US012112290B2

(12) United States Patent
Markison

(10) Patent No.: US 12,112,290 B2
(45) Date of Patent: Oct. 8, 2024

(54) COMPUTER WITH IMPROVED COMPUTER ARCHITECTURE

(71) Applicant: Markison Patent Portal, Inc., Chicago, IL (US)

(72) Inventor: Timothy W. Markison, Mesa, AZ (US)

(73) Assignee: Markison Patent Portal, Inc., Chicago, IL (US)

( * ) Notice: Subject to any disclaimer, the term of this patent is extended or adjusted under 35 U.S.C. 154(b) by 32 days.

(21) Appl. No.: 18/178,741

(22) Filed: Mar. 6, 2023

(65) Prior Publication Data

US 2023/0281255 A1 Sep. 7, 2023

Related U.S. Application Data

(60) Provisional application No. 63/488,227, filed on Mar. 3, 2023, provisional application No. 63/317,380, filed on Mar. 7, 2022.

(51) Int. Cl.
*G06Q 10/0637* (2023.01)
*G06F 16/904* (2019.01)
(Continued)

(52) U.S. Cl.
CPC ..... *G06Q 10/06375* (2013.01); *G06F 16/904* (2019.01); *G06F 18/241* (2023.01); (Continued)

(58) Field of Classification Search
CPC ........... G06Q 10/06375; G06Q 10/103; G06Q 30/0202; G06Q 50/184; G06F 16/904; G06F 18/241; G06F 2216/11
See application file for complete search history.

(56) References Cited

U.S. PATENT DOCUMENTS

2015/0206260 A1* 7/2015 Lundberg ............... G06Q 10/00 705/310
2021/0240334 A1* 8/2021 Brockman ......... G06Q 30/0201
(Continued)

OTHER PUBLICATIONS

Amy J. C. Trappey et al., "Patent Value Analysis Using Deep Learning Models-The Case of IoT Technology Mining for the Manufacturing Industry", IEEE, vol. 68, No. 5 (Year: 2021).*
(Continued)

*Primary Examiner* — Jared M Bibbee
(74) *Attorney, Agent, or Firm* — GARLICK & MARKISON; Timothy W. Markison

(57) ABSTRACT

A computer includes an improved architecture of a computing entity (CE) processing core section, a technology level (TL) co-processor section, a system database section, and a memory section, which stores a CE operating system and a TL operating system. The database section stores TL data operands regarding quantified technologies and the memory section further stores TL system applications, and TL user applications. The CE processing core section executes the TL operating system and the CE operating system. The TL co-processor section executes TL system application(s), in accordance with control of the TL operating system and the CE operating system, to produce TL data operands regarding quantified technologies from a large number of MSBTP documents. The TL co-processor section executes TL user application(s), in accordance with control of the TL operating system and the CE operating system, to produce a digital representation of a characteristic of the quantified technology for display.

11 Claims, 332 Drawing Sheets conventional patent process conventional patent process
annual budget

(51) Int. Cl.

| | |
|---|---|
| ***G06F 18/241*** | (2023.01) |
| ***G06Q 10/10*** | (2023.01) |
| ***G06Q 30/0202*** | (2023.01) |
| ***G06Q 50/18*** | (2012.01) |

(52) U.S. Cl.

CPC ....... *G06Q 10/103* (2013.01); *G06Q 30/0202* (2013.01); *G06Q 50/184* (2013.01); *G06F 2216/11* (2013.01)

(56) References Cited

U.S. PATENT DOCUMENTS

| | | | | |
|---|---|---|---|---|
| 2022/0230262 | A1* | 7/2022 | Kim | G06N 3/045 |
| 2022/0343444 | A1* | 10/2022 | Chan | G06F 16/353 |
| 2022/0391399 | A1* | 12/2022 | Lundberg | G06F 16/2455 |
| 2022/0391814 | A1* | 12/2022 | Kothandaraman | G06F 40/20 |

OTHER PUBLICATIONS

"Helping Pure Storage tap the full power of IP data." Clarivate Case Study. 2021.

"Nationalizing Your PCT Applications." Dennemeyer & Associates IP Blog. (Jul. 2, 2020).

"Technology Taxonomy Example". Cipher. (Mar. 2021).

"The Ultimate Guide to Patent Renewals." Dennemeyer Group IP Blog. (Feb. 3, 2022).

Aristodemou, L., Tietze, F. 2018. "The state-of-the-art on Intellectual Property Analytics (IPA): A literature review on artificial intelligence, machine learning and deep learning methods for analysing intellectual property (IP) data." World Patent Information. vol. 55. pp. 37-51.

Caviggioli, F., Colombelli, A., De Marco, A., Paolucci, E. 2020. "How venture captialists evaluate young innovative company patent portfolios: empirical evidence from Europe." International Journal of Entrepreneurial Behavior & Research. vol. 26 Issue 4. pp. 1-41.

Glasner, J. (Mar. 30, 2023). Startups Turn to New Metrics to Measure Traction. Crunchbase. Retrieved Mar. 30, 2023, from https://news.crunchbase.com.

Krajec, Russ. "Step One for Your Patent: Get Insurance." Received by Markison, Timothy, Jan. 17, 2023.

MacDonald, L., & Tucker, D. (Mar. 20, 2023). Startups and IP protections: Fuel growth and protect your future. Reuters. https://www.reuters.com/legal/legalindustry/startups-ip-protections-fuel-growth-protect-your-future-2023-03-20/#:~:text=Startups%20must%20protect%20their%20ideas,protection%20at%20the%20lowest%20cost.

Swycher, N. "Not Just Another Year." Received by Markison, Timothy, Dec. 16, 2022.

Westfield, M. &. (2021). A guide to valuing tech, software & online businesses. Morgan & Westfield. https:// morganandwestfield.com/articles/a-guide-to-valuing-tech-software-online-businesses/.

* cited by examiner conventional patent process conventional patent process annual budget conventional patent process & annual budget conventional patent process conventional patent process & support services conventional patent process example business value proposition tech value capture via patent protection AI & ML tech value capture via patent protection AI & ML tech value capture via patent protection AI & ML improved computer for technology 70 improved computer for technology 70

| OS function | general description | general rules |
|---|---|---|
| MTU process manage | manage MTU system application processes, MTU user application processes, & MTU OS processes access to HW subsystem | OS processes priority over system applications, which has priority over user application; one write to a record at a time |
| MTU content manage | manage & regulate what constitutes MTUs & their data for new MTUs, merging MTUs, splitting MTUs, and/or editing MTUs; | MTU includes, at a minimum, a marketable feature, a unique value proposition, new and/or existing innovative technology |
| MTU correlation | manage & regulate correlation of ingested documents and existing documents with existing MTUs, new MTUs, changing MTUs | MTU inclusion includes at least one tier up; MTU composition includes at least one tier down; no MTU inclusion for fundamental MTUs |
| MTU system DB manage | manage access to system databases, manage MTU addressing schemes, record creation, record editing, record obsoleting, record deletion | no external access to system databases; only accessed through MTU system applications or MTU user applications |
| MTU private DB manage | manage access to private tracking databases, manage record creation, record editing, record obsoleting, record deletion, report generation | no access other than to authorized user via select MTU user applications |
| user interface manage | control access to MTU user applications based on subscription level & user credentials | no access without proper verification |
| security manage | manage integrity and security of HW resource allocation, manage access to MTU system application | no hacks, no unauthorized data access, no unauthorized data ingest |
| error detect & manage | detection of processing errors, debugging, diagnostics, and/or failure avoidance for MTU system applications and MTU user applications | no deadlocks, no infinite waits, |

FIG. 4C computing entity 110 computing entity 110 computing entity 110 computing entity 110 computing entity 110 computing device 120 computing device 120 computing device 120 computing device 120

HWI = hardware interface (driver)

computing device 120 hardware 180 database

Venn diagram for communications, information, and electrical technologies service supply chain product supply chain high-level technology map high-level to detailed technology map example

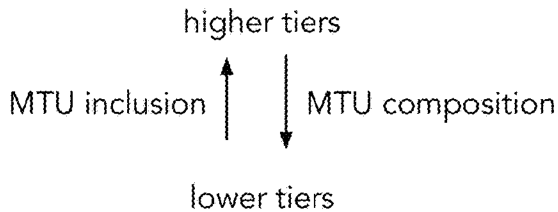

FIG. 15A market-tech unit (MTU) inclusion chart

| MTU | MTUs of possible inclusion | | | | | |
|---|---|---|---|---|---|---|
| CC | CC | BBC | FC | OC | SP | item |
| BBC | BBC | FC | OC | SP | item | |
| FC | FC | OC | SP | item | | |
| OC | OC | SP | item | | | |
| SI | SI | item | | | | |
| item | item | | | | | |

FIG. 15B

MTU layer composition chart

| layer | possible MTUs of composition | | | | | |
|---|---|---|---|---|---|---|
| CC | CC | | | | | |
| BBC | CC | BBC | | | | |
| FC | CC | BBC | FC | | | |
| OC | CC | BBC | FC | OC | | |
| SI | CC | BBC | FC | OC | SI | |
| item | CC | BBC | FC | OC | SI | item |

FIG. 15C

CC = circuit component MTU
BBC = building block circuit MTU
FC = functional circuit MTU
OC = operational circuit MTU
SI = sub-item MTU

MTU layers of a program

PL = Programming Language
OI =Operational Instruction
SR = Sub-Routine
PR = Program re-engineered patent process re-engineered patent process 220 re-engineered patent process 220 re-engineered patent process 220 improved computer for technology 70

MSBTP = marketing, sales, business, technical, and patents
MTU = Market-Tech Unit improved computer for technology 70

MTU record 452

MTU data record 452

CP = cell phone
HWI = hardware interface
API = application programming interface

MTU composition hierarchy diagram general description
A cell phone is a communication device that wirelessly communicates data and/or voice signals via a cellular radio system.

FIG. 47

MTU synonyms
mobile phone
smart phone
cellular phone
cellular telephone

FIG. 48 related MTUs
computing device
portable computing device
smart watch
tablet
laptop

FIG. 49 metadata
date of first use of term "cell phone"
date of most recent use of term
# of data sources reviewed
history of term "cell phone"
# of MTUs in a cell phone
# of MTU lower tiers

FIG. 50 science categories
communications technology
electrical technology
information technology

FIG. 51 manufacturing data
manufacturing facilities
manufacturing processes
quality control
manufacturing equipment
test procedures
test equipment

FIG. 52

CAGR - compounded annual growth rate

FN = foreign national
PCT = patent cooperation treaty

CP = cell phone
HWI = hardware interface
API = application programming interface MTU cell phone composition functional diagram MTU data record 452-1

CP = cell phone
HW = hardware
IO = input / output cell phone IO interface & devices functional diagram cell phone IO interface & devices hierarchy diagram composite cell phone HW functional diagram

FIG. 75
functional diagram of a touchscreen
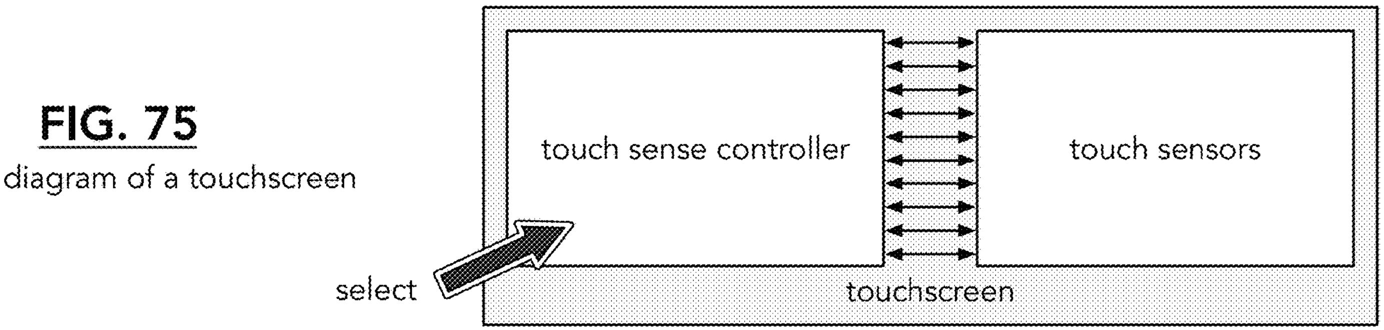
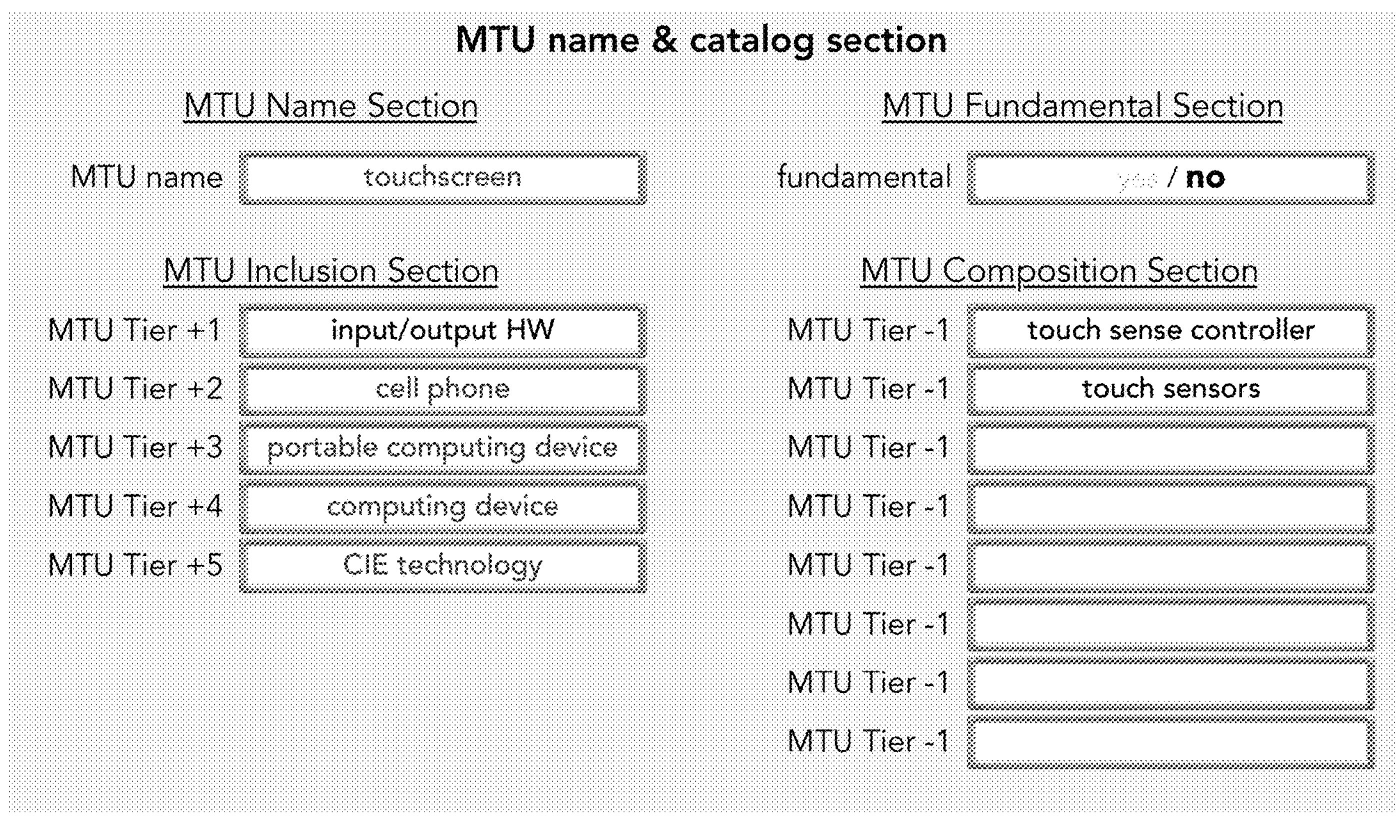
FIG. 76

MTU data record 452-3 functional diagram of a touch screen controller composite functional diagram of a touchscreen controller & touch sensors functional diagram of a sensor circuit for CP touchscreen functional diagram of a sense circuit of a sensor circuit for CP touchscreen composite functional diagram of a sensor circuit for CP touchscreen MTU data record 452-6

FIG. 89
functional diagram of an analog to digital converter
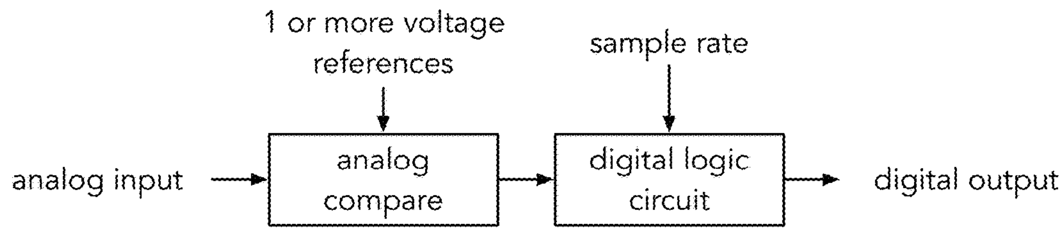
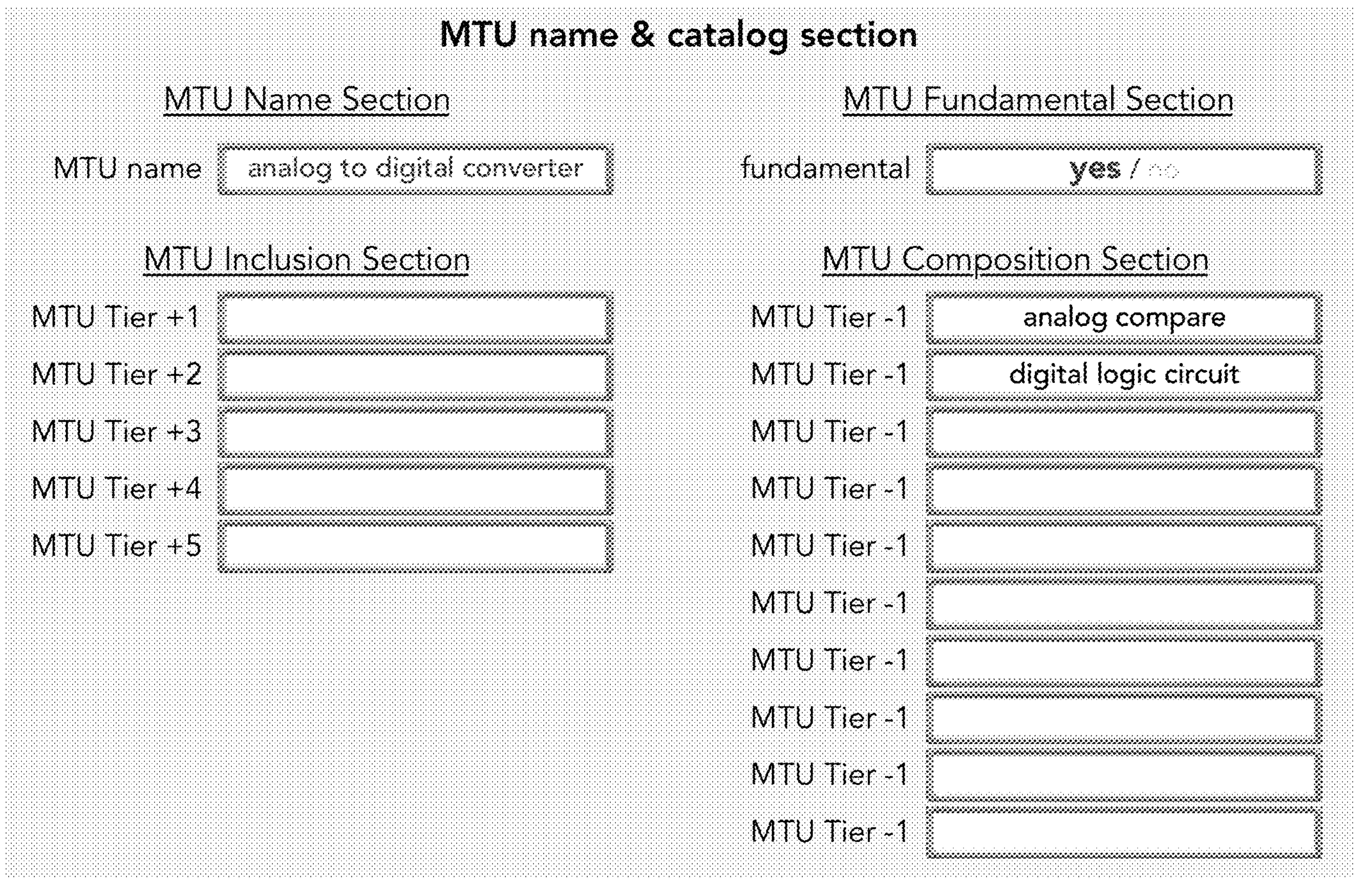
FIG. 90 related MTUs medial view midsole 464

Solution 1: contour focus to obtain fixed FT via insole, midsole, &/or outsole
Novelty nuggets: first contour in heel insole, midsole, and/or outsole, second contour in forefoot insole, midsole, and/or outsole
Inventive embodiments: different combination of novelty nuggets MSBT documents
marketing, sales, business, and/or technical patent documents MSBT data identify & gather app MSBT data dissection & MTU-interpret app MSBT data dissection & MTU-interpret app MSBT data dissection & MTU-interpret app MSBT data dissection & MTU-interpret app MSBT data dissection & MTU-interpret app MSBT data dissection & MTU-interpret app MSBT data dissection & MTU-interpret app MSBT data dissection & MTU-interpret app MSBT data dissection & MTU-interpret app MSBT data dissection & MTU-interpret app MSBT data dissection & MTU-interpret app MSBT data dissection & MTU-interpret app MSBT data dissection & MTU-interpret app MSBT data dissection & MTU-interpret app MSBT data dissection & MTU-interpret app MSBT data dissection & MTU-interpret app MTU tagging of MSBT document app correlation = maybe correlation = no correlation = yes correlation = yes tagging MSBT records MSBT data record creation app patent data identify & gather app patent data dissection, MTU-interpret, and patent term identify app annotated patent record creation app patent term record creation app identify new MTU MTU composition diagram MTU inclusion diagram example of modifying & physical feature

US attorney fees

| name | fixed | hourly |
|---|---|---|
| prepare & file provisional application | | |
| prepare & file non-provisional application | | |
| prepare & file legal placeholder invention | | |
| prepare & file PCT application | | |
| prepare & file continuation application | | |
| prepare & file continuation-in-part application | | |
| prepare & file divisional application | | |
| prepare & file LPI conversion application | | |
| prepare & file provisional conversion application | | |
| prepare & file design application | | |
| prepare & file office action response | | |
| prepare & file de minimus office action response | | |
| prepare & file appeal brief | | |
| prepare & file restriction response | | |
| issuance processing | | |
| annuity processing | | |
| maintenance fee processing processing | | |
| portfolio management fee | | |

US Government fees

| name | micro | small | large |
|---|---|---|---|
| provisional application filing | | | |
| non-provisional application filing | | | |
| PCT application filing | | | |
| design application filing | | | |
| exam request | | | |
| issuance | | | |
| annuity #1 | | | |
| annuity #2 | | | |
| ⋮ | | | |
| annuity #x | | | |
| maintenance #1 | | | |
| ⋮ | | | |
| maintenance #y | | | |

FIG. 163

| portfolio matters | Existing qty | portfolio matters | Existing qty |
|---|---|---|---|
| issued utility patents | | PA search / IDS | |
| pending prov. app. | | office actions | |
| pending non-prov. app. | | issuances | |
| pending PCT app. | | annuities / maint. fees | |

| data input |
|---|
| calculated |

| Issuance actions | receive probability | * | allowance probability | = | per patent issuance probability |
|---|---|---|---|---|---|
| 1st OA allowance | 5% | | 100% | | 5.0% |
| receive 1st OA | 95% | | 66.7% | | 63.4% |
| receive 2nd OA | 31.64% | | 66.7% | | 21.1% |
| receive 3rd OA | 10.53% | | 66.7% | | 7.0% |
| receive 4th OA | 3.51% | | 66.7% | | 2.3% |
| receive another OA | 1.17% | | 66.7% | | 0.8% |

| primary subsequent filing | |
|---|---|
| subsequent filing factor | 1.25 |
| continuation factor | 15% |
| divisonal factor | 2.5% |
| CIP factor | 7.5% |
| LPC factor | 75% |

| secondary subsequent filing | |
|---|---|
| subsequent filing factor | .5 |
| continuation factor | 50% |
| divisonal factor | 5% |
| CIP factor | 20% |
| LPC factor | 25% |

FIG. 166

| portfolio matters | Existing qty | portfolio matters | Existing qty |
|---|---|---|---|
| issued utility patents | | PA search / IDS | |
| pending prov. app. | | office actions | |
| pending non-prov. app. | | issuances | |
| pending PCT app. | | annuities / maint. fees | |

| portfolio matters | CP qty | 1NP qty | 2NP qty | 3NP qty | 4NP qty | 5NP qty | 6NP qty |
|---|---|---|---|---|---|---|---|
| new prov. filings | | | | | | | |
| new utility filings | | | | | | | |
| new PCT filings | | | | | | | |
| new design filings | | | | | | | |

| actions for portfolio matter of OAs | receive probability |
|---|---|
| receive 1st OA allowance | |
| receive 1st OA | |
| allowed after 1st OA response | |
| allowed after 2nd OA response | |
| allowed after 3rd OA response | |
| allowed after 4th OA response | |
| filing date to 1st OA (β) | |
| 1st OA window (σ) | |
| time between subsequent OAs (δ) | |
| window of subsequent OAs (ε) | |

FIG. 168

| data input |
| --- |
| calculated |

| Issuance actions | receive probability | * | allowance probability | = | issuance probability before 1st OA |
| --- | --- | --- | --- | --- | --- |
| 1st OA allowance | 5% | | 100% | | 5.0% |
| receive 1st OA | 95% | | 66.7% | | 63.4% |
| receive 2nd OA | 31.64% | | 66.7% | | 21.1% |
| receive 3rd OA | 10.53% | | 66.7% | | 7.0% |
| receive 4th OA | 3.51% | | 66.7% | | 2.3% |
| receive another OA | 1.17% | | 66.7% | | 0.8% |

| primary subsequent filing | |
| --- | --- |
| subsequent filing factor | 1.25 |
| continuation factor | 15% |
| divisonal factor | 2.5% |
| CIP factor | 7.5% |
| LPC factor | 75% |

| secondary subsequent filing | |
| --- | --- |
| subsequent filing factor | .5 |
| continuation factor | 50% |
| divisonal factor | 5% |
| CIP factor | 20% |
| LPC factor | 25% |

FIG. 169 period

| current period (CP) | 1st next period (1NP) | 2nd next period | 3rd next period | 4th next period | 5th next period | 6th next period |
|---|---|---|---|---|---|---|
| 1/1/22 - 12/31/22 | 1/1/23 - 12/31/23 | 1/1/24 - 12/31/24 | 1/1/25 - 12/31/25 | 1/1/26 - 12/31/26 | 1/1/27 - 12/31/27 | 1/1/28 - 12/31/28 |
| 1/1/23 - 12/31/23 | 1/1/24 - 12/31/24 | 1/1/25 - 12/31/25 | 1/1/26 - 12/31/26 | 1/1/27 - 12/31/27 | 1/1/28 - 12/31/28 | 1/1/29 - 12/31/29 |
| 1/1/24 - 12/31/24 | 1/1/25 - 12/31/25 | 1/1/26 - 12/31/26 | 1/1/27 - 12/31/27 | 1/1/28 - 12/31/28 | 1/1/29 - 12/31/29 | 1/1/30 - 12/31/30 |
| 1/1/25 - 12/31/25 | 1/1/26 - 12/31/26 | 1/1/27 - 12/31/27 | 1/1/28 - 12/31/28 | 1/1/29 - 12/31/29 | 1/1/30 - 12/31/30 | 1/1/31 - 12/31/31 |
| 1/1/26 - 12/31/26 | 1/1/27 - 12/31/27 | 1/1/28 - 12/31/28 | 1/1/29 - 12/31/29 | 1/1/30 - 12/31/30 | 1/1/31 - 12/31/31 | 1/1/32 - 12/31/32 |

time

FIG. 171

| | actual | forecasted | | | | | | |
|---|---|---|---|---|---|---|---|---|
| portfolio matters | Existing qty | CP qty | 1NP qty | 2NP qty | 3NP qty | 4NP qty | 5NP qty | 6NP qty |
| inventions disclosed | | | | | | | | |
| inventions protected | | | | | | | | |
| pending prov. appl. | | | | | | | | |
| pending non-prov. appl. | | | | | | | | |
| pending PCT appl. | | | | | | | | |
| issued patents | | | | | | | | |

FIG. 173

| | actual | forecasted | | | | | | |
|---|---|---|---|---|---|---|---|---|
| portfolio matters | Existing qty | CP qty | 1NP qty | 2NP qty | 3NP qty | 4NP qty | 5NP qty | 6NP qty |
| inventions disclosed | | | | | | | | |
| inventions protected | | | | | | | | |
| pending prov. appl. | | | | | | | | |
| pending non-prov. appl. | | | | | | | | |
| pending PCT appl. | | | | | | | | |
| issued patents | | | | | | | | |

FIG. 174

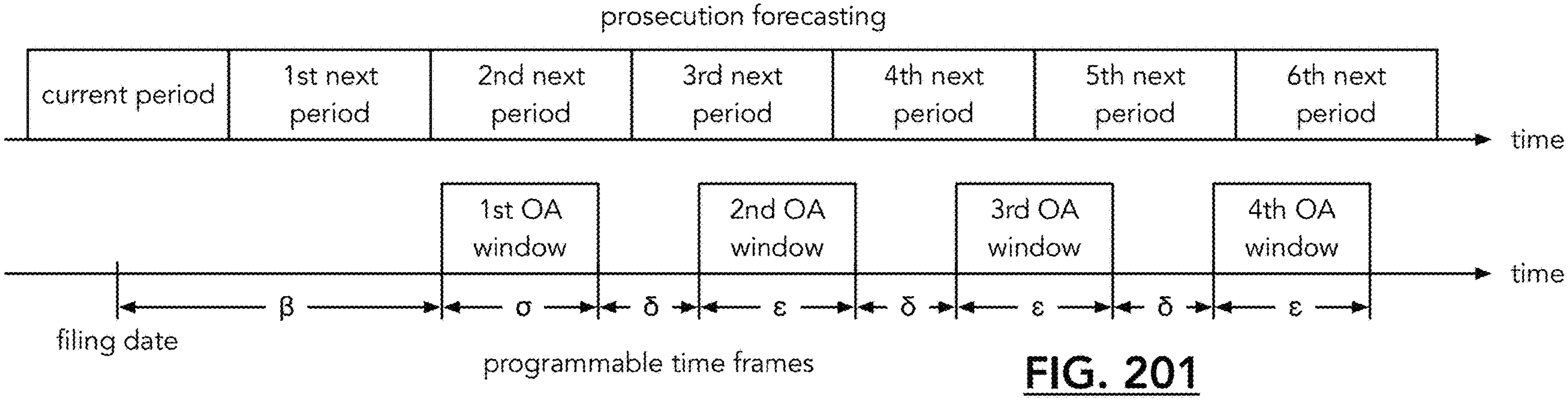

FIG. 201

| actions for portfolio matter of OAs | OA receive probability before 1st OA |
|---|---|
| receive 1st OA allowance | 5% (historical data based) data entry |
| receive 1st OA | 95% (historical data based) data entry |
| allowed after 1st OA response | 66.7% (historical data based) data entry |
| receive 2nd OA | 31.64% (calculated: 100% - 1st OA allowance % - After 1st OA allowance %) |
| allowed after 2nd OA response | 66.7% (historical data based) data entry |
| receive 3rd OA | 10.53% (calculated: Receive 2nd OA % *(1 - After 2nd OA allowance %) |
| allowed after 3rd OA response | 66.7% (historical data based) data entry |
| receive 4th OA | 3.51% (calculated: Receive 3rd OA % *(1 - After 3rd OA allowance %) |
| allowed after 4th OA response | 66.7% (historical data based) data entry |
| receive another OA | 1.17% (calculated: Receive 4th OA % *(1 - After 4th OA allowance %) |

FIG. 202

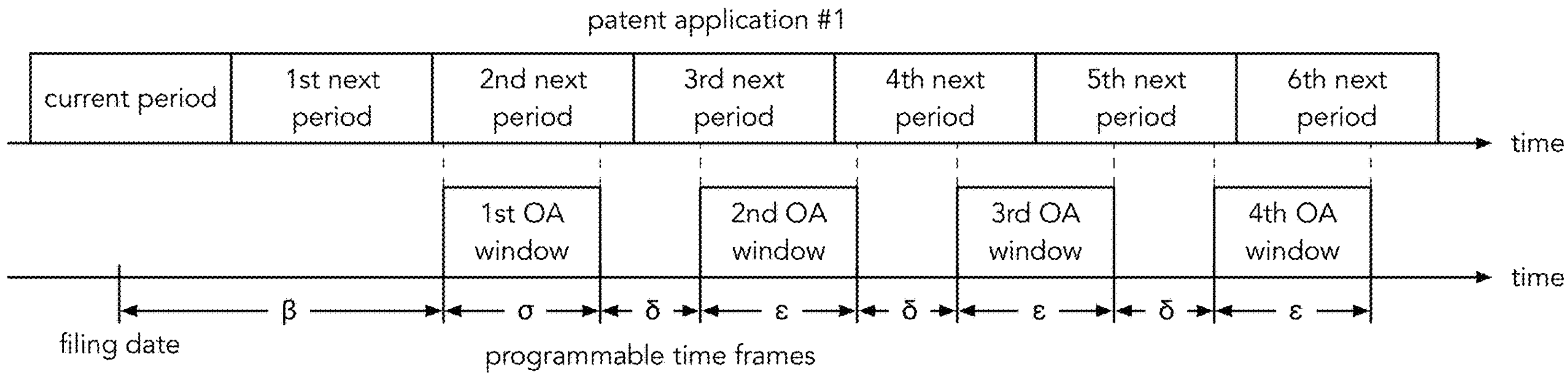

FIG. 203 calculate "timing probabilities" for an OA occurring in a Period

| | CP | 1NP | 2NP | 3NP | 4NP | 5NP | 6NP |
|---|---|---|---|---|---|---|---|
| 1st OA | 0% | 0% | 100% | 0% | 0% | 0% | 0% |
| 2nd OA | 0% | 0% | 0% | 80% | 20% | 0% | 0% |
| 3rd OA | 0% | 0% | 0% | 0% | 50% | 50% | 0% |
| 4th OA | 0% | 0% | 0% | 0% | 0% | 10% | 90% |
| 5th OA | 0% | 0% | 0% | 0% | 0% | 0% | 0% |

0% probability IF OA Window Open Date > Period Close Date (too early)

0% probability IF OA Window Close Date < Period Open Date (too late)

100% probability IF (OA Window Open Date > Period Open Date) AND (OA Window Close Date < Period Close Date) (all within)

x% probability IF (OA Window Open Date < Period Close Date), the "x" = (Period Close Date - OA Window Open Date) / Duration of OA Window (straddle period close)

y% probability IF (OA Window Open Date < Period Open Date), the "y" = (OA Window Close Date - Period Open Date) / Duration of OA Window (straddle period open)

probability of an OA = timing probability * receive probability

FIG. 204 patent application #1 receive probability

| receive | probability |
|---|---|
| 1st OA allowance | 5% |
| receive 1st OA | 95% |
| receive 2nd OA | 31.64% |
| receive 3rd OA | 10.53% |
| receive 4th OA | 3.51% |
| receive another OA | 1.17% |

* timing probabilities

| | CP | 1NP | 2NP | 3NP | 4NP | 5NP | 6NP |
|---|---|---|---|---|---|---|---|
| 1st OA | 0% | 0% | 100% | 0% | 0% | 0% | 0% |
| 2nd OA | 0% | 0% | 0% | 80% | 20% | 0% | 0% |
| 3rd OA | 0% | 0% | 0% | 0% | 50% | 50% | 0% |
| 4th OA | 0% | 0% | 0% | 0% | 0% | 10% | 90% |
| 5th OA | 0% | 0% | 0% | 0% | 0% | 0% | 0% |

=

OA probabilities

| | CP | 1NP | 2NP | 3NP | 4NP | 5NP | 6NP |
|---|---|---|---|---|---|---|---|
| 1st OA | 0% | 0% | 100% | 0% | 0% | 0% | 0% |
| 2nd OA | 0% | 0% | 0% | 25.3% | 6.3% | 0% | 0% |
| 3rd OA | 0% | 0% | 0% | 0% | 5.26% | 5.26% | 0% |
| 4th OA | 0% | 0% | 0% | 0% | 0% | 0.35% | 3.16% |
| 5th OA | 0% | 0% | 0% | 0% | 0% | 0% | 0% |
| sum | **0%** | **0%** | **100%** | **25.3%** | **11.56%** | **5.61%** | **3.16%** |

FIG. 205 calculate "timing probabilities" for an OA occurring in a Period

| | CP | 1NP | 2NP | 3NP | 4NP | 5NP | 6NP |
|---|---|---|---|---|---|---|---|
| 1st OA | 100% | 0% | 0% | 0% | 0% | 0% | 0% |
| 2nd OA | 0% | 80% | 20% | 0% | 0% | 0% | 0% |
| 3rd OA | 0% | 0% | 50% | 50% | 0% | 0% | 0% |
| 4th OA | 0% | 0% | 0% | 10% | 90% | 0% | 0% |
| 5th OA | 0% | 0% | 0% | 0% | 0% | 100% | 0% |

patent application #2 receive probability

| receive | probability |
|---|---|
| 1st OA allowance | 5% |
| receive 1st OA | 95% |
| receive 2nd OA | 31.64% |
| receive 3rd OA | 10.53% |
| receive 4th OA | 3.51% |
| receive another OA | 1.17% |

* timing probabilities

| | CP | 1NP | 2NP | 3NP | 4NP | 5NP | 6NP |
|---|---|---|---|---|---|---|---|
| 1st OA | 100% | 0% | 0% | 0% | 0% | 0% | 0% |
| 2nd OA | 0% | 80% | 20% | 0% | 0% | 0% | 0% |
| 3rd OA | 0% | 0% | 50% | 50% | 0% | 0% | 0% |
| 4th OA | 0% | 0% | 0% | 10% | 90% | 0% | 0% |
| 5th OA | 0% | 0% | 0% | 0% | 0% | 100% | 0% |

=

OA probabilities

| | CP | 1NP | 2NP | 3NP | 4NP | 5NP | 6NP |
|---|---|---|---|---|---|---|---|
| 1st OA | 100% | 0% | 0% | 0% | 0% | 0% | 0% |
| 2nd OA | 0% | 25.3% | 6.3% | 0% | 0% | 0% | 0% |
| 3rd OA | 0% | 0% | 5.26% | 5.26% | 0% | 0% | 0% |
| 4th OA | 0% | 0% | 0% | 0.35% | 3.16% | 0% | 0% |
| 5th OA | 0% | 0% | 0% | 0% | 0% | 1.17% | 0% |
| sum | 100% | 25.3% | 11.56% | 5.61% | 3.16% | 1.17% | 0% |

FIG. 208

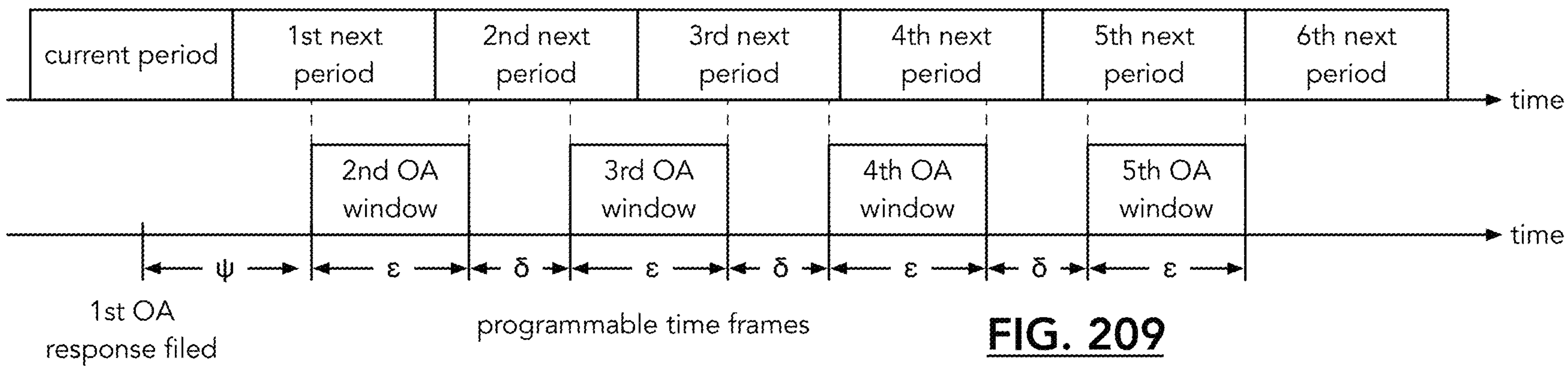

FIG. 209

| actions for portfolio matter of OAs | OA receive probability after 1st OA and before 2nd OA |
|---|---|
| receive 1st OA allowance | 0% |
| receive 1st OA | 0% |
| allowed after 1st OA response | 66.7% (historical data based) data entry |
| receive 2nd OA | 33.3% (calculated: (1 - After 1st OA allowance %)) |
| allowed after 2nd OA response | 66.7% (historical data based) data entry |
| receive 3rd OA | 11.1% (calculated: Receive 2nd OA % *(1 - After 2nd OA allowance %)) |
| allowed after 3rd OA response | 66.7% (historical data based) data entry |
| receive 4th OA | 3.7% (calculated: Receive 3rd OA % *(1 - After 3rd OA allowance %)) |
| allowed after 4th OA response | 66.7% (historical data based) data entry |
| receive another OA | 1.2% (calculated: Receive 4th OA % *(1 - After 4th OA allowance %)) |

FIG. 210 calculate "timing probabilities" for an OA occurring in a Period

| | CP | 1NP | 2NP | 3NP | 4NP | 5NP | 6NP |
|---|---|---|---|---|---|---|---|
| 1st OA | 0% | 0% | 0% | 0% | 0% | 0% | 0% |
| 2nd OA | 0% | 80% | 20% | 0% | 0% | 0% | 0% |
| 3rd OA | 0% | 0% | 50% | 50% | 0% | 0% | 0% |
| 4th OA | 0% | 0% | 0% | 10% | 90% | 0% | 0% |
| 5th OA | 0% | 0% | 0% | 0% | 0% | 100% | 0% |

patent application #3 receive probability

| receive | probability |
|---|---|
| 1st OA allowance | |
| receive 1st OA | |
| receive 2nd OA | 33.3% |
| receive 3rd OA | 11.1% |
| receive 4th OA | 3.7% |
| receive another OA | 1.2% |

* timing probabilities

| | CP | 1NP | 2NP | 3NP | 4NP | 5NP | 6NP |
|---|---|---|---|---|---|---|---|
| 1st OA | 0% | 0% | 0% | 0% | 0% | 0% | 0% |
| 2nd OA | 0% | 80% | 20% | 0% | 0% | 0% | 0% |
| 3rd OA | 0% | 0% | 50% | 50% | 0% | 0% | 0% |
| 4th OA | 0% | 0% | 0% | 10% | 90% | 0% | 0% |
| 5th OA | 0% | 0% | 0% | 0% | 0% | 100% | 0% |

=

OA probabilities

| | CP | 1NP | 2NP | 3NP | 4NP | 5NP | 6NP |
|---|---|---|---|---|---|---|---|
| 1st OA | 0% | 0% | 0% | 0% | 0% | 0% | 0% |
| 2nd OA | 0% | 26.7% | 6.7% | 0% | 0% | 0% | 0% |
| 3rd OA | 0% | 0% | 5.5% | 5.5% | 0% | 0% | 0% |
| 4th OA | 0% | 0% | 0% | 0.37% | 3.3% | 0% | 0% |
| 5th OA | 0% | 0% | 0% | 0% | 0% | 1.2% | 0% |
| sum | 0% | 26.7% | 12.2% | 5.87% | 3.3% | 1.2% | 0% |

FIG. 213

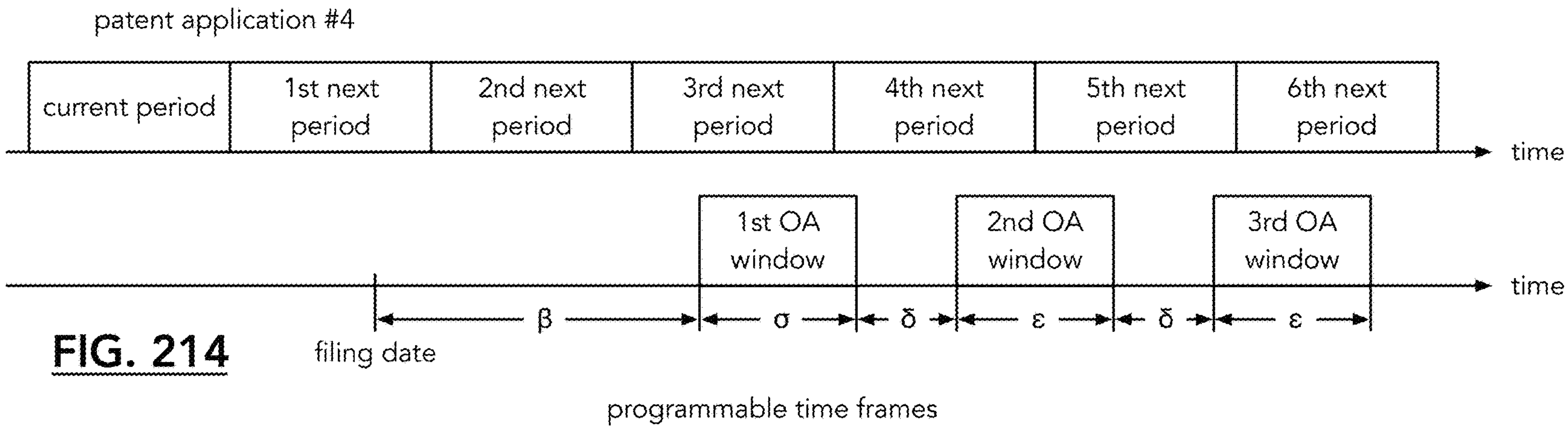

FIG. 214

| actions for portfolio matter of OAs | OA receive probability before 1st OA |
|---|---|
| receive 1st OA allowance | 5% (historical data based) data entry |
| receive 1st OA | 95% (historical data based) data entry |
| allowed after 1st OA response | 66.7% (historical data based) data entry |
| receive 2nd OA | 31.64% (calculated: 100% - 1st OA allowance % - After 1st OA allowance %) |
| allowed after 2nd OA response | 66.7% (historical data based) data entry |
| receive 3rd OA | 10.53% (calculated: Receive 2nd OA % *(1 - After 2nd OA allowance %) |
| allowed after 3rd OA response | 66.7% (historical data based) data entry |
| receive 4th OA | 3.51% (calculated: Receive 3rd OA % *(1 - After 3rd OA allowance %) |
| allowed after 4th OA response | 66.7% (historical data based) data entry |
| receive another OA | 1.17% (calculated: Receive 4th OA % *(1 - After 4th OA allowance %) |

FIG. 215 calculate "timing probabilities" for an OA occurring in a Period

| | CP | 1NP | 2NP | 3NP | 4NP | 5NP | 6NP |
|---|---|---|---|---|---|---|---|
| 1st OA | 0% | 0% | 0% | 90% | 10% | 0% | 0% |
| 2nd OA | 0% | 0% | 0% | 0% | 50% | 50% | 0% |
| 3rd OA | 0% | 0% | 0% | 0% | 0% | 10% | 90% |
| 4th OA | 0% | 0% | 0% | 0% | 0% | 0% | 0% |
| 5th OA | 0% | 0% | 0% | 0% | 0% | 0% | 0% |

patent application #4 receive probability

| receive | probability |
|---|---|
| 1st OA allowance | 5% |
| receive 1st OA | 95% |
| receive 2nd OA | 31.64% |
| receive 3rd OA | 10.53% |
| receive 4th OA | 3.51% |
| receive another OA | 1.17% |

* timing probabilities

| | CP | 1NP | 2NP | 3NP | 4NP | 5NP | 6NP |
|---|---|---|---|---|---|---|---|
| 1st OA | 0% | 0% | 0% | 90% | 10% | 0% | 0% |
| 2nd OA | 0% | 0% | 0% | 0% | 50% | 50% | 0% |
| 3rd OA | 0% | 0% | 0% | 0% | 0% | 10% | 90% |
| 4th OA | 0% | 0% | 0% | 0% | 0% | 0% | 0% |
| 5th OA | 0% | 0% | 0% | 0% | 0% | 0% | 0% |

=

OA probabilities

| | CP | 1NP | 2NP | 3NP | 4NP | 5NP | 6NP |
|---|---|---|---|---|---|---|---|
| 1st OA | 0% | 0% | 0% | 90% | 10% | 0% | 0% |
| 2nd OA | 0% | 0% | 0% | 0% | 15.8% | 15.8% | 0% |
| 3rd OA | 0% | 0% | 0% | 0% | 0% | 1.1% | 9.4% |
| 4th OA | 0% | 0% | 0% | 0% | 0% | 0% | 0% |
| 5th OA | 0% | 0% | 0% | 0% | 0% | 0% | 0% |
| sum | **0%** | **0%** | **0%** | **90%** | **26.8%** | **16.9%** | **9.4%** |

FIG. 218

OA probabilities for patent application #1

| | CP | 1NP | 2NP | 3NP | 4NP | 5NP | 6NP |
|---|---|---|---|---|---|---|---|
| sum | 0% | 0% | 100% | 25.3% | 11.56% | 5.61% | 3.16% |

OA probabilities for patent application #2

| | CP | 1NP | 2NP | 3NP | 4NP | 5NP | 6NP |
|---|---|---|---|---|---|---|---|
| sum | 100% | 25.3% | 11.56% | 5.61% | 3.16% | 1.17% | 0% |

OA probabilities for patent application #3

| | CP | 1NP | 2NP | 3NP | 4NP | 5NP | 6NP |
|---|---|---|---|---|---|---|---|
| sum | 0% | 26.7% | 12.2% | 5.87% | 3.3% | 1.2% | 0% |

OA probabilities for patent application #4

| | CP | 1NP | 2NP | 3NP | 4NP | 5NP | 6NP |
|---|---|---|---|---|---|---|---|
| sum | **0%** | **0%** | **0%** | **90%** | **26.8%** | **16.9%** | **9.4%** |

| | | | | | | | |
|---|---|---|---|---|---|---|---|
| cum. sum | 100% | 52% | 123.8% | 126.8% | 44.8% | 24.9% | 12.6% |

| | CP | 1NP | 2NP | 3NP | 4NP | 5NP | 6NP |
|---|---|---|---|---|---|---|---|
| cum. sum | 100% | 105.3% | 148.3% | 138.7% | 51.5% | 27.4% | 12.6% |
| Total # of OAs | 1 | .52 | 1.24 | 1.27 | .45 | .25 | .13 |

FIG. 221

1st OA probabilities

| | CP | 1NP | 2NP | 3NP | 4NP | 5NP | 6NP |
|---|---|---|---|---|---|---|---|
| patent application #1 | 0% | 0% | 100% | 0% | 0% | 0% | 0% |
| patent application #2 | 100% | 0% | 0% | 0% | 0% | 0% | 0% |
| patent application #3 | 0% | 0% | 0% | 0% | 0% | 0% | 0% |
| patent application #4 | 0% | 0% | 0% | 90% | 10% | 0% | 0% |
| sum of 1st OA | 100% | 0% | 100% | 90% | 10% | 0% | 0% |
| # of 1st OAs | 1 | 0 | 1 | 0.9 | 0.1 | 0 | 0 |
| 1st OA allowance responses | 0.05 | 0 | 0.05 | 0.045 | 0.005 | 0 | 0 |
| full OA responses | 0.95 | .52 | 1.19 | 1.23 | .44 | .25 | .13 |
| Total # of OAs | 1 | .52 | 1.24 | 1.27 | .45 | .25 | .13 |

FIG. 222 expense for cumulative OA probabilities

| | | | | | | | |
|---|---|---|---|---|---|---|---|
| 1st OA allowance expense | $50 | 0 | $50 | $45 | $5 | 0 | 0 |
| full OA response expense | $4.75K | $2.6K | $5.95K | $6.2K | $2.2K | $1.25K | $650 |
| Total OA response expense | $4.8K | $2.6K | $6.0K | $6.2K | $2.2K | $1.25K | $650 |

issuance probability

| Issuance actions | receive probability | * | allowance probability | = | issuance probability based on OA |
|---|---|---|---|---|---|
| 1st OA allowance | 5% | | 100% | | 5.0% |
| receive 1st OA | 95% | | 66.7% | | 63.4% |
| receive 2nd OA | 31.64% | | 66.7% | | 21.1% |
| receive 3rd OA | 10.53% | | 66.7% | | 7.0% |
| receive 4th OA | 3.51% | | 66.7% | | 2.3% |
| receive another OA | 1.17% | | 66.7% | | 0.8% |

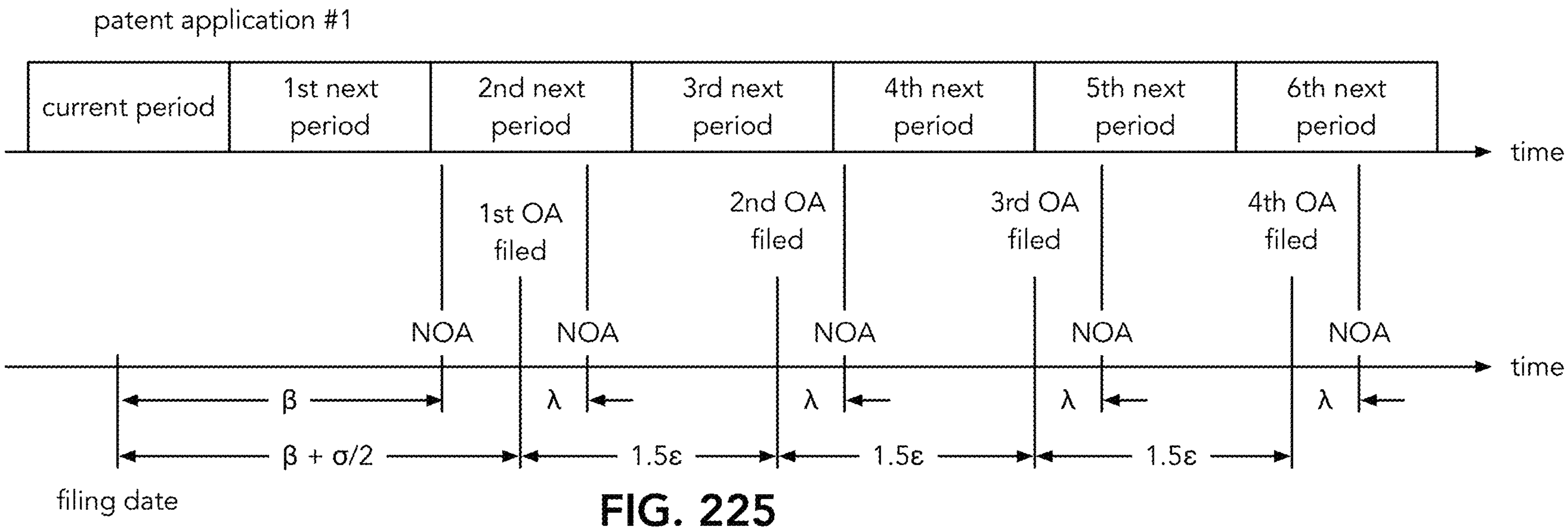

FIG. 225 calculate "timing probabilities" for issuance in a Period

| | CP | 1NP | 2NP | 3NP | 4NP | 5NP | 6NP |
|---|---|---|---|---|---|---|---|
| receive NOA from 1st OA allowance | 0% | 0% | 100% | 0% | 0% | 0% | 0% |
| receive NOA from 1st OA reponse | 0% | 0% | 100% | 0% | 0% | 0% | 0% |
| receive NOA from 2nd OA response | 0% | 0% | 0% | 0% | 100% | 0% | 0% |
| receive NOA from 3rd OA response | 0% | 0% | 0% | 0% | 0% | 100% | 0% |
| receive NOA from 4th OA response | 0% | 0% | 0% | 0% | 0% | 0% | 100% |
| receive NOA from another OA response | 0% | 0% | 0% | 0% | 0% | 0% | 0% |

calculate dates for NOA and then determine which period they fall in

FIG. 226 patent application #1

| | issuance probability based on OA |
|---|---|
| 1st OA allowance | 5.0% |
| receive 1st OA | 63.4% |
| receive 2nd OA | 21.1% |
| receive 3rd OA | 7.0% |
| receive 4th OA | 2.3% |
| receive another OA | 0.8% |

*

"timing probabilities" for issuance

| CP | 1NP | 2NP | 3NP | 4NP | 5NP | 6NP |
|---|---|---|---|---|---|---|
| 0% | 0% | 100% | 0% | 0% | 0% | 0% |
| 0% | 0% | 100% | 0% | 0% | 0% | 0% |
| 0% | 0% | 0% | 0% | 100% | 0% | 0% |
| 0% | 0% | 0% | 0% | 0% | 100% | 0% |
| 0% | 0% | 0% | 0% | 0% | 0% | 100% |
| 0% | 0% | 0% | 0% | 0% | 0% | 0% |

=

"timing probabilities" for issuance

| | CP | 1NP | 2NP | 3NP | 4NP | 5NP | 6NP |
|---|---|---|---|---|---|---|---|
| receive NOA from 1st OA allowance | 0% | 0% | 5% | 0% | 0% | 0% | 0% |
| receive NOA from 1st OA reponse | 0% | 0% | 63.4% | 0% | 0% | 0% | 0% |
| receive NOA from 2nd OA response | 0% | 0% | 0% | 0% | 21.1% | 0% | 0% |
| receive NOA from 3rd OA response | 0% | 0% | 0% | 0% | 0% | 7.0% | 0% |
| receive NOA from 4th OA response | 0% | 0% | 0% | 0% | 0% | 0% | 2.3% |
| receive NOA from another OA response | 0% | 0% | 0% | 0% | 0% | 0% | 0% |
| sum of allowance % | 0% | 0% | 68.4% | 0% | 21.1% | 7.0% | 2.3% |

FIG. 227 issuance probability

| Issuance actions | receive probability | * | allowance probability | = | issuance probability based on OA |
|---|---|---|---|---|---|
| 1st OA allowance | 5% | | 100% | | 5.0% |
| receive 1st OA | 95% | | 66.7% | | 63.4% |
| receive 2nd OA | 31.64% | | 66.7% | | 21.1% |
| receive 3rd OA | 10.53% | | 66.7% | | 7.0% |
| receive 4th OA | 3.51% | | 66.7% | | 2.3% |
| receive another OA | 1.17% | | 66.7% | | 0.8% |

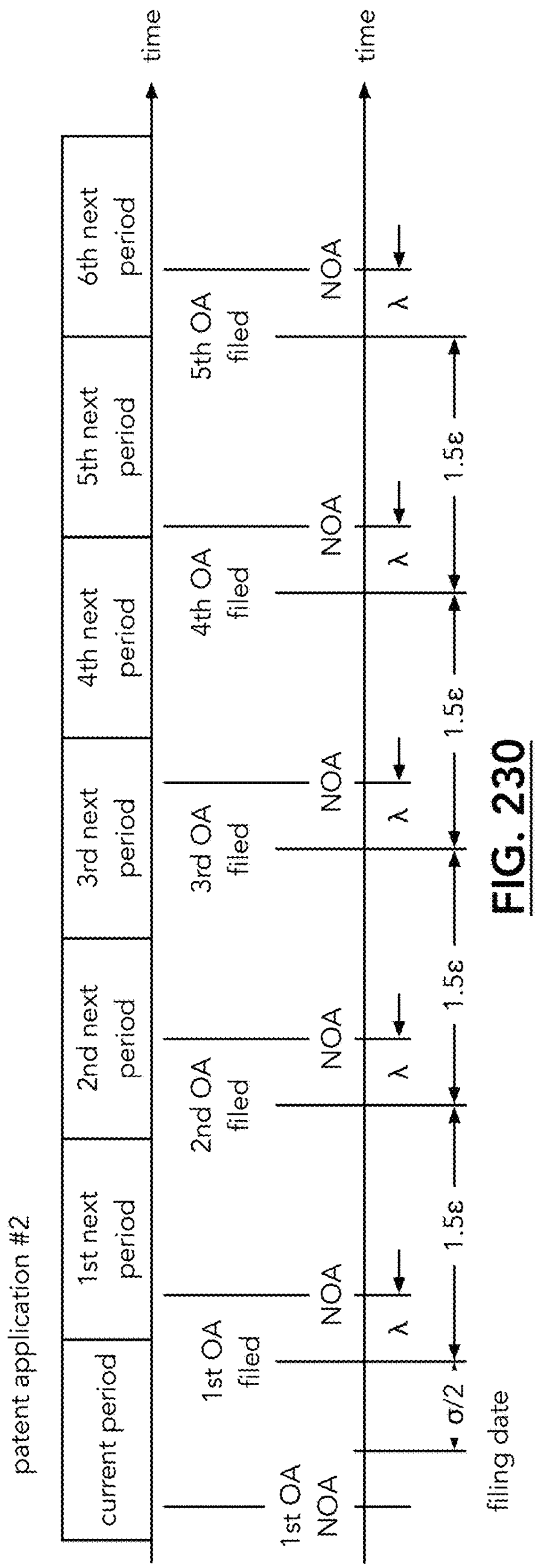

FIG. 230 calculate "timing probabilities" for issuance in a Period

| | CP | 1NP | 2NP | 3NP | 4NP | 5NP | 6NP |
|---|---|---|---|---|---|---|---|
| receive NOA from 1st OA allowance | 100% | 0% | 0% | 0% | 0% | 0% | 0% |
| receive NOA from 1st OA response | 0% | 100% | 0% | 0% | 0% | 0% | 0% |
| receive NOA from 2nd OA response | 0% | 0% | 100% | 0% | 0% | 0% | 0% |
| receive NOA from 3rd OA response | 0% | 0% | 0% | 100% | 0% | 0% | 0% |
| receive NOA from 4th OA response | 0% | 0% | 0% | 0% | 0% | 100% | 0% |
| receive NOA from another OA response | 0% | 0% | 0% | 0% | 0% | 0% | 100% |

calculate dates for NOA and then determine which period they fall in

FIG. 231 patent application #2

| | issuance probability based on OA |
|---|---|
| 1st OA allowance | 5.0% |
| receive 1st OA | 63.4% |
| receive 2nd OA | 21.1% |
| receive 3rd OA | 7.0% |
| receive 4th OA | 2.3% |
| receive another OA | 0.8% |

*

"timing probabilities" for issuance

| CP | 1NP | 2NP | 3NP | 4NP | 5NP | 6NP |
|---|---|---|---|---|---|---|
| 100% | 0% | 0% | 0% | 0% | 0% | 0% |
| 0% | 100% | 0% | 0% | 0% | 0% | 0% |
| 0% | 0% | 100% | 0% | 0% | 0% | 0% |
| 0% | 0% | 0% | 100% | 0% | 0% | 0% |
| 0% | 0% | 0% | 0% | 0% | 100% | 0% |
| 0% | 0% | 0% | 0% | 0% | 0% | 100% |

=

"timing probabilities" for issuance

| | CP | 1NP | 2NP | 3NP | 4NP | 5NP | 6NP |
|---|---|---|---|---|---|---|---|
| receive NOA from 1st OA allowance | 5% | 0% | 0% | 0% | 0% | 0% | 0% |
| receive NOA from 1st OA reponse | 0% | 63.4% | 0% | 0% | 0% | 0% | 0% |
| receive NOA from 2nd OA response | 0% | 0% | 21.1% | 0% | 0% | 0% | 0% |
| receive NOA from 3rd OA response | 0% | 0% | 0% | 7.0% | 0% | 0% | 0% |
| receive NOA from 4th OA response | 0% | 0% | 0% | 0% | 0% | 2.3% | 0% |
| receive NOA from another OA response | 0% | 0% | 0% | 0% | 0% | 0% | 0.8% |
| sum of allowance % | 5% | 63.4% | 21.1% | 7.0% | 0% | 2.3% | 0.8% |

FIG. 232 issuance probability

| Issuance actions | receive probability | * | allowance probability | = | issuance probability based on OA |
|---|---|---|---|---|---|
| 1st OA allowance | | | 100% | | 0.0% |
| receive 1st OA | 100% | | 66.7% | | 66.7% |
| receive 2nd OA | 33.3% | | 66.7% | | 22.2% |
| receive 3rd OA | 11.1% | | 66.7% | | 7.4% |
| receive 4th OA | 3.7% | | 66.7% | | 2.5% |
| receive another OA | 1.2% | | 66.7% | | 0.8% |

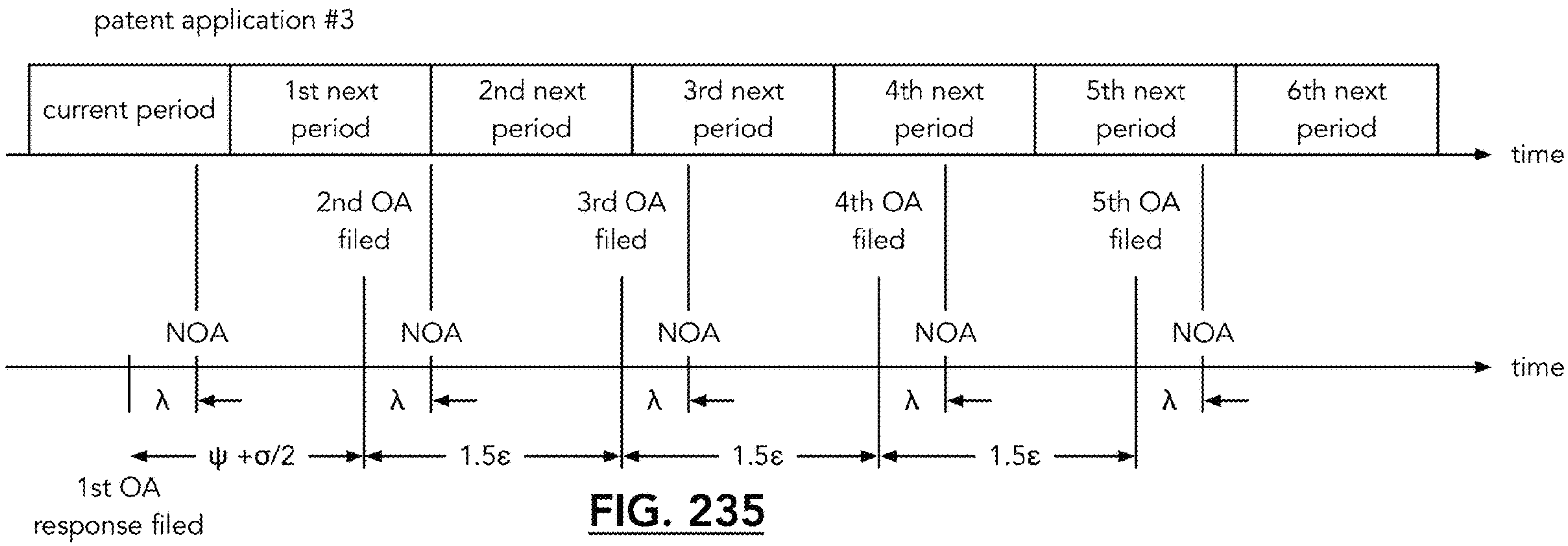

FIG. 235 calculate "timing probabilities" for issuance in a Period

| | CP | 1NP | 2NP | 3NP | 4NP | 5NP | 6NP |
|---|---|---|---|---|---|---|---|
| receive NOA from 1st OA allowance | 0% | 0% | 0% | 0% | 0% | 0% | 0% |
| receive NOA from 1st OA reponse | 100% | 0% | 0% | 0% | 0% | 0% | 0% |
| receive NOA from 2nd OA response | 0% | 100% | 0% | 0% | 0% | 0% | 0% |
| receive NOA from 3rd OA response | 0% | 0% | 0% | 100% | 0% | 0% | 0% |
| receive NOA from 4th OA response | 0% | 0% | 0% | 0% | 100% | 0% | 0% |
| receive NOA from another OA response | 0% | 0% | 0% | 0% | 0% | 100% | 0% |

calculate dates for NOA and then determine which period they fall in

FIG. 236 patent application #3

| | issuance probability based on OA |
|---|---|
| 1st OA allowance | 0.0% |
| receive 1st OA | 66.7% |
| receive 2nd OA | 22.2% |
| receive 3rd OA | 7.4% |
| receive 4th OA | 2.5% |
| receive another OA | 0.8% |

*

"timing probabilities" for issuance

| CP | 1NP | 2NP | 3NP | 4NP | 5NP | 6NP |
|---|---|---|---|---|---|---|
| 0% | 0% | 0% | 0% | 0% | 0% | 0% |
| 100% | 0% | 0% | 0% | 0% | 0% | 0% |
| 0% | 100% | 0% | 0% | 0% | 0% | 0% |
| 0% | 0% | 0% | 100% | 0% | 0% | 0% |
| 0% | 0% | 0% | 0% | 100% | 0% | 0% |
| 0% | 0% | 0% | 0% | 0% | 100% | 0% |

=

"timing probabilities" for issuance

| | CP | 1NP | 2NP | 3NP | 4NP | 5NP | 6NP |
|---|---|---|---|---|---|---|---|
| receive NOA from 1st OA allowance | 0% | 0% | 0% | 0% | 0% | 0% | 0% |
| receive NOA from 1st OA reponse | 66.7% | 0% | 0% | 0% | 0% | 0% | 0% |
| receive NOA from 2nd OA response | 0% | 22.2% | 0% | 0% | 0% | 0% | 0% |
| receive NOA from 3rd OA response | 0% | 0% | 0% | 7.4% | 0% | 0% | 0% |
| receive NOA from 4th OA response | 0% | 0% | 0% | 0% | 2.5% | 0% | 0% |
| receive NOA from another OA response | 0% | 0% | 0% | 0% | 0% | 0.8% | 0% |
| sum of allowance % | 0% | 22.2% | 0% | 7.4% | 2.5% | 0.8% | 0% |

FIG. 237

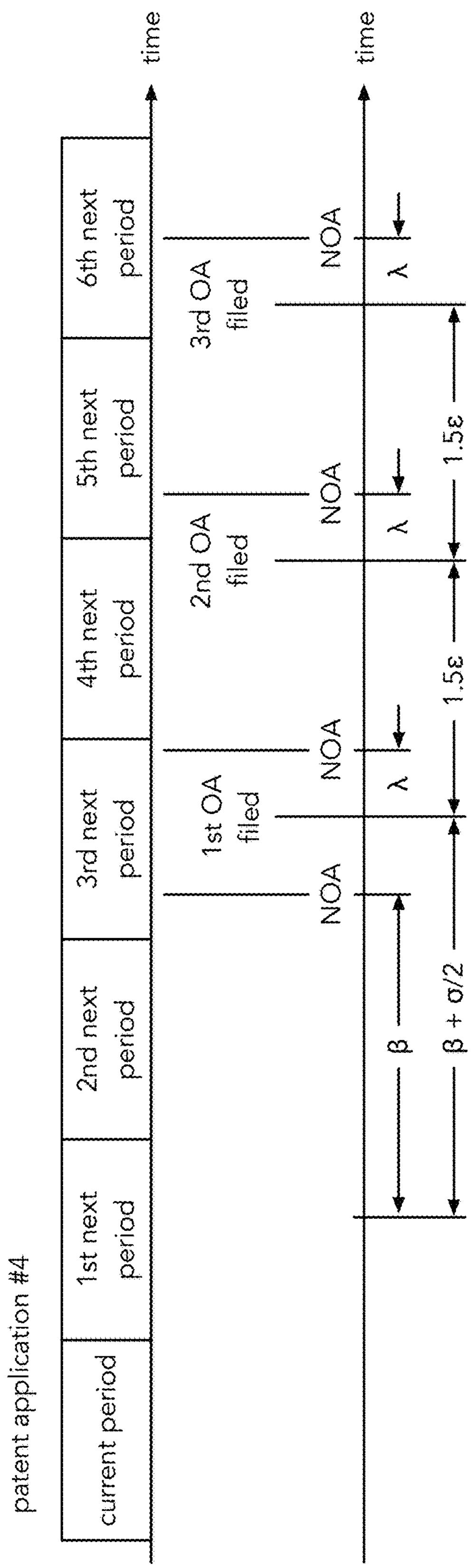

FIG. 240 calculate "timing probabilities" for issuance in a Period

| | CP | 1NP | 2NP | 3NP | 4NP | 5NP | 6NP |
|---|---|---|---|---|---|---|---|
| receive NOA from 1st OA allowance | 0% | 0% | 0% | 100% | 0% | 0% | 0% |
| receive NOA from 1st OA reponse | 0% | 0% | 0% | 100% | 0% | 0% | 0% |
| receive NOA from 2nd OA response | 0% | 0% | 0% | 0% | 0% | 100% | 0% |
| receive NOA from 3rd OA response | 0% | 0% | 0% | 0% | 0% | 0% | 100% |
| receive NOA from 4th OA response | 0% | 0% | 0% | 0% | 0% | 0% | 0% |
| receive NOA from another OA response | 0% | 0% | 0% | 0% | 0% | 0% | 0% |

calculate dates for NOA and then determine which period they fall in

FIG. 241 patent application #4

| | issuance probability based on OA |
|---|---|
| 1st OA allowance | 5.0% |
| receive 1st OA | 63.4% |
| receive 2nd OA | 21.1% |
| receive 3rd OA | 7.0% |
| receive 4th OA | 2.3% |
| receive another OA | 0.8% |

*

"timing probabilities" for issuance

| CP | 1NP | 2NP | 3NP | 4NP | 5NP | 6NP |
|---|---|---|---|---|---|---|
| 0% | 0% | 0% | 100% | 0% | 0% | 0% |
| 0% | 0% | 0% | 100% | 0% | 0% | 0% |
| 0% | 0% | 0% | 0% | 0% | 100% | 0% |
| 0% | 0% | 0% | 0% | 0% | 0% | 100% |
| 0% | 0% | 0% | 0% | 0% | 0% | 0% |
| 0% | 0% | 0% | 0% | 0% | 0% | 0% |

=

"timing probabilities" for issuance

| | CP | 1NP | 2NP | 3NP | 4NP | 5NP | 6NP |
|---|---|---|---|---|---|---|---|
| receive NOA from 1st OA allowance | 0% | 0% | 0% | 5% | 0% | 0% | 0% |
| receive NOA from 1st OA reponse | 0% | 0% | 0% | 63.4% | 0% | 0% | 0% |
| receive NOA from 2nd OA response | 0% | 0% | 0% | 0% | 0% | 21.1% | 0% |
| receive NOA from 3rd OA response | 0% | 0% | 0% | 0% | 0% | 0% | 7.0% |
| receive NOA from 4th OA response | 0% | 0% | 0% | 0% | 0% | 0% | 0% |
| receive NOA from another OA response | 0% | 0% | 0% | 0% | 0% | 0% | 0% |
| sum of allowance % | 0% | 0% | 0% | 68.4% | 0% | 21.1% | 7.0% |

FIG. 242 issuance forecast

| | CP | 1NP | 2NP | 3NP | 4NP | 5NP | 6NP |
|---|---|---|---|---|---|---|---|
| Application #1 sum of issuances % | 0% | 68.4% | 0% | 0% | 21.1% | 7.0% | 2.3% |
| Application #2 sum of issuances % | 5% | 63.4% | 21.1% | 7.0% | 0% | 2.3% | 0.8% |
| Application #3 sum of issuances % | 66.7% | 22.2% | 0% | 7.4% | 2.5% | 0.8% | 0% |
| Application #4 sum of issuances % | 0% | 0% | 0% | 68.4% | 0% | 21.1% | 7.0% |
| cumulative sum of issuances % | **71.7%** | **154%** | **21.1%** | **82.8%** | **23.6%** | **31.2%** | **10.1%** |
| cumulative sum of issuances | **0.72** | **1.54** | **0.21** | **0.83** | **0.24** | **0.31** | **0.10** |

FIG. 243

| | | | | | | | |
|---|---|---|---|---|---|---|---|
| issuance expenses (attorney fees) | $1,080 | $2,310 | $315 | $1,245 | $360 | $465 | $150 |
| issuance expenses (gov't fees) | $504 | $1,078 | $147 | $581 | $168 | $217 | $70 |
| issuance expenses (total fees) | $1,584 | $3,388 | $462 | $1,826 | $528 | $682 | $220 |

FIG. 244 patent application #1

| | |
|---|---|
| application type | utility |

| primary subsequent filing | |
|---|---|
| subsequent filing factor | 1.25 |
| continuation factor | 15% |
| divisonal factor | 2.5% |
| CIP factor | 7.5% |
| LPC factor | 75% |

| secondary subsequent filing | |
|---|---|
| subsequent filing factor | .5 |
| continuation factor | 50% |
| divisonal factor | 5% |
| CIP factor | 20% |
| LPC factor | 25% |

FIG. 247

| | | CP | 1NP | 2NP | 3NP | 4NP | 5NP | 6NP |
|---|---|---|---|---|---|---|---|---|
| sum of allowance % | | 0% | 0% | 68.4% | 0% | 21.1% | 7.0% | 2.3% |
| CON % | 18.8% | 0% | 0% | 12.9% | 0% | 4.0% | 1.3% | 0.4% |
| DIV % | 3.1% | 0% | 0% | 2.1% | 0% | 0.7% | 0.2% | 0% |
| CIP % | 9.4% | 0% | 0% | 6.4% | 0% | 2.0% | 0.7% | 0.2% |
| LPC % | 93.8% | 0% | 0% | 64.2% | 0% | 19.8% | 6.6% | 2.2% |

FIG. 248 patent application #2

| application type | utility |
|---|---|

| primary subsequent filing | |
|---|---|
| subsequent filing factor | 1.25 |
| continuation factor | 15% |
| divisonal factor | 2.5% |
| CIP factor | 7.5% |
| LPC factor | 75% |

| secondary subsequent filing | |
|---|---|
| subsequent filing factor | .5 |
| continuation factor | 50% |
| divisonal factor | 5% |
| CIP factor | 20% |
| LPC factor | 25% |

FIG. 249

| | | CP | 1NP | 2NP | 3NP | 4NP | 5NP | 6NP |
|---|---|---|---|---|---|---|---|---|
| sum of allowance % | | 5% | 63.4% | 21.1% | 7.0% | 0% | 2.3% | 0.8% |
| CON % | 18.8% | 0.9% | 11.9% | 4.0% | 1.3% | 0% | 0.4% | 0% |
| DIV % | 3.2% | 0.1% | 2.0% | 0.7% | 0.2% | 0% | 0% | 0% |
| CIP % | 9.4% | 0.5% | 5.9% | 2.0% | 0.7% | 0% | 0.2% | 0% |
| LPC % | 93.4% | 4.7% | 59.4% | 19.8% | 6.6% | 0% | 2.2% | 0.75% |

FIG. 250 patent application #3

| | |
|---|---|
| application type | utility |

| primary subsequent filing | |
|---|---|
| subsequent filing factor | 1.25 |
| continuation factor | 15% |
| divisonal factor | 2.5% |
| CIP factor | 7.5% |
| LPC factor | 75% |

| secondary subsequent filing | |
|---|---|
| subsequent filing factor | .5 |
| continuation factor | 50% |
| divisonal factor | 5% |
| CIP factor | 20% |
| LPC factor | 25% |

FIG. 251

| | | CP | 1NP | 2NP | 3NP | 4NP | 5NP | 6NP |
|---|---|---|---|---|---|---|---|---|
| sum of allowance % | | 66.7% | 22.2% | 0% | 7.4% | 2.5% | 0.8% | 0% |
| CON % | 18.8% | 12.5% | 4.2% | 0% | 1.4% | 0.5% | 0.2% | 0% |
| DIV % | 3.2% | 2.1% | 0.7% | 0% | 0.2% | 0% | 0% | 0% |
| CIP % | 9.4% | 6.3% | 2.1% | 0% | 0.7% | 0.2% | 0% | 0% |
| LPC % | 93.4% | 62.6% | 20.8% | 0% | 6.9% | 2.3% | 0.75% | 0% |

FIG. 252 patent application #4

| | |
|---|---|
| application type | CIP |

| primary subsequent filing | |
|---|---|
| subsequent filing factor | 1.25 |
| continuation factor | 15% |
| divisonal factor | 2.5% |
| CIP factor | 7.5% |
| LPC factor | 75% |

| secondary subsequent filing | |
|---|---|
| subsequent filing factor | .5 |
| continuation factor | 50% |
| divisonal factor | 5% |
| CIP factor | 20% |
| LPC factor | 25% |

FIG. 253

| | | CP | 1NP | 2NP | 3NP | 4NP | 5NP | 6NP |
|---|---|---|---|---|---|---|---|---|
| sum of allowance % | | 0% | 0% | 0% | 68.4% | 0% | 21.1% | 7.0% |
| CON % | 25% | 0% | 0% | 0% | 17.1% | 0% | 5.3% | 1.75% |
| DIV % | 2.5% | 0% | 0% | 0% | 1.7% | 0% | 0.5% | 0.2% |
| CIP % | 10.0% | 0% | 0% | 0% | 6.8% | 0% | 2.1% | 0.7% |
| LPC % | 12.5% | 0% | 0% | 0% | 8.6% | 0% | 2.6% | 0.9% |

FIG. 254

| | | CP | 1NP | 2NP | 3NP | 4NP | 5NP | 6NP |
|---|---|---|---|---|---|---|---|---|
| patent application #1 | CON % | 0% | 0% | 12.9% | 0% | 4.0% | 1.3% | 0.4% |
| patent application #2 | CON % | 0.9% | 11.9% | 4.0% | 1.3% | 0% | 0.4% | 0% |
| patent application #3 | CON % | 12.5% | 4.2% | 0% | 1.4% | 0.5% | 0.2% | 0% |
| patent application #4 | CON % | 0% | 0% | 0% | 17.1% | 0% | 5.3% | 1.75% |
| sum | CON % | **13.4%** | **16.1%** | **16.9%** | **19.8%** | **4.5%** | **7.2%** | **2.15%** |
| | CON # | **0.13** | **0.16** | **0.17** | **0.2** | **0.05** | **0.07** | **0.02** |

FIG. 255

| | | CP | 1NP | 2NP | 3NP | 4NP | 5NP | 6NP |
|---|---|---|---|---|---|---|---|---|
| patent application #1 | DIV % | 0% | 0% | 2.1% | 0% | 0.7% | 0.2% | 0% |
| patent application #2 | DIV % | 0.1% | 2.0% | 0.7% | 0.2% | 0% | 0% | 0% |
| patent application #3 | DIV % | 2.1% | 0.7% | 0% | 0.2% | 0% | 0% | 0% |
| patent application #4 | DIV % | 0% | 0% | 0% | 1.7% | 0% | 0.5% | 0.2% |
| sum | DIV % | **2.2%** | **2.7%** | **2.8%** | **2.1%** | **0.7%** | **0.7%** | **0.2%** |
| | DIV # | **0.02** | **0.03** | **0** | **0.02** | **0** | **0** | **0** |

FIG. 256

| | | CP | 1NP | 2NP | 3NP | 4NP | 5NP | 6NP |
|---|---|---|---|---|---|---|---|---|
| patent application #1 | CIP % | 0% | 0% | 6.4% | 0% | 2.0% | 0.7% | 0.2% |
| patent application #2 | CIP % | 0.5% | 5.9% | 2.0% | 0.7% | 0% | 0.2% | 0% |
| patent application #3 | CIP % | 6.3% | 2.1% | 0% | 0.7% | 0.2% | 0% | 0% |
| patent application #4 | CIP % | 0% | 0% | 0% | 6.8% | 0% | 2.1% | 0.7% |
| sum | CIP % | **6.8%** | **8.0%** | **8.4%** | **8.4%** | **2.2%** | **3.0%** | **0.9%** |
| | CIP # | **0.07** | **0.08** | **0.08** | **0.08** | **0.02** | **0.03** | **0** |

FIG. 257

| | | CP | 1NP | 2NP | 3NP | 4NP | 5NP | 6NP |
|---|---|---|---|---|---|---|---|---|
| patent application #1 | LPC % | 0% | 0% | 64.2% | 0% | 19.8% | 6.6% | 2.2% |
| patent application #2 | LPC % | 4.7% | 59.4% | 19.8% | 6.6% | 0% | 2.2% | 0.75% |
| patent application #3 | LPC % | 62.6% | 20.8% | 0% | 6.9% | 2.3% | 0.75% | 0% |
| patent application #4 | LPC % | 0% | 0% | 0% | 8.6% | 0% | 2.6% | 0.9% |
| sum | LPC % | **67.3%** | **80.3%** | **84%** | **22.1%** | **22.1%** | **12.2%** | **3.9%** |
| | LPC # | **0.67** | **0.80** | **0.84** | **0.22** | **0.22** | **0.12** | **0.04** |

FIG. 258 market-tech unit forecast summary
with 4 existing patents

| | CP | 1NP | 2NP | 3NP | 4NP | 5NP | 6NP |
|---|---|---|---|---|---|---|---|
| new prov. applications | | | | | | | |
| new utility applications | | | | | | | |
| legal placeholder inventions | | | | | | | |
| PCT applications | | | | | | | |
| 1st OA allowance responses | 0.05 | 0 | 0.05 | 0.045 | 0.005 | 0 | 0 |
| full OA responses | 0.95 | 0.52 | 1.19 | 1.23 | 0.44 | 0.25 | .13 |
| Total # of OAs | 1 | 0.52 | 1.24 | 1.27 | 0.45 | 0.25 | .13 |
| cumulative sum of issuances | 0.72 | 1.54 | 0.21 | 0.83 | 0.24 | 0.31 | 0.10 |
| CON # | 0.13 | 0.16 | 0.17 | 0.20 | 0.05 | 0.07 | 0.02 |
| DIV # | 0.02 | 0.03 | 0.03 | 0.02 | 0 | 0 | 0 |
| CIP # | 0.07 | 0.08 | 0.08 | 0.08 | 0.02 | 0.03 | 0 |
| LPC # | 0.67 | 0.80 | 0.84 | 0.22 | 0.22 | 0.12 | 0.04 |

FIG. 259 small company - few key patents large company - over & imbalance patenting

| invention type | use weighting | % of total inventions |
|---|---|---|
| fundamental | 4.5 | 7.5% to 10.0% |
| commercially necessary | 2.5 | 10.0% to 14.5% |
| commercial expansion | 1.0 | 75.5% to 82.5% |

FIG. 293 patent plan on a year by year basis & per country

| prev. gen. | current gen. | next gen. | total | unit cost | monthly cost | annual cost |
|---|---|---|---|---|---|---|
| tbf # of FI | tbf # of FI | tbf # of FI | tbf # of FI | | | |
| tbf # of CNI | tbf # of CNI | tbf # of CNI | tbf # of CNI | | | |
| tbf # of CEI | tbf # of CEI | tbf # of CEI | tbf # of CEI | | | |
| tbf # of app | tbf # of app | tbf # of app | tbf # of app | cost per app | mo. app exp. | yr. app exp. |
| | | | tbf # of LPC | cost per LPC | mo. LPC exp. | yr. LPC exp. |
| | | | tbf # of CON | cost per CON | mo. CON exp. | yr. CON exp. |
| | | | tbf # of DIV | cost per DIV | mo. DIV exp. | yr. DIV exp. |
| | | | tbf # of CIP | cost per CIP | mo. CIP exp. | yr. CIP exp. |
| | | | tbf # of OAR | cost per OAR | mo. OAR exp. | yr. OAR exp. |
| | | | tbf # of ISS | cost per ISS | mo. ISS exp. | yr. ISS exp. |
| | | | tbf # of MFP | cost per MFP | mo. MFP exp. | yr. MFP exp. |

tbf = to be filed
FI = fundamental invention
CNI = commercially necessary invention
CEI = commercial expansion invention
LPI = legal placeholder invention
LPC = LPI conversion CON = continuation application
DIV = divisional application
CIP = continuation-in-part application
OAR = office action response
ISS = issuance processing
MFP = maintenance fee payment

FIG. 303 portfolio valuation tool 1650

| | period | existing | | | |
|---|---|---|---|---|---|
| | | # of issued patents | # of Inventions protected | Issued Patent % | Issued Patent Score |
| | existing | <value> | <value> | <value> | <value> |
| FORECASTED | CP | <value> | <value> | <value> | <value> |
| | 1st NP | <value> | <value> | <value> | <value> |
| | 2nd NP | <value> | <value> | <value> | <value> |
| | 3rd NP | <value> | <value> | <value> | <value> |
| | 4th NP | <value> | <value> | <value> | <value> |
| | 5th NP | <value> | <value> | <value> | <value> |
| | 6th NP | <value> | <value> | <value> | <value> |
| | 7th NP | <value> | <value> | <value> | <value> |

FIG. 315

| | period | forecasted future | | | |
|---|---|---|---|---|---|
| | | # of issued patents | # of Inventions protected | Issued Patent % | Issued Patent Score |
| | existing | | | <value> | <value> |
| FORECASTED | CP | <value> | <value> | <value> | <value> |
| | 1st NP | <value> | <value> | <value> | <value> |
| | 2nd NP | <value> | <value> | <value> | <value> |
| | 3rd NP | <value> | <value> | <value> | <value> |
| | 4th NP | <value> | <value> | <value> | <value> |
| | 5th NP | <value> | <value> | <value> | <value> |
| | 6th NP | <value> | <value> | <value> | <value> |
| | 7th NP | <value> | <value> | <value> | <value> |

FIG. 316

| | | existing & future summed | | | |
|---|---|---|---|---|---|
| | period | # of issued patents | # of Inventions protected | Issued Patent % | Issued Patent Score |
| | existing | <value> | <value> | <value> | <value> |
| FORECASTED | CP | <value> | <value> | <value> | <value> |
| | 1st NP | <value> | <value> | <value> | <value> |
| | 2nd NP | <value> | <value> | <value> | <value> |
| | 3rd NP | <value> | <value> | <value> | <value> |
| | 4th NP | <value> | <value> | <value> | <value> |
| | 5th NP | <value> | <value> | <value> | <value> |
| | 6th NP | <value> | <value> | <value> | <value> |
| | 7th NP | <value> | <value> | <value> | <value> |

FIG. 318

FIG. 333
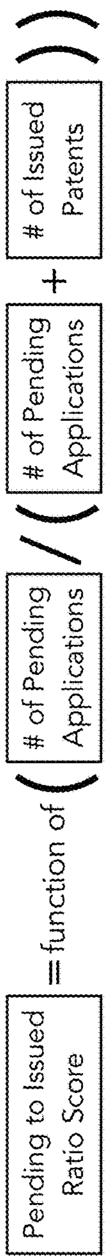
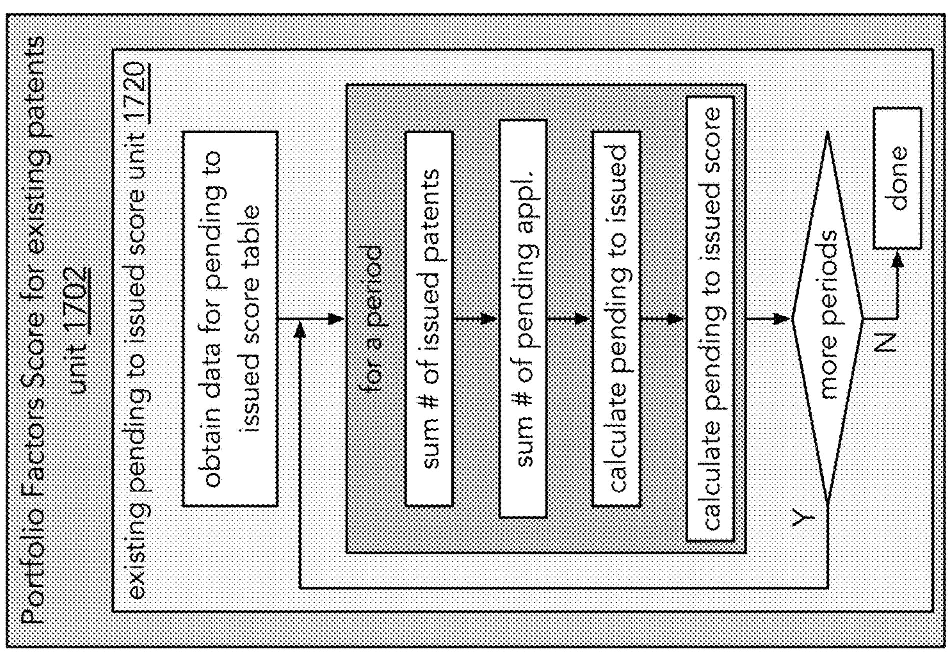
FIG. 334
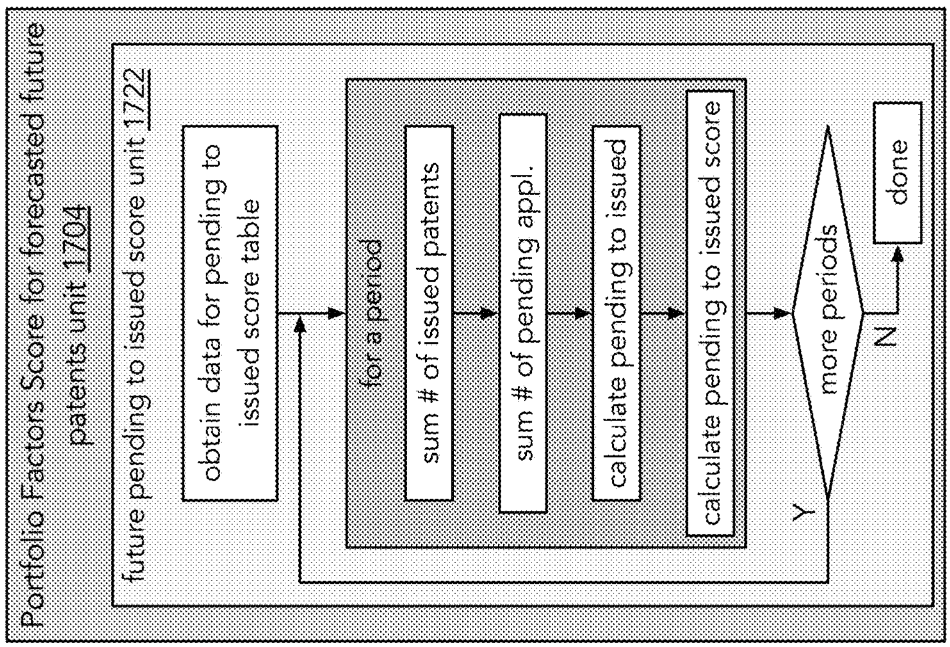
FIG. 335

| | period | existing | | pending to issued % | pending to issued score |
|---|---|---|---|---|---|
| | | # of issued patents | # of pending applications | | |
| | existing | <value> | <value> | <value> | <value> |
| FORECASTED | CP | <value> | <value> | <value> | <value> |
| | 1st NP | <value> | <value> | <value> | <value> |
| | 2nd NP | <value> | <value> | <value> | <value> |
| | 3rd NP | <value> | <value> | <value> | <value> |
| | 4th NP | <value> | <value> | <value> | <value> |
| | 5th NP | <value> | <value> | <value> | <value> |
| | 6th NP | <value> | <value> | <value> | <value> |
| | 7th NP | <value> | <value> | <value> | <value> |

FIG. 336

| | period | forecasted future | | pending to issued % | pending to issued score |
|---|---|---|---|---|---|
| | | # of issued patents | # of pending applications | | |
| | existing | | | <value> | <value> |
| FORECASTED | CP | <value> | <value> | <value> | <value> |
| | 1st NP | <value> | <value> | <value> | <value> |
| | 2nd NP | <value> | <value> | <value> | <value> |
| | 3rd NP | <value> | <value> | <value> | <value> |
| | 4th NP | <value> | <value> | <value> | <value> |
| | 5th NP | <value> | <value> | <value> | <value> |
| | 6th NP | <value> | <value> | <value> | <value> |
| | 7th NP | <value> | <value> | <value> | <value> |

FIG. 337

| | period | targeted # of inventions | running total of targeted inventions | ideal # of inventions | running total of ideal inventions | actual to ideal % | invention scope score |
|---|---|---|---|---|---|---|---|
| FORECASTED | CP | <value> | <value> | <value> | <value> | <value> | <value> |
| | 1st NP | <value> | <value> | <value> | <value> | <value> | <value> |
| | 2nd NP | <value> | <value> | <value> | <value> | <value> | <value> |
| | 3rd NP | <value> | <value> | <value> | <value> | <value> | <value> |
| | 4th NP | <value> | <value> | <value> | <value> | <value> | <value> |
| | 5th NP | <value> | <value> | <value> | <value> | <value> | <value> |
| | 6th NP | <value> | <value> | <value> | <value> | <value> | <value> |
| | 7th NP | <value> | <value> | <value> | <value> | <value> | <value> |

FIG. 343 actual to ideal score table

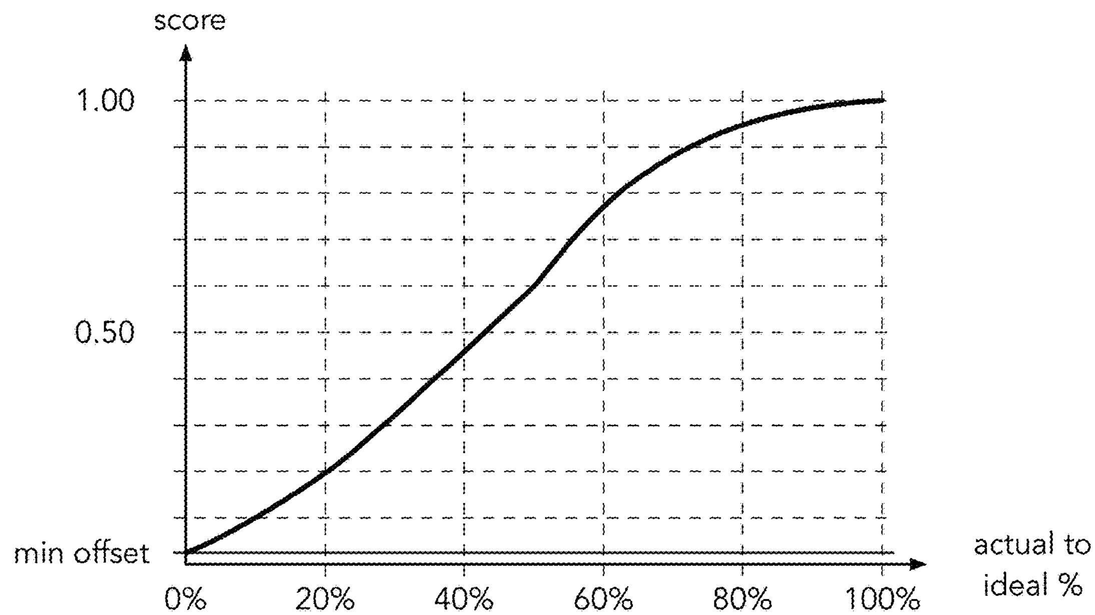

FIG. 344

PG = Previous Generation
CG = Current Generation
NG = Next Generation

*data table*

| competitor | % of MTU inventions protected | portfolio size | market cap ($M) | financial report ($M) | licensing & litigation |
|---|---|---|---|---|---|
| competitor #1 | 6.2% | 427 | $2,500 | +$47 | 2 |
| | | | | | |
| | | | | | |
| | | | | | |
| | | | | | |

*scoring table*

| item score | % levels | all patents | market ($M) | financial ($M) | licensing & litigation |
|---|---|---|---|---|---|
| 1 | 1.0% | 100 | $50 | -$50 | 2 |
| 2 | 4.0% | 500 | $500 | $0 | 5 |
| 3 | 8.0% | 1,000 | $2,000 | $50 | 9 |
| 4 | 14.0% | 3,000 | $10,000 | $200 | 15 |
| 5 | 20.0% | 5,000 | $50,000 | $1,000 | 25 |
| weight | 2.25 | 1.50 | 1.50 | 1.50 | 0.75 |

*score table*

| competitor | % of MTU inventions protected | portfolio size | market cap ($M) | financial report ($M) | licensing & litigation | competitor score |
|---|---|---|---|---|---|---|
| competitor #1 | =3*2.25 | =2*1.5 | =4*1.5 | =3*1.5 | =1*0.75 | 21.00 |

FIG. 350

PG= previous generation
CG = current generation
NG = next generation

MTU to inventive embodiment mapping

MTU patent use data per patent holder

| patent holder ID | tendencies | MTU | life data | patent position | market presence | use likelihood | use score |
|---|---|---|---|---|---|---|---|
| | | | | | | | |
| | | | | | | | |
| | | | | | | | |

COMPUTER WITH IMPROVED COMPUTER ARCHITECTURE

CROSS-REFERENCE TO RELATED APPLICATIONS

The present U.S. Utility Patent application claims priority pursuant to 35 U.S.C. § 119(e) to U.S. Provisional Application No. 63/317,380, entitled "Patent Data and Analytics Computing System", filed Mar. 7, 2022; all of which is hereby incorporated herein by reference in its entirety and made part of the present U.S. Utility Patent Application for all purposes.

The present U.S. Utility Patent Application also claims priority pursuant to 35 U.S.C. § 119(e) to U.S. Provisional Application No. 63/488,227, entitled "Improved Computer for Enhancing and/or Evolving Technology", filed Mar. 3, 2023; all of which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

The disclosed subject matter relates to a variety of technologies and more particularly to an improved computer for technology.

Description of Related Art

Technology is defined as the application of scientific knowledge for practical purposes. The scientific knowledge often applied are physical sciences and/or life sciences but may further include social sciences and/or political sciences. Physical sciences involve the study of the physical world and/or the universe. Life sciences involve the study of living things, human and non-human.

The physical sciences are divided and sub-divided into a plurality of physical science fields (e.g., electrical engineering, computer science, data science, physics, etc.). Similarly, the life sciences are divided and sub-divided into a plurality of life science fields (e.g., biology, human anatomy, physiology, botany, etc.). The advancement of most, if not all, of the scientific fields rely on data analytics provided by computers.

Many advancements in the various scientific fields are innovative and warrant protection. There is a variety of protection mechanisms to protect such innovations; which include legal protection, physical protection, and virtual protection. Creating, identifying, managing, tracking, protecting, utilizing, organizing, and/or evolving innovations within a scientific field is often an overwhelming task and, as such, is often not done or is done ineffectively and/or inefficiently. When the task is over multiple scientific fields, it is even more daunting.

BRIEF DESCRIPTION OF THE SEVERAL VIEWS OF THE DRAWING(S)

FIG. 4C is a diagram of an embodiment of operating system functions of an improved computer for technology;

FIG. 15A is a schematic block diagram of an example of a market-tech unit (MTU) relationships;

FIG. 15B is a schematic block diagram of another example of a market-tech unit (MTU) relationships;

FIG. 15C is a schematic block diagram of another example of a market-tech unit (MTU) relationships;

FIG. 47 is a schematic block diagram of an example of a user-interactive graphical general description section of a cell phone market-tech unit (MTU) data record;

FIG. 48 is a schematic block diagram of an example of a user-interactive graphical MTU synonyms section of a cell phone market-tech unit (MTU) data record;

FIG. 49 is a schematic block diagram of an example of a user-interactive graphical related MTUs section of a cell phone market-tech unit (MTU) data record;

FIG. 50 is a schematic block diagram of an example of a user-interactive graphical metadata section of a cell phone market-tech unit (MTU) data record;

FIG. 51 is a schematic block diagram of an example of a user-interactive graphical science categories section of a cell phone market-tech unit (MTU) data record;

FIG. 52 is a schematic block diagram of an example of a user-interactive graphical manufacturing data section of a cell phone market-tech unit (MTU) data record;

FIG. 75 is a schematic block diagram of an example of a user-interactive graphical composition functional diagram of a touch screen of input/output hardware (HW) of a cell phone;

FIG. 76 is a schematic block diagram of an example of a user-interactive graphical MTU naming & catalog section of a market-tech unit (MTU) data record for a touch screen of input/output hardware (HW) of a cell phone;

FIG. 89 is a schematic block diagram of an example of a user-interactive graphical composition functional diagram of an analog to digital converter;

FIG. 90 is a schematic block diagram of an example of a user-interactive graphical MTU naming & catalog section of a market-tech unit (MTU) data record for an analog to digital converter, which is a fundamental MTU;

FIG. 163 is a diagram of an example of fees associated with patent protecting an MTU as used by the improved computer for technology;

FIG. 166 is a diagram of another example of an input record regarding expense and growth of patent protecting an MTU as used by a growth and expense co-processor of an improved computer for technology;

FIG. 168 is a diagram of another example of an input record regarding expense and growth of patent protecting an MTU as used by a growth and expense co-processor of an improved computer for technology;

FIG. 169 is a diagram of another example of an input record regarding expense and growth of patent protecting an MTU as used by a growth and expense co-processor of an improved computer for technology;

FIG. 171 is a diagram of an example of a multiple time periods relationship to each other as time passes regarding expense and growth estimation of patent protecting an MTU;

FIG. 173 is a diagram of another example of a growth forecast record regarding patent protecting an MTU as used by a growth and expense co-processor of an improved computer for technology;

FIG. 174 is a diagram of another example of a growth forecast record regarding patent protecting an MTU as used by a growth and expense co-processor of an improved computer for technology;

FIG. 201 is a diagram of an example of a prosecution forecasting timing windows for a patent application filed in the current period as used by a growth and expense co-processor of an improved computer for technology;

FIG. 202 is a diagram of an example of prosecution forecasting parameters as determined and used by a growth and expense co-processor of an improved computer for technology;

FIG. 203 is a diagram of an example of prosecution forecasting timing windows for a first patent application filed in the current period based on the timing windows of FIG. 201;

FIG. 204 is a diagram of an example of forecasted probabilities of when office actions for the first patent application will be received as determined by a growth and expense co-processor of an improved computer for technology;

FIG. 205 is a diagram of an example of forecasted probabilities of when office actions will be received combined with the forecasted probabilities of receiving office actions for the first patent application as determined by a growth and expense co-processor of an improved computer for technology;

FIG. 208 is a diagram of an example of forecasted probabilities of when office actions will be received combined with the forecasted probabilities of receiving office actions for the second patent application as determined by a growth and expense co-processor of an improved computer for technology;

FIG. 209 is a diagram of an example of prosecution forecasting timing windows for a patent application having the second office action window being open in the first and second next periods and response to the first office action was filed during the current period;

FIG. 210 is a diagram of an example of updated prosecution forecasting parameters as determined and used by a growth and expense co-processor of an improved computer for technology based on the timing of FIG. 209;

FIG. 213 is a diagram of an example of forecasted probabilities of when office actions will be received combined with the forecasted probabilities of receiving office actions for the third patent application as determined by a growth and expense co-processor of an improved computer for technology;

FIG. 214 is a diagram of an example of prosecution forecasting timing windows for a patent application that is forecasted to be filed in the first next period;

FIG. 215 is a diagram of an example of updated prosecution forecasting parameters as determined and used by a growth and expense co-processor of an improved computer for technology based on the timing of FIG. 214;

FIG. 218 is a diagram of an example of forecasted probabilities of when office actions will be received combined with the forecasted probabilities of receiving office actions for the fourth patent application as determined by a growth and expense co-processor of an improved computer for technology;

FIG. 219 is a diagram of an example of combining the prosecution forecasting of the first through fourth patent applications as determined by a growth and expense co-processor of an improved computer for technology;

FIG. 220 is a diagram of an example of forecasting the quantity and time of receiving offices action for the first through fourth patent applications received per period as determined by a growth and expense co-processor of an improved computer for technology;

FIG. 221 is a diagram of an example of forecasting first office action allowances and non-allowance office actions for the first through fourth patent applications received per period as determined by a growth and expense co-processor of an improved computer for technology;

FIG. 222 is a diagram of an example of forecasting expense for the first office action allowances and non-allowance office actions of FIG. 221 as determined by a growth and expense co-processor of an improved computer for technology;

FIG. 225 is a diagram of an example of issuance forecasting timing windows for a first patent application that is forecasted to be filed in the current period;

FIG. 226 is a diagram of an example of forecasted probabilities of when a notice of allowance for the first patent application will be received as determined by a growth and expense co-processor of an improved computer for technology;

FIG. 227 is a diagram of an example of forecasted probabilities of when a notice of allowance will be received combined with the forecasted probabilities of receiving a notice of allowance for the first patent application as determined by a growth and expense co-processor of an improved computer for technology;

FIG. 230 is a diagram of an example of issuance forecasting timing windows for a second patent application that is forecasted to receive a first office action in the current period;

FIG. 231 is a diagram of an example of forecasted probabilities of when a notice of allowance for the second patent application will be received as determined by a growth and expense co-processor of an improved computer for technology;

FIG. 232 is a diagram of an example of forecasted probabilities of when a notice of allowance will be received combined with the forecasted probabilities of receiving a notice of allowance for the second patent application as determined by a growth and expense co-processor of an improved computer for technology;

FIG. 235 is a diagram of an example of issuance forecasting timing windows for a third patent application that is forecasted to receive a second office action in the first next period;

FIG. 236 is a diagram of an example of forecasted probabilities of when a notice of allowance for the third patent application will be received as determined by a growth and expense co-processor of an improved computer for technology;

FIG. 237 is a diagram of an example of forecasted probabilities of when a notice of allowance will be received combined with the forecasted probabilities of receiving a notice of allowance for the third patent application as determined by a growth and expense co-processor of an improved computer for technology;

FIG. 240 is a diagram of an example of issuance forecasting timing windows for a fourth patent application that is forecasted to be filed in the first next period;

FIG. 241 is a diagram of an example of forecasted probabilities of when a notice of allowance for the fourth patent application will be received as determined by a growth and expense co-processor of an improved computer for technology;

FIG. 242 is a diagram of an example of forecasted probabilities of when a notice of allowance will be received combined with the forecasted probabilities of receiving a notice of allowance for the fourth patent application as determined by a growth and expense co-processor of an improved computer for technology;

FIG. 243 is a diagram of an example of combining issuance forecasting probabilities and timing for the four example patent applications as determined by a growth and expense co-processor of an improved computer for technology;

FIG. 244 is a diagram of an example of calculating expenses for the issuance forecasting probabilities and timing for the four example patent applications as determined by a growth and expense co-processor of an improved computer for technology;

FIG. 247 is a diagram of an example of primary and secondary subsequent filing forecasting parameters for a first patent application as determined by a growth and expense co-processor of an improved computer for technology;

FIG. 248 is a diagram of an example of forecasted probabilities and timing of a subsequent filing for a first patent application as determined by a growth and expense co-processor of an improved computer for technology;

FIG. 249 is a diagram of an example of primary and secondary subsequent filing forecasting parameters for a second patent application as determined by a growth and expense co-processor of an improved computer for technology;

FIG. 250 is a diagram of an example of forecasted probabilities and timing of a subsequent filing for a second patent application as determined by a growth and expense co-processor of an improved computer for technology;

FIG. 251 is a diagram of an example of primary and secondary subsequent filing forecasting parameters for a third patent application as determined by a growth and expense co-processor of an improved computer for technology;

FIG. 252 is a diagram of an example of forecasted probabilities and timing of a subsequent filing for a third patent application as determined by a growth and expense co-processor of an improved computer for technology;

FIG. 253 is a diagram of an example of primary and secondary subsequent filing forecasting parameters for a fourth patent application as determined by a growth and expense co-processor of an improved computer for technology;

FIG. 254 is a diagram of an example of forecasted probabilities and timing of a subsequent filing for a fourth patent application as determined by a growth and expense co-processor of an improved computer for technology;

FIG. 255 is a diagram of an example of forecasted probabilities and timing of a filing continuation (CON) patent application for each of the four patent applications as determined by a growth and expense co-processor of an improved computer for technology;

FIG. 256 is a diagram of an example of forecasted probabilities and timing of a filing divisional (DIV) patent application for each of the four patent applications as determined by a growth and expense co-processor of an improved computer for technology;

FIG. 257 is a diagram of an example of forecasted probabilities and timing of a filing continuation-in-part (CIP) patent application for each of the four patent applications as determined by a growth and expense co-processor of an improved computer for technology;

FIG. 258 is a diagram of an example of forecasted probabilities and timing of a filing legal placeholder conversion (LPC) patent application for each of the four patent applications as determined by a growth and expense co-processor of an improved computer for technology;

FIG. 259 is a diagram of an example of forecasted probabilities and timing of receiving office actions, receiving notices of allowance, and of filing subsequent patent applications relating to an MTU as determined by a growth and expense co-processor of an improved computer for technology;

FIG. 293 is a diagram of an example of relative use weighting of various invention types as used by and/or determined by a co-processor of an improved computer for technology;

FIG. 303 is a diagram of an example of data for a period of an architectural patent protection plan for an MTU as used by and/or determined by a co-processor of an improved computer for technology;

FIG. 315 is a diagram of an example of data for a portfolio factor score for exiting patents unit of a portfolio valuation tool for valuing an MTU of an improved computer for technology;

FIG. 316 is a diagram of an example of calculated data for a portfolio factor score for forecasted future patents units of a portfolio valuation tool for valuing an MTU of an improved computer for technology;

FIG. 318 is a diagram of another example of calculated data for a portfolio factor score for forecasted future patents units of a portfolio valuation tool for valuing an MTU of an improved computer for technology;

FIGS. 333 through 335 are a diagram of another embodiment of a portfolio factor score for exiting patents unit and a portfolio factor score for forecasted future patents units of a portfolio valuation tool for valuing an MTU of an improved computer for technology;

FIG. 336 is a diagram of another example of calculated data for a portfolio factor score for forecasted future patents units of a portfolio valuation tool for valuing an MTU of an improved computer for technology;

FIG. 337 is a diagram of another example of calculated data for a portfolio factor score for forecasted future patents units of a portfolio valuation tool for valuing an MTU of an improved computer for technology;

FIG. 343 is a diagram of an example of calculated data for an invention factor score for forecasted future patents units of a portfolio valuation tool for valuing an MTU of an improved computer for technology;

FIG. 344 is a diagram of a graph of a score to actual to ideal invention percentage for valuing an MTU of an improved computer for technology;

FIG. 348 is a diagram of another example of calculated data for an invention factor score for forecasted future patents units of a portfolio valuation tool for valuing an MTU of an improved computer for technology;

FIG. 349 is a diagram of another example of calculated data for an invention factor score for forecasted future patents units of a portfolio valuation tool for valuing an MTU of an improved computer for technology;

FIG. 350 is a diagram of another example of calculated data for an invention factor score for forecasted future patents units of a portfolio valuation tool for valuing an MTU of an improved computer for technology;

DETAILED DESCRIPTION OF THE INVENTION

Figure 1A:
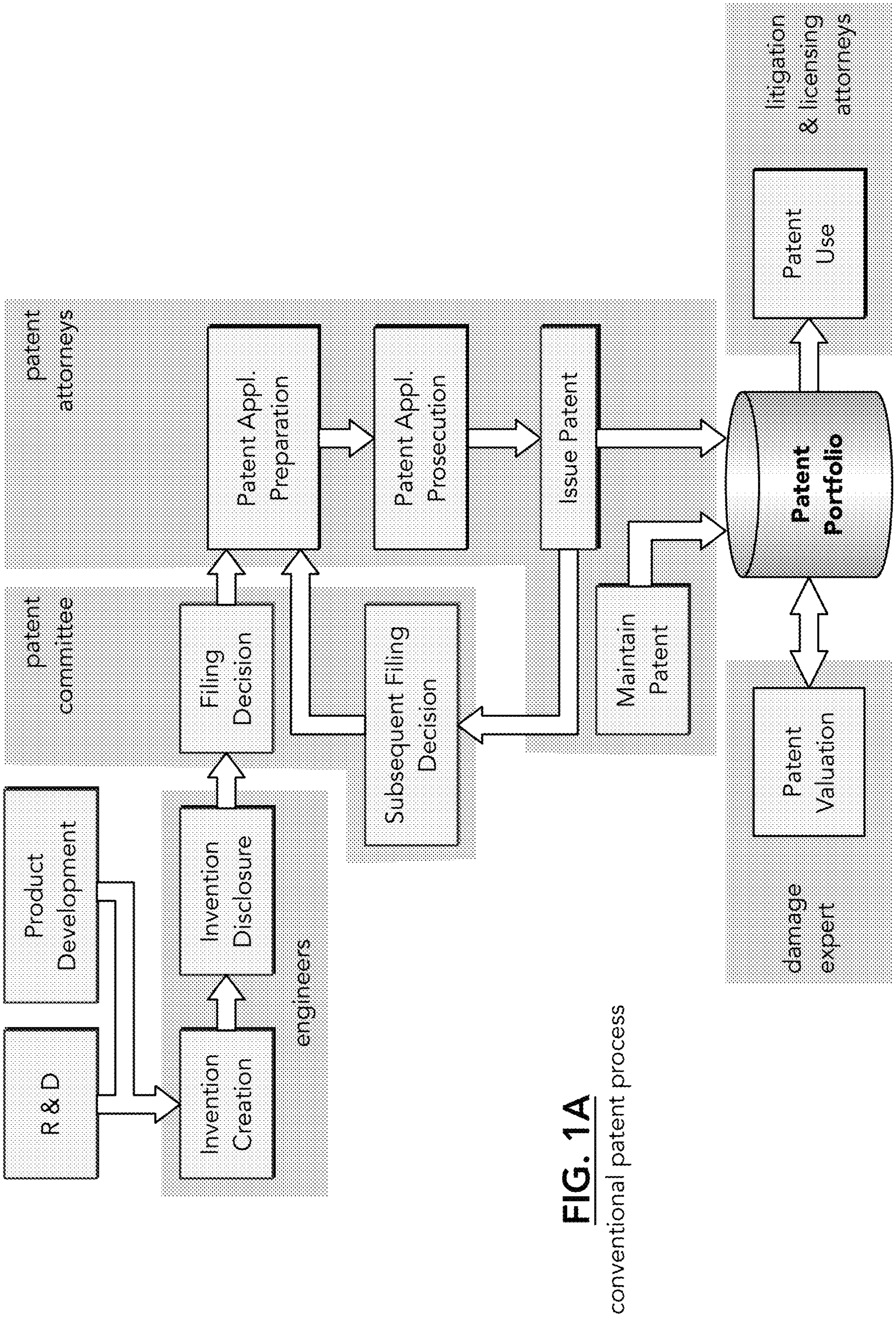
FIG. 1A is a schematic block diagram of an example of a conventional patent process.

FIG. 1A is a schematic block diagram of an example of a conventional patent process that includes four main components: invent & disclose; filing decision; patent application preparation & prosecution; and patent use. Engineers are primarily responsible for the invent & disclose component; a patent committee is responsible for the filing decision component; patent attorneys are primarily responsible for the patent application preparation & prosecution component; and licensing & litigation attorneys are responsible for licensing and litigating issued patents.

In addition to the patent uses of licensing and litigating, patents are assets that may be bought, sold, traded (cross-licensed), used as collateral, used to create a spin-off entity, and/or used in a joint venture. For each type of use, valuing the patents is an important step. This is usually done by damage experts who apply statutory laws and/or case law to determine a financial model for valuing a patent. For valuing a patent portfolio, the calculated value of a few patents is often extrapolated to estimate the value of the patent portfolio.

Working on product development and/or in research & development (R&D) provide the opportunity for engineers to invent. When an engineer invents something that they believe is worthy of being patented, the engineer discloses it. The invention disclosure process may be an ad hoc process (like many small companies use) up to a sophisticated computerized submission process (like many large companies use).

If an engineer is not well versed at recognizing patentable ideas, they render their decision to disclose based on whether the idea would be good subject matter for a white paper. With this approach, too many potentially valuable patentable ideas don't get disclosed.

For most engineers, participating in the patent process is an ancillary function to their primary job. For many, the patent process is a significant burden and only participate when absolutely necessary. For instance, many companies have a mandate for a minimum number of invention disclosures per year per engineer. For other engineers, they don't mind the patent process. As a result, an imbalance of invention disclosures are received.

If a company has a patent committee, it is often composed of engineering management, business unit representatives, and patent attorneys that meet regularly (e.g., monthly). The patent committee's responsibility is to render filing decisions on received invention disclosures. On an individual basis, the patent committee attempts to determine whether an invention, if patented, would it have value to the business. If they believe it would, the decision is to file for patent protection and may further indicate in which countries to seek patent protection.

Patent committees use a variety of decision metrics to render their decision. At the forefront of the decision making process is the annual patent budget, which drives how many new patent applications can be filed in the present year. Other decision metrics include likely use by others, problem being solved, infringement detectability, and obviousness estimations.

Figure 1B:
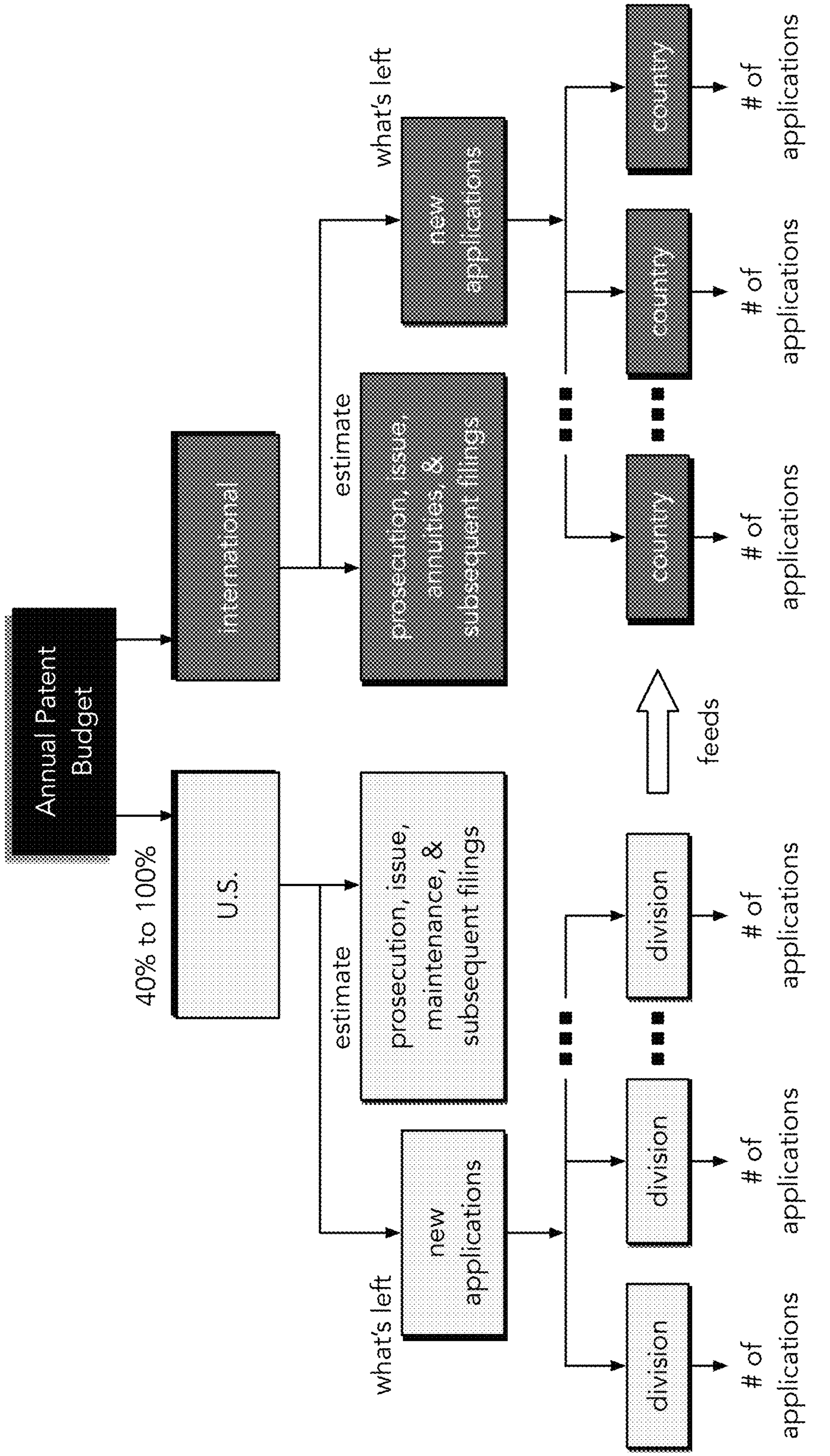
FIG. 1B is a schematic block diagram of an example of an annual budget for a conventional patent process.

FIG. 1B is a schematic block diagram of an example of an annual budget for a conventional patent process. The annual budget is for the preparation, prosecution, issuance, and maintenance of patents. It typically does not include the expenses for using patents. Patent uses often have their own budget.

An annual patent budget is divided into a U.S. portion and an international portion. For large companies that have extensive patent portfolios, the international portion may be more than 50% of the total annual patent. For smaller companies that have relatively small patent portfolios, the international portion may be 0% to 10% of the total annual budget.

On the U.S. side, the budget is divided between new patent applications and on-going portfolio expenses of prosecution, issuance, maintenance, and subsequent patent application filings. The on-going portfolio expenses is estimated, and the remaining amount is allocated to new patent applications. The annual patent budget can be increased or decreased by adjusting the number of new patent applications.

For larger companies, the number of new patent applications is divided among divisions (or departments, groups, business units, sectors, etc.), with each getting an assigned target number. It's these numbers that the patent committee factors into their decision. A similar allocation occurs on the international side.

Figure 1C:
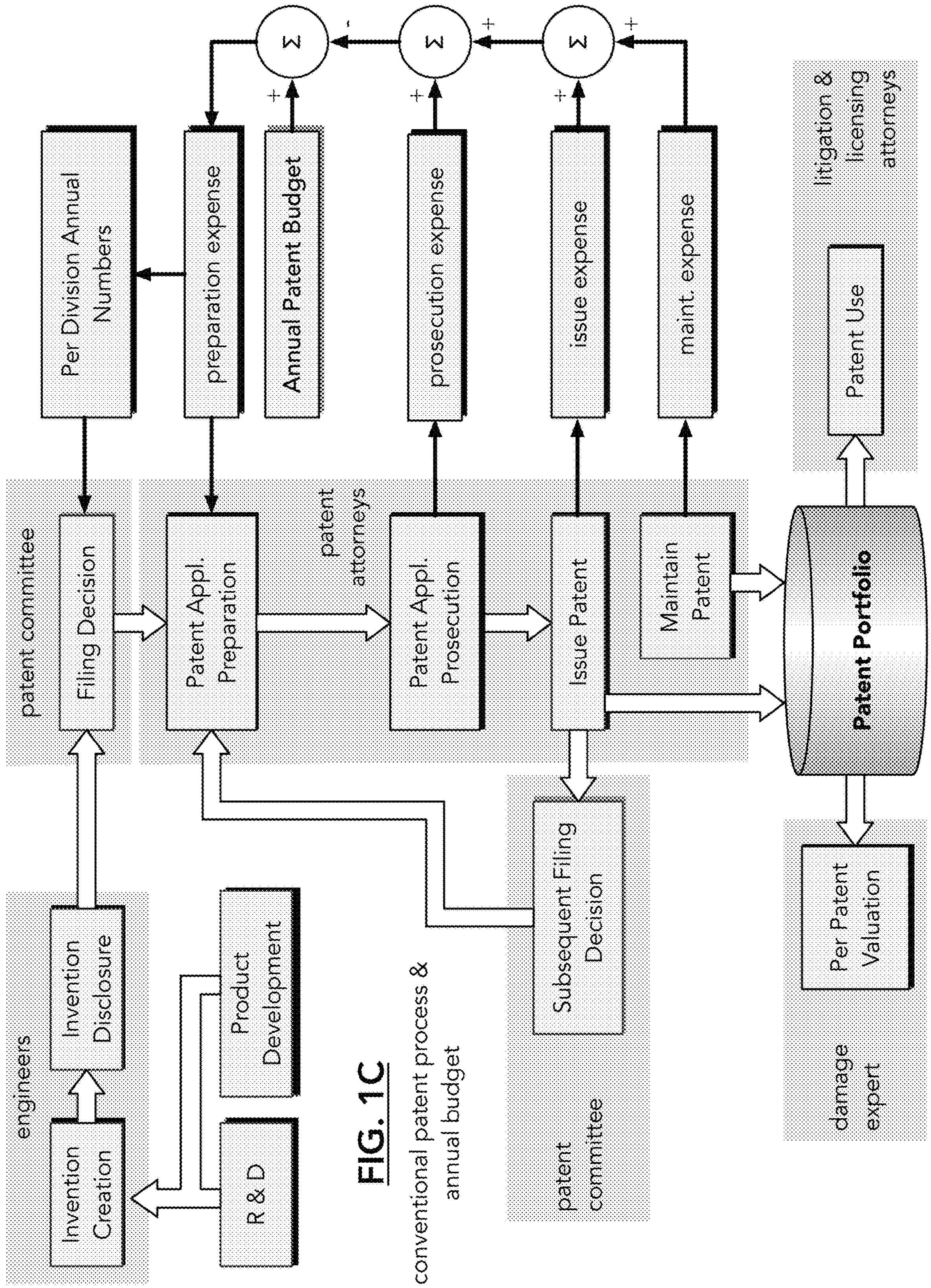
FIG. 1C is a schematic block diagram of an example of a conventional patent process with accompanying components of an annual budget.

FIG. 1C is a schematic block diagram of an example of a conventional patent process with accompanying components of an annual budget. In the figure, the annual patent budget drives the workload of patent attorneys. For the most part, a patent attorney writing a new patent application or prosecuting a pending patent application does so with a focus of getting this patent application to issue. A good patent attorney will further focus on business use of the patent.

When a patent application is allowed, it's processed for issuance and is further reviewed for subsequent filing by the patent committee. A subsequent filing is a continuation patent application, a divisional patent application, or a continuation-in-part patent application. The patent committee renders its decision based on the decision metrics discussed above, which are annual budget and individual patent driven. If a favorable decision is rendered, a subsequent patent application is prepared and filed.

Figure 1D:
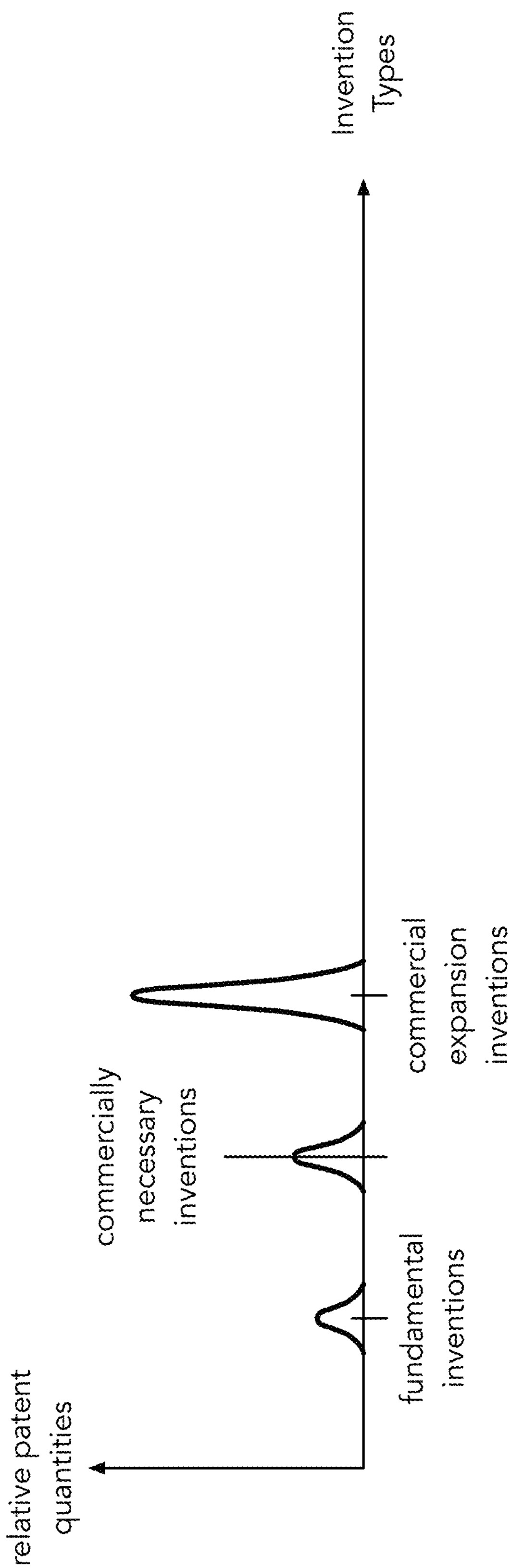
FIG. 1D is a schematic block diagram of an example of invention types of a conventional patent process.

FIG. 1D is a schematic block diagram of an example of invention types of a conventional patent process. This figure represents the types of inventions that are most often disclosed and include: fundamental inventions, commercially necessary inventions, and commercial expansion inventions. A fundamental invention is one that is regarding a fundamental concept of a technology that is being developed for a new product and/or new service. At times, a fundamental invention has been referred to as a "key" invention, a "pioneering" invention, or a "blocking" invention.

A commercially necessary invention is one that is regarding embodying a fundamental concept into a minimally viable commercial product and/or to enable operation of the minimally viable commercial product. As used herein, a "product" is physical or virtual thing that is bought, sold, leased, consumed, etc. by an end user and/or any entity in a product supply chain. As also used herein, a "service" is the use of a commercial and/or proprietary product for the benefit of an end user and/or other entity in a service supply chain. Unless specifically stated otherwise, the discussion of processing inventions for patenting discussed herein is the same for inventions of services and as it is for inventions of products.

A commercial expansion invention is one that improves upon the minimally viable commercial product by improving operating efficiency, reducing cost, improving reliability, improving features, adding new features, adding new functions, and/or other aspects that are intended to make a product more commercially attractive.

This figure also illustrates that a majority of inventions for a product will be commercial expansion inventions. For example, 75% to 85% of inventions are commercial expansion inventions; 10% to 15% of inventions are commercially necessary patents; and 5% to 10% of inventions are fundamental inventions.

Figure 1E:
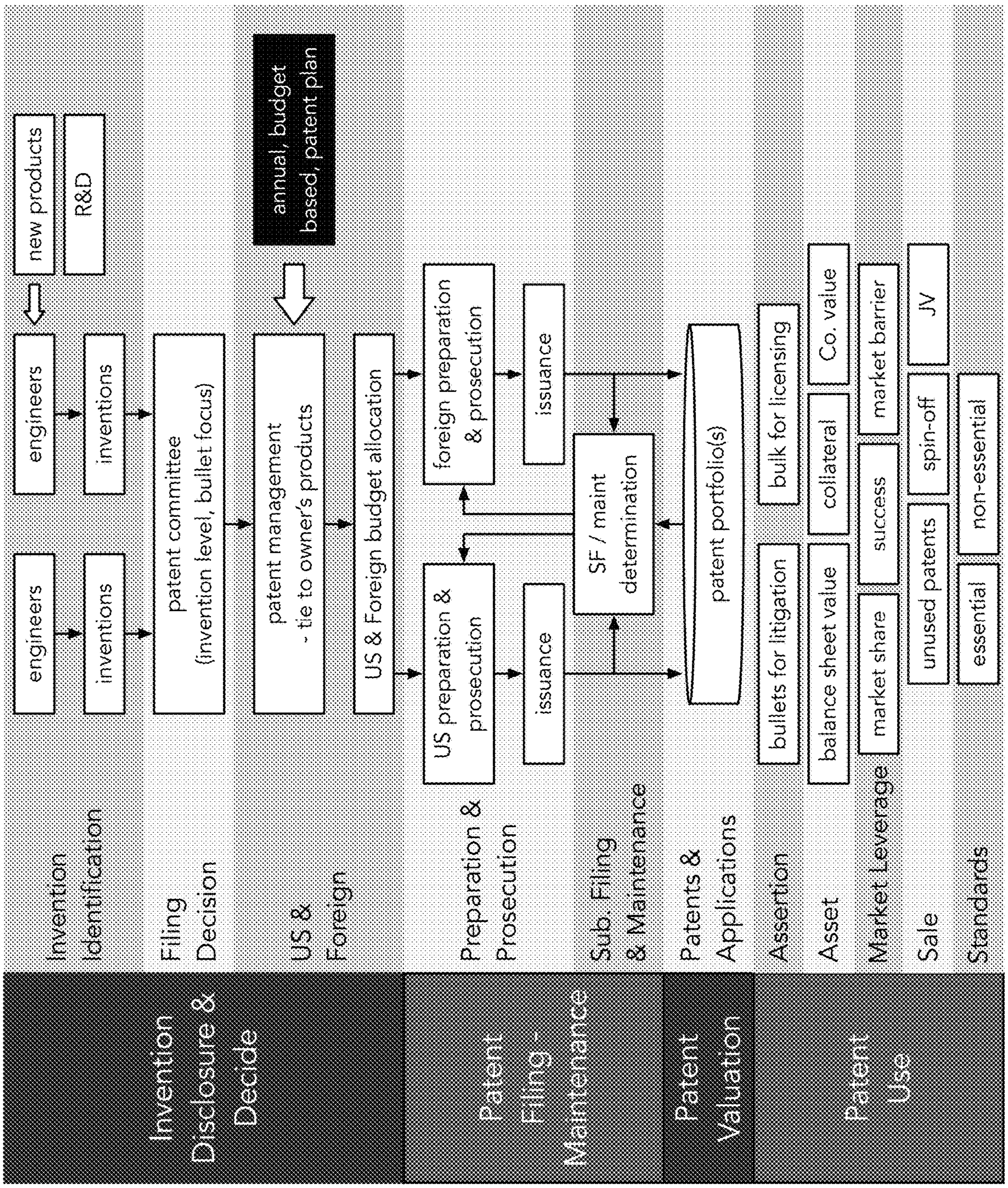
FIG. 1E is a schematic block diagram of an example of a conventional patent process with accompanying elements of the process.

FIG. 1E is a schematic block diagram of an example of a conventional patent process with accompanying elements of the process. This diagram combines the main components of invention disclosure & decide into one component and adds the patent valuation as a new main component. Thus, for the diagram, the four main components of the conventional patent process include invention disclosure & decide, patent filing through maintenance, patent valuation, and patent use.

The invention disclosure & decide component includes the sub-components of invention identification, filing decision, and US & foreign partitioning. The invention identification is primarily done by engineers, typically of different groups for larger companies. Their catalyst for inventing is R&D and/or new product development. The issues with engineer driven invention disclosure include too many inventions disclosures from some engineering groups, too few invention disclosures from other engineering groups, most engineers disclose inventions based on technical merit, not patentable value, limited overview of products being developed, limited to no understanding of the level of innovation of new products being developed, too "now" focused (primarily patenting what's currently be developed and not enough on patenting what's to come), and/or too "me" focused (primarily patenting what will go into a product, not enough focus on design-around options, and on how others would want to use the patented inventions).

The filing decision sub-component is executed by a patent committee and primarily renders patenting filing decisions based on individual merit of an invention and annual budget constraints. The individual merit is a "bullet" focus based on the likelihood of being able to assert the patent in litigation. The issues with conventional patent committees include limited preparation work in reviewing inventions resulting in too many good inventions not being patent protected, "bullet" focus results in too many good inventions not being patent protected, too many "bullet-miss" (unusable patents or un-issuable patents) inventions get pursued, and/or no discernable focus on a patent protecting new technologies of new products. Default approach is allocating a certain number of new patent applications to groups developing a new product.

"Bullet" patents get a patent holder into litigation but it's the breadth, depth, and strength of the relevant portions of a patent portfolio ("bulk" patents) that settle the litigation. It's estimated that 95% of patent lawsuits settle before trial. A settlement typically includes a cross licensing agreement. Who pays who is based on who has the better relevant patent portfolio (the better "bulk" patents). In this instance, a first party has a better relevant patent portfolio if the second party's need for the first party's patent portfolio is greater than the first party's need for the second party's patent portfolio.

The US & foreign sub-component is a patent portfolio management function that allocates the total budget among US patent matters and foreign patent matters. A typical patent portfolio management system tracks the US patent matters and the foreign patent matters. The allocation of the patent budget was previously discussed.

The patent filing to maintenance component includes the sub-components of patent application preparation, patent application prosecution, patent issuance, subsequent patent application filings, and patent maintenance. Issues with patent application preparation and prosecution include too individual patent focused, lack of understanding of the technology, lack of understanding of the business use cases for the invention, inadequate patent quality control measures, and/or inadequate understanding of patent laws, practices, rules, and/or guidelines.

The patent use component includes the sub-components of assertion, asset, market leverage, sale, and standards. The assertion sub-component includes bullet patents for litigation and bulk patents for licensing. The assert sub-component includes balance sheet value (market approach, cost approach, and/or income approach), collateral, and overall company value. The market leverage sub-component includes market share acquisition, market share protection, barrier to market entry, and/or sustainable market success.

The sale sub-component includes selling of unused patents, spin-off a new company, and/or creating a joint venture (JV). The standards sub-component includes standards essential and/or non-essential standard but commercially necessary. The standards essential sub-component is for patented inventions that are essential to implement a standard. The non-essential standard but commercially necessary sub-component is for patent inventions that are no essential for implementing the standard but are necessary to create a commercially viable product.

The conventional patent value component establishes value for some of the patent uses. For example, the conventional patent value process establishes value for patents in litigation for the balance sheet value, for establishing value for collateral, and for patent sales. The conventional patent value component does not include a mechanism to value market leverage. Even though market leverage is an important use of patents, the value of market leverage is not determined via the conventional patent process.

Figure 1F:
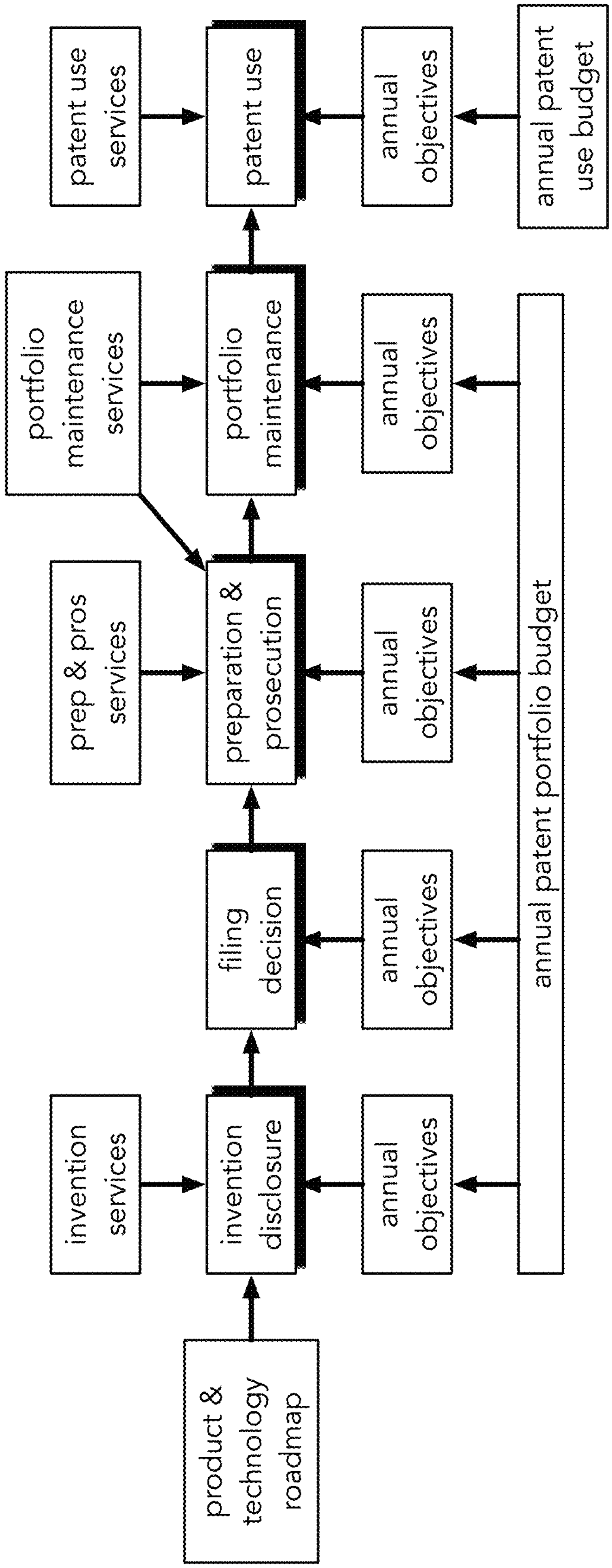
FIG. 1F is a schematic block diagram of an example of a conventional patent process with accompanying support services for the process.

FIG. 1F is a schematic block diagram of an example of a conventional patent process with accompanying support services and data sources for the process. In this diagram, the conventional patent process includes the main components of invention disclosure, filing decision, patent application preparation and prosecution, portfolio management, and patent use.

The data sources include a product & technology roadmap, an annual patent portfolio budget, and an annual patent use budget. A product & technology roadmap typically includes, for products, a list and description of products in development and products to be developed. For technology, the roadmap includes a list and description of technology to be created, which is correlated to the products in development and products to be developed. In some roadmaps, a technology is listed that is not currently earmarked for inclusion in a product, as such is it listed as an R&D project. While product and technology roadmaps list products and technologies, they do not identify specific inventions to be created, the timing of creating inventions, and the number of inventions to be created as new products and/or new technologies are developed.

The annual patent portfolio budget provides annual objects for the number of inventions to be disclosed, the number of disclosed inventions to patent protect, the cost and quantity of on-going patent portfolio development matters, and patent portfolio maintenance. The annual patent use budget is typically separate from the annual patent portfolio budget and will vary greatly based on patent use programs.

The conventional patent process support services include invention services, preparation and prosecution services, portfolio maintenance services, and patent use services. The conventional invention services provides support after inventions have been identified. For example, there are invention services that are directed towards individual inventors and very small companies to help them patent protect and market their invention. As another example, docketing systems used by larger companies include a separate or integrated database for recording and tracking inventions.

As used herein, a small company is referring to a company that files a small number of patents per year regardless of the number of employees the company may have. A large company is referring to a company that file a significant number of patent per year regardless of the number of employees the company may have. In many situations, the number of patent filings of a company corresponds to the number of engineers the company has.

The conventional patent preparation and prosecution services include docketing services, prior art searching, freedom to operate searching, preparation of patent drawings, drafting of patent applications, drafting of office action response, automated drawing and specification generation from a claim set, automated claim numbering and claim structure review, and/or automated claim support in specification analysis.

The conventional portfolio maintenance services include docketing, annuity payments, portfolio culling, maintenance fee payment processing, patent landscape analysis, competitor patent analysis, and/or automated value estimation of individual patents.

The conventional patent process is compartmentalized. The various components are owned and executed by different personnel with different objectives and different responsibilities. The is no one owner of the overall patent process to coordinate the compartmentalized components. There is little to no feedback from the patent use component to the other component such the process is essentially an open loop. As a result of the compartmentalized components, the individual invention focus, and the annual patent budge focus, the conventional process as inefficiencies that will be discussed in greater detail with reference to FIG. 1L.

Figure 1G:
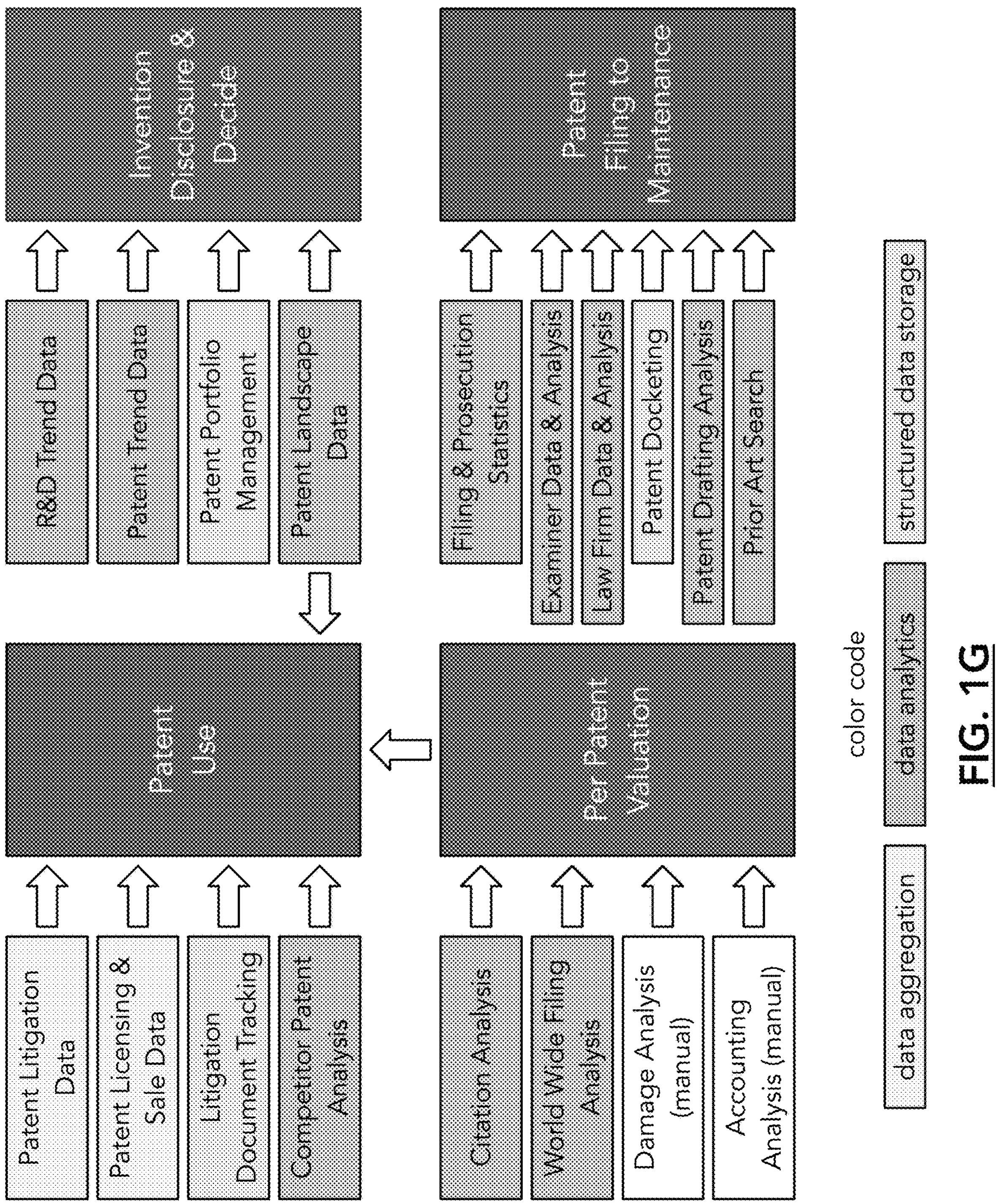
FIG. 1G is a schematic block diagram of another example of a conventional patent process with accompanying support services for the process.

FIG. 1G is a schematic block diagram of another example of a conventional patent process with accompanying patent data support services for the process. The various patent data services are one of a data aggregation service (light gray), a data analytics service (gray green), or a structured data storage service (gray yellow).

The invention disclosure & decide component of the conventional patent process is supported by computer generated patent data analytic services regarding R&D trend data, patent trend data, and patent landscape data. The invention disclose & decide component is further supported by the structured data storage of patent portfolio management.

The patent filing to maintenance component is supported by computer generated patent data analytic services regarding filing and prosecution statistics, examiner data & statistics, law firm data & analysis, patent drafting analysis, and prior art searching. The patent filing to maintenance component is further supported by the structured data storage of patent docketing.

The par patent valuation component is supported by computer generated patent data analytic services regarding citation analysis and worldwide filing analysis. The per patent valuation component is further supported by the manual processes of damage analysis and accounting analysis.

The patent use component is supported by computer generated patent data analytic services regarding patent landscape analysis and competitor patent analysis. The patent use component is further supported by the structured data storage of litigation document docketing. The patent use component is further supported by computer generated patent data aggregation services regarding patent litigation data, patent licensing data, and patent sale data.

For data analytics, the reliability of the resulting data is only as good as the inputted data and the manner of analysis. For the conventional patent process, the data analysis of examiners, of patent filings, of patent prosecution, and of law firms is reliable since it is statistical analysis of quantifiable data that can be reliably and repeatedly retrieved.

The patent drafting analytics is reliable for patent structural issues such as claim number, proper use of antecedent basis, claim terms appearing the specification, and reference number consistency. Automated patent drafting software functions to generate initial figures and draft a specification from a claim set. Reviews of the most recent automated patent drafting software is that it provides a decent first draft of a patent application faster than the drafting patent attorney.

Such software, however, does not determine the substantive quality of the claims. The substantive quality of claims includes having clear direct infringement targets, clarity of novelty aspects of the invention, clarity of the invention, clarity of the problem being solved by the invention, eliminate viable design around options, expansion of the inventive concept, and/or clearly identifiable benefits of the invention.

The R&D trend analysis, the patent trend analysis, prior art searching, patent landscape analysis, and competitor patent analysis each have a significant challenge in quantifying the patented technology to be analyzed. Presently, the only universal patent-technology classification mechanism is the classification codes used by Patent Offices. For instance, many Patent Offices use the IPC (international patent classification) approach to classify incoming patent applications for examination by the appropriate art group. The IPC classification system includes about 250,000 categories and sub-categories and was not designed for business level technology analysis. As such, it does not directly aligned with products and/or services and searching using the IPC yields varying quantifications of a technology and, thus, yields varying data sets to analyze.

The per patent valuation data analytics of citation analysis and worldwide filing analysis have the ability to consistently obtain reliably data sets. The needed data is part of the patents. While data reliability is high, the manner of analysis is flawed. The citation analysis relies on the premise that valuable patents are cited by other patents and, the more times a patent is cited, the more valuable it must be. The worldwide filing analysis is based on the premise that a patent holder files for international patent protection on its most important inventions, thus those must be valuable inventions.

The citation premise is flawed because it relies on prior art cited by the applicant and prior art cited by the examiner. Many applicants cite their own prior art for a multitude of reasons including padding the number of times their patents are cited. With respect to examiners' prior art citings, an examiner has a limited amount of time to conduct a prior art search and, as such, an examiners prior art search is not exhaustive. The premise is further flawed for newly emerging technologies, which won't be cited by others for a few years or more.

Despite the limitations of the various data services, it's estimated that the patent data service industry generates worldwide annual revenue of about a $21 billion. As machine learning and artificial intelligence software continue to evolve, the patent data service industry is expected to grow over the next several years.

Figure 1H:
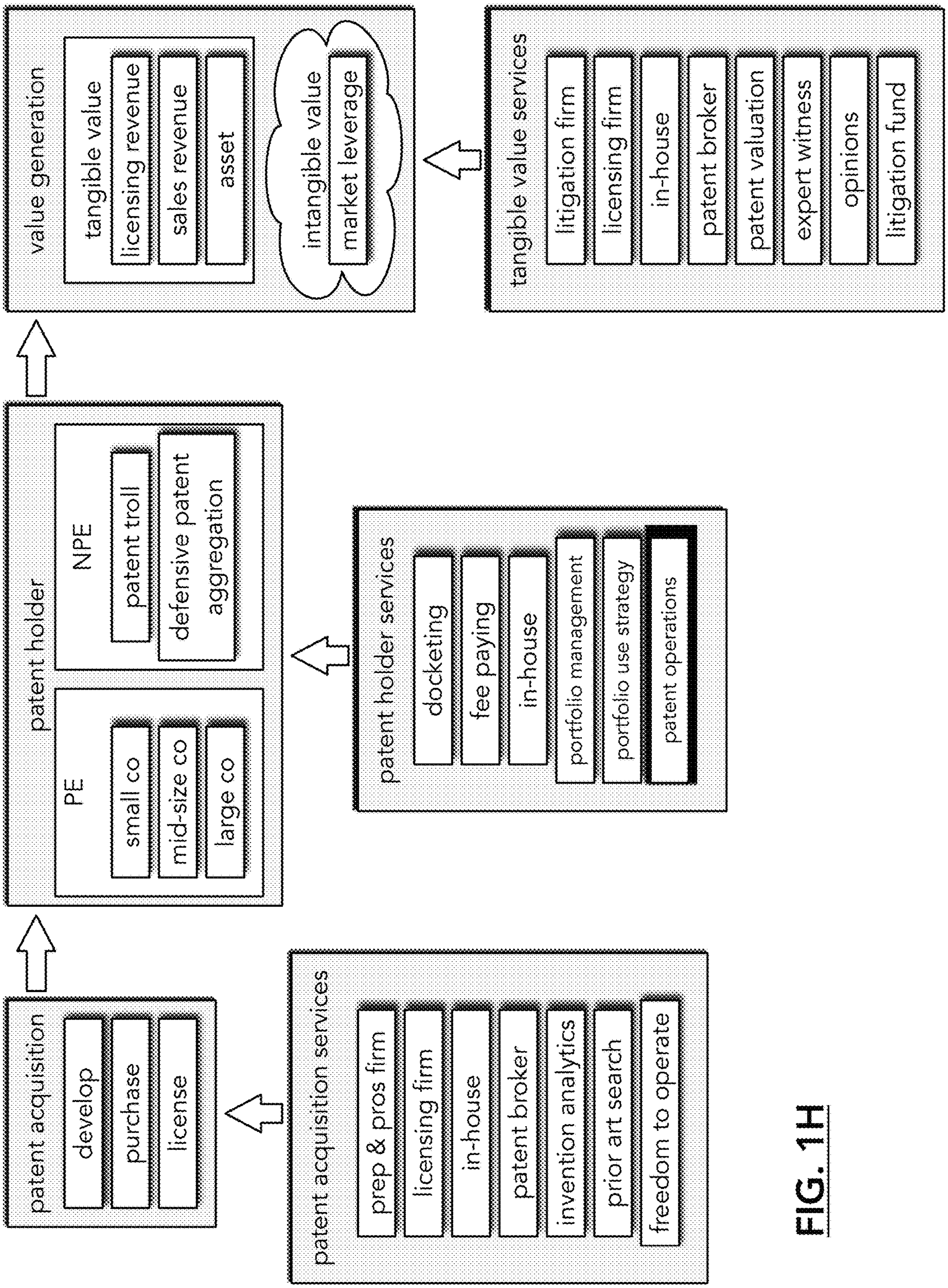
FIG. 1H is a schematic block diagram of another example of a conventional patent process with accompanying support services for the process.

FIG. 1H is a schematic block diagram of another example of a conventional patent process with accompanying support services for the process. In this diagram, the conventional patent process includes the main components of patent acquisition, patent ownership, and patent valuation. Patent acquisition includes developing inventions and patenting them; purchasing patents and/or patent applications; and licensing patents.

Patent acquisition is supported by a plurality of patent acquisition service providers. For example, patent attorneys provide patent application and prosecution services for patenting a company's inventions, such attorneys may be in-house or be affiliated with a law firm. Other examples include licensing attorneys, patent brokers and auctions, invention analytics, prior art searching, and freedom to operate searching.

In this diagram, there are two types of patent holders: practicing entities (PE) and non-practicing entities (NPE). A practicing entity makes a product and/or provides a service that embodies the patents they own. A non-practicing entity does not make a product and/or provides a service embodies the patents they own. Practicing entities range from small companies to very large companies and non-practicing entities include patent trolls and defensive patent aggregation entities.

Patent holder services include patent docketing, maintenance and annuity fee paying services, in-house patent portfolio managers, patent portfolio management software, and in-house patent processes and procedures, which include patent use strategies.

A patent portfolio has tangible value and intangible value. The tangible value is realized through licensing, patent sales, and as assets. Tangible value is supported by tangible value services that include litigation attorneys, licensing attorneys, in-house counsel, patent brokers, patent valuation experts, expert witnesses, legal opinions, and/or litigation funds.

Intangible value corresponds to the market leverage that a patent portfolio provides. Market leverage includes market share protection, market share expansion, barriers to enter a market, and/or litigation deterrent to practicing entities. The intangible value of a patent portfolio is not calculated, yet it may be as valuable or more valuable than the patent portfolio's tangible value.

Figure 1I:
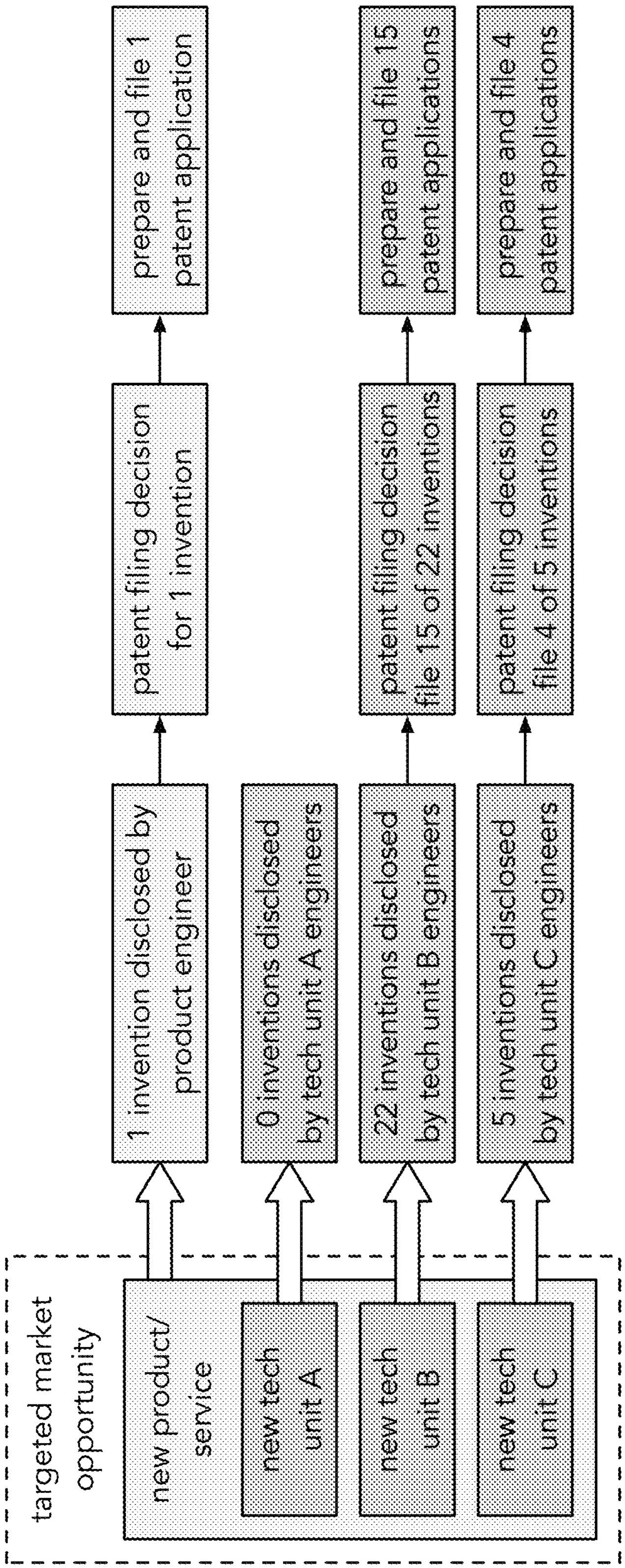
FIG. 1I is a schematic block diagram of an example of identifying and disclosing inventions of a conventional patent process.

FIG. 1I is a schematic block diagram of an example of identifying and disclosing inventions of a conventional patent process. In this example, an entity is developing a new product/service to address a targeted market opportunity. The new product/service includes three inventive new tech units A, B, and C. The product was designed by four groups of engineers: one for the overall product, a second for new tech unit A, a third for new tech unit B, and a fourth for new tech unit C.

In this example, group discloses 1 invention; group 2 does not disclose any inventions, group 3 discloses 22 inventions, and group 4 discloses 5 inventions for a total of 28 inventions. The patent committee decides to patent the inventions from group 1, 15 of the 22 inventions from group 3, and 4 of the 5 inventions from group 4, totaling 20 inventions being patented.

The issue with this example is there is no way to (1) determine if 28 inventions represents the total number of inventions for the new product or a small fraction of the innovation that went into producing the new product; (2) determine if 28 is the right number of inventions to disclose; (3) determine if the distribution of the 28 inventions from the 4 groups was appropriate; (4) determine if the 20 inventions elected for patent protection were the right 20; and (5) determine if 20 of 28 was the right percentage of inventions to patent.

The answers to these questions will not be answered unit the patent holder is involved in a patent dispute involving the new product, which likely won't occur for multiple years after the inventions were patented. By then, it will almost certainly be too late to significantly change the patent portfolio covering the new product.

In one possible scenario, the level of innovation of the new product included 200 new inventions, with 40 new inventions involving the new tech unit A. In this scenario, the other manufacturer of a like new product filed for patent protection on 120 inventions, including 30 inventions for the new tech unit A. In a head to head patent dispute, the other manufacturers 120 patents will force an unfavorable licensing agreement for the entity with the 20 patents.

Figure 1J:
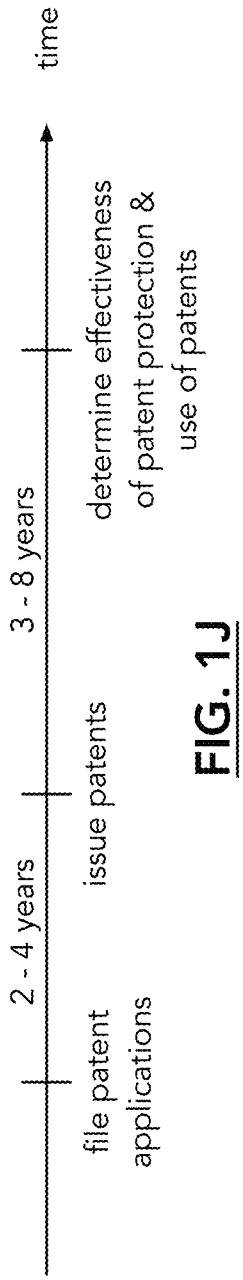
FIG. 1J is a schematic block diagram of an example of a timeline of a conventional patent process.

FIG. 1J is a schematic block diagram of an example of a timeline of a conventional patent process. In this diagram, it takes about 2 to 4 years for patents covering a technology to issue with respect to their filing dates. It's likely another 3 to 8 years before determining the effectiveness of the patents covering the technology as illustrated in the example of FIG. 1I.

This is a significant issue with the conventional patent process. There is no way to determine how well a technology is patent protected until the patents are needed for offensive and/or defensive purposes. This includes the quantity of patents; the scope, breadth, and balance of patent coverage regarding the technology; and the quality of the patents. By the time the patents are needed, it is often too late to correct for inadequate patent protection of a technology.

Figure 1K:
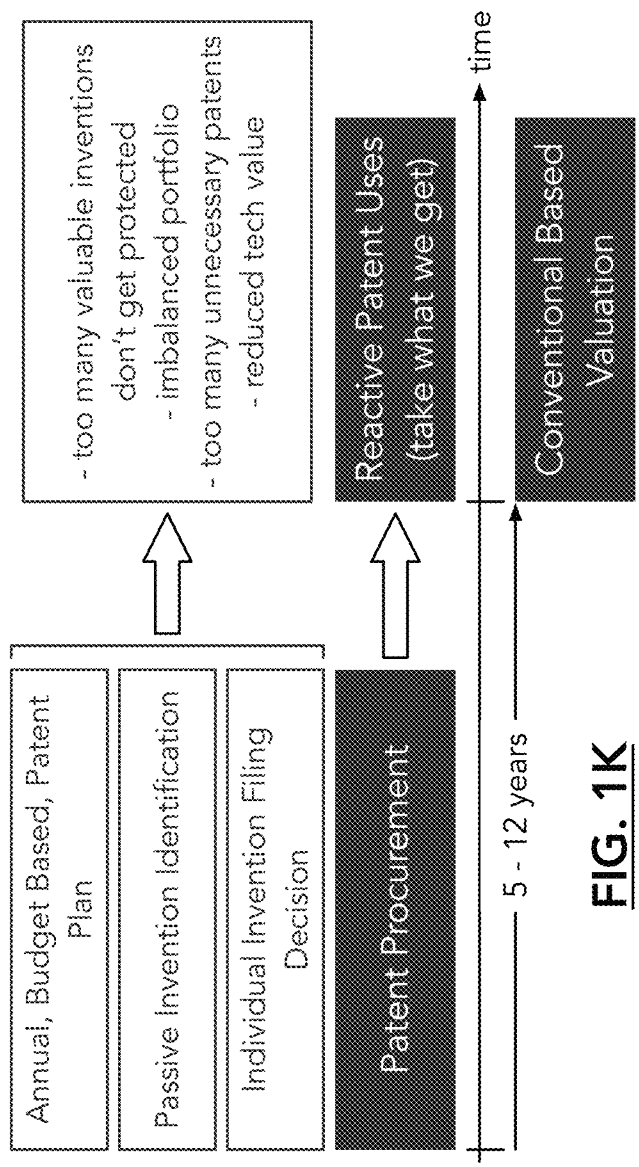
FIG. 1K is a schematic block diagram of an example of limitations of a conventional patent process.

FIG. 1K is a schematic block diagram of an example of limitations of a conventional patent process used by large companies. The patent procurement process is controlled by an annual patent plan that is budget and individual patent driven; it uses a passive invention identification process driven by engineers; and it uses individual invention filing decision metrics.

This yields a patent portfolio in which too many valuable inventions don't get disclosed by engineers and/or are not pursued because they don't fit well in the individual invention filing decision metrics. This also yields a patent portfolio that is imbalanced having too few patents regarding various innovative aspects of the technology and too many patents for other innovative aspects of the technology. It also yields a patent portfolio that includes too many unnecessary patents (outside the scope of the technology, too many on one particular aspect, patent applications that won't issue). It also yields a patent portfolio this is too "me" focused and too "now" focused. All of this reduces the value of the technology.

As discussed above, the deficiencies in a patent portfolio regarding a technology are typically not discovered until the portfolio is needed. The convention patent process is reactive and employs a "take what you get" philosophy.

Figure 1L:
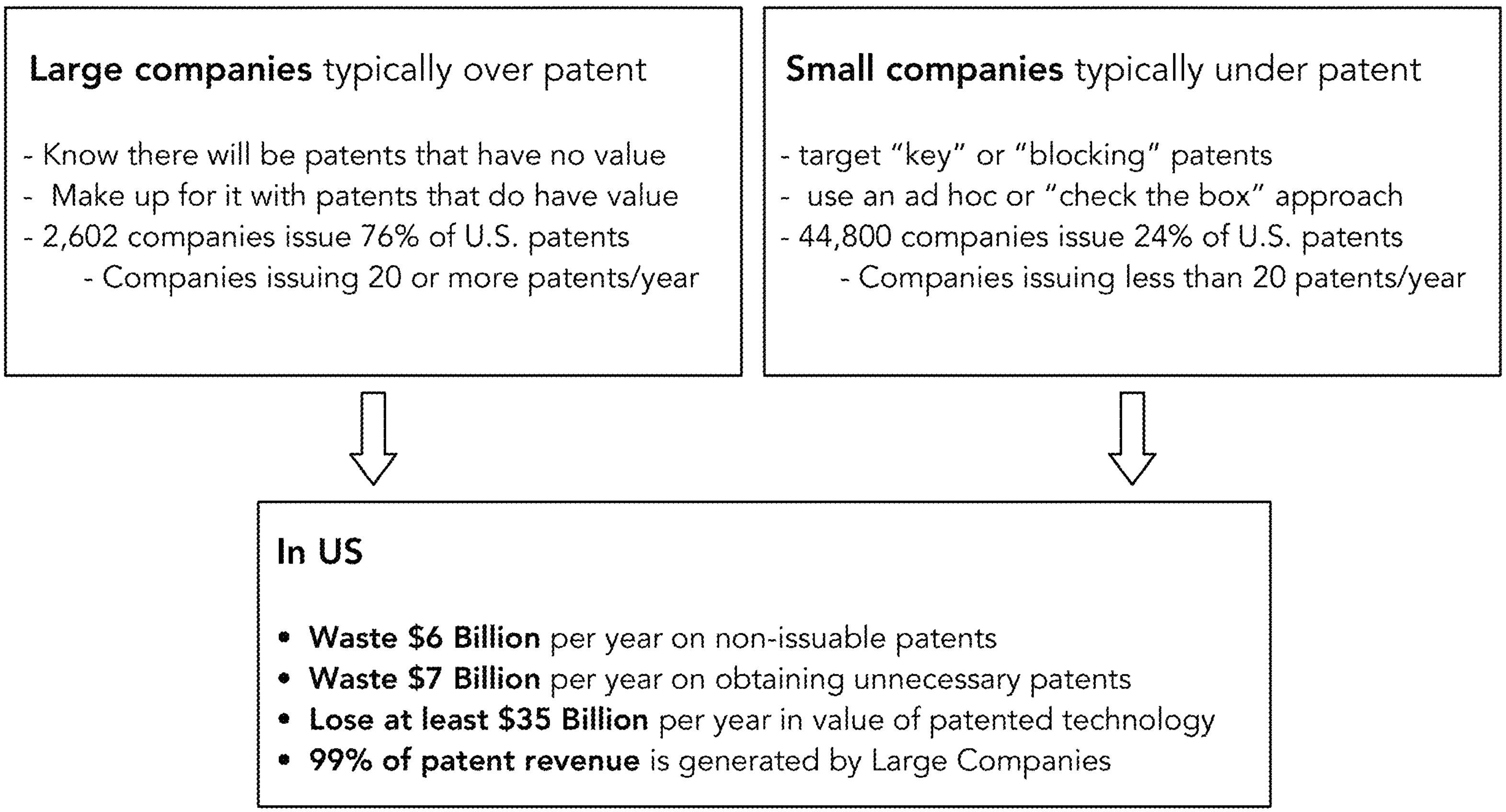
FIG. 1L is a schematic block diagram of another example of limitations of a conventional patent process.

FIG. 1L is a schematic block diagram of another example of limitations of a conventional patent process. As a result of the limitations of the conventional patent process, large companies typically over patent and small companies typically under patent. Large companies know from experience that many of the patents they obtain will have no value. Large companies also know that, if they file enough patents, some of them will have value and their value more than justifies the cost of obtaining patents that have no value.

Small companies typically target patent protecting "key" or "blocking" patents via an ad hoc or check the box patent process. An ad hoc approach is to file patents if and when inventions are disclosed and there is no formal process for when or how inventions are to be disclosed. Many small companies adopt this approach because their investors take a "check the box" approach to patents. The check the box approach verifies that a company has patents on the technology its developing and that's about it. There is little to no substantive analysis of the patents for quality and/or sufficiency of patent coverage for the technology.

Nevertheless, the filing of patent applications has grown dramatically over the last twenty years reaching about 600,000 new patent application per year in the US. Of the 600,000 new patents 76% of them come from 2,602 large companies (e.g., issuing 20 or more patents per year) and the remaining 24% come from 44,800 small companies or individuals.

The filing rates have increased because the value of patented technologies has also increased over the last twenty years. In 2019, worldwide R&D investments reached $2.4 trillion and about $240 billion was invested in patent protecting the R&D. In the US in 2019, the gross domestic product was about $21.38 trillion dollars of which, about $7.76 trillion was attributable to intellectual property intensive industries.

There's no question that patents are big business, generating significant revenues, even though the conventional patent process is inefficient. The inefficiency results in about $6 billion per year being wasted in the US on patent application filings and prosecution that will not result in issued patents.

The inefficiency also results in about $7 billion wasted annually in the US on obtaining unnecessary patents. This includes patents that have no value because of poor quality; because they are overkill of a technology aspect; too few patents to have impact; and/or because they are regarding practically irrelevant aspects of a technology.

The inefficiency also results in lost opportunity of about $35 billion per year in the US. If a technology were patent protected with a balanced, appropriately sized patent portfolio of high quality, this financial opportunity would be realized.

Throughout business, it is an objective to eliminate waste. Yet, when it comes to the patent process, waste seems to be acceptable. A main reason for the waste is that the conventional patent process does not ask or answer the question of how many patents are needed to appropriately protect a technology. It does not ask or answer the question of what types of inventions should be protected, when should they be protected, and where should be they protected. Since the conventional patent process does not ask or answer these questions, it cannot calculate or forecast a patent return on investment for patent protecting a technology.

Figure 2:
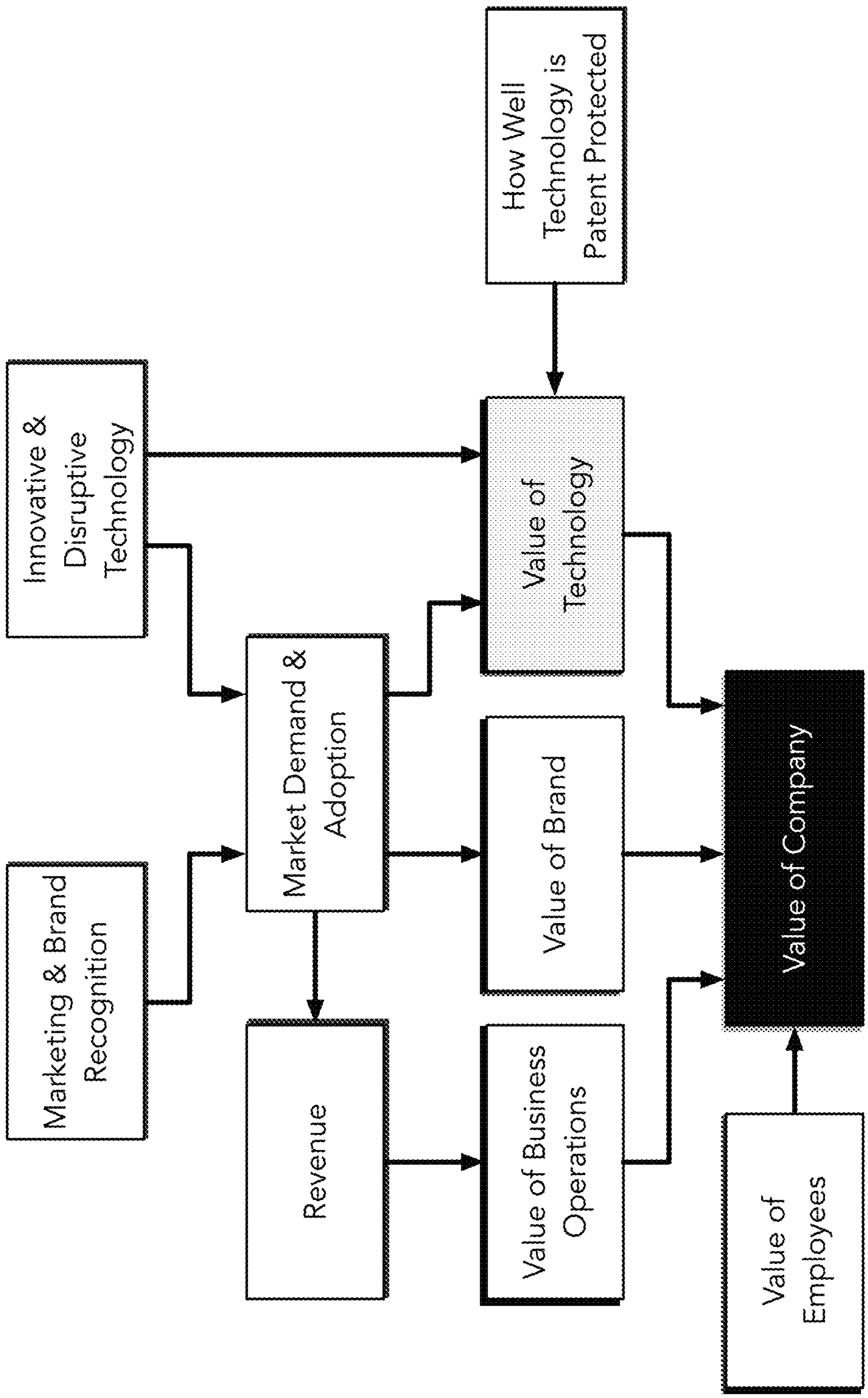
FIG. 2 is a schematic block diagram of an example a company's value proposition.

FIG. 2 is a schematic block diagram of an example a company's value proposition. In this example, a company's value is the combination of the value of its employees, the value of its business operations, the value of its brand, and the value of its technology. The latter three values propositions are driven by market demand & adoption of the company's products and/or services and on revenue generated from such products and/or services. Market demand & adoption is driven by marketing & brand recognition and, for technology companies, on innovative and disruptive technology.

Value of the company's technology is also driven by how well it is patent protected. This is a philosophical shift in valuing patents. It's shifting from valuing patents on an individual basis, as is done in the conventional patent process, to valuing a technology based on how well its patent protected. Patent protecting a technology well includes creating a well balanced portfolio for the technology (equal and appropriate levels of patent protection for each technical challenge of the technology), a patent portfolio of appropriate breadth (covers uses and expansions of the technology), and a patent portfolio of high quality patents; and does so without waste (no unnecessary patents and no patent applications that won't issue).

When a technology is well patent protected, it provides the patent holder significant market leverage with respect to the technology. Market leverage adds to the value of the technology and this patented technology valuation methodology captures the technology's full market value by including market leverage.

Maximizing the value of technology through patent protection, helps maximize the overall value of a company. Increasing the value of technology helps drive the U.S. economy. As mentioned above, in the U.S. in 2019, the gross domestic product was about $21.38 trillion dollars of which, about $7.76 trillion was attributable to intellectual property intensive industries (about 30% of which is directly attributable to patented technology).

Protecting technological development, driving growth of the economy through technology advancements, and rewarding technology advancements with limited time monopolies is rooted in the U.S. Constitution. Patent protection of technology is regarding the invention or discovery of any new and useful process, machine, manufacture, or composition of matter, or any new and useful improvement thereof.

There is no restriction on how a company may use patented technology to increase its overall value. For example, companies embed the patented technology in the products it sells. As another example, companies use patented technology to increase production of the products it sells. As a further example, companies use patented technology to improve tracking of production, quality control, and sales of the products. As yet another example, companies use patented technology to improve other aspects of its business operations and thus to increase the value of business operations. Regardless of how a technology is used by a business, if it helps the business increase its value, then the technology is helping drive the U.S. economy. Helping the U.S. economy through technology advancement is at the heart of the Constitutional right of patent protection.

To patent protect a technology well requires a paradigm shift and re-engineering of the patent process. It requires answering the questions of (1) how many patents are needed to appropriately protect a technology; and (2) what types of inventions should be protected, when should they be protected, and where should be they protected. To answer these questions and more, a new computer architecture is disclosed herein, which provides an improved computer for technology.

Figure 3A:
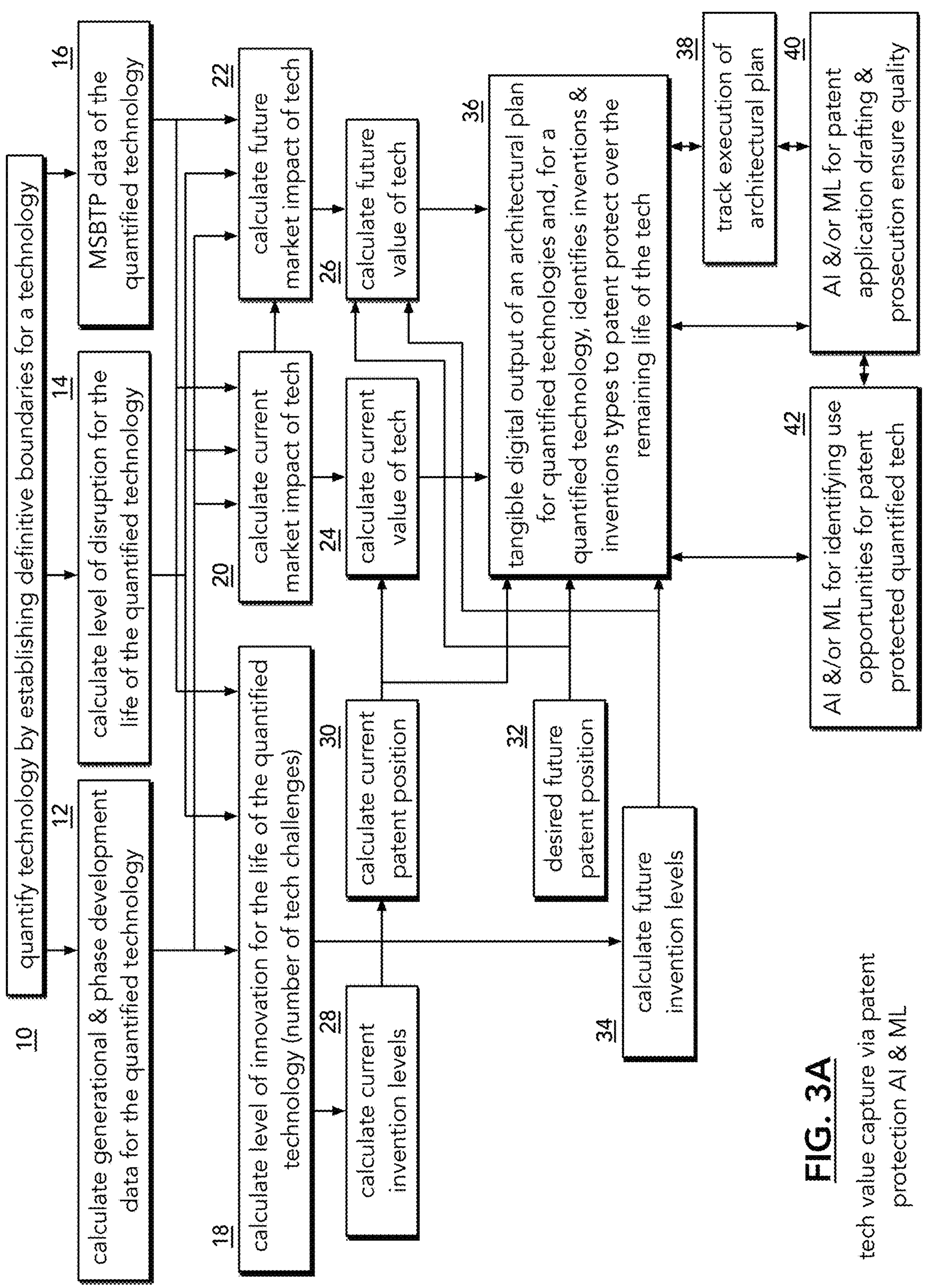
FIGS. 3A through 3C are a logic diagram of a method for execution by an improved computer for technology.
Figure 3B:
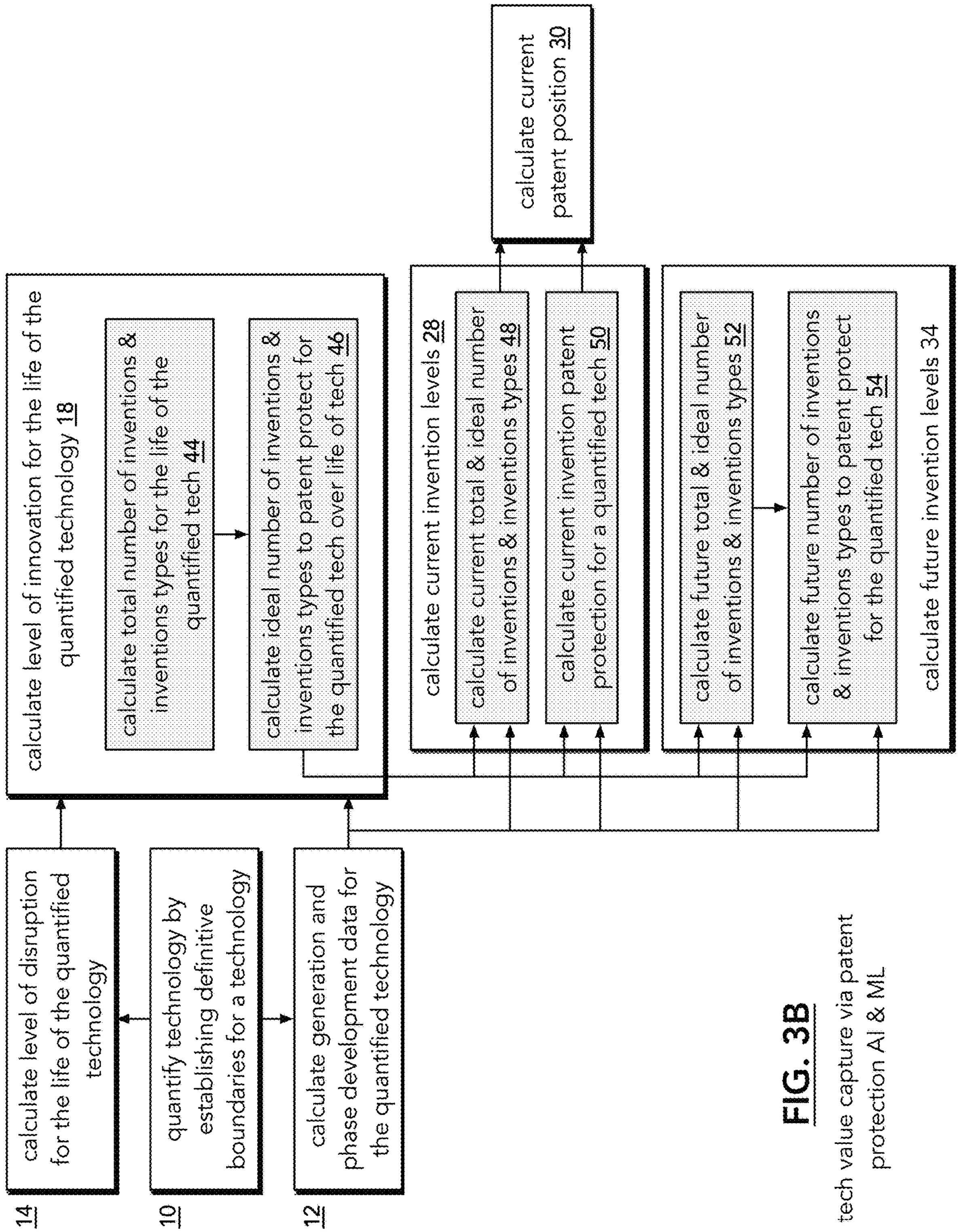
Figure 3C:
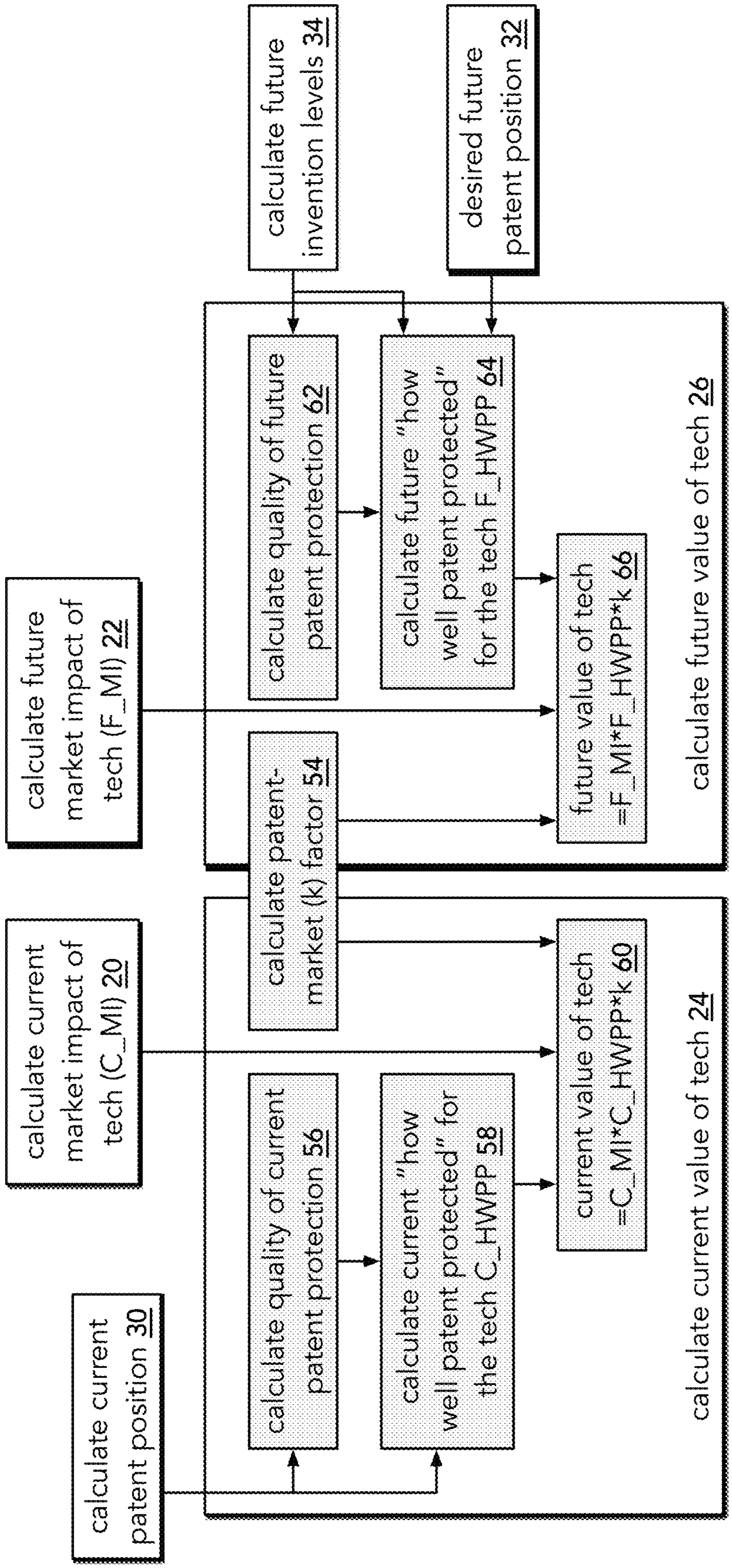

As part of answer the questions, the improved computer for technology executes, using machine learning and/or artificial intelligence programs, the method of FIGS. 3A through 3C. In FIG. 3A, the method begins at step 10 where the improved computer quantifies a technology by establishing definitive boundaries. Via the improved computer, technology is quantified into market-tech units (MTUs), which are discussed in greater detail in subsequent figures. In general, an MTU is a technology that has defined technical boundaries so it can be easily and/or consistently identified, referenced, and/or searched.

The method continues at steps 12, 14, and 16. At step 12, the improved computer calculates generational & phase development data for the quantified technology (i.e., a market-tech unit (MTU)). The generational & phase development data will be discussed in greater detail with reference to subsequent figures. In general, generational & phase development data is regarding S-curves of the quantified technology covering per phase and per generation level of innovation, per phase and per generation breadth of innovation, per phase and per generation profitability, and per phase and per generation technical evolution.

At step 14, the improved computer calculates a level of disruption of the quantified technology that spans the life of the quantified technology. The life of the quantified technology includes one or more generations of the quantified technology, where a new generation of the quantified technology corresponds to a 2× or more improvement of the quantified technology. The level of disruption will be described in greater detail with reference to subsequent figures. In general, the level of disruption is a sliding scale from: incremental disruption, better mouse trap disruption, evolutionary disruption, and revolutionary disruption.

In general, an incremental disruption quantified technology provides an enhancement to a predecessor technology and typically does not obsolete products and exhibits modest perceptible performance improvements. For example, increasing a refresh rate of a video-graphics display is an incremental disruption. As another example, increasing the storage capacity of a random access memory (RAM) chip is an incremental disruption.

In general, a better mouse trap disruption quantified technology provides a notable performance improvement of products that use the predecessor technology. Products using the quantified technology forge a new section of a marketplace. While it takes market share form products using the predecessor technology, it does not generally obsolete such products. For example, a shoe technology that improves the ground body connection is a better mouse trap disruption.

In general, an evolutionary disruption quantified technology provides new performances, features, functions, capabilities, etc. that were not obtainable from products that use predecessor technologies. Products incorporating evolutionary technology typically obsolete products using the predecessor technology and expand the market. For example, LCD displays obsoleted CRT displays and expanded the display market.

In general, a revolutionary disruptive quantified technology opens up new markets for products that have unprecedented performances, features, functions, capabilities, etc. For example, the internet opened up e-commerce markets and a plethora of other on-line products.

At step 16, the improved computer routinely (e.g., periodically, pseudo-randomly, upon command, etc.) gathers marketing, sales, business, technology, and patent (MSBTP) documents relating to a quantified technology. The improved computer extracts data from the MSBTP documents to help define, expand, and categorize the quantified technology in a service and/or product supply chain.

Steps 12, 14, and 16 lead to steps 18, 20, and 22. At step 18, the improved computer calculates a level of innovation for the life of the quantified technology based on the generational & phase data, the level of disruption, and the MSBTP data. The level of innovation corresponds to the number of technical challenges that need to be resolved to make commercially viable products over the life of the quantified technology, which may span multiple generations. In general, a technical challenge corresponds to a technical aspect of a unique value proposition (UVP) of quantified technology, a technical aspect of a marketable feature of products embodying (or likely to embody) the quantified technology, and/or other technical aspect of the quantified technology.

At step 20, the improved computer calculates the current (and past) market impact of the quantified technology based on the generational & phase data, the level of disruption, and the MSBTP data. In general, the market impact of a quantified technology is a financial measure of its influence on transactions of products embodying the quantified technology and uses thereof. As an example, a touch screen controller chip retails for $1 per chip and 1 billion chips are sold annually. Assume that the quantified technology is embodied in all of the touch screen controller chips sold. As such, the annual total revenue for the chips is $1 billion. Assume that 25% of the value of the chip is attributable to the quantified technology, then the market impact of the quantified technology is $250 million (25% of $1 billion).

As another example, assume that the touch screen controller chip with the quantified technology enables new touch related features, services, functions, etc. of a cell phone. Assume that the annual revenue for cell phone sales is $500 billion. Further assume, that the new touch related features, services, functions, etc. account for 0.5% of the value of a cell phone. Based on these assumptions the quantified technology has an additional value of $2.5 billion (0.5% of $500 billion).

At step 22, the improved computer calculates the future impact of the quantified technology based on the generational & phase data, the level of disruption, the MSBTP data, and the current market impact of the quantified technology. Continuing with the examples of step 20, the future forecast for the touch screen controller chip is that it will evolve to include further features, functions, performance enhancements, etc. The future forecast is that the sale of touch screen controller chips will have a CAGR (compounded annual growth rate) of 8% for the next 5 years and the price per chip will have a CAGR of 1% for the next five years. The future forecast further includes that the sales of cell phones will have a CAGR of 4% for the next five years and the price per cell phone remain constant. The future forecast further includes that the touch screen controller will be incorporated in tablets, laptops, and smart watches.

From step 18, the method continues at steps 28 and 34. At step 28, the improved computer calculates a current level of inventions for the quantified technology. To do this, the improved computer determines a total number of inventions to be invented over the life of the quantified technology (which may include multiple generations). Based on the generational and phase data of step 18, the improved computer determines how much of the life of the quantified technology has passed. From the total number of inventions and how much of the life has passed, the improved computer determines the total number of inventions that should have been invented to date.

At step 34, the improved computer calculates a future level of inventions. To do this, the improved computer uses the total number of inventions and how much of the life has passed to determine the total number of inventions that should be invented in the future to the end of life of the quantified technology.

From step 28, the method continues at step 30, where the improved computer calculates a current patent position. To do this, the improved computer determines an actual number of inventions regarding the quantified technology have some form of patent protection (e.g., disclosed in a pending provisional patent application, disclosed in a pending patent application, claimed in an issued patent). The improved computer also determines an ideal number of inventions of the quantified technology that should have some form of patent protection. The ideal number of inventions is based on the total number of inventions that warrant patent protection (e.g., have value in a patent fence protecting the quantified technology; a patent fence is discussed in detail with reference to subsequent figures). The ideal number of inventions will typically be in the range of 60% to 95% of the total number of inventions.

The improved computer then compares the actual number of inventions protected with respect to the ideal number of inventions that should have been patent protected to date. The comparison establishes the current patent position of the industry as a whole and/or for individual patent holders. The patent position ranges from weak to superior on a sliding scale. A superior patent position corresponds to a very high probability of a favorable outcoming in a patent dispute involving the quantified technology. A weak patent position corresponds to a very high probability of an unfavorable outcoming in a patent dispute involving the quantified technology. A superior patent position includes actual inventions patent protected in the range of 35% to 80% of the ideal number of inventions.

From steps 20 and 30, the method continues at steps 24 and 36. At step 24, the improved computer calculates the current value of the quantified technology. The current value is calculation as a function of how well the quantified technology is patent protected (e.g., a calculated numerical representation of its current patent position), the current market impact as determined in step 20, and a market-technology "k" factor. The value of quantified technology as MTUs (market-tech units) will be described in greater detail with reference to subsequent figures.

From steps 22, 32, and 34, the method continues at step 26. At step 32, the improved computer determines a desired future patent position. This is typically based on an input from a user of the improved computer. At step 26, the improved computer calculates the future value of the quantified technology based on the future market impact of step 22, the desired patent position of step 32, and the calculated level of inventions from step 34. The future value is calculation as a function of how well the quantified technology is planned to be patent protected (e.g., a calculated numerical representation of its future patent position), the future market impact as determined in step 22, and the market-technology "k" factor.

The method continues at step 36, where the improved computer generates an architectural plan, as a tangible digital output, for the quantified technology based on the inputs received from steps 24, 26, 30, 32, and 34. The architectural plan includes a targeted number of inventions to patent protect each year, where to seek patent protection, the projected annual cost of patent protection and growing a patent portfolio, the projected growth of the patent portfolio, and the projected value of the quantified technology. The targeted inventions include targeted invention types and targeted quantities for each technical challenge of the quantified technology. The generation of an architectural patent protection plan will be discussed in greater detail with reference to subsequent figures.

The method continues at step 38, where the improved computer tracks execution of the architectural patent protection plan via tracking machine learning and/or artificial intelligence programs and private patent portfolio development databases.

The method continues at step 40, where the improved computer executes machine learning and/or artificial intelligence programs regarding patent application drafting and/or patent application prosecution in accordance with the architectural patent protection plan. The method continues at step 42, where the improved computer executes machine learning and/or artificial intelligence programs to identify patent use opportunities in accordance with the architectural patent protection plan.

FIG. 3B is a logic diagram of a method that is in furtherance of the method of FIG. 3A and, in particular, with respect to steps 18, 28, and 34 of FIG. 3A. In the present figure, step 18, which is regarding the calculation of the level of innovation, includes steps 44 and 46. At step 44, the improved computer calculates a total number of inventions and invention types for the life of the quantified technology. Step 18 then continues at step 46, where the improved computer calculates an ideal number of inventions and invention types to protect over the life of the quantified technology. The total number of inventions and the ideal number of inventions corresponds to the level of innovation.

Step 28, which is regarding the calculation of the current invention level, includes the steps 48 and 50. At step 48, the improved computer calculates a current a total number of inventions and a current ideal number of inventions that should have been invented to date. Step 28 continues at step 50, where the improved computer calculates the current invention patent protection level for the quantified technology based on the total and ideal numbers and an actual number of inventions having some form of patent protection to date.

Step 34, which is regarding the calculation of the future level of inventing, includes the steps 52 and 54. At step 52, the improved computer calculates a future total number of inventions and a future ideal number of inventions that should be invented before the end of life of the quantified technology. Step 34 continues at step 54, where the improved computer calculates the future invention patent protection level for the quantified technology based on the future total and ideal numbers and a desired future patent position.

FIG. 3C is a logic diagram of a method that is in furtherance of the method of FIG. 3A and, in particular, with respect to steps 24 and 26 of FIG. 3A. In the present figure, step 24 includes steps 54, 56, 58, and 60 and step 26 includes steps 54, 62, 64, and 66. At step 54, the improved computer calculates the market-patent "k" factor, which is a sliding scale of a measure of patent need and technology competitiveness. The market-patent "k" factor will be described in greater detail with reference to subsequent figures.

At step 56 of step 24, the improved computer calculates quality of current patent protection (e.g., the quality of patent application preparation and/or patent application prosecution). The method continues at step 58, where the improved computer calculates a to-date how well is the quantified technology patent protected. The method continues at step 60, where the improved computer calculates the current value of the quantified technology based on the "how well patent protected" value, the current market impact, and the "k" factor.

At step 62 of step 26, the improved computer calculates quality of future patent protection (e.g., the likely quality of to be filed patent applications and/or to be prosecuted patent applications). The method continues at step 64, where the improved computer calculates a future how well the quantified technology will be patent protected. The method continues at step 66, where the improved computer calculates the future value (on a year by year basis) of the quantified technology based on the future "how well patent protected" value, the future market impact, and the "k" factor.

Figure 4A:
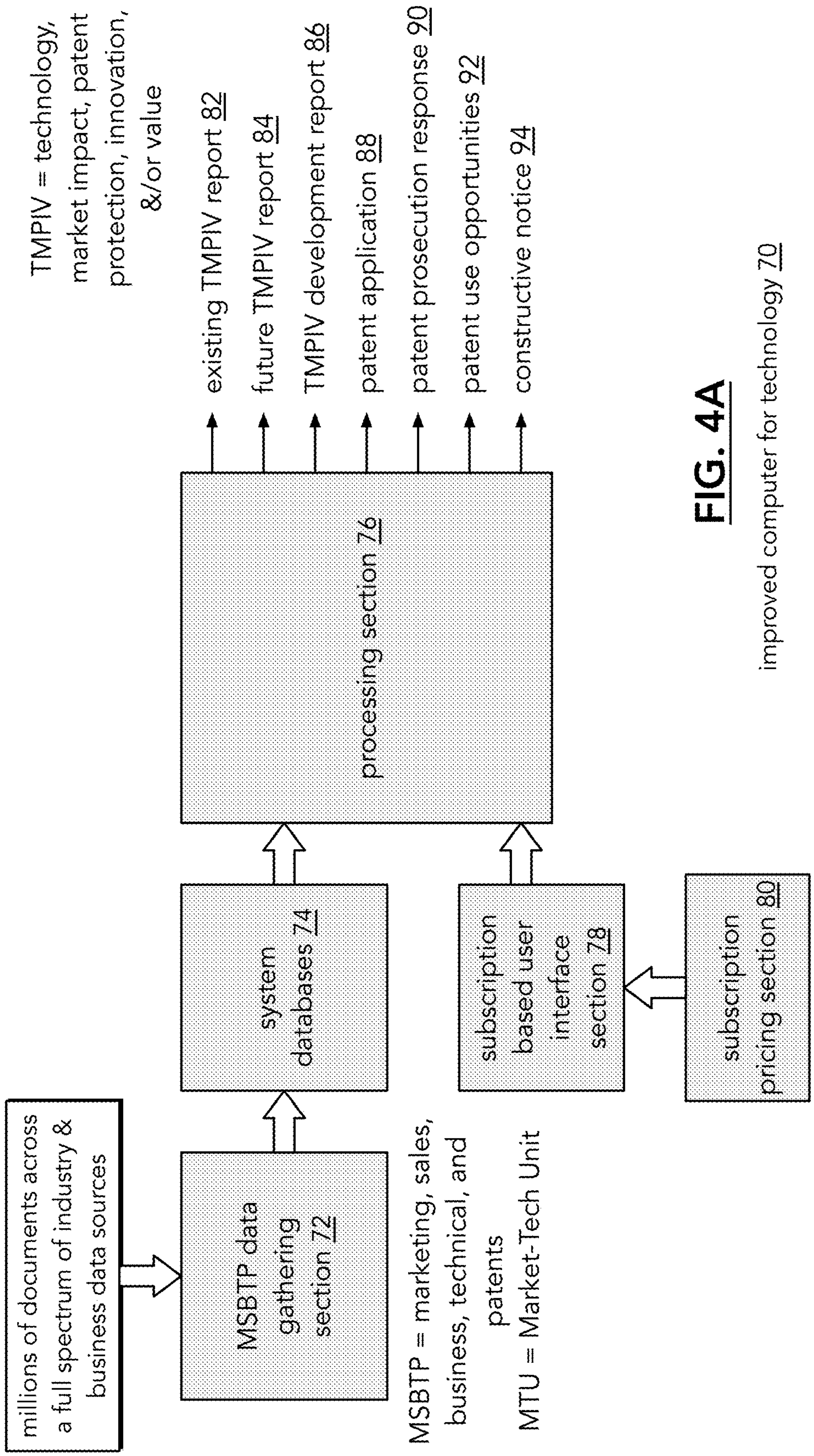
FIG. 4A is a schematic block diagram of an embodiment of an improved computer for technology.

FIG. 4A is a schematic block diagram of an embodiment of an improved computer 70 for technology that includes an MSBTP (marketing, sales, business, technical, and patent) data gathering section 72, system databases 74, a processing section 76, a subscription based user interface section 78, and a subscription pricing section 80, which are supported by one or more computing entities. In general, the MSBTP data gathering section 72 executes machine learning and/or artificial intelligence programs to routinely (e.g., periodically, pseudo randomly, upon request, etc.) ingest a large number of documents and dissect each document for relevant information regarding existing market-tech units (MTUs) and potentially new MTUs, where an MTU is a piece of quantified technology.

Relevant documents come in a variety of forms, are of a variety of types, and contain information regarding a variety of technology related topics. The form of a document is either a digital form or a physical form (e.g., printed on a piece of paper, in a printed newspaper, in a printed magazine, etc.). For documents in physical form to be ingested by the MSBTP data gathering section, the document is scanned to produce a digital version of it.

A digital form document, it is formatted in accordance with one or more document formats. For example, a document is a PDF (portable document format) document, another document is an HTML (hypertext markup language) document, another document is a word processing document, another document is a spreadsheet, another document is an image of one or more image formats (JPEG, PNG, GIF, SVG, MP4, etc.), and/or any other manner of digitizing information.

The document type is one or more of, but not limited to, a scholarly paper, an article, an essay, a study, a report (market, financial, business, technical, etc. that is regarding the past, present, and/or future), a manuscript, a deed, a certificate, a file, an experiment, a summary, a compilation, a data sheet, marketing material, sales material, an annual report, a patent, a patent application, a business plan, and a record.

The relevant content of document is information regarding an MTU's technical boundaries, its MTU inclusion hierarchy, its MTU composition hierarchy, functionality, its market impact, science categories, its inventions and patent protection thereof, and/or manufacturing. Each of these content categories will be discussed in greater detail with reference to subsequent figures. As a non-exhaustive list of examples, the document content includes information regarding technology, businesses that leverage (use, buy, sell, trade, lease, etc.) technology, financial data regarding technology, past and current market data regarding technology, transactions (buy, sell, license, litigate, etc.) regarding technology, development of new technology, requirements of a technology, standardizations of a technology, legal regulations of a technology, revenue forecasts regarding products/services embodying technology, and forecasts of future technology.

For documents ingested by the MSBTP data gathering section 72, it generates data for a MSBT (marketing, sales, business, technology) record to be created in an MSBT database; it generates data for an annotated patent record to be created in an annotated patent database; and it generates data for a patent term record to be crated in a patent term database if the ingested patent contains a new patent term (i.e., not already in the patent term database).

As documents are ingested, the MSBTP data gathering section 72 tags them with an MTU classification, which includes the classification of the MTU(s) name if the document is clearly associated with the MTU(s), the classification of "undecided, potential new MTU" if the document is not clearly associated with an existing MTU but is likely associated with a potentially new MTU, or a classification of "undecided" if the document is not clearly associated with an existing MTU or a potentially new MTU.

For a document that is tagged with an MTU name, relevant information regarding the document is added to the MTU record regarding the MTU in an MTU database. The MSBTP data gathering section 72 routinely (e.g., periodically (minutes, hours, days), pseudo-randomly, upon command) reviews the documents that have been classified "undecided, potential new MTU" to determine if there is sufficient data to establish a new MTU, to establish that there is not a new MTU, and/or to reclassify a document. The MSBTP data gathering section 72 also routinely reviews documents with the classification of "undecided" to determine if they should be reclassified or ultimately deleted.

When there is sufficient data to establish a new MTU, MSBTP data gathering section 72 generates data to create a new MTU record in the MTU database. The data includes the documents used to establish the existence of a new MTU.

From the records in the MSBT database, the annotated patent database, and/or the patent term database, the MSBTP data gathering section 72 generates market impact data for an MTU. The market impact data includes existing market impact data and future forecasted market impact data.

The processing section 76, as will be discussed in greater detail with reference to subsequent Figures, includes machine learning and/or artificial intelligence programs that function based on an MTU operating system and in accordance with a re-engineered patent process. The processing section 76 produces a plurality of digital reports regarding one or more MTUs, which include, for example, an existing TMPVI (technology, market impact, patent protection, innovation, and/or value) report 82; a future TMPVI report 84, a TMPVI development report 86 (which includes an architectural plan to patent protect an MTU); a drafted patent application and/or claim set 88; a patent prosecution response 90; a patent use opportunities report 92, and/or a constructive notice report 94.

Per the re-engineered patent process, an architectural patent protection plan is created by the processing section 76 for an MTU as early in the development of the MTU as practically possible. Using machine learning and/or artificial intelligence programs, which will be described in detail with subsequent figures, the processing section 76 calculates the total number of inventions that are likely to be invented over the life of the MTU based on, at least in part, technical challenges of the MTU; calculates invention types breakdown of the total number of inventions; calculates how many of the total number of inventions should be patent protected based on a desired patent position balanced with a desired patent spend and desired patent ROI (return on investment); and determines, when, where, and how to patent protect selected inventions.

In this manner, a patent portfolio for an MTU is built in accordance with a detailed architectural plan, which can be adjusted as the technology and/or market of the MTU evolve. As such, every invention that is patent protected is done so with a purpose in accordance with the plan, there is virtually no waste due to unnecessary patents, the resulting patent portfolio is balanced, of the desired scope and breadth to maximize the value of the MTU. When the patent application drafting and prosecution tools of the improved computer are used, waste due to filing patent applications that won't issue or issue with fatal flaws is eliminated.

As an analogy, the architectural plan to patent protect an MTU (market-tech unit, which a quantifiable piece of technology) is similar to the architectural plan for a building. The architectural plan for a building defines the size of the building, the shape of the building, the types of rooms in the building and quantity for each, the plumbing, the electrical, the HVAC, and so on. Every detail of the building is mapped out before building materials are purchased and construction commences.

The architectural plan to patent protect an MTU defines the size of the patent protection (number of inventions to protect), the type of inventions to protect and when & how to protect them, the technology challenges to be addressed, which leads to problems to be solved, inventive concepts for solving the problems, and particular solutions. In essence, every detail for building a patent portfolio to protect an MTU is mapped out as early in the development of the MTU as possible. This insures, like a building, that only necessary building materials are being acquired so that waste is minimized, and the desired structure is created (building or patent portfolio).

In contrast, the conventional patent process, which does not determine the number of inventions to patent protect for a technology over its life and does not quantify a technology in definitive terms that clearly defines technical boundaries, is like collecting building materials over several years for a variety of suppliers of which, some regularly provide certain building materials and others rarely provide other types of building materials. Then, years later collecting an imbalance of building materials, determining what can be built from the collected building materials.

If such an approach were taken with constructing a building, a contractor would collect too many building materials from some sources (e.g., plumbing supplies, roofing materials, paint, floor covering) and receiving too few building materials from other sources (e.g., framing material, electrical, drywall) over a multi-year period. After years of gathering various building materials in this manner, the contractor now decides what can be built with the collected building materials. Clearly, what can be built would have some functioning building elements but would not resemble the building that was constructed from a detailed architectural plan.

The improved computer 70 includes a new computer architecture that uses a new MTU operating system and system level machine learning and/or artificial intelligence programs to balance data analytics performed by user machine learning and/or artificial intelligence programs on the improved computer. The balancing of data analytics is to keep reports, summaries, and/or plans at the digestible pieces of meaningful information level and avoid swinging too far into the details or swinging too far into the general. With too far into the detail, the important take-aways of the data analysis are lost in the detail. With too far into the general, any important take-aways are lost in generality.

Within the improved computer 70, the user machine learning and/or artificial intelligence programs are software tools with the same purpose as any tool. In general, a tool (physical and/or virtual) provides a useful function for its user by improving something, making something more efficient, making something more reliable, making something faster, etc., where the something is an aspect of the user's life (e.g., making a business more financially sound, providing better production (output &/or efficiency), providing more efficient business functions, making a higher quality product, and so on). From a business standpoint, any tool that aids in increasing the value of the company is a valuable tool, regardless of its particular function.

Figure 4B:
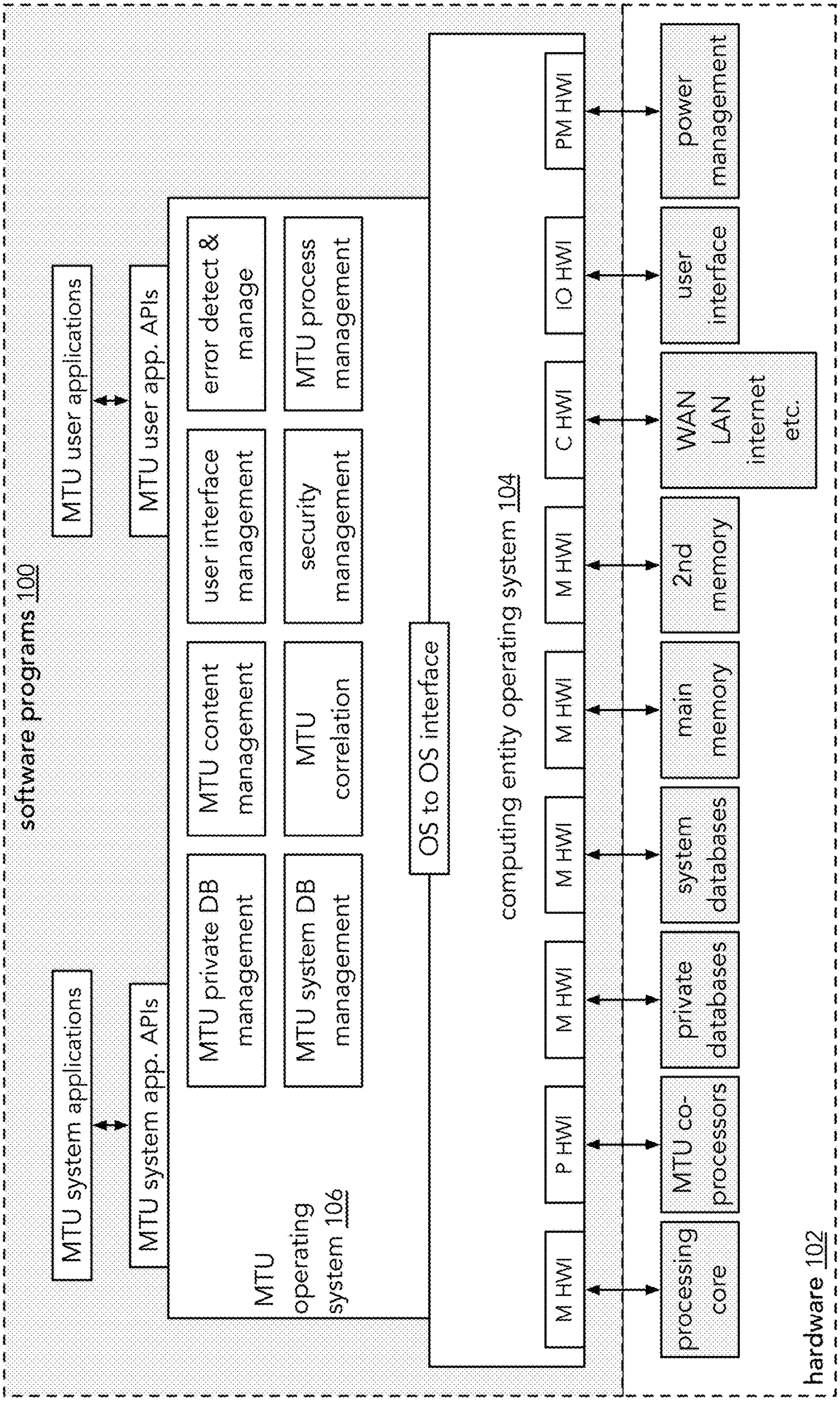
FIG. 4B is a schematic block diagram of another embodiment of an improved computer for technology.

FIG. 4B is a schematic block diagram of another embodiment of an improved computer 70 for technology. The improved computer 70, which is implemented using one or more computing entities, includes a hardware section 102 and a software programs 100. The hardware section 102 includes a processing core, a plurality of co-processors (e.g., a co-processor is a processing core of a computing entity, is a stand-alone processing unit, and/or is a section of a processing unit), private databases, system databases, main memory, secondary memory, network communication access devices (e.g., WAN (wide area network), LAN (local area network, wired and/or wireless), the Internet, etc.), user interfaces, and power management.

The software programs 100 include a computing entity operating system 104, an MTU operating system 106, MTU machine learning and/or artificial intelligence system applications, MTU machine learning and/or artificial intelligence user applications, MTU system application programming interfaces (APIs), and MTU user application APIs. The computing entity operating system 104 includes hardware interfaces (HWI) for the various hardware components of the hardware section 102. The MTU operating system (OS) 106 includes OS programs regarding MTU private database (DB) management, MTU system DB management, MTU content management, MTU correlation, user interface management, security management, error detection and correction management, and MTU process management.

The MTU operating system 106 interacts with the computing entity operating system 104 via an operating system (OS) to operating system (OS) interface. The OS to OS interface primarily functions as a translator between the OS programs of the MTU operating system and the OS programs of the computing entity operating system 104, which include process management, command interpreter system, input/output device management, main memory management, file management, second storage management, error detection and management, and security management.

The MTU operating system 106 controls the operation of the MTU system applications. The MTU system applications include machine learning and/or artificial intelligence programs for identifying data, gathering data, extracting relevant information from the data, MTU (market-tech unit) classifying the data, creating MTUs, creating and updating MTU records, creating and updating MSBT (marketing, sales, business, technology) records, creating and updating patent data records, creating and updating market impact records, storing MTU records, storing MSBT records, storing patent data records, and storing market impact records).

The MTU operating system 106 also controls the operation of the MTU user applications. The MTU user applications include machine learning and/or artificial intelligence programs regarding MTU generation and phase calculations and/or report generation, MTU existing patent data calculations and/or report generation, MTU existing marketing impact calculations and/or report generation, MTU existing patent protection calculations and/or report generation, MTU previous & current valuation calculations and/or report generation, MTU future forecasted patent data calculations and/or report generation, MTU future forecasted marketing impact calculations and/or report generation, MTU future forecasted patent protection calculations and/or report generation, MTU future forecasted valuation calculations and/or report generation, MTU technology expansion calculations and/or report generation, MTU market opportunity calculations and/or report generation, MTU market expansion calculations and/or report generation, MTU patent portfolio growth & expense calculations and/or report generation, MTU patent protection plan calculations and/or report generation, MTU future value calculations and/or report generation, MTU invention identification and claim drafting calculations and/or report generation, MTU patent application drafting calculations and/or report generation, MTU patent prosecution response calculations and/or report generation, MTU patent quality calculations and/or report generation, MTU patent plan execution & tracking calculations and/or report generation, MTU constructive notice calculations and/or report generation, MTU patent sale opportunity calculations and/or report generation, MTU patent purchase opportunity calculations and/or report generation, MTU patent licensing opportunity calculations and/or report generation, MUT patent standards opportunity calculations and/or report generation, and MTU patent based spin-off or joint venture (JV) opportunity calculations and/or report generation.

The operation of the improved computer 70, the hardware section 102 and the software programs 100 will be described in greater detail with reference to subsequent figures. In an embodiment, the improved computer performs the method of FIGS. 3A through 3C.

FIG. 4C is a diagram of an embodiment of operating system functions of an improved computer for technology in tabular form. The MTU operating system functions set rules the MTU system applications and for the MTU user applications and include MTU process management, MTU content management, MTU correlation, MTU system DB management, MTU private database (DB) management, user interface management, security management, and error detection and correction management.

The MTU process management OS function manages processes (e.g., a process is a running program or a subroutine thereof) of the MTU operating system, of the MTU system applications, and/or MTU user applications based on general rule concepts. The rules include prioritizing MTU operating system processes over MTU system application processes, which have priority over MTU user application processes. The rules also include only one write to a field of data record at a time and no limits on concurrent reading from data records.

As at least part of managing processes, the MTU process management OS function manages access to the hardware section of the improved computer, avoids deadlock of processes, prioritizes processes per the rules, and avoids starvation of processes. Controlling access to the hardware section includes communicating with the computing entity operating system to allow processes access to the processing core, the MTU co-processors, a private database, a system database, main memory, secondary memory, a network connection, and/or a user interface. Controlling access involves creating, loading, executing, suspending, resuming, and/or termination processes access to the hardware. It further involves switching between multiple processing in main memory, providing communication between the processes as needed, and/or managing concurrent accesses to a particular hardware component by multiple processes.

The MTU content management OS function manages and regulates what constitutes an MTU and manages and regulates the evolution of MTUs in accordance with its general rules. The general rules prescribe a minimum requirement for technical boundaries of a technology for it to be quantified as an MTU. The minimum requirements include one or more marketable features and/or one or more unique value propositions (UVP), one or more technical challenges relating to the marketable feature(s) and/or the UVP(s), and new and/or existing innovation based on the technical challenge(s).

The MTU content management OS function controls the identification of new MTUs, of creating data for new MTU data records, for creating data for data populating existing MTU records, and for editing data of existing MTU records. The MTU content management OS function further manages the splitting of an MTU into two or more MTUs, manages the merger of two more MTUs into one MTU, and manages the obsoleting of MTUs.

The MTU correlation OS function manages correlation of patent data and MSBT (marketing, sales, business, technical) data with MTUs (market-tech units, which represent quantified technology) based on general rules. The general rules include that MTU correlation includes MTU inclusion data (e.g., what an MTU is included in at least the next higher MTU tier), includes MTU composition data (e.g., what, of at least the next lower MTU tier, is included in the present MTU), and that MTU inclusion data in not required for fundamental MTUs.

The MTU correlation OS function manages correlation of newly ingest patent data and MSBT data with MTUs; it manages updating correlation of existing patent data and/or MSBT data as MTUs evolve; and it manages updating correlation of existing patent data and/or MSBT data as new MTUs are created.

The MTU system DB management OS function manages access to system databases based on general rules. The general rules include no external access to the system databases, access can only be through an MTU user application or an MTU system application, writing (e.g., create new records, edit records, delete records, etc.) can only be done by an MTU system application, and MTU user application only have read access to system databased.

Based on the rules, the MTU system DB management OS function manages reads and writes to the system databases; manages creating new system database records, manages deletion of system database records; and manages MTU addressing of system data.

The MTU private database (DB) management OS function manages access to private databases based on general rules. A private databases stores data for a user account regarding the planning and execution building a patent portfolio for an MTU. The general rules include that a private databased can only be accessed via selected MTU user applications by authorized users as approved through the user interface management OS function. The general rules further include field level read and/or write access for authorized users.

Based on the rules, the MTU private DB management OS function manages creating new private databases, manages reads and writes to private databases; manages creating new private database records, manages deletion of private database records; and manages MTU addressing of private data.

The user interface management OS function control user access to the improved computer for technology. Basically, unless a user, via its computing device, has proper authorization to access an MTU user application regarding one or more selected MTUs, the user is not permitted to access the improved computer. For example, the user may be a valid user but is seeking to access MTUs it is not authorized to access (e.g., has not subscribed to access such MTUs).

The MTU security management OS function rides on top of the security OS function of the computing entity operating system. MTU security monitors the ingesting of data from vetting data sources and the vetting of received documents prior to ingesting the document into the improved computer. The MTU security also monitors access to the MTU system application and ensures that it only done by authorized system administrators.

The MTU error detection and correction management OS function rides on top of the error detection and correction OS function of the computing entity operating system. The MTU error detection and correction management OS function detects processing errors of MTU OS functions, of MTU system applications, and/or of MTU user applications; processes debugging of MTU OS functions, of MTU system applications, and/or of MTU user applications; processes diagnostics of MTU OS functions, of MTU system applications, and/or of MTU user applications; and detects potential deadlocks and/or infinite loops of MTU OS functions, of MTU system applications, and/or of MTU user applications.

Figure 5A:
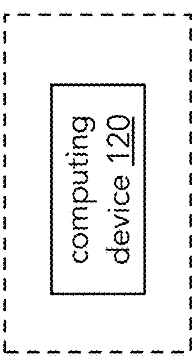
FIGS. 5A through 5E are schematic block diagram of embodiments of computing entities that are part of an improved computer for technology.
Figure 5B:
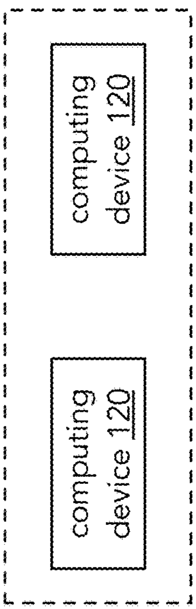
Figure 5C:
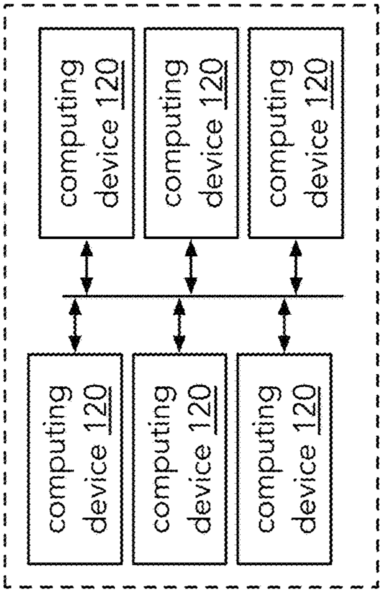
Figure 5D:
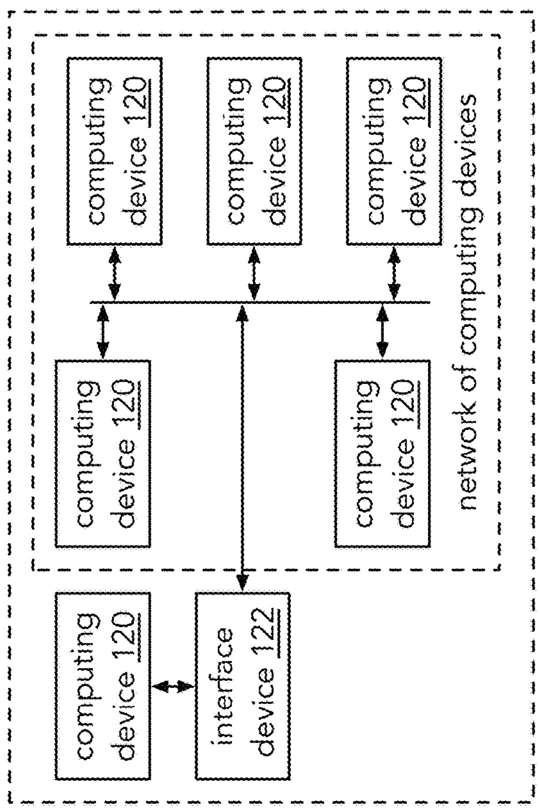
Figure 5E:
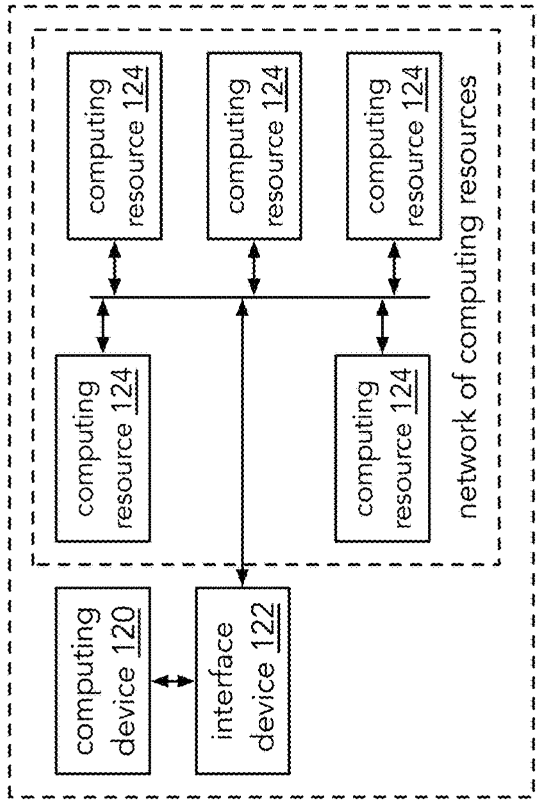

FIGS. 5A through 5E are schematic block diagram of embodiments of computing entities that form at least part of an improved computer for technology. FIG. 5A is schematic block diagram of an embodiment of a computing entity 110 that includes a computing device 120 (e.g., one or more of the embodiments of FIGS. 6A-6G). A computing device may function as a user computing device, a server, a system computing device, a data storage device, a data security device, a networking device, a user access device, a cell phone, a tablet, a laptop, a printer, a game console, a satellite control box, a cable box, etc.

FIG. 3B is schematic block diagram of an embodiment of a computing entity 110 that includes two or more computing devices 120 (e.g., two or more from any combination of the embodiments of FIGS. 6A-6G). The computing devices 120 perform the functions of a computing entity in a peer processing manner (e.g., coordinate together to perform the functions), in a master-slave manner (e.g., one computing device coordinates and the other support it), and/or in another manner.

FIG. 3C is schematic block diagram of an embodiment of a computing entity 110 that includes a network of computing devices 120 (e.g., two or more from any combination of the embodiments of FIGS. 6A-6G). The computing devices are coupled together via one or more network connections (e.g., WAN, LAN, cellular data, WLAN, etc.) and preform the functions of the computing entity.

FIG. 3D is schematic block diagram of an embodiment of a computing entity 110 that includes a primary computing device (e.g., any one of the computing devices of FIGS. 6A-6G), an interface device (e.g., a network connection), and a network of computing devices 120 (e.g., one or more from any combination of the embodiments of FIGS. 6A-6G). The primary computing device utilizes the other computing devices as co-processors to execute one or more the functions of the computing entity, as storage for data, for other data processing functions, and/or storage purposes.

FIG. 3E is schematic block diagram of an embodiment of a computing entity 110 that includes a primary computing device (e.g., any one of the computing devices of FIGS. 6A-6G), an interface device (e.g., a network connection) 122, and a network of computing resources 124 (e.g., two or more resources from any combination of the embodiments of FIGS. 6A-6G). The primary computing device utilizes the computing resources as co-processors to execute one or more the functions of the computing entity, as storage for data, for other data processing functions, and/or storage purposes.

Figure 6A:
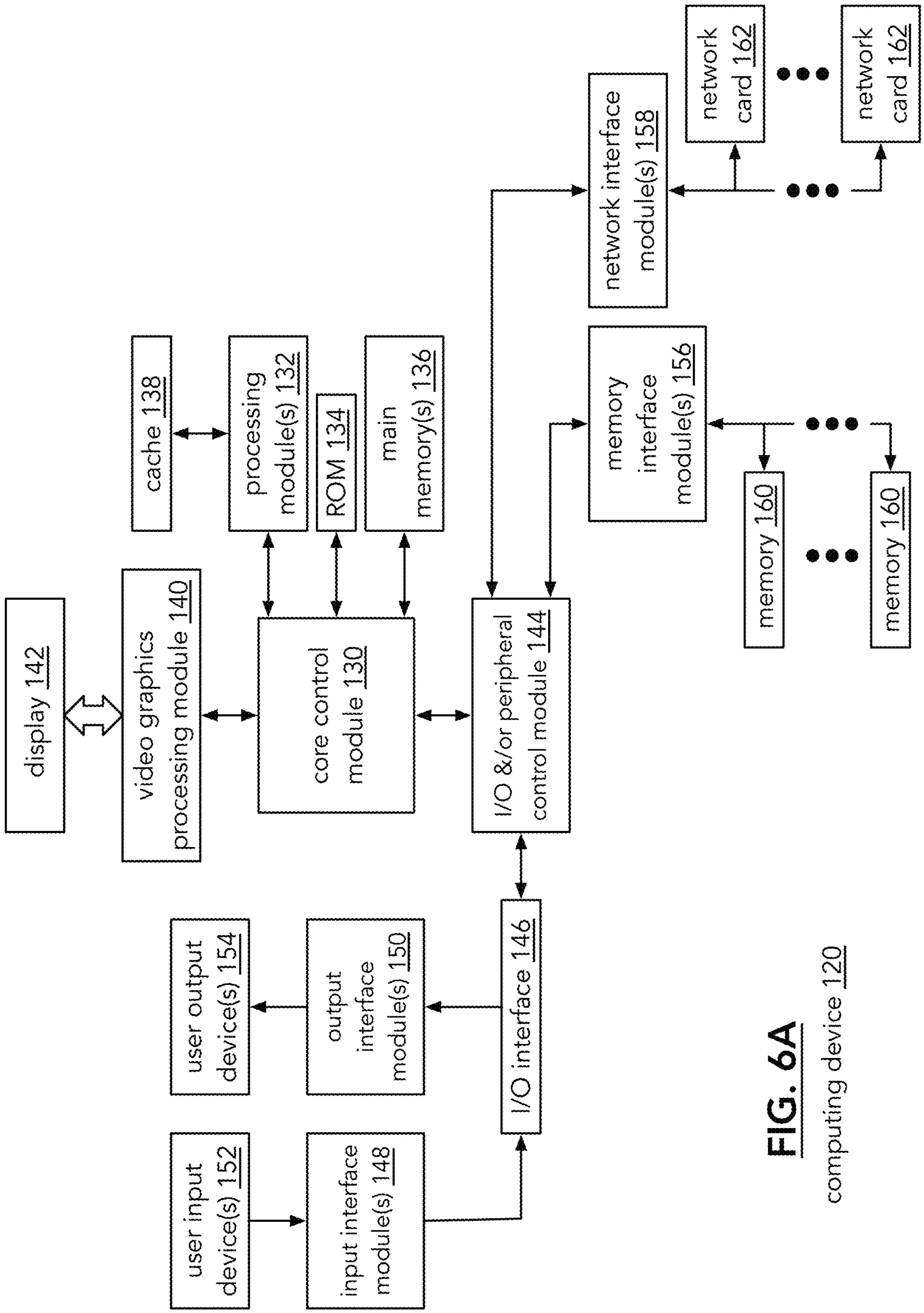
FIGS. 6A through 6G are schematic block diagram of embodiments of computing devices that form at least a portion of a computing entity.

FIGS. 6A through 6G are schematic block diagram of embodiments of computing devices that form at least a portion of a computing entity. FIG. 6A is a schematic block diagram of an embodiment of a computing device 120 that includes a plurality of computing resources. The computing resources, which form a computing core, include one or more core control modules 130, one or more processing modules 132, one or more main memories 136, a read only memory (ROM) 134 for a boot up sequence, cache memory 138, one or more video graphics processing modules 140, one or more displays 142 (optional), an Input-Output (I/O) peripheral control module 144, an I/O interface module 146 (which could be omitted if direct connect 10 is implemented), one or more input interface modules 148, one or more output interface modules 150, one or more network interface modules 158, and one or more memory interface modules 156.

A processing module 132 is described in greater detail at the end of the detailed description section and, in an alternative embodiment, has a direction connection to the main memory 136. In an alternate embodiment, the core control module 130 and the I/O and/or peripheral control module 144 are one module, such as a chipset, a quick path interconnect (QPI), and/or an ultra-path interconnect (UPI).

The processing module 132, the core module 130, and/or the video graphics processing module 140 form a processing core for the improved computer. Additional combinations of processing modules 132, core modules 130, and/or video graphics processing modules 140 form co-processors for the improved computer for technology. Computing resources 124 of FIG. 5E include one more of the components shown in this Figure and/or in or more of FIGS. 6B through 6G.

Each of the main memories 136 includes one or more Random Access Memory (RAM) integrated circuits, or chips. In general, the main memory 136 stores data and operational instructions most relevant for the processing module 132. For example, the core control module 130 coordinates the transfer of data and/or operational instructions between the main memory 136 and the secondary memory device(s) 160. The data and/or operational instructions retrieve from secondary memory 160 are the data and/or operational instructions requested by the processing module or will most likely be needed by the processing module. When the processing module is done with the data and/or operational instructions in main memory, the core control module 130 coordinates sending updated data to the secondary memory 160 for storage.

The secondary memory 160 includes one or more hard drives, one or more solid state memory chips, and/or one or more other large capacity storage devices that, in comparison to cache memory and main memory devices, is/are relatively inexpensive with respect to cost per amount of data stored. The secondary memory 160 is coupled to the core control module 130 via the I/O and/or peripheral control module 144 and via one or more memory interface modules 156. In an embodiment, the I/O and/or peripheral control module 144 includes one or more Peripheral Component Interface (PCI) buses to which peripheral components connect to the core control module 130. A memory interface module 156 includes a software driver and a hardware connector for coupling a memory device to the I/O and/or peripheral control module 144. For example, a memory interface 156 is in accordance with a Serial Advanced Technology Attachment (SATA) port.

The core control module 130 coordinates data communications between the processing module(s) 132 and network(s) via the I/O and/or peripheral control module 144, the network interface module(s) 158, and one or more network cards 162. A network card 160 includes a wireless communication unit or a wired communication unit. A wireless communication unit includes a wireless local area network (WLAN) communication device, a cellular communication device, a Bluetooth device, and/or a ZigBee communication device. A wired communication unit includes a Gigabit LAN connection, a Firewire connection, and/or a proprietary computer wired connection. A network interface module 158 includes a software driver and a hardware connector for coupling the network card to the I/O and/or peripheral control module 144. For example, the network interface module 158 is in accordance with one or more versions of IEEE 802.11, cellular telephone protocols, 10/100/1000 Gigabit LAN protocols, etc.

The core control module 130 coordinates data communications between the processing module(s) 132 and input device(s) 152 via the input interface module(s) 148, the I/O interface 146, and the I/O and/or peripheral control module 144. An input device 152 includes a keypad, a keyboard, control switches, a touchpad, a microphone, a camera, etc. An input interface module 148 includes a software driver and a hardware connector for coupling an input device to the I/O and/or peripheral control module 144. In an embodiment, an input interface module 148 is in accordance with one or more Universal Serial Bus (USB) protocols.

The core control module 130 coordinates data communications between the processing module(s) 132 and output device(s) 154 via the output interface module(s) 150 and the I/O and/or peripheral control module 144. An output device 154 includes a speaker, auxiliary memory, headphones, etc. An output interface module 150 includes a software driver and a hardware connector for coupling an output device to the I/O and/or peripheral control module 144. In an embodiment, an output interface module 150 is in accordance with one or more audio codec protocols.

The processing module 132 communicates directly with a video graphics processing module 140 to display data on the display 142. The display 142 includes an LED (light emitting diode) display, an LCD (liquid crystal display), and/or other type of display technology. The display has a resolution, an aspect ratio, and other features that affect the quality of the display. The video graphics processing module 140 receives data from the processing module 132, processes the data to produce rendered data in accordance with the characteristics of the display, and provides the rendered data to the display 142.

Figure 6B:
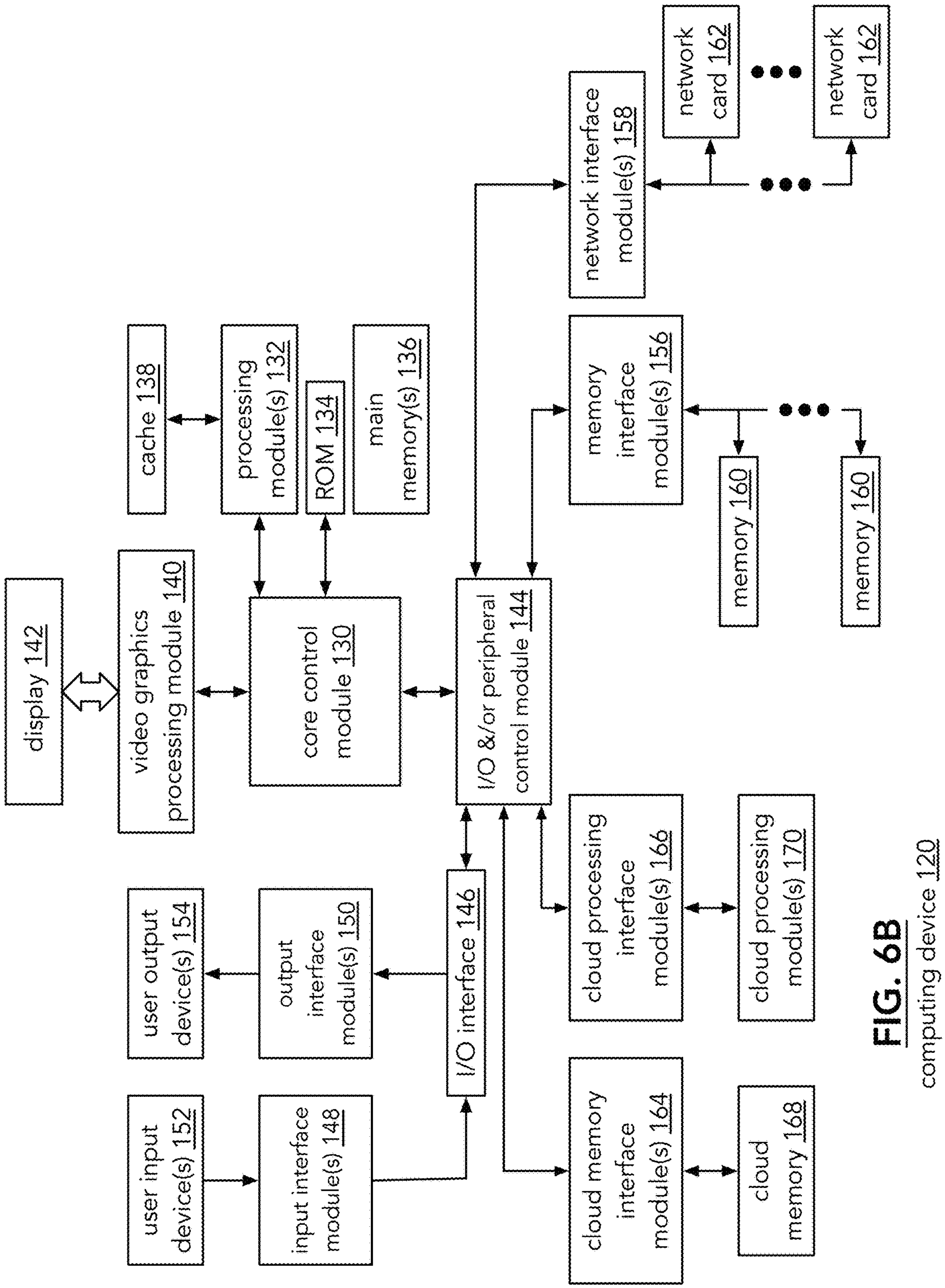

FIG. 6B is a schematic block diagram of an embodiment of a computing device 120 that includes a plurality of computing resources similar to the computing resources of FIG. 6A with the addition of one or more cloud memory interface modules 164, one or more cloud processing interface modules 166, cloud memory 168, and one or more cloud processing modules 170. The cloud memory 168 includes one or more tiers of memory (e.g., ROM, volatile (RAM, main, etc.), non-volatile (hard drive, solid-state, etc.) and/or backup (hard drive, tape, etc.)) that is remoted from the core control module and is accessed via a network (WAN and/or LAN). The cloud processing module 170 is similar to processing module 132 but is remoted from the core control module and is accessed via a network.

Figure 6C:
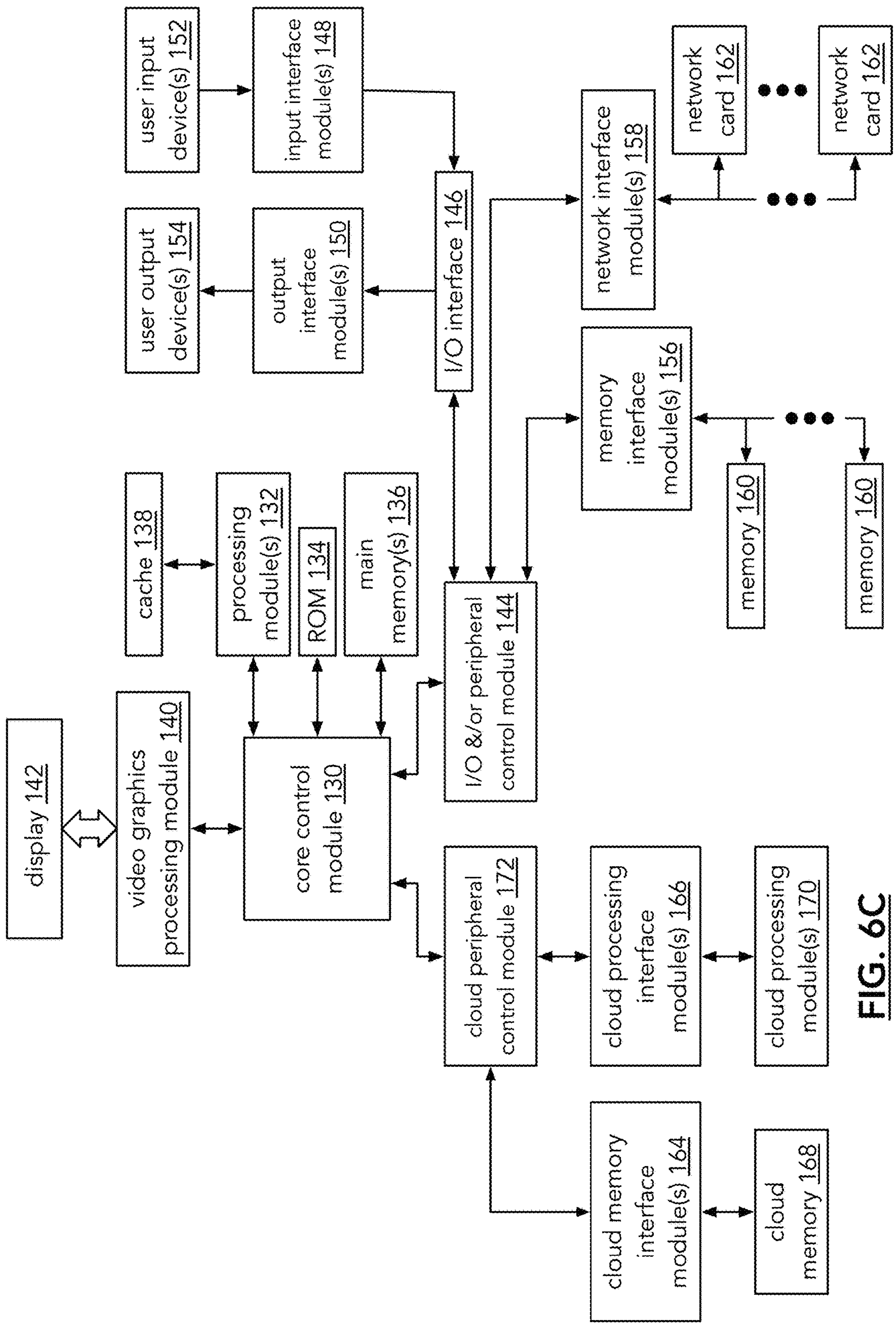

FIG. 6C is a schematic block diagram of an embodiment of a computing device 120 that includes a plurality of computing resources similar to the computing resources of FIG. 6B with a change in how the cloud memory interface module(s) 164 and the cloud processing interface module(s) 166 are coupled to the core control module 130. In this embodiment, the interface modules 164 and 166 are coupled to a cloud peripheral control module 172 that directly couples to the core control module 130.

Figure 6D:
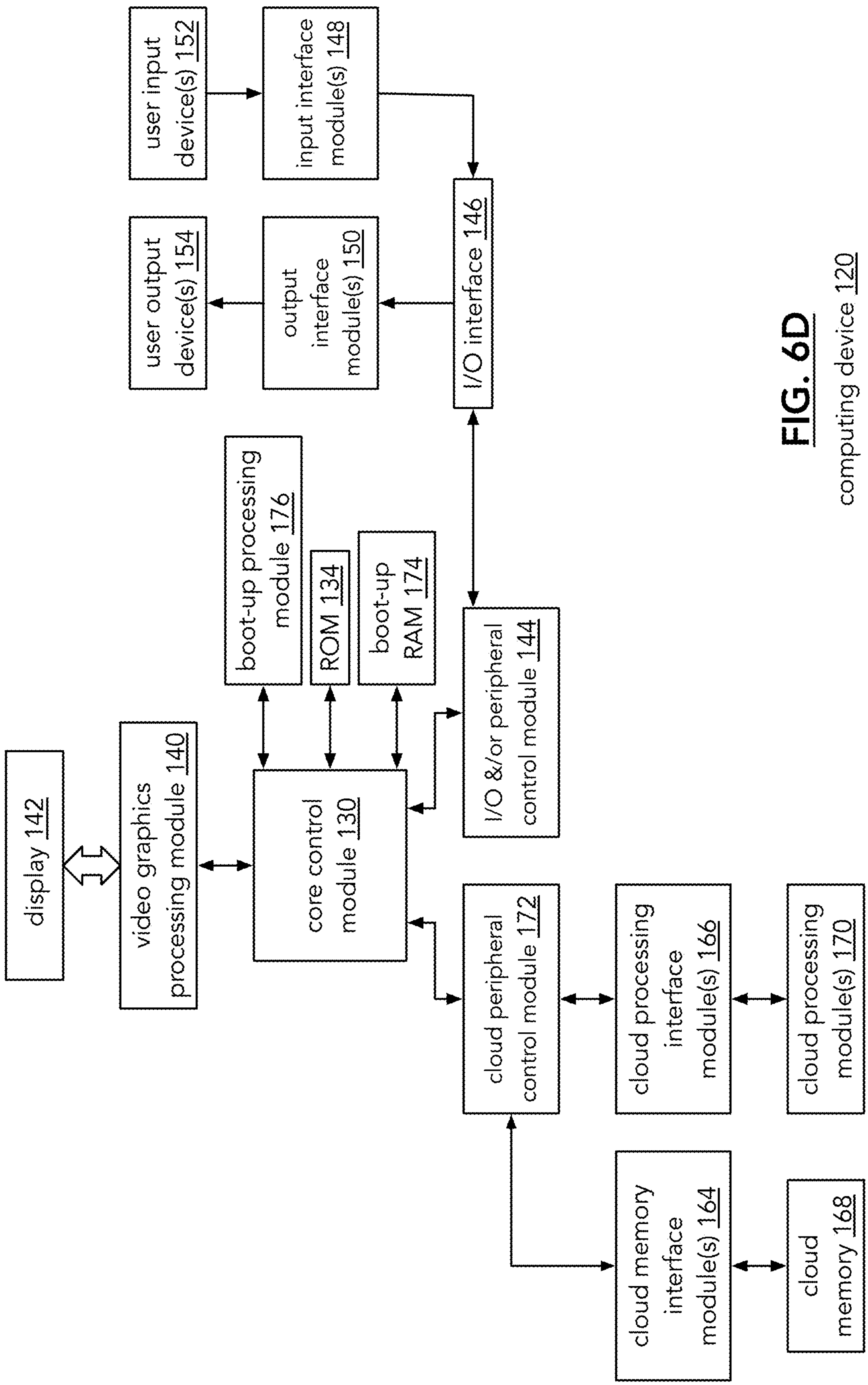

FIG. 6D is a schematic block diagram of an embodiment of a computing device 120 that includes a plurality of computing resources, which includes include a core control module 130, a boot up processing module 176, boot up RAM 174, a read only memory (ROM) 134, a one or more video graphics processing modules 140, one or more displays 48 (optional), an Input-Output (I/O) peripheral control module 144, one or more input interface modules 148, one or more output interface modules 150, one or more cloud memory interface modules 164, one or more cloud processing interface modules 166, cloud memory 168, and cloud processing module(s) 170.

In this embodiment, the computing device 120 includes enough processing resources (e.g., module 176, ROM 134, and RAM 174) to boot up. Once booted up, the cloud memory 168 and the cloud processing module(s) 170 function as the computing device's memory (e.g., main and hard drive) and processing module.

Figure 6E:
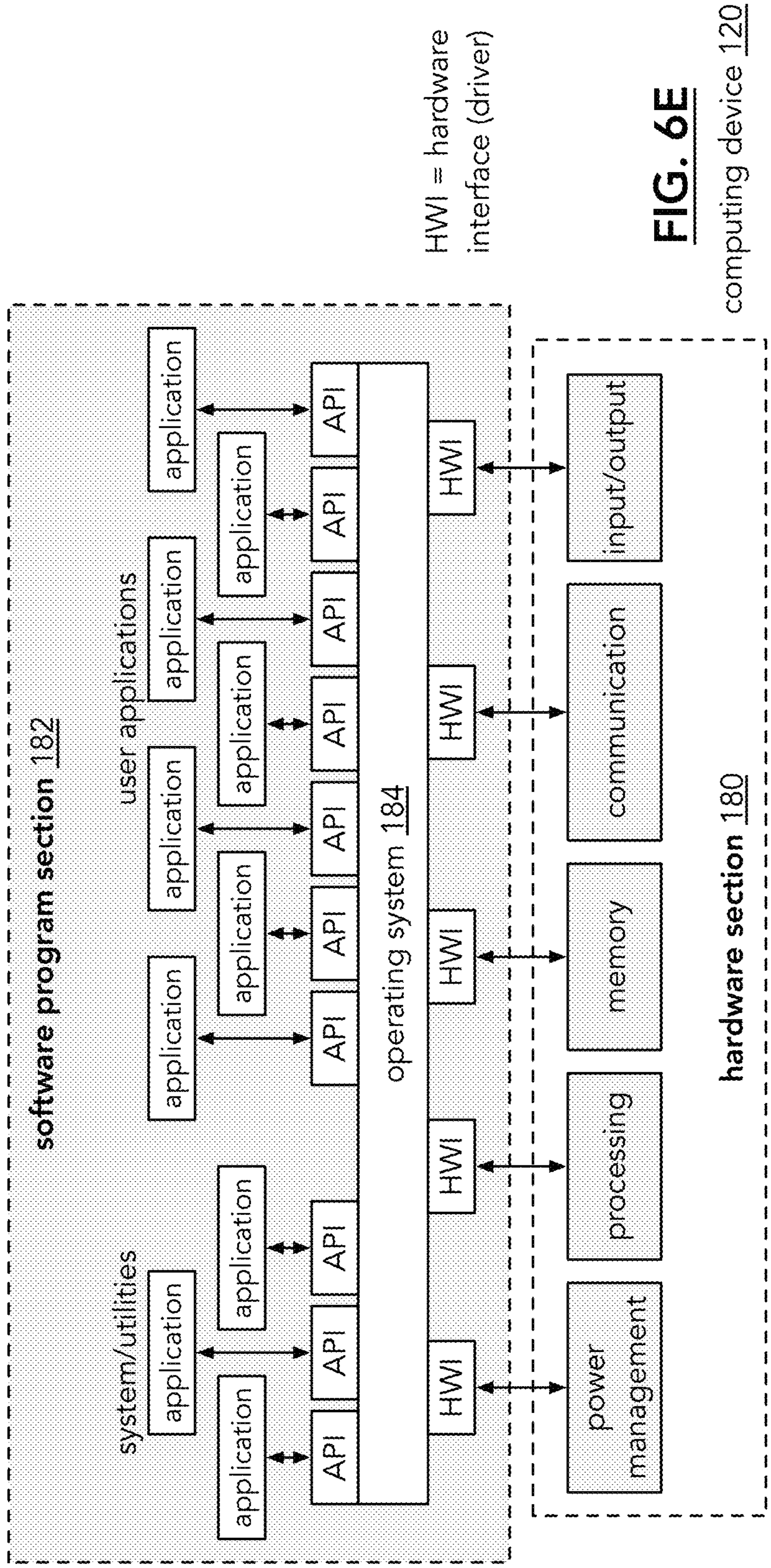

FIG. 6E is a schematic block diagram of another embodiment of a computing device 120 that includes a hardware section 180 and a software program section 182. The hardware section 180 includes the hardware functions of power management, processing, memory, communications, and input/output. FIG. 6G illustrates the hardware section 180 in greater detail.

The software program section 182 includes an operating system 184, system and/or utilities applications, and user applications. The software program section further includes APIs and HWIs. APIs (application programming interface) are the interfaces between the system and/or utilities applications and the operating system and the interfaces between the user applications and the operating system 184. HWIs (hardware interface) are the interfaces between the hardware components and the operating system. For some hardware components, the HWI is a software driver. The functions of the operating system 184 are discussed in greater detail with reference to FIG. 6F.

Figure 6F:
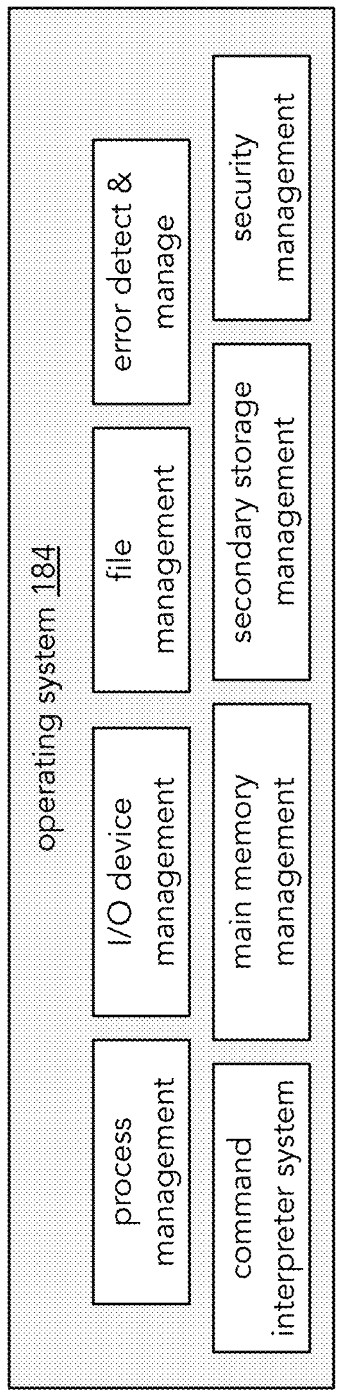
Figure 6G:
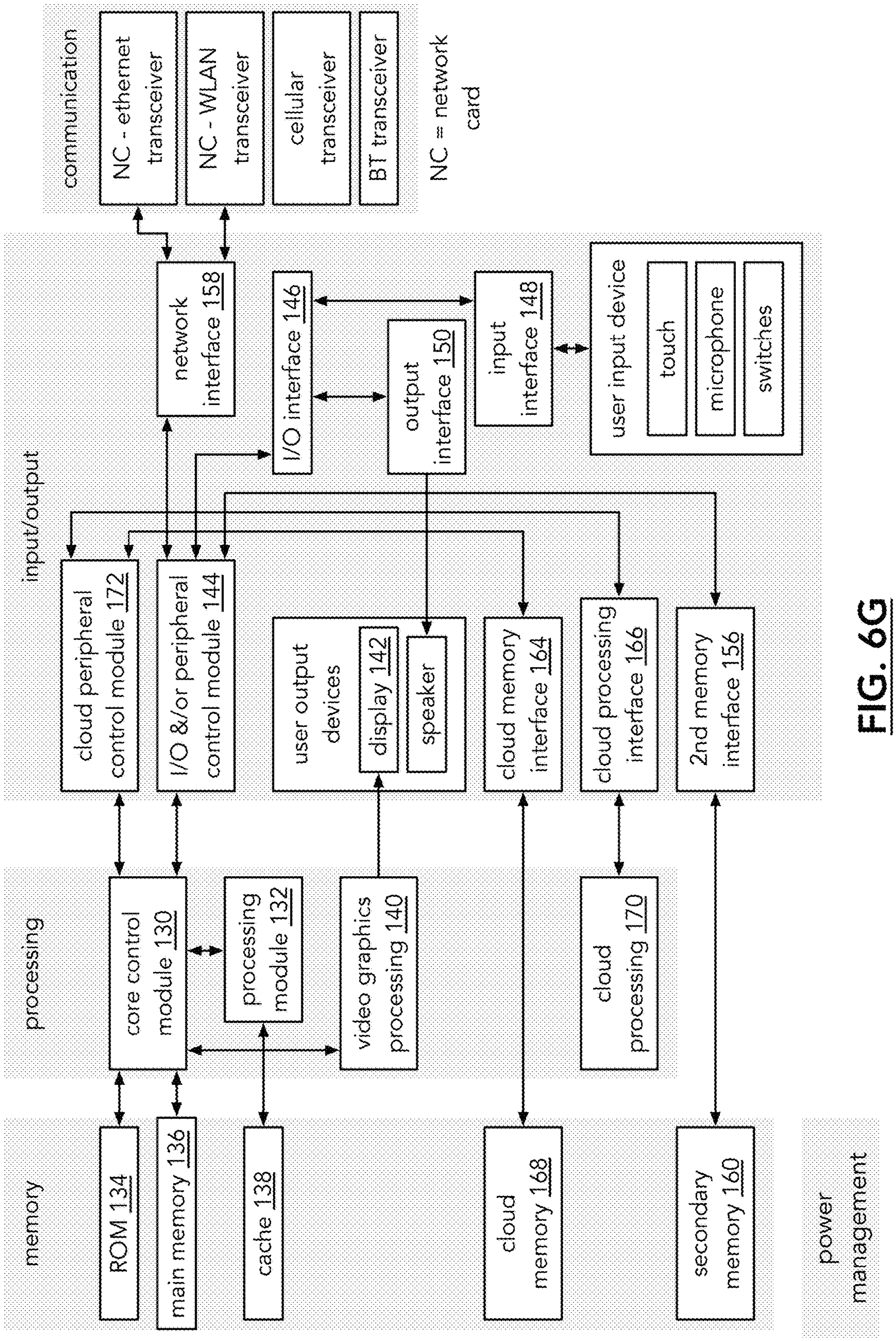

FIG. 6F is a diagram of an example of the functions of the operating system of a computing device 120. In general, the operating system function to identify and route input data to the right places within the computer and to identify and route output data to the right places within the computer. Input data is with respect to the processing module and includes data received from the input devices, data retrieved from main memory, data retrieved from secondary memory, and/or data received via a network card. Output data is with respect to the processing module and includes data to be written into main memory, data to be written into secondary memory, data to be displayed via the display and/or an output device, and data to be communicated via a network care.

The operating system 184 includes the OS functions of process management, command interpreter system, I/O device management, main memory management, file management, secondary storage management, error detection & correction management, and security management. The process management OS function manages processes of the software section operating on the hardware section, where a process is a program or portion thereof.

The process management OS function includes a plurality of specific functions to manage the interaction of software and hardware. The specific functions include:

- load a process for execution;
- enable at least partial execution of a process;
- suspend execution of a process;
- resume execution of a process;
- terminate execution of a process;
- load operational instructions and/or data into main memory for a process;
- provide communication between two or more active processes;
- avoid deadlock of a process and/or interdependent processes; and
- control access to shared hardware components.

The I/O Device Management OS function coordinates translation of input data into programming language data and/or into machine language data used by the hardware components and translation of machine language data and/or programming language data into output data. Typically, input devices and/or output devices have an associated driver that provides at least a portion of the data translation. For example, a microphone captures analog audible signals and converts them into digital audio signals per an audio encoding format. An audio input driver converts, if needed, the digital audio signals into a format that is readily usable by a hardware component.

The File Management OS function coordinates the storage and retrieval of data as files in a file directory system, which is stored in memory of the computing device. In general, the file management OS function includes the specific functions of:

- File creation, editing, deletion, and/or archiving;
- Directory creation, editing, deletion, and/or archiving;
- Memory mapping files and/or directors to memory locations of secondary memory; and
- Backing up of files and/or directories.

The Network Management OS function manages access to a network by the computing device. Network management includes

- Network fault analysis;
- Network maintenance for quality of service;
- Network access control among multiple clients; and
- Network security upkeep.

The Main Memory Management OS function manages access to the main memory of a computing device. This includes keeping track of memory space usage and which processes are using it; allocating available memory space to requesting processes; and deallocating memory space from terminated processes.

The Secondary Storage Management OS function manages access to the secondary memory of a computing device. This includes free memory space management, storage allocation, disk scheduling, and memory defragmentation.

The Security Management OS function protects the computing device from internal and external issues that could adversely affect the operations of the computing device. With respect to internal issues, the OS function ensures that processes negligibly interfere with each other; ensures that processes are accessing the appropriate hardware components, the appropriate files, etc.; and ensures that processes execute within appropriate memory spaces (e.g., user memory space for user applications, system memory space for system applications, etc.).

The security management OS function also protects the computing device from external issues, such as, but not limited to, hack attempts, phishing attacks, denial of service attacks, bait and switch attacks, cookie theft, a virus, a trojan horse, a worm, click jacking attacks, keylogger attacks, eavesdropping, waterhole attacks, SQL injection attacks, and DNS spoofing attacks.

FIG. 6G is a schematic block diagram of the hardware components of the hardware section 180 of a computing device. The memory portion of the hardware section includes the ROM 134, the main memory 136, the cache memory 138, the cloud memory 168, and the secondary memory 160. The processing portion of the hardware section includes the core control module 130, the processing module 132, the video graphics processing module 140, and the cloud processing module 170.

The input/output portion of the hardware section includes the cloud peripheral control module 172, the I/O and/or peripheral control module 144, the network interface module 158, the I/O interface module 146, the output device interface 150, the input device interface 148, the cloud memory interface module 164, the cloud processing interface module 166, and the secondary memory interface module 156. The IO portion further includes input devices such as a touch screen, a microphone, and switches. The IO portion also includes output devices such as speakers and a display.

The communication portion includes an ethernet transceiver network card (NC), a WLAN network card, a cellular transceiver, a Bluetooth transceiver, and/or any other device for wired and/or wireless network communication.

Figure 7:
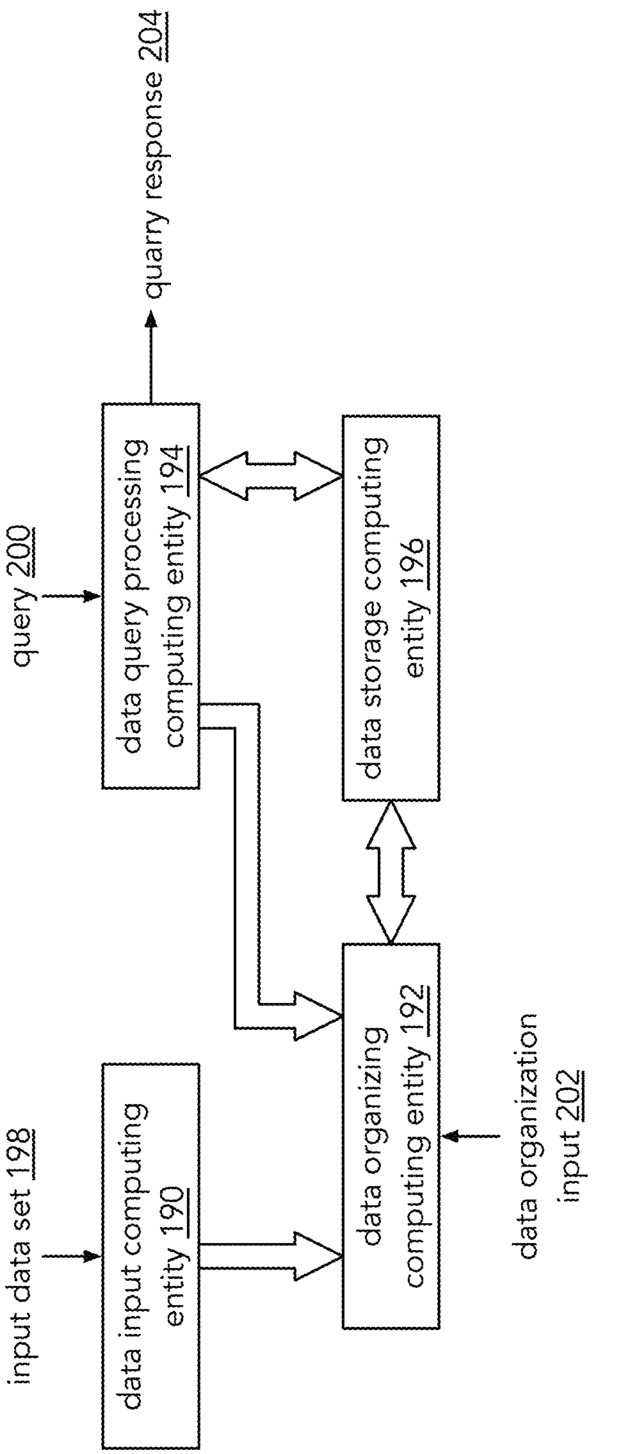
FIG. 7 is a schematic block diagram of an embodiment of a database.

FIG. 7 is a schematic block diagram of an embodiment of a database that includes a data input computing entity 190, a data organizing computing entity 192, a data query processing computing entity 194, and a data storage computing entity 196. Each of the computing entities is implementation in accordance with one or more of the embodiments of FIGS. 5A through 5E.

The data input computing entity 190 is operable to receive an input data set 198. The input data set 198 is a collection of related data that can be represented in a tabular form of columns and rows, and/or other tabular structure. In an example, the columns represent different data elements of data for a particular source and the rows corresponds to the different sources (e.g., employees, licenses, email communications, etc.).

If the data set 198 is in a desired tabular format, the data input computing entity 190 provides the data set to the data organizing computing entity 192. If not, the data input computing entity 190 reformats the data set to put it into the desired tabular format.

The data organizing computing entity 192 organizes the data set 198 in accordance with a data organizing input 202. In an example, the input 202 is regarding a particular query and requests that the data be organized for efficient analysis of the data for the query. In another example, the input 202 instructions the data organizing computing entity 192 to organize the data in a time-based manner. The organized data is provided to the data storage computing entity for storage.

When the data query processing computing entity 194 receives a query 200, it accesses the data storage computing entity 196 regarding a data set for the query. If the data set is stored in a desired format for the query, the data query processing computing entity 194 retrieves the data set and executes the query to produce a query response 204. If the data set is not stored in the desired format, the data query processing computing entity 194 communicates with the data organizing computing entity 192, which re-organizes the data set into the desired format.

Figure 8A:
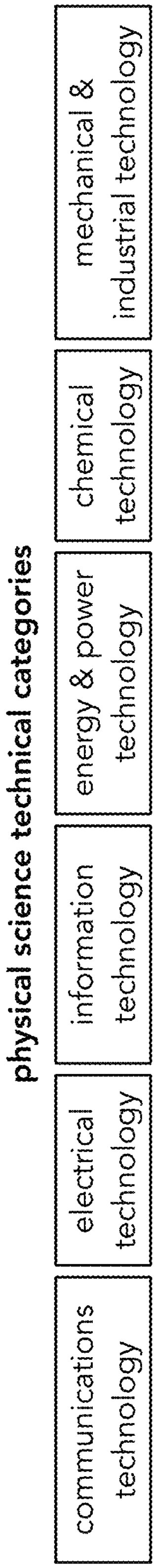
FIG. 8A is a diagram of an example of physical science technical categories.

FIG. 8A is a diagram of an example of physical science technical categories that include, but is not limited to, the high-level categories of communications technology, electrical technology, information technology, energy and power technology, chemical technology, and mechanical & industrial technology. Recall that, in general, physical sciences are regarding the study of the physical, non-living things, in world and/or universe.

Figure 8B:
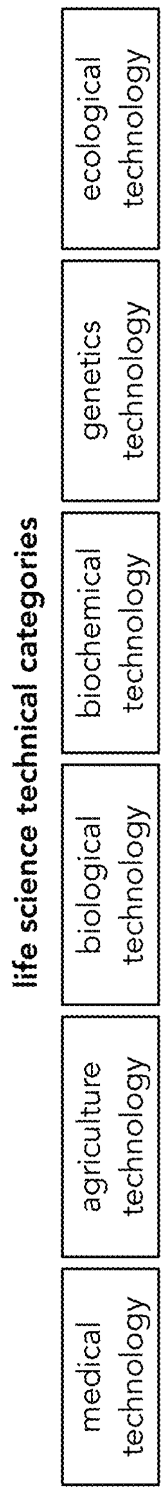
FIG. 8B is a diagram of an example of life science technical categories.

FIG. 8B is a diagram of an example of life science technical categories that include, but is not limited to, the high-level categories of medical technology, agriculture technology, biological technology, biochemical technology, genetics technology, and ecological technology. Recall that, in general, life sciences are regarding the study of living things.

With respect to FIGS. 8A and 8B, the improved computer for technology organizes technology based on the physical sciences and life sciences. Within a life science or physical science category, technology is quantified and organized in accordance with market-tech units, which the improved computer identifies and creates by ingesting and processing up to millions of documents regarding technology, the business of technology, the legal protection of technology, the use of technology, the expansion of technology, and/or the relevant information.

The MTUs are mapped into functional diagrams and/or hierarchy diagrams for ease and clarity of identifying a piece of technology and where it fits in the world of technology and how it affects the technology world and the business world. The MTU mapping captures and illustrates how technology builds on technology. The MTU mapping allows for zooming out on a technology map to get a macroscopic view of the technology and/or a zooming in on the technology map to get microscopic views of the technology building blocks (which are quantified as MTUs).

Figure 9A:
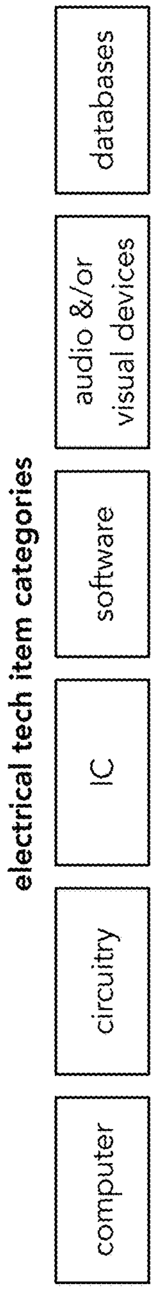
FIG. 9A is a diagram of an example of electrical technology item categories.

The high-level physical science categories can be broken down into sub-categories. For example, FIG. 9A is a diagram of an example of electrical technology being broken down into electrical tech item categories of computer, circuitry, integrated circuit (IC), software, audio and/or visual devices, and database. Note that this is just an example and there are more electrical tech item categories. Further note that an item is a product and/or service that is bought, sold, traded, licensed and/or otherwise consumed by an end-user and/or by an entity in a product supply chain (See FIG. 11B) and/or a service supply chain (See FIG. 11A).

Figure 9B:
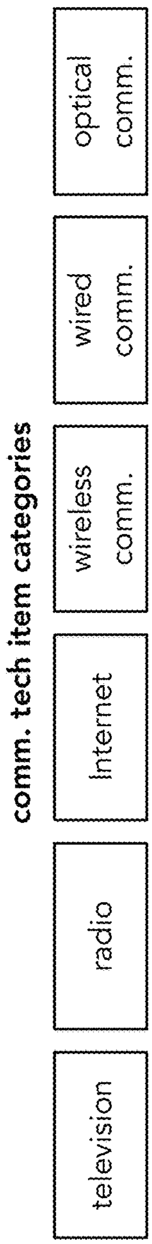
FIG. 9B is a diagram of an example of communication technology item categories.

As another example, FIG. 9B is a diagram of an example of communication technology item categories that include television, radio, the Internet, wireless communications, wired communications, and optical communications. Note that this is just an example and there are more communication tech item categories.

Figure 9C:
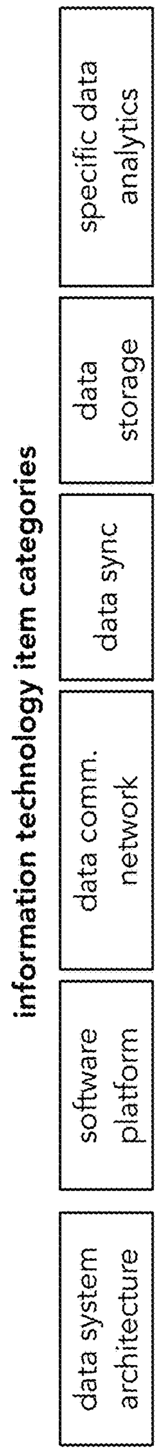
FIG. 9C is a diagram of an example of information technology item categories.

As a further example, FIG. 9C is a diagram of an example of information technology (e.g., the use of systems for storing, retrieving, processing and/or sending digital information) item categories that includes data system architecture, software platform, data communication networks, data synchronization, data storage, and specific data analytics. Note that this is just an example and there are more information technology item categories.

Figure 9D:
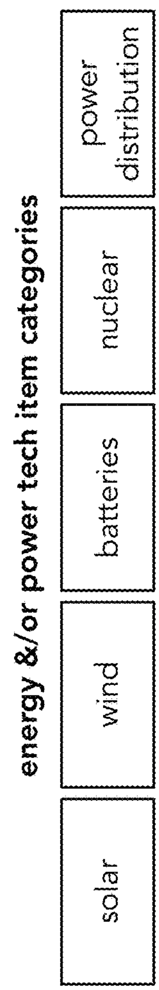
FIG. 9D is a diagram of an example of energy & power technology item categories.

As yet a further example, FIG. 9D is a diagram of an example of energy & power technology item categories that includes solar, wind, batteries, nuclear, and power distribution. Note that this is just an example and there are more energy and power tech item categories. Further note that each of the tech item categories of FIGS. 9A through 9D include one or more layers of further sub-categories.

While not shown in FIGS. 9A through 9D, the following provides examples of sub-categories for the other high-level physical and life science categories.

- A few examples of the practical purposes of mechanical & industrial technology include manufacturing, building construction, building materials, and transportation infrastructure.
- A few examples of the practical purposes of medical technology include diagnosis, surgical, pharmaceutical, health monitoring, genetic engineering, and treatment.
- A few examples of the practical purposes of chemical technology include plastics, pharmaceuticals, materials, and reactions.
- A few examples of the practical purposes of transportation technology includes global positioning satellite (GPS), flight, vehicles, collision protection for living and/or non-living things, and automation of transportation.
- A few examples of the practical purposes of agriculture technology include robotic planting/weeding/harvesting, watering control, pest control, and soil content control.
- A few examples of the practical purposes of biological technology include synthesizing insulin and/or other human biologicals, DNA profiling, stem cells, and genome analysis.
- A few examples of the practical purposes of information technology include establish a software platform, establish a data communications network, establish data synchronization of a data set, establish data storage of a data set, establish specific analytics of a data set.

Figure 10A:
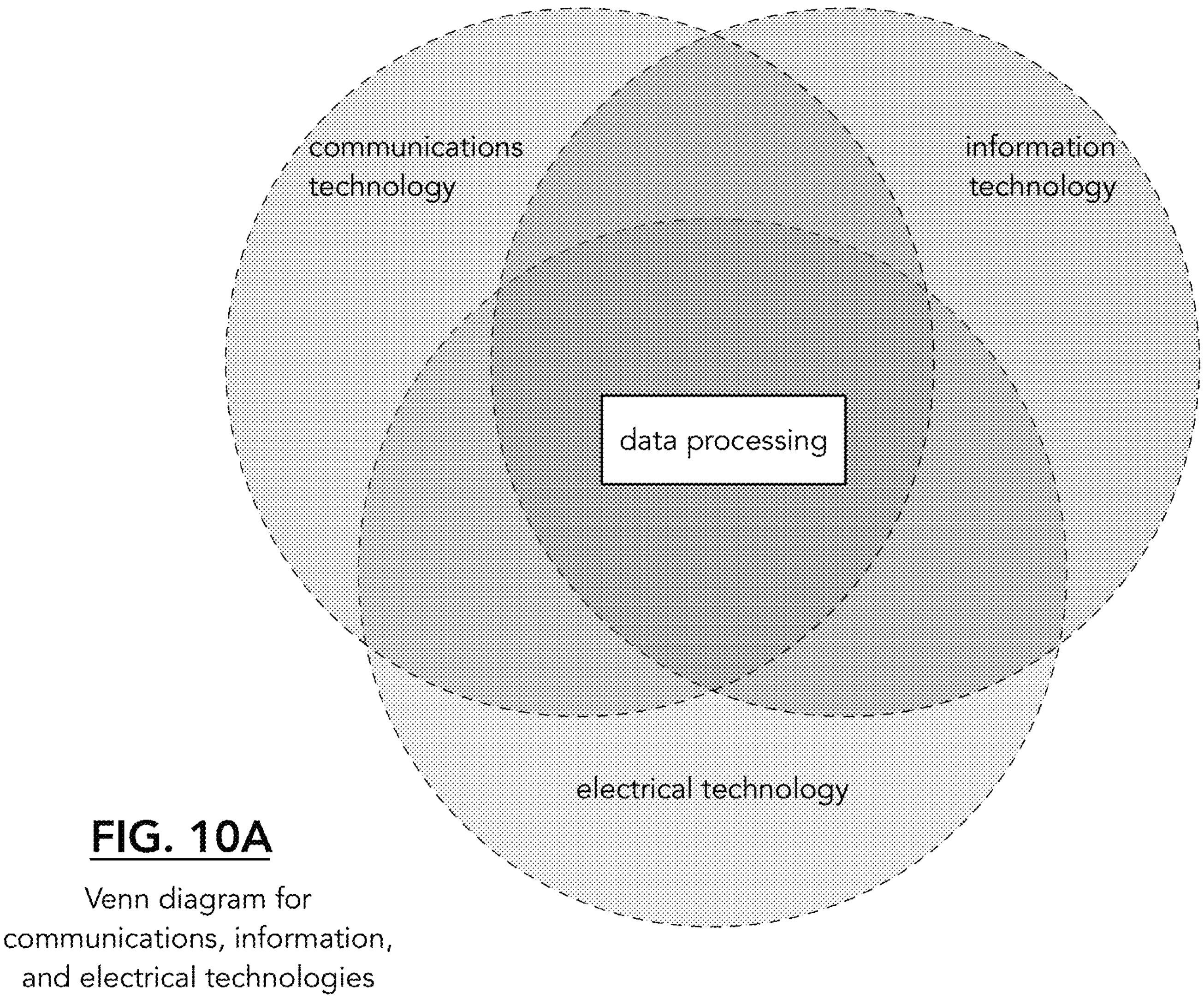
FIG. 10A is a Venn diagram of communication technology, information technology, and electrical technology.

FIG. 10A is a Venn diagram of communication technology, information technology, and electrical technology. As shown, there is technical overlap between the three tech categories. For example, a computing device would be within the intersection of the three technology categories. Note that at the center of the Venn diagram is data processing. All three of the technology categories rely on data processing and so many of the technology advancements made, and being made, in these tech categories depends on inventive, reliable, and repeatable data processing.

Figure 10B:
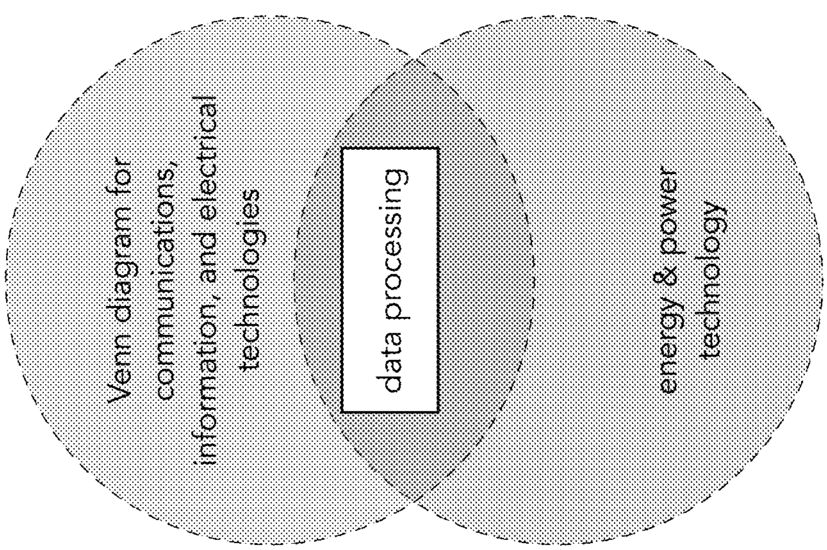
FIG. 10B is a Venn diagram of communication technology, information technology, and electrical technology with energy & power technology.

FIG. 10B is a Venn diagram of communication technology, information technology, and electrical technology with energy & power technology. The combination of communication, information, and electrical technologies overlap with the energy & power technology. At the center of the overlap is data processing.

Figure 10C:
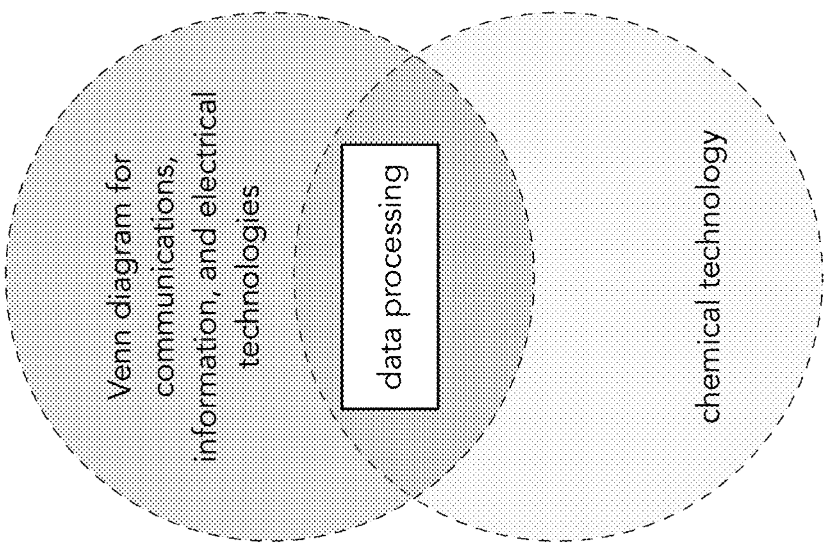
FIG. 10C is a Venn diagram of communication technology, information technology, and electrical technology with chemical technology.

FIG. 10C is a Venn diagram of communication technology, information technology, and electrical technology with chemical technology. The combination of communication, information, and electrical technologies overlap with the chemical technology. At the center of the overlap is data processing.

Figure 10D:
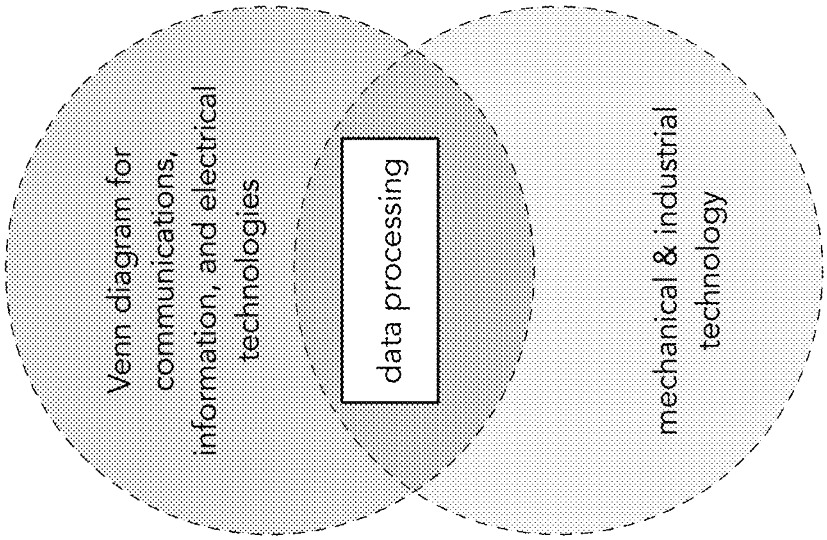
FIG. 10D is a Venn diagram of communication technology, information technology, and electrical technology with mechanical & industrial technology.

FIG. 10D is a Venn diagram of communication technology, information technology, and electrical technology with mechanical & industrial technology. The combination of communication, information, and electrical technologies overlap with the mechanical & industrial technology. At the center of the overlap is data processing.

Figure 10E:
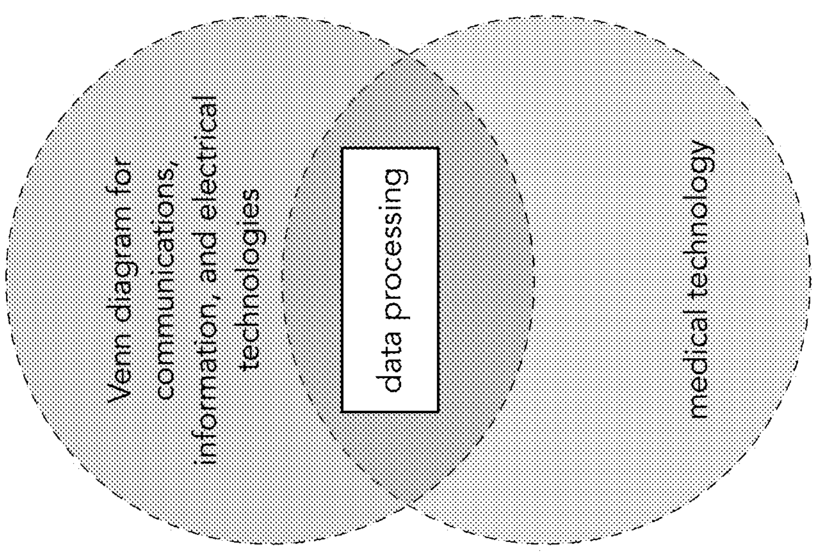
FIG. 10E is a Venn diagram of communication technology, information technology, and electrical technology with medical technology.

FIG. 10E is a Venn diagram of communication technology, information technology, and electrical technology with medical technology. The combination of communication, information, and electrical technologies overlap with the medical technology. At the center of the overlap is data processing.

Figure 10F:
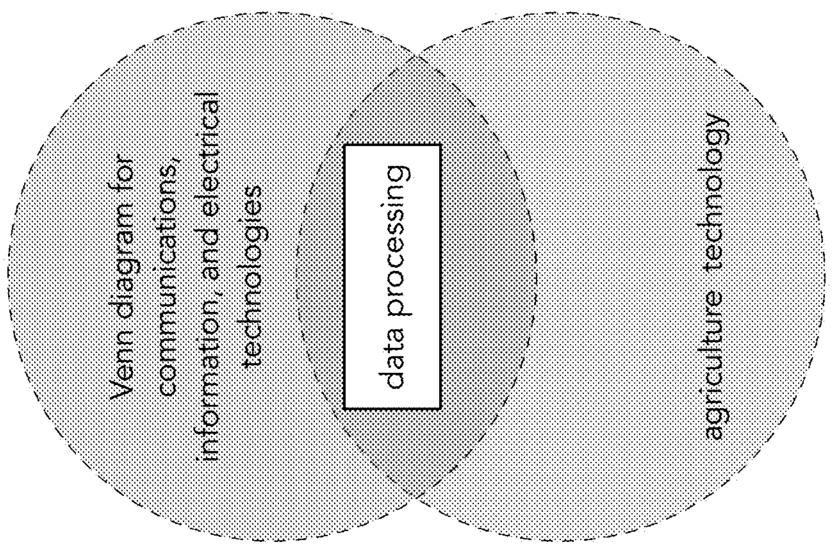
FIG. 10F is a Venn diagram of communication technology, information technology, and electrical technology with agriculture technology.

FIG. 10F is a Venn diagram of communication technology, information technology, and electrical technology with agriculture technology. The combination of communication, information, and electrical technologies overlap with the agriculture technology. At the center of the overlap is data processing.

Figure 10G:
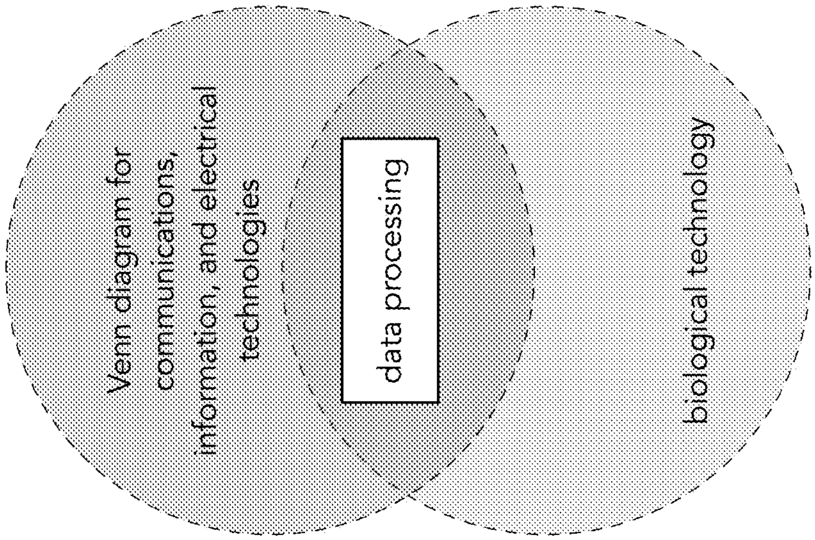
FIG. 10G is a Venn diagram of communication technology, information technology, and electrical technology with biological technology.

FIG. 10G is a Venn diagram of communication technology, information technology, and electrical technology with biological technology. The combination of communication, information, and electrical technologies overlap with the biological technology. At the center of the overlap is data processing.

Figure 10H:
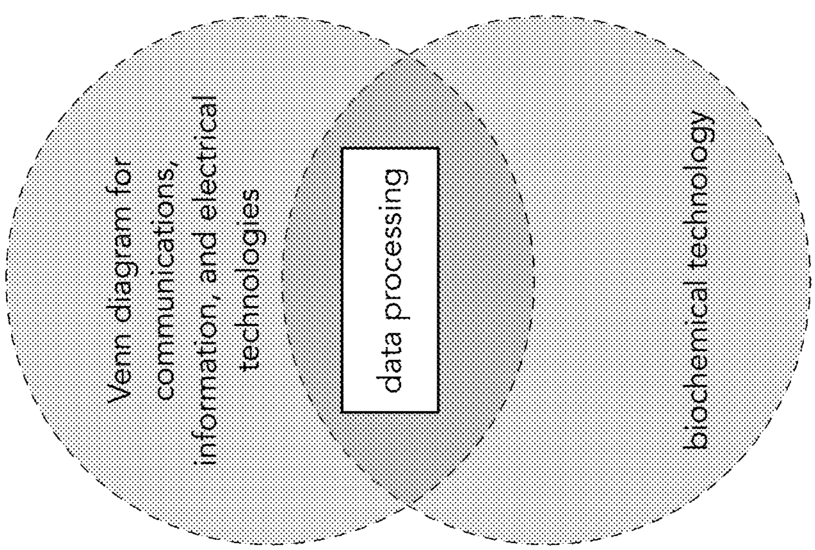
FIG. 10H is a Venn diagram of communication technology, information technology, and electrical technology with biochemical technology.

FIG. 10H is a Venn diagram of communication technology, information technology, and electrical technology with biochemical technology. The combination of communication, information, and electrical technologies overlap with the biochemical technology. At the center of the overlap is data processing.

Figure 10I:
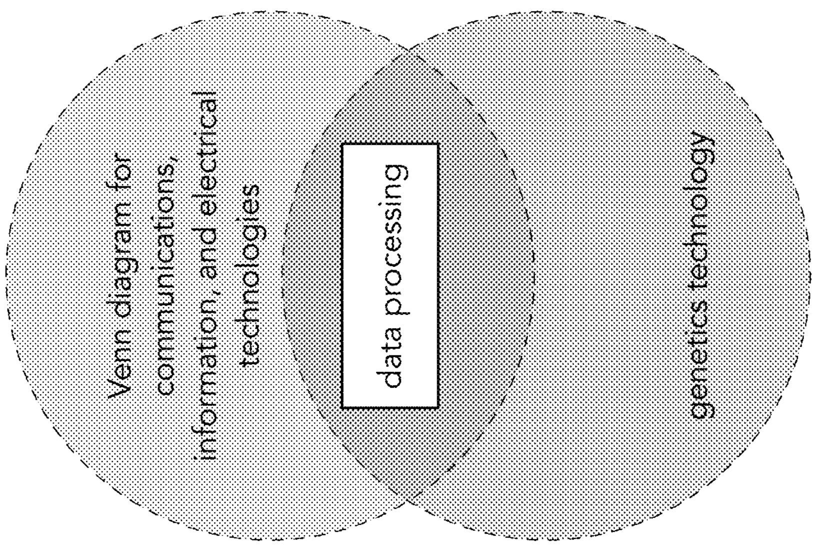
FIG. 10I is a Venn diagram of communication technology, information technology, and electrical technology with genetics technology.

FIG. 10I is a Venn diagram of communication technology, information technology, and electrical technology with genetics technology. The combination of communication, information, and electrical technologies overlap with the genetics technology. At the center of the overlap is data processing.

Figure 10J:
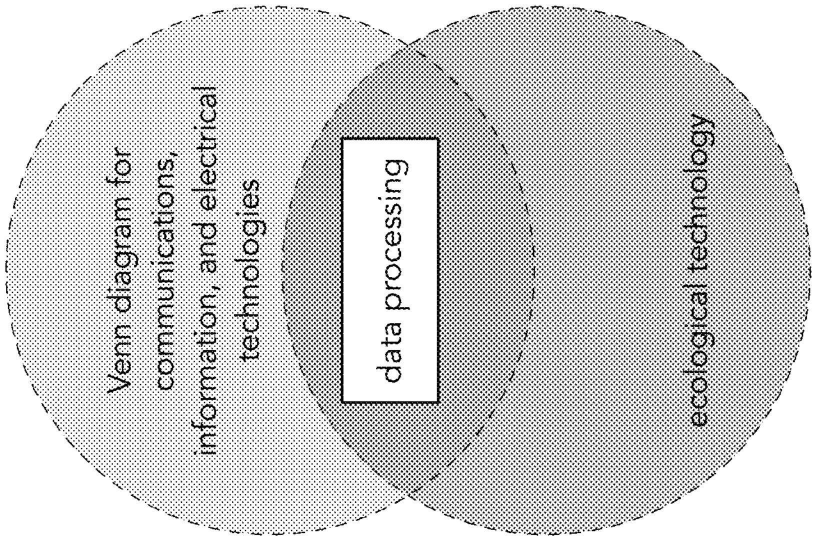
FIG. 10J is a Venn diagram of communication technology, information technology, and electrical technology with ecological technology.

FIG. 10J is a Venn diagram of communication technology, information technology, and electrical technology with ecological technology. The combination of communication, information, and electrical technologies overlap with the ecological technology. At the center of the overlap is data processing.

Figure 11A:
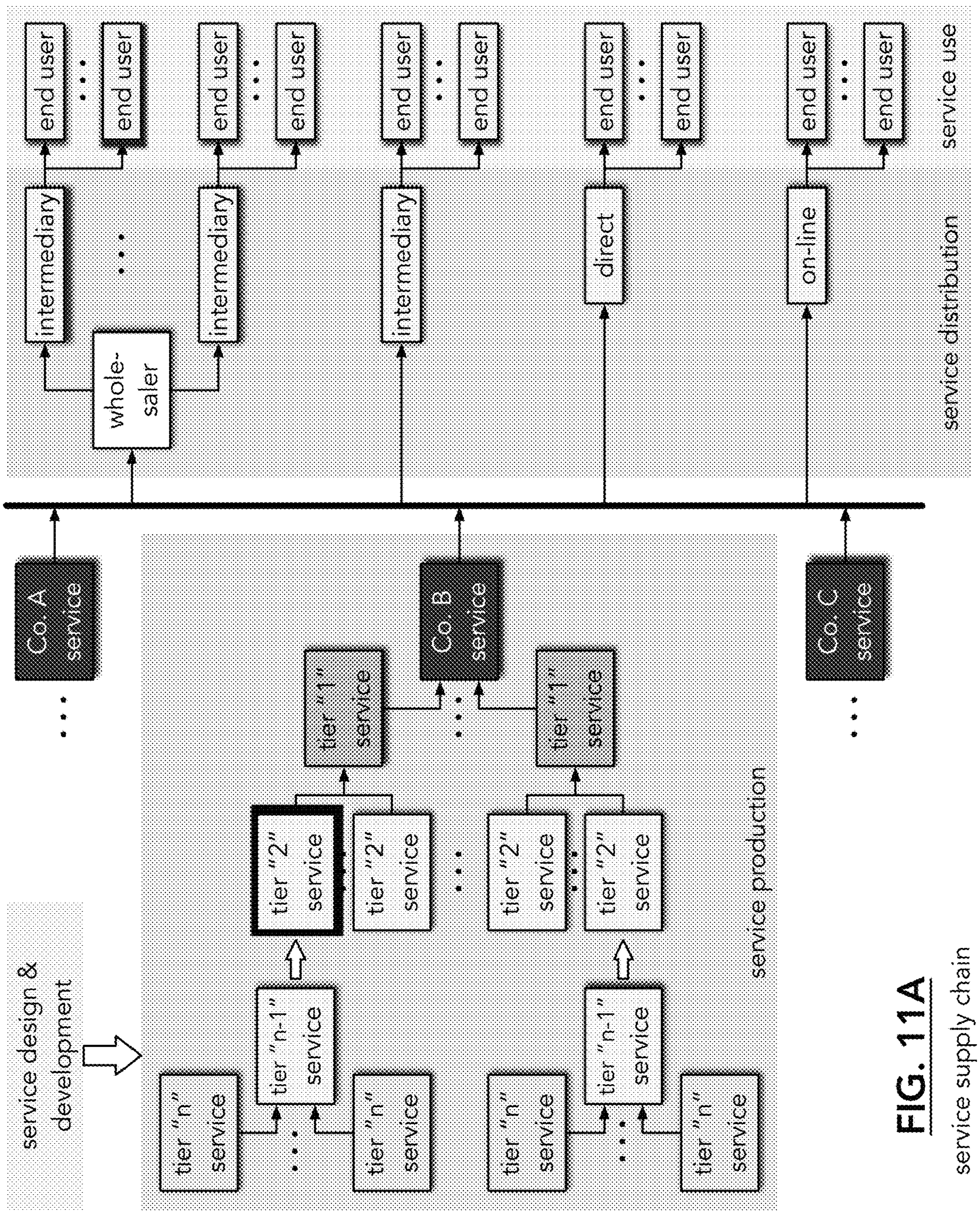
FIG. 11A is a schematic block diagram of an example of a service supply chain.

FIG. 11A is a schematic block diagram of an example of a service supply chain that includes three main sections of service production, service distribution, and service use. As used herein, a "service" shall mean the use of a commercial and/or proprietary product(s) for the benefit of an end user and/or other entity in a service supply chain. The service can be performed by the service provider for the targeted user (e.g., the end user or an entity in the supply chain) or the service is a self-service. As is also used herein, a "product" is physical or virtual thing that is bought, sold, leased, consumed, etc. by an end user and/or any entity in a product supply chain.

An end-user is a person or business entity that can access a service directly from the company offering the service or access through the service an intermediary (e.g., a service retailer or service aggregator). The intermediary obtains the right to offer the service to end users directly from the company providing the service or through a service wholesaler.

A service (e.g., software as a service, storage as a service, streaming content service, etc.) includes one or more tiers of services. The tiers of service include tier services provided by others and products that enable the performance of a service tier. For example, a streaming content service a communication service that delivers streaming content to an end user, a data storage services that stores the content, and a digital rights management service for authorized distribution of the content. Each service and each service of a tier is represented by its own market-tech unit (MTU).

Figure 11B:
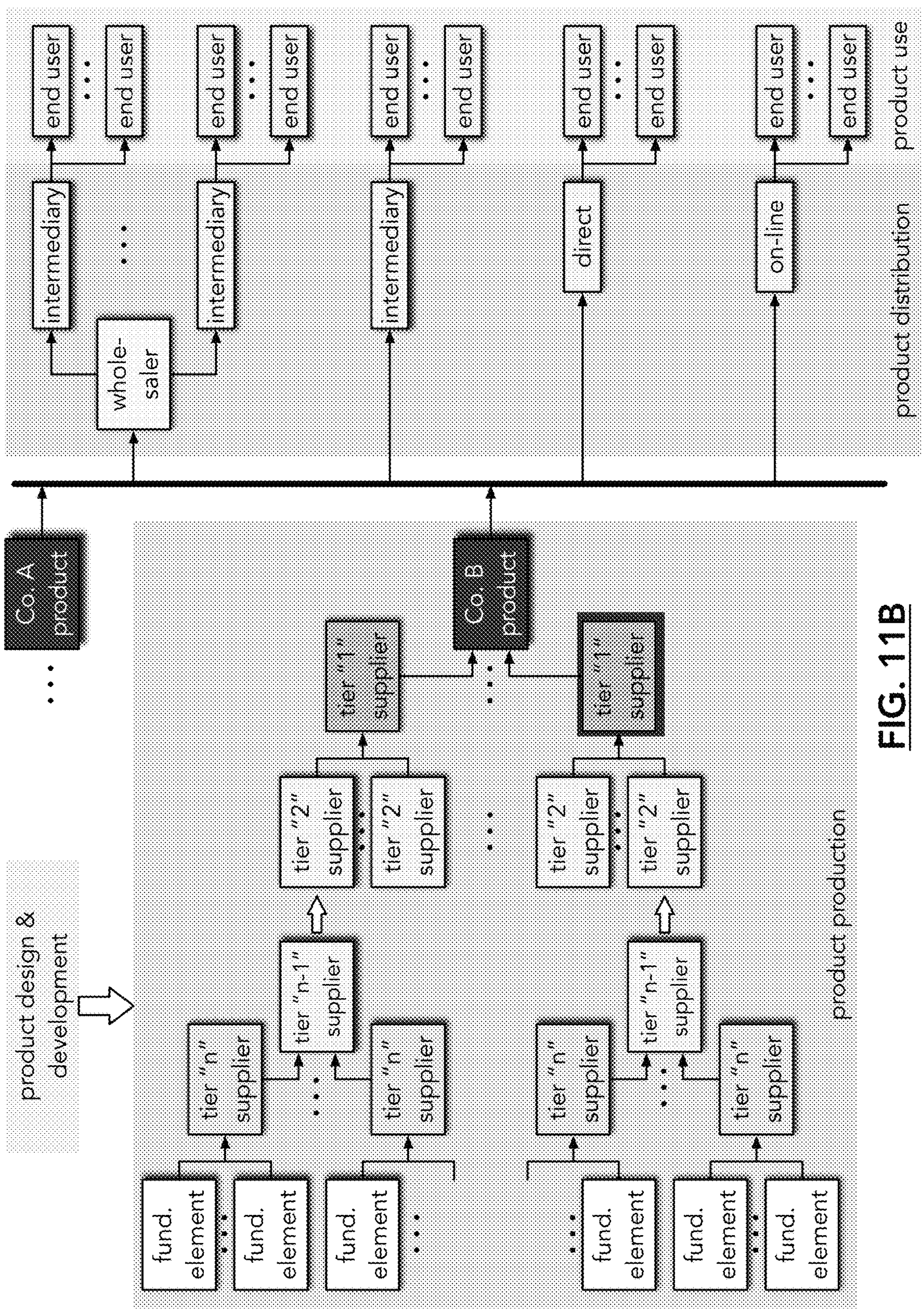
FIG. 11B is a schematic block diagram of an example of a product supply chain.

FIG. 11B is a schematic block diagram of an example of a product supply chain that includes three main sections of product production, product distribution, and product use. An end-user is a person or business entity that obtains (e.g., purchases, leases, rents, etc.) a product directly from the company offering the product or access through a product intermediary (e.g., a retailer, a broker, a leasing agent, a rental entity, etc.). The product intermediary obtains the right to offer the product to end users directly from the company selling the product or through a wholesaler and/or distributor.

A product includes one or more tiers of products. Each product of each tier is represented by its own market-tech unit (MTU). Some products are identified as fundamental elements of other products. For communications, electrical, and information technologies, fundamental products include hardware components, hardware circuits, and hardware circuit blocks. An example of fundamental MTUs is discussed with reference to FIG. 40.

Figure 12A:
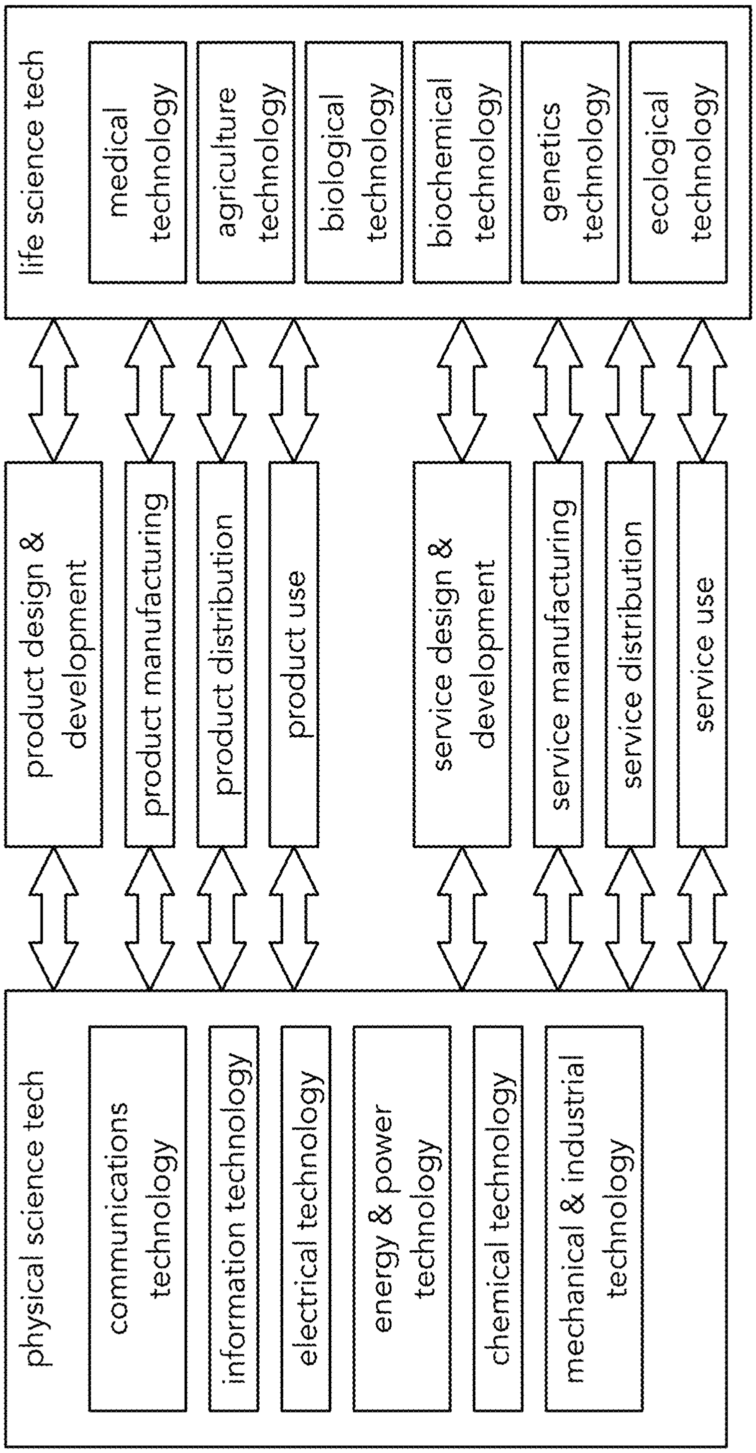
FIG. 12A is a schematic block diagram of an example of a high-level technology relational map.

FIG. 12A is a schematic block diagram of an example of a high-level technology relational map. As mentioned, market-tech units (MTUs) represent pieces of technology, which range from a fundamental element MTU that is linked all the way up to a high-level MTU (e.g., a high-level technology category). In this diagram, a root tier MTU for physical sciences includes tier 1 MTUs for communications technology, information technology, electrical technology, energy & power technology, chemical technology, and mechanical & industrial technology. As is also shown, a root tier MTU for life sciences includes tier 1 MTUs for medical technology, agriculture technology, biological technology, biochemical technology, genetics technology, and ecological technology.

Other root tier MTUs include product design & development, product manufacturing, product distribution, product use, service design & development, service manufacturing, service distribution, and service use. These root MTUs are linked to other root MTUs to provide a high-level technology map based on MTUs. The technology map is routinely changing to correspond to changes in technology. New technologies emerge, old technologies fade away, and existing technologies evolve, expand, and transform.

Figure 12B:
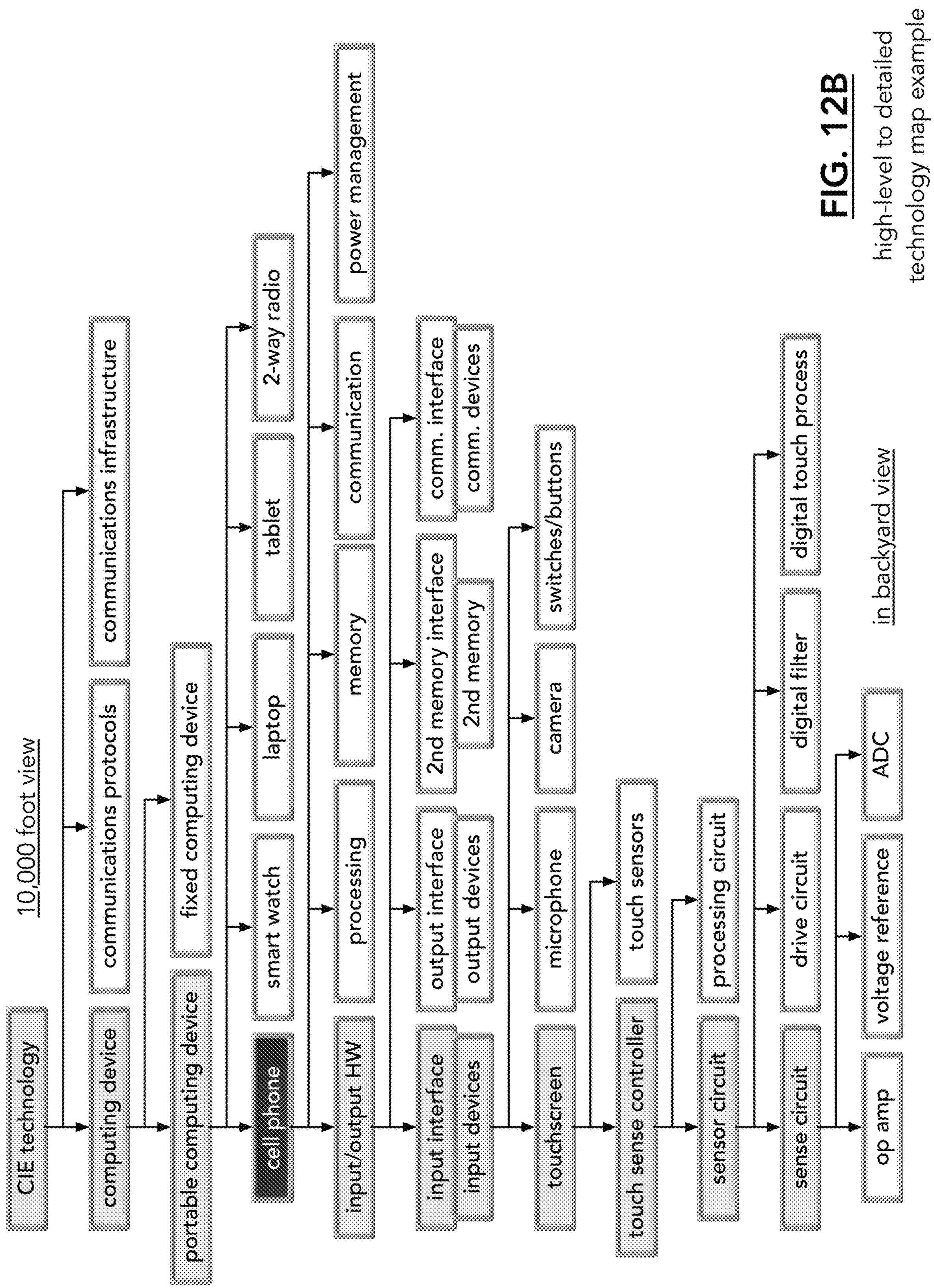
FIG. 12B is a schematic block diagram of an example of a technology relational map.

FIG. 12B is a schematic block diagram of an example of a technology relational map for a cell phone based on tiers of inclusion MTUs and tiers of composition MTUs. As used herein, inclusion is regarding one or more higher tiers and composition is regarding one or more lower tiers. In this example, the initially selected MTU is that of a cell phone. The cell phone is part of the higher tier MTU of the portable computing device; the portable computing device is part of the higher tier MTU of computing devices, which is part of the higher tier MTU of communications, information, and electrical (CIE) technologies.

Parallel MTUs of a cell phone include the MTUs of smart watches, laptops, tablets, and two-way radios. The quantifying of technologies MTUs will be described in detail with reference to subsequent figures.

The cell phone MTU is composed of lower tier MTUs of input/output hardware, processing, memory, communication, and power management. The input/output hardware MTU is composed of lower tier MTUs of input interface & input devices, output interface & output devices, $2^{nd}$ memory interface & second memory devices, and communication interface & communication devices. The input interface & input devices MTU is composed of the lower tier MTUs of touchscreen, microphone, camera, and switches/buttons. The touchscreen MTU is composed of the lower tier MTUs of touch screen controller and touch sensors. The touch screen controller MTU is composed of lower tier MTUs of sensor circuit and processing circuit. The sensor circuit MTU is composed of the lower tier MTUs of sense circuit, drive circuit, digital filter, and digital touch processing. The sense circuit MTU is composed of the lower tier MTUs of op amp, voltage reference, and analog to digital converter (ADC).

The cataloging and linking of MTUs creates a technology map that can be zoomed out to a "10,000 foot view" of communications, information, and electrical technologies and that can be zoomed in to a "backyard view" of the components of a sense circuit.

Figure 13A:
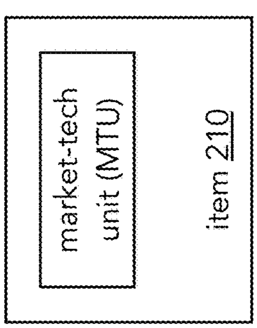
FIGS. 13A through 13E are schematic block diagram of embodiments of items that include one or more market-tech units (MTUs)

FIGS. 13A through 13E are schematic block diagram of embodiments of items that include one or more market-tech units (MTUs). FIG. 13A is a schematic block diagram of an item that includes one market-tech unit (MUT). An item is a physical and/or virtual product and/or service that is exchanged from one entity to another in a supply chain of FIG. 11A or of FIG. 11B and/or a distinguishable portion of such a physical and/or virtual product and/or service. In an example, an item is a resistor. In another example, an item is an airplane.

Figure 13B:
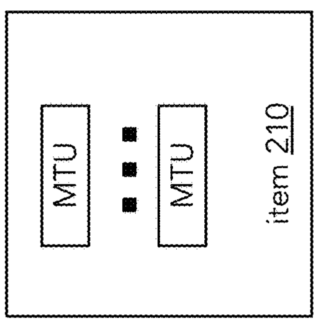

FIG. 13B is a schematic block diagram of an item that includes two or more market-tech units (MUTs).

Figure 13C:
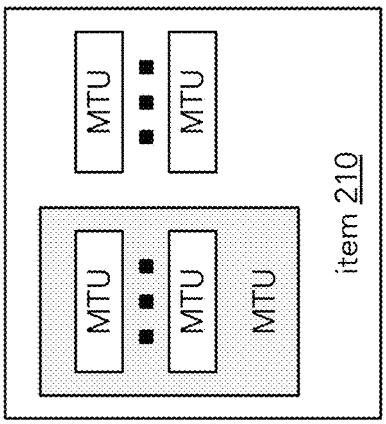

FIG. 13C is a schematic block diagram of an item that includes two tiers of MTUs, with one tier including lower tier MTUs.

Figure 13D:
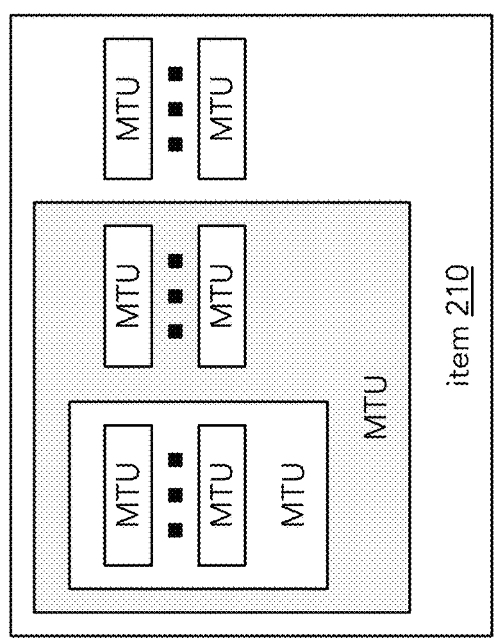

FIG. 13D is a schematic block diagram of an item that includes three tiers of MTUs, with each tier including lower tier MTUs.

Figure 13E:
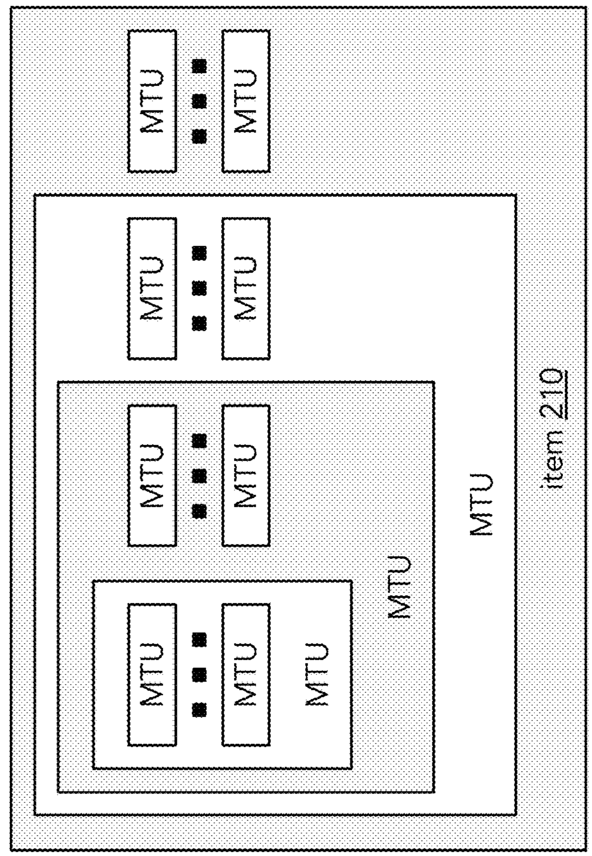

FIG. 13E is a schematic block diagram of an item that includes a plurality of tiers of MTUs, with each tier including lower tier MTUs.

Figure 14A:
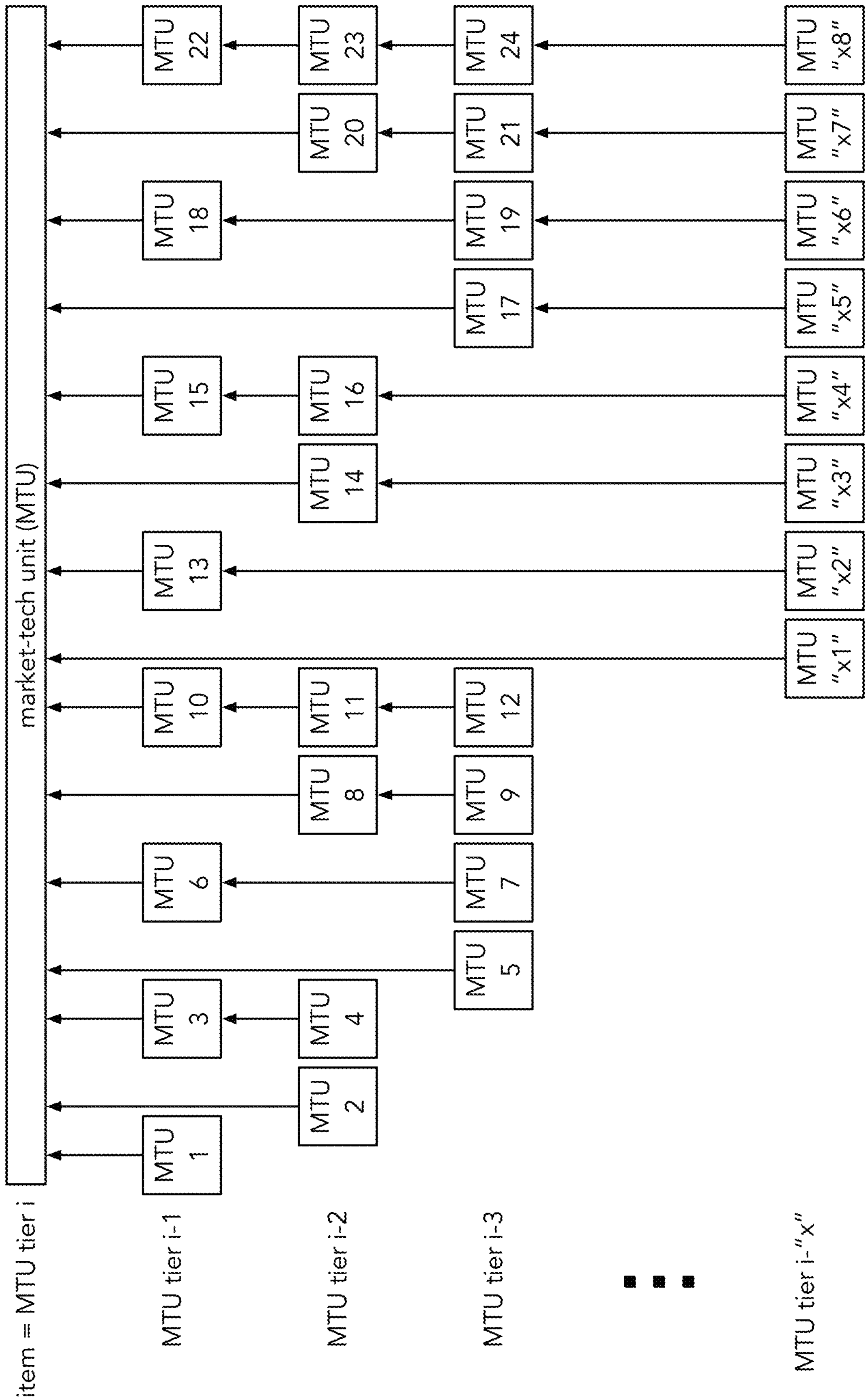
FIG. 14A is a schematic block diagram of an example of a market-tech unit (MTU) relationship map.

FIG. 14A is a schematic block diagram of an example of a market-tech unit (MTU) composition map. In this example, an item has an MTU at tier I, and is composed a plurality of other MTUs from tiers i-1, i-2, i-3, and so on to i-"x", where x is 4 or more. Some of the lower tier MTUs are also composed of other MTUs. In total, this item is composed of a total of 32 other MTUs; MTUs 1, 3, 6, 10, 13, 15, 18, and 22 from tier i-2; MTUs 2, 8, 14, and 20 from tier i-2; MTUs 5 and 17 from tier i-3; and MTU x1 from tier i-x.

MTU 3 of tier i-1 is at least partially composed of MTU 4 from tier i-2; MTU 6 of tier i-1 is at least partially composed of MTU 7 from tier i-3; MTU 8 of tier i-2 is at least partially composed of MTU 9 of tier i-3; MTU 10 of tier i-1 is at least partially composed of MTU 11 of tier i-2, which is at least partially composed of MTU 12 of tier i-3; MTU 13 of tier i-1 is at least partially composed of MUT x2 of tier i-x; MTU 14 of tier i-2 is at least partially composed of MTU x3 of tier i-x; MTU 15 of tier i-1 is at least partially composed of MTU 16 of tier i-2, which is at least partially composed of MTU x4 of tier i-x; MTU 17 of tier i-3 is at least partially composed of MTU x5 of tier i-x; MTU 18 of tier i-1 is at least partially composed of MTU 19 of tier i-3, which is at least partially composed of MTU x6 of tier i-x; MTU 20 of tier i-2 is at least partially composed of MTU 21 of tier i-3, which is at least partially composed of MTU x7 of tier i-x; and MTU 22 of tier i-1 is at least partially composed of MTU 23 of tier i-2, which is at least partially composed of MTU 24 of tier i-3, which is at least partially composed of MTU x8 of tier i-x.

The composition map is expressed graphically as a functional composition diagram and/or as a hierarchy composition diagram in the MTU record for the item. From a diagram, each MTU is selectable to view its MTU record, which will be described in greater detail with reference to subsequent figures.

Figure 14B:
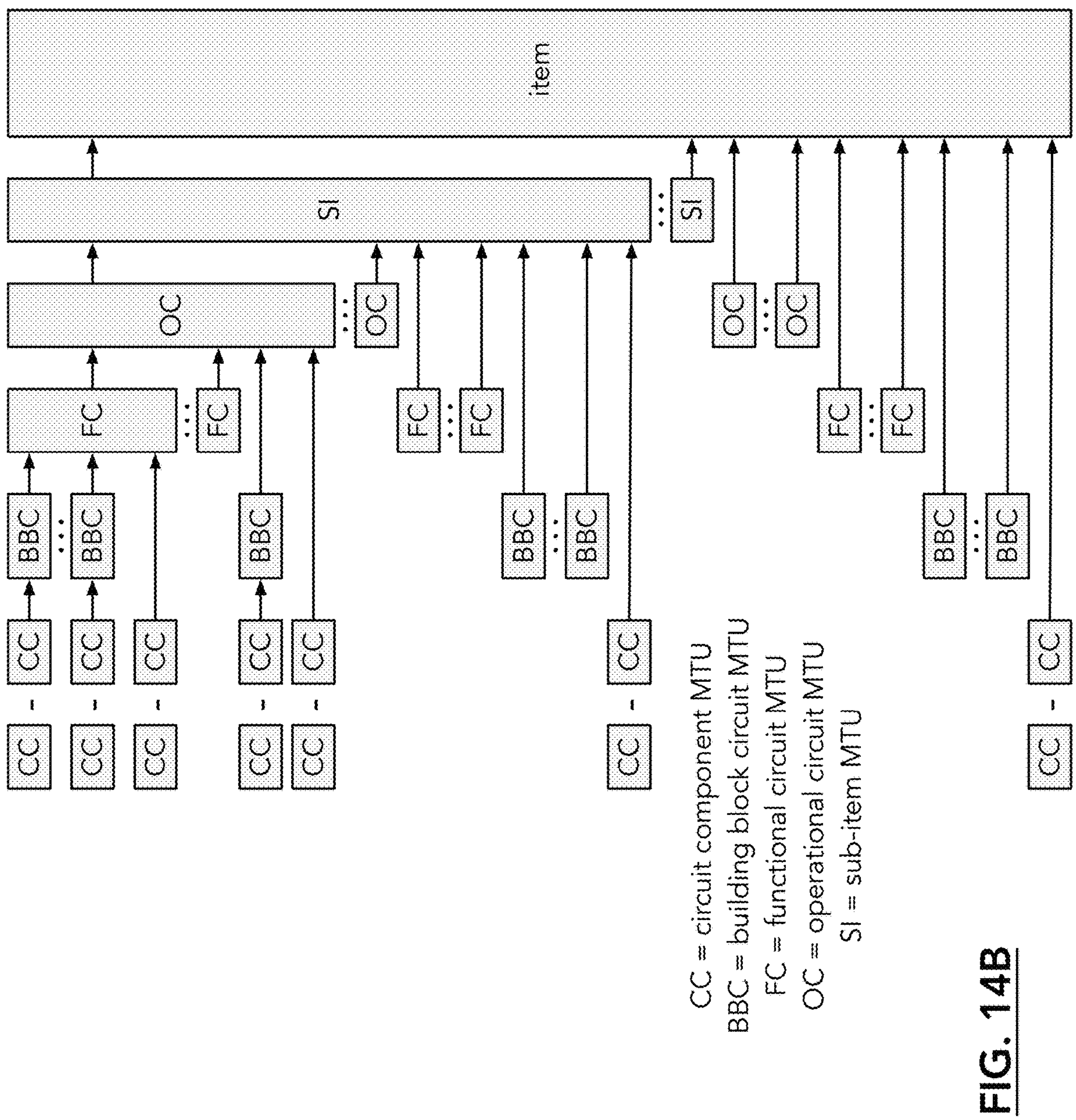
FIG. 14B is a schematic block diagram of another example of a market-tech unit (MTU) relationship map.

FIG. 14B is a schematic block diagram of another example of a market-tech unit (MTU) composition hierarchy diagram for an electrical item. The item is composed of sub-item (SI) MTUs, operational circuit (OC) MTUs, functional circuit (FC) MTUs, building block circuit (BBC) MTUs, and circuit component (CC) MTUs. A higher tier MTU may include one or more MTUs of one or more lower tiers.

FIG. 15A is a schematic block diagram of an example of a market-tech unit (MTU) inclusion and composition relationships. With respect to an MTU of interest, inclusion is referring to higher tier MTU and composition is referring to lower tier MTUs. For example, the cell phone of FIG. 12B has a composition relationship with the input/output HW, the processing HW, the memory, the communication HW, and power management. As another example, the cell phone of FIG. 12B has an inclusion relationship with portable computing devices, which has an inclusion relationship with computing devices, which has an inclusion relationship with CIE technology.

FIG. 15B is a schematic block diagram of another example of a market-tech unit (MTU) inclusion relationship for the electrical item of FIG. 14B. In this diagram, a circuit component (CC) MTU may be included in other circuit component (CC) MTUs; may be included in building block circuit (BBC) MTUs; may be included in functional circuit (FC) MTUs; may be included in operational circuit (OC) MTUs; may be included in sub-item (SI) MTUs; and may be included in item MTUs.

A building block circuit (BBC) MTU may be included in other building block circuit (BBC) MTUs; may be included in functional circuit (FC) MTUs; may be included in operational circuit (OC) MTUs; may be included in sub-item (SI) MTUs; and may be included in item MTUs.

A functional circuit (FC) MTU may be included in other functional circuit (FC) MTUs; may be included in operational circuit (OC) MTUs; may be included in sub-item (SI) MTUs; and may be included in item MTUs.

An operational circuit (OC) MTU may be included in other operational circuit (OC) MTUs; may be included in sub-item (SI) MTUs; and may be included in item MTUs.

A sub-item (SI) MTUs may be included in other sub-item (SI) MTUs; and may be included in item MTUs. An item MTU may be included in other item MTUs.

FIG. 15C is a schematic block diagram of another example of a market-tech unit (MTU) composition relationships. In this diagram, an item may be composed of one or more circuit component (CC) MTUs, one or more building block circuit (BBC) MTUs, one or more functional circuit (FC) MTUs, one or more operational circuit (OC) MTUs, one or more sub-item (SI) MTUs; and/or one or more other item MTUs.

A sub-item MTU may be composed of one or more circuit component (CC) MTUs, one or more building block circuit (BBC) MTUs, one or more functional circuit (FC) MTUs, one or more operational circuit (OC) MTUs, and/or one or more other sub-item (SI) MTUs.

An operational circuit (OC) MTU may be composed of one or more circuit component (CC) MTUs, one or more building block circuit (BBC) MTUs, one or more functional circuit (FC) MTUs, and/or one or more other operational circuit (OC) MTUs.

A functional circuit (FC) MTU may be composed of one or more circuit component (CC) MTUs, one or more building block circuit (BBC) MTUs, and/or one or more other functional circuit (FC) MTUs.

A building block circuit (BBC) MTU may be composed of one or more circuit component (CC) MTUs, and/or one or more other building block circuit (BBC) MTUs. A circuit component (CC) MTU may be composed of one or more other circuit component (CC) MTUs. For CIE (communications, information, electrical) technologies, a circuit component includes fundamental hardware components, fundamental hardware circuits, and/or fundamental hardware circuit blocks; examples of which are discussed with reference to FIG. 40.

Figure 16A:
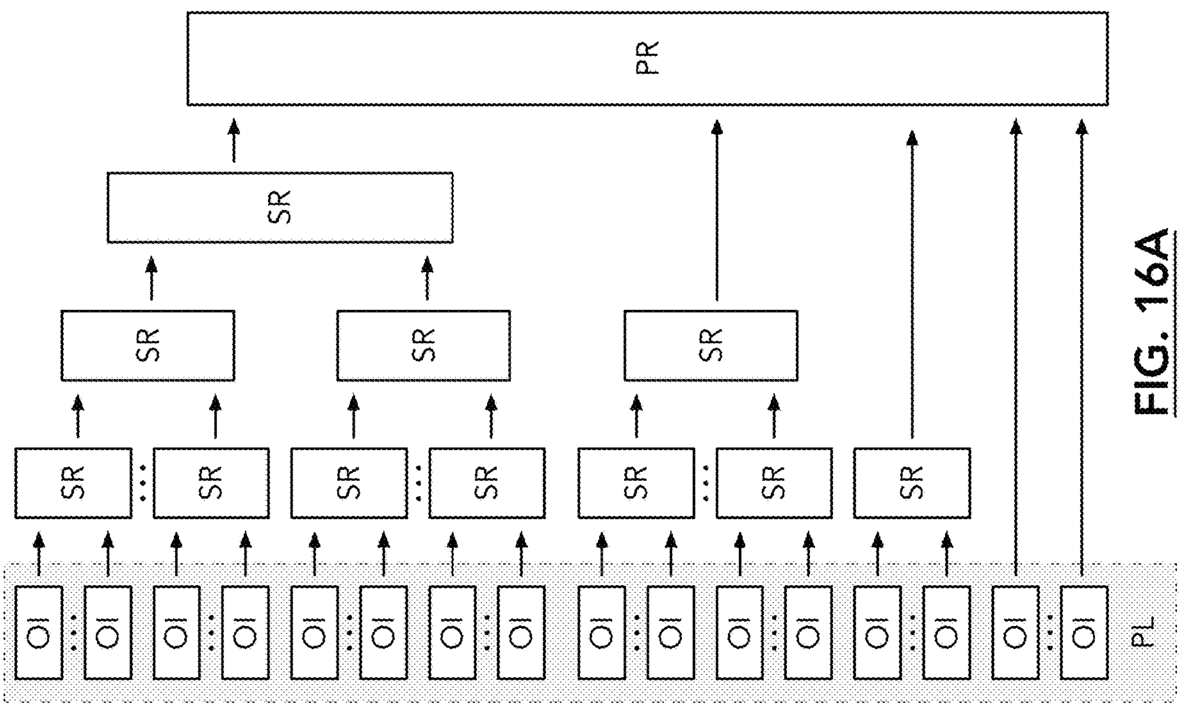
FIG. 16A is a schematic block diagram of an example of a software market-tech unit (MTU) relationships.

FIG. 16A is a schematic block diagram of an example of a software market-tech unit (MTU) composition relationship. In this diagram, a program (PR) MTU is composed of one or more sub-routine (SR) MTUs and one or more operational instructions (OI) MTUs of a programming language (PL) MTU. A sub-routine may include one more tiers of other sub-routines. Note that operational instructions MTUs are fundamental MTUs and are included in composition diagrams, but typically will not include inclusion diagrams. Further note that a program is a software algorithm that includes system applications, user applications, and operating system functions, and/or portions thereof.

Figure 16B:
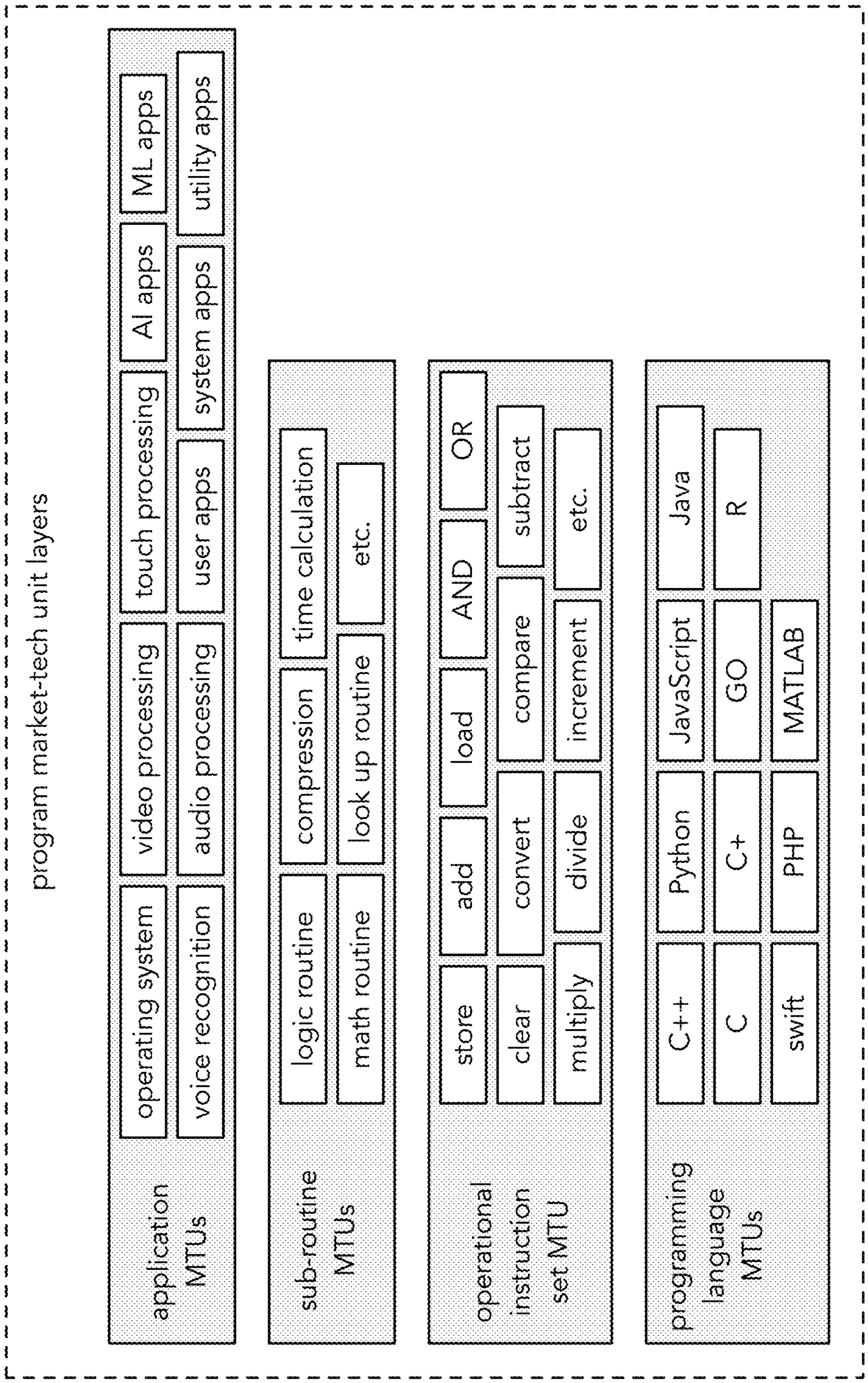
FIG. 16B is a schematic block diagram of another example of a software market-tech unit (MTU) relationships.

FIG. 16B is a schematic block diagram of another example of a software market-tech unit (MTU) composition relationship. In this example, the program or application MTU includes, but is not limited to, operating system, voice recognition, video processing, audio processing, touch sense processing, user applications, artificial intelligence (AI) applications, system applications, machine learning (ML) applications, and/or utility applications.

A sub-routine MTU tier includes a logic routine, a mathematical routine, data compression, a look-up routine, time calculation, etc. An operational instruction set MTU includes, but is not limited to, store, add, load, AND, OR, clear, convert, compare, subtract, multiply, divided, increment, etc. A programming language MTU includes C++, Python, JavaScript, Java, C, C+, GO, R, swift, PHP, MATLAB, etc.

Figure 17:
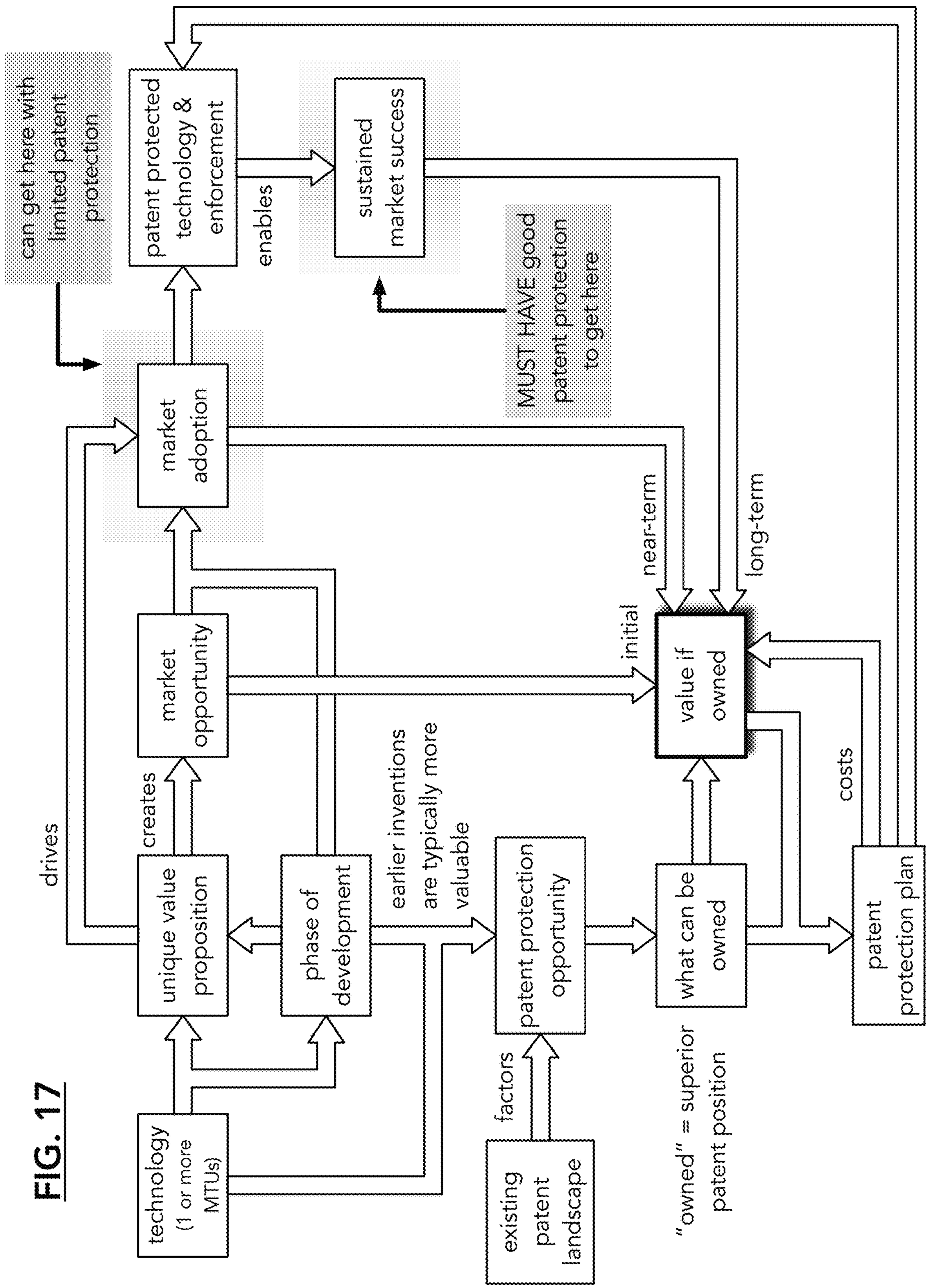
FIG. 17 is a flow diagram of an example of a technology development (one or more market-tech units [MTUs]), business development, patent protection of the technology, and business success.

FIG. 17 is a flow diagram of an example of technology development, business development, patent protection of the technology, and business success. When a business contemplates developing a new technology and/or when investment companies contemplate in companies developing a new technology, the unique value proposition(s) of the technology, its market opportunities, and market adoption are studied and evaluated in great detail.

How long will it take to develop the technology? How much money will it cost? What's the market opportunity for the technology (service obtainable market)? What's the estimated return on investment? The answers to these questions dictate whether a company will develop a technology and/or whether it will get funding to the develop the technology.

In accordance with a re-engineered patent process and the improved computer disclosed herein, patent protecting a technology now receives equal scrutiny. Based on the phases of development of the technology and existing patent landscape, the improved computer calculates a patent protection opportunity for the technology. The technology is quantified by one or more market-tech units (MTUs).

The improved computer then calculates what can be owned. In this instance, ownership means patent position for the technology with respect to others' patent position for the technology. A superior patent position places the patent holder in a most favorable position with respect to others in a patent dispute regarding the technology. As part of calculating the patent protection opportunity and what can be owned, the improved computer determines, based on the phase of development, how much patenting of the technology already exists, or should exist, and how much patenting of the technology is future forecasted.

If a good amount of patenting already exists and the present company owns little of the existing patents, the improved computer determines what patent position can be obtained for various levels of patenting. It may be impossible to obtain a superior patent position no matter the level of patenting going forward if there are too many existing patents.

From the patent protection opportunity and the "what can be owned" calculations, the improved computer determines the value of the technology based on the patent position that can be obtained. The value calculation factors in the market opportunity, market adoption (actual and/or forecasted), sustained market success (actual and/or forecasted), and the cost to patent protect the technology. If the calculations are favorable, the improved computer generates a patent protection plan.

With patent protection in place, a company is much more likely to obtain sustained market success than without patent protection. If products and/or services embodying the technology take market share from others and/or creates a new market opportunities, others will want to stop the loss of market share and some others will want to capitalize on the new market opportunities. A good patent position will help protect the newly acquired market share.

Unfortunately, too many companies and investors barely consider the patent protection opportunity; it is often treated as a check-mark analysis. The company has patents, check. While the check-mark approach to patenting technology can get to market adoption, it is highly unlikely sustained success can be reached; especially if the technology is the primary market differentiator. In this instance, too much of the technology was not patent protected and is thus free for others to use. When this occurs, the value of the technology is greatly diminished from what it should be if the technology were properly patent protected.

Figure 18:
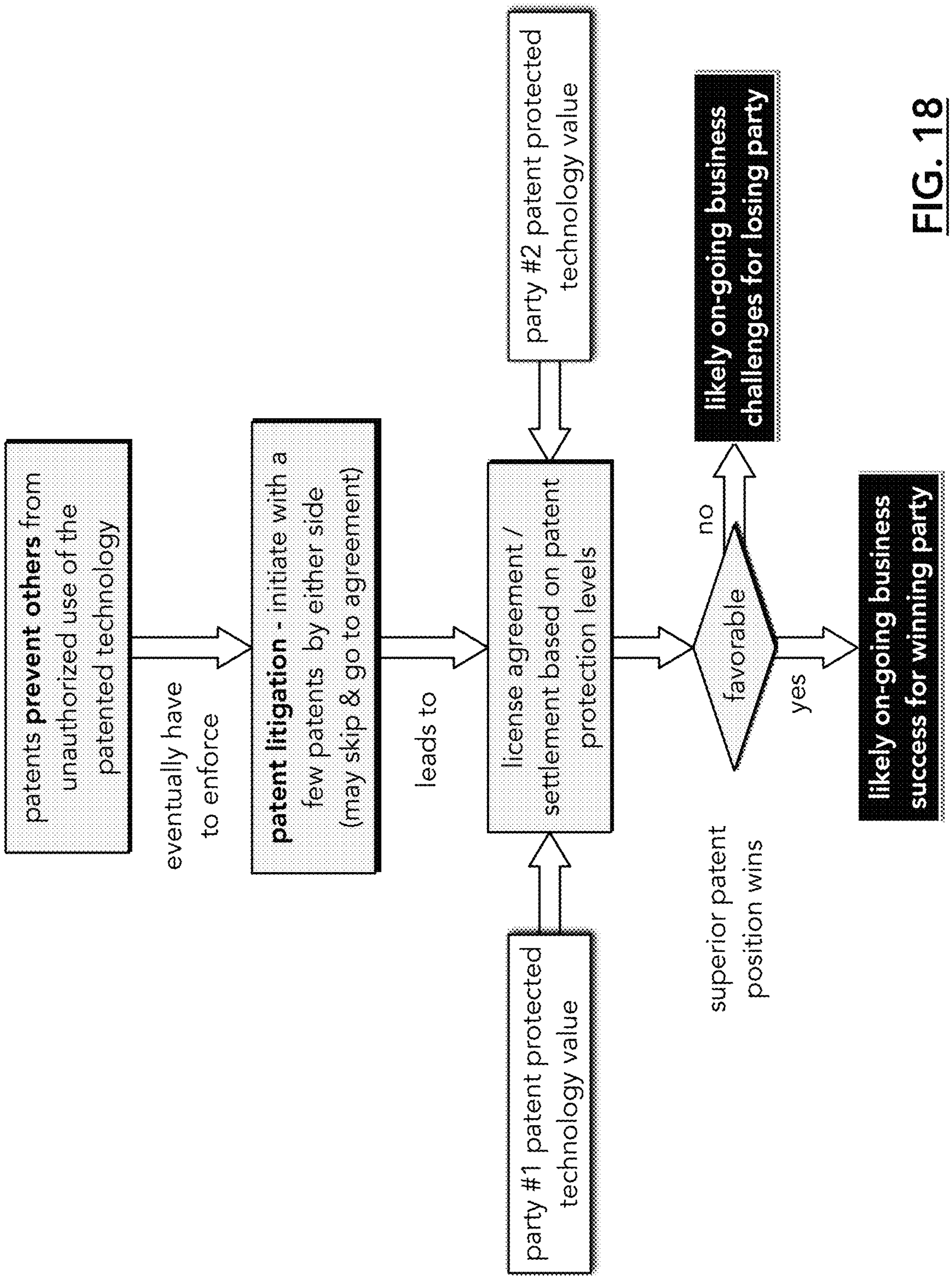
FIG. 18 is a logic diagram of an example of value of patent protected technology (one or more market-tech units [MTUs])

FIG. 18 is a logic diagram of an example of value of patent protected technology (one or more market-tech units [MTUs]). This diagram builds on the discussion of FIG. 17 and further emphasizes the value of a superior patent position. The first box states that patents prevent others from unauthorized use of patented technology. In addition, if nobody wants to use a patented technology, then the technology and patents protecting it have little to no value.

If another entity or person is uses the patented technology without authorization, the patent holder will have to assert its patents against the infringing entity if the patent holders wants the unauthorized use to be stopped and/or to be compensated for the unauthorized use. One way to assert patents is through patent litigation in which one to several patents are asserted.

For a patent holder that built its patent portfolio using the improved computer for technology, the patent holder has numerous patents to assert of which, a few are selected for a variety of litigation reasons (e.g., notice, priority dates, claim coverage, clean file wrapper histories, etc.). For small companies that didn't use the improved computer for technology only owns a few patents, which they assert. For large companies that didn't use the improved computer for technology, they shifted through their patents to identify assertable patents.

Since over 95% of patent litigation cases settle before trial, eventually the patent holder and the infringing entity will enter into a licensing negotiation. Note that of the 5% of patent cases that do go to trial, most of them end in settlement unless that patents are found to be invalid or not infringed.

In licensing negotiations between two practicing entities, their respective patent portfolios come into play. While a few patents can be used to begin a patent assertion process, it is the patent portfolios that dictate the outcome of licensing negotiations. Basically, the entity having the superior patent position with respect to the other wins; it will receive money from the other entity. A superior patent position is a first practicing entity having more impact through patent protected technology on the other practicing entity than their patent protected technology impacts has on the first entity.

The more favorable the licensing negotiations (i.e., the more favorable the patent position) the more likely the practicing entity will have on-going business success. Conversely, the less favorable the licensing negotiations, the more likely the practicing entity will have on-going business issues and challenges.

Figure 19:
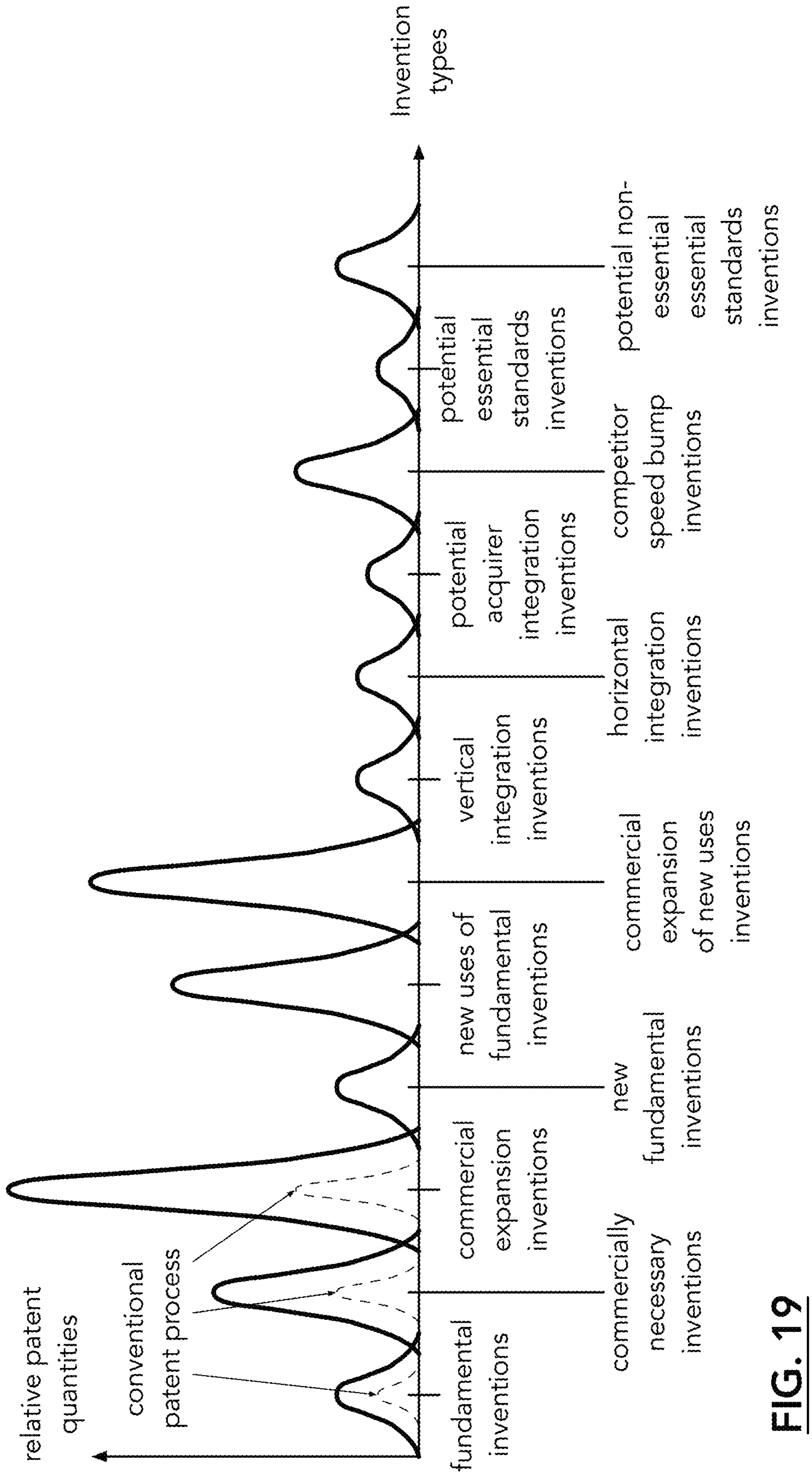
FIG. 19 is a diagram of an example of a full spectrum of invention types for patenting to patent protect a technology (one or more market-tech units[MTUs])

FIG. 19 is a diagram of an example of a full spectrum of invention types for patenting to patent protect a technology (one or more market-tech units [MTUs]). As part of the re-engineered patent process and, as part of the functionality of the improved computer for technology, a full spectrum of invention types are analyzed for inclusion in an architectural plan for patent protecting an MTU (e.g., a quantified technology).

The invention types include fundamental inventions, commercially necessary inventions, and commercial expansion inventions as were discussed with reference to the conventional patent process. In contrast, the relative quantities of each will be significantly higher for the re-engineered patent process than for the conventional patent process. This occurs because the re-engineered patent process overcomes the engineer driven invention disclosure step, the too "me" focused inventions, the too "now" focused inventions, the too "many good inventions not being patented" issue, the annually budget focus, the individual invention focus, and the patent application preparation and prosecution variance of the conventional patent process. The improved computer further factors in design-around inventions.

In addition, the improved computer for technology, in accordance with the re-engineered patent process, evaluates other invention types to determine the value they add to patent protecting the technology. The other invention types include new fundamental inventions, new uses of fundamental inventions, commercial expansion of new use inventions, vertical integration inventions, horizontal integration inventions, potential acquirer integration inventions, competitor speed bump inventions, potential standard essential inventions, and potential standard non-essential but commercially essential inventions.

The new fundamental inventions include inventions that expand the scope of the fundamental concepts beyond me and now (what is currently being developed for inclusion in a product and/or service). The improved computer uses one or more ML (machine learning) and/or AI (artificial intelligence) programs to calculate and report on new fundamental inventions. The one or more programs will be discussed with reference to subsequent figures.

The new uses of fundamental inventions include new ways to use the original fundamental inventions and the new fundamental inventions. The improved computer uses one or more ML and/or AI programs to calculate and report on new uses of fundamental inventions. The one or more programs will be discussed with reference to subsequent figures.

The commercial expansion of new use inventions include inventions that expand on the original commercially necessary inventions, the original commercial expansion inventions, and on uses of the new fundamental inventions. The improved computer uses one or more ML and/or AI programs to calculate and report on commercial expansion of new use inventions. The one or more programs will be discussed with reference to subsequent figures.

The vertical integration inventions include inventions that would integrate the present MTU into one or more MTUs of a higher tier and/or that would integrate a lower tier MTU into the present MTU. The improved computer uses one or more ML and/or AI programs to calculate and report on vertical integration inventions. The one or more programs will be discussed with reference to subsequent figures.

The horizontal integration inventions include inventions that would integrate the present MTU into one or more MTUs of the same tier and/or that would integrate a same tier MTU into the present MTU. The improved computer uses one or more ML and/or AI programs to calculate and report on horizontal integration inventions. The one or more programs will be discussed with reference to subsequent figures.

The potential acquirer integration inventions include inventions would integrate the present MTU into one or more MTUs of the potential acquirer. The improved computer uses one or more ML and/or AI programs to calculate and report on potential acquirer integration inventions. The one or more programs will be discussed with reference to subsequent figures.

The competitor speed bump inventions include inventions that target a future technology path of a competitor regardless of whether the future technology path is part of the company's present roadmap. These inventions are intended to provide leverage is subsequent negotiations with the targeted competitor(s). The improved computer uses one or more ML and/or AI programs to calculate and report on competitor speed bump inventions. The one or more programs will be discussed with reference to subsequent figures.

The potential standard essential inventions include inventions that would likely be adopted by a standard if such a standard were to be formed. Typically, essential patents for a standard have to be licensed at a reasonable and nondiscriminatory (RAND) royalty rate. The improved computer uses one or more ML and/or AI programs to calculate and report on potential standard essential inventions. The one or more programs will be discussed with reference to subsequent figures.

The potential standard non-essential but commercially essential inventions include inventions that would likely not be essential for a standard if such a standard were to be formed. These inventions, however, would most likely be needed to make a commercially viable standards compliant product and would not be subject RAND royalty rates. The improved computer uses one or more ML and/or AI programs to calculate and report on potential standard non-essential but commercially essential inventions. The one or more programs will be discussed with reference to subsequent figures.

Figure 20:
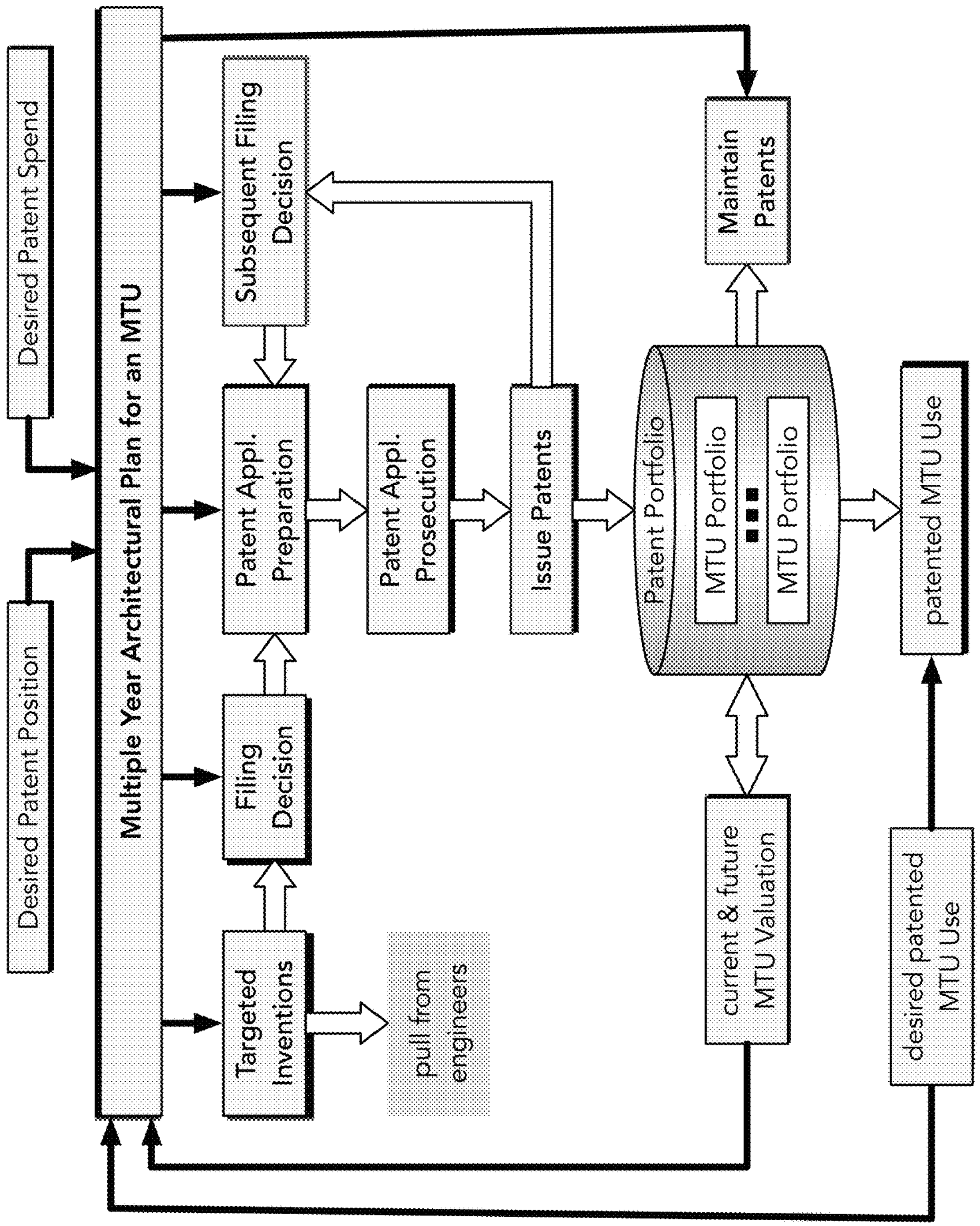
FIG. 20 is a schematic block diagram of an embodiment of a re-engineered patent process for effective and efficient patent protection, use, and/or value of a technology (one or more market-tech units [MTUs])

FIG. 20 is a schematic block diagram of an example of a re-engineered patent process 220. The improved computer leverages the re-engineered patent process to effectively and efficiently quantifying a technology in terms of one or more market-tech units (MTUs), to generate an architectural plan for patent protecting the technology, to generate use opportunities reports regarding the technology, to generate a report regarding the lifelong value of the technology, to track execution of the architectural patent, and to ensure quality execution of the architectural plan.

The improved computer for technology generates, using one or more ML and/or AI programs, a multiple year architectural plan for an MTU based on a balancing of a desired patent position and a desired patent spend and based on x desired The multiple year architectural plan drives uses of the patent protected MTU. For multiple MTUs of interest, the improved computer generates a unique architectural plan for each MTU. In an embodiment, the improved computer further balances the desired patent spend and desired patent position among the multiple MTUs.

The desired patent position is with respect to others regarding a patent dispute involving the technology and can range from weak to superior. A superior patent position is one in which the patent holder has a superior patent position with respect to all others involved with the technology. A weak paten position is one in which the patent holder has an inferior patent position with respect to most, if not all, others involved with the technology.

The desired patent spend is based on a desired ROI over the life the MTU. The ROI is the anticipated value of the MTU divided by the patent spend. The improved computer generates, using one or more ML and/or AI programs, a year-by-year valuation report for the MTU over the life of the MTU. The life of an MTU includes one or more generations.

The desired future uses of the patent protected MTU include market leverage, asset value, assertion, sale, and/or standards. Essentially, the improved computer generates a report regrading of how the patent protected MTU can be used in the future based on the level of patent protection. For many companies, the most important use of a patent protected MTU is maximizing the company's valuation by maximizing the value of the MTUs "owned" via patent protection by the company.

The multiple year architectural plan drives the remainder of the patent process. It identifies, on a year-by-year basis, quantities of inventions to patent protect for each of the technical challenges of the MTU, the invention type breakdown for each technical challenge, where to seek patent protection, and the manner of patent protection (e.g., provisional patent application, non-provisional patent application, PCT application, a bundled patent application, and/or a subsequent filing patent application). With the invention types, invention quantities, and invention to technical challenge affiliations established, an active invention disclosure process is employed to pull specific inventions from engineers and/or to stimulate further inventing.

The multiple year architectural plan drives the filing decisions regarding specific inventions. Since specific inventions are pulled from engineers and/or from inventing sessions, the disclosed inventions are in accordance with the multi-year plan and are targeted to protect certain innovations of the MTU (e.g., address technical challenges of a quantified technology). As such, the filing decision step shifts from an annual budget driven and individual invention focus decision of the conventional patent process to a portfolio fit decision at the technology level of the re-engineered patent process.

The multiple year architectural plan drives the patent application preparation step since it prescribes the manner of patent protection for categories of inventions (e.g., types and technical challenges). In addition, the improved computer includes one or more ML and/or AI programs regarding quality assurance of patent application preparation and prosecution.

The multiple year architectural plan drives subsequent filing decisions (e.g., the filing of a continuation application, a divisional patent application, a continuation-in-part patent application, or legal placeholder continuation patent application for an allowed patent application). It also drives maintenance decisions regarding issued patents. Since every patent filed was in accordance with the plan, there should be very few patents for which maintenance fees are not paid.

As the improved computer routinely ingest more data, it adjusts the architectural plan accordingly. For example, if the ingested data is indicated a shift in use of a technology, the improved computer adjusts the plan to ensure the desired patent position is obtained for the shift in use of the technology.

Figure 21A:
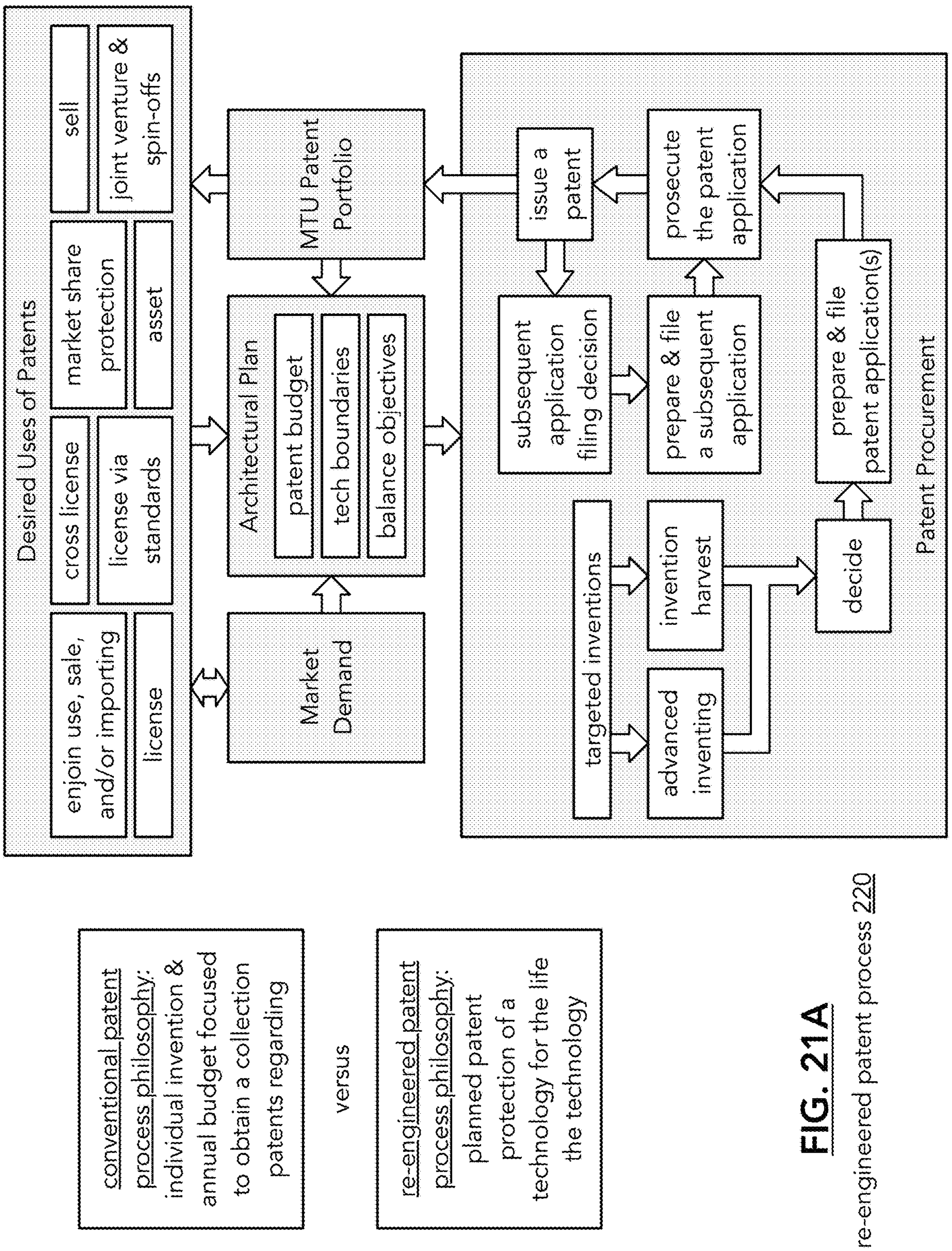
FIG. 21A is a schematic block diagram of another embodiment of a re-engineered patent process for effective and efficient patent protection, use, and/or value of a technology (one or more market-tech units [MTUs])

FIG. 21A is a schematic block diagram of another embodiment of a re-engineered patent process. In this example, the re-engineered patent processing includes the main steps of desired usage of patents, market demand, architectural plan, MTU patent portfolio, and patent procurement. The uses include injunctive relief (enjoin use, sale, offer for sale, etc.), licensing revenue source, cross licensing negotiation leverage, influencing standards, market share protection and leverage, as an asset valuation generator, selling patents, and/or establishing new business entities via a spin-off or joint venture.

Market demand, actual and forecasted, is a significant factor in generating the architectural plan. Based on the premise that a patent only has value if another wants to use the patented invention, market demand for patented technology is essential to put forth the effort to develop, productize, and protect a technology, which identified via one or more MTUs.

The inventions currently patent protected as recording the MTU patent portfolio helps shape the architectural plan or at least a year or two of the plan. For example, if one technical challenge is on track for the desired number of inventions to protect, a second technical challenge is ahead of pace for protecting the desired number of inventions, and a third technical challenge is behind pace for protecting the desired number of inventions protect, the improved computer adjusts, via an ML and/or AI program, the near term portion of the plan to increase the pace of patent protecting inventions regarding the third technical challenge, decreasing the pace of patent protecting inventions regarding the second technical challenge, and maintaining the pace of patent protecting inventions regarding the first technical challenge.

Continuing with the preceding example, the improved computer would raise, per the ML and/or AI program, the threshold for seeking patent protection for inventions regarding the third technical challenge. The improved computer would also lower, per the ML and/or AI program, the threshold for seeking patent protection for inventions regarding the second technical challenges. The improved computer would further generate, via the ML and/or AI program, a report to emphasize increasing invention harvesting sessions and/or inventing sessions regarding the second technical challenge.

The patent procurement section includes the elements of targeted inventions, advanced inventing, invention harvesting, decide, prepare & file patent applications, prosecuted patent applications, issues patents, subsequent application filing decision, and prepare and file subsequent patent applications. The targeting inventions are identified in the architectural plan by quantity, type, and technology challenges and can be pulled from engineers during invention harvesting sessions (e.g., query engineers in particular technology areas what they are working on, have worked on, or will be working on regarding a technical challenge) and/or advanced inventing session (e.g., identify one or more problems of a technical challenge and invent solutions to the problem).

Figure 21B:
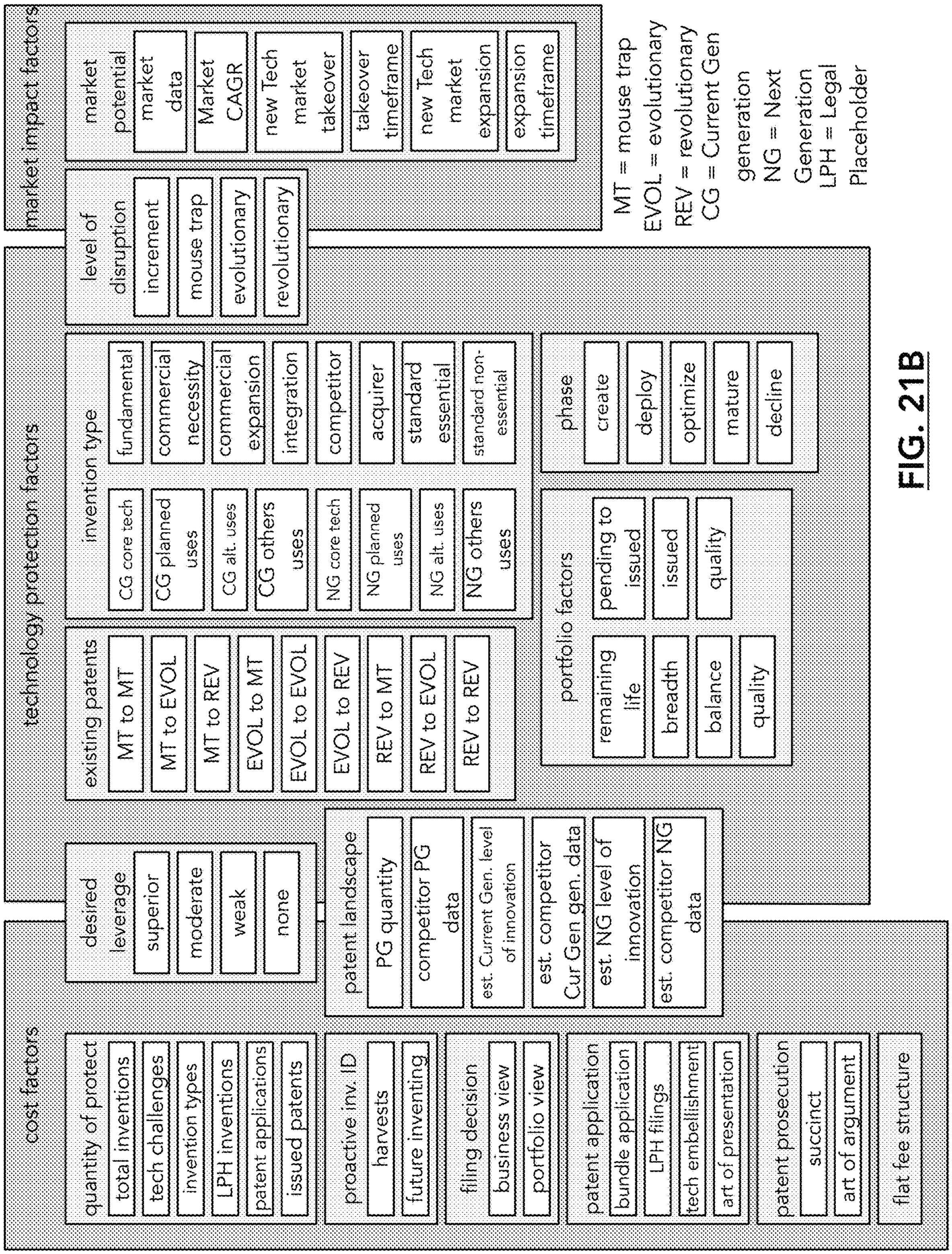
FIG. 21B is a schematic block diagram of an example of data for a re-engineered patent process for effective and efficient patent protection, use, and/or value of a technology (one or more market-tech units [MTUs])

FIG. 21B is a schematic block diagram of an example of data for a re-engineered patent process for effective and efficient patent protection, use, and/or value of a technology (one or more market-tech units [MTUs]). How the improved computer uses the data listed in this Figure is discussed in greater detail with reference to one or more the Figures.

In this example, there are three main data categories used by the improved computer to support the re-engineered patent process. The three main data categories are cost factors, technology protection factors, and market impact factors.

The cost factor category includes sub-categories of quality of patent protection, proactive invention identification (inv. ID), filing decision, patent application, patent prosecution, desired leverage, and patent landscape. The quality of patent protection for an MTU includes data regarding total number of inventions for an MTU, the ideal number of inventions to patent protect for the MTU (part of total number), the technical challenges of the MTU, the invention types, number of place holder inventions, the number of issued patents, and the number of pending patent applications.

The proactive invention identification for an MTU includes data regarding the use of invention harvesting sessions and the use of advanced inventing sessions. The filing decision for an MTU includes business impact (e.g., market analysis, financial analysis, business objectives, technology details, competition, etc.) and patent portfolio fit (e.g., review of plan as to where an invention fits).

The desired leverage sub-category includes a superior patent position, a moderate patent position, a weak patent position, and no patent position. This sub-category applies to the cost factor category and the technology protection factors category.

The patent landscape sub-category includes previous generation quantity of inventions patent protected, competitor previous generation patent and technology data, estimated current generation level of innovation, estimated competitor current generation patent and technology data, estimated next generation level of innovation, and estimated competitor next generation patent and technology data. This sub-category applies to the cost factor category and the technology protection factors category.

The existing patents sub-category includes generation to generation comparison of the level of disruption, where MT is a better mouse trap, EVOL is evolutionary, and REV is revolutionary. These levels of disruption were discussed with reference to one or more previous Figures. The invention types sub-category list the invention types for FIG. 19 and expand on them to include generational information.

The portfolio factors sub-category includes remaining life of patents, breadth of coverage of the patents, balance of patent coverage of a technical challenge and among the technical challenges, a pending application to issued patent ratio, an issued patent score, and a quality of patents score. The phase of a generation sub-category includes create, deploy, optimize, mature, and decline.

The level of disruption category, which spans the technology protection factors category and the market impact factors category, includes incremental, better mouse trap, evolutionary, and revolutionary. The market potential sub-category includes market data, market CAGR, new tech (MTU) market takeover factor, takeover time frame, new tech market expansion, and market expansion time frame.

Figure 22:
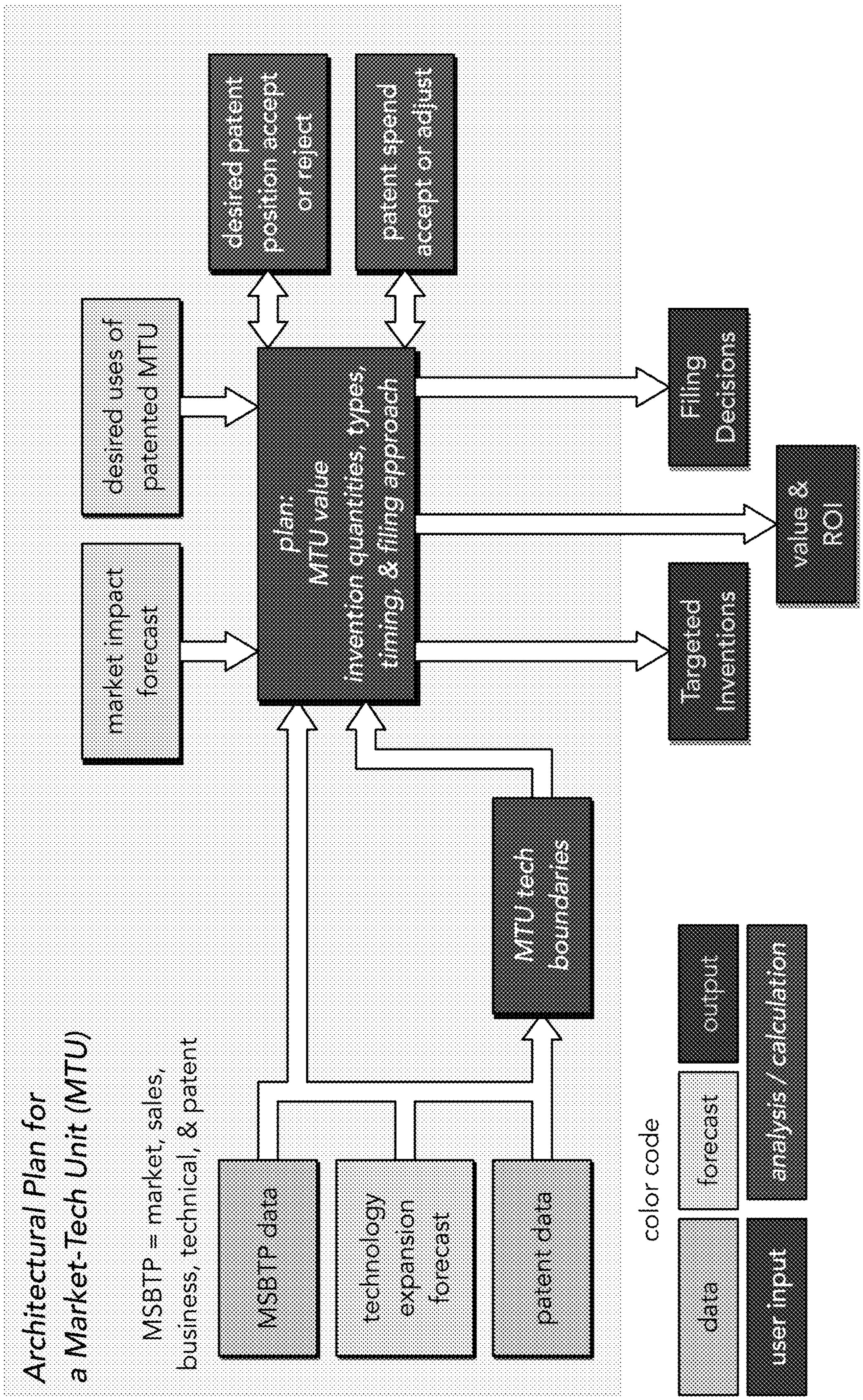
FIG. 22 is a flow diagram of an example of a generating a patent protection plan for a technology (one or more market-tech units [MTUs)]

FIG. 22 is a flow diagram of an example of a generating an architectural plan for patent protecting a technology (a market-tech unit [MTU)]. The diagram is colored based on the nature of a block. Light gray-green represents a document gathering, document partitioning for data extraction, and data organization performed by the improved computer; the light gray represents a forecasting function performed by the improved computer, black represents an output produced by the improved computer, dark blue-gray represents a user input received by the improved computer, and dark grey-green represents analysis and/or calculations performed by the improved computer.

For the improved computer to generate an architectural plan that maps out what inventions to protect, when, and how (e.g., invention quantities, types, timing, and filing approach), and to generate a year-by-year report regarding the value of the MTU and patent ROI, the improved computer requires data regrading, desired patent position, desired patent spend, market impact of the MTU, desired uses of the patented MTU, relevant MSBT (marketing, sales, business, technology) documents, technology expansion forecast, patent data (existing and/or forecasted annotated patents and/or patent terms), and MTU tech boundaries (which include features, unique value propositions, technical challenges, and may further include problems).

The desired patent position and desired patent spend are user inactive inputs, which if left blank, the improved computer uses the desired patent position of superior with no limit on the patent spend. The user, via an authorized user device, has the option of accepting the patent position and/or the patent spend. If both are accepted, the improved computer generates the architectural plan, which includes output reports for active inventing sessions regarding targeted inventions and for filing decisions for pursed inventions.

If the user, via the authorized user device, reject the patent spend, the user can enter a new desired patent spend. With the spend as a constraint, the improved computer adjusts the patent position until it generates a new architectural plan that meets the patent spend constraint. The improved computer provides the user device with the adjusted patent position and the report on valuation and ROI. If the user accepts the new patent position, the improved computer generates the architectural plan and corresponding reports.

If the new patent position is not accepted, the user, via the authorized user device, adjusts the patent spend and/or the desired patent spend until an acceptable compromised is reached.

Figure 23:
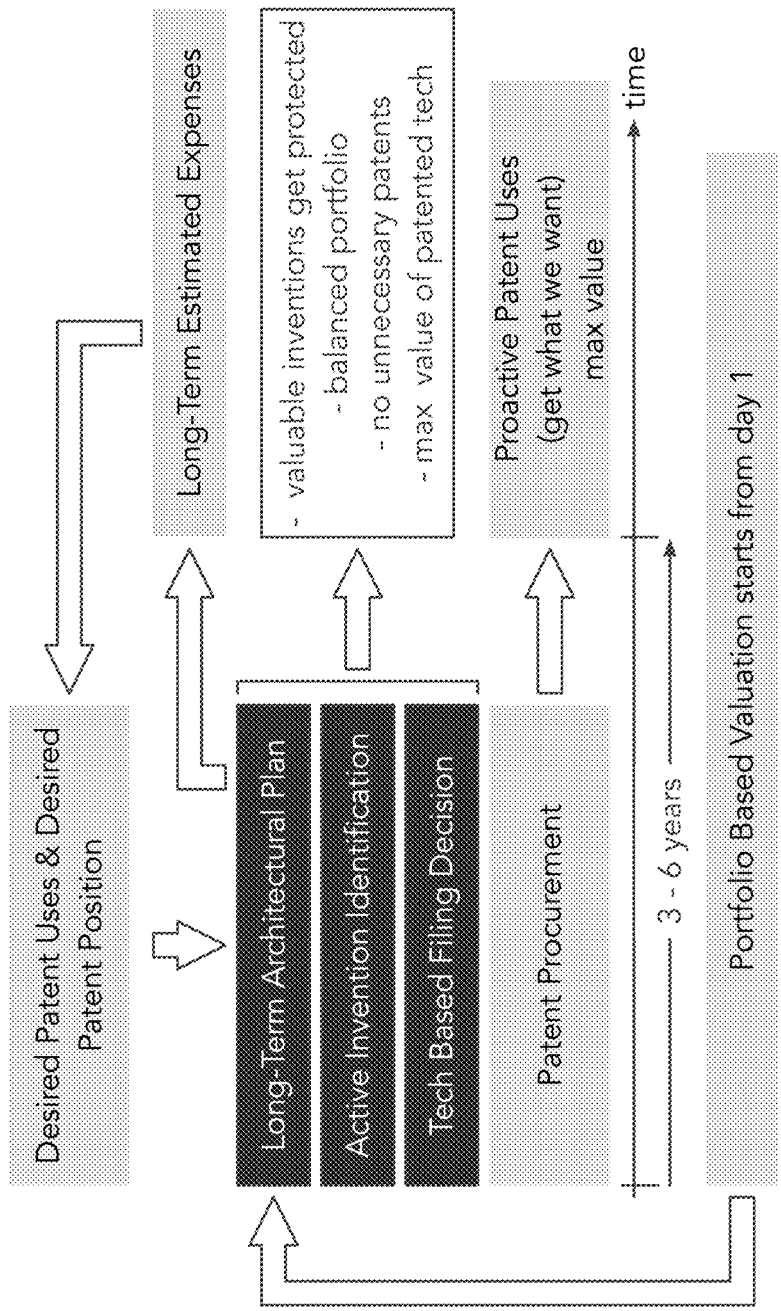
FIG. 23 is a flow diagram of another example of a generating a patent protection plan for a technology (one or more market-tech units [MTUs)]

FIG. 23 is a flow diagram of another example of generating a patent protection plan for a technology (one or more market-tech units [MTUs)]. In this diagram, the desired uses, desired patent position, and estimated value of the MTU drive the long-term architectural plan. The plan enables active invention identification, technology based filing decisions, and answers the question of how many inventions should be patent protected, which, by not enabling, are significant drawbacks of the conventional patent process.

Unlike the conventional patent process, the re-engineered patent process yields a right sized patent portfolio that is balanced, that has no waste, and that maximizes value of the patented technology. The re-engineered patent process also enables routine calculations of how well a technology is being patent protected; starting from day 1. Don't have to wait until the patents are needed, as is done in the conventional patent process, to determine the quality and level of patent protection.

Figure 24:
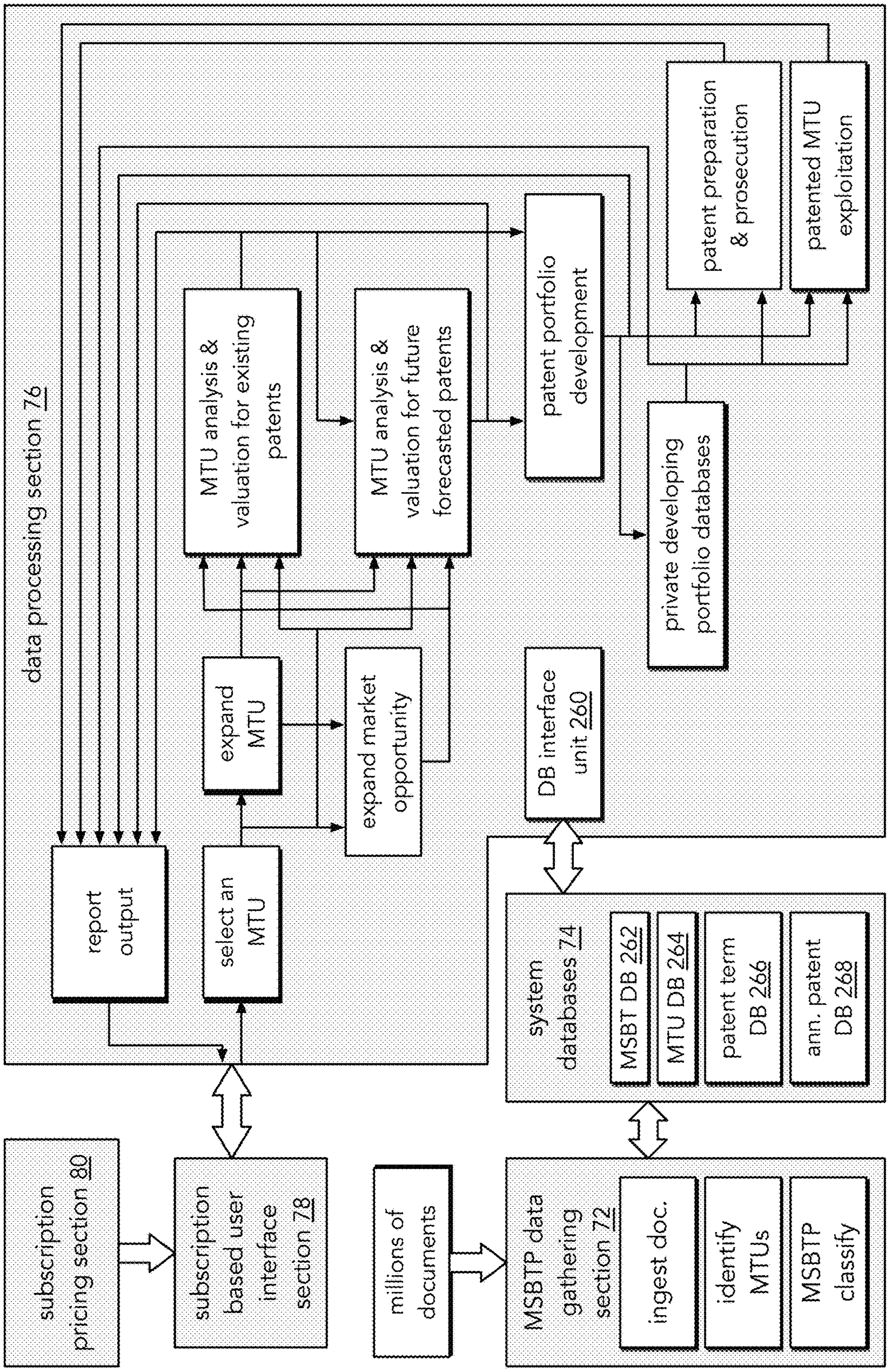
FIG. 24 is a schematic block diagram of a further embodiment of an improved computer for technology.

FIG. 24 is a schematic block diagram of a further embodiment of an improved computer for technology 70. The improved computer 70 includes the MSBTP (marketing, sales, business, technology, patents) data gathering section 72, which, in an embodiment, is implemented via one or more computing entities; system databases 74, each of which, in an embodiment, is implemented as per FIG. 7; a data processing section 76, which, in an embodiment, is implemented via one or more computing entities; a subscription based user interface section 78, which, in an embodiment, is implemented via one or more computing entities; and a subscription pricing section 80, which, in an embodiment, is implemented via one or more computing entities.

As will be discussed in greater detail with reference to subsequent figures, the MSBTP data gathering section 72 includes one or more co-processors for ingest documents, for classifying the documents with an MTU classification, and for identifying new MTUs from the documents. Relevant documents are stored in a system databases 74, which includes an MSBTP database (DB) 262, an MTU database 264, a patent term database 266, and an annotated (ann.) patent database 268.

The data processing section 76 includes one or more co-processors for an report output function; for a select an MTU function; for an expand an MTU function; for an expand market opportunities function; for analysis and valuation of an MTU with respect to existing patents; for analysis and valuation of an MTU with respect to future forecasted patents; for patent portfolio development based on MTUs; for patent application preparation and prosecution; and for patented MTU exploitation (e.g., patent uses and/or constructive notice). The data processing section 76 also includes private developing portfolio databases and a database interface unit 260 (which provides the data processing section access to the system databases).

In operation, the MSBTP data gathering section 72 routinely ingests documents (millions over time) and processing them to extract MTU information. The MTU information corresponds to data regarding an existing MTU and/or to data to identify a new MTU. For each ingested document to be saved (e.g., the document has at least one piece of information (regardless of how small) pertaining to an existing MTU or a potential new MTU, the MSBTP data gathering section 72 creates a database entry request.

For example, when the document is an issued patent or a pending patent application, the MSBTP data gathering section 72 generates an annotated patent database entry request for the patent or application that has been annotated with respect to MTU information. The request is sent to the annotated patent database 268 for a record to be created for the annotated patent or application. The MSBTP data gathering section 72 may further generate a patent term database entry request for a new patent term found in the patent or application. This request is sent to the patent term database 266 for a record to be created for the new patent term.

As another example, when the document is related to marketing, sales, business (financial, market, economy, etc.), and/or technology, the MSBTP data gathering section 72 generates an MSBT database entry request for the document. The request is sent to the MSBT database 262 for a record to be created for the MSBT document.

From the ingested documents, the MSBTP data gathering section 72 classifies the documents with an MTU classification, which include an MTU name, undecided, and undecided/potential new MTU. The MSBTP data gathering section 72 adds the MTU classification to the database record for the document. The MSBTP data gathering section 72 routinely reviews the MTU classification of stored documents to determine if an MTU classification update is needed. If so, the MSBTP data gathering section 72 updates a document's MTU classification.

The MSBTP data gathering section 72 also processes stored documents with the MTU classification of undecided/potential new MTU to determine whether a new MTU should be created. If so, the MSBTP data gathering section 72 generates an MTU database entry request for the new MTU and sends it to the MTU database 264.

The data processing section 76 receives a selection of an MTU from the subscription based user interface section 78 and a selection of a report, or reports, to be generated. The reports of the data processing section 76 are per selected MTU(s) and include an existing patent landscape report, a competitor existing patent analysis report, a "how well the MTU is patent protected with existing patents" report, a market impact of the MTU in light of existing patents report, a value of an MTU in light of existing patents report, a forecasted future patent landscape report, a competitor forecasted future patent analysis report, a "how well the MTU is patent protected with forecasted future patents" report, a market impact of the MTU in light of forecasted future patents report, a value of an MTU in light of forecasted future patents report, an architectural plan for developing a patent portfolio for an MTU report, an expense & growth report for an MTU being developed per the architectural plan, a patent protection tracking report, a patent use report, and a constructive notice report.

For a selected MTU, the data processing section 76, if not already done, expands the innovation of the MTU and expands the market opportunity for the MTU and the expansion of the MTU. Expanding innovation of the MTU includes identifying new unique values propositions for the MTU, identifying new features for the MTU, identifying new technical challenges for the MTU, identifying new uses for the MTU, and so on. Expanding the market opportunities includes identifying new market opportunities for the expanded MTU and further includes identifying other MTUs that have similar unique value propositions, similar features, and/or similar technical challenges and determining the MTU applicability in markets of the other MTUs.

From the selected MTU, the expansion of the MTU, and the expansion of the market opportunities, the data processing section 76 analyzes the MTU from an existing patent standpoint to produce one or more of the above mentioned existing patent reports and/or analyzes the MTU from a forecasted future patent standpoint to produce one or more of the above mentioned forecasted future patent reports.

From the existing patent analysis, forecasted future patent analysis, and inputted data regarding patent position and/or patent spend, the data processing section 76 generates an architectural plan for patent protecting the MTU. The data processing section tracks execution of the architectural plan via a private database (one for each authorized user). To ensure quality of executing the architectural plan, the data processing section includes an ML and/or AI patent application preparation program and an ML and/or AI patent application prosecution program.

From the stored data and the various other analysis performed by, and/or reports generated by, the data processing section, it generates one or more reports regarding market exploitation of the patent protected MTU. For example, the data processing section 76 generates a report on uses of the patents of the MTU. As another example, the data processing section generates a constructive notice report.

The co-processors of the improved computer 70 may be implemented in a variety of ways. For example, a co-processor is one or more computing entities and/or one or more computing devices. As another example, a co-processor is a dedicating processing module of a computing entity and/or of a computing device. As yet another example, a co-processor is a computing core of a computing device. As a further example, a co-processor is an allocation portion of processing resources of a computing entity and/or of a computing device. As yet a further example, a co-processor is a temporary allocation of processing resources of a user computing device.

The various programs, including ML and/or AI programs, of the improved computer for technology may be allocated to co-processors in a variety of ways. For example, a co-processor is allocated multiple programs for execution. As another example, a co-processor is dedicated to a specific program, or programs. As yet another example, co-processors are allocated programs on an as-needed basis. As a further example, each program, or set of programs, is allocated to a dedicated set of co-processors to increase parallel operations of the improved computer, the number of co-processors in a dedicated set can vary to accommodate scaling of parallel operations.

Figure 25:
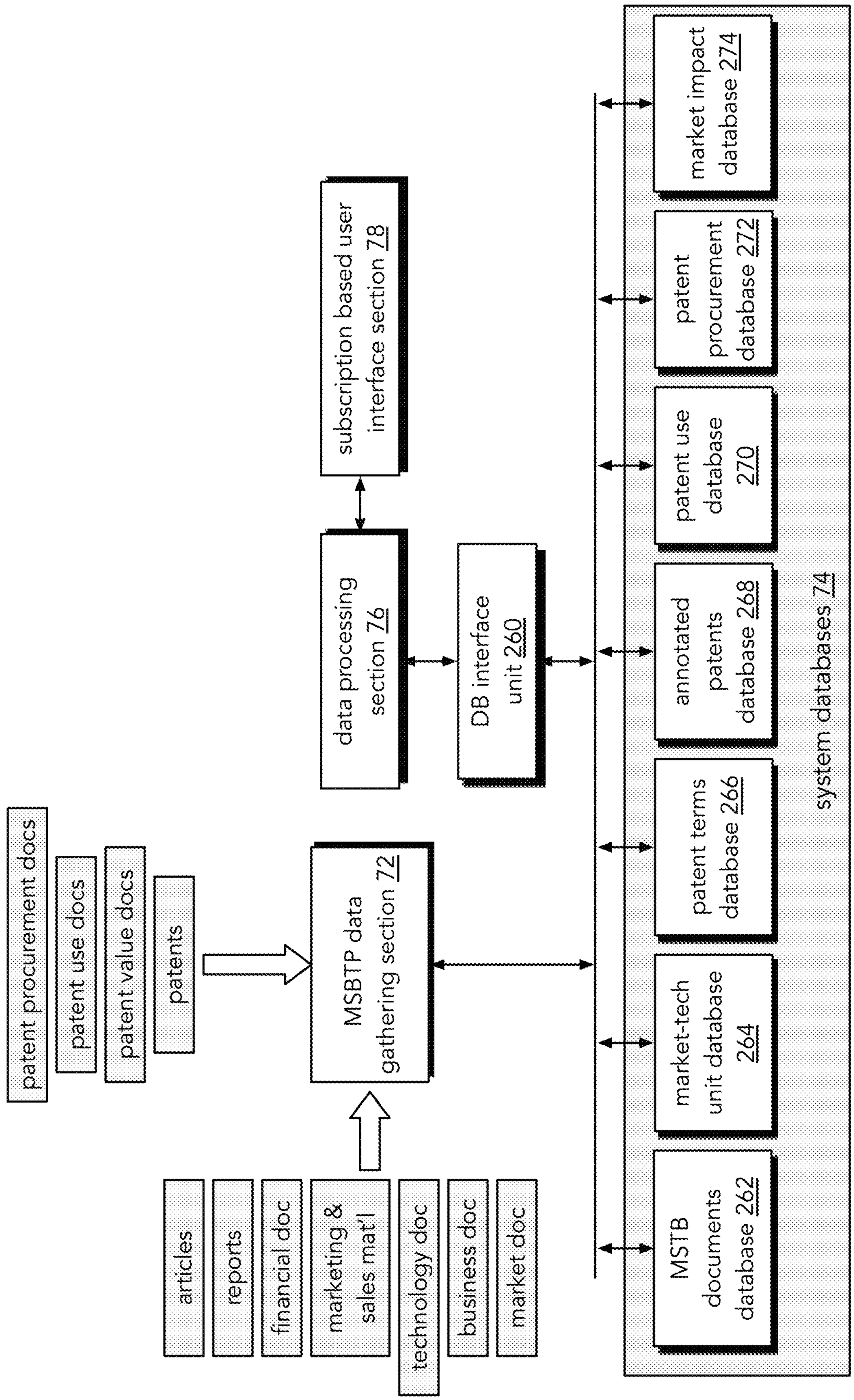
FIG. 25 is a schematic block diagram of a further embodiment of an improved computer for technology.

FIG. 25 is a schematic block diagram of a further embodiment of an improved computer for technology 70, which includes the MSBTP data gathering section 72, the data processing section 76, the subscription based user interface section 78, the database interface unit 260, and the system databases 74. The system databases 74 include the MSBT (marketing, sales, business, technology) database 262, the market-tech unit (MTU) database 264, the patent terms database 266, the annotated patent database 268, a patent use database 270, a patent procurement databased 272, and a market impact database 278.

The MSBTP data gathering section 72 ingests a variety of documents. As an example of documents, which far from an exhaustive list, the documents include articles from various publications, reports, financial documents, marketing material, sales material, technology documents, business documents, market documents, patent procurement documents, patent use documents, patent value documents, and patents. In general, the MSBTP data gathering section 72 seeks to ingest and process any document that pertains to a technology category, business regarding a technology, financial reports and/or analysis of a technology and/or business regarding technology, market reports and/or analysis of a technology and/or business regarding technology, technical description of a technology, and/or existing and/or projected use of a technology.

Figure 26:
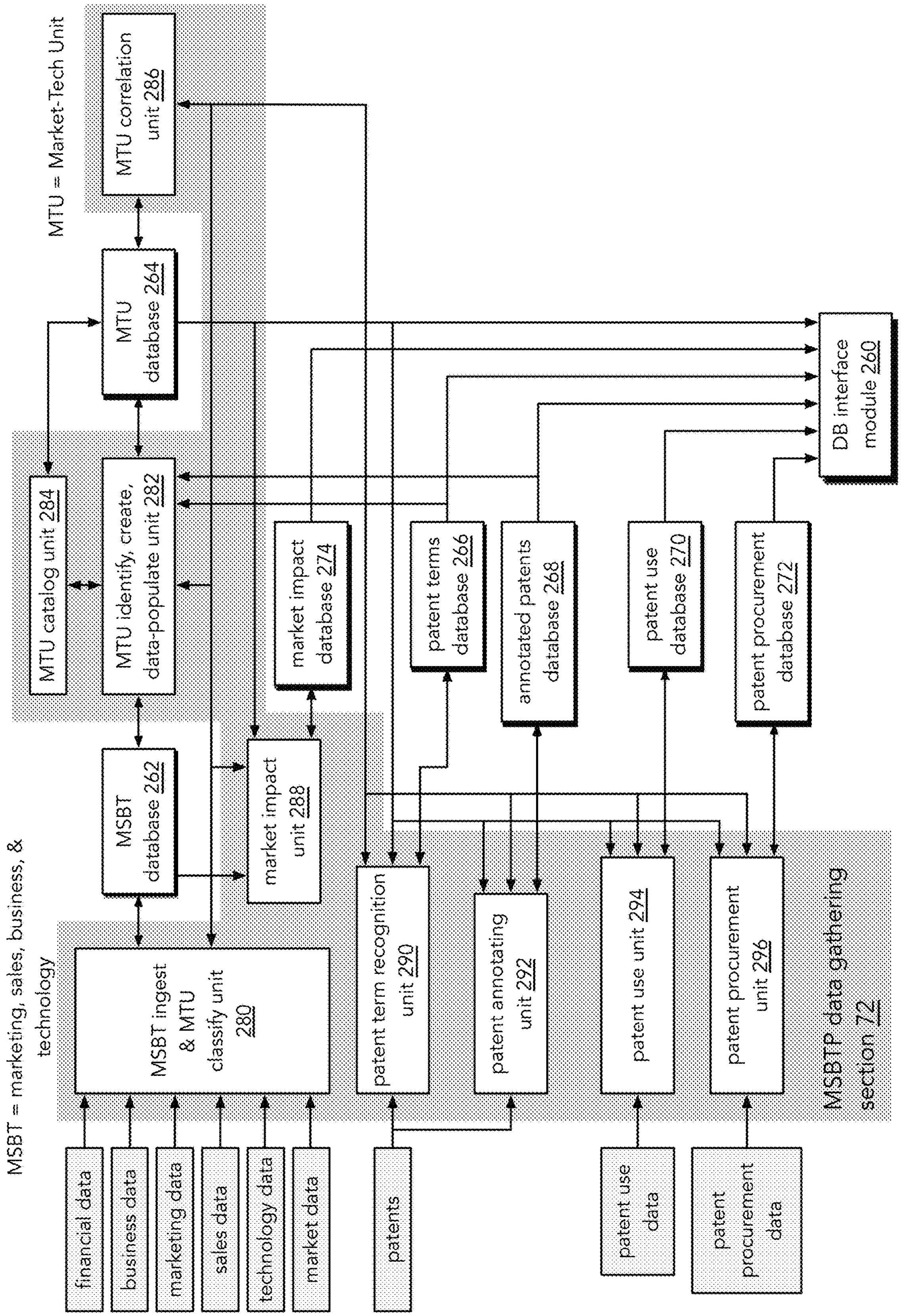
FIG. 26 is a schematic block diagram of a further embodiment of an improved computer for technology.

FIG. 26 is a schematic block diagram of a further embodiment of an improved computer for technology 70 that includes, in part, the MSBTP data gathering section 72 and the system databases. The MSBTP data gathering section 72 includes an MSBT ingest and MTU classify unit 280, an MTU identify, create, and data populate unit 282, an MTU catalog unit 284, an MTU correlation unit 286, a market impact unit 288, a patent term recognition unit 290, a patent annotating unit 292, a patent use unit 294, and a patent procurement unit 296. As used herein, a unit is implemented via one or more co-processors and/or one more processing modules.

The MSBT ingest and MTU classify unit 280 ingests MSBT (marketing, sales, business, and technology) documents that include, but is not limited to, financial data, business data, marketing data, sales data, technology data, and market data. The unit 280 processes each document with respect to MTU information (e.g., information relevant to an MTU record) and classifies documents with an MTU classification in conjunction with the MTU correlation unit 286. The unit 280 also creates MSBT database entry requests for documents to be saved as MSBT records in the MSBT database 262.

The MTU identify, create, and data populate unit 282 retrieves MSBT records from the MSTB database 262, annotated patent records from the annotated patent database 268, and/or patent term records from the patent term database 266, and MTU records from the MTU database 264. The unit 282 processes the MSTB records, the annotated patent records, and/or the patent term records to identify new data to add to an existing MTU record and/or to identify edits to be made to existing MTU records. For new data to add to an existing MTU record, the unit 282 generates a data populate request for the existing MTU record regarding the new data and sends it to the MTU database 264. For data edits, the unit 282 generates a data populate request for the existing MTU record regarding the data edits and sends it to the MTU database 264.

The MTU identify, create, and data populate unit 282 retrieves MSBT records, annotated patent records, and/or patent term records from the respective databases that have an MTU classification of undecided/potential new MTU. The unit 282 processes the records to determine if there is sufficient data to support the existence of a new MTU. If yes, the unit 282 generates a new MTU record request for the new MTU and sends it to the MTU database 264. The unit 282 also updates the MTU classification of the records from undecided/potential new MTU to the name of the new MTU.

If there is not sufficient data to support the determination of a new MTU, the unit 282 determines whether the accumulated data is indicating an increase or decrease in the likelihood of it representing a new MTU. When the data indicates a decrease in the likelihood of new MTU, the unit 282 determines whether the likelihood of a new MTU has dropped below a lower limit threshold (e.g., less than a 1% to 5% chance a new MTU is emerging). If yes, the unit 282 changes the MTU classification of the retrieved records from undecided/potential new MTU to undecided.

The MTU identify, create, and data populate unit 282 also retrieves MSBT records, annotated patent records, and/or patent term records from the respective databases that have an MTU classification of undecided. The unit 282 processes the records to determine if there is sufficient data to support the existence of a potential new MTU. If yes, the unit 282 updates the MTU classification of the records from undecided to undecided/potential new MTU.

The MTU catalog unit 284 retrieves MTU records from the MTU database to catalog the records. In this context, cataloging means creating and/or updating technology maps of MTUs by linking MTUs together in a functional and/or hierarchical manner. A technology map is for a particular technology category (e.g., communications technology, information technology, electrical technology, medical technology, etc.) or a combination of technologies (e.g., communications technology, information technology, and electrical technology) from a high-level down to a microscopic technical detail (e.g., fundamental components, circuits, and/or elements). MTU inclusion diagrams and MTU composition diagrams are derived from the technology maps.

The MTU correlation unit 286 is operable to ensure that MSBT records, annotated patent records, and/or patent term records are correlated with the appropriate MTUs. In particular, the MTU correlation unit 286 ensures that MTU classification of records is accurate and is drawn from value MTU records.

The market impact unit 288 retrieves MSBT records and MTU records from respective databases to determine existing market impact of an MTU and to determine a forecasted future market impact of the MTU. For an MTU, the unit 288 generates a market impact record regarding the existing market impact of the MTU and/or the forecasted future market impact of the MTU.

The patent term recognition unit 290 ingests new patents (issued and pending), retrieves annotated patent records, and retrieves patent term records to identify new patent terms and/or to update existing patent terms in light of MTU classifications based on the ingested new patents. As used herein, a patent term is a claim term or a technical term. A claim term includes one or more words regarding a claim noun (e.g., an element, a step, an input, output, and/or some quantifiable thing), a claim descriptor (e.g., a feature, a function, a description, an interaction, an operational limitation of a claim noun and/or the like), and/or a claim relator (relationship of two or more claim nouns). A technical term includes one or more words that is regarding a technical aspect of an MTU.

The patent term recognition unit 290 identifies new patent terms in the ingested patents based on the retrieved patent term records and/or the retrieved annotated patent records. The unit 290 determines which records to retrieve based on one or more of a multitude of factors, which includes assignee name, inventor name, patent title, patent classification, and/or similar patent terms. For a new patent term, the unit 290 generates a new patent term record request and sends it to the patent term database 266. For updating an existing patent term, the unit 290 generates an update patent term record request and sends it to the patent term database 266.

The patent annotating unit 292 ingests new patents (issued and pending), retrieves annotated patent records, and retrieves patent term records to annotate the ingested patents in light of MTU data. As used herein, annotate means highlighting patent terms within a patent, identifying general patent information, identifying foreign counterparts, extracting technology boundary data that pertain to technical boundaries of an existing MTU and/or a potential new MTU, generating an MTU orientated general description of the patent, identifying a science category, identifying product and/or service data, identifying manufacturing data, and/or identifying market impact data.

For a new annotated patent, the patent annotating unit 292 generates a new annotated patent record request and sends it to the annotated patent database 268. The unit 292 also routinely reviews existing annotated patent records to determine, based on more recent ingested data, whether an existing annotated patent record should be updated. If so, unit 292 generates an update an existing annotated patent record request and sends it to the annotated patent database 268.

The patent use unit 294 ingests documents regarding patent use (e.g., patent sales, patent litigation, patent licensing, product/service information, technology investments, assignment records, etc.) and retrieves existing patent use documents from the patent use database 270. For new documents, unit 294 generates a new patent use record request and sends it to the patent use database 270. The unit 294 also routinely reviews existing patent use records to determine, based on more recent ingested data, whether an existing patent use record should be updated. If so, unit 294 generates an update an existing patent use record request and sends it to the patent use database 270.

The patent procurement unit 296 ingests and processes documents regarding pricing of various patent services and/or patent filing statistics, patent prosecution statistics, patent issuance statistics, and patent abandonment statistic. For new documents, unit 296 generates a new patent procurement record request and sends it to the patent procurement database 272. The unit 296 also routinely reviews existing patent procurement records to determine, based on more recent ingested data, whether an existing patent procurement record should be updated. If so, unit 296 generates an update an existing patent procurement record request and sends it to the patent procurement database 272.

By quantifying technology with market-tech units, which have definable technical boundaries, the improved computer has significantly greater data consistency with respect to most, if not all, of the functions it offers in comparison to services that support the conventional patent process. The greater data consistency of MTUs enables more efficient and effective prior art searching, better architectural planning of patent protecting a technology, clear definitions for technology, better valuation of technology, and/or any other benefits of better data consistency.

Figure 27:
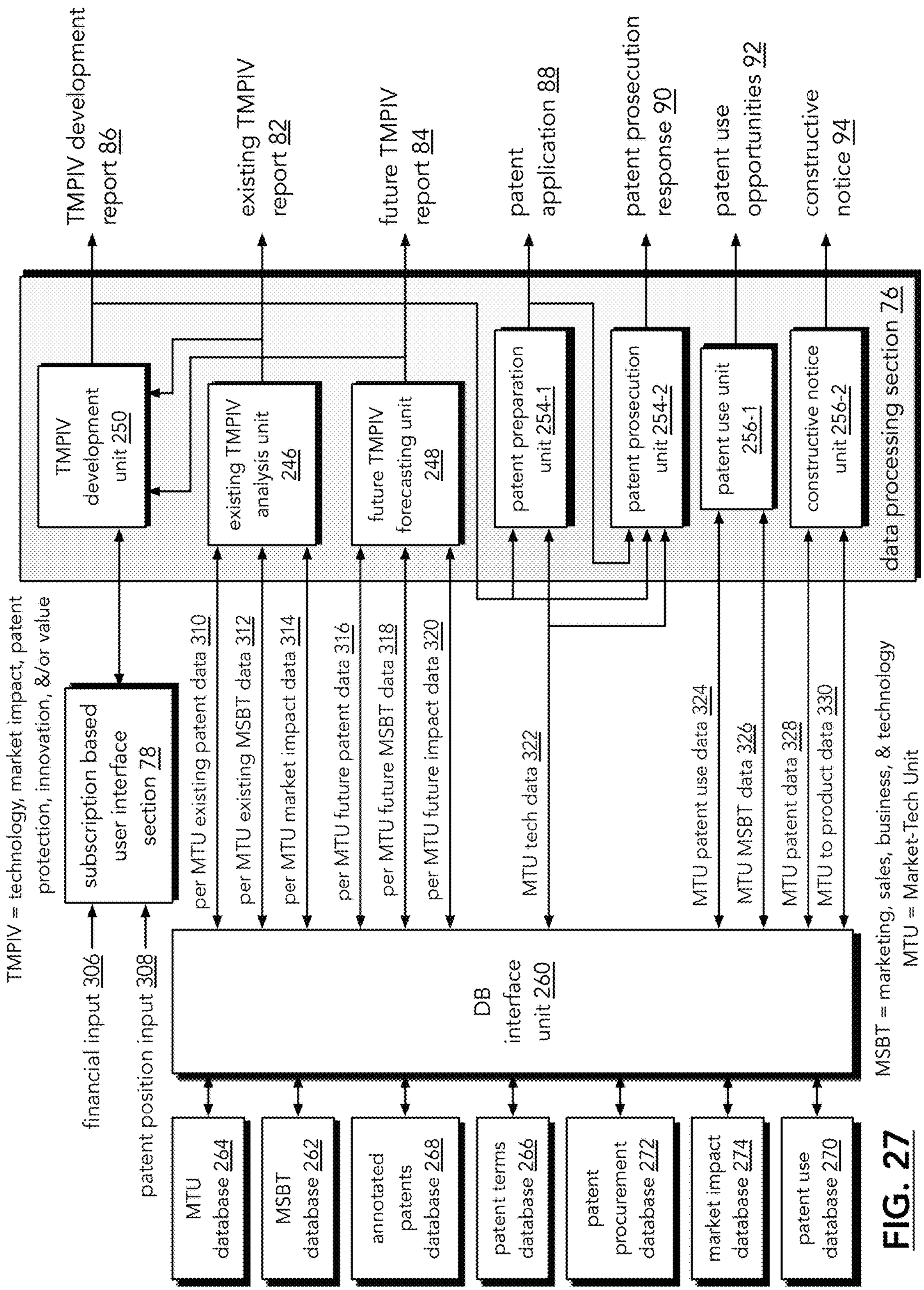
FIG. 27 is a schematic block diagram of a further embodiment of an improved computer for technology.

FIG. 27 is a schematic block diagram of a further embodiment of an improved computer for technology 70 that includes the system databases 262-274, the database interface unit 260, the subscription based user interface section 78, and the data processing section 76. The data processing section 76 includes a TMPIV (Technology, Market impact, Patent protection, Innovation, and Value of technology) development unit 250, an existing TMPIV analysis unit 246, a future TMPIV forecasting unit 248, a patent preparation unit 254-1, a patent prosecution unit 254-2, a patent use unit 256-1, and constructive notice unit 256-2.

The existing TMPIV analysis unit 246 generates one or more reports 82 based on data retrieved from the MTU database 264, from the MSTB database 262, from the annotated patent database 268, the from the patent term database 266, and/or from the market impact databased 274. For example, the unit 246 generates an existing patent landscape report for an MTU based on per MTU existing patent data 310 (annotated patents and/or patent terms), per MTU existing MSBT data 312, and per MTU market impact data 314 for the selected MTU.

The unit 246 generates an existing patent landscape report for a selected MTU to include a list of inventions that have some form of patent protection, a list of assignees of existing patents (issued and pending), a breakdown of existing patents per assignee, a number of total inventions that should exist to date for the technology, an ideal number of inventions that should have been patent protected to date, a general description of the MTU, general descriptions of the existing patents, a comparison of existing patents to the total number of inventions to date, and/or a comparison of existing patents to an ideal number of inventions that have been patent protected to date.

The unit 246 generates a competitor existing patent analysis report regarding an MTU based on the existing patent landscape report tailored for a particular assignee. The report further compares the particular assignee's patenting of the MTU to date with the patenting to date of the MTU by other assignees.

The unit 246 generates a "how well the MTU is patent protected with existing patents" report based on the existing patent landscape report and the retrieved data. The report includes the list of inventions that have some form of patent protection, the number of total inventions that should exist to date for the technology, the ideal number of inventions that should have been patent protected to date, a quality analysis of the existing patent protection, and a calculation of the level of patent protection based on a ratio of the actual number of inventions protection with respect to the ideal number of inventions and the quality of the existing patent protection. The quality includes a cumulative score of per patent application preparation and prosecution quality score and a patent portfolio sufficiency score (e.g., balance, breadth, scope, etc.).

The unit 246 generates a market impact of the MTU in light of existing patents report based on the existing patent landscape report and the retrieved data. The report includes existing total available market (TAM) data, a compound annual growth rate (CAGR) for the TAM, service obtainable market (SOM) data, a CAGR for the SOM, influence of the marketable features of the MTU on the TAM and/or the SOM, influence of the unique value propositions (UVPs) of the MTU on the TAM and/or the SOM, influence of the technical challenges of the MTU on the TAM and/or the SOM, and a market impact calculation on the TAM and/or on the SOM.

The unit 246 generates a value of an MTU in light of existing patents report based on the how well patented report, the market impact report, and a market-patent "k" factor. The report includes the relevant data points of the other reports and a calculation of the value of the MTU at present. The calculation could further include past values of the MTU.

The future TMPIV forecasting unit 248 generates one or more reports 84 based on data retrieved from the MTU database 264, from the MSTB database 262, from the annotated patent database 268, from the patent term database 266, and/or from the market impact databased 274. For example, the unit 248 generates a forecasted future patent landscape report for an MTU based on per MTU future patent data 316, per MTU future MSBT data 318, and per MTU future market impact data 320 for the selected MTU.

The unit 248 generates a forecasted future patent landscape report for a selected MTU to a number of total inventions that should be created from present day to end of life of the MTU, an ideal number of inventions to be patent protected from present day to end of life of the MTU, a general description of the MTU, a forecast of assignees of future patents, and/or a list of technical challenges, unique value propositions, and/or marketable features for future inventions.

The unit 248 generates a competitor forecasted future patent analysis report based on the future patent landscape report tailored for a particular assignee. The report further compares the particular assignee's forecasted future patenting of the MTU with the forecasted future patenting of the MTU by other assignees.

The unit 248 generates a "how well the MTU is patent protected with forecasted future patents" report based on the future patent landscape report and the retrieved future forecasting data. The report includes the number of total inventions that should be created from present day to end of life of the MTU, the ideal number of inventions that should be patent protected from present day to end of file, a quality projection of the future patent protection, and a calculation of the level of patent protection based on desired patent position, a ratio of the number of inventions that will likely be patent protected based on desired patent position with respect to the ideal number of inventions and the quality of the future patent protection. The quality includes a cumulative score of per patent application preparation and prosecution quality forecasted score and a patent portfolio sufficiency forecasted score (e.g., balance, breadth, scope, etc.).

The unit 248 generates a market impact of the MTU in light of forecasted future patents report based on the future patent landscape report and the retrieved future forecasting data. The report includes, on a year-by-year basis, forecasted total available (or addressable) market (TAM) data, a forecasted compound annual growth rate (CAGR) for the TAM, forecasted service obtainable market (SOM) data, a forecasted CAGR for the SOM, forecasted influence of the marketable features of the MTU on the TAM and/or the SOM, forecasted influence of the unique value propositions (UVPs) of the MTU on the TAM and/or the SOM, forecasted influence of the technical challenges of the MTU on the TAM and/or the SOM, and a forecasted market impact calculation on the TAM and/or on the SOM.

The unit 248 generates a value of an MTU in light of forecasted future patents report based on the forecasted how well patented report, the forecasted market impact report, and the market-patent "k" factor. The report includes, on a year-by-year basis, the relevant data points of the other reports and a calculation of the future value of the MTU.

The TMPIV development unit 250 generates a development report 86 that includes an architectural plan for developing a patent portfolio for an MTU report, an expense & growth report for the MTU based on the architectural plan, and a patent protection tracking report. The unit 250 generates its reports 86 based on the financial input 306, the patent position input 308, and/or the reports 82 and 84 produced by the existing TMPIV analysis unit 246 and the future TMPIV analysis unit 248. Note that the subscription based user interface section 78 receives financial input data 306 and/or patent position input data 308 for an MTU from an authenticated user device (e.g., a computing device or a computing entity).

The patent preparation unit 254-1 generates a patent application, or at least a claim set, for an invention of an MTU in accordance with architectural plan and MTU technical data 322. The MTU technical data 322 includes data regarding the MTU from the MTU database 264, business and technical information regarding the MTU from the MSBT database 262, market impact data from the market impact database 274, annotated patents from the annotated patent database 268, and/or patent terms from the patent terms database 266.

The patent prosecution unit 254-2 generates a prosecution response (e.g., an office action response) for a pending patent application regarding an invention of an MTU in accordance with architectural plan and MTU technical data 322. The MTU technical data 322 includes data regarding the MTU from the MTU database 264, business and technical information regarding the MTU from the MSBT database 262, market impact data from the market impact database 274, annotated patents from the annotated patent database 268, and/or patent terms from the patent terms database 266.

Figure 28:
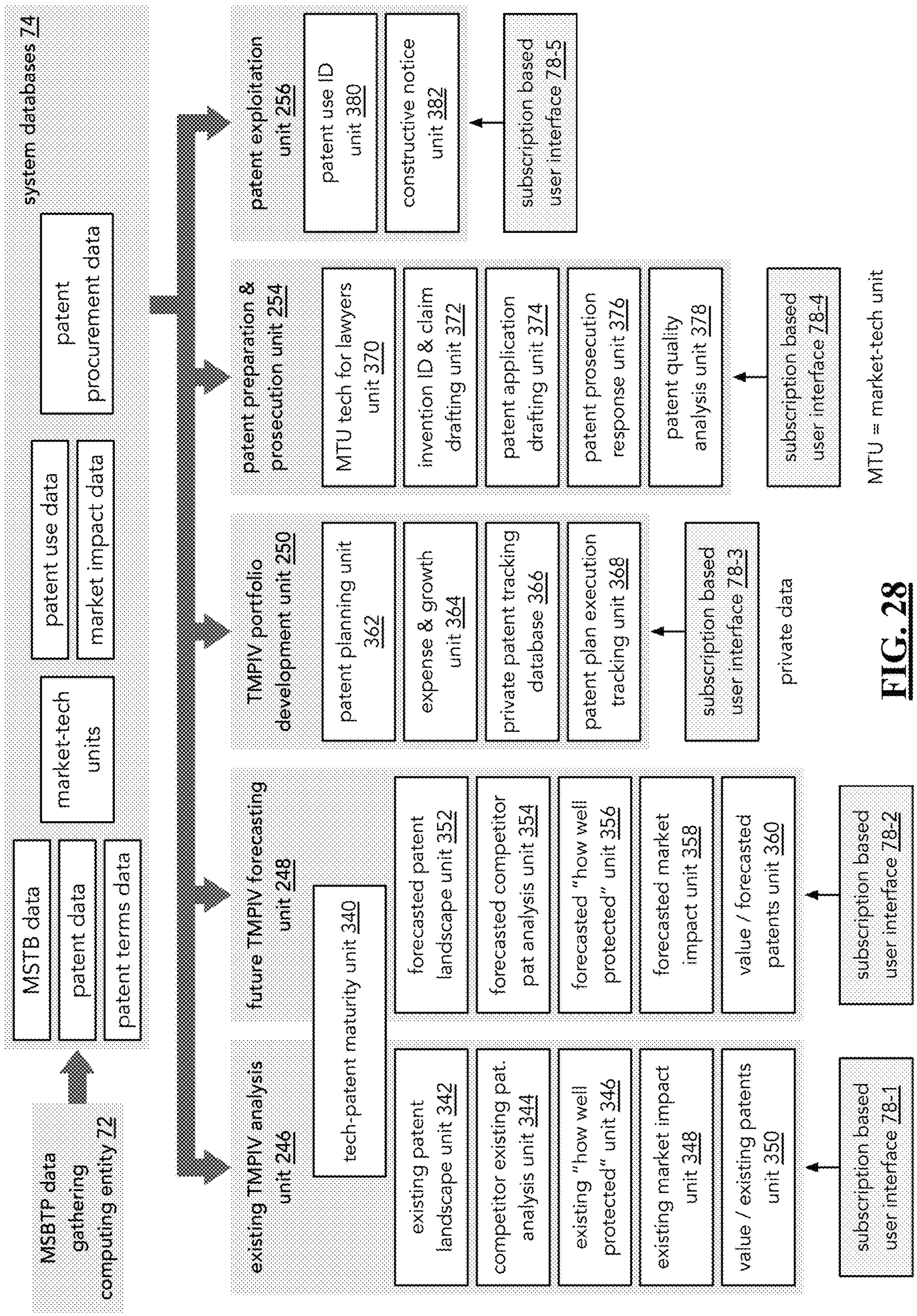
FIG. 28 is a schematic block diagram of a further embodiment of an improved computer for technology.

FIG. 28 is a schematic block diagram of a further embodiment of an improved computer for technology 70. In this embodiment, the improved computer includes the MSBTP (marketing, sales, business, technology, patents) data gathering section 72, the system databases 74, the subscription based user interface 78, the existing TMPIV (Technology, Market impact, Patent protection, Innovation, and Valuation) analysis unit 246, the future TMPIV analysis unit 248, the TMPIV portfolio development unit 250. The patent application preparation and prosecution unit 254, and the patent exploitation unit 256. Units 246-256 are part of the data processing section 76.

The system databases 74 stores MSBT data, patent data, patent terms, market-tech units (MTU) data, patent use data, market impact data, and patent procurement data. In an embodiment, the data of the system databases 74 is not directly accessible to authorized and authenticated user devices. Such user devices have read access only to the data of the system databases 74 indirectly via the data processing section 76.

The units of the data processing section 76 have read access to the data of the system databases 74, but do not have write access. The reports generated by the various units are stored by the respective units. The respective units may further store the data used to generate the reports. Authorized and authenticated user devices have read access only the reports and do not have read or write access to the data used to generate the reports, if stored by a respective unit.

The existing TMPIV analysis unit 246 includes a technology-patent maturity unit 340, an existing patent landscape unit 342, a competitor existing patent analysis unit 344, an existing "how well protected" unit 346, an existing market impact unit 348, and an MTU valuation in light of existing patents unit 350. The technology-patent maturity unit 340 determines the generation of an MTU and the phase of the current generation. The unit 340 also calculates the total number of inventions that are likely to be created over the life of the MTU, the percentage of the total number of inventions that should have been invented to date (e.g., existing inventions) and the remaining number of inventions to be invented (e.g., forecasted future inventions).

The existing patent landscape unit 342 generates an existing patent landscape report as generally discussed with reference to FIG. 27 and as described in greater detail with reference to subsequent figures. The competitor existing patent analysis unit 344 generates a competitor existing patent report as generally discussed with reference to FIG. 27 and as described in greater detail with reference to subsequent figures.

The existing "how well protected" unit 346 generates an existing "how well protected" report as generally discussed with reference to FIG. 27 and as described in greater detail with reference to subsequent figures. The existing market impact unit 348 generates an existing market impact report as generally discussed with reference to FIG. 27 and as described in greater detail with reference to subsequent figures. The MTU valuation in light of existing patents unit 350 generates an existing MTU valuation report as generally discussed with reference to FIG. 27 and as described in greater detail with reference to subsequent figures.

The future TMPIV analysis unit 248 includes the technology-patent maturity unit 340, a forecasted future patent landscape unit 352, a competitor forecasted future patent analysis unit 354, a forecasted future "how well protected" unit 356, a forecasted future market impact unit 358, and an MTU valuation in light of forecasted future patents unit 360.

The forecasted future patent landscape unit 352 generates a forecasted future patent landscape report as generally discussed with reference to FIG. 27 and as described in greater detail with reference to subsequent figures. The competitor forecasted future patent analysis unit 354 generates a competitor forecasted future patent report as generally discussed with reference to FIG. 27 and as described in greater detail with reference to subsequent figures.

The forecasted future "how well protected" unit 356 generates a forecasted future "how well protected" report as generally discussed with reference to FIG. 27 and as described in greater detail with reference to subsequent figures. The forecasted future market impact unit 358 generates a forecasted future market impact report as generally discussed with reference to FIG. 27 and as described in greater detail with reference to subsequent figures. The MTU valuation in light of forecasted future patents unit 360 generates a forecasted future MTU valuation report as generally discussed with reference to FIG. 27 and as described in greater detail with reference to subsequent figures.

The TMPIV portfolio development unit 250 includes a patent planning unit 362, an expense and growth unit 364, private patent tracking databases 366, and a patent plan execution tracking unit 368. The patent planning unit 362 generates the architectural plan for patent protection of an MTU as generally discussed with reference to FIG. 27 and as described in greater detail with reference to subsequent figures. The expense and growth unit 364 calculates the expense of patenting inventions per the architectural plan, calculates prosecution timing and expense of pending patent applications, calculates timing and expense of issuing patent applications, and calculates timing and expense of subsequent filings.

The private patent tracking databases 366 are individual databases for authorized and authenticated user devices that are affiliated with executing an architectural plan for an MTU. Note that a private database 366 tracks one or more MTU architectural plans of a user (via its device). The patent plan execution unit 368 coordinates data entry in the private databases 366 and generates periodic (and/or on-demand) reports regarding the execution of the architectural plan.

The patent preparation and prosecution unit 254 includes an MTU technology for lawyers unit 370, an invention identification (ID) and claim drafting unit 372, a patent application drafting unit 374, a patent prosecution unit 376, and a patent quality analysis unit 378. The MTU technology for lawyers unit 370 provides general descriptions of relevant MTUs that are associated with an MTU of which an invention is being patented. For example, if the invention is regarding a touch screen controller, the MTU technology for lawyers unit 370 retrieves general descriptions of touch screen controllers, touch screens, and the devices using touch screens (inclusion MTUs-higher tier MTUs). The MTU technology for lawyers unit 370 may further retrieve general descriptions of touch screen controller composition MTUs (lower tier MTUs).

The invention identification (ID) and claim drafting unit 372 generates a report that identifies novel aspects of an invention of an MTU based on the technical boundaries of the MTU and a particular problem the invention is addressing. In an embodiment, the unit 372 uses an interactive ML and/or AI program to generate an initial report regarding novel aspect and a series of questions to tune the novel aspects and outline independent claims.

The patent quality analysis unit 378 generates a report regarding patent quality by reviewing and analyzing the claims, support of the claims, clarity of the invention being patented, clarity of problem being solved, clarity of benefit of invention, and/or relative scope of claim coverage. The determination of patent quality will be discussed in greater detail with reference to subsequent figures.

The improved computer disclosed herein provides an improved computer architecture, provides many new technologies, and provides many significant technical improvements and/or technical advantages over existing computers and computer programs that support the conventional patent process. These include, but are not limited to, one or more of:

- increased data consistency regarding data identification, data retrieval, data analysis, and/or data results through the use of one or more new computer co-processing units and/or functions that quantify technology in terms of market-tech units (MTUs);
- one or more new computer co-processing units and/or functions to identify new MTUs and create database records for new MTUs, one or more new computer co-processing units and/or functions to identify documents relevant to new and/or existing MTUs, to retrieve such documents, dissecting such documents to extract relevant MTU data, create database records for storing such documents, and/or to update existing MTU records with further MTU data, which further improves data consistency;
- one or more new computer co-processing units and/or functions to generate an architectural plan to patent protect an MTU over the life of the MTU, only patents that service a purpose per the plan are pursued, which eliminates waste and increases effectiveness;
  - to answer the question of "how many patents are needed to appropriately protect a technology?"
  - to calculate, for the quantified technology as represented by an MTU, a total number of inventions likely to be invented over the life of the quantified technology;
  - to calculate the life of a quantified technology (MTU);
  - to generate a report regarding invention types for the MTU and to calculate quantities for each invention type;
- one or more new computer co-processing units and/or functions to calculate, on a year-by-year basis (or other frequency) expense and growth of patent protection of an MTU from its infancy to its end of life;
- one or more new computer co-processing units and/or functions to calculate a year-by-year (or other frequency) value of an MTU from its infancy to its end of life;
- one or more new computer co-processing units and/or functions to generate an existing patent landscape report (and/or prior art search report) for an MTU (and/or MTUs);
- one or more new computer co-processing units and/or functions to track and record execution of an architectural plan for patent protecting an MTU; and/or
- one or more new computer co-processing units and/or functions to generate an improved and streamlined architectural plan to patent protect an MTU over the life of the MTU, which;
  - answers the question of "how many patents are needed to appropriately protect a technology?"
  - calculates, for the quantified technology as represented by an MTU, a total number of inventions likely to be invented over the life of the quantified technology;
  - calculates the life of a quantified technology (MTU); and/or
  - generates a report regarding invention types for the MTU and to calculate quantities for each invention type.

Like other computers, the improved computer operates at the machine level where data is represented as unique sequences of 1's and 0's. For the improved computer data is one of data operands, operational instructions, or resulting data, where a set of operational instructions (or operational codes, or op codes) is performed on one or more data operands to produce resulting data. Within the improved computer it is common for the resulting data of a previously executed set of operational instructions to be a data operand(s) [intermediate operand] for a subsequently executed set of operational instructions, where a set includes one or more operational instructions.

Operational instructions are programming language specific and provide the instructions for the computer to read data operands, write data operands, write data results, and/or perform a function on a data operand(s). Examples of functions includes, but are not limited to, add, subtract, shift left, shift right, multiply, divide, a logic AND, a logic OR, a logic XOR, etc. A generic format for an operational instruction is [function; address for operand; (additional address for additional operands if functions involve two or more operands); address of where to write the data result].

The data operands, operational instructions, and data results are stored within the improved computer's memory as unique sequences of 1's and 0's. How the 1's and 0's are stored, retrieved, and processed within the computer dictate whether they are related to a data operand, an operational instruction, or a data result. All of the unique sequences of 1's and 0's regarding a program need to be properly associated with data operands, operational instructions, and data result; and need to be retrieved, processed, and/or stored in a precise manner for the program to operating correctly (e.g., produce the desired data result(s) from one or more initial data operands and/or one or more intermediate data operands).

A new combination and/or ordering of operational instructions that is executed by the improved computer on data operands (new, known, initial, and/or intermediate) to produce a new data result is novel. The creation, storage, and/or execution of operational instructions by an improved computer on data operands to produce a new data result are, in it of themselves, technical challenges.

Creating a new tool via the novel programming of a computer provides the benefits of any physical tool, which include, but are not limited to, improving performance, efficiency, accurately, reliability, safety, resolution, etc. of an existing task, providing new solutions to an existing task, and providing solutions to new tasks.

The human meaning of the 1's and 0's of the data operands, the operational instructions, and/or the data results does not change the technical challenges of programming a computer to produce an output, or outputs, through one or more sets of operational instructions operating on initial data operands and/or intermediate operands.

Figure 29:
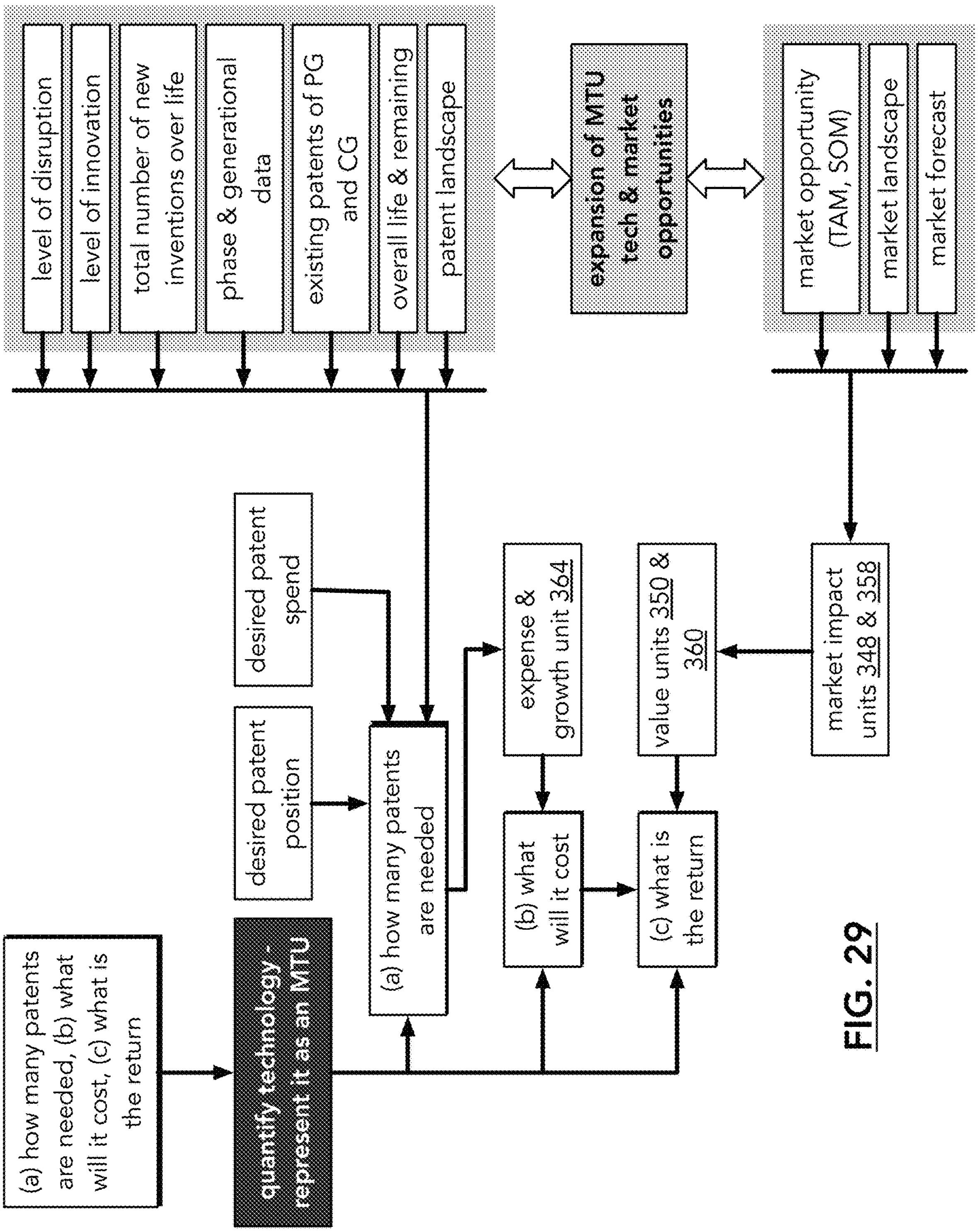
FIG. 29 is a flow diagram of another example of a generating a patent protection plan for a technology (one or more market-tech units [MTUs)]

FIG. 29 is a flow diagram of another example of a generating a patent protection plan for a technology (one or more market-tech units [MTUs)]. This diagram focuses on the improved computer for technology answering the questions of (a) How many patents are needed? (b) What will it cost? and (c) What is the return? These questions cannot be reliably and consistently answered without first quantifying a piece of technology (e.g., establish technology boundaries that are definitive and repeatably identifiable).

When a piece of technology has been quantified into an MTU, the question of "how many patents are needed" can be answered. The answer depends on a plurality of data (inputted and calculated). The inputted data includes desired patent position and desired patent spend. The calculated data includes a level of disruption of the MTU (e.g., incremental, better mouse trap, evolutionary, revolutionary), level of innovation (e.g., driven by quantity and/or complexity of unique valuation propositions, of marketable features, and/or of technical challenges), the total number of inventions likely to be invented over the life of the technology, generation and phase data for the MTU, previous generation (PG) and/or current generation (CG) existing patents, overall life and remaining life of MTU, and the patent landscape for the MTU (existing and forecasted future).

From these inputs, the improved computer calculates a number of inventions to patent protection on a year-by-year basis. This includes a breakdown of invention types per technical challenge, UVP, and/or marketable feature. It further includes how and where patent protection is to be sought.

When an initial year-by-year number inventions to patent protect has been determined, the question of "what will it cost" can be answered. The expense & growth unit 364 answers the question by determining year-by-year expense and portfolio growth numbers based on the year-by-year number of inventions to patent protect. If the projected costs exceed the desired patent spend, then the improved computer requests the user device to adjust the patent position and/or the patent spend.

Once the year-by-year number of inventions to patent protection and costs have been determined, the question of "what is the return" can be answered. The value units 350 & 360 calculate a year-by-year value of the MTU based on market impact data, how well patent protected, and the "k" factor. The year-by-year ROI is calculated based on the year-by-year value and the year-by-year expenses.

Figure 30:
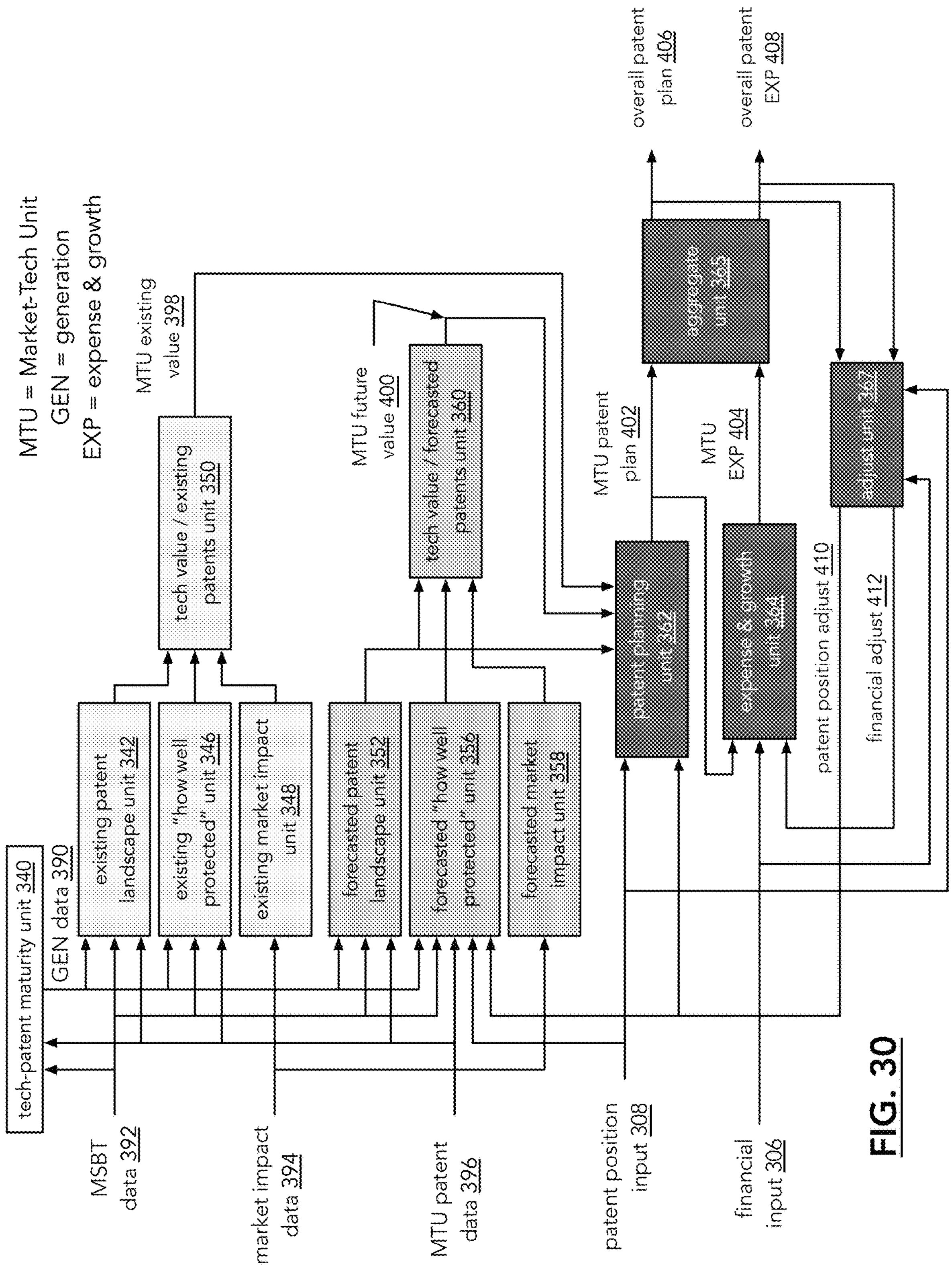
FIG. 30 is a schematic block diagram of a further embodiment of an improved computer for technology.

FIG. 30 is a schematic block diagram of a further embodiment of an improved computer for technology. In this embodiment, some of the units of the data processing section 76 are shown, which are the tech-patent maturity unit 340, the existing patent landscape unit 342, the existing "how well protected" units 346, the existing market impact unit 348, the existing value unit 350, the forecasted patent landscape unit 352, the forecasted "how well protected" unit 356, the forecasted market impact unit 358, the forecasted MTU value unit 360, the patent planning unit 362, the expense and growth unit 364, an aggregate unit 365, and an adjust unit 367.

The tech-patent maturity unit 340 generates generational (GEN) data 390 for an MTU. The GEN data includes the generations of an MTU (previous, current, and/or next) and the phases of each generation. The GEN data 390 further includes the life span of each generation and the time frame of each phase.

The units 342-350 use the GEN data 390, the MSBT data 392, the market impact data 394, and the MTU patent data 396 to generate an MTU existing value report 398. The units 352-360 use the GEN data 390, the MSBT data 392, the market impact data 394, and the MTU patent data 396 to generate an MTU future value report 400.

For an MTU, the patent planning unit 362 generates a year-by-year MTP architectural patent protection plan 402 based the forecasted patent landscape report for the MTU produced by the forecasted patent landscape unit 352, the MTU existing value report 398, the forecasted future value report 400, and on the patent position input 308. For the MTU, the expense and growth unit 364 generates a year-by-year expense and growth report 404 based on the MTU patent plan 402. The expense and growth unit 364 may adjust the year-by-year expense and growth report 404 based on the financial input 306, which includes a desired patent spend.

For each additional MTU, the patent planning unit 362 generates a unique year-by-year MTU patent plan 402 and the expense and growth unit 364 generates a unique year-by-year expense and growth report 404.

The aggregate unit 365 aggregates patent plans 402 of individual MTUs into an overall patent plan 406, which covers multiple MTUs of interest to a user. The aggregate unit 365 also aggregates the expense and growth reports 404 of the individual MTUs into an overall expense and growth report 408.

The adjust unit 367 compares the overall expense and growth report 408 in light of the financial input 306. If the overall cost is too high, the adjust unit 367 adjusts, for one or more MTUs, the desired patent position 410 and/or patent spend 412. This can be done on a year-by-year basis and an MTU-by-MTU basis to best balance spend and patent position for the MTUs.

Figure 31:
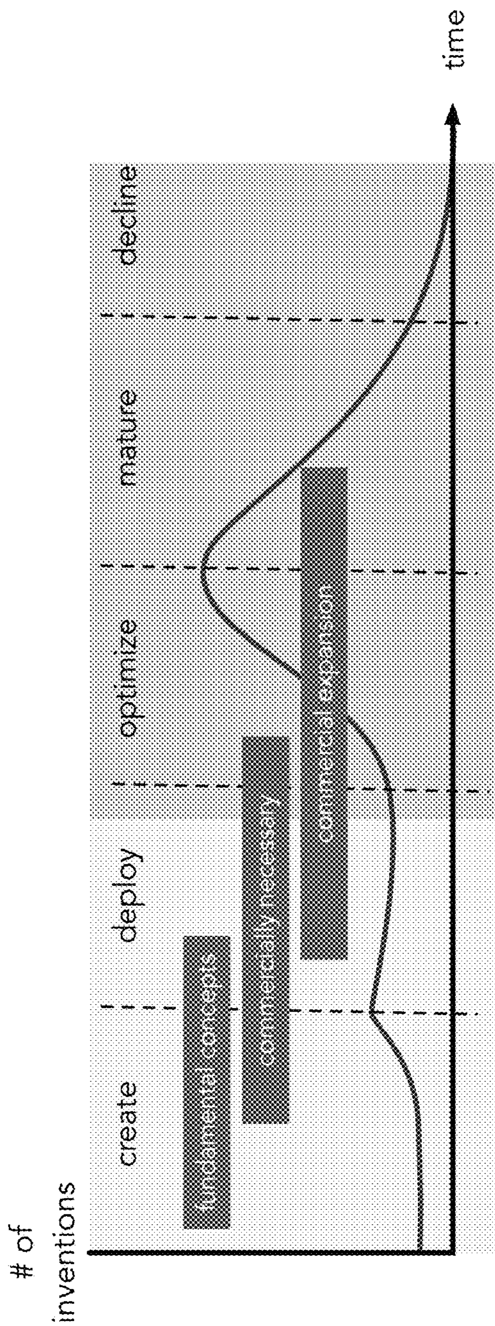
FIG. 31 is a diagram of an example of a relative number of inventions being created over the life of a technology (one or more market-tech units [MTUs)]

FIG. 31 is a diagram of an example of a relative number of inventions being created over the life of a technology (a market-tech unit [MTU)]. A generational life of an MTU includes a create phase, a deploy phase, an optimize phase, a mature phase, and a decline phase. In the create phase, the MTU is being created and not yet commercialized. In the deploy phase, an initial commercial embodiment of the MTU is made publicly available. In the optimize phase, commercial embodiments of the MTU are optimized for performance, production costs, features, and/or other optimizations and revenue from the commercial embodiments increases. In the mature phase, the commercial embodiments of the MTU are optimized and revenue from the commercial embodiments increases at a decreasing rate. In the decline phase, revenue from the commercial embodiments of the MTU decreases at an increasing rate.

The creation of inventions occur over the life of the MTU. In general, the relative number of inventions is depicted by the line. Fundamental inventions are typically created during the create phase and a portion of the deploy phase. Commercially necessary inventions are typically created in part of the create phase, throughout the deploy phase and into the optimize phase. Commercial expansion inventions are typically created in part of the deploy phase through the mature phase and into the decline phase.

Figure 32:
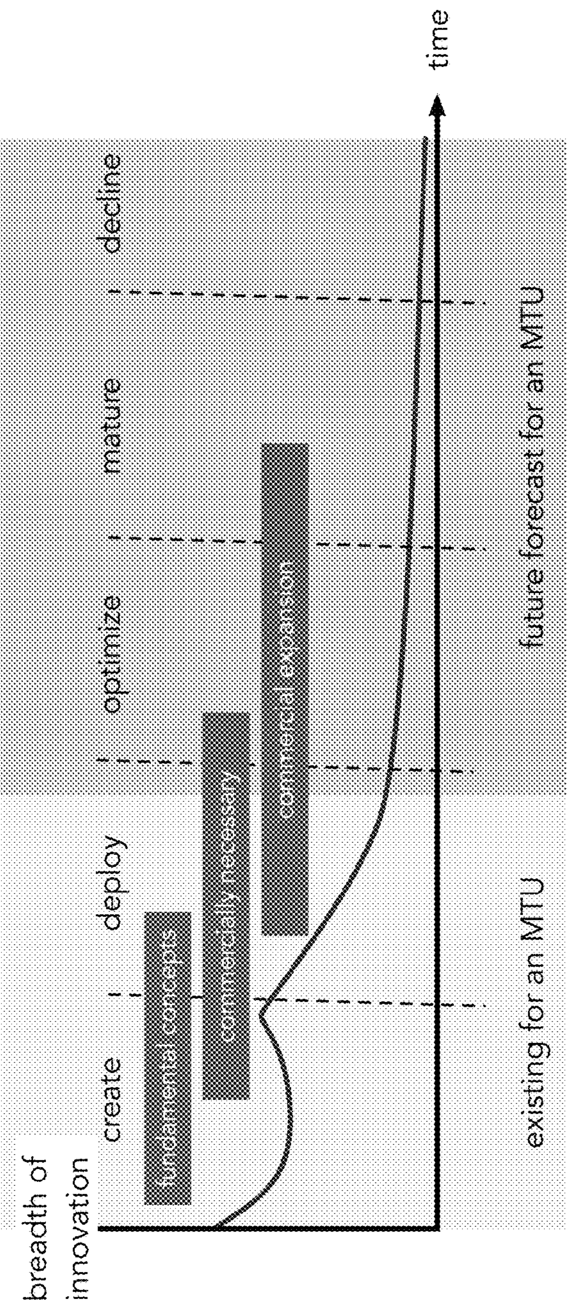
FIG. 32 is a diagram of an example of a relative invention breadth of inventions being created over the life of a technology (one or more market-tech units [MTUs)]

FIG. 32 is a diagram of an example of a relative invention breadth of inventions being created over the life of a technology (a market-tech unit [MTU)]. In general, fundamental inventions have more breadth than commercially necessary inventions, which have more breadth than commercial expansion inventions.

Figure 33:
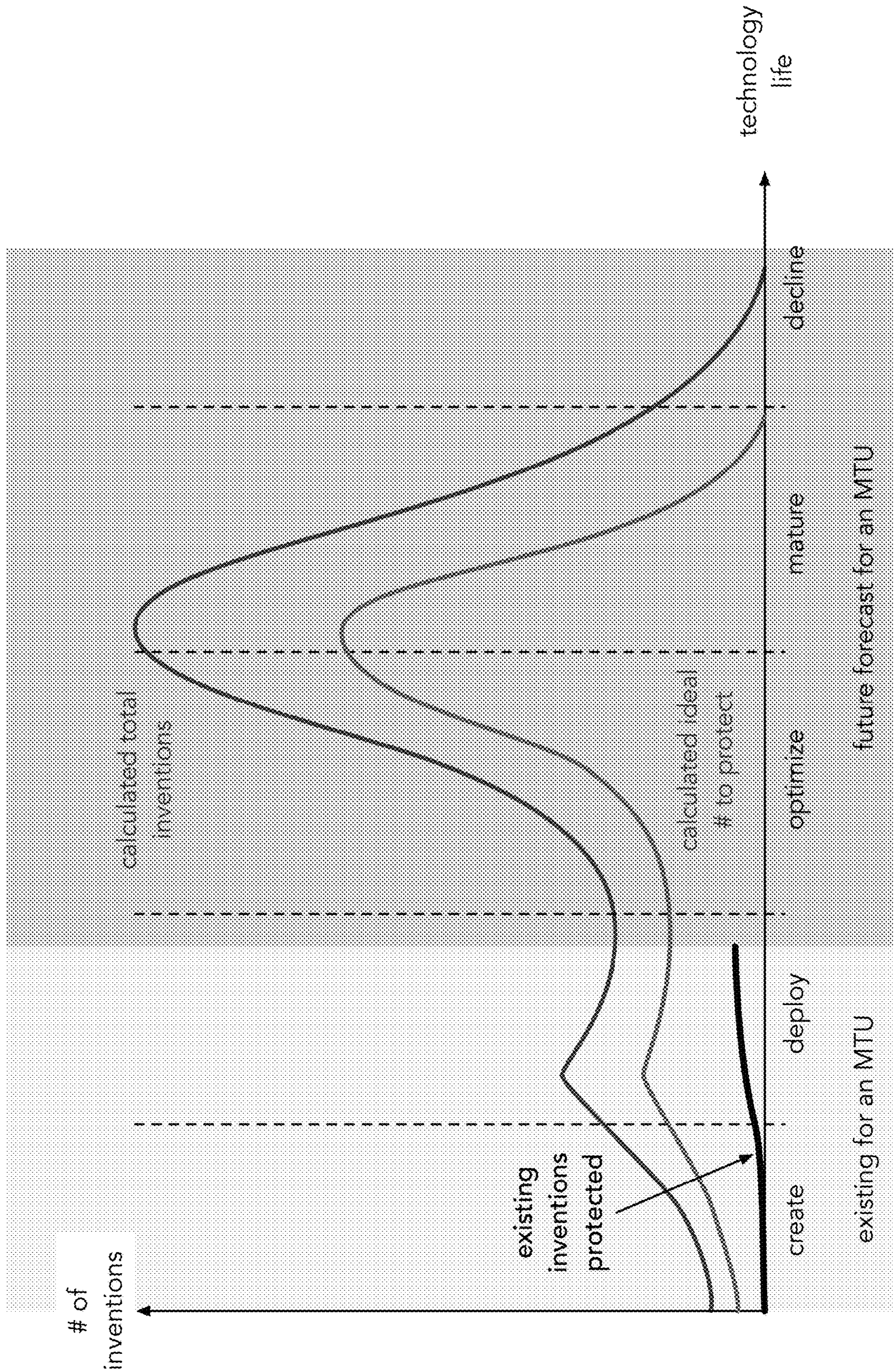
FIG. 33 is a diagram of an example of a relative total number of inventions, a relative ideal number of inventions over the life of a technology (one or more market-tech units [MTUs)], and existing inventions protected to date.

FIG. 33 is a diagram of an example of a relative total number of inventions, a relative ideal number of inventions over the life of a technology (a market-tech unit [MTU)], and existing inventions protected to date. The blue line represents the calculated total number of inventions that are likely to be created over the life of the MTU. The red line represents the calculated ideal number of inventions that are likely to be patent protected. The black line represents the inventions that have been patent protected to date (e.g., existing inventions with patent protection).

The improved computer calculates the data of FIGS. 31-33 and it's used by the various units of the improved computer. For example, the patent planning unit 362 uses the data as part of its function to generate an architectural plan for patent protecting an MTU.

Figure 34:
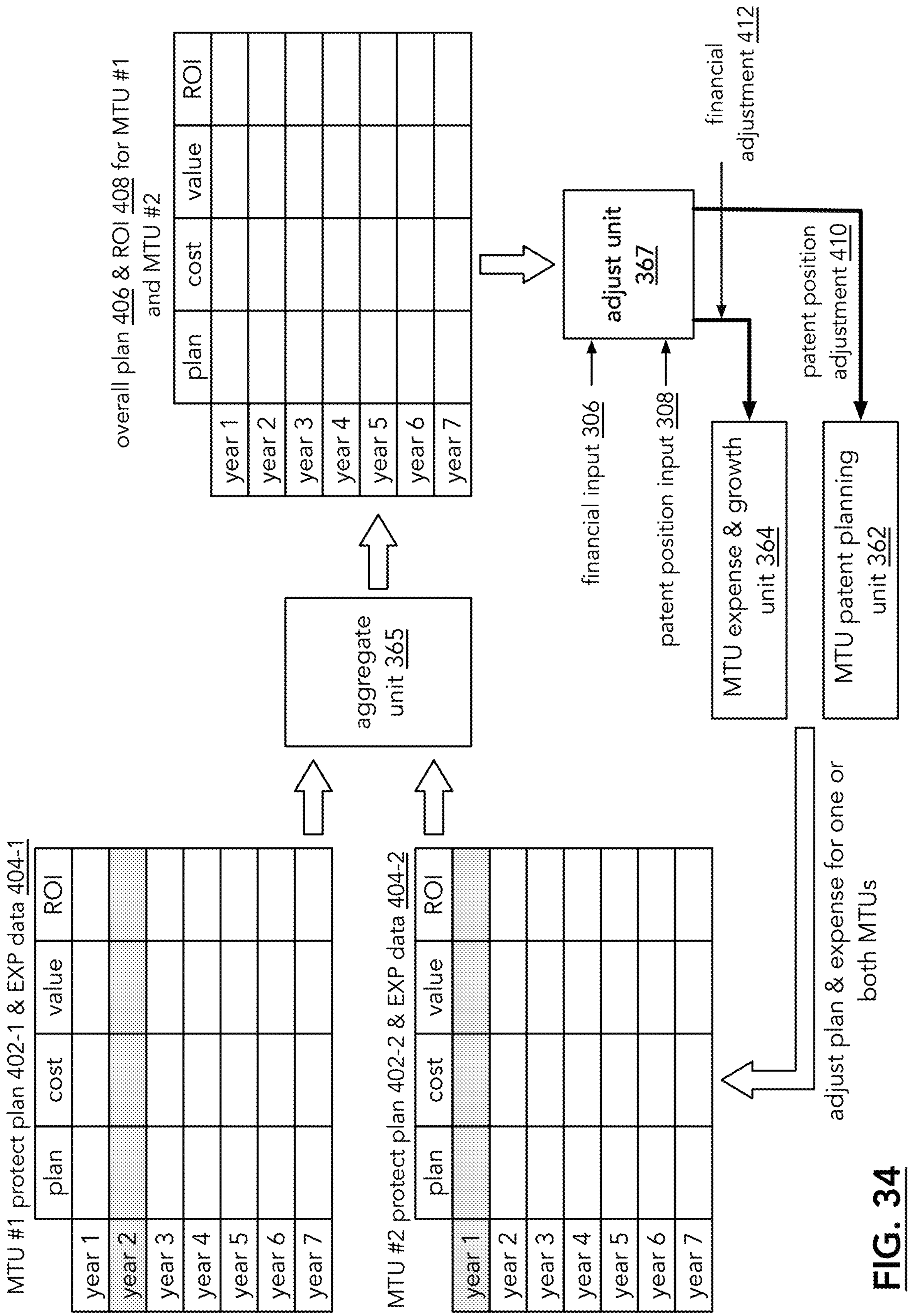
FIG. 34 is a flow diagram of another example of a generating a patent protection plan for multiple market-tech units [MTUs]

FIG. 34 is a flow diagram of another example of a generating a patent protection plan for multiple market-tech units [MTUs]. As discussed with the reference to FIG. 30, the adjust unit 367 generates a financial adjustment 412 and/or a patent position adjustment 410 for an architectural plan for one or more MTUs.

In this example, the architectural plan, the corresponding expense, the corresponding value, and the corresponding ROI are created for two MTUs on a year-by-year basis. After the aggregate unit 365 combined the two reports, the adjust unit 367 adjusted the patent position and cost for MTU #2 in year 1 and adjusted the patent position and cost for MTU #1 in year 2. The other years remain as originally calculated.

Figure 35:
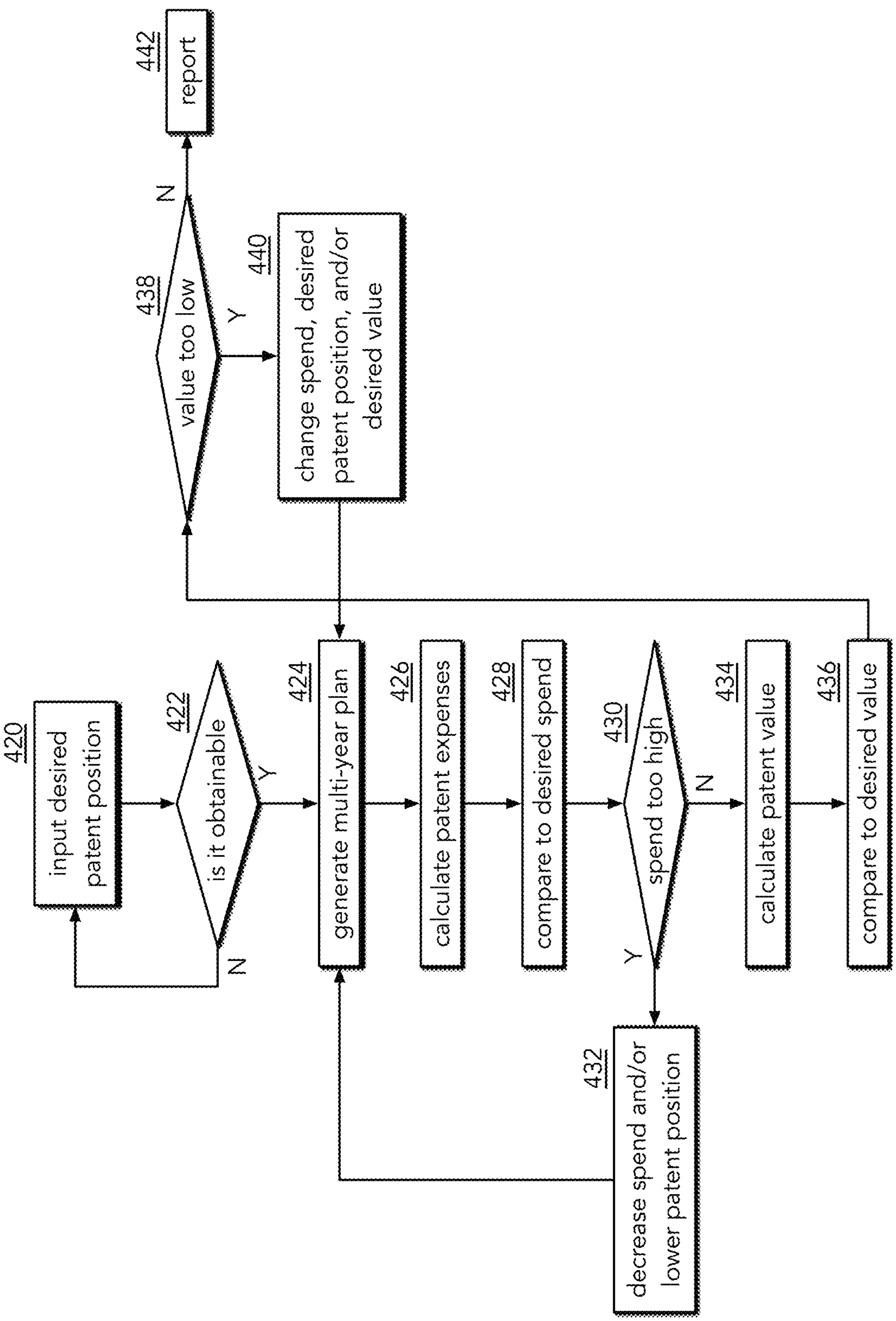
FIG. 35 is a logic diagram of an example of a method for generating a patent protection plan regarding a technology (one or more market-tech units [MTUs)]

FIG. 35 is a logic diagram of an example of a method for generating a patent protection plan regarding a technology (a market-tech unit [MTU)]. The method begins at step 420 where the improved computer receives an input for a desired patent position (e.g., a sliding scale from weak to superior). The method continues at step 422 where the improved computer determines whether the inputted patent position is obtainable.

To determine whether the desired patent position is obtainable, the improved computer determines the total number of inventions and invention types that are likely to be created over the life of the MTU, the ideal number of inventions and invention types to patent protect over the life of the MTU, the current phase, and the number of inventions that have been patent protected to date (e.g., existing patent protection). From this data, the improved computer determines the patent positioned achieved to date (e.g., a comparison of the existing patent protection with the ideal number of inventions that should have been patent protected to date).

If the achieved to date patent position is comparable to the inputted desired patent position, then the desired patent position is obtainable. If the achieved to date patent position is less than the inputted desired patent position, the improved computer determines whether a sufficient number and type of inventions remain to be created (e.g., future forecasted patent protection) to obtain the desired patent position. If so, the desired patent position is obtainable. If not, the desired patent position is not obtainable.

If the desired patent position is not obtainable, the method repeats at step 420. If the desired patent position is obtainable, the method continues at step 424 where the improved computer generates a year-by-year multi-year architectural plan for patent protecting an MTU. The method continues at step 426 where the improved computer generates a year-by-year cost report for the plan.

The method continues at step 428 where the improved computer compares, on a year-by-year basis, the calculated costs with a desired patent spend. The method continues at step 430 where the improved computer determines whether the calculated costs exceeds the desired patent spend. Typically, the comparison will prioritize the calculated costs and desired patent spend for the current year, then for the next year, and so on.

If the calculated costs exceed the desired spend, the method continues at step 432 where the improved computer receives an input to decrease the desired spend for a given year, or years, and/or to decrease the desired patent position. Note that, to keep the cost of the current year and the following year at desired patent spends, the invention protection rate in subsequent years can be increase so that the desired patent position can still likely be obtained. After step 432, the method repeats at step 424.

When the calculated costs are not too high (e.g., are comparable to the desired patent spend), the method continues at step 434 where the improved computer calculates the year-by-year value of the MTU. The method continues at step 436 where the improved computer compares the calculated ROI (calculated value divided by calculated costs) with a desired ROI. The method continues at step 438 where the improved computer determines whether the calculated value and/or the calculated ROI are too low. If yes, the method continues at step 440 where the improved computer receives an input to change the patent spend, the desired patent position, the desired value, and/or the desired ROI and the method repeats at step 424.

When the calculated value and/or the calculated ROI are acceptable, the method continues at step 442 where the improved computer generates a report that includes the multi-year architectural plan, the multi-year costs, the multi-year growth of patent protection, the multi-year value of the MTU, and the multi-year ROI. Note that the improved computer routinely performs this method to update, if needed, the report as more data is ingested.

Figure 36:
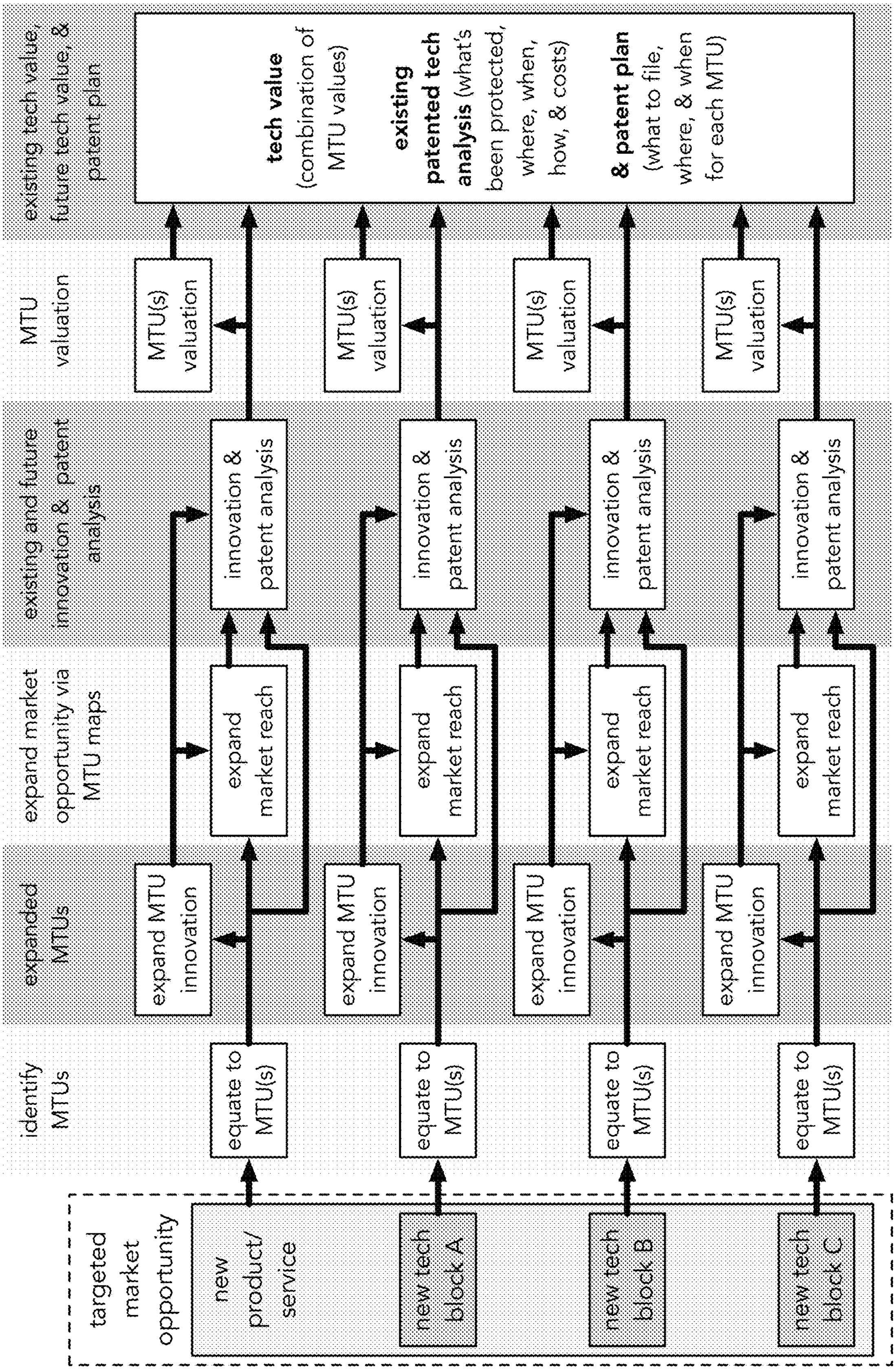
FIG. 36 is a diagram of an example of implementing a method for generating a patent protection plan regarding a technology (one or more market-tech units [MTUs)]

FIG. 36 is a diagram of an example of implementing a method for generating a patent protection plan regarding a technology (a market-tech unit [MTU)]. In this example, a new product/service is being developed for a targeted market opportunity. The new product/service includes a new tech block A, a new tech block B, and a new tech block C. This example new product is the same as used in the example of FIG. 1I. In this example, however, the improved computer generates a report for patent protecting the new product/service in accordance with the re-engineered patent process and the functions of the improved computer.

The high-level functions performed by the improved computer includes identify MTUs, expand MTUs, expand market opportunities for MTUs, perform existing and future forecasted invention and patent analysis, value the MTUs, and generate a report that includes existing value of MTUs, future value of MTUs, the forecasted costs of patent protecting the MTUs, and an architectural plan to patent protect the MTUs.

To begin, the improved computer equates the new product to an MTU, the new tech block A to an MTU, the new tech block B to an MTU, and the new tech block C to an MTU. An equated MTU may be an existing MTU or a new MTU. Note that the product and each of the tech blocks could include multiple MTUs, but for simplicity of discussion, each only includes one MTU.

With the MTUs identified, the improved computer attempts to expand the innovation level of the MTUs. In general, the innovation focus of the new product and its new tech blocks is initially targeted to producing a commercially viable product. The improved computer expands the fundamental, commercially necessary, and commercial expansion inventions beyond the commercially viable product to encompass how each MTU influences the markets of interests, which ties into the next step. From the MTUs and expanded innovation of the MTUs, the improved computer expands the market reach (e.g., market opportunities) for each MTU beyond the targeted market opportunity.

The improved computer then performs an innovation and patent analysis for each of the MTUs. This involves calculating the total number of inventions that are likely to be created over the life of an MTU, the ideal number of inventions to patent protect over the life of the MTU, the existing patent protection of inventions, and a future forecast of patent protection for inventions.

Next, the improved computer calculates the year-by-year value of each of the MTUs and then generates the report. As an example, the improved computer calculated that the desired number of inventions to protect for each of the MTUs is 15 for the product MTU, 12 for the tech block A MTU, 9 for the tech block B, and 18 for the tech block C MTU. By patent protecting this number of inventions and the corresponding invention types, the desired patent position (e.g., superior) is obtained.

In comparison with the conventional patent process example of FIG. 1I, 1 invention was patent protected for the product while the improved computer determined that 15 inventions of particular types should be patent protected. In the conventional patent process example, 0 inventions were patent protected for tech block A while the improved computer determined that 12 inventions of particular types should be patent protected.

In the conventional patent process example, 22 inventions were disclosed and 15 of them were patent protected for tech block B, while the improved computer determined that 9 inventions of particular types should be patent protected. In the conventional patent process example, 5 inventions were disclosed and 4 of them were patent protected for tech block C while the improved computer determined that 18 invention of particular types should be patent protected.

The under and over patenting of the product and its tech blocks of the conventional patent process would not be realized until a patent dispute arose regarding the product and/or its tech blocks. With re-engineered patent process supported by the improved computer, the product manufacturer has confidence from day 1 of developing the product and its tech blocks that, by following the report produced by improved computer, the manufacturer will have a superior patent position if a patent dispute arises regarding the product and/or its tech blocks.

Figure 37:
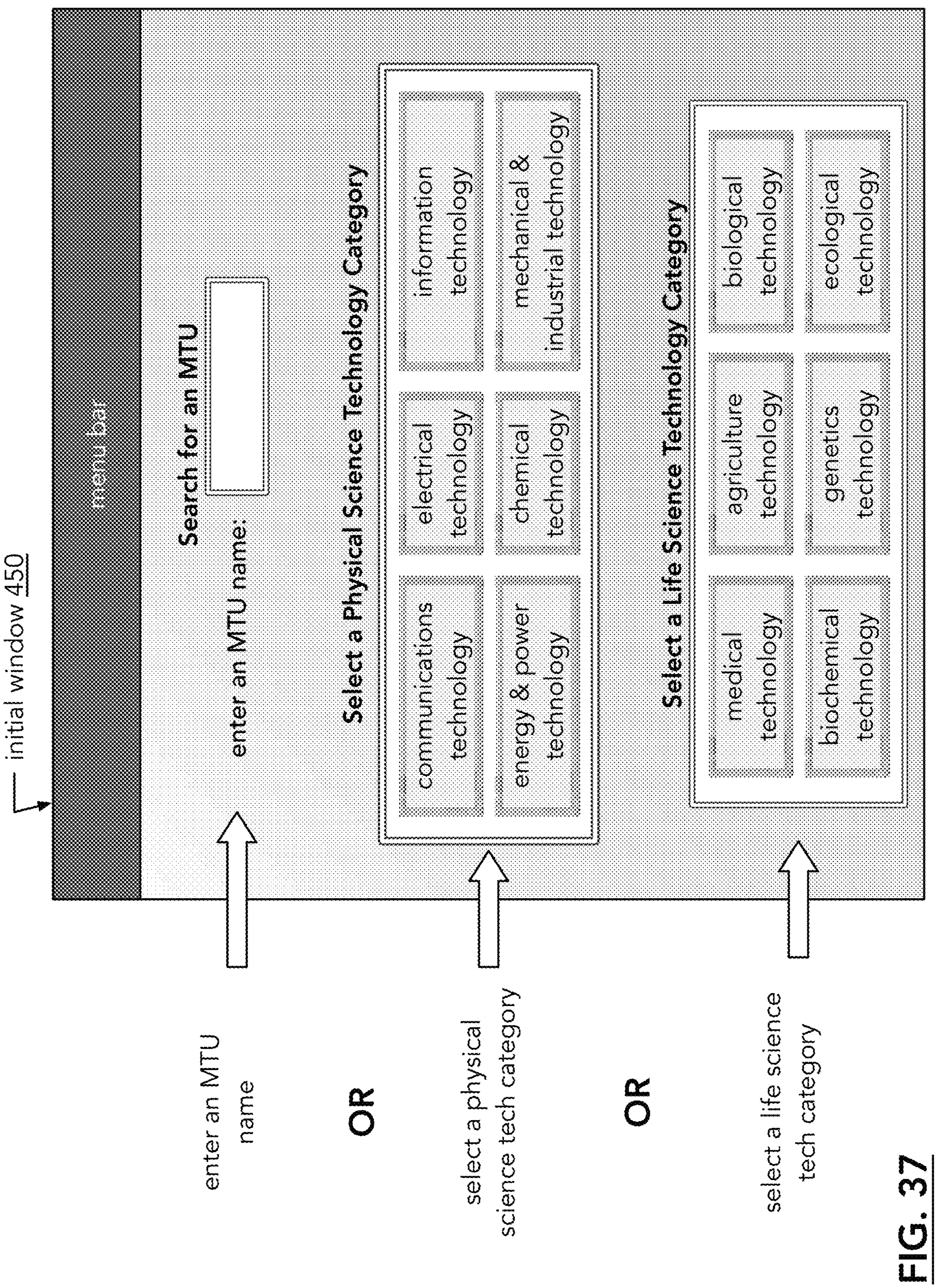
FIG. 37 is a schematic block diagram of an example of a graphical user interface (GUI) of an improved computer for technology.

FIG. 37 is a schematic block diagram of an example of a graphical user interface (GUI) of an improved computer for technology for initiating an MTU query. The initial search window 450 includes a field for entering an MTU name, a first set of buttons for selecting a physical science technology category, and a second set of buttons for selecting a life science technology category. The initial window 450 may further includes additional sets of buttons for other technology categories and/or a set of buttons for various technology sub-categories. A button may include a general description via a right click on the button and/or a hover over the button.

In another embodiment, the initial search window 450 includes one or more of a field for a patent holder's name, a field for a product and/or service name, a field for a unique value proposition, a field for marketable features, a field for technical challenges, and a field for problems. A field may include a drop-down window for selecting from a list of relevant names.

Figure 38A:
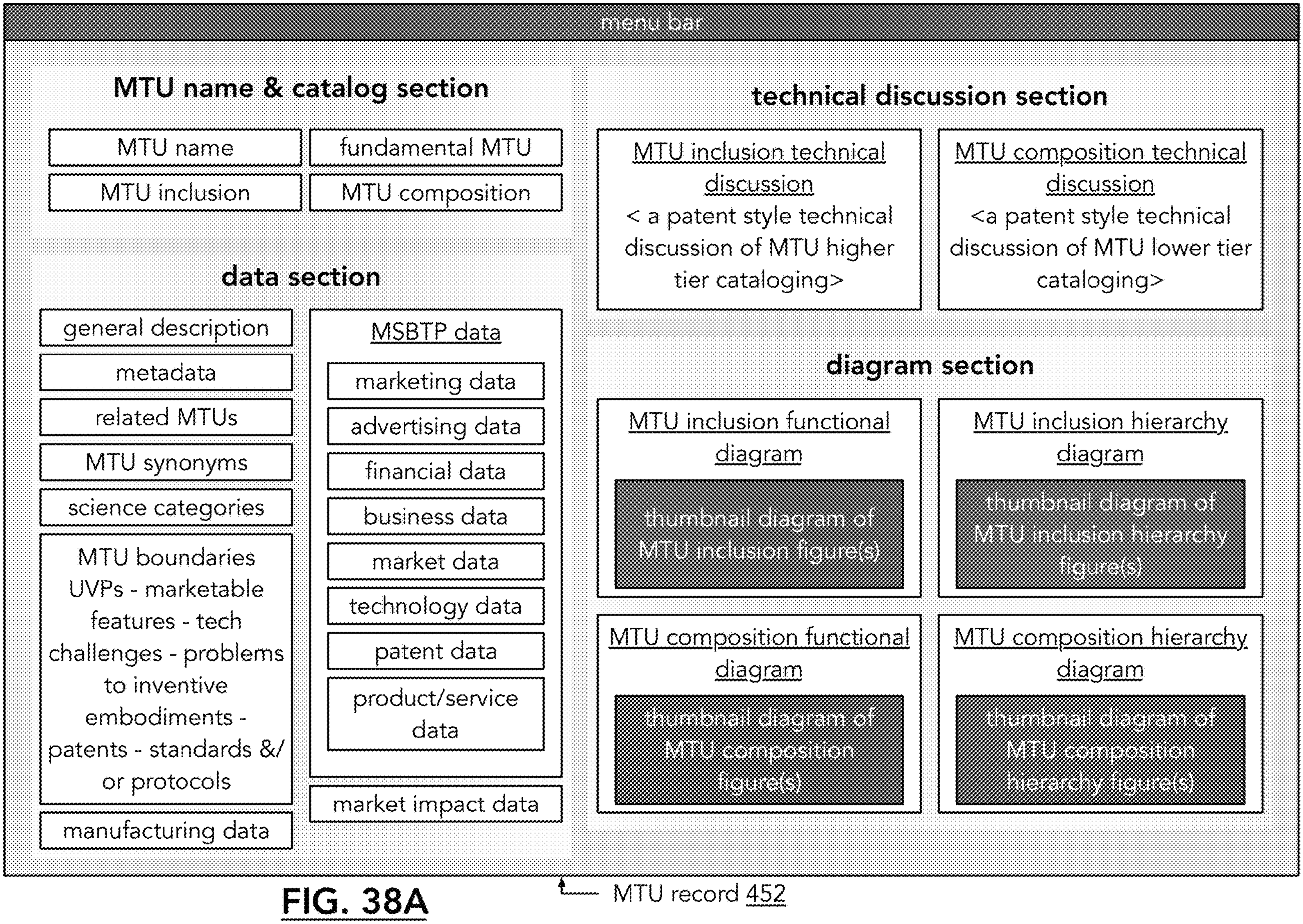
FIG. 38A is a schematic block diagram of an example of a user-interactive graphical representation of a market-tech unit (MTU) data record of an MTU database.

FIG. 38A is a schematic block diagram of an example of a user-interactive graphical representation of a market-tech unit (MTU) data record 452 of the MTU database. In an embodiment, an MTU record includes an MTU name & catalog section, a data section, a technical discussion section, and a diagram section. The MTU name & catalog section includes fields for an MTU name, MTU inclusion information (higher tier MTUs), MTU composition information (lower tier MTUs), and an indication as to whether the MTU is a fundamental MTU. As used herein, a field means an attribute of a database record that includes one or more sets of data values (where a set includes one or more data values and a data value includes digital data regarding text, audio, video, images, graphics and/or other digital content). A field may further include storage characteristics of data values within the record and/or within the database.

The data section of the MTU record 452 includes fields for a general description of the MTU, metadata, related MTUs, MTU synonyms, science categories, MTU boundaries, manufacturing data, market impact data, and MSBTP (marketing, sales, business, technical, and patent) data. The MTU boundaries field includes fields for unique values propositions of the MTU, marketable features of the MTU, technical challenges of the MTU, problems to inventive embodiments information, and standards information. The MSBTP data section includes fields for marketing data, advertising data, financial data, business data, market data, technology data, patent data, and product/service data.

The diagram section includes fields for one or more MTU inclusion functional diagrams, one or more MTU inclusion hierarchy diagrams, one or more MTU composition functional diagrams, one or more MTU composition hierarchy diagrams, and one or more MTU composite diagrams. The inclusion diagrams include the MTU and higher tier MTUs. The composition diagrams include the MTU and lower tier MTUs. The composite diagrams include multiple higher tiers of MTUs and/or multiple lower tiers of MTUs.

Each diagram uses symbols (e.g., electrical symbols, graphic images, labeled box, etc.) to represent MTUs. The MTUs are coupled together based on MTU interaction between them. The interaction is labeled in accordance with the technology category. For example, MTU interaction for electrical technology diagrams are labeled with, as a non-exhaustive example list, signal type, signal flow, signal level, current, voltage, power, signal manipulation, etc. As another example, MTU interaction for communication technology diagrams are labeled with, as a non-exhaustive example list, audio in, audio out, video in, video out, analog signal, digital signal, etc. As a further example, MTU interaction for chemical technology diagrams are labeled with, as a non-exhaustive example list, combustion reaction, electrical reaction, decomposition reaction, neutralization reaction, precipitation reaction, synthesis, etc.

The technical discussion section includes fields for MTU inclusion technical discussion and MTU composition technical discussion. Each technical discussion is written in a manner for a person of average skill in the art to understand the use concepts of the MTU within the technical environment(s) in which it resides (i.e., a discussion of the MTU inclusion functional diagram) and to understand the operational concepts of the MTU based on the MTUs it includes (i.e., a discussion of the MTU composition functional diagram). Note that the various sections of the MTU record 452 will be described in greater detail with reference to subsequent Figures.

In an embodiment, the improved computer generates one or more MTU records for an MTU based on inclusion MTUs. For example, multiple MTU records are generated for an MTU which has more than one MTU inclusion path. For example, a touch screen is used in portable computing devices such as cell phones, tablets, smart phones, laptops, and two-way radios. In this example, five MTU records would be created, one for an MTU inclusion path to cell phones, a second for an MTU inclusion path to tablets, and so on. An example of this type of MTU record is shown in FIG. 38B.

Figure 39:
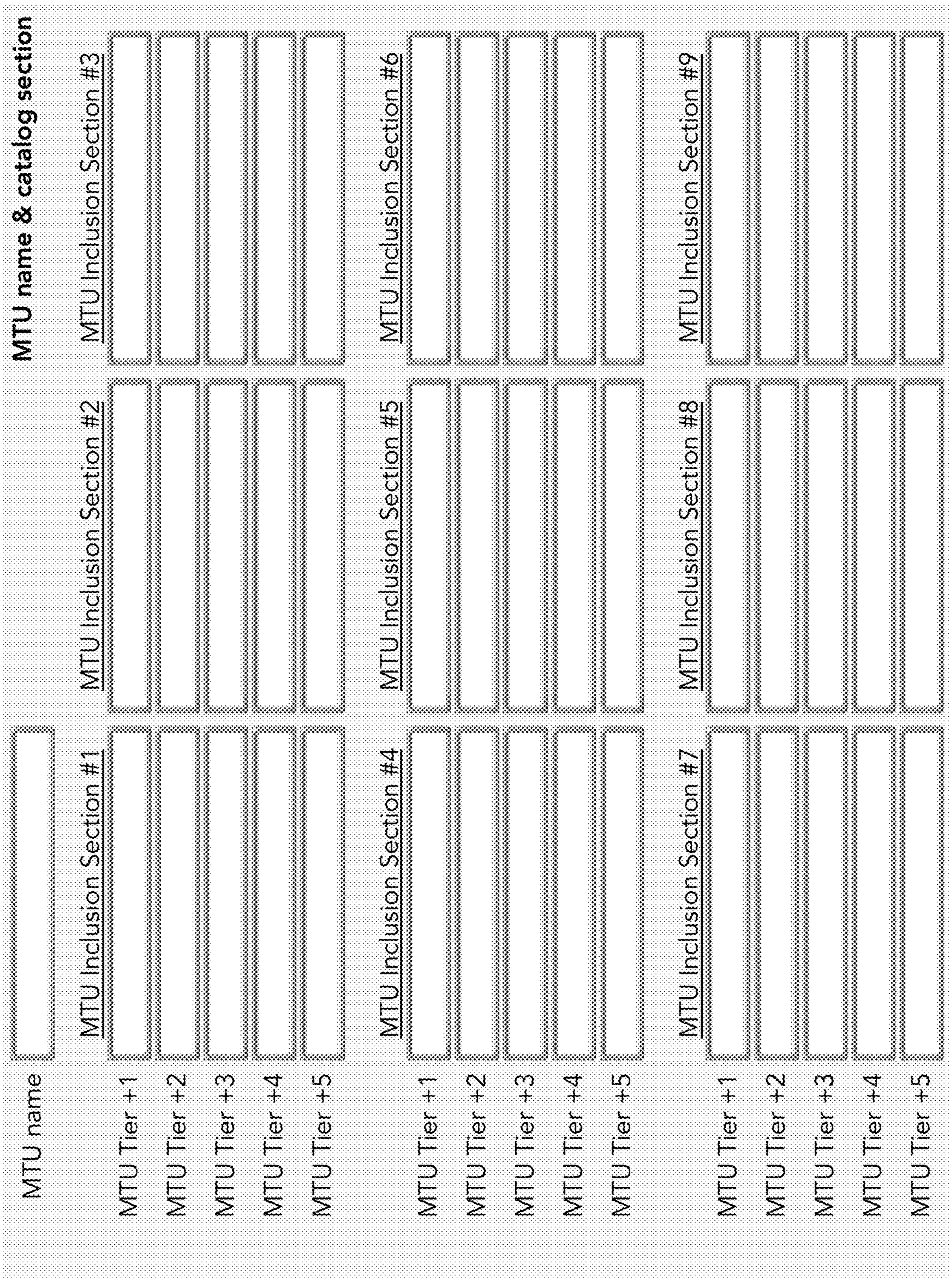
FIG. 39 is a schematic block diagram of another example of a graphical user-interactive representation of an MTU naming and catalog section of a market-tech unit (MTU) data record of an MTU database.

Alternatively, the improved computer generates one MTU record for the touch screen and the record includes a plurality of MTU inclusion path sections. For example, the MTU record includes an MTU inclusion path for cell phones, an MTU inclusion path for tablets, and so on. An example of this type of MTU record is shown in FIG. 39. The mapping of an MTU to inclusion MTUs and/or to composition MTUs is referred, herein, as cataloging an MTU.

Figure 38B:
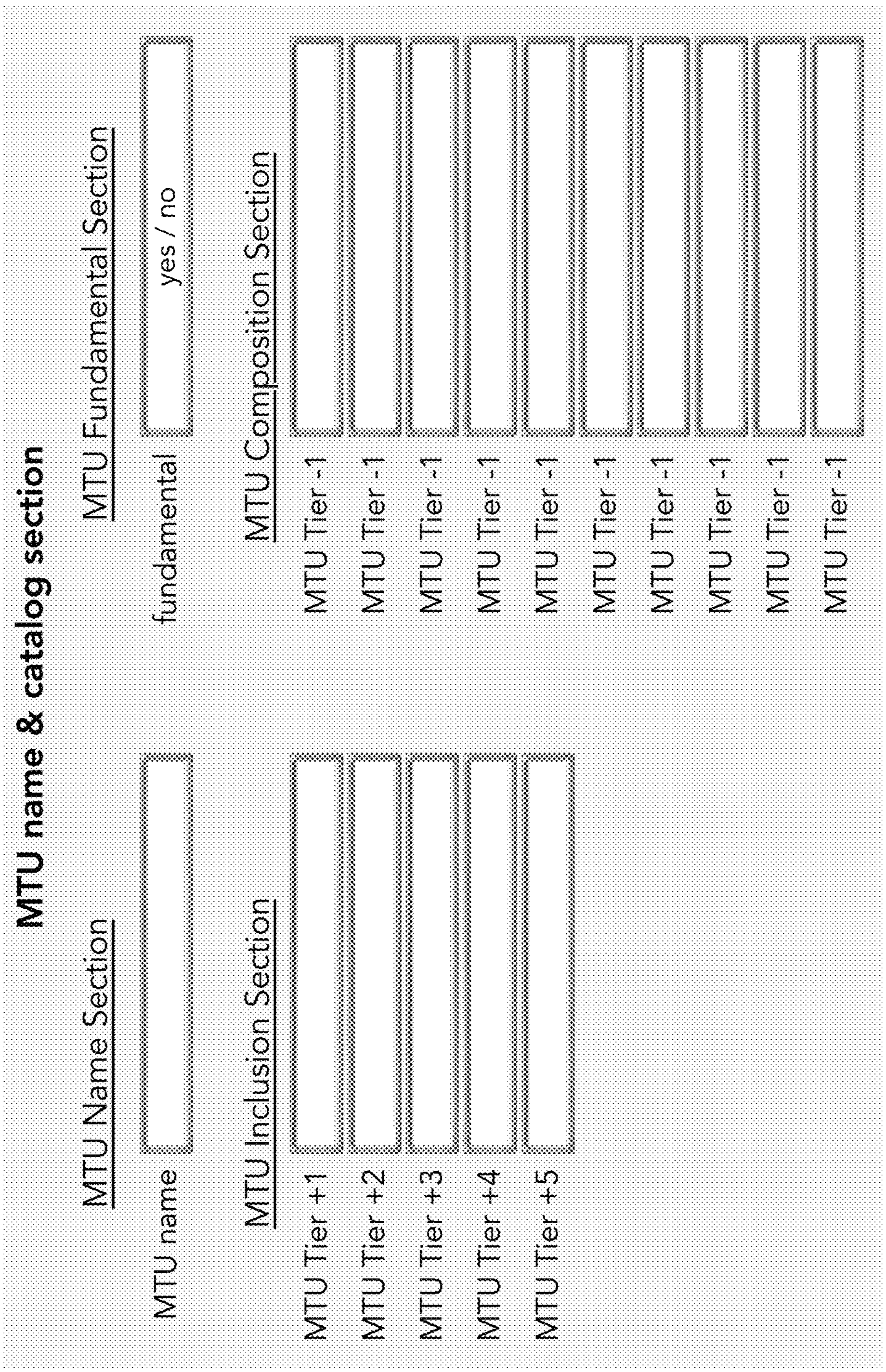
FIG. 38B is a schematic block diagram of an example of a user-interactive graphical representation of an MTU naming and catalog section of a market-tech unit (MTU) data record of an MTU database.

FIG. 38B is a schematic block diagram of an example of a user-interactive graphical representation of an MTU naming and catalog section of a market-tech unit (MTU) data record of an MTU database. This section includes a MTU Name Section, an MTU inclusion section, an MTU Fundamental Section, and an MTU Composition Section. The MTU Name Section includes a field for the MTU name. An MTU name is determined by the improved computer based on an initial technology map that includes the MTU and/or based on analyzing ingested documents to identify a new MTU and/or to adjust an existing MTU name based on information regarding an existing MTU extracted from the documents.

The MTU Fundamental Section includes a field to indicate whether the MTU is a fundamental MTU or not. Examples of fundamental elements of the electrical technology category are provided with reference to FIG. 40.

The MTU Inclusion Section includes fields for higher tier MTUs. For an MTU of a touch screen, the tier +1 MTU is input/output HW, the tier +2 MTU is a cell phone, the tier +3 MTU is a portable computing device, the tier +4 MTU is a computing device, and the tier MTU is CIE (communication, information, and electrical) technology.

The MTU Composition Section includes fields for tier −1 MTUs. For the example of a touch screen MTU, the tier −1 MTUs include a touch screen controller and touch screen sensors.

FIG. 39 is a schematic block diagram of another example of a graphical user-interactive representation of an MTU name and catalog section of a market-tech unit (MTU) data record of an MTU database. In this example, the name and catalog section of an MTU record includes a plurality of MTU inclusion sections. This enables one MTU record to catalog to plurality of inclusion branches of a technology map.

Figure 40:
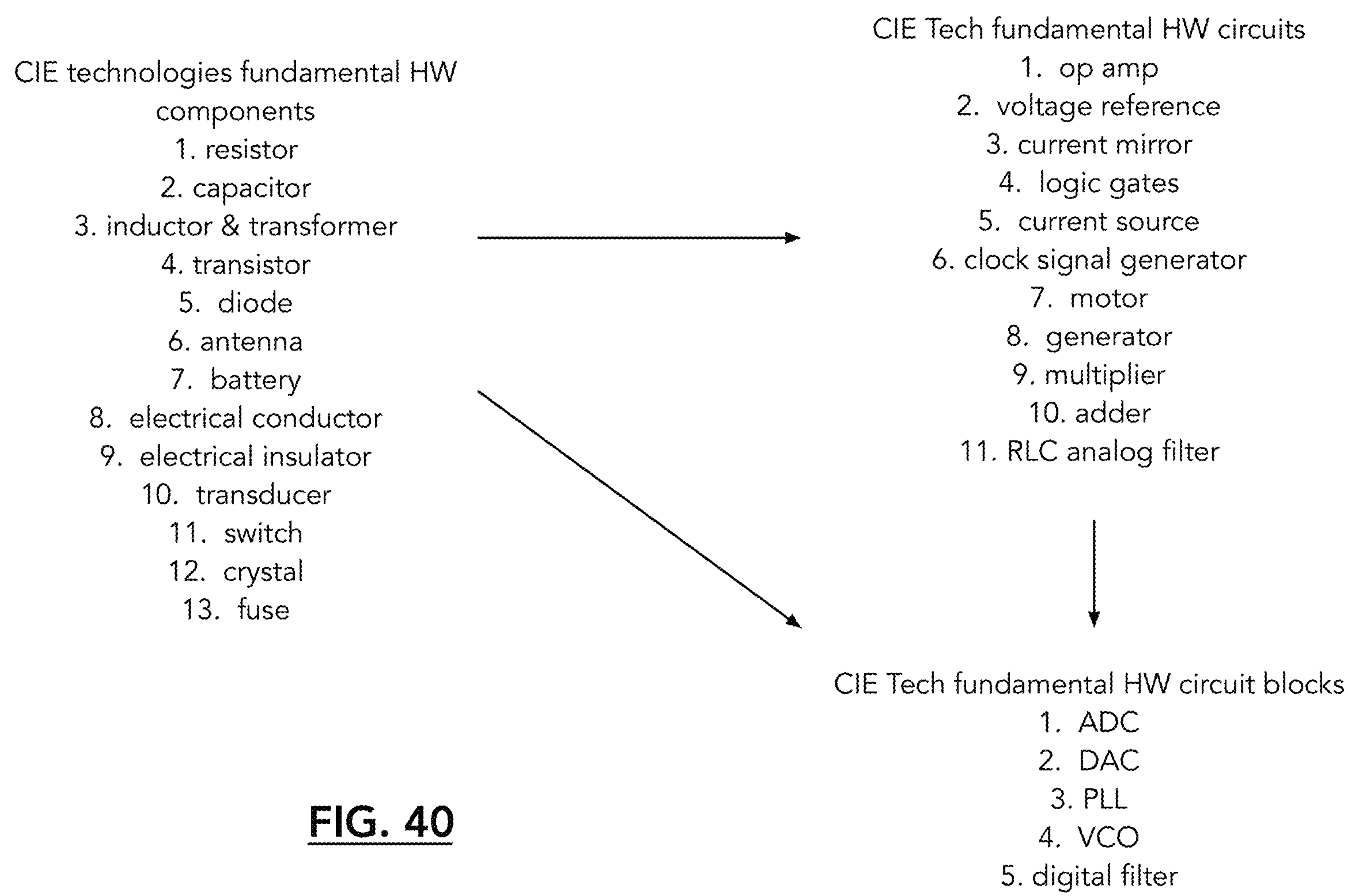
FIG. 40 is a schematic block diagram of an example of a relationship between CIE (communication, information, and electrical technologies) fundamental hardware (HW) component market-tech units (MTUs), CIE tech fundamental HW circuit MTUs, and CIE tech fundamental HW circuit block MTUs.

FIG. 40 is a schematic block diagram of an example of a relationship between CIE (communication, information, and electrical technologies) fundamental hardware (HW) component market-tech units (MTUs), CIE tech fundamental HW circuit MTUs, and CIE tech fundamental HW circuit block MTUs. In general, a fundamental hardware component is comprised of single element such as, for example but not as an exhaustive list, a resistor, capacitor, inductor, transformer, transistor, diode, antenna, battery, electrical conductor, electrical insulator, a transducer, a switch, a crystal, and a fuse.

In general, a fundamental HW circuit is comprised of two or more fundamental HW components and may further comprise one or more other fundamental HW circuits. As an example, but not as an exhaustive list, a fundamental HW circuit includes an op amp, a voltage reference, a current mirror, logic gates, a current source, a clock signal generator, a motor, a generator, a multiplier, an adder, and an RLC analog filter.

In general, a fundamental HW circuit block is comprised of one or more fundamental HW circuits and may further includes one or more fundamental HW components. As an example, but not as an exhaustive list, a fundamental HW circuit block includes an analog to digital converter, a digital to analog converter, a phase locked loop, a voltage controlled oscillator, and a digital filter.

In accordance with the MTU operating system of the improved computer, MTU records for fundamental MTUs do not include MTU inclusion data and do not include MTU inclusion diagrams. The rationale for this is that fundamental MTUs are too widely used to map every inclusion use. Fundamental MTUs are, however, referenced by other MTUs in their composition data.

Figure 41:
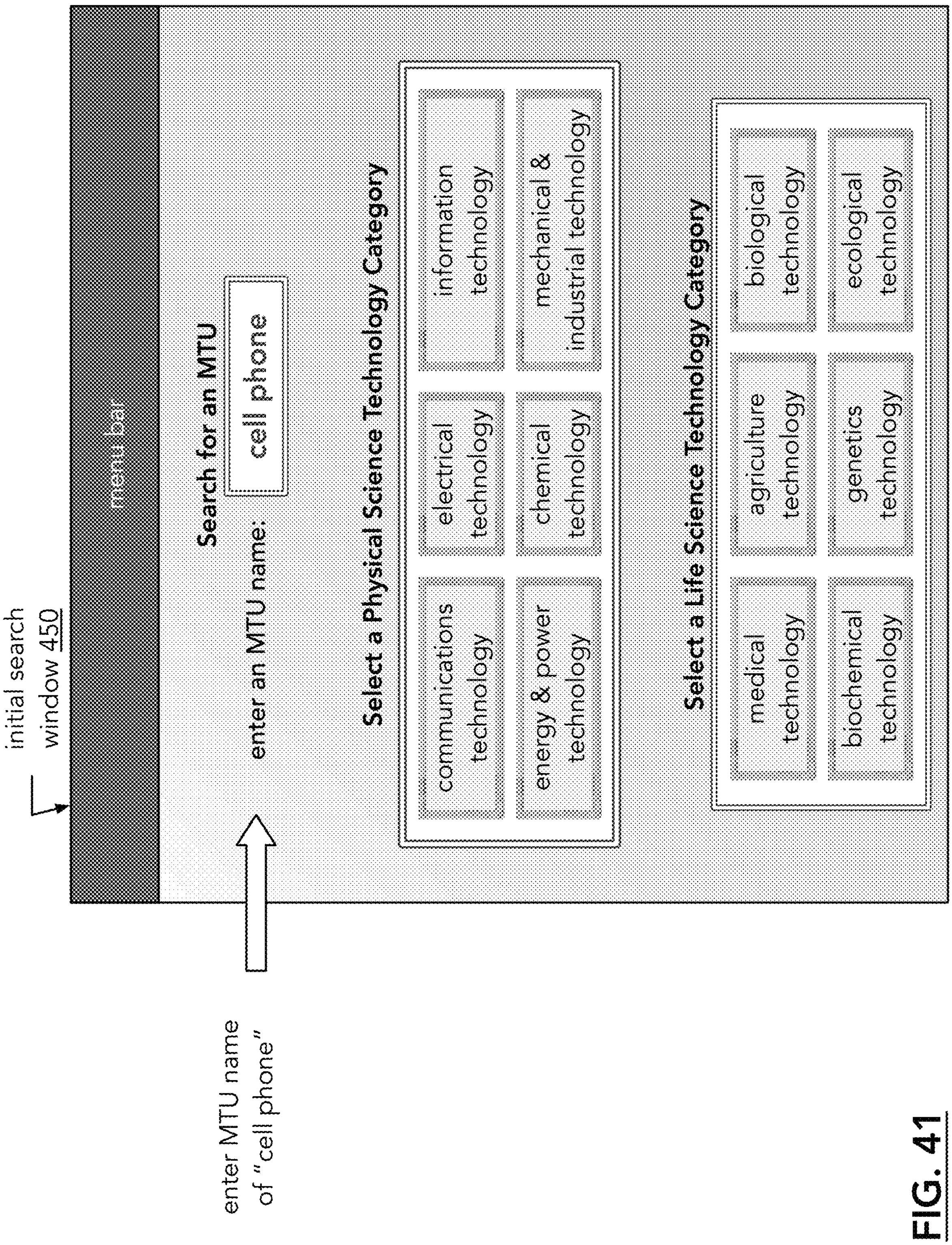
FIG. 41 is a schematic block diagram of another example of a graphical user interface (GUI) of an improved computer for technology with an entry of cell phone for an MTU name.

FIG. 41 is a schematic block diagram of another example of a graphical user interface (GUI) of an improved computer for technology with an entry of "cell phone" for an MTU name. The improved computer determines whether it has an MTU record for a "cell phone" or a synonym thereof. Synonyms of a cell phone include, but are not limited to mobile phone, smart phone, cellular phone, and cellular telephone.

If an MTU record does not exist for a cell phone, the improved computer stores the term "cell phone" as a potential new MTU term and displays a graphical message that the MTU term of "cell phone" or the like was not found.

In this example, an MTU record for a cell does exist. In this instance, the improved computer retrieves at least a portion of the MTU record for a cell phone and displays a graphical representation of the cell phone MTU record as shown in FIG. 42A.

Figure 42A:
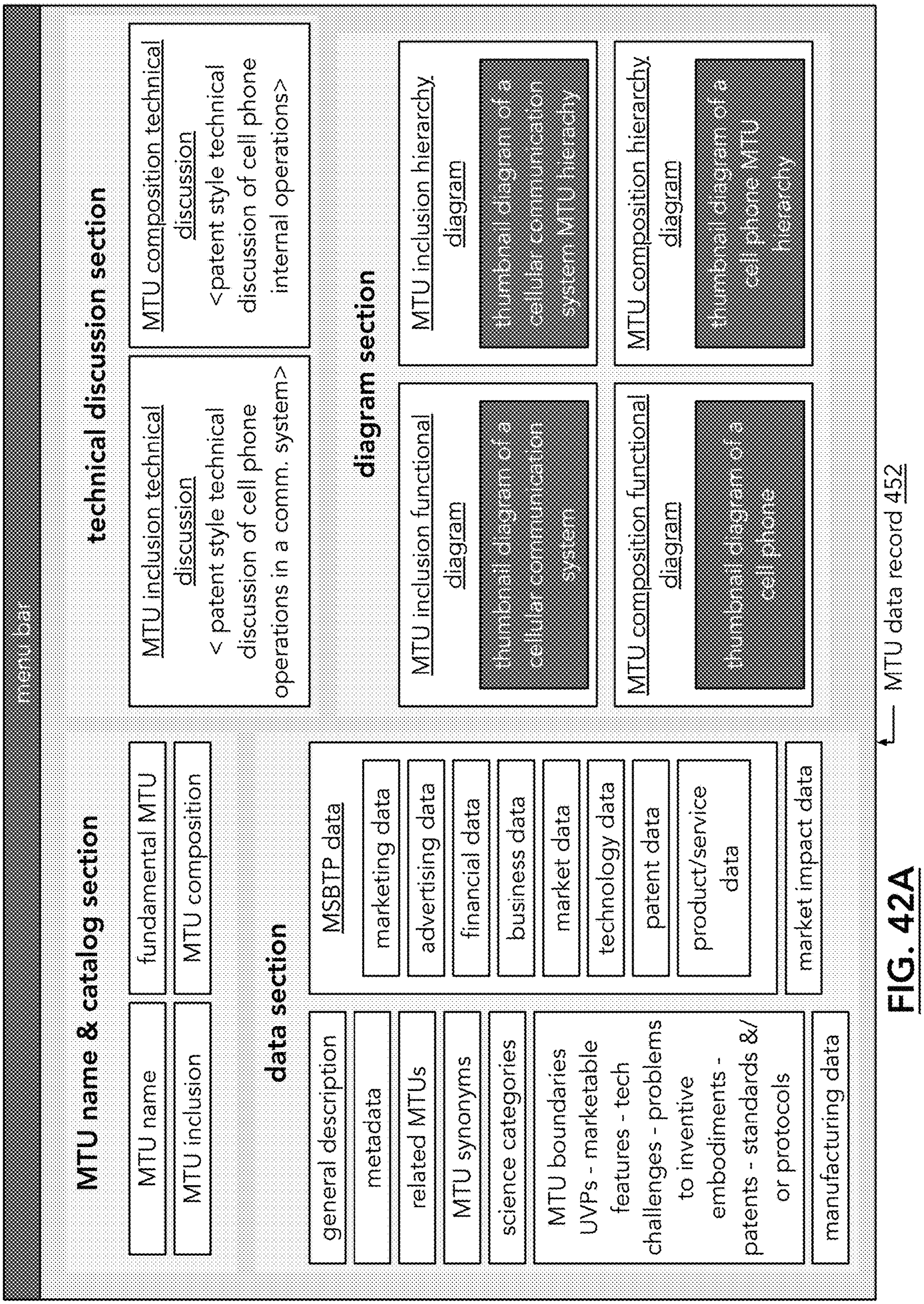
FIG. 42A is a schematic block diagram of another example of a user-interactive graphical representation of a market-tech unit (MTU) data record for a cell phone.

FIG. 42A is a schematic block diagram of another example of a user-interactive graphical representation of a market-tech unit (MTU) data record 452 for a cell phone. As discussed with reference to FIG. 38A, the MTU record includes the MTU name & catalog section, the data section, the technical discussion section, and the diagram section populated with data regarding a cell phone. More detailed examples of the sections of a cell phone MTU are discussed with reference to FIGS. 42B through 66.

Figure 42B:
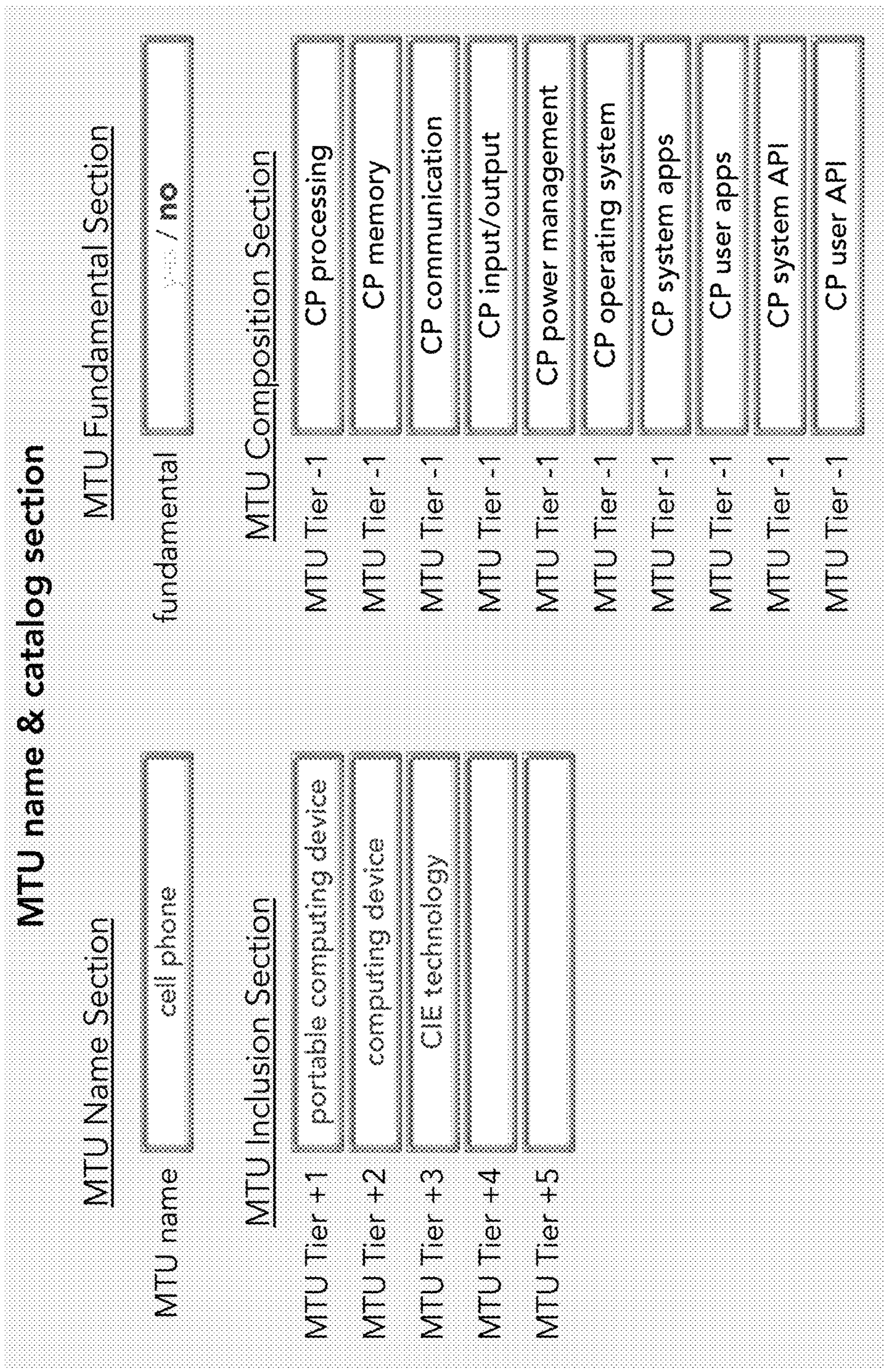
FIG. 42B is a schematic block diagram of another example of a user-interactive graphical representation of an MTU naming and catalog section of a cell phone market-tech unit (MTU) data record.

FIG. 42B is a schematic block diagram of another example of a user-interactive graphical representation of an MTU name and catalog section of a cell phone market-tech unit (MTU) data record. In this example, the MTU name field includes the phase "cell phone" and the MTU Fundamental section indicates that a cell phone is not a fundamental MTU.

The MTU inclusion section includes the phrase "portable computing device" in the MTU tier +1 field; the phrase "computing device" in the MTU tier +2 field; and the phrase "CIE technology" in the MTU tier +3 field, where CIE stands for communications, information, and electrical. Note that the MTU inclusion section may include more or less fields for more tier levels (e.g., MTU tier +6) and/or may include more fields per MTU higher tier (e.g., MTU tier +1_1, MTU tier +1_2, etc.).

The MTU composition section includes a plurality of phrases in the MTU tier −1 fields. The phrases includes CP (cell phone) processing, CP memory, CP communications, CP input/output, CP power management, CP operating system, CP system applications, CP user applications, CP system APIs, and CP user APIs. Note that the MTU composition section may include more or less MTU tier −1 fields than shown and/or may further include lower MTU tiers (e.g., MTU tier −2, MTU tier −3, etc.) associated with one or more of the MTU tier −1 fields.

Figure 43:
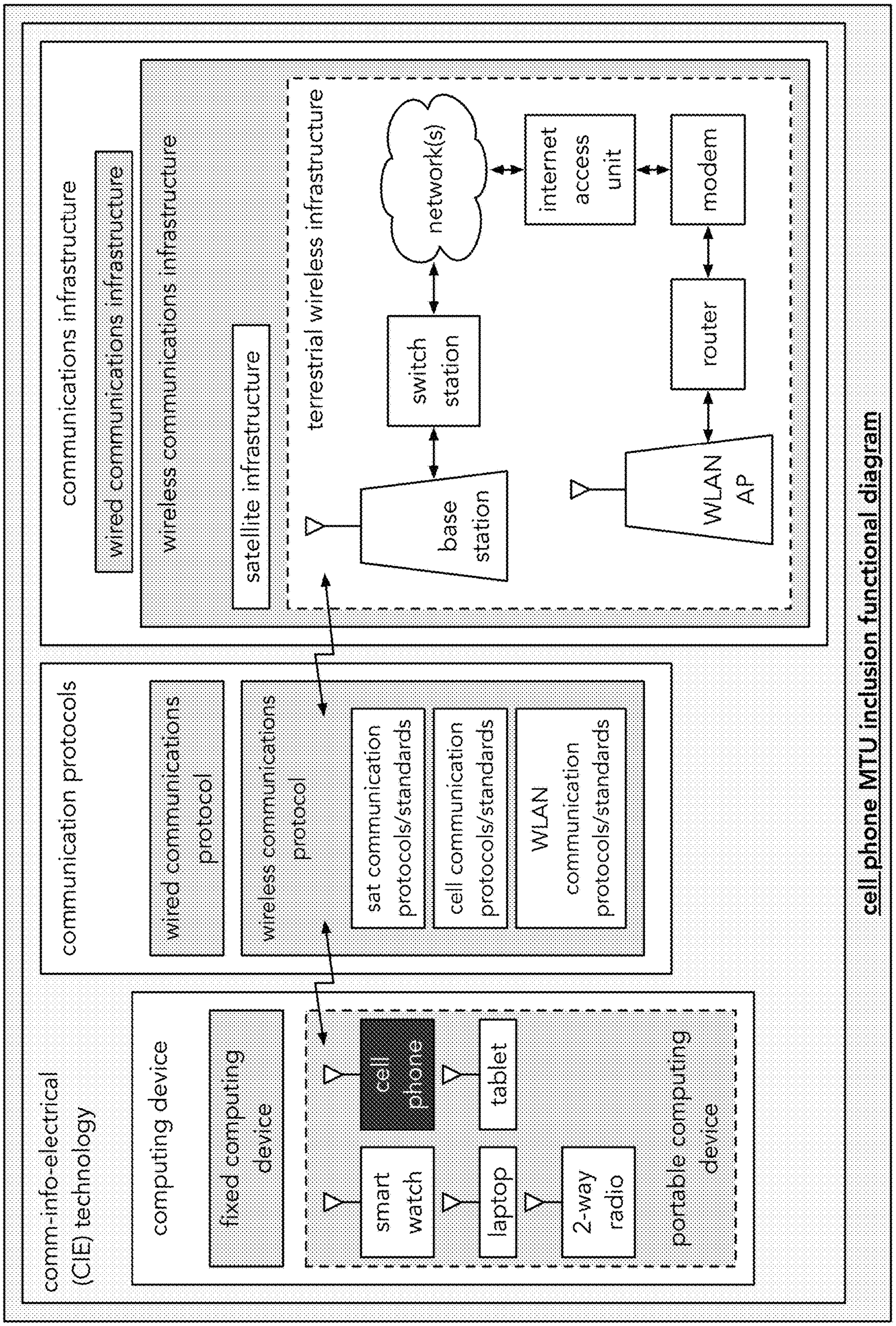
FIG. 43 is a schematic block diagram of an example of a user-interactive graphical MTU inclusion functional diagram of a cell phone market-tech unit (MTU) data record.

FIG. 43 is a schematic block diagram of an example of a user-interactive graphical MTU inclusion functional diagram of a cell phone market-tech unit (MTU) data record. In this MTU inclusion functional diagram for a cell phone, the cell phone is one of a plurality of portable communication devices that communicate wirelessly via a wireless communication protocol with a wireless communication infrastructure. The other portable computing devices, which are related MTUs, include a smart watch, a tablet, a laptop, and a 2-way radio.

The wireless communication protocols include one or more satellite communication standards and/or protocols, one or more cellular communication standards and/or protocols, and WLAN communication standards and/or protocols. Note that this example MTU inclusion diagram does not illustrate an exhaustive list of wireless communication standards and/or protocols nor does it includes the various types of satellite, cellular, and WLAN communication standards. This example MTU inclusion diagram is intended to illustrate the concept and relative simplicity of an MTU inclusion diagram. In general, an MTU inclusion diagram resembles a patent application drawing that illustrates an environment in which an MTU of interest (e.g., a cell phone) lies.

The wireless communication infrastructure includes satellite infrastructure and terrestrial wireless infrastructure. The terrestrial wireless infrastructure includes cellular infrastructure and WLAN infrastructure, both are coupled to one or more networks.

The MTU inclusion diagram may include related higher tier information. In this diagram, the tier +2 MTUs and the tier +3 MTU are shown. The tier +3 MTU is the CIE technology MTU. The tier +2 MTUs includes a computing device, communication protocols, and communication infrastructure. The computing device MTU includes the portable computing devices and fixed computing devices (e.g., personal computers, servers, etc.). The communication protocol MTU includes the wireless communication protocols and wired communication protocols. The communication infrastructure MTU includes the wireless communication infrastructure and wired communication infrastructure.

Each symbol that represents an MTU is selectable via graphics user interface function. If an MTU is selected, the improved computer interprets the selection and retrieves the corresponding MTU record from the MTU database.

Figure 44:
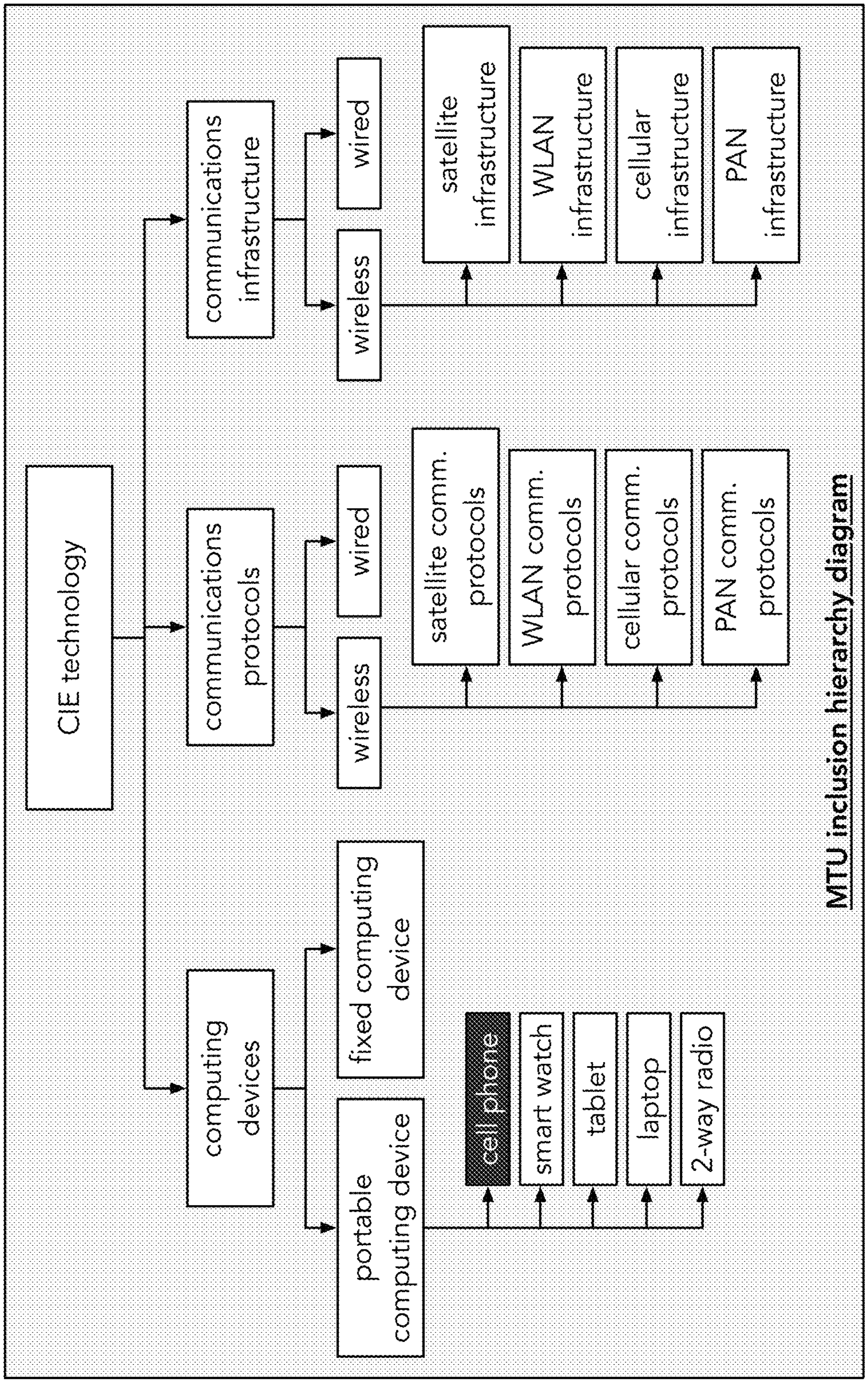
FIG. 44 is a schematic block diagram of an example of a user-interactive graphical MTU inclusion hierarchy diagram of a cell phone market-tech unit (MTU) data record.

FIG. 44 is a schematic block diagram of an example of a user-interactive graphical MTU inclusion hierarchy diagram of a cell phone market-tech unit (MTU) data record. The inclusion hierarchy diagram provides another perspective of the tiering of MTUs in a technology map. In this example, a cell phone is a tier −3 MTU, a portable computing device is a tier −2 MTU, a computing device is a tier −1 MTU, and the CIE technology is a tier 0, or root tier, MTU.

Figure 45:
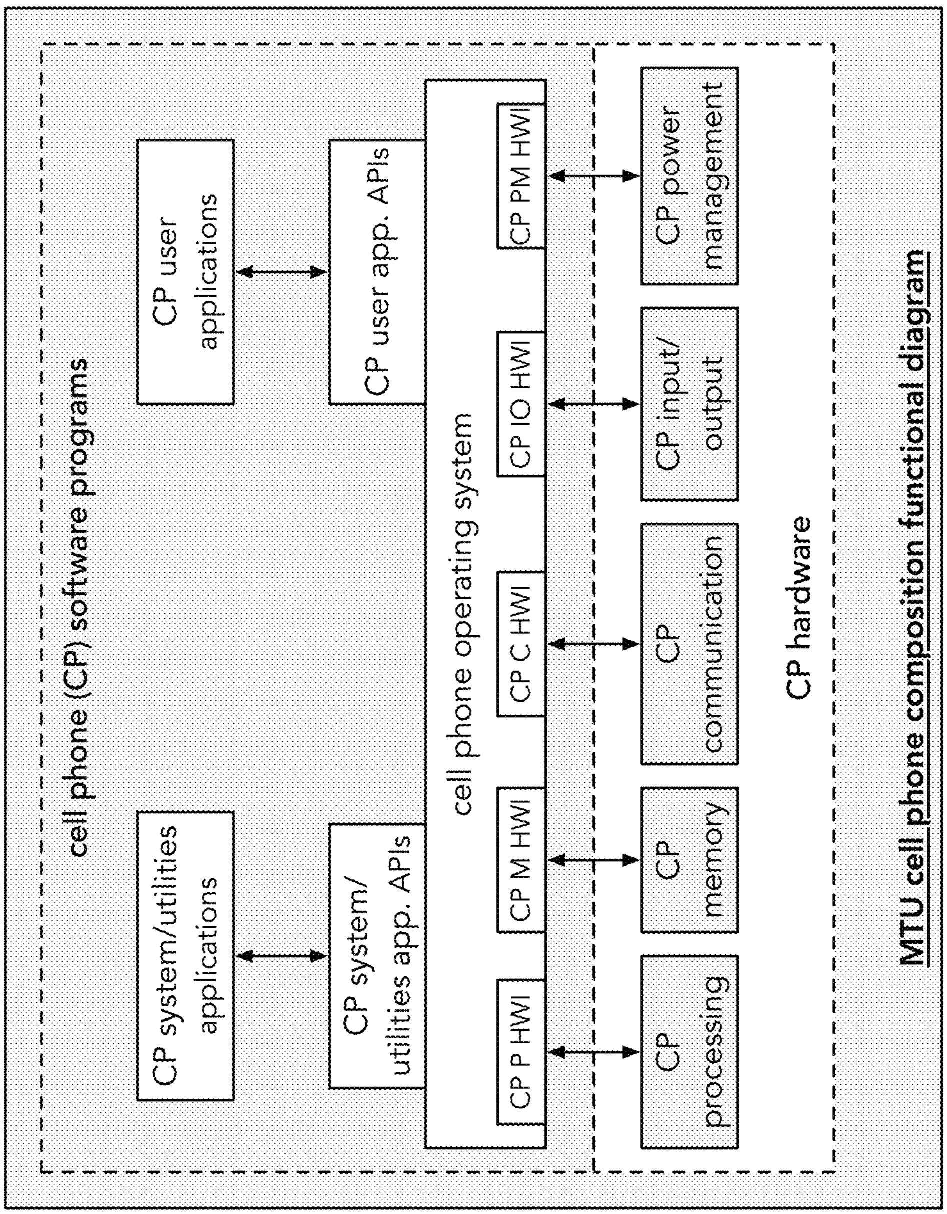
FIG. 45 is a schematic block diagram of an example of a user-interactive graphical MTU composition functional diagram of a cell phone market-tech unit (MTU) data record.

FIG. 45 is a schematic block diagram of an example of a user-interactive graphical MTU composition functional diagram of a cell phone market-tech unit (MTU) data record. A cell phone composition functional diagram includes the lower tier MTUs of a cell phone, which include a cell phone (CP) operating system, CP system/utility applications, CP user applications, CP system/utility APIs, CP user APIs, CP processing hardware, CP memory, CP communication hardware, CP input/output hardware, and CP power management hardware. These MTUs are interconnected as shown. Note that each MTU symbol is selectable via graphics user interface function. If an MTU is selected, the improved computer interprets the selection and retrieves the corresponding MTU record from the MTU database.

Figure 46:
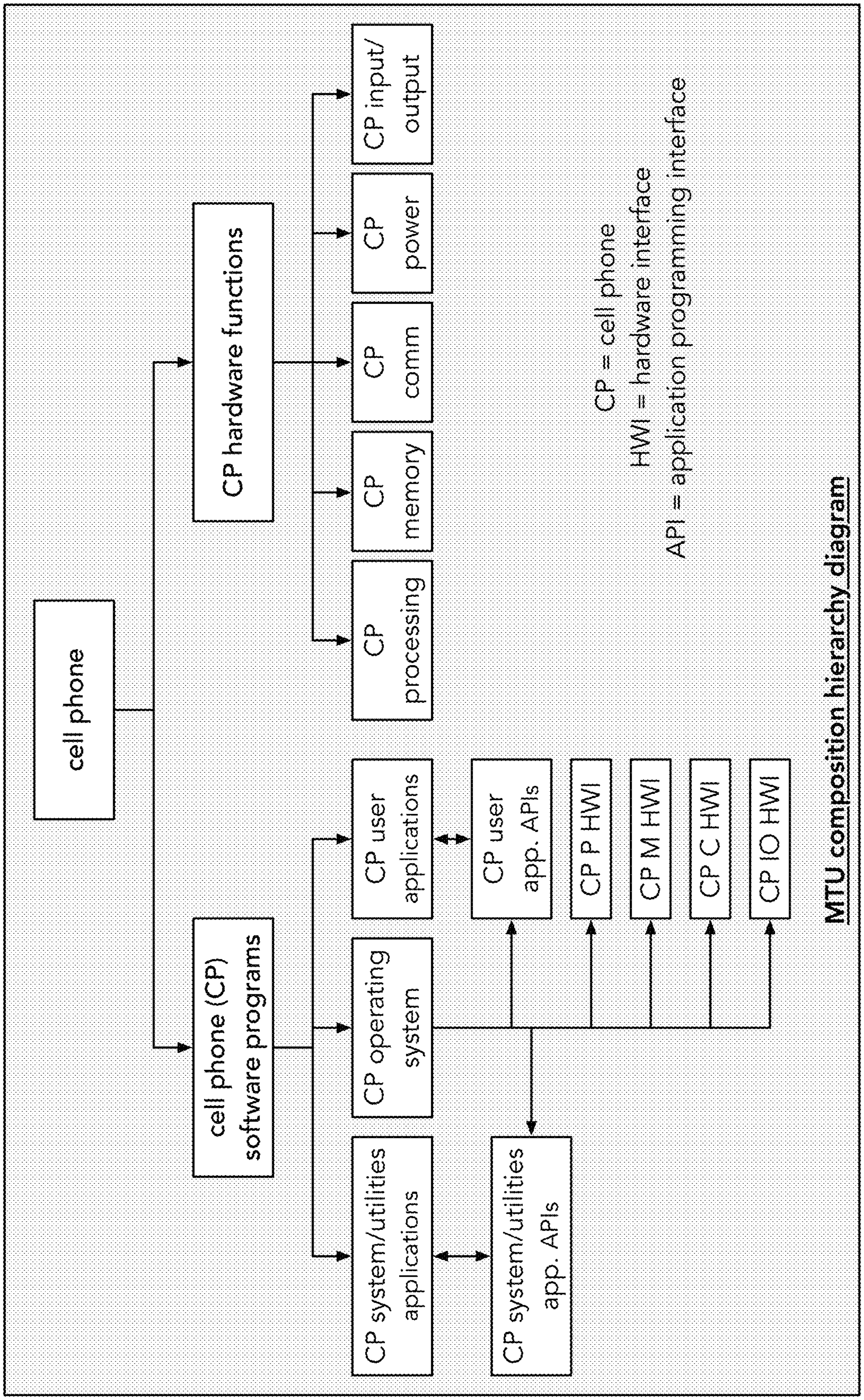
FIG. 46 is a schematic block diagram of an example of a user-interactive graphical MTU composition hierarchy diagram of a cell phone market-tech unit (MTU) data record.

FIG. 46 is a schematic block diagram of an example of a user-interactive graphical MTU composition hierarchy diagram of a cell phone market-tech unit (MTU) data record. The composition hierarchy diagram provides another perspective of composition tiering of MTUs in a technology map. In this example, a cell phone is a tier −3 MTU, the CP software programs, and CP hardware are tier −4 MTUs. Tier −5 MTUs includes the CP system/utilities applications, the CP operating system, the CP user applications, the CP processing HW, the CP memory, the CP communication HW, the CP power management HW, and the CP input/output HW. The cell phone APIs are tier −6 MTUs as are CP system applications, CP utility applications, and CP user applications.

FIG. 47 is a schematic block diagram of an example of a user-interactive graphical general description section of a cell phone market-tech unit (MTU) data record. The general description section includes a field for storing a general and brief description of a cell phone. For example, a cell phone is a communication device that wirelessly communications data and/or voice signals via a cellular communication system with other cell phones and/or other types of communication devices.

FIG. 48 is a schematic block diagram of an example of a user-interactive graphical MTU synonyms section of a cell phone market-tech unit (MTU) data record. The MTU synonyms section includes a plurality of fields for storing synonyms of the MTU. For example, a cell phone has the synonyms of mobile phone, smart phone, cellular phone, cellular telephone, mobile device, etc.

FIG. 49 is a schematic block diagram of an example of a user-interactive graphical related MTUs section of a cell phone market-tech unit (MTU) data record. The related MTU section includes a plurality of fields for related MTUs, where a related MTU is affiliated with the present MTU via one or more common inclusion MTUs and/or one or common composition MTUs. Related MTUs to a cell phone include, for example, a computing device, a portable computing device, a smart watch, a tablet, and a laptop.

FIG. 50 is a schematic block diagram of an example of a user-interactive graphical metadata section of a cell phone market-tech unit (MTU) data record. The metadata for an MTU record includes fields for a variety of data points regarding the MTU and the documents that support it. For example, but not an exhaustive example, the metadata includes date of first use of the MTU term, date of most recent use, number of data sources used, the history of the MTU, number of MTUs that comprise the MTU, number of lower tiers that comprise the MTU, etc.

FIG. 51 is a schematic block diagram of an example of a user-interactive graphical science categories section of a cell phone market-tech unit (MTU) data record. This section includes fields for storing the technology category in which the MTU lies. The cell phone is in the communications, information, and electrical technology categories.

FIG. 52 is a schematic block diagram of an example of a user-interactive graphical manufacturing data section of a cell phone market-tech unit (MTU) data record. This section includes a plurality of fields for manufacturing data regarding the MTU. For example, but not an exhaustive example, the manufacturing data includes manufacturing facilities, the processes for manufacturing the MTU, quality control for manufacturing the MTU, manufacturing equipment for manufacturing the MTU, test procedures, and test equipment for testing the manufactured MTU.

Figure 53:
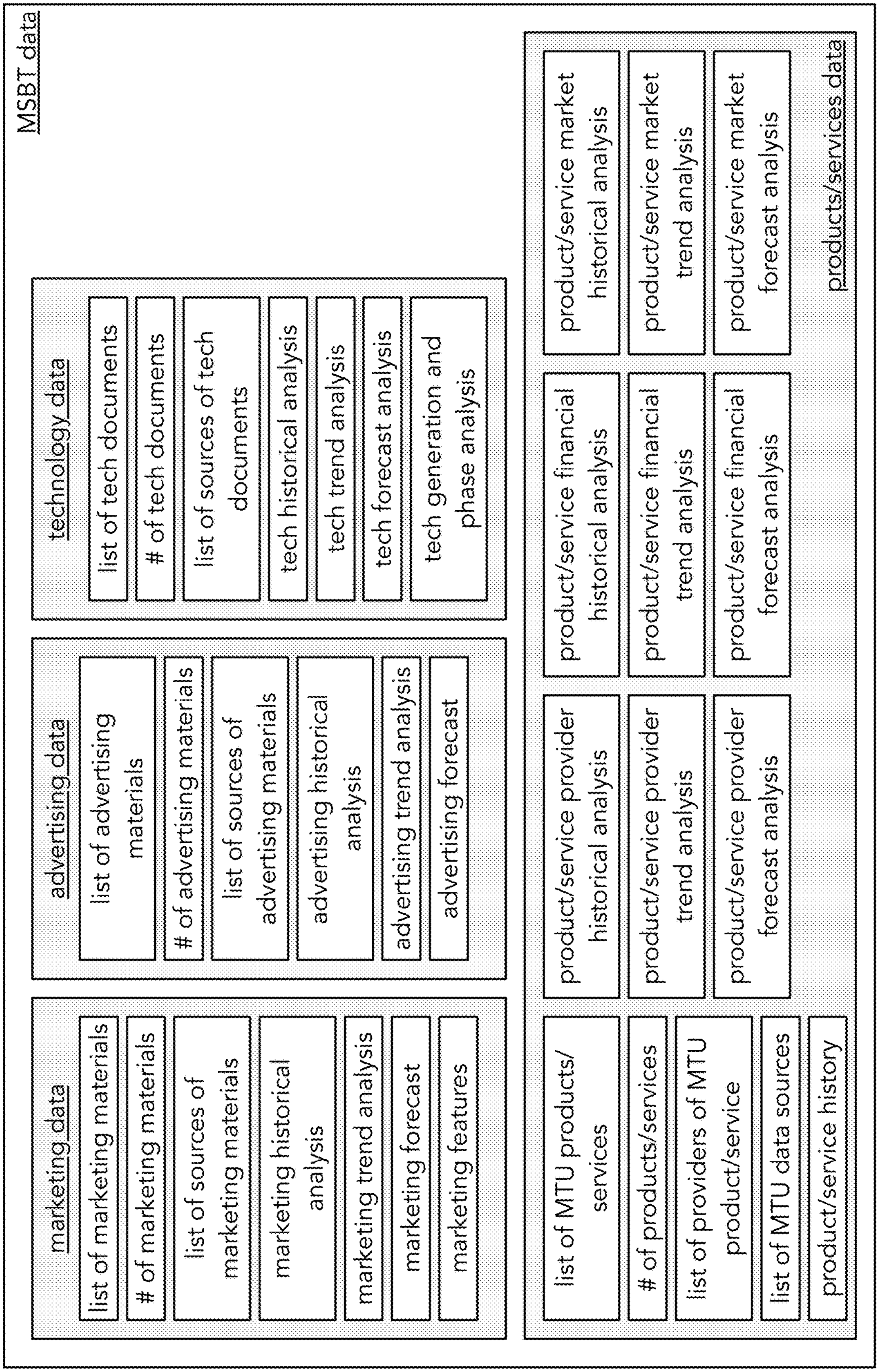
FIG. 53 is a schematic block diagram of an example of a user-interactive graphical MSBT (marketing, sales, business, and technical) section of a market-tech unit (MTU) data record.

FIG. 53 is a schematic block diagram of an example of a user-interactive graphical MSBT (marketing, sales, business, and technical) section of a market-tech unit (MTU) data record. The MSBT data section includes a marketing data section, an advertising data section, a technology data section, and a product/service data section. The marketing data section includes fields for a list of marketing materials that relate to the present MTU. For each marketing material in the list include its name and/or title, its source or author, its publication date, and a brief overview of the subject matter disclosed.

The marketing data section further includes fields for number of marketing materials in the list, a list of sources for the marketing materials in the list, a summary of the history of marketing the MTU, a summary of the marketing trend of the MTU, a marketing forecast for the MTU, and/or a list marketing features of the MTU identified in the marketing materials. Note that marketing materials include documents from which marketing features were derived and/or documents that reference a marketable feature and/or documents that reference a specific product/service in the product/service list.

The advertising section includes fields for a list of advertising (e.g., sales) materials that relate to the present MTU. For each advertising material in the list include its name and/or title, its source or author, its publication date, and a brief overview of the subject matter disclosed. The advertising data section further includes fields for number of advertising materials in the list, a list of sources for the advertising materials in the list, a summary of the history of advertising the MTU, a summary of the advertising trend of the MTU, an advertising forecast for the MTU, and/or a list of marketing features of the MTU identified in the advertising materials. Note that advertising materials include documents that reference a marketable feature and/or documents that reference a specific product/service in the product/service list.

The technology data section includes for a list of technical documents that relate to the present MTU. For each document in the list include its name and/or title, its source or author, its publication date, and a brief overview of the subject matter disclosed. The technical data section further includes fields for number of documents in the list, a list of sources for the documents in the list, a summary of the history of the technology of the MTU, a summary of the technology trend of the MTU, a technology forecast for the MTU, and/or a list of technical challenges of the MTU identified in the documents. Note that technical documents include documents that discuss the technology of the MTU, a technical aspect of the MTU, and/or a technical use of the MTU or as aspect thereof.

The product/service data section includes fields for a list of products/services that include the MTU. For each product/service in the list include its name, its provider(s), its public release date, and a brief overview of the product/service. The product/service data section further includes fields for the number of products/services in the list. The section further includes fields for a list of providers of the products/services in the list and the type of provider (e.g., manufacturer, retailer, wholesaler, broker, distributor, etc.).

The section further includes fields for a list of manufacturers of the MTU; fields for a summary on the history of the products/services; fields for a summary on the history of the providers; fields for a summary on trends of the providers; fields for a trend forecast of the providers; a summary of the financial history of the products/services; fields for a financial trend of the products/services; fields for a financial forecast of the products/services; fields for a summary of the market history regarding the products/services; fields for a market trend of the products/services; and fields for a market forecast of the products/services.

Figure 54:
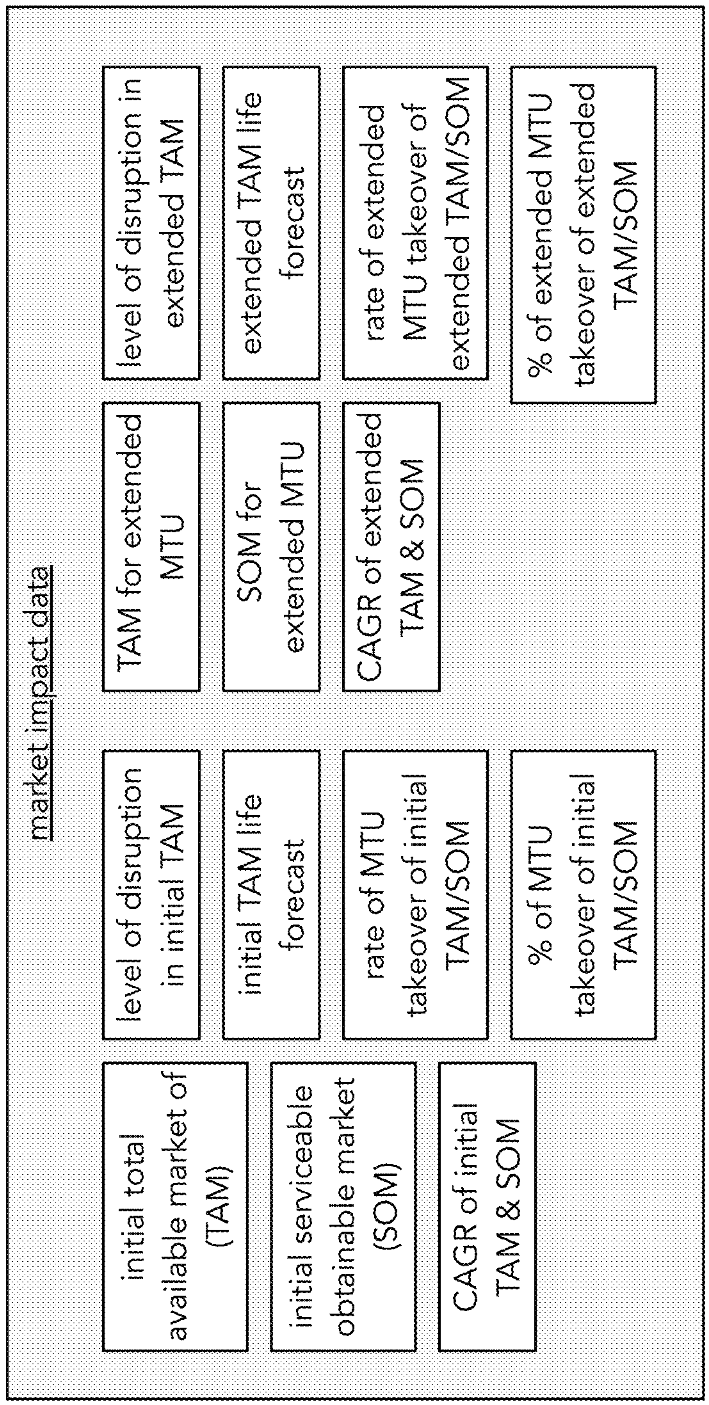
FIG. 54 is a schematic block diagram of an example of a user-interactive graphical market impact section of a market-tech unit (MTU) data record.

FIG. 54 is a schematic block diagram of an example of a user-interactive graphical market impact section of a market-tech unit (MTU) data record. The market impact data section includes fields for initial total available market (TAM), initial service obtainable market (SOM), compound annual growth rate (CAGR) of initial TAM and SOM, level of disruption in initial TAM, initial TAM life forecast, rate of MTU taking over initial TAM and/or SOM, percentage of takeover of initial TAM and/or SOM, TAM for extended MTU, SOM for extended MTU, CAGR of extended TAM and SOM, level of disruption in extended TAM by extended MTU, extended TAM life forecast, rate of extended MTU taking over extended TAM and/or SOM, and percentage of takeover of extended TAM and SOM by extended MTU.

In the example, initial TAM refers to a total available market of an MTU as originally conceived for incorporation in an initial commercially viable product/service and initial SOM refers to a service obtainable market of the originally conceived MTU. For example, if the originally conceived MTU is a touch screen for a cell phone, then the initial TAM is the touch screen opportunity for the entire cell phone market and the initial SOM is the portion of the cell phone market that will most likely switch to include a touch screen. The rate of takeover is the time frame of market adoption, and the percentage of takeover is the percentage of the market that will adopt products/services with the MTU.

Continuing with the example, the extended MTU includes incorporating touch screens in tablets, laptops, and other electronic devices and touch-based use applications of cell phones, tablets, laptops, and other electronic devices. The extended TAM includes the entire cell phone market, the entire tablet market, the entire laptop market, and the entire market of the other electronic devices. The extended SOM is the portion of the extended TAM regarding the devices that will most likely adopt the extended MTU and another portion of the extended TAM for the touch-based used applications.

Figure 55:
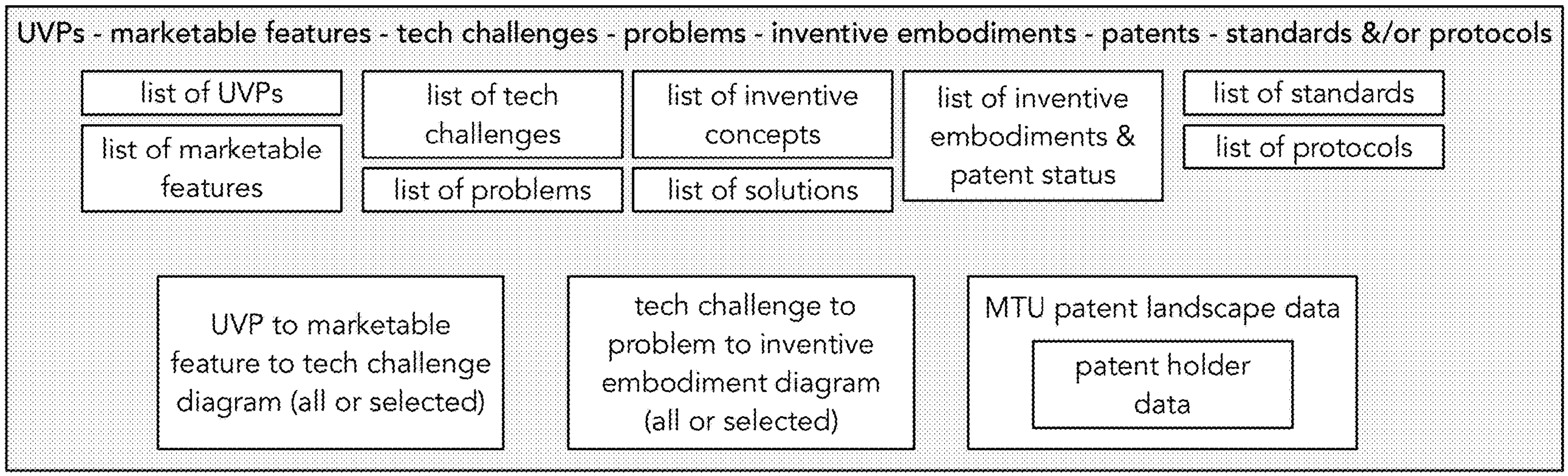
FIG. 55 is a schematic block diagram of an example of a user-interactive graphical MTU boundary section of a market-tech unit (MTU) data record.

FIG. 55 is a schematic block diagram of an example of a user-interactive graphical MTU boundary section of a market-tech unit (MTU) data record. The MTU boundary section includes fields for a list of unique value propositions (UVP), a list of marketable features, a list of technical challenges, a list of problems, a list of inventive concepts, a list of solutions, a list of inventive embodiments and patent status, a list of standards (actual and potential), a list of protocols (actual and potential), a UVP to marketable feature to tech challenge diagram, a tech challenge to problem to inventive embodiment diagram, and MTU patent landscape data.

As used herein, a unique value proposition (UVP) is a reason for investing time and/or money into developing an MTU. There are multiple reasons for investing time and/or money into developing an MTU. For example, but not as an exhaustive example, the reasons include better user experience, new user experience, improved human-machine interaction, improve data accuracy, improve data consistency, improve data organization, improve data interpretation, new product, new service, improve human health, improve animal health, reduce ecological damage, repair ecological damage, improve recycling of materials, reduce manufacturing costs, improve a manufacturing process, improve safety, improve human performance, and reduce risk of harm.

As is also used herein, a marketable feature is a reason why a consumer should buy, use, etc. a product/service that embodies the MTU. A marketable feature is often tied to one or more unique value propositions and often provides more definitive benefits of product/service that embodies the MTU. For example, marketable features for a UVP of a better user experience for a touch screen include, but not limited to, more accurate touch detection, better video resolution, better touch movement tracking, etc.

As is further used herein, a tech challenge is a high-level innovation that is to be created to support a UVP and/or to enable a marketable feature. For example, for the UVP of a better user experience for touch screens and its associated marketable features, the tech challenges include, but are not limited to, improve signal to noise ratio of touch sensing, improve video graphics processing, and improve touch detection processing and image rendering thereof.

Figure 56:
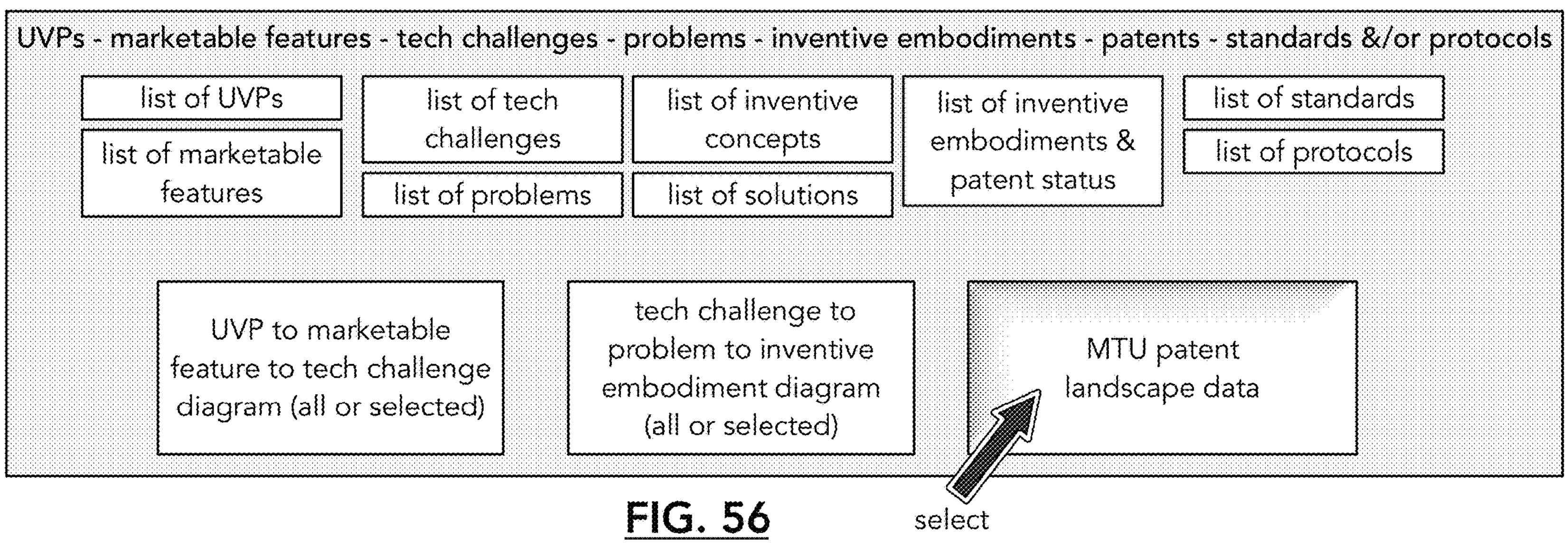
FIG. 56 is a schematic block diagram of an example of interacting with a user-interactive graphical MTU boundary section of a market-tech unit (MTU) data record.

FIG. 56 is a schematic block diagram of an example of interacting with a user-interactive graphical MTU boundary section of a market-tech unit (MTU) data record. As with other user-interactive graphical sections of a record, the buttons are selectable in this section. In this example, the MTU patent landscape button is selected; which the improved computer interprets to retrieve and display the patent data section of the MTU record as shown in FIG. 57.

Figure 57:
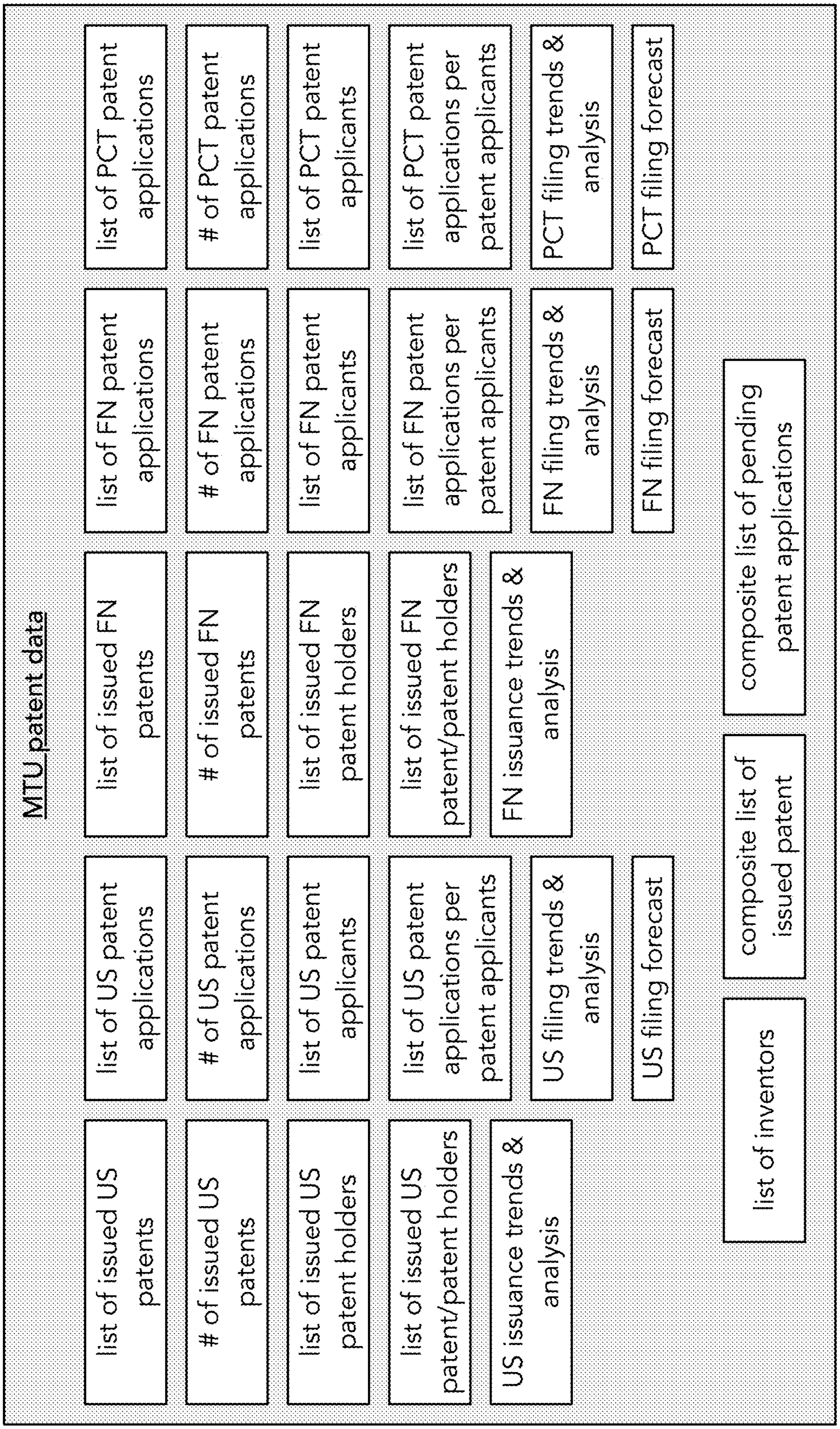
FIG. 57 is a schematic block diagram of an example of a user-interactive graphical MTU patent data section of a market-tech unit (MTU) data record.

FIG. 57 is a schematic block diagram of an example of a user-interactive graphical MTU patent data section of a market-tech unit (MTU) data record. The patent section includes fields for a list of US patents regarding the MTU, a number of issued US patents, a list of US patent holders (original assignee and any subsequent assignees), a list of US patents per patent holder, trends and analysis of the issued US patents (e.g., issuance rate, file to issue time frame, average number of office actions to final disposition, abandonment rate, etc.), a list of pending US patent applications, a number of pending US patent applications, a list of applicants (original assignee and any subsequent assignees) of the pending US patent applications, a list of pending US patent applications per patent applicant, trends and analysis of US patent applications (e.g., new filings per year, time to first office action, etc.), and a new US patent application filing forecast.

The patent section further includes fields for a list of FN (foreign national) patents regarding the MTU, a number of issued FN patents, a list of FN patent holders (original assignee and any subsequent assignees), a list of FN patents per patent holder, trends and analysis of the issued FN patents (e.g., issuance rate, file to issue time frame, average number of office actions to final disposition, abandonment rate, etc.), a list of pending FN patent applications, a number of pending FN patent applications, a list of applicants (original assignee and any subsequent assignees) of the pending FN patent applications, a list of pending FN patent applications per patent applicant, trends and analysis of FN patent applications (e.g., new filings per year, time to first office action, etc.), and a new FN patent application filing forecast.

The patent section still further includes fields for a list of pending PCT (patent cooperation treaty) patent applications regarding the MTU, a number of pending PCT patent applications, a list of PCT applicants (original assignee and any subsequent assignees) of the pending PCT patent applications, a list of pending PCT patent applications per applicant, trends and analysis of CPT patent applications (e.g., new filings per year, conversion to FN patent applications, number of countries for a conversion, etc.), and a new PCT patent application filing forecast.

The patent section yet further includes a list of inventors for the pending patent applications and issued patents regarding the MTU, a composite list of issued patents (e.g., US and FN) and patent holders, and composite list of pending patent applications (e.g., US, FN, and PCT) and applicants.

Figure 58:
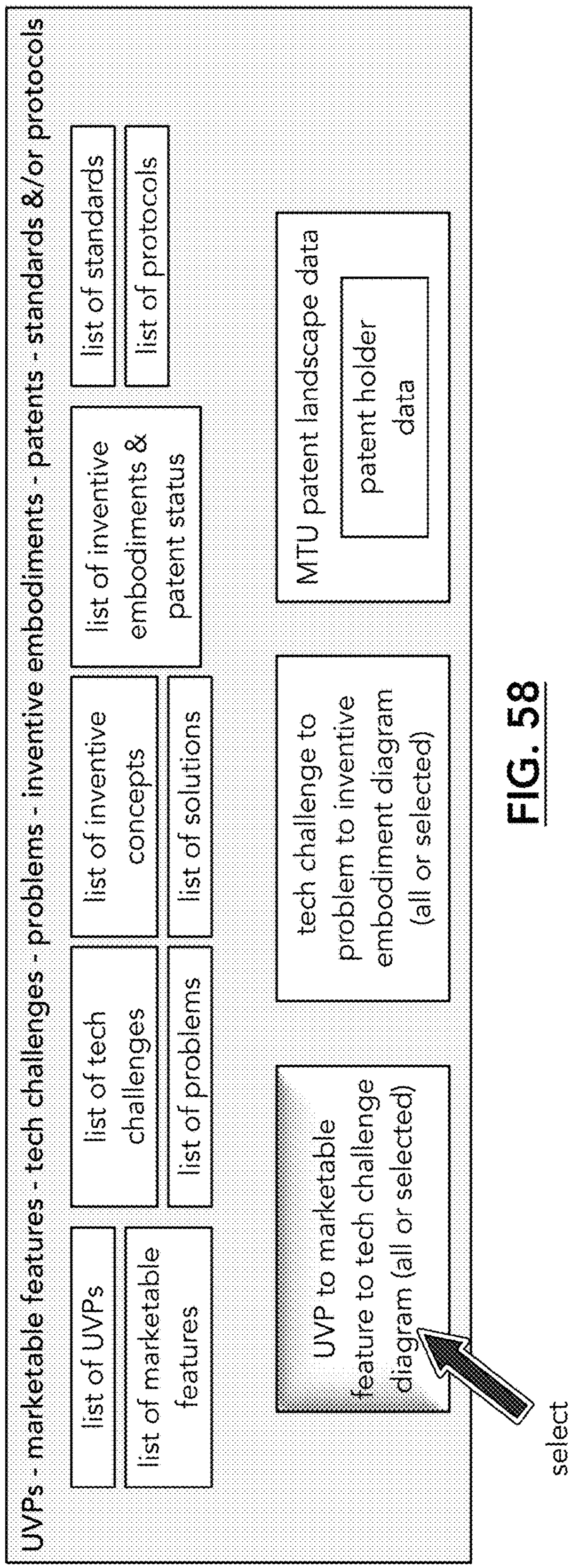
FIG. 58 is a schematic block diagram of another example of interacting with a user-interactive graphical MTU boundary section of a market-tech unit (MTU) data record.

FIG. 58 is a schematic block diagram of another example of interacting with a user-interactive graphical MTU boundary section of a market-tech unit (MTU) data record of FIG. 55. In this example, the interactive button regarding the UVP to marketable feature to tech challenge diagram is selected. The improved computer interprets the selection to retrieve and display the UVP to marketable features to tech challenge section as shown in FIG. 59.

Figure 59:
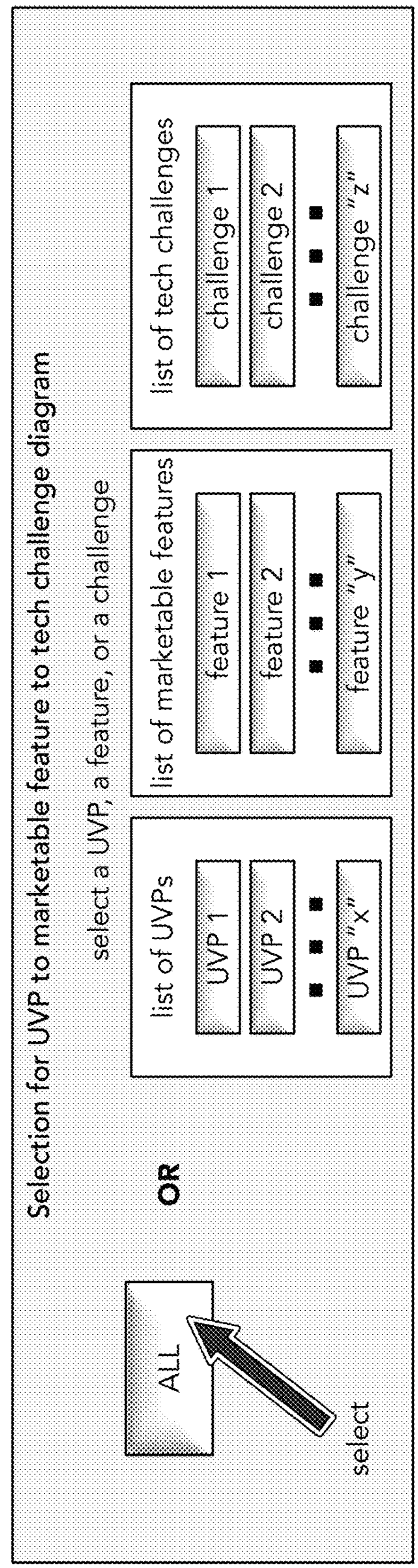
FIG. 59 is a schematic block diagram of an example of interacting with a user-interactive UVP (unique value proposition) to marketable features to technology challenges section of a graphical MTU boundary section of a market-tech unit (MTU) data record.

FIG. 59 is a schematic block diagram of an example of interacting with a user-interactive UVP (unique value proposition) to marketable features to technology challenges section of a graphical MTU boundary section of a market-tech unit (MTU) data record. The UVP to marketable features to tech challenge section includes a button to select all UVPs, marketable features and tech challenges, a section that lists the unique value propositions (UVP) of the MTU, a section that lists the marketable features of the MTU, and a section that lists the tech challenges of the MTU.

For a list of UVPs, marketable features, and tech challenges, an individual UVP, marketable feature, or tech challenge can be selected. Based the selection, the improved computer would retrieve and display a UVP to market feature to tech challenge diagram for the selected UVP, marketable feature, or tech challenge. As part of the retrieving process, the improved computer verifies that the diagram is the most current version of the diagram and, if not, updates or creates the diagram.

The verification process includes reviewing newly added data to the MTU record to determine if it affects a relevant UVP, a relevant marketable feature, and/or a relevant tech challenge. If the newly added data does affect the UVP, the marketable feature, and/or the relevant tech challenge, the improved computer updates the relevant diagram, or diagrams. Note that each version of a diagram is archived so that a historical record of the evaluation of a diagram is maintained. This generally applies to all diagrams created by the improved computer for an MTU.

Figure 61:
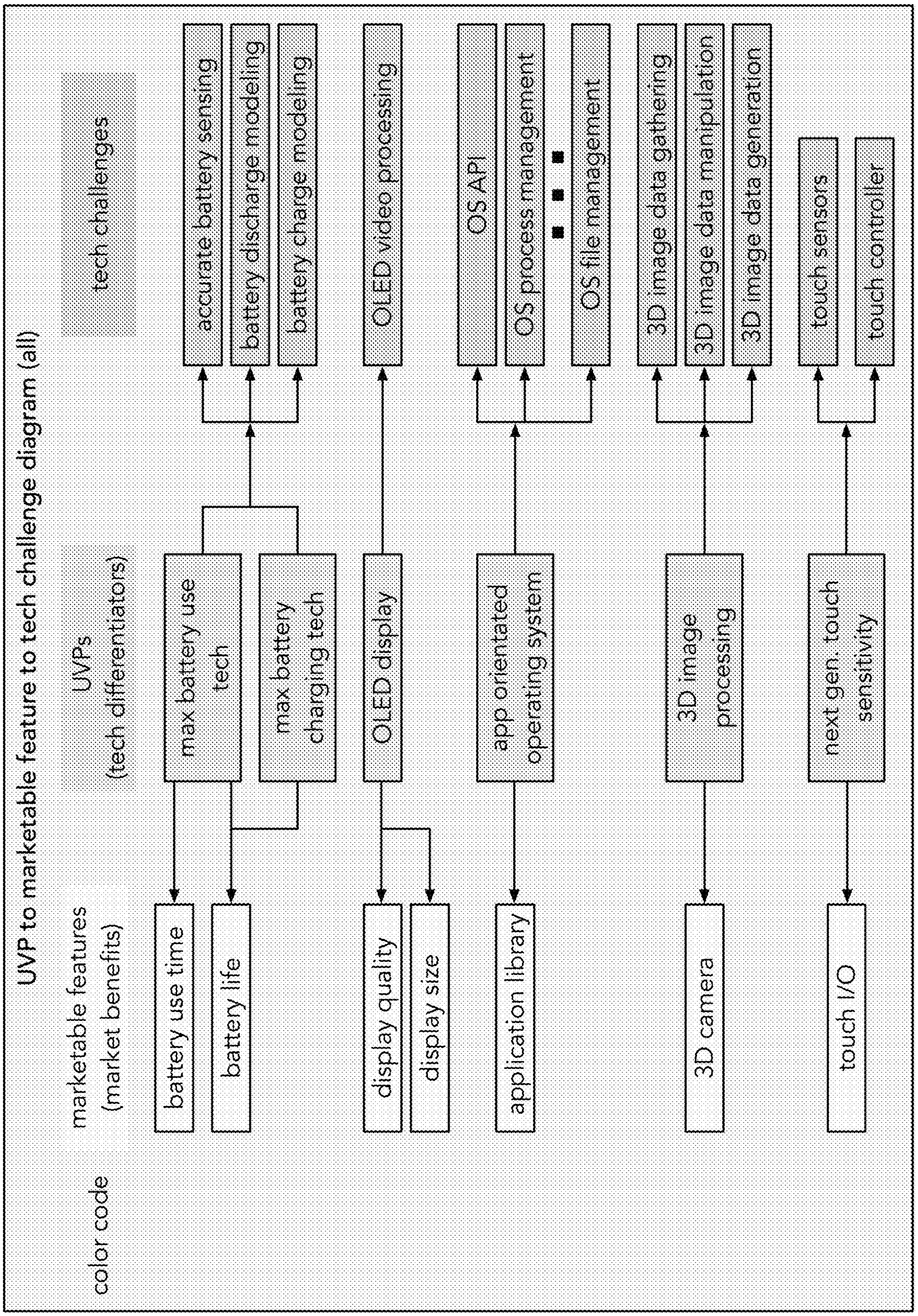
FIG. 61 is a schematic block diagram of an example of a user-interactive UVP (unique value proposition) to marketable features to technology challenges diagram of a graphical MTU boundary section of a cell phone market-tech unit (MTU) data record.

In the example of FIG. 59, the all button is selected, which the improved computer interprets to retrieve and display a UVP to marketable feature to tech challenge diagram. An example is shown in FIG. 61, which will be subsequently discussed.

Figure 60:
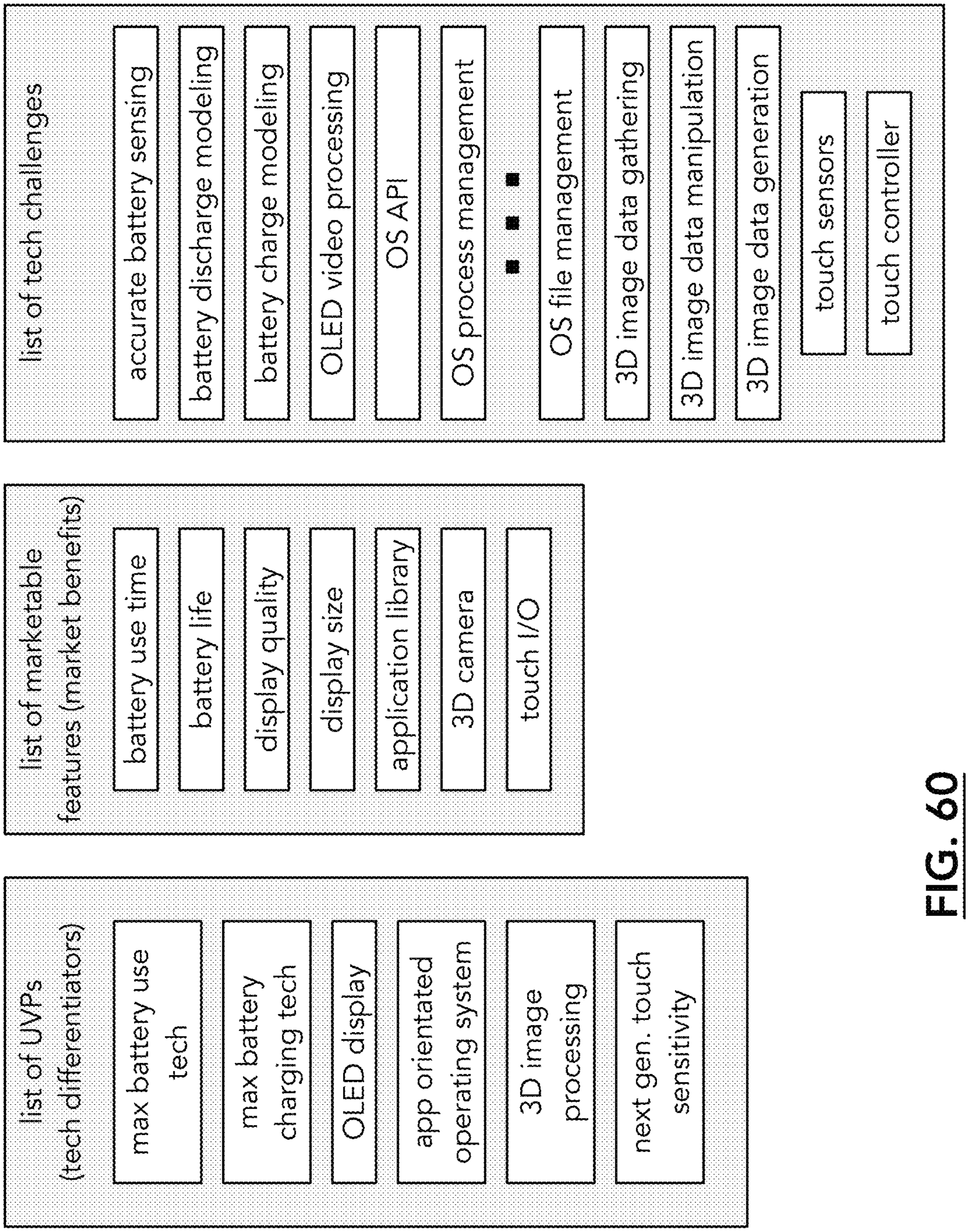
FIG. 60 is a schematic block diagram of an example of user-interactive graphical lists of marketable features, UVP (unique value proposition), and technology challenges of a user-interactive UVP to marketable features to technology challenges section of a graphical MTU boundary section of a cell phone market-tech unit (MTU) data record.

FIG. 60 is a schematic block diagram of an example of user-interactive graphical lists of marketable features, UVP (unique value proposition), and technology challenges of a user-interactive UVP to marketable features to technology challenges section of a graphical MTU boundary section of a cell phone market-tech unit (MTU) data record. The example lists are for a cell phone are not intended to be exhaustive lists. The example list of UVPs includes maximize battery use technologies, maximize battery charging technologies, incorporate OLED (organic light emitting diode) display for better video graphics, improve operating system to support a library of user applications, improved 3D (three-dimensions) image processing, and improve touch detection (i.e., next generation touch sensitivity).

The example list of marketable features includes longer battery use time (e.g., use the phone longer between charges), longer battery life (e.g., battery lasts longer), better display quality, bigger display, vast user application library and ease of adding to the library, better 3D camera, and new & improved touch screen.

The example list of tech challenges includes accurate battery sensing, better battery discharge modeling, better battery charge modeling, OLED video graphics processing, improved operating system process management, file management, etc., new operating system (OS) APIs, improved 3D image data gathering, improved 3D data manipulation, improved 3D image data generation, new touch sensors, and a new touch screen controller.

FIG. 61 is a schematic block diagram of an example of a user-interactive UVP (unique value proposition) to marketable features to technology challenges diagram of a graphical MTU boundary section of a cell phone market-tech unit (MTU) data record. UVPs are color coded with a gray-blue color; marketable features are color coded with a gray-yellow color, and tech challenges are color coded with a gray-green color.

The UVPs of maximum battery use technology and maximum battery charging technology underlie the marketable features of improved battery use time and improved battery life. These UVPs also provide the motivation for the tech challenges of accurate battery sensing, improved battery discharge modeling, and improved battery charge modeling.

The OLED display UVP underlies the marketable features of improved display quality and increased display size. This UVP also provides motivation for the tech challenge of OLED video processing.

The UVP of application orientated operating system underlies the marketable feature of an improved user application library and adding new applications to it. This UVP also provides motivation for the tech challenges of new OS APIs and new operating system functions of process management, file management, etc.

The UVP of the improved 3D imaging processing underlies the marketable feature of a better 3D camera. This UVP also provides the motivation for the tech challenges of 3D image data gathering, 3D image data manipulation, and 3D image data generation.

The UVP of the next generation touch sensitivity underlies the marketable feature of improved touch screen I/O experiences. This UVP also provides the motivation for the tech challenges of new touch sensors and a new touch controller.

Figure 62:
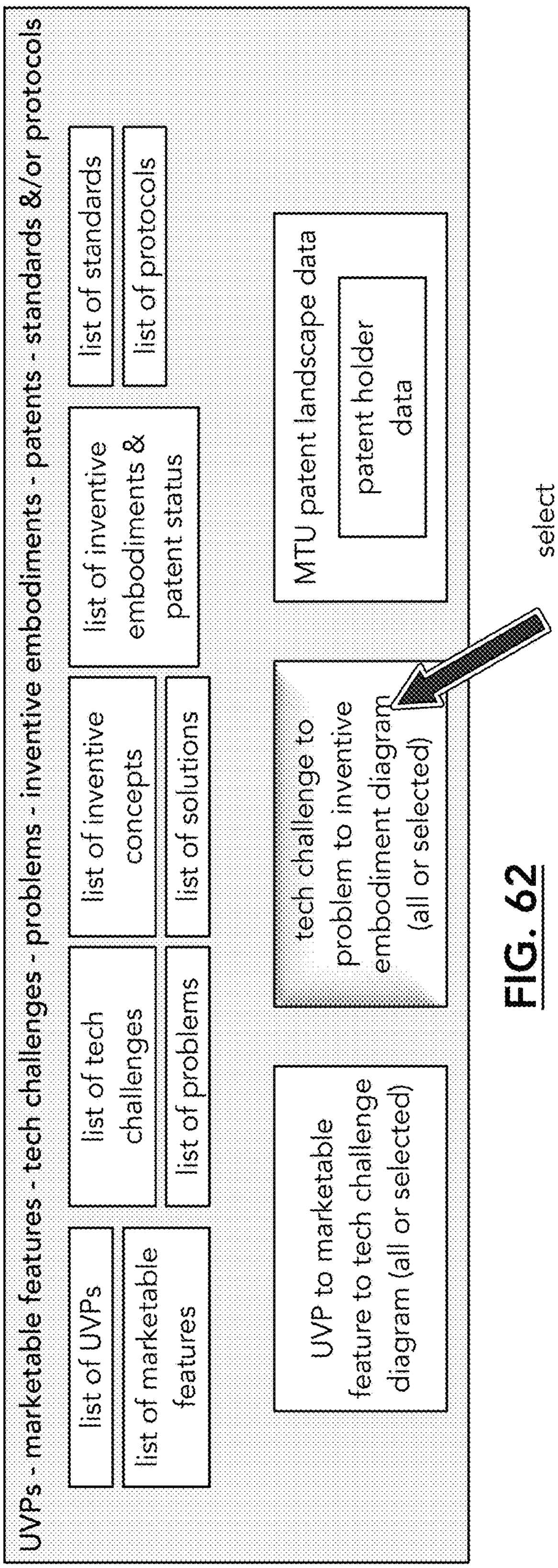
FIG. 62 is a schematic block diagram of an example of interacting with a user-interactive UVP (unique value proposition) to marketable features to technology challenges section of a graphical MTU boundary section of a market-tech unit (MTU) data record.

FIG. 62 is a schematic block diagram of an example of interacting with a user-interactive UVP (unique value proposition) to marketable features to technology challenges section of a graphical MTU boundary section of a market-tech unit (MTU) data record. In this example, the interactive button regarding the tech challenge to problem to inventive embodiment diagram is selected. The improved computer interprets the selection to retrieve and display the tech challenge to problems to inventive embodiments section as shown in FIG. 63.

Figure 63:
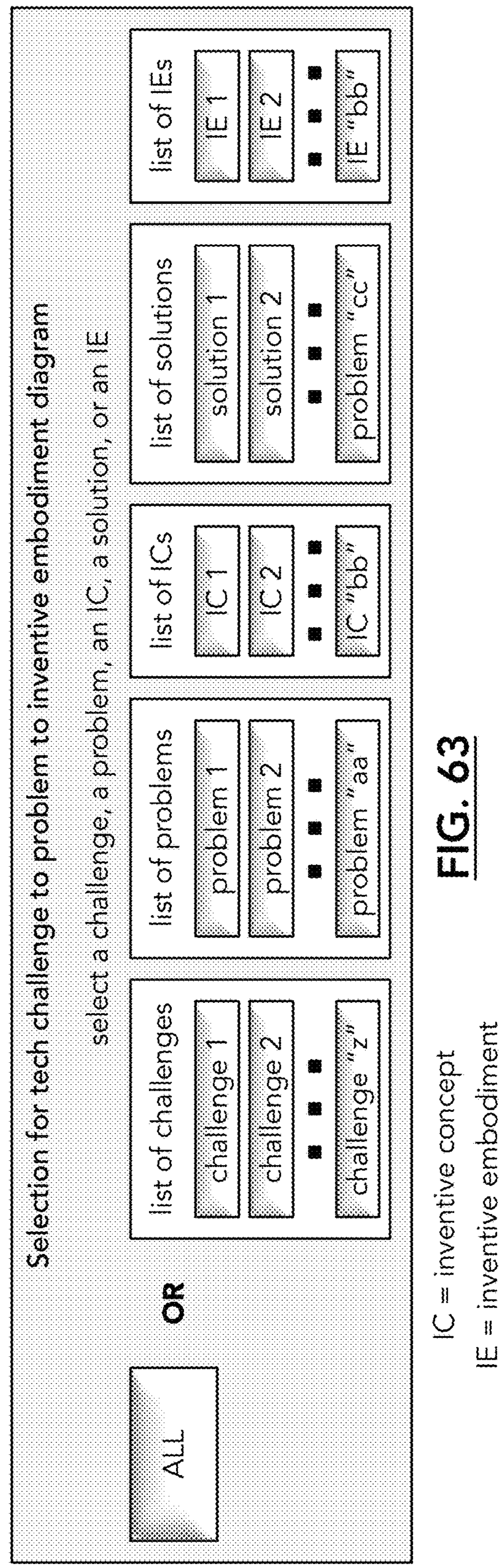
FIG. 63 is a schematic block diagram of an example of interacting with a user-interactive technology challenges to problems to inventive embodiments of a user-interactive UVP to marketable features to technology challenges section of a graphical MTU boundary section of a cell phone market-tech unit (MTU) data record.

FIG. 63 is a schematic block diagram of an example of a user-interactive technology challenges to problems to inventive embodiments section of a user-interactive UVP to marketable features to technology challenges section of a graphical MTU boundary section of a cell phone market-tech unit (MTU) data record. This section includes a button for selecting all diagrams regarding tech challenges to problems to inventive embodiments.

This section includes a list of tech challenges, a list of problems, a list of inventive concepts (IC), a list of solutions, and a list of inventive embodiments (1E). Each item in a list is represented by a selectable button. For example, each tech challenge (1 through z) is represented by a selectable button.

Figure 64:
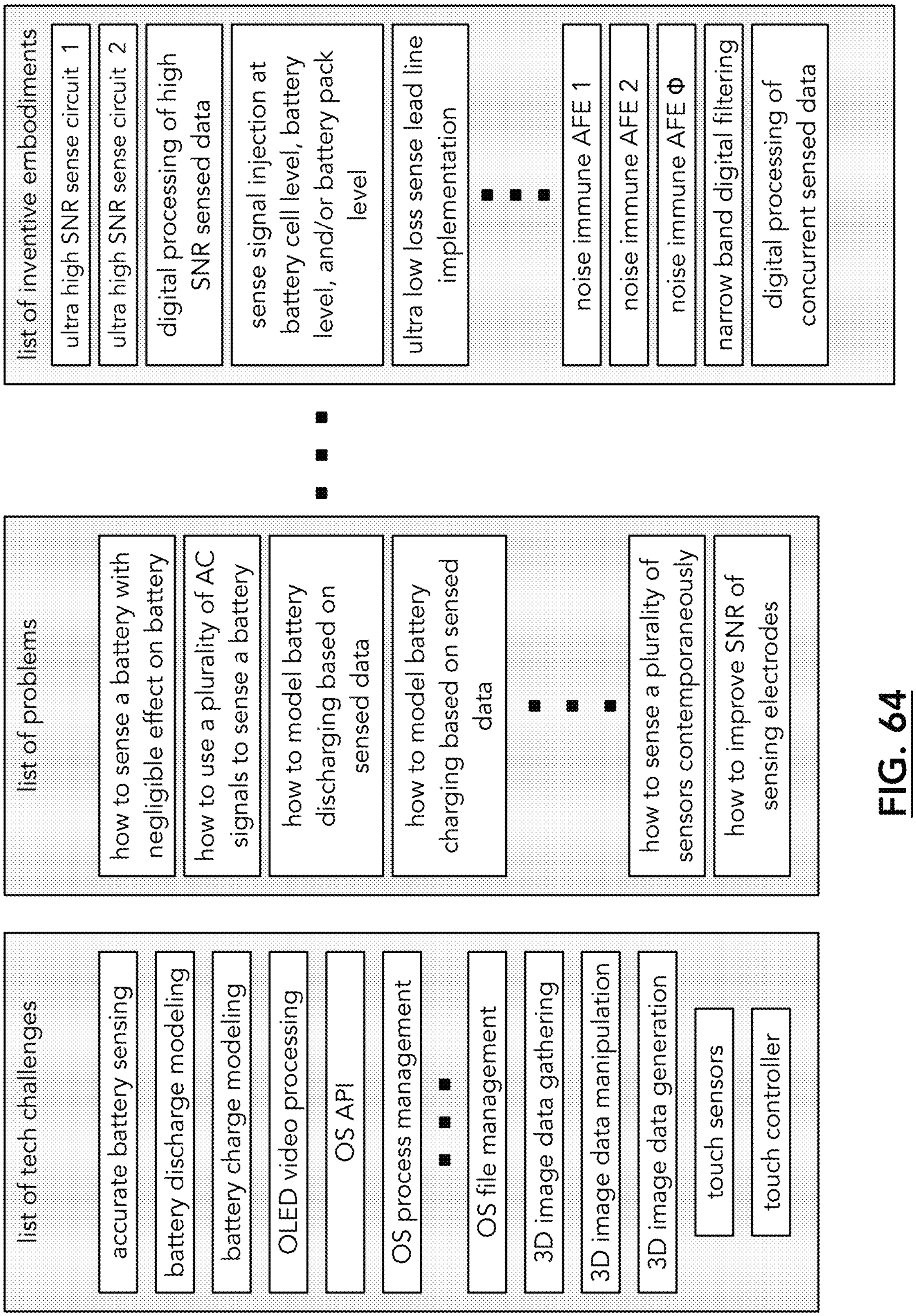
FIG. 64 is a schematic block diagram of an example of user-interactive graphical lists of technology challenges, problems, and inventive embodiments of a user-interactive UVP to marketable features to technology challenges section of a graphical MTU boundary section of a cell phone market-tech unit (MTU) data record.

FIG. 64 is a schematic block diagram of an example of user-interactive graphical lists of technology challenges, problems, and inventive embodiments of a user-interactive UVP to marketable features to technology challenges section of a graphical MTU boundary section of a cell phone market-tech unit (MTU) data record. The list of tech challenges includes accurate battery sensing, improved battery discharge modeling, improved battery charge modeling, OLED video processing, new operating system (OS) APIs, new operating system functions of processing management, file management, etc., improved 3D image data gathering, improved 3D data manipulation, improved 3D image data generation, new touch sensors, and a new touch screen controller. Each tech challenge provides motivation for one or more problems.

For example, the tech challenge of accurate battery sensing provides motivation for the problems of "how to sense a battery with negligible effect on the battery" and "how to use a plurality of AC signals to sense a battery". As another example, the tech challenge of improved battery discharge modeling provides motivation for the problem of "how to model battery discharging based on the more accurate sensed battery data". As a further example, the tech challenge of improved battery charge modeling provides motivation for the problem of "how to model battery charging based on the more accurate sensed battery data".

As an even further example, the tech challenge of a new touch controller provides motivation for the problem "how to sense a plurality sensor contemporaneously" and the problem of "how to improve SNR of sensing electrodes".

Each problem leads to inventive concepts, with leads to solutions, which leads to inventive embodiments. Each inventive embodiment is a patentable idea. In this example, the problem of "how to sense a battery with negligible effect on the battery" leads to the inventive embodiments of ultra-high SNR sense circuit 1, ultra-high SNR sense circuit 2, digital processing of high SNR sensed data, sense signals injected at the battery cell level, battery level, and/or battery pack level, and ultra-low loss sense lead line implementations.

As is further included in this example, the problem of "how to improve SNR of sensing electrodes" leads to the inventive embodiments of noise immune AFE (analog front end) circuit 1, circuit 2, and circuit Φ, narrow band digital filtering, and digital processing of concurrently sensed data.

Figure 65:
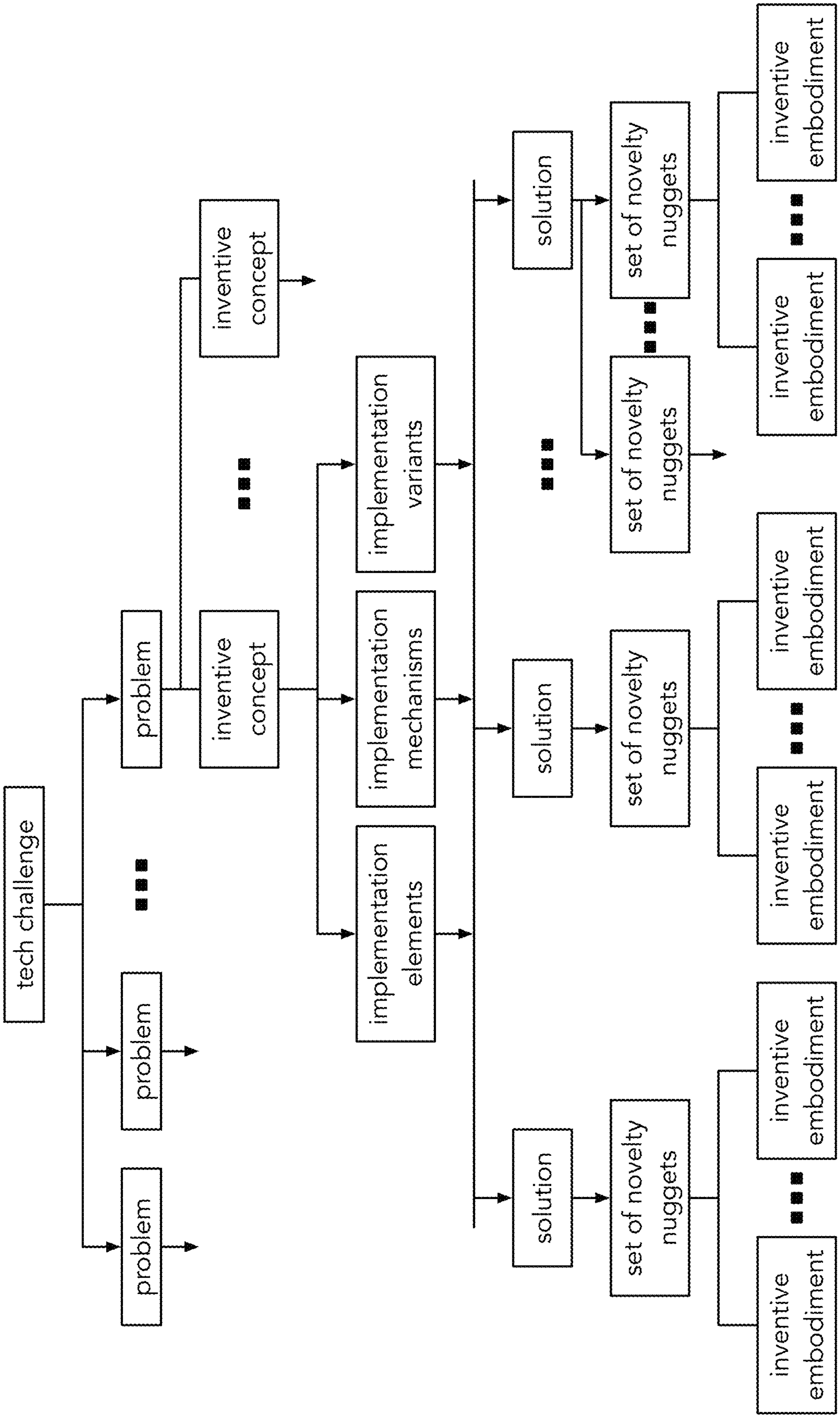
FIG. 65 is a schematic block diagram of an example of a user-interactive graphical representation of technology challenges to problems to inventive concepts to implementation options to solutions to inventive embodiments relational map.

FIG. 65 is a schematic block diagram of an example of a user-interactive graphical representation of a technology challenge to problems to inventive concepts to implementation options to solutions to inventive embodiments relational map. For a technical challenge, one or more problems are identified. The improved computer identifies one or more problems for a technical challenge in at least two ways. The first way is the improved computer identifying problems that are currently being addressed based on the supporting data of an MTU. The second way is the improved computer forecasting problems that are likely to be encounter in addressing the technical challenge based on the supporting data of an MTU, based on technical challenge to problem analytics for the appropriate technology category, or categories, based on scope of technical challenge, and/or based on market uses of the MTU supported by at least partially by the technical challenge.

For each problem (currently being addressed and forecasted), the improved computer identifies one or more inventive concepts. An inventive concept is a conceptual way of solving the problem. As an example, for the problem of "improving force transfer between the body and the ground via the shoes", an inventive concept is to have different force transfer properties in the heel than in the forefoot of sole to improve engagement of the foot to the shoe and the shoe to the ground. Another inventive concept for this problem is to have a series of horizontal force to vertical force focusing elements in the sole to improve engagement of the foot to the shoe and the shoe to the ground.

For each inventive concept, the improved computer identifies implementation elements, implementation mechanisms, and/or implementation variants. An implementation element is a tangible physical and/or virtual part of an inventive concept. An implementation mechanism is an aspect of an implementation element that can be changed. An implementation variant is a variation of an implementation element and/or a variation of an implementation mechanism.

As an example, an inventive concept for a problem is "to do X to A, Y to B, and Z to C". In this example, A, B, and C are implementation elements and X, Y, and Z are implementation mechanisms. Implementation variants would be A' for A, B' for B, C' for C, x for X, y for Y, and/or z for Z.

From the implementation elements, the implementation mechanisms, and the implementation variants, the improved computer identifies one or more solutions, where a solution is a specific combination of the implementation elements, the implementation mechanisms, and the implementation variants. For example, one solution is "do X to A, Y to B, and Z to C"; a second solution is "do x to A, y to B, and z to C", a third solution is "do X to A', Y to B', and Z to C'", and fourth solution is "do x to A', y to B', and z to C'".

For a solution, the improved computer identifies a set of novelty nuggets (e.g., a technical aspect to is believed to be novel in light of known prior art. Depending on the nature of the novelty nuggets, the improved computer identifies one or more inventive embodiments, where an inventive embodiment represents a patentable invention.

Continuing with the above example, for the first solution of do X to A, Y to B, and Z to C", the improved computer identifies the novelty nuggets of "do X to A", "do Y to B", and "do Z to C". The improved computer then identifies specific combinations of the novelty nuggets to produce the inventive embodiments. For the present example, the improved computer determines that the combination of "do X to A" and "do Z to C" is an invention embodiment and "do Y to B" is a separate inventive embodiment.

The improved computer then determines an invention type for each of the inventive embodiments. As discussed with reference to FIG. 19, invention types include fundamental, commercially necessary, commercial expansion, new fundamental, commercial expansion regarding new uses of fundamental inventions, commercial expansion of new fundamental inventions, commercial expansion regarding vertical integration, commercial expansion regarding horizontal integration, commercial expansion regarding competitor speed bump, commercial expansion regarding potential standard essential, and/or commercial expansion regarding potential non-essential but commercially necessary standards related.

The improved computer routinely updates the technical challenge to inventive embodiment relational map as it ingests new data. Each previous version of a technical challenge to inventive embodiment relational map archived to form a historical evolution of the map.

The collection of technical to inventive embodiment relational maps of an MTU provide the improved computer with a mechanism for determining the total number of inventions to be created over the life of an MTU, with a mechanism to target particular inventions.

The conventional patent process does not support and does not create a collection of technical to inventive embodiment relational maps for an MTU. Without such maps and/or without quantifying technology via MTUs, there are no viable mechanisms to determine how well a product is patent protected until a patent dispute arises years after the bulk of the inventing has been completed and to opportunity to patent protect it has passed. Further, without such maps, it is very difficult to determine how well a patent, or patents, cover design-around options. For example, there may be 10 or more inventive embodiments for a particular problem. One or two patents addressing the problem leaves too many design around options open, which significantly diminishes the value of the one or two patents.

Such maps would be extremely helpful in determining whether to invest in a technology company. The maps illustrate the level of innovation likely required to bring a MTU to market, to obtain market adoption, and to obtain sustained market success. The maps further illustrate, at the time of investment, the level of patent protection obtained to date and its level of sufficiency. Interpretation of the maps indicate, for the inventions not patent protected, if the opportunity has passed. In addition, interpretation of the maps further indicate the level of patent protection that is needed to obtain a desired patent position for the MTU.

A list of generalized examples of tech challenges for communication, electrical, and/or information technologies include too costly, operates too slow, needs improved reliability, needs improved efficiency, needs improved accuracy, needs improved security, needs improved safety, needs improved user experiences, needs new user experiences, needs new operations/features, needs improved operations/features, needs new security, and needs new safety.

Figure 66:
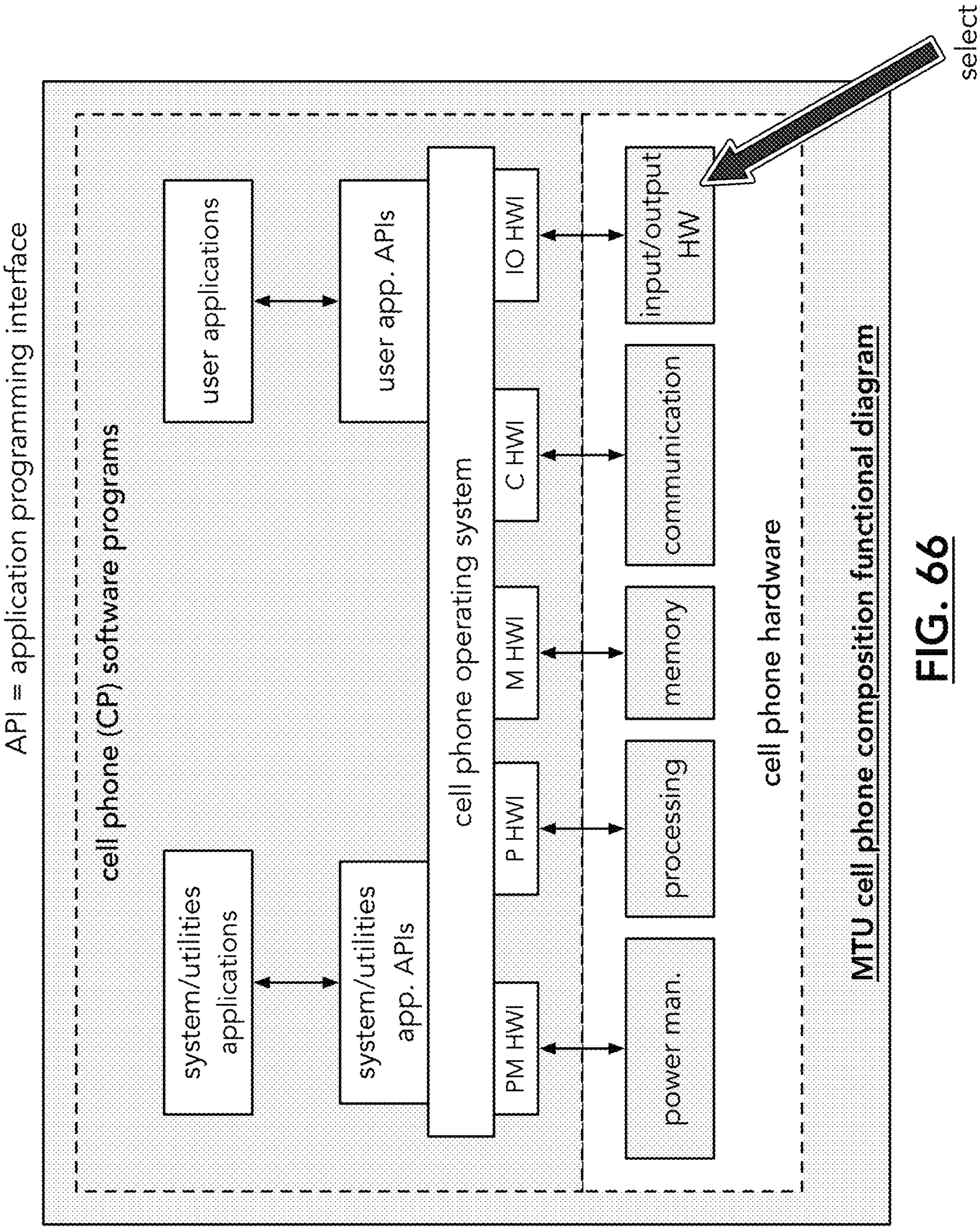
FIG. 66 is a schematic block diagram of an example of a user-interactive graphical MTU composition functional diagram of a cell phone market-tech unit (MTU) data record.

FIG. 66 is a schematic block diagram of an example of a user-interactive graphical MTU composition functional diagram of a cell phone market-tech unit (MTU) data record with the interactive button for input/output HW being selected. The improved computer interprets the selection to retrieve and display the MTU record a cell phones input/output HW.

Figure 67:
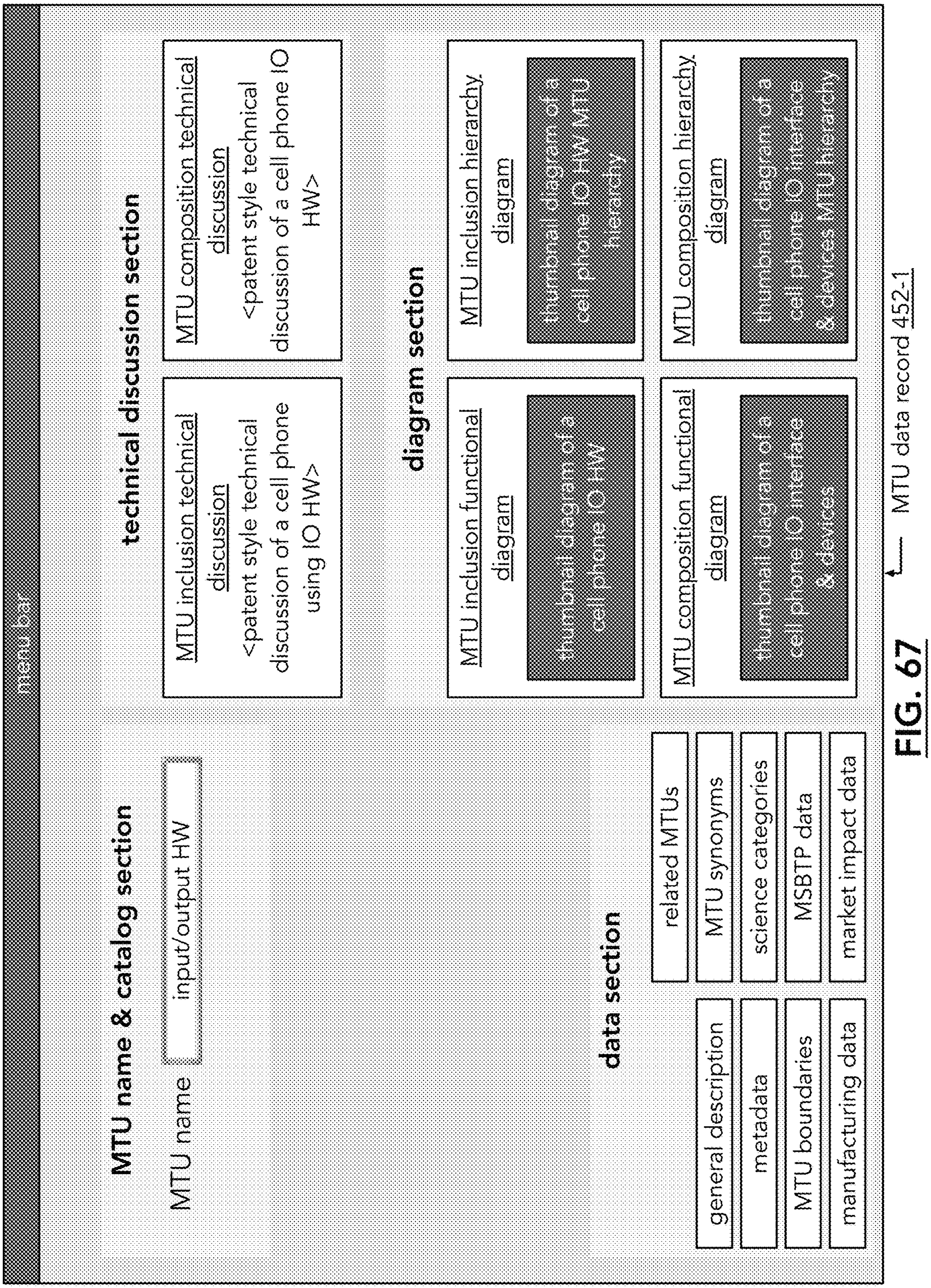
FIG. 67 is a schematic block diagram of an example of a user-interactive graphical market-tech unit (MTU) data record for input/output hardware (HW) of a cell phone.

FIG. 67 is a schematic block diagram of an example of a user-interactive graphical market-tech unit (MTU) data record for input/output hardware (HW) of a cell phone as selected in FIG. 66. In accordance with the formatting of MTU records, the input/output HW MTU record 452-1 includes an MTU name & catalog section, a data section for data relevant to a cell phone's input/output HW, a technical discussion section, and a diagram section.

Figure 68:
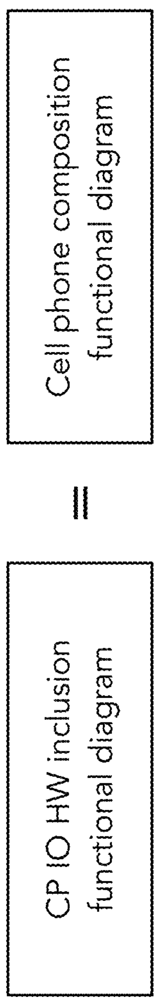
FIG. 68 is a schematic block diagram of an example of a user-interactive graphical input/output hardware (HW) of a cell phone inclusive functional diagram is the same as a user-interactive graphical cell phone composition functional diagram.
Figure 69:
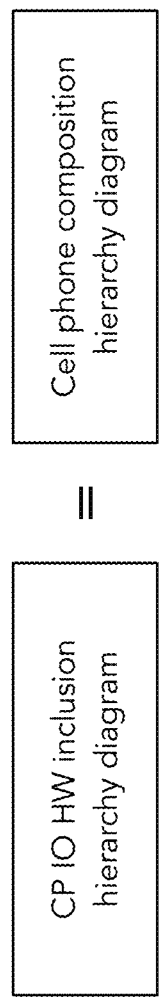
FIG. 69 is a schematic block diagram of an example of a user-interactive graphical input/output hardware (HW) of a cell phone inclusive hierarchy diagram is the same as a user-interactive graphical cell phone composition hierarchy diagram.

FIG. 68 is a schematic block diagram of an example of a user-interactive graphical input/output hardware (CP 10 HW) of a cell phone inclusive functional diagram of the MTU record of FIG. 67. Note that the CP IO HW inclusion functional diagram is the same as the cell phone composition functional diagram. Similarly, as shown in FIG. 69, the CP IO HW inclusion hierarchy diagram is the same as the cell phone composition hierarchy diagram. This generally holds for MTUs of sequential tiers. In general, the inclusion diagrams for an MTU at tier "i" are the same as the composition diagrams for a tier "i+1" MTU that's in the inclusion diagrams of the MTU.

Figure 70:
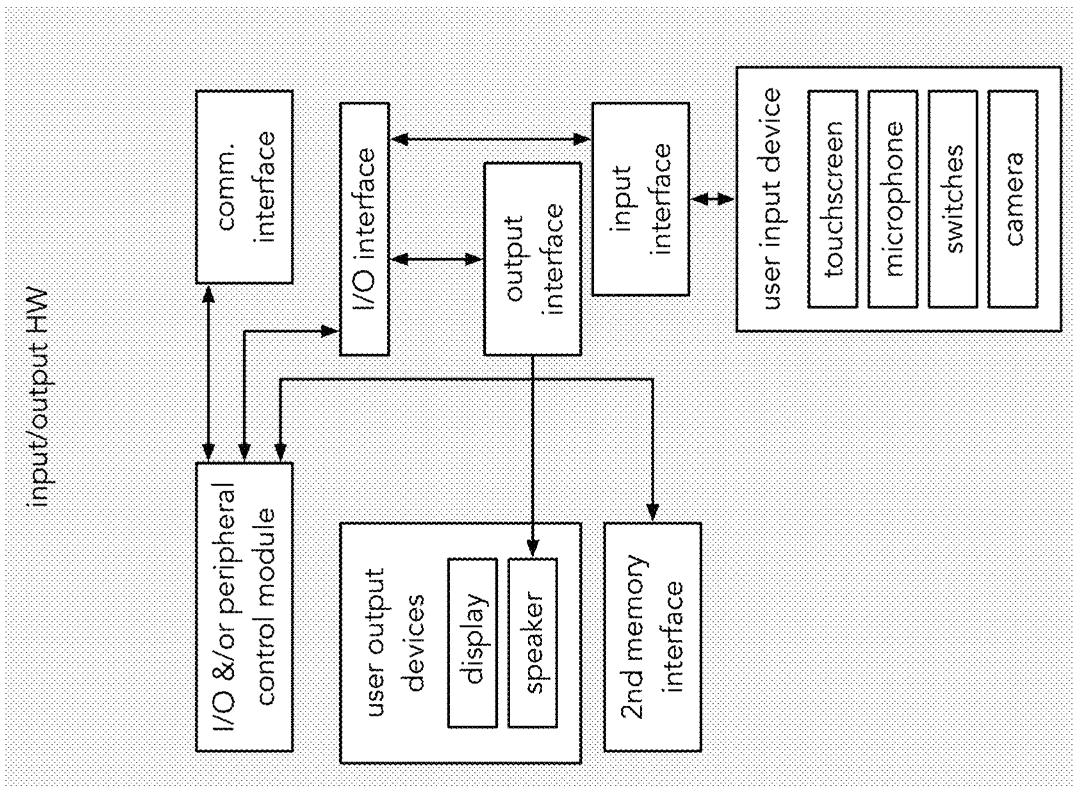
FIG. 70 is a schematic block diagram of an example of a user-interactive graphical input/output hardware (HW) of a cell phone composition functional diagram.

FIG. 70 is a schematic block diagram of an example of a user-interactive graphical input/output hardware (HW) of a cell phone composition functional diagram. The functional diagram of the cell phone's IO hardware includes an IO and/or peripheral control module, a communication interface, an IO interface, an output interface, output devices (e.g., a display, a speaker, etc.), an input interface, input devices (e.g., a touch screen, a microphone, switches, a camera, etc.), and secondary memory interface intercoupled as shown.

Figure 71:
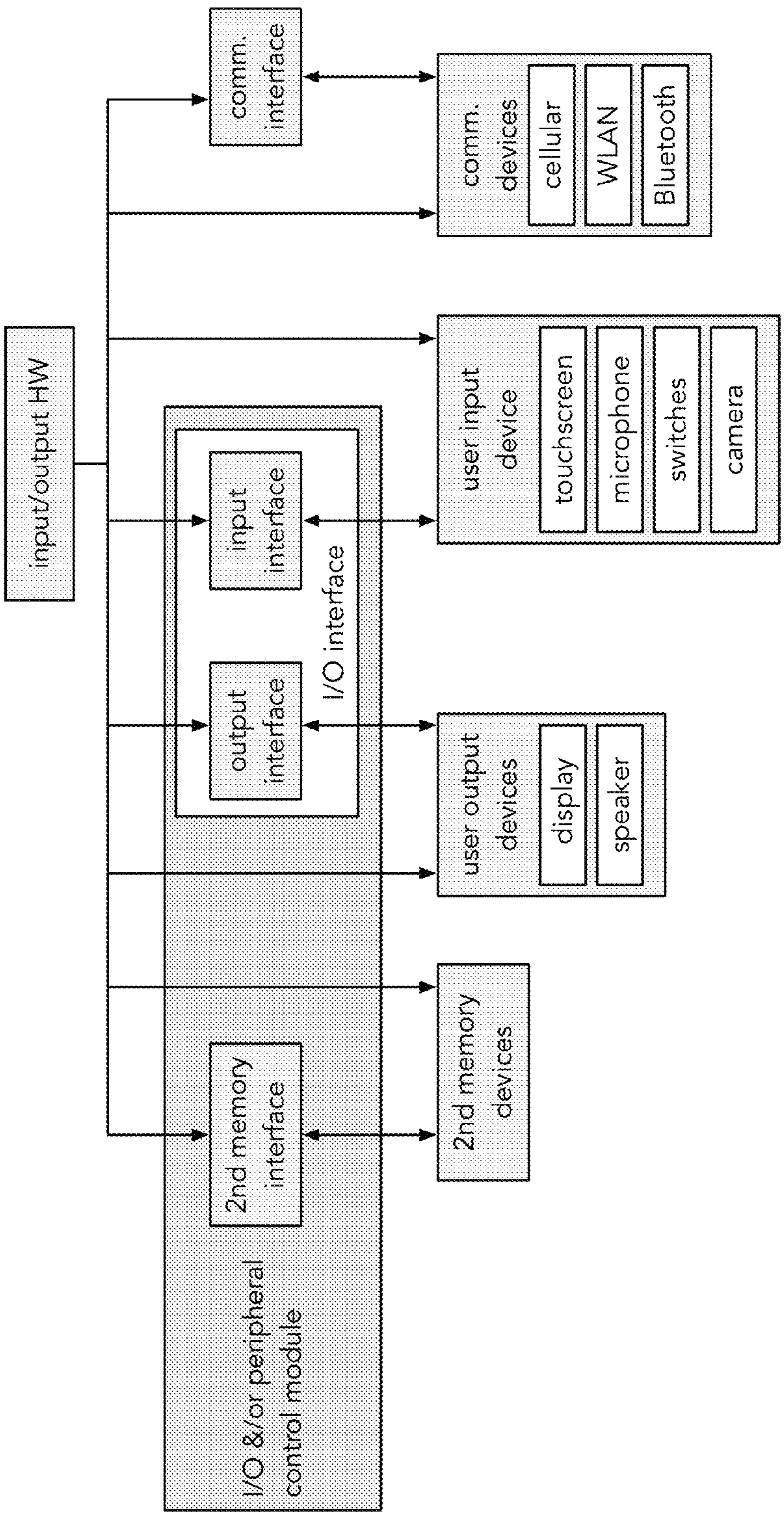
FIG. 71 is a schematic block diagram of an example of a user-interactive graphical input/output hardware (HW) of a cell phone composition hierarchy diagram.

FIG. 71 is a schematic block diagram of an example of a user-interactive graphical input/output hardware (HW) of a cell phone composition hierarchy diagram. In this diagram, the highest tier is the IO hardware, the next lower tier includes the communication interface, and the other interfaces. The next lower tier includes secondary memory, user output devices (e.g., display, speaker, etc.), user input devices (touch screen, microphone, switches, camera, etc.), and communication devices (cellular, WLAN, Bluetooth, etc.).

Figure 72:
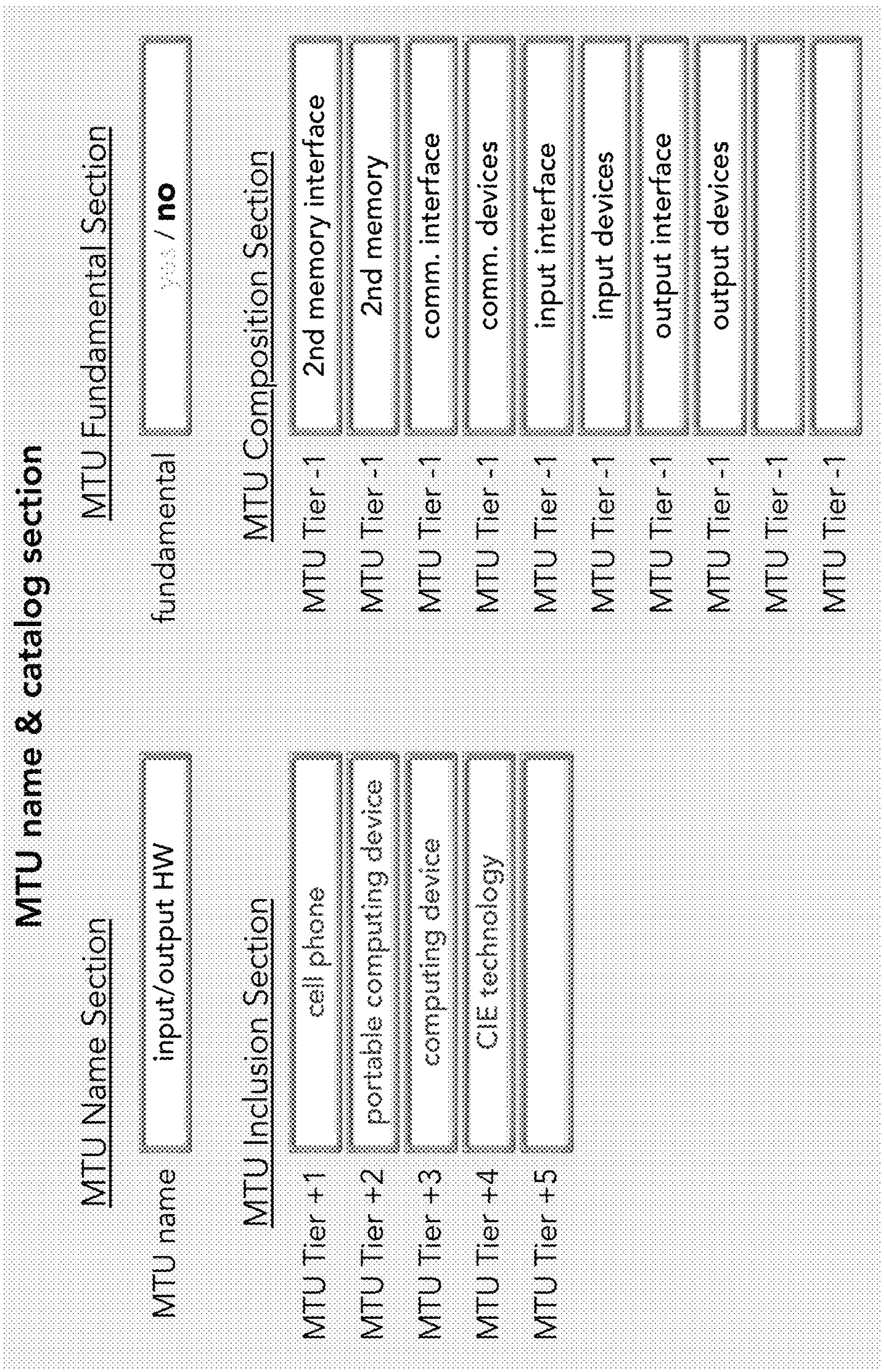
FIG. 72 is a schematic block diagram of an example of a user-interactive graphical MTU naming & catalog section of a market-tech unit (MTU) data record for input/output hardware (HW) of a cell phone.

FIG. 72 is a schematic block diagram of an example of a user-interactive graphical MTU name & catalog section of a market-tech unit (MTU) data record for input/output hardware (HW) of a cell phone. In accordance with the formatting of MTU records, the MTU name & catalog section includes an MTU name section, an MTU inclusion section, an MTU fundamental section, and an MTU composition section.

The MTU name section includes the name for this MTU, which is input/output HW. The MTU inclusion section includes the tier +1 MTU of cell phone, the tier +2 MTU of portable computing device, the tier +3 MTU of computing device, and the tier +4 MTU of CIE technology.

The MTU fundamental section indicates that the input/output HW is not a fundamental MTU. The MTU composition section includes, at a tier −1 level, the secondary memory interface, the secondary memory, the communication interface, communication devices, the input interface, input devices, the output interface, and output devices.

Figure 73:
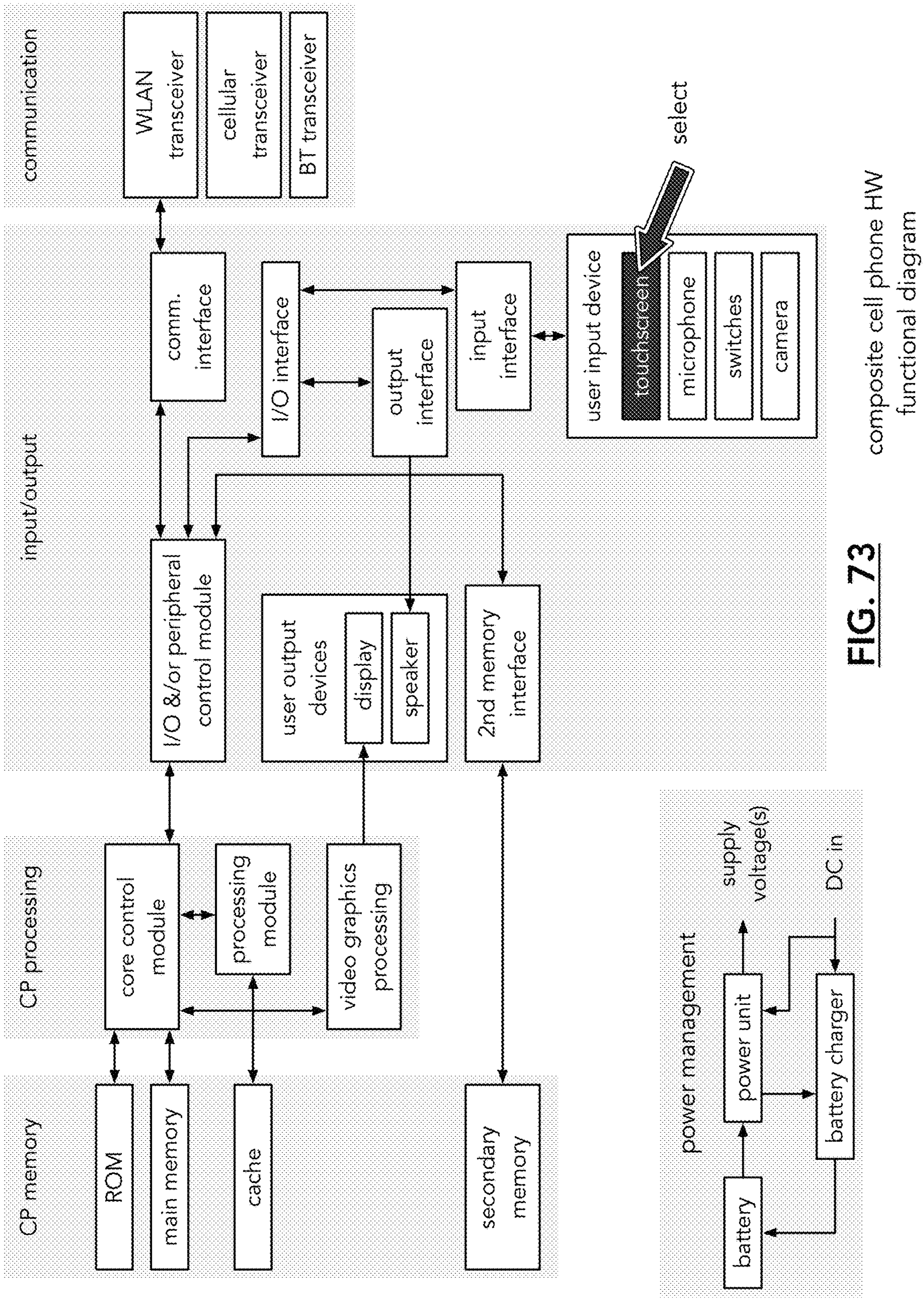
FIG. 73 is a schematic block diagram of an example of a user-interactive graphical cell phone composition functional diagram with "tier −2" details.

FIG. 73 is a schematic block diagram of an example of a user-interactive graphical cell phone composition functional diagram with "tier −2" details. This functional diagram of a cell phone includes the tier −1 MTUs and their respective tier −2 MTUs. The CP memory MTU includes a ROM MTU, a main memory MTU, a cache MTU, and a secondary memory MTU. The CP processing MTU includes a core control module MTU, a processing module MTU, and a video graphics processing MTU. The CP communication MTU includes a WLAN transceiver MTU, a cellular transceiver MTU, and Bluetooth (BT) transceiver MTU. The CP input/output HW includes the tier −2 MTUs as discussed with reference to FIG. 70.

From this diagram, the user input device of touchscreen is selected. The improved computer interprets the selection to retrieve and display an MTU record of the touchscreen; an example of which is shown in FIG. 74.

Figure 74:
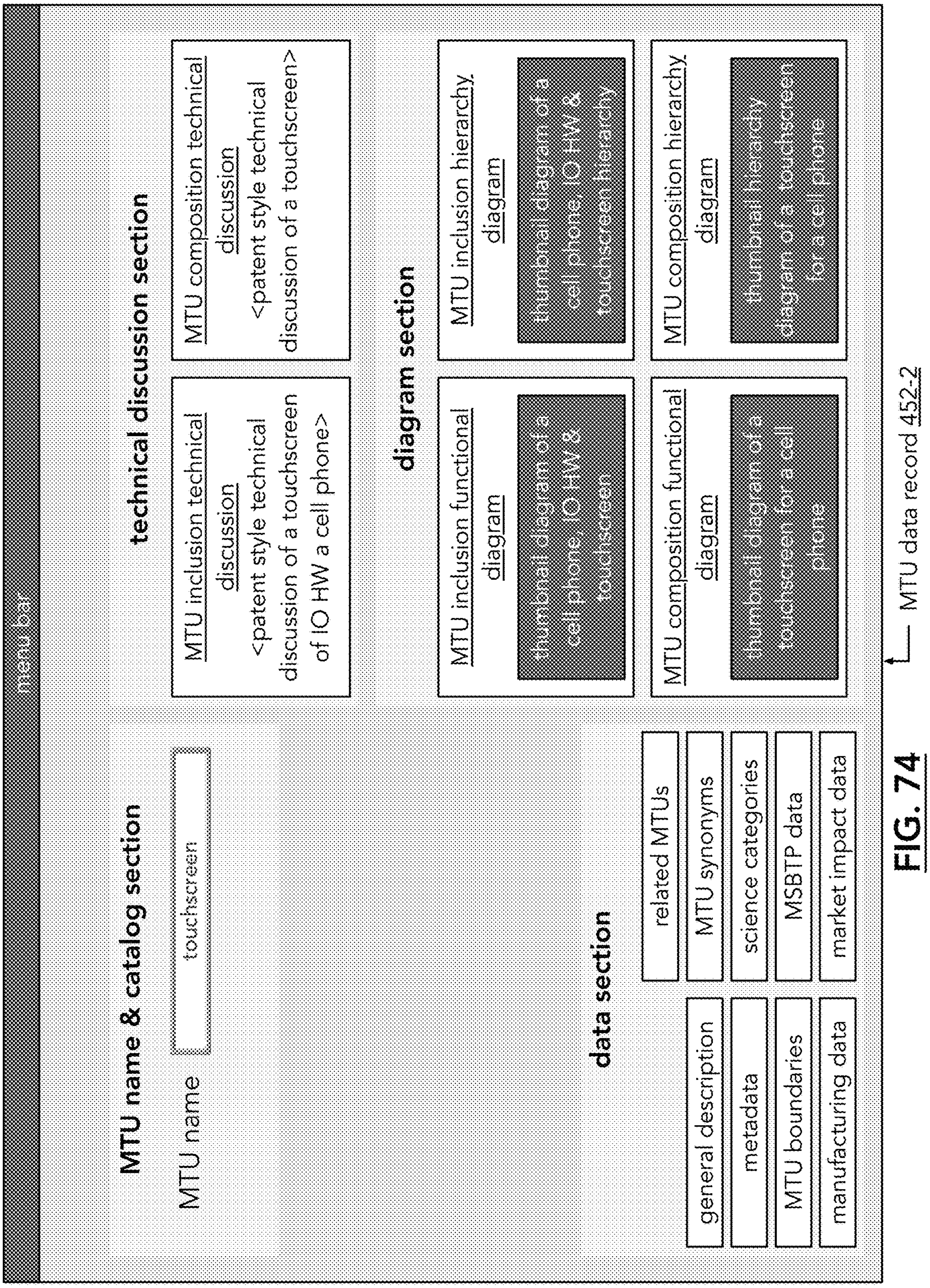
FIG. 74 is a schematic block diagram of an example of a user-interactive graphical market-tech unit (MTU) data record for a touch screen of input/output hardware (HW) of a cell phone.

FIG. 74 is a schematic block diagram of an example of a user-interactive graphical market-tech unit (MTU) data record for a touch screen of input/output hardware (HW) of a cell phone. In accordance with the formatting of MTU records, the touchscreen MTU records 452-2 includes an MTU name & catalog section, a data section for data relevant to a touchscreen of an input/output hardware of a cell phone, a technical discussion section, and a diagram section.

FIG. 75 is a schematic block diagram of an example of a user-interactive graphical composition functional diagram of a touch screen of input/output hardware (HW) of a cell phone. The touch screen includes the lower tier MTUs of a touch sense controller and touch sensors, which are interconnected as shown.

FIG. 76 is a schematic block diagram of an example of a user-interactive graphical MTU name & catalog section of a market-tech unit (MTU) data record for a touch screen of input/output hardware (HW) of a cell phone. The MTU name for this record is touchscreen. The MTU fundamental section indicates that this is not a fundamental MTU.

The MTU inclusion section includes a tier +1 MTU of the input/output HW, a tier +2 MTU of the cell phone, a tier +3 MTU of portable computing device, a tier +4 MTU of computing device, and a tier +5 MTU of CIE technology. The MTU composition section includes the lower tier MTUs of touch sense controller and touch sensors.

From FIG. 75, the touch screen controller was selected. The improved computer interprets the selection to retrieve and display an MTU record of a touch screen controller; an example of which is shown in FIG. 77.

Figure 77:
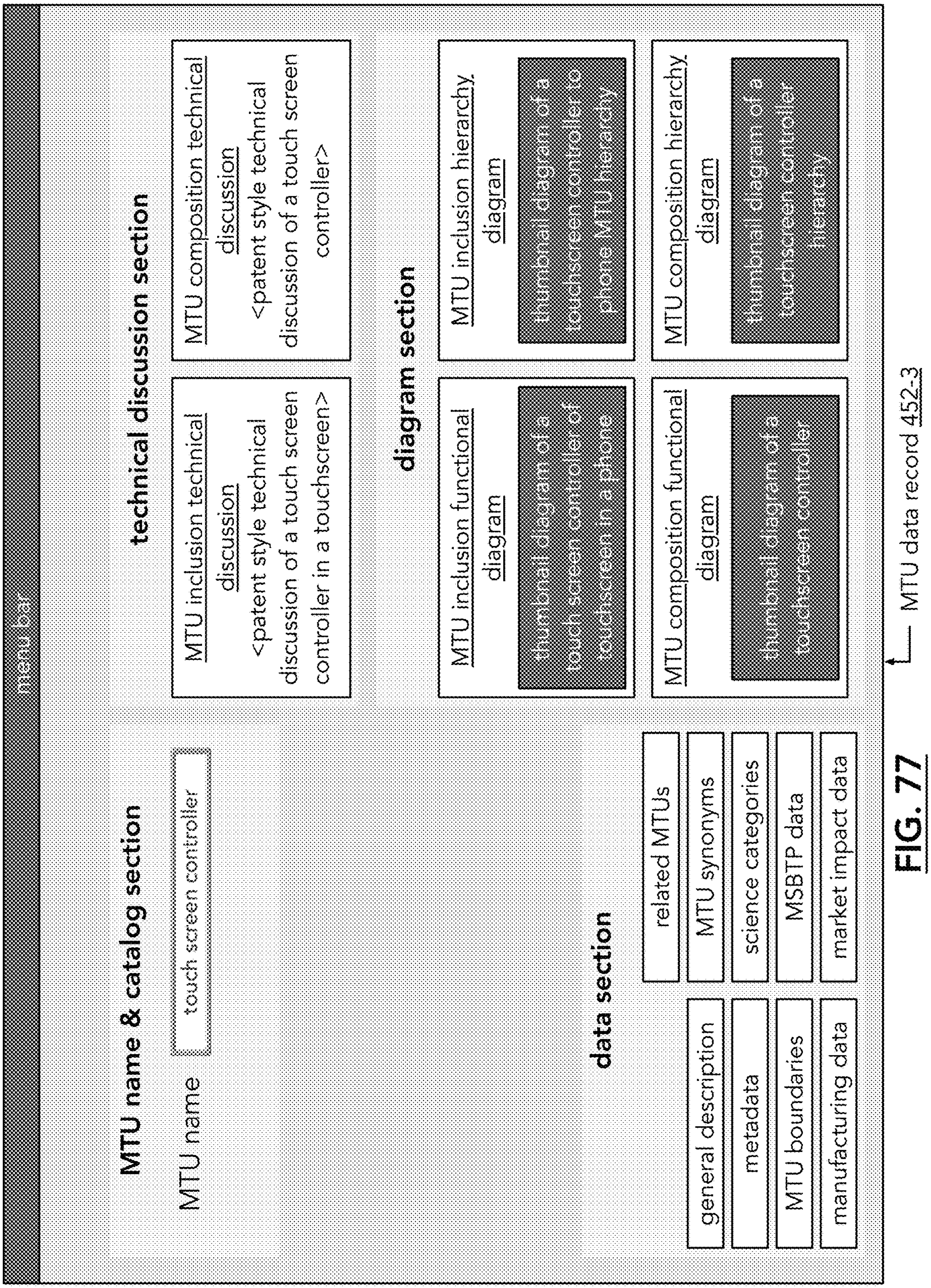
FIG. 77 is a schematic block diagram of an example of a user-interactive graphical market-tech unit (MTU) data record for a touch screen controller of a touch screen of input/output hardware (HW) of a cell phone.

FIG. 77 is a schematic block diagram of an example of a user-interactive graphical market-tech unit (MTU) data record for a touch screen controller of a touch screen of input/output hardware (HW) of a cell phone. In accordance with the formatting of MTU records, the touch screen controller MTU record 452-3 includes an MTU name & catalog section, a data section for data relevant to a touchscreen of an input/output hardware of a cell phone, a technical discussion section, and a diagram section.

Figure 78:
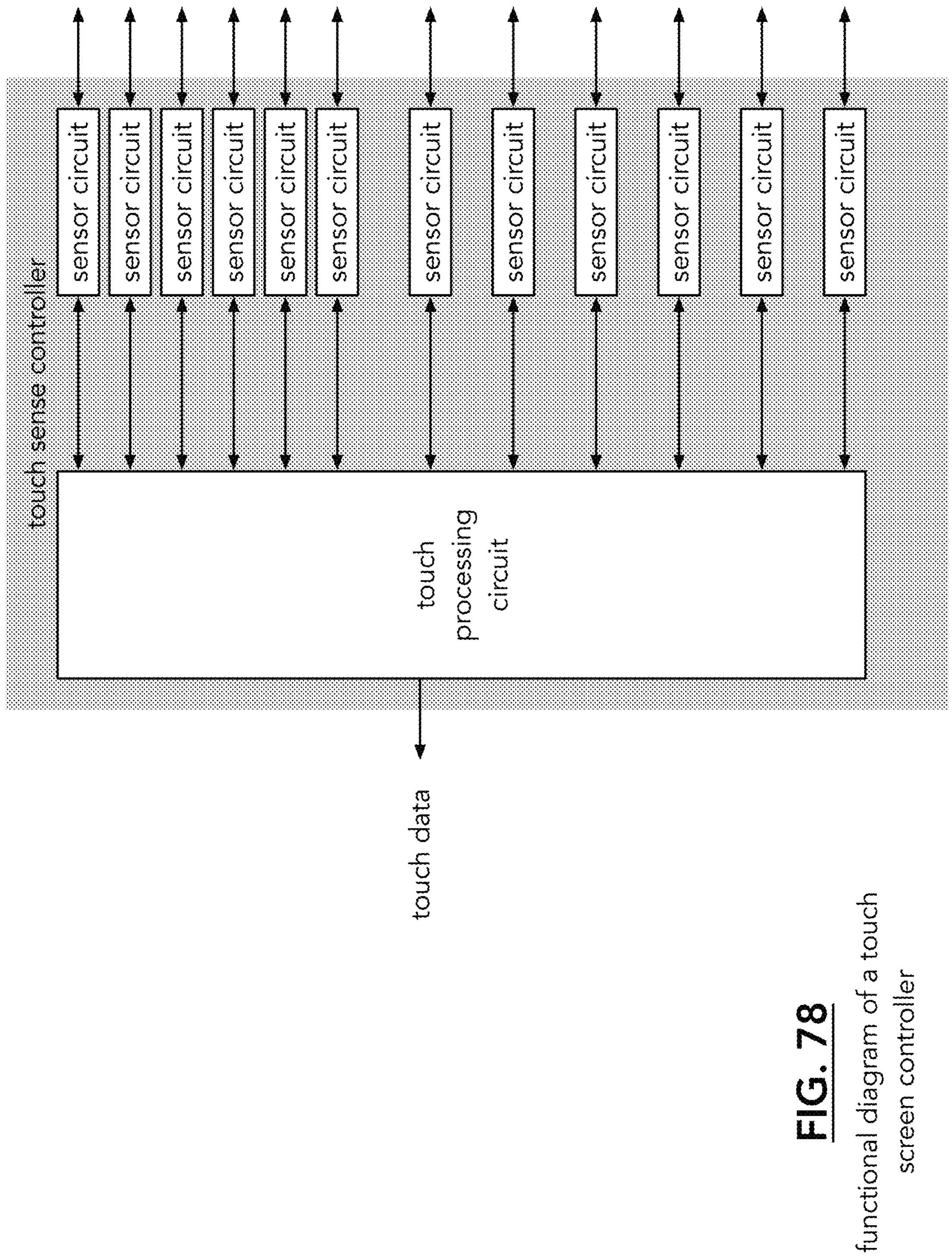
FIG. 78 is a schematic block diagram of an example of a user-interactive graphical composition functional diagram of a touch screen controller of a touch screen of input/output hardware (HW) of a cell phone.

FIG. 78 is a schematic block diagram of an example of a user-interactive graphical composition functional diagram of a touch screen controller of a touch screen of input/output hardware (HW) of a cell phone. The touch sense controller includes a touch processing circuit and a plurality of sensor circuits.

Figure 79:
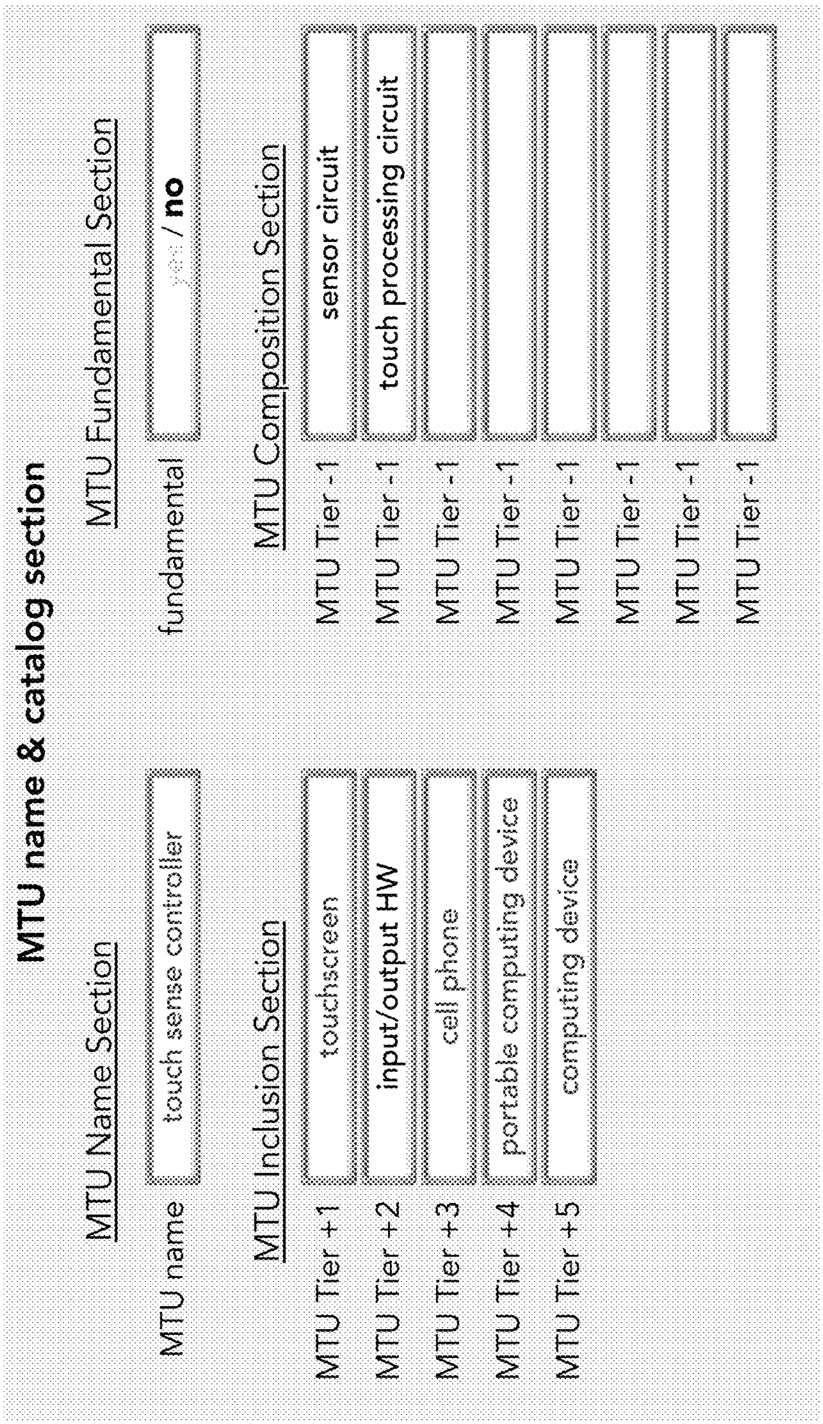
FIG. 79 is a schematic block diagram of an example of a user-interactive graphical MTU naming & catalog section of a market-tech unit (MTU) data record for a touch screen controller of a touch screen of input/output hardware (HW) of a cell phone.

FIG. 79 is a schematic block diagram of an example of a user-interactive graphical MTU name & catalog section of a market-tech unit (MTU) data record for a touch screen controller of a touch screen of input/output hardware (HW) of a cell phone. The MTU name for this record is touch sense controller. The MTU fundamental section indicates that this is not a fundamental MTU.

The MTU inclusion section includes a tier +1 MTU of touch screen, a tier +2 MTU of the input/output HW, a tier +3 MTU of the cell phone, a tier +4 MTU of portable computing device, and a tier +5 MTU of computing device. The MTU composition section includes the lower tier MTUs of sensor circuit and touch processing circuit.

Figure 80:
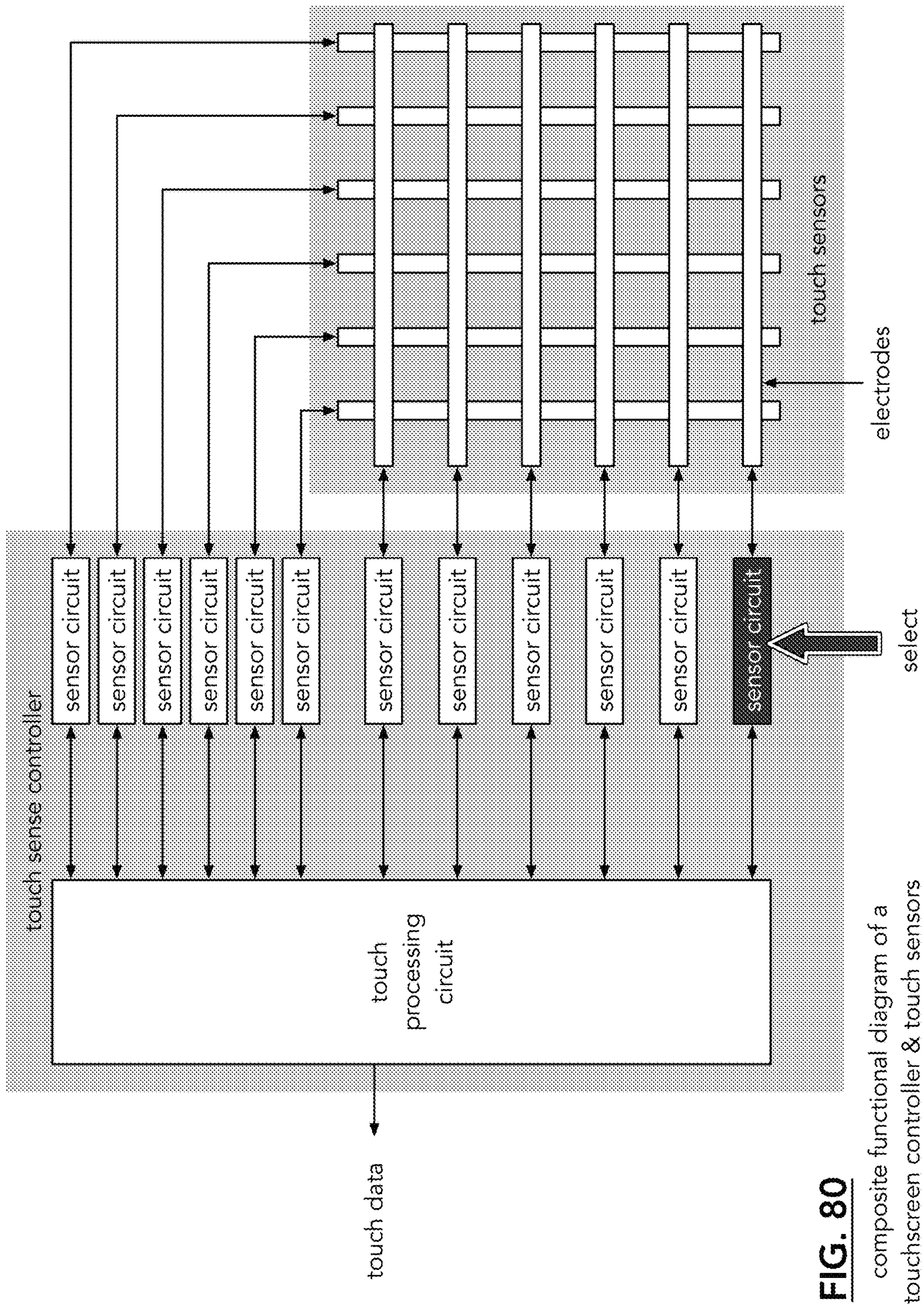
FIG. 80 is a schematic block diagram of an example of a user-interactive graphical composition functional diagram of a touch screen of input/output hardware (HW) of a cell phone with "tier −2" details.

FIG. 80 is a schematic block diagram of an example of a user-interactive graphical composition functional diagram of a touch screen of input/output hardware (HW) of a cell phone with "tier −2" details. The diagram includes a touch sense controller and a plurality of electrodes, which functions as sensors. The touch sense controller includes a plurality of sensor circuits and a touch processing circuit.

In general, a sensor circuit provides a signal to a corresponding electrode so that it can measure the self-capacitance of the electrode (e.g., capacitance of the electrode with respect to a ground plane) and/or mutual capacitance of the electrode with respect to an intersecting electrode. Changes in the self-capacitance and/or mutual capacitance indicates a human touch (directly or via a stylus) of the electrode.

The touch processing circuit receives the sensed capacitance values from the sensor circuits. The touch screen processing circuit detects a touch based on capacitance changes of electrodes and the position of the touch based on which electrodes have a capacitance change.

In this Figure, the sensor circuit is selected for further detail. The improved computer interprets the selection to retrieve and display an MTU record of a sensor circuit; an example of which is shown in FIG. 81.

Figure 81:
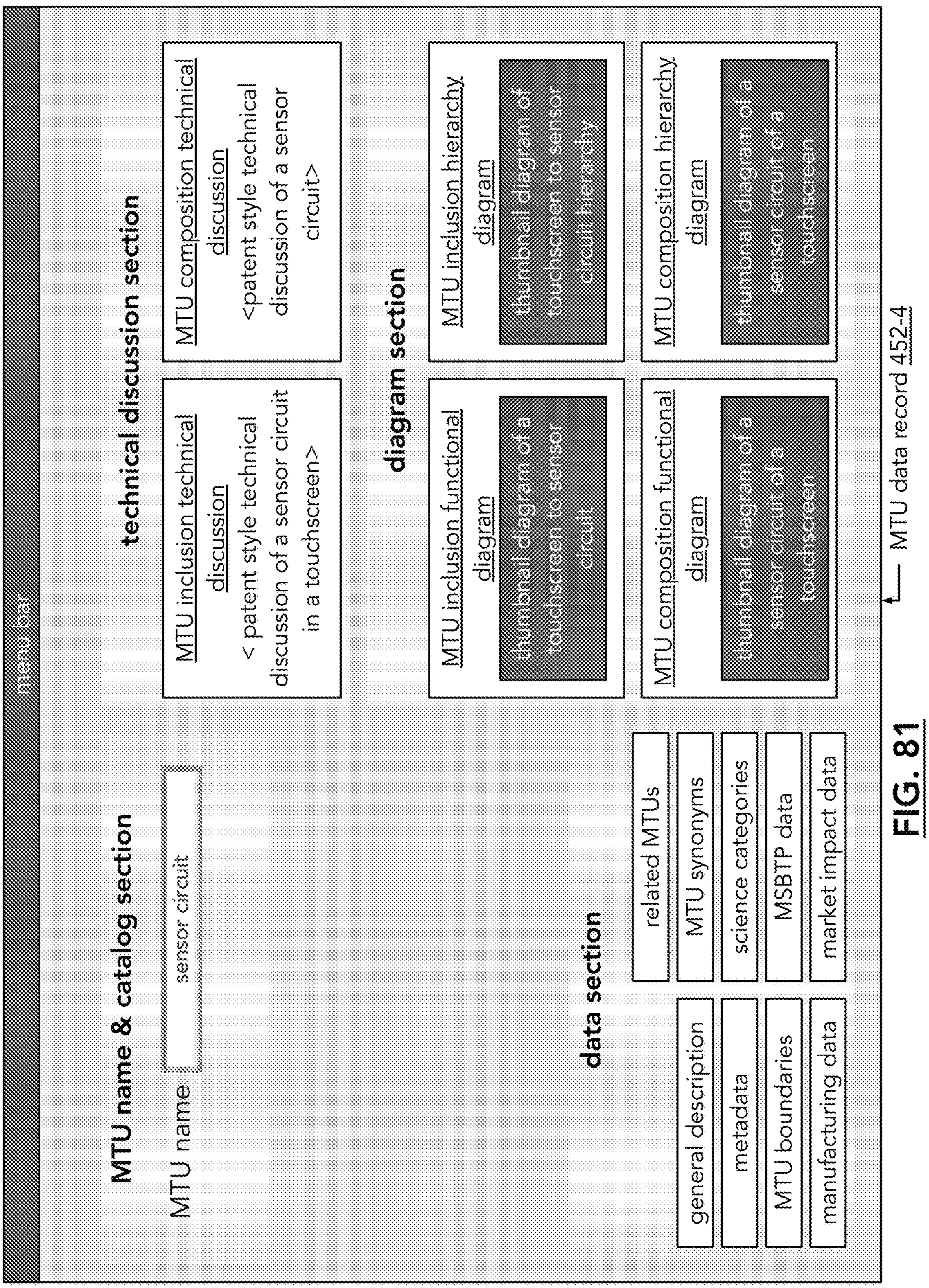
FIG. 81 is a schematic block diagram of an example of a user-interactive graphical market-tech unit (MTU) data record for a sensor circuit of a touch screen controller of a touch screen of input/output hardware (HW) of a cell phone.

FIG. 81 is a schematic block diagram of an example of a user-interactive graphical market-tech unit (MTU) data record for a sensor circuit of a touch screen controller of a touch screen of input/output hardware (HW) of a cell phone. In accordance with the formatting of MTU records, the sensor circuit MTU record 452-4 includes an MTU name & catalog section, a data section for data relevant to a touchscreen of an input/output hardware of a cell phone, a technical discussion section, and a diagram section.

Figure 82:
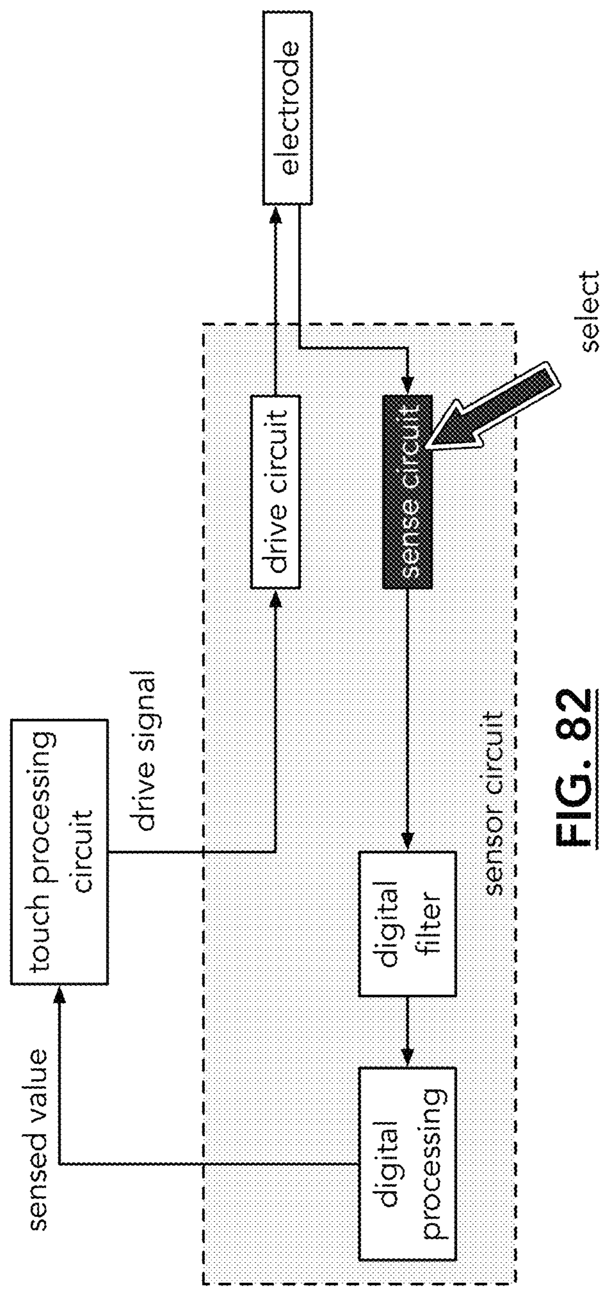
FIG. 82 is a schematic block diagram of an example of a user-interactive graphical composition functional diagram of a sensor circuit of a touch screen controller of a touch screen of input/output hardware (HW) of a cell phone.

FIG. 82 is a schematic block diagram of an example of a user-interactive graphical composition functional diagram of a sensor circuit of a touch screen controller of a touch screen of input/output hardware (HW) of a cell phone. The sensor circuit includes a sense circuit, a drive circuit, a digital filter, and digital processing circuit.

The drive circuit provides a drive signal to an electrode. The sense circuit senses the impedance and/or capacitance of the electrode and produces a digital representation thereof. The digital filter filters the digital representation to remove unwanted signal components to produce digital values. The digital processing circuit interprets the digitals to provide a sensed value at a sampling rate to the touch processing circuit.

In this Figure, the sense circuit of the sensor circuit is selected for further detail. The improved computer interprets the selection to retrieve and display an MTU record of a sense circuit; an example of which is shown in FIG. 84, which is discussed in turn.

Figure 83:
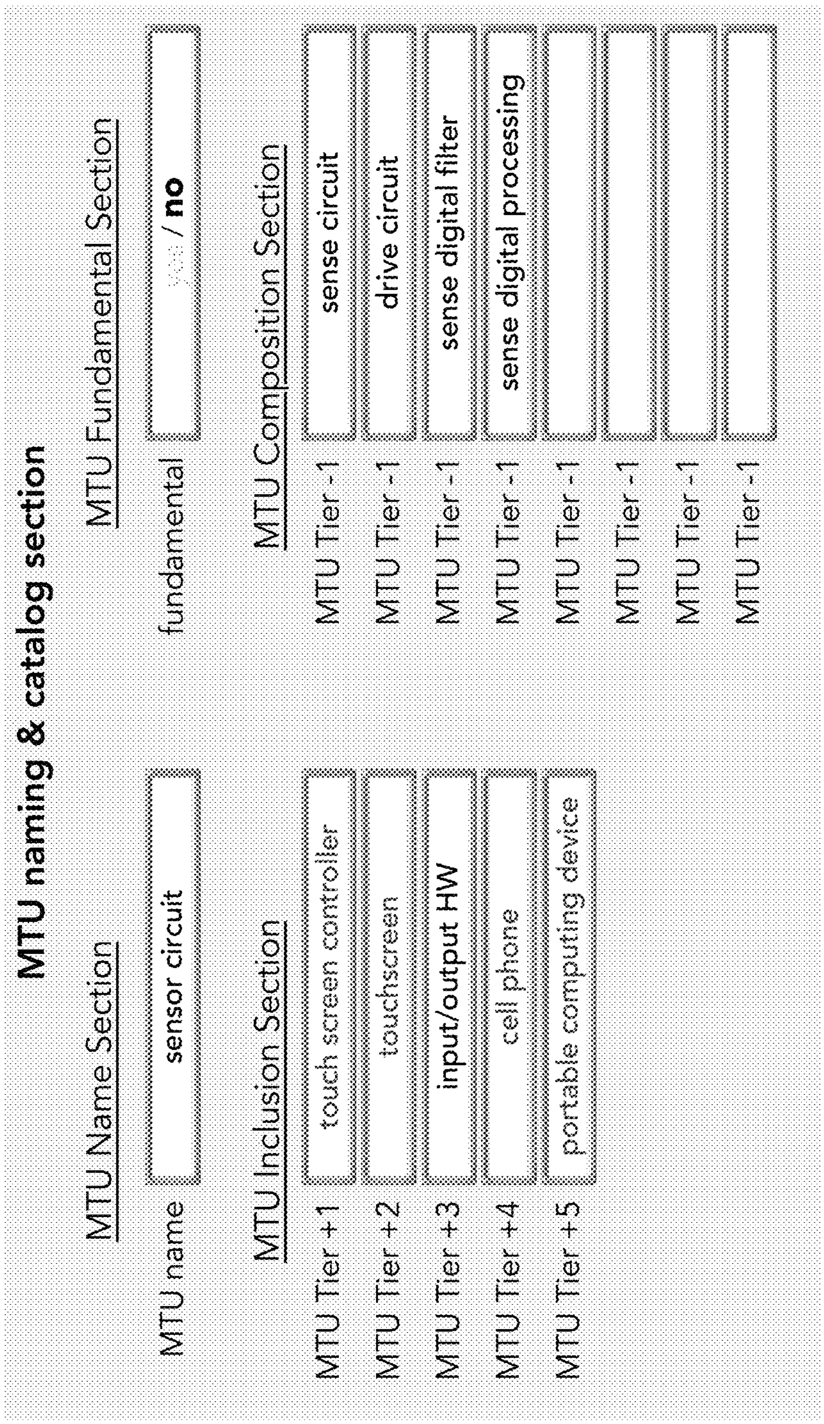
FIG. 83 is a schematic block diagram of an example of a user-interactive graphical MTU naming & catalog section of a market-tech unit (MTU) data record for a sensor circuit of a touch screen controller of a touch screen of input/output hardware (HW) of a cell phone.

FIG. 83 is a schematic block diagram of an example of a user-interactive graphical MTU name & catalog section of a market-tech unit (MTU) data record for a sensor circuit of a touch screen controller of a touch screen of input/output hardware (HW) of a cell phone. The MTU name for this record is sensor circuit. The MTU fundamental section indicates that this is not a fundamental MTU.

The MTU inclusion section includes a tier +1 MTU of a touch screen controller, a tier +2 MTU of touch screen, a tier +3 MTU of the input/output HW, a tier +4 MTU of the cell phone, and a tier +5 MTU of portable computing device. The MTU composition section includes the lower tier MTUs of sense circuit, a drive circuit, a sense digital filter, and sense digital processing circuit.

Figure 84:
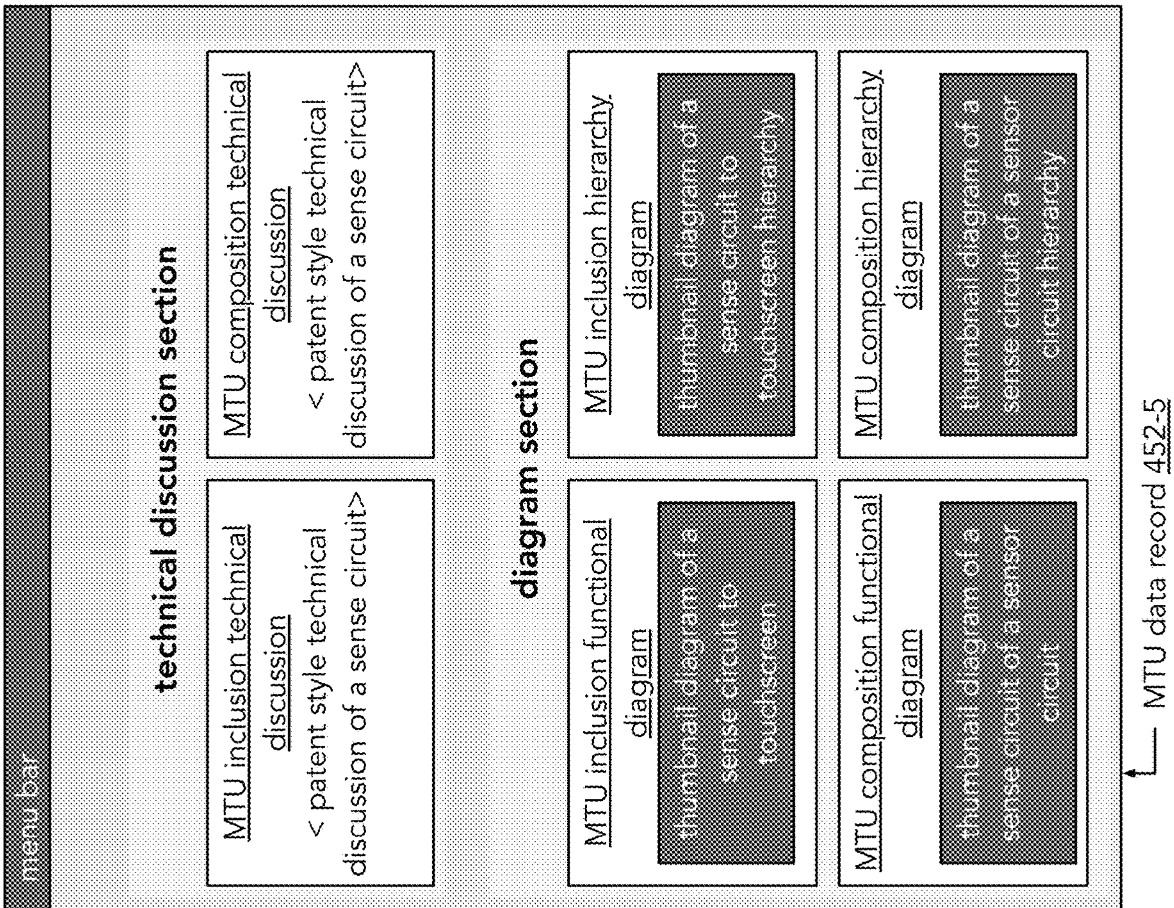
FIG. 84 is a schematic block diagram of an example of a user-interactive graphical market-tech unit (MTU) data record for a sense circuit of a sensor circuit of a touch screen controller of a touch screen of input/output hardware (HW) of a cell phone.

FIG. 84 is a schematic block diagram of an example of a user-interactive graphical market-tech unit (MTU) data record for a sense circuit of a sensor circuit of a touch screen controller of a touch screen of input/output hardware (HW) of a cell phone. In accordance with the formatting of MTU records, the sense circuit MTU record 452-5 includes an MTU name & catalog section, a data section for data relevant to a touchscreen of an input/output hardware of a cell phone, a technical discussion section, and a diagram section.

Figure 85:
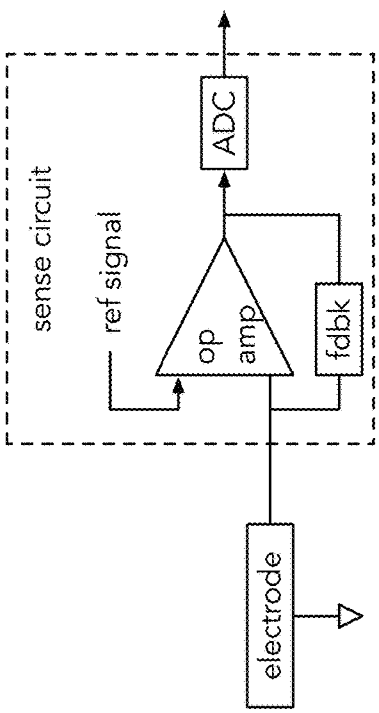
FIG. 85 is a schematic block diagram of an example of a user-interactive graphical composition functional diagram of a sense circuit of a sensor circuit of a touch screen controller of a touch screen of input/output hardware (HW) of a cell phone.

FIG. 85 is a schematic block diagram of an example of a user-interactive graphical composition functional diagram of a sense circuit of a sensor circuit of a touch screen controller of a touch screen of input/output hardware (HW) of a cell phone. The sense circuit includes an op amp, a feedback circuit (which could be part of the op amp), a voltage reference source, and an analog to digital converter (ADC). The op amp compares a reference voltage produced by the voltage reference source with a voltage imposed on electrode by the drive circuit to produce an analog signal that represents a difference between the reference voltage and the voltage on the electrode. The ADC converts the analog signal into a digital signal.

Figure 86:
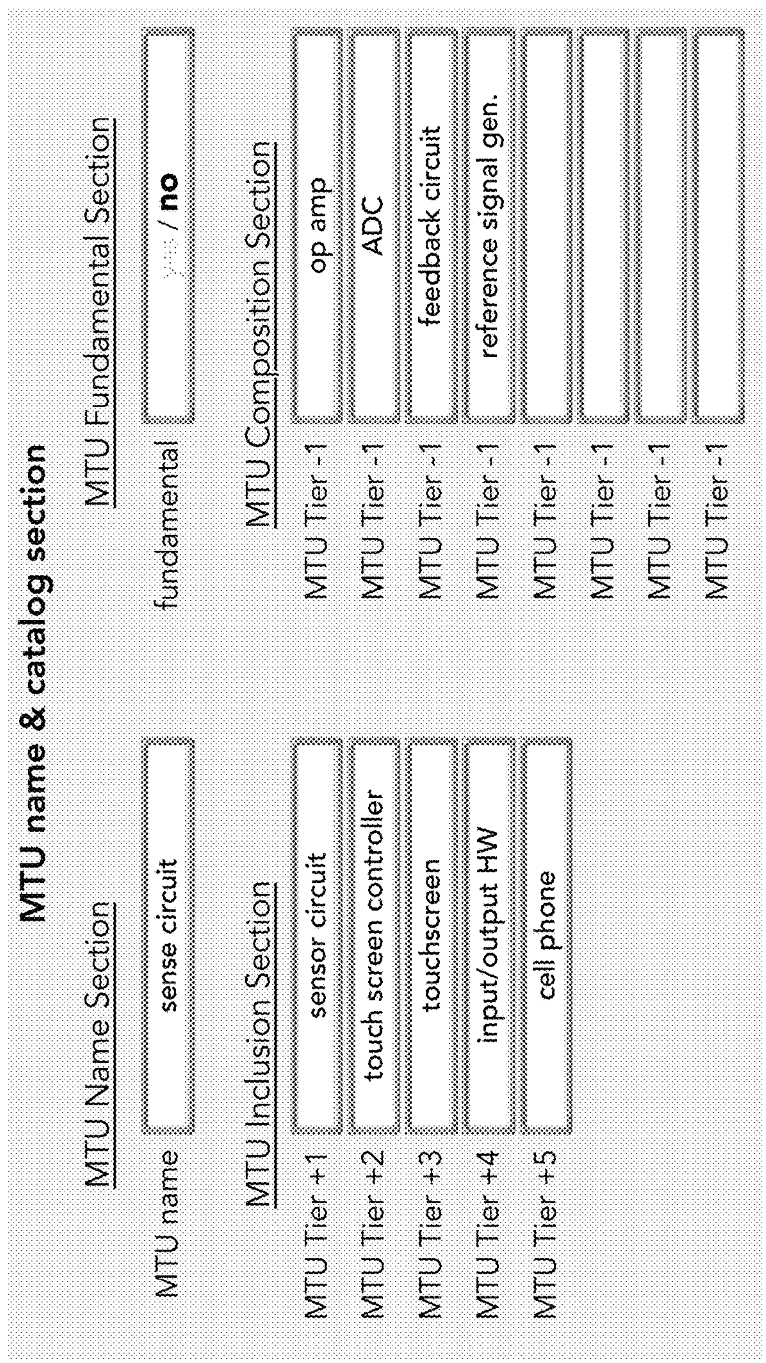
FIG. 86 is a schematic block diagram of an example of a user-interactive graphical MTU naming & catalog section of a market-tech unit (MTU) data record for a sense circuit of a sensor circuit of a touch screen controller of a touch screen of input/output hardware (HW) of a cell phone.

FIG. 86 is a schematic block diagram of an example of a user-interactive graphical MTU name & catalog section of a market-tech unit (MTU) data record for a sense circuit of a sensor circuit of a touch screen controller of a touch screen of input/output hardware (HW) of a cell phone. The MTU name for this record is sense circuit [of a sensor circuit]. The MTU fundamental section indicates that this is not a fundamental MTU.

The MTU inclusion section includes a tier +1 MTU of a sensor circuit, a tier +2 MTU of a touch screen controller, a tier +3 MTU of touch screen, a tier +4 MTU of the input/output HW, and a tier +5 MTU of the cell phone. The MTU composition section includes the lower tier MTUs of an op amp, an ADC, a feedback circuit, and a reference signal generator (or reference voltage source).

Figure 87:
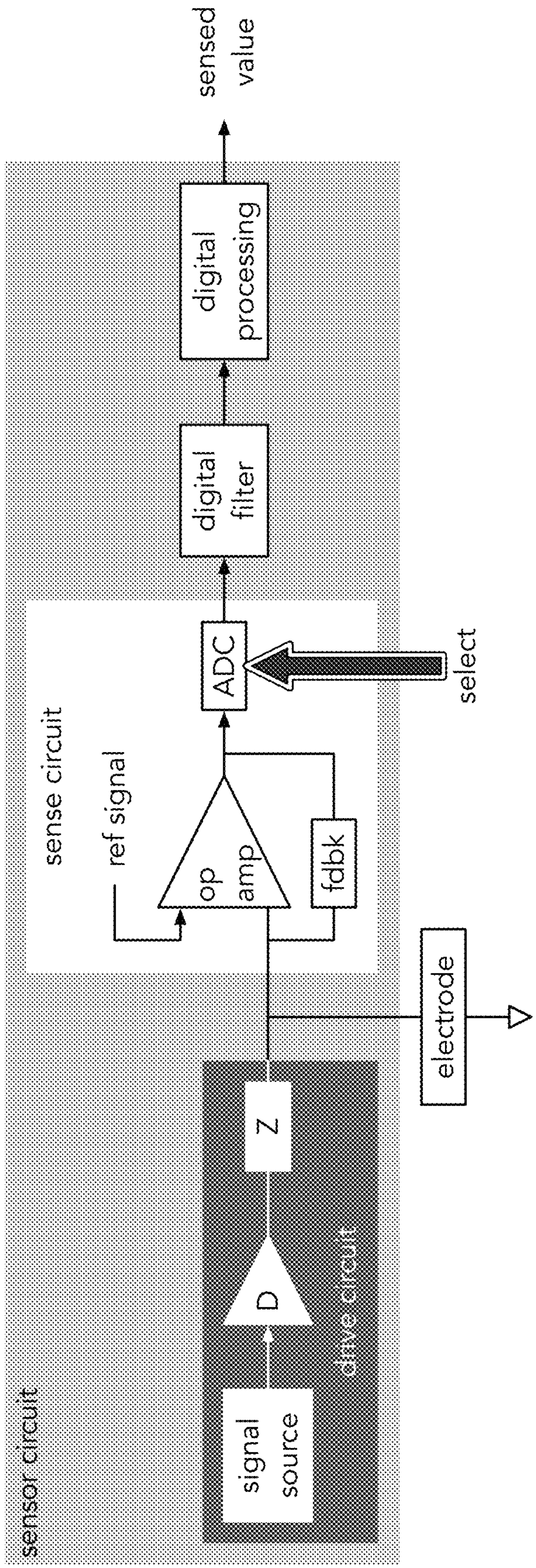
FIG. 87 is a schematic block diagram of an example of a user-interactive graphical composition functional diagram of a sensor circuit of a touch screen of input/output hardware (HW) of a cell phone with "tier −2" details.

FIG. 87 is a schematic block diagram of an example of a user-interactive graphical composition functional diagram of a sensor circuit of a touch screen of input/output hardware (HW) of a cell phone with "tier −2" details. This diagram includes the MTU elements of the drive circuit and of the sense circuit. The drive circuit includes a signal source, a driver (D), and an impedance (Z).

Figure 88:
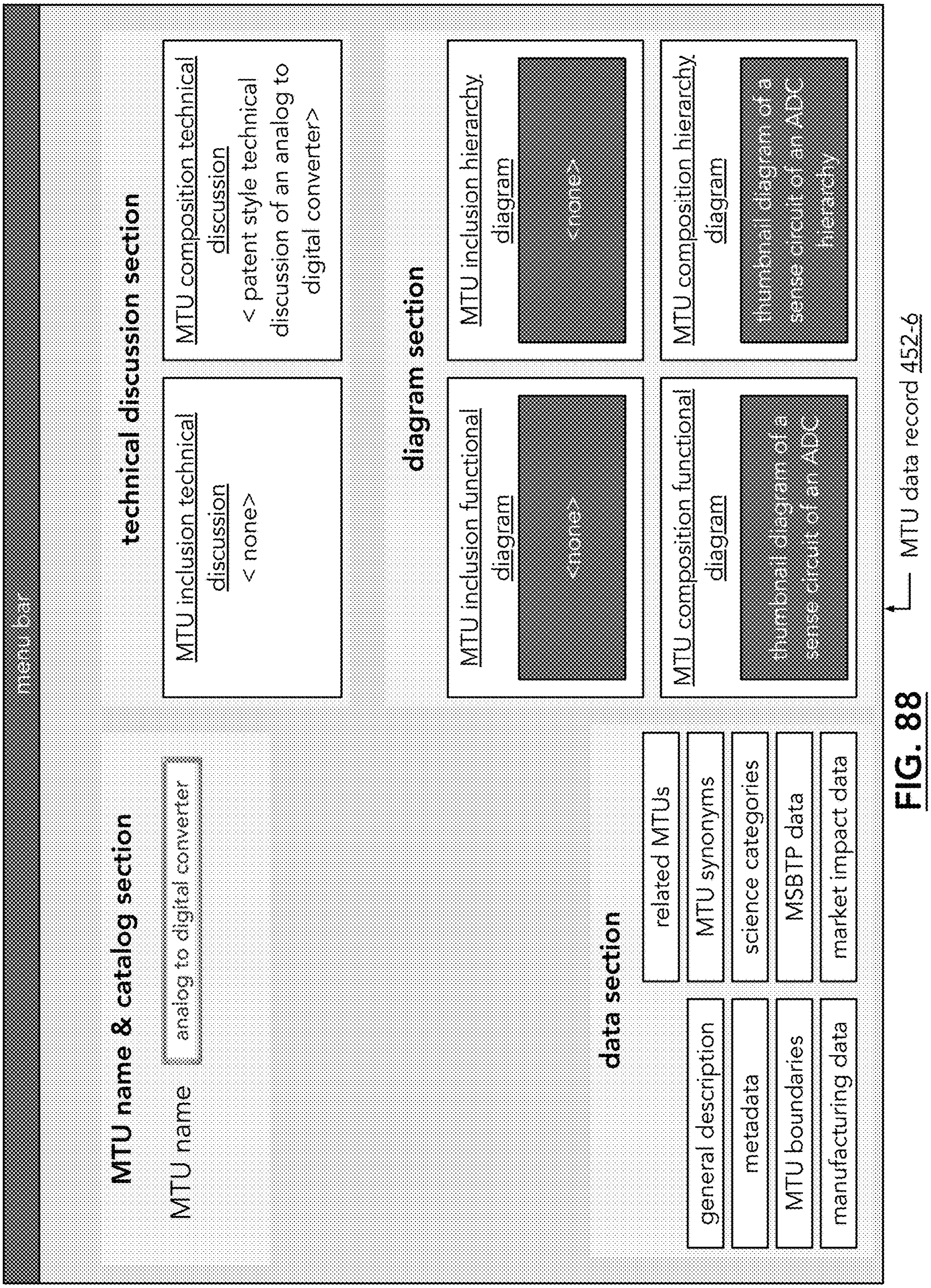
FIG. 88 is a schematic block diagram of an example of a user-interactive graphical market-tech unit (MTU) data record for an analog to digital converter.

FIG. 88 is a schematic block diagram of an example of a user-interactive graphical market-tech unit (MTU) data record for an analog to digital converter. In accordance with the formatting of MTU records, the ADC MTU record 452-6 includes an MTU name & catalog section, a data section for data relevant to a touchscreen of an input/output hardware of a cell phone, a technical discussion section, and a diagram section.

FIG. 89 is a schematic block diagram of an example of a user-interactive graphical composition functional diagram of an analog to digital converter. The ADC includes an analog comparison circuit and a digital logic circuit. The analog comparison circuit compares an analog input with one or more reference voltage to produce analog comparative signal.

For example, if the ADC includes three reference voltages (e.g., 1 volt, 2 volts, and 3 volts), for an input voltage below 1 volt, the analog comparator produce a 0 VDC output. If the input voltage is between 1 and 2 volts, the analog comparator produce a 1 VDC output. If the input voltage is between 2 and 3 volts, the analog comparator produce a 2 VDC output. If the input voltage is above 3 volts, the analog comparator produce a 3 VDC output.

The digital logic circuit, at a sampling rate, produces a digital representation of the analog output of the analog comparator. In the above example, the digital logic circuit produces a 00 digital value for an analog output of 0 volts, a 01 digital value for an analog output of 1 volt, a 10 digital value for an analog output of 2 volts, and a 11 digital value for an analog output of 3 volts.

FIG. 90 is a schematic block diagram of an example of a user-interactive graphical MTU naming & catalog section of a market-tech unit (MTU) data record for an analog to digital converter, which is a fundamental MTU. The MTU name for this record is analog to digital converter. The MTU fundamental section indicates that this is a fundamental MTU.

Being a fundamental MTU, the MTU inclusion section is left blank. The MTU composition section includes the lower tier MTUs of an analog compare circuit and a digital logic circuit.

Figure 91:
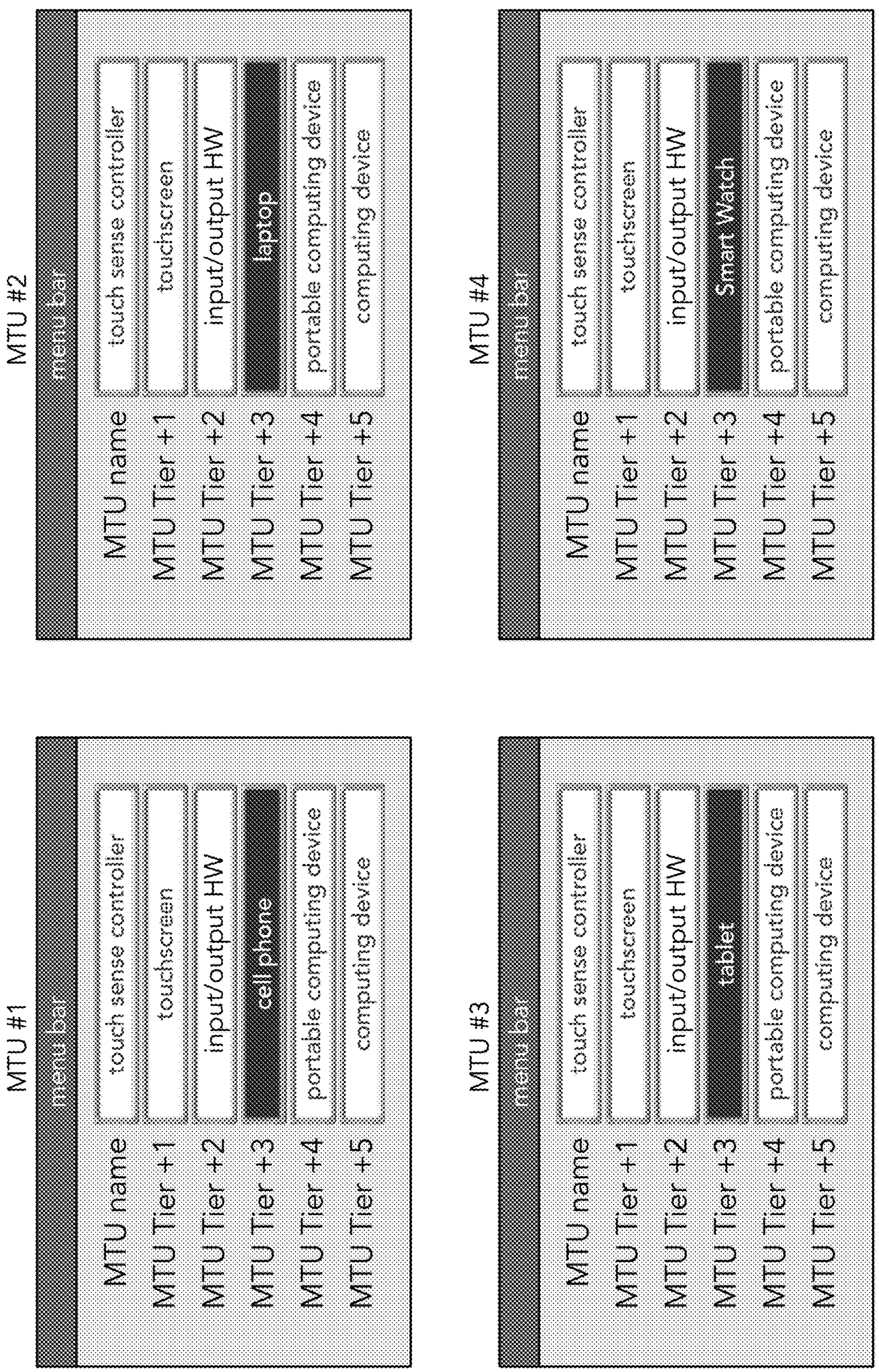
FIG. 91 is a schematic block diagram of an example of a user-interactive graphical market-tech unit (MTU) data records for MTUs related to the sense circuit of a sensor circuit of a touch screen controller of a touch screen of input/output hardware (HW) of a cell phone.

FIG. 91 is a schematic block diagram of an example of a user-interactive graphical market-tech unit (MTU) data records for MTUs related to the sense circuit of a sensor circuit of a touch screen controller of a touch screen of input/output hardware (HW) of a cell phone. The related MTU records include one for a laptop, one for a tablet, and one for a smart watch.

Related MTUs are useful in expanding an initial MTU. For example, a new touch screen controller designed for a touch screen for use in a cell phone may be expanded to uses in the related MTUs of tablets, laptops, and/or smart watches.

Figure 92:
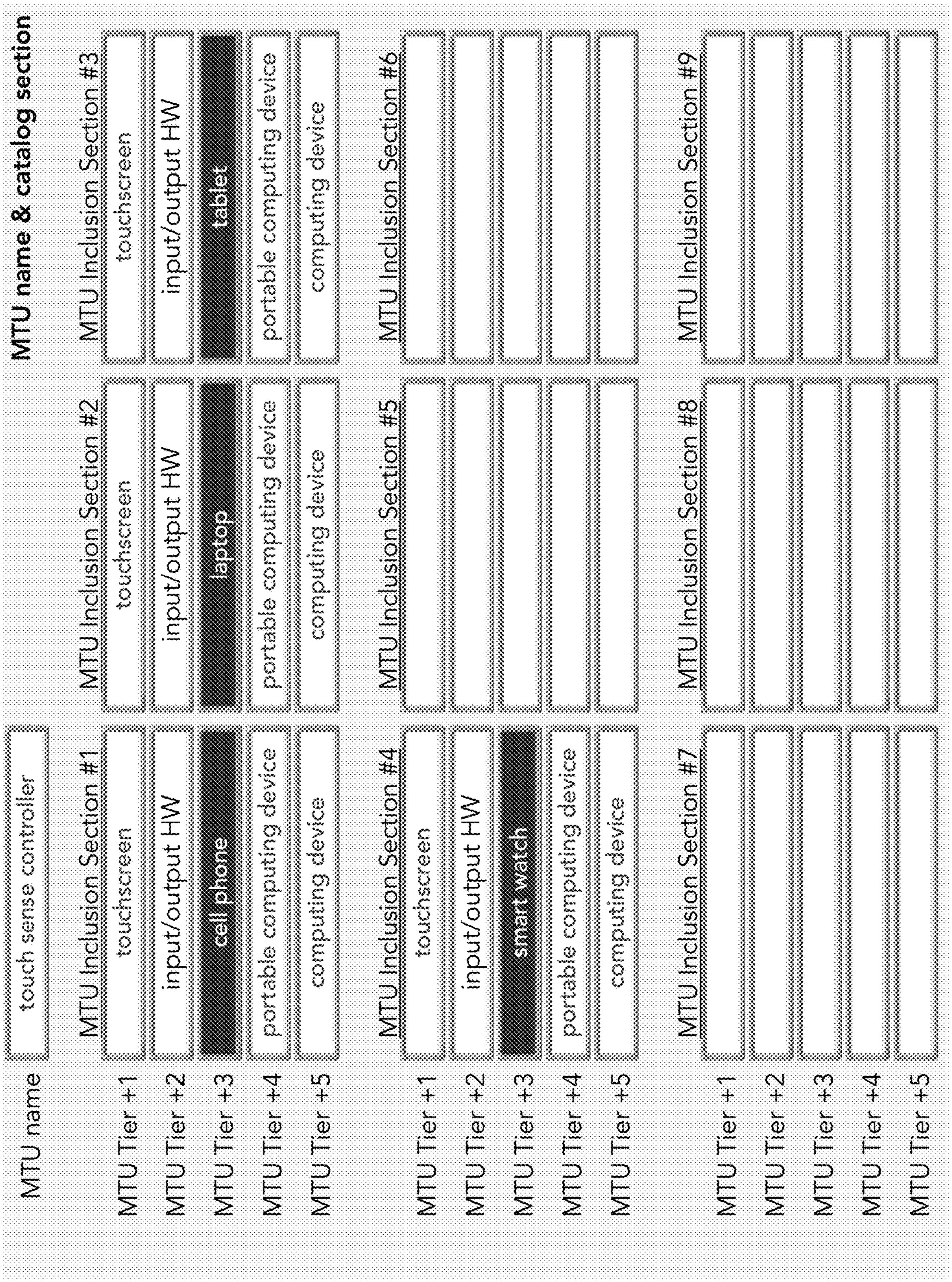
FIG. 92 is a schematic block diagram of an example of a user-interactive graphical market-tech unit (MTU) data record for a sense circuit of a sensor circuit of a touch screen controller of a touch screen of input/output hardware (HW) of a cell phone that includes related MTU inclusions of the sensor circuit.

FIG. 92 is a schematic block diagram of an example of a user-interactive graphical market-tech unit (MTU) data record for a touch sense controller that includes a plurality of MTU inclusion sections as opposed to separate MTU records for the touch screen controller and its different MTU inclusion paths.

In this MTU records, the MTU name and catalog section includes a plurality of MTU includes sections. The first MTU inclusion section is for a cell phone, the second MTU section is for a laptop, the third MTU inclusion section is for a tablet, and the fourth MTU inclusion section is for a smart watch.

Figure 93:
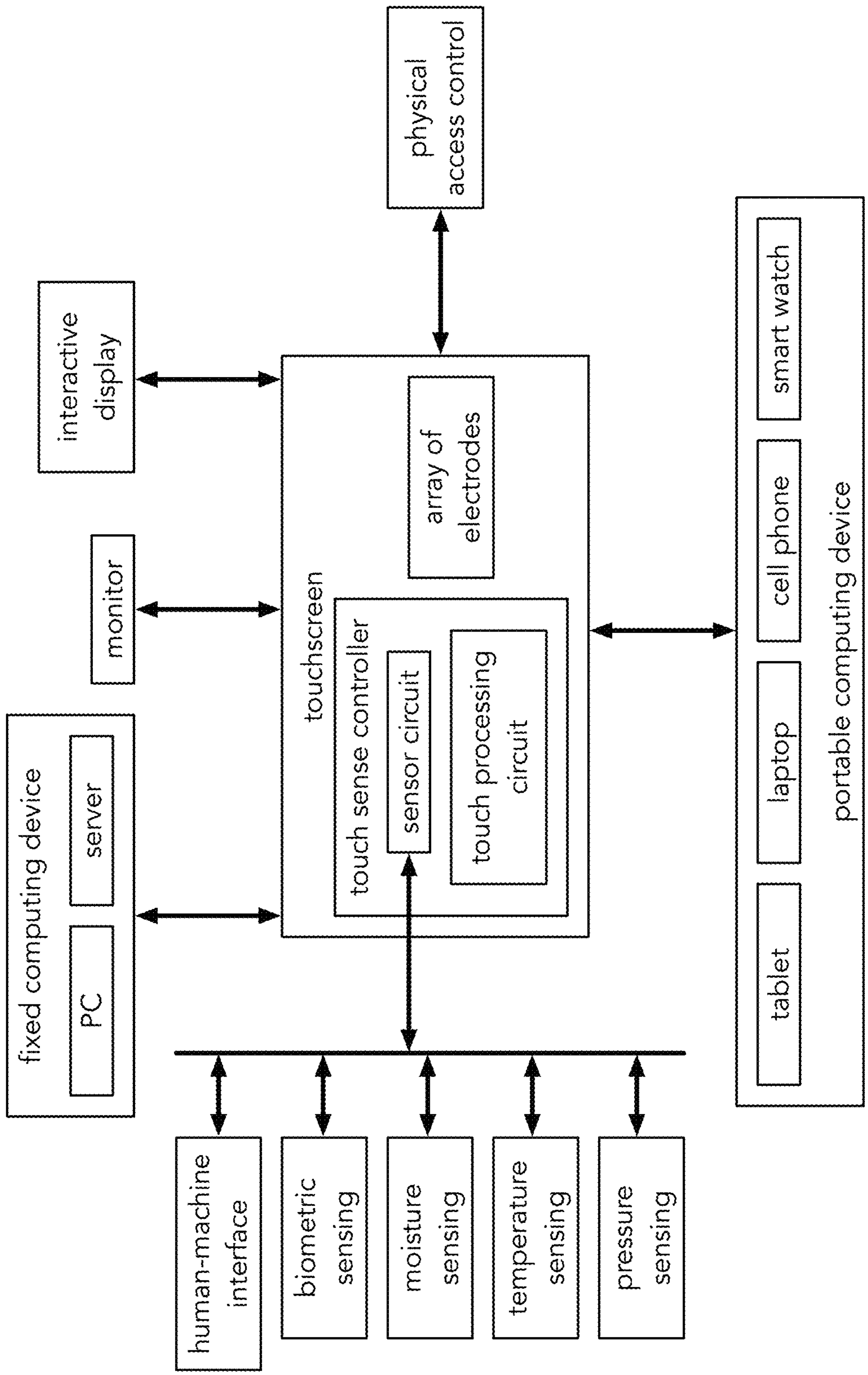
FIG. 93 is a schematic block diagram of an example of a user-interactive graphical composition functional diagram of expanded use of a touch screen.

FIG. 93 is a schematic block diagram of an example of a user-interactive graphical composition functional diagram of expanded use of a sensor circuit of a touch sense controller. The sensor circuit is shown to be included in a touch sense controller of a touch screen. The touch screen can be used in portable computing devices as discussed. A touch screen can also be used in a fixed computing device, a monitor, an interactive display, and/or a physical access control unit.

If the improved computer determines that the new sensor circuit enables new functionalities in the fixed computing device, a monitor, an interactive display, and/or a physical access control unit, the improved computer extends the use of the sensor circuit to in the particular use cases.

As another technique for extending the sensor circuit MTU, the improved computer looks to other circuitry that uses a form of sensing sensors. In this example, the improved computer looks to human-machine interface (analog world to digital world), biometric sensing, moisture sensing, temperature sensing, and pressure sense as a few examples. The improved computer determines whether the new sensor circuit would improve performance of the other sensing applications. If so, the improved computer expands the MTU market impact and technical reach to include each of the other sensing applications.

To further expand the sensor circuit MTU, the improved computer analyzes the sensor circuit of FIG. 82 regarding its overall function and the function of its MTU components. The overall function of the sensor circuit is to capture a signal that represents a capacitance of an electrode. The function of the drive circuit is provide a voltage drive signal to the electrode and the function of the sense circuit is to a sense a voltage produced by the electrode in response to the voltage drive signal. The function of the digital filter and digital processing is to convert a digital representation of the sensed voltage into a digital representation of capacitance.

Based on the overall function and the function of the sensor circuits components, the improved computer searches it system databases for other sensor circuits, for other sensors, and/or for other sensing functions. For example, from the searching, the improved computer learns that there are a variety of drive signal options, a variety of characteristics of a sensor that can be sensed, and a variety of conditions that can be sensed.

Figure 94A:
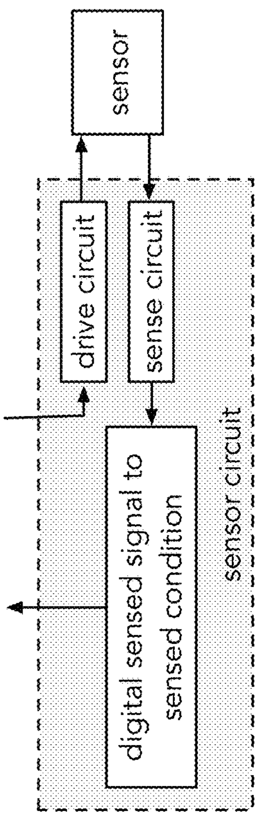
FIG. 94A is a schematic block diagram of a sensor circuit driving and sensing a sensor.
Figure 94B:
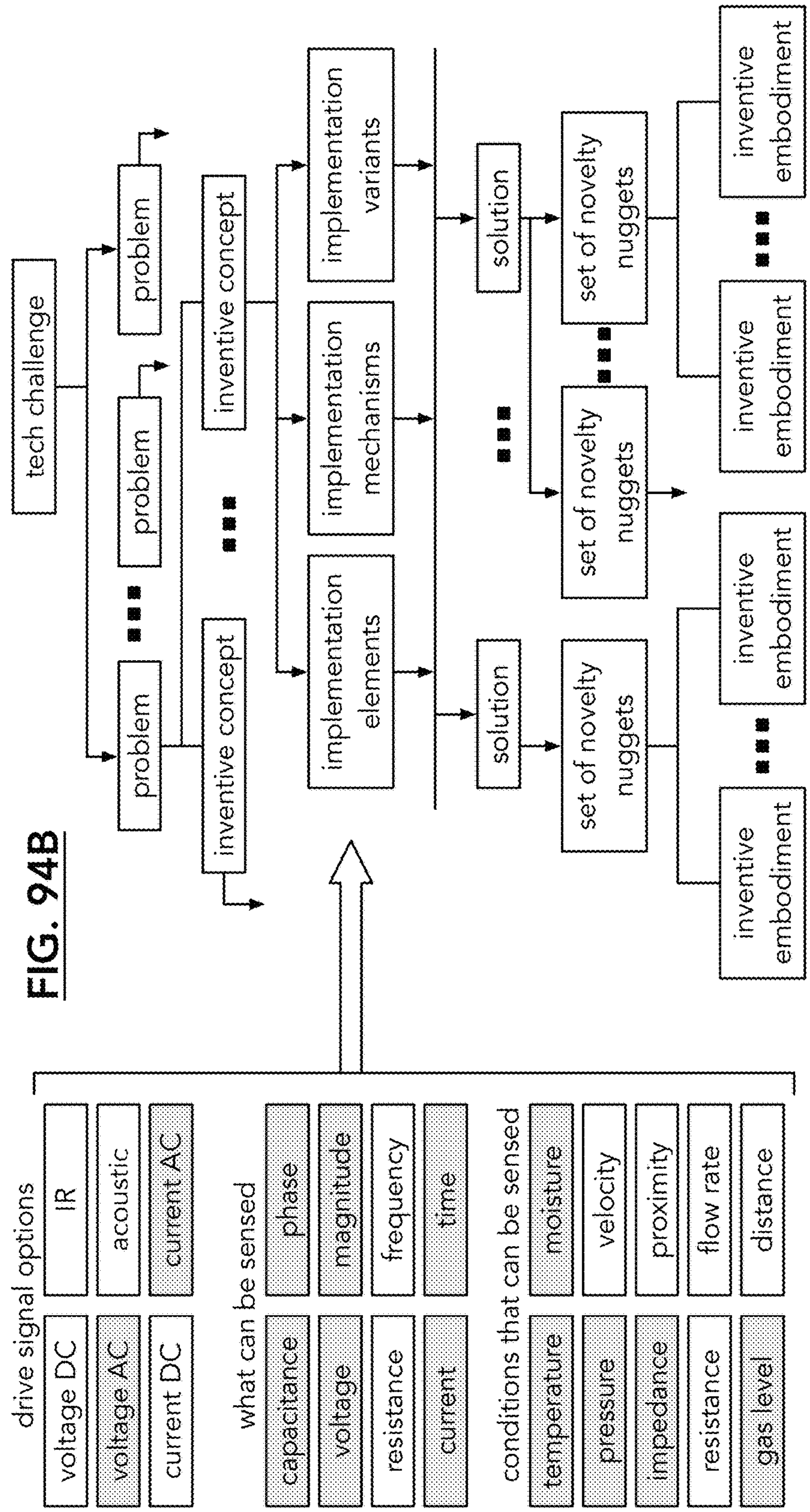
FIG. 94B is a schematic block diagram of an example of a user-interactive graphical composition diagram of tech challenge to inventive embodiments for a sensor circuit.

As shown in FIG. 94B, the drive signal options include a DC voltage drive signal, an AC voltage drive signal, a DC current drive signal, an AC current drive signal, an infrared (IR) drive signal, and an acoustic drive signal. The sensing characteristics include capacitance, voltage, resistance, current, phase, magnitude, frequency, and time. The conditions includes temperature, pressure, impedance, resistance, gas level, moisture, velocity, proximity, flow rate, and distance.

From these options, the improved computer determines which of them are viable options for the sensor circuit of a touch screen controller. The determined options are highlighted by the gray shaded boxes. In addition to determining further functional options, the improved computer generates a more generic composition functional diagram of a sensor circuit as shown in FIG. 94A. As shown, the sensor circuit is coupled to a generic sensor and includes a sense circuit, a drive circuit, and a digital sensed signal to sensed condition circuit.

The improved computer applies the determined options to the sensor diagram and the technical challenge to inventive embodiment, which is also shown in FIG. 94B. This enables the improved computer to expand the sensor circuit of a touch screen controller in two ways: expanding the technical aspects of the sensor circuit based on the determined options and expand its uses based on uses of the other sensor circuits the improved computer identified. The technical challenge is expanded from sensing an electrode to sensing for temperature, pressure, impedance, gas levels, and moisture, which also expands the list of problems and inventive embodiments.

The different drive signal options and the different sense characteristics adds the implementation elements, the implementation mechanisms, and/or the implementation variants, which includes the list of solutions and the list of inventive embodiments.

Figure 95:
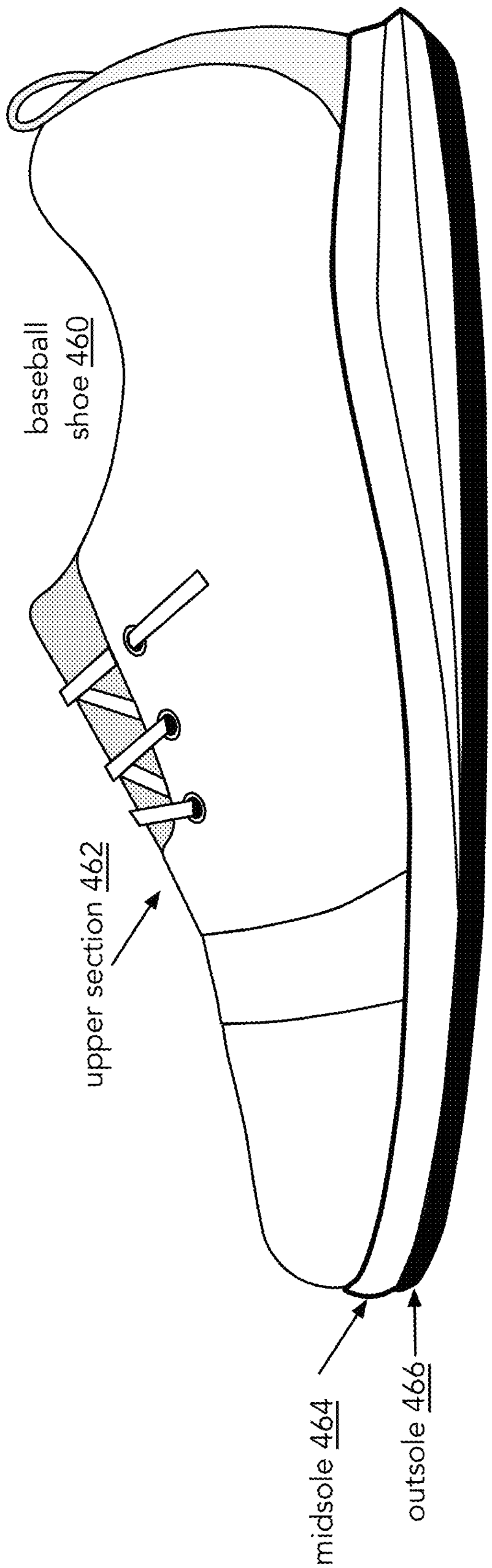
FIG. 95 is a medial side view diagram of a shoe.
Figure 96:
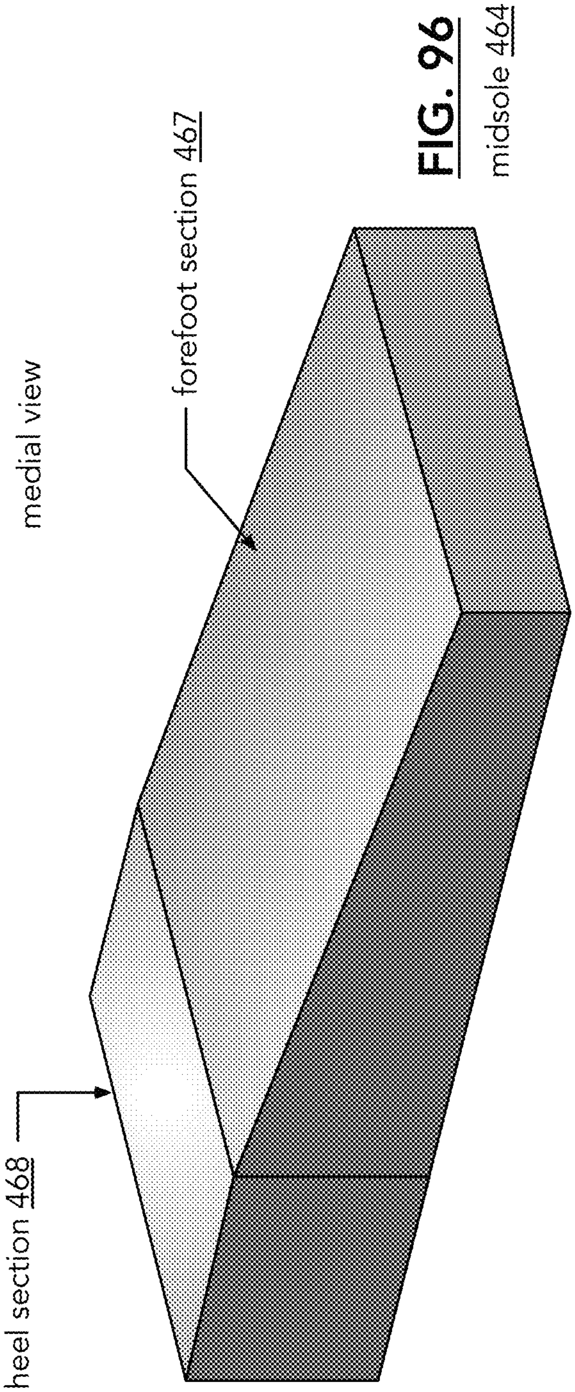
FIG. 96 is an isometric diagram of a force transferring sole for the shoe of FIG. 95.

As another example of the improved computer expanding the technical aspects of an initial MTU and expanding its uses, consider the baseball shoe 460 of FIG. 95, which includes the force transfer sole 465 of FIG. 96. The original unique value proposition for the new baseball shoe was to help baseball players feel more stable and more connected to the ground. The original technical challenge was "how to improve the ground-body connection through a pair of baseball shoes", which was also the initial problem.

The baseball shoe 460 includes an upper section 462 that is attached to a midsole 464, and an outsole 466. Not shown is an insole, which is positioned within the upper section 462 and above (e.g., closer to the foot) the midsole 464. The midsole 464 as shown in FIG. 96 includes a heel section 468 and a forefoot section 467 and is shown in block form for ease of illustration. In practice, the shape of the midsole 464 conforms to the shape of the baseball shoe 460.

The inventive concept for the problem of improving the ground-body connection through a pair of baseball shoes includes using materials that have different force transfer properties in the heel than in the forefoot of midsole to improve engagement of the foot to the shoe and the shoe to the ground.

With the conventional patent process, it is most likely that a patent application would have been filed regarding a baseball shoe that includes materials that have different force transfer properties in the heel than in the forefoot of midsole to improve engagement of the foot to the shoe and the shoe to the ground. Once the patent application issued, it is a 50-50 chance that a continuation patent application would be filed. In this scenario, the innovation of improving the ground-body connection through shoes is woefully under patented, which results in a significant loss of value.

For the innovation of improving the ground-body connection through shoes, the improved computer determines a complete picture of the patent opportunity for innovation and its likely value as the patent opportunity is realized (e.g., as the architectural plan to patent protect the innovative technology is patent protected).

Figure 97:
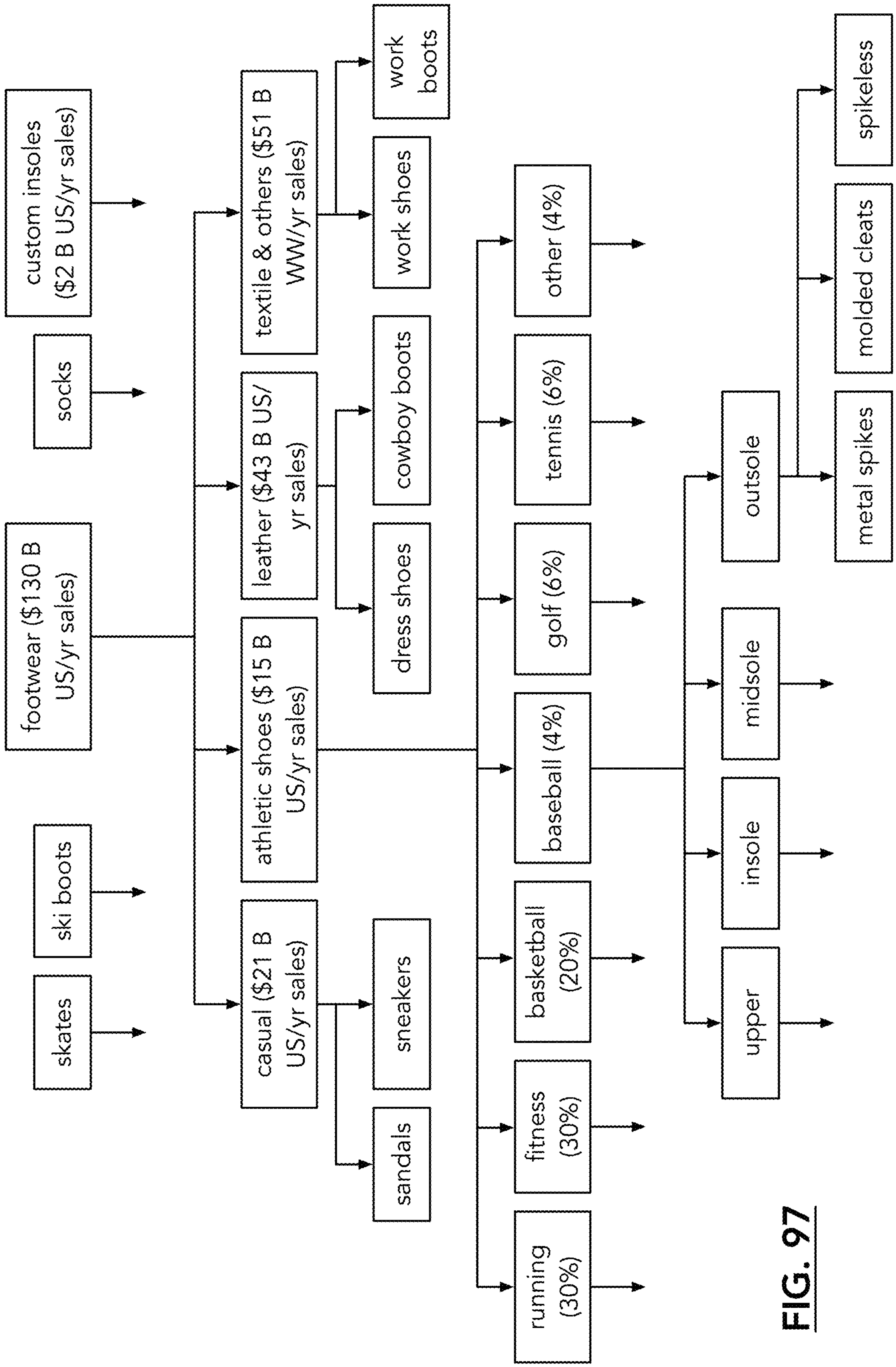
FIG. 97 is a schematic block diagram of an example of a user-interactive graphical market-tech unit (MTU) hierarchy diagram for footwear.

To begin, the improved computer retrieves one or more relevant technology maps for the innovation. For this example, the improved computer retrieves the technology map for baseball shoes as shown in FIG. 97. The technology map includes the MTU of a baseball shoe, which includes the composition MTUs of an upper section, an insole, a midsole, and an outsole. The outsole MTU includes composition MTUs of metal spikes, molded cleats, and spikeless turf.

The technology map includes the inclusion MTU of athletic shoes for the baseball shoe MTU and the inclusion MTU of footwear for the athletic shoe MTU. The map further includes related MTUs of the baseball shoe MTU. The related MTUs are for running shoes, fitness shoes, basketball shoes, golf shoes, tennis shoes, and other types of athletic shoes.

The map also includes related MTUs for the athletic shoe MTUs. These related MTUs includes casual shoes, leather shoes, and textile & others. The composition MTUs for the casual shoes MTU are shown as sandals and sneakers. The composition MTUs for the leather shoe MTU are shown as dress shoes and cowboy boots. The composition MTUs for the textile & other shoe MTU are shown as work shoes and work boots.

The technology map further includes related MTUs for the footwear MTU. They include skates, ski boots, socks, and custom insoles. The map further includes for some of the MTUs an indication of annual US sales or a percentage of the US market. For example, footwear sales in 2019 in the US was approximately $130 billion and the custom insole sales in 2019 in the US was approximately $2 billion.

Of the $130 billion footwear sales, approximately $21 billion was from casual shoes, $15 billion from athletic shoes, $43 billion from leather shoes, and $51 billion from textile & other shoes. Within the athletic shoe market, running shoes typically account for 30% of sales, fitness shoes about 30%, basketball shoes about 20%, baseball shoes about 4%, golf shoes about 6%, tennis shoes about 6%, and other athletic shoes about 4%. As such, the US market for baseball shoes is approximately a $600 million per year.

Note that this example technology map is not intended to provide an exhaustive list of composition MTUs and/or inclusion MTUs. It is provided to illustrate some of the functional abilities of the improved computer for technology.

Figure 98:
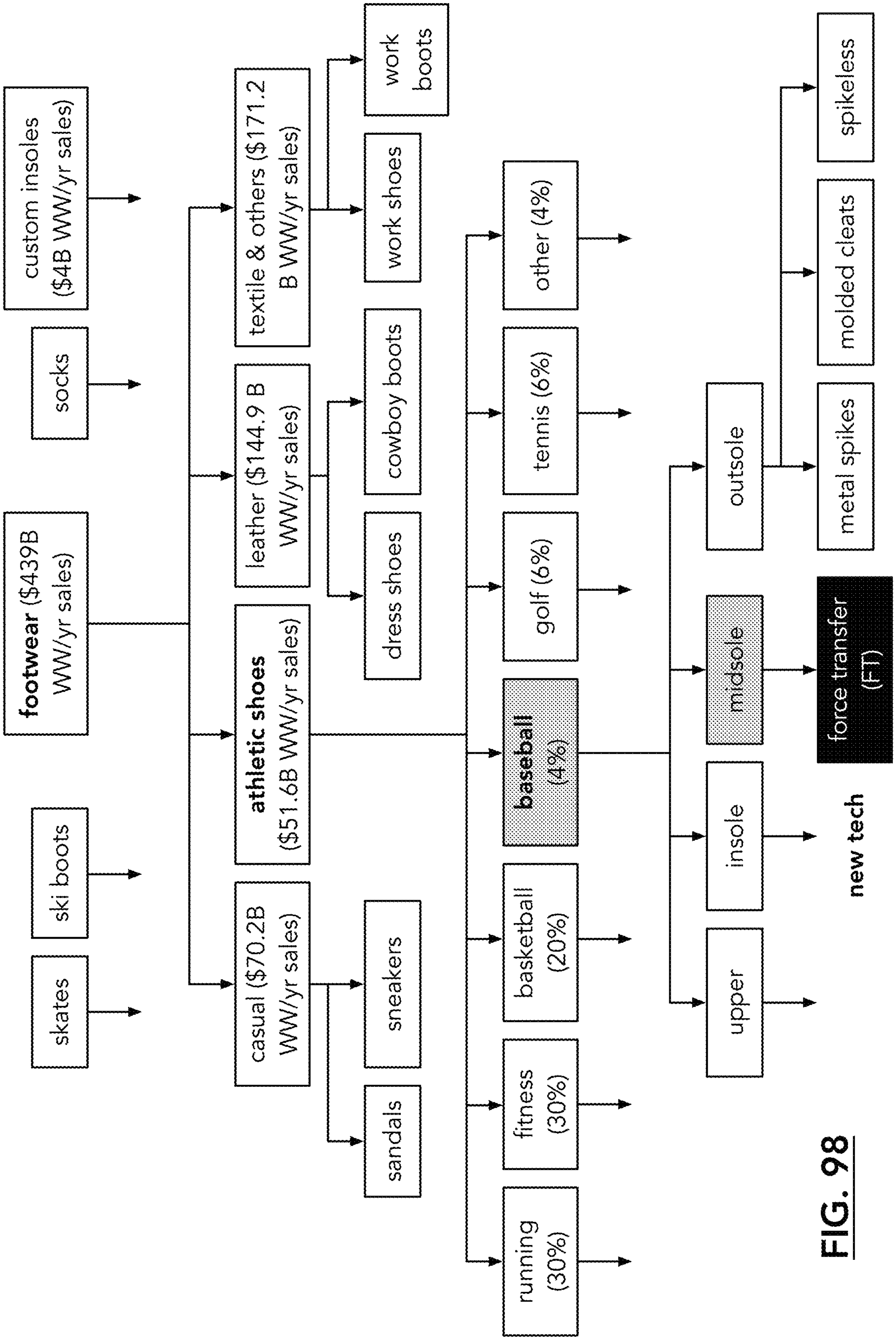
FIG. 98 is a schematic block diagram of an example of mapping an initial inventive embodiment of the sole of FIG. 96 to the user-interactive graphical market-tech unit (MTU) hierarchy diagram for footwear of FIG. 97.

The example continues with the improved computer adding a new MTU regarding a force transfer midsole of a baseball shoe to the technology map as shown in FIG. 98. The new MTU is shown as a black shaded box and the next level MTUs are highlighted in gray shaded boxes.

Figure 99:
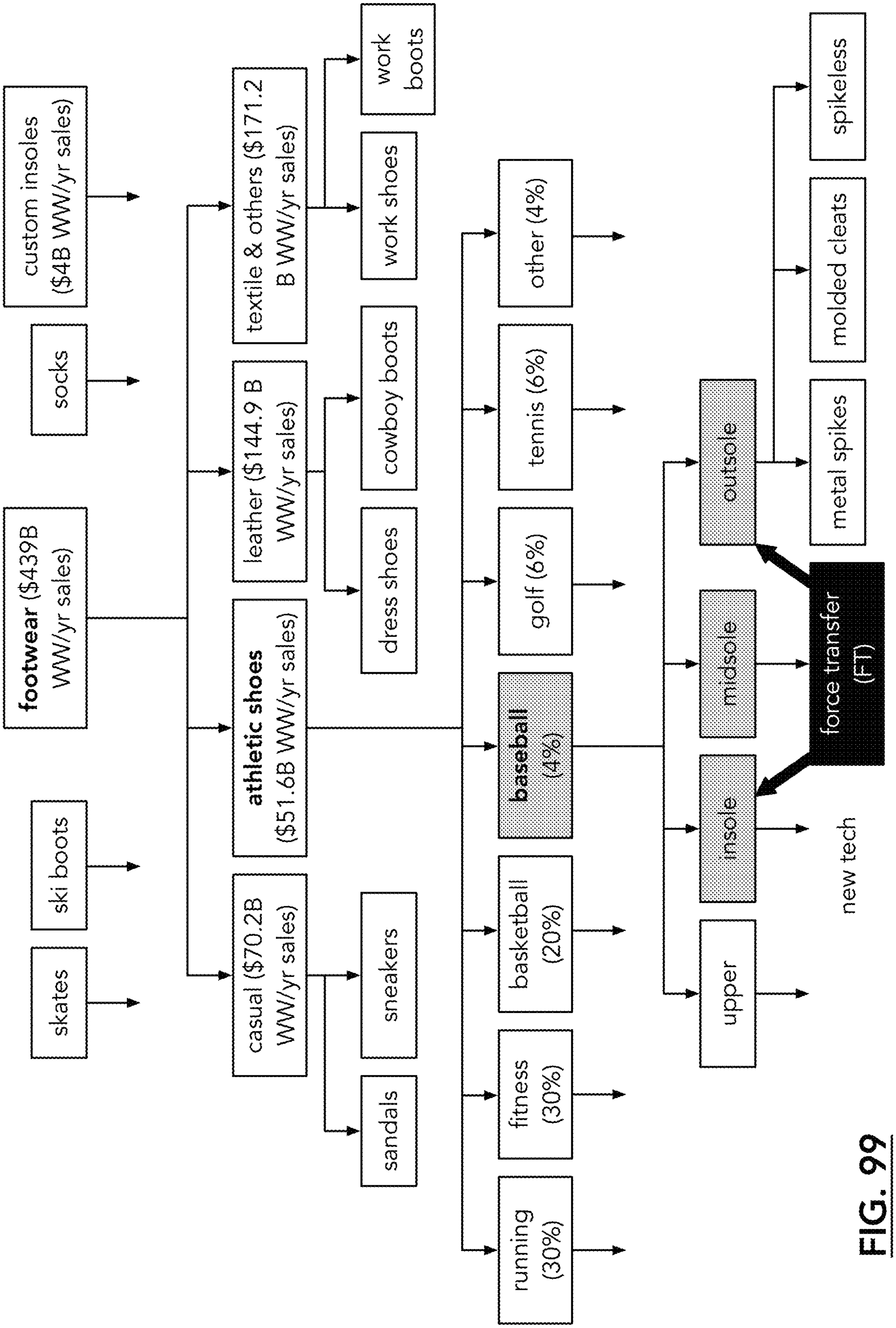
FIG. 99 is a schematic block diagram of an example of expanding the initial inventive embodiment mapping of FIG. 98 of midsoles of baseball shoes to further insoles and outsoles of baseball shoes.

With this as a starting point, the improved computer begins to expand the force transfer midsole of a baseball shoe MTU. For example, the improved computer determines whether the force transfer innovation for a midsole can be applied to the insole and/or outsole. In this example, the innovation can be applied to the related MTUs of the midsole (i.e., the insole and outsole) as shown in FIG. 99.

Figure 100:
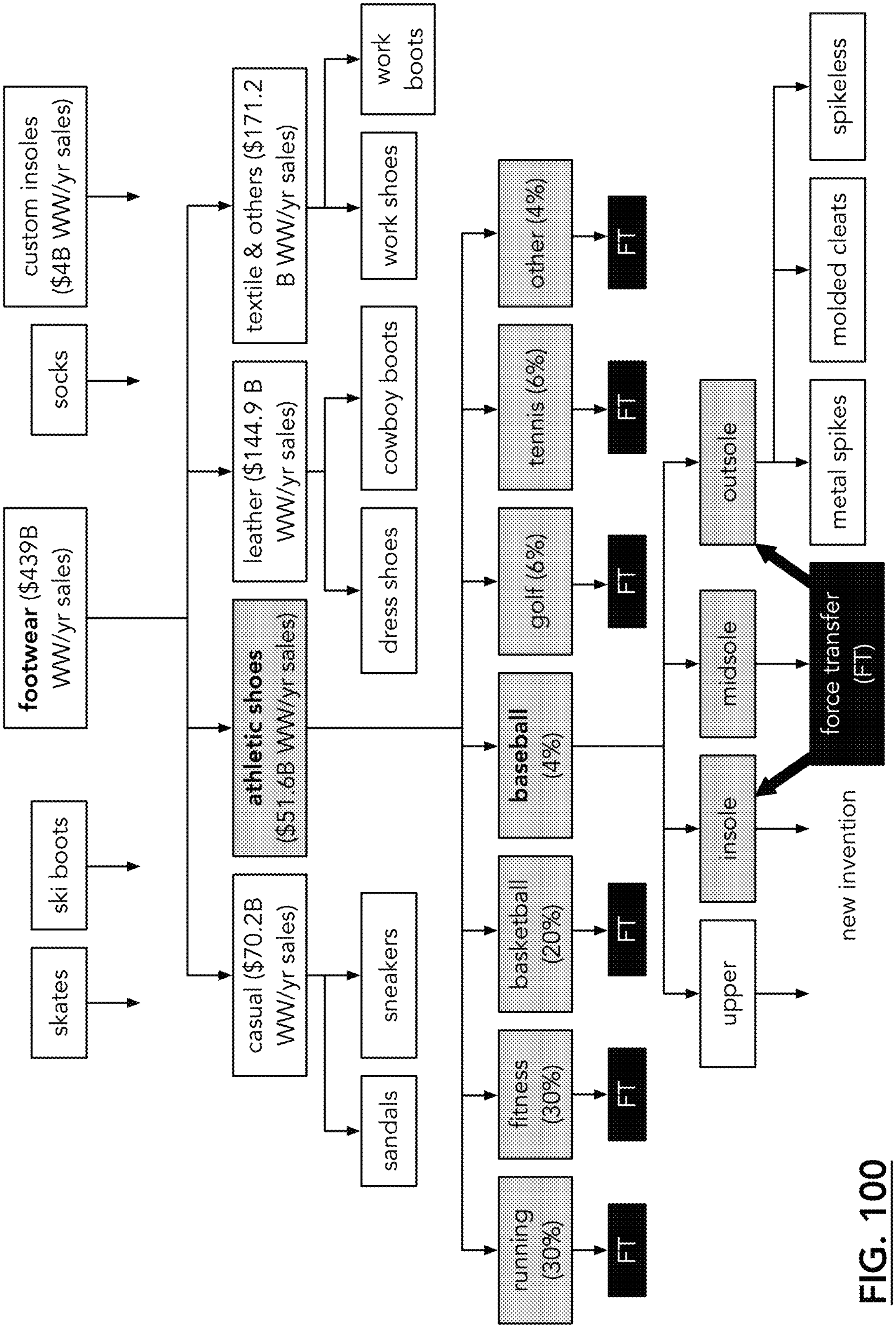
FIG. 100 is a schematic block diagram of an example of further expanding the inventive embodiment mapping of FIG. 99 of insole, midsoles, and outsoles of baseball shoes to insoles, midsoles, and outsoles of other athletic shoes.

The improved computer then determines whether the force transfer innovation can be applied to the related MTUs of the baseball shoe MTU. In this example, the innovation is applicable to insoles, midsoles, and/or outsoles of running shoes, fitness shoes, basketball shoes, golf shoes, tennis shoes, and other types of athletic shoes. In this instance, innovation is applicable to all athletic shoes as shown in FIG. 100.

Figure 101:
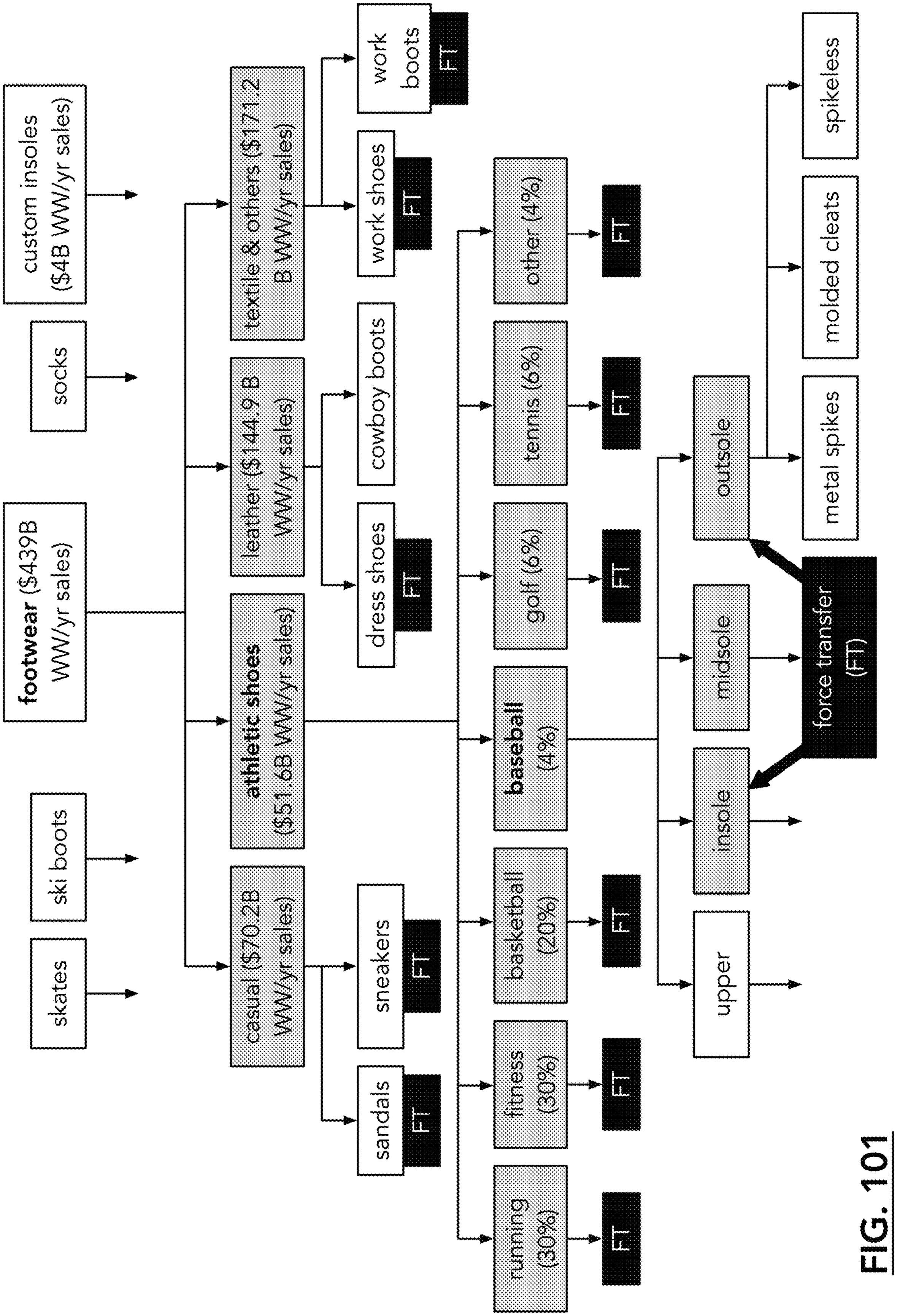
FIG. 101 is a schematic block diagram of an example of further expanding the inventive embodiment mapping of FIG. 100 of all athletic shoes to other types of shoes.

The improved computer then determines whether the force transfer innovation can be applied to the related MTUs of the athletic shoes MTU. In this example, the innovation is applicable to insoles, midsoles, and/or outsoles of casual shoes, leather shoes, and textile & other shoes. For each of the related MTUs for which the innovation is applicable, the improved computer determines which of its composition MTUs the innovation can be applied. For casual shoes, it is applicable to sandals and sneaker; for leather shoes, it is applicable to dress shoes; and for textile & other shoes, it is applicable to work shoes and work boots as is shown in FIG. 101.

Figure 102:
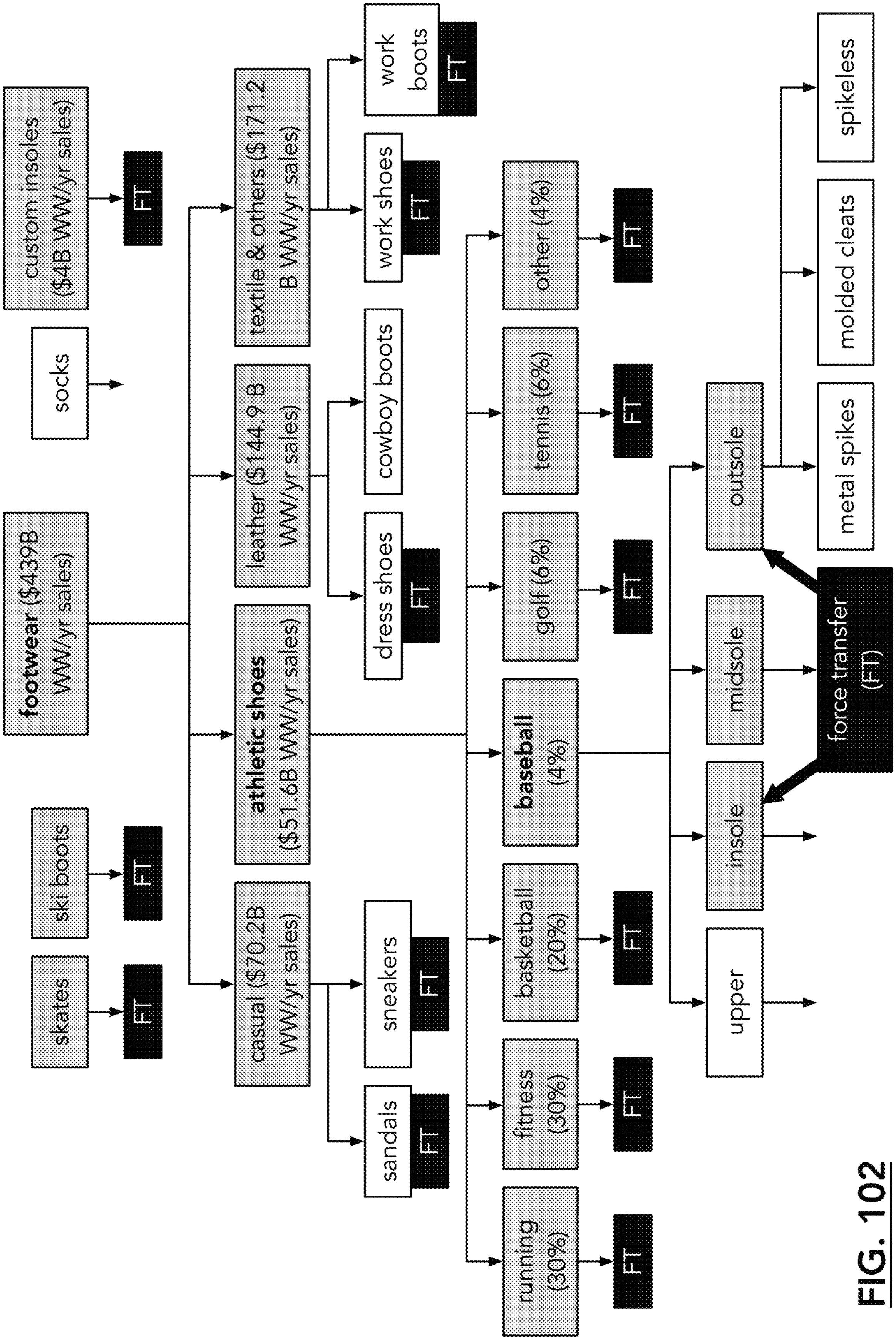
FIG. 102 is a schematic block diagram of an example of further expanding the inventive embodiment mapping of FIG. 101 of almost all shoes to other types of products worn on the feet.

The improved computer then determines whether the force transfer innovation can be applied to the related MTUs of the footwear MTU. In this example, the force transfer innovation is applicable to skates, ski boots and custom insoles as shown in FIG. 102. FIG. 102 illustrates the complete expansion of the inventive concept of force transfer of a baseball shoe's midsole.

Figure 103:
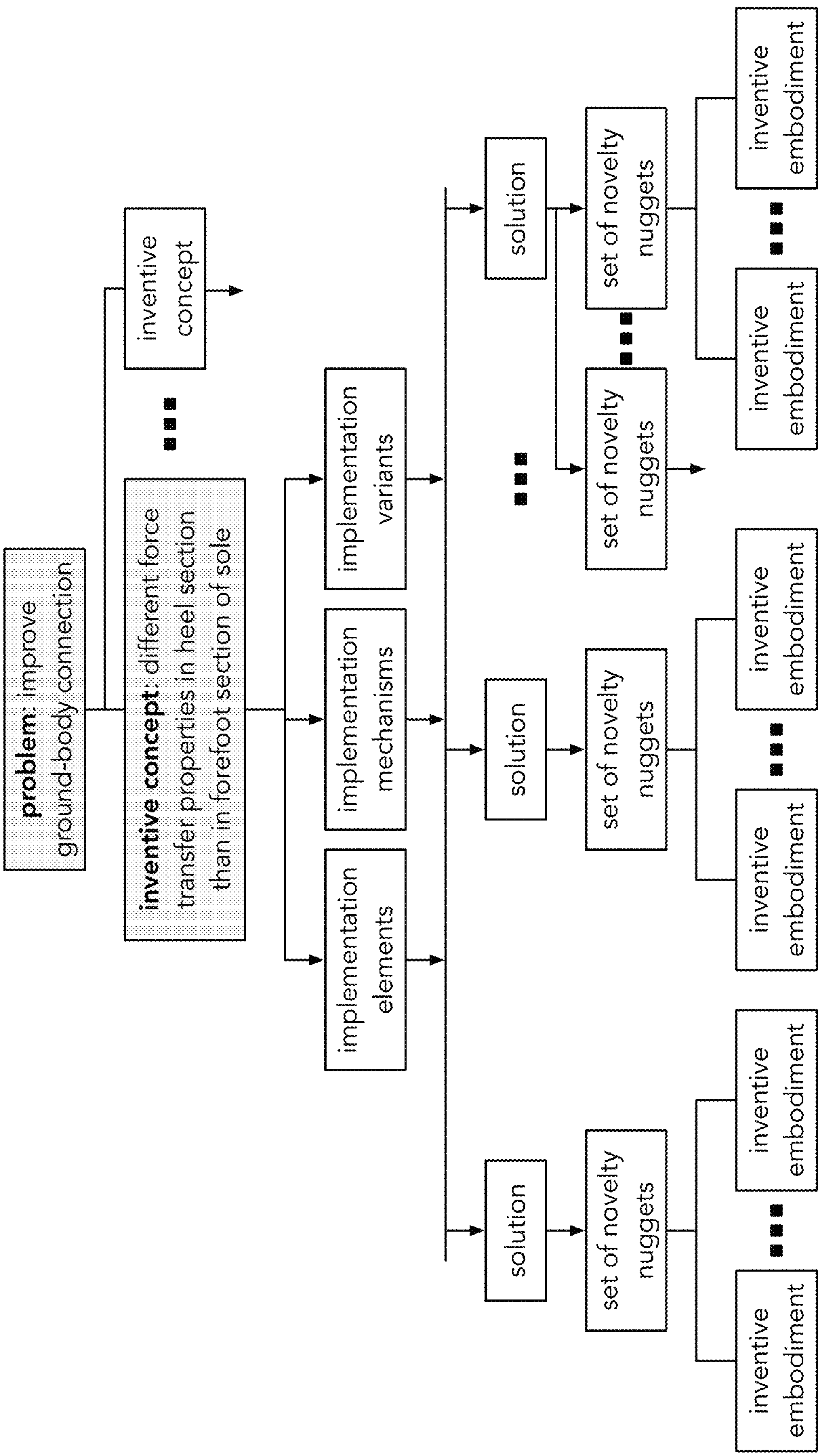
FIG. 103 is a schematic block diagram of an example of a user-interactive graphical composition diagram of tech challenge to inventive embodiments for sole FT concept for use as mapped in FIG. 102.

The improved computer then focuses on determining the total number of inventions for the innovation in light of the expanded use and inventive concepts discussed above. With reference to FIG. 103, the improved computer labels the problem as "improving the ground-body connection through footwear". The improved computer would create a separate problem to inventive embodiment mapping for skates, another for ski boots, and another for custom insoles.

For the footwear problem, the improved computer identifies (determines, creates, and/or retrieves) one or more inventive concepts. A first inventive concept includes "providing different force transfer properties in the heel section than in the forefoot section". A second inventive concept includes "a series of horizontal force to vertical force focusing elements in the midsole and/or outsole".

Figure 104:
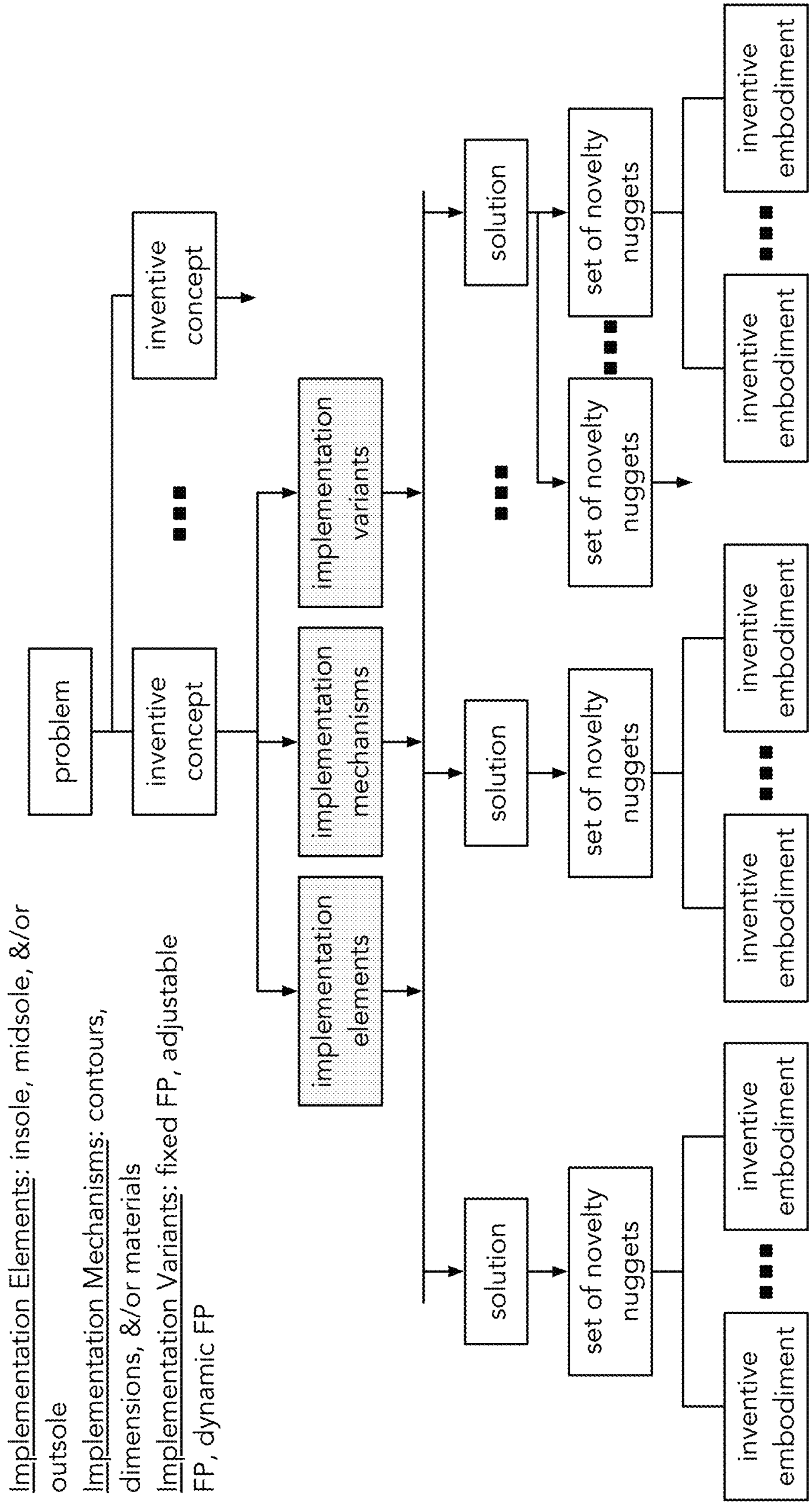
FIG. 104 is a schematic block diagram of a further example of a user-interactive graphical composition diagram of tech challenge to inventive embodiments for sole FT concept for use as mapped in FIG. 102.

For the first inventive concept, the improved computer identifies (determines, creates, and/or retrieves) one or more implementation elements, one or more implementation mechanisms, and/or one or more implementation variants. In this example, the improved computer identifies insole, midsole, and outsole as implementation elements; contours, dimensions, and materials as implementation mechanisms; and fixed force transfer, adjustable force transfer, and dynamic force transfer as implementation variants as shown in FIG. 104.

Figure 105:
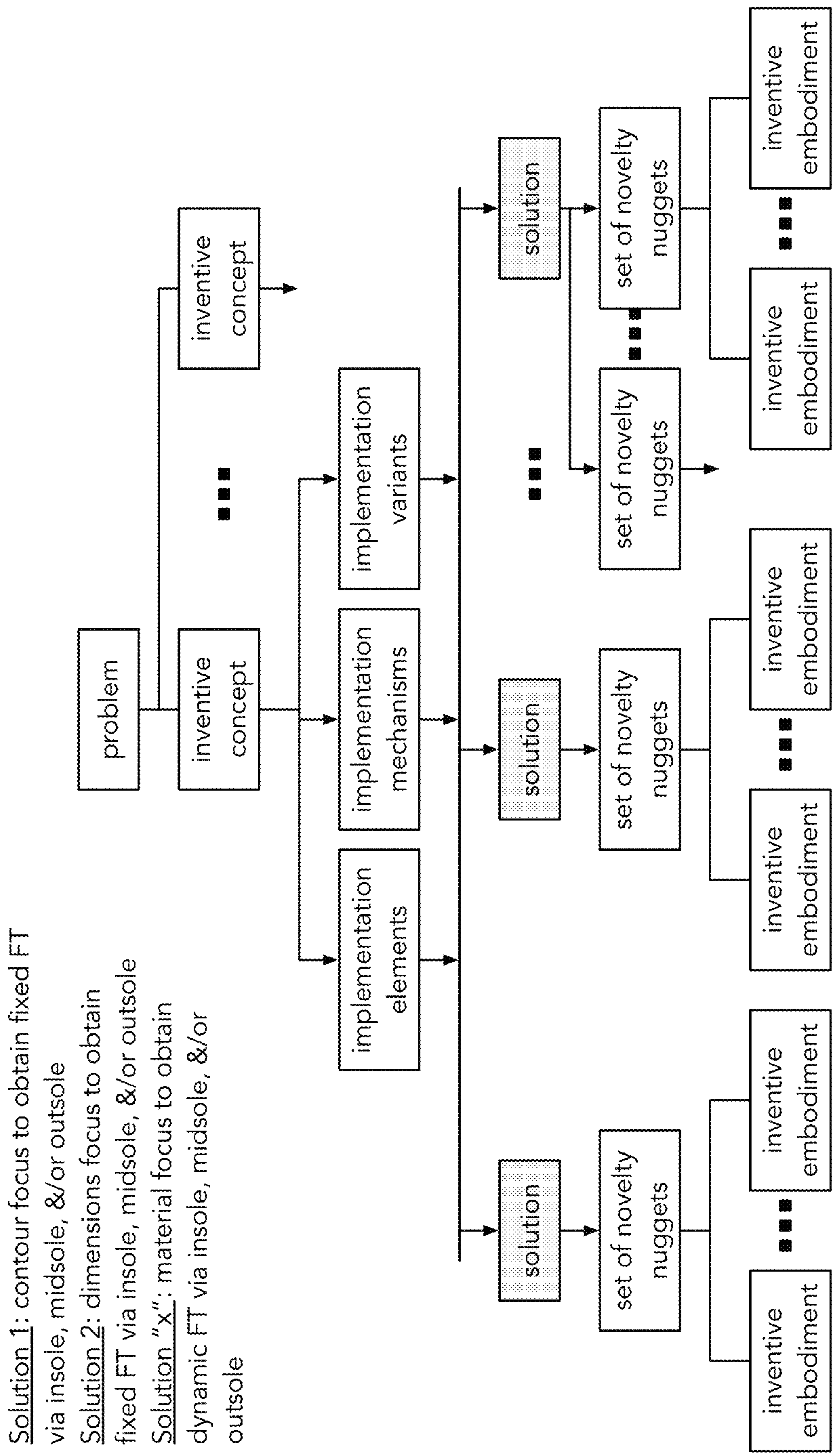
FIG. 105 is a schematic block diagram of a further example of a user-interactive graphical composition diagram of tech challenge to inventive embodiments for sole FT concept for use as mapped in FIG. 102.

The improved computer then identifies (determines, creates, and/or retrieves) one or more solutions from the one or more implementation elements, the one or more implementation mechanisms, and/or the one or more implementation variants. As shown in FIG. 105, the improved computer identifies multiple solutions via different combinations of the implementation elements, implementation mechanisms, and implementation variants. For example, but not as an exhaustive example, a first solution regarding a contour focus to obtain fixed force transfer via insole, midsole, &/or outsole; a second solution regarding a dimensions focus to obtain fixed force transfer via insole, midsole, &/or outsole, and another solution regarding a material focus to obtain dynamic force transfer via insole, midsole, &/or outsole.

Figure 106:
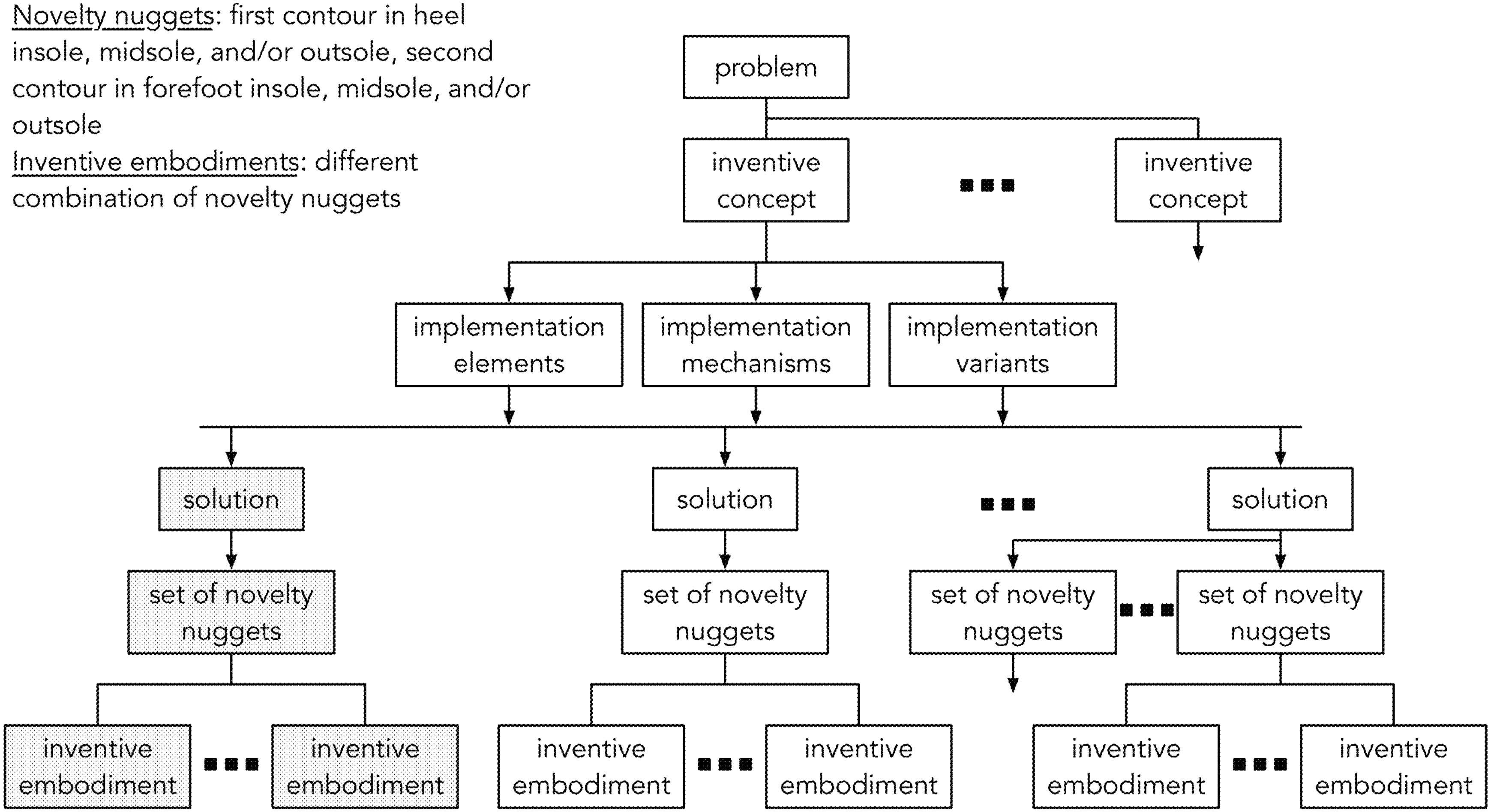
FIG. 106 is a schematic block diagram of a further example of a user-interactive graphical composition diagram of tech challenge to inventive embodiments for sole FT concept for use as mapped in FIG. 102.

For the first solution as shown in FIG. 106, the improved computer identifies (determines, creates, and/or retrieves) one or more inventive embodiments based on novelty nuggets of the solution. For the first invention of "contour focus to obtain fixed forced transfer via insole, midsole, &/or outsole", the novelty nuggets include a first contour (e.g., surface gradient related to the bottom of a foot, slopes, pitch, etc.) in heel insole, midsole, and/or outsole, and a second contour in forefoot insole, midsole, and/or outsole.

The inventive embodiments include different combinations of novelty nuggets. For example, one inventive embodiment includes the first contour of the heel section in the insole, midsole, and/or outsole, and the second contour of the forefoot in the midsole for a fixed force transfer. A second inventive embodiment includes the first contour of the heel section in the midsole, and the second contour of the forefoot in the insole, midsole, and/or outsole for fixed transfer.

Other inventive embodiments from the various solutions include, but not limited to, a first set of materials for the heel section in the insole, midsole, and/or outsole, and second set of materials of the forefoot in the midsole for a fixed force transfer, where a set includes one or more materials; a first varying material composition for the heel section in the insole, midsole, and/or outsole, and second varying material composition of the forefoot in the midsole for a dynamic force transfer based on orientation of weight force vectors; and a first adjustable material composition for the heel section in the insole, midsole, and/or outsole, and second adjustable material composition of the forefoot in the midsole for an adjustable force transfer to accommodate different sized persons wearing the shoes.

The improved computer then determines an architectural plan for patent protecting the force transfer innovation in footwear, skates, ski boots, and/or custom insoles. The improved computer also calculates the expense and growth of the patent protection of the force transfer innovation on a year-by-year basis as the architectural plan is executed.

The improved computer also calculates the value of the innovation on a year-by-year basis, which is predicated on the market value of the footwear industry, the market value of the skates industry, the market value of the ski boots industry, and/or the market value of the custom insole industry. With the conventional patent process, one or two patents would have likely been obtained for a baseball shoe having a fixed forced transfer midsole. The baseball market is about $600 million in annual revenue. Via the improved computer, dozens of patents covering a variety of implementation across of all footwear would be obtained. The footwear market is about $130 billion in annual revenue; that is 216.67 times larger than the baseball shoe market. As an example, the value of force transfer technology if conventionally patented would be about $500K to $1 million; and the value of force transfer technology using the re-engineered patent process and the functionality of the improved computer is about $100 million, which is 100× to 200× increase in value.

Figure 107:
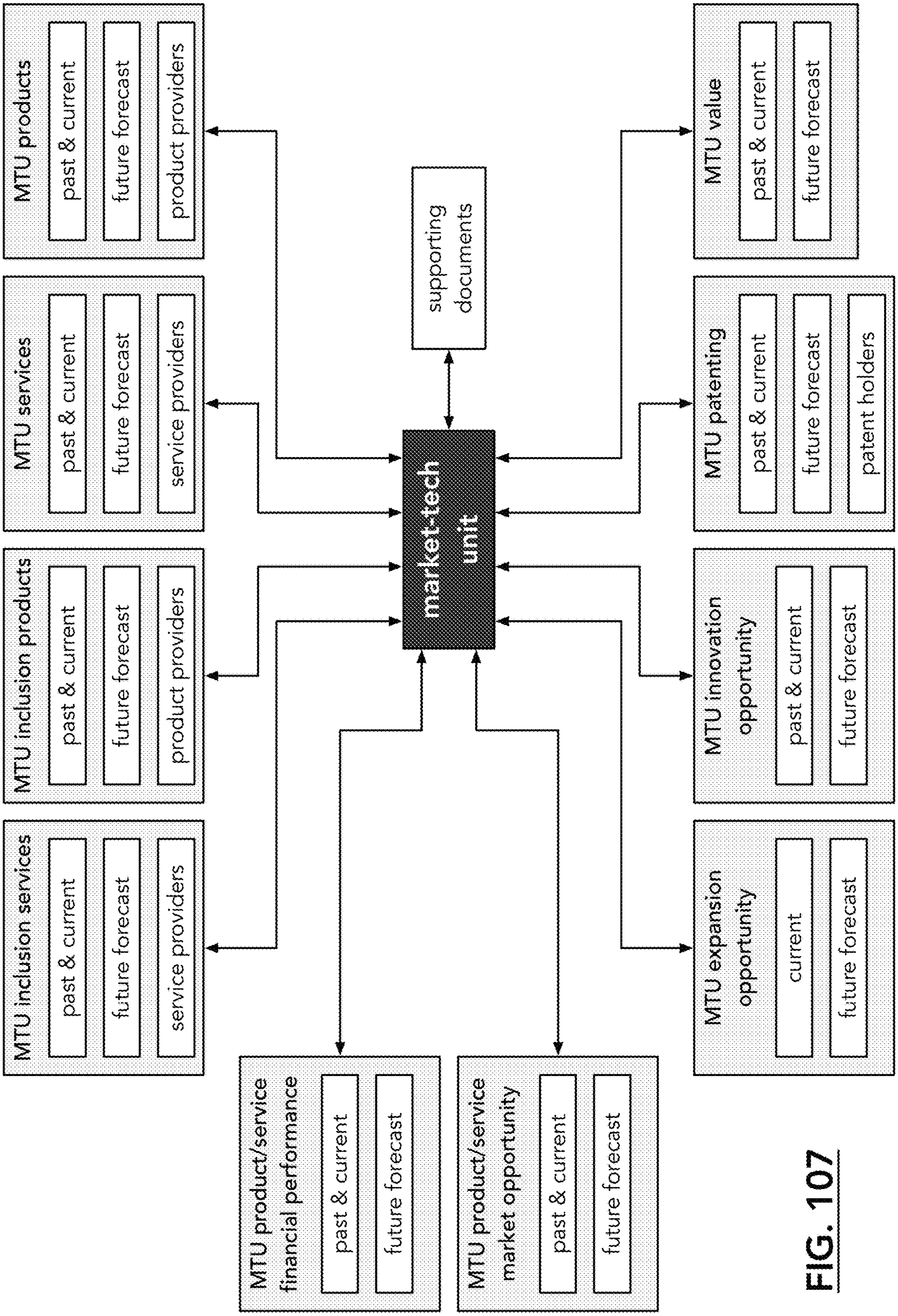
FIG. 107 is a schematic block diagram of an example of the data that comprises a market-tech unit (MTU) data record in an MTU database.

FIG. 107 is a schematic block diagram of an example of the data that comprises a market-tech unit (MTU) data record in an MTU database. For a market tech unit (MTU) record, a plethora of data is routinely collected, processed, and organized by the improved computer to establish technical boundaries for the MTU, to determine technical expansion of the MTU, to determine market use expansion of the MTU, to determine market impact of the MTU, to determine value of the MTU, to determine inventions to be patent protected, to determine an architectural plan to patent protect the MTU, to track execution of the architectural plan, to determine use opportunities for the patented MTU, to determine an existing patent landscape, to determine an existing competitor landscape, to determine an existing product/service landscape, to determine a future forecasted patent landscape, to determine a future forecasted competitor landscape, and/or to determine a future forecasted product/service landscape.

The data for an MTU record is organized by MTU inclusion (higher tiers) services, MTU inclusion products, MTU services, MTU products, MTU product/service financial performance, MTU product/service market opportunity, MTU market expansion opportunity, MTU innovation & innovation expansion opportunity, MTU patenting, MTU value, and the supporting documents from which the data is extracted. Each of the data sections includes a past & current component and a future forecasted component. The products and service data sections further includes a list of providers. The patenting data section further includes a list of patent holders (e.g., applicants and/or assignees).

Figure 108:
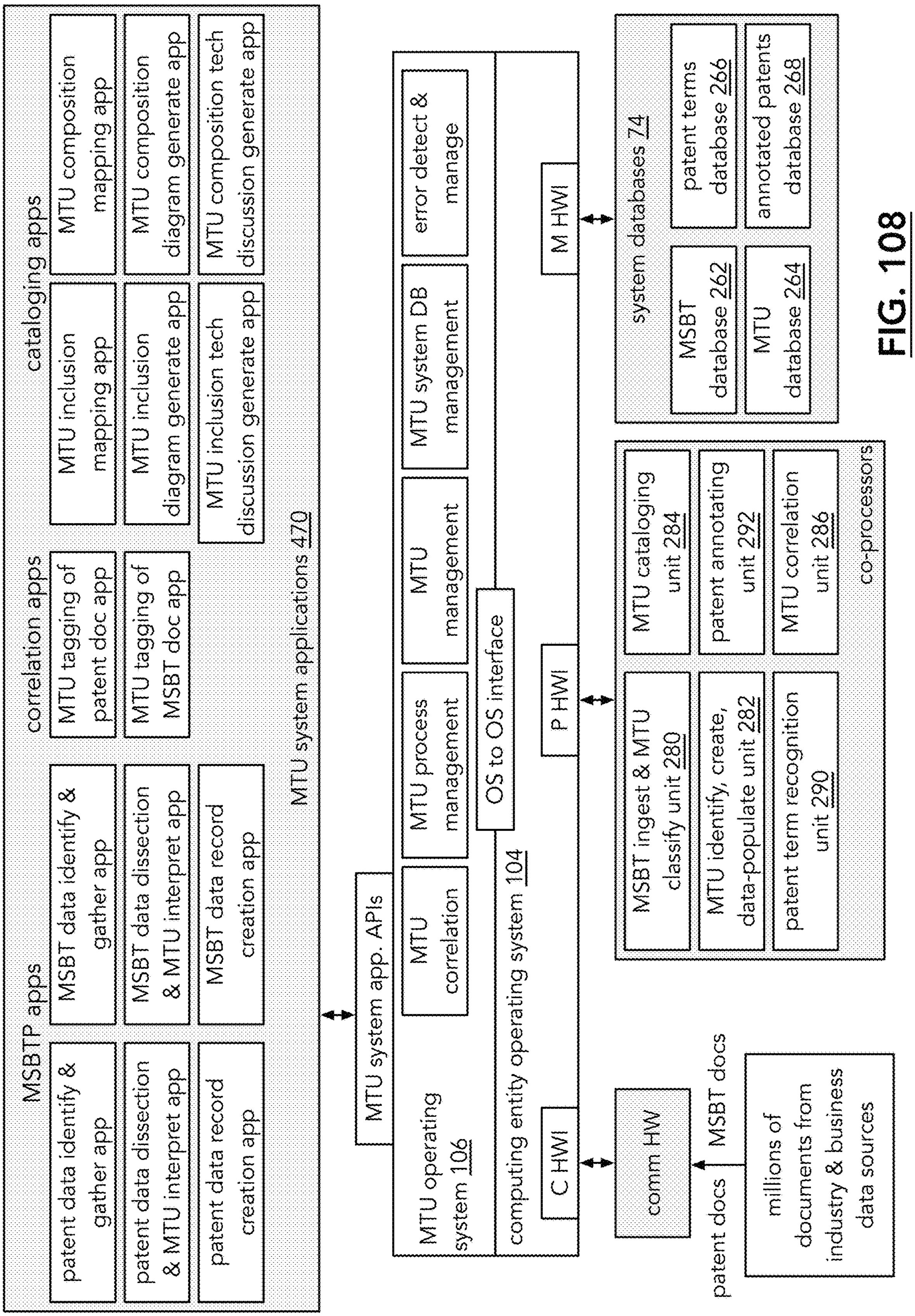
FIG. 108 is a schematic block diagram of another embodiment of an improved computer for technology.

FIG. 108 is a schematic block diagram of another embodiment of a portion of an improved computer for technology 70 that functions to ingest, dissect, interpret, extract data from documents (e.g., marketing, sales, business, technology, patents, and/or other relevant types of documents), to store such extracted data, to store the documents, to identify and create MTUs, and to update MTU records in accordance with new data. The portion of the improved computer includes the computing entity operation system 104, the MTU operating system 106, some of the system databases 74, co-processors of the hardware section, the communication interface hardware, and a plurality of MTU system applications 470. The system databases includes the MSBT database 262, the MTU database 264, the patent terms database 266, and the annotated patent database 268.

The MTU system applications 470 includes MSBTP system applications, correlation applications, and cataloging applications. The MSBTP (marketing, sales, business, technology, and patents) system applications includes patent data identify & gather application, patent data dissection & MTU interpret application, patent data record creation application, MSBT data identify & gather application, MSBT data dissection & MTU interpret application, MSBT data record creation application.

The correlation applications include MTU tagging of a patent document application and MTU tagging of an MSBT document application. The cataloging applications include MTU inclusion mapping application, MTU inclusion diagram generating application, MTU inclusion technical discussion application, MTU composition mapping application, MTU composition diagram generating application, and MTU composition technical discussion application.

The MTU operating system 106 includes the MTU correlation OS function, the MTU processing management function, the MTU system database management function, and the MTU error detection and management function. The co-processors include the MSBT ingest & MTU classify unit 280, the MTU identify, create, and data populate unit 282, the MTU cataloging unit 284, the patent annotating unit 292, and the MTU correlation unit 286. The communication hardware connects the improved computer to one or more networks (e.g., Internet, WAN, LAN, WLAN, cellular, etc.).

The various co-processors execute the various MTU system applications and corresponding portions of the MTU operating system 106 and computing entity operating system 104 as further described with reference to FIGS. 109 through 150C.

Figure 109:
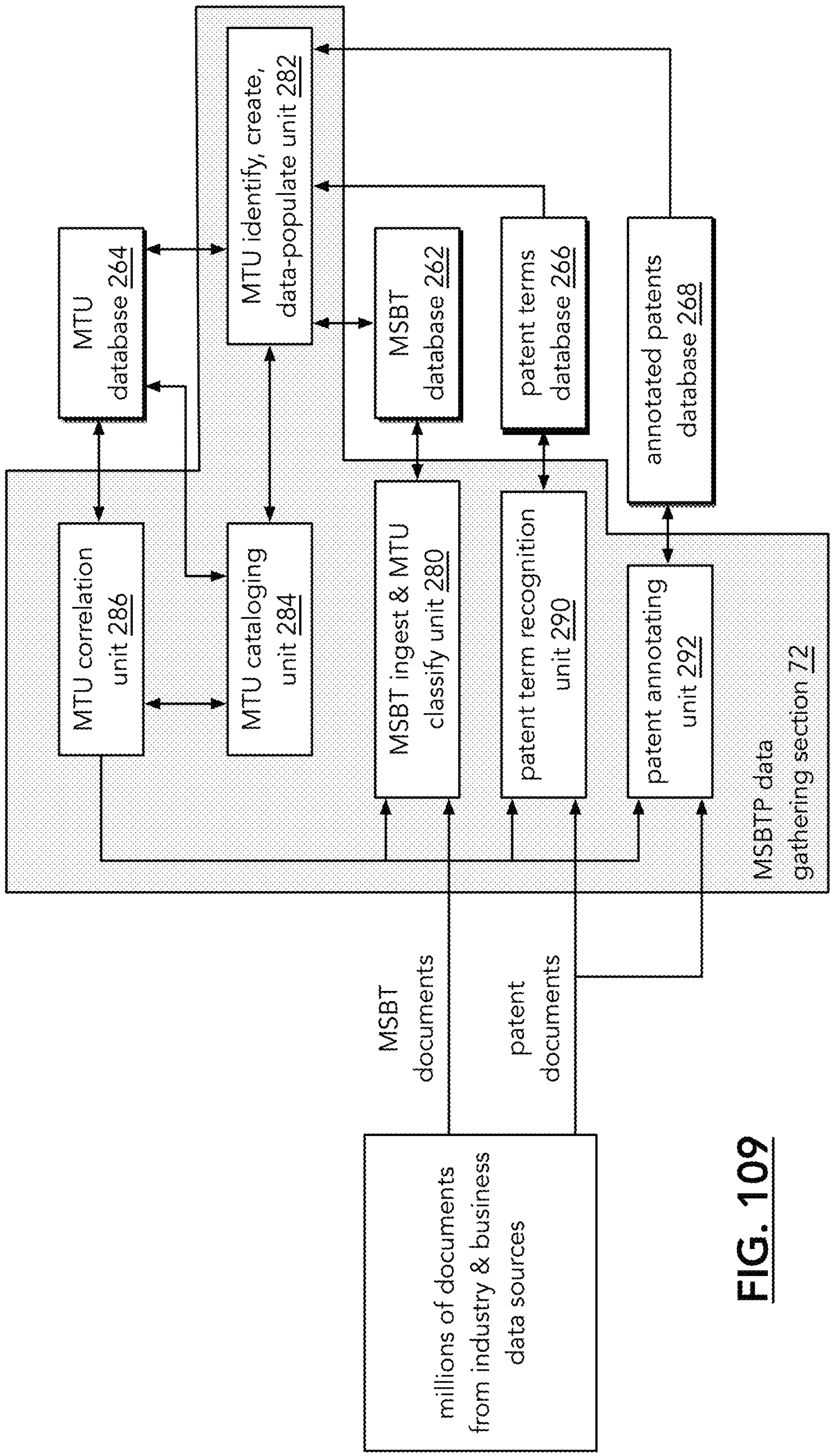
FIG. 109 is a schematic block diagram of an embodiment of an MSBTP (marketing, sales, business, technology, and patent) data gathering section of an improved computer for technology.

FIG. 109 is a schematic block diagram of an embodiment of an MSBTP (marketing, sales, business, technology, and patent) data gathering section 72 of an improved computer for technology. The section 72 includes the MTU correlation unit 286, the MTU cataloging unit 284, the MTU identify, create, and data populate unit 282, the MUSBT ingest & MTU classify unit 280, the patent term recognition unit 290, and the patent annotating unit 292.

The MSBT ingest & MTU classify unit 280 receives MSBT documents (e.g., marketing, sales, business, technology, patents, and/or other relevant types of documents). The unit dissects (e.g., breaks down, analyzes) the document according to data of interest regarding MTUs (e.g., the data that is placed into an MTU record). For example, a document is partitioned into sections based on the data of interest regarding MTUs. As a specific example, one or more portions are sectioned as being related to a marketable feature of a product and/or service, another one or more portions are sectioned as being related to a technical description, and yet another one or more portions are sectioned as being related to financial information of a product and/or service.

The unit 280 extracts data from the various portions of based on the type of section. For example, financial data is extracted for portions sectioned as financial, marketable feature data is extracted from portions sectioned as marketable feature, and so on.

For a new MSBT document, the MSBT ingest & MTU classify unit 280 generates a new MSBT database record request and sends it to the MSBT database 262, which creates the new record. For updated documents, the unit 280 generates an update an existing MSBT database record request and sends it to the MSBT database 262. An example of an MSBT database record is discussed in further detail with reference to FIG. 112.

The unit 280 also MTU classifies each new MBST document based on the extracted data. The MTU classification is one of: one or more specific MTUs, undecided/potential new MTU, or undecided.

The patent term recognition unit 290 and the patent annotating unit 292 ingest patent documents (e.g., pending US patent applications, US issued patents, English translated pending foreign patent applications, and English translated foreign issued patents). In an embodiment, the patent term recognition unit 290 and the patent annotating unit 292 are a combined function performed by a co-processor of the improved computer.

The patent annotating unit 292 dissects (e.g., breaks down, analyzes) a patent document according to data of interest regarding MTUs in a similar manner as an MSBT document. The unit 292 extracts data from the various portions of the patent document based on the type of section. For example, marketable feature data is extracted from portions sectioned as marketable feature, technical challenge data is extracted from portions sectioned as technical challenge, and so on.

For a new patent document, the unit 292 generates a new annotated patent database record request and sends it to the annotated patent database 268, which creates the new record. For an updated patent document (e.g., issuance of a pending application, a foreign counterpart), the unit 292 generates an update an existing annotated database record request and sends it to the annotated patent database 268. An example of an annotated patent database record is discussed in further detail with reference to FIG. 115.

The unit 292 also MTU classifies each new annotated patent document based on the extracted data. The MTU classification is one of: one or more specific MTUs, undecided/potential new MTU, or undecided.

The patent term recognition unit 290 analyzes a patent document to identify patent terms. As used herein, a patent term is a claim term or a technical term. A claim term includes one or more words regarding a claim noun (e.g., an element, a step, an input, output, and/or some quantifiable thing), a claim descriptor (e.g., a feature, a function, a description, an interaction, an operational limitation of a claim noun and/or the like), and/or a claim relator (relationship of two or more claim nouns). A technical term includes one or more words that is regarding a technical aspect of an MTU.

For an identified patent term, the unit 290 determines, based on existing records in the patent terms database 266, whether the patent term is new or an existing one. For a new patent term, the unit 290 generates a new patent term database record request and sends it to the patent terms database 266. The record request includes the patent term, a technical summary of the term, a corresponding figure from the patent document, the type of term (e.g., claim term and/or technical term), and the patent information of the patent document. The record request also includes the MTU classification of the of the patent document.

For an existing patent term, the unit 290 generates an update patent term database record request and sends it to the patent terms database 266. The record update request includes the patent term, a technical summary of the term, a corresponding figure from the patent document, the type of term (e.g., claim term and/or technical term), and the patent information of the patent document. The record update request also includes the MTU classification of the of the patent document. In addition, the patent term database updates a composite summary of the patent term. An example of a patent term database record is discussed in greater detail with reference to FIG. 116.

The MTU identify, create, and data populate unit 282 routinely retrieves newly added records from the MSBT database 262, the patent terms database 262, and the annotated patents databased 268 to determine if a new MTU has emerged, and, if so, to request the creation of a new MTU database record, and to update existing MTU records with new data. The operations of unit 282 will be described in greater detail with reference to FIGS. 117, 118, and 123-136.

The MTU correlation unit 286 coordinates the MTU classifying of the MSBT documents, of patent documents, and of patent terms. The operations of unit 286 will be described in greater detail with reference to one or more of FIGS. 111, 114, 123, 137-139D.

The MTU cataloging unit 284 catalogs MTUs into technology maps and ties MTUs to inclusion MTUs (e.g., higher tier MTUs), to composition MTUs (e.g., lower tier MTUs), and to related MTUs (e.g., MTUs on the same tier and in a similar MTU inclusion mapping). The operations of unit 284 will be described in greater detail with reference to one or more of FIGS. 148-150C.

Figure 110:
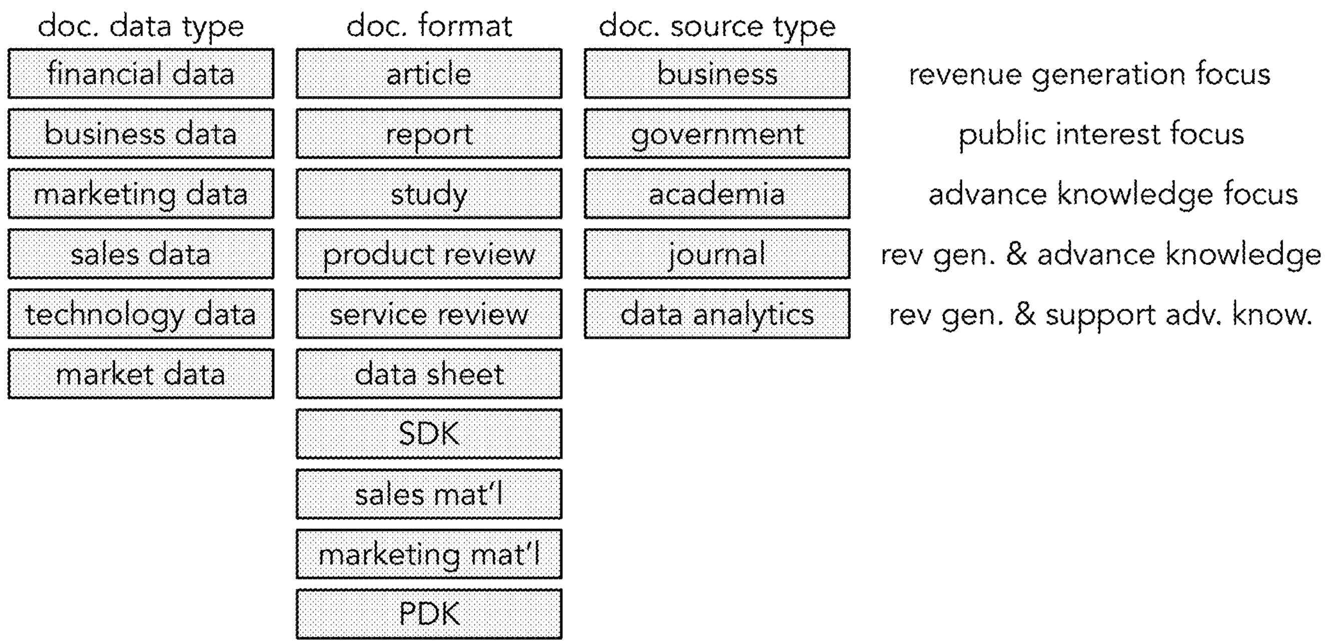
FIG. 110 is a schematic block diagram of an example of characteristics of MSBT (marketing, sales, business, & technology) data ingested by the improved computer for technology.

FIG. 110 is a schematic block diagram of an example of characteristics of MSBT (marketing, sales, business, & technology) document that is ingested by the improved computer for technology. An MSBT document has a document data type, a document format type, and a document source type. As an example, but not as an exhaustive example, the document data types include financial data, business data, marketing data, sales data, technology data, and market data.

As an example, but not as an exhaustive example, the document format type includes an article (newspaper, magazine, journal, etc.), a report, a study, a product review, a service review, a data sheet, a software development kit (SDK), sales material, marketing material, and a product development kit (PDK).

As an example, but not as an exhaustive example, the document source type includes business, government, academia, journal, and data analytics. The document sources typically publish documents (i.e., make publicly available) based on a particular agenda. For example, a business publishes documents based on the agenda of revenue generation and/or brand building. A government agency publishes documents based on the agenda of public interest and/or public awareness. Academia publishes documents based on the agenda of advance knowledge and brand building. Technical journals publish documents based on the agenda of advancing knowledge, revenue generation, and brand building. Data analytics services publish documents based on the agenda of supporting knowledge advancement, revenue generation, and brand building.

The document data type, the document format, and the document source type are used as weighting factors when data from a document is added to an MTU record and the influence the new data has on the understanding, definition, scope, composition, functioning, and/or use of an MTU. For example, a sales document will typically have a lower weighting regarding technical capabilities of a product/service than an academia or technical journal article regarding the product/service.

Figure 111:
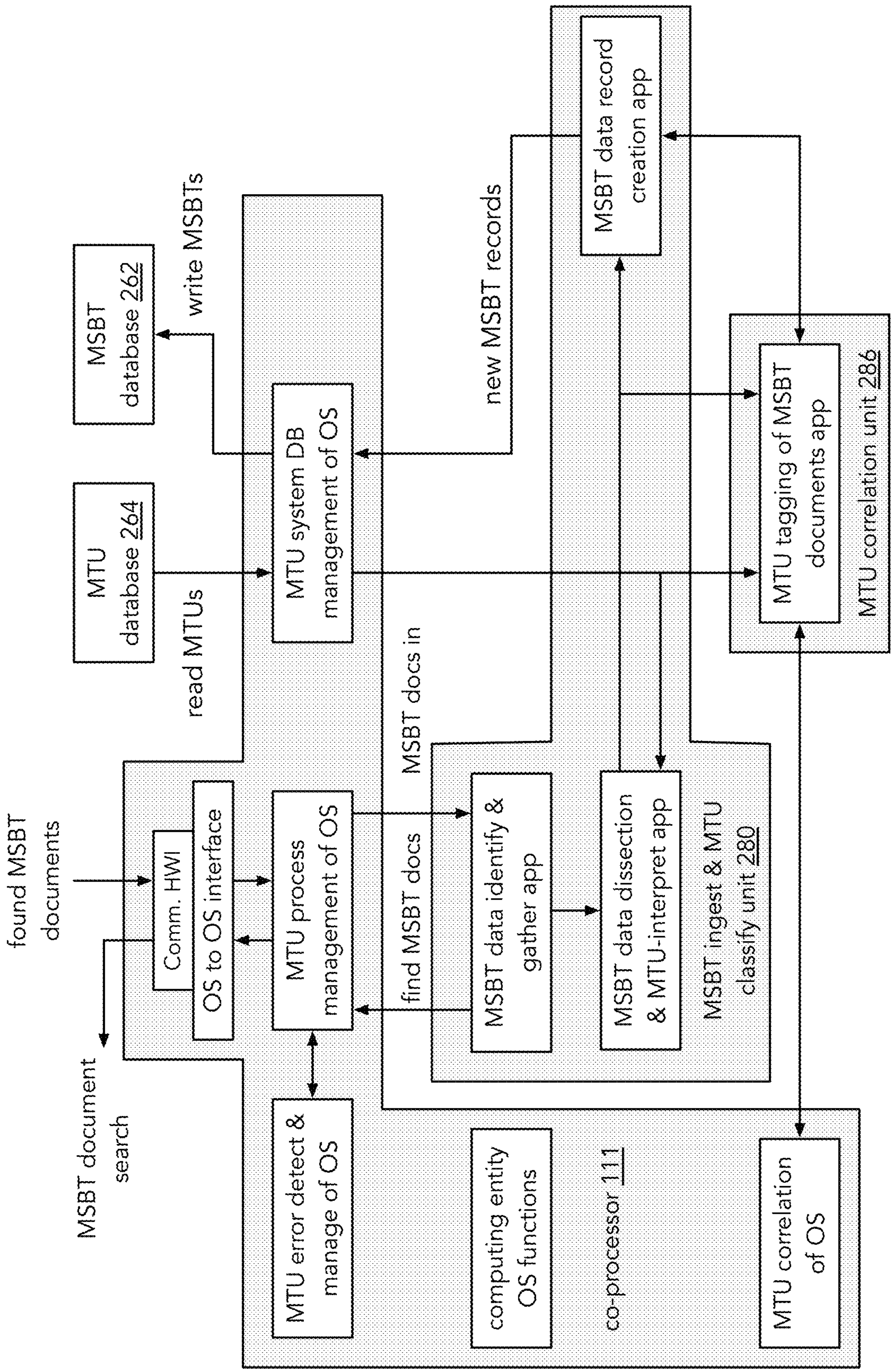
FIG. 111 is a schematic block diagram of a further embodiment of an MSBTP (marketing, sales, business, technology, and patent) data gathering section of an improved computer for technology.

FIG. 111 is a schematic block diagram of a further embodiment of an MSBTP (marketing, sales, business, technology, and patent) data gathering section of an improved computer for technology regarding ingesting MSBT documents and creating MSBT database records. In this embodiment, a co-processor 111 of the improved computer executes the MTU operating system functions of MTU correlation, MTU error detect & management, MTU process management, and MTU system database management; the MBST ingest & MTU classify unit (co-processor) 280 performs the MTU system applications of MSBT data identify & gather, MSBT data dissection & MTU interpret, and MSBT data record creation; and the MTU correlation unit (co-processor) 284 performs the MTU system application of MTU tagging of MSBT documents.

The unit 280 executes the MSBT data identify & gather system application to find MSBT documents. For example, the unit 280 generates a request for a particular MSBT document source to provide all of the new documents its published during a specified time frame. As another example, the unit 280 generates a request for a particular MSBT document source to provide all documents its published regarding a particular subject matter pertaining to an MTU. As a further example, the unit 280 generates a request for a particular MSBT document source to find published documents regarding a particular subject matter pertaining to an MTU. As a still further example, the unit 280 generates a request for multiple MSBT document sources to provide all new documents they've published during a specified time frame and/or regarding a particular subject matter pertaining to an MTU.

The unit 280 sends it requests for MSBT documents to the MSBT document sources via the communication hardware of the improved computer. The computing entity operating system functions of input/output management and process management as executed by the co-processor 111 coordinate access to the network connections of the improved computer and of sending the request to the MSBT document sources. The co-processor 111 also executes the MTU process management OS function and the MTU error detect & management OS function to coordinate management of MTU processes in conjunction with managing the computing entity processes and to ensure, if errors are detected, they are appropriately managed at the MTU OS level and at the computing entity OS level.

The communication hardware of the improved computer receives found MTSB documents and sends them to the MSBT ingest & MTU classify unit 280 executing the MSBT data identify & gather MTU system application. The co-processor 111 executes the appropriate MTU operating system functions and/or computing entity operating system functions to coordinate the conveyance of the received documents from the communication hardware to the unit 280.

For an MSBT document received by the unit 280, it executes the MSBT data dissection & MTU interpret MTU system application to extract MTU orientated data (e.g., data corresponding to an MTU database record) from the document. The unit 280 sends the extracted MTU orientated data (and may further send the document) to the MTU correlation unit 286 for MTU classification.

The MTU correlation unit 286 executes the MTU tagging of MSBT documents MTU system application based on the extracted data (and further on the document). As part of executing the MTU tagging application, the MTU correlation unit determines a technology category for the document and the further determines, if possible, one or more technology maps of the technology category to which the document may pertain. To facilitate this determination, the unit 286 retrieves MTU database records from the MTU database 264, which is coordinate through the MTU system database management OS function executed by co-processor 111.

Based on the retrieved MTU data, the unit 286 classifies the MSBT document. The MTU classifications include the name of one or more MTUs, undecided/potential new MTU, or undecided. The unit 286 provides the MTU classification to the unit 280.

The unit 280 then executes the MSBT data record creation MTU system application to generate a request for creating a new MBST database record. The unit 280 sends the request to the MSBT database 262 via the co-processor 111 that is executing the MTU system DB management OS function. In response to the request, the MSBT database 262 generates a new record of the newly ingested MSBT document. Note that the co-processor 111 executes the appropriate MTU operating system functions and/or computing entity operating system functions to coordinate the execution of the various processes of the MTU systems applications by the unit 280 and/or by the unit 286.

Figure 112:
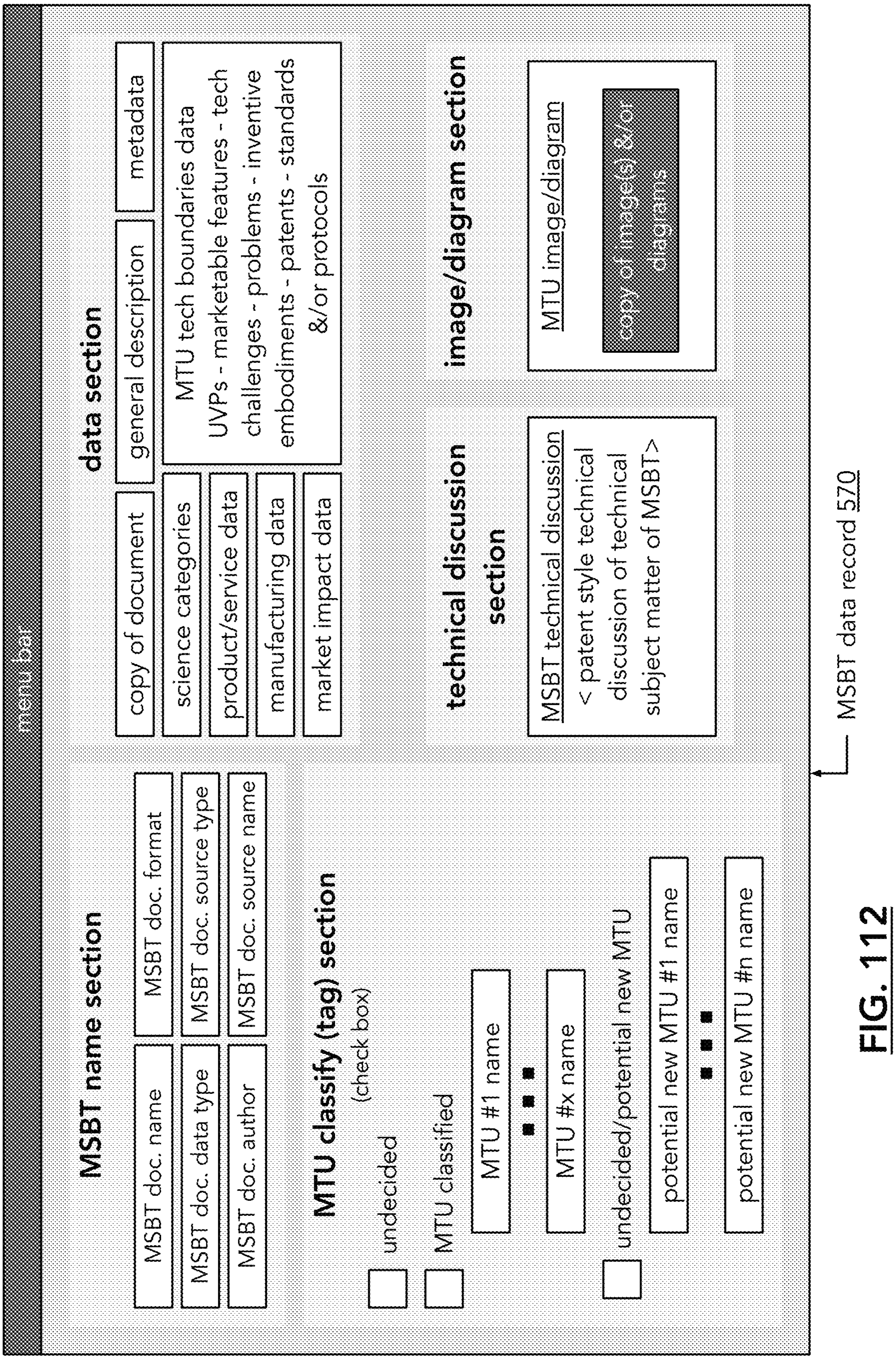
FIG. 112 is a schematic block diagram of an example of a user interactive graphical MSBT (marketing, sales, business, & technology) data record of an MSBT database of the improved computer for technology.

FIG. 112 is a schematic block diagram of an example of a user interactive graphical MSBT (marketing, sales, business, & technology) database record 570 of an MSBT database of the improved computer for technology. Each MSBT document stored by the MSBT database has its own record. The record 570 includes an MSBT name section, an MTU classify (tag) section, a data section, a technical discussion section, and an image/diagram section.

The MSBT name section includes fields for the name of the MSBT document, the data type of the document (e.g., from FIG. 110), the document author, the document format (e.g., from FIG. 110), the document source type (e.g., from FIG. 110), and the document source name. The name section may further include fields for publication date, published by, revision number, and/or other descriptive information.

The MTU classify (tag) section includes a check box for "undecided", a check box for "MTU classified" and a plurality of fields for the MTU names for which the document is relevant; and a check box for "undecided/potential new MTU" and a plurality of fields for potential new MTU names.

The data section includes fields for a copy of the document (which could include highlighting of the partition of the document into MTU sections), a general description of the document, metadata regarding the document, science categories, product/service data, manufacturing data, market impact data, and MTU technical boundaries data. The MTU technical boundaries data includes fields for unique value propositions (UVPs), marketable features, technical challenges, problems, inventive concepts, solutions, inventive embodiments, patents (e.g., as mentioned in the document), standards (e.g., as mentioned in the document), and protocols (e.g., as mentioned in the document).

The technical discussion section includes a field for a summary discussion of technical subject matter disclosed in the document. Such a discussion, if any, would be in accordance with a patent application style of discussing a background technology to provide a general understanding of the technical subject matter and should be a paragraph or two in length. This discussion section is different from the general description of the document, which is an overview discussion of the document (e.g., a data sheet for a product XYZ that lists features ABC).

The image/diagram section includes one or more diagrams to support the technical discussion. The image and/or diagram is extracted from the document and/or created to support the technical discussion.

Figure 113:
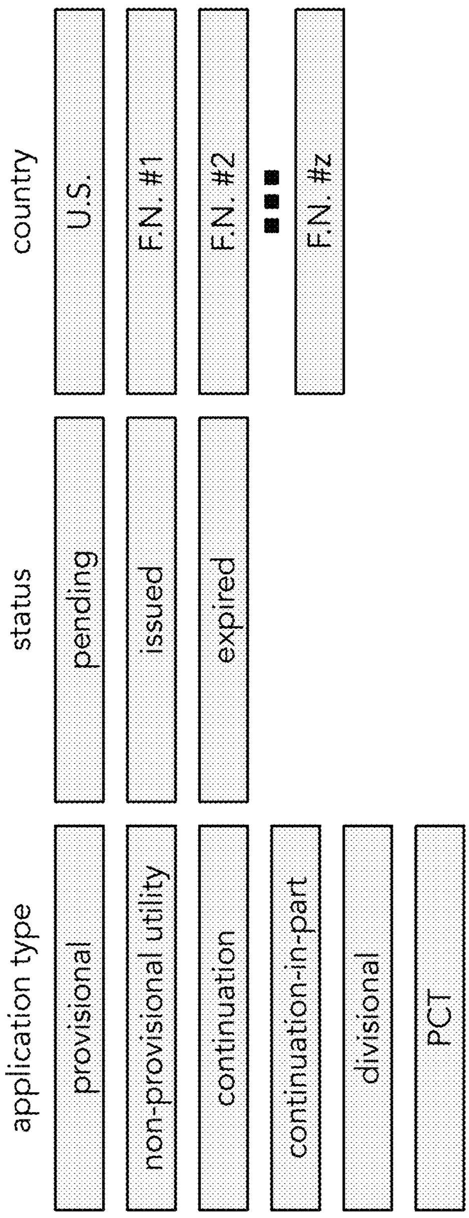
FIG. 113 is a schematic block diagram of an example of characteristics of patent data ingested by the improved computer for technology.

FIG. 113 is a schematic block diagram of an example of characteristics of patent documents ingested by the improved computer for technology. A patent document is of an application type, has a status, and has been filed in one or more countries. As an example, but not as an exhaustive example, the application type includes provisional, non-provisional utility, continuation, continuation-in-part, divisional, and PCT; the status includes pending, issued, and expired; and the country lists the county in which the particular patent document was filed.

Figure 114:
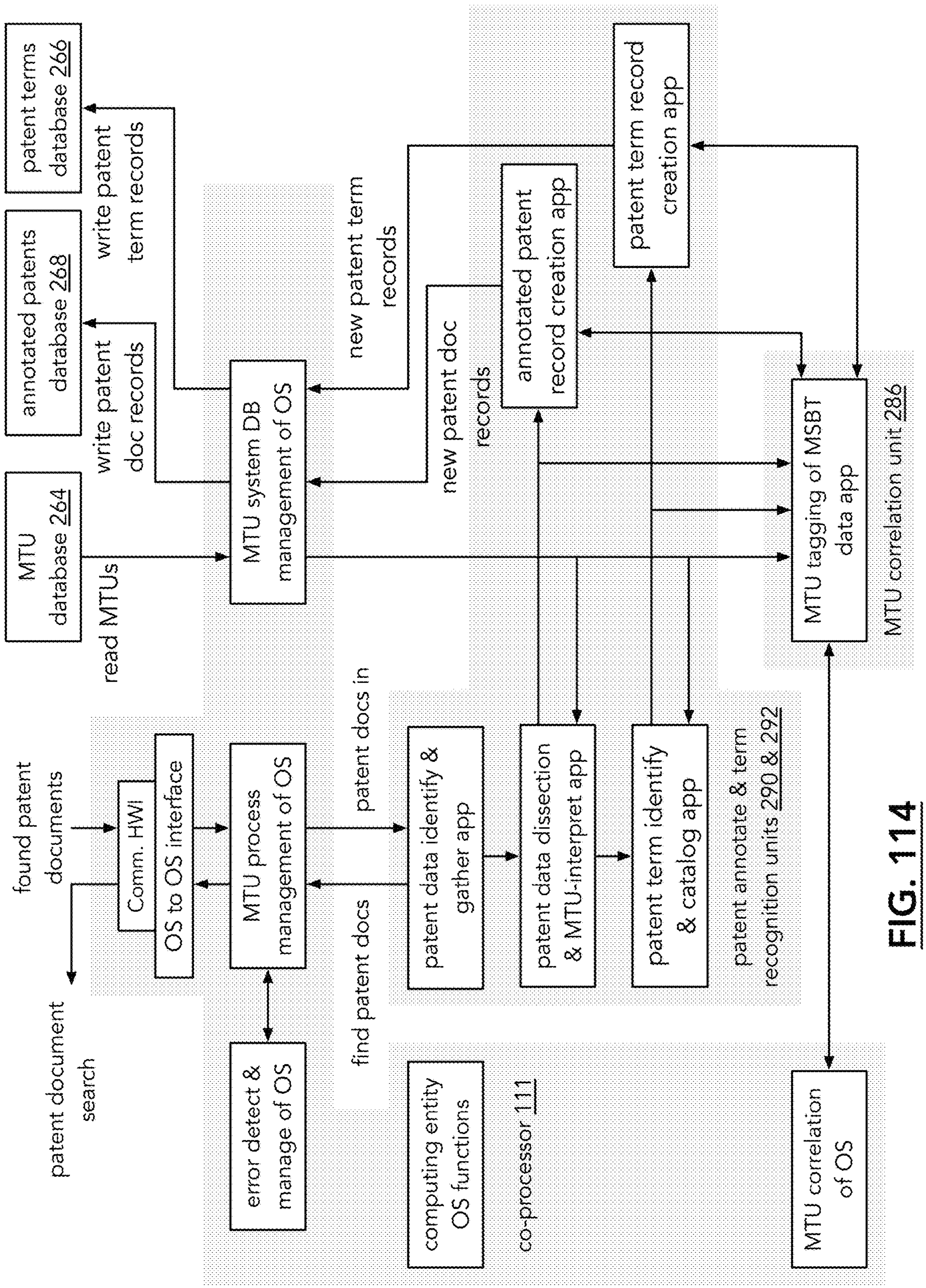
FIG. 114 is a schematic block diagram of a further embodiment of an MSBTP (marketing, sales, business, technology, and patent) data gathering section of an improved computer for technology.

FIG. 114 is a schematic block diagram of a further embodiment of an MSBTP (marketing, sales, business, technology, and patent) data gathering section of an improved computer for technology regarding ingesting patent documents, creating annotated patent database records, and patent term database records. In this embodiment, a co-processor 111 of the improved computer executes the MTU operating system functions of MTU correlation, MTU error detect & management, MTU process management, and MTU system database management; the patent annotating and term recognition units 290 and 292 execute the MTU system applications of patent data identify & gather, patent data dissection & MTU interpret, patent term identify and catalog, annotated patent database record creation, and patent term database record creation.

The units 290 and 292 executes the patent data identify & gather system application to find patent documents. For example, the unit 290/292 generates a request for a particular patent document source (e.g., patent database service) to provide all of the new patent documents its published during a specified time frame. As another example, the unit 290/292 generates a request for a particular patent document source to provide all patent documents its published regarding a particular subject matter pertaining to an MTU. As a further example, the unit 290/292 generates a request for a particular patent document source to find published patent documents regarding a particular subject matter pertaining to an MTU. As a still further example, the unit 290/292 generates a request for multiple patent document sources to provide all new patent documents they've published during a specified time frame and/or regarding a particular subject matter pertaining to an MTU. As a yet further example, the unit 290/292 routinely downloads published patent applications and issued patent from one or more patent offices (e.g., the U.S. Patent and trademark office), which functions as the patent document source.

The unit 290/292 sends it requests for patent documents to the MSBT document sources via the communication hardware of the improved computer. The computing entity operating system functions of input/output management and process management as executed by the co-processor 111 coordinate access to the network connections of the improved computer and of sending the request to the MSBT document sources. The co-processor 111 also executes the MTU process management OS function and the MTU error detect & management OS function to coordinate management of MTU processes in conjunction with managing the computing entity processes and to ensure, if errors are detected, they are appropriately managed at the MTU OS level and at the computing entity OS level.

The communication hardware of the improved computer receives found patent documents and sends them to the unit 290/292 executing the patent data identify & gather MTU system application. The co-processor 111 executes the appropriate MTU operating system functions and/or computing entity operating system functions to coordinate the conveyance of the received patent documents from the communication hardware to the unit 290/292.

For a patent document received by the unit 290/292, it executes the patent data dissection & MTU interpret MTU system application to identifies MTU orientated data (e.g., data corresponding to an MTU database record) in the patent document and to annotate the patent document in light of the MTU orientated data (e.g., highlight sections of the data document regarding benefits of the invention, problem addressed by the invention, etc.). The unit 290/292 sends the extracted MTU orientated data (and may further send the annotated patent document) to the MTU correlation unit 286 for MTU classification.

The MTU correlation unit 286 executes the MTU tagging of MSBT documents MTU system application based on the extracted data (and further on the annotated patent document). As part of executing the MTU tagging application, the MTU correlation unit determines a technology category for the document and the further determines, if possible, one or more technology maps of the technology category to which the annotated patent document may pertain. To facilitate this determination, the unit 284 retrieves MTU database records from the MTU database 264, which is coordinate through the MTU system database management OS function executed by co-processor 111.

Based on the retrieved MTU data, the unit 286 classifies the annotated patent document. The MTU classifications include the name of one or more MTUs, undecided/potential new MTU, or undecided. The unit 286 provides the MTU classification to the unit 290/292.

The unit 290/292 then executes the annotated patent database record creation MTU system application to generate a request for creating a new annotated patent database record. The unit 290/292 sends the request to the annotated patent database 268 via the co-processor 111 that is executing the MTU system DB management OS function. In response to the request, the annotated patent database 268 generates a new record of the newly ingested annotated patent document.

The unit 290/292 also extracts patent terms from a received patent document via the patent term identify & catalog MTU system application. The unit 290/292 uses the MTU classification of the corresponding annotated patent document to MTU classify the patent term.

The unit 290/292 then executes the patent term database record creation MTU system application to generate a request for creating a new patent term database record. The unit 290/292 sends the request to the patent term database 266 via the co-processor 111 that is executing the MTU system DB management OS function. In response to the request, the patent term database 266 generates a new record of the new patent term. Note that the co-processor 111 executes the appropriate MTU operating system functions and/or computing entity operating system functions to coordinate the execution of the various processes of the MTU systems applications by the unit 290/292 and/or by the unit 286.

Figure 115:
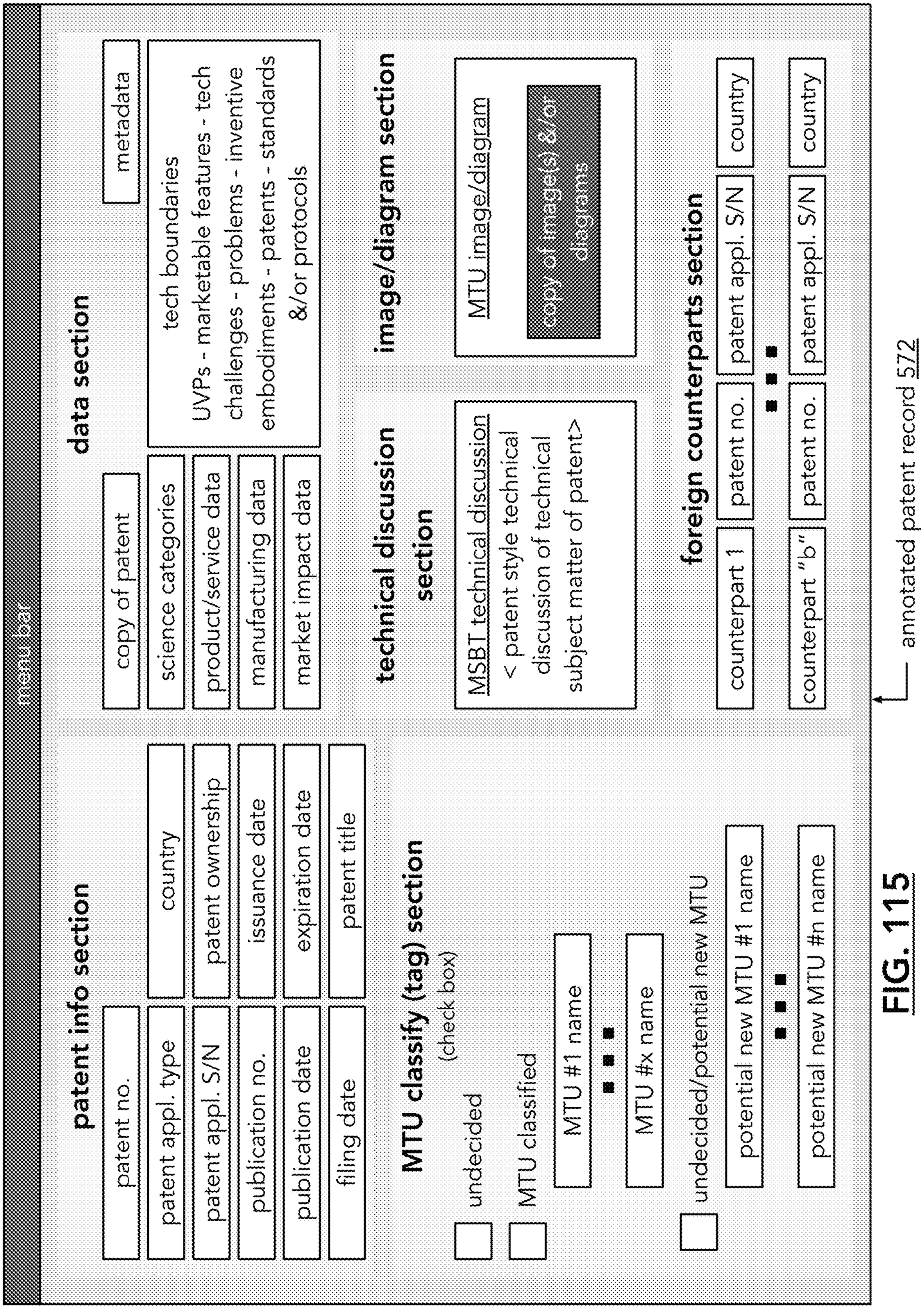
FIG. 115 is a schematic block diagram of an example of a user interactive graphical annotated patent data record of an annotated patent database of the improved computer for technology.

FIG. 115 is a schematic block diagram of an example of a user interactive graphical annotated patent database record 572 of an annotated patent database of the improved computer for technology. Each annotated patent document stored by the annotated patent database has its own record. The record 572 includes a patent information section, an MTU classify (tag) section, a data section, a technical discussion section, an image/diagram section, and a foreign counterpart section.

The patent information section includes fields for issued patent number, patent application type, patent application serial number (S/N), a publication number, a publication data, a filing date, a country in which the patent application was filed, patent owner information (e.g., applicant, assignee, etc.), an issuance date, an expiration date, and a patent title.

The MTU classify (tag) section includes a check box for “undecided”, a check box for “MTU classified” and a plurality of fields for the MTU names for which the document is relevant; and a check box for “undecided/potential new MTU” and a plurality of fields for potential new MTU names.

The data section includes fields for a copy of the annotated patent document, metadata regarding the patent document, science categories, product/service data, manufacturing data, market impact data, and MTU technical boundaries data. The MTU technical boundaries data includes fields for unique value propositions (UVPs), marketable features, technical challenges, problems, inventive concepts, solutions, inventive embodiments, patents (e.g., as mentioned in the document), standards (e.g., as mentioned in the document), and protocols (e.g., as mentioned in the document).

The technical discussion section includes a field for a summary discussion of technical subject matter disclosed in the patent document. Such a discussion, if any, would be in accordance with a patent application style of discussing a background technology to provide a general understanding of the technical subject matter and should be a paragraph or two to a page or two in length.

The image/diagram section includes one or more diagrams to support the technical discussion. The image and/or diagram is extracted from the annotated patent document and/or created to support the technical discussion.

The foreign counterpart section includes fields for foreign counterparts of the present patent document. The fields include issued patent number, patent application serial number, country, filing date, issuance date, and/or other fields comparable to the patent information section. Note that if there is no data for a particular field, the field is left blank. This is a general rule for records within any of the system databases.

Figure 116:
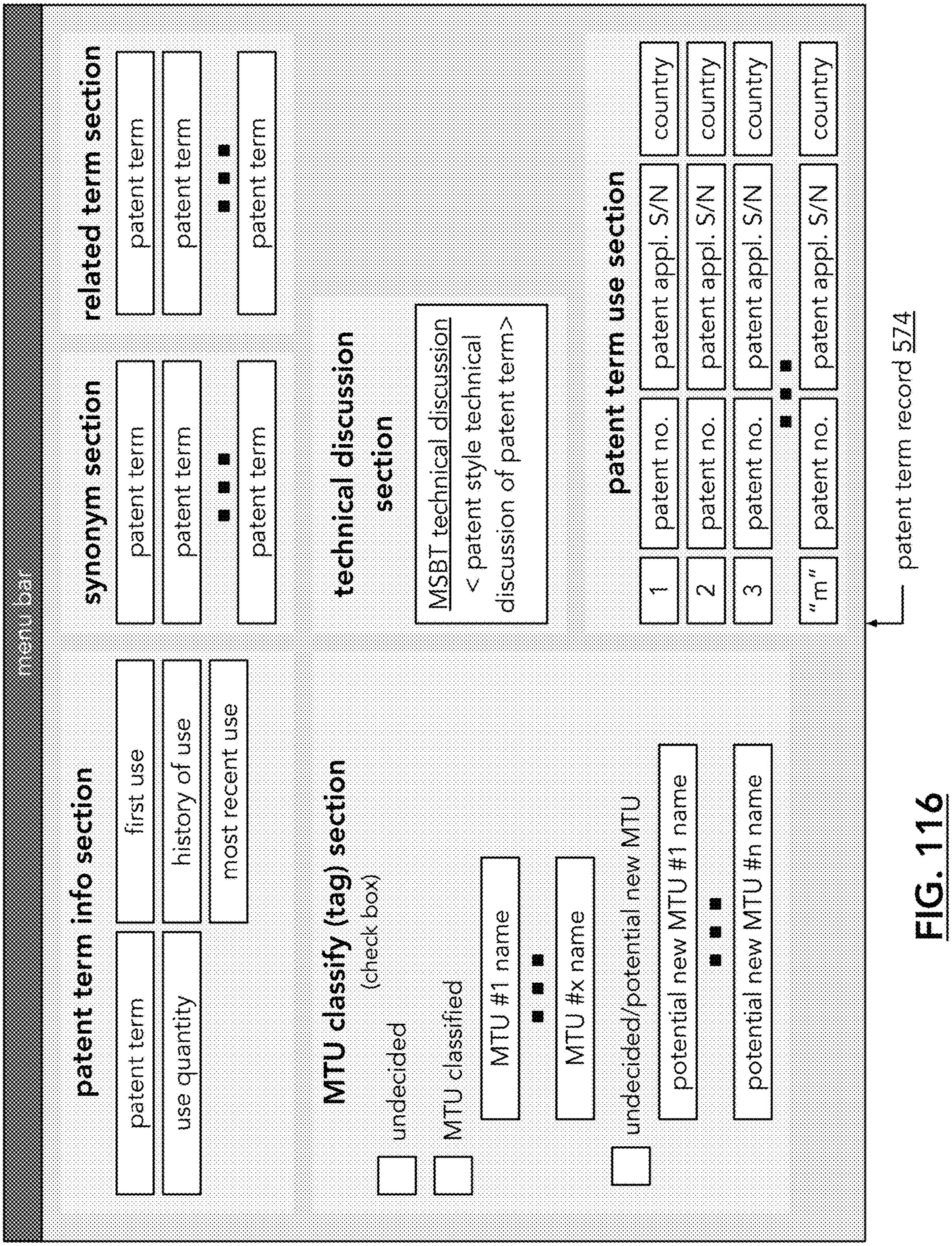
FIG. 116 is a schematic block diagram of an example of a user interactive graphical annotated patent term record of a patent term database of the improved computer for technology.

FIG. 116 is a schematic block diagram of an example of a user interactive graphical patent term record 574 of a patent term database of the improved computer for technology. Each patent term stored by the patent term database has its own record. The record 574 includes a patent term information section, an MTU classify (tag) section, a technical discussion section, a synonym section, a related term section, and a patent term use section.

The patent term information section includes fields for the patent term, the quantity of its use (e.g., the number of patents that include the patent term), the date of first use of the patent term, a summary of the historical use of the patent term and/or it evolution, and the date of most recent use. This allows the improved computer to determine the significance of the patent term and its trend (e.g., being used more, being used less, is new, is obsolete).

The MTU classify (tag) section includes a check box for “undecided”, a check box for “MTU classified” and a plurality of fields for the MTU names for which the document is relevant; and a check box for “undecided/potential new MTU” and a plurality of fields for potential new MTU names.

The technical discussion section includes a field for a summary discussion of patent term. Such a discussion should be in accordance with a patent application style of discussing a background technology to provide a general understanding of the technical subject matter and/or a general meaning. The summary should be a paragraph or two in length.

The synonym section includes fields for a list of synonyms of the patent term. For example, the patent term of “processing circuit” has synonyms of “processor circuit”, “processing module”, “processing unit”, “processor unit”, and “processor”.

The related term section includes fields for a list of related patent terms to the present patent term. For example, the patent term of “processing circuit” has related patent terms of “central processing unit”, “microprocessor”, and “microcontroller”.

The patent term use section includes fields for a list of patent documents that include the patent term. For each patent document, there are fields for patent number, patent serial number, and country (more fields regarding the patents may be included).

Figure 117:
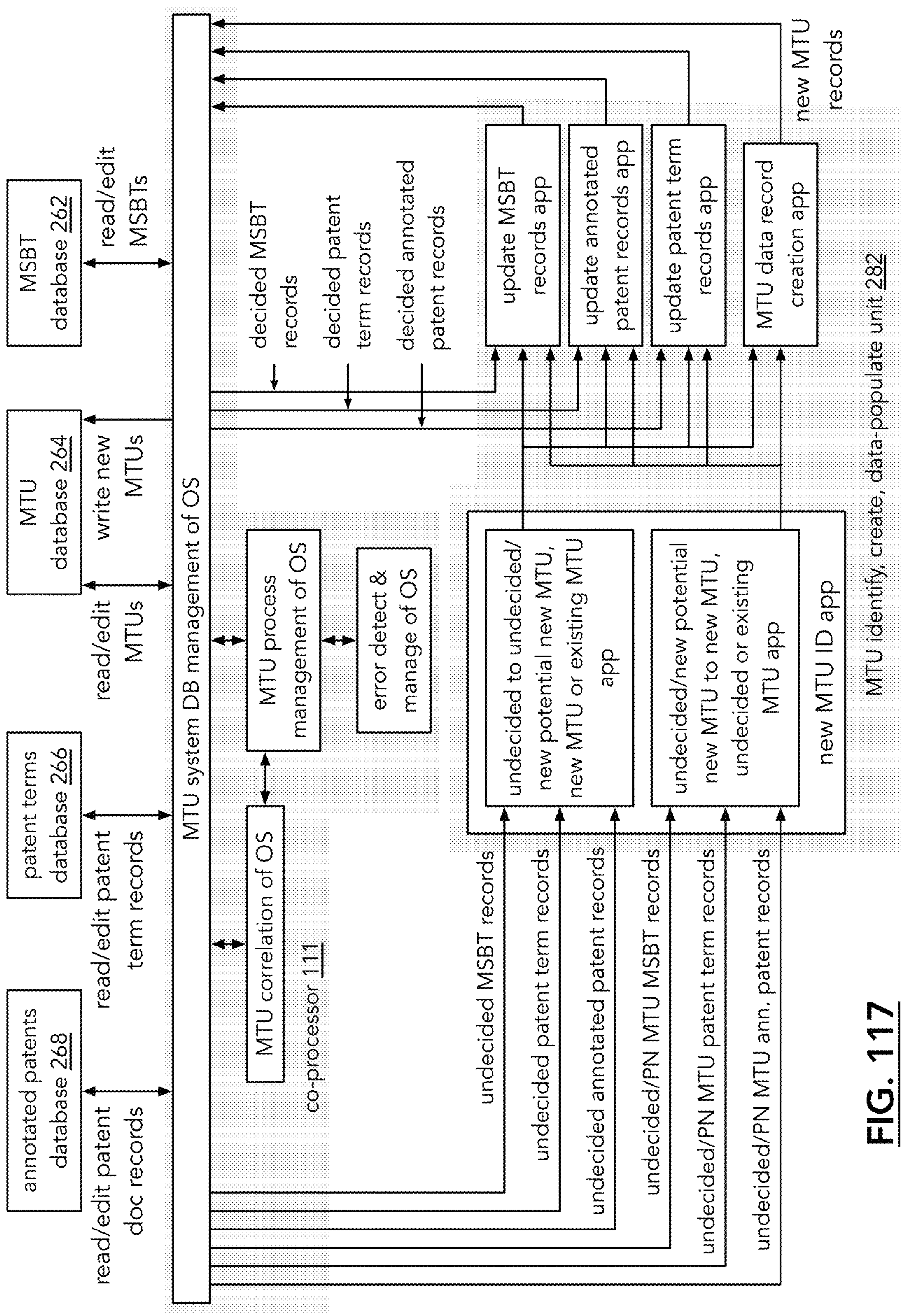
FIG. 117 is a schematic block diagram of a further embodiment of an MSBTP (marketing, sales, business, technology, and patent) data gathering section of an improved computer for technology.

FIG. 117 is a schematic block diagram of a further embodiment of an MSBTP (marketing, sales, business, technology, and patent) data gathering section of an improved computer for technology regarding the identification of new MTUs, the creation of new MTU database records, and data populating existing MTU database records. For these functions, the improved computer includes the co-processor 111, the MTU identify, create, & data populate unit (co-processor) 282, the annotated patent database 268, the patent terms database 266, the MTU database 264, and the MSBT database 262.

The co-processor 111 executes the MTU operating system functions and/or the computing entity operating system functions that support the MTU system applications of new MTU identification, update an MSBT database record, update an annotated patent database record, update a patent term database record, and create a new MTU database record. The MTU identify, create, & data populate unit 282 executes the listed MTU system applications.

The unit 282 executes the new MTU identification system application, which includes two main programs. The first is for records that have a current MTU classification of undecided and the second is for records that have a current MTU classification of undecided/potential new MTU. The unit 282 executes the undecided program to retrieve undecided MSBT records, undecided annotated patent records, and undecided patent term records from the respective databases 262, 266, and 268. The co-processor executes the MTU system database management OS function, the MTU process management OS function, the MTU error detect & manage OS function, the computing entity operating system (CE OS) processing management function, the CE OS secondary memory management, the CE OS main memory management, and/or the CE OS error detect & management to facilitating the requesting and retrieving of records from the respective databases.

The unit 282 interprets the undecided records to determine whether there is now sufficient data to change the MTU classification from undecided to undecided/potential new MTU or to a new MTU. As further discussed in greater detail with reference to one or more subsequent figures, the unit 282 analyzes the data of the undecided records in light of data requirements for an MTU (i.e., the data contained in an MTU database record).

In general, the unit 282 determines, for a sub-section of the data section of an MTU database record, whether the sub-section has sufficient data to establish a definitive parameter for quantifying an emerging technology into an MTU. For example, the unit 282 determines whether the collective undecided records provide sufficient information to identify a unique value proposition, which is a definitive MTU boundary parameter. As another example, the unit 282 determines whether the collective undecided records provide sufficient information to generate a reliable technical summary, which forms another parameter for quantifying an emerging technology. As a further example, the unit 282 determines whether the collective undecided records provide sufficient information to identify a technology challenge, which is another definitive MTU boundary parameter.

For a parameter to quantify a technology as an MTU, the unit 282 assigns a value in a range of values based on the sufficiency (e.g., quantity, reliability, detail, etc.) of the information and on the unit's 282 ability to determine that the information establishes a definitive parameter. The unit 282 interprets the values for the parameters to quantify a technology as an MTU. If the interpretation of the values is inconclusive (e.g., not enough information to identify a potentially new MTU), the unit 282 maintains the "undecided" MTU classification for the records.

If the interpretation of the values is conclusive (e.g., there is enough information to clearly identify a new MTU), the unit 282 initiates the creation of a new MTU record and changes the MTU classification for the records to the name of the new MTU. If the interpretation of the values is between inconclusive and conclusive (e.g., enough information to indicated that there might be a new MTU, but not enough information to clearly establish a new MTU), the unit 282 creates a potential new MTU name and changes the MTU classification for the records to the "undecided/potential new MTU" with the name of the potentially new MTU.

For an MTU classification change (to undecided/potential new MTU or to a new MTU), the unit 282 executes the MTU system applications of update MSBT database records, update annotated patent database records, and update patent term database records. Via these applications, the unit 282 generates update requests and sends them to the respective databases to update the MTU classification.

For a new MTU, the unit 282 executes the MTU system application of create a new MTU database record. Via this application, the unit 282 generates a new MTU database record request and sends it to the MTU database 264, which creates the new MTU database record.

The unit 282 also executes the undecided/potential new MTU program to retrieve records (MSBT, annotated patents, and patent terms) having the MTU classification from the respective databases 262, 266, and 268. The co-processor 111 executes the MTU system database management OS function, the MTU process management OS function, the MTU error detect & manage OS function, the computing entity operating system (CE OS) processing management function, the CE OS secondary memory management, the CE OS main memory management, and/or the CE OS error detect & management to facilitating the requesting and retrieving of records from the respective databases.

The undecided/potential new MTU program is similar to the undecided program in that the unit 282 generates and interprets values for the parameters to quantify a technology as an MTU, with a difference being that the present retrieved data is for a specific potentially new MTU. If the interpretation of the values is conclusive (e.g., there is enough information to clearly identify the new MTU), the unit 282 initiates the creation of a new MTU record and changes the MTU classification for the records to the name of the new MTU.

If the interpretation of the values remains less than conclusive, the unit 282 maintains the MTU classification for the records as "undecided/potential new MTU". If the interpretation of the values has now become inconclusive (e.g., not enough information to identify a potentially new MTU), the unit 282 changes the MTU classification from "undecided/potential new MTU" to "undecided". Note that the unit 282 may execute these MTU system applications concurrently and/or subsequently with the MSBT ingest & MTU classify unit 280, the patent term recognition unit 290, and/or the patent annotating unit 292 executing their respective MTU system applications.

Figure 118:
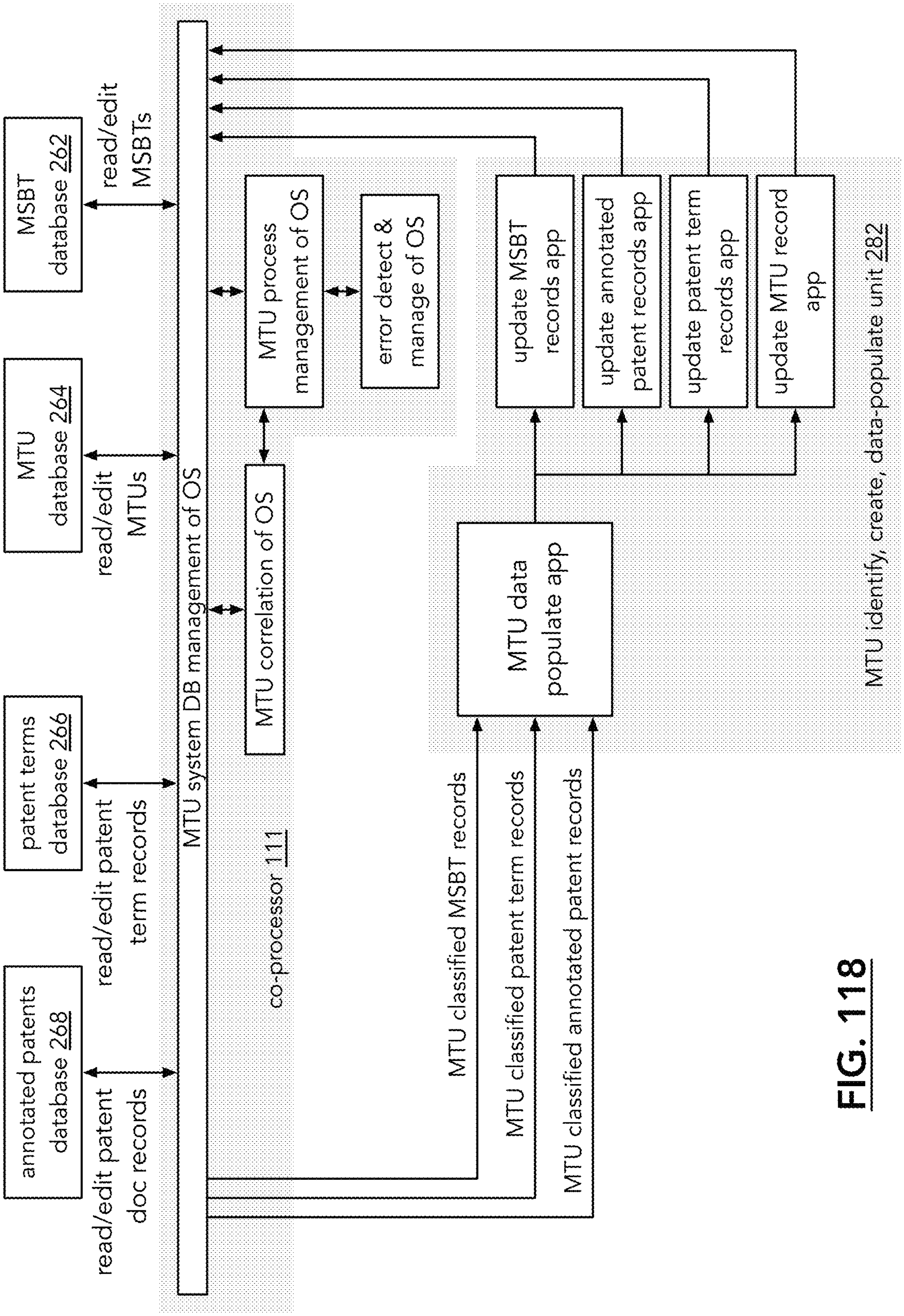
FIG. 118 is a schematic block diagram of a further embodiment of an MSBTP (marketing, sales, business, technology, and patent) data gathering section of an improved computer for technology.

FIG. 118 is a schematic block diagram of a further embodiment of an MSBTP (marketing, sales, business, technology, and patent) data gathering section of an improved computer for technology regarding data populating existing MTU database records. For this function, the MTU identify, create, and data populate unit 282 executes the MTU system application regarding data populating. The unit also executes the MTU system applications of update and MSBT database record, update an annotated patent database record, update a patent database record, and/or update an MTU database record.

The co-processor 111 executes the MTU operating system functions and/or the computing entity operating system functions that support the unit executing the above-mentioned MTU system applications and for writing to and/or reading from one or more of the system databases.

For an MTU database record, the unit 282 retrieves new database records (MSBT, annotated patent, and/or patent term) that have an MTU classification of the MTU name of the present MTU from the respective databases 262, 266, and 268. Via the MTU data populating system application, the unit 282 extracts new information to add to the MTU database record. Via the update an MTU record system application, the unit 282 generates a request to update the MTU database record with the extracted new information.

As the unit 282 determines the updates for the MTU database record, it determines, via the MTU data populating system application, whether the updated MTU database record causes a change in the data an MSBT database record, an annotated patent database record, and/or a patent term database record. For example, if the updated data prompts an update to the MTU name (e.g., changing from "processor circuit" to "processing circuit" since most reference refer to the MTU as a processing circuit), the unit 282 generates database update requests for each effected records and send the requests to the appropriate databases.

Note that the unit 282 may execute this MTU system application concurrently and/or subsequently with the MSBT ingest & MTU classify unit 280, the patent term recognition unit 290, and/or the patent annotating unit 292 executing their respective MTU system applications. Further note that the unit may execute this MTU system application concurrently and/or subsequently with it executing the MTU system application discussed in FIG. 117.

Figure 119:
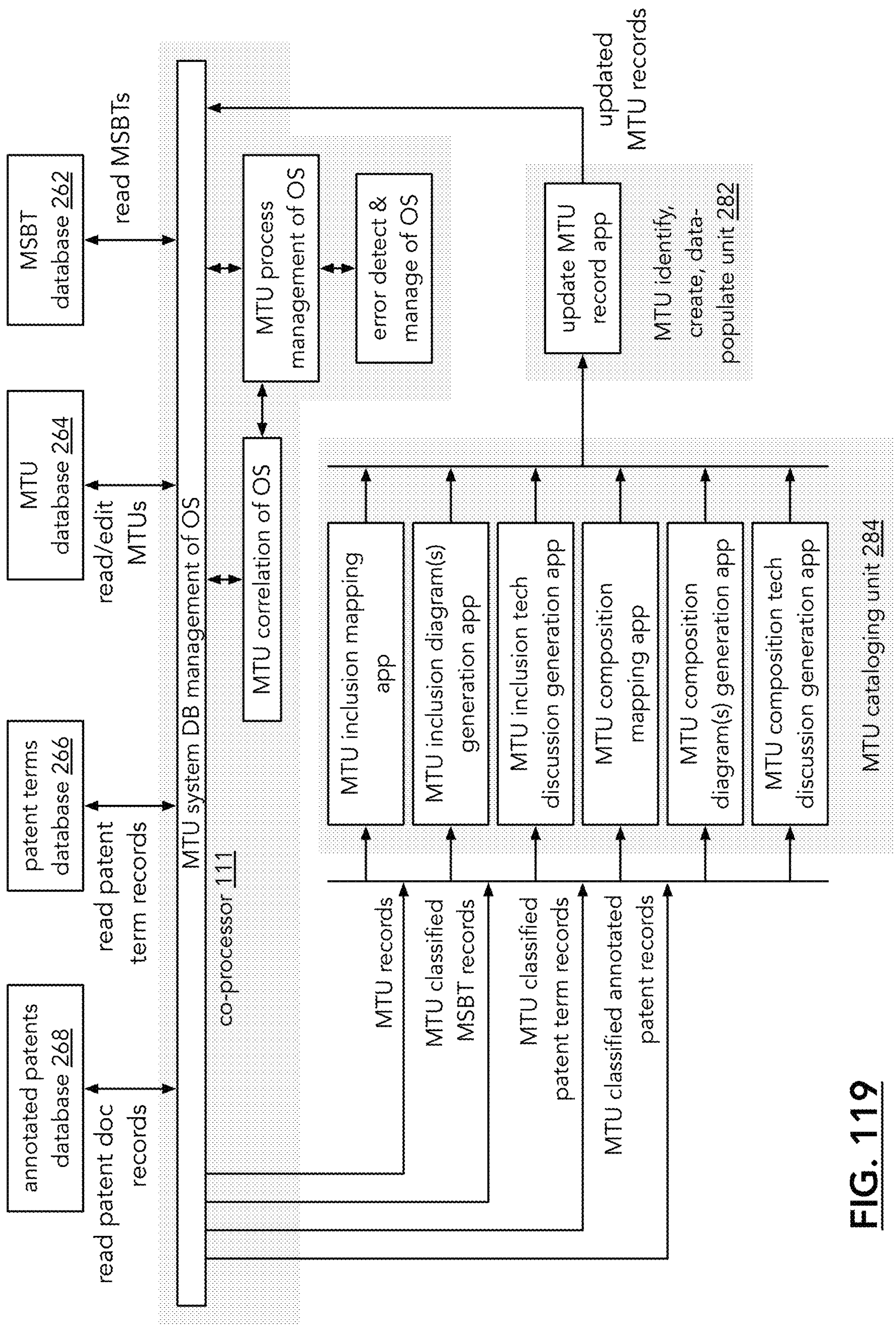
FIG. 119 is a schematic block diagram of a further embodiment of an MSBTP (marketing, sales, business, technology, and patent) data gathering section of an improved computer for technology.

FIG. 119 is a schematic block diagram of a further embodiment of an MSBTP (marketing, sales, business, technology, and patent) data gathering section of an improved computer for technology regarding the cataloging of MTUs into one or more technical maps. For this function of the improved computer, it utilizes the co-processor 111, the MTU cataloging unit 284, the MTU identify, create, and data populate unit 282, the MSBT database 262, the MTU database 264, the patent terms database 266, and the annotated patents database 268.

The MTU cataloging unit (co-processor) 284 executes the MTU system applications of MTU inclusion mapping, MTU includes diagram generation, MTU inclusion technical discussion generation, MTU composition mapping, MTU composition diagram generation, and MTU composition technical discussion generation. The MTU identify, create, and data populate unit executes the MTU system application of update an MTU database record.

The co-processor 111 executes the MTU operating system functions and/or the computing entity operating system functions that support the unit executing the above-mentioned MTU system applications and for writing to and/or reading from one or more of the system databases.

The unit 284 retrieves one or more MTU records, one or more MSBT records that are MTU classified with the names of the one or more MTU records, one or more annotated patent records that are MTU classified with the names of the one or more MTU records, and one or more patent term records that are MTU classified with the names of the one or more MTU records from the respective databases. For example, the unit 284 retrieves the MTU record of touch screen controller and the supporting MSBT document records, the supporting annotated patent records, and/or the supporting patent terms.

For a new MTU record, the executes the MTU inclusion mapping and MTU composition system applications by identifying one or relevant technology maps based on the data of the MTU database records and/or the data of the supporting documents. Assume that this is the first occurrence of a touch screen controller in the literature (e.g., which includes the supporting documents) and is a new technology for the new technology of a touchscreen display.

The literature indicates that a touch screen display is a new user input/output device for a cell phone. From this information, the unit 284 retrieves the technology map that includes input/output devices of a cell phone and may further retrieve other technology maps that include input/output devices.

Executing the MTU inclusion mapping system application, the unit 284 determines that the touch screen controller MTU is included in the new touch screen display MTU of the input/output devices MTU of a cell phone MTU. Accordingly, the unit updates the technology map to include the touch screen display MTU and the touch screen controller MTU.

Executing the MTU composition mapping system application, the unit 284 determines that the touch screen controller MTU includes a plurality sensor circuits and a touch processing circuit. The unit updates the technology map to include the sensor circuits and the touch processing circuit.

Based on the updated technology map, the unit 284 executes the system applications of MTU inclusion diagram generation and MTU composition diagram generation to generate an MTU inclusion functional diagram, an MTU inclusion hierarchy diagram, an MTU composition functional diagram, and/or an MTU composition hierarchy diagram.

From the functional diagrams, the unit 284 executes the system applications of MTU inclusion technical discussion generation and MTU composition technical discussion generation. For example, the unit 284 generates an MTU inclusion technical discussion based on the MTU inclusion functional diagram. As another example, the unit 284 generates an MTU composition technical discussion based on the MTU composition functional diagram.

The unit 284 provides the MTU inclusion functional diagram, the MTU inclusion hierarchy diagram, the MTU composition functional diagram, the MTU composition hierarchy diagram, the MTU inclusion technical discussion, and/or the MTU composition technical discussion to the unit 282. The unit 282 generates an MTU database update request for the touch screen controller MTU to update the record to include the MTU inclusion functional diagram, the MTU inclusion hierarchy diagram, the MTU composition functional diagram, the MTU composition hierarchy diagram, the MTU inclusion technical discussion, and/or the MTU composition technical discussion.

For an existing MTU database record that already includes the MTU inclusion functional diagram, the MTU inclusion hierarchy diagram, the MTU composition functional diagram, the MTU composition hierarchy diagram, the MTU inclusion technical discussion, and/or the MTU composition technical discussion, the unit 284 may update one or more of these data based on newly received documents.

The unit 284 retrieves newly added records that are MTU classified with the names of the one or more MTU records of interest, and one or more patent term records that are MTU classified with the names of the one or more MTU records from the respective databases. For example, the unit retrieves newly added database records that are classified with the touch screen controller MTU.

The unit 284 analyses the newly added documents to determine if there are new features, functions, technical challenges, implementations, etc. with respect to the touch screen controller presently stored in the touch screen controller MTU database record. If the unit identifies changes, it determines whether the changes warrant an update to one or more of the diagrams and/or to one or more of the technical descriptions. If not, the unit 284 concludes the analysis with no updates to the diagrams and/or technical description.

If, however, the unit 284 determines that one or more changes warrant an update to the diagrams, the unit evokes diagram MTU system application(s) to update the MTU inclusion functional diagram, the MTU inclusion hierarchy diagram, the MTU composition functional diagram, and/or the MTU composition hierarchy diagram. The unit then evokes the MTU system application(s) to update the, the MTU inclusion technical discussion, and/or the MTU composition technical discussion.

Figure 120:
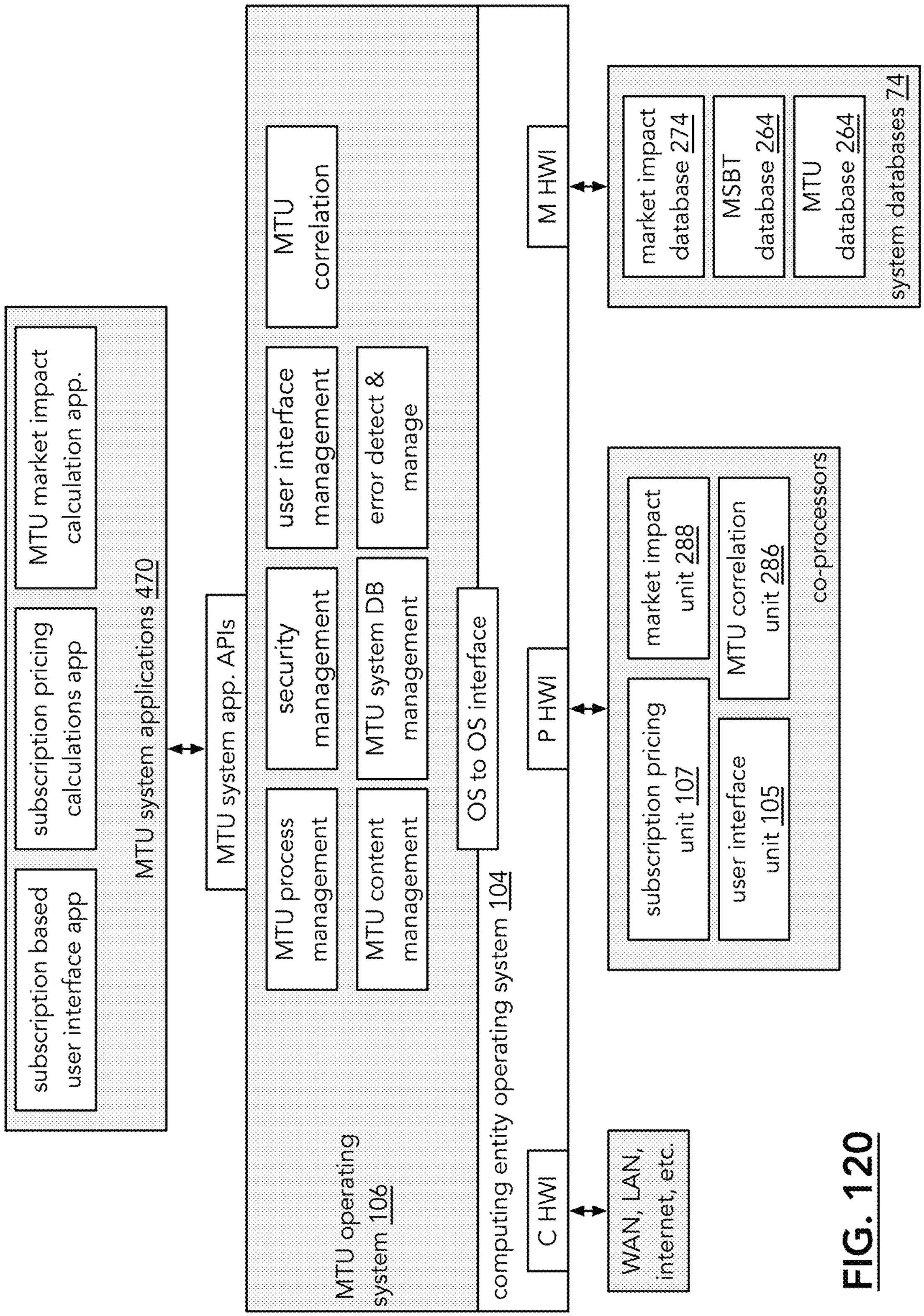
FIG. 120 is a schematic block diagram of an embodiment of a subscription based user interface section, subscription pricing, and market impact section of an improved computer for technology.

FIG. 120 is a schematic block diagram of an embodiment of a portion of the improved computer regarding a subscription based user interface, subscription pricing calculations, and market impact of an MTU. The portion of the improved computer includes the computing entity operation system 104, the MTU operating system 106, some of the system databases 74, co-processors of the hardware section, the communication interface hardware, and a plurality of MTU system applications 470. The system databases includes the MSBT database 262, the MTU database 264, and the market impact database 274.

The MTU system applications 470 includes a subscription based user interface, subscription pricing, and market tech unit (MTU) market impact calculations. The MTU operating system 106 functions include the MTU correlation, the MTU processing management, the MTU system database management, the MTU error detection and management, the MTU security management, the MTU content management, and the user interface management.

The co-processors include a subscription pricing unit 107, a subscription based user interface unit 105, a market impact unit 288, and the MTU correlation unit 286. The communication hardware connects the improved computer to one or more networks (e.g., Internet, WAN, LAN, WLAN, cellular, etc.) through which an authorized and authenticated user device accesses one or more MTU user applications.

The subscription based user interface unit 105 executes the subscription based user interface MTU system application to ensure that only authorized and authenticated user device's access an MTU user application for subscribed to MTUs. The MTU user applications include MTU generation and phase report, MTU existing patent data report, MTU existing market impact report, MTU existing patent protection report, MTU previous and current value report, MTU future patent data report, MTU future market impact report, MTU future patent protection report, MTU future value report, MTU technology expansion report, MTU market opportunity report, MTU expansion report, MTU patent protection expense & growth report, MTU architectural patent protection plan, MTU invention identification & claim drafting, MTU patent application drafting, MTU patent prosecution drafting, MTU patent quality reports, MTU patent protection plan execution tracking report, MTU constructive notice report, MTU patent sale opportunity report, MTU patent purchase opportunity report, MTU patent licensing opportunity report, MTU patent standards report, and MTU patent spin-off or joint venture (JV) opportunity report.

The subscription pricing unit 107 executes the subscription pricing MTU system application. The pricing is based on an MTU access fee component, an access frequency component, and an MTU user application component. The MTU access fee component includes pricing plateaus based on the number of MTUs to be accessed. For example, there is a first fee component to have access to all MTUs, there is a second fee component to access the MTUs of a particular technology category (e.g., communication technology), there is a third fee component to access MTUs of a particular technology map, and there is a fourth fee component to access an individual MTU, wherein the first fee component is greater than the second fee component, which is greater than the third fee component, which is greater than the fourth fee component. There is an MTU fee premium for proprietary MTUs (e.g., only available to client paying to keep it proprietary).

The MTU user application fee component includes pricing plateaus based on the number of MTU user applications to be accessed. For example, there is a first fee component to have access to all MTU user applications, there is a second fee component to access the MTU user applications of a particular analysis perspective (e.g., existing TMPIV, future TMPIV, TMPIV portfolio development, patent preparation & prosecution, patent exploitation), and there is a third fee component to access an individual MTU user application, wherein the first fee component is greater than the second fee component, which is greater than the third fee component.

The MTU access frequency fee component includes pricing plateaus based on the frequency of accessing the improved computer for the chosen level of MTUs and the chosen level of MTU user applications. For example, there is an annual fee component to have year-round access to the improved computer, there is a monthly fee component to have month-by-month access to the improved computer, and there is a one-time access fee component to access the improved computer once for the chosen level of MTUs and the chosen level of MTU user applications, wherein the annual fee component is greater than the monthly fee component, which is greater than the one-time access fee component.

The subscription based user interface unit 105 records in a user database (not shown) for storing user device information, a user device subscription selection regarding the MTU access fee component, the access frequency component, and the MTU user application component. The subscription based user interface unit 105 authentic using a variety of techniques to ensure the user device is truly the user device and is being used by an authentic user. The subscription based user interface unit 105 authorizes an authenticated user device based on an inputted service request and the user device's stored subscription selections. If the inputted service request is in accordance with the user device's stored subscription selections, the subscription based user interface unit 105 allows access to fulfill the inputted service request.

If the inputted service request is not in accordance with the user device's stored subscription selections, the subscription based user interface unit 105 provides message indicating such. In addition, the subscription based user interface unit 105 provides information regarding the difference between the inputted service request and the user device's stored subscription selections. The subscription based user interface unit 105 further provides an annual price difference, a monthly price difference, and/or a one-time price difference regarding the difference between fees of the inputted service request versus the fees of the user device's stored subscription selections.

If the user device selects one of the pricing options, the subscription based user interface unit 105 allows access to the inputted service request after payment has cleared. This allows flexibility in accessing the various MTU user applications and/or accessing various number of MTUs with transparency in the fee structure.

The market impact unit 288 executes the MTU system application of MTU market impact calculations. This discussed in greater detail with reference to FIG. 121.

Figure 121:
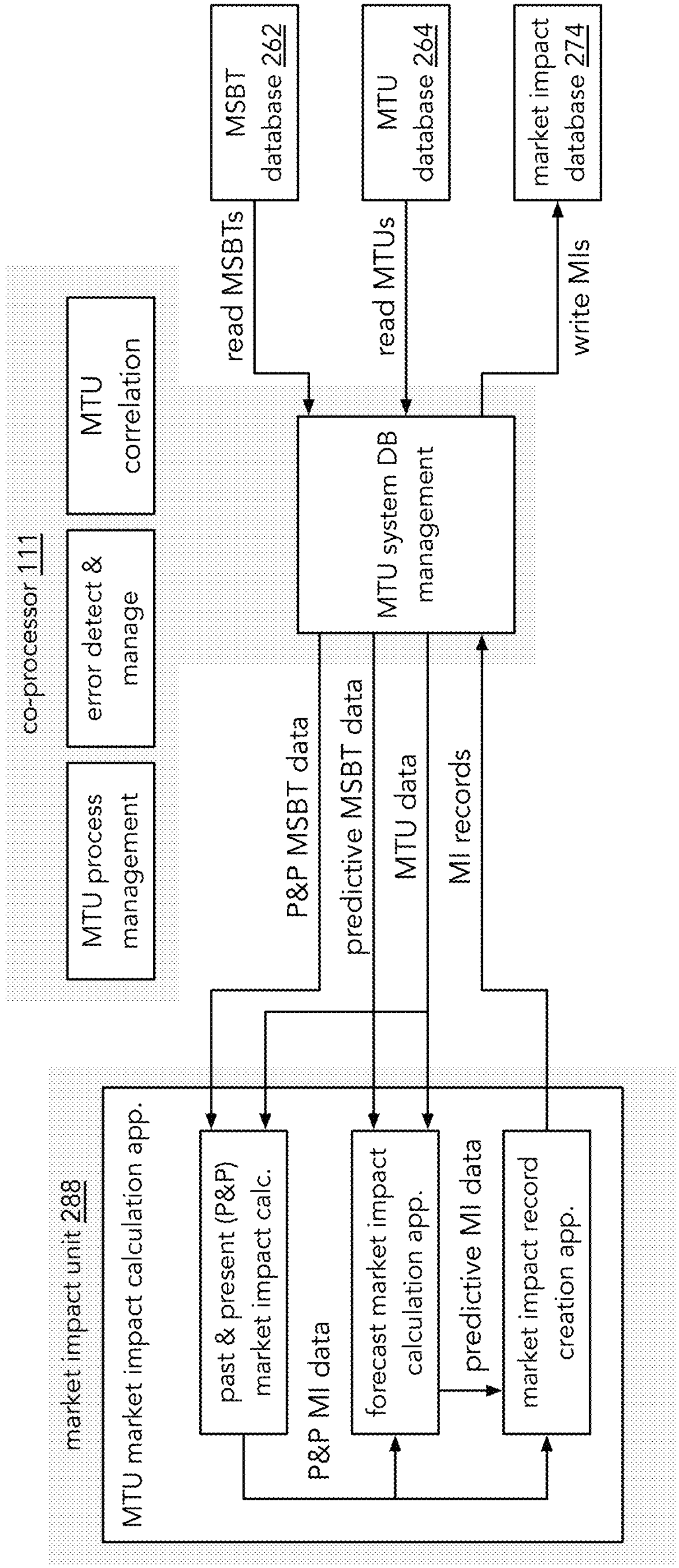
FIG. 121 is a schematic block diagram of a further embodiment of a market impact section of an improved computer for technology.

FIG. 121 is a schematic block diagram of a further embodiment of a portion of an improved computer for technology regarding market impact for an MTU. The portion of the improved computer includes the market impact unit 288, the co-processor 11, the MSBT database 262, the MTU database 264, and the market impact database 274. The market impact unit 288 executes the MTU system application regarding MTU market impact calculations, which includes a patent & present component, a future forecast component, and a market impact record creation component.

The co-processor 111 executes the MTU operating system functions and/or the computing entity operating system functions that support the unit executing the above-mentioned MTU system applications and for writing to and/or reading from one or more of the system databases.

The unit 288 retrieves past and present (P&P) MSBT data and predictive MSBT data from the MBST database 266. The unit 288 also retrieves MTU data from the MTU database 264. For an MTU, the unit 288 generates market impact data, which is regarding the impact the MTU has had on the market and the forecasted impact the MTU is likely to have on the market.

If the market impact has previously been calculated for the MTU, the unit 288 generates a market impact database record update request to adds the latest calculations and their sources to the market impact database 274. If this the first calculation of market impact for the MTU, the unit 288 generates a request for a new market impact database record and sends it to the market impact database 274. The various calculations for market impact are discussed in greater detail with reference to one or more other Figures.

Figure 122:
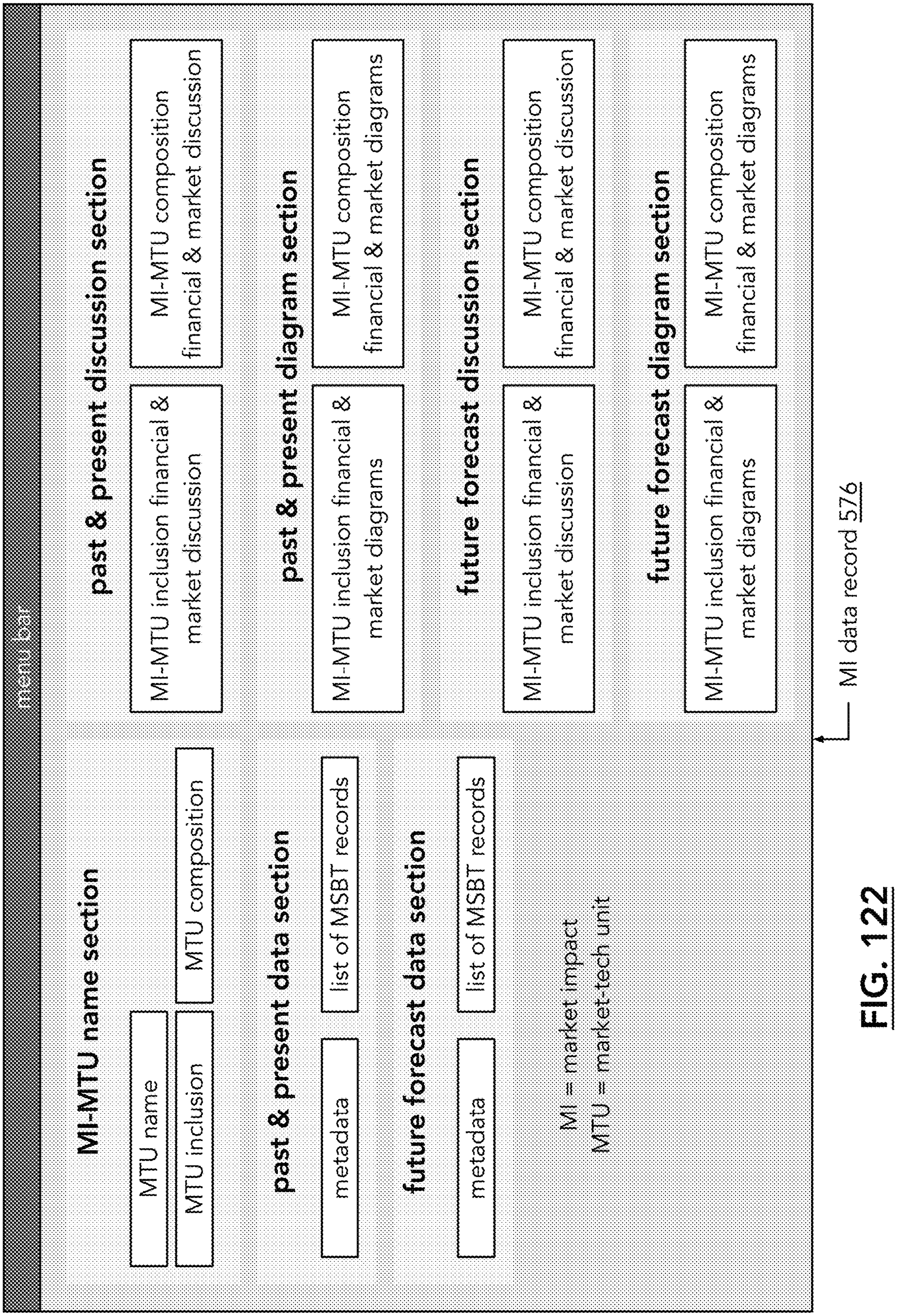
FIG. 122 is a schematic block diagram of an example of a user interactive graphical market impact of an MTU record of a market impact (MI) database of the improved computer for technology.

FIG. 122 is a schematic block diagram of an example of a user interactive graphical database record 576 for market impact of an MTU of a market impact (MI) database of the improved computer for technology. The record includes a market impact (MI) MTU name section, a past and present data section, a future forecast data section, a past and present discussion section, a past and present diagram section, a future forecast discussion section, and a future forecast diagram section.

The market impact (MI) MTU name section includes fields for the MTU name, the names of one or more MTU inclusion names, and the names of one or more MTU composition names. The names of inclusion MTUs and/or composition MTUs are included if they are accessed to help determine the market impact for the present MTU.

The past and present data section includes fields for a list of MSBT database records use to determine the past and present market impact. This section also includes a field for metadata regarding the list.

The future forecast data section includes fields for a list of MSBT database records use to determine the future forecasted market impact. This section also includes a field for metadata regarding the list.

The past and present discussion section includes fields for a past and present summary of the financial and market performance from an MTU inclusion perspective. This section also includes a field for a past and present summary of the financial and market performance from an MTU composition perspective.

The past and present diagram section includes fields for a past and present diagram(s) that support the summary of the financial and market performance from an MTU inclusion perspective. This section also includes a field for a past and present diagram(s) that support the summary of the financial and market performance from an MTU composition perspective.

The future forecast discussion section includes fields for a future forecasted summary of the financial and market performance from an MTU inclusion perspective. This section also includes a field for a future forecasted summary of the financial and market performance from an MTU composition perspective.

The future forecast diagram section includes fields for a future forecasted diagram(s) that support the summary of the financial and market performance from an MTU inclusion perspective. This section also includes a field for a future forecasted diagram(s) that support the summary of the financial and market performance from an MTU composition perspective.

Figure 123:
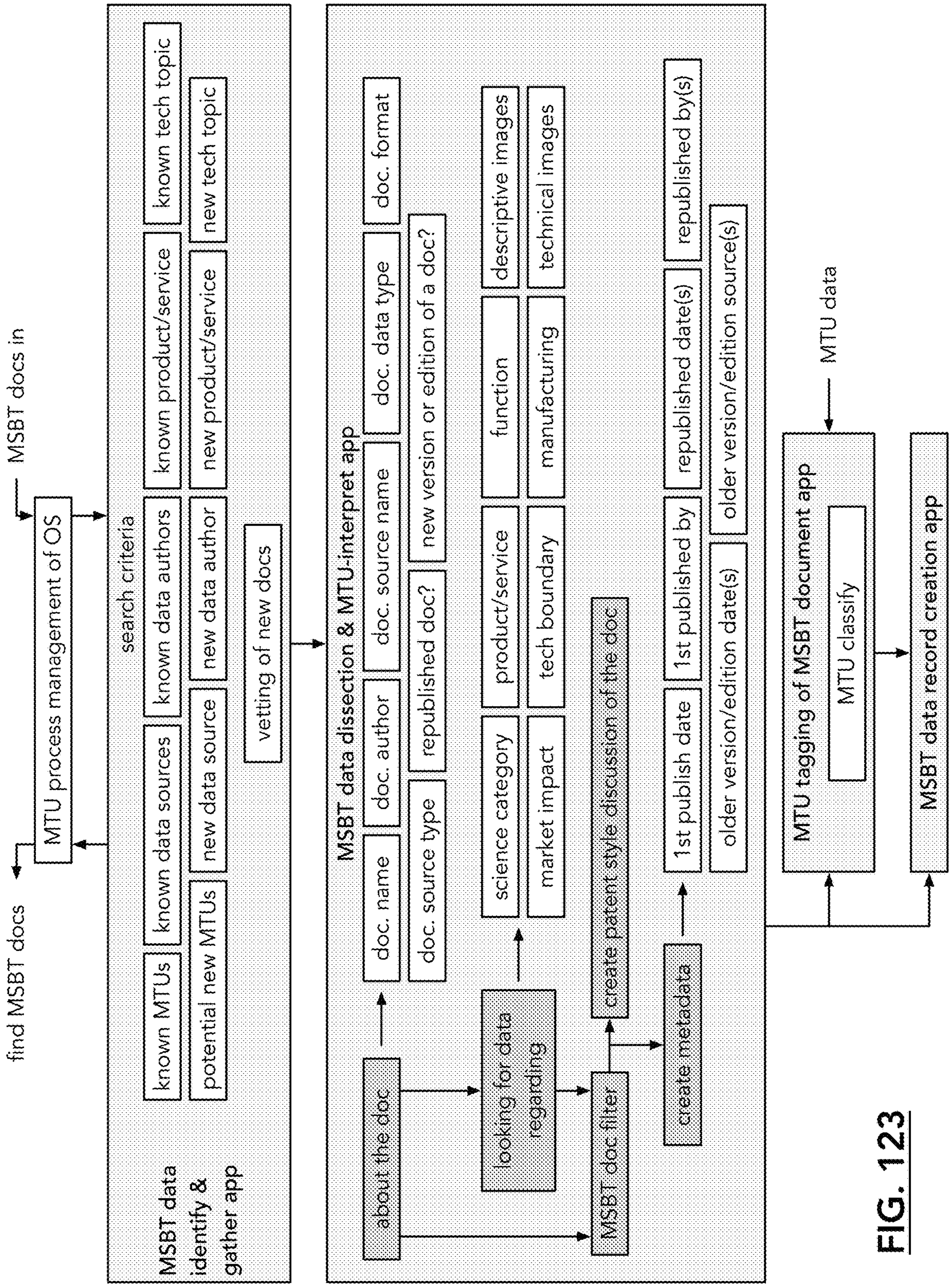
FIG. 123 is a schematic block diagram of a further embodiment of an MSBTP (marketing, sales, business, technology, and patent) data gathering section of an improved computer for technology.

FIG. 123 is a schematic block diagram of a further embodiment of an MSBTP (marketing, sales, business, technology, and patent) data gathering section of an improved computer for technology regarding MSBT documents. In this Figure, the functional operations of the MSBT data identify & gather MTU system application, the MSBT data dissection & MTU interpret MTU system application, the MTU tagging of an MBST document MTU system application, and MSBT database record create MTU system application are discussed.

When the improved computer executes the MSBT data identify & gather MTU system application, it uses search criteria to find and vet potentially relevant MSBT documents. The search criteria includes, but is not limited to, known MTUs, known data sources, known data authors, know products/services, known technical topics, potential new MTUs, new data sources, new data authors, new products/services, and/or new technical topics. For this MTU system application, known means that at least one record in at least one of the system databases has information regarding the known search criteria. An example of searching for potentially relevant MSBT documents will be discussed with reference to FIG. 124. The vetting of potentially relevant MSBT documents will be discussed with reference to FIG. 125.

When the improved computer executes the MSBT data dissection & MTU interpret MTU system application, it follows a basic flow chart of identifying information about the document, look for relevant MTU orientated data, apply an MSBT document filter function, create a patent style discussion of the document, and create metadata for the document. Information about the document includes document name (title, or other identifying phrase), the name of the documents author (e.g., a person), the name of the document source (e.g., publisher, company, etc.), the document data type (see FIG. 110), the document format (see FIG. 110), the document source type (see FIG. 110), whether this document is a republication (i.e., the same document but republished by a second document source), and whether this document is a new version or edition of a previously published document.

The MTU orientated data includes, but is not limited to, science category data, product/service data, function data, a descriptive image, market impact data, a technical boundary (e.g., unique value proposition, marketable feature, technical challenge, problem, inventive concept, implementation element, implementation mechanism, implementation variant, solution, and/or inventive embodiment), manufacturing data, and/or a technical image.

The improved computer executes the MSBT document filter to determine, based on the information about the document and the identified MTU orientated data, the usability of document. In general, the improved computer determines the usefulness of an MSBT document for identifying new MTUs and/or for further defining existing MTUs. An example of MSBT document filtering is discussed with reference to FIG. 131.

The improved computer creates a patent style discussion of the document if it has some measure of usability. As used herein, "a patent style discussion" refers to a written discussion, alone or with reference to a figure or diagram, that provides a sufficient level of detail so that the content and/or purpose of the document can be generally understood from an MTU perspective, which should be achievable in a few paragraphs or less. Examples of such patent style discussions are presented with reference to several Figures; one particular example is discussed with reference to FIG. 129B.

The improved computer creates metadata for the document if it has some measure of usability. For example, the metadata includes, but is not limited to, the date of first publication, the name of the first publishing entity, republication dates (if any), dates for older versions and/or editions of the document, and/or names of the publishers of the older versions and/or editions. An example of metadata is discussed with reference to FIG. 130B.

The improved computer tags MSBT document as discussed with reference to FIGS. 137-139D and creates a request for new MSBT database record and/or a request for updating an existing MSBT database record as discussed with reference to FIG. 141.

Figure 124:
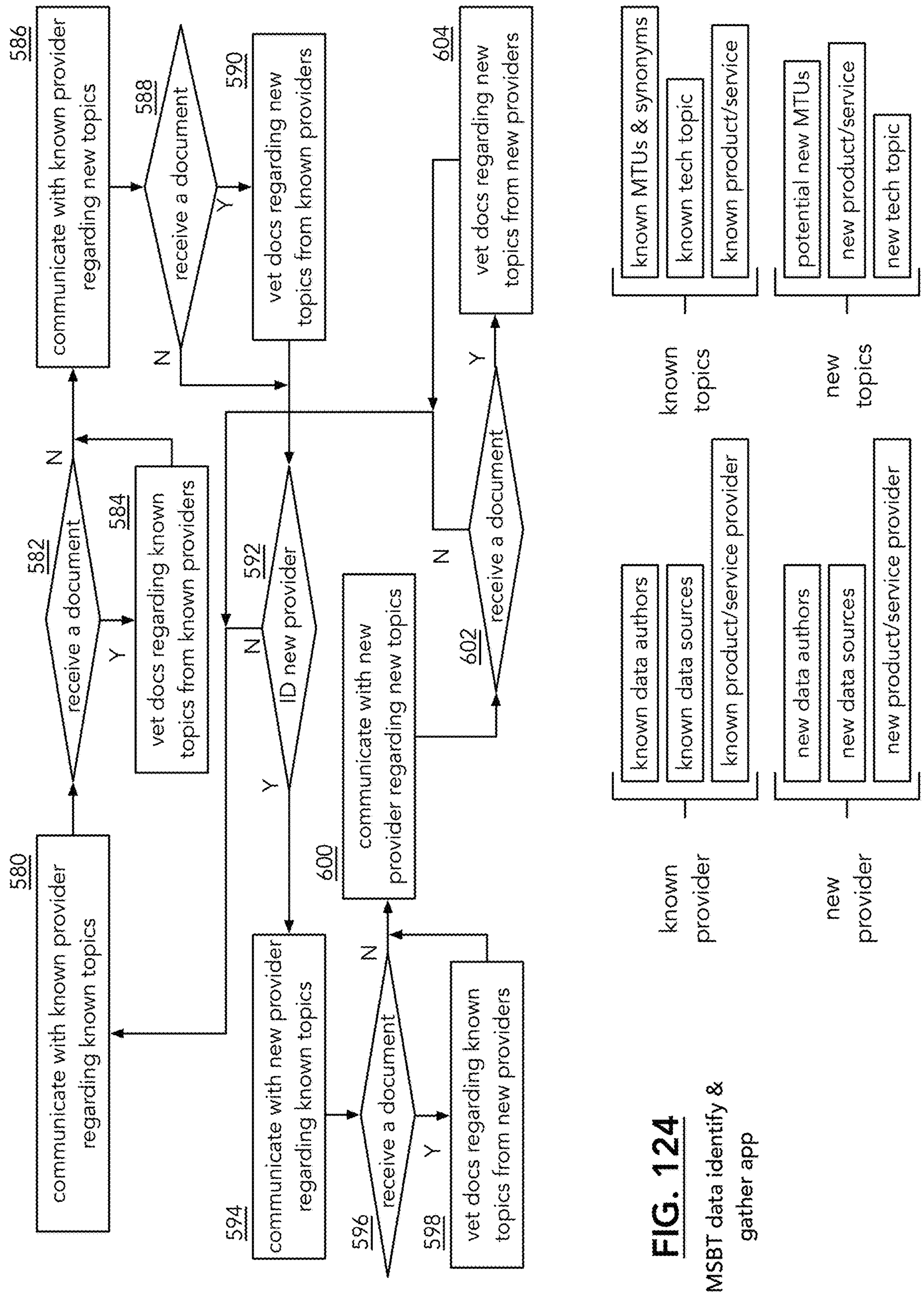
FIG. 124 is a logic diagram of an example of ingesting MSBT documents by an MSBTP (marketing, sales, business, technology, and patent) data gathering section of an improved computer for technology.

FIG. 124 is a logic diagram of an example of a method for ingesting MSBT documents by an MSBTP (marketing, sales, business, technology, and patent) data gathering section of an improved computer for technology. The method begins at step 580 where the improved computer communicates with known providers of MSBT documents regarding known topics (e.g., existing and non-obsoleted MTUs). As shown, a known provider includes a known data author, a known data source, and/or a known product/service provider. A known topic includes a known MTUs and/or its synonyms, a known technology topic, and/or a known product/service.

The communication is through the communication hardware of the improved computer to access MSBT documents via one or more networks (e.g., WAN, LAN, internet, cellular, etc.). The communication can be done in a variety of ways. For example, the improved computer sends a query to a known MSBT document source (e.g., a computing entity associated with a person, company, or other legal entity that makes MSBT documents publicly available) for new MSBT documents in general or with respect to a specified MTU or set of MTUs. As another example, the improved computer routinely (e.g., periodically, pseudo randomly, when there is a new document, etc.) receives new MSBT documents in general or with respect to a specific MTU or set of MTUs from a known source (e.g., a subscription with the known source to receive MSBT documents). As a further example, the improved computer scans a website of a known source for new MSBT documents (e.g., a company selling products/services, a university, etc.). As a still further example, the improved computer reviews internet postings by a known source of new MSBT documents.

The method continues at step 582, where the improved computer determines whether it has received a new MSBT document from a known source. If yes, and for each document received from a known provider regarding a known topic, the method continues at step 584 where the improved computer vets the received document. An example of vetting an MSBT document is discussed with reference to FIG. 125.

From step 584 and from a no response to step 582, the method continues at step 586 where the improved computer communications with known sources regarding new topics. As shown, the new topics includes, but are not limited to, potential new MTUs, new products/services, new technology topics beyond existing MTUs, and/or technology discussions regarding hypothesized scientific theories.

The method continues at step 588, where the improved computer determines whether it has received a new MSBT document from a known source regarding a new topic. If yes, and for each document received from a known provider regarding a new topic, the method continues at step 590 where the improved computer vets the received document.

From step 590 and from a no response to step 588, the method continues at step 592 where the improved computer determines whether it has identified a new provider. As shown, a new provider includes a new data author, a new data source, and/or a new product/service provider. If a new provider is not identified, the method repeats at step 580.

If a new provider is identified, the method continues at step 594 where the improved computer communicates with the new provider regarding known topics. The method continues at step 596, where the improved computer determines whether it has received a new MSBT document from a new source regarding a known topic. If yes, and for each document received from a new provider regarding a known topic, the method continues at step 598 where the improved computer vets the received document.

From step 598 and from a no response to step 596, the method continues at step 600 where the improved computer communications with a new provider regarding a new topic. The method continues at step 602, where the improved computer determines whether it has received a new MSBT document from a new source regarding a new topic. If yes, and for each document received from a new provider regarding a new topic, the method continues at step 604 where the improved computer vets the received document. If not, the method repeats at step 580.

The improved computer routinely executes the method of FIG. 124. For example, the improved computer continually executes the method and receives new MSBT documents 24 hours a day, 7 days a week. As another example, the improved computer executes the method on an hourly basis or a daily basis, 7 days a week. As yet another example, the improved computer executes the method with a different frequency for weekdays versus weekends.

Figure 125:
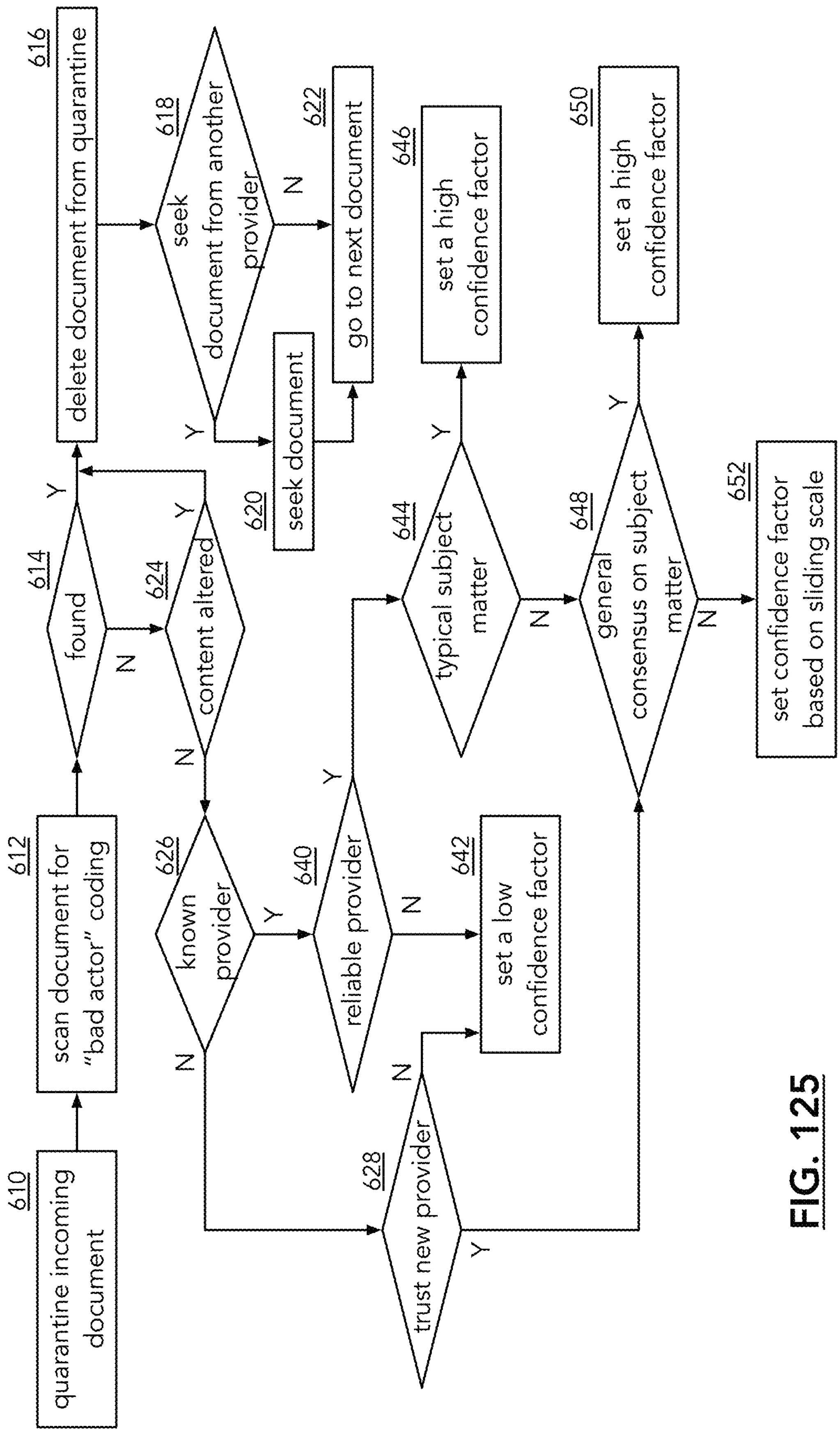
FIG. 125 is a logic diagram of another example of ingesting MSBT documents by an MSBTP (marketing, sales, business, technology, and patent) data gathering section of an improved computer for technology.

FIG. 125 is a logic diagram of another example of ingesting MSBT documents by an MSBTP (marketing, sales, business, technology, and patent) data gathering section of an improved computer for technology regarding vetting of documents to establish confidence factors. The method begins at step 610 where the improved computer quarantines each incoming document. The incoming documents are quarantined in separate hardware from the hardware of the improved computer and the software of the quarantined hardware is separate from the software of the improved computer.

The method continues at step 612, where the quarantine hardware and software scans the document for "bad actor" coding. As used herein, a bad actor is a person or computer bot that operates with malicious intent and does so via hack attempts, phishing attacks, denial of service attacks, bait and switch attacks, cookie theft, a virus, a trojan horse, a worm, click jacking attacks, keylogger attacks, eavesdropping, waterhole attacks, SQL injection attacks, DNS spoofing attacks, and/or any other forms for digital attacks.

The method continues at step 614, where the quarantine hardware and software determines whether any "bad actor" coding was found. If yes, the method continues at step 616 where the quarantine hardware and software deletes the document for quarantine and informs the improved computer. The method continues at step 618 where the improved computer determines whether to seek the document from a different provider. If yes, the method continues at step 620 where the improved computer initiates a search for the document for another provider. From step 620 or a no response from step 618, the method continues at step 622 where the method repeats for the next document in quarantine.

If, at step 614, no "bad actor" coding was found, the method continues at step 624 where the quarantine hardware and software determine whether the content of the document has been altered. The content of a document may be altered in a variety of ways. For example, the content was altered as a result of a data transmission error. As another example, the content was altered intentionally by a person or a computer bot. If the content has been altered, the method repeats at step 616.

If the content has not been altered, the method continues at step 626 where the quarantine hardware and software releases the document to the improved computer and the improved computer determines whether the provider of the document is a known provider. If yes, the method continues at step 640 where the improved computer determines whether provider is reliable (which is based on a historical analysis of documents provided by the provider). If not, the method continues at step 642 where the improved computer sets a low confidence factor for the document and the process repeats for another document.

If, at step 640, the provider is reliable, the method continues at step 644 where the improved computer determines whether subject matter of the document is typical subject matter made publicly available by the provider. If yes, the method continues at step 646 where the improved computer sets a high confidence factor, and the method repeats for the next document.

If not, the method continues at step 648 where the improved computer determines whether there is a general consensus on the subject and whether the subject matter presented by the provider is in line with the general consensus. In this instance, general consensus refers to a sufficient amount of scientific data to support the validity or invalidity of a hypothesized technical theory. If yes, the method continues at step 650 where the improved computer sets a high confidence factor, and the method repeats for the next document.

If not, the method continues at step 652 where the improved computer sets the confidence factor based on a sliding scale. The sliding scale is based on the amount of data available to validate or invalidate a hypothesized technical theory, the level of data in the present document to validate or invalidate a hypothesized technical theory, and the difference between the data of the present document than the available data.

If, at step 626, the provider is not a known provider (i.e., is a new provider) the method continues at step 628 where the improved computer determines whether to trust the new provider. For example, the improved computer gathers data regarding the new provider and the level of reliability of documents it makes publicly available. If there is sufficient data to support trusting the new provider, the new provider is trusted, if not, the new provider is not trusted (i.e., is treated as an unreliable provider). Note that the improved computer routinely updates the reliability score of a provider.

If the new provider is not yet trusted, the method continues at step 642, where confidence factor is set to a low value. If the new provider is trusted, the method repeats at step 648.

Figure 126:
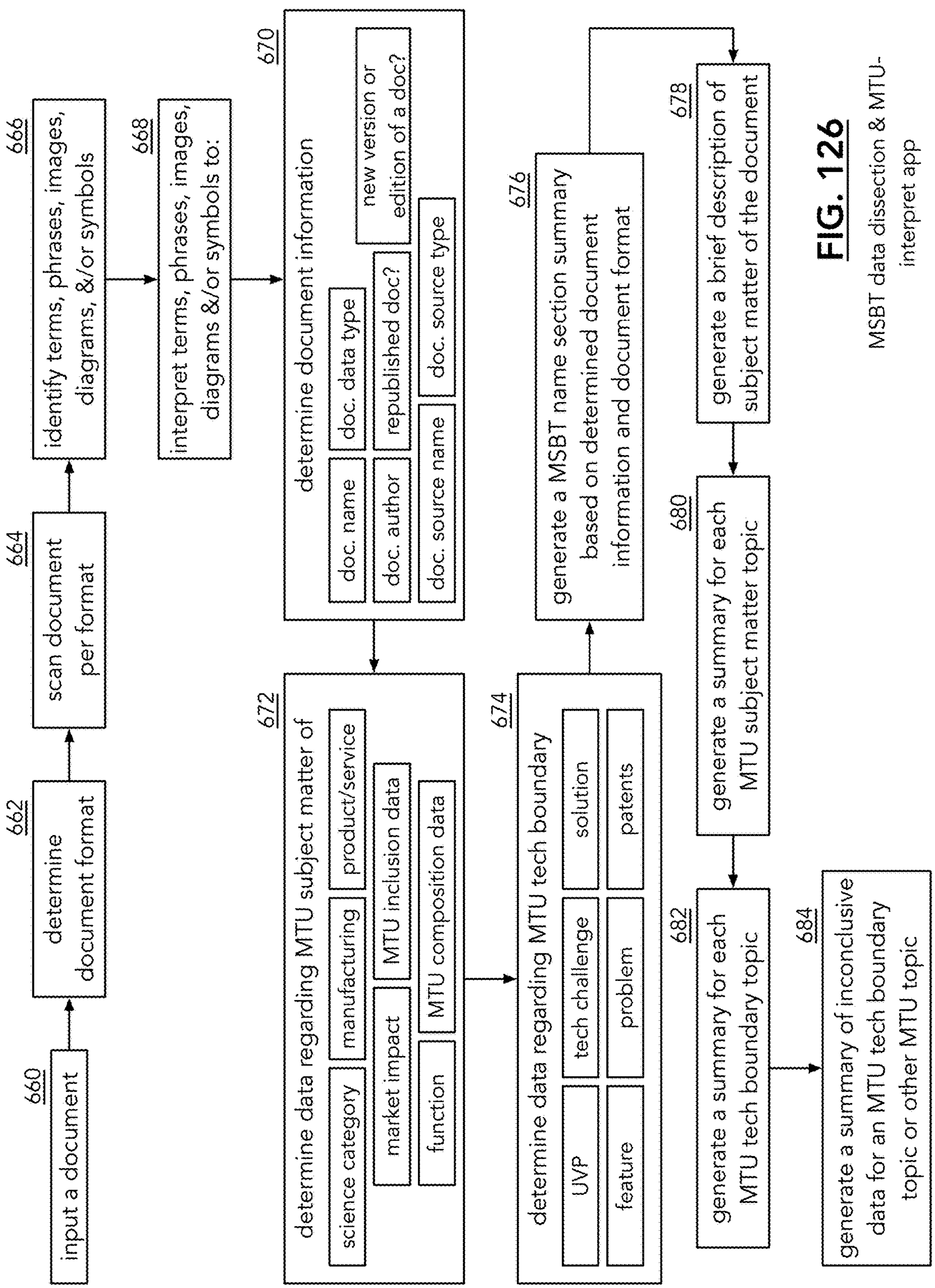
FIG. 126 is a logic diagram of another example of ingesting MSBT documents by an MSBTP (marketing, sales, business, technology, and patent) data gathering section of an improved computer for technology.

FIG. 126 is a logic diagram of another example of a method of ingesting MSBT documents by an MSBTP (marketing, sales, business, technology, and patent) data gathering section of an improved computer for technology regarding ingesting and dissecting an MSBT document. The method begins at step 660 where the improved computer inputs an MSBT document. The method continues at step 662 where the improved computer determines the format of the document. For example, but not as an exhaustive example, the document format includes one or more of an article (newspaper, magazine, journal, etc.), a report, a study, a product review, a service review, a data sheet, a software development kit (SDK), sales material, a white paper, a press release, marketing material, and a product development kit (PDK).

The method continues at step 664 where the improved computer scans the document in accordance with the document format type. As discussed with reference to FIG. 132, scanning a document of a particular document format type may include specific scanning rules. In general, the scanning includes scanning one or more of text, symbols, images, diagrams, tables, charts, etc. so that the document can be partitioned into section regarding MTU orientated data.

The method continues at step 666 where the improved computer identifies terms, phrase, images, diagrams, and/or symbols. The method continues at step 668 where the improved computer interprets the identified terms, phrase, images, diagrams, and/or symbols to partition the document into sections regarding MTU orientated data so that the improved can perform steps 670 through 686.

At step 670 the improved computer determines document information from the document. The document information includes a document name (title, or other identifying phrase), the name of the documents author (e.g., a person), the name of the document source (e.g., publisher, company, etc.), the document data type (see FIG. 110), the document format (see FIG. 110), the document source type (see FIG. 110), whether this document is a republication (i.e., the same document but republished by a second document source), and whether this document is a new version or edition of a previously published document.

The method continues at step 672 where the improved computer the determines data regarding MTU subject matter, which includes science category data, manufacturing data, product/service data, market impact data, MTU inclusion data, functional (e.g., technical) data, and/or MTU composition data. The method continues at step 674 where the improved computer determines data regarding MTU technical boundaries. This data includes unique value proposition data, technical challenge data, solution data, marketable features data, problem data, and/or listed patents and/or patent applications.

The method continues at step 676 where the improved computer generates an MSBT name section summary for an MSBT database record based on the document information, the document format type, the document source type, and/or the document data type. The method continues at step 678 where the improved computer generates a brief description of the subject matter of the document.

The method continues at step 680 where the improved computer generates a summary for each of the MTU subject matter topic contained in the document. The method continues at step 682 where the improved computer generates a summary for each MTU technical boundary topic contained in the document.

The method continues at step 684 where the improved computer generates a summary of data elements of the document that was inclusive (e.g., was not align, correspond to, related to, etc.) an MTU tech boundary topic or other MTU topic. For example, a company's annual report includes technical data, product/service data, financial data, sales data, etc., which is relevant (e.g., fits) with MTU orientated data. The annual report also includes information regarding securities compliance, legal disclaimers, inventors specific information, etc. that is not directly related to MTU orientated data. Such unrelated data, however, may be useful in interpreting some relevant MTU orientated data.

FIGS. 127A through 127D are a logic diagram of another example of ingesting MSBT documents by an MSBTP (marketing, sales, business, technology, and patent) data gathering section of an improved computer for technology that is regarding step 672 of FIG. 126. The method begins at step 690 of FIG. 127A where the improved computer estimates correlated MTUs based on the content of the data and, in particular, the name section data. For example, the improved computer interprets the extracted data of the document (e.g., the partitions of data based on MTU orientated data) to identify one or more MTUs to which the document is relevant or may be relevant.

The method continues at step 692 where the improved computer retrieves MTU orientated subject matter data from the database records of the estimated correlated MTUs. The MTU oriented data includes science category data, manufacturing data, product/service data, market impact data, MTU inclusion data, MTU function data, and MTU composition data. The processing of MTU tech boundary data is discussed with reference to FIGS. 128A through 128C.

The method continues at step 694 where the improved computer compares the retrieved science category data from a correlated MTU with the science category data of the document. The method continues at step 696 where the improved computer determines whether the correlation of science category data of the document with the science category data of the MTU is above an upper threshold. If yes, the method continues at step 698 where the improved computer definitively determines that the science category data of the document correlates (relates to, is similar to, is the same as, etc.) with the science category data of the MTU.

If the answer to step 696 was no, the method continues at step 700 where the improved computer determines whether the correlation of science category data of the document with the science category data of the MTU is below a lower threshold. If yes, the method continues at step 702 where the improved computer indicates that there is no science category data correlation.

If the answer to step 700 was no, the method continues at step 704 where the improved computer indicates that the correlation of science category data of the document with the science category data of the MTU is inconclusive. The method continues at step 706 where the improved computer flags the science category data of the document for subsequent analysis with respect to the MTU. Note that, as the MTU record continues to add data, the added data may assisted in a subsequent analysis of the science category data. Further note that FIGS. 137-139D provide examples of correlating data of a document with data of an MTU.

From steps 698, 702, and 706, the method continues at step 708 where the improved computer compares the retrieved manufacturing data from a correlated MTU with the manufacturing data of the document. The method continues at step 710 where the improved computer determines whether the correlation of manufacturing data of the document with the manufacturing data of the MTU is above an upper threshold. If yes, the method continues at step 712 where the improved computer definitively determines that the manufacturing data of the document correlates (relates to, is similar to, is the same as, etc.) with the manufacturing data of the MTU.

If the answer to step 710 was no, the method continues at step 714 where the improved computer determines whether the correlation of manufacturing data of the document with the manufacturing data of the MTU is below a lower threshold. If yes, the method continues at step 716 where the improved computer indicates that there is no manufacturing data correlation.

If the answer to step 714 was no, the method continues at step 718 where the improved computer indicates that the correlation of manufacturing data of the document with the manufacturing data of the MTU is inconclusive. The method continues at step 720 where the improved computer flags the manufacturing data of the document for subsequent analysis with respect to the MTU. Note that, as the MTU record continues to add data, the added data may assisted in a subsequent analysis of the manufacturing data.

Figure 127A:
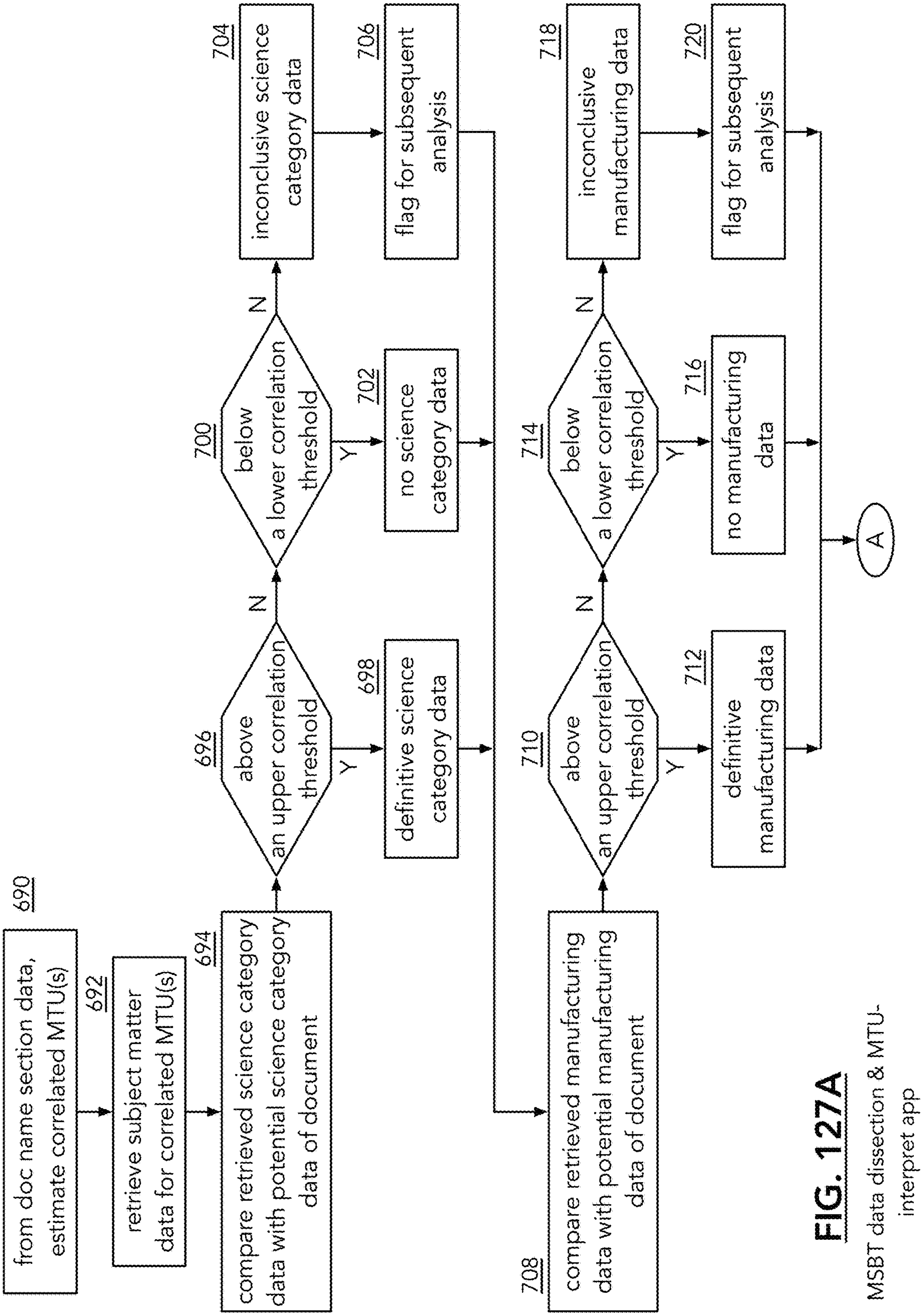
FIGS. 127A through 127D are a logic diagram of another example of ingesting MSBT documents by an MSBTP (marketing, sales, business, technology, and patent) data gathering section of an improved computer for technology.
Figure 127B:
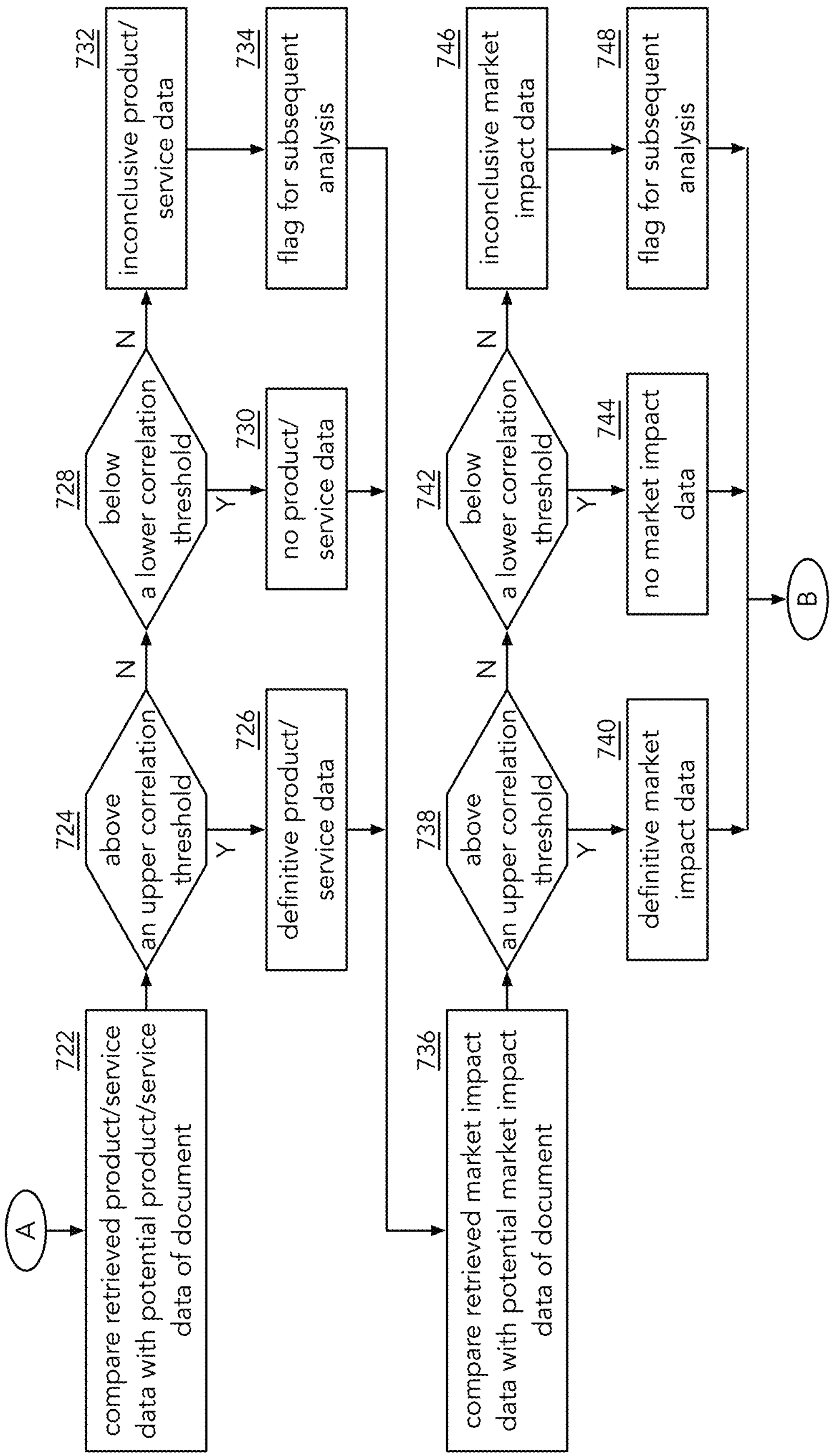

From steps 712, 716, and 720, the method continues at step 722 of FIG. 127B where the improved computer compares the retrieved product/service data from a correlated MTU with the product/service data of the document. The method continues at step 724 where the improved computer determines whether the correlation of product/service data of the document with the product/service data of the MTU is above an upper threshold. If yes, the method continues at step 726 where the improved computer definitively determines that the product/service data of the document correlates (relates to, is similar to, is the same as, etc.) with the product/service data of the MTU.

If the answer to step 724 was no, the method continues at step 728 where the improved computer determines whether the correlation of product/service data of the document with the product/service data of the MTU is below a lower threshold. If yes, the method continues at step 730 where the improved computer indicates that there is no product/service data correlation.

If the answer to step 728 was no, the method continues at step 732 where the improved computer indicates that the correlation of product/service data of the document with the product/service data of the MTU is inconclusive. The method continues at step 734 where the improved computer flags the product/service data of the document for subsequent analysis with respect to the MTU. Note that, as the MTU record continues to add data, the added data may assist in a subsequent analysis of the product/service data.

From steps 726, 730, and 732, the method continues at step 736 where the improved computer compares the retrieved market impact data from a correlated MTU with the market impact data of the document. The method continues at step 738 where the improved computer determines whether the correlation of market impact data of the document with the market impact data of the MTU is above an upper threshold. If yes, the method continues at step 740 where the improved computer definitively determines that the market impact data of the document correlates (relates to, is similar to, is the same as, etc.) with the market impact data of the MTU.

If the answer to step 738 was no, the method continues at step 742 where the improved computer determines whether the correlation of market impact data of the document with the market impact data of the MTU is below a lower threshold. If yes, the method continues at step 744 where the improved computer indicates that there is no market impact data correlation.

If the answer to step 742 was no, the method continues at step 746 where the improved computer indicates that the correlation of market impact data of the document with the market impact data of the MTU is inconclusive. The method continues at step 748 where the improved computer flags the market impact data of the document for subsequent analysis with respect to the MTU. Note that, as the MTU record continues to add data, the added data may assisted in a subsequent analysis of the market impact data.

Figure 127C:
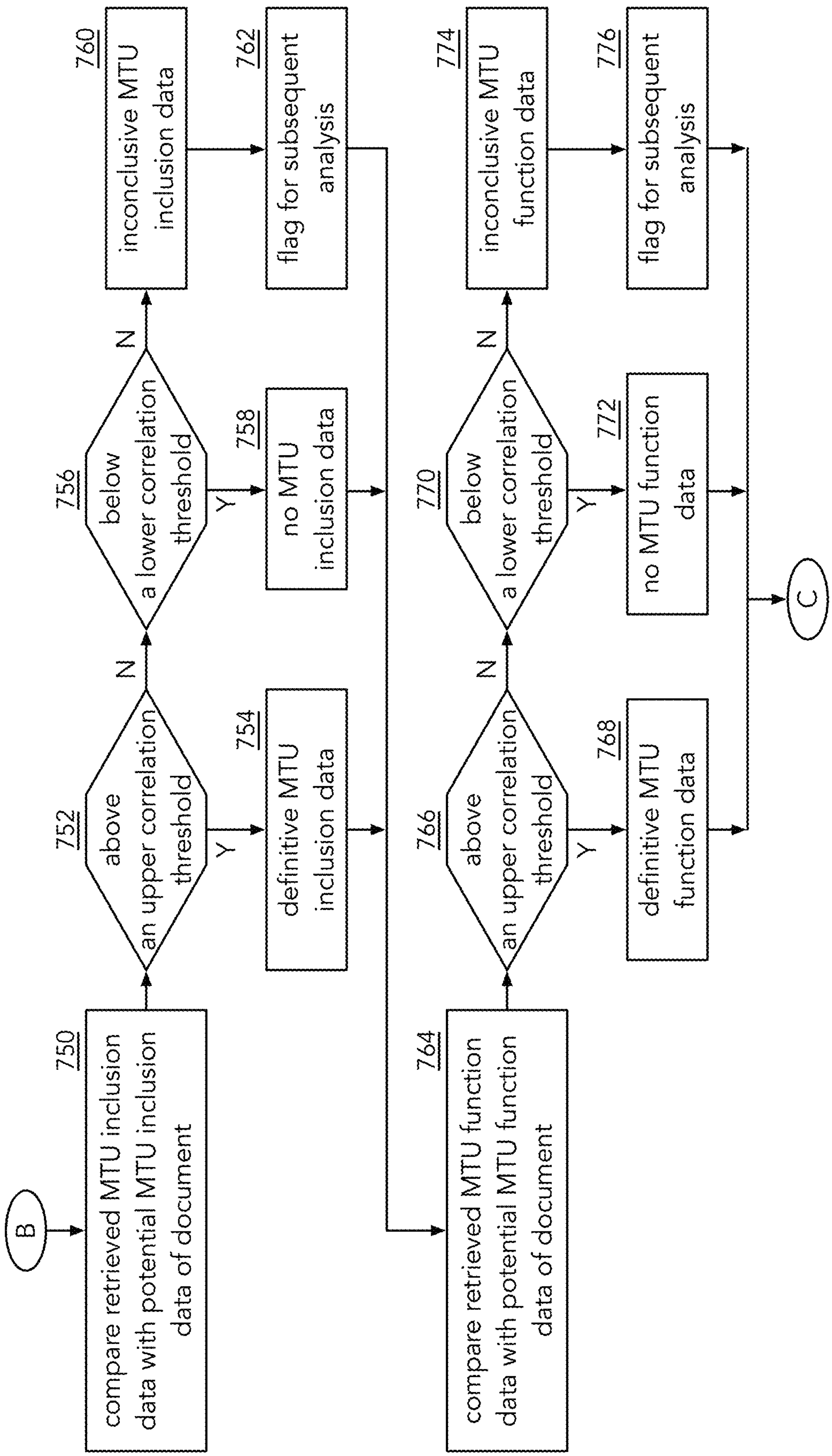

From steps 740, 744, and 748, the method continues at step 750 of FIG. 127C where the improved computer compares the retrieved MTU inclusion data from a correlated MTU with the MTU inclusion data of the document. The method continues at step 752 where the improved computer determines whether the correlation of MTU inclusion data of the document with the MTU inclusion data of the MTU is above an upper threshold. If yes, the method continues at step 754 where the improved computer definitively determines that the MTU inclusion data of the document correlates (relates to, is similar to, is the same as, etc.) with the MTU inclusion data of the MTU.

If the answer to step 752 was no, the method continues at step 756 where the improved computer determines whether the correlation of MTU inclusion data of the document with the MTU inclusion data of the MTU is below a lower threshold. If yes, the method continues at step 758 where the improved computer indicates that there is no MTU inclusion data correlation.

If the answer to step 756 was no, the method continues at step 760 where the improved computer indicates that the correlation of MTU inclusion data of the document with the MTU inclusion data of the MTU is inconclusive. The method continues at step 762 where the improved computer flags the MTU inclusion data of the document for subsequent analysis with respect to the MTU. Note that, as the MTU record continues to add data, the added data may assisted in a subsequent analysis of the MTU inclusion data.

From steps 754, 758, and 762, the method continues at step 764 where the improved computer compares the retrieved MTU function data from a correlated MTU with the MTU function data of the document. The method continues at step 766 where the improved computer determines whether the correlation of MTU function data of the document with the MTU function data of the MTU is above an upper threshold. If yes, the method continues at step 768 where the improved computer definitively determines that the MTU function data of the document correlates (relates to, is similar to, is the same as, etc.) with the MTU function data of the MTU.

If the answer to step 766 was no, the method continues at step 770 where the improved computer determines whether the correlation of MTU function data of the document with the MTU function data of the MTU is below a lower threshold. If yes, the method continues at step 772 where the improved computer indicates that there is no MTU function data correlation.

If the answer to step 770 was no, the method continues at step 774 where the improved computer indicates that the correlation of MTU function data of the document with the MTU function data of the MTU is inconclusive. The method continues at step 776 where the improved computer flags the MTU function data of the document for subsequent analysis with respect to the MTU. Note that, as the MTU record continues to add data, the added data may assisted in a subsequent analysis of the MTU function data.

Figure 127D:
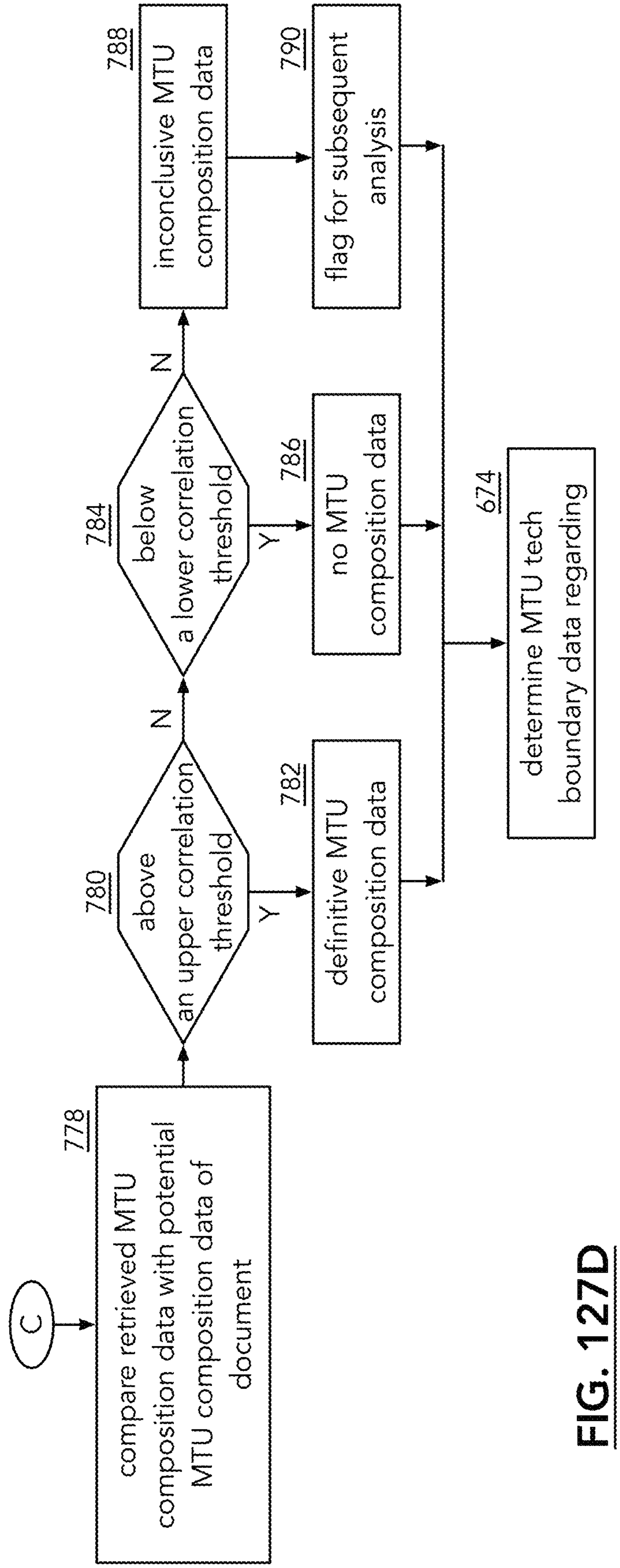

From steps 768, 772, and 776, the method continues at step 778 of FIG. 127D where the improved computer compares the retrieved MTU composition data from a correlated MTU with the MTU composition data of the document. The method continues at step 780 where the improved computer determines whether the correlation of MTU composition data of the document with the MTU composition data of the MTU is above an upper threshold. If yes, the method continues at step 782 where the improved computer definitively determines that the MTU composition data of the document correlates (relates to, is similar to, is the same as, etc.) with the MTU composition data of the MTU.

If the answer to step 780 was no, the method continues at step 784 where the improved computer determines whether the correlation of MTU composition data of the document with the MTU composition data of the MTU is below a lower threshold. If yes, the method continues at step 786 where the improved computer indicates that there is no MTU composition data correlation.

If the answer to step 784 was no, the method continues at step 788 where the improved computer indicates that the correlation of MTU composition data of the document with the MTU composition data of the MTU is inconclusive. The method continues at step 790 where the improved computer flags the MTU composition data of the document for subsequent analysis with respect to the MTU. Note that, as the MTU record continues to add data, the added data may assisted in a subsequent analysis of the MTU composition data. The method continues steps 782, 786, and 790 at step 674, which is discussed with reference to FIGS. 128A through 128C.

Figure 128A:
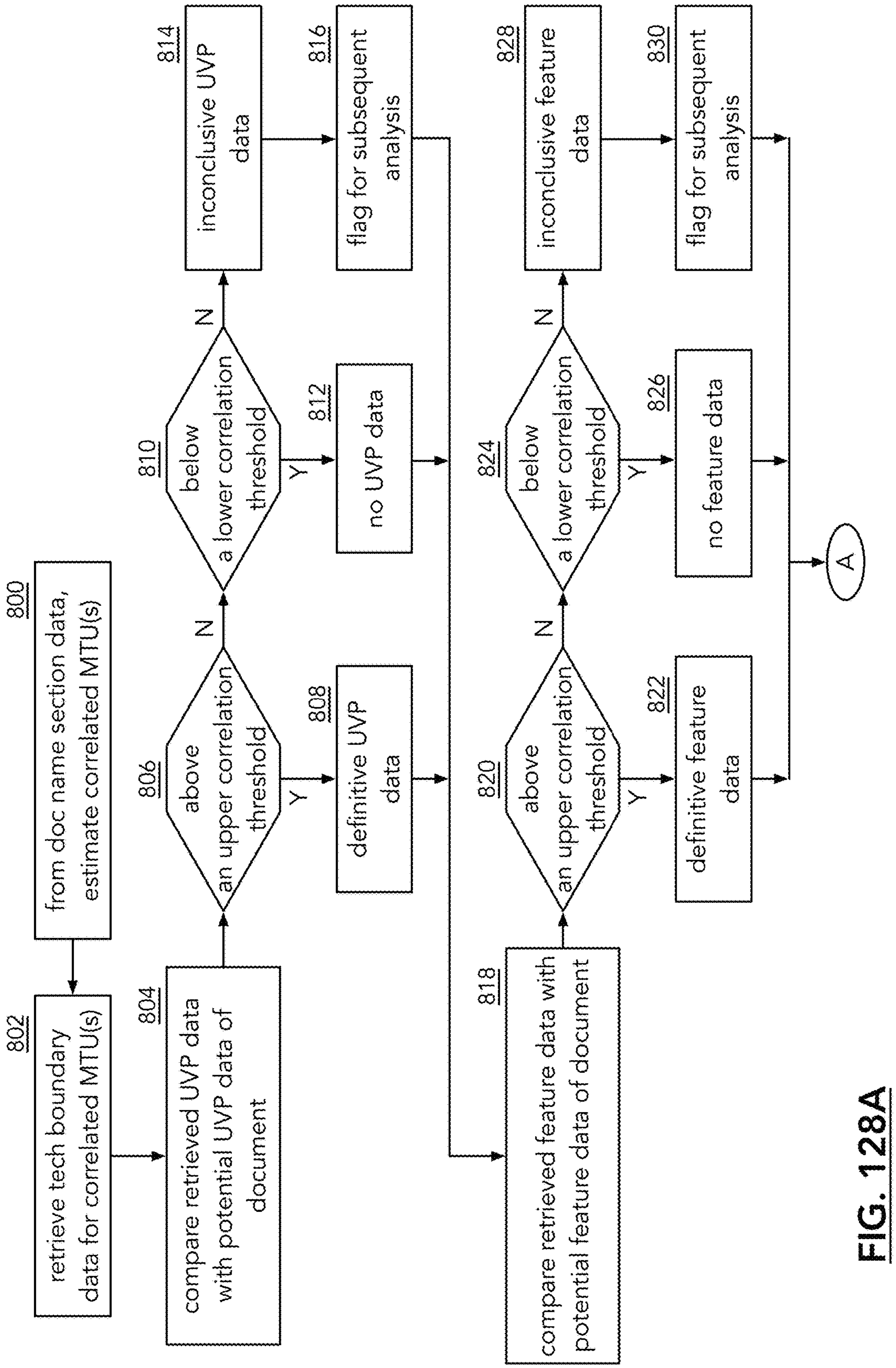
FIGS. 128A through 128C are a logic diagram of another example of ingesting MSBT documents by an MSBTP (marketing, sales, business, technology, and patent) data gathering section of an improved computer for technology.
Figure 128B:
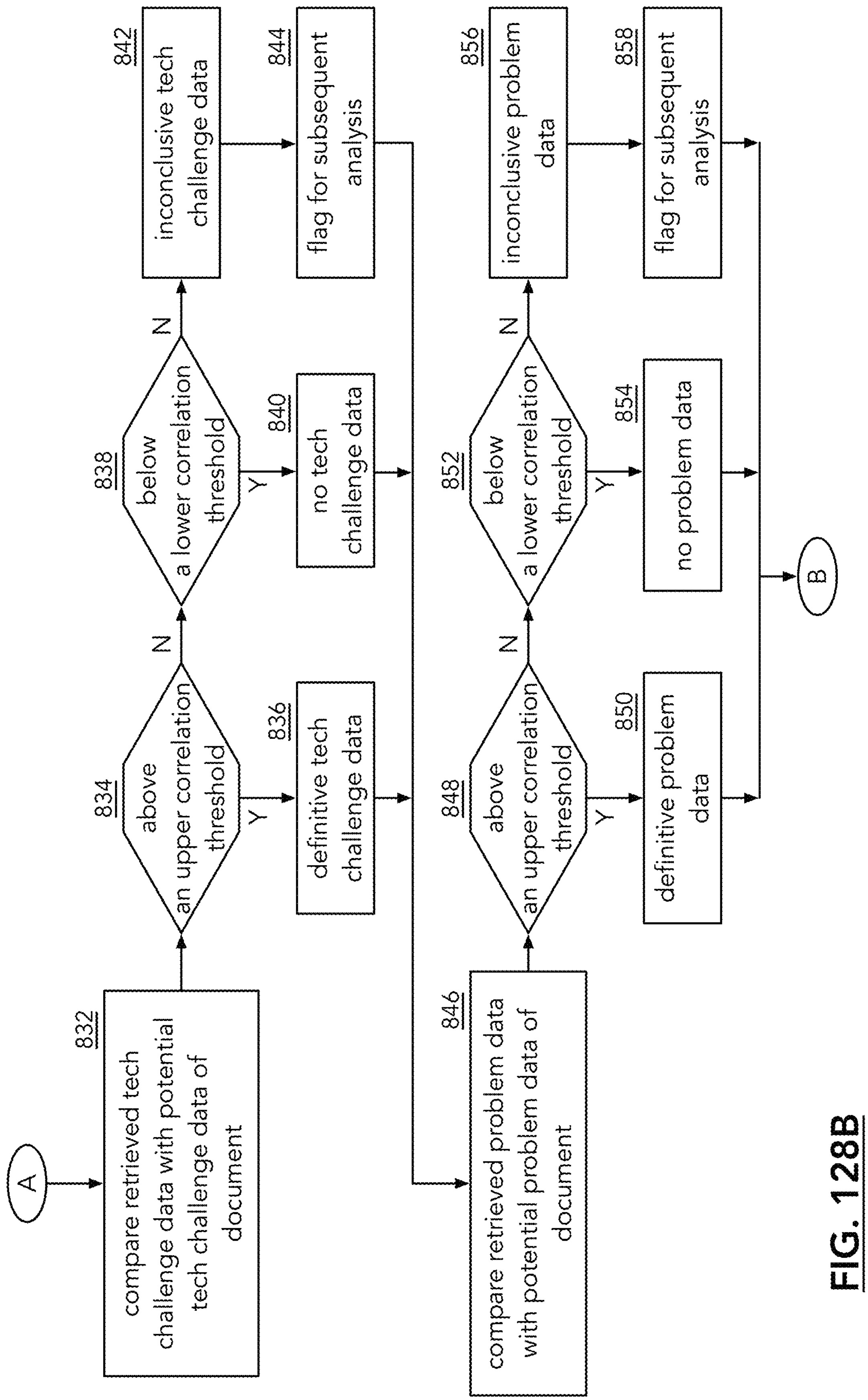
Figure 128C:
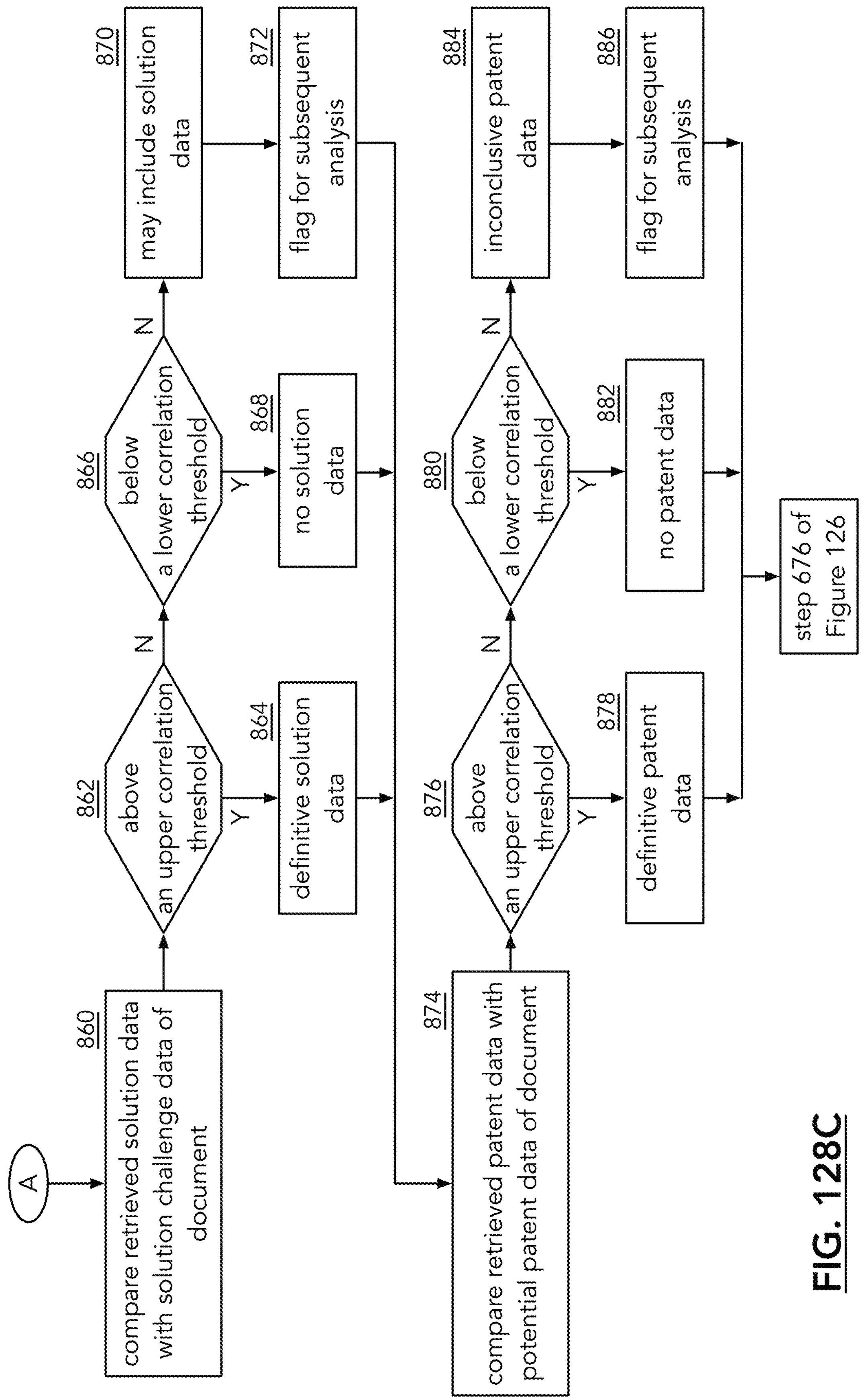

FIGS. 128A through 128C are a logic diagram of another example of ingesting MSBT documents by an MSBTP (marketing, sales, business, technology, and patent) data gathering section of an improved computer for technology that is regarding step 674 of FIG. 126. The method begins at step 800 of FIG. 128A where the improved computer estimates correlated MTUs based on the content of the data and, in particular, the name section data. For example, the improved computer interprets the extracted data of the document (e.g., the partitions of data based on MTU orientated data) to identify one or more MTUs to which the document is relevant or may be relevant.

The method continues at step 802 where the improved computer retrieves MTU tech boundary data from the database records of the estimated correlated MTUs. The MTU tech boundary data includes unique value proposition data, marketable features data, technology challenges data, inventive concept data, problem data, solution data, and/or patent data.

The method continues at step 804 where the improved computer compares the retrieved unique value proposition data (UVP) data from a correlated MTU with the UVP data of the document. The method continues at step 806 where the improved computer determines whether the correlation of UVP data of the document with the UVP data of the MTU is above an upper threshold. If yes, the method continues at step 808 where the improved computer definitively determines that the UVP data of the document correlates (relates to, is similar to, is the same as, etc.) with the UVP data of the MTU.

If the answer to step 806 was no, the method continues at step 810 where the improved computer determines whether the correlation of UVP data of the document with the UVP data of the MTU is below a lower threshold. If yes, the method continues at step 812 where the improved computer indicates that there is no UVP data correlation.

If the answer to step 810 was no, the method continues at step 814 where the improved computer indicates that the correlation of science category data of the document with the science category data of the MTU is inconclusive. The method continues at step 816 where the improved computer flags the UVP data of the document for subsequent analysis with respect to the MTU. Note that, as the MTU record continues to add data, the added data may assisted in a subsequent analysis of the UVP data. Further note that FIGS. 137-139D provide examples of correlating data of a document with data of an MTU.

From steps 808, 812, and 816, the method continues at step 818 where the improved computer compares the retrieved marketable feature data from a correlated MTU with the marketable feature data of the document. The method continues at step 820 where the improved computer determines whether the correlation of marketable feature data of the document with the marketable feature data of the MTU is above an upper threshold. If yes, the method continues at step 822 where the improved computer definitively determines that the marketable feature data of the document correlates (relates to, is similar to, is the same as, etc.) with the marketable feature data of the MTU.

If the answer to step 820 was no, the method continues at step 824 where the improved computer determines whether the correlation of marketable feature data of the document with the marketable feature data of the MTU is below a lower threshold. If yes, the method continues at step 826 where the improved computer indicates that there is no marketable feature data correlation.

If the answer to step 824 was no, the method continues at step 828 where the improved computer indicates that the correlation of marketable feature data of the document with the marketable feature data of the MTU is inconclusive. The method continues at step 830 where the improved computer flags the marketable feature data of the document for subsequent analysis with respect to the MTU. Note that, as the MTU record continues to add data, the added data may assisted in a subsequent analysis of the marketable feature data.

From steps 822, 826, and 830, the method continues at step 832 of FIG. 128B where the improved computer compares the retrieved tech challenge data from a correlated MTU with the tech challenge data of the document. The method continues at step 834 where the improved computer determines whether the correlation of tech challenge data of the document with the tech challenge data of the MTU is above an upper threshold. If yes, the method continues at step 836 where the improved computer definitively determines that the tech challenge data of the document correlates (relates to, is similar to, is the same as, etc.) with the tech challenge data of the MTU.

If the answer to step 834 was no, the method continues at step 838 where the improved computer determines whether the correlation of tech challenge data of the document with the tech challenge data of the MTU is below a lower threshold. If yes, the method continues at step 840 where the improved computer indicates that there is no tech challenge data correlation.

If the answer to step 838 was no, the method continues at step 842 where the improved computer indicates that the correlation of tech challenge data of the document with the tech challenge data of the MTU is inconclusive. The method continues at step 844 where the improved computer flags the tech challenge data of the document for subsequent analysis with respect to the MTU. Note that, as the MTU record continues to add data, the added data may assist in a subsequent analysis of the tech challenge data.

From steps 836, 840, and 844, the method continues at step 846 where the improved computer compares the retrieved problem data from a correlated MTU with the problem data of the document. The method continues at step 848 where the improved computer determines whether the correlation of problem data of the document with the problem data of the MTU is above an upper threshold. If yes, the method continues at step 850 where the improved computer definitively determines that the problem data of the document correlates (relates to, is similar to, is the same as, etc.) with the problem data of the MTU.

If the answer to step 848 was no, the method continues at step 852 where the improved computer determines whether the correlation of problem data of the document with the problem data of the MTU is below a lower threshold. If yes, the method continues at step 854 where the improved computer indicates that there is no problem data correlation.

If the answer to step 852 was no, the method continues at step 856 where the improved computer indicates that the correlation of problem data of the document with the problem data of the MTU is inconclusive. The method continues at step 858 where the improved computer flags the problem data of the document for subsequent analysis with respect to the MTU. Note that, as the MTU record continues to add data, the added data may assisted in a subsequent analysis of the problem data. Note problem data may further include inventive concept data, implementation elements data, implementation mechanisms data, and/or implementation variants data.

From steps 850, 854, and 858, the method continues at step 860 of FIG. 128C where the improved computer compares the retrieved solution data from a correlated MTU with the solution data of the document. The method continues at step 862 where the improved computer determines whether the correlation of solution data of the document with the solution data of the MTU is above an upper threshold. If yes, the method continues at step 864 where the improved computer definitively determines that the solution data of the document correlates (relates to, is similar to, is the same as, etc.) with the solution data of the MTU.

If the answer to step 862 was no, the method continues at step 866 where the improved computer determines whether the correlation of solution data of the document with the solution data of the MTU is below a lower threshold. If yes, the method continues at step 868 where the improved computer indicates that there is no solution data correlation.

If the answer to step 866 was no, the method continues at step 870 where the improved computer indicates that the correlation of solution data of the document with the solution data of the MTU is inconclusive. The method continues at step 872 where the improved computer flags the solution data of the document for subsequent analysis with respect to the MTU. Note that, as the MTU record continues to add data, the added data may assisted in a subsequent analysis of the solution data. Note that the solution data may further include novelty nugget data and/or inventive embodiment data.

From steps 864, 868, and 872, the method continues at step 860 where the improved computer compares the retrieved patent data from a correlated MTU with the patent data of the document. The patent data includes the mention of one or more patents and/or patent applications based on one or more of patent title, patent number, patent application serial number, filing date, issuance date, etc.

The method continues at step 876 where the improved computer determines whether the correlation of patent data of the document with the patent data of the MTU is above an upper threshold. If yes, the method continues at step 878 where the improved computer definitively determines that the patent data of the document correlates (relates to, is similar to, is the same as, etc.) with the patent data of the MTU.

If the answer to step 876 was no, the method continues at step 880 where the improved computer determines whether the correlation of patent data of the document with the patent data of the MTU is below a lower threshold. If yes, the method continues at step 882 where the improved computer indicates that there is no patent data correlation.

If the answer to step 880 was no, the method continues at step 884 where the improved computer indicates that the correlation of patent data of the document with the patent data of the MTU is inconclusive. The method continues at step 886 where the improved computer flags the patent data of the document for subsequent analysis with respect to the MTU. Note that, as the MTU record continues to add data, the added data may assist in a subsequent analysis of the patent data. The method continues from steps 878, 882, and 886 to step 676 of FIG. 126.

Figure 129A:
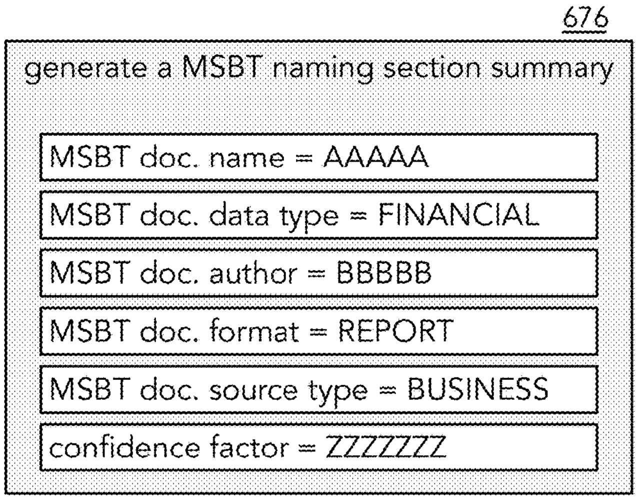
FIGS. 129A through 129F are diagrams of other examples of ingesting MSBT documents by an MSBTP (marketing, sales, business, technology, and patent) data gathering section of an improved computer for technology.

FIGS. 129A through 129F are diagrams of other examples of ingesting MSBT documents by an MSBTP (marketing, sales, business, technology, and patent) data gathering section of an improved computer for technology regarding data of an MSBT document. FIG. 129A illustrates an example of generating an MSBT name section summary, which includes an MSBT document name of AAAAA; an MSBT document data type of FINANCIAL; an MBST document author of BBBBB; an MSBT document format of REPORT; an MSBT document source type of BUSINESS; and a confidence factor of ZZZZZZ.

Figure 129B:
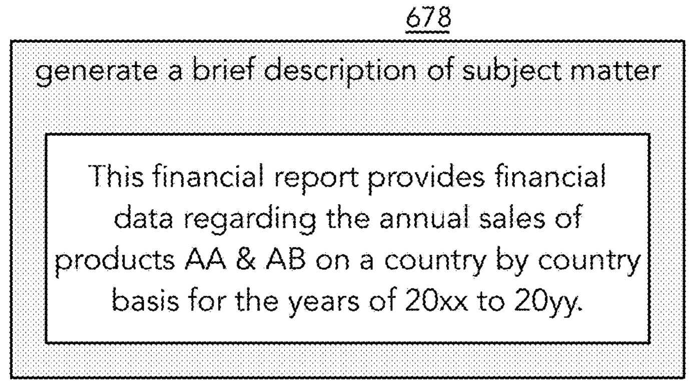

FIG. 129B illustrates an example of generating a brief description 678 of the subject manner of an example MSBT document. From the name summary section 676 and other data, the improved computer generates a summary of the MSBT document. For example, "This financial report provides financial data regarding the annual sales of products AA & AB on a country by country basis for the years of 20xx to 20yy."

Figure 129C:
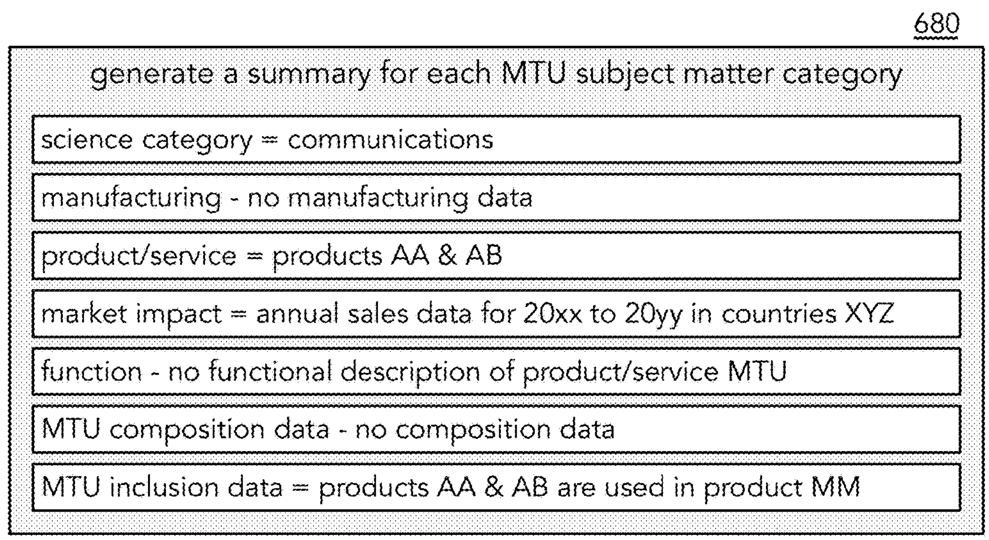

FIG. 129C illustrates an example of generating a summary 680 of the MTU subject matter categories of an MSBT document. For example, the science category is communications; there is no manufacturing data; the product/service is regarding products AA and AB; the market impact is regarding annual sales data for 20xx to 20yy in countries XYZ; there is not functional description (i.e., no technical discussion); there is not MTU composition data of products AA and/or of AB; and there is MTU inclusion data regarding products AA and/or AB, which is/are used in product MM.

Figure 129D:
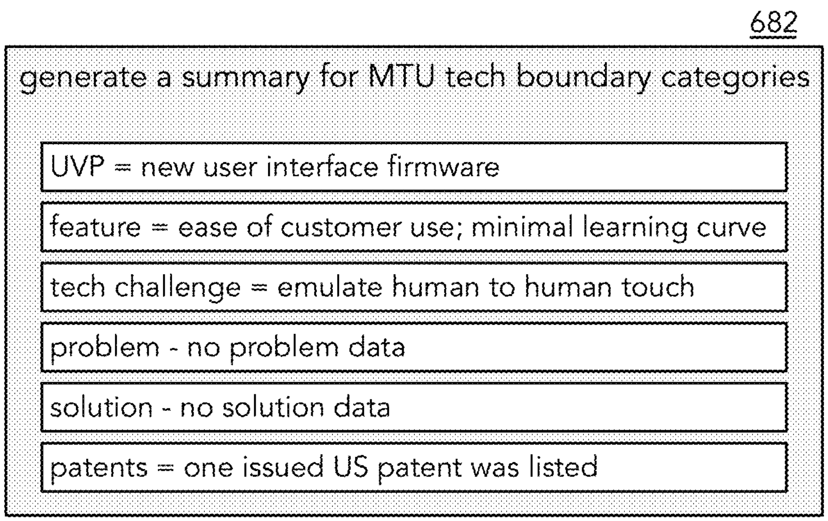

FIG. 129D illustrates an example of generating a summary 682 of MTU tech boundaries of the MSBT document. For example, the UVP data (e.g., the why build) includes new user interface firmware; the marketable feature data (e.g., the why buy) includes ease of use for customers and minimal learning curve; the technical challenge data includes emulate human to human touch; there is no patent data; there is not solution data; and the patent data includes one issued US patent.

Figure 129E:
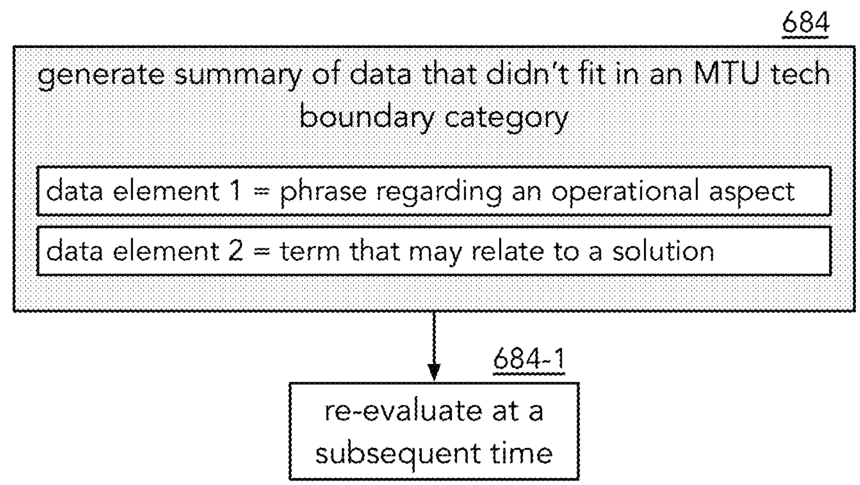

FIG. 129E illustrates an example of generating a summary 684 of the data that didn't fit an MTU technology boundary category. For example, data element #1 is regarding an operational aspect of a listed product but is too generalized to categorizes as an MTU boundary. As another example, data element #2 is regarding a solution is too non-descriptive to categorizes as a solution. The improved computer flags, at step 684-1, data elements 1 and 2 for re-evaluation at a subsequent time.

Figure 129F:
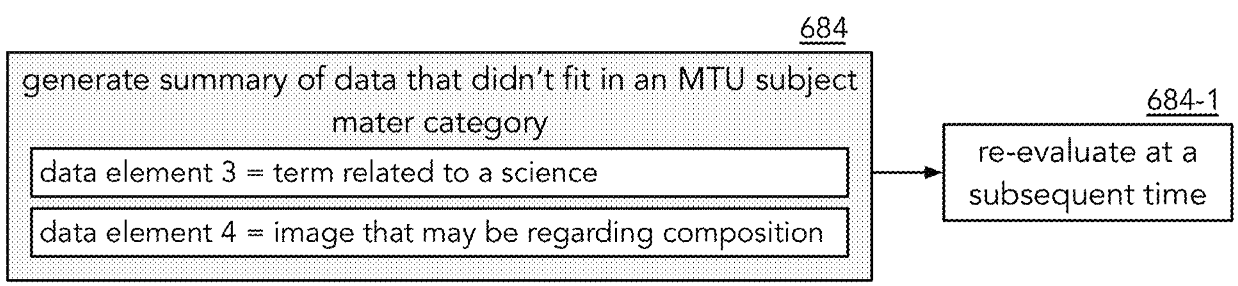

FIG. 129F illustrates an example of generating a summary 684 of the data that didn't fit an MTU subject matter category. For example, data element #3 is regarding a term that is related to science but is too generalized to categorizes as science category dat. As another example, data element #4 is an image regarding the product but is too non-descriptive to categorizes it as MTU composition data. The improved computer flags, at step 684-1, data elements 3 and 4 for re-evaluation at a subsequent time.

Figure 130A:
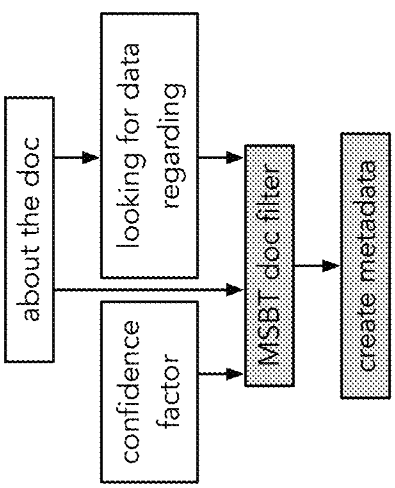
FIGS. 130A and 130B are a logic diagram of another example of ingesting MSBT documents by an MSBTP (marketing, sales, business, technology, and patent) data gathering section of an improved computer for technology.
Figure 130B:
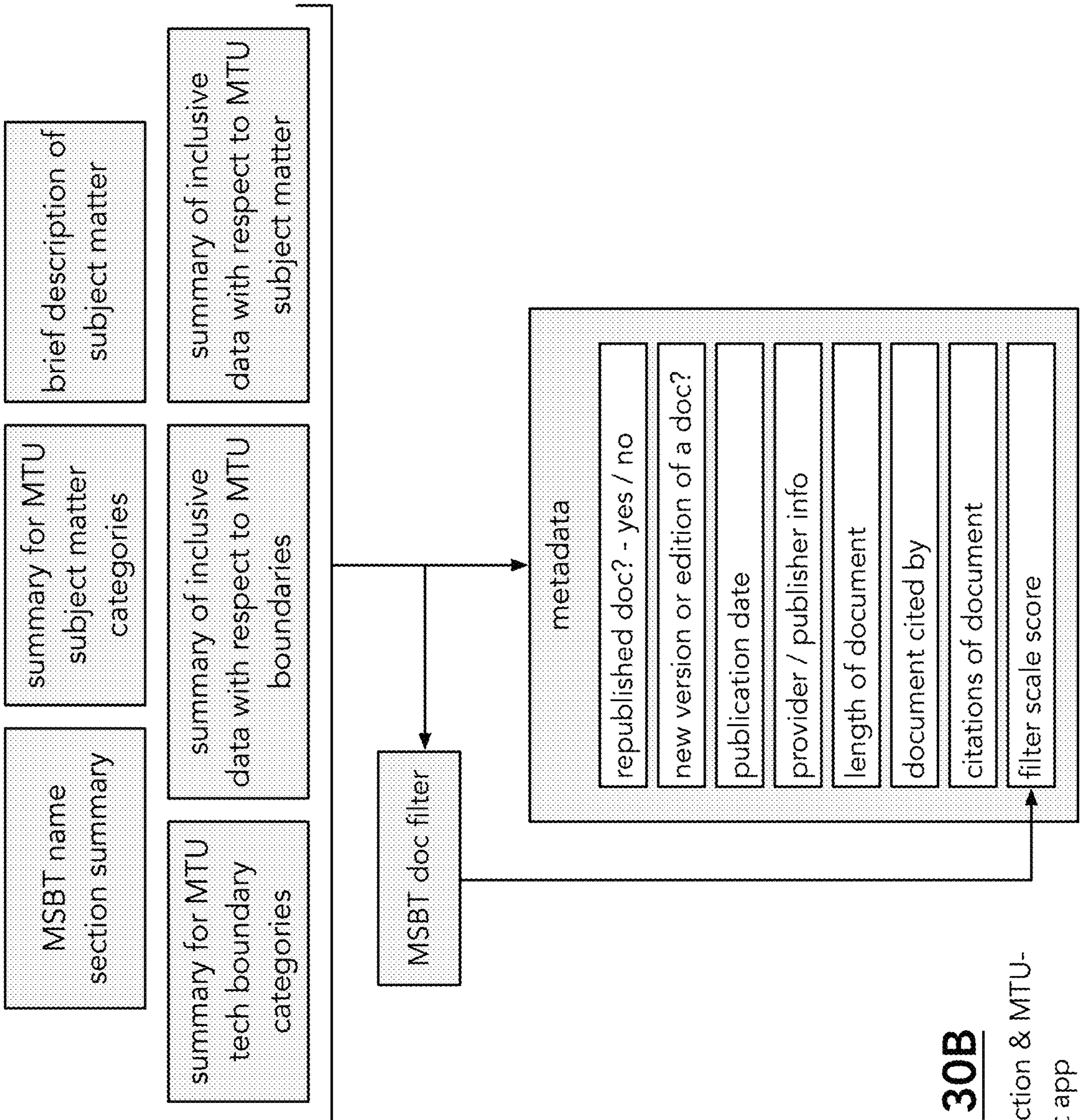

FIGS. 130A and 130B are a logic diagram of another example of ingesting MSBT documents by an MSBTP (marketing, sales, business, technology, and patent) data gathering section of an improved computer for technology. FIG. 130A is a repeat of the logic diagram of FIG. 123 with the steps of MSBT document filter and create metadata.

FIG. 130B is an example of creating metadata for an MSBT document. In this example, the improved computer reviews the MSBT name section summary, the summary of the MTU subject matter categories, the brief description of the subject matter, the summary of the MTU technical boundaries, the summary of the inclusive data with respect to tech boundaries, and the summary of the inconclusive data with respect to MTU subject matter to generate the metadata. In addition, the improved computer includes the filter score for the document in the metadata. The filtering is discussed in greater detail with reference to FIG. 131.

For example, but not meant as an exhaustive example, the metadata includes an indication as to whether this document is a republication of an original document; whether this document is a new version or new editions of an original document; the publication date; the provider information and/or publisher information, the length of the document, a list of documents that have cited this document, a list of documents cited by this document, and/or the filter score.

Figure 131:
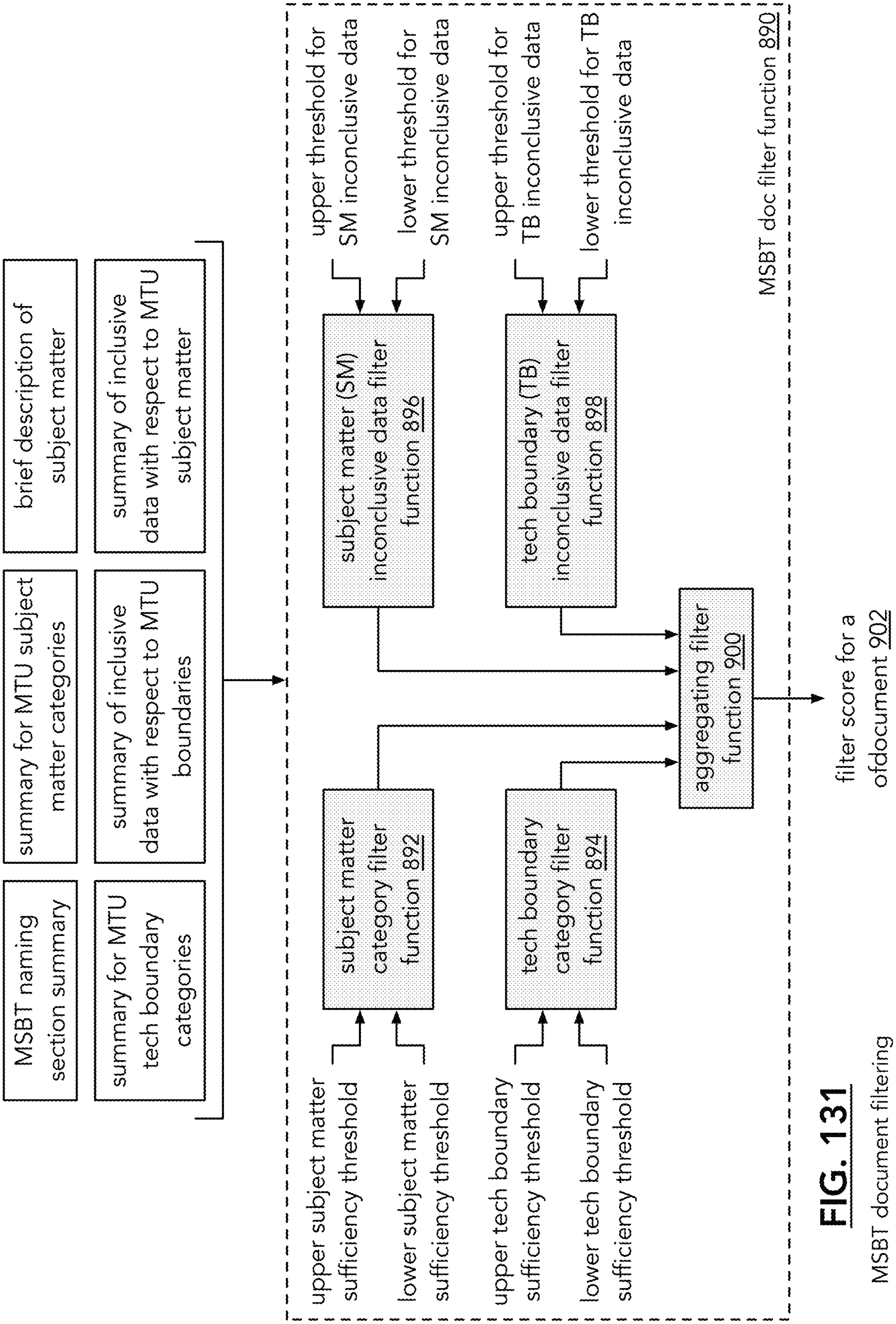
FIG. 131 is a logic diagram of another example of ingesting MSBT documents by an MSBTP (marketing, sales, business, technology, and patent) data gathering section of an improved computer for technology.

FIG. 131 is a logic diagram of another example of ingesting MSBT documents by an MSBTP (marketing, sales, business, technology, and patent) data gathering section of an improved computer for technology regarding the filtering of MSBT documents to generate an applicability score. The improved computer executes an MSBT document filter function 890 to generate a filter score, which is measure of how applicable the document is to create a new MTU and/or updating an existing MTU.

In this example, the improved computer reviews the MSBT name section summary, the summary of the MTU subject matter categories, the brief description of the subject matter, the summary of the MTU technical boundaries, the summary of the inclusive data with respect to tech boundaries, and the summary of the inconclusive data with respect to MTU subject matter to generate the filter score 902. This data is ingested into the MSBT document filter function 890, which includes the functions of subject matter category filter function 892, a tech boundary filter function 894, a subject matter inconclusive data filter function 896, and a tech boundary inconclusive data filter function 898.

The improved computer executes the subject matter category filter function 892 to generate a subject matter sufficiency score based on the number of definitive subject matter correlations. For example, if the document has no data regarding subject matter categories (e.g., a low threshold) that definitively correlated with MTU subject matter categories, then the subject matter score is low (e.g., 1 or 2 on a scale from 1 to 10). If, however, the document has data regarding multiple subject matter categories (e.g., a high threshold) that definitively correlate with the MTU subject matter categories, then the subject matter score is high (e.g., 7 to 9 on a scale from 1 to 10; 10 if all categories have a definitive correlation).

The improved computer executes the tech category filter function 892 to generate a tech boundary sufficiency score based on the number of definitive tech boundary correlations. For example, if the document has no data regarding tech boundary categories (e.g., a low threshold) that definitively correlated with MTU tech boundary categories, then the tech boundary score is low (e.g., 1 or 2 on a scale from 1 to 10). If, however, the document has data regarding multiple tech boundary categories (e.g., a high threshold) that definitively correlate with the MTU tech boundary categories, then the tech boundary score is high (e.g., 7 to 9 on a scale from 1 to 10; 10 if all categories have a definitive correlation).

The improved computer executes the subject matter inconclusive data filter function 896 to generate a subject matter inconclusive data score based on the number of inconclusive subject matter correlations. For example, if the document has no inconclusive data regarding subject matter categories (e.g., a low threshold), then the inconclusive subject matter score is low (e.g., 1 or 2 on a scale from 1 to 10). If, however, the document has multiple inconclusive data regarding multiple subject matter categories (e.g., a high threshold), then the inconclusive subject matter score is high (e.g., 7 to 9 on a scale from 1 to 10).

The improved computer executes the tech category inconclusive data filter function 898 to generate a tech boundary inconclusive data score based on the number of inconclusive tech boundary correlations. For example, if the document has no inconclusive data regarding tech boundary categories (e.g., a low threshold), then the tech boundary score is low (e.g., 1 or 2 on a scale from 1 to 10). If, however, the document has inconclusive data regarding multiple tech boundary categories (e.g., a high threshold), then the tech boundary score is high (e.g., 7 to 9 on a scale from 1 to 10; 10 if all categories have a definitive correlation).

The improved computer executes the aggregating filter function 900 to combine the scores from functions 892-898 to produce the filter score 902. Depending on the format type, data type, and/or data source type, the improved computer adjusts weighting factors of the scores from functions 892-898. For example, the document is a datasheet, which typically involves technical data, the MTU boundary score will be weighted heavier than the other scores. As another example, weighting factors for the inconclusive data scores is lower than the weighting factors for the conclusive data scores.

Figure 132:
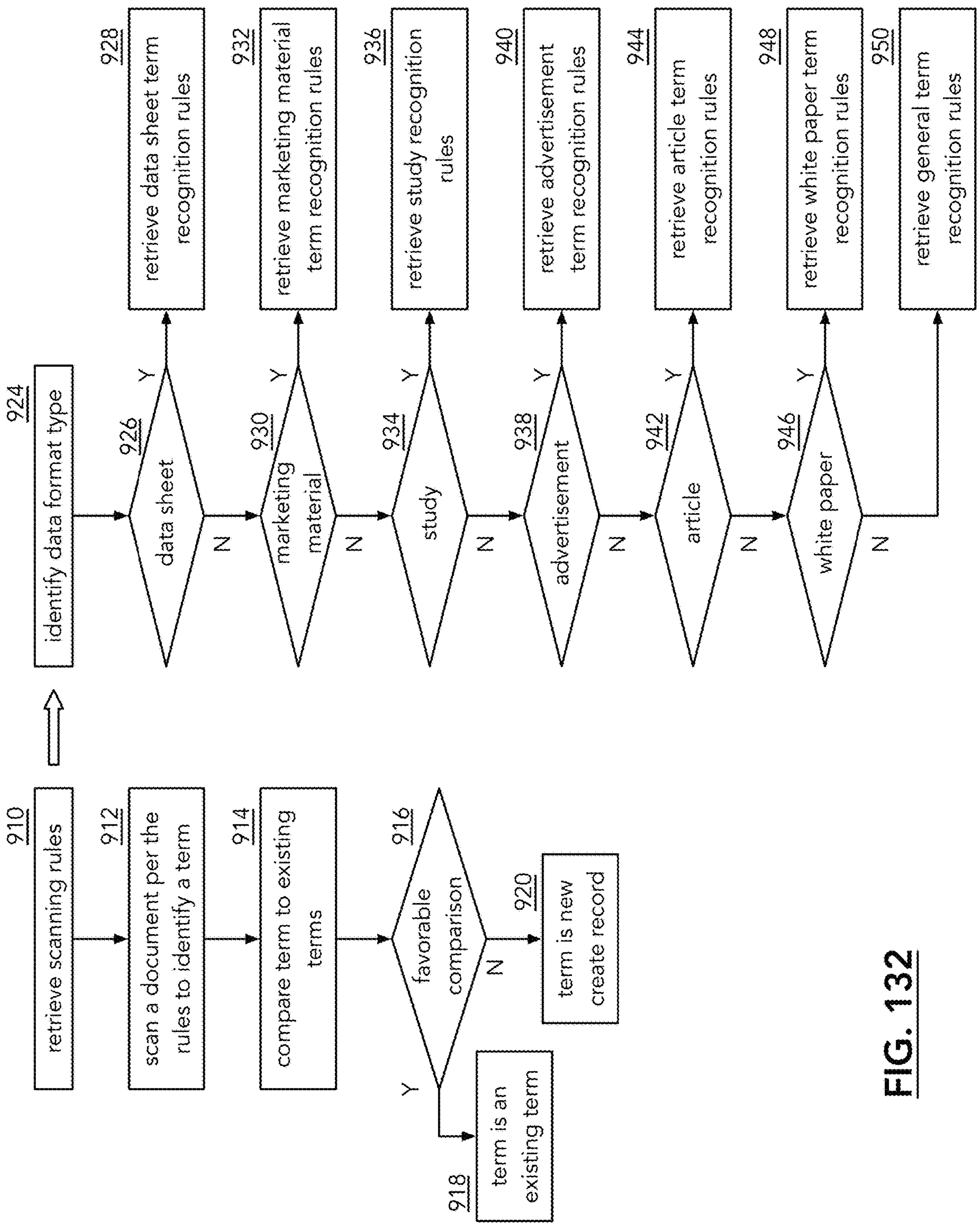
FIG. 132 is a logic diagram of another example of ingesting MSBT documents by an MSBTP (marketing, sales, business, technology, and patent) data gathering section of an improved computer for technology.

FIG. 132 is a logic diagram of another example of a method of ingesting MSBT documents by an MSBTP (marketing, sales, business, technology, and patent) data gathering section of an improved computer for technology. The method begins at step 910 where the improved computer retrieves scanning rules for scanning an MSBT document based on the document format type. For example, the improved computer executes an embedded method to retrieve the appropriate set of scanning rules.

The embedded method begins at step 924 where the improved computer identities the data format of the document. The method continues at step 926 where the improved computer determines whether the document format type is a data sheet. If yes, the method continues at step 928 where the improved computer retrieves data sheet term recognition rules. An example of data sheet term recognition rules is discussed with reference to FIGS. 133 and 134.

If not, the method continues at step 930 where the improved computer whether the document format type is marketing material. If yes, the method continues at step 932 where the improved computer retrieves marketing material term recognition rules.

If not, the method continues at step 934 where the improved computer whether the document format type is a study. If yes, the method continues at step 936 where the improved computer retrieves marketing material term recognition rules. If not, the method continues at step 938 where the improved computer determines whether the document format type is an advertisement (e.g., sales material). If yes, the method continues at step 940 where the improved computer retrieves advertisement term recognition rules.

If not, the method continues at step 942 where the improved computer determines whether the document format type is an article. If yes, the method continues at step 944 where the improved computer retrieves article term recognition rules. If not, the method continues at step 946 where the improved computer determines whether the document format type is a white paper. If yes, the method continues at step 948 where the improved computer retrieves white paper term recognition rules. If not, the method continues at step 950 where the improved computer retrieves general term recognition rules.

The main method continues at step 912 where the improved computer scans a document in accordance with the rules to identify an MBST term. As used herein, an MBST term includes one or more words, one or more symbols, and/or one or more characters to describe a potentially relevant piece of information regarding an MTU. For example, but not meant as an exhaustive example, an MSBT term is regarding technical information, use information, financial information, exploitation information, expansion information, generational information, phase information, innovation information, etc.

The method continues at step 914 where the improved computer compares an identified term with existing terms (e.g., name and meaning). The method continues at step 916 where the improved computer determines whether the comparison was favorable. If yes, the method continues at step 918 where the improved computer determines that the term is existing and, as appropriate, updates its meaning in a term section of MSBT database. If not, the method continues at step 920 where the improved computer determines that the term is new and creates a request for a new MSBT term database record.

Figure 133:
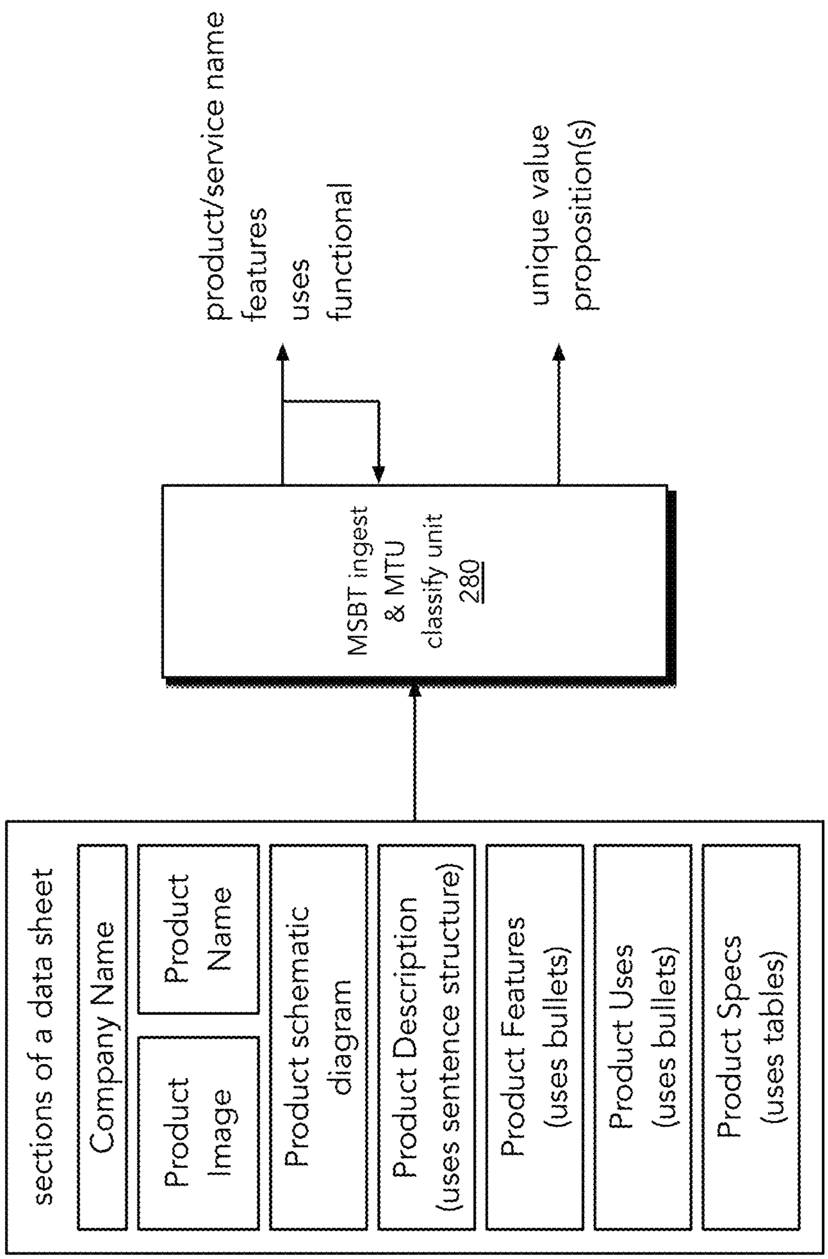
FIG. 133 is a diagram of another example of ingesting a datasheet by an MSBTP (marketing, sales, business, technology, and patent) data gathering section of an improved computer for technology.

FIG. 133 is a diagram of another example of ingesting a datasheet by an MSBTP (marketing, sales, business, technology, and patent) data gathering section of an improved computer for technology. The data sheet is shown to include a plurality of sections: company name, product image, product name, product schematic diagram, product description, product features, produces uses, and product specifications. When the MSBT ingest & MTU classify unit 280 of the improved computer ingests a data sheet, it identifies the data sheet's various sections. The unit 280 processes the various sections as discussed with reference to FIG. 134.

Figure 134:
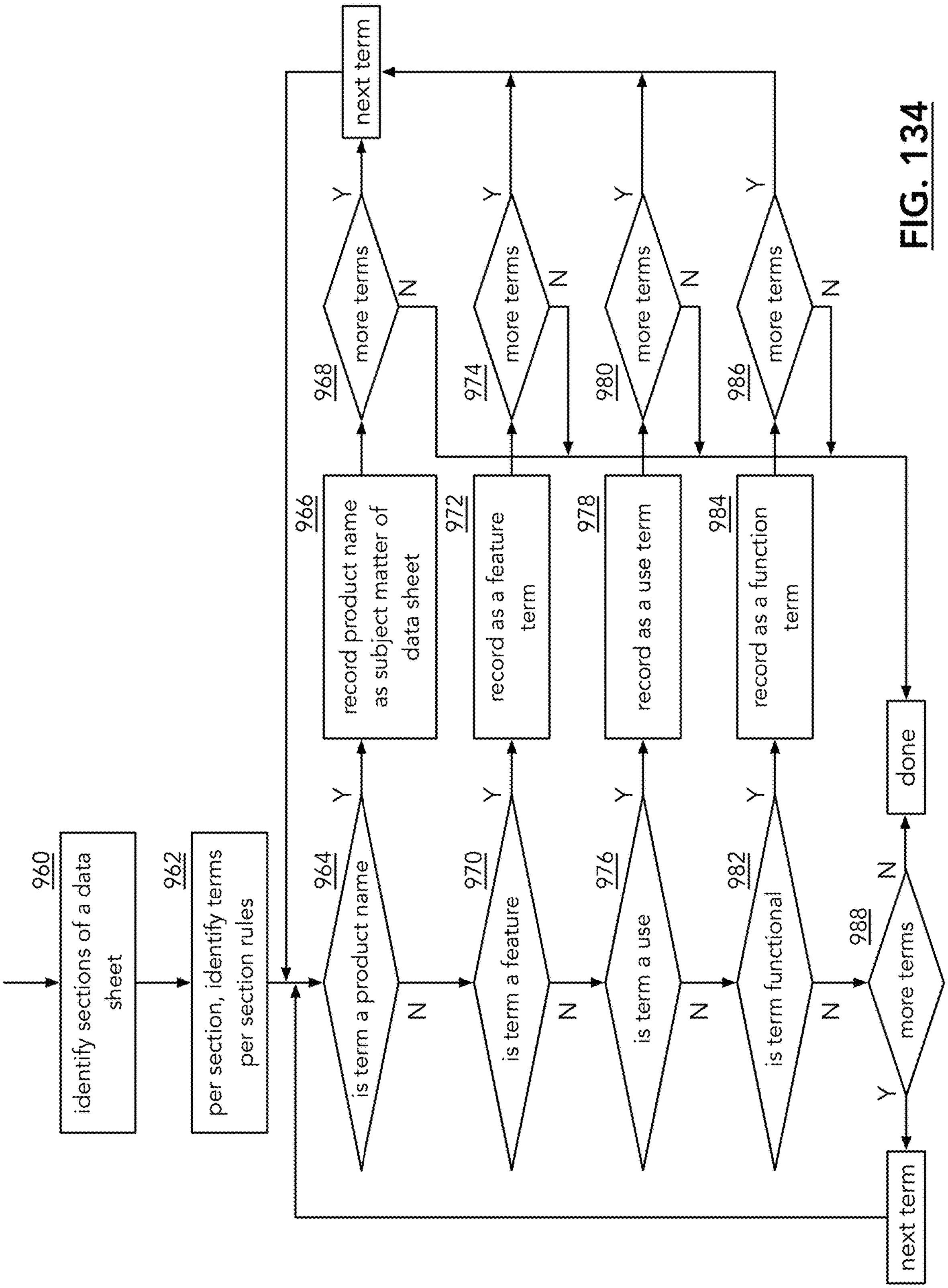
FIG. 134 is a logic diagram of another example of ingesting MSBT documents by an MSBTP (marketing, sales, business, technology, and patent) data gathering section of an improved computer for technology.

FIG. 134 is a logic diagram of an example of a method of ingesting a data sheet by the MSBT ingest & MTU classify unit 280 of the improved computer. The method begins at step 960 where the improved computer identifies sections of a data sheet as illustrated in FIG. 133. The method continues at step 962 where the improved computer identifies terms per section based on the rules for a data sheet, where each section includes specific types of information.

The method continues at step 964 where the improved computer determines whether an identified term is a product name. The improved computer analyzes the term in light of the section it's from and the words, symbols, and/or characters. If the term was extracted from the product name section of a data sheet and the words, symbols, and/or characters are consistent with product naming conventions, the improved computer identifies the term as a product name.

If the term is a product name, the method continues at step 966 where the improved computer records the product name as the subject matter of the data sheet, which may corresponds to an existing MTU or a potential new MTU. The method continues at step 968 where the improved computer determines whether there are more terms to process. If not, the method is done. If yes, the method repeats at step 964.

If, at step 964, the term is not a product name, the method continues at step 970 where the improved computer determines whether the term is regarding a marketable feature. If the term was extracted from the product features section of a data sheet and the words, symbols, and/or characters are consistent with features description conventions, the improved computer identifies the term as a marketable feature. The method continues at step 972 where the improved computer records the term as a marketable feature. The method continues at step 974 where the improved computer determines whether there are more terms to process. If not, the method is done. If yes, the method repeats at step 964.

If, at step 970, the term is not a marketable feature, the method continues at step 976 where the improved computer determines whether the term is regarding use of the product. If the term was extracted from the product use section of a data sheet and the words, symbols, and/or characters are consistent with product use description conventions, the improved computer identifies the term as a marketable feature. The method continues at step 978 where the improved computer records the term as a use of the product, which corresponds to MTU inclusion data. The method continues at step 980 where the improved computer determines whether there are more terms to process. If not, the method is done. If yes, the method repeats at step 964.

If, at step 976, the term is not a use of the product, the method continues at step 982 where the improved computer determines whether the term is regarding a functional aspect of the product. If the term was extracted from the product description section of a data sheet and the words, symbols, and/or characters are consistent with technical description conventions, the improved computer identifies the term as a technical discussion of an aspect of the product. The method continues at step 984 where the improved computer records the term as a technical aspect of the product, which corresponds to MTU composition data. The method continues at step 986 where the improved computer determines whether there are more terms to process. If not, the method is done. If yes, the method repeats at step 964.

If, at step 982, the term is not regarding a functional aspect of the product, the method continues at step 988 where the improved computer determines whether there are more terms to process. If not, the method is done. If yes, the method repeats at step 964.

Figure 135:
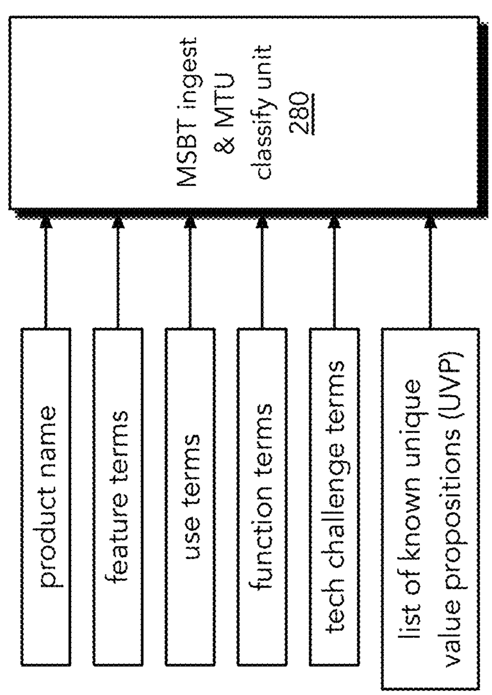
FIG. 135 is a diagram of another example of document partitioning by an MSBTP (marketing, sales, business, technology, and patent) data gathering section of an improved computer for technology.

FIG. 135 is a diagram of another example of document partitioning by an MSBTP (marketing, sales, business, technology, and patent) data gathering section of an improved computer for technology. In particular, this figure illustrates the MSBT ingest & MTU classify unit 280 using existing product names, existing features, existing uses, existing functional terms, existing technical challenge terms, and/or existing unique value propositions (UVP) to help identify one or more terms in a new MSBT document.

Figure 136:
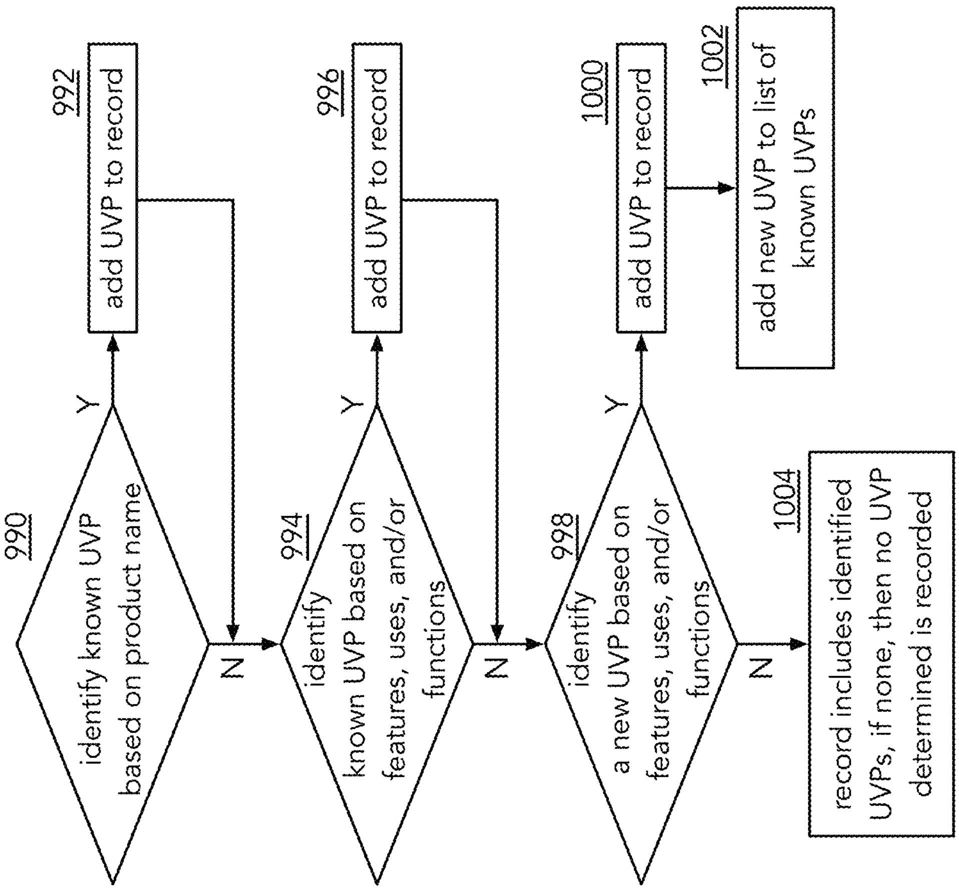
FIG. 136 is a logic diagram of another example of ingesting MSBT documents by an MSBTP (marketing, sales, business, technology, and patent) data gathering section of an improved computer for technology.

FIG. 136 is a logic diagram of an example of a method of ingesting a data sheet by the MSBT ingest & MTU classify unit 280 of the improved computer based on the information of FIG. 135. The method begins at step 990 where the improved computer determines whether a document includes a known UVP based on the product name associated with the document and based on other documents that include the product name. If yes, the method continues at step 992 where the improved computer adds the UVP to the record request for the MSBT document under analysis.

After step 992 or if the answer to step 990 was no, the method continues at step 994 where the improved computer determines whether the document includes a known UVP based on features, uses, and/or functions in other documents that include the product name and/or other documents that includes similar features, uses, and/or functions of the present document under analysis. If yes, the method continues at step 996 where the improved computer adds the UVP to the record request for the MSBT document under analysis.

After step 996 or if the answer to step 994 was no, the method continues at step 998 where the improved computer determines whether the document includes a new UVP based on features, uses, and/or functions in other documents that include the product name and/or other documents that includes similar features, uses, and/or functions of the present document under analysis.

If yes, the method continues at step 1000 where the improved computer adds the UVP to the record request for the MSBT document under analysis. The method continues at step 1002 where the improved computer adds the new UVP to the list of known UVPs. If the answer to step 998 was no, the method continues at step 1004 where the improved computer records the UVPs identified, if any.

Figure 137:
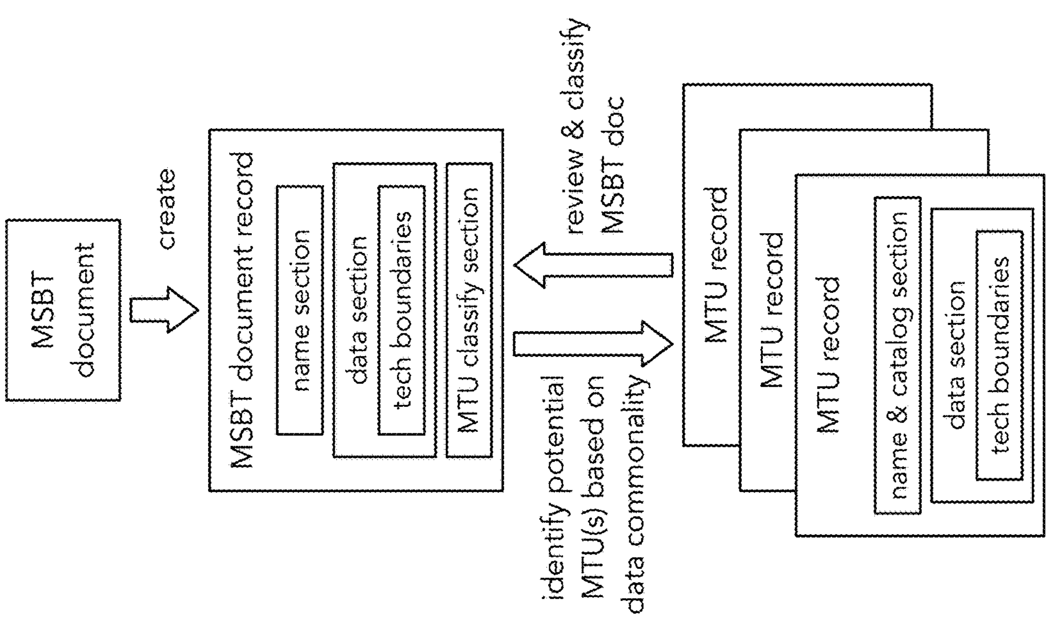
FIG. 137 is a diagram of an example of MTU tagging a document by an MSBTP (marketing, sales, business, technology, and patent) data gathering section of an improved computer for technology.

FIG. 137 is a diagram of an example of MTU tagging a document by an MSBTP (marketing, sales, business, technology, and patent) data gathering section of an improved computer for technology. In this figure, one or more MTU units are retrieved by the improved computer to determine if the is sufficient data correlation between the MTU record and the MSBT document record to tag the MSBT document records with the MTU name. For example, the improved computer compares the various fields between the two records for correlation. An example of this is shown in FIG. 138.

Figure 138:
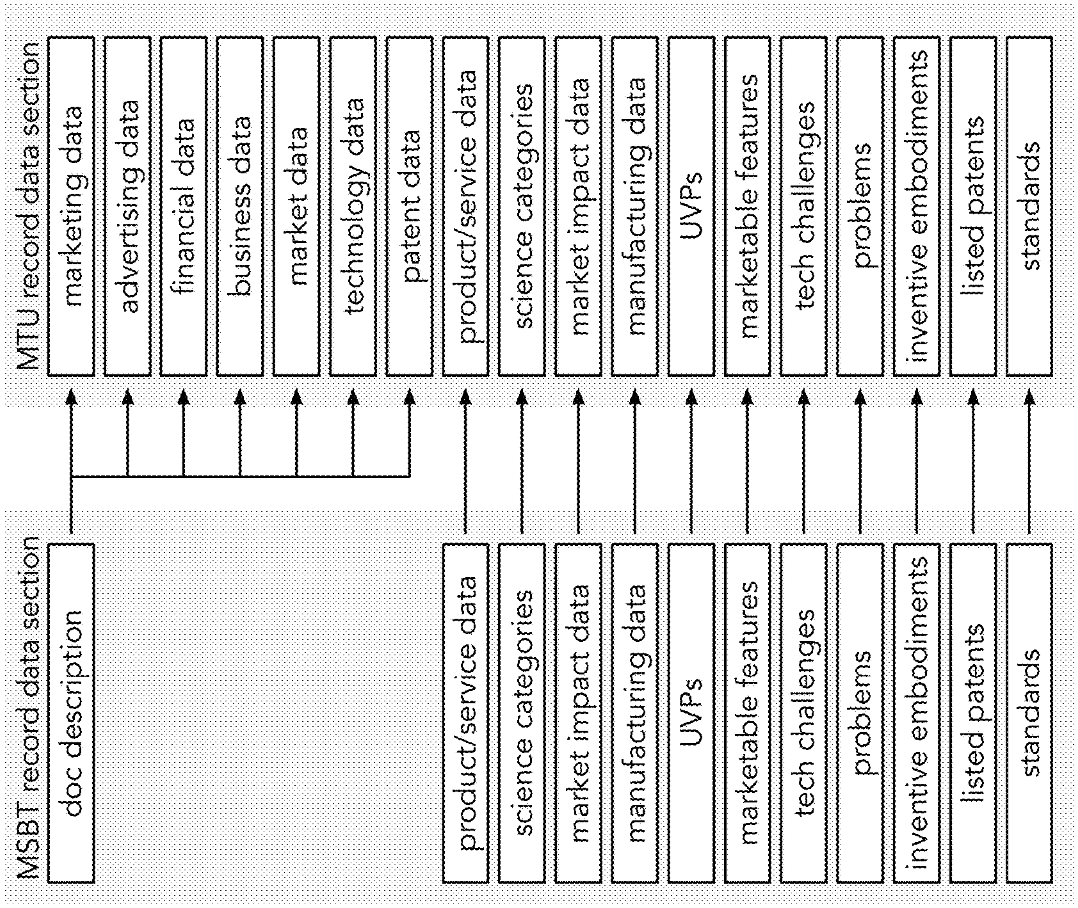
FIG. 138 is a diagram of another example of MTU tagging a document by an MSBTP (marketing, sales, business, technology, and patent) data gathering section of an improved computer for technology.

FIG. 138 is a diagram of another example of MTU tagging a document by an MSBTP (marketing, sales, business, technology, and patent) data gathering section of an improved computer for technology. In this figure, the MSBT record includes the data fields of document description, product/service data, science category, market impact data, manufacturing data, UVPs, marketable features, technical challenges, problems, inventive embodiments, listed patents, and standards. The MTU records includes fields for marketing data, advertising data, financial data, business data, market data, technical data, patent data, product/service data, science category, market impact data, manufacturing data, UVPs, marketable features, technical challenges, problems, inventive embodiments, listed patents, and standards.

The document description field of the MSBT record should correlate to one or more of the fields for marketing data, advertising data, financial data, business data, market data, technical data, and patent data of the MTU record. For example, if the MSBT document is regarding financial data, the document description field of the MSBT record is correlated to the financial data field of the MTU record. If the document description field of the MSBT record includes insufficient data to correlate to one of the fields of the MTU record, the document description field of the MSBT record is uncorrelated with the MTU records.

For each of the other fields of the MSBT record, the improved computer determines whether the field includes sufficient data with its corresponding field in the MTU record. If yes, the improved computer correlates the fields. If not, the field of the MSBT records is uncorrelated. The higher level of correlation between the fields of the MSBT record and MTU record, the more likely the MSBT record will be tagged (e.g., MTU classified) with the name of the MTU.

Figure 139A:
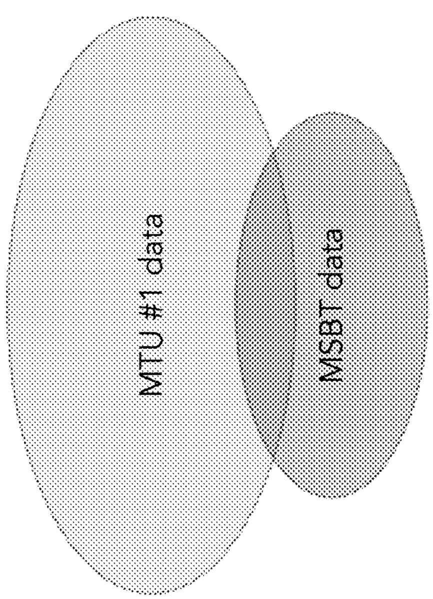
FIGS. 139A through 139D are diagrams of examples regarding MTU tagging a document by an MSBTP (marketing, sales, business, technology, and patent) data gathering section of an improved computer for technology.

FIGS. 139A through 139D are diagrams of examples regarding MTU tagging a document by an MSBTP (marketing, sales, business, technology, and patent) data gathering section of an improved computer for technology. In these figures, the overlap between the MSBT data and the MTU data corresponds to the number of fields that were correlated as discussed with reference to FIG. 138. As shown in FIG. 139A, there is some overlap (e.g., about 10% to 30% of the MSBT data overlaps with the MTU data), which creates an uncertainty if there is sufficient correlation to tag the MSBT with MTU #1. So, the MSBT record is not tagged with the MTU #1 name but is flagged for subsequent analysis.

Figure 139B:
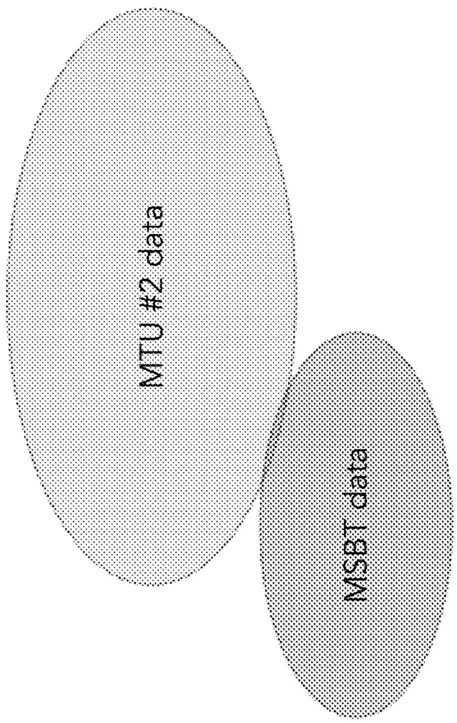

As shown in FIG. 139B, there is very little overlap (e.g., less than 5% of the MSBT data overlaps with the MTU data), which creates certainty that there is insufficient correlation to tag the MSBT with MTU #2.

Figure 139C:
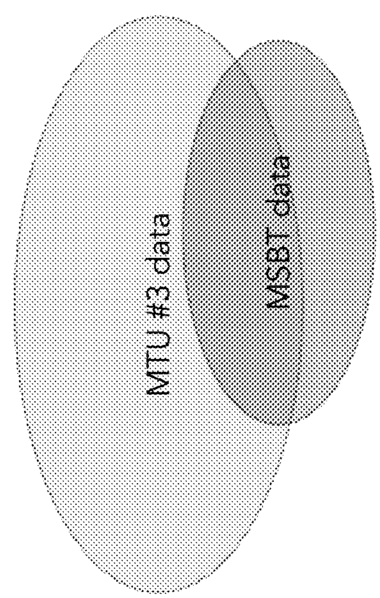
Figure 139D:
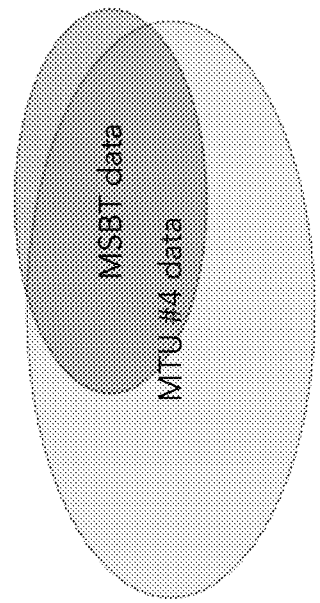

As shown in FIGS. 139C and 139D, there is significant overlap (e.g., more than 50% of the MSBT data overlaps with the MTU data), which creates certainty that there is sufficient correlation to tag the MSBT with MTU #3 and with MTU #4.

Figure 140:
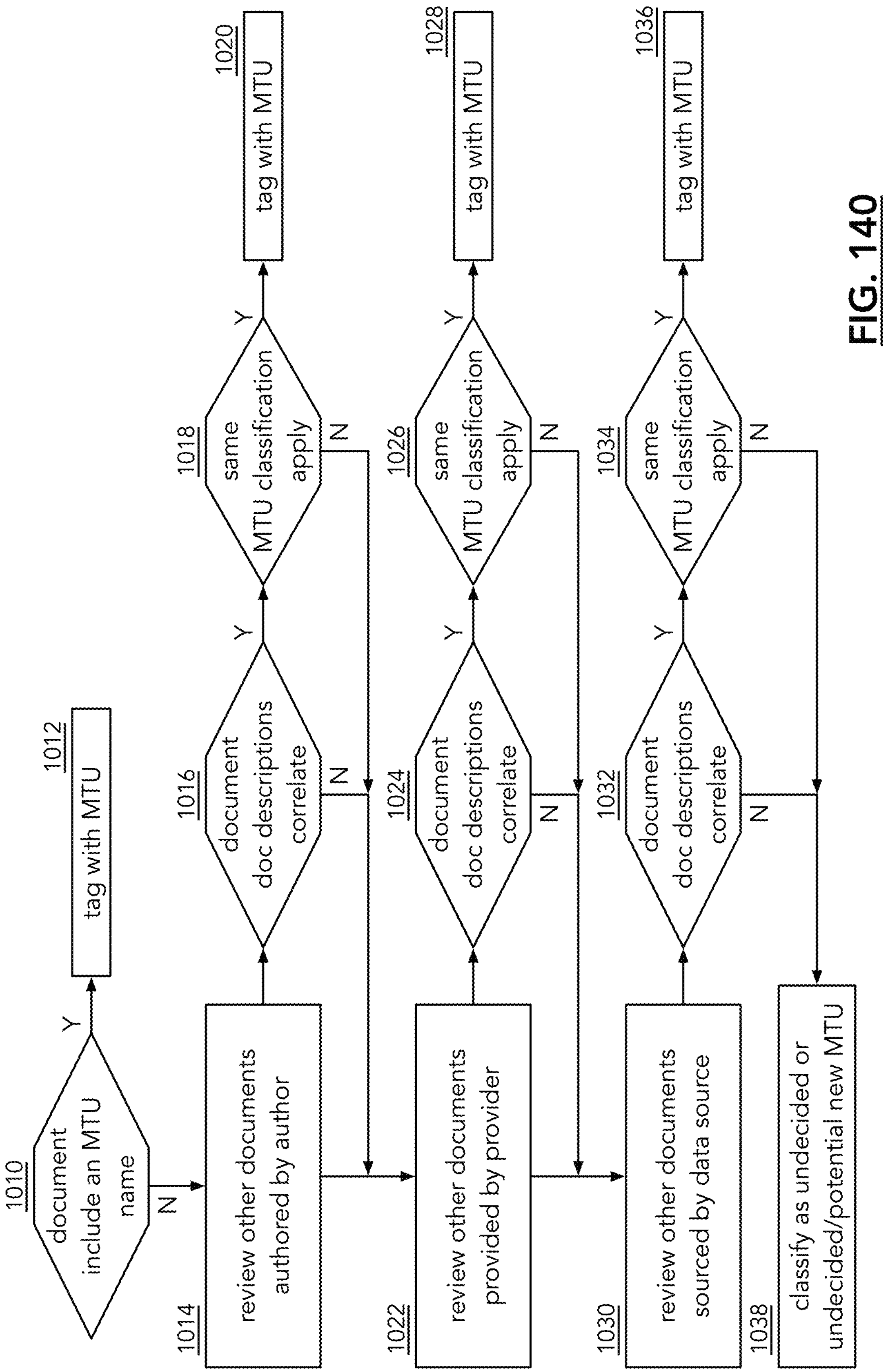
FIG. 140 is a logic diagram of an example of a method for MTU tagging a document by an MSBTP (marketing, sales, business, technology, and patent) data gathering section of an improved computer for technology.

FIG. 140 is a logic diagram of an example of a method for MTU tagging a document by an MSBTP (marketing, sales, business, technology, and patent) data gathering section of an improved computer for technology. The method begins at step 1010 where the improved computer determines whether the MSBT document includes in the body of the document, the name of an MTU. If yes, the method continues at step 1012 where the improved computer tags the MSBT record for the document with the MTU.

If the answer to step 1010 was no, the method continues at step 1014 where the improved computer reviews other document authored by the same author. The method continues at step 1016 where the improved computer determines whether the document description of the present document corresponds to the document description of one or more other documents. If yes, the method continues at step 1018 where the improved computer determines whether an MTU classification of one or more of the other document is an appropriate MTU classification for the present document. If yes, the method continues at step 1020 where the improved computer tags the document with the one or more appropriate MTU classifications.

If the answer to step 1016 or 1018 was no, the method continues at step 1022 where the improved computer reviews other document provided by the same provider. The method continues at step 1024 where the improved computer determines whether the document description of the present document corresponds to the document description of one or more other documents. If yes, the method continues at step 1026 where the improved computer determines whether an MTU classification of one or more of the other document is an appropriate MTU classification for the present document. If yes, the method continues at step 1028 where the improved computer tags the document with the one or more appropriate MTU classifications.

If the answer to step 1024 or 1026 was no, the method continues at step 1030 where the improved computer reviews other document sourced by the same data source. The method continues at step 1032 where the improved computer determines whether the document description of the present document corresponds to the document description of one or more other documents. If yes, the method continues at step 1034 where the improved computer determines whether an MTU classification of one or more of the other document is an appropriate MTU classification for the present document. If yes, the method continues at step 1036 where the improved computer tags the document with the one or more appropriate MTU classifications.

If the answer to step 1032 or 1034 was no, the method continues at step 1038 where the improved computer tags the MSBT document with the MTU classification of undecided or undecided/potential new MTU.

Figure 141:
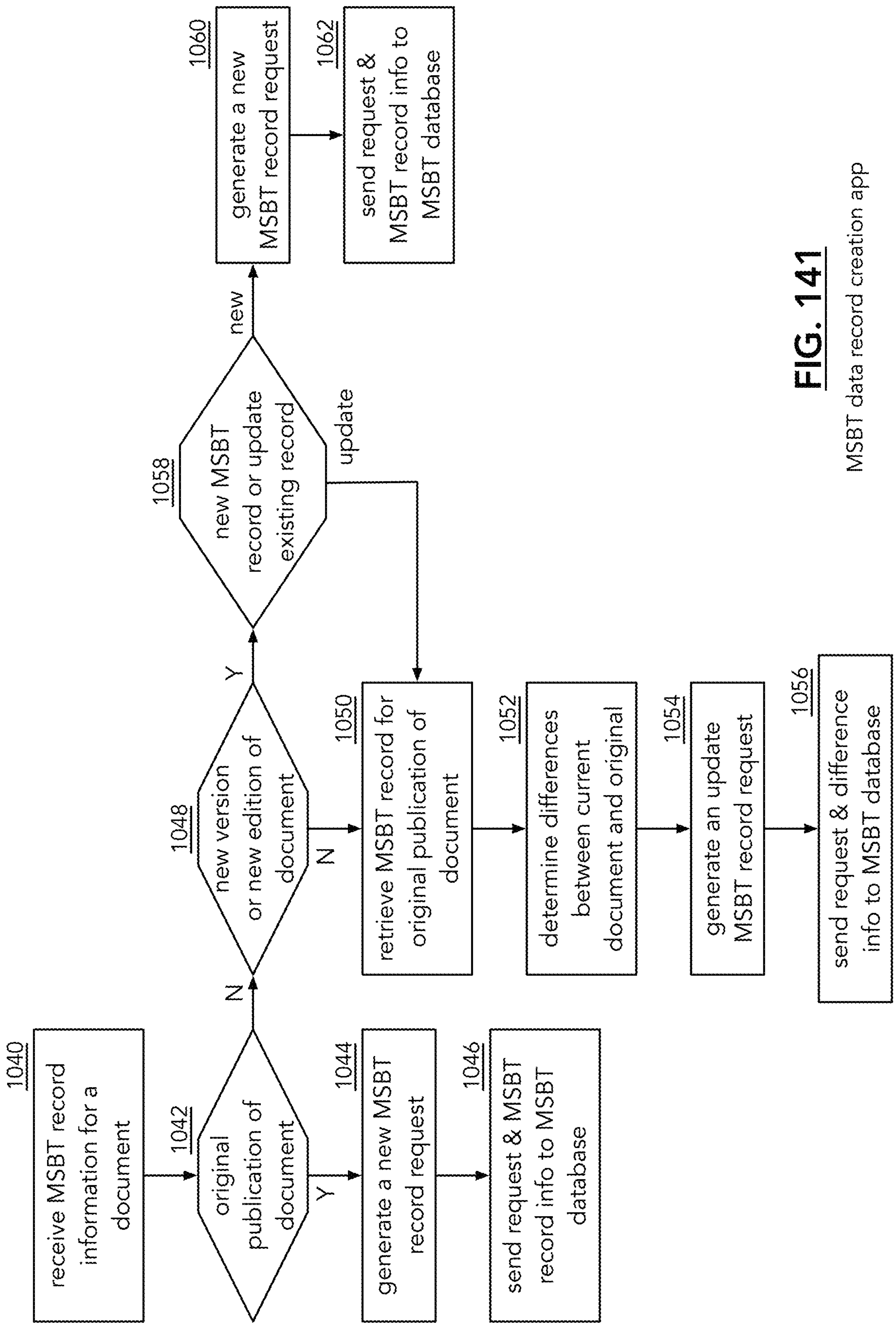
FIG. 141 is a logic diagram of an example of a method for generating a new MSBT data record for an MSBT document by an MSBTP (marketing, sales, business, technology, and patent) data gathering section of an improved computer for technology.

FIG. 141 is a logic diagram of an example of a method for generating a new MSBT data record for an MSBT document by an MSBTP (marketing, sales, business, technology, and patent) data gathering section of an improved computer for technology. The method begins at step 1040 where the improved computer receives MSBT record information regarding an MBST document. The method continues at step 1042 where the improved computer determines whether the record is an original publication. If yes, the method continues at step 1044 where the improved computer generates a new MSBT record request. The method continues at step 1046 where the improved computer sends the request to the MSBT database, which creates the record.

If the answer to step 1042 was no, the method continues at step 1048 where the improved computer determines whether the document is a new version or a new edition of an original document (e.g., has difference in comparison to the original document). If yes, the method continues at step 1058 where the improved computer determines whether to create a new MSBT database record for the new version or new edition. In an embodiment, the decision to create a new record for new versions and for new editions.

For a new record, the method continues at step 1060 where the improved computer generates a new record request for the new version or new edition document. The method continues at step 1062 where the improved computer sends the request to the MSBT database, which creates the record.

If the answer to step 1048 was no or the answer to step 1058 was update, the method continues at step 1050 where the improved computer retrieves the MSBT record for the original document. The method continues at step 1502 where the improved computer determines the changes between the original document and the new version or new edition. The method continues at step 1054 where the improved computer generates an update the MSBT record request based on the determined differences. The method continues at step 1056 where the improved computer sends the request to the MSBT database, which updates the record.

Figure 142:
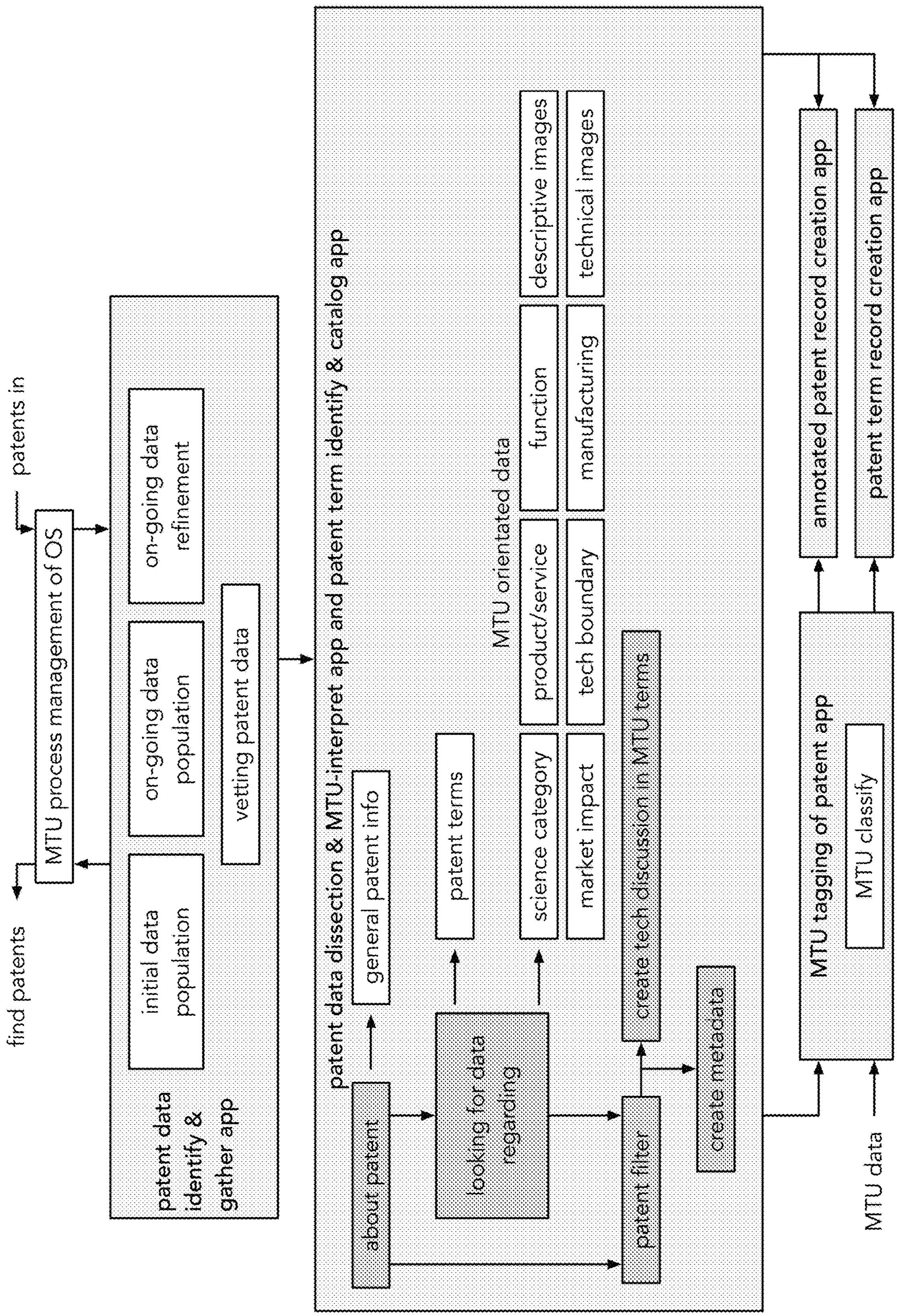
FIG. 142 is a schematic block diagram of a further embodiment of an MSBTP (marketing, sales, business, technology, and patent) data gathering section of an improved computer for technology.

FIG. 142 is a schematic block diagram of a further embodiment of an MSBTP (marketing, sales, business, technology, and patent) data gathering section of an improved computer for technology ingesting and processing patents (issued and pending).

In this Figure, the functional operations of the patent data identify & gather MTU system application, the patent data dissection, patent term identify, & MTU interpret MTU system application, the MTU tagging of a patent document MTU system application, annotated patent database record create MTU system application and patent term database record create MTU system application are discussed.

The patent data identify & gather MTU system application includes four sub-programs: initial data population, on-going data population, on-going refinement, and vetting patent data. The improved computer's execution of this MTU system application is discussed with reference to FIG. 143.

When the improved computer executes the patent data dissection, patent term identify, & MTU interpret MTU system application, it follows a basic flow chart of identifying information about the patent, look for relevant MTU orientated data, apply a patent filter function, create a general discussion of the patent, and create metadata for the patent. Information about the patent includes general patent information of title, inventor(s), assignee, IPC classification, listed prior art, the application type, status, country, etc.

The improved computer seeks patent terms and MTU orientated data from patents it ingests. A patent term is a claim term or technical term. The MTU orientated data includes, but is not limited to, science category data, product/service data, function data, a descriptive image, market impact data, a technical boundary (e.g., unique value proposition, marketable feature, technical challenge, problem, inventive concept, implementation element, implementation mechanism, implementation variant, solution, and/or inventive embodiment), manufacturing data, and/or a technical image.

The improved computer executes the patent filter to determine, based on the information about the patent, the patent terms, and the identified MTU orientated data, the usability of patent. In general, the improved computer determines the usefulness of a patent for identifying new MTUs and/or for further defining existing MTUs. The filtering of a patent is similar to the filtering of an MSBT document filtering, which was discussed with reference to FIG. 131.

The improved computer creates a discussion of the document if it has some measure of usability. The improved computer follows a similar approach to generating discussion of a patent as it does for generating a discussion of an MSBT document.

The improved computer creates metadata for the patent if it has some measure of usability. For example, the metadata includes, but is not limited to, source of patent, number of pages, number of figures, etc. The improved computer also creates metadata for a patent term.

The improved computer tags patents and patent terms as discussed with reference to FIGS. 144A-144G. The improved computer creates a request for new annotated patent database record and/or a request for updating an existing annotated patent database record as discussed with reference to FIG. 145 and creates a request for new patent term database record and/or a request for updating an existing patent term database record as discussed with reference to FIG. 146.

Figure 143:
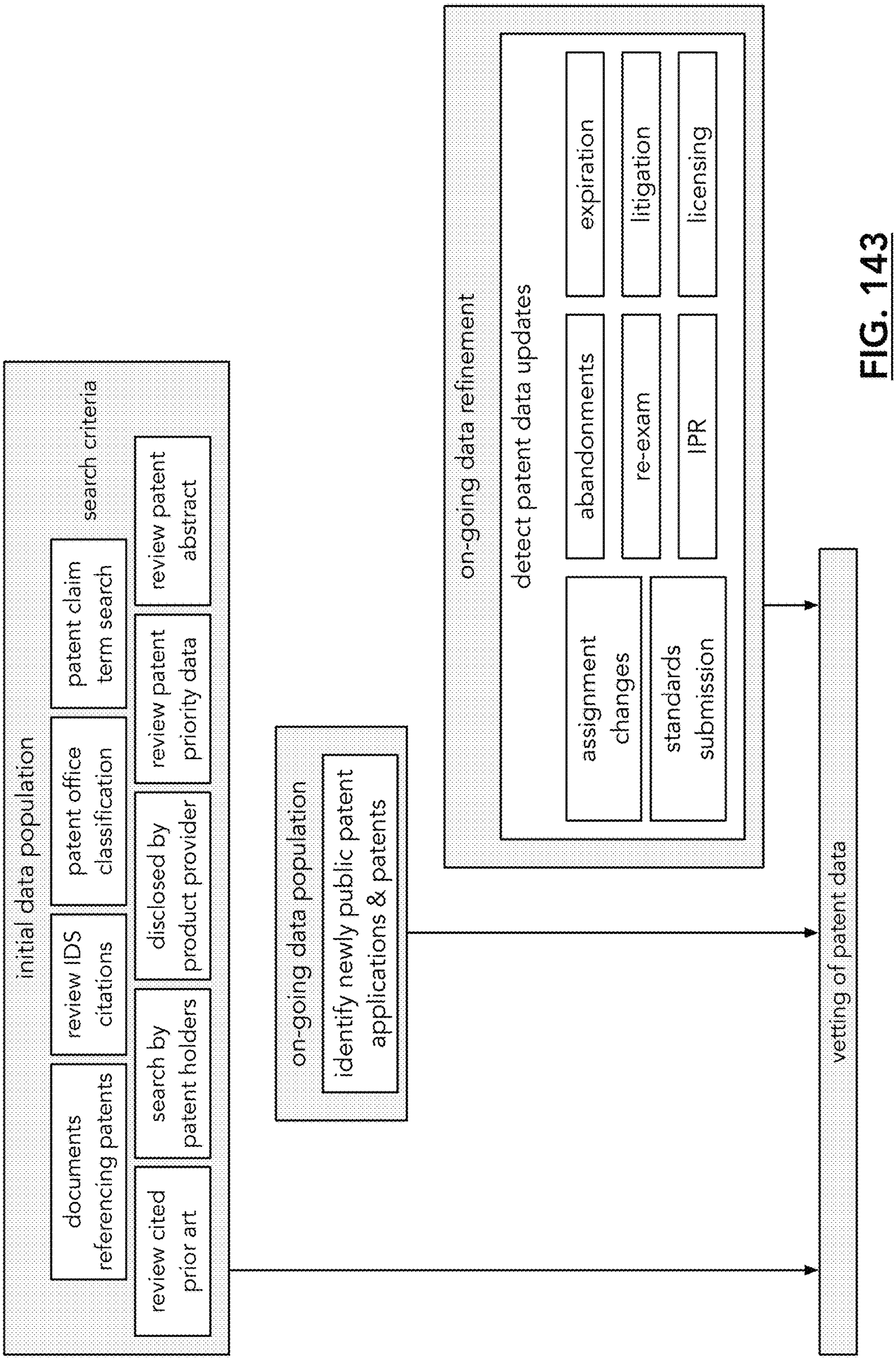
FIG. 143 is a schematic block diagram of a further embodiment of an MSBTP (marketing, sales, business, technology, and patent) data gathering section of an improved computer for technology regarding ingesting patents and patent applications.

FIG. 143 is a schematic block diagram of a further embodiment of an MSBTP (marketing, sales, business, technology, and patent) data gathering section of an improved computer for technology regarding ingesting patents and patent applications. The improved computer executes the initial data populate sub-program based on search criteria to identify patents of various types, of various status, and/or from various countries. See FIG. 113 for examples of types, status, and countries.

The search criteria includes, but is not limited to, patents identified in MSBT documents, information disclosure statements (IDS), patent office classification (e.g., IPC), patent claim terms, cited prior art, patent holders (e.g., inventors, applicants, assignees, etc.), patents listed by a product provider (e.g., a manufacturer, a distributor, a product retailor, etc.), patent priority data to identify parent and/or sibling patents, and/or patent abstracts. For patents found via one or more the search criteria, the improved computer vets them. The vetting of a patent is similar to the vetting of an MSBT document, which was discussed with reference to FIG. 125.

The improved computer executes the on-going data population sub-program to identify newly published patents of various types, of various status, and from various countries. To do this, the improved computer interfaces with one or more patent services and/or with one or more patent offices. In an implementation, the improved seeks to ingest patents in batches regarding a technology category and/or one or more technology maps thereof. For example, the improved computer ingests medical technology patents in one or more batches and ingests communication technology patents in one or more other batches.

The improved computer executes the on-going data refinement sub-program to identify changes to existing patents (e.g., annotated patents in the annotated patent database). For example, the improved computer updates an existing annotated patent database record when the application type changes, the status changes, and/or a foreign counterpart is filed. For example, the application type changes include, but is not limited to, a non-provisional patent application is filed claiming priority to a pending provisional application, and a US or foreign national utility patent application is file claiming priority to a pending PCT application. As another example, the status change includes, but is not limited to, a pending patent application issues and an issued patent expires.

The improved computer executes the on-going data refinement sub-program to identify changes to existing patents based on one or more search criteria. The search criteria includes, but is not limited to, assignment changes, standards submissions, standards acceptance, abandonments, re-exam requests, IPR (inter party re-exams), assertion in litigation, and used for licensing.

The improved computer executes the initial data population sub-program once to initially populate the annotated patent database and the patent term database. The improved computer executes the on-going data population and on-going data refinement sub-programs routinely (e.g., continually, periodically, etc.). The improved computer vets each newly received patents and/or piece of data regarding patents before adding it a database.

FIGS. 144A through 144G are a logic diagram of an example of a method for ingesting patents and patent applications by an MSBTP (marketing, sales, business, technology, and patent) data gathering section of an improved computer for technology. The method begins at step 1070 where the improved computer determines whether the figures are more than just boxes with numbers. If not, the method continues at step 1074 where the improved computer determines whether to create new figures. If not, the method continues at step 1078 where the improved computer identifies disclosed notions from the specification in accordance with patent disclosure categories (e.g., problem set up, solution & novelty, technical description, benefit of solution, technical environment & use of invention, and patent law interpretation).

If the answer to step 1074 was yes, the method continues at step 1076 where the improved computer creates new figures with descriptive components that are consistent with MTU classifications and symbols. In an example, the improved computer augments the existing figures with descriptive terms. In another example, the improved computer generates new figures based on the specification and the claims. The creation of the new figures may further be based on the existing figures.

From step 1076 or for a yes answer from step 1070, the method continues at step 1072 where the improved computer identifies disclosed notions from the specification in accordance with patent disclosure categories. The method continues at step 1080 where the improved computer identifies claim terms from the independent claims and from the dependent claims.

Figure 144A:
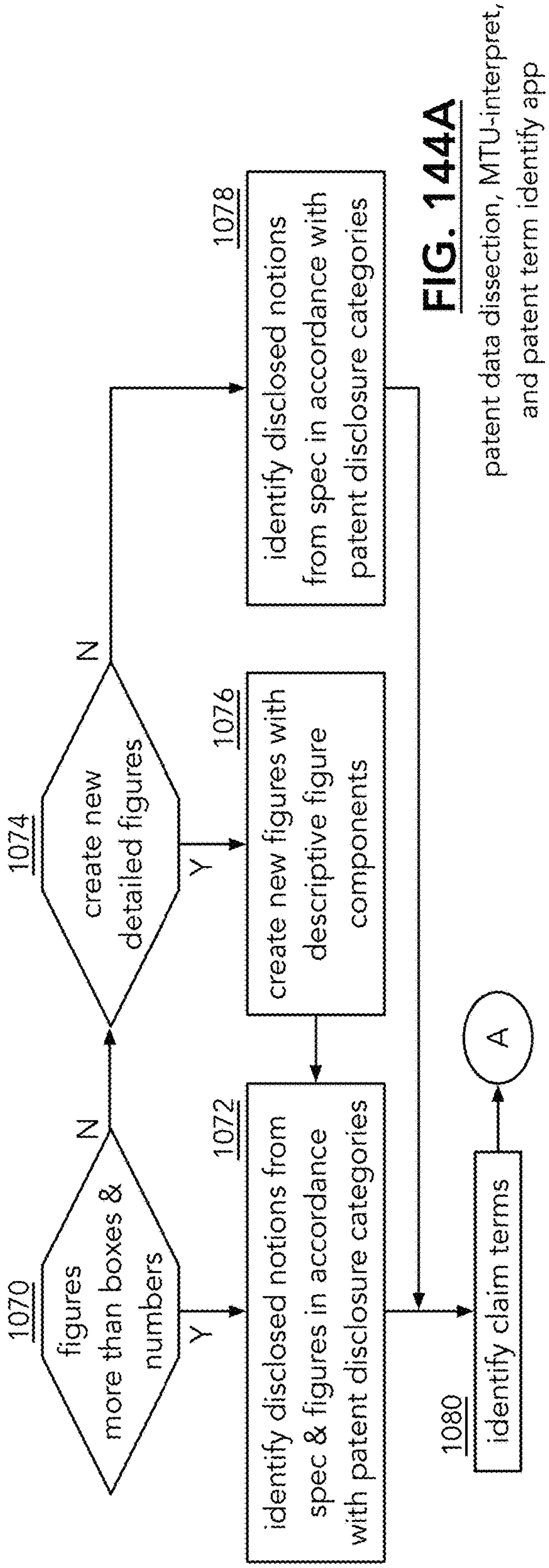
FIGS. 144A through 144G are a logic diagram of an example of a method for ingesting patents and patent applications by an MSBTP (marketing, sales, business, technology, and patent) data gathering section of an improved computer for technology.
Figure 144B:
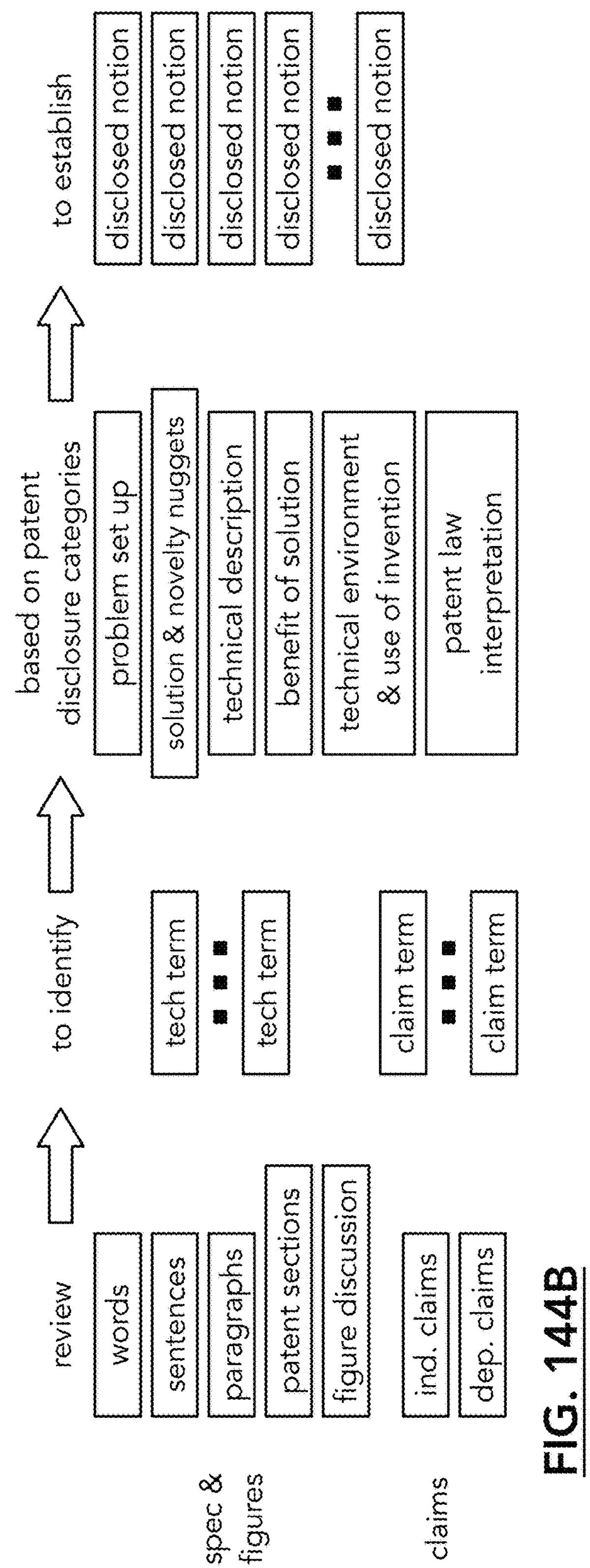

For example, and as shown in FIG. 144B, the improved computer analyses the specification (and figures, if descriptive) to identify tech terms and analyses the claims to identify claim terms. The tech terms and claim terms are patent terms, which are stored in the patent term database. The improved computer interprets the words, sentences, paragraphs, patent section, and/or figure description of the specification, the identified tech terms, and/or the identified claim terms, to identify one or more disclosed notions that pertain to one or more patent disclosure categories.

For example, a disclosed notion of "the combination of XYZ increases efficiency" pertains to the problem set up and benefit of the solution patent disclosure categories. As another example, a disclosed notion of "product AA includes XYZ" pertains to the technical environment & use of invention patent disclosure category. As another example, a disclosed notion of "XYZ functions to perform A to modify B and then performs C on the modified B to produce D" pertains to the solution & novelty nuggets and the technical description of the patent disclosure categories. Note that a quality patent application is one from which the patent disclosure categories can be readily identified, the specification and figures support, define, and enable the claims, and the claims have identifiable novelty nuggets.

Figure 144C:
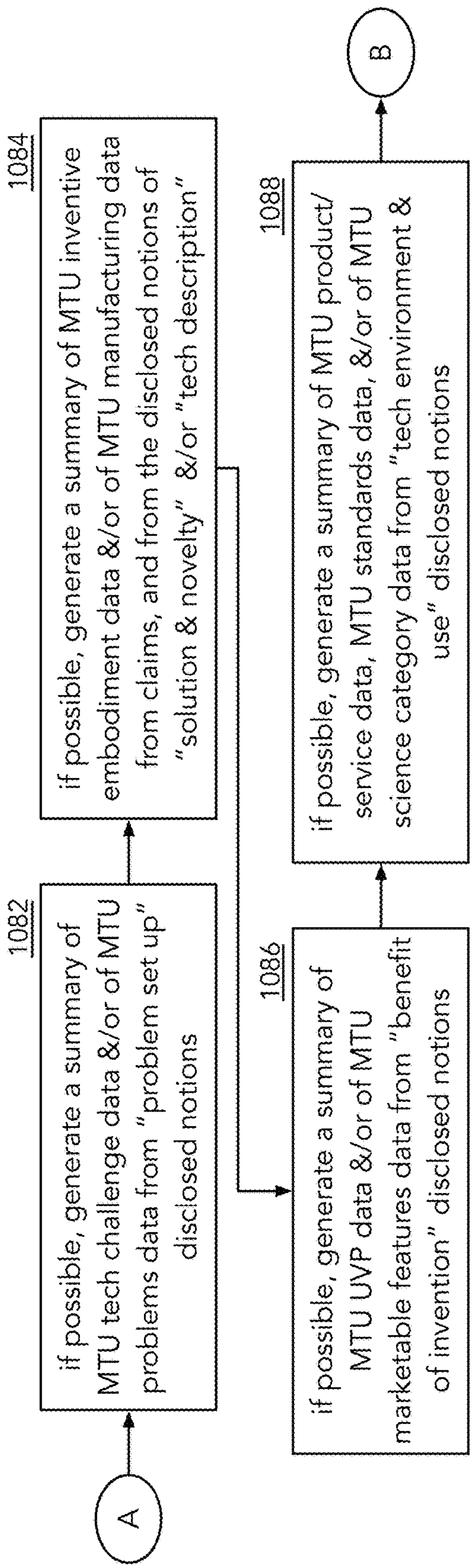

The method continues at step 1082 of FIG. 144C where the improved computer generates, if possible (e.g., there's at least one relevant disclosed notion), a summary of MTU tech challenge data and/or MTU problem data disclosed in the patent based on the disclosed notion regarding the patent disclosure category of problem set up. The method continues at step 1084 where the improved computer generates, if possible, a summary of MTU inventive embodiment data and/or MTU manufacturing data disclosed in the patent based on the claims and further based on the disclosed notions regarding the patent disclosure categories of solution & novelty nuggets and technical description.

The method continues at step 1086 where the improved computer generates, if possible, a summary of MTU UVP data and/or MTU marketable features data disclosed in the patent based on the disclosed notions regarding the patent disclosure category of benefit of the invention. The method continues at step 1088 where the improved computer generates, if possible, a summary of MTU product/service data, MTU science category data, and/or MTU standards data disclosed in the patent based on the disclosed notions regarding the patent disclosure categories of technical description and technical environment & use.

Figure 144D:
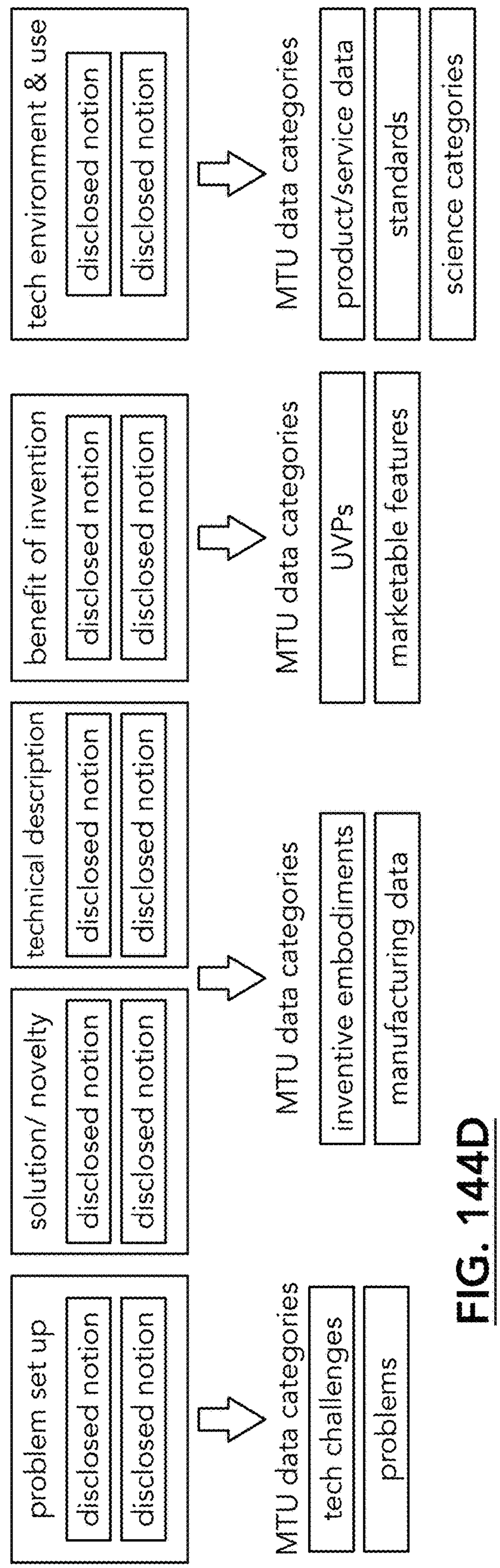

FIG. 144D is an example of the steps 1082-1088 of FIG. 144C. In this example, the problem set up disclosed notions help identify data regarding the MTU data categories (or technology quantifying data categories) of technology challenges and problems. The solution & novelty nugget disclosed notions and the technical description disclosed notions help identify data regarding the MTU data categories of inventive embodiments and manufacturing data. The benefit of the invention disclosed notions help identify data regarding the MTU data categories of UVPs and marketable features. The technical environment & use disclosed notions help identify data regarding the MTU data categories of product/service, standards, and science categories.

Figure 144E:
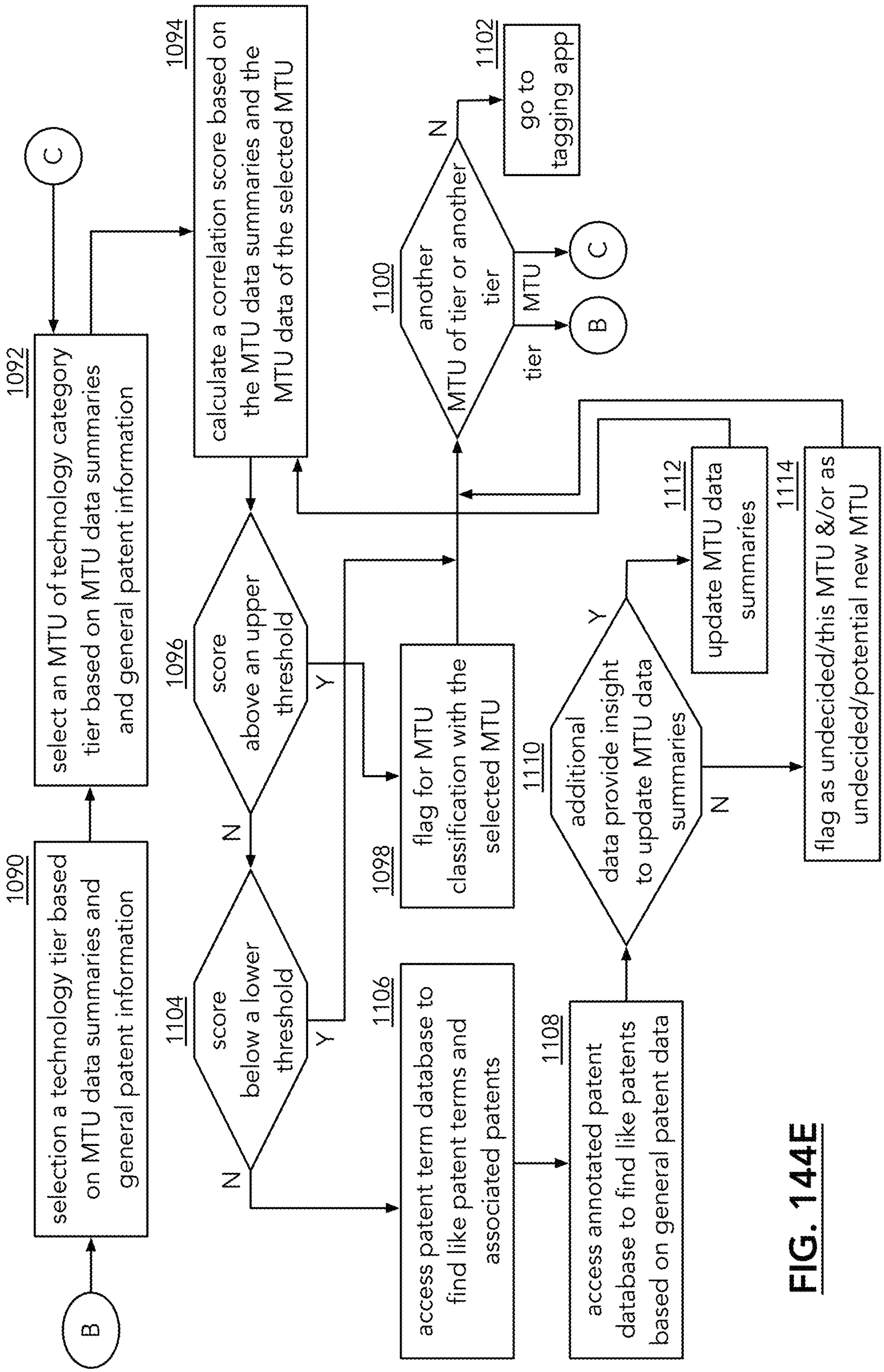

The method continues at step 1090 of FIG. 144E where the improved computer, for MTU classification of a patent, selects a technology map and an initial technology tier of a science category based on the MTU data summaries and the general patent information. The selection may be a default selection to a particular MTU of the map or involve initial analysis to select the MTU. The method continues at step 1092 where the improved computer selects an MTU of the technology category tier based on the MUT data summaries and the general patent information.

The method continues at step 1094 where the improved computer calculates a correlation score based on the correlation of the data of MTU data summaries and the data of the selected MTU. The method continues at step 196 where the improved computer determines whether the score is above an upper threshold (e.g., a high correlation score, which indicates that the patent is definitively regarding the selected MTU). If yes, the method continues at step 1098 where the improved computer flags the patent for MTU classification with the selected MTU.

The method continues at step 1100 where the improved computer determines whether this is another MTU of the current tier that has been selected, a, MTU from a different tier that has been selected, of the MTU data summaries suggest more than one MTU. If not, the method continues at step 1102 where the improved computer executes the MTU tagging of a patent system application to tag the patent with the selected MTU. If there is another selected MTU of the same tier, the method repeats at step 1090. If there is a selected MTU of another tier, the method repeats at step 1092.

If the answer at step 1096 was no, the method continues at step 1104 where the improved computer determines whether score is below a lower threshold (e.g., a low correlation score, which indicates that the patent is definitively not regarding the selected MTU). If yes, the method continues at step 1100.

If the answer at step 1104 was no, the method continues at step 1106 where the improved computer accesses the patent term database to find patents that include like patent terms as the present patent. The method continues at step 1108 where the improved computer accesses the annotated patent database to find like patents based on the general description of the present patent. The method continues at step 1110 where the improved computer reviews the like patents to determine if they provide insight into the MTU data summaries of the present patent application.

If not, the method continues at step 1114 where the improved computer flags the patent for an MTU classification of undecided or undecided/potential new MTU. The method then continues at step 1100. If the answer to step 1110 is yes, the method continues at step 1112 where the improved computer updates one or more of the MTU data summaries of the patent. The method then continues at step 1094.

Figure 144F:
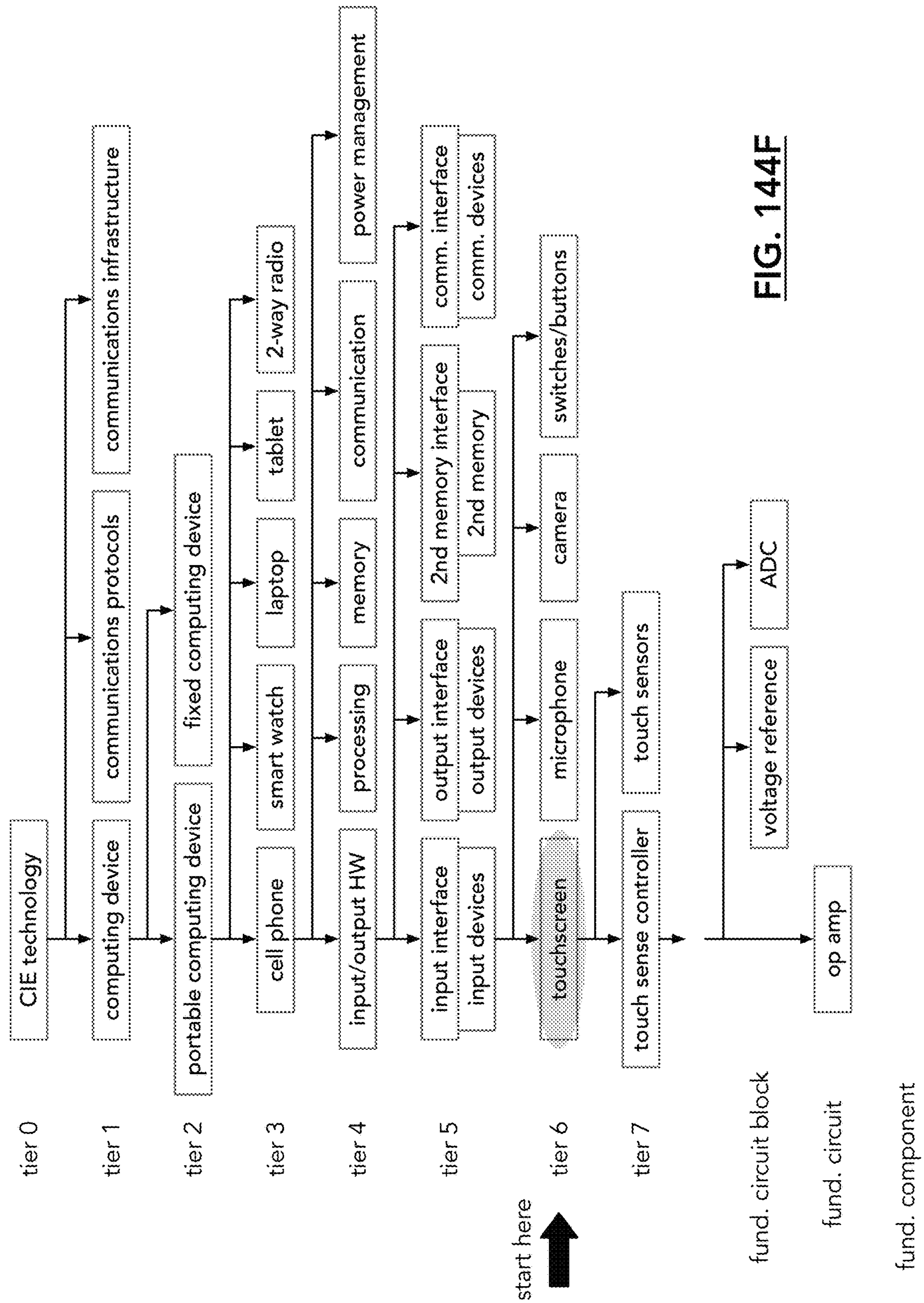

FIG. 144F is an example of selecting a technology map and an MTU for classifying a patent. In this example, the improved computer selects the MTU map regarding cell phone of portable computing devices of computing devices of CIE (communications, information, and electrical) technology based on an initial review of the general patent information and the MTU data summaries. The improved computer then selects the touchscreen MTU to start the method of FIG. 144E.

Figure 144G:
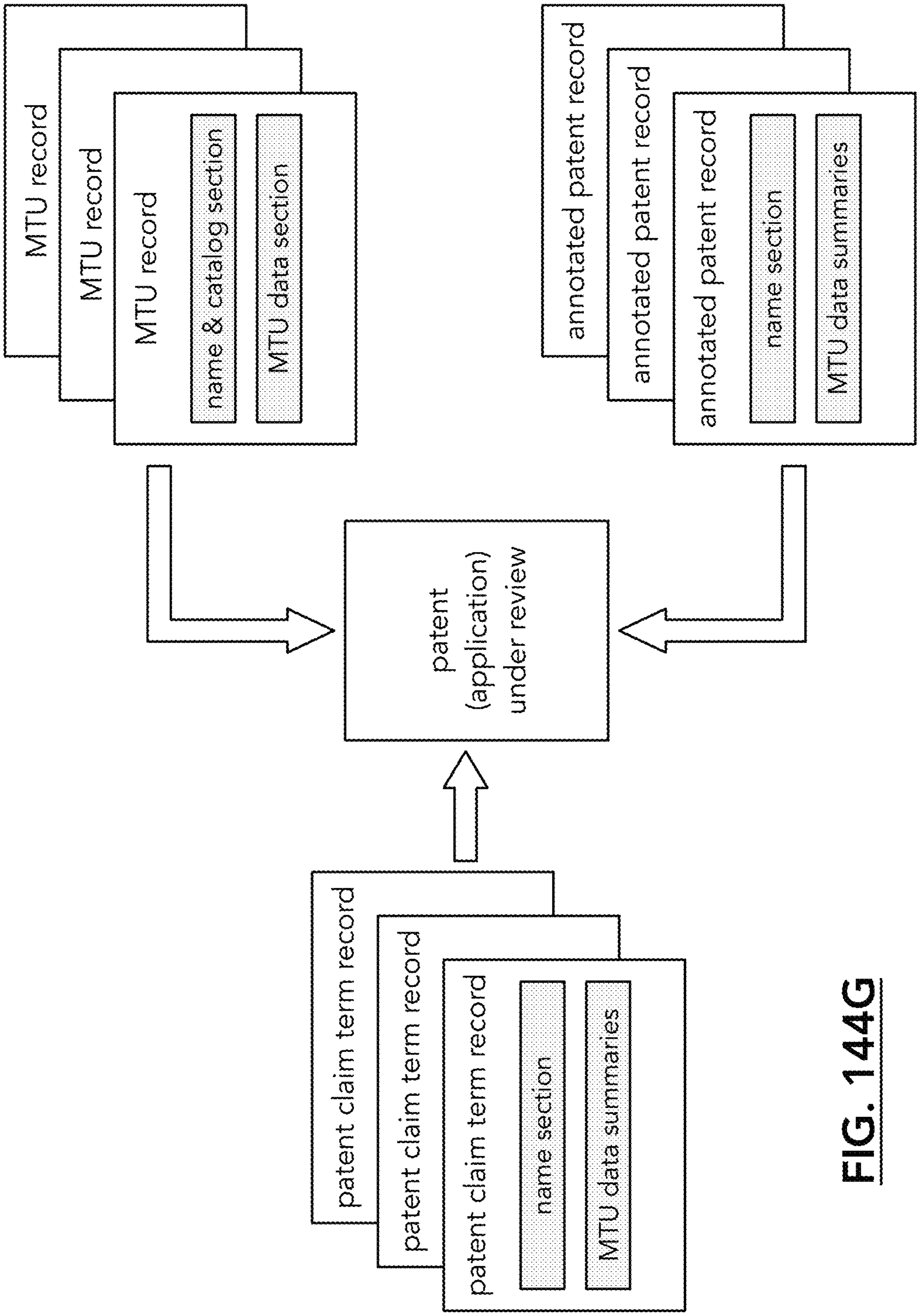

FIG. 144G is an example of the data used by the improved computer to review a patent (of any type, of any status, from any country). The data includes one or more patent term records, one or more annotated patent records, and/or one or more MTU records. Each records includes a name section and its own MTU orientated data section. The review includes an initial MTU classification, updating an MTU classification, updating MTU data summaries, and/or updating other sections of the corresponding annotated patent record.

Figure 145:
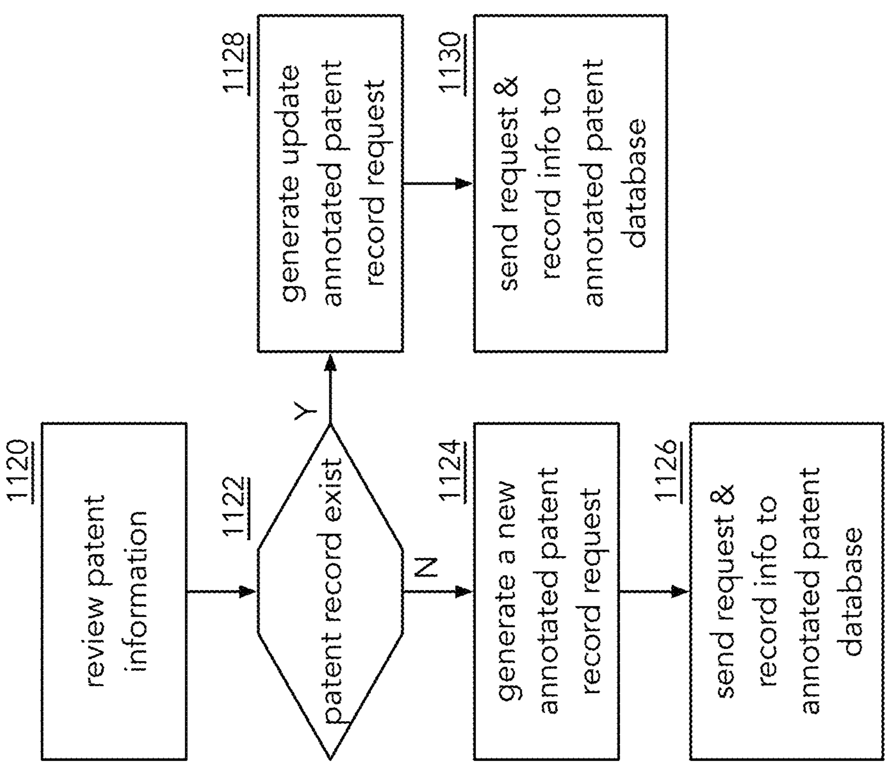
FIG. 145 is a logic diagram of an example of a method for generating a new annotated patent record for an MSBT document by an MSBTP (marketing, sales, business, technology, and patent) data gathering section of an improved computer for technology.

FIG. 145 is a logic diagram of an example of a method for generating a new annotated patent record for an MSBT document by an MSBTP (marketing, sales, business, technology, and patent) data gathering section of an improved computer for technology. The method begins at step 1120 where the improved computer reviews patent information. The method continues at step 1122 where the improved computer determines whether an annotated patent records exists for the patent based on the patent information (e.g., patent number, country, filing date, patent application serial number, etc.).

If yes, the method continues at step 1128 where the improved computer generates an update annotated patent database record request regarding new patent information. The method continues at step 1130 where the improved computer sends the request and the new patent information to the annotated patent database, which updates the existing annotated patent record with the new data.

If the answer to step 1122 was no, the method continues at step 1124 where the improved computer generates a new annotated patent database record request regarding the patent. The method continues at step 1126 where the improved computer sends the request and the patent information to the annotated patent database, which creates a new annotated patent record for the patent.

Figure 146:
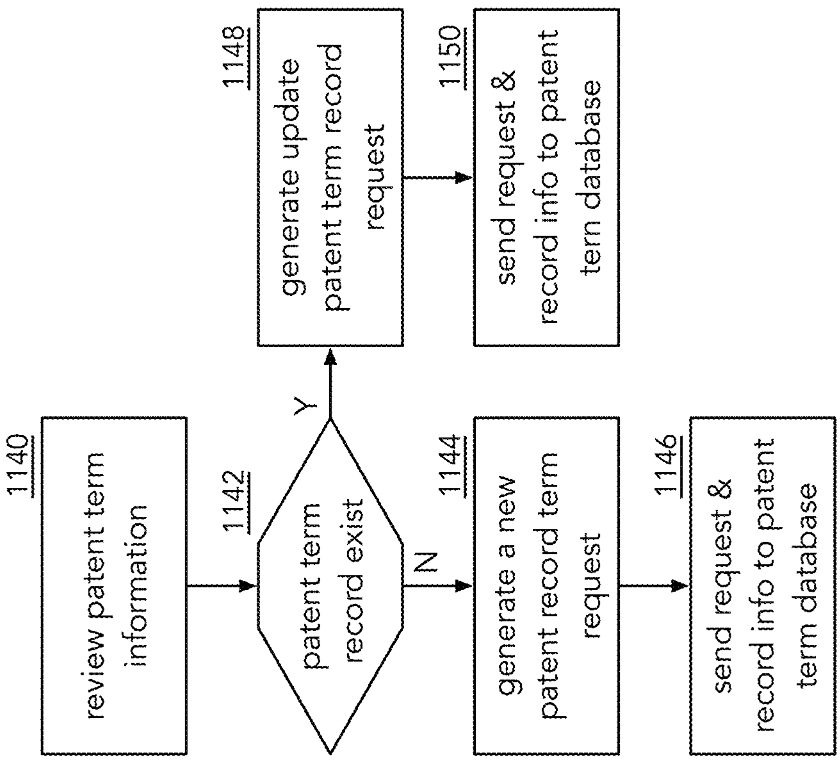
FIG. 146 is a logic diagram of an example of a method for generating a new patent term record for an MSBT document by an MSBTP (marketing, sales, business, technology, and patent) data gathering section of an improved computer for technology.

FIG. 146 is a logic diagram of an example of a method for generating a new patent term record for an MSBT document by an MSBTP (marketing, sales, business, technology, and patent) data gathering section of an improved computer for technology. The method begins at step 1140 where the improved computer reviews patent term information. The method continues at step 1142 where the improved computer determines whether a patent term records exists for the patent term based on the patent term information (e.g., patent term name, patent term synonym, discussion of patent term, etc.).

If yes, the method continues at step 1148 where the improved computer generates an update patent term database record request regarding new patent term information. The method continues at step 1150 where the improved computer sends the request and the new patent term information to the patent term database, which updates the existing patent term record with the new data.

If the answer to step 1142 was no, the method continues at step 1144 where the improved computer generates a new patent term database record request regarding the patent term. The method continues at step 1166 where the improved computer sends the request and the patent term information to the patent term database, which creates a new patent term record for the patent term.

Figure 147:
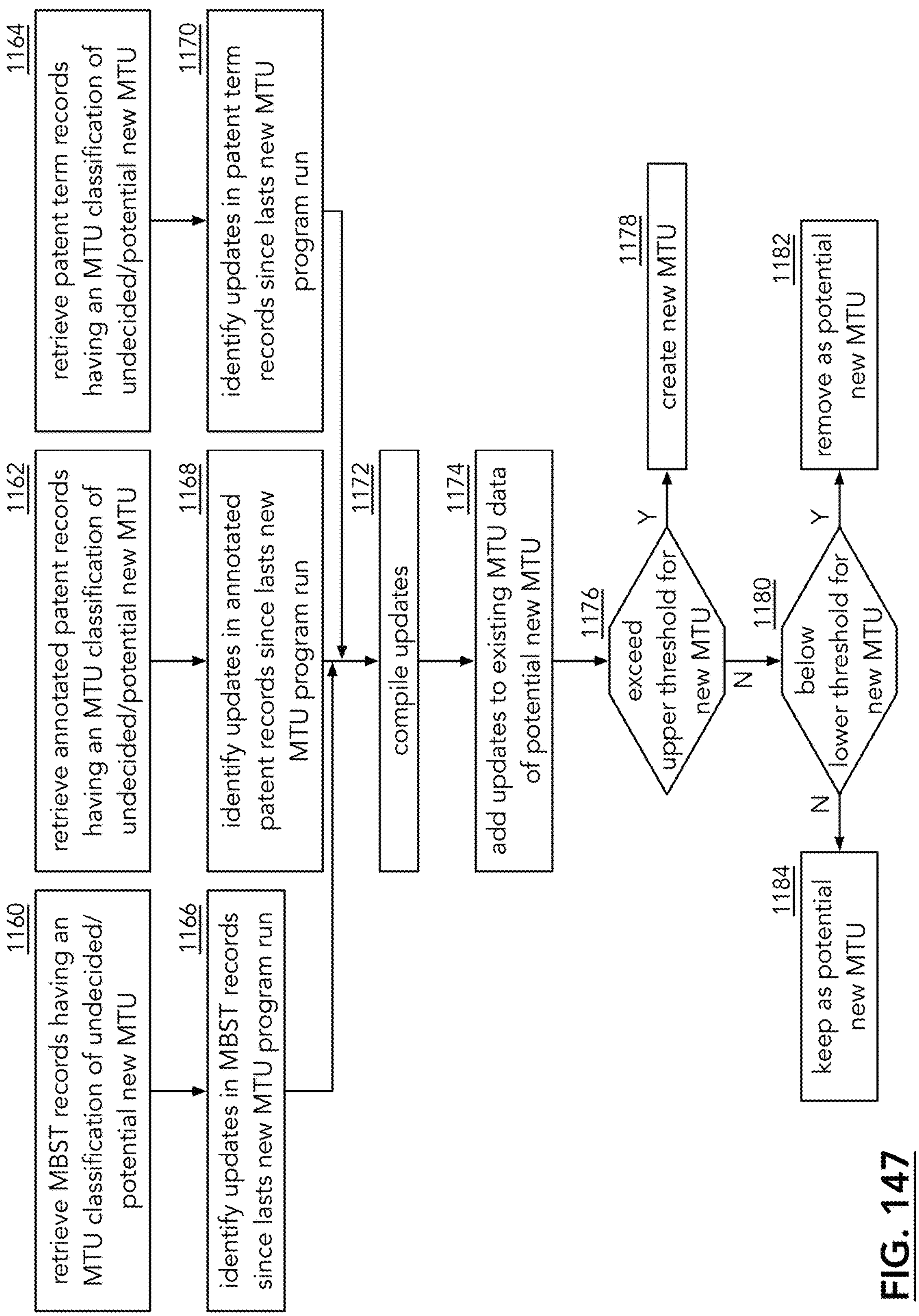
FIG. 147 is a logic diagram of an example of a method for identifying a new market-tech unit (MTU) by an MSBTP (marketing, sales, business, technology, and patent) data gathering section of an improved computer for technology.

FIG. 147 is a logic diagram of an example of a method for identifying a new market-tech unit (MTU) by an MSBTP (marketing, sales, business, technology, and patent) data gathering section of an improved computer for technology. The method begins at steps 1160, 1162, and 1164. At step 1160, the improved computer retrieves MSBT records having an MTU classification of undecided/potential new MTU fora specific potential new MTU. At step 1162, the improved computer retrieves annotated patent records having an MTU classification of undecided/potential new MTU for the specific potential new MTU. At step 1164, the improved computer retrieves patent term records having an MTU classification of undecided/potential new MTU for the specific potential new MTU.

From steps 1160, 1162, and 1164, the method continues at steps 1166, 1168, and 1170. At step 1166, the improved computer identifies updates to the retrieved MSBT records since the last running of this method for this specific potential new MTU. At step 1168, the improved computer identifies updates to the retrieved annotated patent records since the last running of this method for this specific potential new MTU. At step 1170, the improved computer identifies updates to the retrieved patent term records since the last running of this method for this specific potential new MTU.

From steps 1166, 1168, and 1170, the method continues at step 1172 where the improved computer compiles the updates from the various records based on MTU orientated data categories. The method continues at step 1174 where the improved computer adds the compiled updates to existing MTU data summaries regarding the potential new MTU to create most-recent-updated MTU data summaries.

The method continues at step 1176 where the improved computer determines whether analysis of the most-recent-updated MTU data summaries exceeds an upper threshold for establishing a new MTU. The upper threshold corresponds to sufficient data to establish the new MTU, which includes, at a minimum, one or more new and definitive UVPs, one or more new and definitive technology challenges, and market impact data to support a new MTU. If yes, the method continues at step 1178 where the improved computer initiates the creation of the new MTU and a new MTU database record.

If the answer to step 1176 is no, the method continues at step 1180 where the improved computer determines whether analysis of the most-recent-updated MTU data summaries is below a lower threshold for establishing a new MTU. The lower threshold corresponds to very little to no data to support the creation of a new MTU. If no, the method continues at step 1184 where the improved computer keeps the specified potential new MTU as a potential new MTU.

If yes, the method continues at step 1182 where the improved computer removes the specified potential new MTU as a potentially new MTU and updates the MSBT records, the annotated patent records, and the patent term records MTU classification by removing the undecided/potential new MTU for the specified potential new MTU from the records.

As used herein, an MTU should include a manageable number of UVPs and of technical challenges (e.g., 1-10). The number of technical challenges depends on the number of problems and corresponding inventions likely to evolve for each technical challenge. As a general example, it would be desirable to keep the number inventions that have patent protection between 20 and 200 per MTU. Too few inventions indicates too fine of partitioning of MTUs and too many inventions includes too coarse of partitioning of MTUs and/or generations thereof.

To track the evolution of MTUs and to assist in determining when an MTU should be split into two or more MTUs, MSBT records, annotated patent records, and patent term records may include a specific MTU classification for the current MTU and undecided/potential new MTU classification regarding the splitting of the current MTU.

As is also used herein, a new MTU may be proprietary to a particular customer and is only included the private database associated with the particular customer (i.e., it is not stored in the MTU database for access by the MTU user applications). As information regarding the MTU becomes publicly available, the improved computer executes the method of FIG. 147 and, once there is sufficiently publicly available data to substantiate creating a new MTU, the MTU will be added to the MTU database and will no longer be deemed proprietary of the particular customer.

Figure 148:
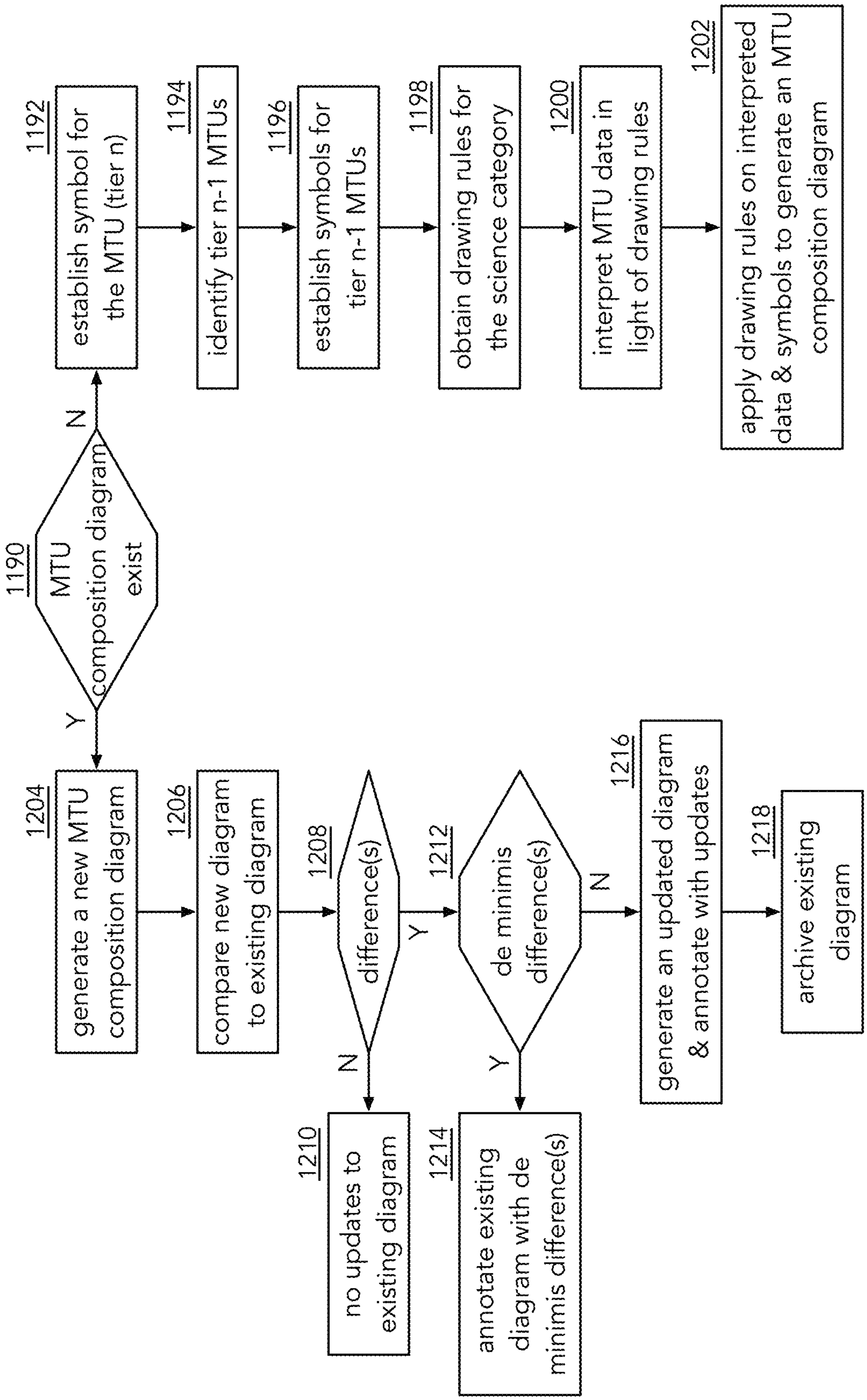
FIG. 148 is a logic diagram of an example of a method for generating/updating a market-tech unit (MTU) composition diagram by an MSBTP (marketing, sales, business, technology, and patent) data gathering section of an improved computer for technology.

FIG. 148 is a logic diagram of an example of a method for generating/updating a market-tech unit (MTU) composition diagram by an MSBTP (marketing, sales, business, technology, and patent) data gathering section of an improved computer for technology. The method begins at step 1190 where the improved computer determines whether an MTU composition drawing exists. If no, the method continues at step 1192 where the improved computer establishes (e.g., look up, create, modify another, etc.) a symbol for the MTU. Examples of establishing a symbol for an MTU are discussed with reference to FIGS. 150A-150C.

The method continues at step 1194 where the improved computer identifies tier −1 MTUs from a technology map, from the MTU database record, etc. and may further identify tier −2 MTUs and lower tiers. The method continues at step 1196 where the improved computer establishes symbols for the tier −1 MTUs (and lower tiers if appropriate). The method continues at step 1198 where the improved computer obtains drawing rules of the particular science category. For example, there are rules for drawing electrical diagrams, for drawing flow charts, etc.

The method continues at step 1200 where the improved computer interprets the MTU data and the MTU symbols in light of the drawing rule to ensure that the symbols comply with the rules and that there is sufficient data for the rules to process. The method continues at step 1202 where the improved computer applies the drawing rules on the interpreted data and symbols to generate an MTU composition diagram.

If the answer to step 1190 was yes, the method continues at step 1204 where the improved computer generates a new MTU composition diagram per steps 1192 through 1202. The method continues at step 1206 where the improved computer compares the new diagram to the existing one. The method continues at step 1208 where the improved computer determines if there are any differences. If not, the method continues at step 1210 where the improved computer does not update the existing drawing.

If yes, the method continues at step 1212 where the improved computer determines whether the differences are de minimis (e.g., de minimis changes are slight word differences a term but change operation of the MTU; non de minimis changes affect the operation of the MTU, which includes new and/or improved features, new and/or improved functions, etc.). If the changes are de minimis, the method continues at step 1214 where the improved computer annotates the existing diagram with notes regarding the de minimis differences.

If the changes are not de minimis, the method continues at step 1216 where the improved computer generates an updated diagram to include the non-de minimis changes and annotates the updates. The method continues at step 1218 where the improved computer archives the existing diagram.

The improved computer routinely executes the method of FIG. 148 to creating and/or update MTU composition diagrams. The purpose of an MTU composition diagram is to provide a figure that is enablement driven, is easy to understand, has easily recognizable elements (e.g., MTU symbols), has clear data/signal flow (if applicable), has clear connectivity between elements (if applicable), omits obvious features (e.g., power connections unless power is part of tech challenge), and/or has focus on functionality with minimal theoretical discussion (limited to no use of equations, depict what the equations do).

Figure 149:
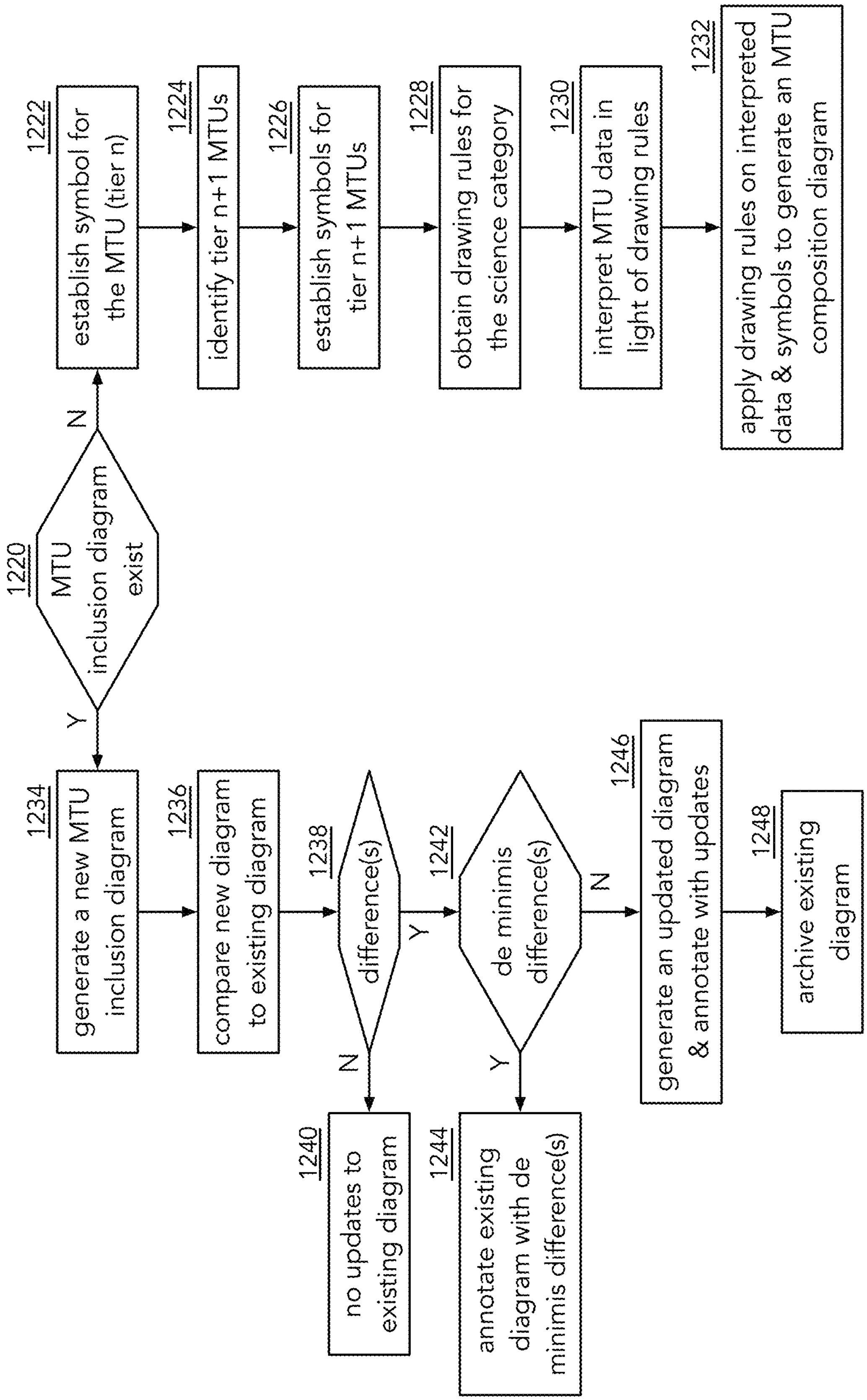
FIG. 149 is a logic diagram of an example of a method for generating/updating a market-tech unit (MTU) composition diagram by an MSBTP (marketing, sales, business, technology, and patent) data gathering section of an improved computer for technology.

FIG. 149 is a logic diagram of an example of a method for generating/updating a market-tech unit (MTU) composition diagram by an MSBTP (marketing, sales, business, technology, and patent) data gathering section of an improved computer for technology. The method begins at step 1200 where the improved computer determines whether an MTU inclusion drawing exists. If no, the method continues at step 1222 where the improved computer establishes (e.g., look up, create, modify another, etc.) a symbol for the MTU. Examples of establishing a symbol for an MTU are discussed with reference to FIGS. 150A 150C.

The method continues at step 1224 where the improved computer identifies tier +1 MTUs from a technology map, from the MTU database record, etc. and may further identify tier +2 MTUs and higher tiers. The method continues at step 1226 where the improved computer establishes symbols for the tier +1 MTUs (and higher tiers if appropriate). The method continues at step 1228 where the improved computer obtains drawing rules of the particular science category. For example, there are rules for drawing electrical diagrams, for drawing flow charts, etc.

The method continues at step 1230 where the improved computer interprets the MTU data and the MTU symbols in light of the drawing rule to ensure that the symbols comply with the rules and that there is sufficient data for the rules to process. The method continues at step 1232 where the improved computer applies the drawing rules on the interpreted data and symbols to generate an MTU inclusion diagram.

If the answer to step 1220 was yes, the method continues at step 1234 where the improved computer generates a new MTU inclusion diagram per steps 1222 through 1232. The method continues at step 1236 where the improved computer compares the new diagram to the existing one. The method continues at step 1228 where the improved computer determines if there are any differences. If not, the method continues at step 1240 where the improved computer does not update the existing drawing.

If yes, the method continues at step 1242 where the improved computer determines whether the differences are de minimis (e.g., de minimis changes are slight word differences a term but change operation of the MTU; non de minimis changes affect the operation of the MTU, which includes new and/or improved features, new and/or improved functions, etc.). If the changes are de minimis, the method continues at step 1244 where the improved computer annotates the existing diagram with notes regarding the de minimis differences.

If the changes are not de minimis, the method continues at step 1246 where the improved computer generates an updated diagram to include the non-de minimis changes and annotates the updates. The method continues at step 1248 where the improved computer archives the existing diagram.

The improved computer routinely executes the method of FIG. 149 to creating and/or update MTU inclusion diagrams. The purpose of an MTU inclusion diagram is to provide a figure that is enablement driven, is easy to understand, has easily recognizable elements (e.g., MTU symbols), has clear data/signal flow (if applicable), has clear connectivity between elements (if applicable), omits obvious features (e.g., power connections unless power is part of tech challenge), and/or has focus on functionality with minimal theoretical discussion (limited to no use of equations, depict what the equations do).

Figure 150A:
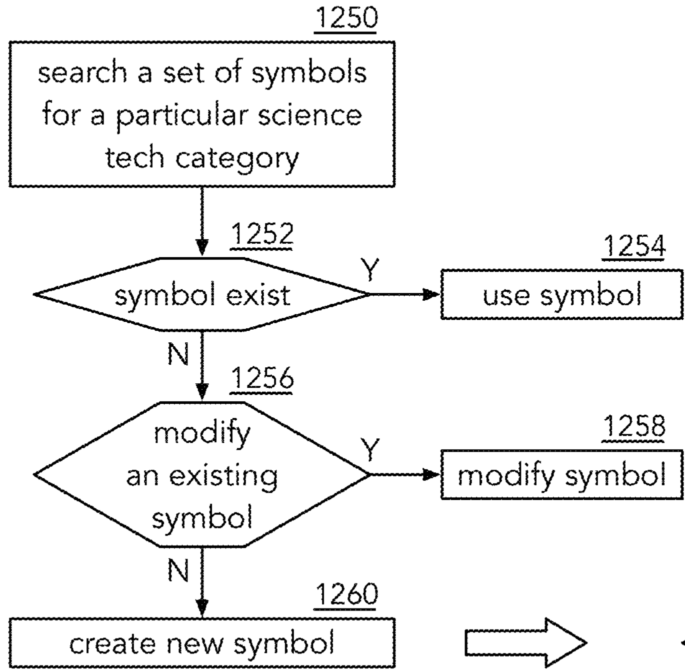
FIGS. 150A through 150C are a logic diagram of an example of a method for generating/updating a market-tech unit (MTU) symbol by an MSBTP (marketing, sales, business, technology, and patent) data gathering section of an improved computer for technology.
Figure 150B:
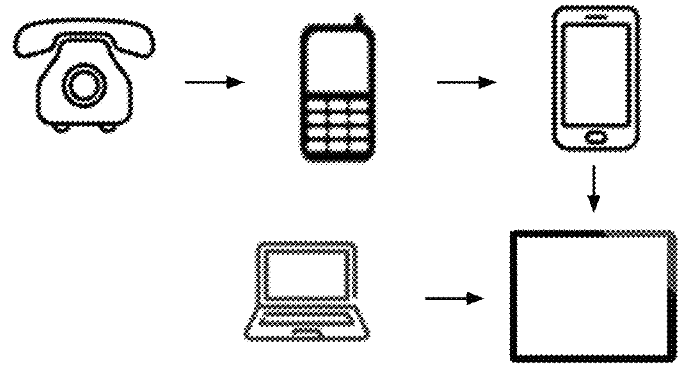
Figure 150C:
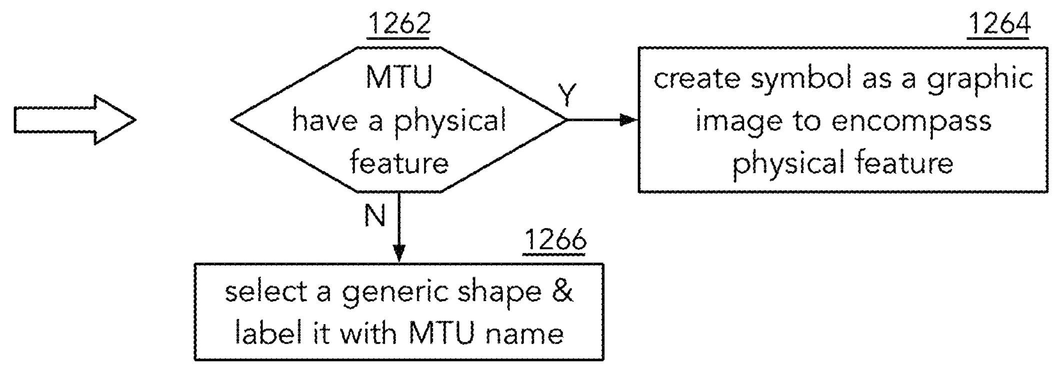

FIGS. 150A through 150C are a logic diagram of an example of a method for generating/updating a market-tech unit (MTU) symbol by an MSBTP (marketing, sales, business, technology, and patent) data gathering section of an improved computer for technology. The method, regarding step 1192 of FIG. 148 and step 1222 of FIG. 149, begins at step 1250 of FIG. 150A where the improved computer searches a set of symbols for a particular technology category in which the MTU lies. For example, there are symbols for various electronic devices and/or electronic circuits.

The method continues at step 1252 where the improved computer determines whether a symbol for the MTU exists. If yes, the method continues at step 1254 where the improved computer uses the symbol. If a symbol does not exist, the method continues at step 1256 where the improved computer determines to modify an existing symbol. If yes, the method continues at step 1258 where the improved computer modifies an existing symbol.

FIG. 150B illustrates an example of modifying an existing system of a telephone and a tablet. The symbol for a phone began with a graphical representation of a rotary phone. The symbol for a cell phone evolved from the rotary phone to a button phone with an external antenna to a touchscreen phone with an internal antenna. The symbol for a laptop computer is a graphical representation of a laptop. The symbol for a tablet evolved from the symbol of a laptop and a touchscreen cell phone.

Returning to the method of FIG. 150A, the method continues at step 1260 where the improved computer creates a new symbol. FIG. 150C illustrates a method for creating a new symbol. The method begins at step 1262 where the improved computer determines whether the MTU has a physical feature (e.g., a package, a housing, a geometric shape, etc.). If yes, the method continues at step 1264 where the improved computer generates a symbol for the MTU as a graphical representation that encompasses the physical feature. If no, the method continues at step 1266 where the improved computer selects a generic shape and labels it with the MTU name.

Figure 151:
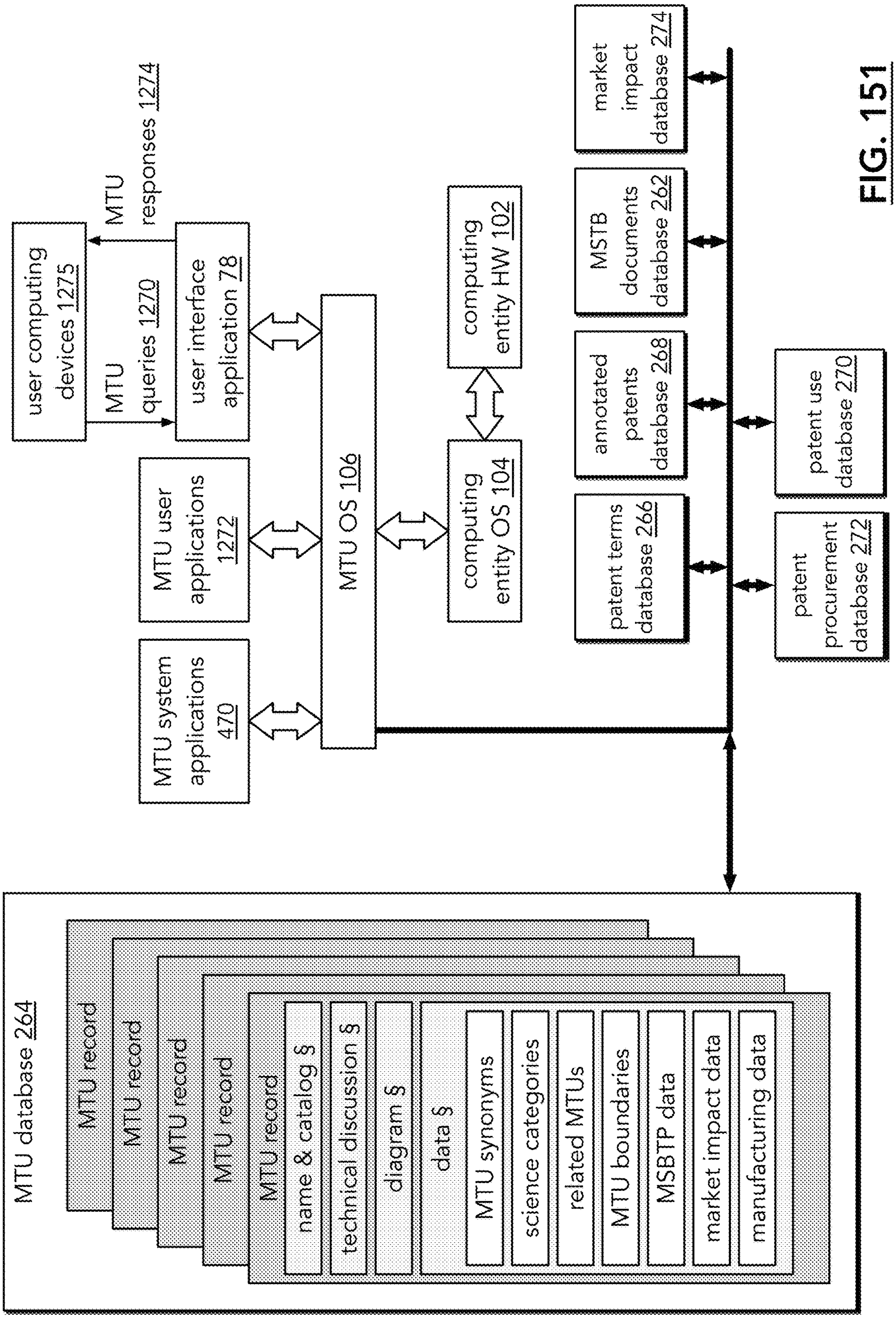
FIG. 151 is a schematic block diagram of a further embodiment of an improved computer for technology regarding use of MTU data records.

FIG. 151 is a schematic block diagram of a further embodiment of an improved computer for technology regarding use of MTU data records. The improved computer 70 is shown to include the user interface application 78, the computing entity hardware (HW) 102, the computing entity operating system (OS) 104, the MTU operating system (OS) 106, the MTU database 264, the MSBT database 262, the patent terms database 266, the annotated patent database 268, the patent use database 270, the patent procurement database 272, the market impact database 274, the MTU system applications 470, and the MTU user applications 1272.

The MTU OS 106 controls and manages the MTU system applications 470 access to the system databases 262-274 and controls and manages the MTU system applications 470 access to the computing entity OS 104. The MTU OS 106 also controls and manages the MTU user applications 1272 access to the system databases 262-274 and controls and manages the MTU user applications 1272 access to the computing entity OS 104. The MTU OS 106 further controls and manages the user interface application 78 access to the MTU user applications.

The computing entity OS 104 controls and manages the MTU system applications 470 (via the MTU OS 106) access to the computing entity hardware 102, controls and manages the MTU user applications 1272 (via the MTU OS 106) access to the computing entity hardware 102, and controls and manages the user interface application 78 (via the MTU OS 106) access the computing entity hardware 102.

User computing devices 1275 send MTU queries 1270 to the improved computer via the user interface application 78. For an authorized MTU query from an authorized and authenticated user computing device, the improved computer while executing the user interface application 78 selects one or more MTU user applications 1272 to process the MTU query. The improved computer executes the one or more MTU user applications 1272 via the computing entity hardware 102 under the control and management of the MTU OS 106 and the computing entity OS 104 to produce an MTU response 1274. The improved computer outputs the MTU response 1274 to the user computing device.

Figure 152:
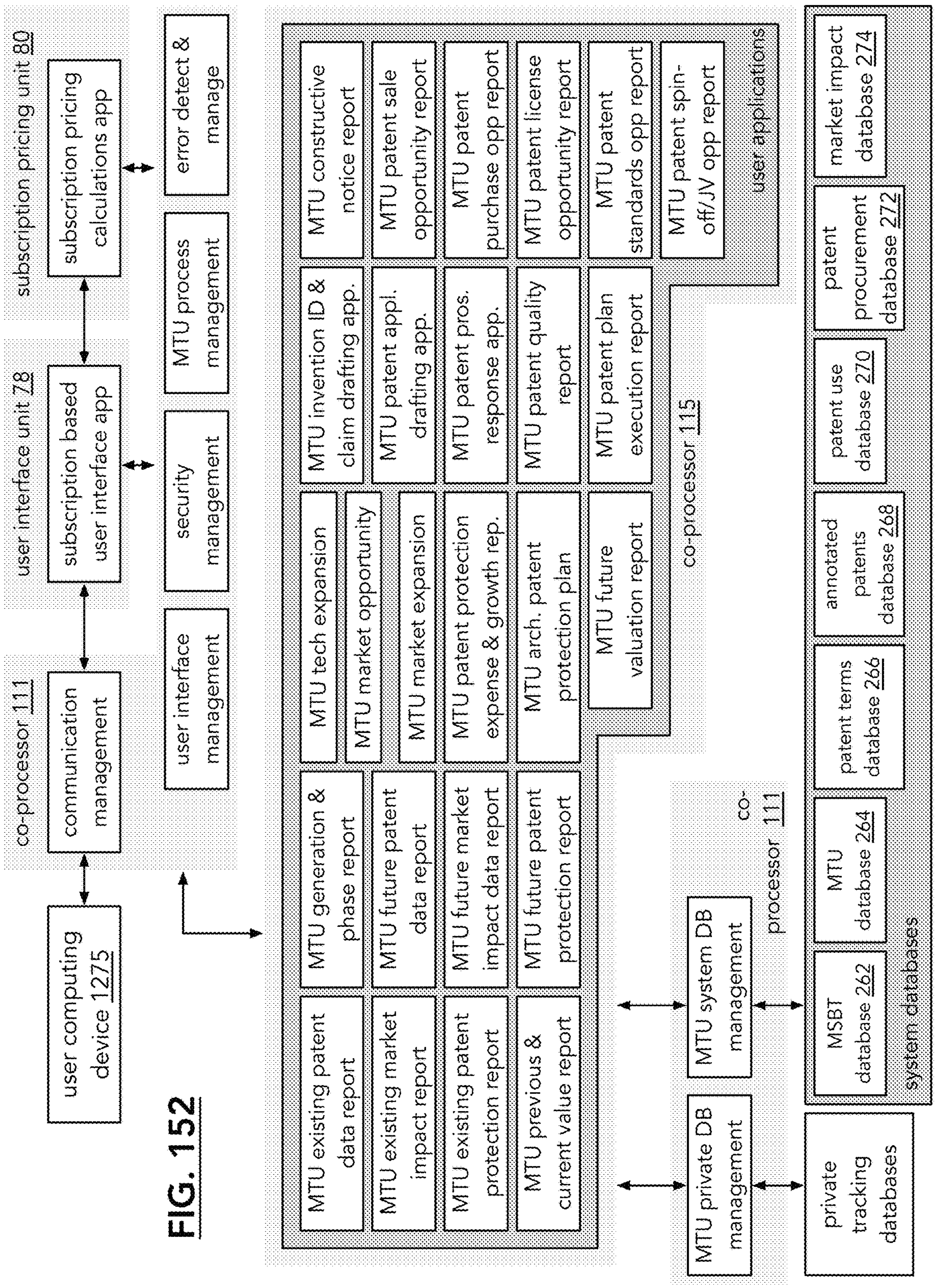
FIG. 152 is a schematic block diagram of a further embodiment of an improved computer for technology.

FIG. 152 is a schematic block diagram of a further embodiment of an improved computer for technology that is in communication with a user computing device 1275. The improved computer includes, in part, the system databases 262-274, co-processor 111 for executing MTU OS functions & computing entity OS functions, co-processor 115 for executing user applications, the user interface unit 78, and the subscription pricing unit 80. The MTU user applications include MTU generation and phase report, MTU existing patent data report, MTU existing market impact report, MTU existing patent protection report, MTU previous and current value report, MTU future patent data report, MTU future market impact report, MTU future patent protection report, MTU future value report, MTU technology expansion report, MTU market opportunity report, MTU expansion report, MTU patent protection expense & growth report, MTU architectural patent protection plan, MTU invention identification & claim drafting, MTU patent application drafting, MTU patent prosecution drafting, MTU patent quality reports, MTU patent protection plan execution tracking report, MTU constructive notice report, MTU patent sale opportunity report, MTU patent purchase opportunity report, MTU patent licensing opportunity report, MUT patent standards report, and MUT patent spin-off or joint venture (JV) opportunity report.

Figure 153:
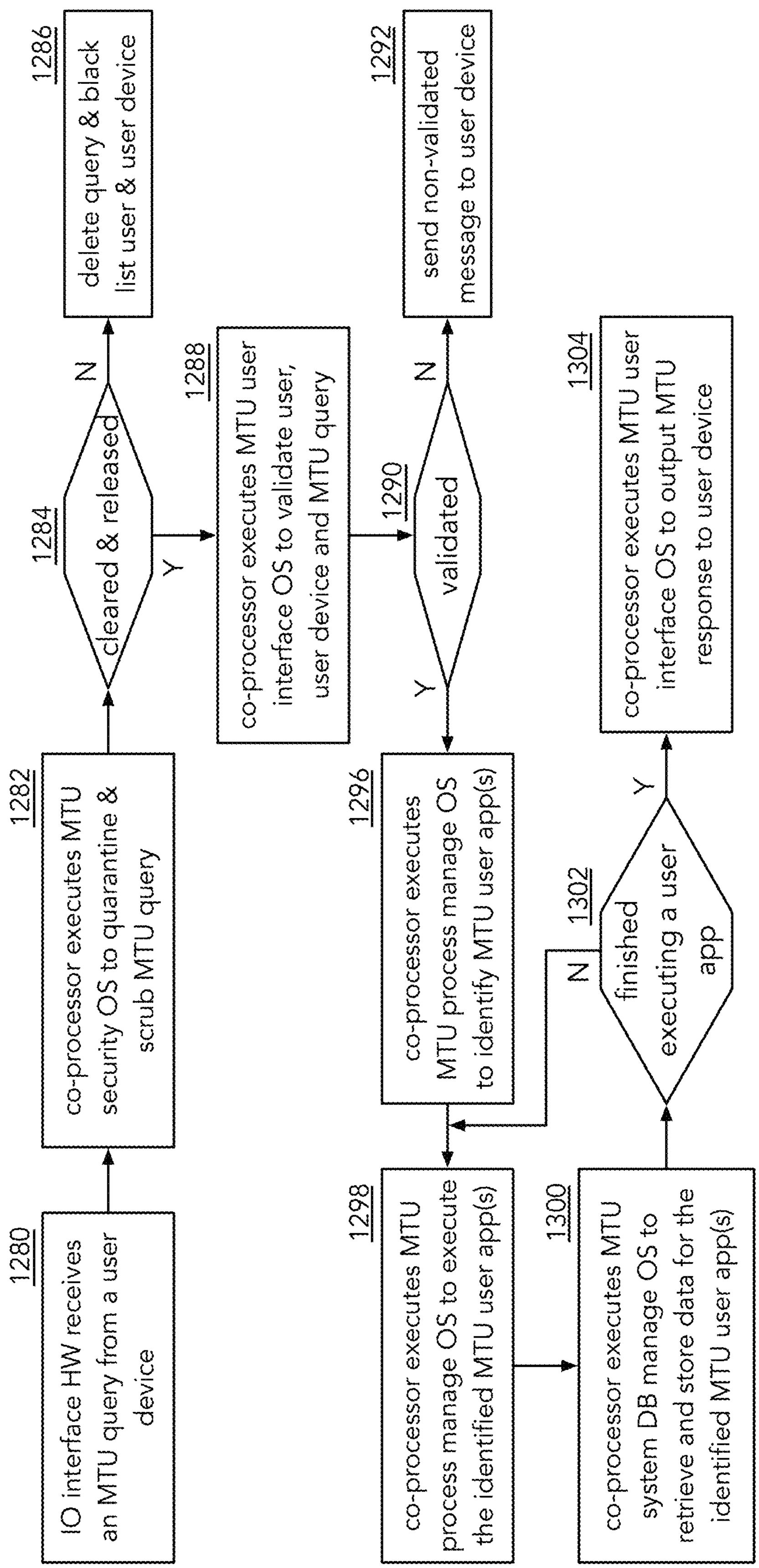
FIG. 153 is a logic diagram of an example of a method for accessing a market-tech unit (MTU) record from an MTU database by an MTU operating system of an improved computer for technology.

Examples of the improved computer executing one or more of the MTU user applications are discussed with reference to other figures herein. As an example, the improved computer executes the method of FIG. 153 which begins at step 1280 where the improved computer, via its 10 interface hardware receives an MTU query from a user computing device. The method continues at step 1282 where the improved computer, via a co-processor, executes the MTU security OS function to quarantine and scrub the query to ensure that the request does not include "bad actor" coding and that is from an authenticated user computing device (e.g., is the true user computing device and not a spoof).

The method continues at step 1284 where the improved computer determines whether the MTU query has been clear and should be released for further analysis. If no, the method continues at step 1286 where the improved computer deletes the query from quarantine, blacklists the user (e.g., bans the user from accessing the improved computer), and/or blacklists the user computing device (e.g., bans the user computing device from accessing the improved computer).

If the answer to step 1284 was yes, the method continues at step 1288 where the improved computer, via co-processor, executes the MTU user interface MTU OS function to valid the user, the user computing device, and the MTU query. For example, the improved computer verifies that the user has a valid account, verifies that the user computing device is registered to the user, and verifies that the user is authorized to make such an MTU query (e.g., the query is within the subscription of the user).

The method continues at step 1290 where the improved computer determines whether the user, the user computing device, and the MTU query have been validated. If not, the method continues at step 1292 where the improved computer sends a message to the user computing device indicating the query was not validated. If the cause for the query not being valid was an insufficient subscription, the improved computer includes the message the cost for obtaining a sufficient subscription to fulfill the query.

If the answer to step 1290 was yes, the method continues at step 1296 where the improved computer, via a co-processor, executes the MTU process management OS function to identified MTU user applications that are required to fulfill the MTU query. The method continues at step 1298 where the improved computer, via a co-processor, executes the MTU process management OS function to control and manage the processes of the identified MTU user applications.

The method continues at step 1300 where the improved computer, via a co-processor, executes the MTU system database management OS function to retrieve data as needed for the execution of the MTU user applications and to store data being generated by the MTU user applications. The method continues at step 1302 where the improved computer determines whether the execution of the MTU user applications is finished (i.e., have produced an MTU response). If not, the method repeats at step 1298. If yes, the method continues at step 1304 where the improved computer, via a co-processor, executes the MTU user interface OS function to output the MTU response to the user computing device.

Figure 154:
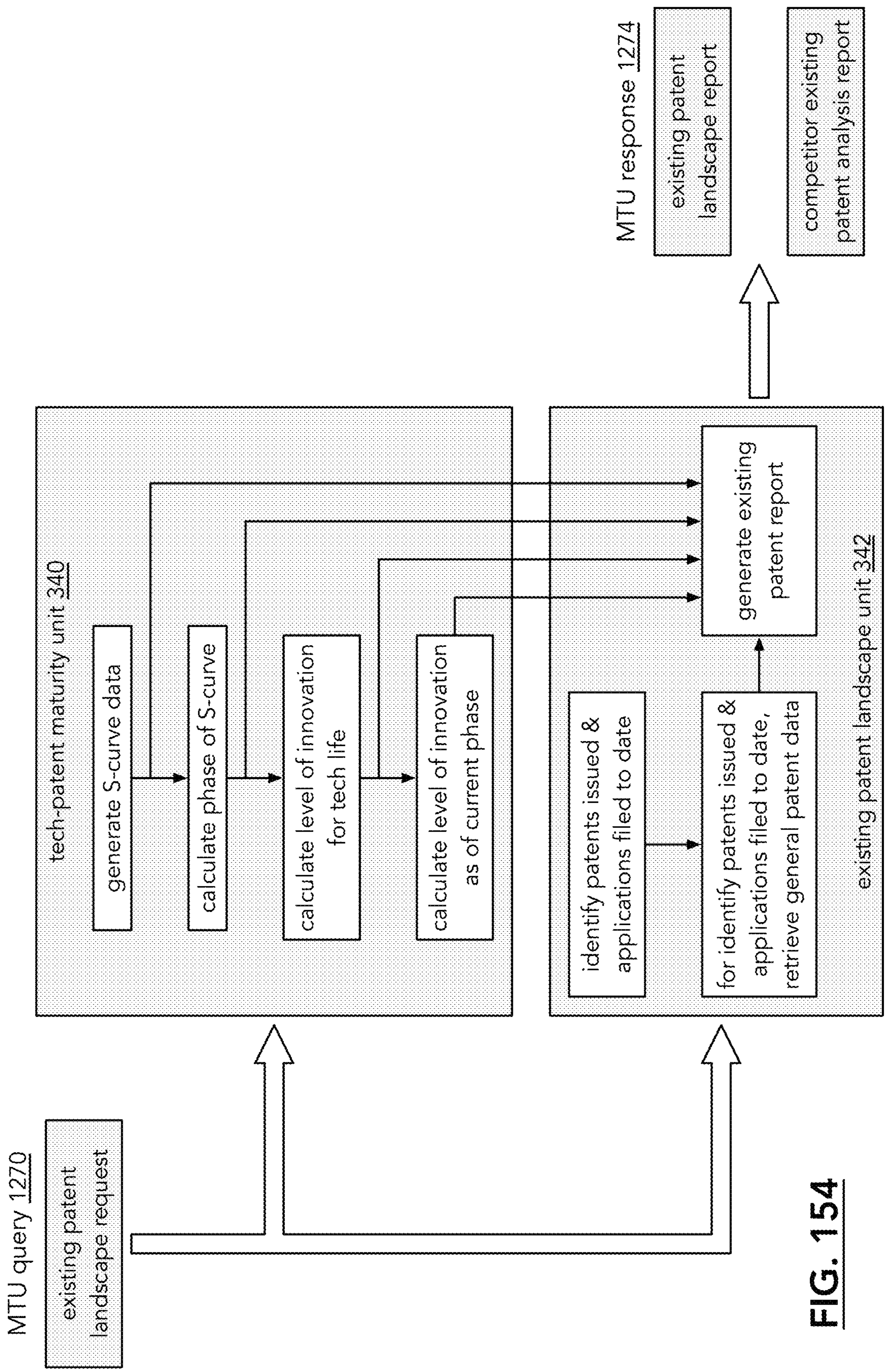
FIG. 154 is a schematic block diagram of a further embodiment of an improved computer for technology regarding generating of an existing patent landscape report for an MTU.

FIG. 154 is a schematic block diagram of a further embodiment of an improved computer for technology regarding generating of an existing patent landscape report for an MTU. In this figure, the improved computer receives an MTU query 1270 to generate a report for an existing patent landscape regarding a specified MTU, or MTUs. To prepare the report, the improved computer engages the tech-patent maturity unit 340 and the existing patent landscape unit 342.

The tech patent maturity unit 340 executes the MTU user application for producing a report regarding generation data and phase data for the MTUs. While executing this MTU user application, the tech patent maturity unit 340 generates S-curve data for each generation detected for the MTU. The unit 340 determines the start date of the current generation of the MTU, the time duration of the current generation and for each of its phase, and the time that has passed since the start date. From this information, the unit determines the current phase, the time remaining the current phase, and the time remaining before end of life.

The unit 340 calculates a level of innovation for the life of the MTU. To do this, the unit calculates the total number of inventions likely to be created over the life of the current generation of the MTU. The unit 340 also calculates a total number of invention types to created based on the total number of inventions and MSBTP (marketing, sales, business, technical, and patents) data. From this data, the unit 340 determines the total number of inventions that should have been created to date and the corresponding numbers for invention types. Examples of this are discussion in preceding and/or subsequent figures.

The existing patent landscape unit 342 identifies MTU related patents that have issued to date and MTU related patent applications have been filed to date and are publicly available. In this instance, related means patents and patent applications have an MTU classification of the MTU. For the MTU related issued patents and patent applications, the unit 342 retrieves general patent data (e.g., patent holder information, filing date, title, general description, etc.)

The unit 342 generates the existing patent landscape report for the MTU based on the retrieved patent data, the S-curve data, the phase of the S-curve data, the level of innovation data, and the level of innovation to date data. To do this, the unit 342 maps invention quantities per time of the existing patents and patent applications to the S-curve.

The unit 342 generates the existing patent landscape report as an MTU response 1274 to the MTU query. The landscape reports includes the above data organized in the aggregate, by patent holder, by invention type, by year, by phase, etc. From the existing patent landscape report, the data of a particular patent holder can be extracted to produce a competitor existing patent analysis report.

Figure 155:
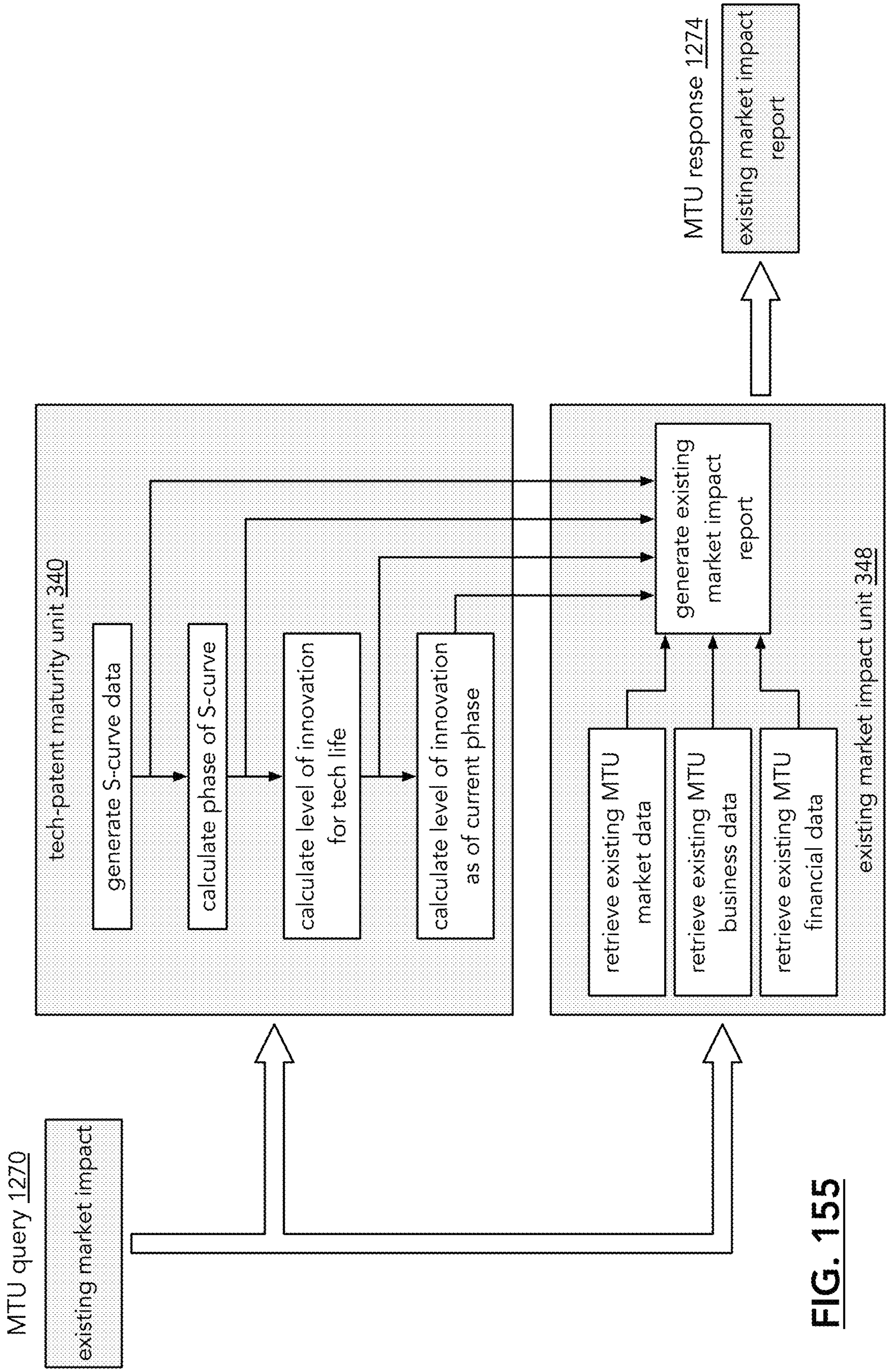
FIG. 155 is a schematic block diagram of a further embodiment of an improved computer for technology regarding generating of an existing market impact report for an MTU.

FIG. 155 is a schematic block diagram of a further embodiment of an improved computer for technology regarding generating of an existing market impact report for an MTU. In this figure, the improved computer receives an MTU query 1270 to generate a report for existing market impact regarding a specified MTU, or MTUs. To prepare the report, the improved computer engages the tech-patent maturity unit 340 and the existing market impact unit 348. The tech-patent maturity unit 340 operates as discussed in the preceding figure.

The market impact unit 348 retrieves existing market data regarding the MTU, existing business data regarding the MTU, and exiting financial data regarding the MTU. From this data and the data from unit 340, the unit 348 generates the existing market impact report as an MTU response 1274. Examples of this are discussed in preceding and/or subsequent figures.

Figure 156:
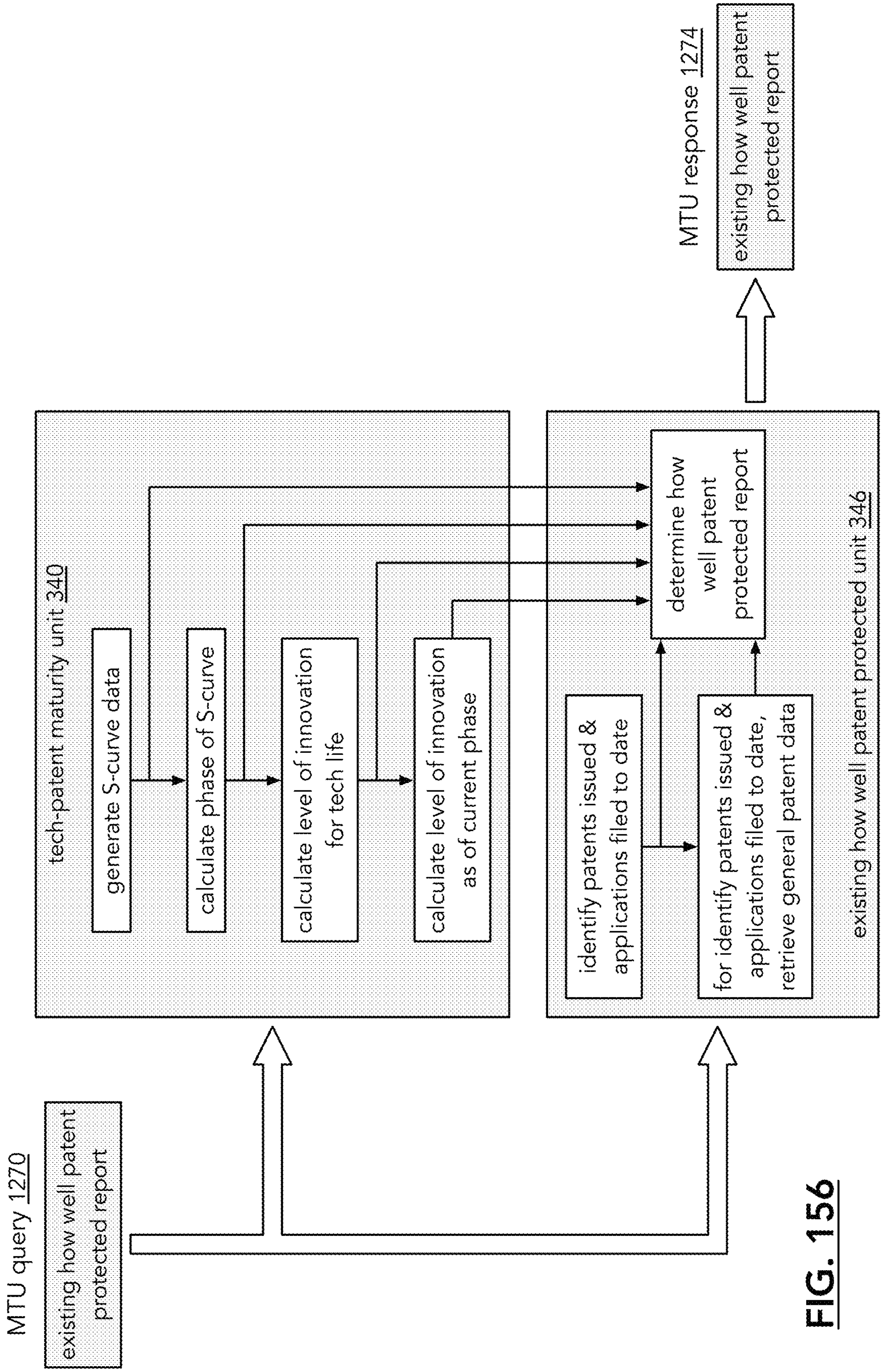
FIG. 156 is a schematic block diagram of a further embodiment of an improved computer for technology regarding generating of a report regarding how well an MTU is protected by existing patents and existing inventions.

FIG. 156 is a schematic block diagram of a further embodiment of an improved computer for technology regarding generating of a report regarding how well an MTU is protected by existing patents and existing inventions. In this figure, the improved computer receives an MTU query 1270 to generate a report for how well existing inventions are patent protected for a specified MTU, or MTUs. To prepare the report, the improved computer engages the tech-patent maturity unit 340 and the existing how well patent protected unit 346. The tech-patent maturity unit 340 operates as discussed in the preceding figure.

The unit 346 identifies issued and pending patent applications regarding the MTU have been filed and/or issued to date. The unit 346 retrieves patent data for the identified existing patents and applications. The unit 346 compares the number of existing inventions that have been patent protection to the number inventions that could have been patent protected to date to determine a level of patent protection proficiency to date. The level of patent protection proficiency is basically a measure of how many of the total number of inventions that could have been patent protected to date have actually been patent protected.

The unit 346 also performs a patent quality analysis of the existing patents and patent applications. The quality of an issued patent or pending patent application is based on the ability to clearly identify the patent disclosure categories of problem set up, solution & novelty nuggets, technical description, benefit of solution, technical environment, use of the invention, and patent law interpretation.

From the above data, the unit 346 determines how well the MTU has been patent protected to date. Examples of this are discussed in preceding and/or subsequent figures.

Figure 157:
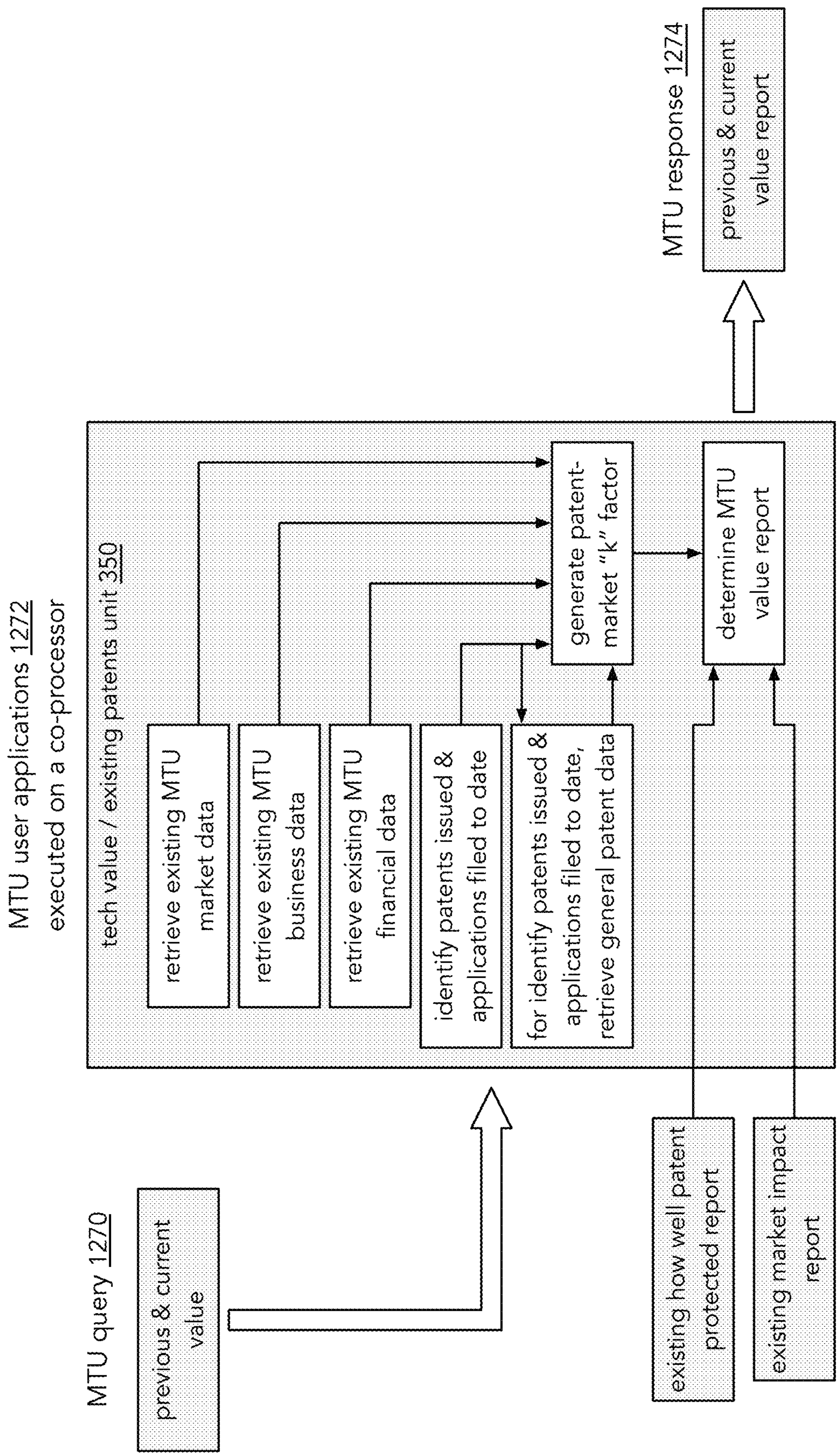
FIG. 157 is a schematic block diagram of a further embodiment of an improved computer for technology regarding generating of a report regarding value of an MTU based on existing patents and inventions reports.

FIG. 157 is a schematic block diagram of a further embodiment of an improved computer for technology regarding generating of a report regarding value of an MTU based on existing patents and inventions reports. In this figure, the improved computer receives an MTU query 1270 to generate a report regarding the existing value of a specified MTU, or MTUs. To prepare the report, the improved computer engages the tech/value patents unit 350.

The unit 350 calculates the value of an MTU based on the market impact of the MTU, how well the MTU is patent protected, and a market-patent "k" factor. The market impact data and the how well patent protected data are pulled from the previous report.

The unit 350 the "k" factor is a measure of how heavily market differentiators depend on technology. The more important technology is to differentiate products in the marketplace, the higher the "k" factor. To calculate the "k" factor, the unit 350 retrieves market data, business data, and financial data regarding the MTU. The unit 350 also retrieves patent data regarding the MTU.

From the above data, the unit 350 determines the existing value of the MTU. Examples of this are discussed in preceding and/or subsequent figures.

Figure 158:
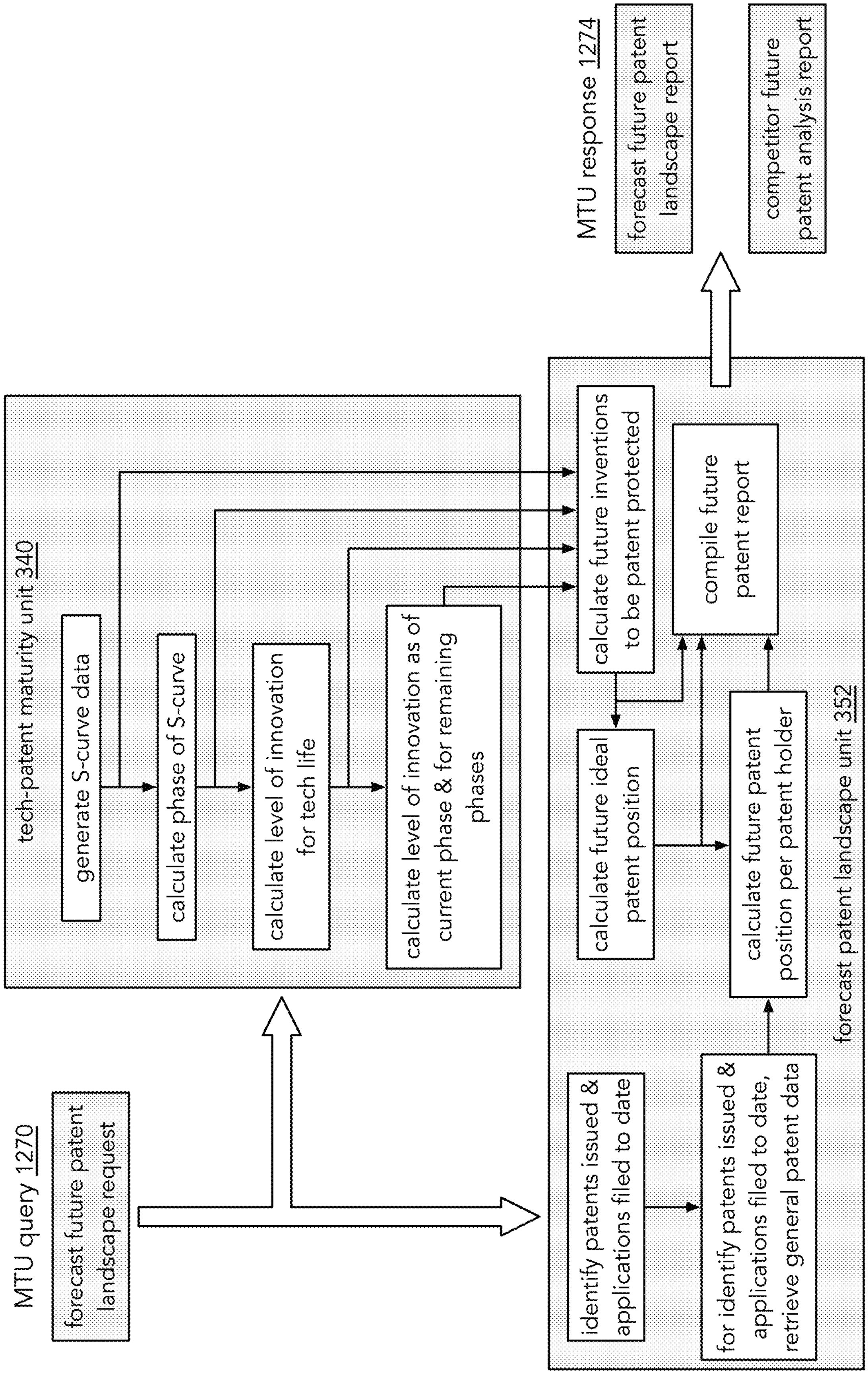
FIG. 158 is a schematic block diagram of a further embodiment of an improved computer for technology regarding generating of a forecasted future patent landscape report for an MTU.

FIG. 158 is a schematic block diagram of a further embodiment of an improved computer for technology regarding generating of a forecasted future patent landscape report for an MTU. In this figure, the improved computer receives an MTU query 1270 to generate a report for a future forecasted patent landscape regarding a specified MTU, or MTUs. To prepare the report, the improved computer engages the tech-patent maturity unit 340 and the forecast patent landscape unit 352.

The tech patent maturity unit 340 executes the MTU user application for producing a report regarding generation data and phase data for the MTUs. While executing this MTU user application, the tech patent maturity unit 340 generates S-curve data for each generation detected for the MTU. The unit 340 determines the start date of the current generation of the MTU, the time duration of the current generation and for each of its phase, and the time that is remaining until the end of life. From this information, the unit determines the current phase, the time remaining the current phase, and the time remaining before end of life.

The unit 340 calculates a level of innovation for the life of the MTU. To do this, the unit calculates the total number of inventions likely to be created over the life of the current generation of the MTU. The unit 340 also calculates a total number of invention types to created based on the total number of inventions and MSBTP (marketing, sales, business, technical, and patents) data. From this data, the unit 340 determines the total number of inventions that should be created from now to the end of life and the corresponding numbers for invention types. Examples of this are discussion in preceding and/or subsequent figures.

The forecast patent landscape unit 352 identifies MTU related patents that have issued to date and MTU related patent applications have been filed to date and are publicly available. In this instance, related means patents and patent applications have an MTU classification of the MTU. For the MTU related issued patents and patent applications, the unit 352 retrieves general patent data (e.g., patent holder information, filing date, title, general description, etc.)

From the data from unit 340, the unit 352 calculates the number of inventions that should be invented from the present data to the end of life of the MTU. The unit 352 also calculates the future ideal patent position.

From the retrieved patent data and the above calculated data, the unit 352 generates the forecasted future patent landscape report as an MTU response 1274. The landscape reports includes the above data organized in the aggregate, by patent holder, by invention type, by year, by phase, etc. From the forecasted future patent landscape report, the data of a particular patent holder can be extracted to produce a competitor existing patent analysis report.

Figure 159:
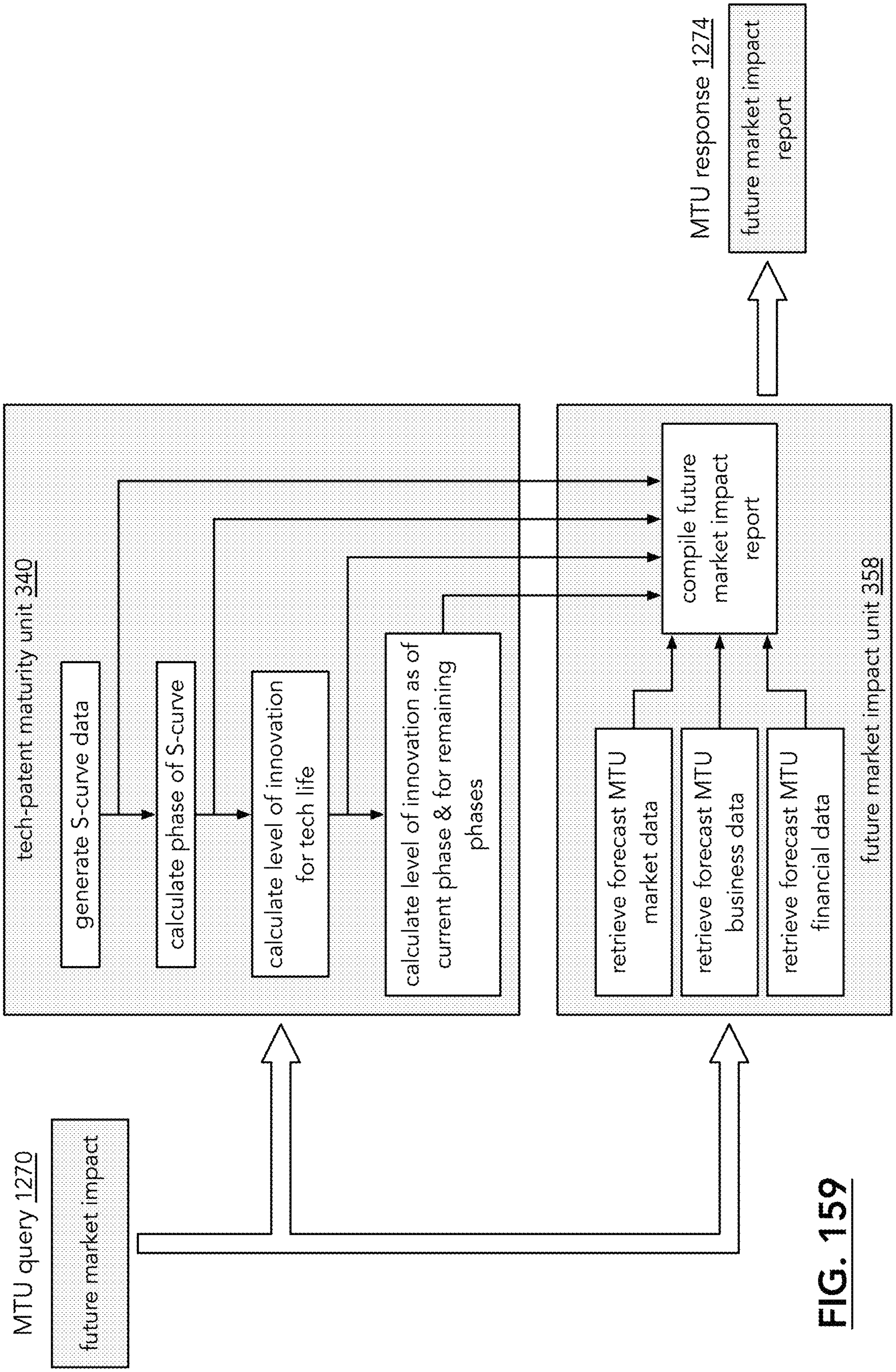
FIG. 159 is a schematic block diagram of a further embodiment of an improved computer for technology regarding generating of a forecasted future market impact report for an MTU.

FIG. 159 is a schematic block diagram of a further embodiment of an improved computer for technology regarding generating of a forecasted future market impact report for an MTU. In this figure, the improved computer receives an MTU query 1270 to generate a report for future market impact regarding a specified MTU, or MTUs. To prepare the report, the improved computer engages the tech-patent maturity unit 340 and the future market impact unit 358. The tech-patent maturity unit 340 operates as discussed in the preceding figure.

The market impact unit 358 retrieves future market data regarding the MTU, future business data regarding the MTU, and future financial data regarding the MTU. From this data and the data from unit 340, the unit 358 generates the future market impact report as an MTU response 1274. Examples of this are discussed in preceding and/or subsequent figures.

Figure 160:
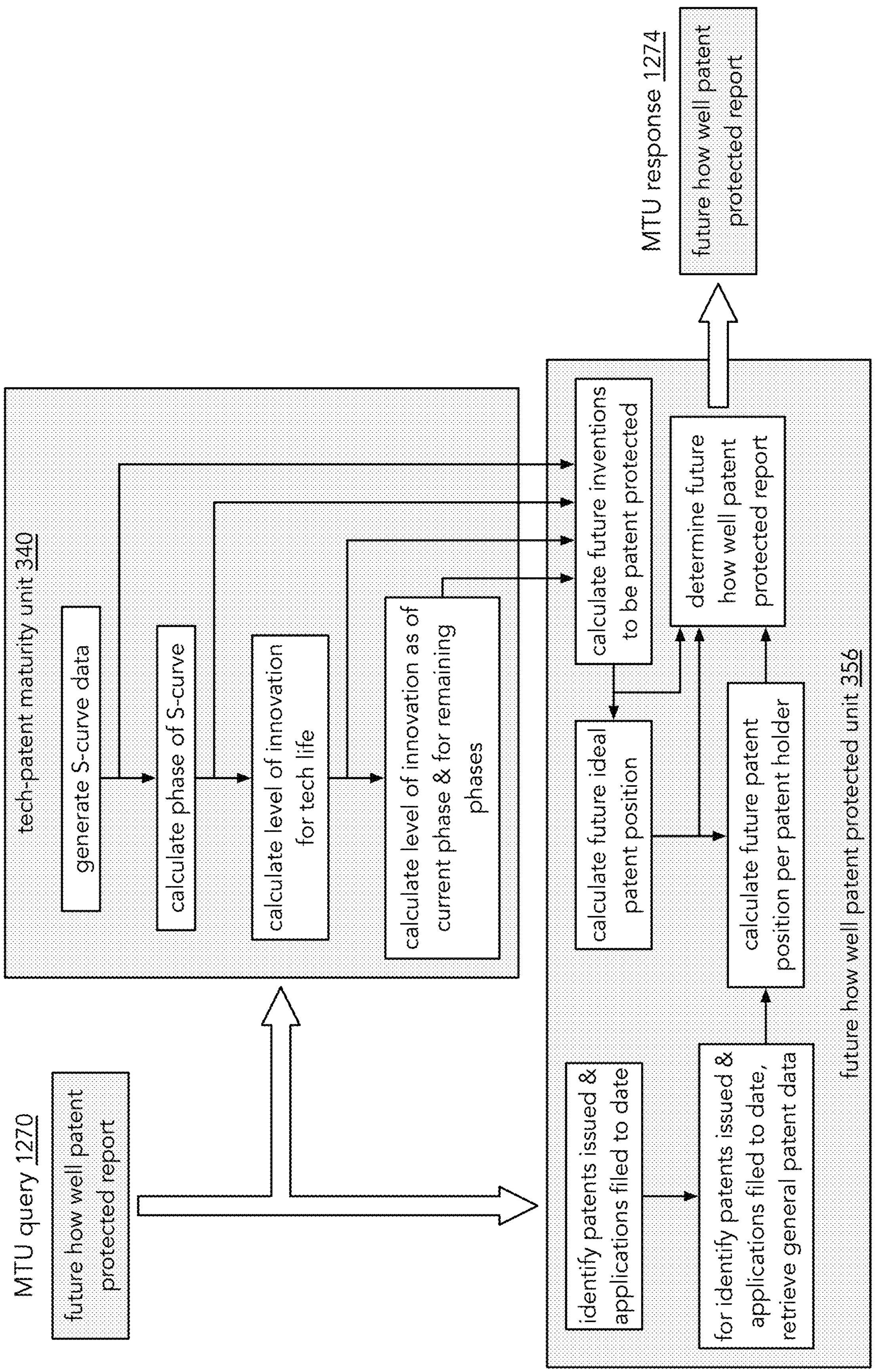
FIG. 160 is a schematic block diagram of a further embodiment of an improved computer for technology regarding generating of a report regarding how well an MTU is protected by forecasted future patents and existing inventions.

FIG. 160 is a schematic block diagram of a further embodiment of an improved computer for technology regarding generating of a report regarding how well an MTU is protected by forecasted future patents and existing inventions. In this figure, the improved computer receives an MTU query 1270 to generate a report for how well future inventions are likely to be patent protected for a specified MTU, or MTUs. To prepare the report, the improved computer engages the tech-patent maturity unit 340 and the future how well patent protected unit 356. The tech-patent maturity unit 340 operates as discussed in the preceding figure.

The unit 356 identifies issued and pending patent applications regarding the MTU have been filed and/or issued to date. The unit 356 retrieves patent data for the identified existing patents and applications. The unit 356 compares the number of future inventions that are likely to be patent protection to the total number inventions that are likely to be created in the future to determine a level of future patent protection proficiency.

The unit 356 also performs a patent quality estimate of future patents and patent applications. From this data and the above data, the unit 356 determines how well the MTU has been patent protected to date. Examples of this are discussed in preceding and/or subsequent figures.

Figure 161:
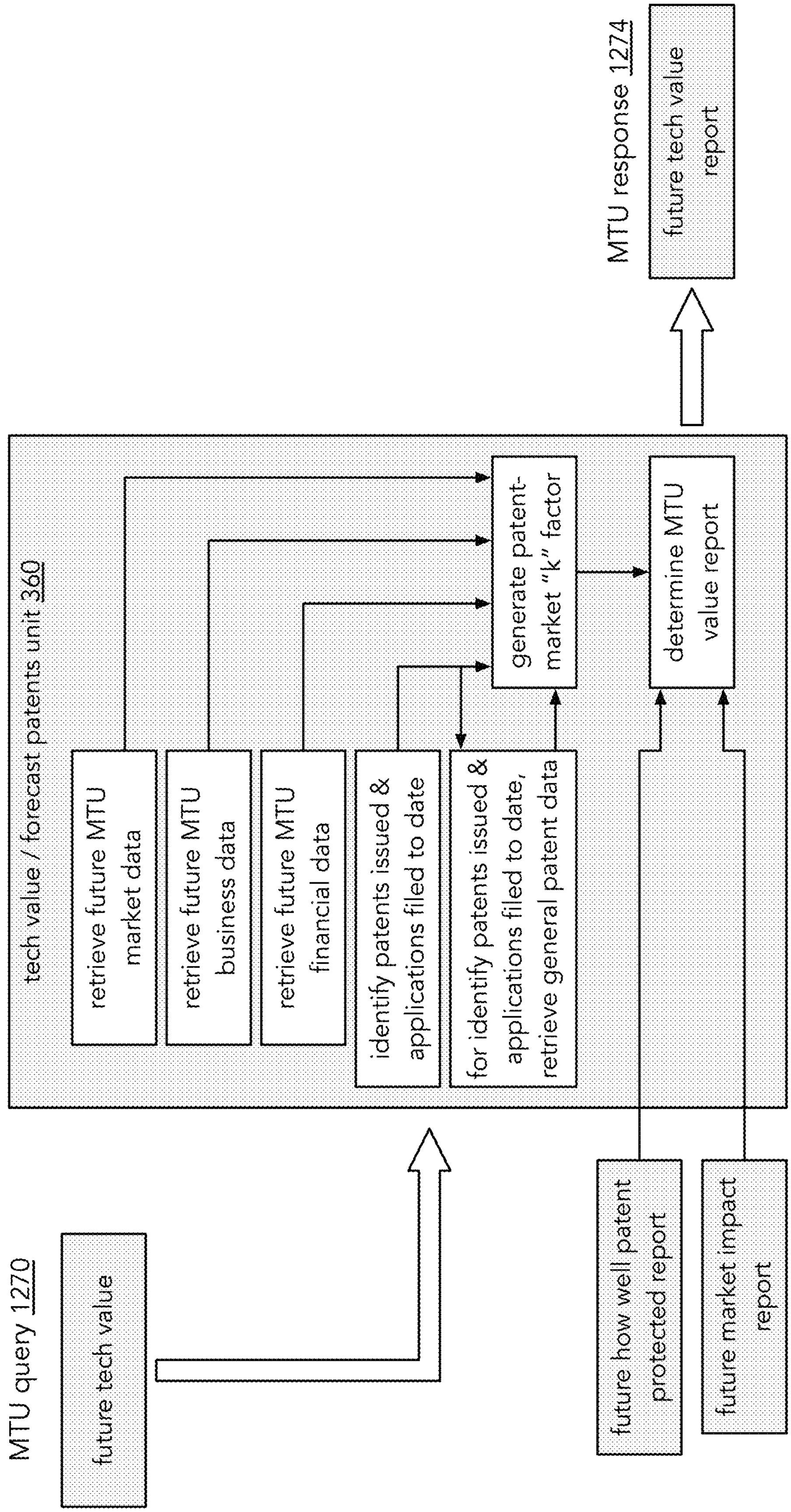
FIG. 161 is a schematic block diagram of a further embodiment of an improved computer for technology regarding generating of a report regarding value of an MTU based on existing patents and inventions reports.

FIG. 161 is a schematic block diagram of a further embodiment of an improved computer for technology regarding generating of a report regarding value of an MTU based on existing patents and inventions reports. In this figure, the improved computer receives an MTU query 1270 to generate a report regarding the future value of a specified MTU, or MTUs. To prepare the report, the improved computer engages the tech/value forecast patents unit 360.

The unit 360 calculates the future value of an MTU based on the future market impact of the MTU, the future how well the MTU is patent protected, and the market-patent "k" factor. The future market impact data and the future how well patent protected data are pulled from the previous report. The "k" factor is calculated as previously discussed. From this data, the unit 360 determines the existing value of the MTU. Examples of this are discussed in preceding and/or subsequent figures.

Figure 162:
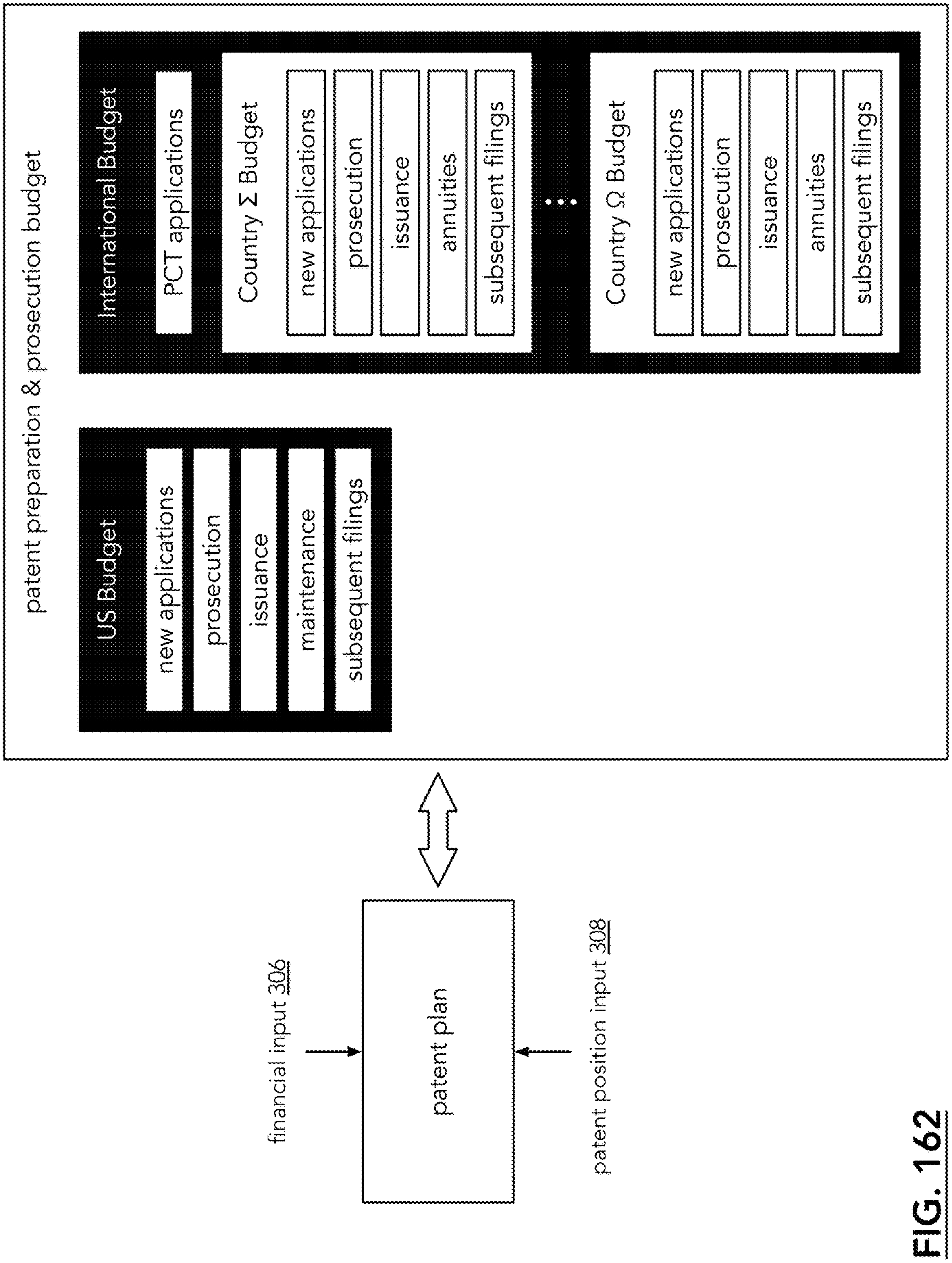
FIG. 162 is a schematic block diagram of an example of interaction between a patent plan and a budget as processed by an improved computer for technology.

FIG. 162 is a schematic block diagram of an example of interaction between a patent plan and a budget as processed by an improved computer for technology. In a conventional patent process, the patent preparation and prosecution budget is governed by an annual, budget-based, patent plan. Such a patent plan partitions the annual budget into domestic (e.g., U.S.) expenses and international expenses. The expenses include patent application preparation expenses, patent prosecution expenses, patent issuance expenses, patent annuity expenses for international patents, and maintenance expenses for U.S. patents. The number of new U.S. patent applications is a function of the patent budget allocated for U.S. patent application preparation expenses divided by the average per U.S. patent application preparation cost.

The number of new international patent applications is a function of the patent budget allocated for international patent application preparation expenses divided by the average per international patent application preparation cost, which is further divided by the number of countries the patent application will be filed in.

With an annual target patent filing number that is established based on an annual budget, a patent committee renders its decisions to fill the numbers quota based on individual merits of the invention and a resulting patent (i.e., can it be used as a bullet for litigation). The decision is not based on the market impact of the technology, a desired patent position for the technology, and/or how a patented invention supports the market impact and/or desired patent position. This leads to an unfocused patent portfolio that omits too many valuable inventions.

In contrast, the re-engineered patent process executed by the new computer for technology (as described in more detail with reference to one or more of the previous Figures) develops a patent business plan (i.e., patent plan) based on Market-Tech Units (MTUs) in order to maximize the value of patented technology. While the budget shown includes the same format (e.g., partitioning the annual budget into U.S. expenses and international expenses) as conventional processing, the way the budget is determined with respect to the re-engineered patent process is substantially different.

In the re-engineered patent process, the patent plan includes a patent budget (e.g., a total spend for patents for a time period), technology boundaries (e.g., technology classes and sub-classes), and balance objectives. The patent plan identifies targeted inventions and filing decisions for a patent portfolio based on patent data, forecasting, data analysis, and user input as discussed in more detail with reference to at least FIG. 22. The user inputs are adjustable and include a financial input 306 and a patent position input 308. The financial input 306 is a desired financial commitment for developing the patent portfolio over a period of time (e.g., a quarter, a year, two years, seven years, etc.) and the patent position input 308 is a desired patent position with respect to others.

The financial input 306 is adjusted based on the market impact of one or more market-technology areas of the portfolio and the patent ROI. For example, a market-technology area that has a large market impact may require a larger financial commitment to adequately protect technology and secure a desired patent ROI.

The patent position input 308 ranges from weak to superior on a sliding scale (e.g., a numerical scale where 1 corresponds to weak and 10 corresponds to superior). A superior patent position corresponds to a very high probability of a favorable outcoming in a patent dispute involving the quantified technology. A weak patent position corresponds to a very high probability of an unfavorable outcoming in a patent dispute involving the quantified technology. A superior patent position includes actual inventions patent protected in the range of 35% to 80% of the ideal number of inventions. With a superior patent portfolio, the patent holder would be able to grow and protect its market share, would be able to control who participates in the market and would be able to determine what's the cost of entry into the market. A superior patent protection thus correlates to having a better patent position with respect to all others in the market.

A superior patent position is not just a sheer numbers game. A superior patent position is achieved by creating a patent portfolio that is balanced, has broad technology boundaries, and has no weaknesses. As such, a medium patent position is less balanced, has less broad technology boundaries, and has more weaknesses than a superior patent position and a weak patent position is not balanced, has narrow technology boundaries, and has many weaknesses.

In this example, a patent preparation and prosecution budget is shown. Patent use (e.g., licensing and litigating) may be a separate budget or a separate component of the overall patent budget. From the financial input (e.g., desired spend) and the desired patent position per MTU, the patent plan estimates where and how money will be allocated within a patent preparation and prosecution budget. The patent preparation and prosecution budget includes a domestic budget (e.g., U.S. budget) and an international budget. The U.S. budget includes a budget for new applications, prosecution, issuance, maintenance, and subsequent filings. New applications include provisional applications and non-provisional applications (e.g., utility, design, and plant applications). New applications may include legal placeholder inventions (LPIs) that are filed at an additional cost to the base application fee (e.g., a bundle application). The budget for new applications includes estimated legal service fees (e.g., preparing and filing the application) and government filing fees. Prosecution includes office action responses, notice of appeals, appeal briefs, requests for continued examination (RCE), examiner interviews, and other communication with the Patent Office during the prosecution of a patent. The budget for prosecution includes the includes estimated legal service fees (e.g., preparing and filing responses) and government filing fees.

The issuance budget includes estimated government issue fees and associated legal service fees for issuing patents. The maintenance budget includes estimated maintenance fees and associated legal service fees to keep patents in force (e.g., paid at around 3, 7, and 11 years after the issue date of a patent). Maintenance fees are not required for design or plant patents. Subsequent filings include continuation applications, continuation-in-part applications, and divisional applications. A special type of continuation application to claim out an LPI is a LPI conversion application (also referred to herein as a legal placeholder conversion (LPC) application) and may be at a different billing rate than a traditional continuation. The budget for subsequent filings includes estimated legal service fees (e.g., preparing and filing the subsequent application) and government filing fees. From the amount of new applications filed and to be filed, the new computer for technology is operable to estimate costs and quantities of prosecution, issuance, maintenance, and subsequent filings.

The international budget includes a budget for Patent Cooperation Treaty (PCT) applications and budgets for each selected country (e.g., Country Σ through Country Ω) where applications are filed at the national stage (via the PCT route or directly). A PCT application makes it possible to seek patent protection for an invention simultaneously in a large number of countries by filing a single "international" patent application instead of filing several separate national or regional applications. The budget for each country includes a budget for new applications, prosecution, issuance, annuities, and subsequent filings. The budget for each new application, prosecution, issuance, annuities, and subsequent filings is similar to that of the U.S. budget, except that for international filings, annuities (similar to maintenance fees) are yearly fees paid to a foreign patent office to maintain a granted patent or patent application in force. At the time of the filing of this application, official fees for annuities (also referred to as renewal fees) can range from $200-$2000 per country per year. The longer a patent holder wanted to keep their patent in force, the higher the official fee is per year.

Therefore, the patent plan and the budget are adjustable based off of patent portfolio growth goals and financial constraints. By adjusting the budget, the patent plan may be adjusted (e.g., the patent position may be reduced to accommodate a lower budget). Likewise, by adjusting the patent plan, the budget may be adjusted (e.g., a more superior patent position may require a larger budget). By conducting detailed expense and growth estimation, a client can see the greater picture of their choices and goals (e.g., instead of looking at a patent budget on a yearly basis without strategic portfolio growth goals in mind). With this information, adequate funding can be secured and planning can commence.

FIG. 163 is a diagram of an example of fees associated with patent protecting an MTU as used by the improved computer for technology. FIG. 163 shows legal service fees (e.g., U.S. attorney fees) and government filing fees (e.g., U.S. government fees) for patent preparation and prosecution used to determine the patent preparation and prosecution budget of FIG. 162.

The U.S. attorney fees data fields include a name of the service and the rate, either fixed fee or hourly rate. Where hourly rates apply, another field may include a type of practitioner (e.g., associate, partner, paralegal, etc.) and their corresponding billing rate. The services listed include prepare and file a provisional application, prepare and file a non-provisional application, prepare and file a legal placeholder invention (LPI), prepare and file a PCT application, prepare and file a continuation application, prepare and file a continuation-in-part application, prepare and file a divisional application, prepare and file a legal placeholder invention (LPI) conversion application, prepare and file a provisional conversion application, prepare and file a design application, prepare and file an office action response, prepare and file de minimus office action response, prepare and file restriction response, issuance processing, annuity processing, maintenance fee processing, and portfolio management fee. More or less services may exist depending upon the services offered. The hourly and/or fixed fees may be entered by user input in accordance with a particular patent firm's fee structure, automatically input based on average fees in a particular region (e.g., the U.S.), and/or be set by default settings.

The U.S. government fees include a name of the item and the size of the entity that is filing the item (e.g., micro, small, or large, where the size of the entity may dictate the fee). Government fee structures and entity classifications may vary in different countries. The names of items include a provisional application filing, a non-provisional application filing, a PCT application filing, a design application filing, an examination request, an issuance, annuities #1-#x (e.g., depending on the year, country, etc.), and maintenance fees #1-#x (e.g., depending on the year). The micro, small, and large fees may be automatically and/or manually input based on the current fees charged by a government entity (e.g., the U.S. Patent Office). The new computer for technology is operable to continually update the fee structure and items in accordance with newly ingested data.

Figure 164:
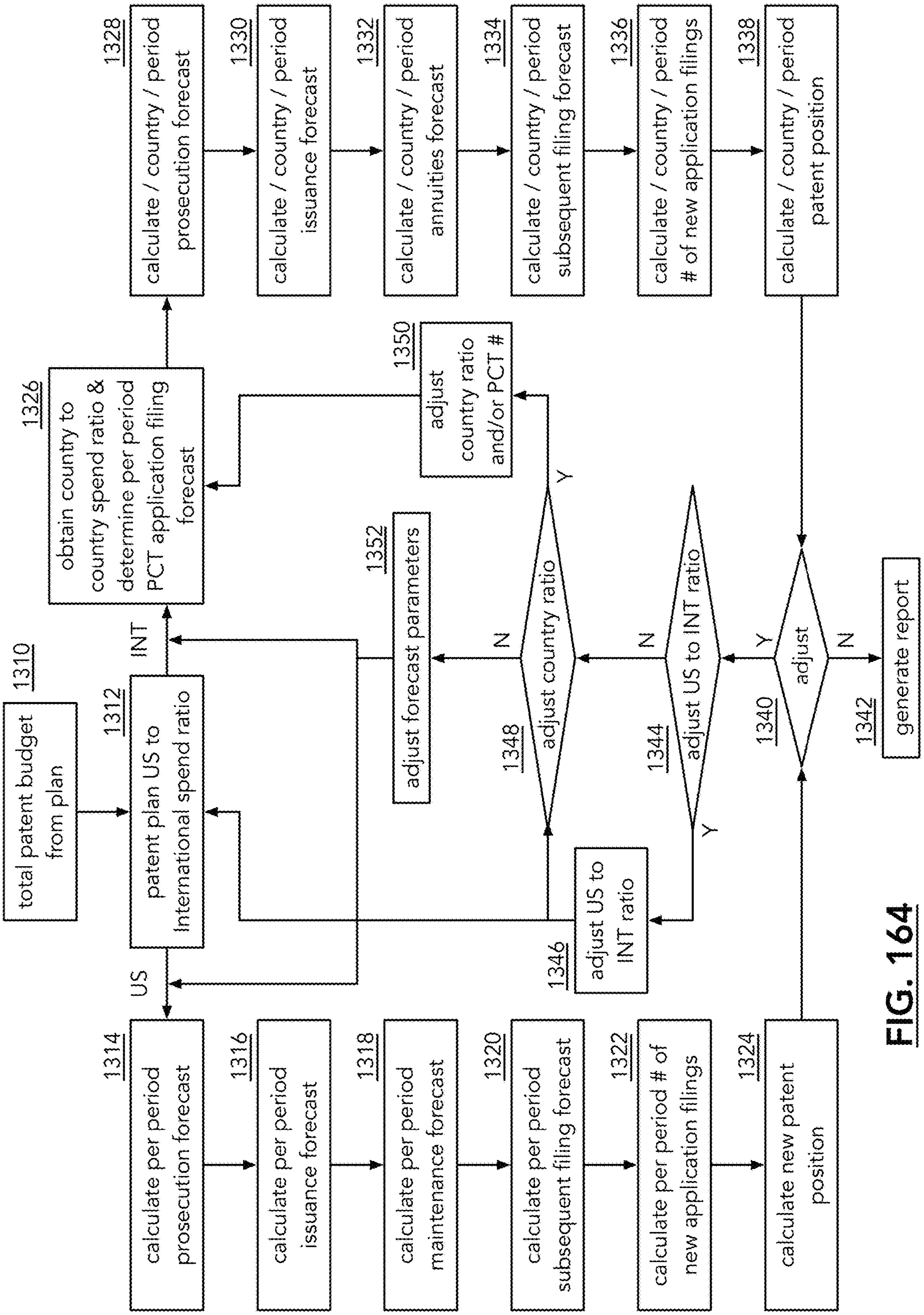
FIG. 164 is a logic diagram of an example of a method for balancing patent spend and desired patent position for a plan to patent protect an MTU (market-tech unit) by a growth and expense co-processor of an improved computer for technology.

FIG. 164 is a logic diagram of an example of a method for balancing patent spend and desired patent position for a plan to patent protect an MTU (market-tech unit) by a growth and expense co-processor of an improved computer for technology. In the method shown, the primary driver in determining a patent preparation and prosecution plan is a total patent budget from the patent plan (i.e., determining what patent portfolio is possible with a particular spend). The growth and expense co-processor is operable to ingest hundreds to thousands of records and factor in dozens of variables to determine detailed patent preparation and prosecution forecasting and expenses. Such processing is not operable to be done solely by the human mind (e.g., it requires artificial intelligence and/or a computer). The method begins with step 1310 where a total patent budget regarding one or more time periods (e.g., 6 years) is determined from a patent plan. The total patent budget is determined by a desired financial commitment and a desired patent position as discussed with reference to FIG. 162.

The method continues with step 1312 where a patent plan domestic (e.g., U.S.) to international spend ratio is determined. Determining the extent of international patent protection for technology is challenging. The challenge is balancing the cost of obtaining foreign national patents and their business value with respect to obtaining U.S. patents and their business value. As in the U.S., desired use of patents and market impact of your patent protected technology drive the quantity and types of patents to seek in other countries. While desired use of patents may be the same domestically and internationally, in practice, the actual uses are quite different.

With respect to patent litigation, if a U.S. company can sue a potential infringer in the U.S. or in a foreign country, it will almost always sue in the U.S. because it is much more costly to litigate a patent infringement lawsuit in a foreign country as compared to the U.S. Further, it is far more convenient to file in the U.S. than in a foreign country by eliminating foreign travel and the need for foreign counsel. U.S. Courts are also much more likely to render an impartial decision based on patent laws than most other foreign courts.

For most multi-national companies, the U.S. accounts for a significant portion of their business. Thus, a U.S. patent portfolio provides substantial leverage in coming to an acceptable resolution. Litigation is often used as pressure to execute a licensing agreement between the parties. As such, filing in the U.S. is a convenient and economical approach. With respect to licensing, a U.S. company typically determines the value of a licensing deal with a foreign company based on its U.S. patent portfolio and then increases a U.S. licensing rate by a relatively small amount (e.g., 0.5%) to establish a worldwide licensing rate.

With the actual uses being substantially different in the U.S. than in foreign countries for a U.S. company, it is beneficial to develop a patent portfolio to substantially favor U.S. patents over foreign national patents. In essence, developing the U.S. portion of the patent portfolio creates market leverage and developing the foreign international of the patent portfolio provides strategic, additional, and/or alternative assertion, licensing, and/or partnering options. From this philosophical viewpoint, an analytical approach is used to establish the patent plan U.S. to international spend ratio.

The method continues with steps 1314 (for U.S. patent preparation and prosecution budget determination) and 1326 (for international patent preparation and prosecution budget determination). At step 1314, the per period prosecution forecast is calculated. The per period prosecution forecast is calculated based on the probability of the occurrence of U.S. prosecution matters (e.g., office actions, appeal briefs, restriction responses, etc.) over a designated time period (e.g., a quarter, a year, 5 years, 7 years, etc.). For example, the probability of U.S. prosecution matters can be calculated for each filed application based on the timeframe of prosecution matters (e.g., when an office action is likely to be received from the Patent Office) and how likely various outcomes are (e.g., the probability of a first office action allowance, etc.). Based on the probability of prosecution matters, an amount of prosecution matters can be estimated per period.

The method continues for U.S. patent preparation and prosecution budget determination at step 1316 where the per period issuance forecast is calculated. The per period issuance forecast is calculated based on the likelihood of U.S. issuances in light of particular prosecution actions per period. For example, the likelihood of an issuance due to a first office action allowance may be lower than the likelihood of an issuance due to a first office action response. Based on the probability of issuances, an amount of issuances can be estimated per period.

The method continues for U.S. patent preparation and prosecution budget determination at step 1318 where the per period maintenance forecast is calculated. The per period maintenance forecast is calculated based on the probability of issuances. For example, when a patent issues (based on issuance forecasting), the occurrence of a maintenance fee can be estimated. Based on the probability of a maintenance fee, an amount of maintenance fees can be estimated per period.

The method continues for U.S. patent preparation and prosecution budget determination at step 1320 where the per period subsequent filing forecast is calculated. The per period subsequent filing forecast is calculated based on expected U.S. subsequent filings (e.g., continuations, LPI conversion applications, divisional applications, and continuation-in-part applications) for the period. For example, when a patent issues (based on issuance forecasting), subsequent filings can be estimated based on a ratio of desired subsequent filings (e.g., the ratio of continuations to divisional applications, etc.) and a filing factor (e.g., a weight based on whether the subsequent filing is primary, secondary, later). Based on the probability of subsequent filings, a number of subsequent filings can be estimated per period.

The method continues for U.S. patent preparation and prosecution budget determination at step 1322 where the per period number of new application filings is calculated. The per period number of new application filings is calculated based on anticipated and/or desired new application filings (e.g., provisional applications and non-provisional applications). The per period number of new application filings may be determined based on a desired level of protection of the MTU involved, the desired patent position, available budget, a number of inventions already identified, an amount of products in development, inventions typically obtained from advanced inventing sessions, etc.

The method continues for U.S. patent preparation and prosecution budget determination at step 1324 where a new patent position is determined based on a new number of filings per period. For example, the growth and expense co-processor calculates the probability of prosecution actions, issuances, maintenance fees, subsequent filings, and new filings and calculates an estimated amount based on those probabilities. Based on those amounts, a patent position is determined.

For international patent preparation and prosecution budget determination, the method begins at step 1326 where a country to country spend ratio is obtained and a per period PCT application filing forecast is determined. For example, one or more previously filed patent applications and/or one or more new applications are selected for PCT application filing. For PCT applications approaching national stage deadlines or applications to be filed directly in foreign countries, desired countries are selected (e.g., based on where competitors are located, where a large part of the market for a MTU exists, where products are likely used, etc.). Based on the desired level of patent protection in each of those countries and the cost of foreign preparation and prosecution in those countries (e.g., some countries are more costly than others), the country to country spend ratio is obtained.

The method continues for international patent preparation and prosecution budget determination at step 1328 where the per country, per period prosecution forecast is calculated. The per country, per period prosecution forecast is calculated based on expected foreign prosecution matters (e.g., office actions, appeal briefs, restriction responses, etc.) for a designated time period (e.g., a quarter, a year, 5 years, 7 years, etc.). For example, the probability of prosecution matters in each country can be calculated for each application based on the timeframe of prosecution matters (e.g., when an office action is likely to be received from the country's patent office) and how likely various outcomes are (e.g., the probability of a first office action allowance, etc.). Based on the probability of prosecution matters, an amount of prosecution matters can be estimated per period.

The method continues for international patent preparation and prosecution budget determination at step 1330 where a per country, per period issuance forecast is calculated. The per period issuance forecast is calculated based on the likelihood of foreign issuances in light of particular prosecution actions per period. For example, the likelihood of an issuance due to a first office action allowance may be lower than the likelihood of an issuance due to a first office action response. Based on the probability of issuances, an amount of issuances can be estimated per period.

The method continues for international patent preparation and prosecution budget determination at step 1332 where per country, per period annuities forecast is calculated. The per country, per period annuities forecast is calculated based on the probability of issuances and the estimated length of prosecution. For example, when a patent issues (based on issuance forecasting), the occurrence of an annuity fee can be estimated. Further, in foreign countries, annuities may be charged to patent applicants during prosecution (e.g., on a yearly basis). Based on the probability of an annuity fee, an amount of annuity fees can be estimated per period.

The method continues for international patent preparation and prosecution budget determination at step 1334 where the per country, per period subsequent filing forecast is calculated. The per country, per period subsequent filing forecast is calculated based on expected subsequent filings (e.g., continuations, divisional applications, continuation-in-part applications, etc.). For example, when a patent issues (based on issuance forecasting), subsequent filings can be estimated based on a ratio of desired subsequent filings (e.g., the ratio of continuations to divisional applications, etc.) and a filing factor (e.g., a weight based on whether the subsequent filing is primary, secondary, later). Based on the probability of subsequent filings, a number of subsequent filings can be estimated per period.

The method continues for international patent preparation and prosecution budget determination at step 1336 where the per country, per period number of new application filings is calculated. The per country, per period number of new application filings is calculated based on anticipated and/or desired new application filings for the period and the corresponding fees (e.g., based on attorney fees and government fees) for each country. For example, the per country, per period number of new application filings is calculated based on the number of per period number of new application filings filed in the U.S. (e.g., 5% of new U.S. applications are filed internationally). The method continues for international patent preparation and prosecution budget determination at step 1338 where a per country, per period patent position is determined based on the forecasting determined in steps 1326-1336.

For example, the growth and expense co-processor calculates the per country, per period probability of prosecution actions, issuances, annuities fees, subsequent filings, and new filings and calculates an estimated amount based on those probabilities. Based on the estimated amounts, the per period, per country patent position can be determined.

When the U.S. patent position is calculated at step 1324, the method continues with step 1340 where it is determined whether the U.S. budget should be adjusted. For example, the new patent position may be too weak and more funds are needed to reach a desired patent position.

When the per country patent position is calculated at step 1338, the method continues with step 1340 where it is determined whether the per country, per period and PCT international budget should be adjusted. For example, the calculated patent position may be too low to allow for desired international patent protection in one or more country and more funds need to be allocated to the international budget.

When it is determined that the U.S. or international budget should be adjusted, the method continues with step 1344 where it is determined whether the U.S. to international ("INT") spend ratio should be adjusted. For example, if the calculated per period U.S. budget is too high in terms of the total patent budget from the patent plan, the U.S. to international spend ratio could be adjusted to allocate money from the international patent preparation and prosecution budget to the U.S. patent preparation and prosecution budget. If at step 1344 it is determined to adjust the U.S. to international spend ratio, the method continues with step 1346 where the U.S. to international spend ratio is adjusted accordingly. When the international spend ratio is adjusted, the method branches back to step 1312 where the patent plan U.S. to international spend ratio is determined and used to determine the U.S. and international budgets.

If at step 1344, it is not determined to adjust the U.S. to international spend ratio, the method continues with step 1348 where it is determined whether the country to country ratio or the amount of PCT filings should be adjusted. For example, when the patent position of one or more country is too low, the country to country ratio can be adjusted to increase the amount of filings in the one or more country. As another example, if U.S. patent portfolio growth is prioritized in a particular period over foreign portfolio growth, the per period PCT application filing forecast can be scaled down. When it is determined that the country to country ratio and/or the amount of PCT filings should be adjusted, the method continues with step 1350 where the country to country ratio and/or the amount of PCT filings is adjusted accordingly. When the country to country ratio or the amount of PCT filings is adjusted, the method then branches to step 1326 where the country to country spend ratio and the per period PCT application filing forecast are obtained and determined to use in the international budget.

If the country to country ratio or the amount of PCT filings is determined to not be adjusted, the method continues with step 1352 where forecast parameters are adjusted. Forecast parameters include the probability of receiving office actions or issuances based on historical or average data. Forecast parameters also include subsequent filing factors (e.g., how many subsequent filings are likely per patent application), current portfolio matters (issued utility patents, pending applications, office actions, issuances, annuities/maintenance fees, prior art search/IDS, etc.), desired patent position, desired spend, and portfolio growth goals (number of desired new applications, etc.).

When the forecast parameters are adjusted at step 1352, the method branches back to step 1314 of the U.S. preparation and prosecution budget determination and/or step 1326 of the international preparation and prosecution budget determination. When it is determined that the U.S. or international patent position does not need to be adjusted, the method continues with step 1342 where a report is generated. The report may include some or all of the forecasting information determined by the present method and well as budget information. To determine budget information, the growth and expense co-processor calculates attorney fees and government fees for each forecasted matter.

Figure 165:
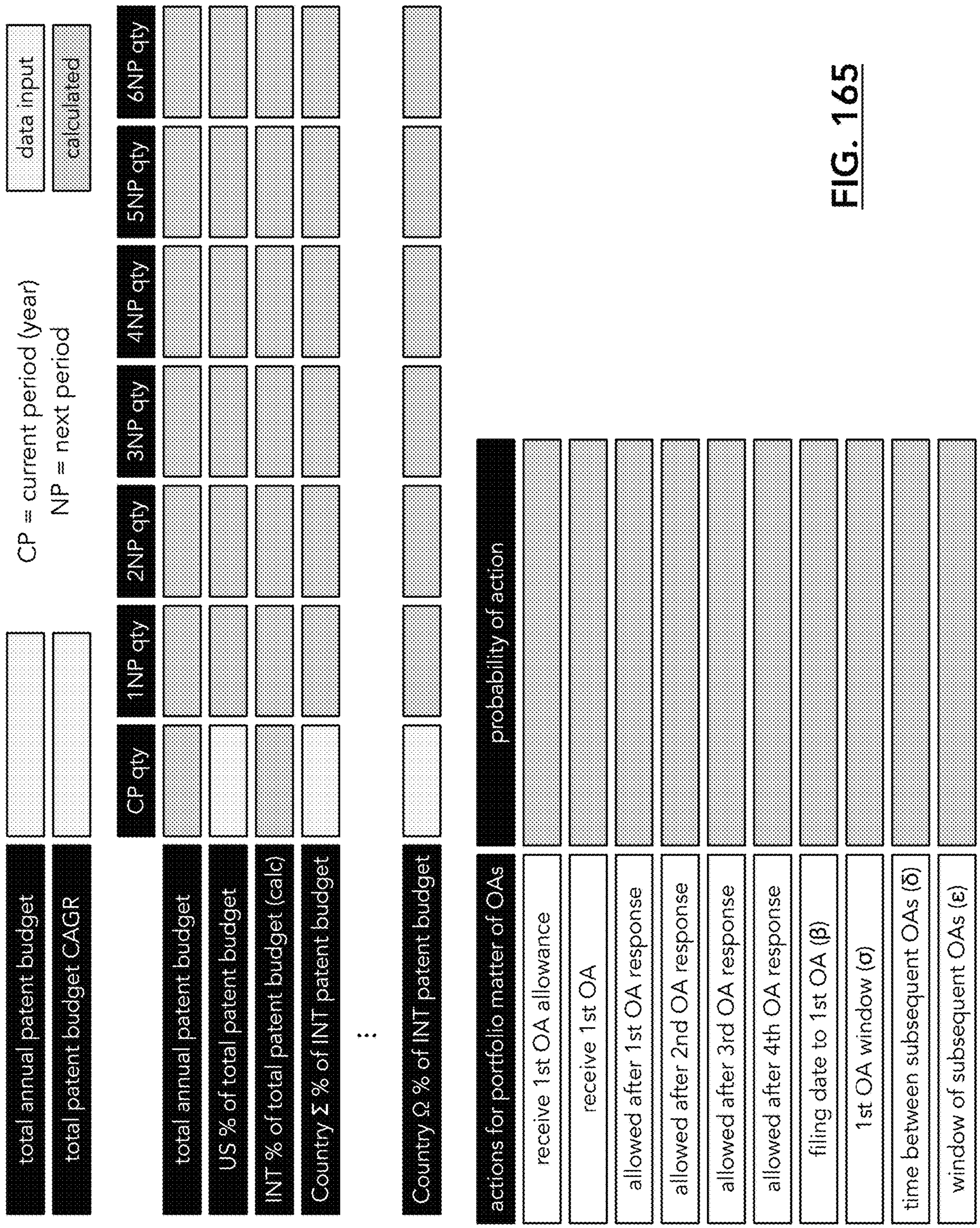
FIG. 165 is a diagram of an example of an input record regarding expense and growth of patent protecting an MTU as used by a growth and expense co-processor of an improved computer for technology.

FIG. 165 is a diagram of an example of an input record regarding expense and growth of patent protecting an MTU as used by a growth and expense co-processor of an improved computer for technology. For example, the input record includes inputs for expense and portfolio forecasting parameters per country when budget is driven by a particular spend. Data fields in blue are data input fields and data fields in gray include data calculated by the growth and expense co-processor.

The expense and portfolio forecasting parameters per country in this example include the total annual patent budget, a total patent budget compound annual growth rate (CAGR), total annual patent budget for a current through sixth next period, a domestic (e.g., U.S.) percentage of total patent budget for a current through sixth next period, an international percentage of total patent budget for a current through sixth next period, each foreign country's (e.g., country Σ through country Ω) percentage of the international patent budget for a current through sixth next period, and the probability of receiving actions for portfolio matter of office actions (OAs).

The total annual patent budget and a total patent budget CAGR are shown here as data inputs (e.g., a user can set a desired amount). Based on the total annual patent budget data input, the total annual patent budget for a current through sixth next period can be calculated. For example, the life of a market-tech unit (MTU) can be used to allocate more or less budget to certain periods.

The U.S. percentage of total patent budget for a current period is shown as a data input (e.g., based on a desired spend for U.S. portfolio growth and maintenance). Based on the percentage selected, the U.S. percentage of total patent budget for a first-sixth next period can be calculated. Because the U.S. percentage of total patent budget for a current period is a data input, the international percentage of total patent budget for the current through sixth next period is calculated based off of the total annual budget and the U.S. percentage of total patent budget.

Each selected country's percentage of the international percentage of the total patent budget for a current period is shown as a data input. A certain country may be allocated more budget than another, when a higher level of patent protection is required in that country. Based on each selected country's percentage of the international percentage of the total patent budget for the current period, each selected country's percentage of the international percentage of the total patent budget for a current through sixth next period can be calculated.

The particular actions for portfolio matter of office actions shown include a receive first office action allowance, a receive first office action, allowed after first office action response, allowed after second office action response, allowed after third office action response, allowed after fourth office action response, a filing date to 1$^{st}$ office action (OA) period of time (e.g., β), a first office action window (e.g., σ), a time between subsequent office actions (e.g., δ), and a window of subsequent office actions (e.g., ε). Each of these data fields includes a calculated probability of action. The probabilities of action may be default settings or calculated based on past performance and/or historical data.

FIG. 166 is a diagram of another example of an input record regarding expense and growth of patent protecting an MTU as used by a growth and expense co-processor of an improved computer for technology. The example input record includes inputs for expense and portfolio forecasting parameters per country when budget is driven by desired spend. Data fields in blue are data input fields and data fields in gray include data calculated by one or more processing modules of the new computer for technology. Data input fields exist for existing quantities of portfolio matters such as issued utility patents, pending provisional applications, pending non-provisional applications, pending PCT applications, prior art (PA) searches/information disclosure statement (IDS), office actions, issuances, and annuities/maintenance fees.

The issuance actions include a first office action allowance, a receive first office action, a receive second office action, a receive third office action, a receive fourth office action, and a receive another office action. The receive probability of the issuance actions may be based on default settings or calculated based on past performance. As an example, the receive probability of a first office action allowance is 5%, the receive probability of a first office action is 95%, the receive probability of a second office action is 31.64%, the receive probability of a third office action is 10.53%, the receive probability of a fourth office action is 3.51%, and the receive probability of another office action is 1.17%.

The allowance probabilities are shown as data input fields (with the exception of the first office action allowance probability) and may be based on past performance or default settings. In this example, the first office action allowance probability is 100% and the rest of the issuance actions have a 66.7% chance of resulting in allowance. A per patent issuance probability is calculated by multiplying the receive probability by the allowance probability. For example, the issuance probability of a first office action allowance is 5% (e.g., 5%×100%), the issuance probability of a first office action is 63.4% (e.g., 95%×66.7%), the issuance probability of a second office action is 21.1% (e.g., 31.64%×66.7%), the issuance probability of a third office action is 7.0% (e.g., 10.53%×66.7%), the issuance probability of a fourth office action is 2.3% (e.g., 3.51%×66.7%), and the issuance probability of another office action is 0.8% (e.g., 1.17%×66.7%).

Further data input fields exist for subsequent filing factors. The subsequent filing factors may be default settings. Here, there are data input fields for a primary subsequent filing (e.g., after a first issuance) and a secondary subsequent filing (e.g., second issuance and beyond) but more or less are possible. In this example, for a primary subsequent filing, there is a subsequent filing factor of 1.25, a continuation factor of 15%, a divisional factor of 2.5%, a CIP factor of 7.5%, and a legal placeholder conversion (LPC) (also referred to herein as an LPI conversion application) factor of 75%. For a secondary subsequent filing there is a subsequent filing factor of 0.5%, a continuation factor of 50%, a divisional factor of 5%, a CIP factor of 20%, and an LPC factor of 25%. The factors may be default settings or calculated based on past performance or particular portfolio goals (e.g., the portfolio may lean heavily toward bundled applications and require more LPC subsequent application filings).

Figure 167:
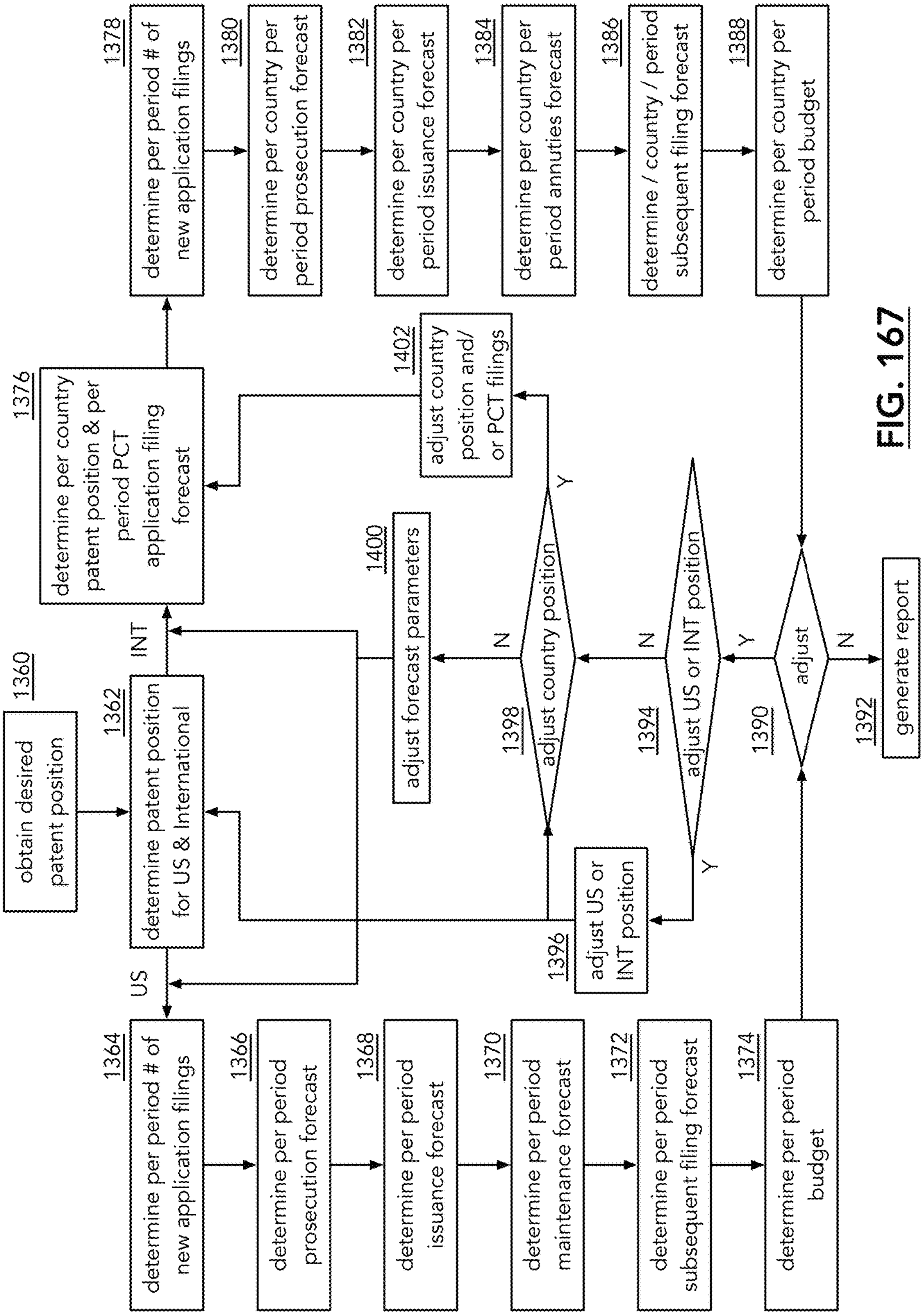
FIG. 167 is a logic diagram of another example of a method for balancing patent spend and desired patent position for a plan to patent protect an MTU (market-tech unit) by a growth and expense co-processor of an improved computer for technology.

FIG. 167 is a logic diagram of another example of a method for balancing patent spend and desired patent position for a plan to patent protect an MTU (market-tech unit) by a growth and expense co-processor of an improved computer for technology. In the method of FIG. 167, the primary driver is a desired patent position (i.e., number of filings per the patent plan). The method begins with step 1360 where a desired patent position is obtained for one or more periods. The desired patent position may be sliding scale from weak to superior (e.g., a numerical scale where 1 is weak and 10 is superior). A superior patent position is achieved by creating a patent portfolio that is balanced, has broad technology boundaries, and has no weaknesses. As such, a medium patent position is less balanced, has less broad technology boundaries, and has more weaknesses than a superior patent position and a weak patent position is not balanced, has narrow technology boundaries, and has many weaknesses.

The method continues with step 1362 where a desired patent position is determined for domestic (e.g., the U.S.) and international patent protection. For example, prioritizing the development of a U.S. patent portfolio may indicate a desired patent position for the U.S. to be superior whereas the desired patent position for international is medium.

The method continues with steps 1364 (for U.S. patent preparation and prosecution budget determination) and 1376 (for international patent preparation and prosecution budget determination). At step 1364, the per period number of new application filings is determined. The per period number of new application filings (e.g., provisional applications and non-provisional applications) is determined based on the desired patent position for a period (e.g., a quarter, a year, 5 years, 7 years, etc.). For example, a superior patent position may require a higher number of new application filings than a less superior patent position.

The method continues for U.S. patent preparation and prosecution budget determination at step 1366 where the per period prosecution forecast is determined. The per period prosecution forecast is calculated based on the probability of the occurrence of U.S. prosecution matters (e.g., office actions, appeal briefs, restriction responses, etc.) over a designated time period (e.g., a quarter, a year, 5 years, 7 years, etc.). For example, the probability of U.S. prosecution matters can be calculated for each filed application based on the timeframe of prosecution matters (e.g., when an office action is likely to be received from the Patent Office) and how likely various outcomes are (e.g., the probability of a first office action allowance, etc.). Based on the probability of prosecution matters, an amount of prosecution matters can be estimated per period.

The method continues for U.S. patent preparation and prosecution budget determination at step 1368 where the per period issuance forecast is determined. The per period issuance forecast is calculated based on the likelihood of U.S. issuances in light of particular prosecution actions per period. For example, the likelihood of an issuance due to a first office action allowance may be lower than the likelihood of an issuance due to a first office action response. Based on the probability of issuances, an amount of issuances can be estimated per period.

The method continues for U.S. patent preparation and prosecution budget determination at step 1370 where the per period maintenance forecast is determined. The per period maintenance forecast is calculated based on the probability of issuances. For example, when a patent issues (based on issuance forecasting), the occurrence of a maintenance fee can be estimated. Based on the probability of a maintenance fee, an amount of maintenance fees can be estimated per period.

The method continues for U.S. patent preparation and prosecution budget determination at step 1372 where the per period subsequent filing forecast is calculated. The per period subsequent filing forecast is calculated based on expected U.S. subsequent filings (e.g., continuations, LPI conversion applications, divisional applications, and continuation-in-part applications) for the period. For example, when a patent issues (based on issuance forecasting), subsequent filings can be estimated based on a ratio of desired subsequent filings (e.g., the ratio of continuations to divisional applications, etc.) and a filing factor (e.g., a weight based on whether the subsequent filing is primary, secondary, later). Based on the probability of subsequent filings, a number of subsequent filings can be estimated per period.

The method continues for U.S. patent preparation and prosecution budget determination at step 1374 where a per period U.S. budget is determined based on the forecasting determined in steps 1364-1374. For example, the growth and expense co-processor calculates the an amount of new filings and the probability of prosecution actions, issuances, maintenance fees, and subsequent filings, and calculates estimated amounts based on those probabilities. Based on the estimated amounts, the growth and expense co-processor calculates the attorney fees and government fees associated with each item and compiles the expenses into a total per period budget.

For international patent preparation and prosecution budget determination, the method begins at step 1376 where a country to country patent position is determined and a per period PCT application filing forecast is determined. For example, one or more previously filed patent applications and/or one or more new applications are selected for PCT application filing. For PCT applications already filed and approaching national stage deadlines or applications to be filed directly in foreign countries, desired countries are selected (e.g., where competitors are located, where a large part of the market for an MTU exists, where products are likely used, etc.). Based on the desired level of patent protection in each of those countries, the per country patent position is determined.

The method continues for international patent preparation and prosecution budget determination at step 1378 where the per country, per period (e.g., a quarter, a year, 5 years, 7 years, etc.) number of new application filings is determined. The per country, per period number of new application filings is determined based on anticipated and/or desired new application filings in accordance with a desired patent position for the period for each country.

The method continues for international patent preparation and prosecution budget determination at step 1380 where the per country, per period prosecution forecast is calculated. The per country, per period prosecution forecast is calculated based on expected foreign prosecution matters (e.g., office actions, appeal briefs, restriction responses, etc.) for a designated time period (e.g., a quarter, a year, 5 years, 7 years, etc.). For example, the probability of prosecution matters in each country can be calculated for each application based on the timeframe of prosecution matters (e.g., when an office action is likely to be received from the country's patent office) and how likely various outcomes are (e.g., the probability of a first office action allowance, etc.). Based on the probability of prosecution matters, an amount of prosecution matters can be estimated per period.

The method continues for international patent preparation and prosecution budget determination at step 1382 where a per country, per period issuance forecast is determined. The per period issuance forecast is calculated based on the likelihood of foreign issuances in light of particular prosecution actions per period. For example, the likelihood of an issuance due to a first office action allowance may be lower than the likelihood of an issuance due to a first office action response. Based on the probability of issuances, an amount of issuances can be estimated per period.

The method continues for international patent preparation and prosecution budget determination at step 1384 where per country, per period annuities forecast is calculated. The per country, per period annuities forecast is calculated based on the probability of issuances and the estimated length of prosecution. For example, when a patent issues (based on issuance forecasting), the occurrence of an annuity fee can be estimated. Further, in foreign countries, annuities may be charged to patent applicants during prosecution (e.g., on a yearly basis). Based on the probability of an annuity fee, an amount of annuity fees can be estimated per period.

The method continues for international patent preparation and prosecution budget determination at step 1386 where the per country, per period subsequent filing forecast is calculated. The per country, per period subsequent filing forecast is calculated based on expected subsequent filings (e.g., continuations, divisional applications, continuation-in-part applications, etc.). For example, when a patent issues (based on issuance forecasting), subsequent filings can be estimated based on a ratio of desired subsequent filings (e.g., the ratio of continuations to divisional applications, etc.) and a filing factor (e.g., a weight based on whether the subsequent filing is primary, secondary, later). Based on the probability of subsequent filings, a number of subsequent filings can be estimated per period.

The method continues for international patent preparation and prosecution budget determination at step 1388 where a per country, per period and PCT filing international budget is determined based on forecasting determined in steps 1376-1386. For example, the growth and expense co-processor calculates the per country, per period probability of prosecution actions, issuances, annuities fees, subsequent filings, in accordance with projected new filings and calculates estimated amounts based on those probabilities. Based on the estimated amounts, the growth and expense co-processor calculates the attorney fees and government fees associated with each item and compiles the expenses into a total per period, per country budget.

When the U.S. patent preparation and prosecution budget is calculated at step 1374, the method continues with step 1390 where it is determined whether the per period U.S. budget should be adjusted. For example, the calculated per period U.S. budget may be too expensive. When the international patent preparation and prosecution budget is calculated at step 1388, the method continues with step 1390 where it is determined whether the per country, per period and PCT international budget should be adjusted. For example, the calculated per country, per period and PCT international budget may be too high or too low to allow for desired international patent protection.

When it is determined that the U.S. or international budget should be adjusted, the method continues with step 1394 where it is determined whether the U.S. or international ("INT") patent position should be adjusted. For example, if the calculated per period U.S. budget is too high, the U.S. desired patent position may be lowered. If at step 1394 it is determined to adjust the U.S. or international patent position, the method continues with step 1396 where the U.S. or international desired patent position is adjusted accordingly. When the desired patent position is adjusted accordingly, the method branches back to step 1362 where the patent position of U.S. and international patent protection is determined.

If at step 1394 it is not determined to adjust the U.S. or international patent position, the method continues with step 1398 where it is determined whether the country position or the amount of PCT filings should be adjusted. For example, when the international budget is too high, the country position for one or more countries can be lowered to reduce the amount of filings and cost. As another example, if U.S. patent portfolio growth is prioritized in a particular period over foreign portfolio growth, the per period PCT application filing forecast can be scaled down. When it is determined that the country position or the amount of PCT filings should be adjusted, the method continues with step 1402 where the country position and/or the amount of PCT filings is adjusted accordingly. When the country position and/or the amount of PCT filings is adjusted accordingly, the method then branches to step 1376 where the country position and the per period PCT application filing forecast are determined.

If the country position or the amount of PCT filings is determined to not be adjusted, the method continues with step 1400 where forecast parameters are adjusted. Forecast parameters include the probability of receiving office actions or issuances based on historical or average data. Forecast parameters also include subsequent filing factors (e.g., how many subsequent filings are likely per patent application), current portfolio matters (issued utility patents, pending applications, office actions, issuances, annuities/maintenance fees, prior art search/IDS, etc.), and portfolio growth goals (number of desired new applications, etc.).

When the forecast parameters are adjusted at step 1400, the method branches back to step 1364 of the U.S. preparation and prosecution budget determination and/or step 1376 of the international preparation and prosecution budget determination. When it is determined that the U.S. or international budget should not be adjusted, the method continues with step 1392 where a report is generated. The report may include some or all of the forecasting and budget information determined by the present method.

FIG. 168 is a diagram of another example of an input record regarding expense and growth of patent protecting an MTU as used by a growth and expense co-processor of an improved computer for technology. The input record of FIG. 168 includes inputs for expense and portfolio forecasting parameters per country when budget is driven by new application filing numbers (e.g., a desired patent position). Data fields exist for existing quantities of portfolio matters (e.g., from a private patent database) such as quantities of issued utility patents, pending provisional applications, pending non-provisional applications, pending PCT applications, prior art (PA) searches/information disclosure statement (IDS), office actions, issuances, and annuities/maintenance fees. New filings are forecasted based on data from a private patent database (e.g., advanced inventing session data) and from a patent plan (e.g., a desired patent position).

The portfolio matters for new filings include, for example, new provisional filings, new utility filings, new PCT filings, and new design filings. More or less portfolio matters may exist. A current period (CP) quantity (e.g., a goal for the current year) for each of the portfolio matters can be inputted or calculated based on patent plan objectives. Additionally, first next period (NP) (e.g., next year) through sixth NP (e.g., six years from now) quantities for each of the portfolio matters can be inputted or calculated based on patent plan objectives and quantities of previous periods. More or less periods than shown may be included.

The particular actions for portfolio matter of office actions shown include a receive first office action allowance, a receive first office action, allowed after first office action response, allowed after second office action response, allowed after third office action response, allowed after fourth office action response, a filing date to 1st office action (OA) period of time (e.g., $\beta$), a first office action window (e.g., $\sigma$), a time between subsequent office actions (e.g., $\delta$), and a window of subsequent office actions (e.g., $\epsilon$). Each of these data fields includes a calculated or inputted probability of action. The probabilities of action may be default settings or calculated based on past performance and/or historical data.

FIG. 169 is a diagram of another example of an input record regarding expense and growth of patent protecting an MTU as used by a growth and expense co-processor of an improved computer for technology. The input record of FIG. 169 includes inputs for expense and portfolio forecasting parameters per country when budget is driven by filing numbers (e.g., based on a desired patent position). Data fields in blue are data input fields and data fields in gray include data calculated by one or more processing modules of the new computer for technology.

The issuance actions include a first office action allowance, a receive first office action, a receive second office action, a receive third office action, a receive fourth office action, and a receive another office action. The receive probability of the issuance actions may be based on default settings or calculated based on past performance. As an example, the receive probability of a first office action allowance is 5%, the receive probability of a first office action is 95%, the receive probability of a second office action is 31.64%, the receive probability of a third office action is 10.53%, the receive probability of a fourth office action is 3.51%, and the receive probability of another office action is 1.17%.

The allowance probabilities are shown as data input fields (with the exception of the first office action allowance probability) and may be default settings or calculated based on past performance. In this example, the first office action allowance probability is 100% and the rest of the issuance actions have a 66.7% chance of resulting in allowance. A per patent issuance probability is calculated by multiplying the receive probability by the allowance probability. For example, the issuance probability of a first office action allowance is 5.0% (e.g., 5.0%×100%), the issuance probability of a first office action is 63.4% (e.g., 95%×66.7%), the issuance probability of a second office action is 21.1% (e.g., 31.64%×66.7%), the issuance probability of a third office action is 7.0% (e.g., 10.53%×66.7%), the issuance probability of a fourth office action is 2.3% (e.g., 3.51%×66.7%), and the issuance probability of another office action is 0.8% (e.g., 1.17%×66.7%).

Further data input fields exist for subsequent filing factors. The subsequent filing factors may be default settings, calculated based on past performance, and/or determined based on portfolio goals. Here, there are data input fields for a primary subsequent filing (e.g., after a first issuance) and a secondary subsequent filing (e.g., second issuance and beyond) but more or less are possible. In this example, for a primary subsequent filing, there is a subsequent filing factor and factors (percentages) for each type of subsequent filing.

The subsequent filing factor is a weight applied to the various subsequent filing percentages based on how desired the filing is. For the primary subsequent filing, the subsequent filing factor is 1.25, the continuation factor is 15%, the divisional factor is 2.5%, the CIP factor is 7.5%, and the legal placeholder conversion (LPC) (also referred to herein as an LPI conversion application) factor is 75%. For a secondary subsequent filing there is a subsequent filing factor of 0.5, a continuation factor of 50%, a divisional factor of 5%, a CIP factor of 20%, and an LPC factor of 25%.

Figure 170:
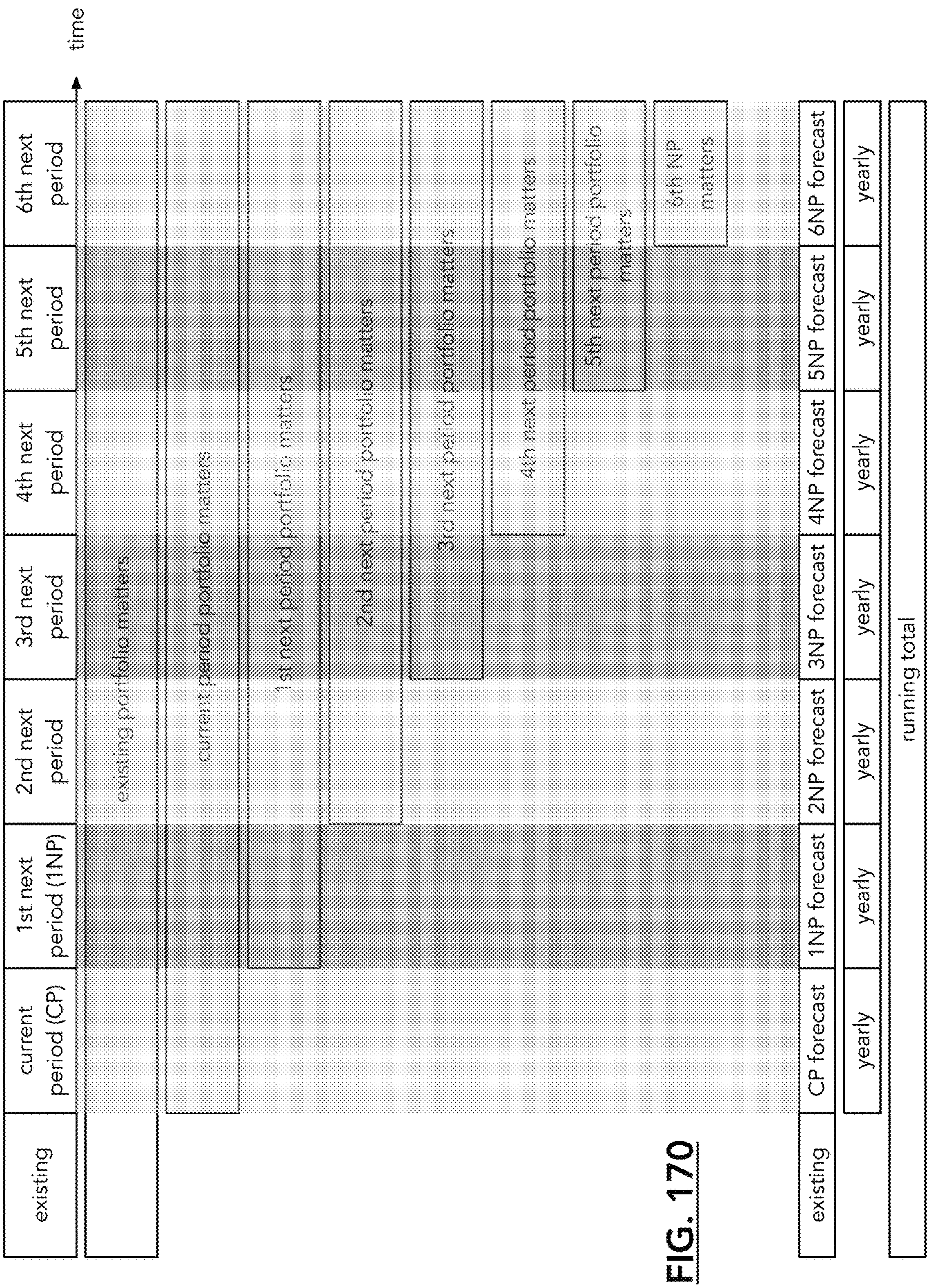
FIG. 170 is a diagram of an example of a multi-period expense and growth estimation of patent protecting an MTU that compounds over time.

FIG. 170 is a diagram of an example of a multi-period expense and growth estimation of patent protecting an MTU that compounds over time. The multi-period expense and growth estimation includes an existing period and forecasting for a current period (CP), a first next period (1NP), a second next period (2NP), a third next period (3NP), a fourth next period (4NP), a fifth next period (5NP), and a sixth next period (6NP). In this example, portfolio matters are forecasted on a yearly basis (e.g., a period is one year) but other time periods (e.g., quarterly, bi-annually, etc.) are possible. The Existing portfolio matters exist at an "existing" time period and are maintained and prosecuted throughout portfolio development (e.g., from the existing time to the sixth next period). The multi-period expense and growth estimation includes a current period (CP) forecast (e.g., for a current year) to map out current period portfolio matters. As shown, during the current period, the multi-period expense and growth estimation includes existing portfolio matters and current period portfolio matters and a running total.

The multi-period expense and growth estimation includes a first next period (1NP) forecast (e.g., for first next year) to map out first next period portfolio matters. During the first next period, the multi-period expense and growth estimation includes existing, current, and first next period portfolio matters and a running total. The multi-period expense and growth estimation includes a second next period (2NP) forecast (e.g., for a second next year) to map out second next period portfolio matters. During the second next period, the multi-period expense and growth estimation includes existing, current, first, and second next period portfolio matters and a running total.

The multi-period expense and growth estimation includes a third next period (3NP) forecast (e.g., for a third next year) to map out third next period portfolio matters. During the third next period, the multi-period expense and growth estimation includes existing, current, first, second, and third next period portfolio matters and a running total. The multi-period expense and growth estimation includes a fourth next period (4NP) forecast (e.g., for a fourth next year) to map out fourth next period portfolio matters. During the fourth next period, the multi-period expense and growth estimation includes existing, current, first, second, third, and fourth next period portfolio matters and a running total.

The multi-period expense and growth estimation includes a fifth next period (5NP) forecast (e.g., for a fifth next year) to map out fifth next period portfolio matters. During the fifth next period, the multi-period expense and growth estimation includes existing, current, first, second, third, fourth, and fifth next period portfolio matters and a running total. The multi-period expense and growth estimation includes a sixth next period (6NP) forecast (e.g., for a sixth next year) to map out sixth next period portfolio matters. During the sixth next period, the multi-period expense and growth estimation includes existing, current, first, second, third, fourth, fifth, and sixth next period portfolio matters and a running total. The multi-period expense and growth estimation may go further into the future or show less periods than this example.

By forecasting portfolio matters for multiple periods, the portfolio size, strength, and budget can be analyzed and strategized in accordance with desired patent position and patent business goals.

FIG. 171 is a diagram of an example of a multiple time periods relationship to each other as time passes regarding expense and growth estimation of patent protecting an MTU. For example, FIG. 171 shows expense and growth estimation that forecasts portfolio matters on a yearly basis (e.g., each period is one year) for a current period (CP), a first next period (1NP), a second next period (2NP), a third next period (3NP), a fourth next period (4NP), a fifth next period (5NP), and a sixth next period (6NP) over the course of five years. Longer or shorter periods are possible.

In a first year, the current period (CP) is Jan. 22, 2001-Dec. 31, 2022, the first next period (1NP) is the next year Jan. 1, 2023-Dec. 31, 2023, the second next period (2NP) is the next year 1/1/2024-12/31/2024, the third next period (3NP) is the next year 1/1/2025-12/31/2025, the fourth next period (4NP) is the next year 1/1/2026-12/31/2026, the fifth next period (5NP) is the next year 1/1/2027-12/31/2027, and the sixth next period (6NP) is the next year 1/1/2028-12/31/2028.

As time moves on to the second year, the first next period (1NP) of 1/1/2023-12/31/2023 from above becomes the current period, the first next period (1NP) is the next year 1/1/2024-12/31/2024, the second next period (2NP) is the next year 1/1/2025-12/31/2025, the third next period (3NP) is the next year 1/1/2026-12/31/2026, the fourth next period (4NP) is the next year 1/1/2027-12/31/2027, the fifth next period (5NP) is the next year 1/1/2028-12/31/2028, and the sixth next period (6NP) is the next year 1/1/2029-12/31/2029.

As time moves on to the third year, the first next period (1NP) of 1/1/2024-12/31/2024 from above becomes the current period, the first next period (1NP) is the next year 1/1/2025-12/31/2025, the second next period (2NP) is the next year 1/1/2026-12/31/2026, the third next period (3NP) is the next year 1/1/2027-12/31/2027, the fourth next period (4NP) is the next year 1/1/2028-12/31/2028, the fifth next period (5NP) is the next year 1/1/2029-12/31/2029, and the sixth next period (6NP) is the next year 1/1/2030-12/31/2030.

As time moves on to the fourth year, the first next period (1NP) of 1/1/2025-12/31/2025 from above becomes the current period, the first next period (1NP) is the next year 1/1/2026-12/31/2026, the second next period (2NP) is the next year 1/1/2027-12/31/2027, the third next period (3NP) is the next year 1/1/2028-12/31/2028, the fourth next period (4NP) is the next year 1/1/2029-12/31/2029, the fifth next period (5NP) is the next year 1/1/2030-12/31/2030, and the sixth next period (6NP) is the next year 1/1/2031-12/31/2031.

As time moves on to the fifth year, the first next period (1NP) of 1/1/2026-12/31/2026 from above becomes the current period, the first next period (1NP) is the next year 1/1/2027-12/31/2027, the second next period (2NP) is the next year 1/1/2028-12/31/2028, the third next period (3NP) is the next year 1/1/2029-12/31/2029, the fourth next period (4NP) is the next year 1/1/2030-12/31/2030, the fifth next period (5NP) is the next year 1/1/2031-12/31/2031, and the sixth next period (6NP) is the next year 1/1/2032-12/31/2032.

Figure 172:
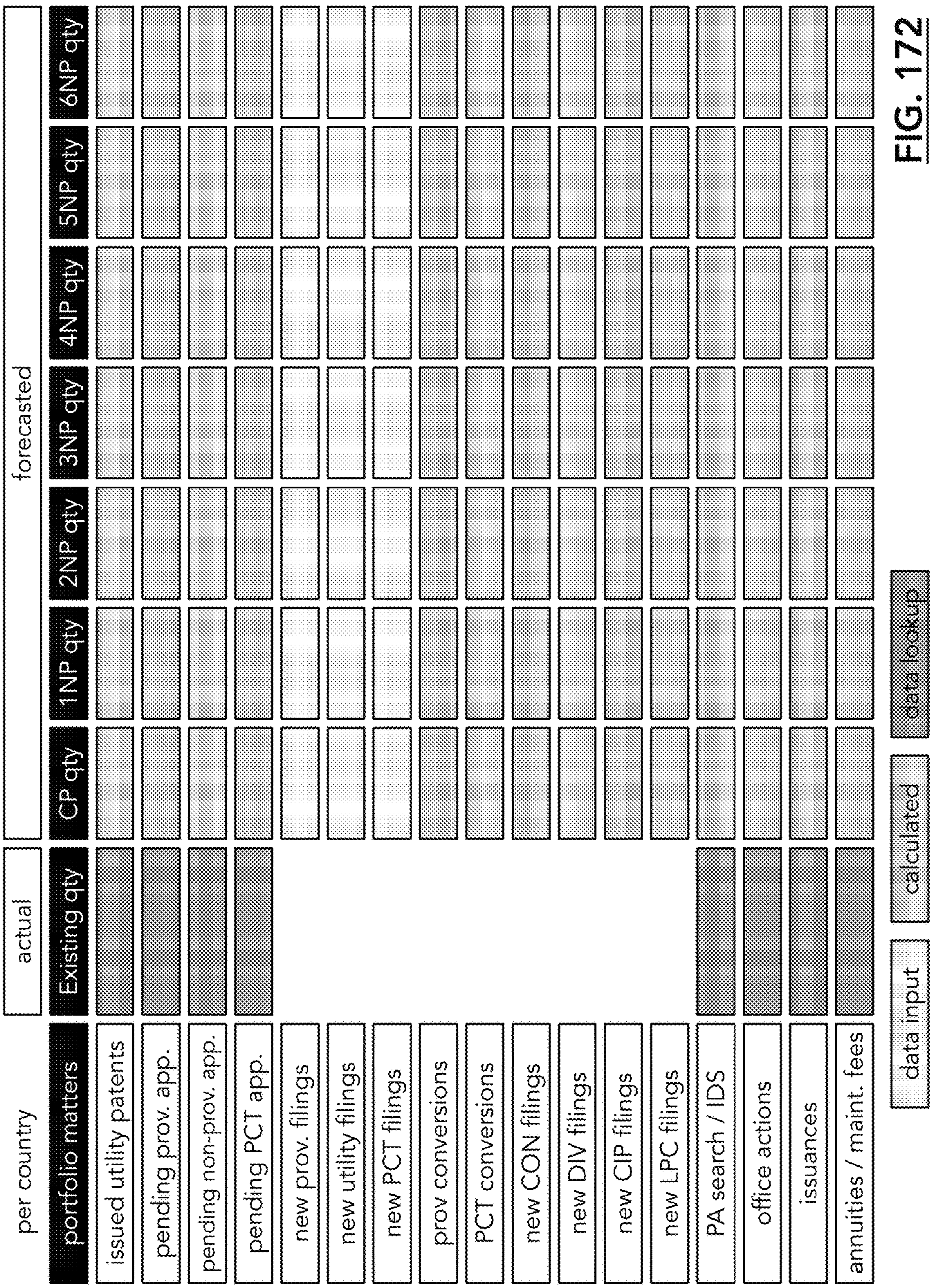
FIG. 172 is a diagram of an example of a growth forecast record regarding patent protecting an MTU as used by a growth and expense co-processor of an improved computer for technology.

FIG. 172 is a diagram of an example of a growth forecast record regarding patent protecting an MTU as used by a growth and expense co-processor of an improved computer for technology. The growth forecast record includes actual (e.g., existing) and forecasted quantities of portfolio matter for periods of time (e.g., year-by-year) of a patent plan. Data fields in blue are data input fields, data fields in light gray include data calculated by one or more processing modules of the new computer for technology, and data fields in dark gray are data lookup fields. The year-by-year totals could be per country and/or combined for all countries involved. A separate, similar analysis can occur for design patents. While quantities are shown here, the total spend can also be tracked.

The portfolio matters listed include issued utility patents, pending provisional applications, pending non-provisional applications, pending PCT applications, new provisional filings, new utility filings, new PCT filings, provisional conversions, PCT conversions, new continuation (CON) filings, new divisional (DIV) filings, new continuation-in-part (CIP) filings, new legal placeholder conversion (LPC) filings, prior art (PA) search/information disclosure statement (IDS), office actions (e.g., including appeal briefs, reply briefs, petitions, etc., and factoring requests for continued examination (RCE)), issuances, and annuities/maintenance fees. Actions for portfolio matters may include filing new applications, responses to office actions, etc.

The actual portfolio matters in the growth forecast record include existing quantities of issued utility patents, pending provisional applications, pending non-provisional applications, pending PCT applications, prior art (PA) search/information disclosure statement (IDS), office actions, issuances, and annuities/maintenance fees. The existing quantities of actual portfolio matters may be included via a data lookup.

The forecasted portfolio matters in the growth forecast record include forecasted quantities for each portfolio matter for a current period (CP), a first next period (1NP), a second next period (2NP), a third next period (3NP), a fourth next period (4NP), a fifth next period (5NP), and a sixth next period (6NP). More or less periods for forecasting are possible. Quantities for new application filings such as new provisional filings, new utility filings, and new PCT filings can be input based on a desired patent position. Other forecasted portfolio matters can be calculated by the growth and expense co-processor based on new filings, budget, past performance, desired patent position, and/or default settings.

FIG. 173 is a diagram of another example of a growth forecast record regarding patent protecting an MTU as used by a growth and expense co-processor of an improved computer for technology. The forecasting estimations included in the growth forecast record may be based on past performance, statistical data, default settings, forecasting parameters, desired patent position, etc. The quantities may be broken down per country or combined for multiple countries. The quantities may be broken down per market-tech unit (MTU) or combined. In this example, the portfolio matters shown include yearly quantities of inventions disclosed, inventions protected, pending provisional applications, pending non-provisional applications, pending PCT applications, and issued patents. Disclosed inventions are inventions that have been disclosed to the patent process but not yet included in a patent application. Protected inventions are inventions that are included in an application, either claimed out or included as legal placeholder inventions (LPIs).

In this example, for the actual (e.g., existing) portfolio matters, there are 24 existing inventions disclosed, 24 inventions protected, 0 pending provisional applications, 6 pending non-provisional applications, 0 pending PCT applications, and 0 issued patents. For example, the existing portfolio includes six utility patent applications having four inventions each as well as 24 inventions that have yet to be included in an application. For a current period (CP) (e.g., a current year), it is forecasted that there will be 24 inventions disclosed, 24 inventions protected, 0 pending provisional applications, 24 pending non-provisional applications, 0 pending PCT applications, and 6 issued patents for that period. For example, during the current period, the previously disclosed 24 inventions are filed as six new utility patent applications each having four inventions. It is estimated that 18 subsequent filings will occur in the current period (e.g., LPCs, continuations, etc.). With 6 issuances, 6 previously filed applications, 6 new applications, and 18 subsequent filings, the total quantity of pending non-provisional applications is 24 (6+6+18−6) during the current period.

For a first next period (1NP) (e.g., a next year), it is forecasted that there will be 24 inventions disclosed, 24 inventions protected, 0 pending provisional applications, 33 pending non-provisional applications, 0 pending PCT applications, and 15 issued patents for that period. For example, during the first next period, the previously disclosed 24 inventions are filed as six new utility patent applications each having four inventions. It is estimated that 18 subsequent filings will occur in the current period (e.g., LPCs, continuations, etc.). With 15 issuances, 6 prior issuances, 30 previously filed applications, 6 new applications, and 18 subsequent filings, the total quantity of pending non-provisional applications is 33 during the first next period.

For a second next period (2NP) (e.g., a second next year), it is forecasted that there will be 24 inventions disclosed, 24 inventions protected, 0 pending provisional applications, 32 pending non-provisional applications, 0 pending PCT applications, and 25 issued patents for that period. For example, during the second next period, the previously disclosed 24 inventions are filed as six new utility patent applications each having four inventions. It is estimated that 18 subsequent filings will occur in the current period (e.g., LPCs, continuations, etc.). With 25 issuances, 21 prior issuances, 54 previously filed applications, 6 new applications, and 18 subsequent filings, the total quantity of pending non-provisional applications is 32 during the second next period.

For a third next period (3NP) (e.g., a third next year), it is forecasted that there will be 24 inventions disclosed, 24 inventions protected, 0 pending provisional applications, 26 pending non-provisional applications, 0 pending PCT applications, and 30 issued patents for that period. For example, during the third next period, the previously disclosed 24 inventions are filed as six new utility patent applications each having four inventions. It is estimated that 18 subsequent filings will occur in the current period (e.g., LPCs, continuations, etc.). With 30 issuances, 46 prior issuances, 78 previously filed applications, 6 new applications, and 18 subsequent filings, the total quantity of pending non-provisional applications is 26 during the third next period.

For a fourth next period (4NP) (e.g., a fourth next year), it is forecasted that there will be 24 inventions disclosed, 24 inventions protected, 0 pending provisional applications, 18 pending non-provisional applications, 0 pending PCT applications, and 32 issued patents for that period. For example, during the fourth next period, the previously disclosed 24 inventions are filed as six new utility patent applications each having four inventions. It is estimated that 18 subsequent filings will occur in the current period (e.g., LPCs, continuations, etc.). With 32 issuances, 76 prior issuances, 102 previously filed applications, 6 new applications, and 18 subsequent filings, the total quantity of pending non-provisional applications is 18 during the fourth next period.

For a fifth next period (5NP) (e.g., a fifth next year), it is forecasted that there will be 24 inventions disclosed, 24 inventions protected, 0 pending provisional applications, 7 pending non-provisional applications, 0 pending PCT applications, and 35 issued patents for that period. For example, during the fifth next period, the previously disclosed 24 inventions are filed as six new utility patent applications each having four inventions. It is estimated that 18 subsequent filings will occur in the current period (e.g., LPCs, continuations, etc.). With 35 issuances, 108 prior issuances, 126 previously filed applications, 6 new applications, and 18 subsequent filings, the total quantity of pending non-provisional applications is 7 during the fifth next period.

For a sixth next period (6NP) (e.g., a sixth next year), it is forecasted that there will be 0 inventions disclosed, 24 inventions protected, 0 pending provisional applications, 11 pending non-provisional applications, 0 pending PCT applications, and 20 issued patents for that period. For example, during the sixth next period, the previously disclosed 24 inventions are filed as six new utility patent applications each having four inventions. It is estimated that 18 subsequent filings will occur in the current period (e.g., LPCs, continuations, etc.). With 20 issuances, 143 prior issuances, 150 previously filed applications, 6 new applications, and 18 subsequent filings, the total quantity of pending non-provisional applications is 11 during the sixth next period.

FIG. 174 is a diagram of another example of a growth forecast record regarding patent protecting an MTU as used by a growth and expense co-processor of an improved computer for technology. The example of FIG. 174 is similar to the example of FIG. 173 except that running totals for portfolio matters are shown.

For the actual portfolio matters, there are 24 existing inventions disclosed, 24 inventions protected, 0 pending provisional applications, 6 pending non-provisional applications, 0 pending PCT applications, and 0 issued patents. For a current period (CP) (e.g., a current year), it is forecasted that there will be 24 inventions disclosed making a running total of 48 disclosed inventions, a running total of 48 inventions protected, 0 pending provisional applications, 24 pending non-provisional applications, 0 pending PCT applications, and 6 issued patents.

For a first next period (1NP) (e.g., a next year), it is forecasted that there will be 24 inventions disclosed making a running total of 72 disclosed inventions, a running total of 72 inventions protected, 0 pending provisional applications, 33 pending non-provisional applications, 0 pending PCT applications, and a running total of 21 issued patents. For a second next period (2NP) (e.g., a second next year), it is forecasted that there will be 24 inventions disclosed making a running total of 96 disclosed inventions, a running total of 96 inventions protected, 0 pending provisional applications, 32 pending non-provisional applications, 0 pending PCT applications, and a running total of 46 issued patents.

For a third next period (3NP) (e.g., a third next year), it is forecasted that there will be 24 inventions disclosed making a running total of 120 disclosed inventions, a running total of 120 inventions protected, 0 pending provisional applications, 26 pending non-provisional applications, 0 pending PCT applications, and a running total of 76 issued patents. For a fourth next period (4NP) (e.g., a fourth next year), it is forecasted that there will be 24 inventions disclosed making a running total of 144 disclosed inventions, a running total of 144 inventions protected, 0 pending provisional applications, 18 pending non-provisional applications, 0 pending PCT applications, and a running total of 108 issued patents.

For a fifth next period (5NP) (e.g., a fifth next year), it is forecasted that there will be 24 inventions disclosed making a running total of 168 disclosed inventions, a running total of 168 inventions protected, 0 pending provisional applications, 7 pending non-provisional applications, 0 pending PCT applications, and a running total of 143 issued patents. For a sixth next period (6NP) (e.g., a sixth next year), it is forecasted that there will be 0 inventions disclosed making a running total of 168 disclosed inventions, a running total of 192 inventions protected, 0 pending provisional applications, 11 pending non-provisional applications, 0 pending PCT applications, and a running total of 163 issued patents for that period.

Figure 175:
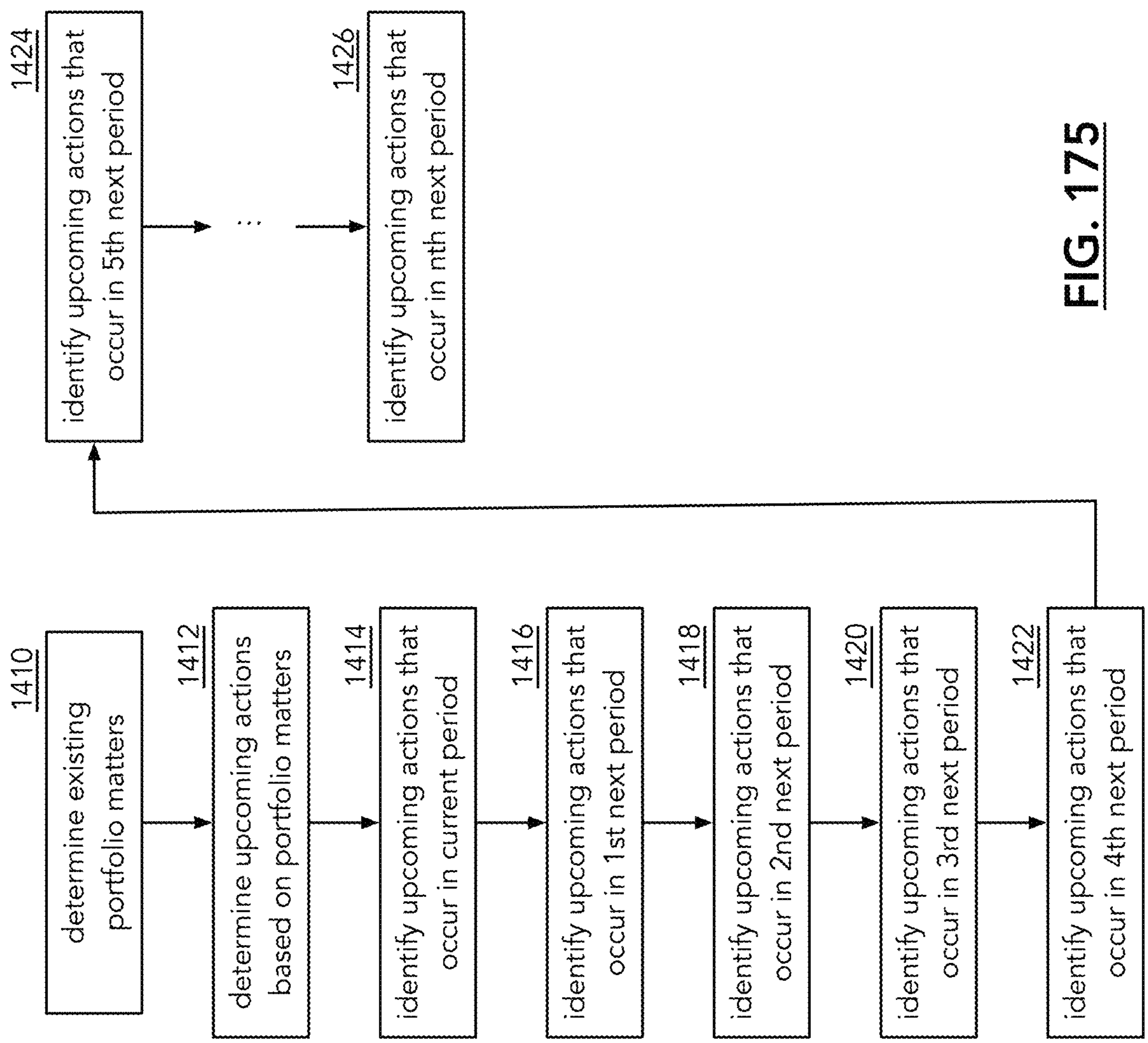
FIG. 175 is a logic diagram of an example of a method for forecasting upcoming actions regarding patent protecting an MTU (market-tech unit) based on existing patent protected inventions by a growth and expense co-processor of an improved computer for technology.

FIG. 175 is a logic diagram of an example of a method for forecasting upcoming actions regarding patent protecting an MTU (market-tech unit) based on existing patent protected inventions by a growth and expense co-processor of an improved computer for technology. The method begins with step 1410 where the growth and expense co-processor determines existing portfolio matters are determined. Existing portfolio matters include filed provisional and/or non-provisional applications, filed PCT applications, filed subsequent filings, issuances, filed office actions responses, maintenance fees paid, etc. The growth and expense co-processor may perform a data lookup to determine the existing portfolio matters.

The method continues with step 1412 where the growth and expense co-processor determines upcoming actions based on the existing portfolio matters. For example, if a non-provisional application has been filed, responses to office actions and/or an issuance are upcoming. An amount of subsequent filings (e.g., continuations, LPCs, continuations-in-part, etc.) based off the non-provisional application can also be estimated. In another example, if an issuance occurred, an upcoming action may include paying maintenance fees.

The method continues with step 1414 where the growth and expense co-processor identifies upcoming actions based on the existing portfolio matters that occur in a current period. A period may be set as any length of time that makes sense for a business and/or a technology. For example, the period may be a year taking into account most businesses budget and plan for the current year. Other time periods such as a quarter or two years are also possible. In the example of an existing non-provisional application, a first office action response or first office action allowance may be expected in the current period.

The method continues with step 1416 where the growth and expense co-processor identifies upcoming actions that occur in a first next period. The upcoming actions in a first next period are identified based on the existing portfolio matters and a likely outcome of actions that occurred in the current period. In an example of an existing non-provisional application where a first office action response was likely filed in a current period, in the first next period a second office action response and a request for continued examination may be expected. Further, filing a certain number of subsequent filings off of the non-provisional application may be expected in the first next period.

The method continues with step 1418 where upcoming actions that occur in a second next period are identified. The upcoming actions in a second next period are identified based on the existing portfolio matters and a likely outcome of actions that occurred in the current and first next periods. In an example of an existing non-provisional application where a first office action response was likely filed in a current period and a second office action response with a request for continued examination was likely filed in the first next period, in the second next period a first office action response after request for continued examination may be expected. Further, with subsequent filings that were filed in the first next period, an amount of office action responses related to those filings may be expected in the second next period.

The method continues with step 1420 where the growth and expense co-processor identifies upcoming actions that occur in a third next period. The upcoming actions in a third next period are identified based on the existing portfolio matters and a likely outcome of actions that occurred in the current, first next, and second next periods. In an example of an existing non-provisional application where a first office action response was likely filed in a current period, a second office action response with a request for continued examination was likely filed in the first next period, and a first office action response after request for continued examination was likely filed in the second next period, in the third next period an issuance may be expected. With the issuance, a subsequent filing such as a continuation may also be expected. Further, with subsequent filings that were filed in the first next period and office action responses related to those filings expected in the second next period, additional office action responses and/or issuances related to those filings may be expected in the third next period.

The method continues with step 1422 where the growth and expense co-processor identifies upcoming actions that occur in a fourth next period. The upcoming actions in a fourth next period are identified based on the existing portfolio matters and a likely outcome of actions that occurred in the current, first next, second next, and third next periods. With subsequent filings filed in the first next period and the third next period, various stages of office actions and/or issuances pertaining to those filings may be expected. Further subsequent filing may also be expected.

The method continues with step 1424 where the growth and expense co-processor identifies upcoming actions that occur in a fifth next period. The upcoming actions in a fifth next period are identified based on the existing portfolio matters and a likely outcome of actions that occurred in the current, first next, second next, third next, and fourth next periods. With subsequent filings filed in the first next period, third next, and fourth next periods, various stages of office actions and/or issuances pertaining to those filings may be expected. Further subsequent filing may also be expected. Also, maintenance fees off issued patents may be expected.

The method continues with step 1426 where the growth and expense co-processor identifies upcoming actions that occur in a nth next period. The nth next period is set at a time in the future that makes sense for the business and/or the technology. For example, the business may want to secure funding for developing a patent portfolio over a ten-year period and needs an estimate of how much that will cost. In another example, the upcoming actions may be estimated up to only a third next period or less.

The upcoming actions in the nth next period are identified based on the existing portfolio matters and a likely outcome of actions that occurred in the proceeding periods. With subsequent filings filed throughout, various stages of office actions and/or issuances pertaining to those filings may be expected. Further subsequent filing may also be expected. Also, maintenance fees off issued patents may be expected.

Figure 176:
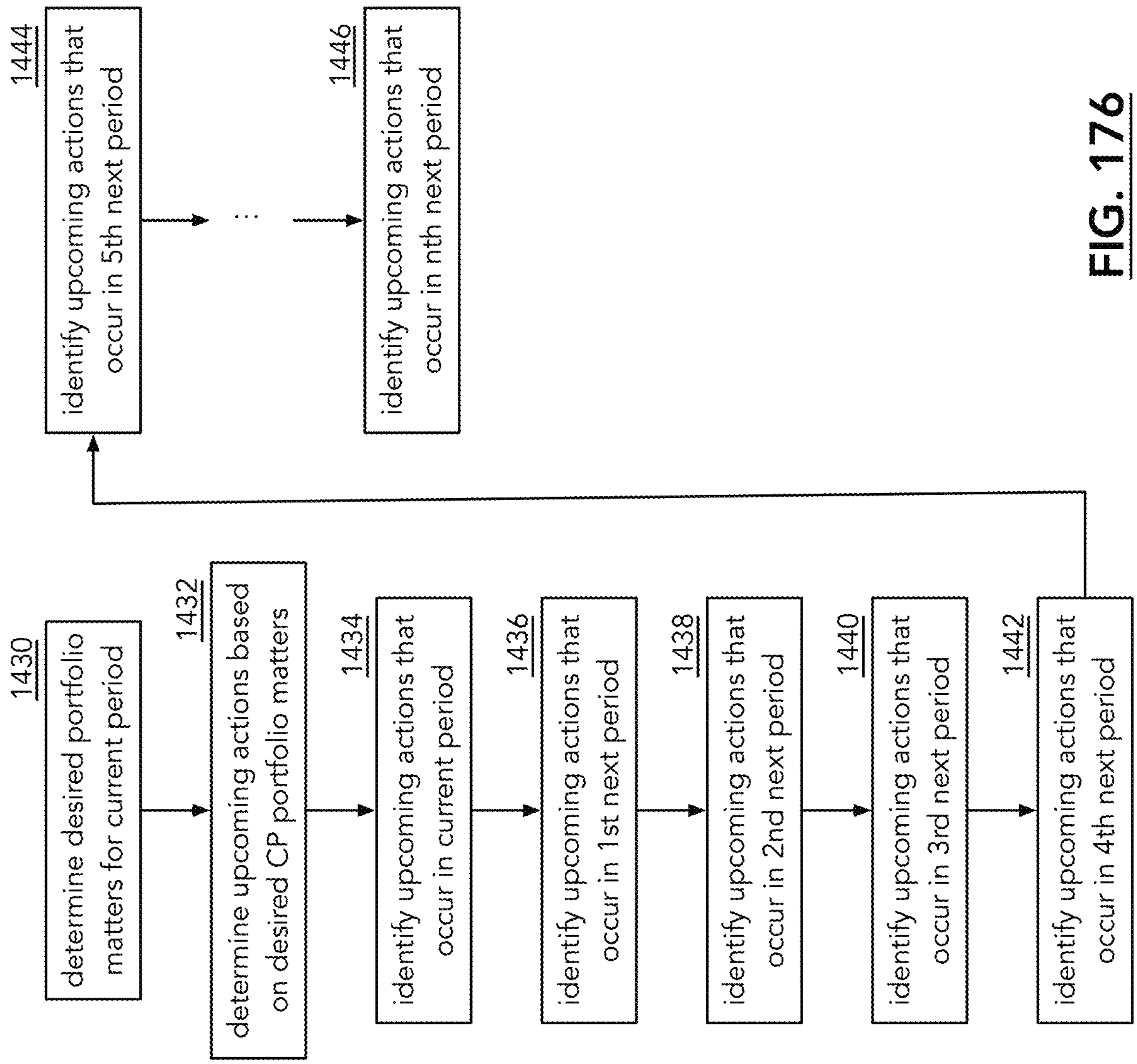
FIG. 176 is a logic diagram of an example of a method for forecasting upcoming actions regarding patent protecting an MTU (market-tech unit) based on patent protected inventions of the current period by a growth and expense co-processor of an improved computer for technology.

FIG. 176 is a logic diagram of an example of a method for forecasting upcoming actions regarding patent protecting an MTU (market-tech unit) based on patent protected inventions of the current period by a growth and expense co-processor of an improved computer for technology. The method begins with step 1430 where the growth and expense co-processor determines desired portfolio matters for a current period. Desired portfolio matters pertain to amount of desired portfolio growth over the current period and include new provisional and/or non-provisional applications, new subsequent filings (based off the new non-provisional applications), new PCT applications, etc. For example, the desired portfolio matters for the current period may include filing five new non-provisional applications.

The method continues with step 1432 where growth and expense co-processor determines upcoming actions based on the desired current period (CP) portfolio matters. For example, when the desired current period portfolio matters include filing five new non-provisional applications, the upcoming actions include those filings, responses to office actions, and issuances. Desired upcoming subsequent filings (e.g., continuations, LPCs, continuations-in-part, etc.) based off the non-provisional applications can also be estimated. Once patents issue, upcoming actions further includes paying maintenance fees.

The method continues with step 1434 where the growth and expense co-processor identifies upcoming actions based on the desired portfolio matters in the current period. A period may be set as any length of time that makes sense for a business and/or a technology. For example, the period may be a year taking into account most businesses budget and plan for the current year. Other time periods such as a quarter or two years are also possible. Where the desired portfolio matters for the current period include may include filing five new non-provisional applications, the upcoming actions that occur in the current period may include those filings and potentially one or more first office action responses and/or first office action allowances.

The method continues with step 1436 where the growth and expense co-processor identifies upcoming actions that occur in a first next period. The upcoming actions in a first next period are identified based on the desired current period portfolio matters and a likely outcome of actions that occurred in the current period. In an example of filing five new non-provisional applications and one or more first office action responses (based off the five new non-provisional applications) in a current period, in the first next period one or more second office action responses (and associated requests for continued examination) may be expected. Further, a certain number of subsequent filings off of the non-provisional applications can be estimated for the first next period.

The method continues with step 1438 where the growth and expense co-processor identifies upcoming actions that occur in a second next period. The upcoming actions in a second next period are identified based on the desired portfolio matters for the current period and a likely outcome of actions that occurred in the current and first next period. In an example of filing five new non-provisional applications one or more first office actions response in a current period and one or more second office actions in the first next period, in the second next period one or more first office action responses after request for continued examination may be expected. Further, with subsequent filings that were filed in the first next period, an amount of office action responses related to those filings may be expected in the second next period.

The method continues with step 1440 where the growth and expense co-processor identifies upcoming actions that occur in a third next period. The upcoming actions in a third next period are identified based on the desired portfolio matters for the current period and a likely outcome of actions that occurred in the current, first next, and second next periods. In an example of filing five new non-provisional applications and one or more first office action responses in a current period, filing one or more second office action responses in the first next period, and filing one or more first office action responses after request for continued examination in the second next period, in the third next period one or more issuances may be expected. With the issuances, subsequent filings such as a continuations may also be expected. Further, with subsequent filings that were filed in the first next period and office action responses related to those filings expected in the second next period, additional office action responses and/or issuances related to those filings may be expected in the third next period.

The method continues with step 1442 where the growth and expense co-processor identifies upcoming actions that occur in a fourth next period. The upcoming actions in a fourth next period are identified based on the desired portfolio matters for the current period and a likely outcome of actions that occurred in the current, first next, second next, and third next periods. With subsequent filings filed in the first next period and the third next period, various stages of office actions and/or issuances pertaining to those filings may be expected. Further subsequent filing may also be expected.

The method continues with step 1444 where the growth and expense co-processor identifies upcoming actions that occur in a fifth next period. The upcoming actions in a fifth next period are identified based on the desired portfolio matters for the current period and a likely outcome of actions that occurred in the current, first next, second next, third next, and fourth next periods. With subsequent filings filed in the first next period, third next, and fourth next periods, various stages of office actions and/or issuances pertaining to those filings may be expected. Further subsequent filing may also be expected. Also, maintenance fees off issued patents may be expected.

The method continues with step 1446 where the growth and expense co-processor identifies upcoming actions that occur in a nth next period. The nth next period is set at a time in the future that makes sense for the business and/or the technology. For example, the business may want to secure funding for developing a patent portfolio over a ten-year period and needs an estimate of how much that will cost. In another example, the upcoming actions may be estimated up to only a third next period or less.

The upcoming actions in the nth next period are identified based on the desired portfolio matters for the current period and a likely outcome of actions that occurred in the proceeding periods. With subsequent filings filed throughout, various stages of office actions and/or issuances pertaining to those filings may be expected. Further subsequent filing may also be expected. Also, maintenance fees off issued patents may be expected.

Figure 177:
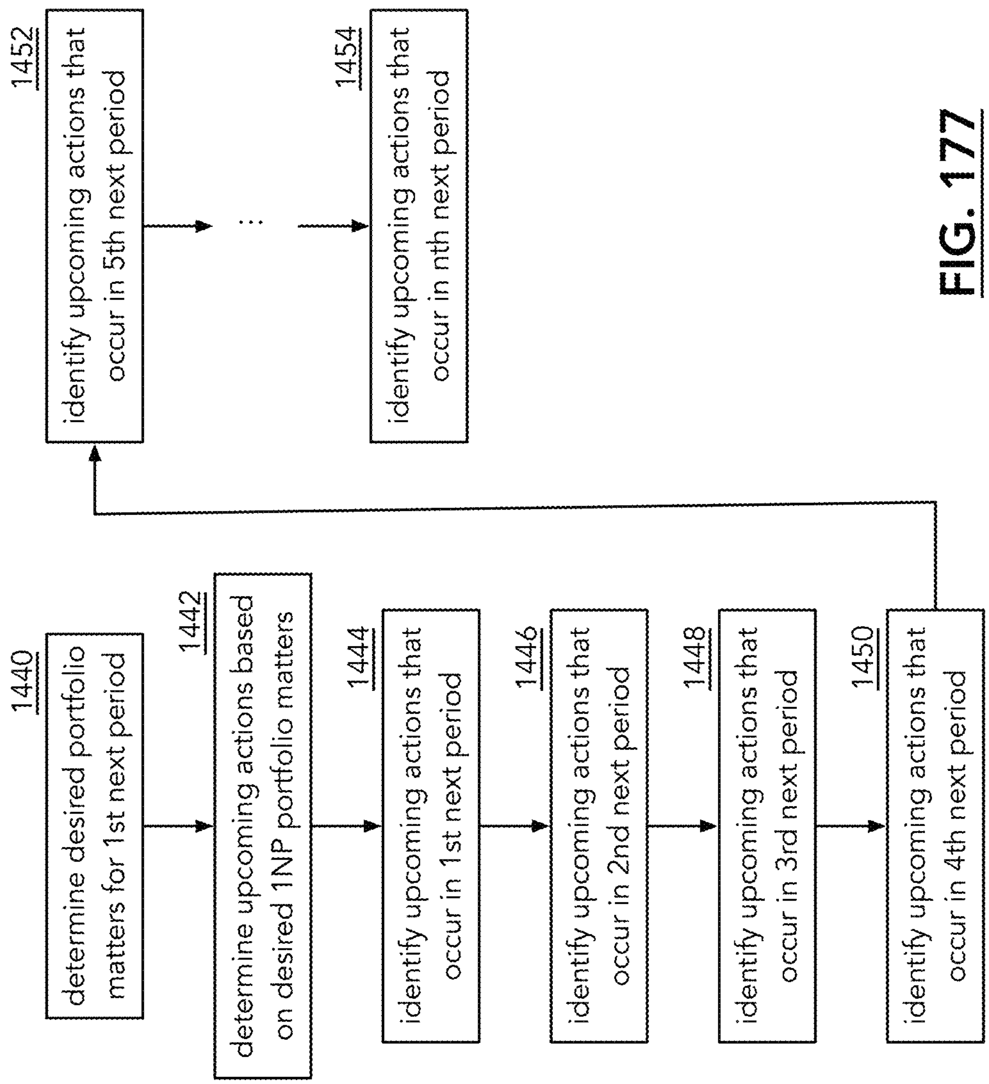
FIG. 177 is a logic diagram of an example of a method for forecasting upcoming actions regarding patent protecting an MTU (market-tech unit) based on patent protected inventions of the $1^{st}$ next period by a growth and expense co-processor of an improved computer for technology.

FIG. 177 is a logic diagram of an example of a method for forecasting upcoming actions regarding patent protecting an MTU (market-tech unit) based on patent protected inventions of the first next period by a growth and expense co-processor of an improved computer for technology. The method begins with step 1440 where the growth and expense co-processor determines desired portfolio matters for a first next period. Desired portfolio matters pertain to amount of desired portfolio growth over a first next period and include new provisional and/or non-provisional applications, new subsequent filings (based off the new non-provisional applications), new PCT applications, etc. For example, the desired portfolio matters for the first next period may include filing five new non-provisional applications.

The method continues with step 1442 where the growth and expense co-processor determines upcoming actions based on the desired first next period (1NP) portfolio matters. For example, when the desired first next period portfolio matters include filing five new non-provisional applications, the upcoming actions include those filings, responses to office actions, and issuances. Desired upcoming subsequent filings (e.g., continuations, LPCs, continuations-in-part, etc.) based off the non-provisional applications can also be estimated. Once patents issue, upcoming actions further includes paying maintenance fees.

The method continues with step 1444 where the growth and expense co-processor identifies upcoming actions based on the desired portfolio matters in the first next period. Where the desired portfolio matters for the first next period include filing five new non-provisional applications, the upcoming actions that occur in the first next period may include those filings and potentially one or more first office action responses and/or first office action allowances.

The method continues with step 1446 where the growth and expense co-processor identifies upcoming actions that occur in a second next period. The upcoming actions in a second next period are identified based on the desired first next period portfolio matters and a likely outcome of actions that occurred in the first next period. In an example of filing five new non-provisional applications and one or more first office action responses (based off the five new non-provisional applications) in a first next period, in the second next period one or more second office action responses (and associated requests for continued examination) may be expected. Further, a certain number of subsequent filings off of the non-provisional applications can be estimated for the second next period.

The method continues with step 1448 where the growth and expense co-processor identifies upcoming actions that occur in a third next period are identified. The upcoming actions in a third next period are identified based on the desired portfolio matters for the first next period and a likely outcome of actions that occurred in the first next and second next period. In an example of filing five new non-provisional applications one or more first office actions response in a first next period and one or more second office actions in the second next period, in the third next period one or more first office action responses after request for continued examination may be expected. Further, with subsequent filings that were filed in the second next period, an amount of office action responses related to those filings may be expected in the third next period.

The method continues with step 1450 where the growth and expense co-processor identifies upcoming actions that occur in a fourth next period. The upcoming actions in a fourth next period are identified based on the desired portfolio matters for the first next period and a likely outcome of actions that occurred in the first next, second next, and third next periods. In an example of filing five new non-provisional applications and one or more first office action responses in a first next period, filing one or more second office action responses in the second next period, and filing one or more first office action responses after request for continued examination in the third next period, in the fourth next period one or more issuances may be expected. With the issuances, subsequent filings such as a continuations may also be expected. Further, with subsequent filings that were filed in the second next period and office action responses related to those filings expected in the third next period, additional office action responses and/or issuances related to those filings may be expected in the fourth next period.

The method continues with step 1452 where the growth and expense co-processor identifies upcoming actions that occur in a fifth next period. The upcoming actions in a fifth next period are identified based on the desired portfolio matters for the first next period and a likely outcome of actions that occurred in the first next, second next, third next, and fourth next periods. With subsequent filings filed in the second next period and the fourth next period, various stages of office actions and/or issuances pertaining to those filings may be expected. Further subsequent filing may also be expected.

The method continues with step 1454 where the growth and expense co-processor identifies upcoming actions that occur in a nth next period. The nth next period is set at a time in the future that makes sense for the business and/or the technology. For example, the business may want to secure funding for developing a patent portfolio over a ten-year period and needs an estimate of how much that will cost. In another example, the upcoming actions may be estimated up to only a third next period or less.

The upcoming actions in the nth next period are identified based on the desired portfolio matters for the first next period and a likely outcome of actions that occurred in the proceeding periods. With subsequent filings filed throughout, various stages of office actions and/or issuances pertaining to those filings may be expected. Further subsequent filing may also be expected. Also, maintenance fees off issued patents may be expected.

Figure 178:
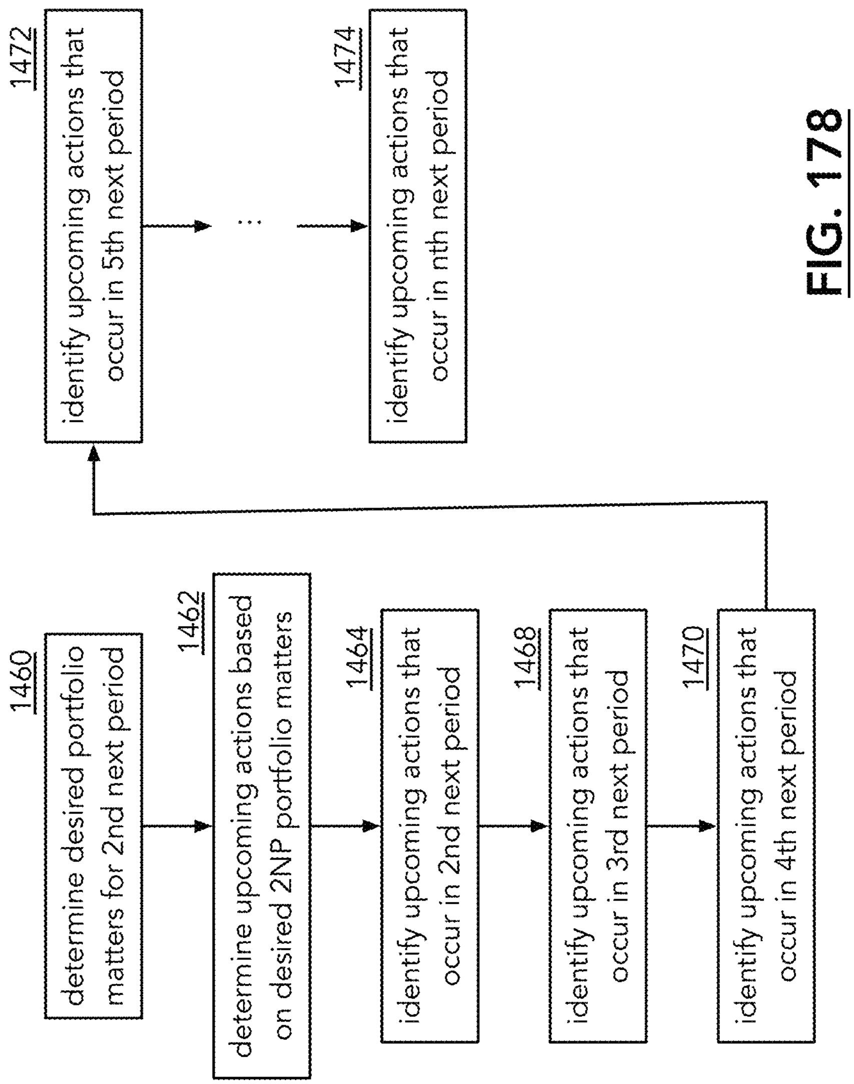
FIG. 178 is a logic diagram of an example of a method for forecasting upcoming actions regarding patent protecting an MTU (market-tech unit) based on patent protected inventions of the $2^{nd}$ next period by a growth and expense co-processor of an improved computer for technology.

FIG. 178 is a logic diagram of an example of a method for forecasting upcoming actions regarding patent protecting an MTU (market-tech unit) based on patent protected inventions of the second next period by a growth and expense co-processor of an improved computer for technology. The method begins with step 1460 where the growth and expense co-processor determines desired portfolio matters for a second next period. Desired portfolio matters pertain to amount of desired portfolio growth over a second next period and include new provisional and/or non-provisional applications, new subsequent filings (based off the new non-provisional applications), new PCT applications, etc. For example, the desired portfolio matters for the second next period may include filing five new non-provisional applications.

The method continues with step 1462 where growth and expense co-processor determines upcoming actions based on the desired second next period (2NP) portfolio matters. For example, when the desired second next period portfolio matters include filing five new non-provisional applications, the upcoming actions include those filings, responses to office actions, and issuances. Desired upcoming subsequent filings (e.g., continuations, LPCs, continuations-in-part, etc.) based off the non-provisional applications can also be estimated. Once patents issue, upcoming actions further includes paying maintenance fees.

The method continues with step 1464 where the growth and expense co-processor identifies upcoming actions based on the desired portfolio matters in the second next period. Where the desired portfolio matters for the second next period include filing five new non-provisional applications, the upcoming actions that occur in the second next period may include those filings and potentially one or more first office action responses and/or first office action allowances.

The method continues with step 1468 where the growth and expense co-processor identifies upcoming actions that occur in a third next period. The upcoming actions in a third next period are identified based on the desired second next period portfolio matters and a likely outcome of actions that occurred in the second next period. In an example of filing five new non-provisional applications and one or more first office action responses (based off the five new non-provisional applications) in a second next period, in the third next period one or more second office action responses (and associated requests for continued examination) may be expected. Further, a certain number of subsequent filings off of the non-provisional applications can be estimated for the third next period.

The method continues with step 1470 where the growth and expense co-processor identifies upcoming actions that occur in a fourth next period. The upcoming actions in a fourth next period are identified based on the desired portfolio matters for the second next period and a likely outcome of actions that occurred in the second next and third next period. In an example of filing five new non-provisional applications one or more first office actions response in a second next period and one or more second office actions in the third next period, in the fourth next period one or more first office action responses after request for continued examination may be expected. Further, with subsequent filings that were filed in the third next period, an amount of office action responses related to those filings may be expected in the fourth next period.

The method continues with step 1472 where the growth and expense co-processor identifies upcoming actions that occur in a fifth next period. The upcoming actions in a fifth next period are identified based on the desired portfolio matters for the second next period and a likely outcome of actions that occurred in the second next, third next, and fourth next periods. In an example of filing five new non-provisional applications and one or more first office action responses in a second next period, filing one or more second office action responses in the third next period, and filing one or more first office action responses after request for continued examination in the fourth next period, in the fifth next period one or more issuances may be expected. With the issuances, subsequent filings such as a continuations may also be expected. Further, with subsequent filings that were filed in the third next period and office action responses related to those filings expected in the fourth next period, additional office action responses and/or issuances related to those filings may be expected in the fifth next period.

The method continues with step 1474 where the growth and expense co-processor identifies upcoming actions that occur in a nth next period. The nth next period is set at a time in the future that makes sense for the business and/or the technology. For example, the business may want to secure funding for developing a patent portfolio over a ten-year period and needs an estimate of how much that will cost. In another example, the upcoming actions may be estimated up to only a third next period or less.

The upcoming actions in the nth next period are identified based on the desired portfolio matters for the second next period and a likely outcome of actions that occurred in the proceeding periods. With subsequent filings filed throughout, various stages of office actions and/or issuances pertaining to those filings may be expected. Further subsequent filing may also be expected. Also, maintenance fees off issued patents may be expected.

Figure 179:
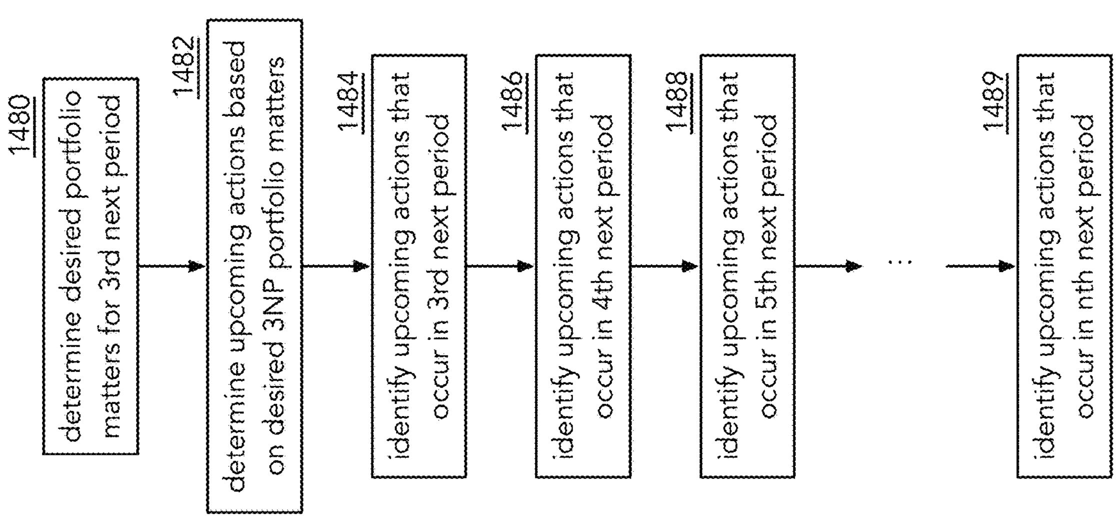
FIG. 179 is a logic diagram of an example of a method for forecasting upcoming actions regarding patent protecting an MTU (market-tech unit) based on patent protected inventions of the $3^{rd}$ next period by a growth and expense co-processor of an improved computer for technology.

FIG. 179 is a logic diagram of an example of a method for forecasting upcoming actions regarding patent protecting an MTU (market-tech unit) based on patent protected inventions of the third next period by a growth and expense co-processor of an improved computer for technology. The method begins with step 1480 where the growth and expense co-processor determines desired portfolio matters for a third next period. Desired portfolio matters pertain to amount of desired portfolio growth over a third next period and include new provisional and/or non-provisional applications, new subsequent filings (based off the new non-provisional applications), new PCT applications, etc. For example, the desired portfolio matters for the third next period may include filing ten new non-provisional applications.

The method continues with step 1482 where the growth and expense co-processor determines upcoming actions based on the desired third next period (3NP) portfolio matters. For example, when the desired third next period portfolio matters include filing ten new non-provisional applications, the upcoming actions include those filings, responses to office actions, and issuances. Desired upcoming subsequent filings (e.g., continuations, LPCs, continuations-in-part, etc.) based off the non-provisional applications can also be estimated. Once patents issue, upcoming actions further includes paying maintenance fees.

The method continues with step 1484 where the growth and expense co-processor identifies upcoming actions based on the desired portfolio matters in the third next period. Where the desired portfolio matters for the third next period include filing ten new non-provisional applications, the upcoming actions that occur in the third next period may include those filings and one or more first office action responses and/or first office action allowances.

The method continues with step 1486 where the growth and expense co-processor identifies upcoming actions that occur in a fourth next period. The upcoming actions in a fourth next period are identified based on the desired third next period portfolio matters and a likely outcome of actions that occurred in the third next period. In an example of filing ten new non-provisional applications and one or more first office action responses (based off the ten new non-provisional applications) in a third next period, in the fourth next period one or more second office action responses (and associated requests for continued examination) may be expected. Further, a certain number of subsequent filings off of the non-provisional applications can be estimated for the fourth next period.

The method continues with step 1488 where the growth and expense co-processor identifies upcoming actions that occur in a fifth next period. The upcoming actions in a fifth next period are identified based on the desired portfolio matters for the third next period and a likely outcome of actions that occurred in the third next and fourth next period. In an example of filing ten new non-provisional applications one or more first office actions response in a third next period and one or more second office actions in the fourth next period, in the fifth next period one or more first office action responses after request for continued examination may be expected. Further, with subsequent filings that were filed in the fourth next period, an amount of office action responses related to those filings may be expected in the fifth next period.

The method continues with step 1489 where the growth and expense co-processor identifies upcoming actions that occur in a nth next period. The nth next period is set at a time in the future that makes sense for the business and/or the technology. For example, the business may want to secure funding for developing a patent portfolio over a ten-year period and needs an estimate of how much that will cost. In another example, the upcoming actions may be estimated up to only a fifth next period or less.

The upcoming actions in the nth next period are identified based on the desired portfolio matters for the third next period and a likely outcome of actions that occurred in the proceeding periods. With subsequent filings filed throughout, various stages of office actions and/or issuances pertaining to those filings may be expected. Further subsequent filing may also be expected. Also, maintenance fees off issued patents may be expected.

Figure 180:
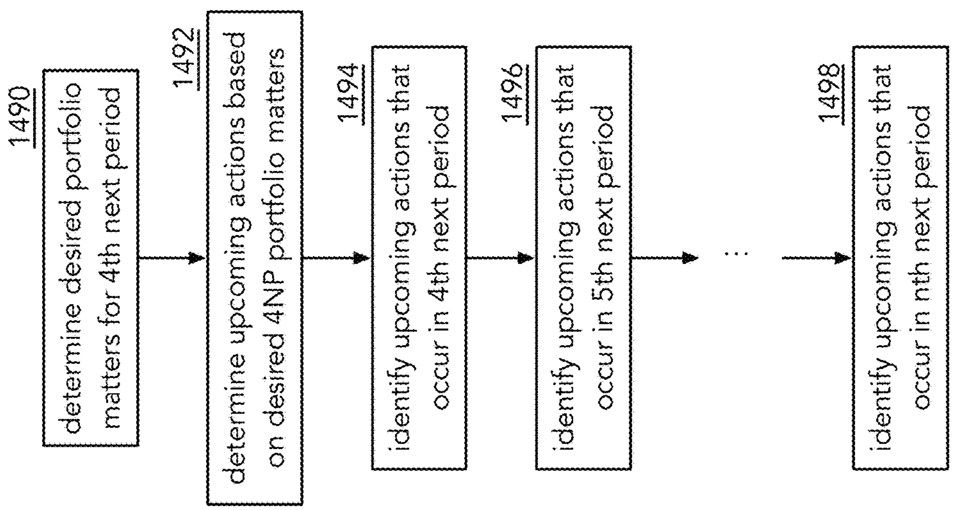
FIG. 180 is a logic diagram of an example of a method for forecasting upcoming actions regarding patent protecting an MTU (market-tech unit) based on patent protected inventions of the $4^{th}$ next period by a growth and expense co-processor of an improved computer for technology.

FIG. 180 is a logic diagram of an example of a method for forecasting upcoming actions regarding patent protecting an MTU (market-tech unit) based on patent protected inventions of the fourth next period by a growth and expense co-processor of an improved computer for technology. The method begins with step 1490 where the growth and expense co-processor determines desired portfolio matters for a fourth next period are determined. Desired portfolio matters pertain to amount of desired portfolio growth over a fourth next period and include new provisional and/or non-provisional applications, new subsequent filings (based off the new non-provisional applications), new PCT applications, etc. For example, the desired portfolio matters for the fourth next period may include filing ten new non-provisional applications.

The method continues with step 1492 where the growth and expense co-processor determines upcoming actions based on the desired fourth next period (4NP) portfolio matters. For example, when the desired fourth next period portfolio matters include filing ten new non-provisional applications, the upcoming actions include those filings, responses to office actions, and issuances. Desired upcoming subsequent filings (e.g., continuations, LPCs, continuations-in-part, etc.) based off the non-provisional applications can also be estimated. Once patents issue, upcoming actions further includes paying maintenance fees.

The method continues with step 1494 where the growth and expense co-processor identifies upcoming actions based on the desired portfolio matters in the fourth next period. Where the desired portfolio matters for the fourth next period include filing ten new non-provisional applications, the upcoming actions that occur in the fourth next period may include those filings and one or more first office action responses and/or first office action allowances.

The method continues with step 1496 where the growth and expense co-processor identifies upcoming actions that occur in a fifth next period. The upcoming actions in a fifth next period are identified based on the desired fourth next period portfolio matters and a likely outcome of actions that occurred in the fourth next period. In an example of filing ten new non-provisional applications and one or more first office action responses (based off the ten new non-provisional applications) in a fourth next period, in the fifth next period one or more second office action responses (and associated requests for continued examination) may be expected. Further, a certain number of subsequent filings off of the non-provisional applications can be estimated for the fifth next period.

The method continues with step 1498 where the growth and expense co-processor identifies upcoming actions that occur in a nth next period. The nth next period is set at a time in the future that makes sense for the business and/or the technology. For example, the business may want to secure funding for developing a patent portfolio over a ten-year period and needs an estimate of how much that will cost. In another example, the upcoming actions may be estimated up to only a fifth next period or less.

The upcoming actions in the nth next period are identified based on the desired portfolio matters for the fourth next period and a likely outcome of actions that occurred in the proceeding periods. With subsequent filings filed throughout, various stages of office actions and/or issuances pertaining to those filings may be expected. Further subsequent filing may also be expected. Also, maintenance fees off issued patents may be expected.

Figure 181:
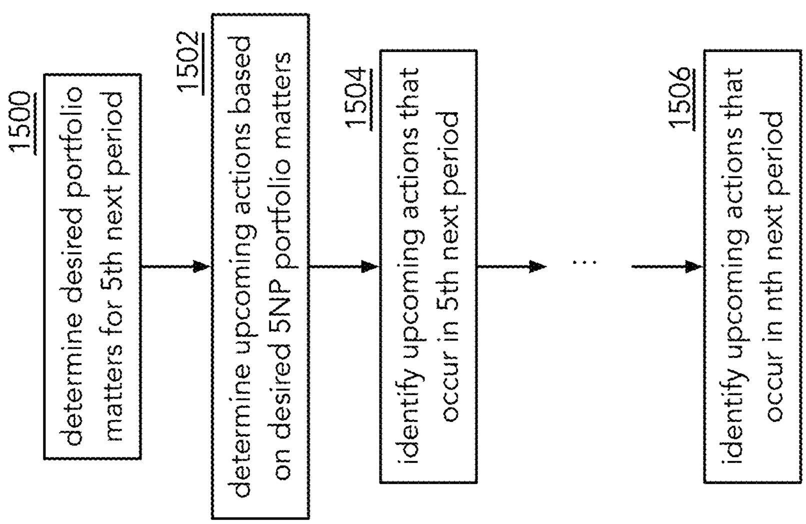
FIG. 181 is a logic diagram of an example of a method for forecasting upcoming actions regarding patent protecting an MTU (market-tech unit) based on patent protected inventions of the $5^{th}$ next period by a growth and expense co-processor of an improved computer for technology.

FIG. 181 is a logic diagram of an example of a method for forecasting upcoming actions regarding patent protecting an MTU (market-tech unit) based on patent protected inventions of the fifth next period by a growth and expense co-processor of an improved computer for technology. The method begins with step 1500 where the growth and expense co-processor determines desired portfolio matters for a fifth next period. Desired portfolio matters pertain to an amount of desired portfolio growth over a fifth next period and include new provisional and/or non-provisional applications, new subsequent filings (based off the new non-provisional applications), new PCT applications, etc. For example, the desired portfolio matters for the fifth next period may include filing three new non-provisional applications.

The method continues with step 1502 where the growth and expense co-processor determines upcoming actions based on the desired fifth next period (5NP) portfolio matters. For example, when the desired fifth next period portfolio matters include filing three new non-provisional applications, the upcoming actions include those filings, responses to office actions, and issuances. Desired upcoming subsequent filings (e.g., continuations, LPCs, continuations-in-part, etc.) based off the non-provisional applications can also be estimated. Once patents issue, upcoming actions further includes paying maintenance fees.

The method continues with step 1504 where the growth and expense co-processor identifies upcoming actions based on the desired portfolio matters in the fifth next period. Where the desired portfolio matters for the fifth next period include filing three new non-provisional applications, the upcoming actions that occur in the fifth next period may include those filings and one or more first office action responses and/or first office action allowances.

The method continues with step 1506 where the growth and expense co-processor identifies upcoming actions that occur in a nth next period. The nth next period is set at a time in the future that makes sense for the business and/or the technology. For example, the business may want to secure funding for developing a patent portfolio over a ten-year period and needs an estimate of how much that will cost.

The upcoming actions in the nth next period are identified based on the desired portfolio matters for the fifth next period and a likely outcome of actions that occurred in the proceeding periods. With subsequent filings filed throughout, various stages of office actions and/or issuances pertaining to those filings may be expected. Further subsequent filing may also be expected. Also, maintenance fees off issued patents may be expected.

Figure 182:
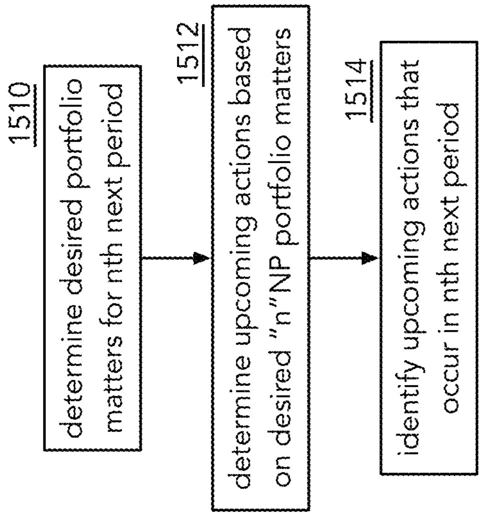
FIG. 182 is a logic diagram of an example of a method for forecasting upcoming actions regarding patent protecting an MTU (market-tech unit) based on patent protected inventions of the $n^{th}$ next period by a growth and expense co-processor of an improved computer for technology.

FIG. 182 is a logic diagram of an example of a method for forecasting upcoming actions regarding patent protecting an MTU (market-tech unit) based on patent protected inventions of the nth next period by a growth and expense co-processor of an improved computer for technology. The method begins with step 1510 where the growth and expense co-processor determines desired portfolio matters for an nth next period. Desired portfolio matters pertain to an amount of desired portfolio growth over an nth next period and include new provisional and/or non-provisional applications, new subsequent filings (based off the new non-provisional applications), new PCT applications, etc. For example, the desired portfolio matters for the nth next period may include filing five new non-provisional applications.

The method continues with step 1512 where the growth and expense co-processor determines upcoming actions based on the desired nth next period ("n" NP) portfolio matters. For example, when the desired nth next period portfolio matters include filing five new non-provisional applications, the upcoming actions include those filings, responses to office actions, and issuances. Desired upcoming subsequent filings (e.g., continuations, LPCs, continuations-in-part, etc.) based off the non-provisional applications can also be estimated. Once patents issue, upcoming actions further includes paying maintenance fees.

The method continues with step 1514 where the growth and expense co-processor identifies upcoming actions that occur in the nth next period. Where the desired portfolio matters for the nth next period include filing five new non-provisional applications, the upcoming actions that occur in the nth next period may include those filings and one or more first office action responses and/or first office action allowances.

Figure 183:
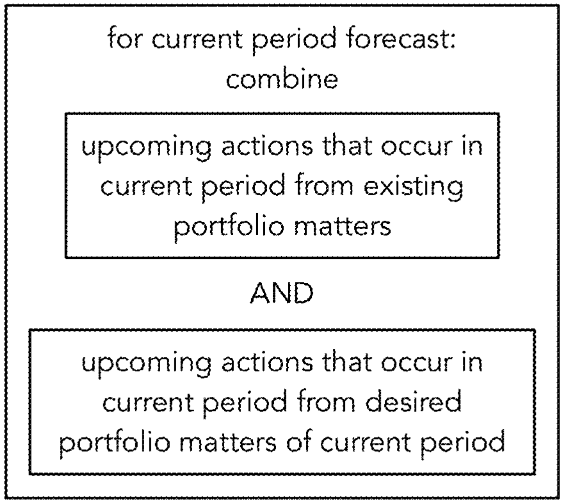
FIG. 183 is a logic diagram of an example of a method for combining actions regarding patent protecting an MTU (market-tech unit) that are forecasted to occur in the current period by a growth and expense co-processor of an improved computer for technology.

FIG. 183 is a logic diagram of an example of a method for combining actions regarding patent protecting an MTU (market-tech unit) that are forecasted to occur in the current period by a growth and expense co-processor of an improved computer for technology. For a current period forecast, the upcoming actions that occur in the current period from the existing portfolio matters (as discussed with reference to step 1414 of FIG. 175) are combined with the upcoming actions that occur in the current in the current period from the desired portfolio matters of the current period (as discussed with reference to step 1434 of FIG. 176).

Figure 184:
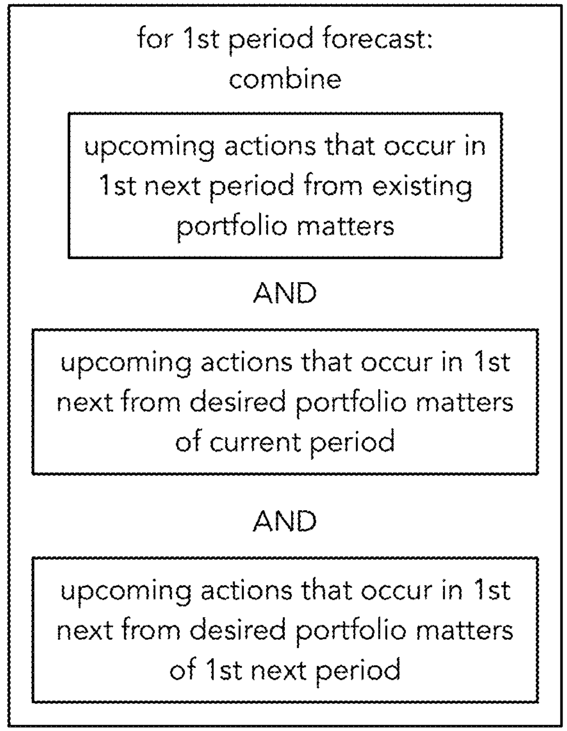
FIG. 184 is a logic diagram of an example of a method for combining actions regarding patent protecting an MTU (market-tech unit) that are forecasted to occur in the $1^{st}$ next period by a growth and expense co-processor of an improved computer for technology.

FIG. 184 is a logic diagram of an example of a method for combining actions regarding patent protecting an MTU (market-tech unit) that are forecasted to occur in the first next period by a growth and expense co-processor of an improved computer for technology. For a first next period forecast, the upcoming actions that occur in the first next period from the existing portfolio matters (as discussed with reference to step 1416 of FIG. 175) are combined with the upcoming actions that occur in the first next period from desired portfolio matters of a current period (as discussed with reference to step 1436 of FIG. 176) and the upcoming actions that occur in the first next period from desired portfolio matters of the first next period (as discussed with reference to step 1444 of FIG. 177).

Figure 185:
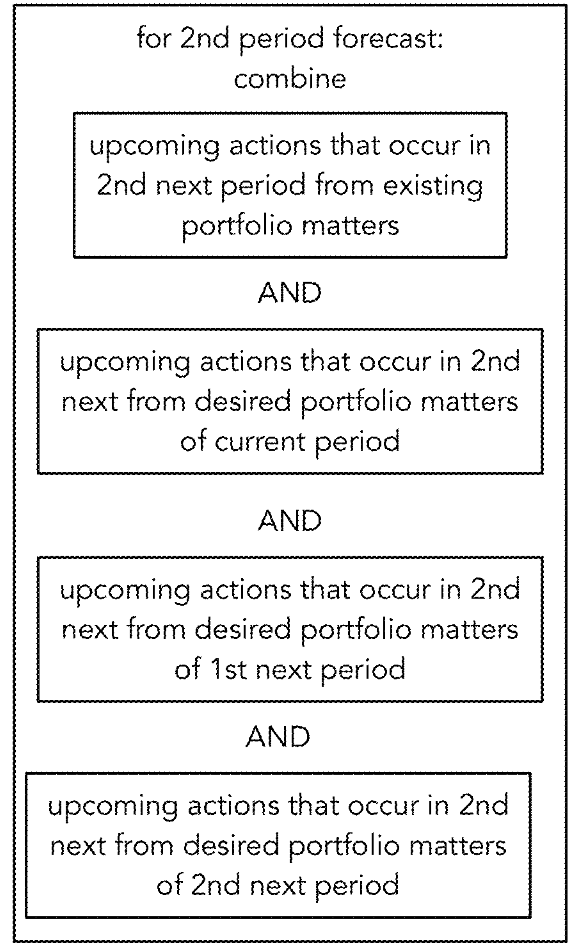
FIG. 185 is a logic diagram of an example of a method for combining actions regarding patent protecting an MTU (market-tech unit) that are forecasted to occur in the $2^{nd}$ next period by a growth and expense co-processor of an improved computer for technology.

FIG. 185 is a logic diagram of an example of a method for combining actions regarding patent protecting an MTU (market-tech unit) that are forecasted to occur in the second next period by a growth and expense co-processor of an improved computer for technology. For a second next period forecast, the upcoming actions that occur in the second next period from the existing portfolio matters (as discussed with reference to step 1418 of FIG. 175) are combined with the upcoming actions that occur in the second next period from desired portfolio matters of a current period (as discussed with reference to step 1438 of FIG. 176), the upcoming actions that occur in the second next period from desired portfolio matters of the first next period (as discussed with reference to step 1446 of FIG. 177), and the upcoming actions that occur in the second next period from desired portfolio matters of the second next period (as discussed with reference to step 1464 of FIG. 178).

Figure 186:
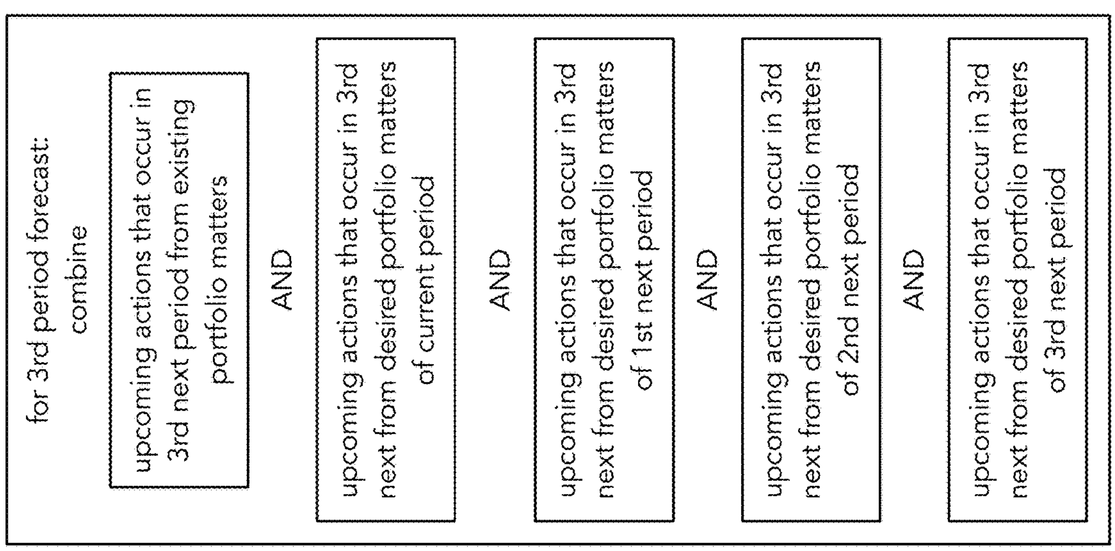
FIG. 186 is a logic diagram of an example of a method for combining actions regarding patent protecting an MTU (market-tech unit) that are forecasted to occur in the $3^{rd}$ next period by a growth and expense co-processor of an improved computer for technology.

FIG. 186 is a logic diagram of an example of a method for combining actions regarding patent protecting an MTU (market-tech unit) that are forecasted to occur in the third next period by a growth and expense co-processor of an improved computer for technology. For a third next period forecast, the upcoming actions that occur in the third next period from the existing portfolio matters (as discussed with reference to step 1420 of FIG. 175) are combined with the upcoming actions that occur in the third next period from desired portfolio matters of a current period (as discussed with reference to step 1440 of FIG. 176), the upcoming actions that occur in the third next period from desired portfolio matters of the first next period (as discussed with reference to step 1448 of FIG. 177), the upcoming actions that occur in the third next period from desired portfolio matters of the second next period (as discussed with reference to step 1468 of FIG. 178), and the upcoming actions that occur in the third next period from desired portfolio matters of the third next period (as discussed with reference to step 1484 of FIG. 179).

Figure 187:
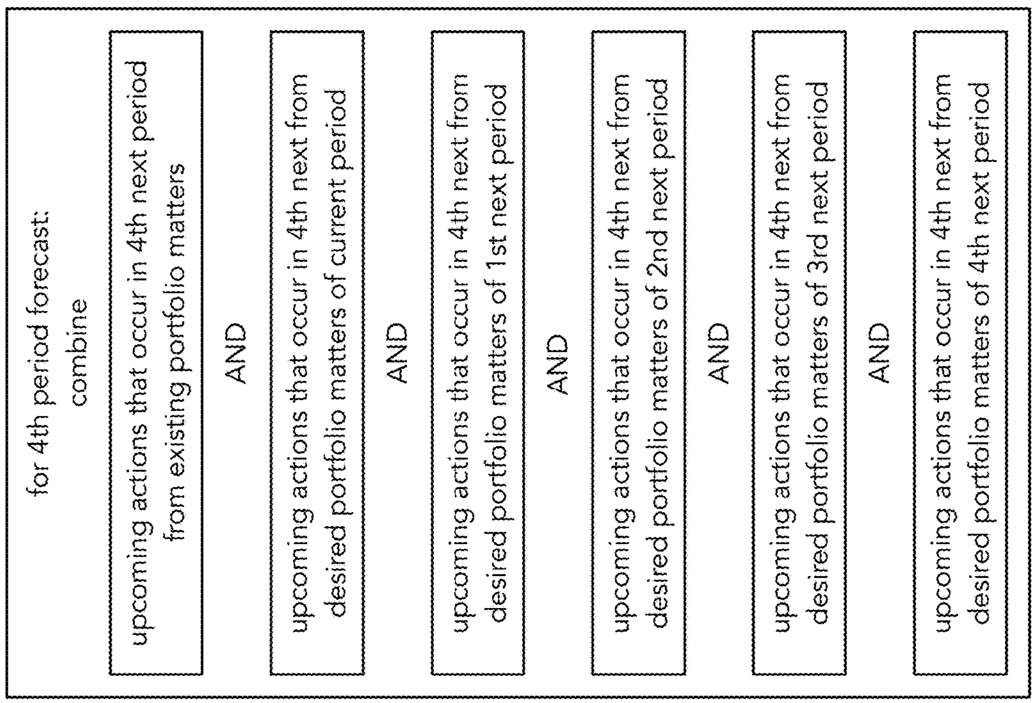
FIG. 187 is a logic diagram of an example of a method for combining actions regarding patent protecting an MTU (market-tech unit) that are forecasted to occur in the $4^{th}$ next period by a growth and expense co-processor of an improved computer for technology.

FIG. 187 is a logic diagram of an example of a method for combining actions regarding patent protecting an MTU (market-tech unit) that are forecasted to occur in the fourth next period by a growth and expense co-processor of an improved computer for technology. For a fourth next period forecast, the upcoming actions that occur in the fourth next period from the existing portfolio matters (as discussed with reference to step 1422 of FIG. 175) are combined with the upcoming actions that occur in the fourth next period from desired portfolio matters of a current period (as discussed with reference to step 1442 of FIG. 176), the upcoming actions that occur in the fourth next period from desired portfolio matters of the first next period (as discussed with reference to step 1450 of FIG. 177), the upcoming actions that occur in the fourth next period from desired portfolio matters of the second next period (as discussed with reference to step 1470 of FIG. 178), the upcoming actions that occur in the fourth next period from desired portfolio matters of the third next period (as discussed with reference to step 1486 of FIG. 179), and the upcoming actions that occur in the fourth next period from desired portfolio matters of the fourth next period (as discussed with reference to step 1494 of FIG. 180).

Figure 188:
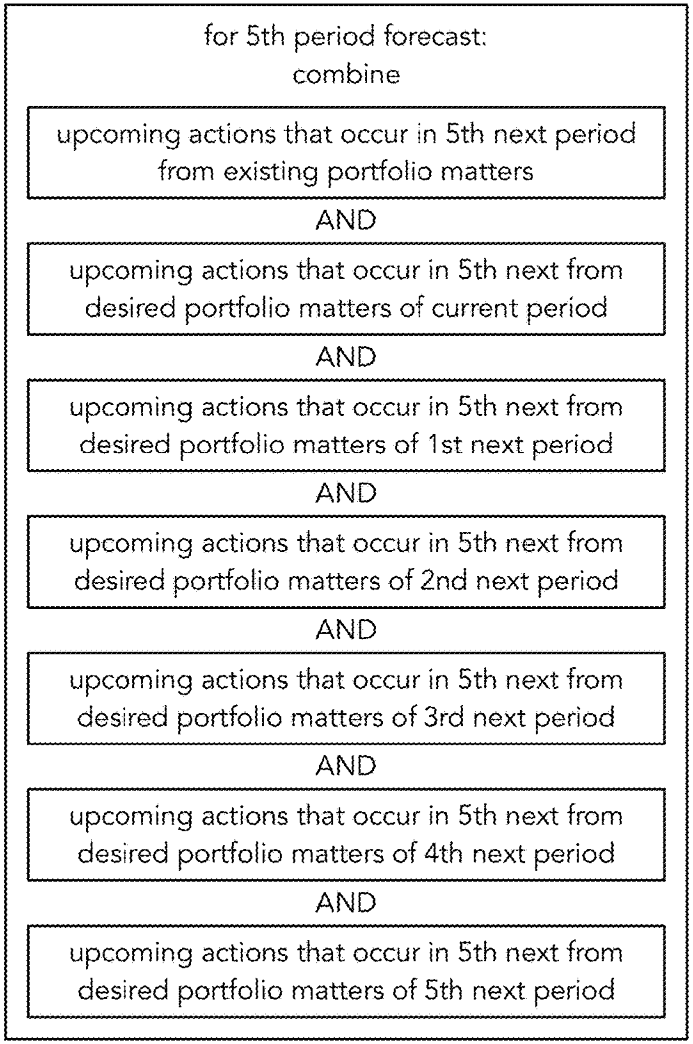
FIG. 188 is a logic diagram of an example of a method for combining actions regarding patent protecting an MTU (market-tech unit) that are forecasted to occur in the $5^{th}$ next period by a growth and expense co-processor of an improved computer for technology.

FIG. 188 is a logic diagram of an example of a method for combining actions regarding patent protecting an MTU (market-tech unit) that are forecasted to occur in the fifth next period by a growth and expense co-processor of an improved computer for technology. For a fifth next period forecast, the upcoming actions that occur in the fifth next period from the existing portfolio matters (as discussed with reference to step 1424 of FIG. 175) are combined with the upcoming actions that occur in the fifth next period from desired portfolio matters of a current period (as discussed with reference to step 1444 of FIG. 176), the upcoming actions that occur in the fifth next period from desired portfolio matters of the first next period (as discussed with reference to step 1452 of FIG. 177), the upcoming actions that occur in the fifth next period from desired portfolio matters of the second next period (as discussed with reference to step 1472 of FIG. 178), the upcoming actions that occur in the fifth next period from desired portfolio matters of the third next period (as discussed with reference to step 1488 of FIG. 179), the upcoming actions that occur in the fifth next period from desired portfolio matters of the fourth next period (as discussed with reference to step 1496 of FIG. 180), and the upcoming actions that occur in the fifth next period from desired portfolio matters of the fifth next period (as discussed with reference to step 1504 of FIG. 181).

Figure 189:
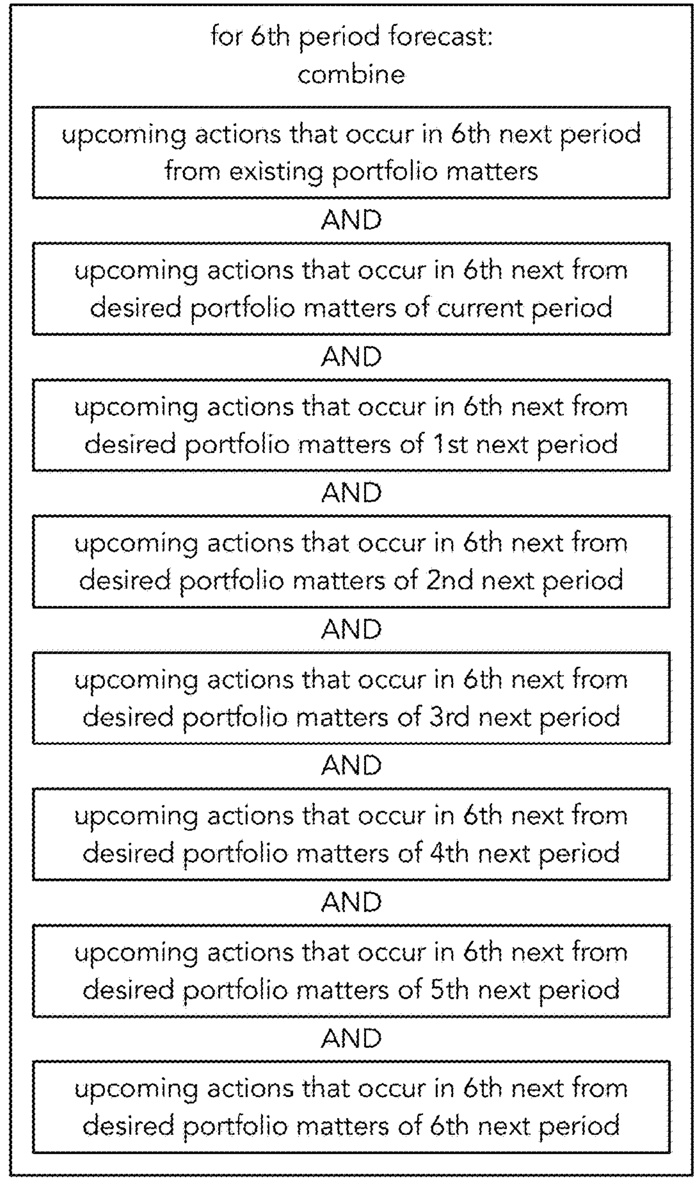
FIG. 189 is a logic diagram of an example of a method for combining actions regarding patent protecting an MTU (market-tech unit) that are forecasted to occur in the $6^{th}$ next period by a growth and expense co-processor of an improved computer for technology.

FIG. 189 is a logic diagram of an example of a method for combining actions regarding patent protecting an MTU (market-tech unit) that are forecasted to occur in the sixth next period by a growth and expense co-processor of an improved computer for technology. For a sixth next period forecast, the upcoming actions that occur in the sixth next period from the existing portfolio matters are combined with the upcoming actions that occur in the sixth next period from desired portfolio matters of a current period, the upcoming actions that occur in the sixth next period from desired portfolio matters of the first next period, the upcoming actions that occur in the sixth next period from desired portfolio matters of the second next period, the upcoming actions that occur in the sixth next period from desired portfolio matters of the third next period, the upcoming actions that occur in the sixth next period from desired portfolio matters of the fourth next period, the upcoming actions that occur in the sixth next period from desired portfolio matters of the fifth next period, and the upcoming actions that occur in the sixth next period from desired portfolio matters of the sixth next period.

Figure 190:
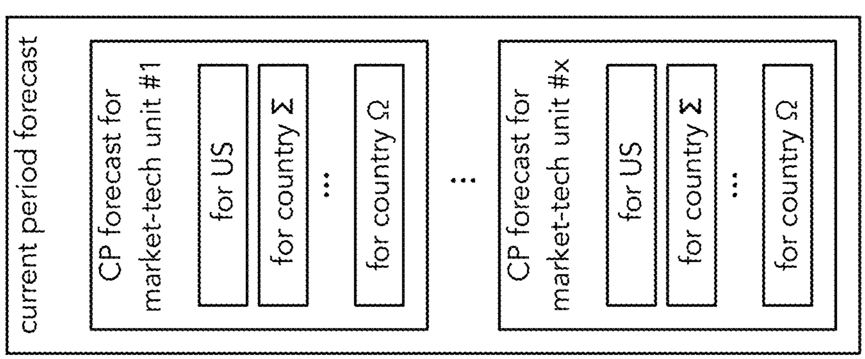
FIG. 190 is a logic diagram of an example of a method for combining US and international actions regarding patent protecting multiple MTUs (market-tech units) that are forecasted to occur in the current period by a growth and expense co-processor of an improved computer for technology.

FIG. 190 is a logic diagram of an example of a method for combining US and international actions regarding patent protecting multiple MTUs (market-tech units) that are forecasted to occur in the current period by a growth and expense co-processor of an improved computer for technology. For each market-tech unit #1-#x of a technology, a current period forecast can be generated as discussed with reference to FIGS. 176 and 183. Further, a current period forecast of each market-tech unit #1-#x of a technology can be generated with respect to a particular country (e.g., the U.S., foreign countries Σ-Ω, etc.). The current period forecast can be shown for each of these categories or combined into an overall current period forecast.

Figure 191:
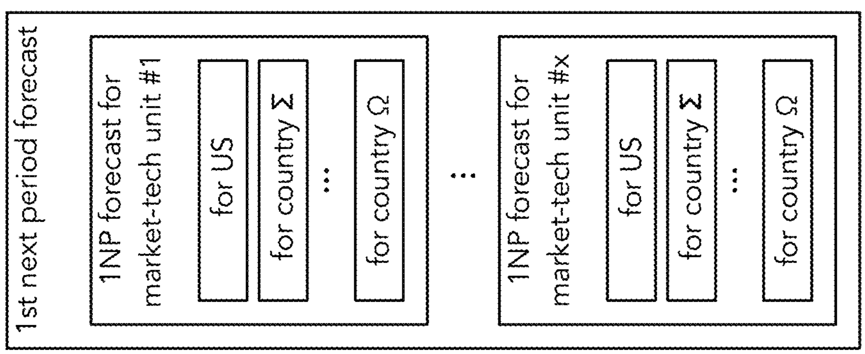
FIG. 191 is a logic diagram of an example of a method for combining US and international actions regarding patent protecting multiple MTUs (market-tech units) that are forecasted to occur in the $1^{st}$ next period by a growth and expense co-processor of an improved computer for technology.

FIG. 191 is a logic diagram of an example of a method for combining US and international actions regarding patent protecting multiple MTUs (market-tech units) that are forecasted to occur in the first next period by a growth and expense co-processor of an improved computer for technology. For each market-tech unit #1-#x of a technology, a first next period forecast can be generated as discussed with reference to FIGS. 177 and 184. Further, a first next period forecast of each market-tech unit #1-#x of a technology can be generated with respect to a particular country (e.g., the U.S., foreign countries Σ-Ω, etc.). The first next period forecast can be shown for each of these categories or combined into an overall first next period forecast.

Figure 192:
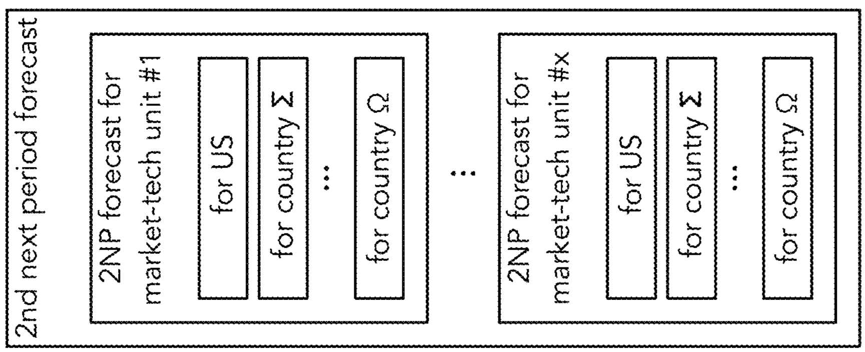
FIG. 192 is a logic diagram of an example of a method for combining US and international actions regarding patent protecting multiple MTUs (market-tech units) that are forecasted to occur in the $2^{nd}$ next period by a growth and expense co-processor of an improved computer for technology.

FIG. 192 is a logic diagram of an example of a method for combining US and international actions regarding patent protecting multiple MTUs (market-tech units) that are forecasted to occur in the second next period by a growth and expense co-processor of an improved computer for technology. For each market-tech unit #1-#x of a technology, a second next period forecast can be generated as discussed with reference to FIGS. 178 and 185. Further, a second next period forecast of each market-tech unit #1-#x of a technology can be generated with respect to a particular country (e.g., the U.S., foreign countries Σ-Ω, etc.). The second next period forecast can be shown for each of these categories or combined into an overall second next period forecast.

Figure 193:
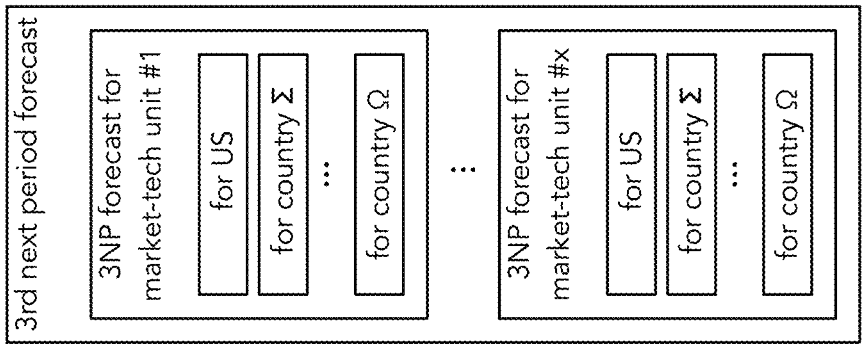
FIG. 193 is a logic diagram of an example of a method for combining US and international actions regarding patent protecting multiple MTUs (market-tech units) that are forecasted to occur in the $3^{rd}$ next period by a growth and expense co-processor of an improved computer for technology.

FIG. 193 is a logic diagram of an example of a method for combining US and international actions regarding patent protecting multiple MTUs (market-tech units) that are forecasted to occur in the third next period by a growth and expense co-processor of an improved computer for technology. For each market-tech unit #1-#x of a technology, a third next period forecast can be generated as discussed with reference to FIGS. 179 and 186. Further, a third next period forecast of each market-tech unit #1-#x of a technology can be generated with respect to a particular country (e.g., the U.S., foreign countries Σ-Ω, etc.). The third next period forecast can be shown for each of these categories or combined into an overall third next period forecast.

Figure 194:
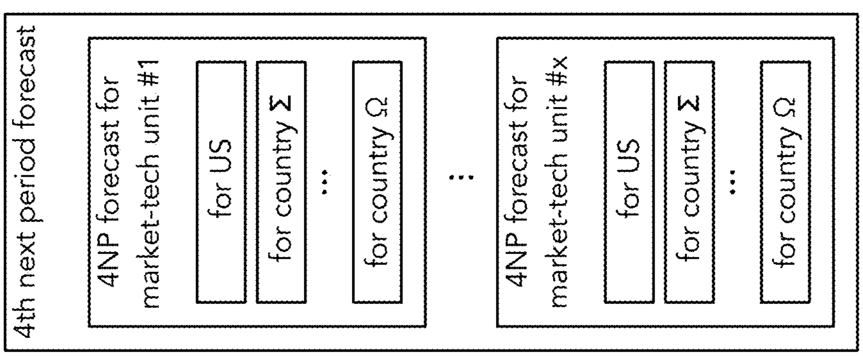
FIG. 194 is a logic diagram of an example of a method for combining US and international actions regarding patent protecting multiple MTUs (market-tech units) that are forecasted to occur in the $4^{th}$ next period by a growth and expense co-processor of an improved computer for technology.

FIG. 194 is a logic diagram of an example of a method for combining US and international actions regarding patent protecting multiple MTUs (market-tech units) that are forecasted to occur in the fourth next period by a growth and expense co-processor of an improved computer for technology. For each market-tech unit #1-#x of a technology, a fourth next period forecast can be generated as discussed with reference to FIGS. 180 and 187. Further, a fourth next period forecast of each market-tech unit #1-#x of a technology can be generated with respect to a particular country (e.g., the U.S., foreign countries Σ-Ω, etc.). The fourth next period forecast can be shown for each of these categories or combined into an overall fourth next period forecast.

Figure 195:
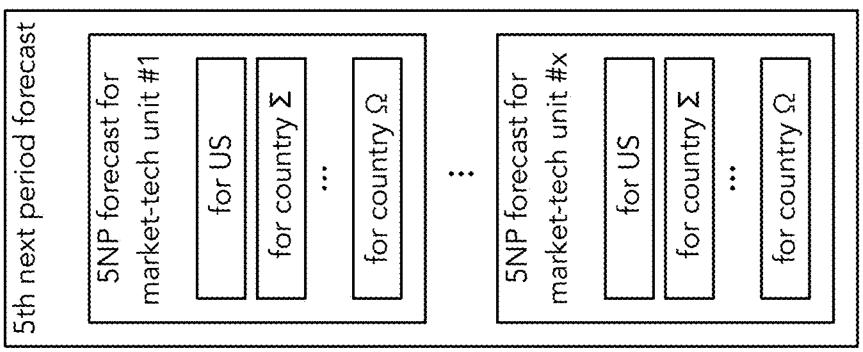
FIG. 195 is a logic diagram of an example of a method for combining US and international actions regarding patent protecting multiple MTUs (market-tech units) that are forecasted to occur in the $5^{th}$ next period by a growth and expense co-processor of an improved computer for technology.

FIG. 195 is a logic diagram of an example of a method for combining US and international actions regarding patent protecting multiple MTUs (market-tech units) that are forecasted to occur in the 5th next period by a growth and expense co-processor of an improved computer for technology. For each market-tech unit #1-#x of a technology, a fifth next period forecast can be generated as discussed with reference to FIGS. 181 and 188. Further, a fifth next period forecast of each market-tech unit #1-#x of a technology can be generated with respect to a particular country (e.g., the U.S., foreign countries Σ-Ω, etc.). The fifth next period forecast can be shown for each of these categories or combined into an overall fifth next period forecast.

Figure 196:
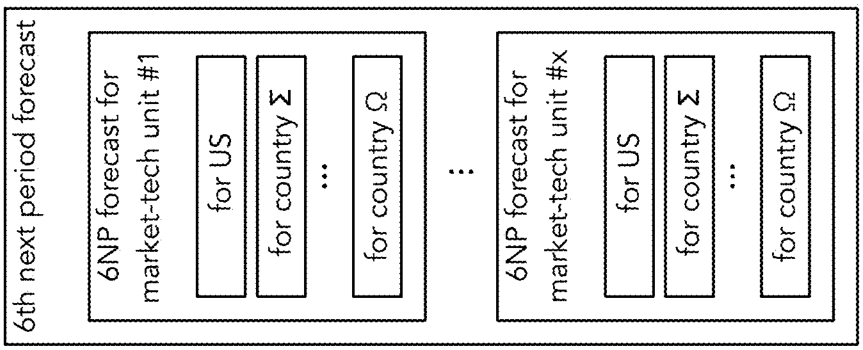
FIG. 196 is a logic diagram of an example of a method for combining US and international actions regarding patent protecting multiple MTUs (market-tech units) that are forecasted to occur in the $6^{th}$ next period by a growth and expense co-processor of an improved computer for technology.

FIG. 196 is a logic diagram of an example of a method for combining US and international actions regarding patent protecting multiple MTUs (market-tech units) that are forecasted to occur in the $6^{th}$ next period by a growth and expense co-processor of an improved computer for technology. For each market-tech unit #1-#x of a technology, a sixth next period forecast can be generated as discussed with reference to FIG. 189. Further, a sixth next period forecast of each market-tech unit #1-#x of a technology can be generated with respect to a particular country (e.g., the U.S., foreign countries Σ-Ω, etc.). The sixth next period forecast can be shown for each of these categories or combined into an overall sixth next period forecast.

Figure 197:
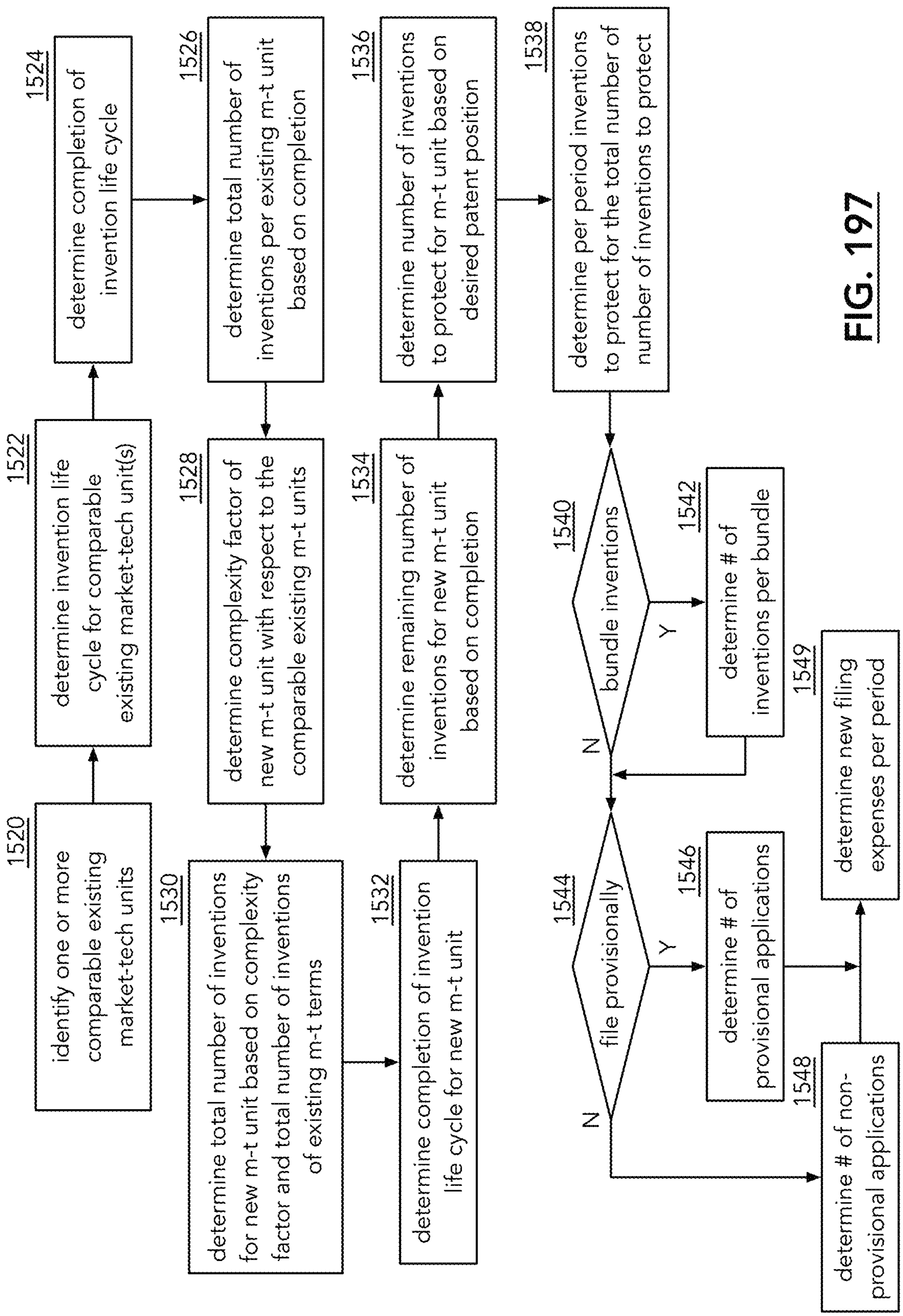
FIG. 197 is a logic diagram of an example of a method for forecasting new inventions per period to patent protect for an MTU (market-tech unit) by a growth and expense co-processor of an improved computer for technology.

FIG. 197 is a logic diagram of an example of a method for forecasting new inventions per period to patent protect for an MTU (market-tech unit or m-t unit) by a growth and expense co-processor of an improved computer for technology. The method begins with step 1520 where the growth and expense co-processor identifies one or more comparable existing market-tech units. For example, the MSBTP (marketing, sales, business, technical, and patent) data gathering section of the improved computer for technology executes machine learning and/or artificial intelligence programs to routinely (e.g., periodically, pseudo randomly, upon request, etc.) ingests a large number of documents and dissect each document for relevant information regarding existing MTUs. The growth and expense co-processor compares (e.g., by classification data, keywords, etc.) a new or incoming MTU to existing MTUs to identify comparable existing MTUs. For example, if the MTU is improved circuitry for use in touchscreens, the one or more comparable existing MTUs may include touchscreen devices.

The method continues with step 1522 where the growth and expense co-processor determines invention life cycle(s) for the comparable existing MTUs (e.g., based on gathered data from at least the MSBTP data gathering section). For example, an invention life cycle for a comparable existing MTU includes generations (previous, current, and/or next) and the phases of each generation. A generational life of a MTU includes a create phase, a deploy phase, an optimize phase, a mature phase, and a decline phase. In the create phase, the MTU is being created and not yet commercialized. In the deploy phase, an initial commercial embodiment of the MTU is made publicly available. In the optimize phase, commercial embodiments of the MTU are optimized for performance, production costs, features, and/or other optimizations and revenue from the commercial embodiments increases. In the mature phase, the commercial embodiments of the MTU are optimized and revenue from the commercial embodiments increases at a decreasing rate.

In the decline phase, revenue from the commercial embodiments of the MTU decreases at an increasing rate.

The method continues with step 1524 where growth and expense co-processor determines the completion of the invention life cycle. For example, each generation of the invention life cycle includes a life span and each phase of each generation includes a time frame. The completion of the invention life cycle estimates when the invention life cycle ends based on the expected life span of each generation and the time frame of each phase. For example, a comparable MTU may be in a optimize phase and the completion of the invention life cycle (e.g., the end of the decline phase) may be estimated at 5 years from today.

The method continues with step 1526 where the growth and expense co-processor determines a total number of inventions per existing comparable MTU based on the completion of the invention life cycle. The creation of inventions occurs over the life of the MTU. Fundamental inventions are typically created during the create phase and a portion of the deploy phase. Commercially necessary inventions are typically created in part of the create phase, throughout the deploy phase and into the optimize phase. Commercial expansion inventions are typically created in part of the deploy phase through the mature phase and into the decline phase. The growth and expense co-processor is operable to analyze inventions that currently exist (e.g., identify inventions from issued patents and pending patent applications gathered via at least the MSBTP data gathering section) for a comparable existing MTU but also estimate a remaining amount of inventions that are likely to occur for the remainder of its invention life cycle based on market statistics, historical data, etc. The existing and estimated remaining inventions for each existing comparable MTU are combined to determine the total number of inventions per existing comparable MTU.

The method continues with step 1528 where the growth and expense co-processor determines a complexity factor of the new market-tech unit with respect to the comparable existing MTUs. The complexity factor may be a value that ranges from 0.5 to 4.0 and indicates a change in the level of innovation to develop the new MTU technology with respect to the level of innovation used to develop the comparable existing MTU technology. Determining the complexity factor may include comparing how similar the comparable existing MTUs are to the one or more new MTUs. For example, the new MTU may involve an innovative tweak to an already existing component in which case the complexity factor may be a 1.0 or less. In another example, the new MTU may involve a completely new, revolutionary component that will require development from the ground up in which case the complexity factor may be closer to a 4.0.

The method continues with step 1530 where the growth and expense co-processor determines a total number of inventions for the new MTU based on the complexity factor and the total number of inventions of existing MTUs. For example, if the number of inventions of comparable existing MTUs is 15,000 and the complexity factor is 1.0, the total number of inventions for the new MTU may be calculated as 15,000 (e.g., 1.0×15,000). In another example, when the new MTU is more complex than existing comparable MTUs, more inventions may be involved in the development and launch of the new MTU. For example, if the number of inventions of comparable existing MTUs is 15,000 and the complexity factor is 4.0, the total number of inventions for the new MTU may be calculated at 60,000 (e.g., 4.0×15,000).

The method continues with step 1532 where the growth and expense co-processor determines completion of invention life cycle for the new MTU. Based on the current stage of the invention life cycle of the new MTU, the type of technology involved, comparison to similar technologies, market data, historical data, etc., an estimated completion of the invention life cycle for the new MTU can be determined. Each generation of the invention life cycle includes a life span and each phase of each generation includes a time frame. The completion of the invention life cycle estimates when the invention life cycle ends based on the expected life span of each generation and the time frame of each phase. For example, the new MTU may be in a create phase and the completion of the invention life cycle (e.g., the end of the decline phase) may be estimated at 10 years from today.

The method continues with step 1534 where the growth and expense co-processor determines the remaining number of inventions for new MTU based on the completion of the invention life cycle. Based on the generation and phase the MTU is currently in and the completion of the invention life cycle, a remaining number of inventions for the new MTU can be determined. For example, if the MTU is currently in year two of a ten year technology lifespan, estimated inventions for the remaining eight years can be determined from the total number of inventions for the new MTU.

The method continues with step 1536 where the growth and expense co-processor determines a number of inventions to protect for the new MTU based on a desired patent position. The desired patent position is with respect to others regarding a patent dispute involving the technology and can range from weak to superior. A superior patent position is one in which the patent holder has a superior patent position with respect to all others involved with the technology. A weak patent position is one in which the patent holder has an inferior patent position with respect to most, if not all, others involved with the technology. The number of inventions to protect may be determined based on a percentage of the total number of inventions estimated for the lifespan of the MTU. For example, a superior patent position be a higher percentage and a weak patent position may be a lower percentage.

The method continues with step 1538 where the growth and expense co-processor determines per period inventions to protect for the total number of inventions to protect. For example, a period may be set at a year and the invention lifespan is determined to be ten years where the current year is year two. For year two, and the remaining eight years, the total number of inventions for each year (i.e., period) is determined. Depending on the phase (e.g., create, deploy, optimize, mature, and decline) of the MTU, more inventions may be allotted to particular periods. For example, a peak amount of inventions may need to be protected during the end of the optimize stage (e.g., see FIGS. 199-200). If the optimize stage is determined to be years 4-8 of the technology life, years 4-8 may see an increase in the amount of inventions protected of the total number of inventions.

The method continues with step 1540 where the growth and expense co-processor determines whether to bundle inventions. For example, a patent application for a bundle of inventions includes "x" number of inventions. One of the inventions is selected to be the claimed invention. The remaining "x−1" inventions (i.e., Legal Placeholder Inventions) are disclosed in an enabling manner for subsequent conversion to a patent application.

The upfront cost of filing a patent application with a bundle of inventions is significantly less than filing separate patent applications for each of the inventions in the bundle. For example, assume that the attorney fee for preparing and filing a patent application is $14,000, the government filing fee for a patent application is $1,000, and the attorney fee for a detailed discussion for a legal placeholder invention is $4,000 and further assume there are 6 inventions in a bundle. The cost to file one patent application with a bundle of 6 inventions is $35,000 ($14,000+$1,000+5*$4,000)). The cost to file six separate patent applications is $90,000 (6*($14,000+$1,000)).

When it is determined to pursue application bundles, the method continues with step 1542 where the growth and expense co-processor determines a number of inventions per bundle. The number of inventions per bundle may be determined based on a typical number of inventions relating to a particular topic at a particular phase in the technology, a desired length of the specification and amount of drawings, desired spend, and/or the amount of total inventions desired for bundling. For example, the number of inventions per bundle may be determined to be 4.

When the number of inventions per bundle are determined or it is determined not to bundle inventions, the method continues with step 1544 where the growth and expense co-processor determines whether to file applications (e.g., bundles if coming from step 1542) provisionally.

Patent law provides that a patent application for an invention can be filed as a provisional patent application or it can be filed as a non-provisional utility patent application. If a provisional application is filed, it must be converted into a non-provisional utility patent application within 12 months of its filing date. The provisional patent application expires 12 months after its filing date.

In general, a provisional patent application has less requirements than a non-provisional utility patent application (e.g., no claims) and is cheaper to file (e.g., lower attorney fees and governmental filing fees) to establish a priority date for the disclosed subject matter regarding the invention. Therefore, depending upon the time frame for filing and the funds available, provisional applications may initially be chosen over non-provisional applications in certain cases.

A provisional patent application is not examined or reviewed by the Patent Office. As such, the detailed discussion of the invention may be almost any length and/or of any level of detail. If, however, the detailed discussion of the provisional application is lacking an enabling disclosure, does not disclose the best mode of operation, and/or is lacking support for the claims, as are required for a non-provisional utility patent application, the added detailed description is not afforded the filing date of the provisional patent application. It is given the filing date of the non-provisional utility patent application. While patent law allows for the filing of provisional patent applications, it's typically recommended to file a non-provisional patent application when time allows. This ensures that all of the requirements of the detailed description are met, and the application is in queue for examination by the Patent Office.

When it is determined that one or more provisional applications are to be filed, the method continues with step 1546 where the growth and expense co-processor determines the number of provisional applications. The number of provisional applications may be based on the number of total inventions, the number of bundle applications, the level of completeness of the invention, the time frame in which the applications should or need to be filed, the current phase of the technology, a desired spend, etc.

When it is determined that one or more provisional applications are not to be filed or after the number of provisional applications are determined at step 1546, the method continues with step 1548 where the growth and expense co-processor determines the number of non-provisional applications. The number of non-provisional applications may be based on the number of total inventions, the number of the bundle applications, the number of provisional applications filed, the level of completeness of the invention, the current phase of the technology, a desired spend, etc.

The method continues with step 1549 where the growth and expense co-processor determines new application filing expenses per period. When a desired number of new applications are determined per period, the filing expenses can be calculated based on attorney fees and government fees associated for application filings. If the amount is too high, the desired patent position can be adjusted to reduce the amount of new filings and reduce expenses. Other options to reduce filing expenses without weakening a desired patent position may include filing more provisional applications over non-provisional applications initially, filing more bundles applications, and/or including more inventions per bundle.

Figure 198:
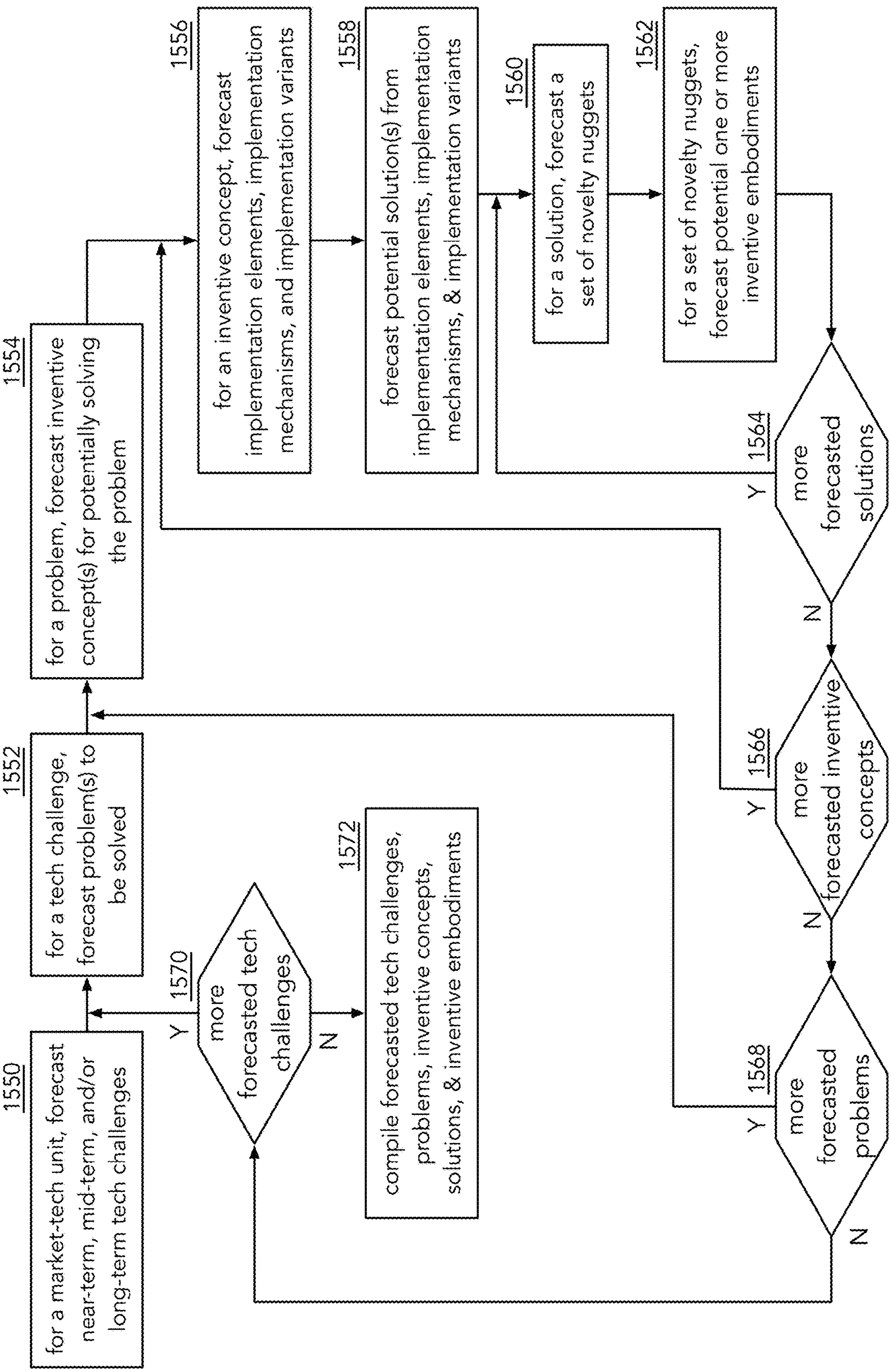
FIG. 198 is a logic diagram of another example of a method for forecasting new inventions per period to patent protect for an MTU (market-tech unit) by a growth and expense co-processor of an improved computer for technology.

FIG. 198 is a logic diagram of another example of a method for forecasting new inventions per period to patent protect for an MTU (market-tech unit) by a growth and expense co-processor of an improved computer for technology. FIG. 198 is a new application forecasting method related to the technical challenge to inventive embodiment mapping discussed with reference to FIG. 65. The forecasting method aims to estimate a quantity of new application filings and, if possible, identify inventive subject matter. Forecasted data may be based on information pulled from engineers during invention harvesting sessions, advanced inventing sessions, and/or determined based on historical data (e.g., analyzing the inventive embodiment chain of comparable known technical challenges).

The method begins with step 1550 where for an MTU, near-term, mid-term, and/or long-term technical (tech) challenges are forecasted. In general, a technical challenge corresponds to a technical aspect of a unique value proposition (UVP) of quantified technology, a technical aspect of a marketable feature of products embodying (or likely to embody) the quantified technology, and/or other technical aspect of the quantified technology. For example, for the UVP of a better user experience for touch screens and its associated marketable features, the tech challenges include, but are not limited to, improve signal to noise ratio of touch sensing, improve video graphics processing, and improve touch detection processing and image rendering thereof.

The method continues with step 1552 where for a technical challenge, the problem(s) to be solved are forecasted. Each technical challenge provides motivation for one or more problems. For example, the technical challenge of accurate battery sensing provides motivation for the problems of "how to sense a battery with negligible effect on the battery" and "how to use a plurality of AC signals to sense a battery." As another example, the technical challenge of improved battery discharge modeling provides motivation for the problem of "how to model battery discharging based on the more accurate sensed battery data." As a further example, the tech challenge of improved battery charge modeling provides motivation for the problem of "how to model battery charging based on the more accurate sensed battery data."

The method continues with step 1554 where for a problem, inventive concept(s) for potentially solving the problem are forecasted. An inventive concept is a conceptual way of solving a problem. As an example, for the problem of "improving force transfer between the body and the ground via the shoes," an inventive concept is to have different force transfer properties in the heel than in the forefoot of sole to improve engagement of the foot to the shoe and the shoe to the ground. Another inventive concept for this problem is to have a series of horizontal force to vertical force focusing elements in the sole to improve engagement of the foot to the shoe and the shoe to the ground.

The method continues with step 1556 where for an inventive concept, implementation elements, implementation mechanisms, and implementation variants are forecasted. An implementation element is a tangible physical and/or virtual part of an inventive concept. An implementation mechanism is an aspect of an implementation element that can be changed. An implementation variant is a variation of an implementation element and/or a variation of an implementation mechanism.

As an example, an inventive concept to a solve a problem is "to do X to A, Y to B, and Z to C". In this example, A, B, and C are implementation elements and X, Y, and Z are implementation mechanisms. Implementation variants would be A' for A, B' for B, C' for C, x for X, y for Y, and/or z for Z.

The method continues with step 1558 where potential solution(s) from implementation elements, implementation mechanisms, and implementation variants are forecasted. From the implementation elements, the implementation mechanisms, and the implementation variants, the growth and expense co-processor identifies one or more solutions, where a solution is a specific combination of the implementation elements, the implementation mechanisms, and the implementation variants. For example, one solution is "do X to A, Y to B, and Z to C"; a second solution is "do x to A, y to B, and z to C", a third solution is "do X to A', Y to B', and Z to C", and fourth solution is "do x to A', y to B', and z to C".

The method continues with step 1560 where for a solution, a set of novelty nuggets is forecasted. A novelty nugget is a technical aspect to is believed to be novel in light of known prior art. Continuing with the example of above, for the first solution of do X to A, Y to B, and Z to C", the growth and expense co-processor may identify the novelty nuggets of "do X to A", "do Y to B", and "do Z to C".

The method continues with step 1562 where for a set of novelty nuggets, potential one or more inventive embodiments are forecasted. Depending on the nature of the novelty nuggets, the growth and expense co-processor identifies one or more inventive embodiments, where an inventive embodiment represents a patentable invention. The growth and expense co-processor identifies specific combinations of the novelty nuggets to produce the inventive embodiments. For the example discussed above, the growth and expense co-processor determines that the combination of "do X to A" and "do Z to C" is an invention embodiment and "do Y to B" is a separate inventive embodiment.

The growth and expense co-processor then determines an invention type for each of the inventive embodiments. Invention types include fundamental, commercially necessary, commercial expansion, new fundamental, commercial expansion regarding new uses of fundamental inventions, commercial expansion of new fundamental inventions, commercial expansion regarding vertical integration, commercial expansion regarding horizontal integration, commercial expansion regarding competitor speed bump, commercial expansion regarding potential standard essential, and/or commercial expansion regarding potential non-essential but commercially necessary standards related.

The method continues with step 1564 where it is determined whether more forecasted solutions exist. As new data is ingested, new solutions may arise. When more forecasted solutions are determined, the method branches back to step 1560 where a set of novel nuggets are forecasted based on the new solutions.

When more forecasted solutions are not determined at step 1564, the method continues with step 1566 where it is determined whether more forecasted inventive concepts exist. As new data is ingested, new inventive concepts may arise. When more forecasted inventive concepts are determined, the method branches back to step 1556 where for the inventive concept, forecast implementation elements, implementation mechanisms, and implementation variants are forecasted.

When more forecasted inventive concepts are not determined at step 1566, the method continues with step 1568 where it is determined whether more forecasted problems exist. As new data is ingested, new problems may arise. When more forecasted problems are determined, the method branches back to step 1554 where for a problem, inventive concept(s) for potentially solving the problem are forecasted. When more forecasted problems are not determined at step 1568, the method continues with step 1570 where it is determined whether more forecasted technical challenges exist.

When more forecasted technical challenges are determined, the method branches back to step 1552 where for a technical challenge, problem(s) to be solved are forecasted. When more forecasted technical challenges are not determined at step 1570, the method continues with step 1572 where forecasted technical challenges, problems, inventive concepts, and inventive embodiments are compiled. The compilation provides the growth and expense co-processor with a mechanism for determining the total number of inventions to be created over the life of an MTU and a mechanism to target particular inventions.

Figure 199:
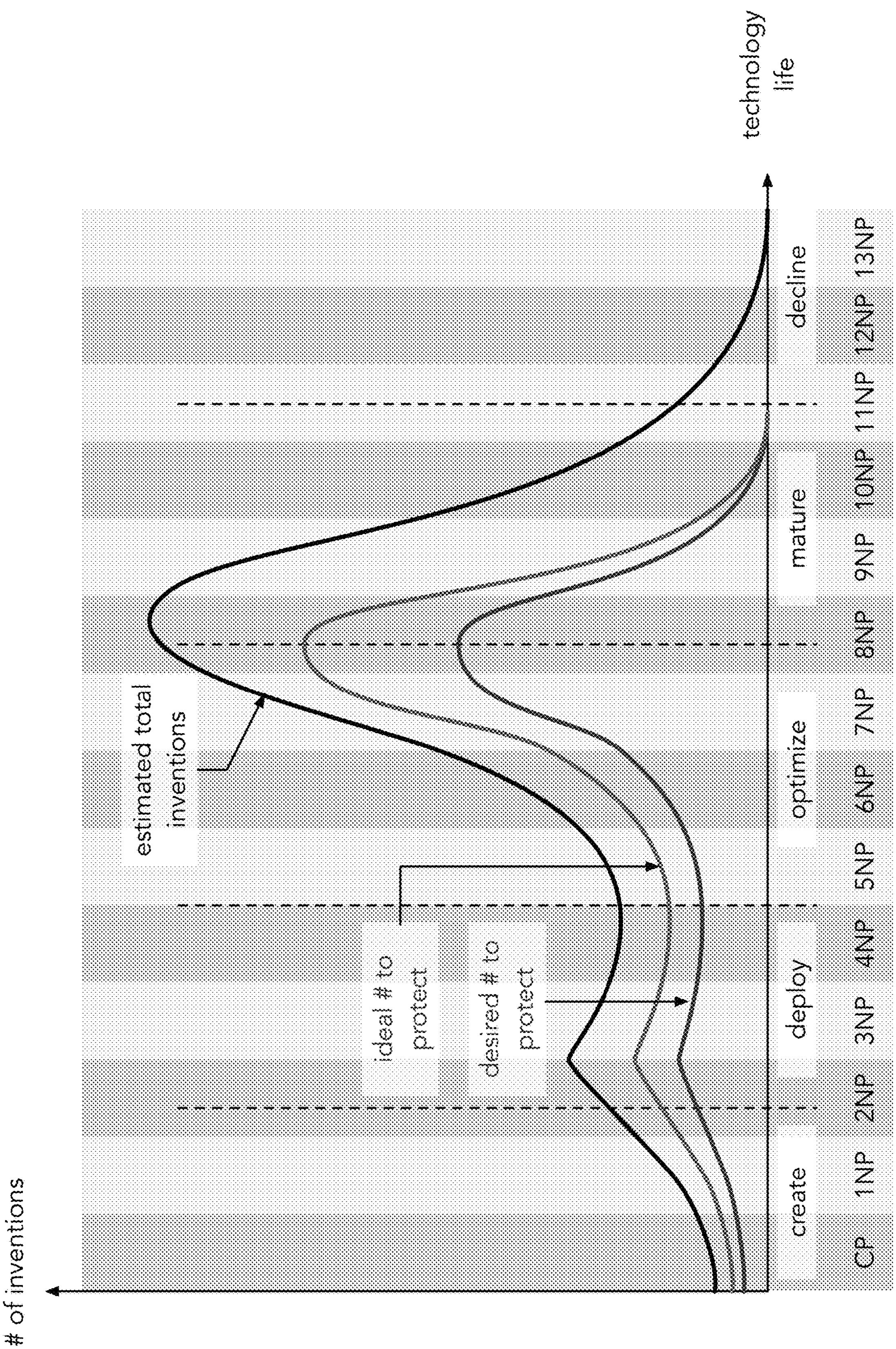
FIG. 199 is a diagram of an example of relative total number of inventions, ideal number of inventions, and desired number of inventions to protect for an MTU (market-tech unit) over the life of the MTU.

FIG. 199 is a diagram of an example of estimated total number of inventions, ideal number of inventions, and desired number of inventions to protect for an MTU (market-tech unit) over the life of the MTU. The technology life of the MTU includes a create, deploy, optimize, mature, and decline phase. In this example, each phase ranges from approximately two and a half to three and a half periods. For example, a period may be one year. The create phase spans a current period (CP), a first next period (1NP), and approximately half of a second next period (2NP). The deploy phase spans the latter half of the second next period (2NP), a third next period (3NP), and a fourth next period (4NP).

The optimize phase spans a fifth next period (5NP), a sixth next period (6NP), a seventh next period (7NP), and approximately half of an eighth next period (8NP). The mature phase spans the latter half of the eighth next period (8NP), a ninth next period (9NP), a tenth next period (10NP), and approximately half of an eleventh next period (11NP). The decline phase spans the latter half of the eleventh next period (11NP), a twelfth next period (12NP), and a thirteenth next period (13NP) (e.g., the technology life is approximately 14 years when the period is a year).

The black curve represents the estimated total number of inventions for an MTU. For example, the estimated total number of inventions may be calculated based on comparable existing MTUs as discussed with reference to FIG. 197 and/or based on developing an inventive embodiment chain as discussed with reference to FIG. 198.

The red curve represents the ideal number of inventions to protect. The ideal number of inventions is based on the total number of inventions that warrant patent protection (e.g., have value in a patent fence protecting the quantified technology; a patent fence is discussed in detail with reference to subsequent figures) and/or are will likely be protected industry wide. The ideal number of inventions will typically be in the range of 60% to 95% of the total estimated number of inventions.

The blue curve represents the desired number of inventions to protect. The desired number of inventions to protect is based on a desired patent position with respect to others. The patent position ranges from weak to superior on a sliding scale. A superior patent position corresponds to a very high probability of a favorable outcoming in a patent dispute involving the quantified technology. A weak patent position corresponds to a very high probability of an unfavorable outcoming in a patent dispute involving the quantified technology. A superior patent position includes actual inventions patent protected in the range of 35% to 80% of the ideal number of inventions.

All curves follow a similar path where the number of inventions climbs steadily in the create phase, drops slightly/remains constant in the deploy phase, increases significantly towards the end of the optimize phase, decreases significantly in the mature phase, and then drops to zero in or by the decline phase. Mapping the number of inventions over the life of a technology determines which periods require more funding, prosecution, and preparation.

Figure 200:
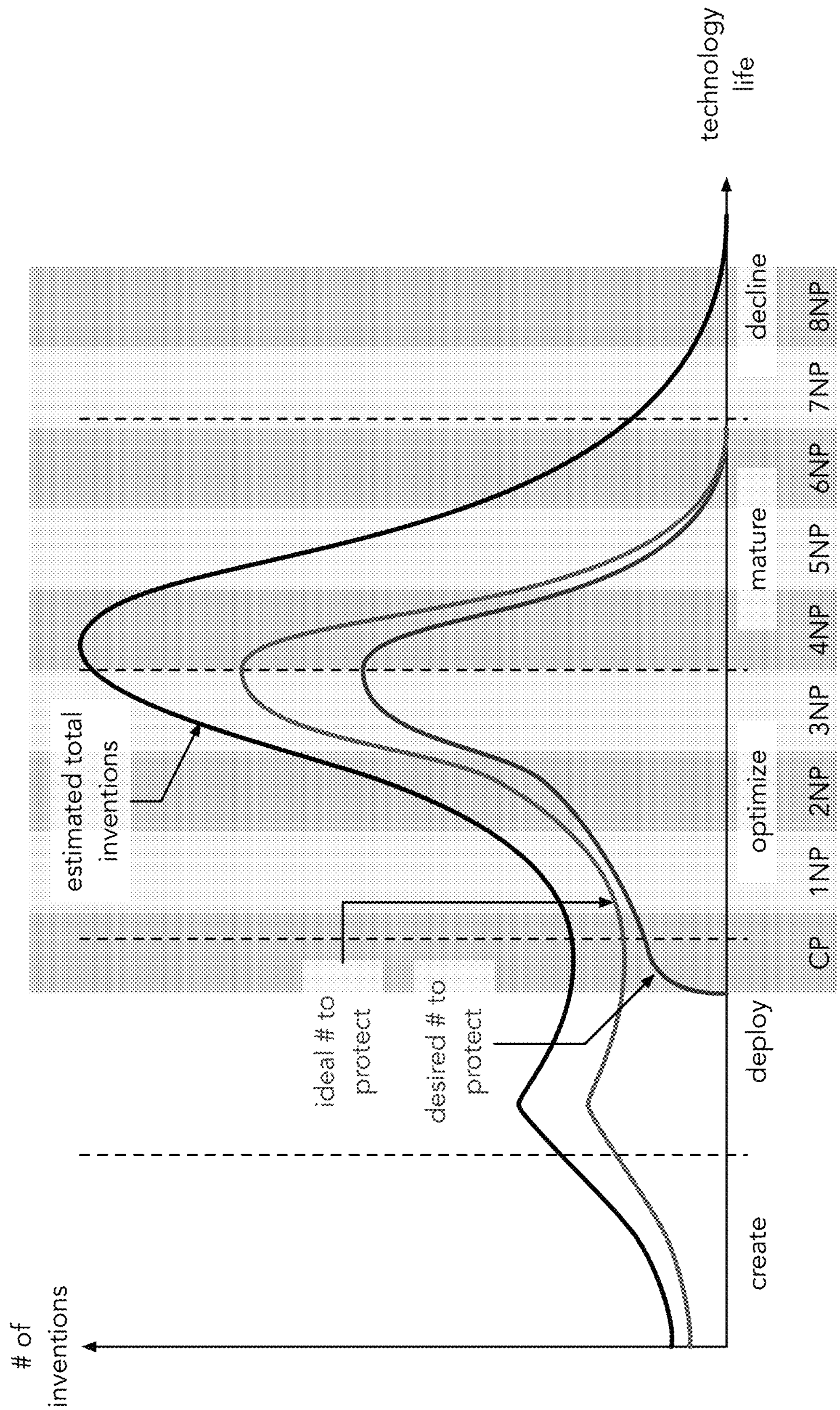
FIG. 200 is a diagram of another example of relative total number of inventions, ideal number of inventions, and desired number of inventions to protect for an MTU (market-tech unit) over the life of the MTU if patent protecting inventions started late the deploy phase.

FIG. 200 is a diagram of another example of estimated total number of inventions, ideal number of inventions, and desired number of inventions to protect for an MTU (market-tech unit) over the life of the MTU if patent protecting inventions started late the deploy phase. In this example, the current period (CP) begins during the middle to end of a deploy phase of an MTU and ends in the beginning of the optimize phase. The optimize phase spans the end of the current period, a first next period (1NP), a second next period (2NP), and a third next period (3NP). The mature phase spans a fourth next period (4NP), a fifth next period (5NP), a sixth next period (6NP), and a portion of a seventh next period (7NP). The decline phase spans the majority of the seventh next period (7NP), and an eighth next period (8NP) (e.g., patent protection occurs for 8 years of an MTU's technology life when the period is a year).

Because patent protection occurs later in the MTU's technology life in comparison to the example of FIG. 199, the desired number of protected inventions (e.g., the blue curve) may need to be adjusted to catch up to the ideal and estimated total invention curves. For example, the blue curve here follows more closely to the ideal curve (e.g., the red curve) than in FIG. 199. Shifting the desired number of inventions protected closer to the ideal number of patents protected helps the portfolio "catch up" to where it would be if patenting had begun earlier in the life of the technology.

FIG. 201 is a diagram of an example of a prosecution forecasting timing windows for a patent application filed in the current period as used by a growth and expense co-processor of an improved computer for technology. The prosecution forecasting timeline includes a series of periods (e.g., years). For example, the prosecution forecasting timeline includes a current period, a first next period, a second next period, a third next period, a fourth next period, a fifth next period, and a sixth next period. More or less periods are possible based on the desired forecasting.

The growth and expense co-processor forecasts when prosecution matters (e.g., receipt of a first office action after a new filing, receipt of a second office action, etc.) will likely occur based on programmable time frames. The programmable time frames may be based on past performance, industry averages, default settings, and/or details of the prosecution (e.g., whether prioritized/expedited prosecution avenues were pursued, whether certain art areas have longer response times, etc.). The programmable time frames may be continually updated based on newly ingested data.

A programmable time frame (β) is the estimated time between filing a new application (i.e., the filing date) and receiving a first office action. The forecasting occurs on a per patent application basis or based on an average filing date for new applications. In this example, a new application has a filing date that occurs in the middle of the current period, and the programmable time frame (β) spans to the end of the first next period (e.g., the programmable time frame (β) is approximately a year and a half long when a period is a year).

The next programmable time frame (σ) is a first office action window. The first office action window is the time period where receiving a first office action is likely. In this example, the programmable time frame (σ) occurs at the beginning of a second next period and lasts about three quarters of the second next period (e.g., the programmable time frame (σ) is approximately nine months when a period is a year).

The next programmable time frame (δ) is an estimated time frame between receiving office actions. In this example, the programmable time frame (δ) occurs after each office action window and lasts approximately six-seven months when a period is a year. The next programmable time frame (ε) is the time window of subsequent office actions (e.g., office actions received after a first office action). The subsequent office action window is a time period where receiving a subsequent office action is likely. The programmable time frame (ε) may be shorter or longer than the programmable time frame (σ) where receiving a first office action is likely.

In this example, a programmable time frame (δ) occurs after the first office action window (at about approximately three quarters through the second next period) and ends when a second office action window begins at about a third of the way into the third next period. A programmable time frame (ε) for the second office action window occurs after the programmable time frame (δ) and lasts until approximately a twelfth into the fourth next period (e.g., the programmable time frame (ε) is approximately nine months when a period is a year).

A next programmable time frame (δ) occurs after the second office action window (at about approximately a twelfth into the fourth next period) and ends when a third office action window begins at a half of the way into the fourth next period. A programmable time frame (ε) for the third office action window occurs after the programmable time frame (δ) and lasts until approximately a quarter into the fifth next period (e.g., the programmable time frame (ε) is approximately nine months when a period is a year).

A next programmable time frame (δ) occurs after the third office action window (at about approximately a third into the fifth next period) and ends when a fourth office action window begins at approximately eleven-twelfths of the way into the fifth next period. A programmable time frame (ε) for the fourth office action window occurs after the programmable time frame (δ) and lasts until approximately a two-thirds of the way into the sixth next period (e.g., the programmable time frame (ε) is approximately nine months when a period is a year). The prosecution forecasting may be forecasted for longer or shorter than six next periods and depends on the technology, the phase of the technology, and the amount of forecasting desired.

FIG. 202 is a diagram of an example of prosecution forecasting parameters as determined and used by a growth and expense co-processor of an improved computer for technology. The particular actions for portfolio matter of office actions shown include a receive first office action allowance, a receive first office action, allowed after first office action response, receive second office action, allowed after second office action response, receive third office action, allowed after third office action response, receive fourth office action, allowed after fourth office action response, and receive another office action.

Before receiving a first office action, each of these actions includes a receive probability. The receive probabilities may be historical data based data entries, default settings, and/or calculated based on other receive probabilities. Algorithms are used to calculate historical data points per client, per tech class, and/or per market-tech unit. In this example, the receive first office action allowance has a historical data based data entry of a 5% receive probability and the receive first office action has a historical data based data entry of a 95% receive probability. The allowed after first office action response has a historical data based data entry of a 66.7% receive probability.

The receive second office action has a calculated receive probability of 31.64% ((1-first office action allowance receive probability (5%))×(1-after first office action allowance probability (66.7)) and allowed after second office action response has a historical data based data entry of a 66.7% receive probability. The receive third office action has a calculated receive probability of 10.53% (received second office action probability (31.64%)×(1−after second office action allowance probability (66.7%)), and allowed after third office action response has a historical data based data entry of a 66.7% receive probability.

The receive fourth office action has a calculated receive probability of 3.51% (received third office action probability (10.53%)×(1−after third office action allowance probability (66.7%)), and allowed after fourth office action response has a historical data based data entry of a 66.7% receive probability. The receive another office action has a calculated receive probability of 1.17% (received third office action probability (5.51%)×(1−after third office action allowance probability (66.7%)).

FIG. 203 is a diagram of an example of prosecution forecasting timing windows for a first patent application filed in the current period based on the timing windows of FIG. 201. The prosecution forecasting timeline includes a series of periods (e.g., years). For example, the prosecution forecasting timeline includes a current period, a first next period, a second next period, a third next period, a fourth next period, a fifth next period, and a sixth next period. More or less periods are possible based on the desired forecasting.

The growth and expense co-processor forecasts when prosecution matters (e.g., receipt of a first office action after a new filing, receipt of a second office action, etc.) will likely occur based on programmable time frames. The programmable time frames may be based on past performance, industry averages, default settings, and/or details of the prosecution (e.g., whether prioritized/expedited prosecution avenues were pursued, whether certain art areas have longer response times, etc.). The programmable time frames may be continually updated based on newly ingested data.

A programmable time frame (β) is the estimated time between filing a new application (i.e., the filing date) and receiving a first office action. The forecasting occurs on a per patent application basis or based on an average filing date for new applications. In this example, a new application (e.g., a first patent application) has a filing date that occurs in the middle of the current period, and the programmable time frame (β) spans to the end of the first next period (e.g., the programmable time frame (β) is approximately a year and a half long when a period is a year).

The next programmable time frame (σ) is a first office action window. The first office action window is the time period where receiving a first office action is likely. In this example, the programmable time frame (σ) occurs at the beginning of a second next period and lasts about three quarters of the second next period (e.g., the programmable time frame (σ) is approximately nine months when a period is a year).

The next programmable time frame (δ) is an estimated time frame between receiving office actions. In this example, the programmable time frame (δ) occurs after each office action window and lasts approximately six-seven months when a period is a year. The next programmable time frame (ε) is the time window of subsequent office actions (e.g., office actions received after a first office action). The subsequent office action window is a time period where receiving a subsequent office action is likely. The programmable time frame (ε) may be shorter or longer than the programmable time frame (σ) where receiving first office action window is likely.

In this example, a programmable time frame (δ) occurs after the first office action window (at about approximately three quarters through the second next period) and ends when a second office action window begins at about a third of the way into the third next period. A programmable time frame (ε) for the second office action window occurs after the programmable time frame (δ) and lasts until approximately a twelfth into the fourth next period (e.g., the programmable time frame (ε) is approximately nine months when a period is a year).

A next programmable time frame (δ) occurs after the second office action window (at about approximately a twelfth into the fourth next period) and ends when a third office action window begins at a half of the way into the fourth next period. A programmable time frame (ε) for the third office action window occurs after the programmable time frame (δ) and lasts until approximately a quarter into the fifth next period (e.g., the programmable time frame (ε) is approximately nine months when a period is a year).

A next programmable time frame (δ) occurs after the third office action window (at about approximately a third into the fifth next period) and ends when a fourth office action window begins at approximately eleven-twelfths of the way into the fifth next period. A programmable time frame (ε) for the fourth office action window occurs after the programmable time frame (δ) and lasts until approximately a two-thirds of the way into the sixth next period (e.g., the programmable time frame (ε) is approximately nine months when a period is a year). The prosecution forecasting may be forecasted for longer or shorter than six next periods and depends on the technology, the phase of the technology, and the amount of forecasting desired.

FIG. 204 is a diagram of an example of forecasted probabilities of when office actions for the first patent application will be received as determined by a growth and expense co-processor of an improved computer for technology. With reference to the office action (OA) windows of FIG. 203, for a patent application filed in a current period, for the current period (CP) and the first next period (1NP), there is zero percent probability of receiving an office action (e.g., there is a zero percent probability of receiving an OA if the OA window open date is greater than a period close date). For a second next period, there is 100% chance of receiving a first office action (e.g., there is 100% probability of receiving an OA if the OA window open date is greater than the period open date AND the OA window close date is less than the period close date).

For a third next period (3NP), there is an 80% chance of receiving a second office action (e.g., there is an x % probability of receiving an OA if the OA window open date is less than the period close date, the "x"=(period close date−OA window open date)/Duration of the OA window)). For a fourth next period (4NP), there is a 20% chance of receiving a second office action (e.g., there is a y % probability of receiving an OA if the OA window open date is less than the period close date, the "y"=(OA window close date−period open date)/Duration of the OA window)). For a fourth next period (4NP), there is a 50% chance of receiving a third office action (e.g., there is an x % probability of receiving an OA if the OA window open date is less than the period close date, the "x"=(period close date−OA window open date)/Duration of the OA window)).

For a fifth next period (5NP), there is a 50% chance of receiving a third office action (e.g., there is a y % probability of receiving an OA if the OA window open date is less than the period close date, the "y"=(OA window close date−period open date)/Duration of the OA window)). For a fifth next period (5NP), there is a 10% chance of receiving a fourth office action (e.g., there is an x % probability of receiving an OA if the OA window open date is less than the period close date, the "x"=(period close date−OA window open date)/Duration of the OA window)).

For a sixth next period (6NP), there is a 90% chance of receiving a fourth office action (e.g., there is a y % probability of receiving an OA if the OA window open date is less than the period close date, the "y"=(OA window close date−period open date)/Duration of the OA window)).

FIG. 205 is a diagram of an example of forecasted probabilities of when office actions will be received combined with the forecasted probabilities of receiving office actions for the first patent application as determined by a growth and expense co-processor of an improved computer for technology.

For calculating the probability of an office action, the timing probability discussed with reference to FIG. 204 is multiplied by the receive probability as discussed with reference to FIG. 202. As discussed with reference to FIG. 202, the receive first office action allowance has a 5% receive probability, the receive first office action has a 95% receive probability, the receive second office action has a receive probability of 31.64%, the receive third office action has a receive probability of 10.53%, the receive fourth office action has a receive probability of 3.51%, and the receive another office action has a receive probability of 1.17%.

As discussed with reference to FIG. 204, for the current period (CP) and the first next period (1NP), there is zero percent probability of receiving an office action, for a second next period, there is 100% chance of receiving a first office action, for a third next period (3NP), there is an 80% chance of receiving a second office action, for a fourth next period (4NP), there is a 20% chance of receiving a second office action and a 50% chance of receiving a third office action, for a fifth next period (5NP), there is a 50% chance of receiving a third office action and a 10% chance of receiving a fourth office action, and for a sixth next period (6NP), there is a 90% chance of receiving a fourth office action.

The probability of receiving any type of office action (OA) in the current period (CP) and in the first next period (1NP) is thus 0%. The probability of receiving an office action in the second next period (2NP) is 100% (e.g., there is a 100% probability of receiving the first office action in the second next period). The probability of receiving a second office action in the third next period (3NP) is 25.3% (e.g., 31.64%×80%=25.3%). There are no other office actions expected in the third next period therefore the probability of receiving an office action in the third next period is 25.3%. The probability of receiving a second office action in the fourth next period (4NP) is 6.3% (e.g., 31.54%×20%=6.3%) and the probability of receiving a third office action in the fourth next period is 5.26% (e.g., 10.53%×50%=5.26%). Therefore, the probability of receiving an office action in the fourth next period is 11.56% (e.g., 6.3%+5.26%=11.56%).

The probability of receiving a third office action in the fifth next period (5NP) is 5.26% (e.g., 10.53%×50%=5.26%) and the probability of receiving a fourth office action in the fifth next period is 0.35% (e.g., 3.51%*10%=0.35%). Therefore, the probability of receiving an office action in the fifth next period is 5.61% (e.g., 5.26%+0.35%=5.61%).

The probability of receiving a fourth office action in the sixth next period (6NP) is 3.16% (e.g., 3.51%×90%=3.16%). There are no other office actions expected in the sixth next period therefore the probability of receiving an office action in the third next period is 3.16%.

Figures 206, 207:
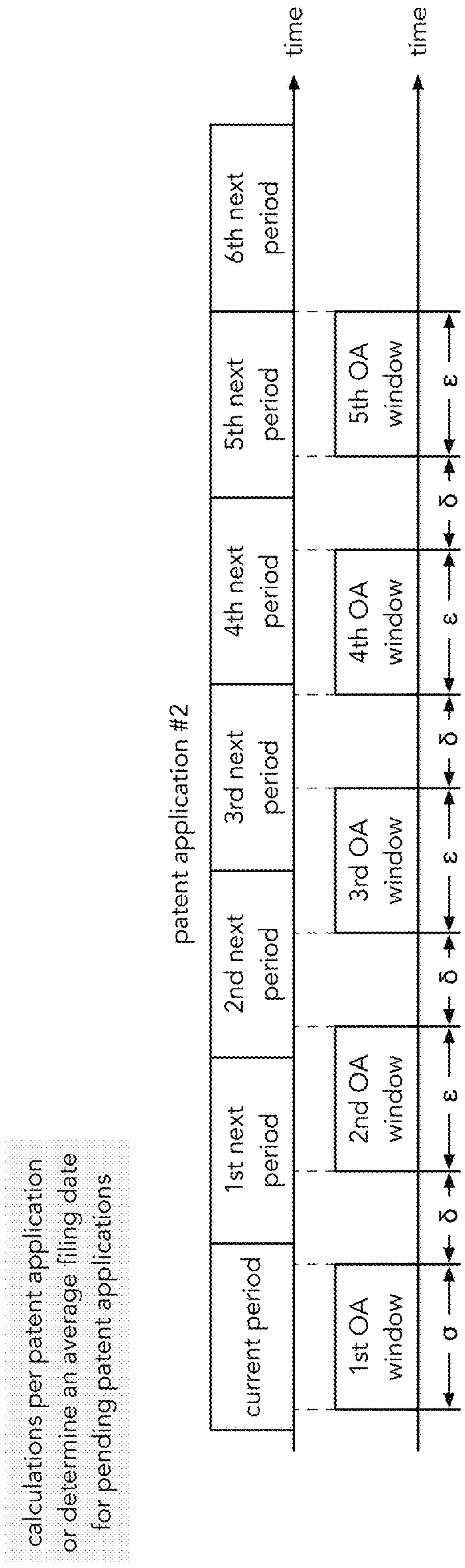
FIG. 206 is a diagram of an example of prosecution forecasting timing windows for a second patent application having the first office action window within the current period.
FIG. 207 is a diagram of an example of forecasted probabilities of when office actions for the second patent application will be received as determined by a growth and expense co-processor of an improved computer for technology based on the timing of FIG. 206.

FIG. 206 is a diagram of an example of prosecution forecasting timing windows for a second patent application having the first office action window within the current period. The prosecution forecasting timeline includes a series of periods (e.g., years). For example, the prosecution forecasting timeline includes a current period, a first next period, a second next period, a third next period, a fourth next period, a fifth next period, and a sixth next period. More or less periods are possible based on the desired forecasting.

The growth and expense co-processor forecasts when prosecution matters (e.g., receipt of a first office action after a new filing, receipt of a second office action, etc.) will likely occur based on programmable time frames. The programmable time frames may be based on past performance, industry averages, default settings, and/or details of the prosecution (e.g., whether prioritized/expedited prosecution avenues were pursued, whether certain art areas have longer response times, etc.). The programmable time frames may be continually updated based on newly ingested data.

In this example, a new application (e.g., a second application) was filed at some point prior to the current period and a first office action window (programmable time frame (σ)) occurs within a current period. The first office action window is the time period where receiving a first office action is likely. In this example, the programmable time frame (σ) starts and ends within the current period (e.g., the programmable time frame (σ) is approximately nine months when a period is a year).

The next programmable time frame (δ) is an estimated time frame between receiving office actions. In this example, the programmable time frame (δ) occurs after each office action window and lasts approximately six-seven months when a period is a year. The next programmable time frame (ε) is the time window of subsequent office actions (e.g., office actions received after a first office action). The subsequent office action window is a time period where receiving a subsequent office action is likely. The programmable time frame (ε) may be shorter or longer than the programmable time frame (σ) where receiving first office action window is likely.

In this example, a programmable time frame (δ) occurs after the first office action window (towards the end of the current period) and ends when a second office action window begins at about a third of the way into the first next period. A programmable time frame (ε) for the second office action window occurs after the programmable time frame (δ) and lasts until a quarter of the way into a second next period (e.g., the programmable time frame (ε) is approximately nine months when a period is a year).

A next programmable time frame (δ) occurs after the second office action window (at about approximately a quarter of the way into the second next period) and ends when a third office action window begins at about two-thirds of the way into the second next period. A programmable time frame (ε) for the third office action window occurs after the programmable time frame (δ) and lasts until approximately half way into the third next period (e.g., the programmable time frame (ε) is approximately nine months when a period is a year).

A next programmable time frame (δ) occurs after the third office action window (at about approximately half way into the third next period) and ends when a fourth office action window begins at approximately eleven-twelfths of the way into the third next period. A programmable time frame (ε) for the fourth office action window occurs after the programmable time frame (δ) and lasts until approximately a two-thirds of the way into the fourth next period (e.g., the programmable time frame (ε) is approximately nine months when a period is a year).

A next programmable time frame (δ) occurs after the fourth office action window (at about approximately two-thirds of the way into the fourth next period) and ends when a fifth office action window begins at approximately one-fourth of the way into the fifth next period. A programmable time frame (ε) for the fifth office action window occurs after the programmable time frame (δ) and lasts until the end of the fifth next period (e.g., the programmable time frame (ε) is approximately nine months when a period is a year). The prosecution forecasting may be forecasted for longer or shorter than six next periods and depends on the technology, the phase of the technology, and the amount of forecasting desired.

FIG. 207 is a diagram of an example of forecasted probabilities of when office actions for the second patent application will be received as determined by a growth and expense co-processor of an improved computer for technology based on the timing of FIG. 206. For a second patent application filed at a point prior to a current period, for the current period (CP) there is a 100% chance of receiving a first office action (e.g., there is 100% probability of receiving an OA if the OA window open date is greater than the period open date AND the OA window close data is less than the period close data). For the first next period (1NP) there is an 80% chance of receiving a second office action (e.g., there is an x % probability of receiving an OA if the OA window open date is less than the period close date, the "x"=(period close date−OA window open date)/Duration of the OA window)).

For a second next period (2NP), there is a 20% chance of receiving a second office action (e.g., there is a y % probability of receiving an OA if the OA window open date is less than the period close date, the "y"=(OA window close date−period open date)/Duration of the OA window)). For a second next period, there is a 50% chance of receiving a third office action (e.g., there is an x % probability of receiving an OA if the OA window open date is less than the period close date, the "x"=(period close date−OA window open date)/Duration of the OA window)).

For a third next period (3NP), there is a 50% chance of receiving a third office action (e.g., there is a y % probability of receiving an OA if the OA window open date is less than the period close date, the "y"=(OA window close date−period open date)/Duration of the OA window)). For a third next period, there is a 10% chance of receiving a fourth office action (e.g., (e.g., there is an x % probability of receiving an OA if the OA window open date is less than the period close date, the "x"=(period close date−OA window open date)/Duration of the OA window)).

For a fourth next period (4NP), there is a 90% chance of receiving a fourth office action (e.g., there is a y % probability of receiving an OA if the OA window open date is less than the period close date, the "y"=(OA window close date−period open date)/Duration of the OA window)). For a fifth next period (5NP), there is a 100% chance of receiving a fifth office action (e.g., there is a 100% probability of receiving an OA if the OA window open date is greater than the period close date AND the OA window close date is less than the period close date). For a sixth next period (6NP), there is a 0% chance of receiving an office action (e.g., there is a zero percent chance of receiving an office action if the OA window close date is less than the period open date).

FIG. 208 is a diagram of an example of forecasted probabilities of when office actions will be received combined with the forecasted probabilities of receiving office actions for the second patent application as determined by a growth and expense co-processor of an improved computer for technology.

For calculating the probability of an office action, the timing probability discussed with reference to FIG. 207 is multiplied by the receive probability as discussed with reference to FIG. 202. As discussed with reference to FIG. 202, a receive first office action allowance has a 5% receive probability, the receive first office action has a 95% receive probability, the receive second office action has a receive probability of 31.63%, the receive third office action has a receive probability of 10.53%, the receive fourth office action has a receive probability of 3.51%, and the receive another office action has a receive probability of 1.17%.

As discussed with reference to FIG. 207, for the current period (CP) there is a 100% chance of receiving a first office action, for the first next period (1NP) there is an 80% chance of receiving a second office action, for a second next period (2NP) there is a 20% chance of receiving a second office action and a 50% chance of receiving a third office action, for a third next period (3NP) there is a 50% chance of receiving a third office action and a 10% chance of receiving a fourth office action, for a fourth next period (4NP) there is a 90% chance of receiving a fourth office action, for a fifth next period (5NP) there is a 100% chance of receiving a fifth office action, and for a sixth next period (6NP), there is a 0% chance of receiving an office action.

The probability of receiving an office action (OA) in the current period (CP) is 100% (e.g., there is a 100% probability of receiving the first office action in the current period). The probability of receiving a second office action in the first next period (1NP) is 25.3% (e.g., 31.64%×80%=25.3%). There are no other office actions expected in the first next period therefore the probability of receiving an office action in the first next period is 25.3%.

The probability of receiving a second office action in the second next period (2NP) is 6.3% (e.g., 31.54%×

20%=6.3%). The probability of receiving a third office action in the second next period is 5.26% (e.g., 10.53%×50%=5.26%). Therefore, the probability of receiving an office action in the second next period is 11.56% (e.g., 6.3%+5.26%=11.56%).

The probability of receiving a third office action in the third next period (3NP) is 5.26% (e.g., 10.53%×50%=5.26%) and the probability of receiving a fourth office action in the third next period is 0.35% (e.g., 3.51%*10%=0.35%). Therefore, the probability of receiving an office action in the third next period is 5.61% (e.g., 5.26%+0.35%=5.61%).

The probability of receiving a fourth office action in the fourth next period (4NP) is 3.16% (e.g., 3.51%×90%=3.16%). There are no other office actions expected in the fourth next period therefore the probability of receiving an office action in the third next period is 3.16%. The probability of receiving a fifth office action in the fifth next period (5NP) is 1.17% (e.g., 100%×1.17%=1.17%). There are no other office actions expected in the fifth next period therefore the probability of receiving an office action in the fifth next period is 1.17%. There are no office actions expected in the sixth next period therefore the probability of receiving an office action in the sixth next period is 0%.

FIG. 209 is a diagram of an example of prosecution forecasting timing windows for a patent application (e.g., a third patent application) having the second office action window being open in the first and second next periods and response to the first office action was filed during the current period. The prosecution forecasting timeline includes a series of periods (e.g., years). For example, the prosecution forecasting timeline includes a current period, a first next period, a second next period, a third next period, a fourth next period, a fifth next period, and a sixth next period. More or less periods are possible based on the desired forecasting.

The growth and expense co-processor forecasts when prosecution matters (e.g., receipt of a second office action, etc.) will likely occur based on programmable time frames. The programmable time frames may be based on past performance, industry averages, default settings, and/or details of the prosecution (e.g., whether prioritized/expedited prosecution avenues were pursued, whether certain art areas have longer response times, etc.). The programmable time frames may be continually updated based on newly ingested data.

In this example, a patent application having the second office action window being open in the first and second next periods and response to the first office action was filed during the current period. A programmable time frame (ψ) is a time period between filing a first office action response and receiving a second office action (2nd OA window begins). In this example, the programmable time frame (ψ) begins at about half way through a current period and ends about a third of the way into the first next period (e.g., the programmable time frame ψ may be around 10 months long when a period is a year).

The next programmable time frame (ε) is an OA time window. The office action time window is a time period where receiving a office action is likely. A programmable time frame (ε) for the second office action window occurs after the programmable time frame (ψ) and lasts until a one-sixth of the way into a second next period (e.g., the programmable time frame (ε) may be around 9-10 months when a period is a year).

The next programmable time frame (δ) is an estimated time frame between receiving office actions. In this example, the programmable time frame (δ) occurs after each office action window and lasts approximately six-seven months when a period is a year.

In this example, a programmable time frame (δ) occurs after the second office action window (about one-sixth of the way into the second next period) and ends when a third office action window begins at about two-thirds of the way into the second next period. A programmable time frame (ε) for the third office action window occurs after the programmable time frame (δ) and lasts until about half way into a third next period (e.g., the programmable time frame (ε) is approximately 9-10 months when a period is a year).

A next programmable time frame (δ) occurs after the third office action window (at about approximately half way into the third next period) and ends when a fourth office action window begins at about eleven-twelfths of the way into the third next period. A programmable time frame (ε) for the fourth office action window occurs after the programmable time frame (δ) and lasts until approximately two-thirds of the way into the fourth next period (e.g., the programmable time frame (ε) is approximately 9-10 months when a period is a year).

A next programmable time frame (δ) occurs after the third office action window (at about approximately half way into the third next period) and ends when a fourth office action window begins at approximately eleven-twelfths of the way into the third next period. A programmable time frame (ε) for the fourth office action window occurs after the programmable time frame (δ) and lasts until approximately a two-thirds of the way into the fourth next period (e.g., the programmable time frame (ε) is approximately 9-10 months when a period is a year).

A next programmable time frame (δ) occurs after the fourth office action window (at about approximately two-thirds of the way into the fourth next period) and ends when a fifth office action window begins at approximately one-fourth of the way into the fifth next period. A programmable time frame (ε) for the fifth office action window occurs after the programmable time frame (δ) and lasts until the end of the fifth next period (e.g., the programmable time frame (ε) is approximately 9-10 months when a period is a year). The prosecution forecasting may be forecasted for longer or shorter than six next periods and depends on the technology, the phase of the technology, and the amount of forecasting desired.

FIG. 210 is a diagram of an example of updated prosecution forecasting parameters as determined and used by a growth and expense co-processor of an improved computer for technology based on the timing of FIG. 209. The particular actions for portfolio matter of office actions shown include a receive first office action allowance, a receive first office action, allowed after first office action response, receive second office action, allowed after second office action response, receive third office action, allowed after third office action response, receive fourth office action, allowed after fourth office action response, and receive another office action.

In comparison to the example of FIG. 202 where a first office action has yet to be received, here, the office action (OA) receive probabilities are adjusted based on the fact that an office action has been received and a response was filed. The receive probabilities may be historical data based data entries, default settings, and/or calculated based on other receive probabilities. Algorithms are used to calculate historical data points per client, per tech class, and/or per market-tech unit.

In this example, the receive first office action allowance is adjusted to 0% because it is now known that that possible outcome did not occur. The receive first office action is adjusted to 0% because it is an outcome that has already occurred and will not occur again. The allowed after first office action response has a historical data based data entry of a 66.7% receive probability.

The receive second office action has a calculated receive probability of 33.33% ((1−allowed after first office action response receive probability (66.7)) and allowed after second office action response has a historical data based data entry of a 66.7% receive probability. The receive third office action has a calculated receive probability of 11.1% (received second office action probability (33.3%)×(1−after second office action allowance probability (66.7%)), and allowed after third office action response has a historical data based data entry of a 66.7% receive probability.

The receive fourth office action has a calculated receive probability of 3.7% (received third office action probability (11.1%)×(1−after third office action allowance probability (66.7%)), and allowed after fourth office action response has a historical data based data entry of a 66.7% receive probability. The receive another office action has a calculated receive probability of 1.2% (received third office action probability (3.7%)×(1−after third office action allowance probability (66.7%)).

Figures 211, 212:
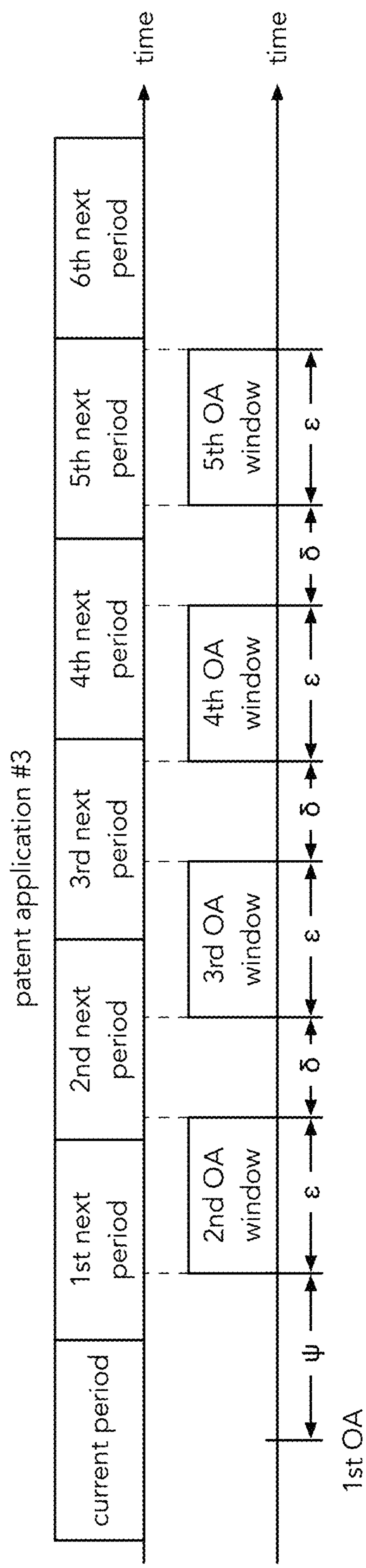
FIG. 211 is a diagram of an example of prosecution forecasting timing windows for a third patent application having the second office action window being open in the first and second next periods and response to the first office action was filed during the current period.
FIG. 212 is a diagram of an example of forecasted probabilities of when office actions for the third patent application will be received as determined by a growth and expense co-processor of an improved computer for technology.

FIG. 211 is a diagram of an example of prosecution forecasting timing windows for a third patent application having the second office action window being open in the first and second next periods and response to the first office action was filed during the current period. FIG. 211 is similar to the diagram of FIG. 209. The programmable time frame (ψ) is a time period between filing a first office action response and receiving a second office action (2nd OA window begins). In this example, the programmable time frame (ψ) begins at about half way through a current period and ends about a third of the way into the first next period (e.g., the programmable time frame ψ may be around 10 months long when a period is a year).

The next programmable time frame (ε) is an OA time window. The office action time window is a time period where receiving a office action is likely. A programmable time frame (ε) for the second office action window occurs after the programmable time frame (ψ) and lasts until a one-sixth of the way into a second next period (e.g., the programmable time frame (ε) may be around 9-10 months when a period is a year).

The next programmable time frame (δ) is an estimated time frame between receiving office actions. In this example, the programmable time frame (δ) occurs after each office action window and lasts approximately six-seven months when a period is a year.

In this example, a programmable time frame (δ) occurs after the second office action window (about one-sixth of the way into the second next period) and ends when a third office action window begins at about two-thirds of the way into the second next period. A programmable time frame (ε) for the third office action window occurs after the programmable time frame (δ) and lasts until about half way into a third next period (e.g., the programmable time frame (ε) is approximately 9-10 months when a period is a year).

A next programmable time frame (δ) occurs after the third office action window (at about approximately half way into the third next period) and ends when a fourth office action window begins at about eleven-twelfths of the way into the third next period. A programmable time frame (ε) for the fourth office action window occurs after the programmable time frame (δ) and lasts until approximately two-thirds of the way into the fourth next period (e.g., the programmable time frame (ε) is approximately 9-10 months when a period is a year).

A next programmable time frame (δ) occurs after the third office action window (at about approximately half way into the third next period) and ends when a fourth office action window begins at approximately eleven-twelfths of the way into the third next period. A programmable time frame (ε) for the fourth office action window occurs after the programmable time frame (δ) and lasts until approximately a two-thirds of the way into the fourth next period (e.g., the programmable time frame (ε) is approximately 9-10 months when a period is a year).

A next programmable time frame (δ) occurs after the fourth office action window (at about approximately two-thirds of the way into the fourth next period) and ends when a fifth office action window begins at approximately one-fourth of the way into the fifth next period. A programmable time frame (ε) for the fifth office action window occurs after the programmable time frame (δ) and lasts until the end of the fifth next period (e.g., the programmable time frame (ε) is approximately 9-10 months when a period is a year). The prosecution forecasting may be forecasted for longer or shorter than six next periods and depends on the technology, the phase of the technology, and the amount of forecasting desired.

FIG. 212 is a diagram of an example of forecasted probabilities of when office actions for the third patent application will be received as determined by a growth and expense co-processor of an improved computer for technology. With reference to the office action (OA) windows of FIG. 211, for a third patent application where an office action response is filed in a current period, there is a 0% probability of receiving an office action (OA) for the current period (CP) (e.g., there is a zero percent probability of receiving an OA if the OA window open date is greater than a period close date). For a first next period (1NP), there is 80% chance of receiving a second office action (e.g., there is an x % probability of receiving an OA if the OA window open date is less than the period close date, the "x"=(period close date−OA window open date)/Duration of the OA window)).

For a second next period (2NP), there is an 20% chance of receiving a second office action (e.g., there is a y % probability of receiving an OA if the OA window open date is less than the period close date, the "y"=(OA window close date−period open date)/Duration of the OA window)). For the second next period, there is an 50% chance of receiving a third office action (e.g., there is an x % probability of receiving an OA if the OA window open date is less than the period close date, the "x"=(period close date−OA window open date)/Duration of the OA window)).

For a third next period (3NP), there is a 50% chance of receiving a third office action (e.g., there is a y % probability of receiving an OA if the OA window open date is less than the period close date, the "y"=(OA window close date−period open date)/Duration of the OA window)). For the third next period, there is a 10% chance of receiving a fourth office action ((e.g., there is an x % probability of receiving an OA if the OA window open date is less than the period close date, the "x"=(period close date−OA window open date)/Duration of the OA window)).

For a fourth next period (4NP), there is a 90% chance of receiving a fourth office action (e.g., there is a y % probability of receiving an OA if the OA window open date is less than the period close date, the "y"=(OA window close date−period open date)/Duration of the OA window)). For a fifth next period (5NP), there is a 100% chance of receiving a fifth office action (e.g., there is 100% probability of an OA is the OA window open date is less greater than the period open date AND the OA window close date is less than the period close date)). For a sixth next period (6NP), there is a 0% chance of receiving an office action (e.g., there is a 0% probability of an office action is the OA window close date is less than the period open date).

FIG. 213 is a diagram of an example of forecasted probabilities of when office actions will be received combined with the forecasted probabilities of receiving office actions for the third patent application as determined by a growth and expense co-processor of an improved computer for technology. For calculating the probability of an office action, the timing probability discussed with reference to FIG. 212 is multiplied by the receive probability as discussed with reference to FIG. 210. As discussed with reference to FIG. 210 the receive second office action has a receive probability of 33.3%, the receive third office action has a receive probability of 11.1%, the receive fourth office action has a receive probability of 3.7%, and the receive another office action has a receive probability of 1.2%.

As discussed with reference to FIG. 212, for the current period (CP) there is a 0% chance of an office action, for the first next period (1NP) there is an 80% chance of receiving a second office action, for a second next period (2NP) there is a 20% chance of receiving a second office action and a 50% chance of receiving a third office action, for a third next period (3NP) there is a 50% chance of receiving a third office action and a 10% chance of receiving a fourth office action, for a fourth next period (4NP) there is a 90% chance of receiving a fourth office action, for a fifth next period (5NP) there is a 100% chance of receiving a fifth office action, and for a sixth next period (6NP), there is a 0% chance of receiving an office action.

The probability of receiving an office action (OA) in the current period (CP) is 0%. The probability of receiving a second office action in the first next period (1NP) is 26.7% (e.g., 33.3%×80%=26.7%). There are no other office actions expected in the first next period therefore the probability of receiving an office action in the first next period is 26.7%.

The probability of receiving a second office action in the second next period (2NP) is 6.7% (e.g., 33.3%×20%=6.7%). The probability of receiving a third office action in the second next period is 5.5% (e.g., 11.1%×50%=5.5%). Therefore, the probability of receiving an office action in the second next period is 12.2% (e.g., 6.7%+5.5%=12.2%).

The probability of receiving a third office action in the third next period (3NP) is 5.5% (e.g., 11.1%×50%=5.5%) and the probability of receiving a fourth office action in the third next period is 0.37% (e.g., 3.7%*10%=0.37%). Therefore, the probability of receiving an office action in the third next period is 5.87% (e.g., 5.5%+0.37%=5.87%).

The probability of receiving a fourth office action in the fourth next period (4NP) is 3.3% (e.g., 3.7%×90%=3.3%). There are no other office actions expected in the fourth next period therefore the probability of receiving an office action in the fourth next period is 3.3%. The probability of receiving a fifth office action in the fifth next period (5NP) is 1.17% (e.g., 1.2%×100%=1.2%). There are no other office actions expected in the fifth next period therefore the probability of receiving an office action in the fifth next period is 1.2%. There are no office actions expected in the sixth next period therefore the probability of receiving an office action in the sixth next period is 0%.

FIG. 214 is a diagram of an example of prosecution forecasting timing windows for a patent application (e.g., a fourth patent application) that is forecasted to be filed in the first next period. The prosecution forecasting timeline includes a series of periods (e.g., years). For example, the prosecution forecasting timeline includes a current period, a first next period, a second next period, a third next period, a fourth next period, a fifth next period, and a sixth next period. More or less periods are possible based on the desired forecasting.

The growth and expense co-processor forecasts when prosecution matters (e.g., receipt of a first office action after a new filing, receipt of a second office action, etc.) will likely occur based on programmable time frames. The programmable time frames may be based on past performance, industry averages, default settings, and/or details of the prosecution (e.g., whether prioritized/expedited prosecution avenues were pursued, whether certain art areas have longer response times, etc.). The programmable time frames may be continually updated based on newly ingested data.

A programmable time frame (β) is the estimated time between filing a new application (i.e., the filing date) and receiving a first office action. The forecasting occurs on a per patent application basis or based on an average filing date for new applications. In this example, a new application has a filing date that is projected to occur about two-thirds of the way through a first next period, and the programmable time frame (β) spans to about a third of the way through a third next period (e.g., the programmable time frame (β) is approximately a year and eight months long when a period is a year).

The next programmable time frame (σ) is a first office action window. The first office action window is the time period where receiving a first office action is likely. In this example, the programmable time frame (σ) occurs about a third of the way into a third next period and lasts about one-sixth of the way into a fourth next period (e.g., the programmable time frame (σ) is approximately 9-10 months when a period is a year).

The next programmable time frame (δ) is an estimated time frame between receiving office actions. In this example, the programmable time frame (δ) occurs after each office action window and lasts approximately six-seven months when a period is a year. The next programmable time frame (ε) is the time window of subsequent office actions (e.g., office actions received after a first office action). The subsequent office action window is a time period where receiving a subsequent office action is likely. The programmable time frame (ε) may be shorter or longer than the programmable time frame (σ) where receiving first office action window is likely.

In this example, a programmable time frame (δ) occurs after the first office action window (at about approximately one-sixth through the fourth next period) and ends when a second office action window begins at about two-thirds of the way into the fourth next period. A programmable time frame (ε) for the second office action window occurs after the programmable time frame (δ) and lasts until approximately halfway into the fifth next period (e.g., the programmable time frame (ε) is approximately 9-10 months when a period is a year).

A next programmable time frame (δ) occurs after the second office action window (at about approximately halfway into the fifth next period) and ends when a third office action window begins at about eleven-twelfths of the way into the fifth next period. A programmable time frame (ε) for the third office action window occurs after the programmable time frame (δ) and lasts until approximately two-thirds of the way into the sixth next period (e.g., the programmable time frame (ε) is approximately 9-10 months when a period is a year). The prosecution forecasting may be forecasted for longer or shorter than six next periods and depends on the technology, the phase of the technology, and the amount of forecasting desired.

FIG. 215 is a diagram of an example of updated prosecution forecasting parameters as determined and used by a growth and expense co-processor of an improved computer for technology based on the timing of FIG. 214. The particular actions for portfolio matter of office actions shown include a receive first office action allowance, a receive first office action, allowed after first office action response, receive second office action, allowed after second office action response, receive third office action, allowed after third office action response, receive fourth office action, allowed after fourth office action response, and receive another office action.

Before receiving a first office action, each of these actions includes a receive probability. The receive probabilities may be historical data based data entries, default settings, and/or calculated based on other receive probabilities. Algorithms are used to calculate historical data points per client, per tech class, and/or per market-tech unit. In this example, the receive first office action allowance has a historical data based data entry of a 5% receive probability and the receive first office action has a historical data based data entry of a 95% receive probability. The allowed after first office action response has a historical data based data entry of a 66.7% receive probability.

The receive second office action has a calculated receive probability of 31.64% ((1−first office action allowance receive probability (5%))×(1-after first office action allowance probability (66.7)) and allowed after second office action response has a historical data based data entry of a 66.7% receive probability. The receive third office action has a calculated receive probability of 10.53% (received second office action probability (31.64%)×(1−after second office action allowance probability (66.7%)) and allowed after third office action response has a historical data based data entry of a 66.7% receive probability.

The receive fourth office action has a calculated receive probability of 3.51% (received third office action probability (10.53%)×(1−after third office action allowance probability (66.7%)) and allowed after fourth office action response has a historical data based data entry of a 66.7% receive probability. The receive another office action has a calculated receive probability of 1.17% (received third office action probability (5.51%)×(1−after third office action allowance probability (66.7%)).

Figures 216, 217:
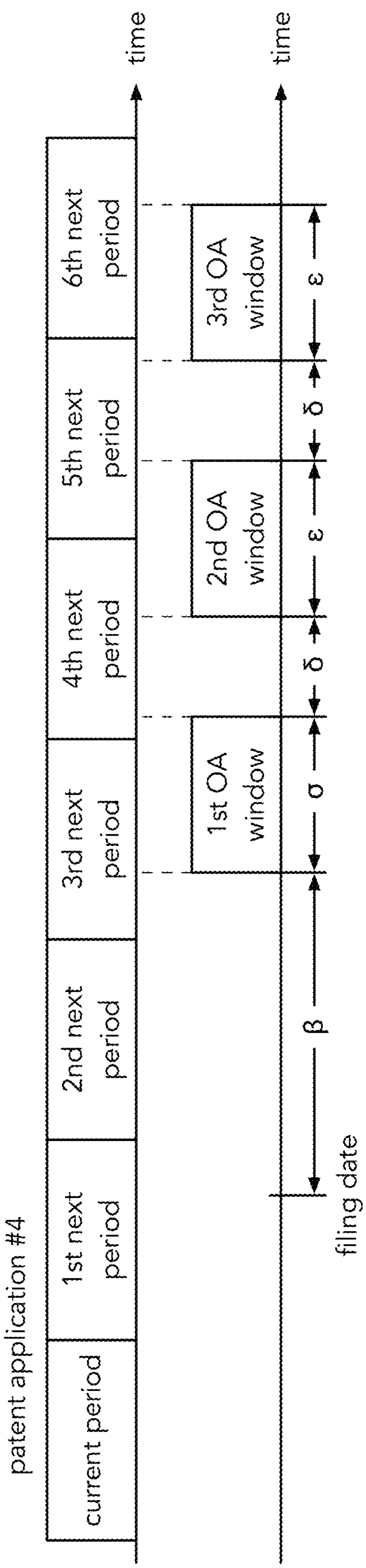
FIG. 216 is a diagram of an example of prosecution forecasting timing windows for a fourth patent application that is forecasted to be filed in the first next period.
FIG. 217 is a diagram of an example of forecasted probabilities of when office actions for the fourth patent application will be received as determined by a growth and expense co-processor of an improved computer for technology.

FIG. 216 is a diagram of an example of prosecution forecasting timing windows for a fourth patent application that is forecasted to be filed in the first next period. FIG. 216 is similar to the diagram of FIG. 214 and shows a new (e.g., fourth) patent application with a filing date projected to occur about two-thirds of the way through a first next period. The programmable time frame (β) spans to about a third of the way through a third next period, the first office action time window (σ) occurs about a third of the way into a third next period and lasts about one-sixth of the way into a fourth next period.

The next programmable time frame (δ) is an estimated time frame between receiving office actions. In this example, the programmable time frame (δ) occurs after each office action window and lasts approximately six-seven months when a period is a year. The next programmable time frame (ε) is the time window of subsequent office actions (e.g., office actions received after a first office action). The subsequent office action window is a time period where receiving a subsequent office action is likely. The programmable time frame (ε) may be shorter or longer than the programmable time frame (0) where receiving first office action window is likely.

In this example, a programmable time frame (δ) occurs after the first office action window (at about approximately one-sixth through the fourth next period) and ends when a second office action window begins at about two-thirds of the way into the fourth next period. A programmable time frame (ε) for the second office action window occurs after the programmable time frame (δ) and lasts until approximately halfway into the fifth next period. A next programmable time frame (δ) occurs after the second office action window (at about approximately halfway into the fifth next period) and ends when a third office action window begins at about eleven-twelfths of the way into the fifth next period. A programmable time frame (ε) for the third office action window occurs after the programmable time frame (δ) and lasts until approximately two-thirds of the way into the sixth next period (e.g., the programmable time frame (ε) is approximately 9-10 months when a period is a year). The prosecution forecasting may be forecasted for longer or shorter than six next periods and depends on the technology, the phase of the technology, and the amount of forecasting desired.

FIG. 217 is a diagram of an example of forecasted probabilities of when office actions for the fourth patent application will be received as determined by a growth and expense co-processor of an improved computer for technology. With reference to the office action (OA) windows of FIG. 216, for a fourth patent application filed in a first next period, for the current period (CP), the first next period (1NP), and the second next period (2NP) there is zero percent probability of receiving an office action (e.g., there is a zero percent probability of receiving an OA if the OA window open date is greater than a period close date).

For a third next period (3NP), there is 90% chance of receiving a first office action (e.g., there is an x % probability of receiving an OA if the OA window open date is less than the period close date, the "x"=(period close date−OA window open date)/Duration of the OA window)).

For a fourth next period (4NP), there is an 10% chance of receiving a first office action ((e.g., there is a y % probability of receiving an OA if the OA window open date is less than the period close date, the "y"=(OA window close date−period open date)/Duration of the OA window)). For the fourth next period, there is a 50% chance of receiving a second office action (e.g., there is an x % probability of receiving an OA if the OA window open date is less than the period close date, the "x"=(period close date−OA window open date)/Duration of the OA window)).

For a fifth next period (5NP), there is a 50% chance of receiving a second office action ((e.g., there is a y % probability of receiving an OA if the OA window open date is less than the period close date, the "y"=(OA window close date−period open date)/Duration of the OA window)). For a fifth next period, there is a 10% chance of receiving a third office action (e.g., there is an x % probability of receiving an OA if the OA window open date is less than the period close date, the "x"=(period close date−OA window open date)/Duration of the OA window)).

For a sixth next period (6NP), there is a 90% chance of receiving a third office action (e.g., there is a y % probability of receiving an OA if the OA window open date is less than the period close date, the "y"=(OA window close date−period open date)/Duration of the OA window)).

FIG. 218 is a diagram of an example of forecasted probabilities of when office actions will be received combined with the forecasted probabilities of receiving office actions for the fourth patent application as determined by a growth and expense co-processor of an improved computer for technology.

For calculating the probability of an office action, the timing probability discussed with reference to FIG. 217 is multiplied by the receive probability as discussed with reference to FIG. 215. As discussed with reference to FIG. 215, the receive first office action allowance has a 5% receive probability, the receive first office action has a 95% receive probability, the receive second office action has a receive probability of 31.63%, the receive third office action has a receive probability of 10.53%, the receive fourth office action has a receive probability of 3.51%, and the receive another office action has a receive probability of 1.17%.

As discussed with reference to FIG. 217, for the current period (CP), the first next period (1NP), and the second next period (2NP) there is zero percent probability of receiving an office action. For a third next period (3NP), there is 90% chance of receiving a first office action. For a fourth next period (4NP), there is an 10% chance of receiving a first office action and a 50% chance of receiving a second office action. For a fifth next period (5NP), there is a 50% chance of receiving a second office action and a 10% chance of receiving a third office action. For a sixth next period (6NP), there is a 90% chance of receiving a third office action.

The probability of receiving any type of office action (OA) in the current period (CP), first next period (1NP), and second next period (2NP) is thus 0%. The probability of receiving an office action in the third next period (3NP) is 90% (e.g., 90%×(95%+5%)=100%). There are no other office actions expected in the third next period therefore the probability of receiving an office action in the third next period is 90%.

The probability of receiving a first office action in the fourth next period (4NP) is 10% (e.g., 10%×(95%+5%) =10%). The probability of receiving a second office action in the fourth next period is 15.8% (e.g., 50%×31.64%=15.8%). The probability of receiving an office action in the fourth next period is 26.8% (e.g., 10%×15.8%=26.8%). The probability of receiving a second office action in the fifth next period (5NP) is 15.8% (e.g., 50%×31.64%=15.8%) and the probability of receiving a third office action in the fifth next period is 1.1% (e.g., 10%×10.53%=1.1%). Therefore, the probability of receiving an office action in the fifth next period is 16.9% (e.g., 15.8%+1.1%=16.9%).

The probability of receiving a third office action in the sixth next period (6NP) is 9.4% (e.g., 10.53%×90%=9.4%). There are no other office actions expected in the sixth next period therefore the probability of receiving an office action in the third next period is 9.4%.

FIG. 219 is a diagram of an example of combining the prosecution forecasting of the first through fourth patent applications as determined by a growth and expense co-processor of an improved computer for technology. The OA probabilities for a first patent application (as discussed with reference to FIG. 205) are 0% for a current period (CP), 0% for a first next period, 100% for a second next period (2NP), 25.3% for a third next period (3NP), 11.56% for a fourth next period (4NP), 5.61% for a fifth next period (5NP), and 3.16% for a sixth next period (6NP).

The OA probabilities for a second patent application (as discussed with reference to FIG. 208) are 100% for a current period (CP), 25.3% for a first next period, 11.56% for a second next period (2NP), 5.61% for a third next period (3NP), 3.16% for a fourth next period (4NP), 1.17% for a fifth next period (5NP), and 0% for a sixth next period (6NP).

The OA probabilities for a third patent application (as discussed with reference to FIG. 213) are 0% for a for a current period (CP), 26.7% for a first next period, 12.2% for a second next period (2NP), 5.87% for a third next period (3NP), 3.3% for a fourth next period (4NP), 1.17% for a fifth next period (5NP), and 0% for a sixth next period (6NP).

The OA probabilities for a fourth patent application (as discussed with reference to FIG. 218) are 0% for a for a current period (CP), 0% for a first next period, 0% for a second next period (2NP), 90% for a third next period (3NP), 26.8% for a fourth next period (4NP), 16.9% for a fifth next period (5NP), and 9.4% for a sixth next period (6NP).

Based on the OA probabilities for each patent application, a cumulative sum for OA probabilities for patent applications 1-4 over a current-sixth period can be calculated. For example, the probability of receiving an office action in the current period (CP) is 100% (e.g., 0%+100%+0%+0%=100%). The probability of receiving an office action in the first next period (1NP) is 52% (e.g., 0%+25.3%+26.7%+0%=52%). The probability of receiving an office action in the second next period (2NP) is 123.8% (e.g., 100%+11.56%+12.2%+0%=123.8%). The probability of receiving an office action in the third next period (3NP) is 126.8% (e.g., 25.3%+5.61%+5.87%+90%=126.5%). The probability of receiving an office action in the fourth next period (4NP) is 44.8% (e.g., 11.56%+3.16%+3.3%+26.8%=44.8%). The probability of receiving an office action in the fifth next period (5NP) is 24.9% (e.g., 5.61%+1.17%+1.17%+16.9%=24.9%). The probability of receiving an office action in the sixth next period (6NP) is 12.6% (e.g., 3.16%+0%+0%+9.4%=12.6%).

FIG. 220 is a diagram of an example of forecasting the quantity and time of receiving offices action for the first through fourth patent applications received per period as determined by a growth and expense co-processor of an improved computer for technology. From the cumulative sums of the office action probabilities for patent applications #1-#4 of FIG. 219 for a current through sixth period, a total number of office actions can be estimated for each period.

During a current period (CP) where the probability of receiving an office action (OA) is 100%, one office action can be expected. During a first next period (1NP) where the probability of receiving an office action (OA) is 52%, 0.52 office actions can be expected. During a second next period (2NP) where the probability of receiving an office action (OA) is 123.8%, 1.24 office actions can be expected. During a third next period (3NP) where the probability of receiving an office action (OA) is 126.8%, 1.27 office actions can be expected. During a fourth next period (4NP) where the probability of receiving an office action (OA) is 44.8%, 0.45 office actions can be expected.

During a fifth next period (5NP) where the probability of receiving an office action (OA) is 24.9%, 0.25 office actions can be expected. During a sixth next period (6NP) where the probability of receiving an office action (OA) is 12.6%, 0.13 office actions can be expected.

FIG. 221 is a diagram of an example of forecasting first office action allowances and non-allowance office actions for the first through fourth patent applications received per period as determined by a growth and expense co-processor of an improved computer for technology.

For a current period (CP), the second patent application has a 100% probability of receiving a first office action while the other applications have a 0% probability of receiving a first office action. Therefore, the sum probability of receiving a first office action in the current period is 100%. For a first next period (1NP), no applications have a probability of receiving a first office action. Therefore, the sum probability of receiving a first office action in the first next period is 0%.

For a second next period (2NP), the first patent application has a 100% probability of receiving a first office action while the other applications have a 0% probability of receiving a first office action. Therefore, the sum probability of receiving a first office action in the second next period is 100%. For a third next period (3NP), the fourth patent application has a 90% probability of receiving a first office action while the other applications have a 0% probability of receiving a first office action. Therefore, the sum probability of receiving a first office action in the third next period is 90%.

For a fourth next period (4NP), the fourth patent application has a 10% probability of receiving a first office action while the other applications have a 0% probability of receiving a first office action. Therefore, the sum probability of receiving a first office action in the fourth next period is 10%. No applications have a probability of receiving a first office action in the fifth or sixth next periods therefore the sum probability of receiving a first office action in the fifth or sixth next period is 0%.

Based on the probability of first office actions, an amount of first office actions can be estimated. For example, for the current period with the 100% of receiving a first office action, one first office action can be expected. For the first next period with the 0% of receiving a first office action, no first office actions are expected. For the second next period with the 100% of receiving a first office action, one first office action can be expected.

For the third next period with the 90% of receiving a first office action, 0.9 first office actions are expected. For the fourth next period with the 10% of receiving a first office action, 0.1 first office action can be expected. For the fifth next period with the 0% of receiving a first office action, no first office actions are expected. For the sixth next period with the 0% of receiving a first office action, no first office actions are expected.

In this example, the probability of obtaining a first office action allowance is 5%. Therefore, with one first office action expected and one total number of office actions (OAs) in the current period, 0.05 office action responses are first office action (OA) allowance responses and 0.95 office action responses full office action responses (e.g., an office action response that is not a first office action allowance response).

With zero first office actions and 0.52 total office actions expected in the first next period, zero office actions are OA allowance responses, and 0.52 office actions are full office action responses. With one first office action and 1.24 total office actions expected in the second next period, 0.05 office actions are OA allowance responses, and 1.19 office actions are full office action responses. With 0.9 first office actions and 1.27 total office actions expected in the third next period, 0.045 office actions are OA allowance responses (e.g., 5%*0.9), and 1.23 office actions are full office action responses.

With 0.1 first office actions and 0.45 total office actions expected in the fourth next period, 0.005 office actions are OA allowance responses (e.g., 5%*0.1), and 0.44 office actions are full office action responses. With zero first office actions and 0.25 total office actions expected in the fifth next period, zero office actions are OA allowance responses and 0.25 office actions are full office action responses. With zero first office actions and 0.13 total office actions expected in the sixth next period, zero office actions are OA allowance responses and 0.13 office actions are full office action responses.

FIG. 222 is a diagram of an example of forecasting expense for the first office action allowances and non-allowance office actions of FIG. 221 as determined by a growth and expense co-processor of an improved computer for technology.

As discussed with reference to FIG. 221, 0.05 first office action (OA) allowance responses and 0.95 full office action responses are expected for a current period (CP), zero first office action (OA) allowance responses and 0.52 full office action responses are expected for a first next period (1NP), 0.05 first office action allowance responses and 1.19 full office action responses are expected for a second next period (2NP), 0.045 first office action allowance responses and 1.23 full office action responses are expected for a third next period (3NP), 0.005 first office action allowance responses and 0.44 full office action responses are expected for a fourth next period (4NP), zero first office action allowance responses and 0.25 full office action responses are expected for a fifth next period (5NP), and zero first office action allowance responses and 0.13 full office action responses are expected for a sixth next period (6NP).

Based on these probabilities, the expenses for OA responses can be estimated. For example, when the expense for a first office action allowance response is $1000 ($1K) and a full office action response is $5000 ($5K), expenses for a current period (CP) are $4.8K (e.g., $50 for 0.05 first office action allowance responses and $4.75K for 0.95 full office action allowance responses. Expenses for a first next period (1NP) are $2.6K (e.g., 0.52×$5K=$2.6K). Expenses for a second next period (2NP) are $6.0K (e.g., $50 for 0.05 first office action allowance responses and $5.95K for 1.19 full office action allowance responses). Expenses for a third next period (3NP) are $6.2K (e.g., $45 for 0.045 first office action allowance responses and $6.15K for 1.23 full office action allowance responses).

Expenses for a fourth next period (4NP) are $2.2K (e.g., $5 for 0.005 first office action allowance responses and $2.2K for 0.44 full office action allowance responses). Expenses for a fifth next period (5NP) are $1.25K (e.g., 0.25×$5K=$1.25K). Expenses for a sixth next period (6NP) are $650 (e.g., 0.13×$5K=$650).

Figures 223, 224:
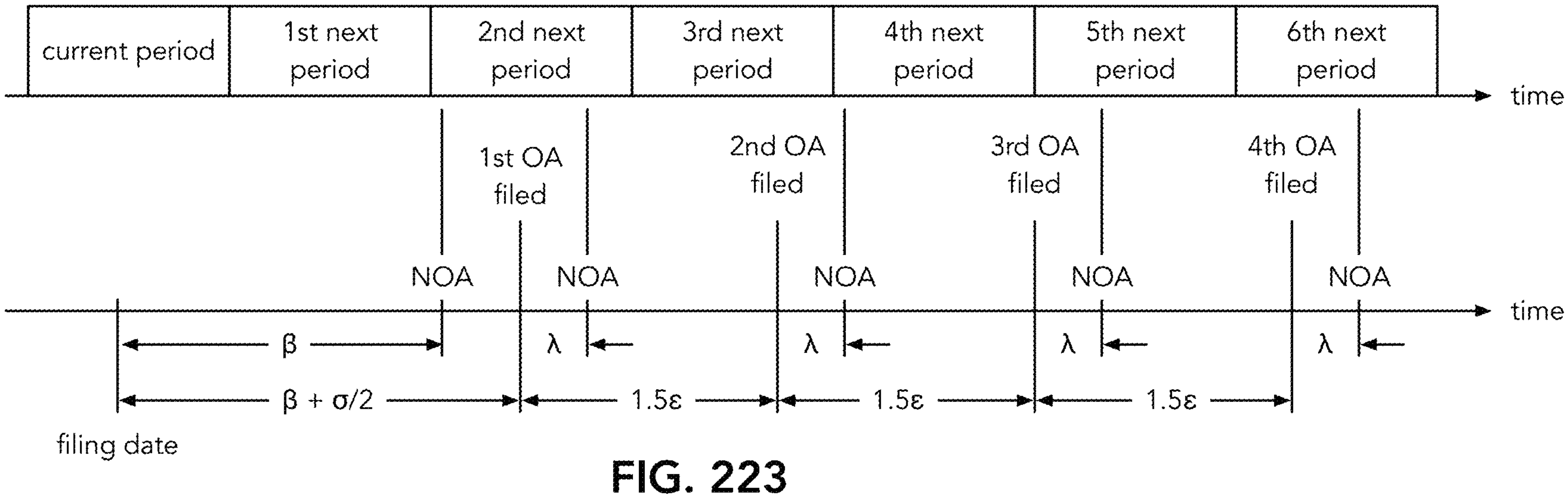
FIG. 223 is a diagram of an example of issuance forecasting timing windows for a patent application that is to be filed in the current period.
FIG. 224 is a diagram of an example of issuance forecasting parameters as determined and used by a growth and expense co-processor of an improved computer for technology based on the timing of FIG. 223.

FIG. 223 is a diagram of an example of issuance forecasting timing windows for a patent application (e.g., a first patent application) that is to be filed in the current period. The issuance forecasting timeline includes a series of periods (e.g., years). For example, the issuance forecasting timeline includes a current period, a first next period, a second next period, a third next period, a fourth next period, a fifth next period, and a sixth next period. More or less periods are possible based on the desired forecasting.

The growth and expense co-processor forecasts when issuances will likely occur based on programmable time frames. The programmable time frames may be based on past performance, industry averages, default settings, and/or details of prosecution (e.g., when office action responses are filed, etc.). The programmable time frames may be continually updated based on newly ingested data.

The forecasting occurs on a per patent application basis or based on an average filing date for new applications. In this example, a new application has a filing date that occurs in the middle of the current period, and the programmable time frame (β) spans to the end of the first next period (e.g., the programmable time frame (β) is approximately a year and a half long when a period is a year). If a first office action allowance occurs, a notice of allowance (NOA) occurs at the end of the first next period (after the programmable time frame (β)).

For this example, office action responses are assumed to be filed in the middle of an office action (OA) window. For example, a response to first office action is filed in the middle of the second next period after a time β+σ/2 (where σ is the time frame of a first office action window).

A programmable time frame (λ) is the time after filing an office action to receiving a notice of allowance. The programmable time frame (1.5ε) is the time window between filing office action responses (where s is the time frame of subsequent office action windows). As shown, after filing a first office action response after a period of β+σ/2, a notice of allowance may occur after a time frame λ (e.g., about three-quarters into the second next period).

If a notice of allowance does not occur after a first office action, after a period of 1.5ε from filing a first office action response, a response to a second office action is filed. After filing a second office action response, a notice of allowance may occur after a time frame λ (e.g., about one-twelfth into the fourth next period).

If a notice of allowance does not occur after a second office action, after a period of 1.5ε from filing a second office action response, a response to a third office action is filed. After filing a third office action response, a notice of allowance may occur after a time frame λ (e.g., about one-third into the fifth next period).

If a notice of allowance does not occur after a third office action, after a period of 1.5ε from filing a third office action response, a response to a fourth office action is filed. After filing a fourth office action response, a notice of allowance may occur after a time frame λ (e.g., about half way into the sixth next period). The issuance forecasting may be forecasted for longer or shorter than six next periods and depends on the technology, the phase of the technology, and the amount of forecasting desired.

FIG. 224 is a diagram of an example of issuance forecasting parameters as determined and used by a growth and expense co-processor of an improved computer for technology based on the timing of FIG. 223. The issuance probability is calculated by multiplying issuance action receive probability by an allowance probability. Receive and allowance probabilities may be based on historical data, a particular market-tech unit, default settings, etc.

Issuance actions (similar to prosecution actions as previously discussed) include a first office action (OA) allowance, a receive first office action, a receive second office action, a receive third office action, a receive fourth office action, and a receive another office action. The receive probability of a first office action allowance is 5%, the receive probability of a first office action is 95%, the receive probability of a second office action is 31.64%, the receive probability of a third office action is 10.53%, the receive probability of a fourth office action is 3.51%, and the receive probability of another office action is 1.17%.

If a first office action allowance is received, the allowance probability is 100%, if a first office action is received the allowance probability is 66.7%, if a second office action is received the allowance probability is 66.7%, if a third office action is received the allowance probability is 66.7%, if a fourth office action is received the allowance probability is 66.7%, and if another office action is received the allowance probability is 66.7%.

The issuance probability before receiving a first office action for issuance due to a first office action allowance is 5.0% (e.g., 5%×100%). The issuance probability before receiving a first office action for issuance after receiving a first office action is 63.4% (e.g., 95%×66.7%). The issuance probability before receiving a first office action for issuance after receiving a second office action is 21.1% (e.g., 31.64%×66.7%). The issuance probability before receiving a first office action for issuance after receiving a third office action is 7.0% (e.g., 10.53%×66.7%). The issuance probability before receiving a first office action for issuance after receiving a fourth office action is 2.3% (e.g., 3.51%×66.7%). The issuance probability before receiving a first office action for issuance after receiving a fifth office action is 0.8% (e.g., 1.17%×66.7%).

FIG. 225 is a diagram of an example of issuance forecasting timing windows for a first patent application that is forecasted to be filed in the current period. The issuance forecasting timeline is similar to the example of FIG. 223 where a new application has a filing date that occurs in the middle of the current period, and the programmable time frame (β) spans to the end of the first next period (e.g., the programmable time frame (β) is approximately a year and a half long when a period is a year). If a first office action allowance occurs, a notice of allowance (NOA) occurs at the end of the first next period (after the programmable time frame (β)).

For this example, office action responses are assumed to be filed in the middle of an office action (OA) window. For example, a response to first office action is filed in the middle of the second next period after a time β+σ/2 (where σ is the time frame of a first office action window).

A programmable time frame (λ) is the time after filing an office action to receiving a notice of allowance. The programmable time frame (1.5ε) is the time window between filing office action responses (where s is the time frame of subsequent office action windows). As shown, after filing a first office action response after a period of β+σ/2, a notice of allowance may occur after a time frame λ (e.g., about three-quarters into the second next period).

If a notice of allowance does not occur after a first office action, after a period of 1.5ε from filing a first office action response, a response to a second office action is filed. After filing a second office action response, a notice of allowance may occur after a time frame λ (e.g., about one-twelfth into the fourth next period).

If a notice of allowance does not occur after a second office action, after a period of 1.5ε from filing a second office action response, a response to a third office action is filed. After filing a third office action response, a notice of allowance may occur after a time frame λ (e.g., about one-third into the fifth next period).

If a notice of allowance does not occur after a third office action, after a period of 1.5ε from filing a third office action response, a response to a fourth office action is filed. After filing a fourth office action response, a notice of allowance may occur after a time frame λ (e.g., about half way into the sixth next period). The issuance forecasting may be forecasted for longer or shorter than six next periods and depends on the technology, the phase of the technology, and the amount of forecasting desired.

FIG. 226 is a diagram of an example of forecasted probabilities of when a notice of allowance for the first patent application will be received as determined by a growth and expense co-processor of an improved computer for technology. In light of the timing windows discussed with reference to FIG. 225, timing probabilities for issuance can be calculated for a period. The dates for potential notices of allowance (NOAs) can be calculated and then the period those dates are in are determined. For example, with a first patent application filed in a current period (CP), there is zero percent probability of issuance in the current period or the first next period (1NP). If a NOA is received from a first office action allowance, there is a 100% probability of issuance during a second next period (2NP). If a NOA is received from a first office action response, there is a 100% probability of issuance during the second next period.

If a NOA is received from a second office action response, there is a 100% probability of issuance during a fourth next period (4NP). If a NOA is received from a third office action response, there is a 100% probability of issuance during the fifth next period (5NP). If a NOA is received from a fourth office action response, there is a 100% probability of issuance during the sixth next period (6NP).

FIG. 227 is a diagram of an example of forecasted probabilities of when a notice of allowance will be received combined with the forecasted probabilities of receiving a notice of allowance for the first patent application as determined by a growth and expense co-processor of an improved computer for technology. To determine the timing probabilities for issuance, the issuance probabilities based on office action (OA) are multiplied by the timing probabilities for issuance in a period.

The issuance probabilities based on office action were discussed with reference to FIG. 224. The issuance probability due to a first office action allowance is 5.0%, the issuance probability after receiving a first office action is 63.4%, the issuance probability after receiving a second office action is 21.1%. The issuance probability after receiving a third office action is 7.0%. The issuance probability after receiving a fourth office action is 2.3%. The issuance probability after receiving a fifth office action is 0.8%.

The timing probabilities for issuance in a period were discussed with reference to FIG. 226. With a first patent application filed in a current period (CP), there is zero percent probability of issuance in the current period or the first next period (1NP). If a NOA is received from a first office action allowance, there is a 100% probability of issuance during a second next period (2NP). If a NOA is received from a first office action response, there is a 100% probability of issuance during the second next period. If a NOA is received from a second office action response, there is a 100% probability of issuance during a fourth next period (4NP). If a NOA is received from a third office action response, there is a 100% probability of issuance during the fifth next period (5NP). If a NOA is received from a fourth office action response, there is a 100% probability of issuance during the sixth next period (6NP).

As such, with a first patent application filed in a current period (CP), there is zero percent probability of issuance in the current period or the first next period (1NP). There is a 5% probability of issuance during a second next period (2NP) due to a receive NOA from a first office action allowance (e.g., 5%×100%=5%). There is a 63.4% probability of issuance during a second next period due to a receive NOA from a first office action response (e.g., 63.4%×100%=63.4%). The sum of the allowance/issuance probability for the second next period is thus 68.4% (e.g., 5%+63.4%=68.4%).

There is zero percent probability of issuance in a third next period (3NP). There is a 21.1% probability of issuance during a fourth next period (4NP) due to a receive NOA from a second office action response (e.g., 21.1%×100%=21.1%). The sum of the allowance/issuance probability for the fourth next period is 21.1%. There is a 7.0% probability of issuance during a fifth next period (5NP) due to a receive NOA from a third office action response (e.g., 7.0%×100%=7.0%). The sum of the allowance/issuance probability for the fourth next period is 7.0%. There is a 2.3% probability of issuance during a sixth next period (6NP) due to a receive NOA from a fourth office action response (e.g., 2.3%×100%=2.3%). The sum of the allowance/issuance probability for the sixth next period is 2.3%.

Figures 228, 229:
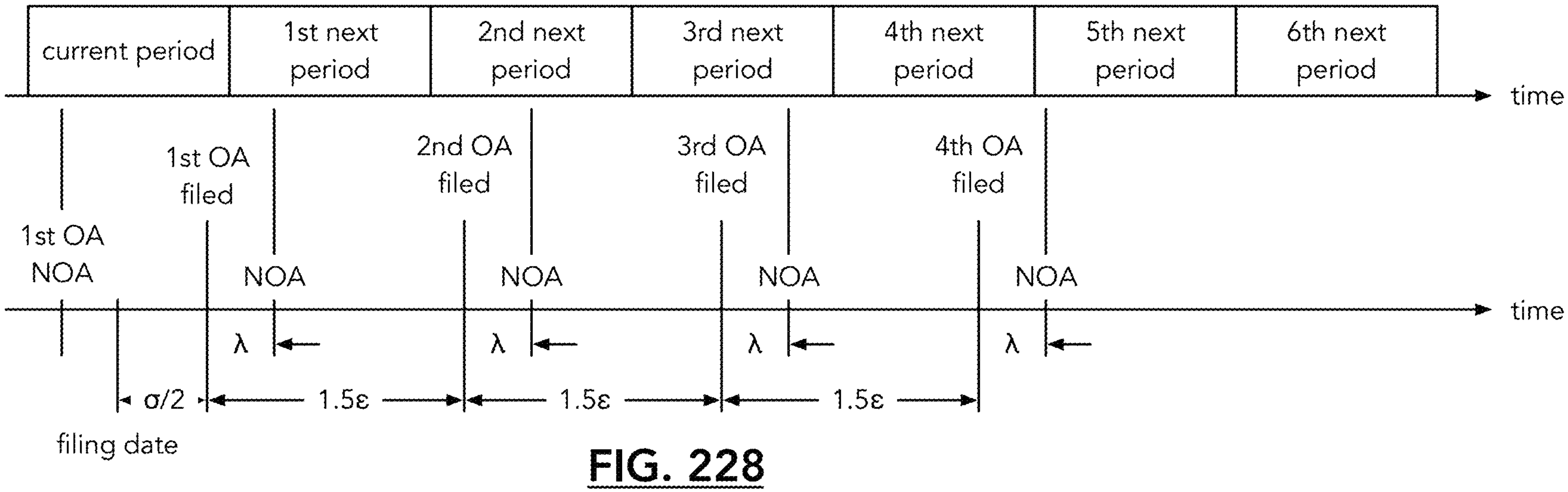
FIG. 228 is a diagram of an example of issuance forecasting timing windows for a patent application forecasted to receive a first office action in the current period.
FIG. 229 is a diagram of an example of issuance forecasting parameters as determined and used by a growth and expense co-processor of an improved computer for technology based on the timing of FIG. 228.

FIG. 228 is a diagram of an example of issuance forecasting timing windows for a patent application forecasted to receive a first office action in the current period. For example, the issuance forecasting timeline includes a current period, a first next period, a second next period, a third next period, a fourth next period, a fifth next period, and a sixth next period. More or less periods are possible based on the desired forecasting.

The growth and expense co-processor forecasts when issuances will likely occur based on programmable time frames. The programmable time frames may be based on past performance, industry averages, default settings, and/or details of prosecution (e.g., when office action responses are filed, etc.). The programmable time frames may be continually updated based on newly ingested data.

The forecasting occurs on a per patent application basis or based on an average filing date for new applications. In this example, a new application (e.g., a second patent application) has a filing date that occurs prior to the current period and a first office action is projected to be received in the current period. If a first office action allowance occurs, a notice of allowance (NOA) occurs at the beginning of the current period. For this example, office action responses are assumed to be filed in the middle of an office action (OA) window. For example, a response to first office action is filed toward the end of the current period after a time $\sigma/2$ (where $\sigma$ is the time frame of a first office action window).

A programmable time frame ($\lambda$) is the time after filing an office action to receiving a notice of allowance. The programmable time frame ($1.5\varepsilon$) is the time window between filing office action responses (where $\varepsilon$ is the time frame of subsequent office action windows). As shown, after filing a first office action response after a period of $\sigma/2$, a notice of allowance may occur after a time frame $\lambda$ (e.g., about one-quarter into the first next period).

If a notice of allowance does not occur after a first office action, after a period of $1.5\varepsilon$ from filing a first office action response, a response to a second office action is filed. After filing a second office action response, a notice of allowance may occur after a time frame $\lambda$ (e.g., about half way into the second next period).

If a notice of allowance does not occur after a second office action, after a period of $1.5\varepsilon$ from filing a second office action response, a response to a third office action is filed. After filing a third office action response, a notice of allowance may occur after a time frame $\lambda$ (e.g., about three-quarters into the third next period).

If a notice of allowance does not occur after a third office action, after a period of $1.5\varepsilon$ from filing a third office action response, a response to a fourth office action is filed. After filing a fourth office action response, a notice of allowance may occur after a time frame $\lambda$ (e.g., about one-twelfth into the fifth next period). The issuance forecasting may be forecasted for longer or shorter than six next periods and depends on the technology, the phase of the technology, and the amount of forecasting desired.

FIG. 229 is a diagram of an example of issuance forecasting parameters as determined and used by a growth and expense co-processor of an improved computer for technology based on the timing of FIG. 228. The issuance probability is calculated by multiplying issuance action receive probability by an allowance probability. Receive and allowance probabilities may be based on historical data, a particular market-tech unit, default settings, etc.

Issuance actions (similar to prosecution actions as previously discussed) include a first office action (OA) allowance, a receive first office action, a receive second office action, a receive third office action, a receive fourth office action, and a receive another office action. The receive probability of a first office action allowance is 5%, the receive probability of a first office action is 95%, the receive probability of a second office action is 31.64%, the receive probability of a third office action is 10.53%, the receive probability of a fourth office action is 3.51%, and the receive probability of another office action is 1.17%.

If a first office action allowance is received, the allowance probability is 100%, if a first office action is received the allowance probability is 66.7%, if a second office action is received the allowance probability is 66.7%, if a third office action is received the allowance probability is 66.7%, if a fourth office action is received the allowance probability is 66.7%, and if another office action is received the allowance probability is 66.7%.

The issuance probability due to a first office action allowance is 5.0% (e.g., 5%×100%). The issuance probability after receiving a first office action is 63.4% (e.g., 95%×66.7%). The issuance probability after receiving a second office action is 21.1% (e.g., 31.64%×66.7%). The issuance probability after receiving a third office action is 7.0% (e.g., 10.53%×66.7%). The issuance probability after receiving a fourth office action is 2.3% (e.g., 3.51%×66.7%). The issuance probability after receiving a fifth office action is 0.8% (e.g., 1.17%×66.7%).

FIG. 230 is a diagram of an example of issuance forecasting timing windows for a second patent application that is forecasted to receive a first office action in the current period. The diagram of FIG. 230 is similar to the diagram of FIG. 228 except that a respond to a fifth office action is shown at the beginning of the sixth period.

In this example, a new application (e.g., a second patent application) has a filing date that occurs prior to the current period and a first office action is projected to be received in the current period. If a first office action allowance occurs, a notice of allowance (NOA) occurs at the beginning of the current period. For this example, office action responses are assumed to be filed in the middle of an office action (OA) window. For example, a response to first office action is filed toward the end of the current period after a time σ/2 (where σ is the time frame of a first office action window).

A programmable time frame (λ) is the time after filing an office action to receiving a notice of allowance. The programmable time frame (1.5ε) is the time window between filing office action responses (where s is the time frame of subsequent office action windows). As shown, after filing a first office action response after a period of σ/2, a notice of allowance may occur after a time frame λ (e.g., about one-quarter into the first next period).

If a notice of allowance does not occur after a first office action, after a period of 1.5ε from filing a first office action response, a response to a second office action is filed. After filing a second office action response, a notice of allowance may occur after a time frame λ (e.g., about half way into the second next period).

If a notice of allowance does not occur after a second office action, after a period of 1.5ε from filing a second office action response, a response to a third office action is filed. After filing a third office action response, a notice of allowance may occur after a time frame λ (e.g., about three-quarters into the third next period).

If a notice of allowance does not occur after a third office action, after a period of 1.5ε from filing a third office action response, a response to a fourth office action is filed. After filing a fourth office action response, a notice of allowance may occur after a time frame λ (e.g., about one-twelfth into the fifth next period). If a notice of allowance does not occur after a fourth office action, after a period of 1.5ε from filing a fourth office action response, a response to a fifth office action is filed. After filing a fifth office action response, a notice of allowance may occur after a time frame λ (e.g., about one-third into the sixth next period).

FIG. 231 is a diagram of an example of forecasted probabilities of when a notice of allowance for the second patent application will be received as determined by a growth and expense co-processor of an improved computer for technology. In light of the timing windows discussed with reference to FIG. 230, timing probabilities for issuance can be calculated for a period. The dates for potential notices of allowance (NOAs) can be calculated and then the period those dates are in are determined. For example, with a second patent application is filed prior to a current period (CP) and a first office action is expected to be received in the current period, if a NOA is received from a first office action allowance, there is a 100% probability of issuance during the current period. If a NOA is received from a first office action response, there is a 100% probability of issuance during a first next period (1NP).

If a NOA is received from a second office action response, there is a 100% probability of issuance during a second next period (2NP). If a NOA is received from a third office action response, there is a 100% probability of issuance during the third next period (3NP). If a NOA is received from a fourth office action response, there is a 100% probability of issuance during the fifth next period (5NP). If a NOA is received from a fifth office action response (e.g., "another" OA response), there is a 100% probability of issuance during the sixth next period (6NP).

FIG. 232 is a diagram of an example of forecasted probabilities of when a notice of allowance will be received combined with the forecasted probabilities of receiving a notice of allowance for the second patent application as determined by a growth and expense co-processor of an improved computer for technology. To determine the timing probabilities for issuance, the issuance probabilities based on office action (OA) are multiplied by the timing probabilities for issuance in a period.

The issuance probabilities based on office action were discussed with reference to FIG. 229. The issuance probability due to a first office action allowance is 5.0%, the issuance probability after receiving a first office action is 63.4%, the issuance probability after receiving a second office action is 21.1%. The issuance probability after receiving a third office action is 7.0%. The issuance probability after receiving a fourth office action is 2.3%. The issuance probability after receiving a fifth office action is 0.8%.

The timing probabilities for issuance in a period were discussed with reference to FIG. 231. With a second patent application filed prior to a current period (CP) and a first office action expected in the current period, if a NOA is received from a first office action allowance, there is a 100% probability of issuance during the current period. If a NOA is received from a first office action response, there is a 100% probability of issuance during the first next period (1NP). If a NOA is received from a second office action response, there is a 100% probability of issuance during a second next period (2NP). If a NOA is received from a third office action response, there is a 100% probability of issuance during the third next period (3NP). If a NOA is received from a fourth office action response, there is a 100% probability of issuance during the fifth next period (5NP). If a NOA is received from another office action response, there is a 100% probability of issuance during the sixth next period (6NP).

As such, with a second patent application expecting a first office action in a current period (CP), there is a 5% probability of issuance during a current period (CP) due to a receive NOA from a first office action allowance (e.g., 5% x 100%=5%). The sum of the allowance/issuance probability for the current period is thus 5%. There is a 63.4% probability of issuance during a first next period (1NP) due to a receive NOA from a first office action response (e.g., 63.4%×100%=63.4%). The sum of the allowance/issuance probability for the current period is thus 63.4%.

There is a 21.1% probability of issuance during a second next period (2NP) due to a receive NOA from a second office action response (e.g., 21.1%×100%=21.1%). The sum of the allowance/issuance probability for the second next period is thus 21.1%. There is a 7.0% probability of issuance during a third next period (3NP) due to a receive NOA from a third office action response (e.g., 7.0%×100%=7.0%). The sum of the allowance/issuance probability for the third next period is thus 7.0%. There is a zero percent probability of issuance in a fourth next period (4NP). There is a 2.3% probability of issuance during a fifth next period (5NP) due to a receive NOA from a fourth office action response (e.g., 2.3%×100%=2.3%). The sum of the allowance/issuance probability for the fifth next period is 2.3%.

There is a 0.8% probability of issuance during a sixth next period (6NP) due to a receive NOA from another office action response (e.g., 0.8%×100%=0.8%). The sum of the allowance/issuance probability for the sixth next period is 0.8%.

Figures 233, 234:
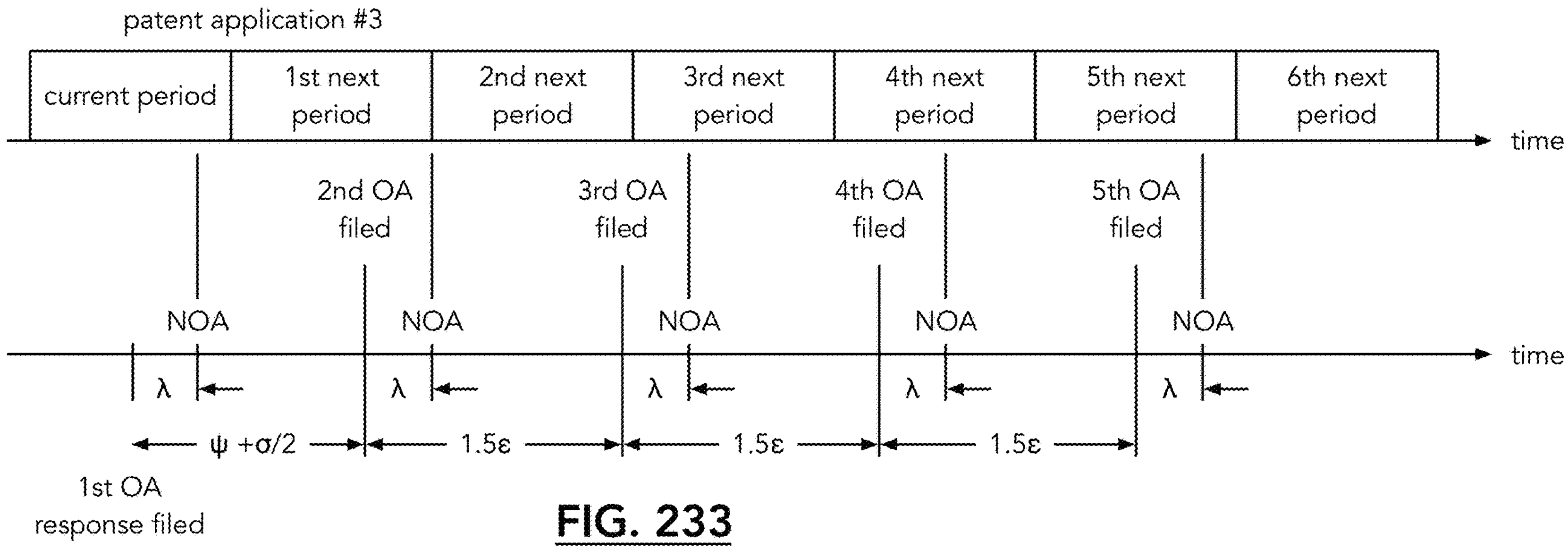
FIG. 233 is a diagram of an example of issuance forecasting timing windows for a patent application forecasted to receive a second office action in the $1^{st}$ next period.
FIG. 234 is a diagram of an example of issuance forecasting parameters as determined and used by a growth and expense co-processor of an improved computer for technology based on the timing of FIG. 233.

FIG. 233 is a diagram of an example of issuance forecasting timing windows for a patent application forecasted to receive a second office action in the first next period. For example, the issuance forecasting timeline includes a current period, a first next period, a second next period, a third next period, a fourth next period, a fifth next period, and a sixth next period. More or less periods are possible based on the desired forecasting.

The growth and expense co-processor forecasts when issuances will likely occur based on programmable time frames. The programmable time frames may be based on past performance, industry averages, default settings, and/or details of prosecution (e.g., when office action responses are filed, etc.). The programmable time frames may be continually updated based on newly ingested data.

The forecasting occurs on a per patent application basis or based on an average filing date for new applications. In this example, a new application (e.g., a third patent application) has a filing date that occurs prior to the current period, and a first office action response was filed in the current period. For this example, office action responses are assumed to be filed in the middle of an office action (OA) window. For example, a response to first office action is filed in the middle of the current period. After a time ($\psi+\sigma/2$) (where $\sigma$ is the time frame of a second office action window and $\psi$ is a time from after the first office action is filed to the beginning of a second office action window).

A programmable time frame ($\lambda$) is the time after filing an office action to receiving a notice of allowance. The programmable time frame ($1.5\varepsilon$) is the time window between filing office action responses (where s is the time frame of subsequent office action windows). As shown, after filing a first office action response, a notice of allowance may occur after a time frame $\lambda$ (e.g., about three-quarters of the way through the current period). If a notice of allowance does not occur after the first office action, a second office action response is filed after a period of $\psi+\sigma/2$ from filing a first office action response. A notice of allowance may occur after a time frame $\lambda$ (e.g., at the beginning of the second next period) from filing the second office action response.

If a notice of allowance does not occur after a second office action, after a period of $1.5\varepsilon$ from filing a second office action response, a response to a third office action is filed. After filing a third office action response, a notice of allowance may occur after a time frame $\lambda$ (e.g., about a third into the third next period).

If a notice of allowance does not occur after a third office action, after a period of $1.5\varepsilon$ from filing a third office action response, a response to a fourth office action is filed. After filing a fourth office action response, a notice of allowance may occur after a time frame $\lambda$ (e.g., about half way into the fourth next period). If a notice of allowance does not occur after a fourth office action, after a period of $1.5\varepsilon$ from filing a fourth office action response, a response to a fifth office action is filed. After filing a fifth office action response, a notice of allowance may occur after a time frame $\lambda$ (e.g., about three-quarters of the way into the fifth next period). The issuance forecasting may be forecasted for longer or shorter than six next periods and depends on the technology, the phase of the technology, and the amount of forecasting desired.

FIG. 234 is a diagram of an example of issuance forecasting parameters as determined and used by a growth and expense co-processor of an improved computer for technology based on the timing of FIG. 233. The issuance probability is calculated by multiplying issuance action receive probability by an allowance probability. Receive and allowance probabilities may be based on historical data, a particular market-tech unit, default settings, etc.

Issuance actions (similar to prosecution actions as previously discussed) include a first office action (OA) allowance, a receive first office action, a receive second office action, a receive third office action, a receive fourth office action, and a receive another office action. For a third patent application, because a first office action has been filed, there is no receive probability of a first office action allowance and a 100% receive probability of a first office action. The receive probability of a second office action is 33.3%, the receive probability of a third office action is 11.1%, the receive probability of a fourth office action is 3.7%, and the receive probability of another office action is 1.2%.

If a first office action allowance is received, the allowance probability is 100%, if a first office action is received the allowance probability is 66.7%, if a second office action is received the allowance probability is 66.7%, if a third office action is received the allowance probability is 66.7%, if a fourth office action is received the allowance probability is 66.7%, and if another office action is received the allowance probability is 66.7%.

The issuance probability due to a first office action allowance is 0.0% (e.g., 0%×100%). The issuance probability after receiving a first office action is 66.7% (e.g., 100%×66.7%). The issuance probability after receiving a second office action is 22.2% (e.g., 33.3%×66.7%). The issuance probability after receiving a third office action is 7.4% (e.g., 11.1% x 66.7%). The issuance probability after receiving a fourth office action is 2.5% (e.g., 3.7%×66.7%). The issuance probability after receiving a fifth office action is 0.8% (e.g., 1.2%×66.7%).

FIG. 235 is a diagram of an example of issuance forecasting timing windows for a third patent application that is forecasted to receive a second office action in the first next period. FIG. 235 is similar to the diagram of FIG. 233 where a new application (e.g., a third patent application) has a filing date that occurs prior to the current period, a first office action response was filed in the current period, and a second office action is projected to be received in the first next period. For this example, office action responses are assumed to be filed in the middle of an office action (OA) window. For example, a response to first office action is filed in the middle of the current period. After a time ($\psi+\sigma/2$) (where $\sigma$ is the time frame of a second office action window and $\psi$ is a time from after the first office action is filed to the beginning of a second office action window).

A programmable time frame ($\lambda$) is the time after filing an office action to receiving a notice of allowance. The programmable time frame ($1.5\varepsilon$) is the time window between filing office action responses (where s is the time frame of subsequent office action windows). As shown, after filing a second office action response after a period of $\psi+\sigma/2$ from filing a first office action response, a notice of allowance may occur after a time frame $\lambda$ (e.g., at the beginning of the second next period).

If a notice of allowance does not occur after a second office action, after a period of $1.5\varepsilon$ from filing a second office action response, a response to a third office action is filed. After filing a third office action response, a notice of allowance may occur after a time frame $\lambda$ (e.g., about a third into the third next period).

If a notice of allowance does not occur after a third office action, after a period of $1.5\varepsilon$ from filing a third office action response, a response to a fourth office action is filed. After filing a fourth office action response, a notice of allowance may occur after a time frame $\lambda$ (e.g., about half way into the fourth next period). If a notice of allowance does not occur after a fourth office action, after a period of $1.5\varepsilon$ from filing a fourth office action response, a response to a fifth office action is filed. After filing a fifth office action response, a notice of allowance may occur after a time frame $\lambda$ (e.g., about three-quarters of the way into the fifth next period).

FIG. 236 is a diagram of an example of forecasted probabilities of when a notice of allowance for the third patent application will be received as determined by a growth and expense co-processor of an improved computer for technology. In light of the timing windows discussed with reference to FIG. 235, timing probabilities for issuance can be calculated for a period. The dates for potential notices of allowance (NOAs) can be calculated and then the period those dates are in are determined. For example, when a third patent application is filed prior to a current period (CP) and a response to first office action (OA) is filed in a current period, there is no probability of a NOA received from a first office action allowance. If a NOA is received from the first office action response, there is a 100% probability of issuance during the current period (CP).

If a NOA is received from a second office action response, there is a 100% probability of issuance during a first next period (1NP). There is no probability of issuance in a second next period (2NP). If a NOA is received from a third office action response, there is a 100% probability of issuance during the third next period (3NP). If a NOA is received from a fourth office action response, there is a 100% probability of issuance during the fourth next period (4NP). If a NOA is received from a fifth office action response (e.g., "another" OA response), there is a 100% probability of issuance during the fifth next period (5NP).

FIG. 237 is a diagram of an example of forecasted probabilities of when a notice of allowance will be received combined with the forecasted probabilities of receiving a notice of allowance for the third patent application as determined by a growth and expense co-processor of an improved computer for technology. To determine the timing probabilities for issuance, the issuance probabilities based on office action (OA) are multiplied by the timing probabilities for issuance in a period.

The issuance probabilities based on office action were discussed with reference to FIG. 234. The issuance probability due to a first office action allowance is 0%, the issuance probability after receiving a first office action is 66.7%, the issuance probability after receiving a second office action is 22.2%, the issuance probability after receiving a third office action is 7.4%, the issuance probability after receiving a fourth office action is 2.5%, and the issuance probability after receiving another office action is 0.8%.

The timing probabilities for issuance in a period were discussed with reference to FIG. 236. With a third patent application filed prior to a current period (CP) and a first office action response filed in a current period (CP), there is a 100% probability of issuance during the current period (CP) if an NOA is received from the first office action response. If a NOA is received from a second office action response, there is a 100% probability of issuance during a first next period (1NP). There is no probability of issuance in a second next period (2NP). If a NOA is received from a third office action response, there is a 100% probability of issuance during the third next period (3NP). If a NOA is received from a fourth office action response, there is a 100% probability of issuance during the fourth next period (4NP). If a NOA is received from a fifth office action response (e.g., "another" OA response), there is a 100% probability of issuance during the fifth next period (5NP).

As such, with a third patent application filed prior to a current period (CP) and the first office action filed in the current period (CP), there is a 66.7% probability of issuance during a current period (CP) due to a receive NOA from a first office action response (e.g., 66.7%×100%=66.7%). The sum of the allowance/issuance probability for the current period is thus 66.7%.

There is a 22.2% probability of issuance during a first next period (1NP) due to a receive NOA from a second office action response (e.g., 22.2%×100%=22.2%). The sum of the allowance/issuance probability for the first next period is thus 22.2%. There is a 0% probability of issuance during a second next period (2NP).

There is a 7.4% probability of issuance during a third next period (3NP) due to a receive NOA from a third office action response (e.g., 7.4%×100%=7.4%). The sum of the allowance/issuance probability for the third next period is thus 7.4%. There is a 2.5% probability of issuance during a fourth next period (4NP) due to a receive NOA from a fourth office action response (e.g., 2.5%×100%=2.5%). The sum of the allowance/issuance probability for the fourth next period is 2.5%. There is a 0.8% probability of issuance during a fifth next period (5NP) due to a receive NOA from another office action response (e.g., 0.8%×100%=0.8%). The sum of the allowance/issuance probability for the fifth next period is 0.8%. There is a 0% probability of issuance during a sixth next period (6NP).

Figure 238:
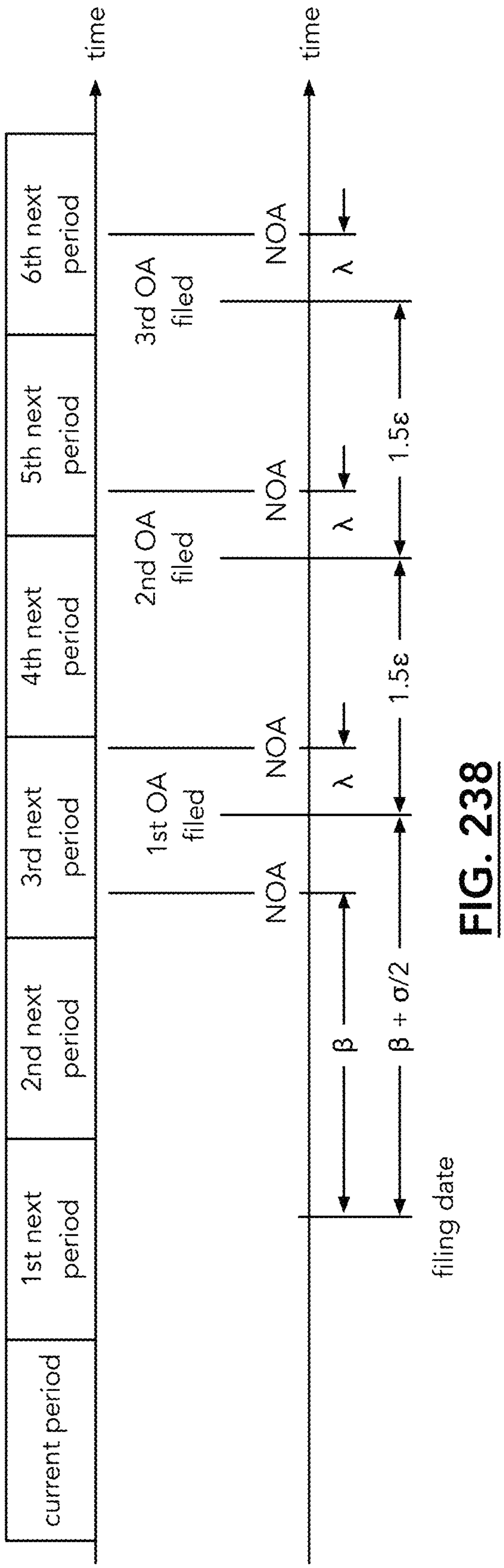
FIG. 238 is a diagram of an example of issuance forecasting timing windows for a patent application forecasted to be filed in the $1^{st}$ next period.

FIG. 238 is a diagram of an example of issuance forecasting timing windows for a patent application forecasted to be filed in the first next period. The issuance forecasting timeline includes a series of periods (e.g., years). For example, the issuance forecasting timeline includes a current period, a first next period, a second next period, a third next period, a fourth next period, a fifth next period, and a sixth next period. More or less periods are possible based on the desired forecasting.

The growth and expense co-processor forecasts when issuances will likely occur based on programmable time frames. The programmable time frames may be based on past performance, industry averages, default settings, and/or details of prosecution (e.g., when office action responses are filed, etc.). The programmable time frames may be continually updated based on newly ingested data.

The forecasting occurs on a per patent application basis or based on an average filing date for new applications. In this example, a new application (e.g., a fourth application) is filed during the middle of a first next period. The programmable time frame (β) is the amount of time from filing a new application to receiving a first office action (or first office action allowance). The programmable time frame (β) spans to about a third of the way into the third next period. If a first office action allowance occurs, a notice of allowance (NOA) occurs at about a third of the way into the third next period (after the programmable time frame (β)).

For this example, office action responses are assumed to be filed in the middle of an office action (OA) window. For example, a response to first office action is filed towards the middle of the third next period after a time $\beta+\sigma/2$ (where σ is the time frame of a first office action window).

A programmable time frame (λ) is the time after filing an office action to receiving a notice of allowance. The programmable time frame (1.5ε) is the time window between filing office action responses (where s is the time frame of subsequent office action windows). As shown, after filing a first office action response after a period of $\beta+\sigma/2$, a notice of allowance may occur after a time frame λ (e.g., about the end of the third next period).

If a notice of allowance does not occur after a first office action, after a period of 1.5ε from filing a first office action response, a response to a second office action is filed. After filing a second office action response, a notice of allowance may occur after a time frame λ (e.g., about one-fourth into the fifth next period).

If a notice of allowance does not occur after a second office action, after a period of 1.5ε from filing a second office action response, a response to a third office action is filed. After filing a third office action response, a notice of allowance may occur after a time frame λ (e.g., about half way into the sixth next period). The issuance forecasting may be forecasted for longer or shorter than six next periods and depends on the technology, the phase of the technology, and the amount of forecasting desired.

Figure 239:
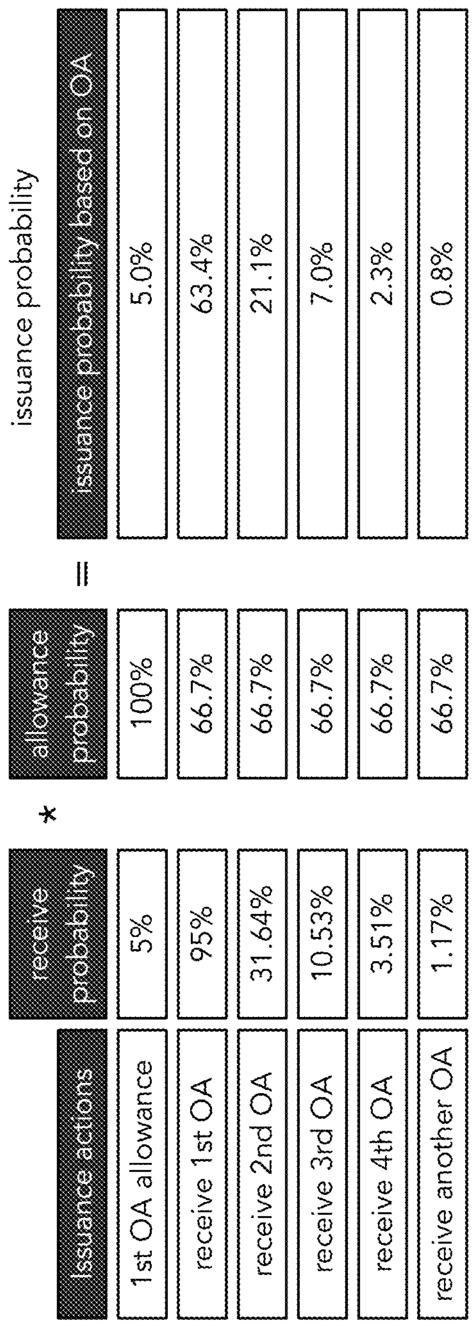
FIG. 239 is a diagram of an example of issuance forecasting parameters as determined and used by a growth and expense co-processor of an improved computer for technology based on the timing of FIG. 233.

FIG. 239 is a diagram of an example of issuance forecasting parameters as determined and used by a growth and expense co-processor of an improved computer for technology based on the timing of FIG. 238. The issuance probability is calculated by multiplying issuance action receive probability by an allowance probability. Receive and allowance probabilities may be based on historical data, a particular market-tech unit, default settings, etc.

Issuance actions (similar to prosecution actions as previously discussed) include a first office action (OA) allowance, a receive first office action, a receive second office action, a receive third office action, a receive fourth office action, and a receive another office action. The receive probability of a first office action allowance is 5%, the receive probability of a first office action is 95%, the receive probability of a second office action is 31.64%, the receive probability of a third office action is 10.53%, the receive probability of a fourth office action is 3.51%, and the receive probability of another office action is 1.17%.

If a first office action allowance is received, the allowance probability is 100%, if a first office action is received the allowance probability is 66.7%, if a second office action is received the allowance probability is 66.7%, if a third office action is received the allowance probability is 66.7%, if a fourth office action is received the allowance probability is 66.7%, and if another office action is received the allowance probability is 66.7%.

The issuance probability before receiving a first office action for issuance due to a first office action allowance is 5.0% (e.g., 5%×100%). The issuance probability before receiving a first office action for issuance after receiving a first office action is 63.4% (e.g., 95%×66.7%). The issuance probability before receiving a first office action for issuance after receiving a second office action is 21.1% (e.g., 31.64%×66.7%). The issuance probability before receiving a first office action for issuance after receiving a third office action is 7.0% (e.g., 10.53%×66.7%). The issuance probability before receiving a first office action for issuance after receiving a fourth office action is 2.3% (e.g., 3.51%×66.7%). The issuance probability before receiving a first office action for issuance after receiving a fifth office action is 0.8% (e.g., 1.17%×66.7%).

FIG. 240 is a diagram of an example of issuance forecasting timing windows for a fourth patent application that is forecasted to be filed in the first next period. The diagram of FIG. 240 is similar to the diagram of FIG. 238. In this example, a new application (e.g., a fourth application) is filed during the middle of a first next period. The programmable time frame (β) is the amount of time from filing a new application to receiving a first office action (or first office action allowance). The programmable time frame (β) spans to about a third of the way into the third next period. If a first office action allowance occurs, a notice of allowance (NOA) occurs at about a third of the way into the third next period (after the programmable time frame (β)).

For this example, office action responses are assumed to be filed in the middle of an office action (OA) window. For example, a response to first office action is filed towards the middle of the third next period after a time $\beta+\sigma/2$ (where σ is the time frame of a first office action window).

A programmable time frame (λ) is the time after filing an office action to receiving a notice of allowance. The programmable time frame (1.5ε) is the time window between filing office action responses (where s is the time frame of subsequent office action windows). As shown, after filing a first office action response after a period of $\beta+\sigma/2$, a notice of allowance may occur after a time frame λ (e.g., about the end of the third next period).

If a notice of allowance does not occur after a first office action, after a period of 1.5ε from filing a first office action response, a response to a second office action is filed. After filing a second office action response, a notice of allowance may occur after a time frame λ (e.g., about one-fourth into the fifth next period).

If a notice of allowance does not occur after a second office action, after a period of 1.5ε from filing a second office action response, a response to a third office action is filed. After filing a third office action response, a notice of allowance may occur after a time frame λ (e.g., about half way into the sixth next period). The issuance forecasting may be forecasted for longer or shorter than six next periods and depends on the technology, the phase of the technology, and the amount of forecasting desired.

FIG. 241 is a diagram of an example of forecasted probabilities of when a notice of allowance for the fourth patent application will be received as determined by a growth and expense co-processor of an improved computer for technology. In light of the timing windows discussed with reference to FIG. 240, timing probabilities for issuance can be calculated for a period. The dates for potential notices of allowance (NOAs) can be calculated and then the period those dates are in are determined. For example, when a fourth patent application is filed during the middle of a first next period, there is no probability of issuance in a current period (CP), first next period (1NP), or second next period (2NP).

If a NOA is received from a first office action allowance, there is 100% probability of issuance during a third next period (3NP). If a NOA is received from a first office action response, there is 100% probability of issuance during a third next period (3NP). There is no probability of issuance during a fourth next period (4NP). If a NOA is received from a second office action response, there is a 100% probability of issuance during a fifth next period (1NP). If a NOA is received from a third office action response, there is a 100% probability of issuance during the sixth next period (6NP).

FIG. 242 is a diagram of an example of forecasted probabilities of when a notice of allowance will be received combined with the forecasted probabilities of receiving a notice of allowance for the fourth patent application as determined by a growth and expense co-processor of an improved computer for technology. To determine the timing probabilities for issuance, the issuance probabilities based on office action (OA) are multiplied by the timing probabilities for issuance in a period.

The issuance probabilities based on office action were discussed with reference to FIG. 239. The issuance probability due to a first office action allowance is 5.0%. The issuance probability after receiving a first office action is 63.4%. The issuance probability after receiving a second office action is 21.1%. The issuance probability after receiving a third office action is 7.0%. The issuance probability after receiving a fourth office action is 2.3%. The issuance probability after receiving another office action is 0.8%.

The timing probabilities for issuance in a period were discussed with reference to FIG. 241. When a fourth patent application is filed during the middle of a first next period, there is no probability of issuance in a current period (CP), first next period (1NP), or second next period (2NP). If a NOA is received from a first office action allowance, there is 100% probability of issuance during a third next period (3NP). If a NOA is received from a first office action response, there is 100% probability of issuance during a third next period (3NP). There is no probability of issuance during a fourth next period (4NP). If a NOA is received from a second office action response, there is a 100% probability of issuance during a fifth next period (1NP). If a NOA is received from a third office action response, there is a 100% probability of issuance during the sixth next period (6NP).

As such, with the patent fourth application filed during the middle of a first next period, there is a 0% probability of issuance during a current period (CP), a first next period (1NP), or a second next period (2NP). The sum of the allowance/issuance probability for the current, first next, and second next periods are thus 0%.

There is a 5% probability of issuance during a third next period (3NP) due to a receive NOA from first office action allowance (e.g., 5%×100%=5%). There is a 63.4% probability of issuance during a third next period (3NP) due to a receive NOA from first office action response (e.g., 63.4%×100%=63.4%). The sum of the allowance/issuance probability for the third next period is thus 68.4% (e.g., 5%+63.4%=68.4%). There is a 0% probability of issuance during a fourth next period (4NP). The sum of the allowance/issuance probability for the fourth next period is thus 0%.

There is a 21.1% probability of issuance during a fifth next period (5NP) due to a receive NOA from a second office action response (e.g., 21.1%×100%=21.1%). The sum of the allowance/issuance probability for the fifth next period is thus 21.1%. There is a 7.0% probability of issuance during a sixth next period (6NP) due to a receive NOA from a third office action response (e.g., 7.0%×100%=7.0%).

FIG. 243 is a diagram of an example of combining issuance forecasting probabilities and timing for the four example patent applications as determined by a growth and expense co-processor of an improved computer for technology. The sum of issuance probabilities for a first patent application (as discussed with reference to FIG. 227) are 0% for a current period (CP), 0% for a first next period, 68.4% for a second next period (2NP), 0% for a third next period (3NP), 21.2% for a fourth next period (4NP), 7.0% for a fifth next period (5NP), and 2.3% for a sixth next period (6NP).

The sum of issuance probabilities for a second patent application (as discussed with reference to FIG. 232) are 5% for a current period (CP), 63.4% for a first next period (1NP), 21.2% for a second next period (2NP), 7.0% for a third next period (3NP), 0% for a fourth next period (4NP), 2.3% for a fifth next period (5NP), and 0.8% for a sixth next period (6NP).

The sum of issuance probabilities for a third patent application (as discussed with reference to FIG. 237) are 66.7% for a for a current period (CP), 22.2% for a first next period, 0% for a second next period (2NP), 7.4% for a third next period (3NP), 2.5% for a fourth next period (4NP), 0.8% for a fifth next period (5NP), and 0% for a sixth next period (6NP).

The sum of issuance probabilities for a fourth patent application (as discussed with reference to FIG. 242) are 0% for a for a current period (CP), 0% for a first next period, 0% for a second next period (2NP), 68.4% for a third next period (3NP), 0% for a fourth next period (4NP), 21.1% for a fifth next period (5NP), and 7.0% for a sixth next period (6NP).

Based on the sum of issuance probabilities for each patent application, a cumulative sum of issuance probabilities for patent applications 1-4 over a current-sixth period can be calculated. For example, the probability of issuance in the current period (CP) is 71.7% (e.g., 66.7%+5%+0%+0%=71.7%). The probability of issuance in the first next period (1NP) is 154% (e.g., 68.4%+63.4%+22.2%+0%=154%). The probability of issuance in the second next period (2NP) is 21.2% (e.g., 0%+21.1%+0%+0%=21.1%).

The probability of issuance in the third next period (3NP) is 82.8% (e.g., 0%+7.0%+7.4%+68.4%=82.8%). The probability of issuance in the fourth next period (4NP) is 23.6% (e.g., 21.1%+0%+2.5%+0%=23.6%). The probability of issuance in the fifth next period (5NP) is 31.2% (e.g., 7.0%+2.3%+0.8%+21.1%=31.2%). The probability of issuance in the sixth next period (6NP) is 10.1% (e.g., 2.3%+0.8%+0%+7.0%=10.1%).

Based off of the cumulative sum of issuance probabilities, an amount of issuances can be estimated. For example, for a current period, 0.72 issuances can be expected, for a first next period, 1.54 issuances can be expected, for a second next period, 0.21 issuances can be expected, for a third next period, 0.83 issuances can be expected, for a fourth next period, 0.24 issuances can be expected, for a fifth next period, 0.31 issuances can be expected, and for a sixth next period, 0.10 issuances can be expected.

FIG. 244 is a diagram of an example of calculating expenses for the issuance forecasting probabilities and timing for the four example patent applications as determined by a growth and expense co-processor of an improved computer for technology. Using the amount of estimated issuances discussed with reference to FIG. 243 and issuance fees, issuance expenses can be estimated. In this example, programmable values for issuance fees include a $700 government fee and a $1500 attorney fee (total of $2200) per issuance. Issuance fees can be programmed based on current government fees, a particular clients, industry averages, etc.

For a current period, the forecasted issuance expense for attorney fees is $1,080 (e.g., 0.72×$1500), the forecasted issuance expense for government fees is $504 (e.g., 0.72×$700), and the total forecasted issuance expense is $1,584 (e.g., $1,080+$504). For a first next period, the forecasted issuance expense for attorney fees is $2,310 (e.g., 1.54×$1500), the forecasted issuance expense for government fees is $1,078 (e.g., 1.54×$700), and the total forecasted issuance expense is $3,388 (e.g., $2,310+$1,078). For a second next period, the forecasted issuance expense for attorney fees is $315 (e.g., 0.21×$1500), the forecasted issuance expense for government fees is $147 (e.g., 0.21×$700), and the total forecasted issuance expense is $462 (e.g., $315+$147).

For a third next period, the forecasted issuance expense for attorney fees is $1,245 (e.g., 0.83×$1500), the forecasted issuance expense for government fees is $581 (e.g., 0.83×$700), and the total forecasted issuance expense is $1,826 (e.g., $1,245+$581). For a fourth next period, the forecasted issuance expense for attorney fees is $360 (e.g., 0.24×$1500), the forecasted issuance expense for government fees is $168 (e.g., 0.24×$700), and the total forecasted issuance expense is $528 (e.g., $360+$168).

For a fifth next period, the forecasted issuance expense for attorney fees is $465 (e.g., 0.31×$1500), the forecasted issuance expense for government fees is $217 (e.g., 0.31×$700), and the total forecasted issuance expense is $682 (e.g., $465+$217). For a sixth next period, the forecasted issuance expense for attorney fees is $150 (e.g., 0.10×$1500), the forecasted issuance expense for government fees is $70 (e.g., 0.10×$700), and the total forecasted issuance expense is $220 (e.g., $70+$220).

Figure 245:
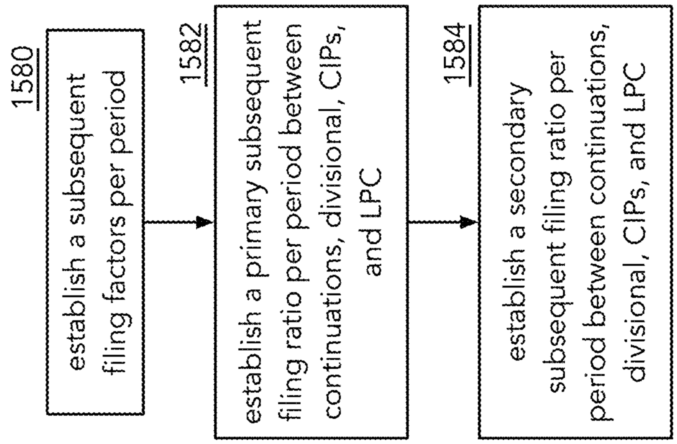
FIG. 245 is a logic diagram of an example of method for forecasting subsequent filing probabilities and timing as executed by a growth and expense co-processor of an improved computer for technology.

FIG. 245 is a logic diagram of an example of method for forecasting subsequent filing probabilities and timing as executed by a growth and expense co-processor of an improved computer for technology. In this example, subsequent filings are forecasted domestically (e.g., in the U.S.), but a similar method can be used for forecasting subsequent foreign filings. Subsequent filings include continuation applications, divisional applications, continuation in part applications, legal placeholder conversion (LPC) applications, and provisional conversion applications. For provisional conversions, a set period of time "x" may be used to determine when the conversion will take place.

The method begins with step 1580 where subsequent filing factors are established per period. Subsequent filing factors determine an amount of first subsequent filings per period, and an amount of second and beyond subsequent filings per period. The subsequent filing factor refers to a weight used to multiply to percentages of each type of subsequent filing. For example, the subsequent filing factor for a first (e.g., primary) subsequent filing, may be a 1.25. As another example, the subsequent filing factor for a second (e.g., secondary) subsequent filing, may be a 0.5.

The method continues with step 1582 where a primary subsequent filing ratio per period is determined between the various types of subsequent filings (e.g., continuations, divisionals, continuation-in-part (CIPs), and LPCs). For example, for primary subsequent filings, the amount of LPCs desired may be higher than the amount of continuations. The primary subsequent filing ratio may be based on the type of application (e.g., if it is a bundle application), likelihood of a restriction requirement (e.g., based on past performance and/or industry average), desired patent position, budget, etc.

The method continues with step 1584 where a secondary subsequent filing ratio per period is determined between the various types of subsequent filings (e.g., continuations, divisionals, continuation-in-part (CIPs), and LPCs). For example, for secondary subsequent filings, the amount of continuations may be more desired that the amount of LPCs. The secondary subsequent filing ratio may be based on the type of application (e.g., if it is a bundle application), likelihood of a restriction requirement (e.g., based on past performance and/or industry average), desired patent position, budget, etc.

Figure 246:
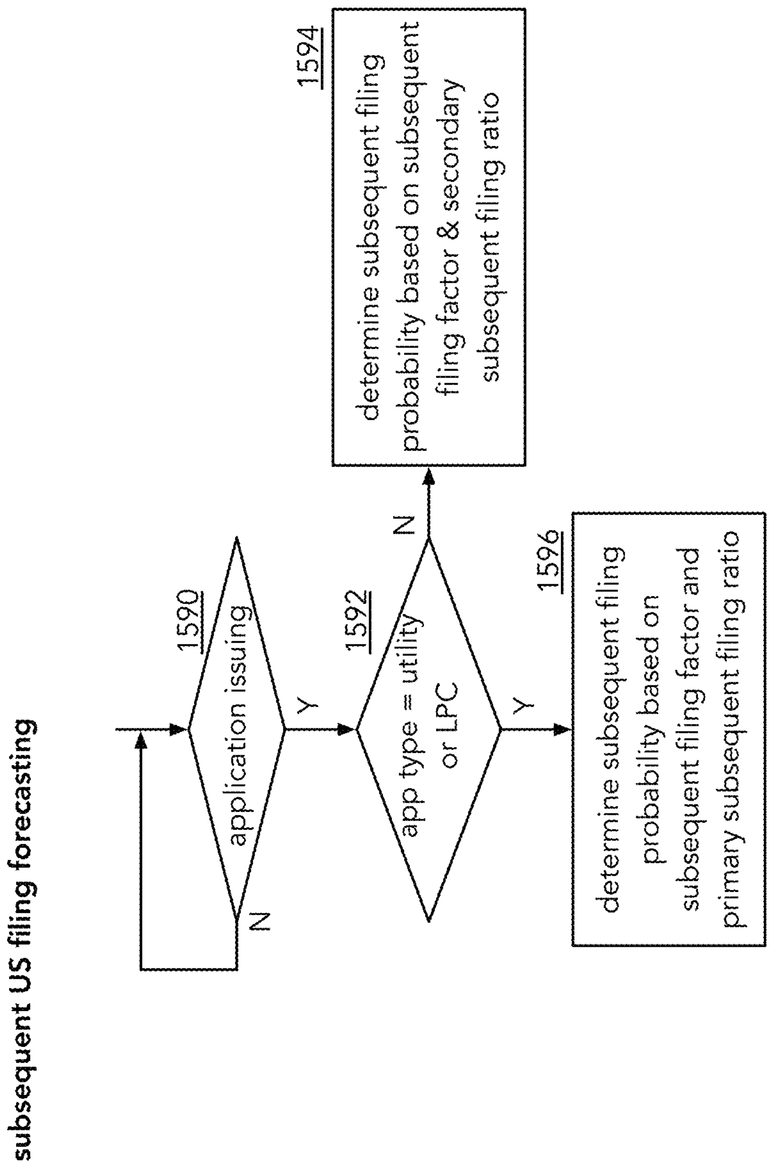
FIG. 246 is a logic diagram of another example of method for forecasting subsequent filing probabilities and timing as executed by a growth and expense co-processor of an improved computer for technology.

FIG. 246 is a logic diagram of another example of method for forecasting subsequent filing probabilities and timing as executed by a growth and expense co-processor of an improved computer for technology. The method begins with step 1590 where whether an application is issuing is determined. If the application is not issuing, the method branches back to step 1590 until an application issues.

If the application is issuing, the method continues with step 1592 where whether the application is a utility or a legal placeholder conversion (LPC) is determined. When the application is a utility or an LPC application, the method continues with step 1596 where a subsequent filing probability based on the subsequent filing factor and primary subsequent filing ratio (e.g., as discussed with reference to FIG. 245) is determined.

When the application is not a utility or an LPC application (e.g., the application is a subsequent filing), the method continues with step 1598 where a subsequent filing probability based on the subsequent filing factor and a secondary subsequent filing ratio (e.g., as discussed with reference to FIG. 245) is determined.

FIG. 247 is a diagram of an example of primary and secondary subsequent filing forecasting parameters for a first patent application as determined by a growth and expense co-processor of an improved computer for technology. The primary and secondary subsequent filing forecasting parameters may be set for all patents per period or set for all periods.

In this example, the first patent application is a utility application. The primary filing forecasting parameters include a subsequent filing factor, a continuation factor, a divisional factor, a continuation-in-part (CIP) factor, and a legal placeholder conversion (LPC) factor. The continuation, divisional, CIP, and LPC factors represent the primary subsequent filing ratio as discussed with reference to FIG. 245.

For primary filing forecasting, the subsequent filing factor is set at 1.25. The continuation factor is set at 15%, the divisional factor is set at 2.5%, the CIP factor is set at 7.5%, and the LPC factor is set at 75%. The primary subsequent filing ratio may be based on the type of application (e.g., if it is a bundle application, there will be an LPC factor), likelihood of a restriction requirement (e.g., based on past performance and/or industry average), desired patent position, budget, etc.

The secondary filing forecasting parameters include a subsequent filing factor, a continuation factor, a divisional factor, a continuation-in-part (CIP) factor, and a legal placeholder conversion (LPC) factor. The continuation, divisional, CIP, and LPC factors represent the secondary subsequent filing ratio as discussed with reference to FIG. 245.

For secondary filing forecasting, the subsequent filing factor is set at 0.5. The continuation factor is set at 50%, the divisional factor is set at 5%, the CIP factor is set at 20%, and the LPC factor is set at 25%. The secondary subsequent filing ratio may be based on the type of application, likelihood of a restriction requirement (e.g., based on past performance and/or industry average), desired patent position, budget, etc.

FIG. 248 is a diagram of an example of forecasted probabilities and timing of a subsequent filing for a first patent application as determined by a growth and expense co-processor of an improved computer for technology. The sum of allowance probabilities of the first patent application over the current-sixth next periods was discussed with reference to FIG. 227.

With the first patent application filed in a current period (CP), there is zero percent probability of issuance in the current period or the first next period (1NP), a 68.4% probability of issuance in the second next period (2NP), a zero percent probability of issuance in the third next period (3NP), a 21.1% probability of issuance during a fourth next period (4NP), a 7.0% probability of issuance during a fifth next period (5NP), and a 2.3% probability of issuance during a sixth next period (6NP).

The probability of filing a subsequent filing per period is determined by multiplying the issuance probability by the probability of a type of subsequent filing. The probability of the type of subsequent filing is determined by multiplying the subsequent filing factor by the filing type factor. For example, the probability of a continuation is 18.8% (e.g., 1.25×15%=18.8%), the probability of a divisional is 3.1% (e.g., 1.25×2.5%=3.1%), the probability of a CIP is 9.4% (e.g., 1.25×7.5%=9.4%), and the probability of an LPC is 93.8% (e.g., 1.25×75%=93.8%)

For the current period (CP) and the first next period (1NP), there is no probability of a subsequent filing. For a second next period (2NP), there is a 12.9% probability of filing a continuation (e.g., 18.8%×68.4%), a 2.1% probability of filing a divisional (e.g., 3.1%×68.4%), a 6.4% probability of filing a CIP (e.g., 9.4%×68.4%), and a 64.2% probability of filing an LPC (e.g., 93.8%×68.4%).

For a third next period (3NP), there is a 0% probability of a subsequent filing. For a fourth next period (4NP), there is a 4.0% probability of filing a continuation (e.g., 18.8%×21.1%), a 0.7% probability of filing a divisional (e.g., 3.1%×21.1%), a 2.0% probability of filing a CIP (e.g., 9.4%×21.1%), and a 19.8% probability of filing an LPC (e.g., 93.8%×21.1%). For a fifth next period (5NP), there is a 1.3% probability of filing a continuation (e.g., 18.8%×7.0%), a 0.2% probability of filing a divisional (e.g., 3.1%×7.0%), a 0.7% probability of filing a CIP (e.g., 9.4%×7.0%), and a 6.6% probability of filing an LPC (e.g., 93.8%×7.0%). For a sixth next period (6NP), there is a 0.4% probability of filing a continuation (e.g., 18.8%×2.3%), a 0.0% probability of filing a divisional (e.g., 3.1%×2.3%), a 0.2% probability of filing a CIP (e.g., 9.4%×2.3%), and a 2.2% probability of filing an LPC (e.g., 93.8%×2.3%).

FIG. 249 is a diagram of an example of primary and secondary subsequent filing forecasting parameters for a second patent application as determined by a growth and expense co-processor of an improved computer for technology. The primary and secondary subsequent filing forecasting parameters may be set for all patents per period or set for all periods.

In this example, the second patent application is a utility application. The primary filing forecasting parameters include a subsequent filing factor, a continuation factor, a divisional factor, a continuation-in-part (CIP) factor, and a legal placeholder conversion (LPC) factor. The continuation, divisional, CIP, and LPC factors represent the primary subsequent filing ratio as discussed with reference to FIG. 245.

For primary filing forecasting, the subsequent filing factor is set at 1.25. The continuation factor is set at 15%, the divisional factor is set at 2.5%, the CIP factor is set at 7.5%, and the LPC factor is set at 75%. The primary subsequent filing ratio may be based on the type of application (e.g., if it is a bundle application, there will be an LPC factor), likelihood of a restriction requirement (e.g., based on past performance and/or industry average), desired patent position, budget, etc.

The secondary filing forecasting parameters include a subsequent filing factor, a continuation factor, a divisional factor, a continuation-in-part (Cl P) factor, and a legal placeholder conversion (LPC) factor. The continuation, divisional, CIP, and LPC factors represent the secondary subsequent filing ratio as discussed with reference to FIG. 245.

For secondary filing forecasting, the subsequent filing factor is set at 0.5. The continuation factor is set at 50%, the divisional factor is set at 5%, the CIP factor is set at 20%, and the LPC factor is set at 25%. The secondary subsequent filing ratio may be based on the type of application, likelihood of a restriction requirement (e.g., based on past performance and/or industry average), desired patent position, budget, etc.

FIG. 250 is a diagram of an example of forecasted probabilities and timing of a subsequent filing for a second patent application as determined by a growth and expense co-processor of an improved computer for technology. The sum of allowance probabilities of the second patent application over the current-sixth next periods was discussed with reference to FIG. 232.

With a second patent application expecting a first office action in a current period (CP), there is a 5% probability of issuance during a current period (CP), a 63.4% probability of issuance during a first next period (1NP), a 21.1% probability of issuance during a second next period (2NP), a 7.0% probability of issuance during a third next period (3NP), a zero percent probability of issuance in a fourth next period (4NP), a 2.3% probability of issuance during a fifth next period (5NP), and a 0.8% probability of issuance during a sixth next period (6NP).

The probability of filing a subsequent filing per period is determined by multiplying the issuance probability by the probability of a type of subsequent filing. The probability of the type of subsequent filing is determined by multiplying the subsequent filing factor by the filing type factor. For example, the probability of a continuation is 18.8% (e.g., 1.25×15%=18.8%), the probability of a divisional is 3.1% (e.g., 1.25×2.5%=3.1%), the probability of a CIP is 9.4% (e.g., 1.25×7.5%=9.4%), and the probability of an LPC is 93.8% (e.g., 1.25×75%=93.8%)

For the current period (CP) there is a 0.9% probability of filing a continuation (e.g., 18.8%×5%), a 0.1% probability of filing a divisional (e.g., 3.1%×5%), a 0.5% probability of filing a CIP (e.g., 9.4%×5%), and a 4.7% probability of filing an LPC (e.g., 93.8%×5%). For the first next period (1NP), there is a 11.9% probability of filing a continuation (e.g., 18.8% x 63.4%), a 2.0% probability of filing a divisional (e.g., 3.1%×63.4%), a 5.9% probability of filing a CIP (e.g., 9.4%×63.4%), and a 59.5% probability of filing an LPC (e.g., 93.8%×63.4%).

For a second next period (2NP), there is a 4.0% probability of filing a continuation (e.g., 18.8%×21.1%), a 0.7% probability of filing a divisional (e.g., 3.1%×21.1%), a 2.0% probability of filing a CIP (e.g., 9.4%×21.1%), and a 19.8% probability of filing an LPC (e.g., 93.8%×21.1%).

For a third next period (3NP), there is a 1.3% probability of filing a continuation (e.g., 18.8%×7.0%), a 0.2% probability of filing a divisional (e.g., 3.1%×7.0%), a 0.7% probability of filing a CIP (e.g., 9.4%×7.0%), and a 6.6% probability of filing an LPC (e.g., 93.8%×7.0%). For a fourth next period (4NP), there is no probability of a subsequent filing.

For a fifth next period (5NP), there is a 0.4% probability of filing a continuation (e.g., 18.8%×2.3%), a 0.0% probability of filing a divisional (e.g., 3.1%×2.3%), a 0.2% probability of filing a CIP (e.g., 9.4%×2.3%), and a 2.2% probability of filing an LPC (e.g., 93.8%×2.3%).

For a sixth next period (6NP), there is a 0.0% probability of filing a continuation (e.g., 18.8%×0.8%), a 0.0% probability of filing a divisional (e.g., 3.1%×0.8%), a 0.0% probability of filing a CIP (e.g., 9.4%×0.8%), and a 0.75% probability of filing an LPC (e.g., 93.8%×0.8%).

FIG. 251 is a diagram of an example of primary and secondary subsequent filing forecasting parameters for a third patent application as determined by a growth and expense co-processor of an improved computer for technology. The primary and secondary subsequent filing forecasting parameters may be set for all patents per period or set for all periods.

In this example, the third patent application is a utility application. The primary filing forecasting parameters include a subsequent filing factor, a continuation factor, a divisional factor, a continuation-in-part (CIP) factor, and a legal placeholder conversion (LPC) factor. The continuation, divisional, CIP, and LPC factors represent the primary subsequent filing ratio as discussed with reference to FIG. 245.

For primary filing forecasting, the subsequent filing factor is set at 1.25. The continuation factor is set at 15%, the divisional factor is set at 2.5%, the CIP factor is set at 7.5%, and the LPC factor is set at 75%. The primary subsequent filing ratio may be based on the type of application (e.g., if it is a bundle application, there will be an LPC factor), likelihood of a restriction requirement (e.g., based on past performance and/or industry average), desired patent position, budget, etc.

The secondary filing forecasting parameters include a subsequent filing factor, a continuation factor, a divisional factor, a continuation-in-part (CIP) factor, and a legal placeholder conversion (LPC) factor. The continuation, divisional, CIP, and LPC factors represent the secondary subsequent filing ratio as discussed with reference to FIG. 245.

For secondary filing forecasting, the subsequent filing factor is set at 0.5. The continuation factor is set at 50%, the divisional factor is set at 5%, the CIP factor is set at 20%, and the LPC factor is set at 25%. The secondary subsequent filing ratio may be based on the type of application, likelihood of a restriction requirement (e.g., based on past performance and/or industry average), desired patent position, budget, etc.

FIG. 252 is a diagram of an example of forecasted probabilities and timing of a subsequent filing for a third patent application as determined by a growth and expense co-processor of an improved computer for technology. The sum of allowance probabilities of the third patent application over the current-sixth next periods was discussed with reference to FIG. 237.

With the third patent application filed prior to a current period (CP) and a first office action response filed in a current period, there is a 66.7% probability of issuance during a current period (CP), a 22.2% probability of issuance during a first next period (1NP), a 7.4% probability of issuance during a third next period (3NP), a 2.5% probability of issuance during a fourth next period (4NP), a 0.8% probability of issuance during a fifth next period (5NP), and there is a 0% probability of issuance during a sixth next period (6NP).

The probability of filing a subsequent filing per period is determined by multiplying the issuance probability by the probability of a type of subsequent filing. The probability of the type of subsequent filing is determined by multiplying the subsequent filing factor by the filing type factor. For example, the probability of a continuation is 18.8% (e.g., 1.25×15%=18.8%), the probability of a divisional is 3.1% (e.g., 1.25×2.5%=3.1%), the probability of a CIP is 9.4% (e.g., 1.25×7.5%=9.4%), and the probability of an LPC is 93.8% (e.g., 1.25×75%=93.8%)

For the current period (CP) there is a 12.5% probability of filing a continuation (e.g., 18.8%×66.7%), a 2.1% probability of filing a divisional (e.g., 3.1%×66.7%), a 6.3% probability of filing a CIP (e.g., 9.4%×66.7%), and a 62.6% probability of filing an LPC (e.g., 93.8%×66.7%).

For the first next period (1NP), there is a 4.2% probability of filing a continuation (e.g., 18.8%×22.2%), a 0.7% probability of filing a divisional (e.g., 3.1%×22.2%), a 2.1% probability of filing a CIP (e.g., 9.4%×22.2%), and a 20.8% probability of filing an LPC (e.g., 93.8%×22.2%). For the second next period (2NP) there is a 0% probability of subsequent filings.

For a third next period (3NP), there is a 1.4% probability of filing a continuation (e.g., 18.8%×7.4%), a 0.2% probability of filing a divisional (e.g., 3.1%×7.4%), a 0.7% probability of filing a CIP (e.g., 9.4%×7.4%), and a 6.9% probability of filing an LPC (e.g., 93.8%×7.4%).

For a fourth next period (4NP), there is a 0.5% probability of filing a continuation (e.g., 18.8%×2.5%), a 0% probability of filing a divisional (e.g., 3.1%×2.5%), a 0.2% probability of filing a CIP (e.g., 9.4%×2.5%), and a 2.3% probability of filing an LPC (e.g., 93.8%×2.5%).

For a fifth next period (5NP), there is a 0.2% probability of filing a continuation (e.g., 18.8%×0.8%), a 0% probability of filing a divisional (e.g., 3.1%×0.8%), a 0% probability of filing a CIP (e.g., 9.4%×0.8%), and a 0.75% probability of filing an LPC (e.g., 93.8%×0.8%). For a sixth next period (6NP), there is a 0% probability of subsequent filings.

FIG. 253 is a diagram of an example of primary and secondary subsequent filing forecasting parameters for a fourth patent application as determined by a growth and expense co-processor of an improved computer for technology. The primary and secondary subsequent filing forecasting parameters may be set for all patents per period or set for all periods.

In this example, the third patent application is a utility application. The primary filing forecasting parameters include a subsequent filing factor, a continuation factor, a divisional factor, a continuation-in-part (CIP) factor, and a legal placeholder conversion (LPC) factor. The continuation, divisional, CIP, and LPC factors represent the primary subsequent filing ratio as discussed with reference to FIG. 245.

For primary filing forecasting, the subsequent filing factor is set at 1.25. The continuation factor is set at 15%, the divisional factor is set at 2.5%, the CIP factor is set at 7.5%, and the LPC factor is set at 75%. The primary subsequent filing ratio may be based on the type of application (e.g., if it is a bundle application, there will be an LPC factor), likelihood of a restriction requirement (e.g., based on past performance and/or industry average), desired patent position, budget, etc.

The secondary filing forecasting parameters include a subsequent filing factor, a continuation factor, a divisional factor, a continuation-in-part (Cl P) factor, and a legal placeholder conversion (LPC) factor. The continuation, divisional, CIP, and LPC factors represent the secondary subsequent filing ratio as discussed with reference to FIG. 245.

For secondary filing forecasting, the subsequent filing factor is set at 0.5. The continuation factor is set at 50%, the divisional factor is set at 5%, the CIP factor is set at 20%, and the LPC factor is set at 25%. The secondary subsequent filing ratio may be based on the type of application, likelihood of a restriction requirement (e.g., based on past performance and/or industry average), desired patent position, budget, etc.

FIG. 254 is a diagram of an example of forecasted probabilities and timing of a subsequent filing for a fourth patent application as determined by a growth and expense co-processor of an improved computer for technology. The sum of allowance probabilities of the fourth patent application over the current-sixth next periods was discussed with reference to FIG. 242.

With the fourth patent application filed during the middle of a first next period, there is a 0% probability of issuance during a current period (CP), a first next period (1NP), or a second next period (2NP). There is a 68.4% probability of issuance during a third next period (3NP), a 0% probability of issuance during a fourth next period (4NP), a 21.1% probability of issuance during a fifth next period (5NP), and a 7.0% probability of issuance during a sixth next period (6NP).

The probability of filing a subsequent filing per period is determined by multiplying the issuance probability by the probability of a type of subsequent filing. The probability of the type of subsequent filing is determined by multiplying the subsequent filing factor by the filing type factor. Here, the secondary subsequent filing factors are used. For example, the probability of a continuation is 25% (e.g., 0.5×50%=25%), the probability of a divisional is 2.5% (e.g., 0.5×5%=2.5%), the probability of a CIP is 10.0% (e.g., 0.5×20%=10%), and the probability of an LPC is 12.5% (e.g., 0.5×25%=12.5%)

For the current period (CP), the first next period (1NP), and the second next period (2NP) there is a 0% probability of subsequent filings. For the third next period (1NP), there is a 17.1% probability of filing a continuation (e.g., 25%×68.4%), a 1.7% probability of filing a divisional (e.g., 2.5%×68.4%), a 6.8% probability of filing a CIP (e.g., 10.0%×68.4%), and a 8.6% probability of filing an LPC (e.g., 12.5%×68.4%). For the fourth next period (4NP) there is a 0% probability of subsequent filings.

For the fifth next period (5NP), there is a 5.3% probability of filing a continuation (e.g., 25%×21.1%), a 0.5% probability of filing a divisional (e.g., 2.5%×21.1%), a 2.1% probability of filing a CIP (e.g., 10.0%×21.1%), and a 2.6% probability of filing an LPC (e.g., 12.5%×21.1%). For a sixth next period (6NP), there is a 1.75% probability of filing a continuation (e.g., 25%×7.0%), a 0.2% probability of filing a divisional (e.g., 2.5%×7.0%), a 0.7% probability of filing a CIP (e.g., 10.0%×7.0%), and a 0.9% probability of filing an LPC (e.g., 12.5%×7.0%).

FIG. 255 is a diagram of an example of forecasted probabilities and timing of a filing continuation (CON) patent application for each of the four patent applications as determined by a growth and expense co-processor of an improved computer for technology.

For a first patent application (as discussed with reference to FIG. 248), there is a 12.9% probability of filing a continuation in the second next period (2NP), a 4.0% probability of filing a continuation in fourth next period (4NP), a 1.3% probability of filing a continuation in fifth next period (5NP), and a 0.4% probability of filing a continuation in sixth next period (6 NP).

For a second patent application (as discussed with reference to FIG. 250), there is a 0.9% probability of filing a continuation in the current period (CP), there is a 11.9% probability of filing a continuation in the first next period (1NP), there is a 4.0% probability of filing a continuation in the second next period (2NP), there is a 1.3% probability of filing a continuation in the third next period (3NP), there is a 0.4% probability of filing a continuation in the fifth next period (5NP), and there is a 0.0% probability of filing a continuation in the sixth next period (6NP).

For a third patent application (as discussed with reference to FIG. 252), there is a 12.5% probability of filing a continuation in the current period (CP), there is a 4.2% probability of filing a continuation in the first next period (1NP), there is a 1.4% probability of filing a continuation in the third next period (3NP), there is a 0.5% probability of filing a continuation in the fourth next period (4NP), and there is a 0.2% probability of filing a continuation in the fifth next period (5NP).

For a fourth patent application (as discussed with reference to FIG. 254), there is a 17.1% probability of filing a continuation in the third next period (3NP), there is a 5.3% probability of filing a continuation in the fifth next period (5NP), and there is a 1.75% probability of filing a continuation in the sixth next period (6NP).

The sum of the continuation filing probabilities for the current period is 13.4% (e.g., 12.5%+0.9%+0%+0%). The sum of the continuation filing probabilities for the first next period (1NP) is 16.1% (e.g., 0%+11.9%+4.2%+0%). The sum of the continuation filing probabilities for the second next period (2NP) is 16.9% (e.g., 12.0%+4.0%+0%+0%). The sum of the continuation filing probabilities for the third next period (3NP) is 19.8% (e.g., 0%+1.3%+1.4%+17.1%). The sum of the continuation filing probabilities for the fourth next period (4NP) is 4.5% (e.g., 4.0%+0%+0.5%+0%). The sum of the continuation filing probabilities for the fifth next period (5NP) is 7.2% (e.g., 1.3%+0.4%+0.2%+5.3%). The sum of the continuation filing probabilities for the sixth next period (6NP) is 2.15% (e.g., 0.4%+0%+0%+1.75%).

From the sums of continuation filing probabilities, the growth and expense co-processor is operable to estimate the number of continuation filings per period. In the current period (CP) there will be 0.13 continuations filed based on the 13.4% filing probability. In the first next period (1NP) there will be 0.16 continuations filed based on the 16.1% filing probability. In the second next period (2NP) there will be 0.17 continuations filed based on the 16.9% filing probability. In the third next period (3NP) there will be 0.20 continuations filed based on the 19.8% filing probability. In the fourth next period (4NP) there will be 0.05 continuations filed based on the 4.5% filing probability. In the fifth next period (5NP) there will be 0.07 continuations filed based on the 7.2% filing probability. In the sixth next period (6NP) there will be 0.02 continuations filed based on the 2.15% filing probability.

FIG. 256 is a diagram of an example of forecasted probabilities and timing of a filing divisional (DIV) patent application for each of the four patent applications as determined by a growth and expense co-processor of an improved computer for technology.

For a first patent application (as discussed with reference to FIG. 248), there is a 2.1% probability of filing a divisional in the second next period (2NP), a 0.7% probability of filing a divisional in fourth next period (4NP), a 0.2% probability of filing a divisional in fifth next period (5NP), and a 0.0% probability of filing a divisional in sixth next period (6NP).

For a second patent application (as discussed with reference to FIG. 250), there is a 0.1% probability of filing a divisional in the current period (CP), there is a 2.0% probability of filing a divisional in the first next period (1NP), there is a 0.7% probability of filing a divisional in the second next period (2NP), there is a 0.2% probability of filing a divisional in the third next period (3NP), there is a 0.0% probability of filing a divisional in the fifth next period (5NP), and there is a 0.0% probability of filing a divisional in the sixth next period (6NP).

For a third patent application (as discussed with reference to FIG. 252), there is a 2.1% probability of filing a divisional in the current period, there is a 0.7% probability of filing a divisional in the first next period (1NP), there is a 0.2% probability of filing a divisional in the third next period (3NP), there is a 0% probability of filing a divisional in the fifth next period (5NP), and there is a 0% probability of filing a divisional in the sixth next period (6NP).

For a fourth patent application (as discussed with reference to FIG. 254), there is a 1.7% probability of filing a divisional in the third next period (3NP), there is a 0.5% probability of filing a divisional in the fifth next period (5NP), and there is a 0.2% probability of filing a divisional in the sixth next period (6NP).

The sum of the divisional filing probabilities for the current period is 2.2% (e.g., 0%+0.1%+2.1%+0%). The sum of the divisional filing probabilities for the first next period (1NP) is 2.7% (e.g., 0%+2.0%+0.7%+0%). The sum of the divisional filing probabilities for the second next period (2NP) is 2.8% (e.g., 2.1%+0.7%+0%+0%). The sum of the divisional filing probabilities for the third next period (3NP) is 2.1% (e.g., 0%+0.2%+0.2%+1.7%). The sum of the divisional filing probabilities for the fourth next period (4NP) is 0.7% (e.g., 0.7%+0%+0%+0%). The sum of the divisional filing probabilities for the fifth next period (5NP) is 0.7% (e.g., 0.2%+0%+0%+0.5%). The sum of the divisional filing probabilities for the sixth next period (6NP) is 0.2% (e.g., 0%+0%+0%+0.2%).

From the sums of divisional filing probabilities, the growth and expense co-processor is operable to estimate the number of divisional filings per period. In the current period (CP) there will be 0.02 divisional applications filed based on the 2.2% filing probability. In the first next period (1NP) there will be 0.03 divisional applications filed based on the 2.7% filing probability. In the second next period (2NP) there will be 0.03 divisional applications filed based on the 2.8% filing probability. In the third next period (3NP) there will be 0.02 divisional applications filed based on the 2.1% filing probability. In the fourth next period (4NP) there will be 0 divisional applications filed based on the 0.7% filing probability. In the fifth next period (5NP) there will be 0 divisional applications filed based on the 0.7% filing probability. In the sixth next period (6NP) there will be 0 divisional applications filed based on the 0.2% filing probability.

FIG. 257 is a diagram of an example of forecasted probabilities and timing of a filing continuation-in-part (CIP) patent application for each of the four patent applications as determined by a growth and expense co-processor of an improved computer for technology.

For a first patent application (as discussed with reference to FIG. 248), there is a 6.4% probability of filing a CIP in the second next period (2NP), a 2.0% probability of filing a CIP in fourth next period (4NP), a 0.7% probability of filing a CIP in fifth next period (5NP), and a 0.2% probability of filing a CIP in sixth next period (6NP).

For a second patent application (as discussed with reference to FIG. 250), there is a 0.5% probability of filing a CIP in the current period (CP), there is a 5.9% probability of filing a CIP in the first next period (1NP), there is a 2.0% probability of filing a CIP in the second next period (2NP), there is a 0.7% probability of filing a CIP in the third next period (3NP), there is a 0.2% probability of filing a CIP in the fifth next period (5NP), and there is a 0% probability of filing a CIP in the sixth next period (6NP).

For a third patent application (as discussed with reference to FIG. 252), there is a 6.3% probability of filing a CIP in the current period (CP), there is a 2.1% probability of filing a Cl P in the first next period (1NP), there is a 0.7% probability of filing a Cl P in the third next period (3NP), there is a 0.2% probability of filing a Cl P in the fifth next period (5NP), and a 0% probability of filing a CIP in the sixth next period (6NP).

For a fourth patent application (as discussed with reference to FIG. 254), there is a 6.8% probability of filing a CIP in the third next period (3NP), there is a 2.1% probability of filing a CIP in the fifth next period (5NP), and there is a 0.7% probability of filing a CIP in the sixth next period (6NP).

The sum of the CIP filing probabilities for the current period is 6.8% (e.g., 0%+0.5%+6.3%+0%). The sum of the CIP filing probabilities for the first next period (1NP) is 8.0% (e.g., 0%+5.9%+2.1%+0%). The sum of the CIP filing probabilities for the second next period (2NP) is 8.4% (e.g., 6.4%+2.0%+0%+0%). The sum of the CIP filing probabilities for the third next period (3NP) is 8.2% (e.g., 0%+0.7%+0.7%+6.8%). The sum of the CIP filing probabilities for the fourth next period (4NP) is 2.2% (e.g., 2.0%+0%+0.2%+0%). The sum of the CIP filing probabilities for the fifth next period (5NP) is 3.0% (e.g., 0.7%+0.2%+0%+2.1%). The sum of the CIP filing probabilities for the sixth next period (6NP) is 0.9% (e.g., 0.2%+0%+0%+0.7%).

From the sums of CIP filing probabilities, the growth and expense co-processor is operable to estimate the number of CIP filings per period. In the current period (CP) there will be 0.07 CIP applications filed based on the 6.8% filing probability. In the first next period (1NP) there will be 0.08 CIP applications filed based on the 8.0% filing probability.

In the second next period (2NP) there will be 0.08 CIP applications filed based on the 8.4% filing probability. In the third next period (3NP) there will be 0.08 CIP applications filed based on the 8.2% filing probability. In the fourth next period (4NP) there will be 0.02 CIP applications filed based on the 2.2% filing probability. In the fifth next period (5NP) there will be 0.03 CIP applications filed based on the 3.0% filing probability. In the sixth next period (6NP) there will be 0 CIP applications filed based on the 0.9% filing probability.

FIG. 258 is a diagram of an example of forecasted probabilities and timing of a filing legal placeholder conversion (LPC) patent application for each of the four patent applications as determined by a growth and expense co-processor of an improved computer for technology. For a first patent application (as discussed with reference to FIG. 248), there is a 64.2% probability of filing a LPC in the second next period (2NP), a 19.8% probability of filing a LPC in fourth next period (4NP), a 6.6% probability of filing a LPC in fifth next period (5NP), and a 2.2% probability of filing a LPC in sixth next period (6NP).

For a second patent application (as discussed with reference to FIG. 250), there is a 4.7% probability of filing a LPC in the current period (CP), there is a 59.5% probability of filing a LPC in the first next period (1NP), there is a 19.8% probability of filing a LPC in the second next period (2NP), there is a 6.6% probability of filing a LPC in the third next period (3NP), there is a 2.2% probability of filing a LPC in the fifth next period (5NP), and there is a 0.75% probability of filing a LPC in the sixth next period (6NP).

For a third patent application (as discussed with reference to FIG. 252), there is a 62.6% probability of filing a LPC in the current period (CP), there is a 20.8% probability of filing a LPC in the first next period (1NP), there is a 6.9% probability of filing a LPC in the third next period (3NP), there is a 2.3% probability of filing a LPC in the fourth next period (4NP), and there is a 0.75% probability of filing a LPC in the fifth next period (5NP).

For a fourth patent application (as discussed with reference to FIG. 254), there is a 8.6% probability of filing a LPC in the third next period (3NP), there is a 2.6% probability of filing a LPC in the fifth next period (5NP), and there is a 0.9% probability of filing a LPC in the sixth next period (6NP).

The sum of the LPC filing probabilities for the current period is 67.3% (e.g., 0%+4.7%+62.6%+0%). The sum of the LPC filing probabilities for the first next period (1NP) is 80.3% (e.g., 0%+59.5%+20.8%+0%). The sum of the LPC filing probabilities for the second next period (2NP) is 84% (e.g., 64.2%+19.8%+0%+0%). The sum of the LPC filing probabilities for the third next period (3NP) is 22.1% (e.g., 0%+6.6%+6.9%+8.6%). The sum of the LPC filing probabilities for the fourth next period (4NP) is 22.1% (e.g., 19.8%+0%+2.3%+0%). The sum of the LPC filing probabilities for the fifth next period (5NP) is 12.2% (e.g., 6.6%+2.2%+0.75%+2.6%). The sum of the LPC filing probabilities for the sixth next period (6NP) is 3.9% (e.g., 2.2%+0.75%+0%+0.9%).

From the sums of LPC filing probabilities, the growth and expense co-processor is operable to estimate the number of LPC filings per period. In the current period (CP) there will be 0.67 LPC applications filed based on the 67.3% filing probability. In the first next period (1NP) there will be 0.8 LPC applications filed based on the 80.3% filing probability. In the second next period (2NP) there will be 0.84 LPC applications filed based on the 84% filing probability. In the third next period (3NP) there will be 0.22 LPC applications filed based on the 22.1% filing probability. In the fourth next period (4NP) there will be 0.22 LPC applications filed based on the 22.1% filing probability. In the fifth next period (5NP) there will be 0.12 LPC applications filed based on the 12.2% filing probability. In the sixth next period (6NP) there will be 0.04 LPC applications filed based on the 3.9% filing probability.

FIG. 259 is a diagram of an example of forecasted probabilities and timing of receiving office actions, receiving notices of allowance, and of filing subsequent patent applications relating to an MTU as determined by a growth and expense co-processor of an improved computer for technology.

Based on the prosecution forecasting discussed for the four patent applications with reference to at least FIG. 221, there are 0.05 first office action (OA) allowance responses expected during a current period (CP), zero first office action allowance responses expected during a first next period (1NP), 0.05 first office action allowance responses expected during a second next period (2NP), 0.045 first office action allowance responses expected during a third next period (3NP), 0.005 first office action allowance responses expected during a fourth next period (4NP), zero first office action allowance responses expected during a fifth next period (5NP), and zero first office action allowance responses expected during a sixth next period (6NP).

Further, there are 0.95 full office action (OA) responses expected during a current period (CP), 0.52 full office action responses expected during a first next period (1NP), 1.19 full office action responses expected during a second next period (2NP), 1.23 full office action responses expected during a third next period (3NP), 0.44 full office action responses expected during a fourth next period (4NP), 0.25 full office action responses expected during a fifth next period (5NP), and 0.13 full office action responses expected during a sixth next period (6NP).

Therefore, there is one total office action response expected during a current period (CP), 0.52 total office action responses expected during a first next period (1NP), 1.24 total office action responses expected during a second next period (2NP), 1.27 total office action responses expected during a third next period (3NP), 0.45 total office action responses expected during a fourth next period (4NP), 0.25 total office action responses expected during a fifth next period (5NP), and 0.13 total office action responses expected during a sixth next period (6NP).

Based on the issuance forecasting discussed for the four patent applications with reference to at least FIG. 242, there are 0.72 issuances expected during a current period (CP), 1.54 issuances expected during a first next period (1NP), 0.21 issuances expected during a second next period (2NP), 0.83 issuances expected during a third next period (3NP), 0.24 issuances expected during a fourth next period (4NP), 0.31 issuances expected during a fifth next period (5NP), and 0.10 issuances expected during a sixth next period (6NP).

Based on the subsequent filing forecasting discussed for the four patent applications with reference to at least FIGS. 255-258, there are 0.13 continuation filings expected during a current period (CP), 0.16 continuation filings expected during a first next period (1NP), 0.17 continuation filings expected during a second next period (2NP), 0.20 continuation filings expected during a third next period (3NP), 0.05 continuation filings expected during a fourth next period (4NP), 0.07 continuation filings expected during a fifth next period (5NP), and 0.02 continuation filings expected during a sixth next period (6NP).

There are 0.02 divisional filings expected during a current period (CP), 0.03 divisional filings expected during a first next period (1NP), 0.03 divisional filings expected during a second next period (2NP), 0.03 divisional filings expected during a third next period (3NP), zero divisional filings expected during a fourth next period (4NP), zero divisional filings expected during a fifth next period (5NP), and zero divisional filings expected during a sixth next period (6NP).

There are 0.07 continuation-in-part (CIP) filings expected during a current period (CP), 0.08 CIP filings expected during a first next period (1NP), 0.08 CIP filings expected during a second next period (2NP), 0.08 CIP filings expected during a third next period (3NP), 0.02 CIP filings expected during a fourth next period (4NP), 0.03 CIP filings expected during a fifth next period (5NP), and zero divisional filings expected during a sixth next period (6NP).

There are 0.67 legal placeholder conversion (LPC) filings expected during a current period (CP), 0.80 LPC filings expected during a first next period (1NP), 0.84 LPC filings expected during a second next period (2NP), 0.22 LPC filings expected during a third next period (3NP), 0.22 LPC filings expected during a fourth next period (4NP), 0.12 LPC filings expected during a fifth next period (5NP), and 0.04 LPC filings expected during a sixth next period (6NP).

The growth and expense co-processor is operable to multiply the forecasted amounts shown by a fee table to determine forecasted expenses for prosecution, issuances, and subsequent filings (e.g., with separate accounting for attorney fees and government fees). The forecasted amounts of new provisional applications, utility applications, legal placeholder inventions, and PCT applications can also be included in the forecast summary.

Figure 260:
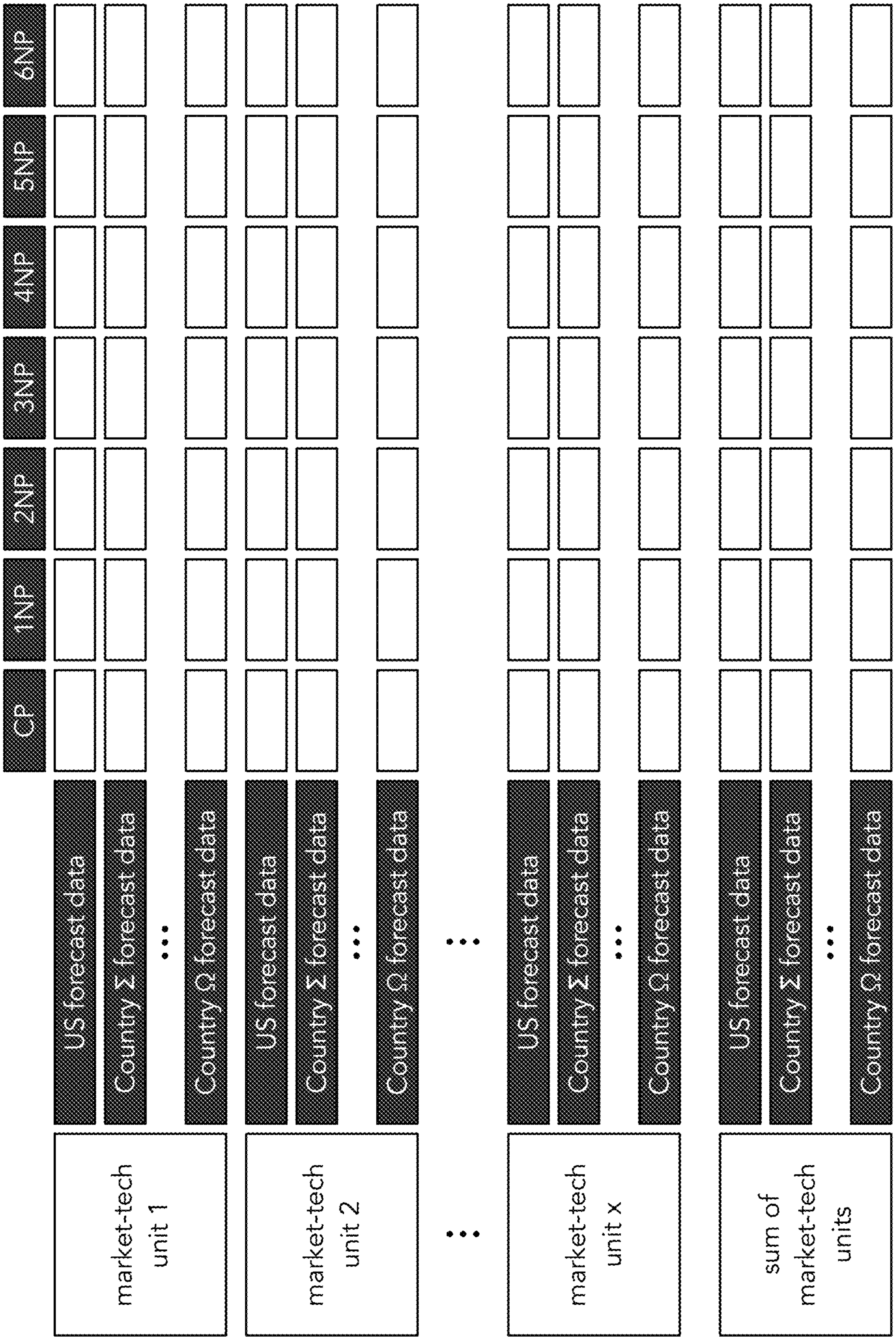
FIG. 260 is a diagram of an example of forecasted probabilities and timing of receiving office actions, receiving notices of allowance, and of filing subsequent patent applications for a plurality of MTUs in the U.S. and in other countries of interest as determined by a growth and expense co-processor of an improved computer for technology.

FIG. 260 is a diagram of an example of forecasted probabilities and timing of receiving office actions, receiving notices of allowance, and of filing subsequent patent applications for a plurality of MTUs in the U.S. and in other countries of interest as determined by a growth and expense co-processor of an improved computer for technology.

For example, for each market-tech unit (MTU) of market-tech units 1–x, domestic (e.g., U.S.) forecasting data (e.g., as discussed with reference to one or more of the previous Figures) and Country Σ through Country Ω forecasting data is determined for a current through sixth next period. Countries Σ-Ω are countries of interest for each MTU and may vary per MTU.

Figure 261:
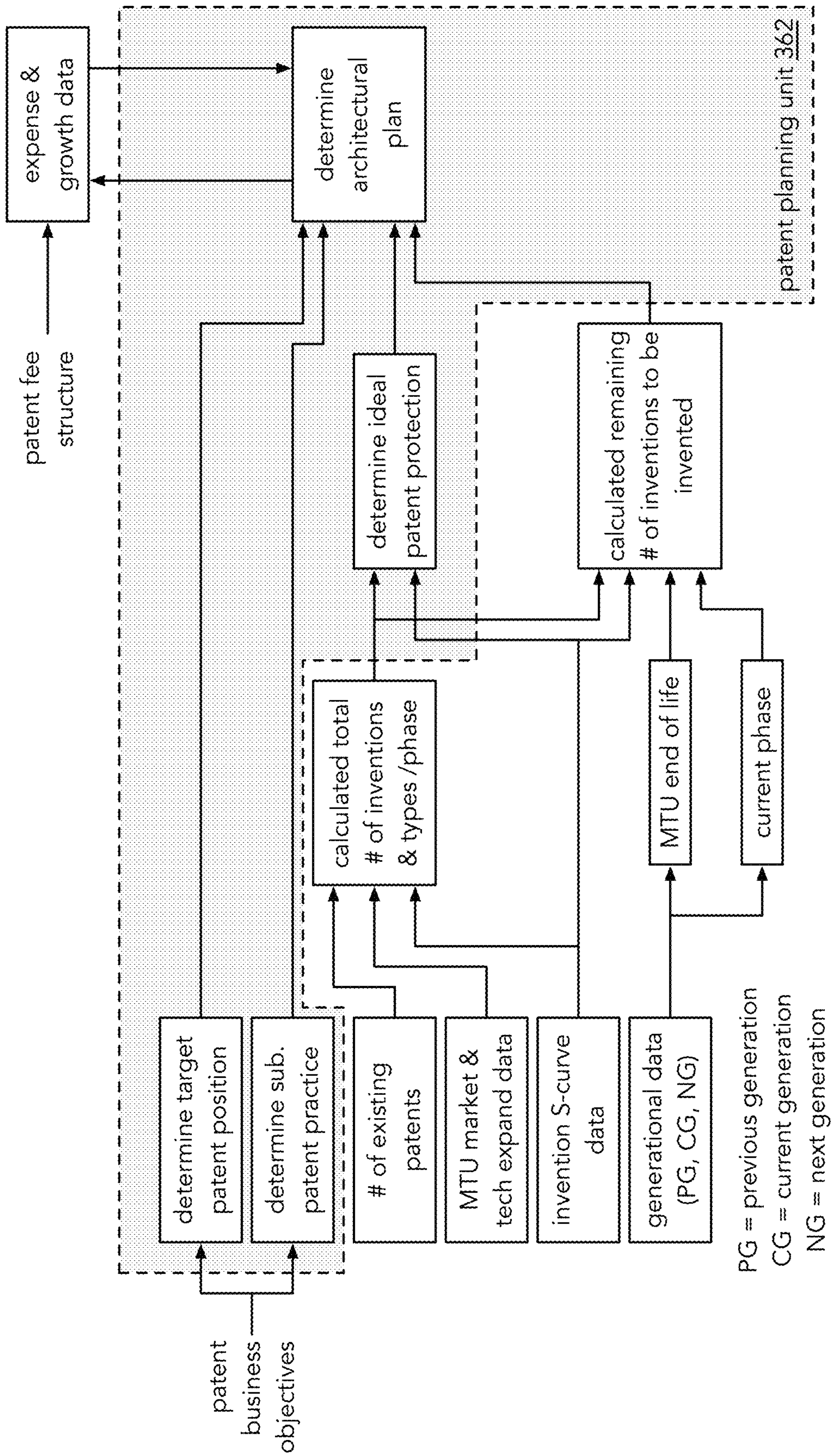
FIG. 261 is a schematic block diagram of an example of creating an architectural patent protection plan by an improved computer for technology.

FIG. 261 is a schematic block diagram of an embodiment of an MTU patent planning unit 362 of an improved computer for technology. The unit 362 executes the MTU user application of MTU architectural patent protection plan based on a variety of data that includes targeted patent position, subsequent filing practice, ideal patent protection, expense & growth data, a calculated total number of inventions for the MTU, a calculated number of invention types, a calculated total number of inventions per phase, a calculated number of invention types per phase, a calculated number of remaining inventions to be invented, and a calculated number of remaining inventions to be invented per remaining phase.

The patent planning unit 362 determines a target patent position and a subsequent (sub.) patent filing practice from the patent business objectives, which are received from an authenticated and authorized user computing device. The patent business objectives include one or more of desired patent position, desired patent spend per year, product development roadmap, technology development roadmap, etc.

The patent planning unit 362 determines ideal patent protection based on the calculated total number of inventions for the MTU, the calculated number of invention types, the calculated total number of inventions per phase, and the calculated number of invention types per phase. The ideal number of inventions corresponds to a percentage of the total number of inventions that should be patent protected; not every inventions needs to be or should be patent protected. The ideal number of inventions that should be patented protected will typically be in the range of 60% to 95% of the total number of inventions.

The unit 362 generates an architectural patent protection plan for an MTU to obtain patent protection in one or more countries. The architectural patent protection plan includes a period-by-period (where a period is a definable duration of time and is often defined to be a year) plan. For a period, the plan includes the number of new patent applications to be filed per country and per application type, the number of inventions to patent protect broken down by invention types and per country, the number of office actions to be received per country, the number of issuances to be received per country, the number of subsequent patent application filings per type and per country, maintenance fees to be paid, and annuity fees to be paid.

The expense & growth data is interactive with the architectural patent protection plan. Thus, as the specific numbers of the plan changes, the expense & growth data changes. This allows for the architectural patent protection plan to be adjusted as often as needed to adapt to changes in the development of the technology, market adoption of the technology, productization of the technology, economic conditions, and so on.

Figure 262:
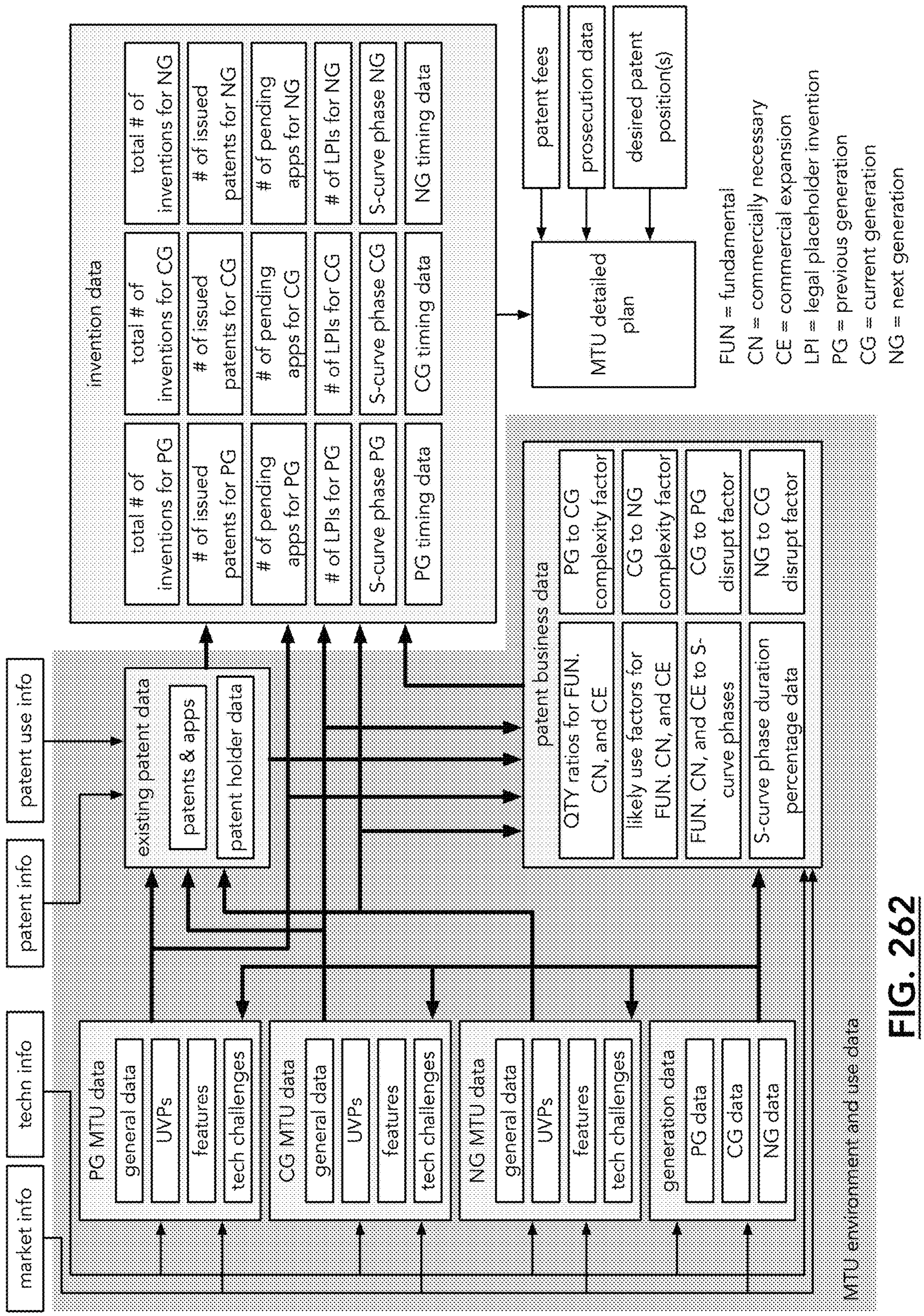
FIG. 262 is a schematic block diagram of another embodiment of an MTU portfolio creation tool as performed by a co-processor of an improved computer for technology.

FIG. 262 is a schematic block diagram of an example of creating an architectural patent protection plan by an improved computer for technology. This example includes an MTU environment & use data section feeding an invention data section from which the architectural patent protection plan is created. The MTU environment & use data section includes the sub-sections of previous generation (PG) MTU data, current generation (CG) MTU data, next generation (NG) MTU data, generation data, existing patent data, and patent business data.

Each of the generation MTU data sub-sections includes the relevant information regarding an MTU database record and, at a minimum, includes the general description of the MTU, its unique value propositions, its marketable features, and it technical challenges. The generation data sub-section includes data for each generation (e.g., start of the generation, end of the generation, and the duration of each phase of the generation). The existing patent data sub-section includes data regarding existing patent applications, existing issued patents, and their patent holders (e.g., inventors, assignees, applicants).

The patent business data sub-section includes data regarding quantities (QTY) and/or ratios regarding the invention types of fundamental inventions (FUN), commercially necessary (CN) inventions, and commercial expansion (CE) inventions. The fundamental inventions include initial fundamental inventions and new fundamental inventions. The commercially necessary inventions include the initial commercially necessary inventions and new commercially necessary inventions. The commercial expansion inventions include the initial CE inventions, new CE inventions, vertical integration inventions, horizontal integration inventions, potential acquirer inventions, competitor speed bump inventions, potential standard essential inventions, and patent standard non-essential but commercially necessary inventions.

The patent business data sub-section further includes data regarding the likely use factors for the invention types of fundamental inventions (FUN), commercially necessary (CN) inventions, and commercial expansion (CE) inventions. For example, a normalized likely use factor fora CE invention is 1, a normalized likely use factor fora CN invention is 2.5, and a normalized likely use factor fora FUN invention is 4.5.

The patent business data sub-section further includes data regarding S-curve data for the invention types of fundamental inventions (FUN), commercially necessary (CN) inventions, and commercial expansion (CE) inventions. The patent business data sub-section further includes data regarding duration of each generation and the corresponding phases.

The patent business data sub-section further includes data regarding generation to generation technology complexity factors (e.g., a comparison of the number of technical challenges and the tech challenge to inventive embodiment mappings). The patent business data sub-section further includes data regarding generation to generation disruption factor. The disruption factor scales from incremental through better-mouse-trap through evolutionary to revolutionary (e.g., 1 for incremental and 10 for revolutionary, with the center of a better-mouse-trap being a 3 and the center of evolutionary being a 7).

The invention data includes the total number of inventions likely to be created for each of the generations; the number of existing issued patent for each generation; the number of pending patent application for each generation; the number of legal placeholder inventions (LPI) inventions (e.g., enabled in pending patent application but not yet claimed) for each generation; the inventions per phase of an S-curve for each generation; and the timing of each generation and the phases thereof. As described in greater detail with reference to subsequent figures, the improved computer generates the architectural patent protection plan for an MTU.

Figure 263:
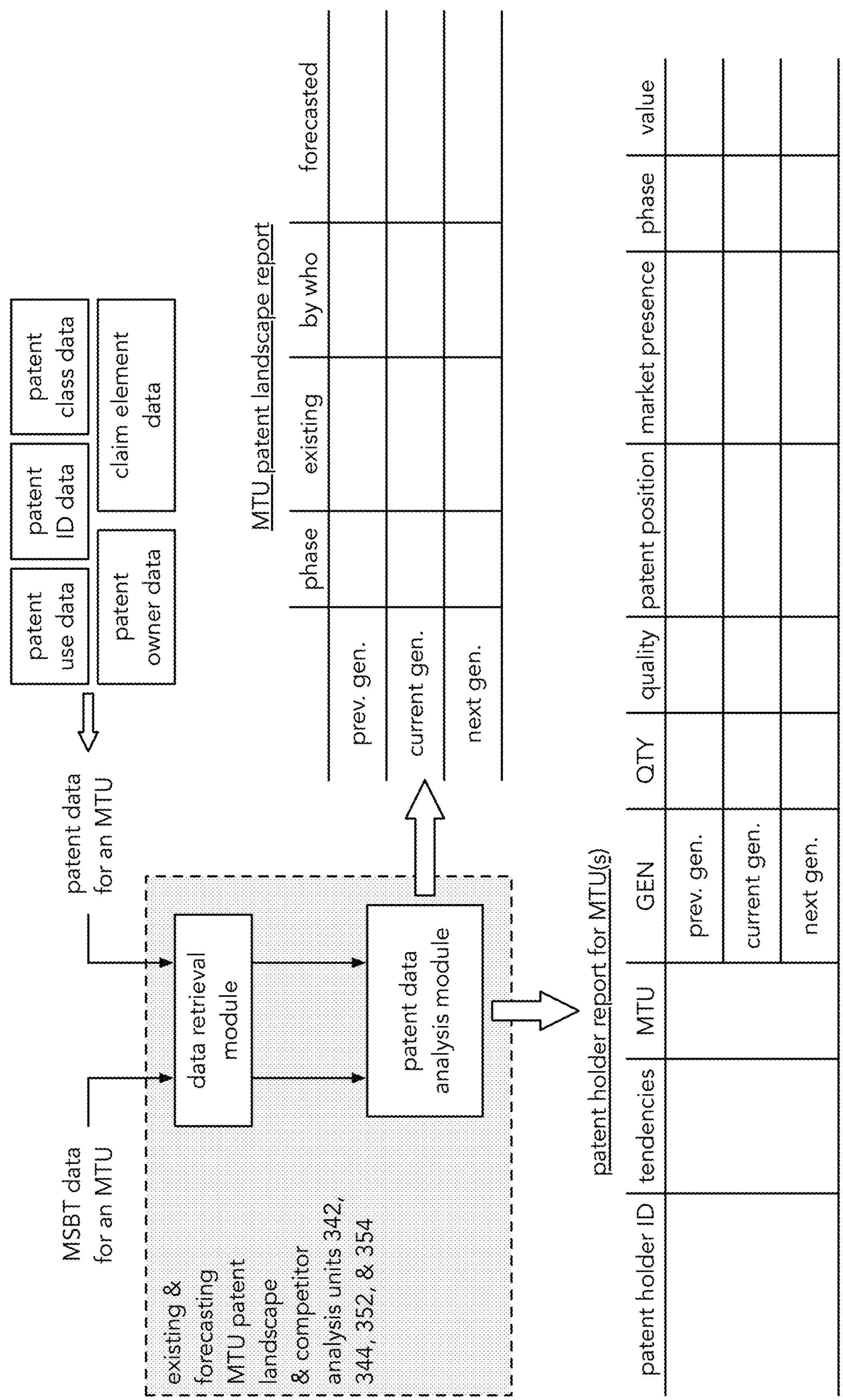
FIG. 263 is a schematic block diagram of an embodiment of MTU patent landscape and competitor analysis units of an improved computer for technology.

FIG. 263 is a schematic block diagram of an embodiment of existing and forecasting MTU patent landscape and competitor analysis units 342, 344, 352, and 354 of an improved computer for technology. In high-level block diagram form, the units retrieve data and analyze the retrieved data to produce an MTU patent landscape report and a patent holder report with respect to the MTU.

The retrieve data includes MSBT data regarding the MTU and patent data regarding the MTU. The patent data includes patent use data, general information about the patents (e.g., patent ID data), patent classification data (e.g., IPC classification), patent owner data, and/or claim element data.

The MTU patent landscape report includes rows for the previous, current, and next generations and columns for phase, existing invention information (existing), a list patent holders (by who), and forecasted invention information (forecasted). The existing invention information includes a total number of inventions, an ideal number of inventions, and an actual number of inventions protected. The forecasted invention information includes a total number of inventions, an ideal number of inventions, and a targeted number of invention to patent protect.

The patent holder report includes rows for each patent holder and sub-rows for each generation. The report includes columns for patent holder ID, tendencies, MTU, generation (GEN), number of inventions protected (QTY), quality of patent protection, patent position, market presence, phase, and estimated value.

Figure 264:
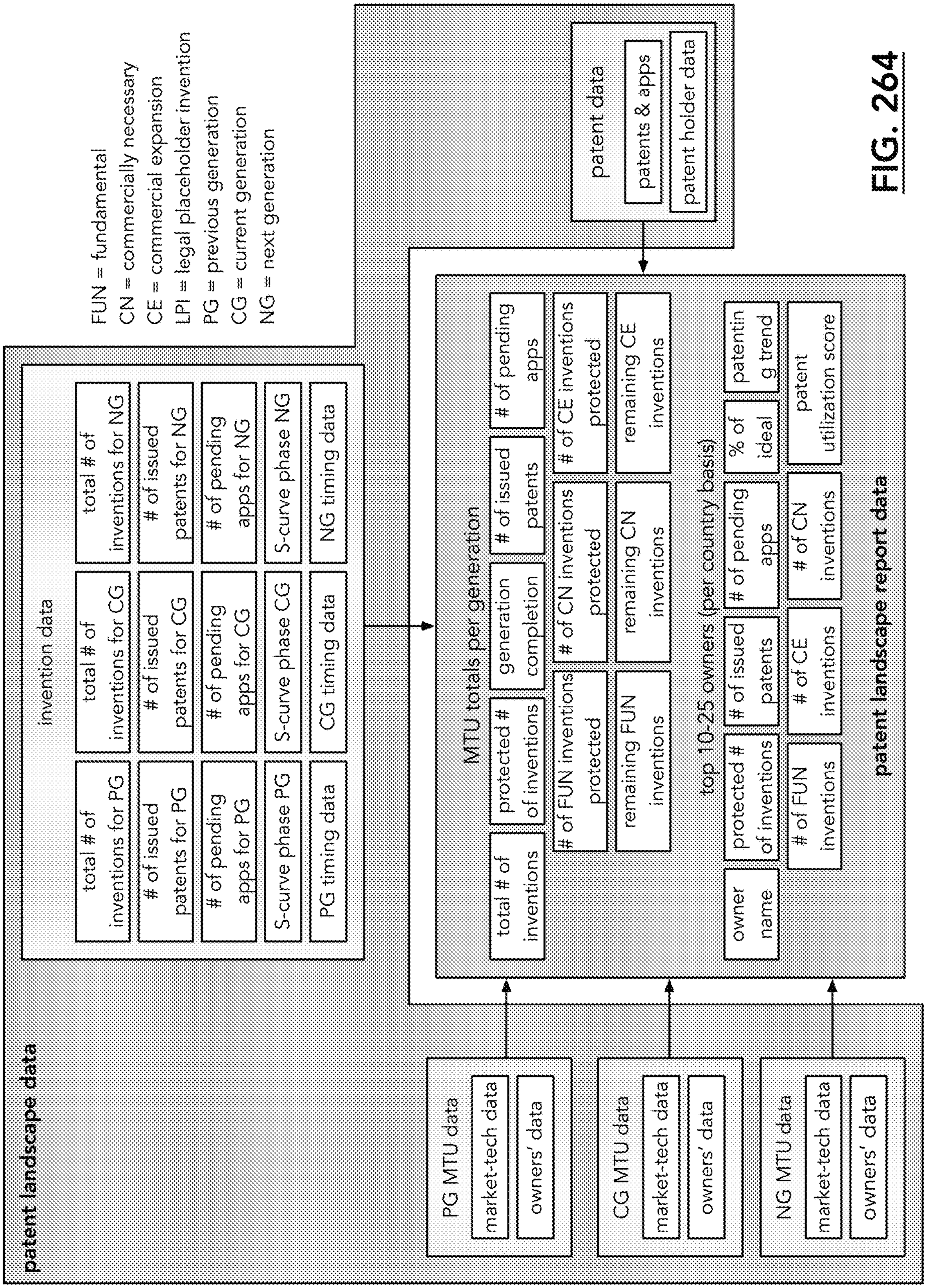
FIG. 264 is a schematic block diagram of an example of data used by MTU patent landscape and competitor analysis units of an improved computer for technology.

FIG. 264 is a schematic block diagram of an example of data used by the MTU patent landscape and competitor analysis units 342, 344, 352, and 354 of an improved computer for technology. The patent landscape data includes an invention data section, a patent data section, a previous generation (PG) section, a current generation (CG) section, and a next generation (NG) section. The invention data, the patent data, and the generational data are similar to the invention data and generational data of FIG. 262.

The patent landscape report data (i.e., the resulting data for a report as shown in the previous figure) includes an MTU totals per generation data section and a top owners data section. The MTU totals per generation data section includes data for each generation regarding a total number of inventions to be created, the number of inventions protected to date, generation completed, number of issued patents to date, number of pending patent applications to date, a forecasted number of patents to issue, a forecasted number of patent applications to be filed, the number of fundamental inventions that have been patent protected and that are forecasted to be patent protected, the number of commercially necessary inventions that have been patent protected and that are forecasted to be patent protected, and the number of commercial expansion inventions that have been patent protected and that are forecasted to be patent protected.

The top owners data section includes, for each owner, the owners name, the number of the owners issued patents to date, the number of the owners pending patent applications to date, a forecasted number of patents to issue to the owner, a forecasted number of patent applications to be filed by the owner, the number of fundamental inventions that have been patent protected and that are forecasted to be patent protected attributable to the owner, the number of commercially necessary inventions that have been patent protected and that are forecasted to be patent protected attributable to the owner, and the number of commercial expansion inventions that have been patent protected and that are forecasted to be patent protected attributable to the owner.

Figure 265:
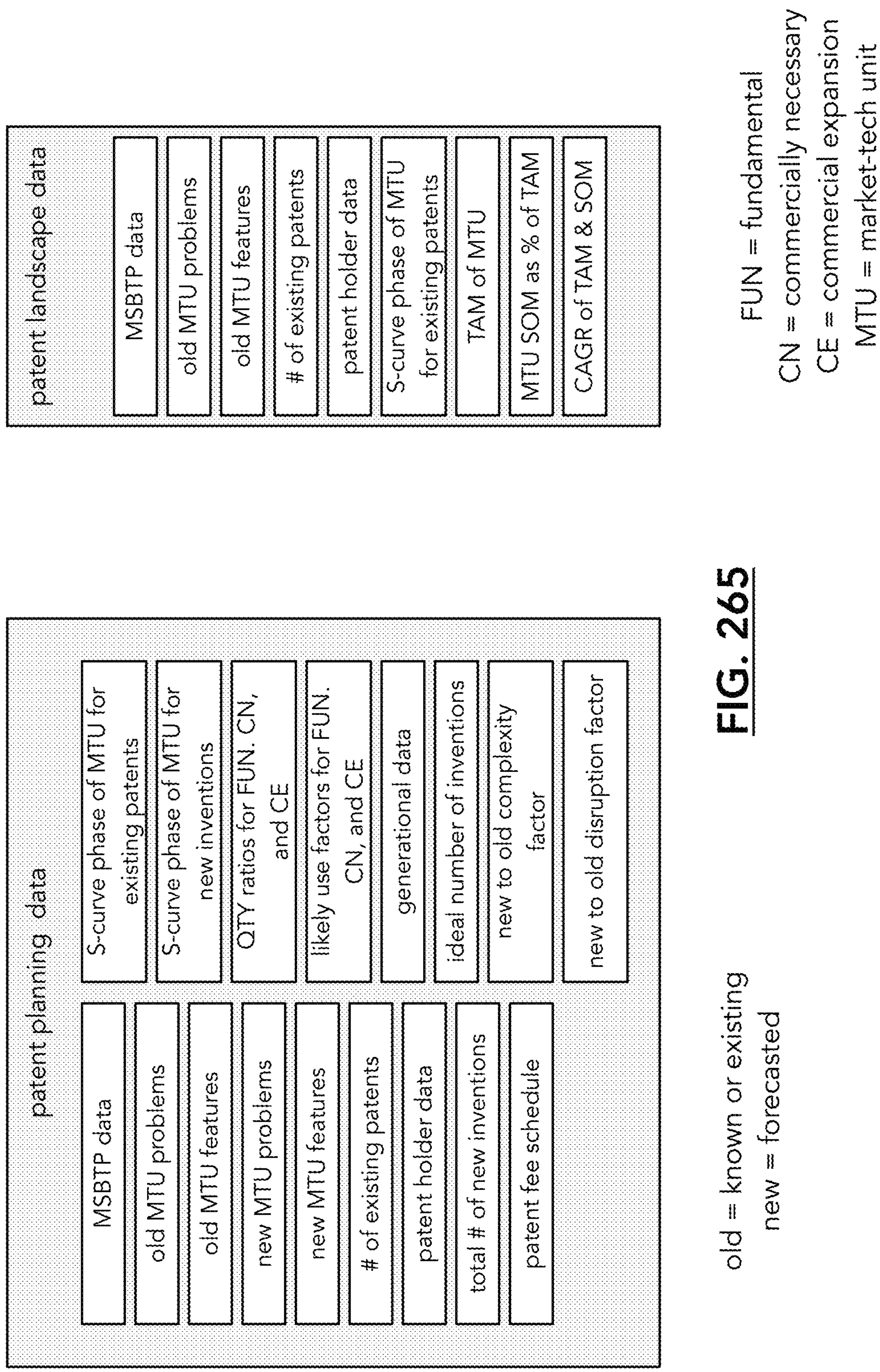
FIG. 265 is a diagram of an example of data used by an MTU patent planning unit and MTU patent landscape and competitor analysis units of an improved computer for technology.

FIG. 265 is a diagram of an example of data used by an MTU patent planning unit and MTU patent landscape and competitor analysis units of an improved computer for technology. The patent planning data includes MSBTP (marketing, sales, business, technology, and/or patents) data, old MTU problems, old MTU features, new MTU problems, new MTU features, number of existing patents, patent holder data, the total number of inventions, the patent fee schedule, the S-curve phase data for existing patents, S-curve phase data for new inventions, quantity and/or ratios for invention types, likely use factors for the invention types, generational data, ideal number of inventions to be patent protected, new to old (e.g., CG to PG) complexity factor, and new to old disruption factor.

The patent landscape data includes MSBTP data, old MTU problems, old MTU features, the number of existing patents (e.g., inventions protected by some form of patent protection), patent holder data, S-curve phase data regarding the existing patents, the TAM for the MTU, the SOM as a percentage of TAM, and CAGR of TAM and/or SOM. The improved computers use of the data in this figure and the preceding figures is discussed in greater detail with reference to one or more previous figures and/or with reference to one or more subsequent figures.

Figure 266:
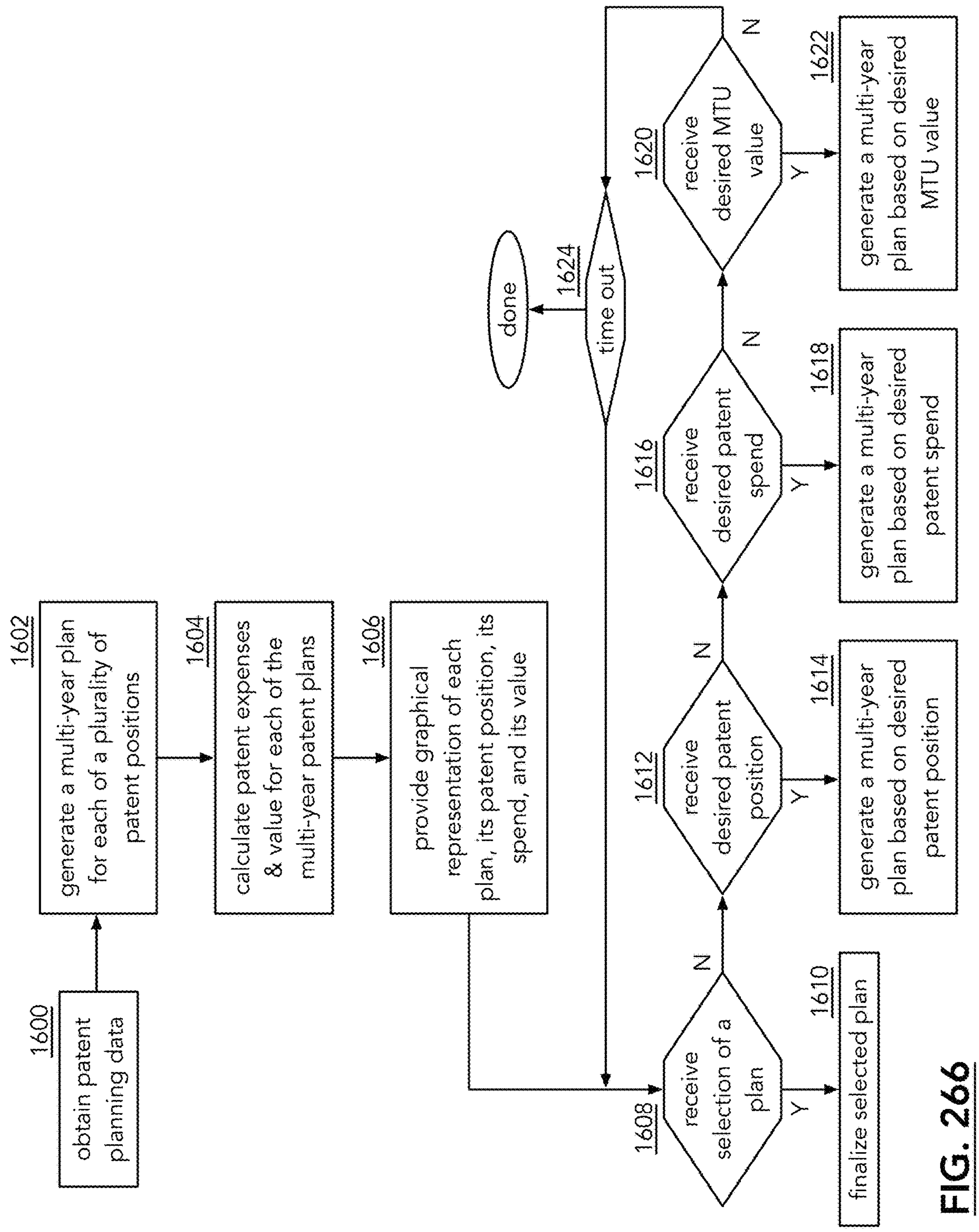
FIG. 266 is a logic diagram of an example of a method for balance of patent spend and desired patent position to produce a multi-year plan to patent protect an MTU as performed by a co-processor of an improved computer for technology.

FIG. 266 is a logic diagram of an example of a method for balance of patent spend and desired patent position to produce a multi-year plan to patent protect an MTU as performed by a co-processor of an improved computer for technology. The method begins at step 1600 where the improved computer obtains patent planning data. The method continues at step 1602 where the improved computer generates a plurality of multi-year patent protection plans; one for each of a plurality of patent positions. The patent position is a measure of patent leverage with respect to the MTU over others. It is a sliding scale from weak to superior, where, as an example, weak is a 1 and superior is a 10.

The method continues at step 1064 where the improved computer calculates, for each plan and on a year-by-year basis, the expenses the value of the MTU. The method continues at step 1606 where the improved computer provides a graphical representation of each plan with respect to its year-by-year patent position, patent spend, and value. The method continues at step 1608 where the improved computer determines whether it has received (e.g., within some time window) a selection of one of the plans. If yes, the method continues at step 1610 where the improved computer finalizes the selected plan.

If the answer to step 1608 was no, the method continues at step 1612 where the improved computer determines whether it has received (e.g., within some time window) an input regarding a desired patent position that was not part of the plurality of patent positions. If yes, the method continues at step 1614 where the improved computer generates a multi-year patent protection plan for the MTU based on the desired patent position.

If the answer to step 1612 was no, the method continues at step 1616 where the improved computer determines whether it has received (e.g., within some time window) an input regarding a desired patent spend. If yes, the method continues at step 1618 where the improved computer generates a multi-year patent protection plan for the MTU based on the desired patent spend.

If the answer to step 1616 was no, the method continues at step 1620 where the improved computer determines whether it has received (e.g., within some time window) an input regarding a desired MTU value. If yes, the method continues at step 1622 where the improved computer generates a multi-year patent protection plan for the MTU based on the desired MTU value. If not, the method continues at step 1624 where the improved computer determines whether a time out for response has expired. If yes, the method is done. If not, the method loops back to step 1608.

Figure 267:
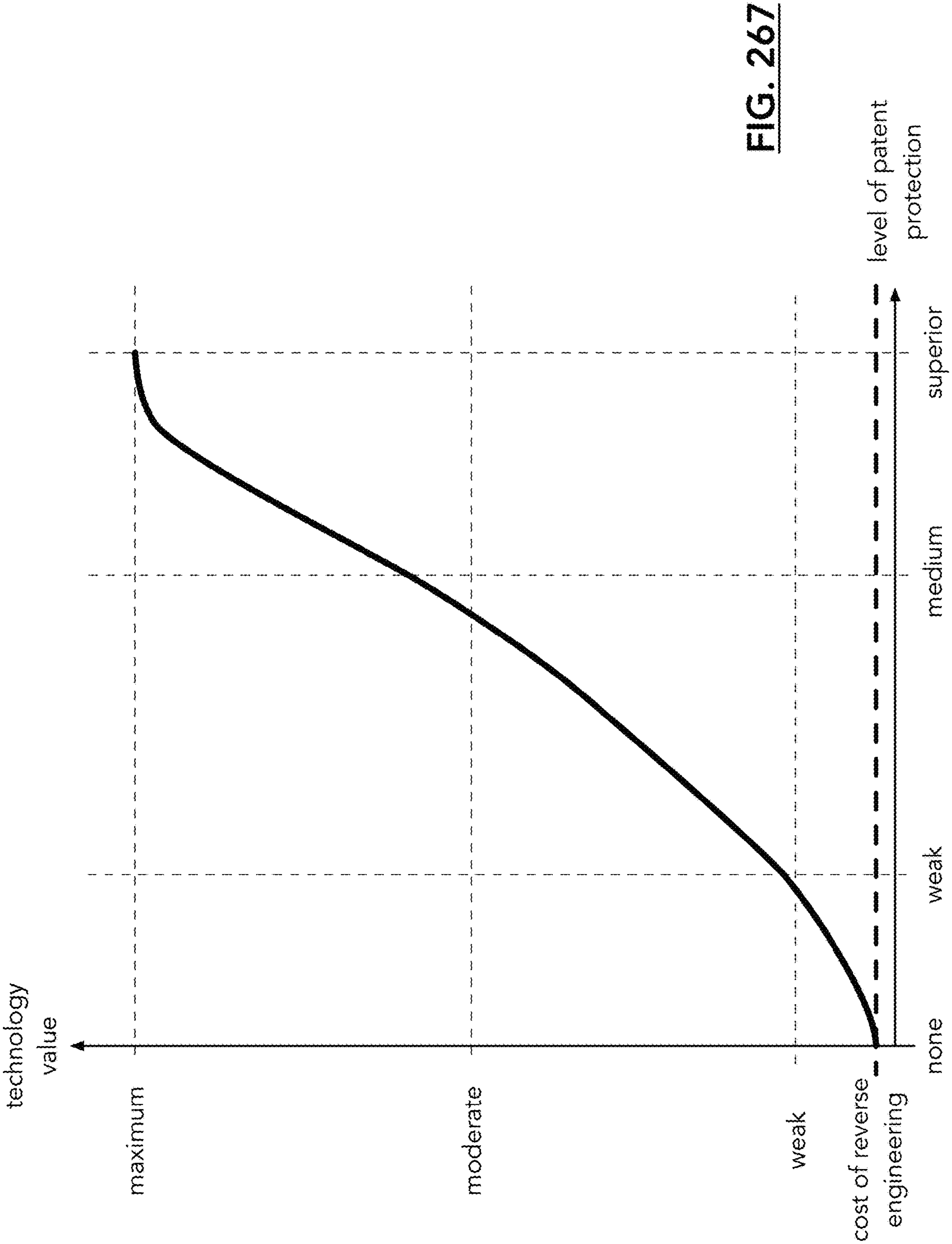
FIG. 267 is a diagram of an example of value of an MTU based on level of patent protection as determined by a co-processor of an improved computer for technology.

FIG. 267 is a diagram of an example of value of an MTU based on level of patent protection as determined by a co-processor of an improved computer for technology. In this example graph, the value of an MTU (e.g., quantified technology) is plotted versus level of patent protection. The value ranges from cost of reverse engineering to maximum and the level of patent protection ranges from weak to superior. As shown, if there is no patent protection for an MTU, its value is the cost of reverse engineering, which may be trivial to millions of dollars. The maximum value is dependent on the impact the MTU has on the market and the size of the market.

Figure 268:
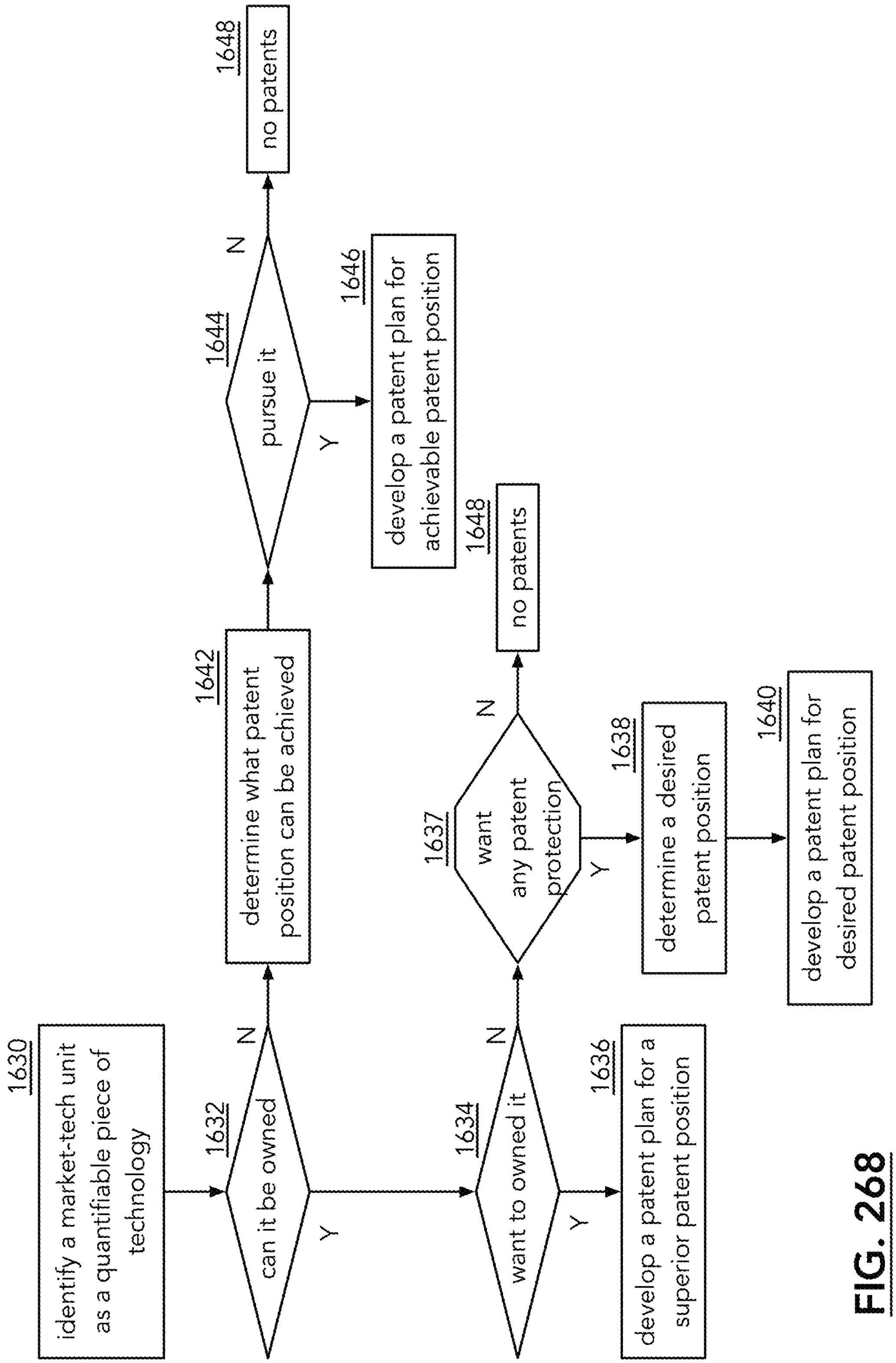
FIG. 268 is a logic diagram of an example of a method for determining patent position for an MTU as performed by a co-processor of an improved computer for technology.
Figure 269A:
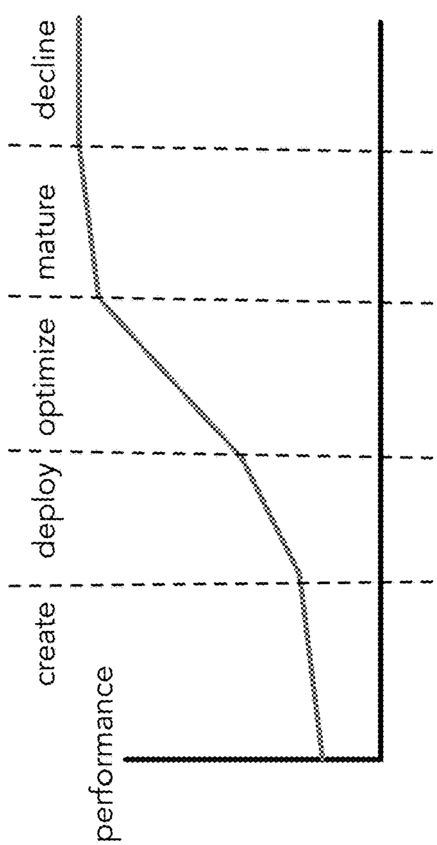
FIGS. 269A through 269D are S-curve diagrams for an MTU regarding performance, profitability, number of total inventions, and breadth of inventions as used by and/or determined by a co-processor of an improved computer for technology.
Figure 269B:
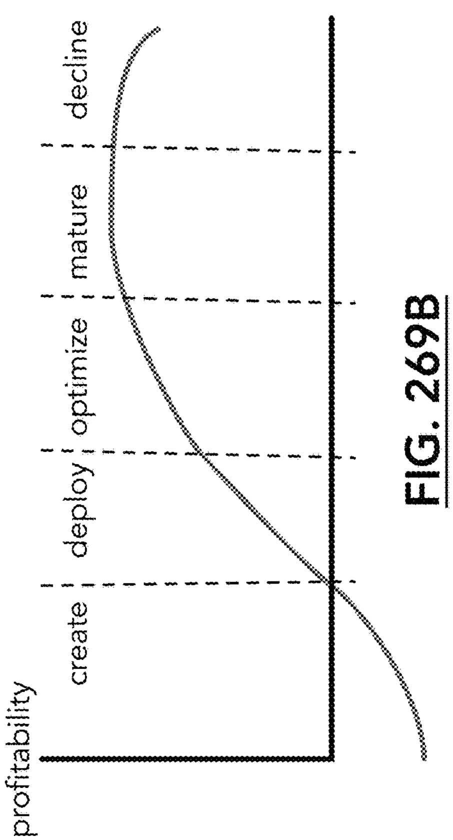
Figure 269C:
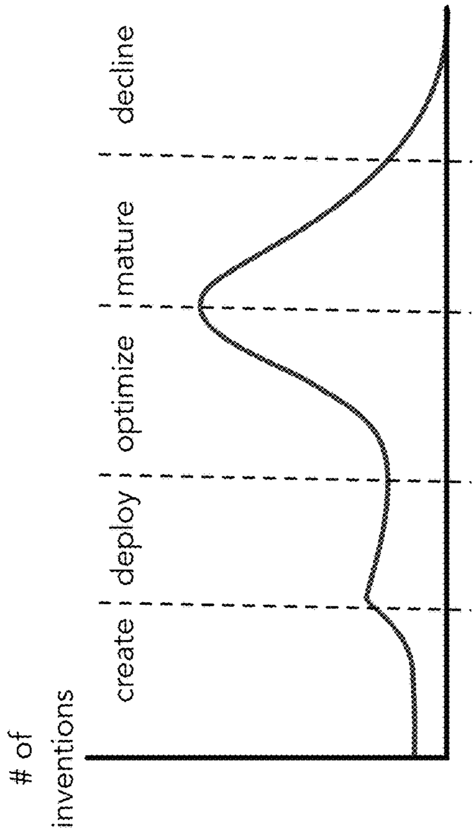
Figure 269D:
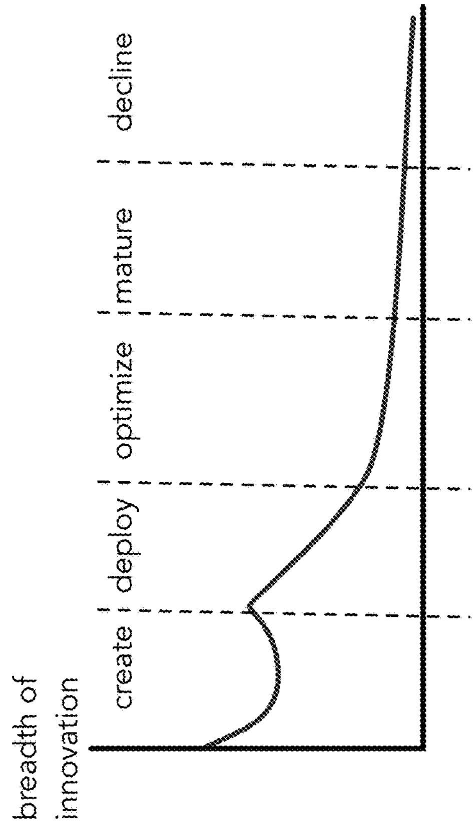

FIG. 268 is a logic diagram of an example of a method for determining patent position for an MTU as performed by a co-processor of an improved computer for technology. The method begins at step 1630 where the improved computer identifies a market-tech unit (MTU) as a quantifiable piece of technology. The method continues at step 1632 where the improved computer determines whether the MTU can be "owned" (e.g., a superior patent position is still obtainable).

If yes, the method continues at step 1634 where the improved computer determines whether the user, via the user computing device, wants to own the MTU. For example, from the users perspective, is the potential ROI worth the patent spend. If yes, the method continues at step 1636 where the improved computer generates an architectural patent protection plan based on a superior patent position.

If the answer to step 1634 was no, the method continues at step 1637 where the improved computer determines whether the user wants any patent protection for the MTU (e.g., receives information from the user computing device). If not, the method continues at step 1648 where the improved computer does not put together a patent protection plan for the MTU (e.g., no patents). If yes, the method continues at step 1638 where the improved computer receives a desired patent position, which is less than a maximum superior position. The method continues at step 1640 where the improved computer generates an architectural patent protection plan based on the inputted patent position.

If the answer to step 1632 was no, the method continues at step 1642 where the improved computer determines what position can still be achieved, the associated costs, and the calculated value. The method continues at step 1644 where the improved computer determines whether to pursue patent protection (e.g., generate a plan) based on a user input. If no, the method continues at step 1648 where the improved computer does not create a patent protection plan. If yes, the method continues at step 1646 where the improved computer generates an architectural patent protection plan based on the available patent position.

FIGS. 269A through 269D are S-curve diagrams for an MTU regarding performance, profitability, number of total inventions, and breadth of inventions as used by and/or determined by a co-processor of an improved computer for technology.

Figure 270A:
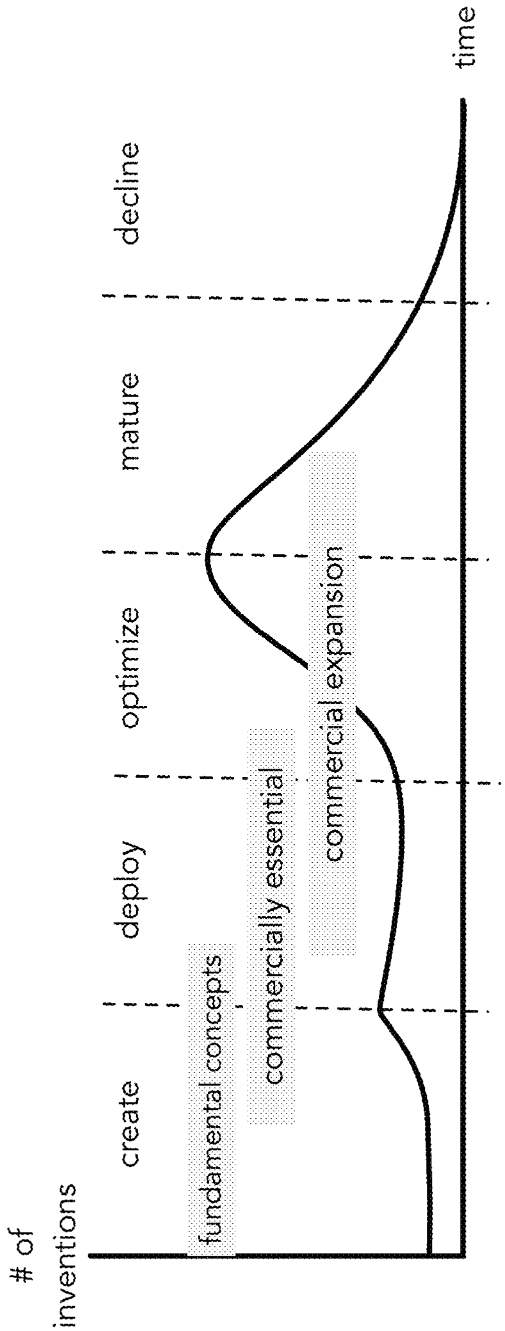
FIGS. 270A and 270B are S-curve diagrams for an MTU regarding number of total inventions and breadth of inventions with an overlay of invention types as used by and/or determined by a co-processor of an improved computer for technology.
Figure 270B:
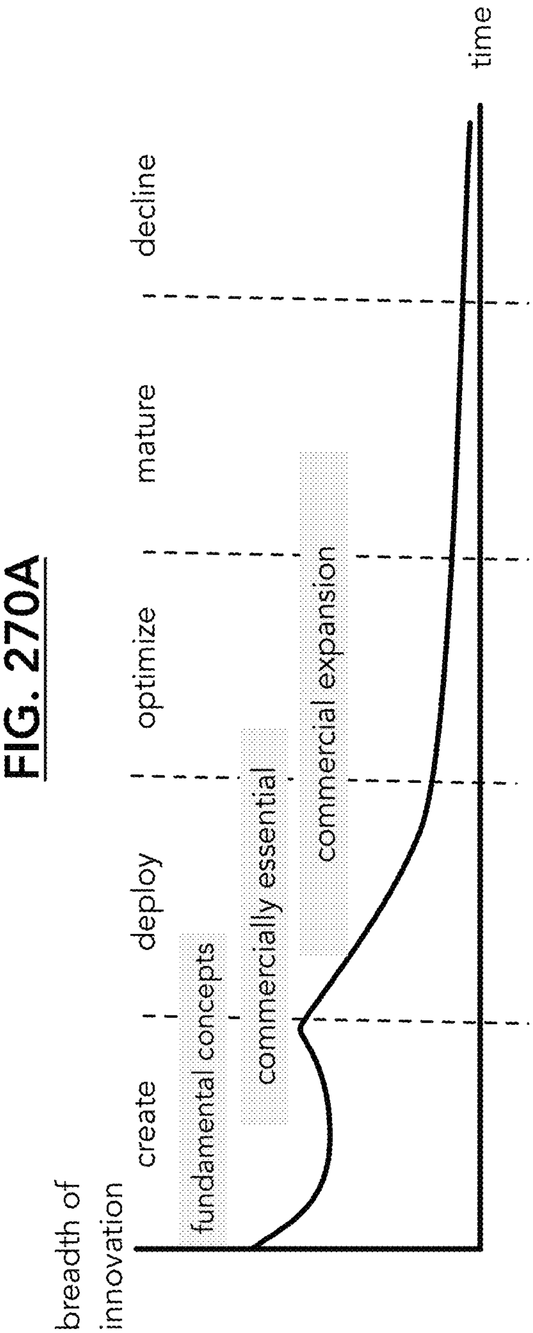

FIGS. 270A and 270B are S-curve diagrams for one generation of an MTU regarding a number of total inventions over the life of the MTU and breadth of inventions over the life of the MTU with an overlay of invention types as used by and/or as determined by a co-processor of an improved computer for technology.

Figure 271:
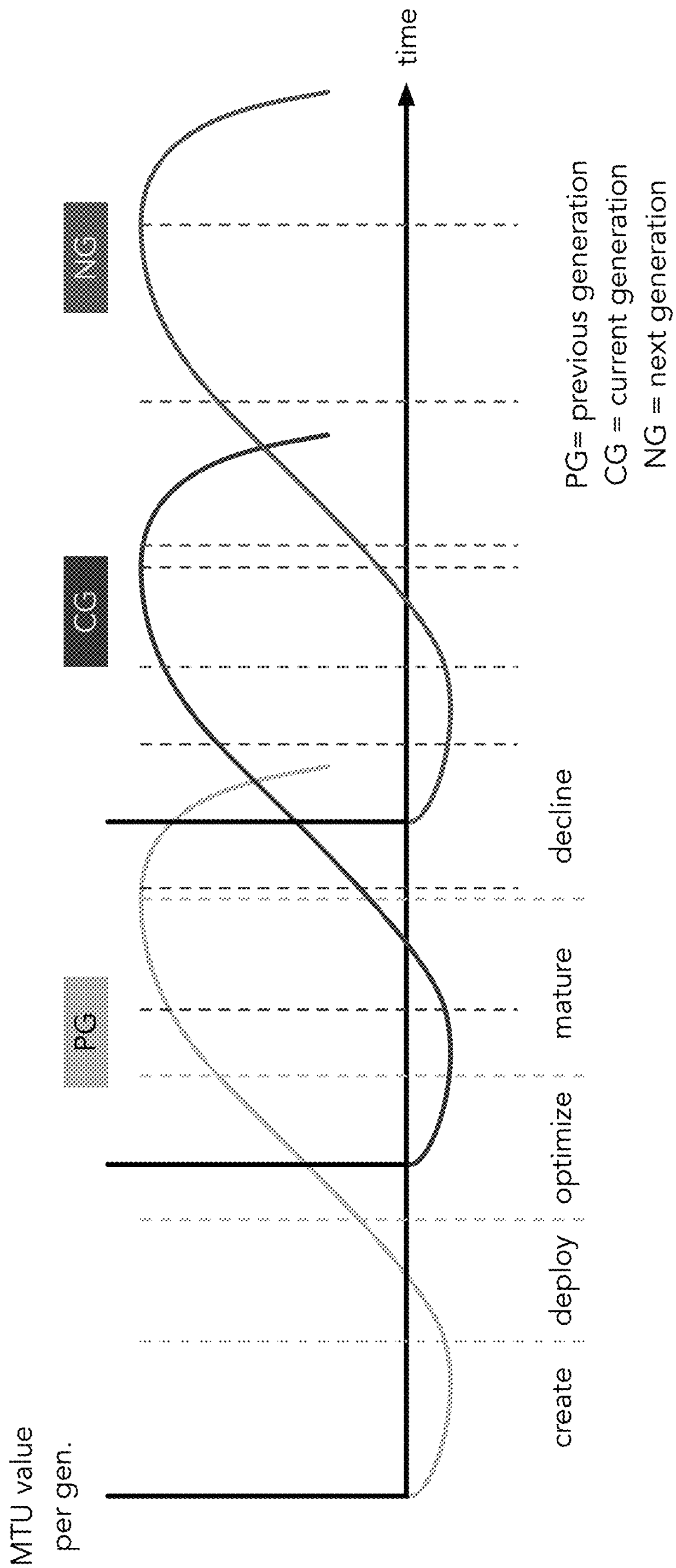
FIG. 271 is an S-curve diagram for three generations of an MTU regarding performance as used by and/or determined by a co-processor of an improved computer for technology.

FIG. 271 is an S-curve diagram for three generations of an MTU regarding performance as used by and/or determined by a co-processor of an improved computer for technology. To differentiate between the generations, orange is used for the previous generation, blue is used for the current generation, and red is used for the next generation.

Figure 272A:
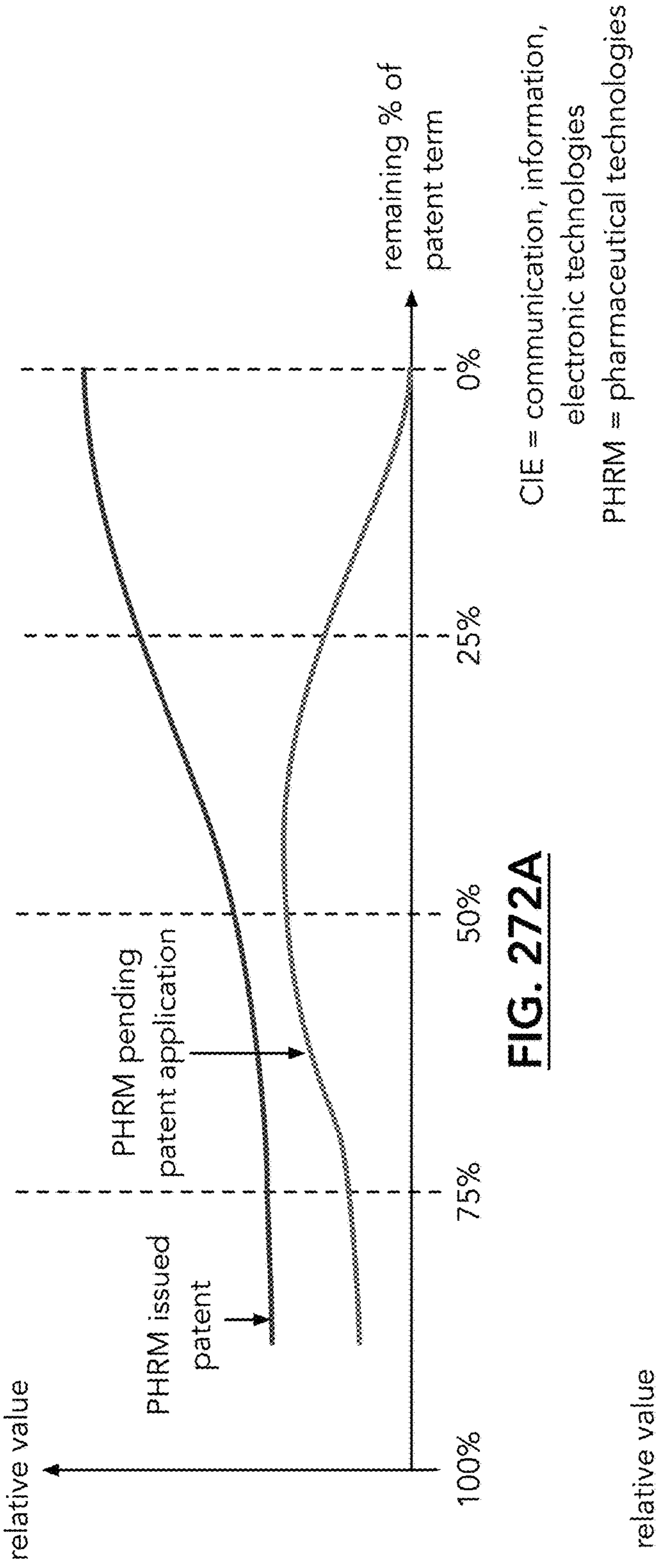
FIG. 272A is a diagram of an example of relative value of a patent and patent application regarding a pharmaceutical MTU over time as used by and/or determined by a co-processor of an improved computer for technology.

FIG. 272A is a diagram of an example of relative value of a patent and patent application regarding a pharmaceutical MTU over time as used by and/or determined by a co-processor of an improved computer for technology. To differentiate between an issued patent and a pending patent application, the curve for the issued patent is a dark red line and the curve for the pending patent application is a blue line.

Figure 272B:
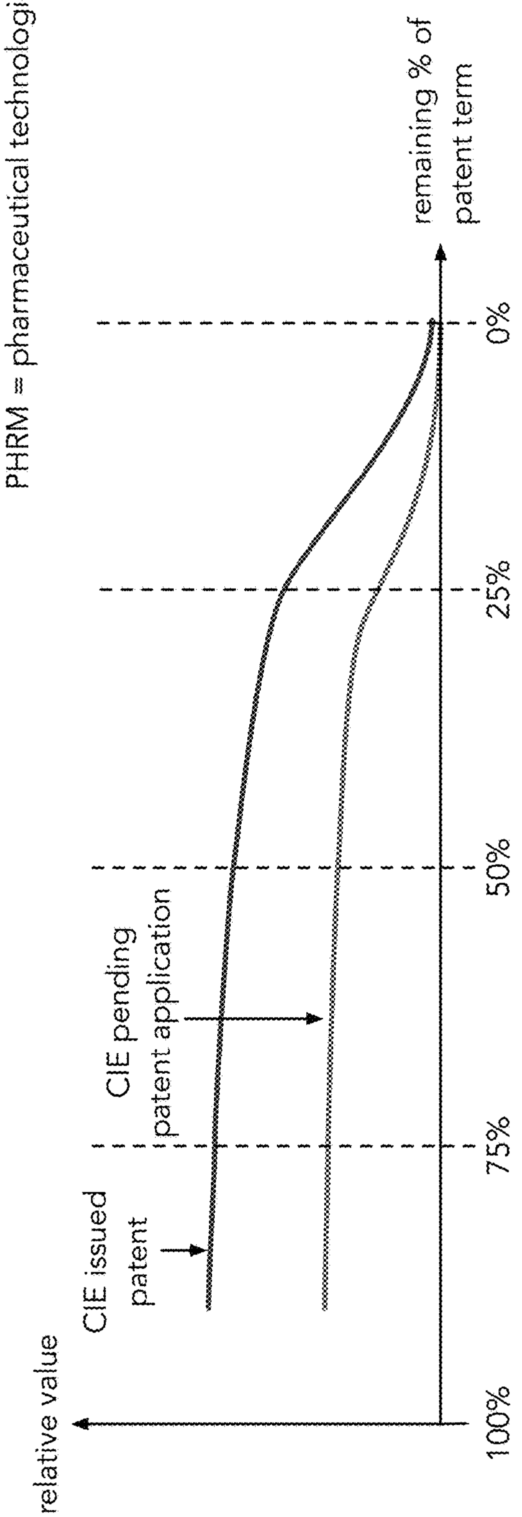
FIG. 272B is a diagram of an example of relative value of a patent and patent application regarding a communication, information, and/or electrical technology MTU over time as used by and/or determined by a co-processor of an improved computer for technology.

FIG. 272B is a diagram of an example of relative value of a patent and patent application regarding a communication, information, and/or electrical technology MTU over time as used by and/or determined by a co-processor of an improved computer for technology. To differentiate between an issued patent and a pending patent application, the curve for the issued patent is a dark red line and the curve for the pending patent application is a blue line.

Figure 273:
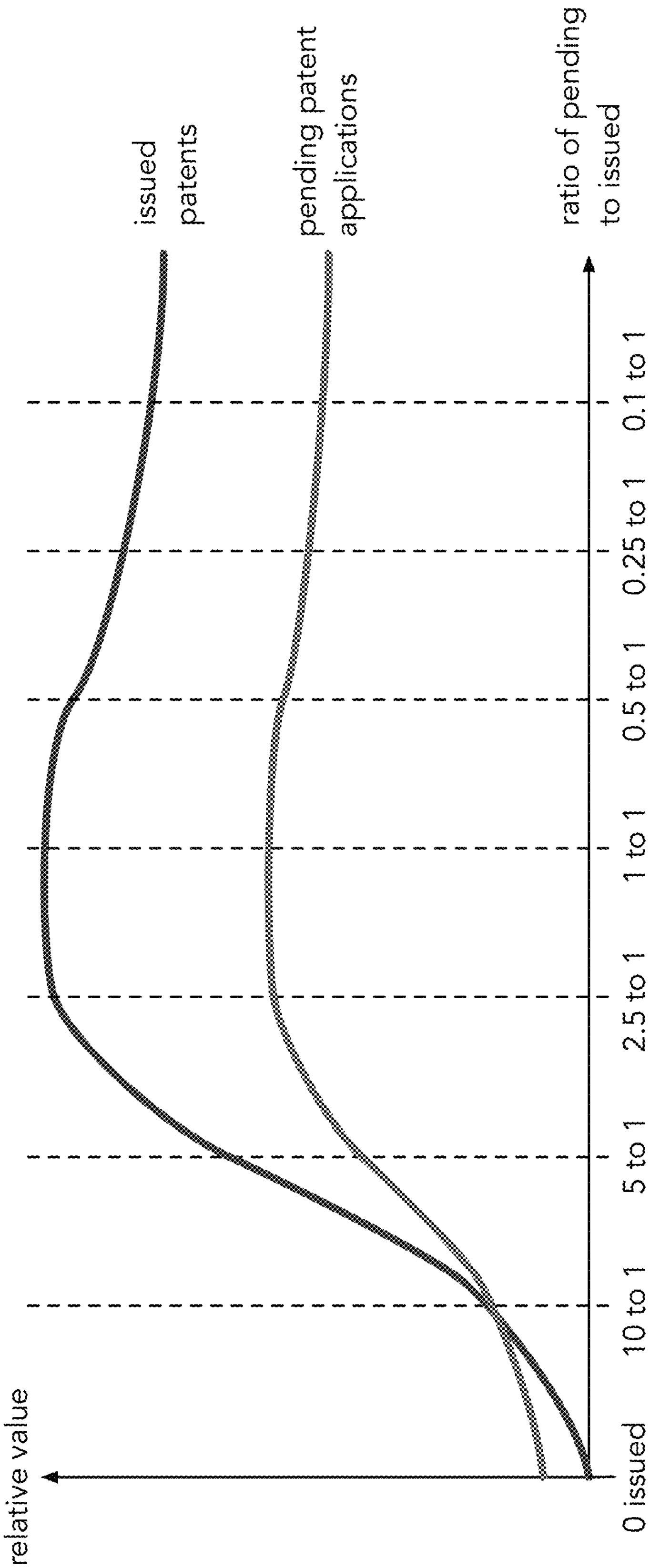
FIG. 273 is a diagram of an example of relative value of a patent and patent application regarding an MTU based on a ratio of pending patent applications to issued patents as used by and/or determined by a co-processor of an improved computer for technology.

FIG. 273 is a diagram of an example of relative value of a patent and patent application regarding an MTU based on a ratio of pending patent applications to issued patents regarding the MTU as used by and/or determined by a co-processor of an improved computer for technology. To differentiate between an issued patent and a pending patent application, the curve for the issued patent is a dark red line and the curve for the pending patent application is a blue line.

Figure 274:
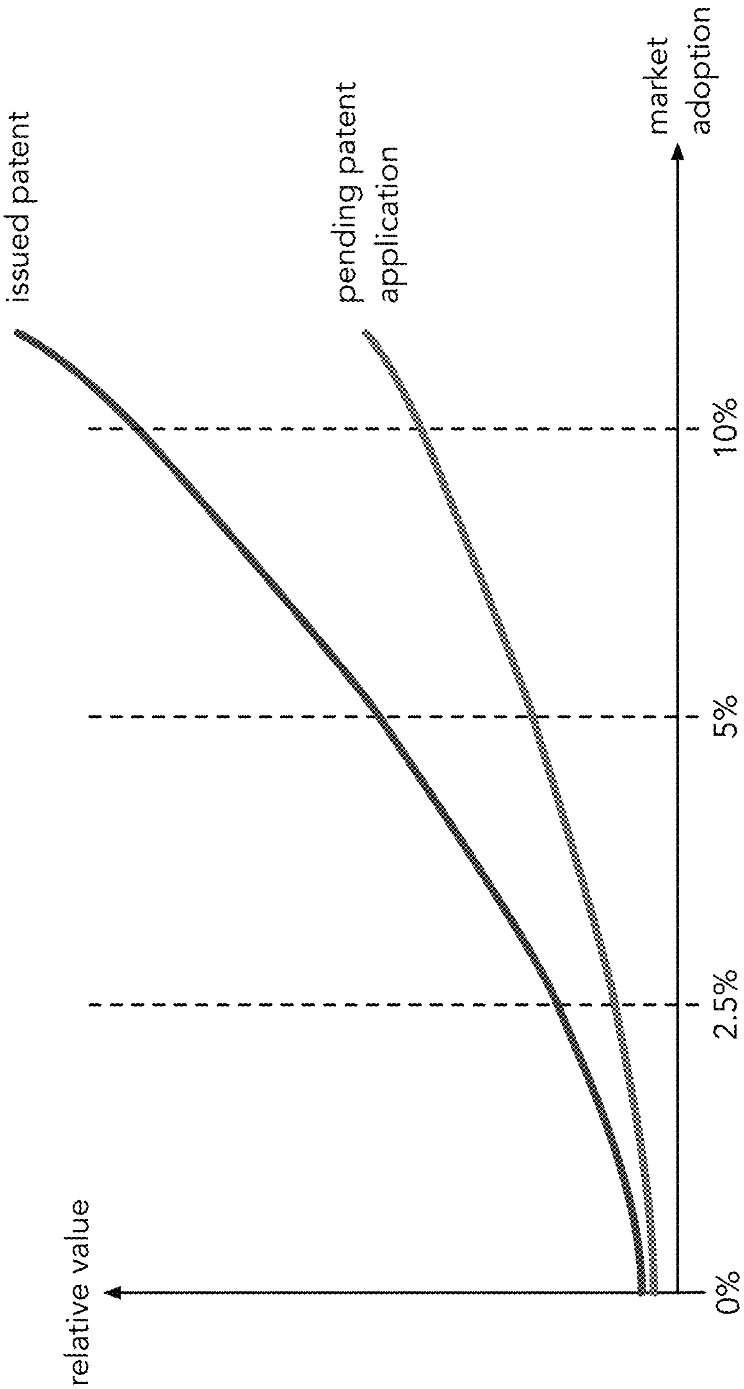
FIG. 274 is a diagram of an example of relative value of a patent and patent application regarding an MTU based on market adoption as used by and/or determined by a co-processor of an improved computer for technology.

FIG. 274 is a diagram of an example of relative value of a patent and patent application regarding an MTU based on market adoption as used by and/or determined by a co-processor of an improved computer for technology. To differentiate between an issued patent and a pending patent application, the curve for the issued patent is a dark red line and the curve for the pending patent application is a blue line.

Figure 275:
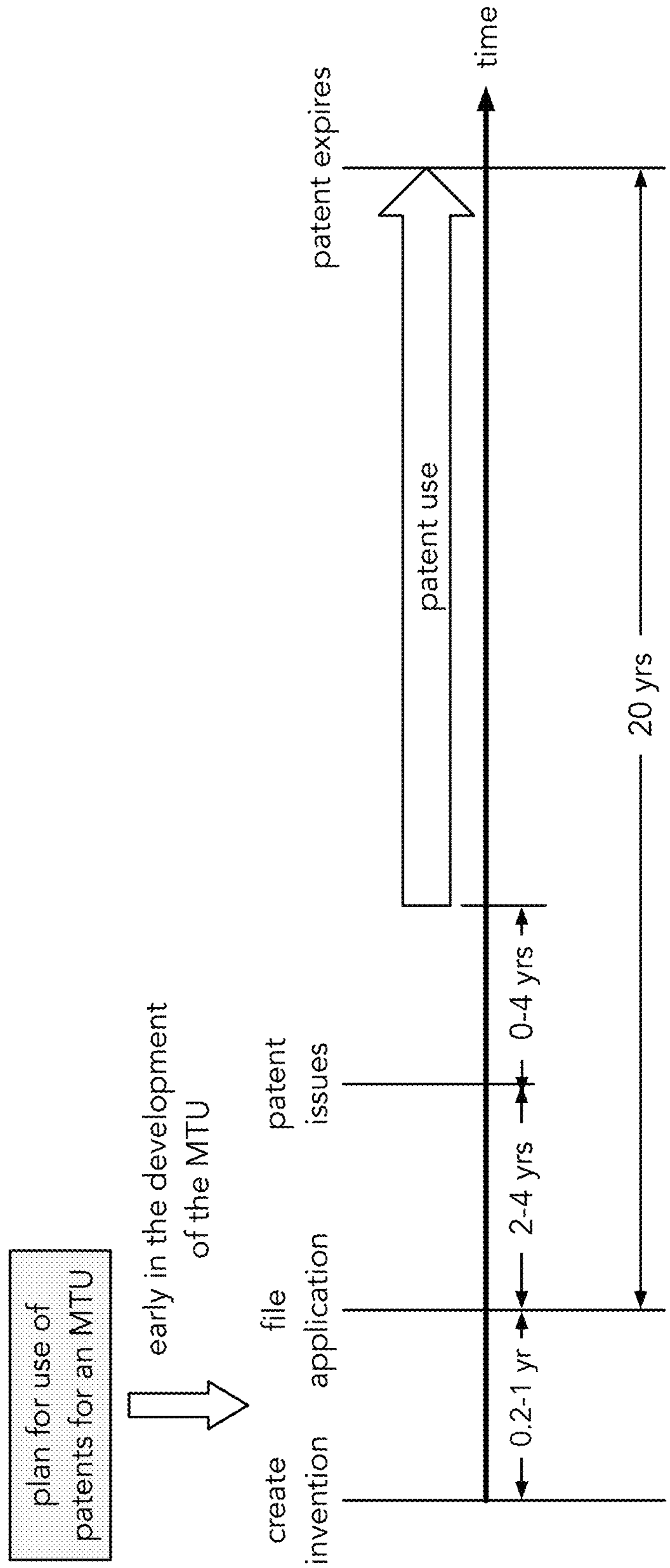
FIG. 275 is a diagram of an example of timing of a patent application and patent regarding an MTU as used by and/or determined by a co-processor of an improved computer for technology.

FIG. 275 is a diagram of an example of timeline for an invention from creation to expiration of an issued patent as used by and/or determined by a co-processor of an improved computer for technology. Within a period of time after the creation of an invention (e.g., 0.2 years to 1 year), a patent application is filed for the invention. The patent protection plan identifies invention types, their corresponding tech challenge to inventive embodiment mapping, and likely time frame for their creation. With this information, the creation of an invention and seeking patent protection for it is planned.

Two to four years after the patent application is filed, it issues. Sometime after the patent issues (e.g., 0 to 4 years or more), it is used. Knowing how the patent will likely be used, helps in shaping the patent protection plan for an MTU.

Figure 276:
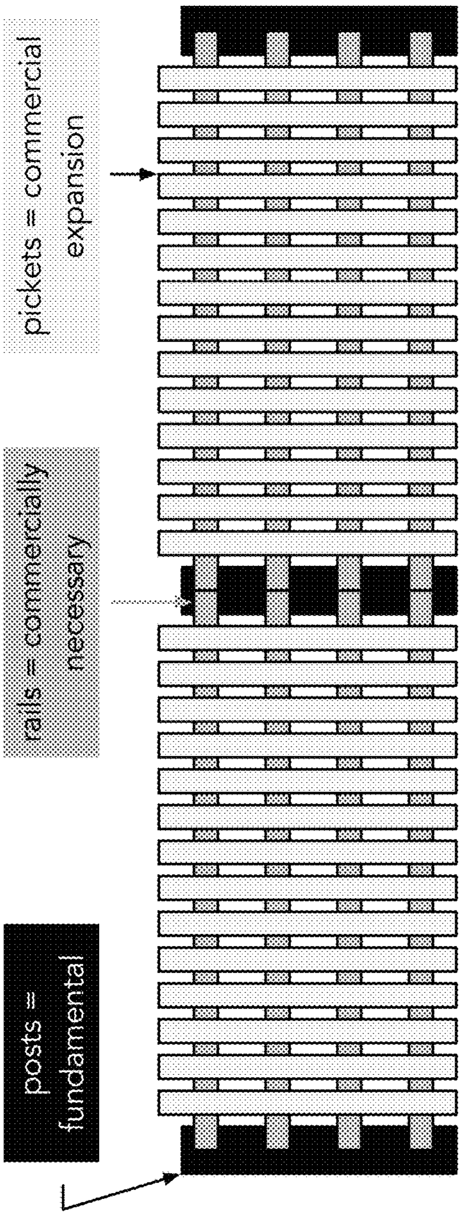
FIG. 276 is a diagram of an example of a well balance and high quality patent portfolio using a fence analogy as would be produced by a co-processor of an improved computer for technology.

FIG. 276 is a diagram of an example of a well balance and high quality patent portfolio using a fence analogy as would be produced by a co-processor of an improved computer for technology. In this example, fundamental inventions are represented as fence posts, commercially necessary inventions are represented by fence rails, and commercial expansion inventions are represented by fence pickets.

Like an actual fence, a patent portfolio is intended to keep others out of a property. The fence should encircle the property and each section should be of equal size and strength. The size and strength of the fence depends on the value of the property being protected. The more valuable, the higher and/or stronger the fence. The more imbalanced the size and strength of each section of a fence, the less effective the fence becomes and making the smaller and weaker sections even more vulnerable.

Figure 277:
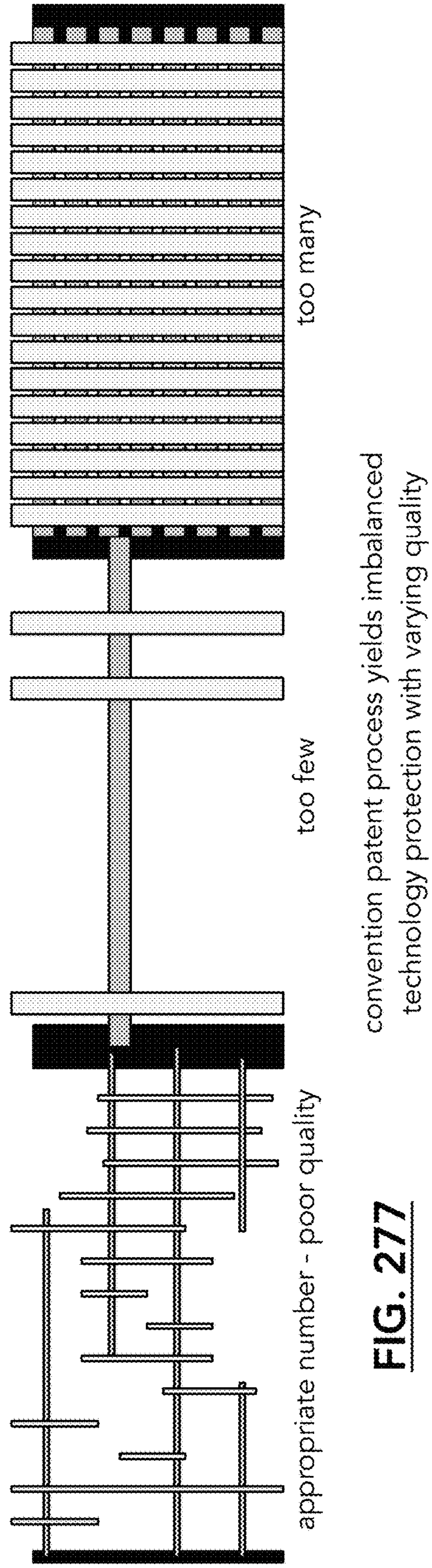
FIG. 277 is a diagram of an example of an imbalanced and varying quality patent portfolio using a fence analogy as would be produced by a conventional patent process.

FIG. 277 is a diagram of an example of an imbalanced and varying quality patent fence analogy as would be produced by a conventional patent process. This example includes three sections of a fence. The first section on the left includes an appropriate number of fence components (e.g., posts, rails, and pickets) but each is of poor quality, which significantly weakens this section of the patent fence.

The second section in the middle includes too few fence components, which significantly weakens this section of the fence. The third section on the right includes too many fence components, which is over strengthens this section of the fence. Thus, if one wanted near unfettered access to at a least a portion of the allegedly protected property, one would access via the first or second sections. An imbalanced patent protection of technology like in this example, adversely affects the value of the technology and compromises the patent position.

Figure 278:
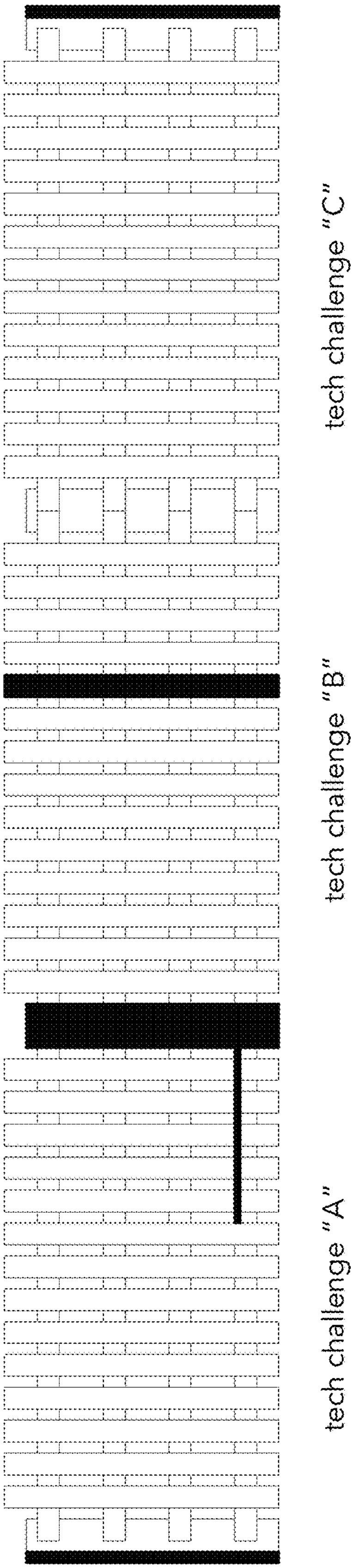
FIG. 278 is a diagram of an example of a weak patent portfolio using a fence analogy as would be produced by a small company using a conventional patent process.

FIG. 278 is a diagram of an example of a weak patent fence analogy as would be produced by a small company using a conventional patent process. In this example, the thin-lined white fence components represent a superior patent position for an MTU that includes tech challenges A, B, and C. Note that a tech challenges helps define the technical boundaries of an MTU.

In this example, the inventions patent protected by the small company are represented by the black fence components. From this example, the few patented inventions provides little barrier to access the property of the MTU. As such, a small company would have a weak to very weak patent position and the value of the MTU is significantly less that it should be.

Figure 279:
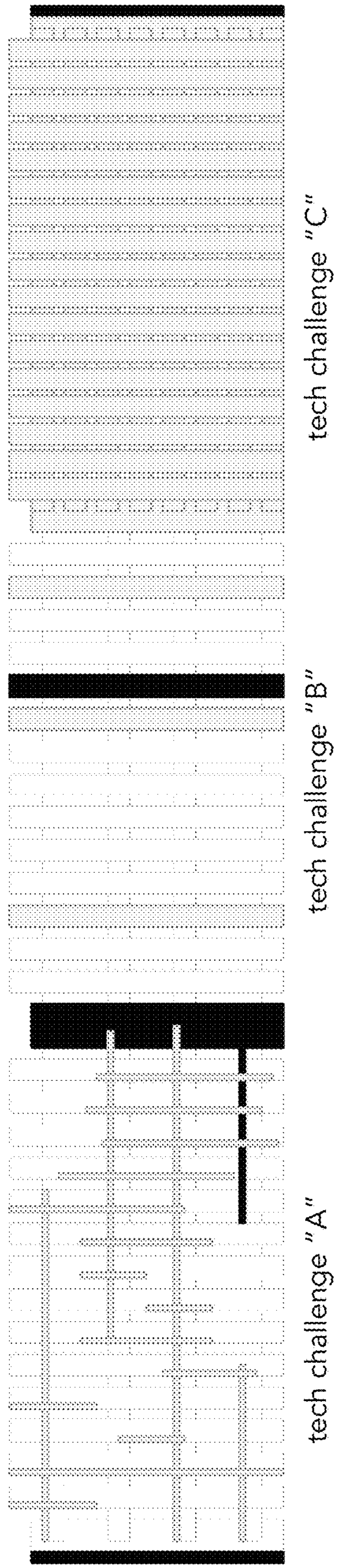
FIG. 279 is a diagram of an example of an imbalanced and varying quality patent portfolio using a fence analogy as would be produced by a large company using a conventional patent process.

FIG. 279 is a diagram of an example of an imbalanced and varying quality patent fence analogy as would be produced by a large company using a conventional patent process. The gray shaded fence components represent those owned by the large company, the black shaded fence components represent those owned by a small company, and the thin-lined white shaded component represent the components of a superior patent position. As in FIG. 277, the first section of the fence for tech challenge A includes an appropriate number of inventions that have poor quality patent protection; the middle section for tech challenge B has too few components; and the third section for tech challenge C has too many components.

Figure 280:
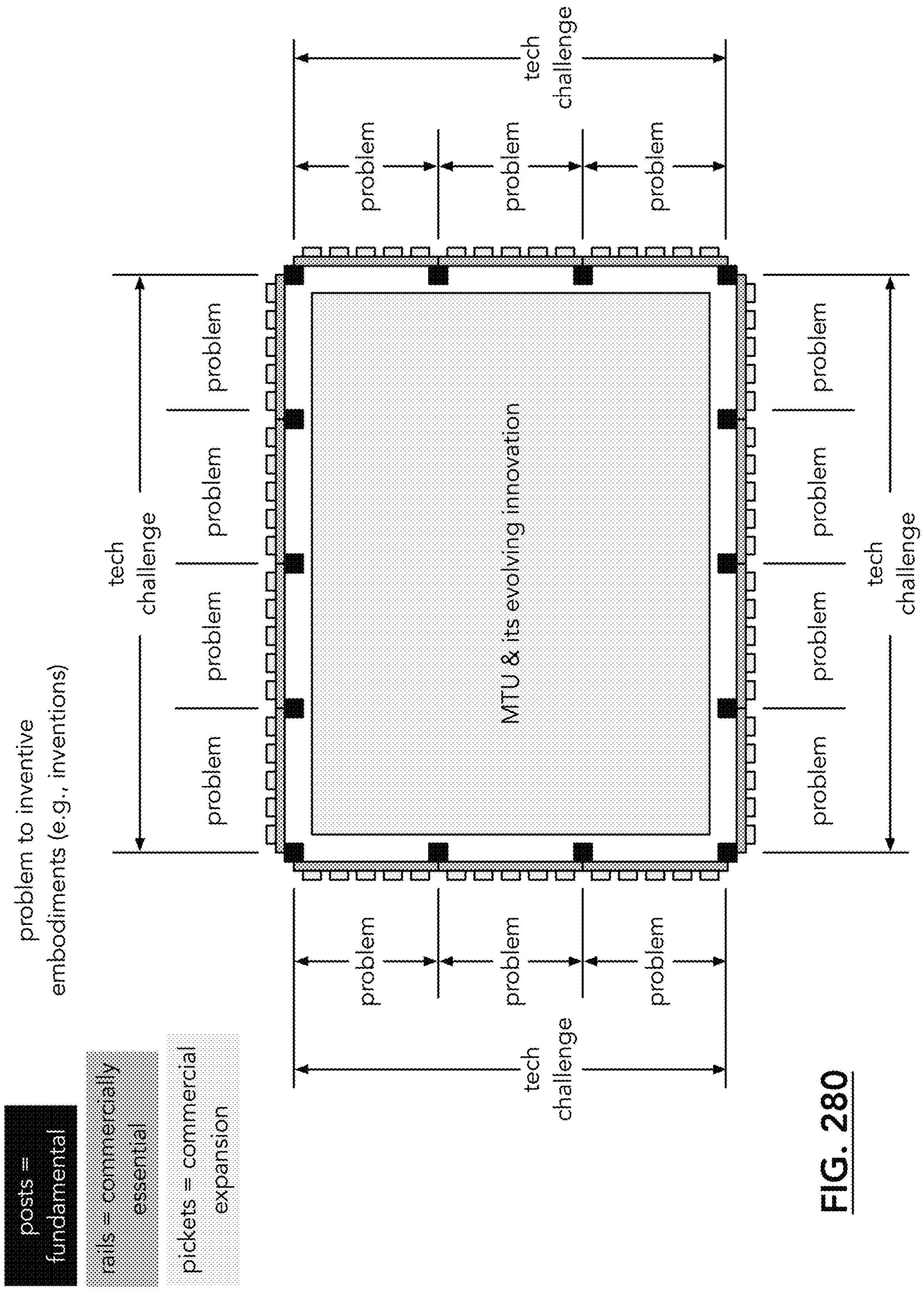
FIG. 280 is a diagram of another example of a well balance and high quality patent portfolio for an MTU using a fence analogy as would be produced by a co-processor of an improved computer for technology.

FIG. 280 is a diagram of another example of a well balance and high quality patent fence analogy for an MTU as would be produced by a co-processor of an improved computer for technology. In this fence analogy that encircles an MTU and its evolving innovation to cover market expansion of the MTU and/or technology expansion of the MTU. Each section of the fence corresponds to a tech challenge, which includes sub-sections for each problem. Each problem sub-section includes one or more inventive embodiments (e.g., inventions of one of the invention types). To create a well-balanced and high quality patent fence around the MTU, technical challenges as identified, and as them emerge, is analyzed to create the tech challenge to inventive embodiment mapping. From this mapping, one or more inventive embodiments per problem is identified for patent protection. The percentage of inventive embodiments for a tech challenge to patent protect varies depending the nature of the tech challenge, the features it enables, and/or the unique value propositions it supports. As an example, a tech challenge that enables highly marketed features that drive sales will have a high percentage of inventive embodiments patent protected (e.g., 50% to 100%). As another example, a tech challenge that does not directly enable marketable features or that does not directly support a UVP, will have a lower percentage of inventive embodiments patent protected (e.g., 10% to 60%).

Figure 281:
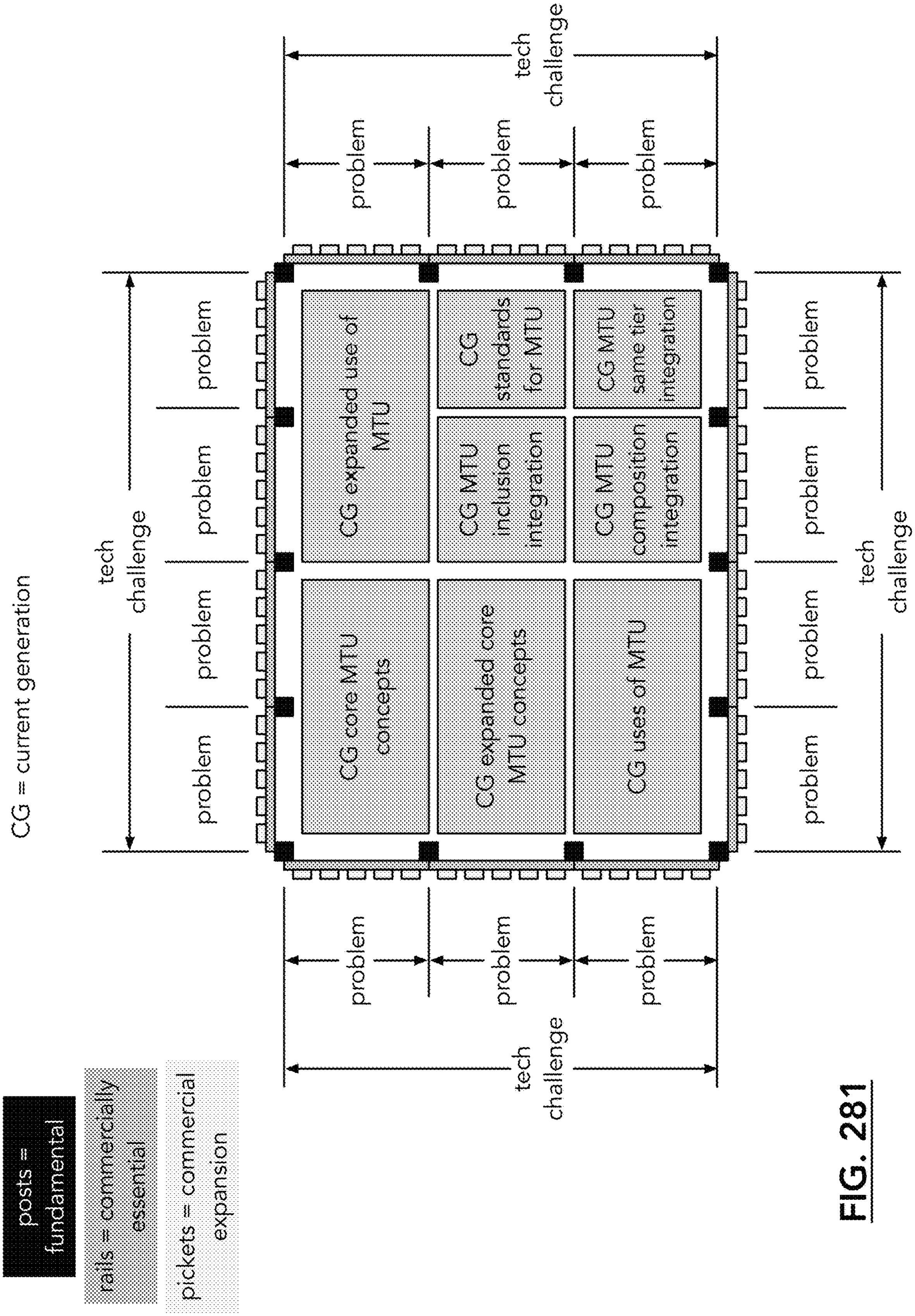
FIG. 281 is a diagram of another example of a well balance and high quality patent portfolio using a fence analogy as would be produced by a co-processor of an improved computer for technology.

FIG. 281 is a diagram of another example of a well balanced and high quality patent fence analogy as would be produced by a co-processor of an improved computer for technology. In this example, the various market and/or technology expansion of a current generation of an MTU comprises the property to be protected. The segments to protect include core concepts of the MTU, expanded core MTU concepts, uses of the MTU, expanded uses of the MTU, MTU inclusion integration, MTU composition integration, standards for MTU, and MTU same tier integration.

Figure 282:
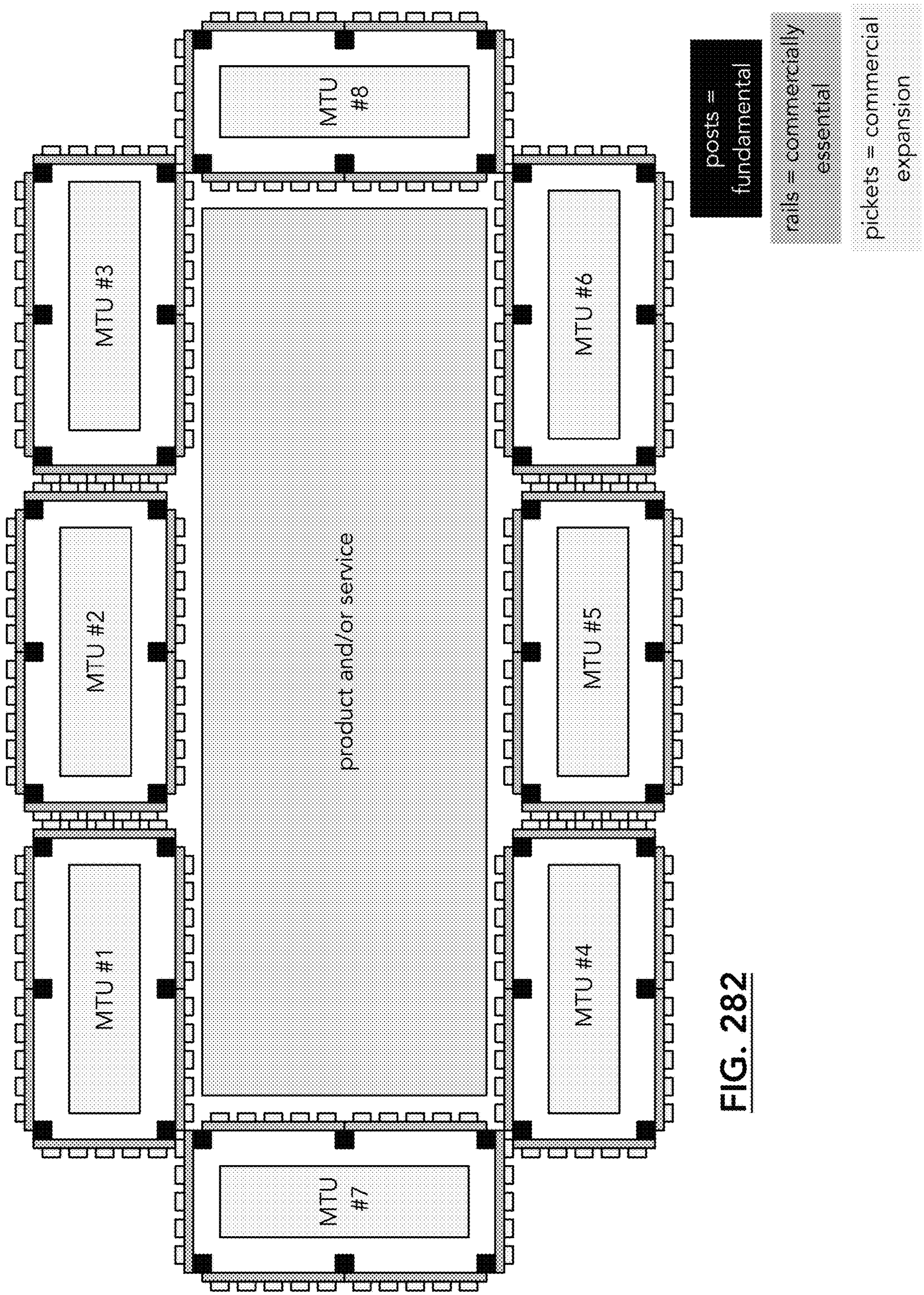
FIG. 282 is a diagram of another example of a well balance and high quality patent portfolio using a fence analogy as would be produced by a co-processor of an improved computer for technology.

FIG. 282 is a diagram of another example of a well balanced and high quality patent fence analogy as would be produced by a co-processor of an improved computer for technology. In this example, eight MTUs constitute a product and/or service. Each of the eight MTUs has its own well-balanced and high quality patent fence. Note that one of the MTUs may be regarding combining the other MTUs to produce the product and/or service.

Figure 283:
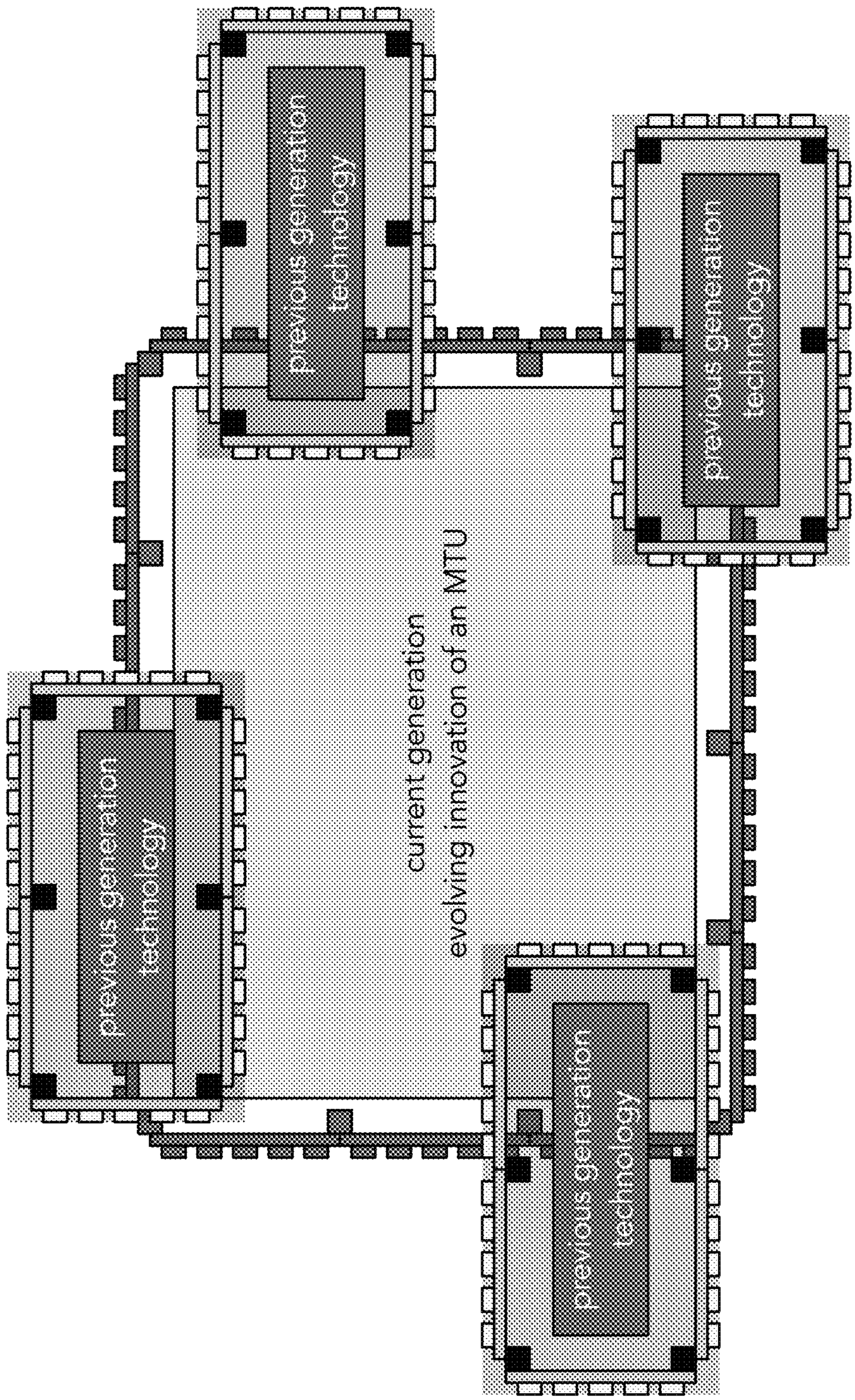
FIG. 283 is a diagram of another example of a well balance and high quality patent portfolio using a fence analogy as would be produced by a co-processor of an improved computer for technology.

FIG. 283 is a diagram of another example of a well balanced and high quality patent fence analogy as would be produced by a co-processor of an improved computer for technology. This example illustrates that a current generation MTU builds on one more previous generation MTUs (e.g., market tech unit that represents a quantified technology).

Figure 284:
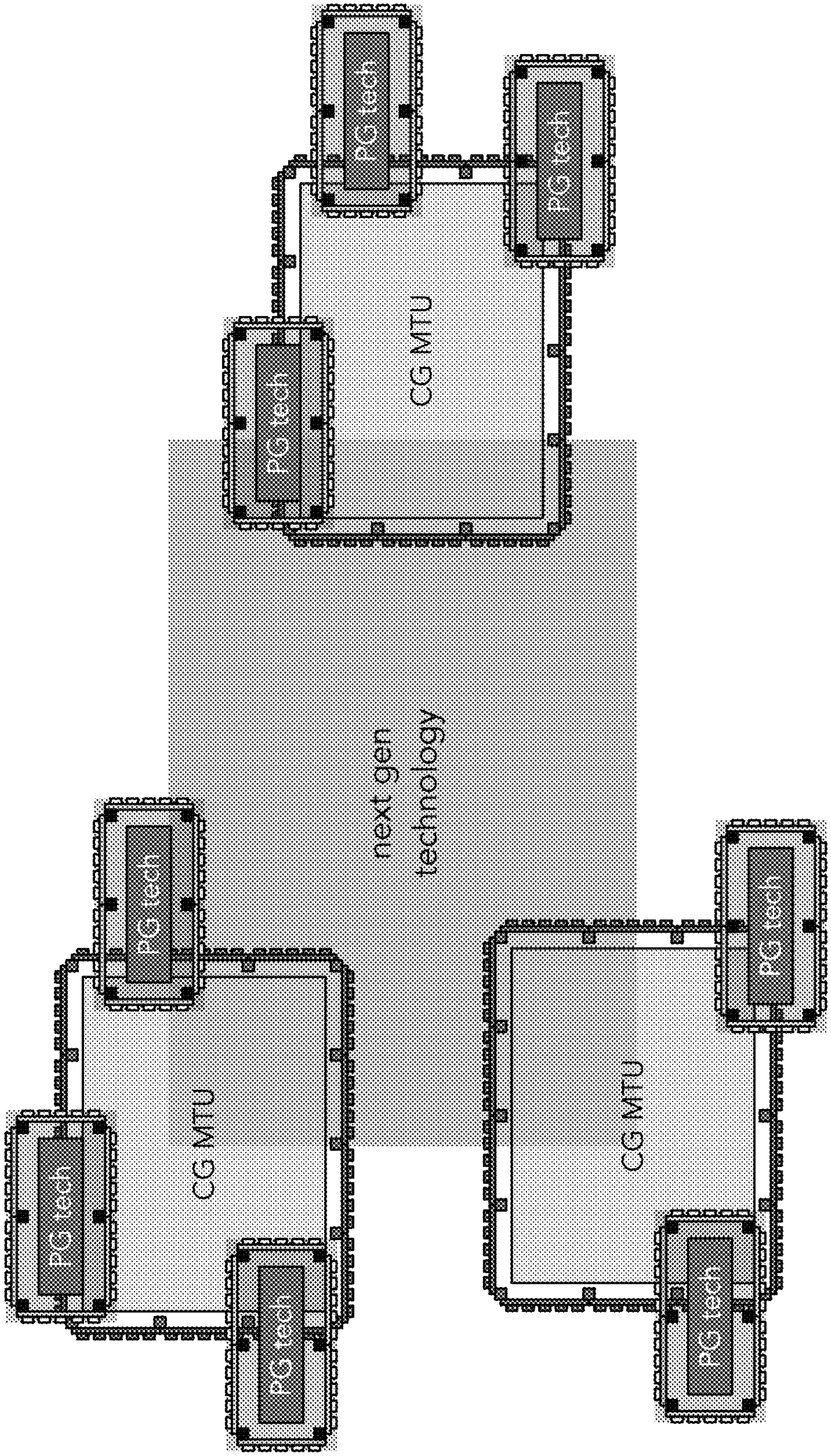
FIG. 284 is a diagram of another example of a well balance and high quality patent portfolio for an MTU using a fence analogy as would be produced by a co-processor of an improved computer for technology.

FIG. 284 is a diagram of another example of a well balanced and high quality patent fence analogy as would be produced by a co-processor of an improved computer for technology. This example illustrates that a next generation MTU builds on one or more current generation MTUs, which build on one more previous generation MTUs (e.g., market tech unit that represents a quantified technology). The evolution of technology from one generation to the next is factored into planning patent protection for an MTU.

Figure 285:
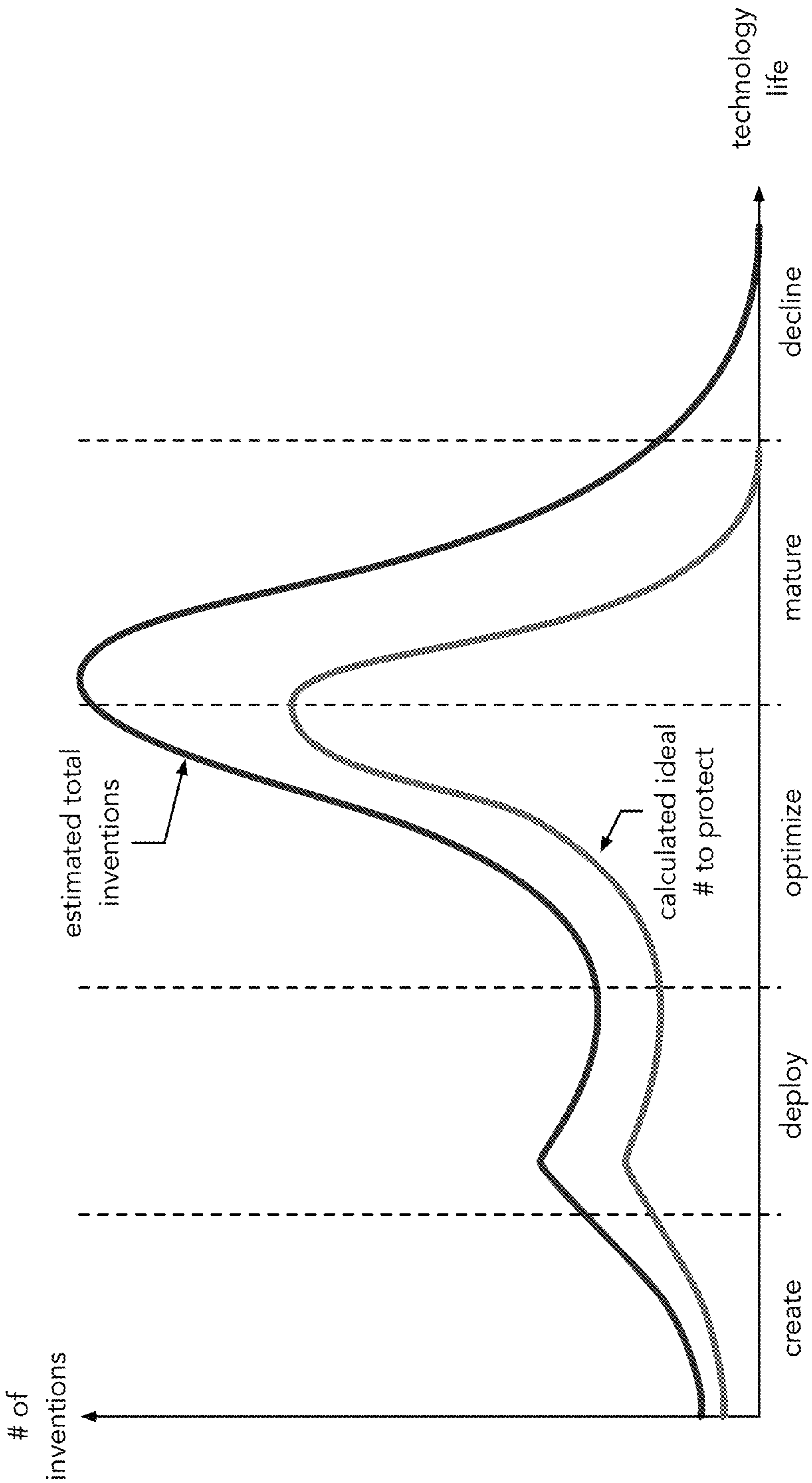
FIG. 285 is a diagram of an example of relative total number of inventions and an ideal number of inventions for an MTU that provide data points for a well balance and high quality patent portfolio as would be produced by a co-processor of an improved computer for technology.

FIG. 285 is a diagram of an example of relative total number of inventions and an ideal number of inventions for an MTU that provide data points for a well balanced and high quality patent portfolio as would be produced by a co-processor of an improved computer for technology. To differentiate between a total number of inventions and an ideal number of inventions, the curve for the total number of inventions is a dark red line and the curve for the ideal number of inventions is a blue line.

The total number of inventions for an MTU is calculated based on the technical challenge to inventive embodiment mapping for each technical challenge of the MTU. The technical challenge to inventive embodiment mapping includes the technology challenge, one or more problems of the technical challenge, one or more solutions per problem, and one or more inventive embodiments. As such, a technical challenge could have one inventive embodiment (e.g., patentable inventions) to tens of inventive embodiments (e.g., 20 to 100).

The improved computer interprets the technical challenge in light of the unique value proposition(s) it supports (directly and indirectly), the marketable features it enables (directly and indirectly), the nature of the technical challenge (e.g., commonalities with other known technical challenges), and/or the documentation defining the technical challenge to calculate the number of problems likely to be solved to fulfill the technical challenge.

The improved computer then defines a problem in terms of one or more inventive concepts based on the data it used to calculate the number of problems. If the data substantiates identifying implementation elements, implementation mechanisms, and implementation variants for an inventive concept, the improved computer calculates them and calculates solutions that can likely be derived therefrom. If the data does not substantiate making a calculation, the improved computer estimates a number of implementation elements, a number of implementation mechanisms, and a number of implementation variants. From there, the improved computer estimates the number of solutions that be derived therefrom. The estimations are based on historical data of comparable technical challenges (e.g., reducing power consumption of a battery-powered watch is comparable to reducing power consumption of a battery-power vehicle). The more comparable technical challenges to draw from, the more accurate the estimate will likely be.

The improved computer continues the estimations down to the inventive embodiment level for each of the solutions for each of the inventive concepts for each of the problems of a technical challenges. The improved computer sums the estimated number of inventive embodiments for each of the technical challenges to produce a total number of inventions. The improved computer then maps the total number of inventions to a normalized invention S-curve.

The improved computer calculates the ideal number of inventions that are likely to be patent protected as discussed above. As technical challenges evolve, as new technical challenges emerge, as problems per technical challenge evolve, as problems for a technical challenge emerge, and so on, the improved computer updates the total number of inventions likely to be invented and the ideal number of inventions to patent protect.

Figure 286:
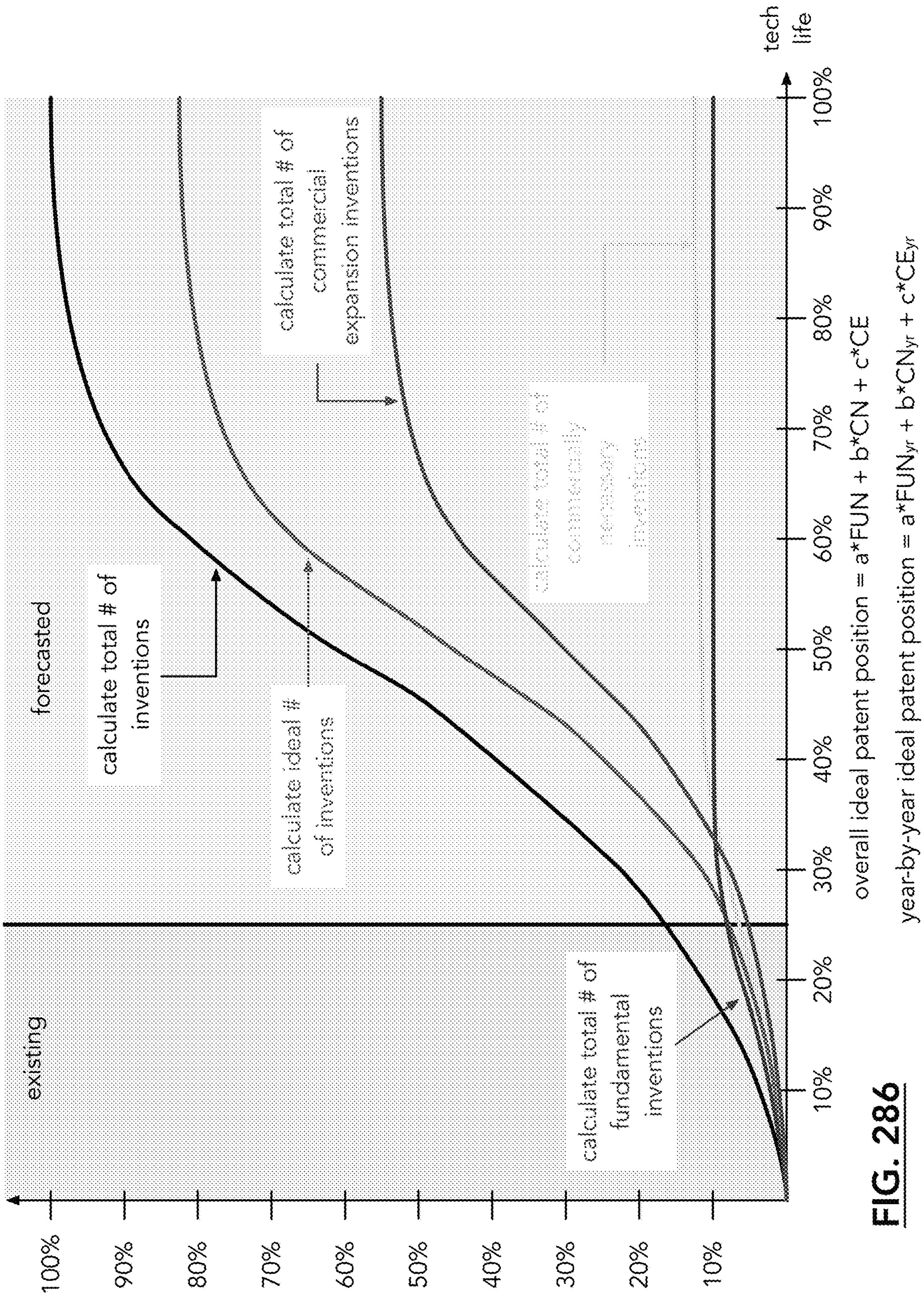
FIG. 286 is a diagram of another example of relative total number of inventions and an ideal number of inventions for an MTU that provide data points for a well balance and high quality patent portfolio as would be produced by a co-processor of an improved computer for technology.

FIG. 286 is a diagram of another example of relative total number of inventions and an ideal number of inventions for an MTU that provide data points for a well balance and high quality patent portfolio as would be produced by a co-processor of an improved computer for technology. To differentiate between a total number of inventions, an ideal number of inventions, fundamental inventions, commercially necessary inventions, and commercial expansion inventions, the curve for the total number of inventions is a black line, the curve for the ideal number of inventions is a red line, the curve for the fundamental inventions is a blue line, the curve for the commercially necessary inventions is a gold line, and the curve for the commercial expansion inventions is a purple line.

The curves are representative of cumulative inventions over time. The total number of inventions is calculated as discussed above. From the total number of inventions and invention type data, the improved computer calculates the total number of fundamental inventions, the total number of commercially necessary inventions, and the total number of commercial expansion inventions. Generally, about 7.5% of the total inventions are fundamental and are typically created in the create and deploy phases, which account for about 20% to 25% of the life of the MTU; about 12.5% of the total inventions are commercially necessary and are typically created in the create deploy, and early optimize phases, which account for about 25% to 35% of the life of the MTU; and about 80% of the total inventions are commercial expansion and are typically created in the deploy through mature phases, which account for about 70% to 75% of the life of the MTU. From these estimates, when about 70% of the life has expired, over 90% of the inventing has been done.

In this example, the ideal patent number is calculated from the total number of fundamental inventions, the total number of commercially necessary, and the total number of commercial expansion. In equation form, the ideal number=a*FUN+b*CN+c*CE. The coefficients corresponds to percentage of the invention types that are likely to be patent protected. For example, "a" ranges from 75% to 100%; "b" ranges from 60% to 100%; and "c" ranges from 40% to 90%. The improved computer determines the value for the coefficients based on a variety of factors, including, but not limited to, patenting traits of the entities developing the MTU, market impact of MTU, level of disruption, life of the MTU, versatility of the MTU, etc.

Figure 287:
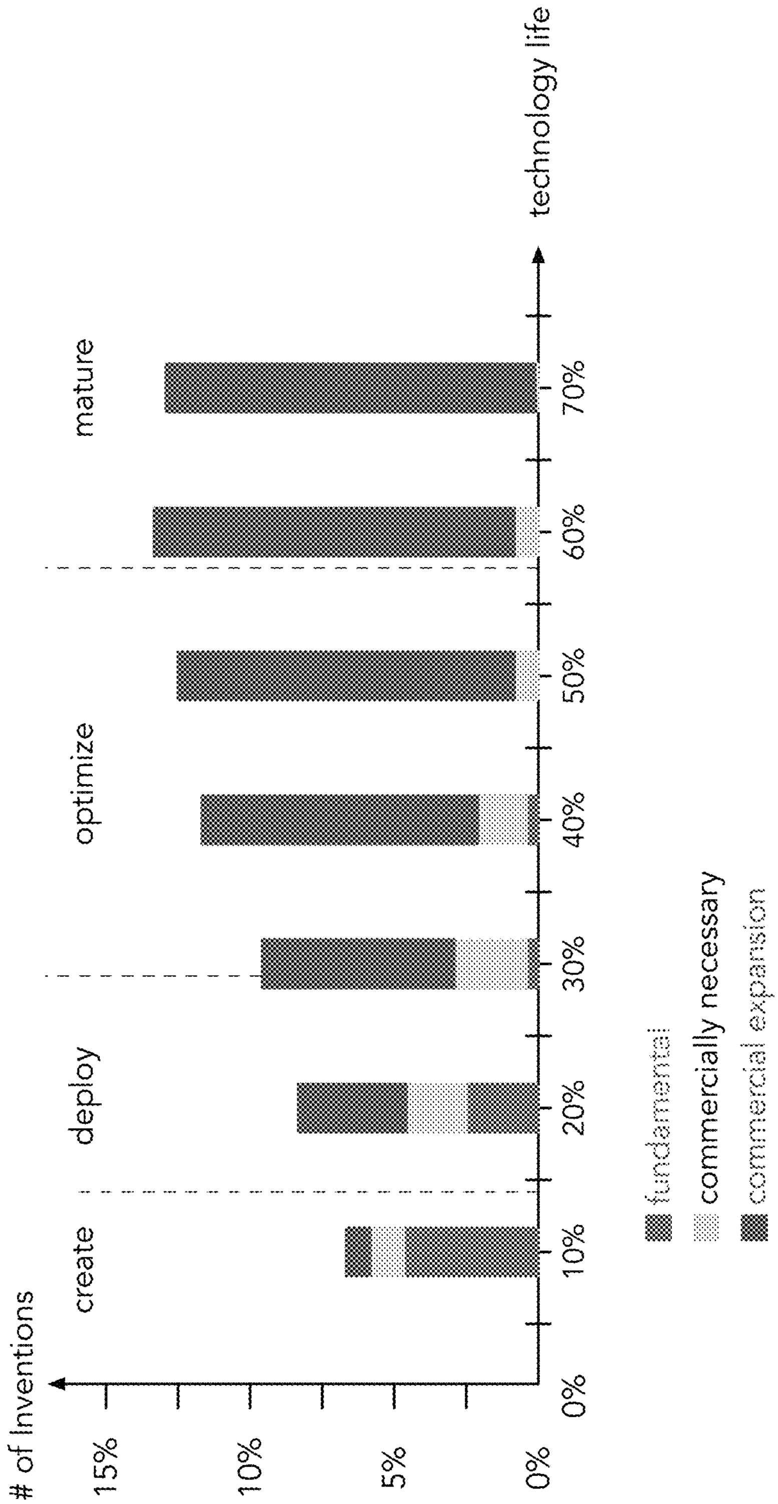
FIG. 287 is a diagram of an example of invention type quantity and timing for inventions of an MTU that provide data points for a well balance and high quality patent portfolio as would be produced by a co-processor of an improved computer for technology.

FIG. 287 is a diagram of an example of invention type quantity and timing for inventions of an MTU that provide data points for a well balance and high quality patent portfolio as would be produced by a co-processor of an improved computer for technology. In this example, the number of inventions is plotted against the technology life, both of which are expressed in percentages. To differentiate between fundamental inventions, commercially necessary inventions, and commercial expansion inventions, data regarding fundamental inventions is colored blue, data regarding commercially necessary invention is colored gold, and data regarding commercial expansion is colored red.

As shown in this figure, the blue fundamental inventions are created early in the technology life and very few, if any, occur beyond the 40% of the technology life expiring. As is also shown, the gold commercially necessary inventions are created early in the technology life and very few, if any, occur beyond the 60% of the technology life expiring. As is further shown, the red commercial expansion inventions are created throughout the technology life, peaking at the end of the optimize and the beginning of the mature phase. The red commercial expansion inventions also account for a majority of all inventions (e.g., about 70% to 85%).

Figure 288:
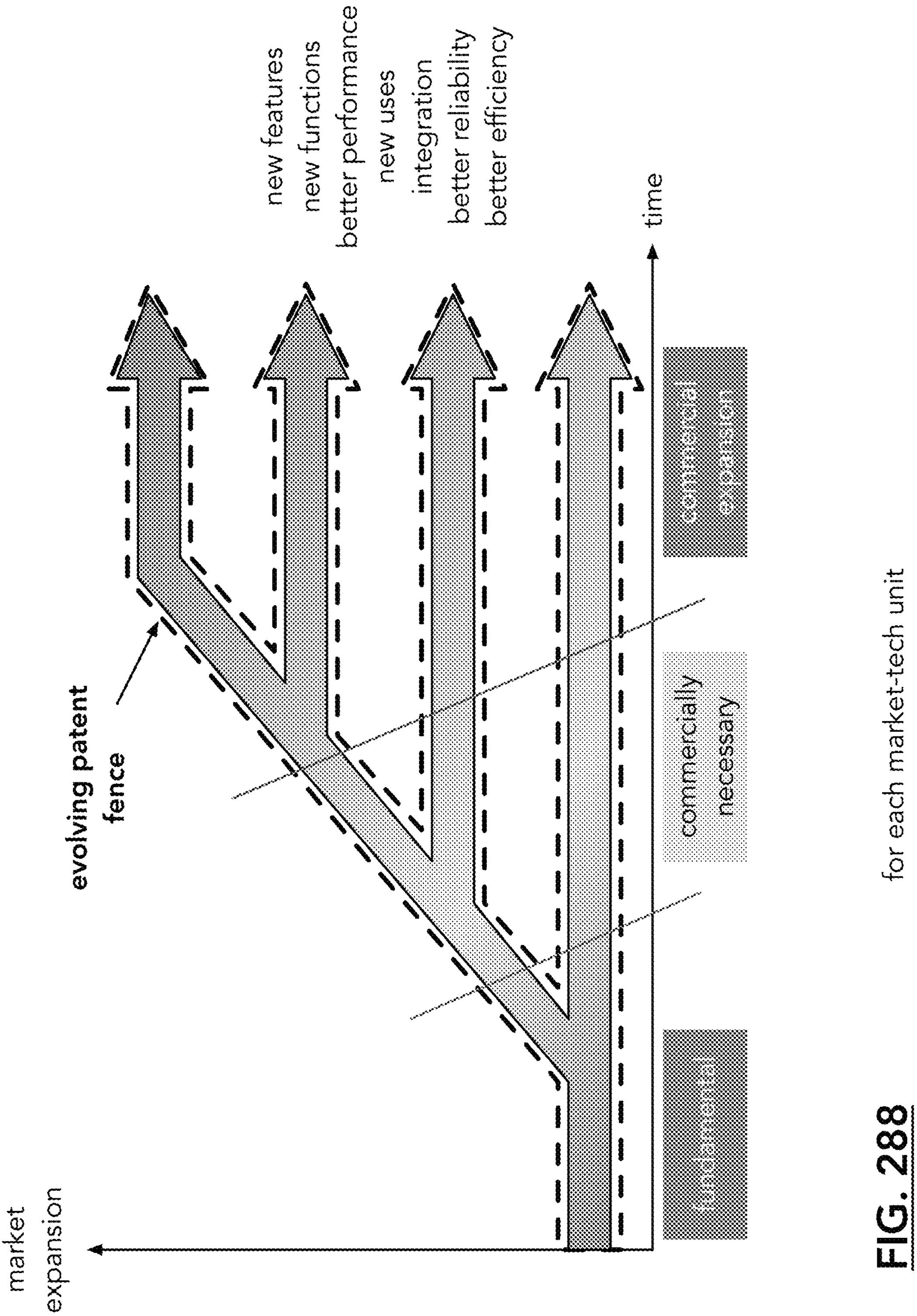
FIG. 288 is a diagram of another example of invention type quantity and timing for inventions of an MTU that provide data points for a well balance and high quality patent portfolio as would be produced by a co-processor of an improved computer for technology.

FIG. 288 is a diagram of another example of invention type quantity and timing for inventions of an MTU that provide data points for a well balanced and high quality patent portfolio as would be produced by a co-processor of an improved computer for technology. This diagram illustrates market expansion of a MTU over time. When an MTU is first conceived, it is conceived for a particular purpose (e.g., as a new product, as a component of a new product, as a component of an improved product, etc.).

Accordingly, the technical problem(s) and corresponding inventive embodiment mapping is based on the core concepts for the MTU. The improved computer expands on the core concepts of the MTU by estimating the likelihood of new features, new functions, improved performance, new uses, vertical and/or horizontal integration, better reliability, better efficiency, and/or other expansions of the core concepts. As discussed above, as time passes, the concentration of invention type changes. Early in the life of the MTU, the blue fundamental inventions are most prevalent. As time passes, the blue fundamental inventions fade from dominance and the gold commercially necessary inventions are most dominant. As more time passes, the gold commercially necessary inventions fade, and the red commercial expansion inventions dominate.

Figure 289:
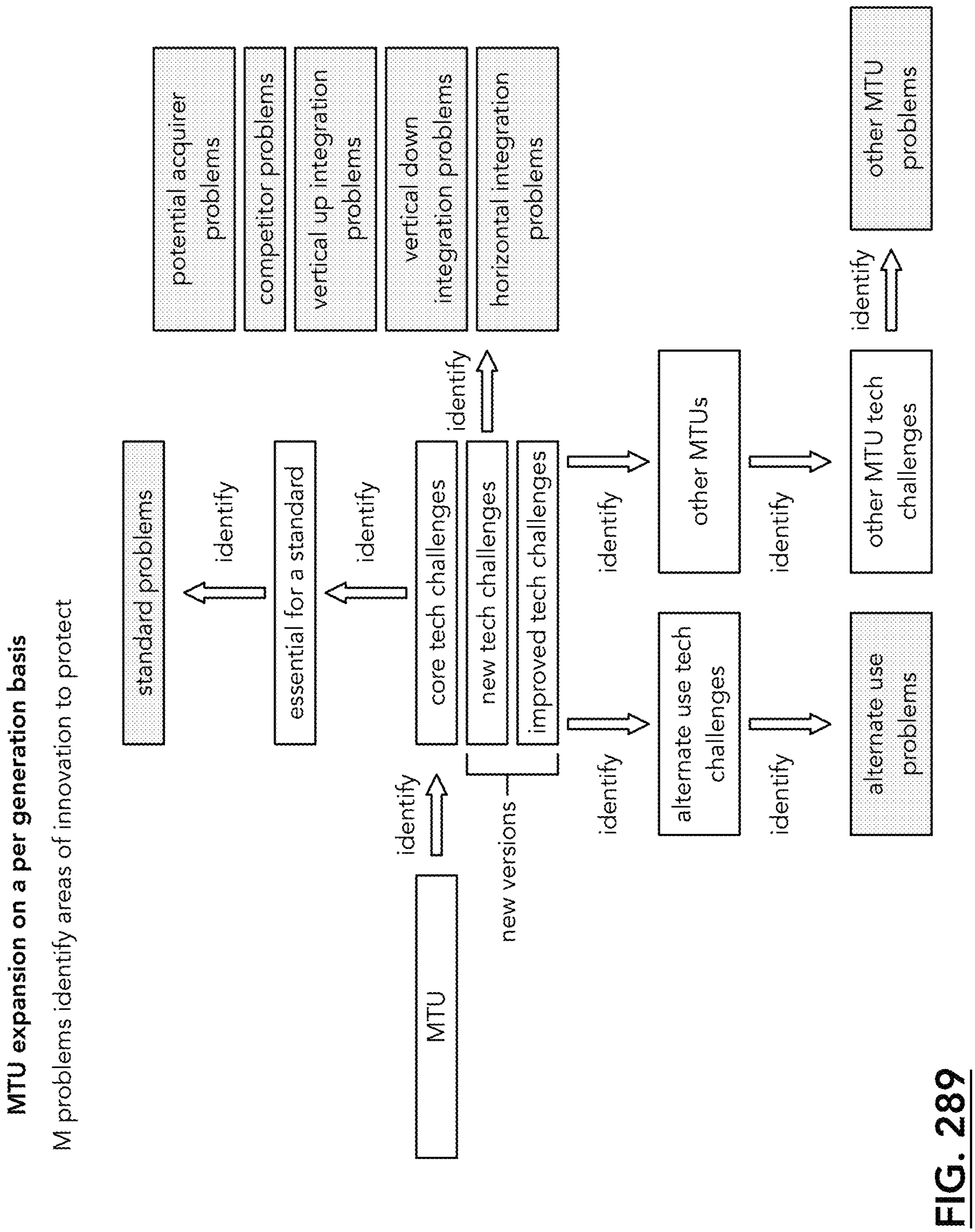
FIG. 289 is a diagram of an example of expanding inventions of a tech challenge associated with an MTU that provide data points for a well balance and high quality patent portfolio as would be produced by a co-processor of an improved computer for technology.

FIG. 289 is a diagram of an example of expanding inventions of a tech challenge associated with an MTU that provide data points for a well balanced and high quality patent portfolio as would be produced by a co-processor of an improved computer for technology. In this diagram for an MTU, the initial core tech challenges are identified. The improved computer analyzes the core tech challenges to determine if one or more of them may relate to an existing standard or have the potential to be part of a new standard. For example, if the tech challenge is related to digital communication between two devices, which do not have to be manufactured by the same entity, then there is a potential that the digital communication could become a standard.

For tech challenges that relate, or potentially relate, to a standard, the problems are identified. Each problem is analyzed by the improved computer to determine if would be essential to the standard or not essential but likely commercially necessary. The improved computer records the resulting analysis in the MTU's database record.

The improved computer attempts to calculate new tech challenges from the core tech challenges. The new tech challenges, or problems thereof, can relate to potential acquirer integration of the MTU, competitor use of comparable MTUs, vertical up or down integration (e.g., MTU inclusion of MTU composition), and/or horizontal integration.

The improved computer further attempts to calculate improved tech challenges from the core tech challenges. For example, the improved computer attempts to calculate alternate uses of the MTU and/or the core tech challenges being applicable to other MTUs. If so, the improved computer calculates alternate use problems and/or other MTU problems.

Figure 290:
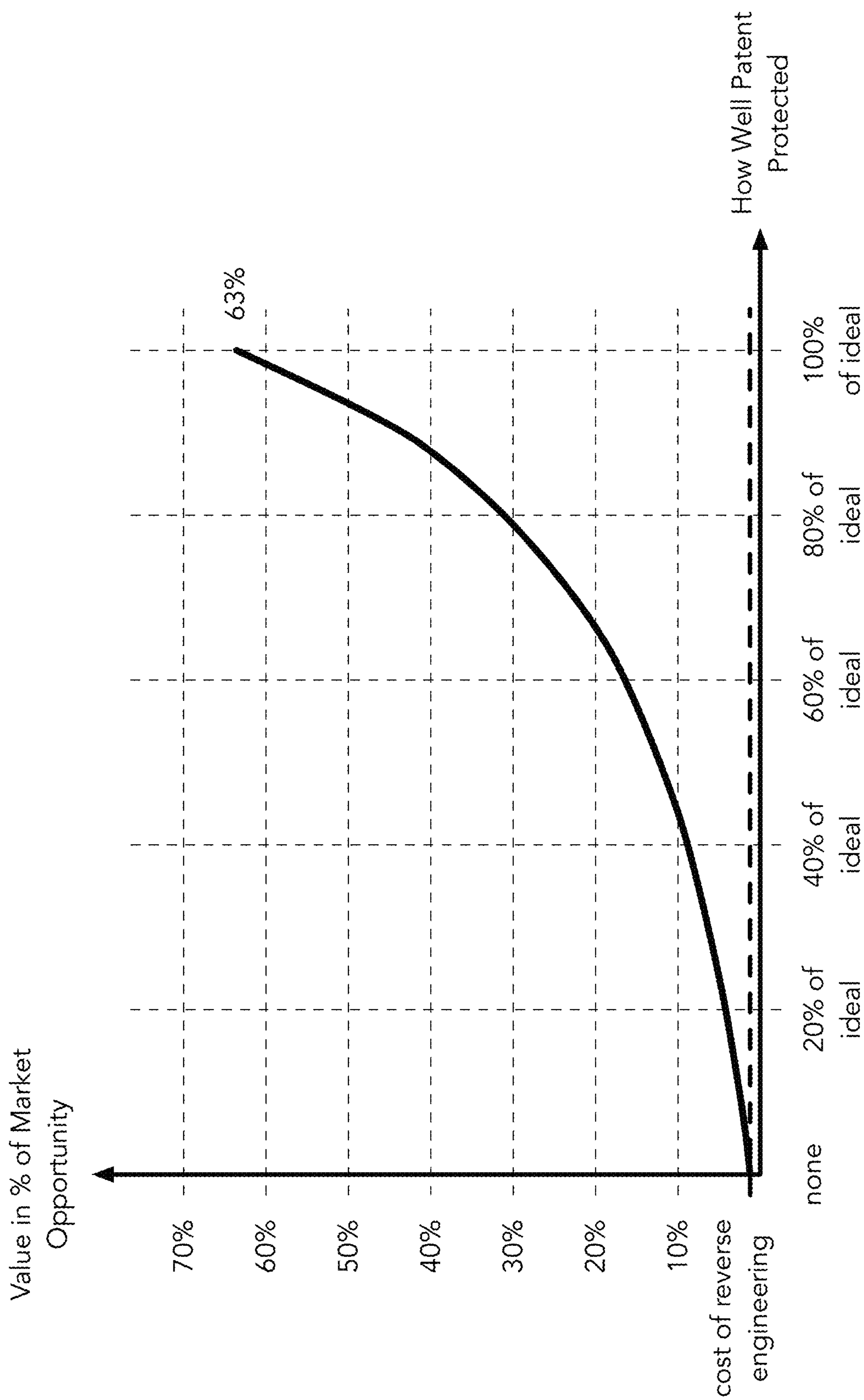
FIG. 290 is a diagram of an example of a graph that plots how well an MTU is patent protected with respect to its value as used by and/or determined by a co-processor of an improved computer for technology.

FIG. 290 is a diagram of an example of a graph that plots how well an MTU is patent protected with respect to its value as used by and/or determined by a co-processor of an improved computer for technology. This is an example for an evolutionary type products that includes one or more MTU. The graph plots how well patent protect in percentage of the ideal number of inventions to patent protect versus the value of the MTUs of the product in percentage of the market opportunity (e.g., a portion of the TAM or the SOM).

As mentioned, the value of an MTU without patent protection is the cost of reverse engineering. For this example, as the percentage of ideal number increases, the value increases. Recall that the ideal number corresponds to inventions of the total number of inventions over the life of the MTU to be patent protected. Thus, 100% of ideal is all of the inventions patent protected for the life of technology. A superior patent position can be generally obtained with a 35% to 60% of ideal number of inventions patent protected.

Figure 291:
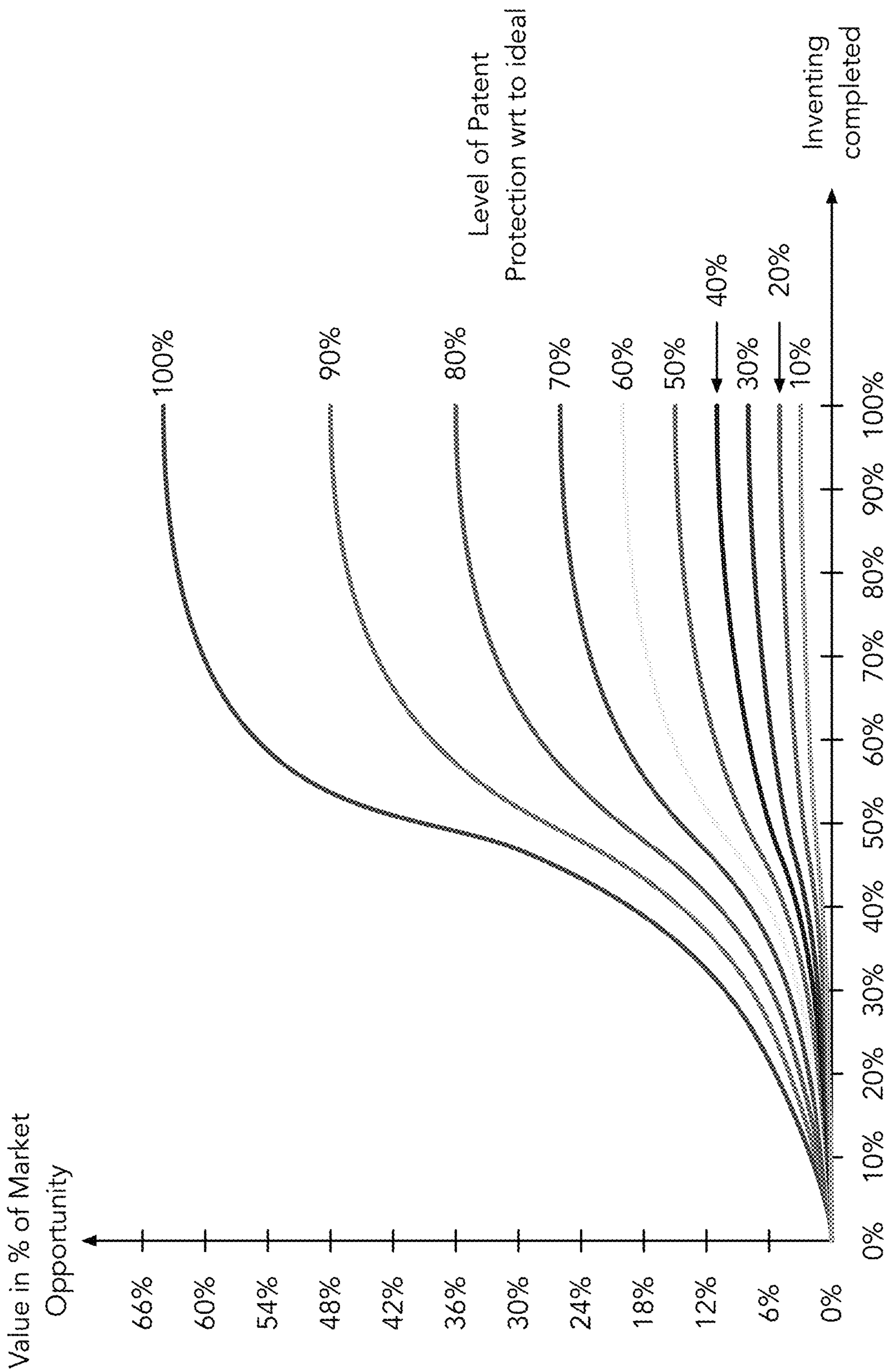
FIG. 291 is a diagram of an example of a graph that plots various levels of how well an MTU is patent protected with respect to its value as used by and/or determined by a co-processor of an improved computer for technology.

FIG. 291 is a diagram of an example of a graph that plots various levels of how well an MTU is patent protected with respect to its value as used by and/or determined by a co-processor of an improved computer for technology. This graph plots an MTU's value as a percentage of market opportunity versus inventing completed, where both axis are labeled with percentage. The various curves represent different levels of patent protection with respect to the ideal number of inventions based on the example of FIG. 290.

Color is used to differentiate the curves. A dark green line represents 100% of ideal; a blue line represents 90% of ideal; a red line represents 80% of ideal; a purple line represents 70% of ideal; a yellow line represents 60% of ideal; a green line represents 50% of ideal; a dark blue line represents 30% of ideal; a brown line represents 30% of ideal; a light purple line represents 20% of ideal; and an orange line represents 10% of ideal.

Each of the curves (10% to 100% of ideal) is calculated based on the equation of c*(1/[1+e^x]), where x=a*(inventing percentage −0.35), where "a" is an S-curve shaping factor that is a number greater than equal to or greater than 5.0 and "c" is a scaling factor based on the percentage of ideal and a tech driven market differentiator factor "f". The value for "f" ranges from 0.01 to 1.0, where a value of 1.0 indicates that all of the market value of is because of the technology of the MTU. For an evolutionary technology, the "f" factor is likely to be in the range of 0.3 to 0.7. The "c" coefficient is calculated based on the "f" factor and the percentage of ideal. For example, c=f*(ideal percentage)^m, where "m" is equal to or greater than 1 and represents the level of competition in the marketplace and what it takes to have a superior patent position.

Figure 292:
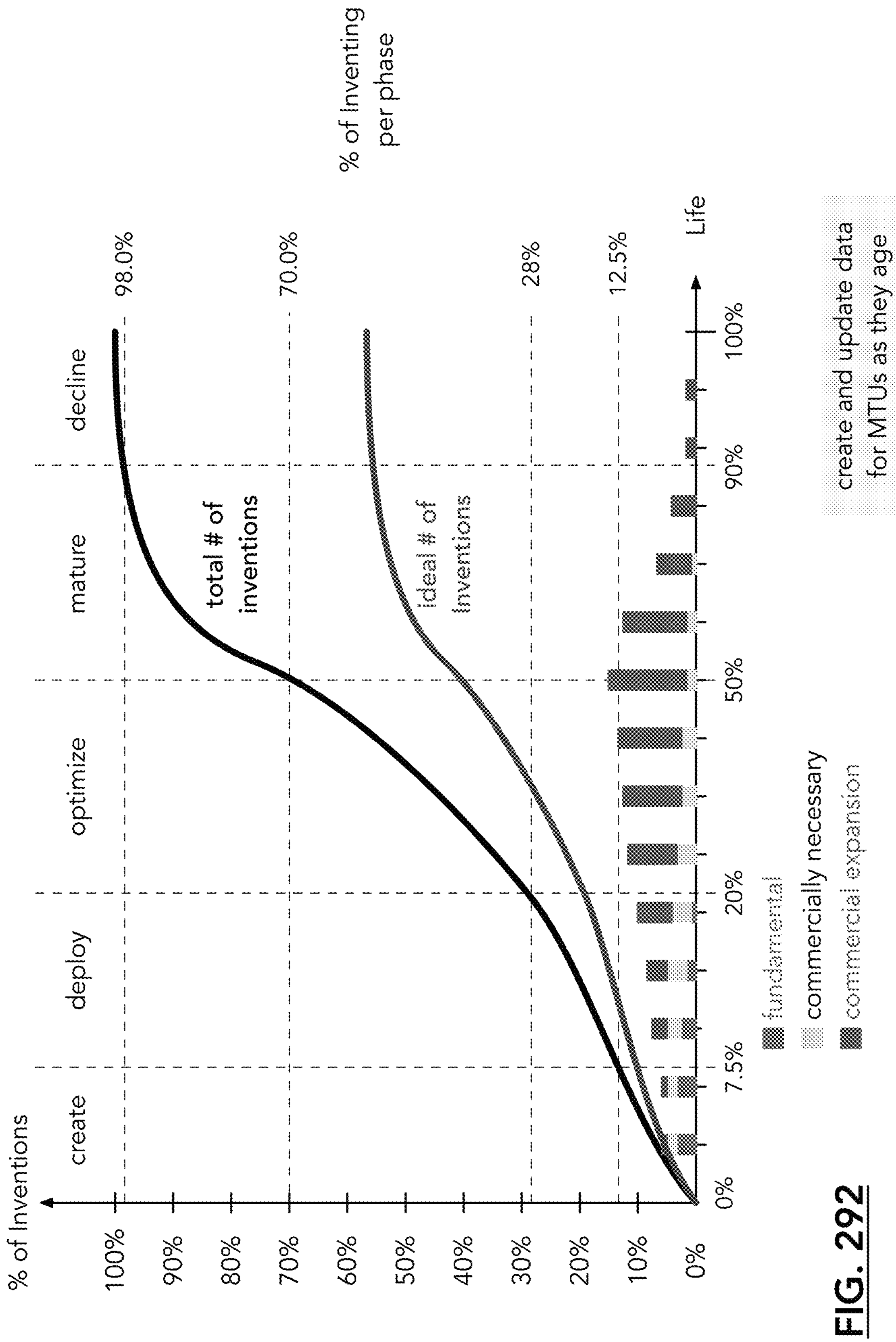
FIG. 292 is a diagram of another example of invention type quantity and timing for inventions of an MTU that provide data points for a well balance and high quality patent portfolio as would be produced by a co-processor of an improved computer for technology.

FIG. 292 is a diagram of another example of invention type quantity and timing for inventions of an MTU that provide data points for a well balance and high quality patent portfolio as would be produced by a co-processor of an improved computer for technology. The graph of this figure plots percentage of inventions versus percentage of technology (MTU) life. The plotted data is for cumulative total number of inventions to be created, cumulative ideal number of inventions to patent protect, time based relative quantity of fundamental inventions to be created, time based relative quantity of commercially necessary inventions to be created, and time based relative quantity of commercial expansion inventions to be created.

To differentiate between fundamental inventions, commercially necessary inventions, and commercial expansion inventions, data regarding fundamental inventions is colored blue, data regarding commercially necessary invention is colored gold, and data regarding commercial expansion is colored red. To differential between the total number and ideal number of inventions, a black line represents the total number of inventions to be created and a purple line represents the ideal number of inventions to be patent protected.

The graph indicates that about 70% of inventions will be created within the first half of the technologies life and that it occurs somewhere in the late optimize phase or the early mature phase. The graph also indicates that almost all of the creation of fundamental inventions occur within the first 20% of life, which corresponds to the create phase and at least a portion of the deploy phase. The graph also indicates the relative quantities and timing for the creation of commercially necessary inventions and commercial expansion inventions.

The improved computer uses this data in a variety of ways. For example, the improved computer uses this data based on the current date to determine the percentage of life that has transpired to date, the total number of inventions that should have been created to date and broken down based on invention types, and the ideal number of inventions that should have some form of patent protection to date and broken down based on invention type. As a further example, the improved computer uses the "to date" data to determine what level of patent position can be achieved going forward.

FIG. 293 is a diagram of an example of relative use weighting of various invention types as used by and/or determined by a co-processor of an improved computer for technology. The invention types includes fundamental, commercially necessary, and commercial expansion as previously discussed. The relative use weighting factor is reflective of an answer to the question of "can a comparable and commercially viable product or service be made without using the patented invention types?"

In general, it would be very difficult to create a comparable and commercially viable product without using most of the fundamental inventions, thus it gets a higher score than the other two invention types. It would be difficult to create a comparable and commercially viable product without using a majority of the commercially necessary inventions, thus it gets a higher score than the commercial expansion but a lower score than fundamental inventions. Since commercial expansion inventions expand the features, functions, uses, etc. it's probable that a comparable and commercially viable product can be created without using a majority of commercial expansion inventions. It is not probable that a comparable and commercially viable product can be created without using some of the commercial expansion inventions.

For this example, fundamental inventions have a use weighting factor of 4.5; commercially necessary inventions have a use weighting factor of 2.5; and commercial expansion inventions have a use weighting factor of 1.0. As such, a fundamental invention is 4.5 times more likely to be used than a commercial expansion invention and a commercially necessary invention is 2.5 times more likely to be used than a commercial expansion invention.

This example also shows the percentage range of invention types of the total number of inventions to be created. For example, fundamental inventions typically account for 7.5% to 10% of the total number of inventions to be created over the life of an MTU; commercially necessary inventions typically account for 10.0 to 14.5% of the total number of inventions; and commercial expansion inventions typically account for 75.5% to 82.5% of the total number of inventions.

Figure 294:
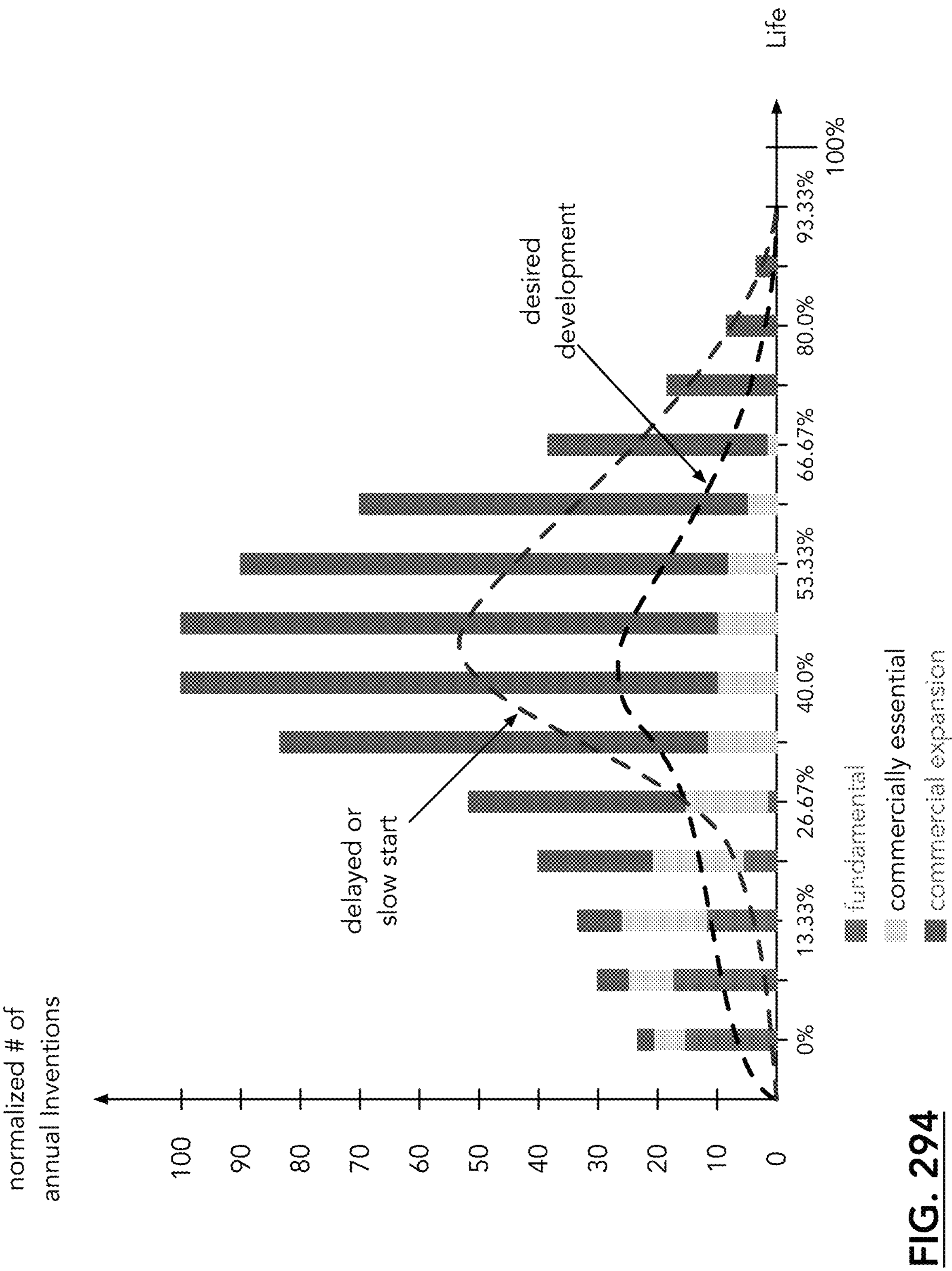
FIG. 294 is a diagram of another example of invention type quantity and timing for inventions of an MTU that provide data points for a well balance and high quality patent portfolio as would be produced by a co-processor of an improved computer for technology.

FIG. 294 is a diagram of another example of invention types' quantity and timing for inventions of an MTU that provide data points for a well balanced and high quality patent portfolio as would be produced by a co-processor of an improved computer for technology. In this example, a normalized annual number of inventions is plotted against the technology life. To differentiate between fundamental inventions, commercially necessary inventions, and commercial expansion inventions, data regarding fundamental inventions is colored blue, data regarding commercially necessary invention is colored gold, and data regarding commercial expansion is colored red.

The graph also includes two curves: one for a desired patent protection development plan and the other for a delayed start in patent protecting inventions. Once the opportunity for patent protection has passed (e.g., the invention has been publicly disclosed and is barred by patent law), it cannot be recaptured. With a slow start, many of the fundamental inventions and commercially necessary inventions are no longer able to be patented. Thus, to make up for it, more commercial expansion inventions need to be patented to achieve a desired patent position.

As an example, with a desired start and with the desire of building a superior patent portfolio, an architectural patent protection plan would target patenting 40% to 60% of the ideal number of fundamental inventions, 30% to 50% of the ideal number of commercially necessary inventions, and 15% to 35% of the ideal number of commercial expansion inventions. As another example, with a delayed start and with the desire of building a superior patent portfolio, an architectural patent protection plan could target patenting only 5% of the ideal number of fundamental inventions, could target patenting only 10% of the ideal number of commercially necessary inventions, and would have to make up for it by targeting 35% to 65% of the ideal number of commercial expansion inventions.

Figure 295:
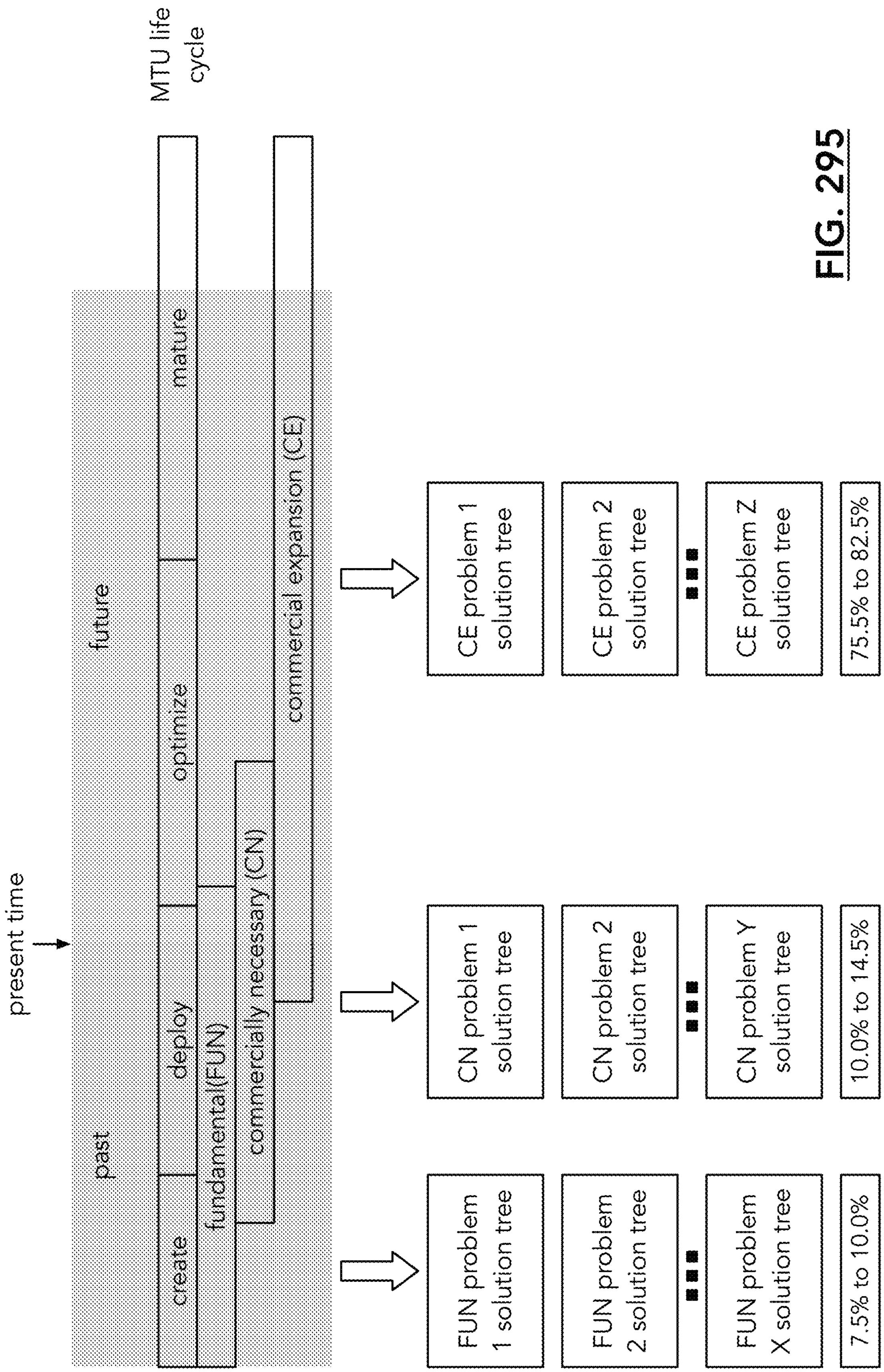
FIG. 295 is a diagram of another example of invention type quantity and timing for inventions of an MTU that provide data points for a well balance and high quality patent portfolio as would be produced by a co-processor of an improved computer for technology.

FIG. 295 is a diagram of another example of invention type quantity and timing for inventions of an MTU that provide data points for a well balance and high quality patent portfolio as would be produced by a co-processor of an improved computer for technology. The diagram includes a phase timeline regarding invention creation of create, deploy, optimize, and mature, which is divided into a past portion and a future portion based on present time. The diagram further includes timing of invention types with respect to the phase timeline. For example, a majority of fundamental inventions are created during the create and optimize phases; a majority of the commercially necessary inventions are created from mid create phase to early optimize phase; and a majority of the commercial expansion inventions are created from mid deploy phase through mature phase.

Each of the invention types are identified based on one or more solution trees (i.e., the mapping of technical challenges to problems to inventive concepts to implementation factors to solutions to inventive embodiments). As time passes and forecasted technical challenges turn into existing or known technical challenges, forecasted problems turn into existing problems, forecasted inventive concepts turn into existing inventive concepts, forecasts implementation factors turn into existing implementation factors, forecasted solutions turn into existing solutions, and/or forecasted inventive embodiments turn into existing inventive embodiments, the data transforms from forecasted numbers for the invention types and forecasted subject matter into actual number of for the invention types (actual patent protected numbers and/or o should have been patent protected numbers) and into specific subject matter.

Figure 296:
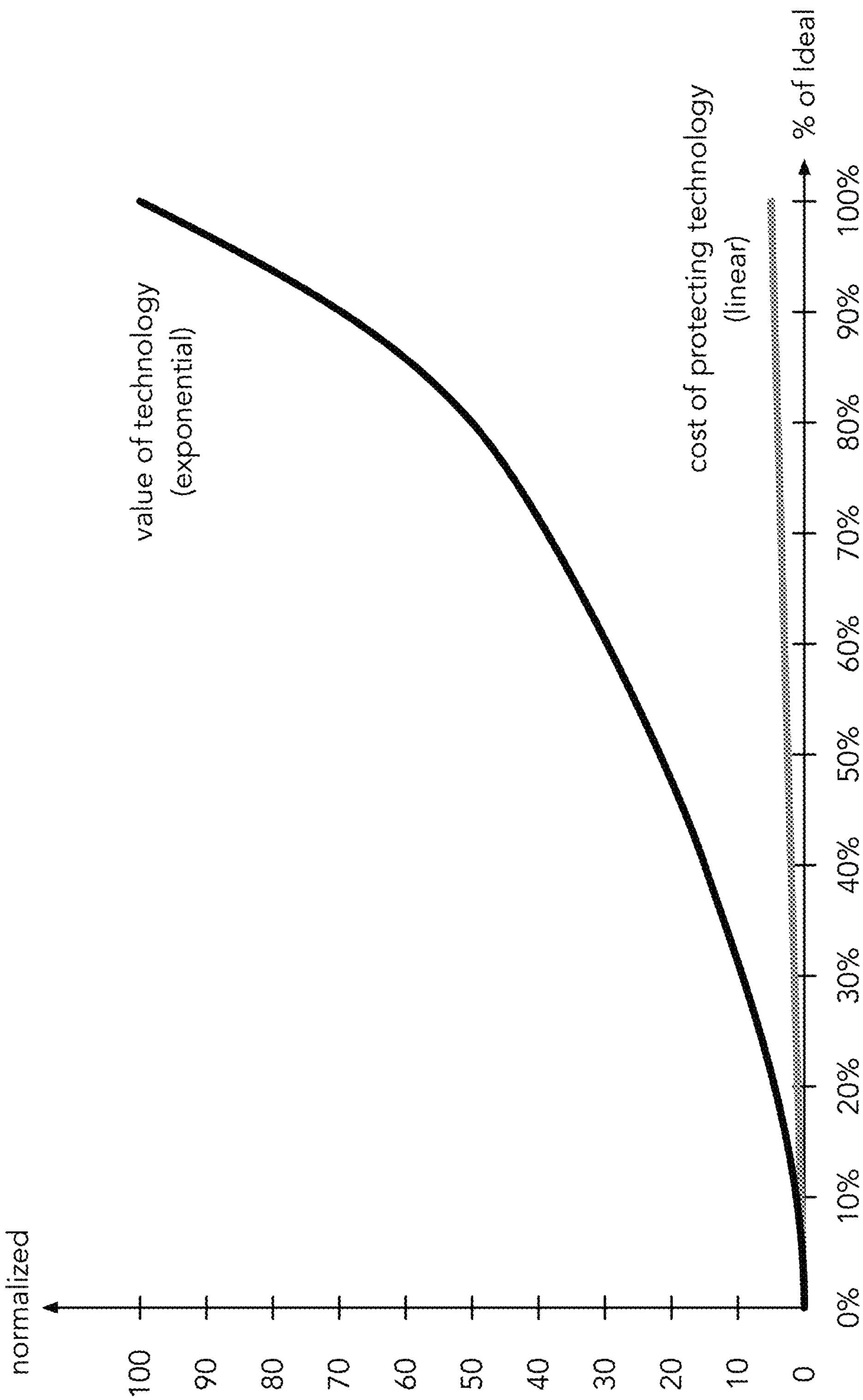
FIG. 296 is a diagram of an example of a graph that plots value of an MTU and costs to patent protect the MTU as used by and/or determined by a co-processor of an improved computer for technology.

FIG. 296 is a diagram of an example of a graph that plots value of an MTU and costs to patent protect the MTU as used by and/or determined by a co-processor of an improved computer for technology. This graph plots normalized value of a patent protected MTU versus the percentage of the ideal number of inventions to patent protect. The graph includes two curves: one for the value of the MTU (e.g., quantified technology) and another for the cost of patent protection.

As shown, and as based on an early start to patent protection, the value increases exponentially as the percent of the ideal number increases. The cost of patent protection increases linearly as the percent of the ideal number increases. For a delayed start, the value curve stops at the remaining percentage of the ideal number. For example, if the patent protection started after 30% of the ideal number has passed, then 70% remains. Thus, the curve would stop at the value corresponding to 70%. The cost of patent protection for this example would have a steeper slope than shown to achieve the corresponding value curve. Basically, have to spend more on patenting protecting more commercial expansion inventions to make up for the slow start.

Figure 297:
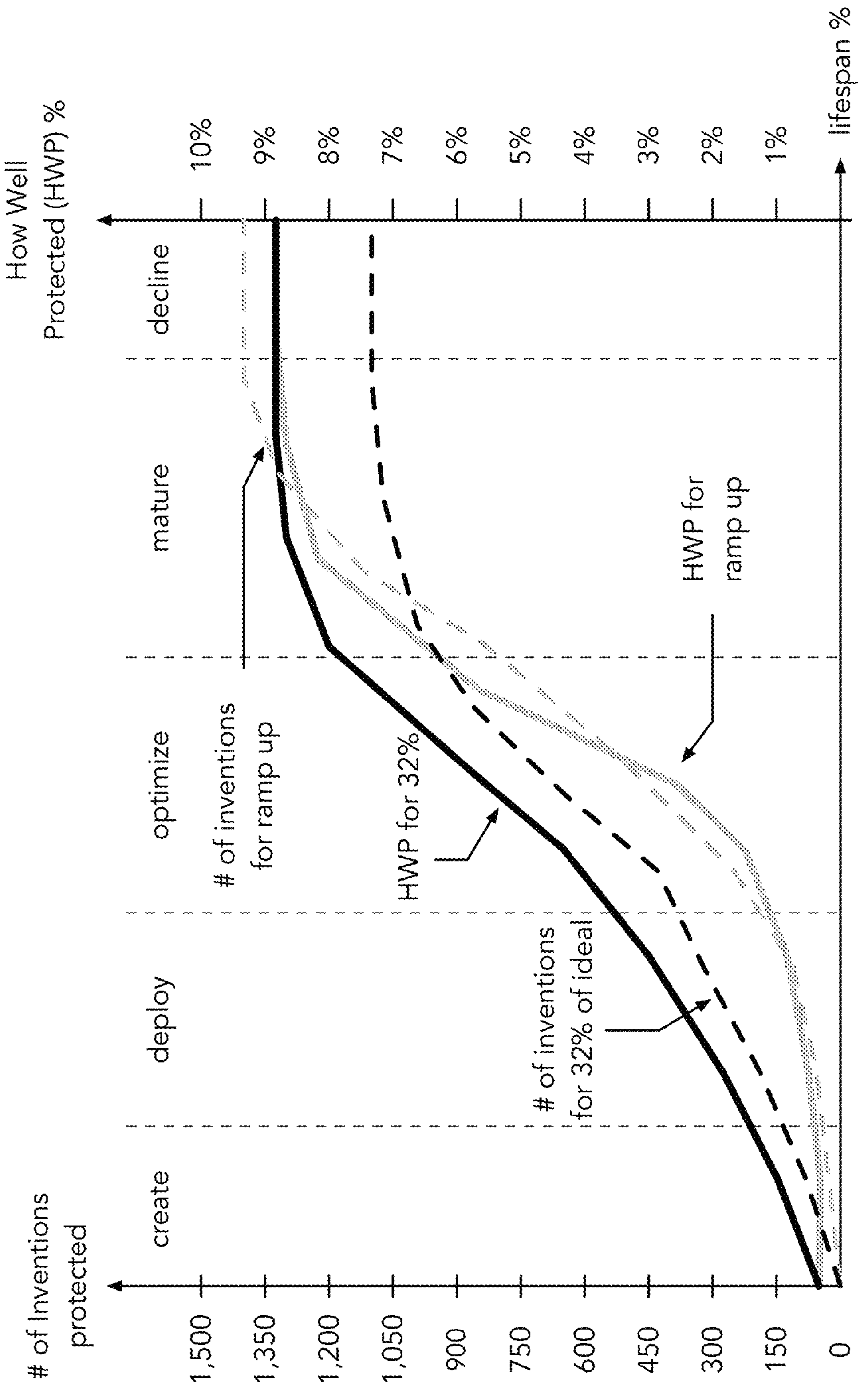
FIG. 297 is a diagram of an example of a graph that plots an early start of patent protecting a product that includes MTUs with a later start of patent protecting the product as used by and/or determined by a co-processor of an improved computer for technology.

FIG. 297 is a diagram of an example of a graph that plots an early start of patent protecting a product (its evolution, its expanded technology, and/or its expanded uses) that includes multiple MTUs with a later start of patent protecting the product as used by and/or determined by a co-processor of an improved computer for technology. In this example, the improved computer determined that the ideal number for inventions to patent protect for the life of the multiple MTUs is 3,450 and that patent protecting 32% of the ideal number of inventions, broken down per MTU and by invention types, would provide the desired patent position. Thus, the target number of inventions to patent protect is about 1,100, assuming an early start to patent protection.

The graph plots number of inventions patent protected versus life of the technology as expressed in percentages. The graph also plots how well patent protected (HWP) percentage versus the tech life percentage. The graph includes a solid black line to represent a curve of how well patent protected for the 32% of ideal and starting the patent protection early (e.g., near the beginning of the create phase). The graph also includes a dashed black line to represent a curve of the accumulated number of inventions being patent protected for the 32% of ideal and starting the patent protection early.

The graph also includes a solid gray line to represent a curve of how well patent protected for the late start to patent protection (e.g., start near the beginning of the optimize phase). The graph also includes a dashed gray line to represent a curve of the accumulated number of inventions being patent protected for the late start. For the late start to catch up to the how well patent protected, which directly correlates to the value of the MTUs, about 1,350 inventions need to be patent protected (about 250 more, which at a cost of approximately $28K per issued patent, this adds a cost of patent protection by $7 million).

In addition to more patent applications to prepare, file, and prosecute, the catching up does not occur until sometime in the mature phase. For an acquisition of a company, the delay in catching up due to the late start could result in the acquisition pricing being tens to hundreds of millions of dollars less than had the early start approach been used.

Figure 298:
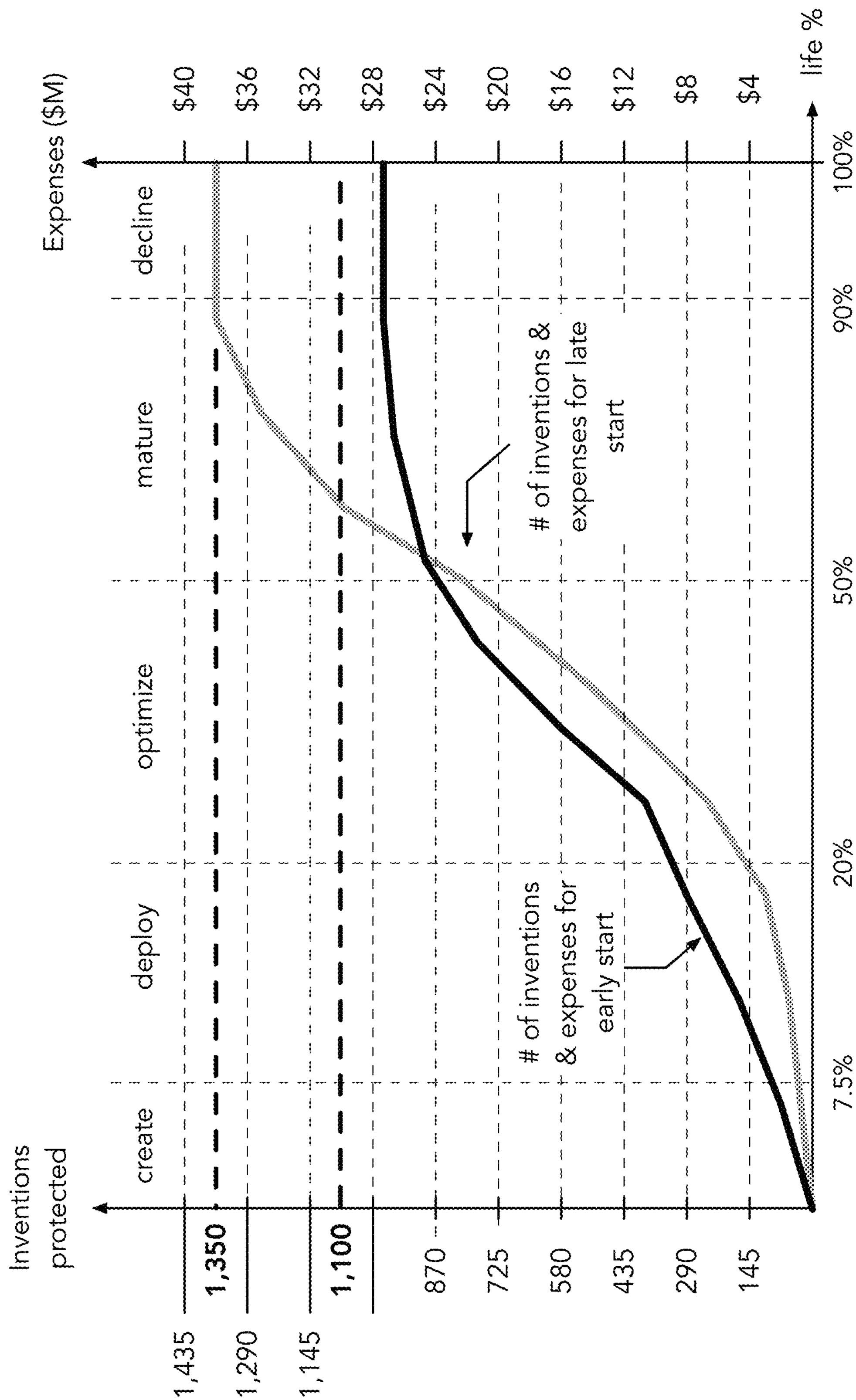
FIG. 298 is a diagram of another example of a graph that plots an early start of patent protecting an MTU with a later start of patent protecting the MTU as used by and/or determined by a co-processor of an improved computer for technology.

FIG. 298 is a diagram of another example of a graph that plots an early start of patent protecting the MTUs of FIG. 297 with a later start of patent protecting the MTUs as used by and/or determined by a co-processor of an improved computer for technology. In this example, the cost for patent protecting the 1,100 inventions for the early start, at $28K per patent protected invention, totals $30.8 million. The costs for patent protecting the 1,350 inventions for the late start, at $28K per patent protected invention, totals $37.8 million.

Figure 299:
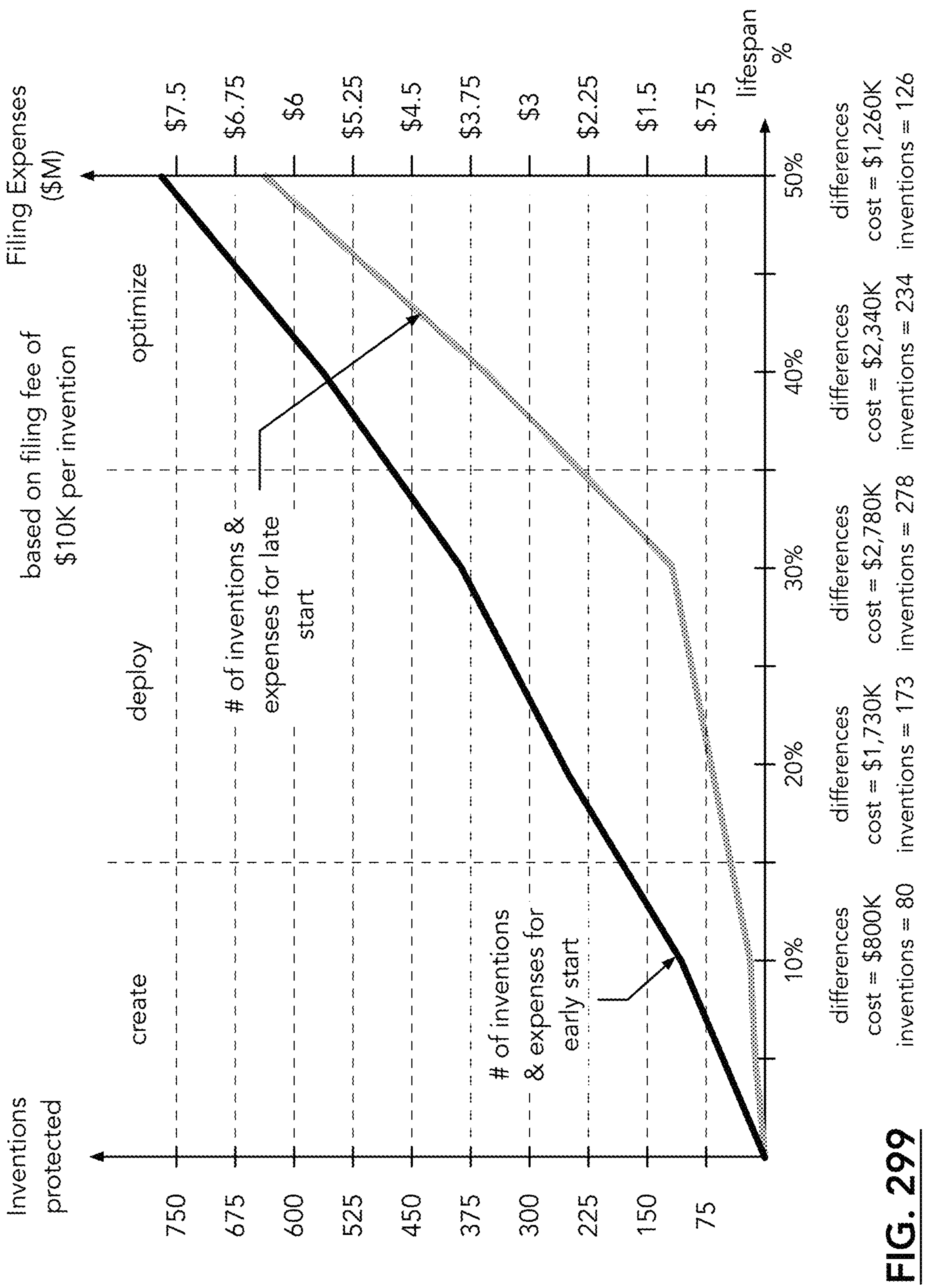
FIG. 299 is a diagram of another example of a graph that plots an early start of patent protecting an MTU with a later start of patent protecting the MTU as used by and/or determined by a co-processor of an improved computer for technology.

FIG. 299 is a diagram of another example of a graph that plots an early start of patent protecting the MTUs of FIG. 297 with a later start of patent protecting the MTUs as used by and/or determined by a co-processor of an improved computer for technology. This diagram focuses on the first half of life of the MTUs to compare the number inventions patent protected for the early start and the delayed start.

At the 10% of life mark, the early start has protected about 105 inventions and the delayed start has protected about inventions. This yields a difference of 80 inventions, which at a filing cost of $10K per invention, is a difference in patent spend of $800K during the first 10% of life (e.g., 1 years to 3 years). At the 20% of life mark, the early start has protected about 240 inventions and the delayed start has protected about 67 inventions. This yields a cumulative difference of 173 inventions, which at a filing cost of $10K per invention, is a difference in patent spend of $1,730 K ($800K from the first 10% and $930 K from the second 10%).

At the 30% of life mark, the early start has protected about 380 inventions and the delayed start has protected about 102 inventions. This yields a cumulative difference of 278 inventions, which at a filing cost of $10K per invention, is a difference in patent spend of $2,780 K ($800K from the first 10%, $930K from the second 10%, and $1,030K from the third 10%).

At the 40% of life mark, the early start has protected about 555 inventions and the delayed start has protected about 321 inventions. This yields a cumulative difference of 234 inventions, which at a filing cost of $10K per invention, is a difference in patent spend of $2,340 K ($800 K from the first 10%, $930 K from the second 10%, $1,030K from the third 10%, and −$430 K from the fourth 10%).

At the 50% of life mark, the early start has protected about 755 inventions and the delayed start has protected about 649 inventions. This yields a cumulative difference of 126 inventions, which at a filing cost of $10K per invention, is a difference in patent spend of $1,260 K ($800 K from the first 10%, $930 K from the second 10%, $1,030K from the third 10%, −$430K from the fourth 10%, and −$1,080 from the fifth 10%).

The difference in how well patent protected is 2.6% at 20% of life; 2.8% at 30% of life; 2.6% at 40% of life; and 1.2% at 50% of life. For a market impact value of $1 billion the 2.6% different represents a value difference of $26 million; for a market impact value of $5 billion the 2.6% different represents a value difference of $130 million; for a market impact value of $10 billion the 2.6% different represents a value difference of $260 million; for a market impact value of $20 billion the 2.6% different represents a value difference of $520 million; and for a market impact value of $50 billion the 2.6% different represents a value difference of $1.30 billion.

At 40% of life, the cumulative patent spend difference was $2.34 million. For the extra spend, the ROI for a market impact value of $1 billion is 11.11 (e.g., 26/2.34); the ROI for a market impact value of $5 billion is 55.55 (e.g., 130/2.34); and soon.

Figure 300:
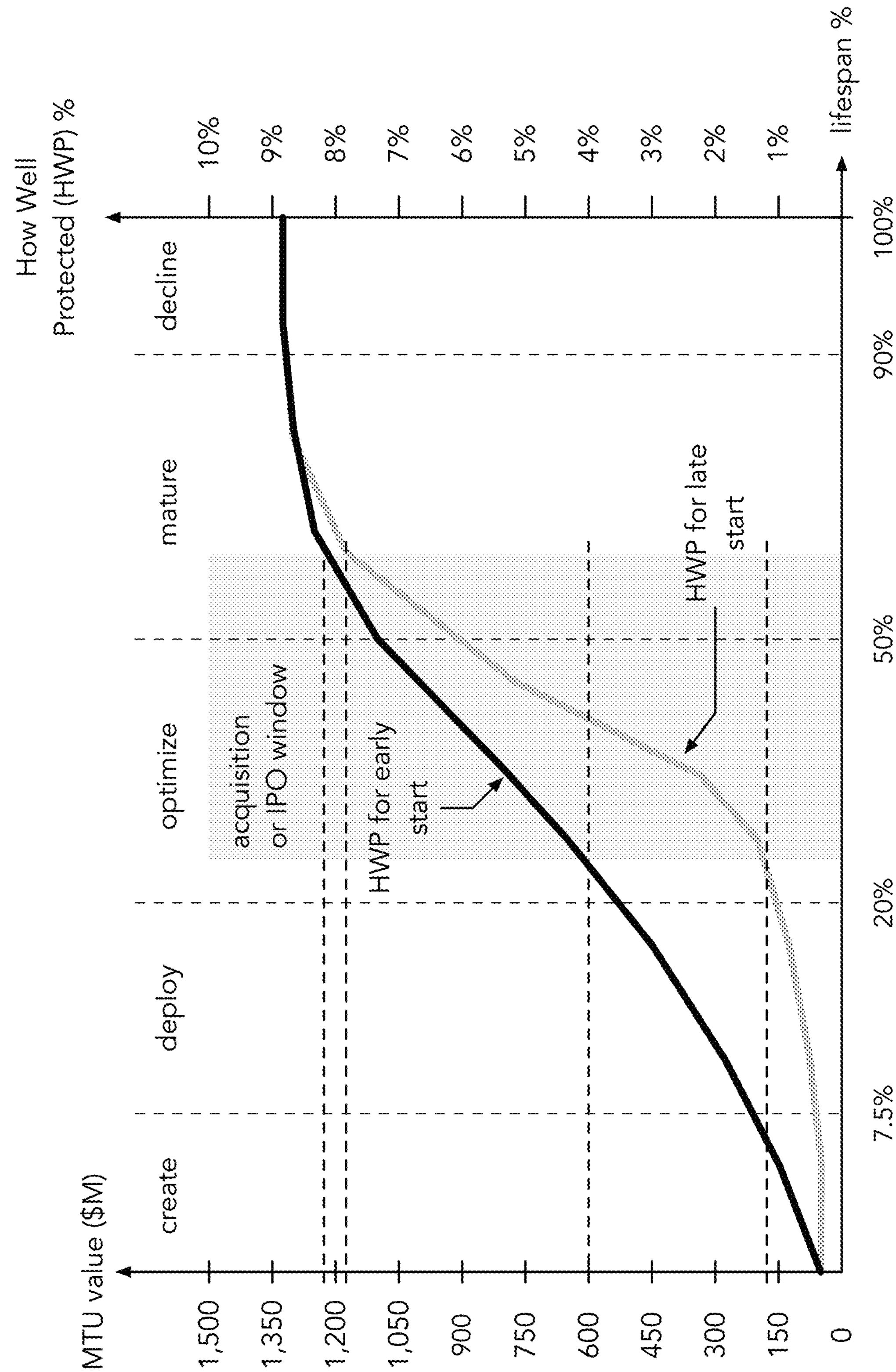
FIG. 300 is a diagram of another example of a graph that plots an early start of patent protecting an MTU with a later start of patent protecting the MTU as used by and/or determined by a co-processor of an improved computer for technology.

FIG. 300 is a diagram of another example of a graph that plots an early start of patent protecting an MTU with a later start of patent protecting the MTU as used by and/or determined by a co-processor of an improved computer for technology. The graph plots MTU value in millions of dollars versus the life of the MTU in percentages. The graph also plots the how well patent protected versus the life of the MTU in percentages. The graph further includes an acquisition or IPO window, which ranges from about 25% of life to 60% of life. The graph still further includes two curves: one for the early start and the other for late start.

At the opening of the acquisition or IPO window at 25% of life, the difference in how well protected is about 2.8% and at the close of the window, the difference is about 0.4%. For a market impact value of $15 billion, the MTU value at 10% is $1.5 billion. At the 25% of life mark, the 2.8% different represents a $420 million difference in MTU value.

Figure 301:
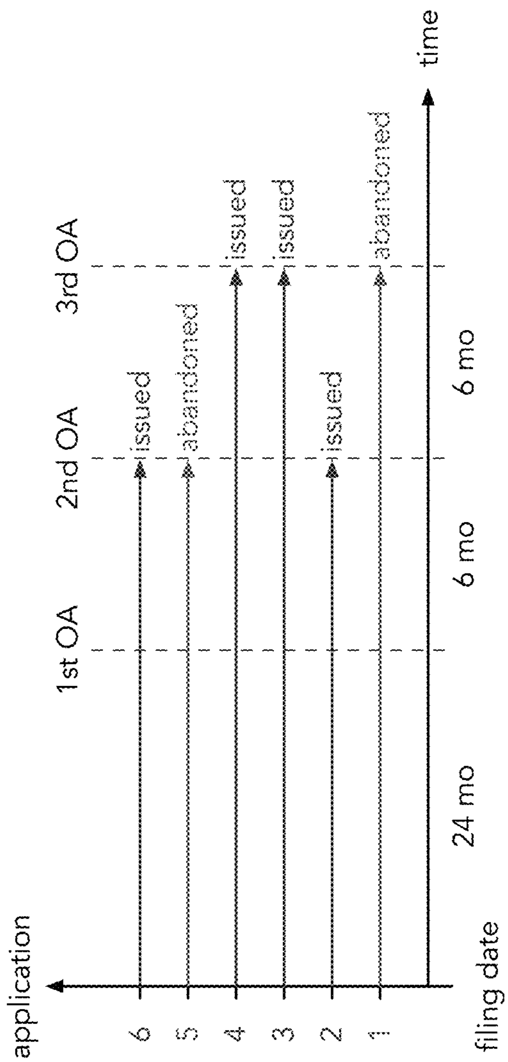
FIG. 301 is a diagram of an example of six patent applications issuance rate based on statistics of a conventional patent process.

FIG. 301 is a diagram of an example of six patent applications issuance rate based on statistics of a conventional patent process. On a filing date, six patent applications were filed; applications 1-6. According to patent statistics, about ⅓ of patent applications filed are eventually abandoned (i.e., they do not issues). The color blue is used to clearly indicate patent applications that will issue, and the color red is used to clearly indicating the patent applications that will not issue (i.e., abandoned).

Also shown in this figure is that, on average, 2.5 office actions are filed for each patent application whether it issues or not. For instance, three offices were issued and responded for red line patent application #1 before it was abandoned; two offices were issued and responded for blue line patent application #2 before it issued; three offices were issued and responded for blue line patent application #3 before it issued; three offices were issued and responded for blue line patent application #4 before it issued; two offices were issued and responded for red line patent application #5 before it was abandoned; and two offices were issued and responded for blue line patent application #6 before it issued.

Figure 302:
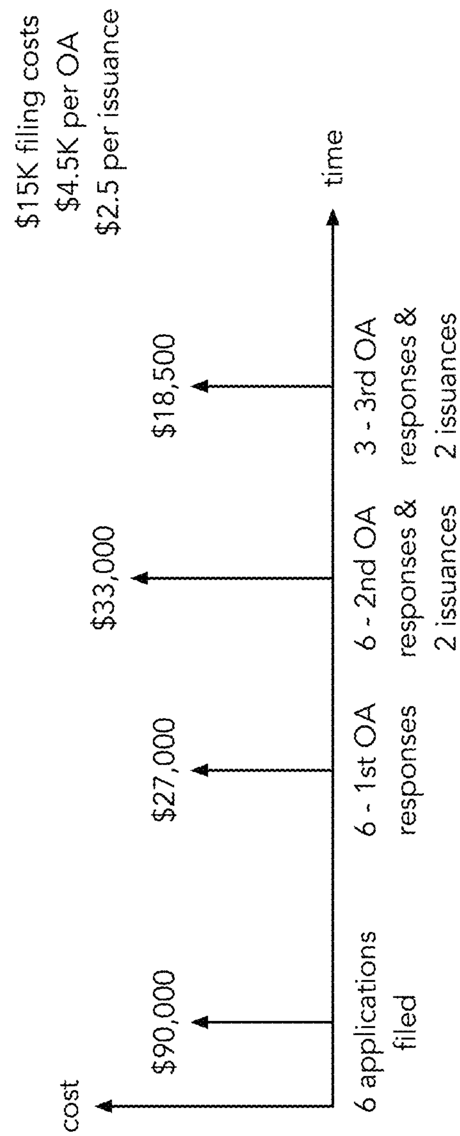
FIG. 302 is a diagram of an example of expenses for the six patent applications of FIG. 301.

FIG. 302 is a diagram of an example of expenses for the six patent applications of FIG. 301. The fees for this figure include $15K for filing a patent application (attorney fees and governmental filing fees), $4.5K for each office action response (attorney fees), and $2.5K for each patent issuance (attorney fees and governmental issuance fees). For the filing of the 6 patent application, an expense of $90K was incurred.

Each of the six patents received a first office and a response was filed and an expense of $27K was incurred. Each of the six patents also received a second office and a response was filed; two of which issued, and one was abandoned, and an expense of $33K was incurred. Three of the six patents also received a third office, and a response was filed; two of which issued, and one was abandoned, and an expense of $18.5K was incurred.

The total expense for all six patents was $168.5K. The average expense for each of the six patents was $28K ($168.5K/6). The average cost per issued patent is $42K ($168.5K/4). In the years preceding the filing of this disclosure, the USPTO receives about 600,000 new patent applications per year. With approximately ⅓ of them becoming abandoned, that's 200,000 patent applications filed per year on patents that will not issue. With an average expense of $28K per patent application filed, about $5.6 billion spent annually on patent applications that will not issue. With the US accounting for about 30% of worldwide patent application filings, the annual worldwide spend on non-issued patents is about $18.7 billion.

Of the patents that do issue, it's estimated that 60% have little to no value due to poor quality, over-patenting a technical area, under-patenting a technology, or patenting ideas that have little commercial value. Thus, in the US, about 240,000 of the 400,000 patents that issues annually, have little to no value. At $28K per patent application filed, about $6.7 billion spent on patent applications that result in patents that have little to no value. With the US accounting for about 30% of worldwide patent application filings, the annual worldwide spend on patent applications that result in patents that have little to no value is about $22.3 billion.

FIG. 303 is a diagram of an example of data for a period of an architectural patent protection plan for an MTU as used by and/or determined by a co-processor of an improved computer for technology. For each period (e.g., a year) and for each country in which patent protection is sought, on a period-by-period basis for multiple periods for a patent protection plan, the improved computer calculates the number of fundamental inventions to be patent protected from the previous generation (PG), from the current generation (CG) and/or from the next generation (NG); calculates the number of commercially necessary inventions to be patent protected from the previous generation (PG), from the current generation (CG) and/or from the next generation (NG); and calculates the number of commercial expansion inventions to be patent protected from the previous generation (PG), from the current generation (CG) and/or from the next generation (NG).

For the period, the improved computer further calculates a total number of new invention to patent protect via new patent applications to be filed (e.g., the sum of PG, CG, and/or NG fundamental inventions, of PG, CG, and/or NG commercially necessary inventions, and of PG, CG, and/or NG commercial expansion inventions). The improved computer calculates an annual expense for patent protecting the total number of new inventions based on a patent application filing costs, the number of new patent applications being filed, and the total number of new inventions. The improved computer may break down the annual numbers to monthly numbers.

For the period, the improved computer further calculates the number of subsequent patent application filings based on the expected issuances during the period and subsequent filing parameters. The subsequent filing parameters include a first set of parameters for the issuance of a utility patent application and a second set of parameters for the issuance of a subsequent filing patent application. The first set of parameters includes a subsequent filing percentage, which could be different for different types of inventions. For example, the subsequent filing percentage is in the range of 10% to 150% for all invention types. For a percentage over 100%, more than one subsequent filing will, on average, be filed from an issuing original utility patent application. As a specific example, for a subsequent filing percent of 150%, for 10 issuing original utility patent application, 15 subsequent patent applications (e.g., CON, CIP, DIV, LPC) will be filed.

As another example, each invention type has its own subsequent filing percentage. As a specific example, fundamental inventions have a subsequent filing percentage of 100%; commercially necessary inventions have a subsequent filing percentage of 80%; and commercial expansion inventions have a subsequent filing percentage of 50%.

The first set of parameters further includes subsequent filing type percentage breakdown. For example, legal placeholder conversion patent applications (LPC) have a first percentage; continuation patent applications (CON) have a second percentage; continuation-in-part patent applications (CIP) have a third percentage; and divisional patent applications (DIV) have a fourth percentage, where the sum of the first, second, third, and fourth percentages equals 100%. Note that a legal placeholder conversion patent application is regarding an invention that was disclosed in the original utility patent application but not claimed. For subsequent filing decisions, a legal placeholder conversion patent application is treated like an original utility patent application.

As an example of the first set of parameters, the subsequent filing percentage is 166.6666% for all invention types, the LPC percentage is 75%, the CON percentage is 15%, the CIP percentage is 5%, and the DIV percentage is 5%; totaling 100%. Thus, for 12 issuing original utility patent applications, 20 subsequent patent application will be filed (e.g., 12/1.666); of which, 15 will be LPCs, 3 will be CONs, 1 will be a CIP, and 1 will be a DIV.

The second set of parameters for the issuance of a subsequent filing patent application (e.g., child, grandchild, etc. of an original utility or LPC patent application) includes a subsequent filing percentage and a subsequent filing type percentage breakdown. As an example of the second set of parameters, the subsequent filing percentage is 66.6666% for all invention types, the LPC percentage is 75%, the CON percentage is 15%, the CIP percentage is 5%, and the DIV percentage is 5%; totaling 100%. Thus, for 30 issuing subsequent patent applications, 20 subsequent patent application will be filed (e.g., 12/1.666); of which, 15 will be LPCs, 3 will be CONs, 1 will be a CIP, and 1 will be a DIV.

For the calculated subsequent patent application filings, the improved computer calculates annual quantities and annual expenses. The improved computer may further determine monthly quantities and monthly expenses.

The improved computer further calculates the number of office action responses expected to prepared and filed in the period. The computer also calculates an annual expense for office action responses. The improved computer may further determine monthly quantities and monthly expenses for office action responses.

The improved computer further calculates the number of issuances expected to occur in the period. The computer also calculates an annual expense for issuances. The improved computer may further determine monthly quantities and monthly expenses for issuances.

The improved computer further calculates the number of maintenance fees (including annuities) expected to occur in the period. The computer also calculates an annual expense for maintenance fees. The improved computer may further determine monthly quantities and monthly expenses for maintenance fees.

Figure 304:
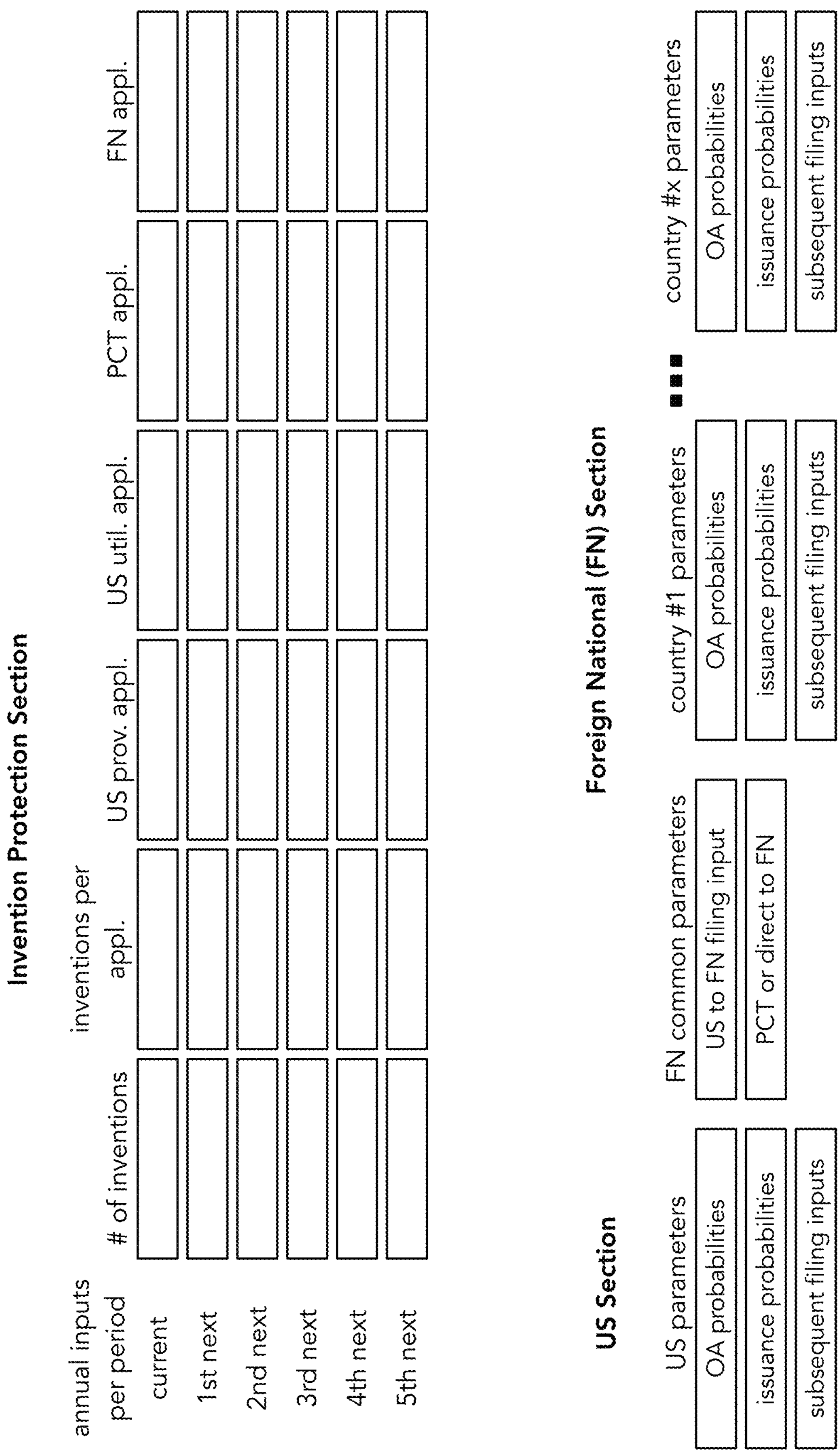
FIG. 304 is a diagram of an example of parameter inputs for generating a period by period plan for patent protecting an MTU as used by and/or determined by a co-processor of an improved computer for technology.

FIG. 304 is a diagram of an example of parameter inputs for generating a period by period plan for patent protecting an MTU as used by and/or determined by a co-processor of an improved computer for technology. This diagram includes three sections: one for invention protection; a second for US parameters, and a third for foreign national parameters.

The invention protection section includes rows corresponds to periods (e.g., a definable duration of time such a calendar year, a fiscal year, etc.) and columns for the number of inventions to be protected per period, the number of inventions per patent application, the number of US provisional patent applications to be filed, the number of US utility patent applications to be filed, the number of PCT applications to be filed, and the number of foreign national (FN) patent applications to be filed. As discussed herein, the invention protection inputs are determined by the improved computer. As an alternative, the improved computer receives one or more inputs for this section from a user computing device, enabling the user of the computing device to test the impact on the plan, the value, and/or the cost of changing one or more inputs.

The US section includes office action (OA) probabilities, issuance probabilities, and subsequent filing inputs. As discussed herein, the improved computer calculates the various inputs for this section. As an alternative, the improved computer receives one or more inputs for this section from a user computing device, enabling the user of the computing device to test the impact on the plan, the value, and/or the cost of changing one or more inputs.

The foreign national (FN) section includes common parameters and individual country parameters. The common parameters include US to FN filing inputs and PCT or direct to foreign national. The US to FN filing input is a percentage of inventions that are to be patent protected in foreign national countries with respect to the number to be US patent protected. Each country sub-section includes office action (OA) probabilities, issuance probabilities, and subsequent filing inputs. As an alternative to each country having its own parameters, one set of parameter is used for all countries of interest.

As discussed herein, the improved computer calculates the various inputs for the foreign section. As an alternative, the improved computer receives one or more inputs for this section from a user computing device, enabling the user of the computing device to test the impact on the plan, the value, and/or the cost of changing one or more inputs.

Figure 305:
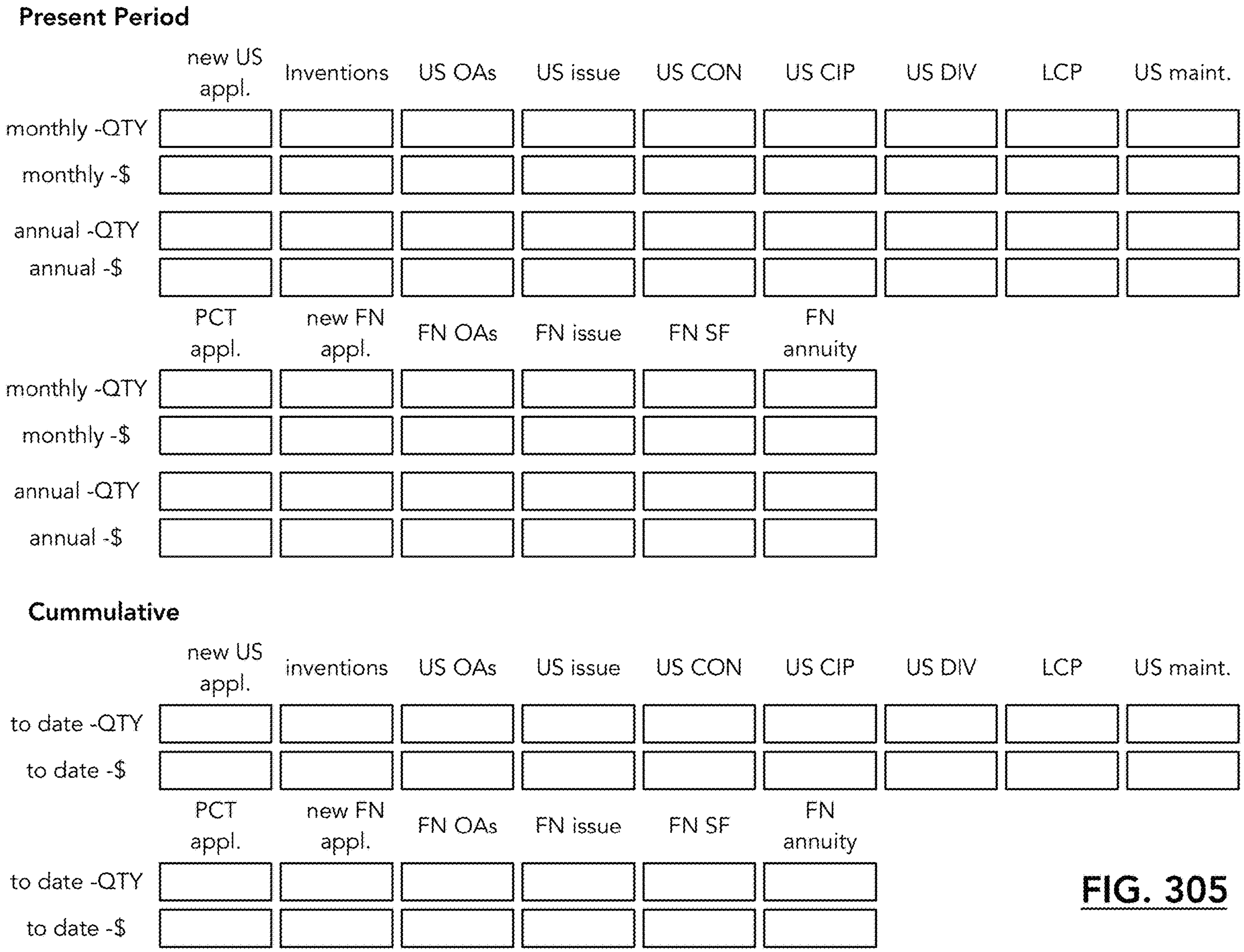
FIG. 305 is a diagram of an example of a period by period plan for patent protecting an MTU as used by and/or determined by a co-processor of an improved computer for technology.

FIG. 305 is a diagram of an example of a period of a multiple period plan for patent protecting an MTU as used by and/or determined by a co-processor of an improved computer for technology. For each period of a plan, the improved computer summarizes the quantities and cost of executing the plan for the period and for the cumulation of periods that have passed. For the present period, the improved computer summaries annual and monthly quantities and costs for new US patent applications to be filed, the number of inventions to be patent protected, the number of US office actions expected to be received, the number of US issuances expected to be received, the number of US CON applications expected to be filed, the number of US CIP applications expected to be filed, the number of US DIV applications expected to be filed, the number of US LPC applications expected to be filed, the number of US maintenance fees that are due, the number of PCT applications expected to be filed, the number of new foreign national applications expected to be filed, the number of foreign national office actions expected to be received, the number of foreign national issuances expected to be received, the number of foreign national subsequent filing (SF) patent applications expected to be filed, and the foreign application annuities that are due.

The improved computer generates the cumulative section to include a summary of the to date quantities and costs for US patent applications that have been filed, the number of inventions that have been patent protected, the number of US office actions that have been received, the number of US issuances that have been received, the number of US CON applications that have been filed, the number of US CIP applications that have been filed, the number of US DIV applications that have been filed, the number of US LPC applications that have been filed, the number of US maintenance fees that have been paid, the number of PCT applications that have been filed, the number of new foreign national applications that have been filed, the number of foreign national office actions that have been received, the number of foreign national issuances that have been received, the number of foreign national subsequent filing (SF) patent applications that have been filed, and the foreign application annuities that have been paid.

Figure 306:
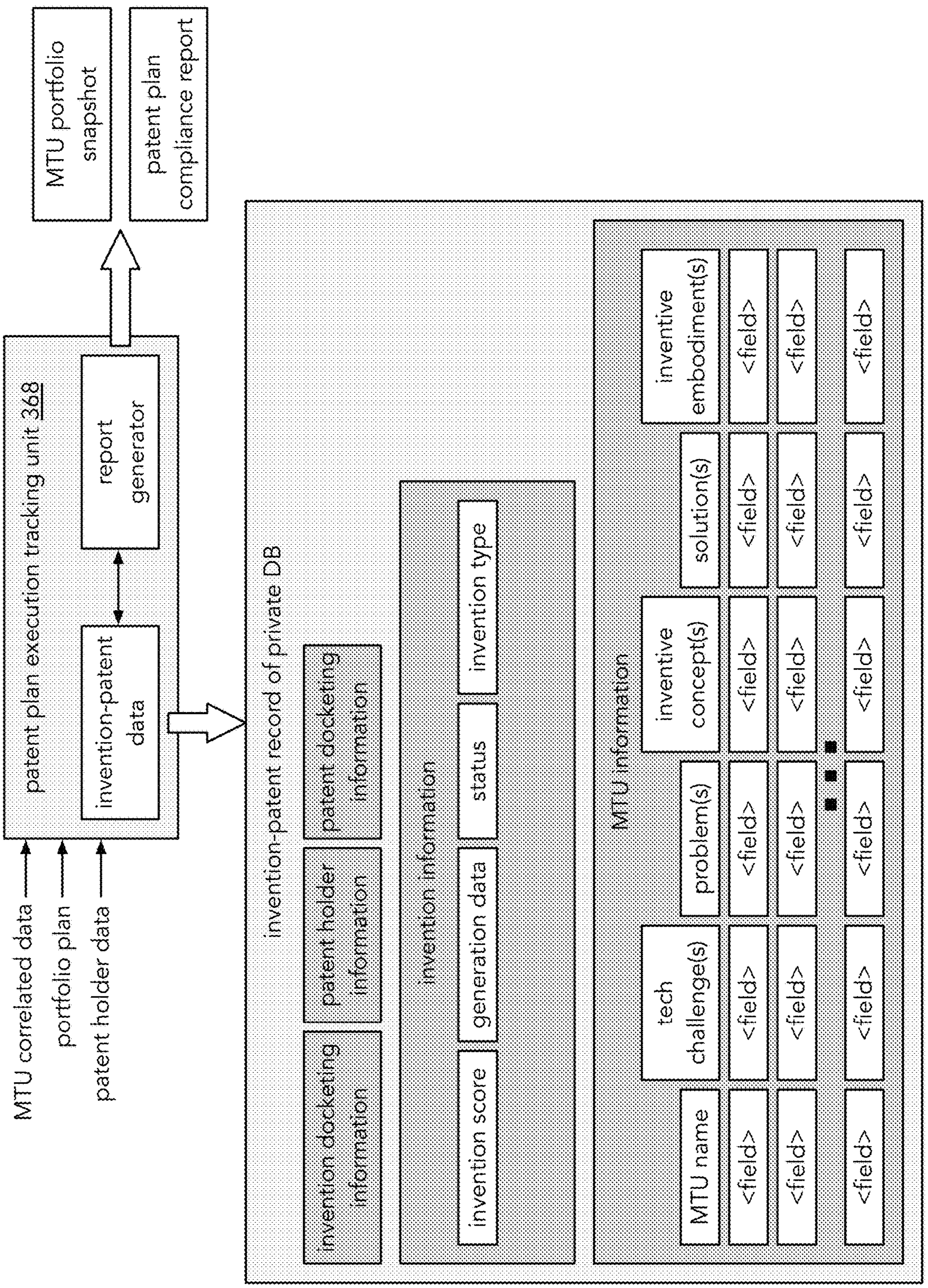
FIG. 306 is a diagram of an example of a private database record for an invention of an MTU as used by and/or determined by a co-processor of an improved computer for technology.

FIG. 306 is a diagram of an example of a private database record for an invention of an MTU as used by and/or determined by a co-processor of an improved computer for technology. In this diagram, the improved computer executes the patent plan execution tracking unit 368 to generate a request for the creation of an invention-patent record of a private database and generates the data to populate the record. In addition, the improved computer executes the patent plan execution tracking unit 368 to generate an MTU snapshot report (e.g., the "to-date data of the preceding Figure) and to generate a patent plan compliance report.

To generate the patent compliance report, the improved computer compares the planned patent protection activities to the actual patent protection activities. For example, the improved computer compares the targeted number of inventions to patent protect for a period with the number of inventions that have been patent protected. If there is a difference, the report highlights the difference (e.g., ahead of pace for commercially necessary invention for tech challenge 1, behind pace for fundamental inventions for tech challenge 2, etc.). As another example, the improved computer compares the number of office actions excepted to be received per the plan and the number of office actions that have been received. If there is a difference, the report highlights the difference. The improved computer interprets received versus expected office actions differences to determine if changes are needed to the office action parameters.

The invention-patent records includes sections for invention docketing information, patent holder information, patent docketing information, invention information, and MTU information. The invention information includes fields for an invention score, generation data, status, and invention type. The invention score is a measure of importance to patent protect based on invention type, tech challenge, portfolio fit, novelty, and/or alternate usability.

The MTU section includes field headers of MTU name, tech challenge(s), problem(s), inventive concept(s), solution(s), and inventive embodiment(s). For each of the field headers, the record includes one or more fields. The data in this section is limited to data that is relevant to the invention. As an example, the specific embodiment(s) of a solution of an inventive concept of a problem of a technical challenge of an MTU is records, not all of the tech challenges, etc., of the MTU.

Figure 307:
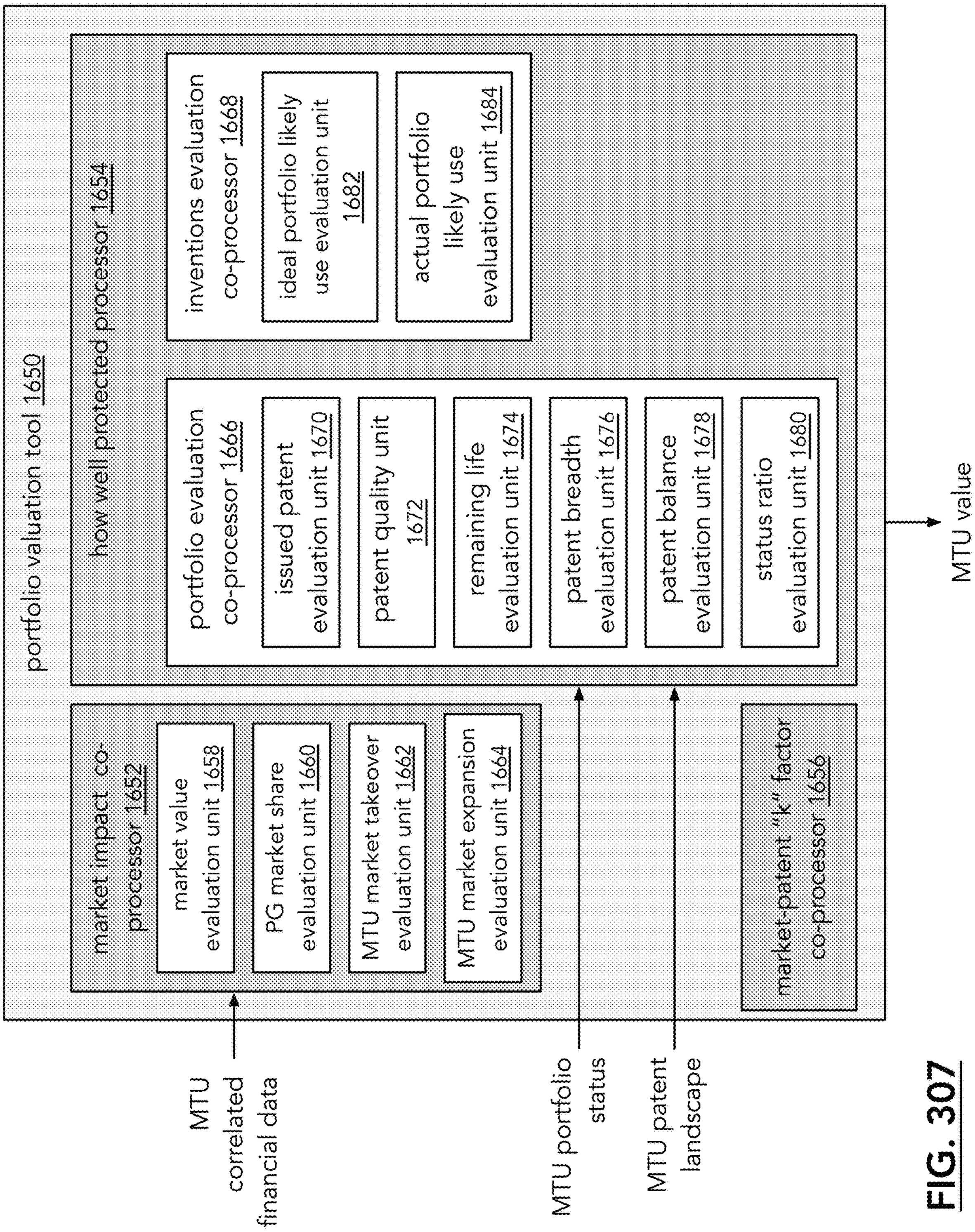
FIG. 307 is a diagram of an embodiment of a portfolio valuation tool for valuing an MTU as performed by a co-processor of an improved computer for technology.
Figure 362:
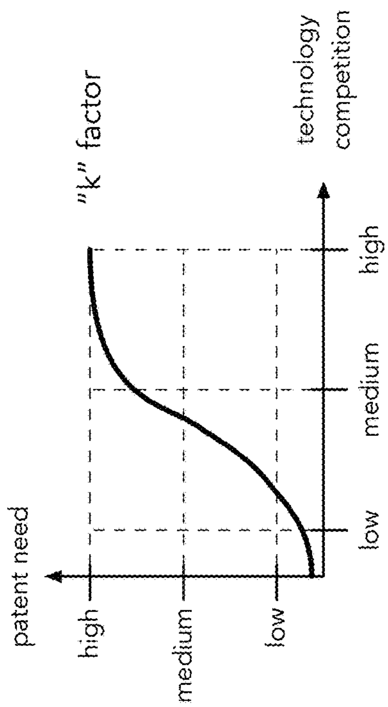

Referring next to FIGS. 307-362, various improvements in the configuration and operation of data processing tools, techniques, data structures, and devices that can be used for, among other things, determining and presenting technology valuations. In various embodiments, the processing tools and devices perform technology valuations at the level of an MTU using techniques that rely on unique capabilities available only to processing devices, and which the human mind is not practically adapted to perform. Various valuation techniques disclosed herein gather and analyze massive amounts of data, and use that analysis to construct linked data structures to determine and present technology valuations at multiple different levels of abstraction.

Such valuations include distilling massive amounts of information and presenting it to users in an understandable format. In one sense, this distillation can be understood with reference to an internet search engine, which distills information from the universe of available documents into a simplified search result that an end-user can understand and use to make decisions. That is not to say the following figures disclose a search engine, but that the various improvements described herein arise in the context of large scale computational and data processing systems, much like the Internet gives rise to the need for search engines.

Referring now to FIG. 307 a portfolio valuation tool for valuing an MTU will be discussed according to various embodiments of the present disclosure. Portfolio valuation tool 1650 can be implemented using a co-processor of an improved computer for technology, which includes at least one computing device 120 (e.g., one or more of the embodiments of FIGS. 6A-6G). In some embodiments, portfolio valuation tool 1650 is one of multiple co-processors used by a primary computing device to execute one or more the functions of the computing entity. In other embodiments, portfolio valuation tool 1650 is implemented as a primary function of a primary computing device.

Illustrated embodiments of portfolio valuation tool 1650 include market impact co-processor 1652, market-patent "k" factor co-processor 1656, and how well protected processor 1654. Market impact co-processor 1652 includes market value evaluation unit 1658, PG market share evaluation unit 1660, MTU market takeover evaluation unit 1662, and MTU market expansion evaluation unit 1664. How well protected processor 1654 includes portfolio evaluation co-processor 1666, which further includes issued patent evaluation unit 1670, patent quality unit 1672, remaining life evaluation unit 1674, patent breadth evaluation unit 1676, patent balance evaluation unit 1678, status ratio evaluation unit 1680; and inventions evaluation co-processor 1668, which further includes ideal portfolio likely use evaluation unit 1682, actual portfolio likely use evaluation unit 1682, and actual portfolio likely use evaluation unit 1684.

Market impact co-processor 1652 receives input including MTU correlated financial data. How well protected processor 1654 receives input including MTU portfolio status and MTU patent landscape. Portfolio valuation tool 1650 uses the outputs of market impact co-processor 1652, market-patent "K" factor co-processor 1656, and how well protected processor 1654 to generate an MTU value. The MTU value output by portfolio valuation tool indicates the value of an evaluated MTU with respect to one or more entities, where the MTU value is a function of the market impact of the MTU (e.g., market impact score), how well the MTU is protected (e.g., how-well-protected score), and a market leverage factor (e.g. market-patent "k" factor).

In various embodiments, the market impact score represents a percentage of the Serviceable Addressable Market (SAM) attributable to the impact of the MTU; the how-well-protected score is based on patent position strength and patent portfolio quality; and the market-patent "k" factor is determined by comparing how necessary patent protection is for a particular MTU vs. the level of competition within the MTU), and then multiplying that result by the market opportunity driven by the MTU.

Correlated financial data can be provided to portfolio valuation tool 1650 in response to a request for input generated by Portfolio valuation tool 1650, in response to completion of a process that determines the correlated financial data, or the like. In various embodiments, previously determined correlated financial data can be obtained from one or more MTU data records (e.g., FIG. 42A) included in in one or more databases, for example a marketing, sales, business, technology, and patent (MSBTP) database (e.g., FIG. 53) in response to the request for input. In other embodiments, another co-processor of the improved computer for technology can execute a financial data correlation process in response to the request for input. In various embodiments, determining correlated financial data includes performing one or more of a historical financial analysis, a financial trend financial analysis, or a financial forecast analysis at the MTU level. MTU portfolio status can be provided to portfolio valuation tool 1650 in response to a request for input generated by Portfolio valuation tool 1650, in response to completion of a process that determines the MTU portfolio status, or the like. In various embodiments, previously determined MTU portfolio status can be obtained from one or more MTU data records (e.g., FIG. 42A) included in in one or more databases, for example a marketing, sales, business, technology, and patent (MSBTP) database (e.g., FIG. 53) in response to the request for input. In other embodiments, another co-processor of the improved computer for technology can execute a portfolio status process in response to the request for input.

MTU patent landscape input can be provided to portfolio valuation tool 1650 in response to a request for input generated by Portfolio valuation tool 1650, in response to completion of a process that determines the MTU portfolio status, or the like. In various embodiments, previously determined MTU portfolio patent landscape information can be obtained from one or more MTU data records (e.g., FIG. 42A) included in one or more databases, for example a marketing, sales, business, technology, and patent (MSBTP) database (e.g., FIG. 53) in response to the request for input. In other embodiments, another co-processor of the improved computer for technology can execute a portfolio status process in response to the request for input.

In an example of operation of portfolio valuation tool 1650, consider a company that is developing a touch screen technology. The output of portfolio valuation tool 1650 would vary based on which MTU is used for the evaluation. For example, when the MTU being considered is "cell phones," the output of portfolio valuation tool 1650 is likely to be different than when an the MTU being considered is "touch screens," because the market for "cell phones" and "touch screens" is not co-extensive, and because the financial value of a "cell phone" is likely to be different than the financial value of a "touch screen." Furthermore, if the company already has a patent portfolio, it is unlikely that the portfolio provides exactly equivalent protection for "cell phones" and "touch screens." Perhaps the cell phone market has a different number of competitors. Maybe cell phone technology is more or less mature, more or less disruptive, and/or matures at a different rate than the touch screen market. Maybe one of the two technologies is substantially protected by patents owned by others. The MTU value output by portfolio valuation tool 1650 takes any or all of these various factors, and more, into account by identifying relationships, quantifying, organizing, and analyzing these relationships and others to arrive at a data based MTU value that would not otherwise be possible to determine to the same degree of precision in any practical amount of time.

Figure 308:
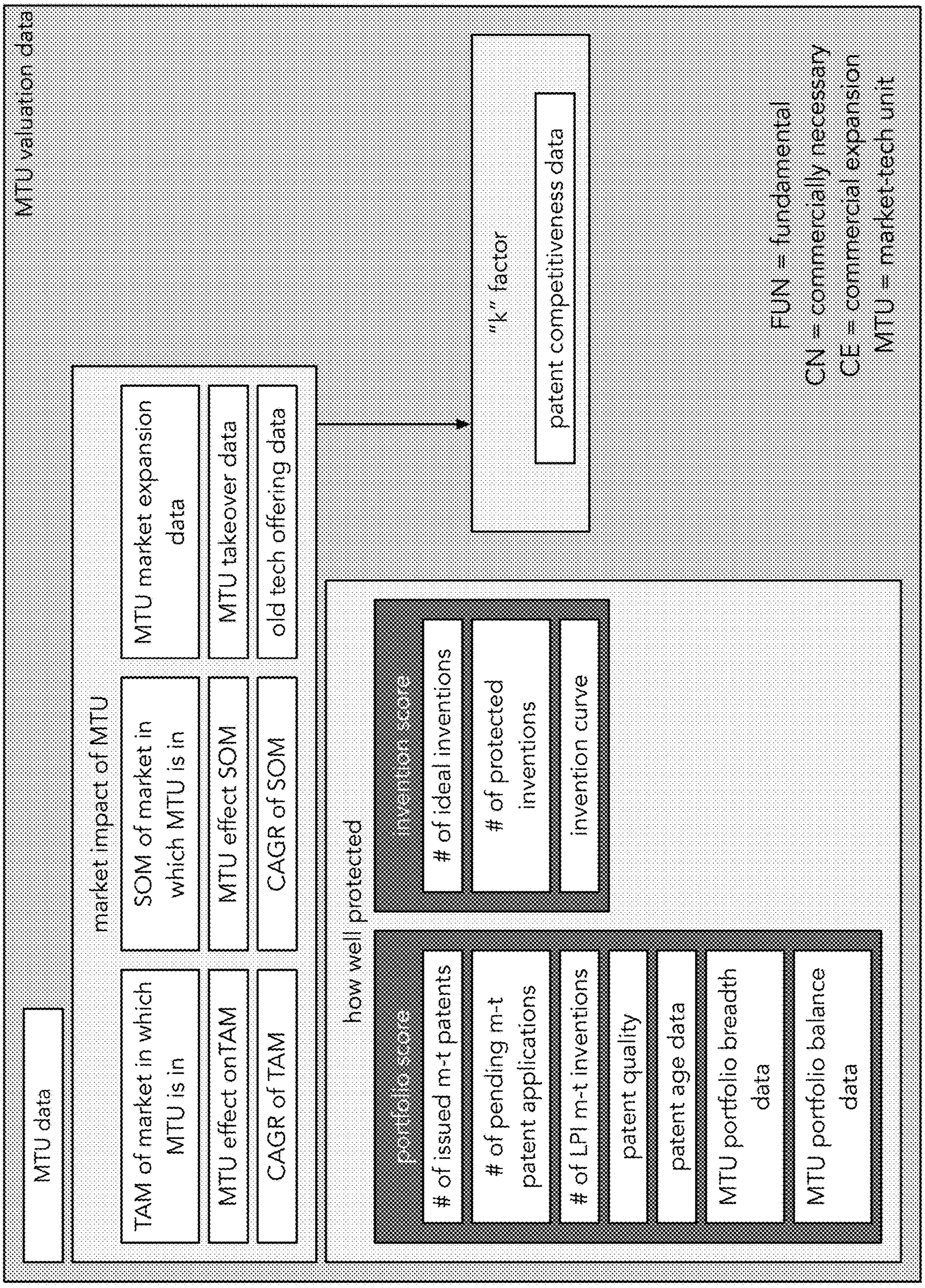
FIG. 308 is a diagram of an embodiment of data used by a portfolio valuation tool for valuing an MTU as performed by a co-processor of an improved computer for technology.

Referring next to FIG. 308 an embodiment of MTU valuation data used by a portfolio valuation tool for valuing an MTU as performed by a co-processor of an improved computer for technology will be discussed. MTU valuation data includes MTU data, which can be obtained from an MTU record included in one or more databases, such as MTU database 264 (FIG. 152). MTU data includes information pertaining to an MTU, generally. MTU information can include, but is not limited to, information defining or describing an MTU, e.g. MTU boundaries, information linking the MTU to related MTUs, e.g. sub MTUs included in the MTU and higher-level MTUs in which the current MTU is included, scientific and technological categories associated with the MTU, or the like.

MTU valuation data also includes data related to the market impact of the MTU, including but not limited to: total addressable market (TAM) of market including the MTU; MTU effect on TAM, compound annual growth rate (CAGR) of TAM; serviceable obtainable market (SOM) of market including the MTU; MTU effect on SOM, compound annual growth rate (CAGR) of SOM; MTU market expansion data; MTU takeover data; "old" (e.g. known, existing, or previous tech offering data). The output of the market impact of MTU data can be used, in conjunction with "k" factor data (e.g. patent competitiveness data), to determine the "k" factor, a market leverage factor.

How well protected data, includes, but is not limited to, portfolio score information and invention score information. Portfolio score information includes the number of issued market-tech (m-t) patents, number of pending m-t patent applications, number of legal placeholder (LPI) m-t inventions, patent quality indicator/rank/rating, patent age data, MTU portfolio breadth data, and MTU portfolio balance data.

Invention score data includes data indicating one or more of a number of ideal inventions, a number of protected inventions, or invention curve data. In various embodiments, the invention score data includes information indicating whether an invention is fundamental (FUN) invention, a commercially necessary (CN) invention, or a commercial expansion (CE) invention.

Figure 309:
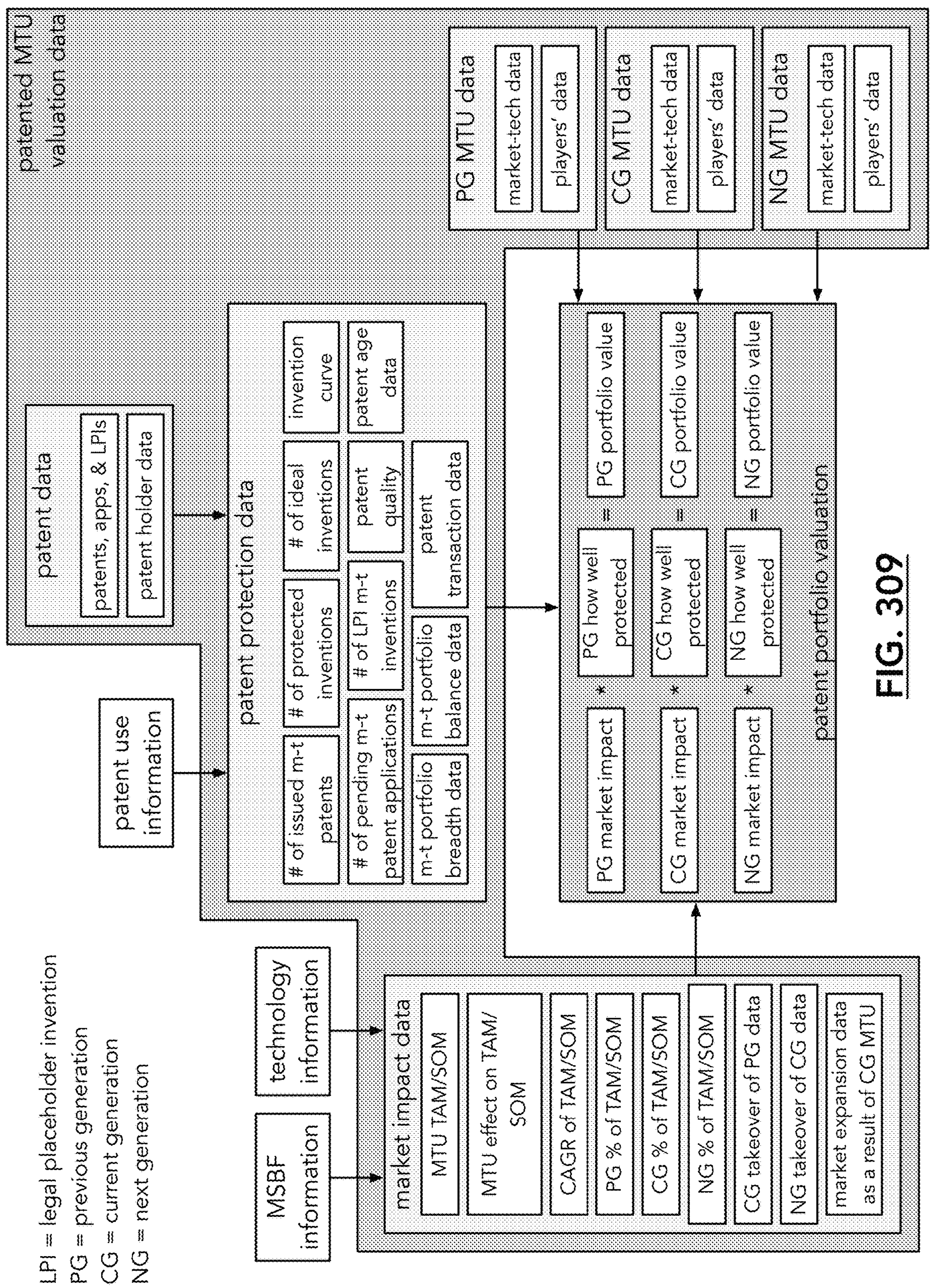
FIG. 309 is a diagram of another embodiment of a portfolio valuation tool for valuing an MTU as performed by a co-processor of an improved computer for technology.

Referring next to FIG. 309 another embodiment of a portfolio valuation tool for valuing an MTU as performed by a co-processor of an improved computer for technology will be discussed. The patent portfolio valuation uses one or more of the following data types (referred to herein as patented MTU valuation data) to generate an MTU value. Additional data types may also be used. The patented MTU valuation data includes patent data, patent protection data, previous generation (PG) MTU data, current generation (CG) MTU data, next generation (NG) MTU data, and market impact data. Although the portfolio valuation tool may directly obtain and use this information in some embodiments, in other embodiments some or all of these data types may be precalculated by external processing systems and stored in one or more databases, from which the portfolio evaluation tool can obtain them in response to a query, in response to periodic or a-periodic updates, in response to user inputs and/or queries, or the like.

In addition to the data types discussed above, external data employed by subsystems, processing modules, and/or co-processors included in the patent portfolio valuation tool to generate an MTU valuation can also be considered to be patented MTU valuation data. Note that the term "patented MTU valuation data" does not require the data to be patented, but refers to the fact that at least one technology within an MTU is disclosed in a patent or patent application, or is considered as a potential subject of one or more patent applications. For example, one or both of marketing, sales, business, and finance (MSBF) information and technology information can be used by a market impact data co-processor in conjunction with market impact data to generate PG, CG, and NG market impact results for an MTU under consideration. Similarly, patent use information can be used in conjunction with patent data and/or patent protection data by a patent protection data co-processor to generate PG, CG, and NG market impact results for an MTU under consideration.

Market impact data includes, but is not limited to MTU TAM/SOM data, MTU effect on TAM/SOM data, CAGR or TOM/SOM data; PG % of TAM/SOM data, CG % of TAM/SOM data, NG % of TAM/SOM data, CG takeover of PG data, NG takeover of CG data, and/or market expansion data as a result of CG MTU.

Patent data includes, but is not limited to data related to patents, patent applications, and legal placeholder inventions (LPIs). Patent data can also include patent holder data, which indicates, among other things entities to whom a patent has issued or is assigned.

Patent protection data includes the number of issued market-tech (m-t) patents, the number of protected inventions, number of ideal inventions, invention curve data, number of pending m-t patent applications, number of legal placeholder inventions (LPIs) patent quality data patent age data, m-t portfolio breadth data, m-t portfolio balance data, patent transaction data (e.g. licensing information; pending and completed litigation pleadings, motions, and rulings; patent prosecution data (e.g. number of office actions; office actions and responses; appeal and reply briefs; and appeal decisions), or the like.

PG MTU data, CG MTU data, and NG MTU data each include market-tech (m-t) data related to their respective generations. Player data is also included for each of the PG MTU data, CG MTU data, and NG MTU data. Player data refers to companies designing, selling, manufacturing, operating, servicing, or otherwise involved in a particular MTU. For example, some of the "players" in the "electric vehicle charger" MTU could be Shell®, Siemens®, Tesla®, Schneider Electric®, and ABB®.

Patent portfolio valuation co-processor used the output of the market impact data co-processor, patent protection data co-processor, the PG MTU data co-processor, the CG MTU data co-processor, and the NG MTU data co-processor to generate one or more patented MTU valuations. In the illustrated example, patent portfolio valuation co-processor calculates a PG market impact value, a CG market impact value, an NG market impact value, a PG how well protected value, a CG how well protected value, and an NG how well protected value. These values are used as a basis for generating a PG portfolio value, a CG portfolio value, and an NG portfolio value, which in turn can be used as a basis for determining an MTU value. In some embodiments, any or all of the values determined by patent portfolio valuation can be output as the final MTU value and provided to one or more other co-processors for further processing, transmitted to a GUI on a user interface device, used to update one or more MTU records included in a database, or the like. In the illustrated example, the PG portfolio value is calculated by multiplying the PG market value by the PG how well protected value. Similarly, the CG portfolio value is calculated by multiplying the CG market value by the CG how well protected value, and the NG portfolio value is calculated by multiplying the NG market value by the NG how well protected value.

Figure 310:
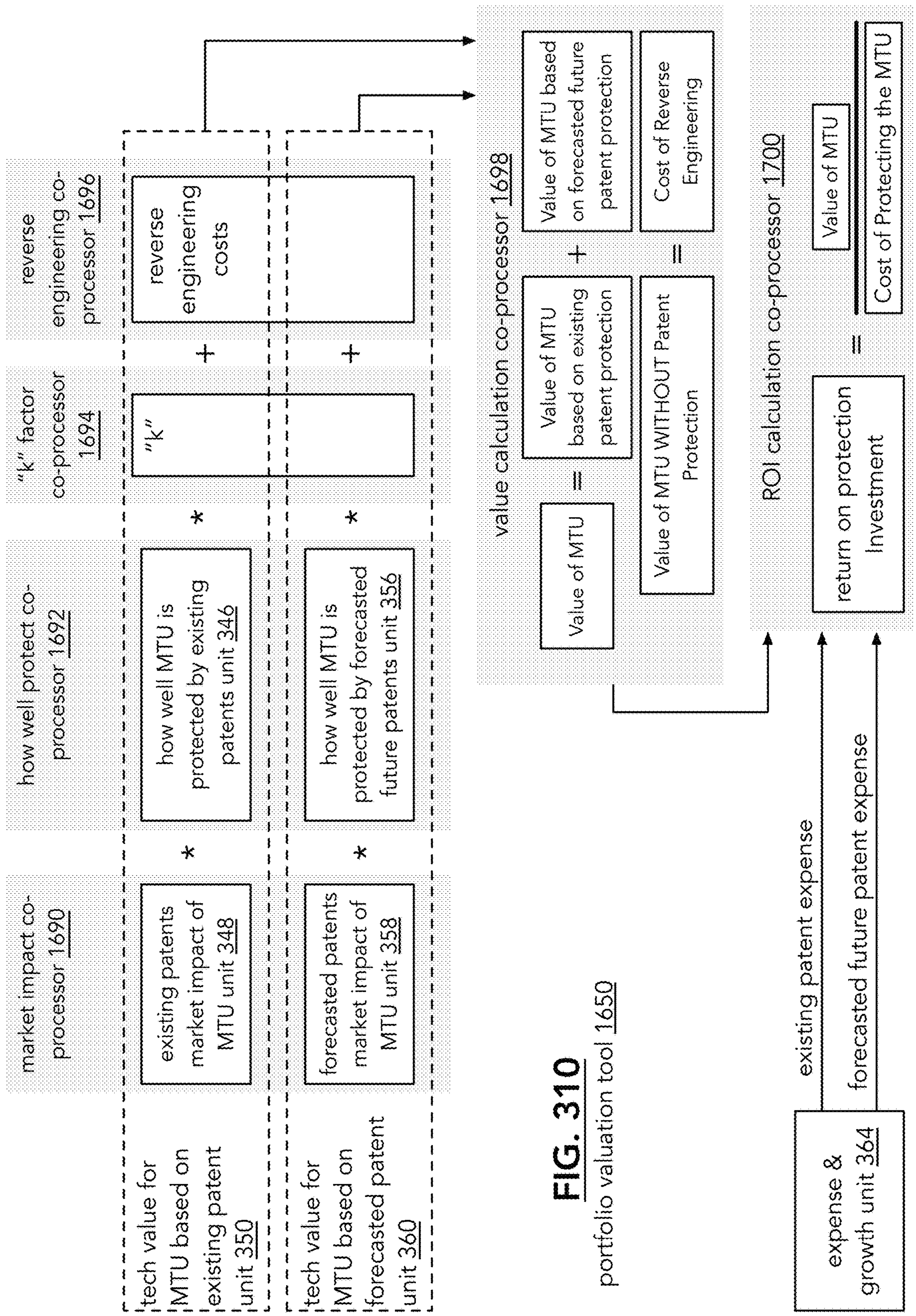
FIG. 310 is a diagram of another embodiment of a portfolio valuation tool for valuing an MTU as performed by a co-processor of an improved computer for technology.

Referring next to FIG. 310 another embodiment of a portfolio valuation tool for valuing an MTU as performed by a co-processor of an improved computer for technology will be discussed. The embodiment of portfolio valuation tool 1650 illustrated in FIG. 310 includes a market impact co-processor 1690, a how well protected co-processor 1692, a "k" factor co-processor 1694, a reverse engineering co-processor 1696, a value calculation co-processor 1698, an ROI calculation co-processor 1700, and an expense and growth unit co-processor 364.

Portfolio evaluation tool 1650 determines a first tech value using a tech value for MTU based on existing patent unit 350, and a second tech value using a tech value for MTU based on forecasted patent unit 350.

The tech value for MTU based on existing patent unit 350 includes at least one or more of the following: an existing patents market impact MTU unit 348, which can be implemented using a market impact co-processor 1690, and which generates a market wide SOM value of the existing patent MTU; a how well MTU is protected by existing patents unit 346, which can be implemented using a how well protected co-processor 1692, and which generates a value (e.g. from 0 to 1) representing how well the MTU is protected by existing patents; a "k" factor co-processor 1694, which generates a "k" value (e.g. from 0.1 to 0.9, with 0.6 being typical for communication, information, electronic technologies); and a reverse engineering co-processor 1696, which generates a reverse engineering costs value associated with the MTU. The output of the tech value for MTU based on existing patent unit 350 is provided to value calculation co-processor 1698.

The tech value for MTU based on forecasted patent unit 360 includes at least one or more of the following: a forecasted patents market impact MTU unit 358, which can be implemented using a market impact co-processor 1690, and which generates a market wide SOM value of the forecasted patents MTU; a how well MTU is protected by forecasted patents unit 356, which can be implemented using a how well protected co-processor 1692, and which generates a value (e.g. from 0 to 1) representing how well the MTU will be protected by forecasted patents; a "k" factor co-processor 1694, which generates a "k" value (e.g. from 0.1 to 0.9, with 0.6 being typical for communication, information, electronic technologies); and a reverse engineering co-processor 1696, which generates a reverse engineering costs value associated with the MTU. The output of the tech value for MTU based on forecasted patent unit 360 is provided to value calculation co-processor 1698.

Value calculation co-processor 1698 determines a value of the MTU by adding the value of the MTU based on existing patent protection to the value of the MTU based on forecasted future patent protection. Value calculation co-processor 1698 also determines the value of the MTU without any patent protection based on the cost of reverse engineering determined by the reverse engineering co-processor 1696. The value of the MTU with and without patent protection are transmitted to ROI calculation co-processor 1700.

ROI calculation co-processor 1700 also receives existing patent expense information and forecasted future patent expense information from expense and growth unit 364, and uses that information in conjunction with the value information received from value calculation co-processor 1698 to determine a return on protection investment. In at least one embodiment, the return on protection investment is determined by dividing the value of the MTU by the cost of protecting the MTU. In some implementations, the return on protection investment also takes into account the difference between the difference between the value of the MTU with and without patent protection.

Figure 311:
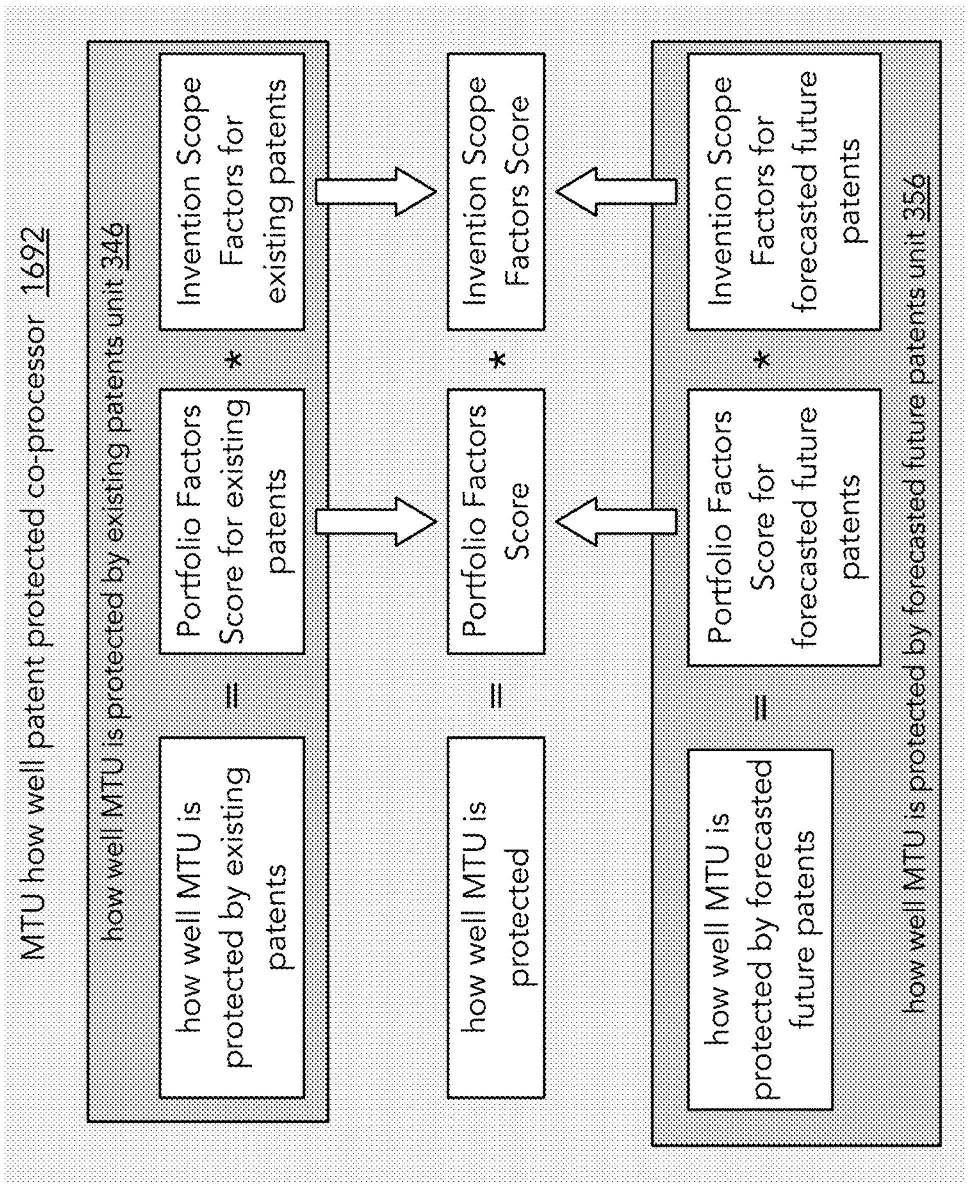
FIG. 311 is a diagram of an embodiment of an MTU how well patent protected co-processor of a portfolio valuation tool for valuing an MTU of an improved computer for technology.

Referring next to FIG. 311 an embodiment of an MTU how well patent protected co-processor of a portfolio valuation tool for valuing an MTU of an improved computer for technology will be discussed. MTU how well protected co-processor 1692 includes a how well MTU is protected by existing patent units 346 and a how well MTU is protected by forecasted future patent units 356.

How well MTU is protected by existing patent unit 346 determines how well the MTU is protected by existing patents by multiplying a portfolio factors score for existing patents by the invention scope factors for existing patents. In various embodiments, a portfolio factor score for existing patents ranges from about 0.02 to 1. In those same embodiments, an invention scope factor for existing patents is in the range of about 0.01 to 1.

How well MTU is protected by forecasted future patents unit 346 determines how well the MTU is protected by forecasted future patents by multiplying a portfolio factors score for forecasted future patents by the invention scope factors for forecasted future patents. In various embodiments, a portfolio factor score for forecasted future patents ranges from about 0.02 to 1. In those same embodiments, an invention scope factor for forecasted future patents is in the range of about 0.01 to 1.

MTU how well protected co-processor 1692 generates a combined portfolio factor score using the portfolio factors score for existing patents and the portfolio factors score for forecasted future patents, and a combined invention scope factors score using the invention scope factors score for existing patents and the inventions scope factors score for forecasted future patents. The combined portfolio factors score is multiplied by the combined invention scope factors score to generate a how well is MTU protected value.

Figure 312:
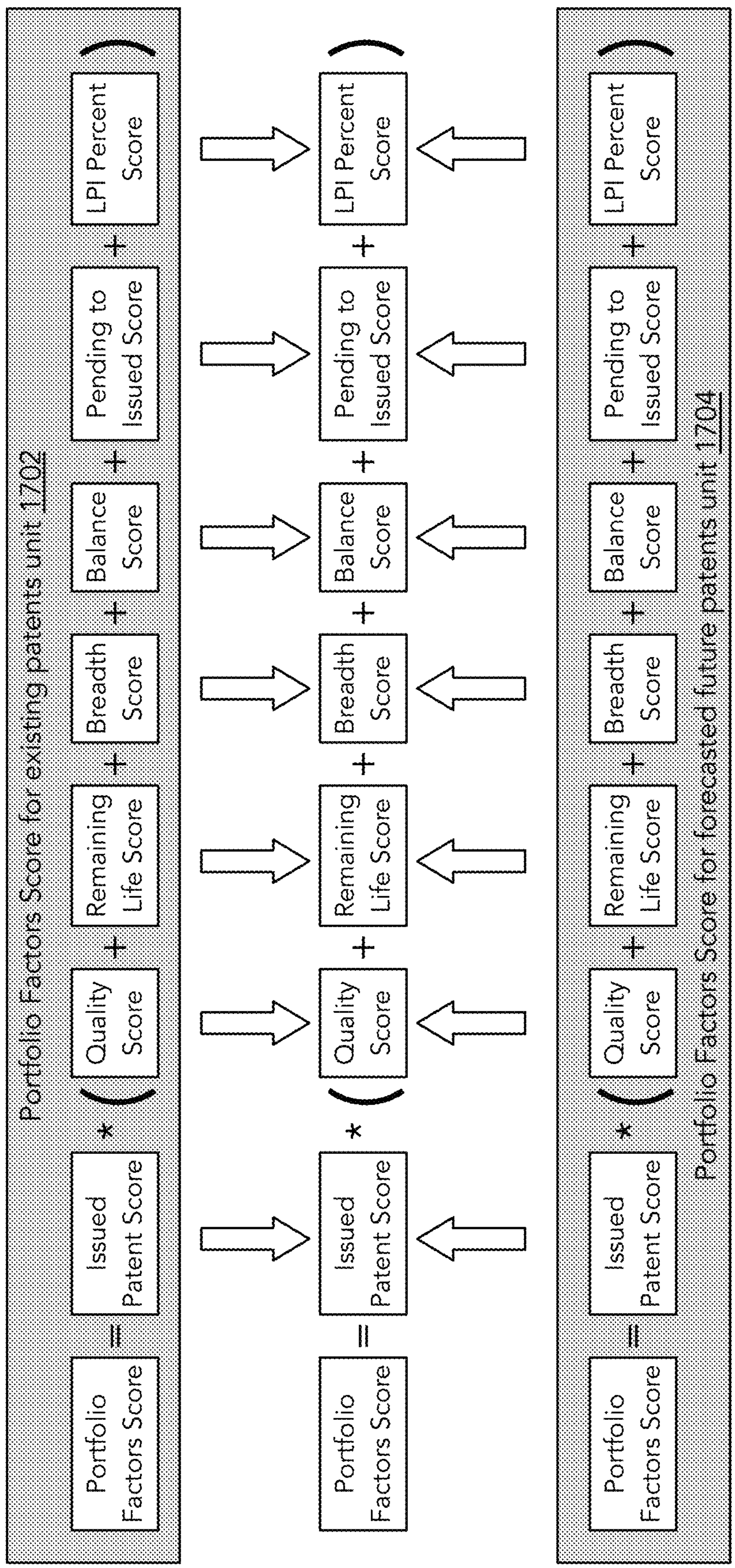
FIG. 312 is a diagram of an embodiment of a portfolio factor score for exiting patents unit and a portfolio factor score for forecasted future patents units of a portfolio valuation tool for valuing an MTU of an improved computer for technology.

Referring next to FIG. 312 an embodiment of a portfolio factors score for existing patents unit and a portfolio factors score for forecasted future patents unit of a portfolio valuation tool for valuing an MTU of an improved computer for technology will be discussed. Portfolio factors score for existing patents unit 1702 determines a portfolio factors score associated with existing patents by multiplying an issued patent score by the sum of the following scores: a quality score, a remaining life score, a breadth score, a balance score, a pending to issued score, and an LPI percent score. In one example, the portfolio factors score is in the range of about 0.02 to 1, the issued patent score is in the range of about 0.02 to 1, the quality score is in the range of about 0.02 to 0.25, the remaining life score is in the range of about 0.02 to 0.1, the breadth score is in the range of about 0.02 to 0.25, a balance score is in the range of about 0.02 to 0.2, a pending to issued score is in the range of about 0.02 to 0.11, and a legal placeholder invention (LPI) percent score is in the range of about 0.02 to 0.1.

Portfolio factors score for forecasted future patents unit 1704 determines a portfolio factors score associated with forecasted future patents by multiplying an issued patent score (associated with forecasted future patents) by the sum of the following scores (also associated with forecasted future patents): a quality score, a remaining life score, a breadth score, a balance score, a pending to issued score and an LPI percent score. In one example, the portfolio factors score is in the range of about 0.02 to 1, the issued patent score is in the range of about 0.02 to 1, the quality score is in the range of about 0.02 to 0.25, the remaining life score is in the range of about 0.02 to 0.1, the breadth score is in the range of about 0.02 to 0.25, a balance score is in the range of about 0.02 to 0.2, a pending to issued score is in the range of about 0.02 to 0.11, and a legal placeholder invention (LPI) percent score is in the range of about 0.02 to 0.1.

With the exception of the remaining life score and the LPI percent score, the various component scores used by portfolio factor score for existing patents unit 1702 and portfolio factors score for forecasted future patents unit 1704 are discussed in greater deal with respect to either previous or subsequent figures.

The remaining life score is a factor indicating how long the patent portfolio will continue to provide protection for a particular MTU. Because a portfolio can consist of multiple different patents in multiple jurisdictions, each having its own expiration date, the remaining life score can be used to represent an average, mean, or median time until expiration of patent protection. In some embodiments, the remaining life score may decrease at either an exponential or other variable rate as more patents expire. For example, the remaining life score for a 400 patent portfolio may be 0.1, but expiration of half those patents will not necessarily result in a remaining life score of 0.05 (half of 0.1).

The LPI percent score refers to the percentage of legal placeholder inventions (LPIs) included in the portfolio. LPIs refer to inventions disclosed, but not yet claimed (or fully claimed), in a patent application. For example, consider a patent application that discloses multiple different advancements in a touchscreen display technology (e.g. four different inventive circuits that can be used to implement the touchscreen display, and an inventive controller that can be used with any of the inventive circuits). If a first application is filed claiming one of the four different inventive circuits, the remaining three inventive circuits and the inventive controller can be referred to as LPIs. Each LPI has the potential to mature into its own patent, so a portfolio that includes 100 patent applications, each having 3 LPIs has the potential to mature into 400 issued patents (100 applications+300 LPIs) covering 400 different inventions, whereas a portfolio that includes 100 patent applications with very few LPIs would almost certainly not mature into 400 issued patents covering 400 different inventions.

In addition to generating portfolio factors scores for both existing and forecasted future patents, the portfolio valuation tool uses those scores to generate an overall portfolio factors score. The portfolio valuation tool combines the outputs of the portfolio factors score for existing patents unit 1702 and the Portfolio factors score for forecasted future patents unit 1704 to generate an overall issued patent score, an overall quality score, an overall remaining life score, an overall breadth score, an overall balance score, an overall pending to issued score and an overall LPI percent score. The overall portfolio factors score tool then generates the overall portfolio factors score by multiplying the overall issued patent score by the sum of the following scores: the overall quality score, the overall remaining life score, the overall breadth score, the overall balance score, the overall pending to issued score, and the overall LPI percent score.

Figure 313:
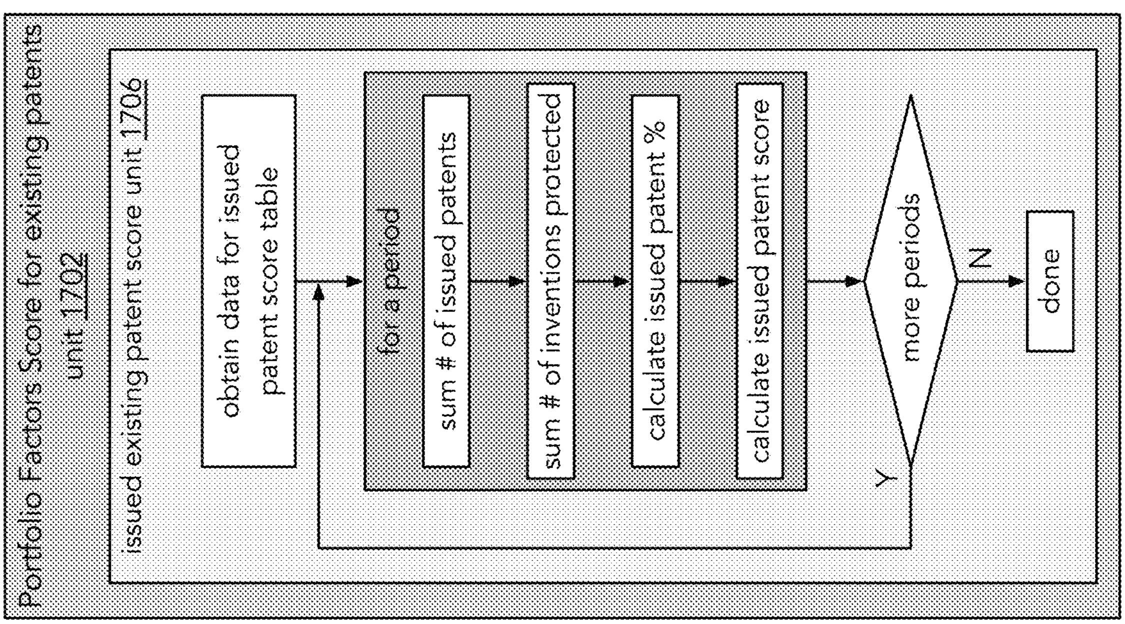
FIG. 313 is a diagram of another embodiment of a portfolio factor score for exiting patents unit of a portfolio valuation tool for valuing an MTU of an improved computer for technology.

Referring next to FIG. 313 another embodiment of a portfolio factor score for existing patents unit of a portfolio valuation tool for valuing an MTU of an improved computer for technology will be discussed. Portfolio factors score for existing patents unit 1702 includes an issued existing patent score unit 1706 that calculates an issued patent score according to various embodiments. Issued existing patent score unit 1706 obtains data to be included in an issued patent score table from one or more data sources. Obtaining the data can include one or more of issuing a query to a commercial, government, or specialty database, performing data scanning and optical character recognition, receiving updated information periodically or in response to a triggering event. For example, one or more co-processors of an improved computer system can be programmed to periodically query a database of a patent-related database. If a query of that database indicates that a patent application in a portfolio has issued, automatic transfer of information indicating the patent issuance can be transmitted to portfolio factors score for existing patents unit 1702. In at least one embodiment, the data obtained for the issued patent score table is grouped into one or more time periods. The time periods can be, for example, a year, a quarter, a month, a number of years, number of quarters, number of months, or the like.

The time period can be determined in advance, and updated data can be obtained automatically one or more times each time period. In some embodiments, the time period can be specified by information included in a user query, or otherwise.

For a particular time period, issued existing patent score unit 1706 sums the number of issued patents present in a portfolio over that time period, sums the number of inventions protected over that time period, calculates the percentage of the number of patents in the portfolio that issued over that time period, and calculates an issued patent score. Issued patent scores are calculated over each time period to be considered.

For example, if portfolio factors score for existing patents unit 1702 is tasked with calculating issued patent scores for each two-year period from 2023-2024, portfolio factors score for existing patents unit 1702 will iteratively calculate 6 issued patent scores for the following periods: 2013-2014, 2015-2016, 2017-2018, 2019-2020, 2021-2022, and 2023-2024.

Figure 314:
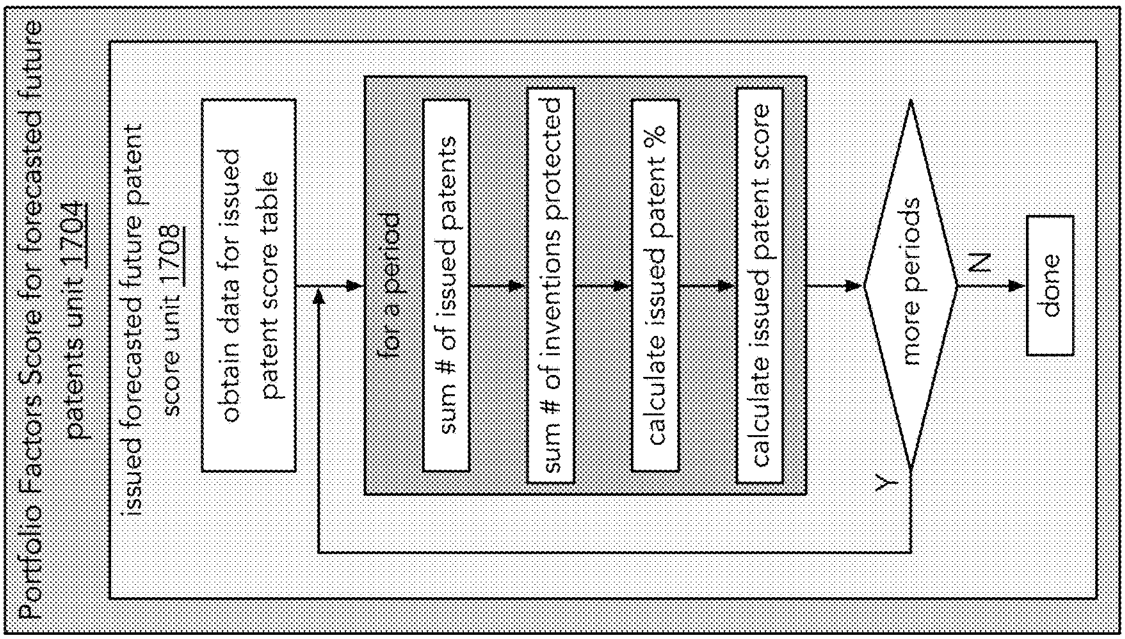
FIG. 314 is a diagram of another embodiment of a portfolio factor score for forecasted future patents units of a portfolio valuation tool for valuing an MTU of an improved computer for technology.

Referring next to FIG. 314 is a diagram of another embodiment of a portfolio factor score for forecasted future patents units of a portfolio valuation tool for valuing an MTU of an improved computer for technology will be discussed. Portfolio factors score for forecasted future patents unit 1704 includes an issued forecasted future patent score unit 1708 that calculates an issued patent score according to various embodiments. Issued forecasted future patent score unit 1708 obtains data to be included in an issued patent score table from one or more data sources. Obtaining the data can include one or more of issuing a query to a commercial, government, or specialty database, performing data scanning and optical character recognition, receiving updated information periodically or in response to a triggering event. For example, one or more co-processors of an improved computer system can be programmed to periodically query a database of a patent-related database. If a query of that database indicates that a patent application in a portfolio has issued, automatic transfer of information indicating the patent issuance can be transmitted to portfolio factors score for forecasted future patents unit 1704. In at least one embodiment, the data obtained for the issued patent score table is grouped into one or more time periods. The time periods can be, for example, a year, a quarter, a month, a number of years, number of quarters, number of months, or the like.

The time period can be determined in advance, and updated data can be obtained automatically one or more times each time period. In some embodiments, the time period can be specified by information included in a user query, or otherwise.

For a particular time period, issued forecasted future patent score unit 1708 sums the number of issued patents present in a portfolio over that time period, sums the number of inventions protected over that time period, calculates the percentage of the number of patents in the portfolio that issued over that time period, and calculates an issued patent score. Issued patent scores are calculated over each time period to be considered.

For example, if portfolio factors score for forecasted future patents unit 1704 is tasked with calculating issued patent scores for the next 2 years in 4-quarter periods, portfolio factors score for forecasted future patents unit 1704 will iteratively calculate two issued patent scores for the following periods: Q1-Q4 of first upcoming year, Q1-Q4 of second upcoming year.

Referring next to FIG. 315 an example of data for a portfolio factor score for existing patents unit of a portfolio valuation tool for valuing an MTU of an improved computer for technology will be discussed. In various embodiments, the data obtained by portfolio factors score for existing patents unit 1702 (FIG. 313) includes data used to form data records for existing time period(s) that have been completed (e.g. previous year(s)), a current time period (CP) that has not yet been completed (e.g. the current year), and some number of "next periods" (NPs) (e.g. the next 7 years). In some embodiments the existing time period(s), current time period, and next time periods need not be of the same duration. Thus, the existing time period can be the past 4 years, while the current time period and the next time periods can each be a single quarter.

The data obtained by portfolio factors score for existing patents unit 1702 includes, but is not limited to, at least one of the following: number of issued patents, number of inventions protected, issued patent percentage, and/or issued patent score. As illustrated, each row of data in the illustrated data structure for existing patents includes information linked to a particular period of time (e.g. existing, CP, $1^{st}$-$7^{th}$ NP). The information in the rows can be organized and stored as a record within a database. For example the illustrated table (or some other data structure) can be stored within, or linked to, an MTU record. Similarly, some or all of the information can be individually stored, or stored in other records linked to each other using relational database linking techniques. Note that the data used by portfolio factors score for existing patents unit 1702 can use forecasted data, despite the fact that the data is used by existing patents unit 1702.

Referring next to FIG. 316 calculated data for a portfolio factors score for forecasted future patents unit of a portfolio valuation tool for valuing an MTU of an improved computer for technology will be discussed. In various embodiments, the data obtained by portfolio factors score for forecasted future patents unit 1704 (FIG. 314) includes data used to form data records for existing time period(s), a current time period (CP) that has not yet been completed (e.g. the current year), and some number of "next periods" (NPs) (e.g. the next 7 years). In some embodiments the time periods need not be of the same duration.

The data obtained by portfolio factors score for forecasted future patents unit 1704 includes, but is not limited to, at least one of the following: number of issued patents, number of inventions protected, issued patent percentage, and/or issued patent score. As illustrated, each row of data in the illustrated data structure for existing patents includes information linked to a particular period of time (e.g. existing, CP, $1^{st}$-$7^{th}$ NP). The information in the rows can be organized and stored as a record within a database. For example the illustrated table (or some other data structure) can be stored within, or linked to, an MTU record. Similarly, some or all of the information can be individually stored, or stored in other records linked to each other using relational database linking techniques. By contrast with the data obtained by portfolio factors score for existing patents unit 1702 (FIG. 315), data obtained by portfolio factors score for forecasted future patents unit 1704 does not include an existing number of issued patents or an existing number of inventions protected, although the issued patent percentage and the issued patent score for an existing portfolio may be included.

Figure 317:
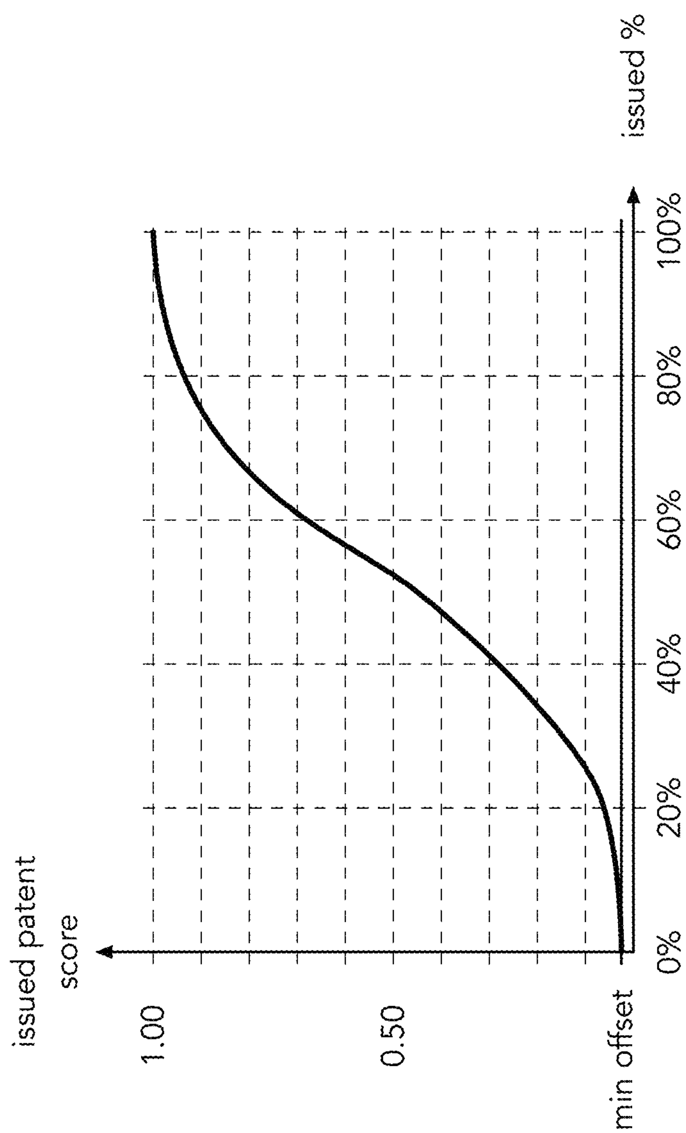
FIG. 317 is a diagram of a graph of issued patent percentage to issued patent score for valuing an MTU of an improved computer for technology.

Referring next to FIG. 317 a graph of issued patent percentage to issued patent score for valuing an MTU of an improved computer for technology will be discussed. The horizontal axis of the graph represents an issued percentage for a portfolio with respect to an MTU, and the vertical axis represents an issued patent score for the same portfolio with respect to the same MTU. The issued percentage is determined by dividing the number of issued patents by the number of inventions protected. the issued patent score is determined by the following formula: issued patent score=x+1-e^(issued percentage/exponent factor), where x is a minimum offset.

Referring next to FIG. 318 another example of calculated data for a portfolio factor score for forecasted future patents units of a portfolio valuation tool for valuing an MTU of an improved computer for technology is illustrated. The data illustrated in FIG. 318 includes data representing summations of data obtained by portfolio factors score for existing patents unit (FIG. 315), and the data obtained by the portfolio factors score for forecasted future patents unit (FIG. 316). The combined portfolio factors scores can be used by an MTU how well patent protected co-processor 1692 to generate an overall patent quality score.

It should be noted that the existing and future summed scores can include summed data that has been weighted prior to being summed. In some embodiments, the forecasted future data (FIG. 316) be given more, or less, impact than the existing data (FIG. 315) by applying a weighting factor to some or all of the data. For example, the impact of existing data can be increased or decreased by multiplying by one or more data values by one or more impact factors. For example, modifying the number of inventions protected for a current period by 1.004 will increase the impact of that data, but multiplying that same data by 0.096 will decrease the impact of that same data. One or more different impact factors can be applied to individual data items, to a subset of data items, or to the entire set of either or both existing and forecasted future data items.

Figure 319:
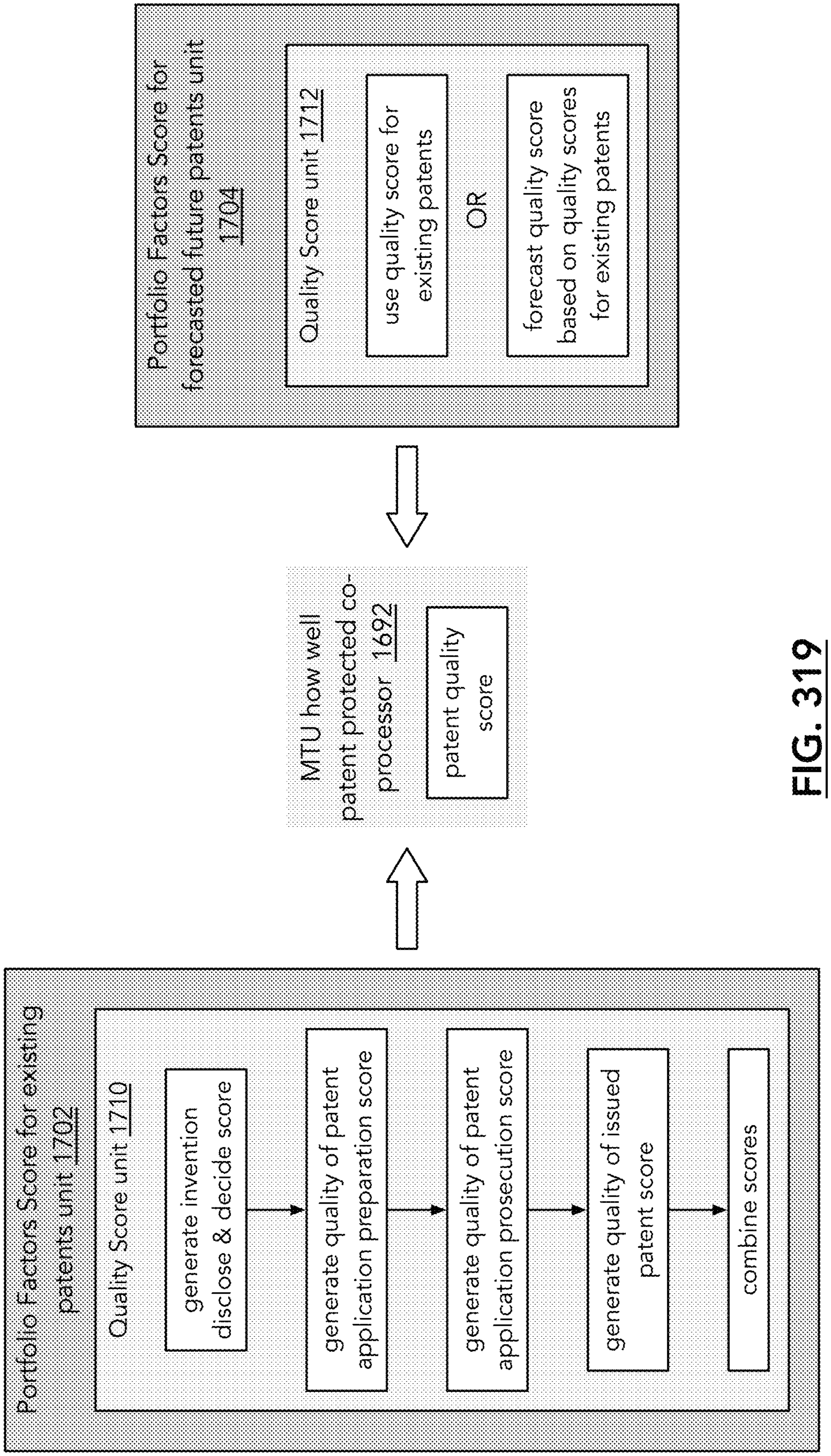
FIG. 319 is a diagram of another embodiment of a portfolio factor score for exiting patents unit and a portfolio factor score for forecasted future patents units of a portfolio valuation tool for valuing an MTU of an improved computer for technology.

Referring next to FIG. 319, another embodiment of a portfolio factor score for existing patents unit and a portfolio factor score for forecasted future patents units of a portfolio valuation tool for valuing an MTU of an improved computer for technology will be discussed. As illustrated in FIG. 319, a portfolio valuation tool for valuing an MTU of an improved computer for technology includes portfolio factors score for existing patents unit 1702, portfolio factors score for forecasted future patents unit 1704, and MTU how well patent protected co-processor 1692.

Portfolio factors score for existing patents unit 1702 includes a first quality score unit 1710, which generates the following scores: an invention disclose and decide score, quality of patent application preparation score, quality of patent application prosecution score, and a quality of issued patent score. Quality score unit 1710 combines these scores to generate combined quality scores for existing patents, and provides the combined quality scores for existing patents to MTU how well patent protected co-processor 1692.

Providing the combined quality scores for existing patents can include direct transmission to MTU how well patent protected co-processor 1692, transmission to an intermediary that forwards the combined quality score for existing patents, transmission to a storage unit for storage and later retrieval by MTU how well patent protected co-processor 1692, or the like. Generating the combined quality scores for existing patents can include creating averages, sums, and trends, such as an issuance rate trend, a quality improvement trend, a quality decreasing trend, a number of office actions (OAs) to issuance trend, or the like.

Portfolio factors score for forecasted future patents unit 1704 includes a second quality score unit 1712, which uses the quality score for existing patents as proxy for the quality score for forecasted future patents, or forecasts the quality score for forecasted future patents based on the quality scores for existing patents. Forecasting the quality score for forecasted future patents can include the use of various statistical methods, including but not limited to straight line, moving averages, simple linear regression, multiple linear regression. The data used for forecasting can include data obtained from qualitative data sources (e.g. the Delphi method, market surveys, executive opinion surveys, and the like) and/or data obtained quantitatively based on time series analysis and projection, and/or causal models.

MTU how well patent protected co-processor 1692 uses the outputs of portfolio factors score for existing patents unit 1702 and portfolio factors score for forecasted future patents unit 1704 to generate a patent quality score indicating how well an MTU is protected by a portfolio including existing and forecasted future patents.

Figure 320:
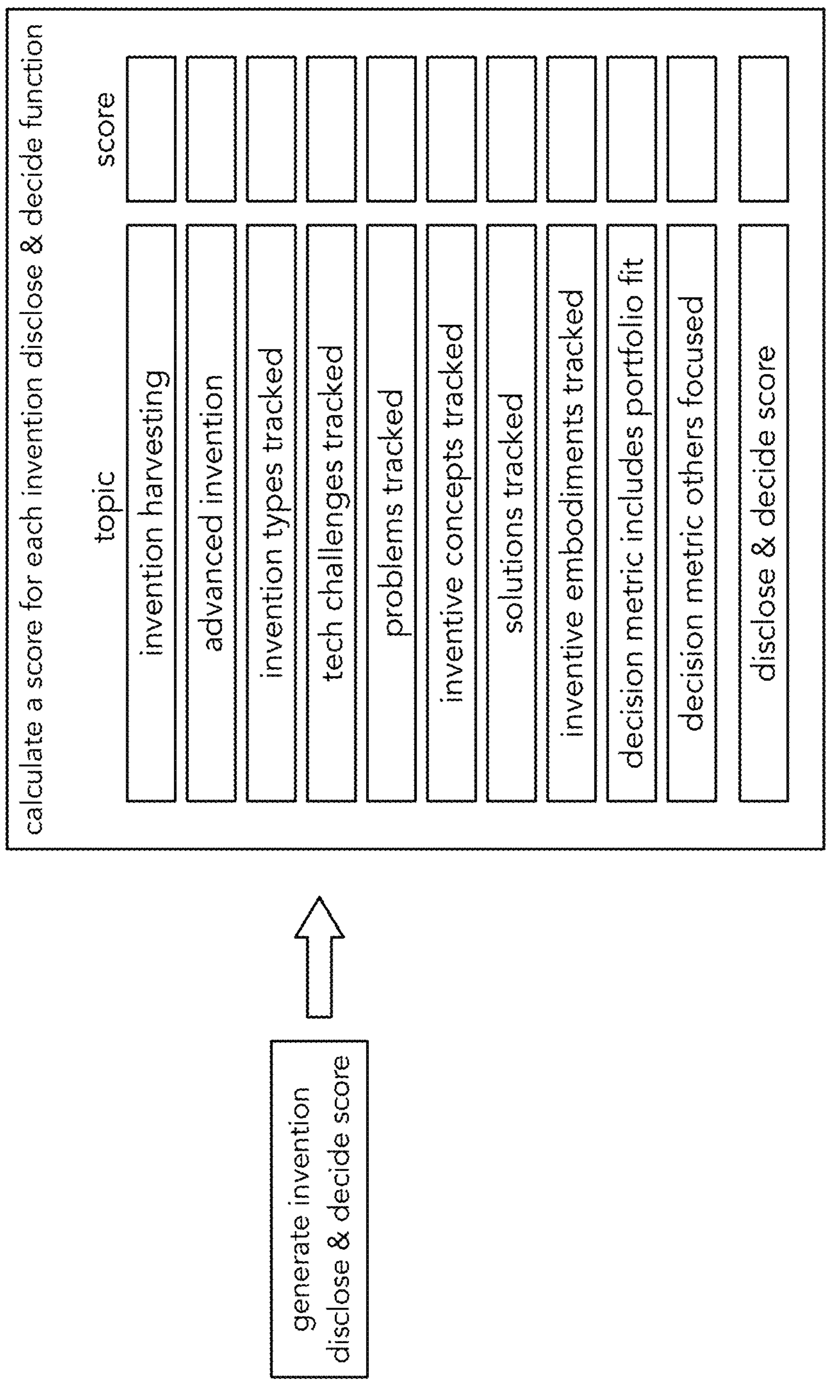
FIG. 320 is a diagram of another example of calculated data for a portfolio factor score for forecasted future patents units of a portfolio valuation tool for valuing an MTU of an improved computer for technology.

Referring next to FIG. 320 another example of calculated data for a portfolio factor score for forecasted future patents units of a portfolio valuation tool for valuing an MTU of an improved computer for technology will be discussed. In particular, data used for generating an invention disclose and decide score are discussed. As shown by FIG. 320, a score for each invention disclose and decide function (e.g. "topic") can be calculated by quality score unit 1710 (FIG. 319). It should be appreciated in advance that the illustrated topics are not an exhaustive list of topics that may be scored by various embodiments.

In at least some embodiments, a score is generated for the following topics: invention harvesting (ensuring inventions are identified/not overlooked), advanced invention (identifying potential inventions by analyzing opportunities for expanding current technologies), invention types tracked (which types of inventions are protected/yet-to-be-protected by particular patents/applications), tech challenges tracked (what technical challenges are anticipated for implementing particular technologies), problems tracked (which problems need to solved in a particular technology), inventive concepts tracked (inventive concepts are basis of patent claim—there may be multiple inventive concepts for a particular MTU), solutions tracked (which problems have been solved by particular inventions), inventive embodiments tracked (a single invention can have multiple embodiments), decision metric includes portfolio fit (do decisions include consideration of how well an invention fits within a current/forecasted future portfolio), decision metric others focused (are decisions based on use of technology by others, and not solely on internal use), and disclose and decide score (a composite score quantifying standardization, repeatability, and consistency of disclosure and decision making processes with respect to technology protection). The score for each topic represents a degree to which policies for each topic have been established, and how well any established policies are implemented.

In at least one such embodiment, each of the scores generated can be in the range of 0.0 to 0.04. A value of 0.0 indicates that no policy has been implemented and/or that the policy is never enforced if it has been implemented. A value of 0.01 indicates that a policy related to a topic is in place, but that the enforcement of the policy is inconsistent. A value of 0.02 indicates that a policy related to a topic is in place and is repeatably enforced. A value of 0.03 indicates that a policy related to a topic is in place and enforcement of that policy has been standardized. A value of 0.04 indicates that both the policy is in place, and enforcement of that policy, have been optimized.

For example, if there is no policy in place to track tech challenges of a particular MTU as they relate to particular patents or patent applications, the score for the track tech challenges topic will be 0.0. A score of 0.0 will also apply if there is a policy in place to track tech challenges, but that policy is only sporadically followed or enforced. If a policy for invention harvesting is in place and repeatably followed, the score for the topic of invention harvesting would be 0.02. If policies regarding decision metrics are others focused and enforcement of those decision metrics is standardized, the score given to the topic of policies regarding decision metrics are others focused will be 0.03. If policies related to invention type tracking (e.g. tracking which invention types are covered by particular patents and applications) are in place and enforcement is optimized (e.g. requiring entry of invention types into a database or docket tracking system, and periodically sending reminders if such data is not entered), the score for the topic of invention types tracked can be given a score of 0.04.

The invention disclose and decide score can be generated by summing the scores calculated for individual topics, by averaging those scores, by determining a median score, or by performing another statistical analysis. In some embodiments, the disclose and decide score itself ranges from 0.0 to 0.04, while in other embodiments, the disclose and decide score can be up to the sum of all individual topic scores. In some embodiments, any or all of the individual topic scores can be weighted relative to other topic scores so that adding the weighted individual topic scores produces a sum between 0.0 and 0.04.

Figure 321:
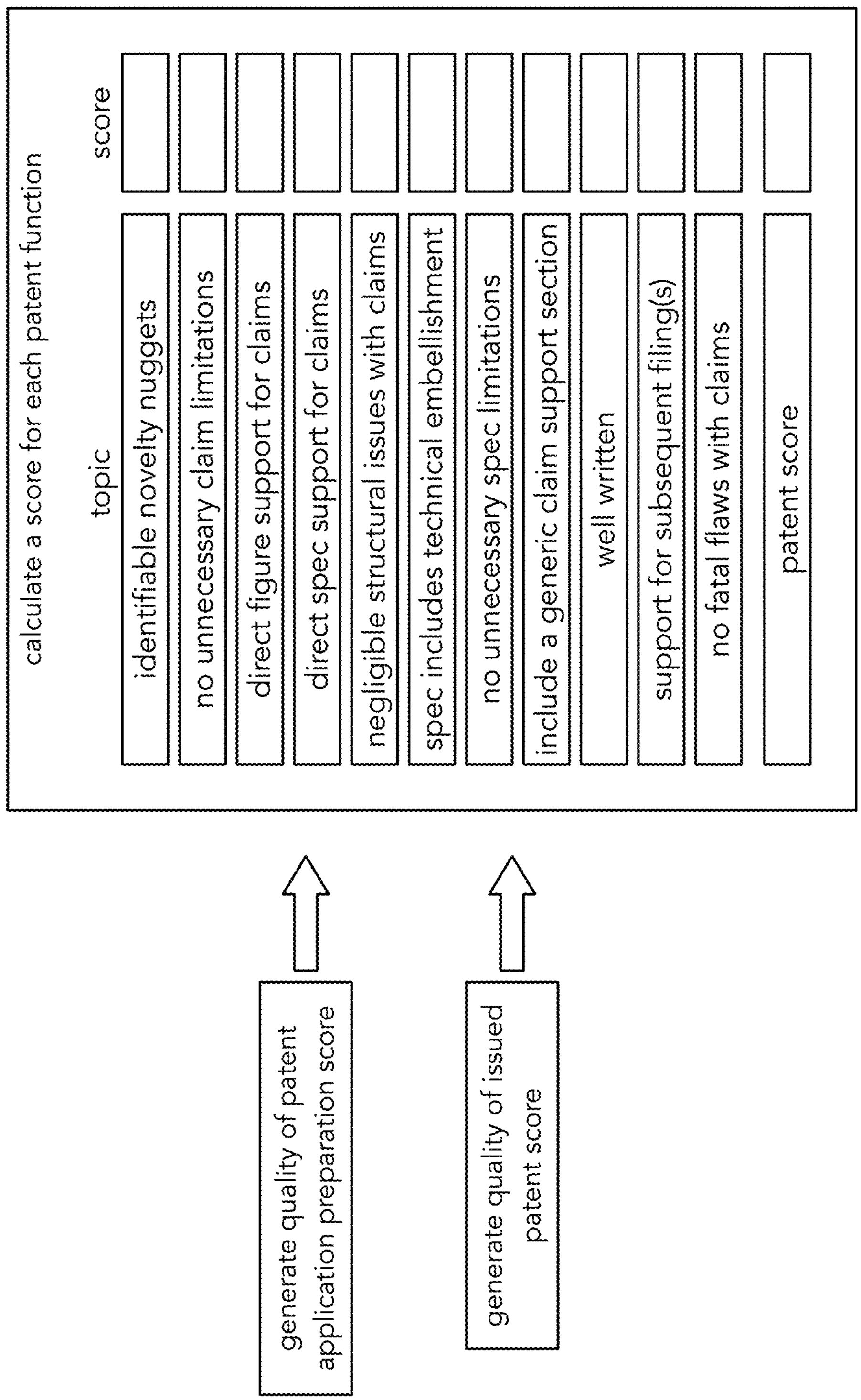
FIG. 321 is a diagram of another example of calculated data for a portfolio factor score for forecasted future patents units of a portfolio valuation tool for valuing an MTU of an improved computer for technology.

Referring next to FIG. 321 another example of calculated data for a portfolio factor score for forecasted future patents units of a portfolio valuation tool for valuing an MTU of an improved computer for technology will be discussed. In particular, data used for generating a quality of patent application preparation score and/or a quality of issued patent score are discussed. As shown by FIG. 321, a score for each patent function (e.g. "topic") can be determined by quality score unit 1710 (FIG. 319).

In at least some embodiments, a score is generated for the following topics: identifiable novelty nuggets, no unnecessary claim limitations, direct figure support for claims, direct spec support for claims, negligible structural issues with claims, spec includes technical embellishment, no unnecessary spec limitations, include a generic claim support section, well written, support for subsequent filing(s), no fatal flaws with claims, and patent score. The score for each topic represents a degree to which each of the patent functions has been achieved. It should be appreciated that the illustrated topics are not an exhaustive list of topics that may be scored by various embodiments.

In at least some embodiments, scores can be generated automatically, based on quantitative analysis of one or more patent documents. For example, direct figure support for claims and direct spec support for claims can be identified based on textual analysis of the claims, the specification, and the Figures to identify matching terms, consistent use of terms in conjunction with callouts, and the like. Even scores for certain topics that appear to more subjective can be automatically generated based on textual analysis of one or more documents and/or comparison with a listing of terms and associated concepts. Assume, for example, that a claim element includes a novelty nugget associated with a given technology. All other elements of the claim can be compared to a listing of element types that may be necessary for the given technology to be functional. If one of the other elements is not included in the list, it can be identified as unnecessary, and/or flagged for further evaluation. In some embodiments, the scores are entered based on human analysis of a patent or patent application. In yet further embodiments, an artificial intelligence (AI) bot can be trained to generate each score. In yet other embodiments, some combination of human, computer automated scoring, and AI scoring is employed.

In at least one such embodiment, each of the scores assigned to individual patent functions (topics) can be in the range of 0.0 to 0.06. A value of 0.0 indicates that a particular patent function has definitely not been achieved, or is not present. If a particular patent function is present, but not fully achieved, a value of between 0.01 to 0.05 is assigned, with 0.05 being more fully achieved. A value of 0.06 indicates that a particular patent function has definitely been achieved.

The total patent score, which represents a quality of patent application preparation score and/or a quality of issued patent score can be generated by summing the scores determined for one or more individual topics, by averaging those scores, by determining a median score, or by performing another statistical analysis. In some embodiments, the patent application preparation score itself ranges from 0.0 to 0.06, while in other embodiments, the total patent score can be up to the sum of all individual topic scores. In some embodiments, any or all of the individual topic scores can be weighted relative to other topic scores so that adding the weighted individual topic scores produces a sum between 0.0 and 0.06.

The patent function of "no fatal flaws with claims" is an important exception to the way in which the scores of individual patent functions are used to generate the total patent score. If there are fatal flaws in the claims, the total patent score will be assigned to be zero, regardless of any other scores.

Figure 322:
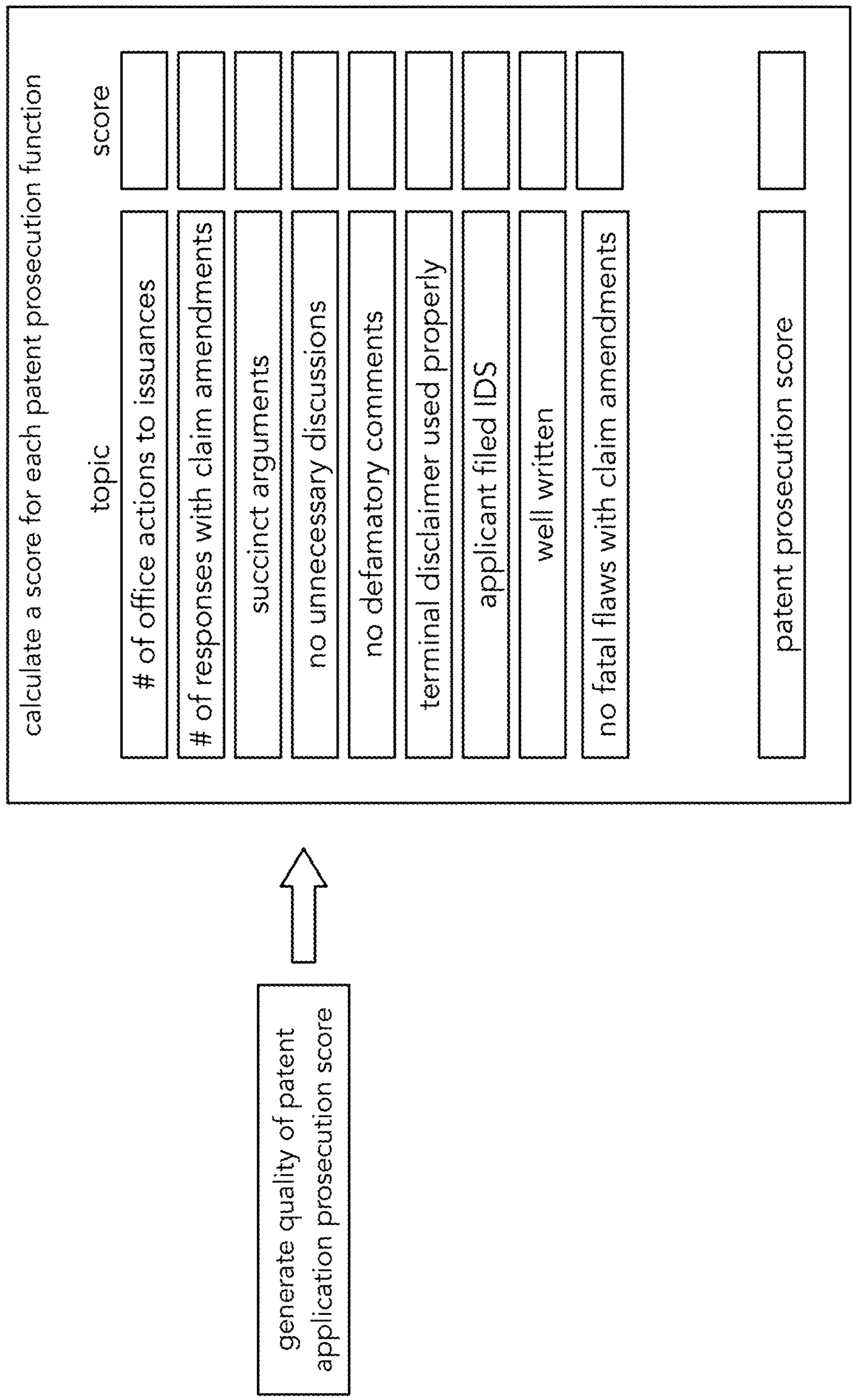
FIG. 322 is a diagram of another example of calculated data for a portfolio factor score for forecasted future patents units of a portfolio valuation tool for valuing an MTU of an improved computer for technology.

Referring next to FIG. 322 another example of calculated data for a portfolio factor score for forecasted future patents units of a portfolio valuation tool for valuing an MTU of an improved computer for technology will be discussed. In particular, data used for generating a quality of patent application prosecution score. As shown by FIG. 322, a score for each patent prosecution function (e.g. "topic") can be determined by quality score unit 1710 (FIG. 319).

In at least some embodiments, a score is generated for the following topics: number of office actions to issuances (too many office actions indicates lack of clarity of invention), number of responses with claim amendments (too many office actions indicates lack of clarity of invention), succinct arguments (long arguments give rise to potential estoppel issues), no unnecessary discussions (unnecessary discussions give rise to potential estoppel issues), no defamatory comments (could cause enforcement issues), terminal disclaimer used properly (do not surrender patent term unnecessarily or cause enforcement issues), applicant filed IDS (demonstrates candor), well written, no fatal flaws with claim amendments, and patent prosecution score. The score for each topic represents a degree to which each of the patent prosecution functions has been achieved. It should be appreciated that the illustrated topics are not an exhaustive list of topics that may be scored by various embodiments.

Scores can be generated automatically, based on quantitative analysis of patent prosecution documents, for example those included in the official file history. Scores can be determined based on one or more of the following: textual analysis of the claims, specification, figures official actions, responses to official actions, appeal briefs, reply briefs, or interview summaries; comparison of prosecution documents to sample prosecution documents, sample arguments; comparison of a patent prosecution functions associated with a current analysis with patent prosecution functions associated with other patent prosecutions; human analysis/user provided input; automated computer analysis and score generation such as through the use of trained artificial intelligence (AI) bots, or some combination thereof.

In at least one such embodiment, each of the scores assigned to individual patent prosecution functions (topics) can be in the range of 0.0 to 0.06. A value of 0.0 indicates that a particular patent prosecution function has definitely not been achieved, or is not present. If a particular patent prosecution function is present, but not fully achieved, a value of between 0.01 to 0.05 is assigned, with 0.05 being more fully achieved. A value of 0.06 indicates that a particular patent prosecution function has definitely been achieved.

The total patent prosecution score, which represents a quality of patent application prosecution score, can be generated by summing the scores determined for one or more individual patent prosecution functions (topics), by averaging those scores, by determining a median score, or by performing another statistical analysis. In some embodiments, the total patent prosecution score itself ranges from 0.0 to 0.06, while in other embodiments, the total patent prosecution score can be up to the sum of all individual topic scores. In some embodiments, any or all of the individual topic scores can be weighted relative to other topic scores so that adding the weighted individual topic scores produces a sum between 0.0 and 0.06.

The patent prosecution function of "no fatal flaws with claim amendments" is an important exception to the way in which the scores of individual patent prosecution functions are used to generate the total patent prosecution score. If there are fatal flaws with the claim amendments, the total patent score will be set to zero, regardless of any other scores.

Figure 323:
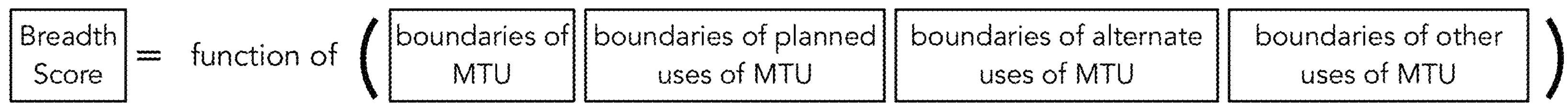
FIGS. 323 and 324 are a diagram of another embodiment of a portfolio factor score for exiting patents unit and a portfolio factor score for forecasted future patents units of a portfolio valuation tool for valuing an MTU of an improved computer for technology.
Figure 324:
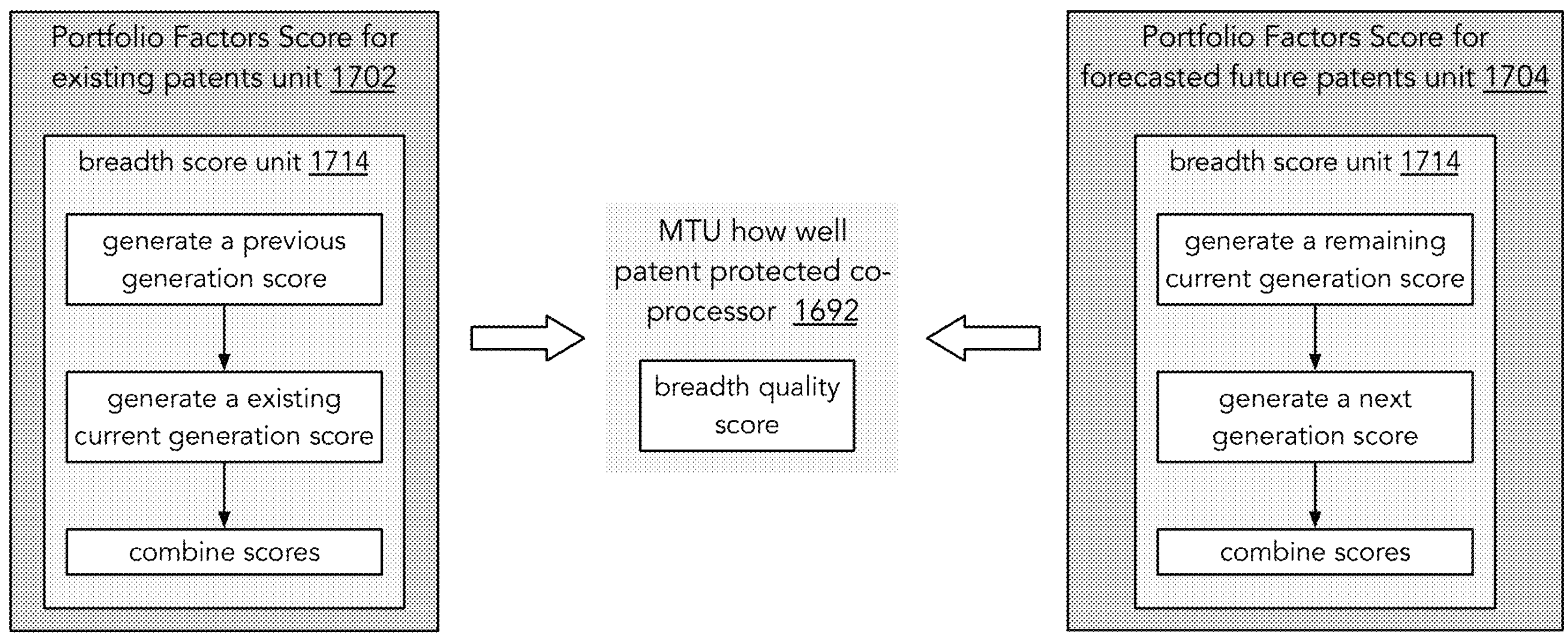

Referring next to FIGS. 323 and 324 another embodiment of a portfolio factor score for existing patents unit and a portfolio factor score for forecasted future patents units of a portfolio valuation tool for valuing an MTU of an improved computer for technology will be discussed. In particular, a determination of a breadth score will be discussed.

A breadth score, when used in evaluating a portfolio, indicates a breadth of protection provided by a patent portfolio for a particular MTU, and is a function of the following: boundaries of an MTU, boundaries of planned uses of an MTU, boundaries of alternate uses of an MTU, and boundaries of other uses of an MTU.

A portfolio valuation tool for valuing an MTU of an improved computer for technology determines breadth quality scores for existing patents and forecasted future patents, and provides those scores to MTU how well patent protected co-processor 1692, which generates an overall breadth quality score and uses that overall breadth quality score to determine how well an MTU is/will be protected by a patent portfolio consisting of existing patents and forecasted future patents. A higher overall breadth quality score will indicate that MTU boundaries are well defined, and well expanded.

A portfolio valuation tool includes portfolio factors score for existing patents unit 1702 and portfolio factor score for forecasted future patents unit 1704. Both portfolio factors score for existing patents unit 1702 and portfolio factor score for forecasted future patents unit 1704 include issued breadth score unit 1714.

The issued breadth score unit 1714 included in portfolio factors score for existing patents unit 1702 generates a previous generation score indicating a breadth of protection provided by an existing portfolio for a previous generation (PG) MTU and a current generation (CG) score indicating a breadth of protection provided by an existing portfolio for a current generation (CG) MTU. The two scores are combined to generate a total existing patent breadth score by using a weighting factor of CG to PG based on a disruption of CG MTU, a level of innovation of the CG MTU, or the like. In at least one embodiment, the more disruptive and innovative the CG technology is, the greater the weight assigned to the CG relative to the PG.

The breadth score unit 1714 included in portfolio factors score for forecasted future patents unit 1704 generates a remaining CG score indicating a breadth of protection provided by a forecasted portfolio for a forecasted remaining life of the CG MTU and a next generation (NG) score indicating a breadth of protection provided by the forecasted future patent portfolio for a NG MTU. The two scores are combined to generate a total forecasted future breadth score by using a weighting factor of remaining CG to NG based on a disruption of CG MTU, a level of innovation of the CG MTU, or the like. In at least one embodiment, the more disruptive and innovative the CG technology is, the greater the weight assigned to the NG relative to the remaining CG.

Figure 325:
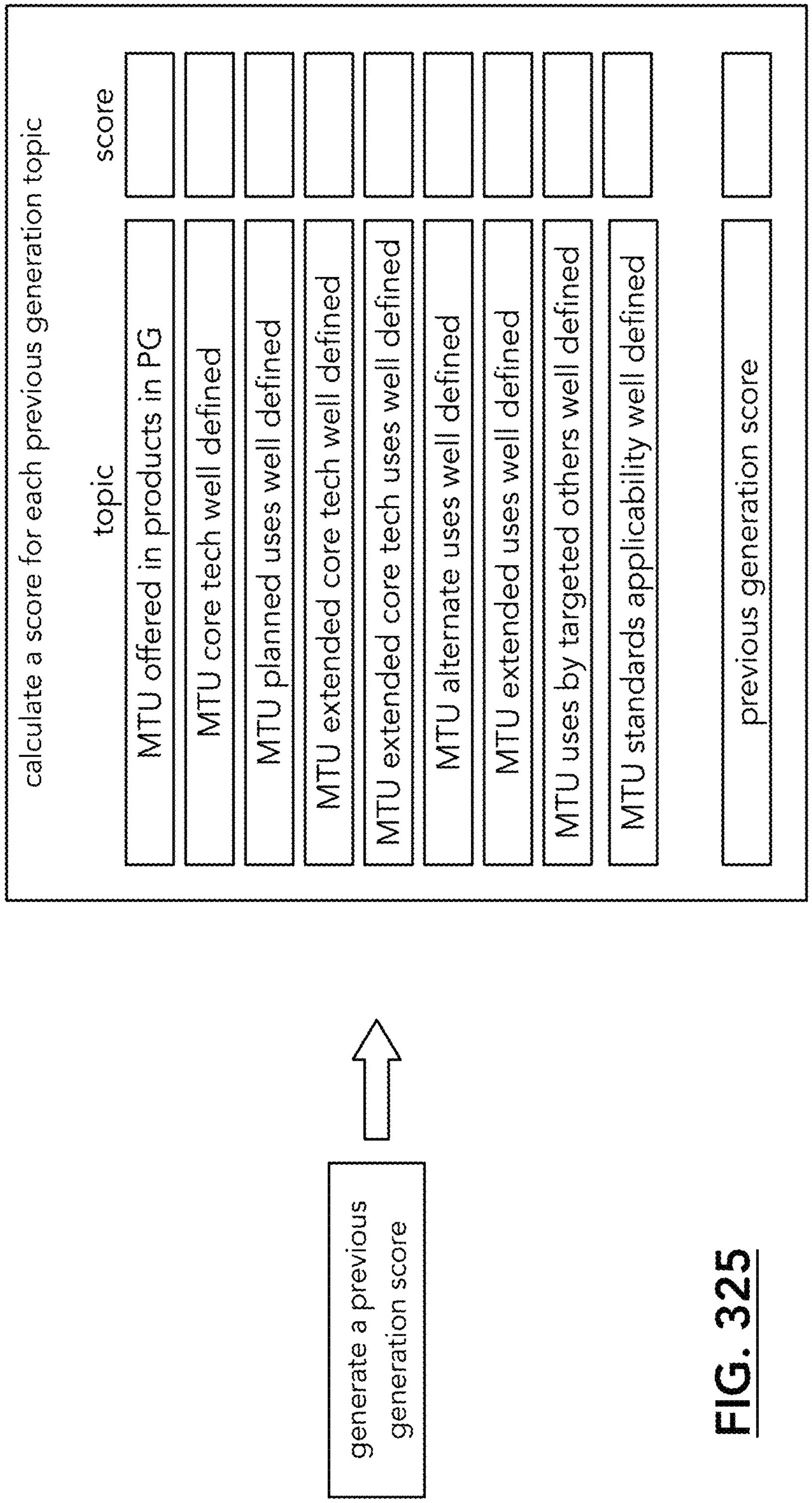
FIG. 325 is a diagram of another example of calculated data for a portfolio factor score for forecasted future patents units of a portfolio valuation tool for valuing an MTU of an improved computer for technology.

Referring next to FIG. 325 another example of calculated data for a portfolio factor score for forecasted future patents units of a portfolio valuation tool for valuing an MTU of an improved computer for technology will be discussed. In particular, data used for generating a previous generation score by portfolio factors score for existing patents unit 1702 (FIG. 324) is illustrated. A score for each previous generation topic can be determined or obtained by Portfolio Factors Score for existing patents unit 1702.

In at least some embodiments, a score is generated for the following previous generation topics: MTU offered in products in PG, MTU core tech well defined, MTU planned uses well defined, MTU extended core tech well defined, MTU extended core tech uses well defined, MTU alternate uses well defined, MTU extended uses well defined, MTU uses by targeted other well defined, and MTU standards applicability well defined. The previous generation (PG) score is generated based on the individual topic scores. The score for each topic represents a degree to which each of the previous generation topics has been achieved. A higher overall previous generation score indicates that MTU boundaries for the previous technology generation (previous generation of the MTU) are well defined, and well expanded. It should be appreciated that the illustrated topics are not an exhaustive list of topics that may be scored by various embodiments.

Scores can be generated automatically, based on one or more of the following: textual analysis of the documents; comparison of documents to samples; comparison of scores assigned to other previous generation MTUs, human analysis/user provided input; automated computer analysis and score generation such as through the use of trained artificial intelligence (AI) bots, or some combination thereof.

In at least one such embodiment, if no MTU is offered in a previous generation product, the total previous generation score will be 0. If an MTU is offered in a previous generation product, the range for each function is 0.0 to 0.1. If the MTU cannot be extended (e.g. the MTU is fully extended already), the maximum score will be assigned for topics related to MTU extension. Similarly, if there are no alternatives or standards related to the MTU, the maximum score will be assigned for topics related to MTU alternatives or standards.

The total previous generation score can be generated by summing the scores determined for one or more previous generation topics, by averaging those scores, by determining a median score, or by performing another statistical analysis. In some embodiments, the total previous generation score itself ranges from 0.0 to 0.1, while in other embodiments, the total previous generation score can be up to the sum of all individual topic scores. In some embodiments, any or all of the individual topic scores can be weighted relative to other topic scores so that adding the weighted individual topic scores produces a sum between 0.0 and 0.1.

Figure 326:
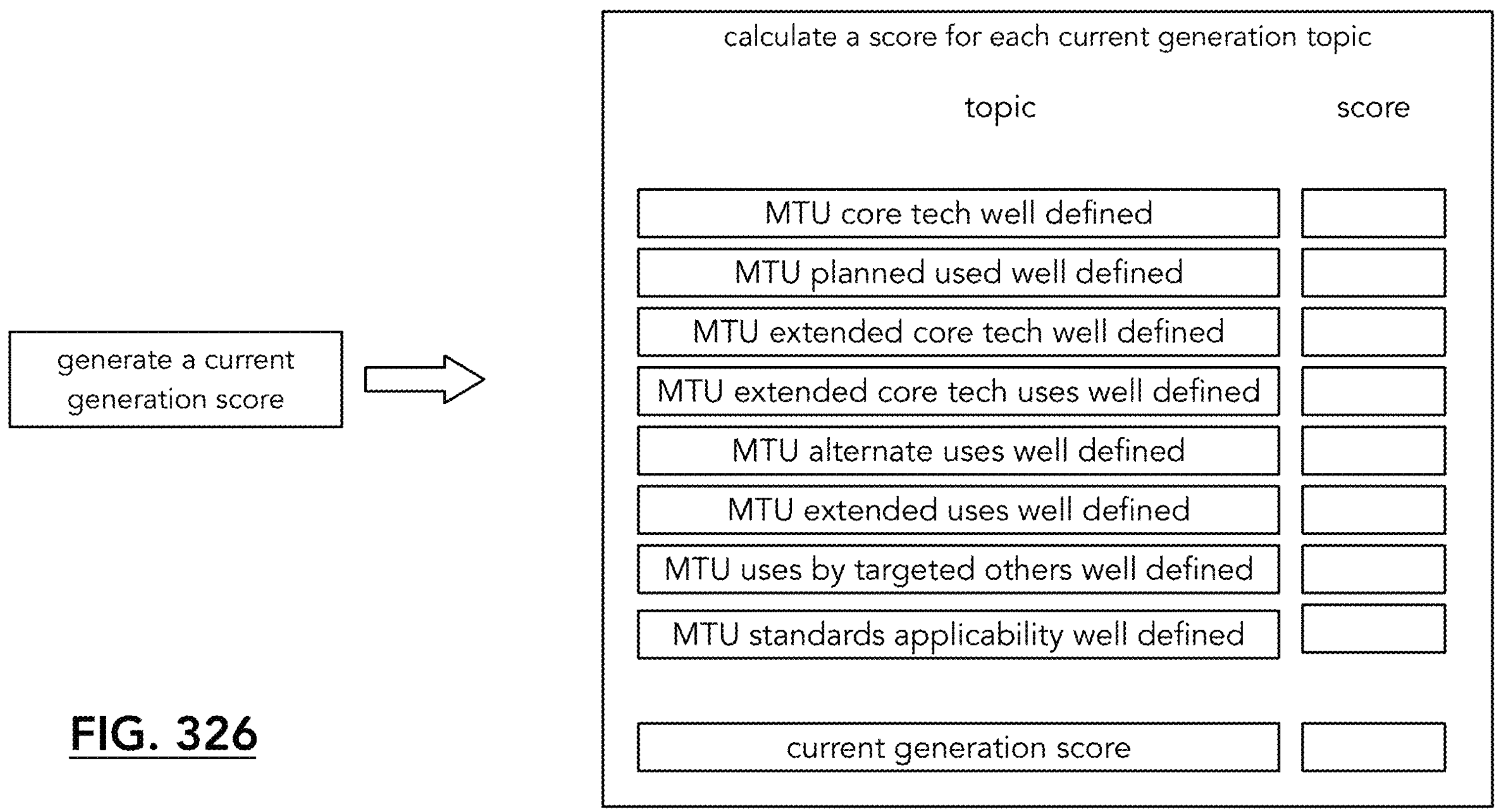
FIG. 326 is a diagram of another example of calculated data for a portfolio factor score for forecasted future patents units of a portfolio valuation tool for valuing an MTU of an improved computer for technology.

Referring next to FIG. 326 is another example of calculated data for a portfolio factor score for forecasted future patents units of a portfolio valuation tool for valuing an MTU of an improved computer for technology will be discussed. In particular, data used for generating a current generation score by portfolio factors score for existing patents unit 1702 (FIG. 324) or a remaining current generation score by portfolio factors score for forecasted future patents unit 1704 (FIG. 324), is illustrated. A score for each CG (or remaining CG) topic can be determined or obtained by Portfolio Factors Score for existing patents unit 1702 and/or portfolio factors score for forecasted future patents unit 1704.

In at least some embodiments, a score is generated for the following current generation topics: MTU core tech well defined, MTU planned uses well defined, MTU extended core tech well defined, MTU extended core tech uses well defined, MTU alternate uses well defined, MTU extended uses well defined, MTU uses by targeted other well defined, and MTU standards applicability well defined. The current generation (CG) and remaining CG scores are generated based on the individual topic scores. Note that in some embodiments, a single CG score can be calculated, and split between CG and remaining CG based on a phase of the CG MTU. Thus, if the CG MTU has a life expectancy of 2 years, and this analysis is being performed 1.5 years into the life of the MTU, % of the single CG score can be assigned as the CG score, while ¼ of the CG score can be treated as the remaining CG score. Other suitable divisions are within the spirit and scope of this disclosure.

The score for each CG topic represents a degree to which each of the CG topics has been achieved. A higher overall CG score indicates that MTU boundaries for the current technology generation (CG MTU) are well defined, and well expanded. It should be appreciated that the illustrated topics are not an exhaustive list of topics that may be scored by various embodiments.

Scores can be generated automatically, based on one or more of the following: textual analysis of the documents; comparison of documents to samples; comparison of scores assigned to other previous generation MTUs, human analysis/user provided input; automated computer analysis and score generation such as through the use of trained artificial intelligence (AI) bots, or some combination thereof.

The range of scores for each function is 0.0 to 0.1. If the MTU cannot be extended (e.g. the MTU is fully extended already), the maximum score will be assigned for topics related to MTU extension. Similarly, if there are no alternatives or standards related to the MTU, the maximum score will be assigned for topics related to MTU alternatives or standards.

The total CG score can be generated by summing the scores determined for one or more current generation topics, by averaging those scores, by determining a median score, or by performing another statistical analysis. In some embodiments, the total CG score itself ranges from 0.0 to 0.1, while in other embodiments, the total CG score is the sum of all individual topic scores. In some embodiments, any or all of the individual topic scores can be weighted relative to other topic scores so that adding the weighted individual topic scores produces a sum between 0.0 and 0.1.

Figure 327:
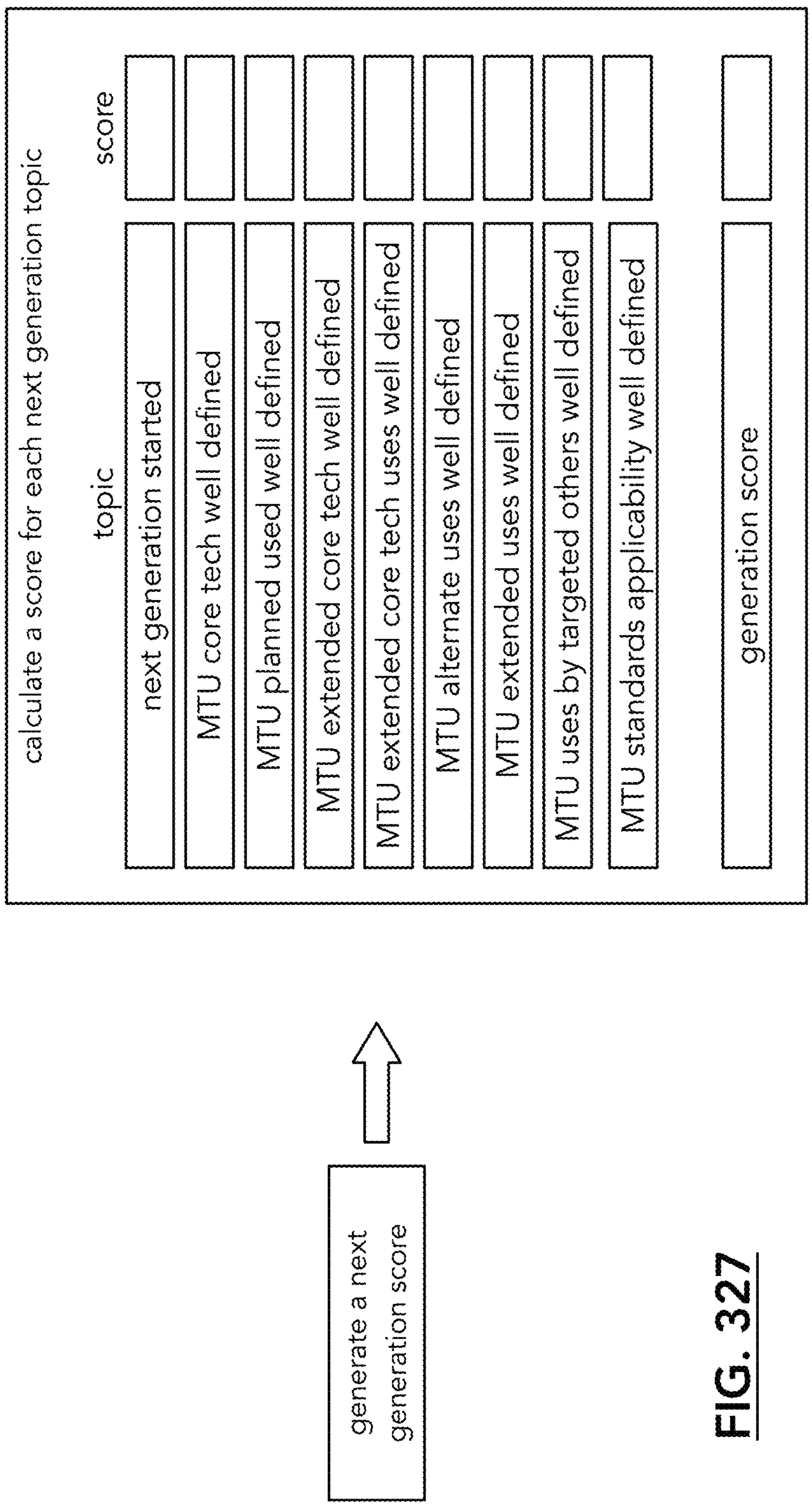
FIG. 327 is a diagram of another example of calculated data for a portfolio factor score for forecasted future patents units of a portfolio valuation tool for valuing an MTU of an improved computer for technology.

Referring next to FIG. 327 a diagram of another example of calculated data for a portfolio factor score for forecasted future patents units of a portfolio valuation tool for valuing an MTU of an improved computer for technology will be discussed. In particular, data used for generating a next generation (NG) score by portfolio factors score for forecasted future patents unit 1704 (FIG. 324), is illustrated. A score for each next generation (NG) topic can be determined or obtained by quality score unit 1712 included in portfolio factors score for forecasted future patents unit 1704.

In at least some embodiments, a score is generated for the following NG topics: NG started, MTU core tech well defined, MTU planned uses well defined, MTU extended core tech well defined, MTU extended core tech uses well defined, MTU alternate uses well defined, MTU extended uses well defined, MTU uses by targeted other well defined, and MTU standards applicability well defined. The total NG score is generated based on the individual topic scores.

The score for each NG topic represents a degree to which each of the NG topics has been achieved. A higher overall NG score indicates that MTU boundaries for the next technology generation (NG MTU) are well defined, and well expanded. It should be appreciated that the illustrated topics are not an exhaustive list of topics that may be scored by various embodiments.

Scores can be generated automatically, based on one or more of the following: textual analysis of the documents; comparison of documents to samples; comparison of scores assigned to other previous generation MTUs, human analysis/user provided input; automated computer analysis and score generation such as through the use of trained artificial intelligence (AI) bots, or some combination thereof.

The range of scores for each function is 0.0 to 0.1. If the NG has not yet started, the total NG score will be set to 0. If the MTU cannot be extended (e.g. the MTU is fully extended already), the maximum score will be assigned for topics related to MTU extension. Similarly, if there are no alternatives or standards related to the MTU, the maximum score will be assigned for topics related to MTU alternatives or standards.

The total NG score can be generated by summing the scores determined for one or more next generation topics, by averaging those scores, by determining a median score, or by performing another statistical analysis. In some embodiments, the total NG score itself ranges from 0.0 to 0.1, while in other embodiments, the total NG score is the sum of all individual topic scores. In some embodiments, any or all of the individual topic scores can be weighted relative to other topic scores so that adding the weighted individual topic scores produces a sum between 0.0 and 0.1.

Figure 328:
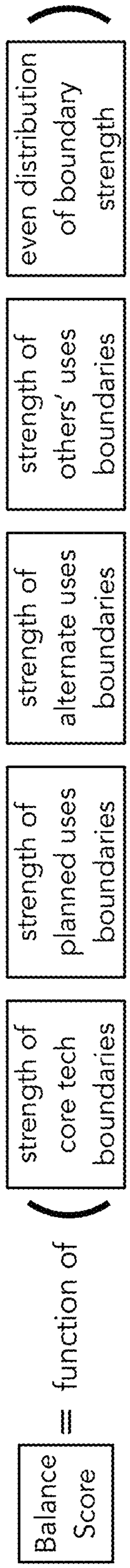
FIGS. 328 and 329 are a diagram of another embodiment of a portfolio factor score for exiting patents unit and a portfolio factor score for forecasted future patents units of a portfolio valuation tool for valuing an MTU of an improved computer for technology.
Figure 329:
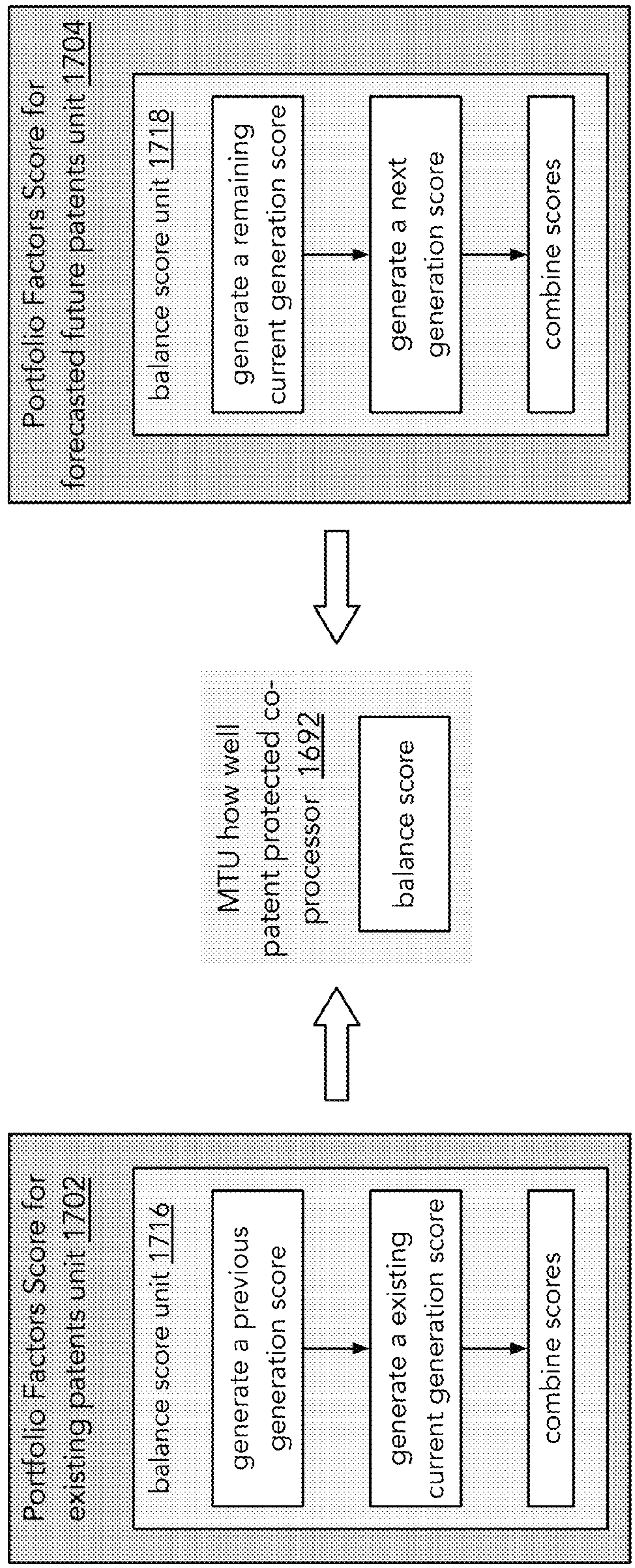

Referring next to FIGS. 328 and 329 another embodiment of a portfolio factor score for existing patents unit and a portfolio factor score for forecasted future patents units of a portfolio valuation tool for valuing an MTU of an improved computer for technology will be discussed.

A balance score, when used in evaluating a portfolio, indicates whether a patent portfolio provides balanced protection for a particular MTU, and is a function of the following: strength of core tech boundaries, strength of planned uses boundaries, strength of alternate uses boundaries, strength of other's uses boundaries, and even distribution of boundary strength.

A portfolio valuation tool for valuing an MTU of an improved computer for technology determines balance scores for existing patents and forecasted future patents, and provides those scores to MTU how well patent protected co-processor 1692, which generates an overall balance score and uses that overall balance score to determine how well protection provided by a patent portfolio (including existing patents and/or forecasted future patents) is balanced across multiple MTU boundaries. A higher overall balance score indicates a higher degree of balanced protection for MTU boundaries.

A portfolio valuation tool includes portfolio factors score for existing patents unit 1702 and portfolio factor score for forecasted future patents unit 1704. Portfolio factors score for existing patents unit 1702 includes balance score unit 1716, and portfolio factor score for forecasted future patents unit 1704 includes balance score unit 1718.

Balance score unit 1716 generates a previous generation (PG) balance score indicating how well protection provided by a portfolio of existing patents is balanced across multiple MTU boundaries of a previous generation (PG) MTU. Balance score unit 1716 also generates a current generation (CG) balance score indicating how well protection provided by a portfolio of existing patents is balanced across multiple MTU boundaries of a current generation (CG) MTU. The two scores are combined to generate a total existing patents balance score by using a weighting factor of CG to PG based on a disruption of CG MTU, a level of innovation of the CG MTU, or the like. In at least one embodiment, the more disruptive and innovative the CG technology is, the greater the weight assigned to the CG relative to the PG.

The balance score unit 1718 generates a remaining CG score indicating how well protection provided by a portfolio of forecasted future patents is balanced across multiple MTU boundaries of a forecasted remaining life of the CG MTU. Balance score unit 1718 also generates a next generation (NG) balance score indicating how well protection provided by a portfolio of forecasted future patents is balanced across multiple MTU boundaries of a next generation (NG) MTU. Balance score unit 1718 combines the two scores to generate a forecasted future balance score by using a weighting factor of remaining CG balance to NG balance based on a disruption of the CG MTU and a level of innovation of the CG MTU, or the like. In at least one embodiment, the more disruptive and innovative the CG technology is, the greater the weight assigned to the NG relative to the remaining CG.

Figure 330:
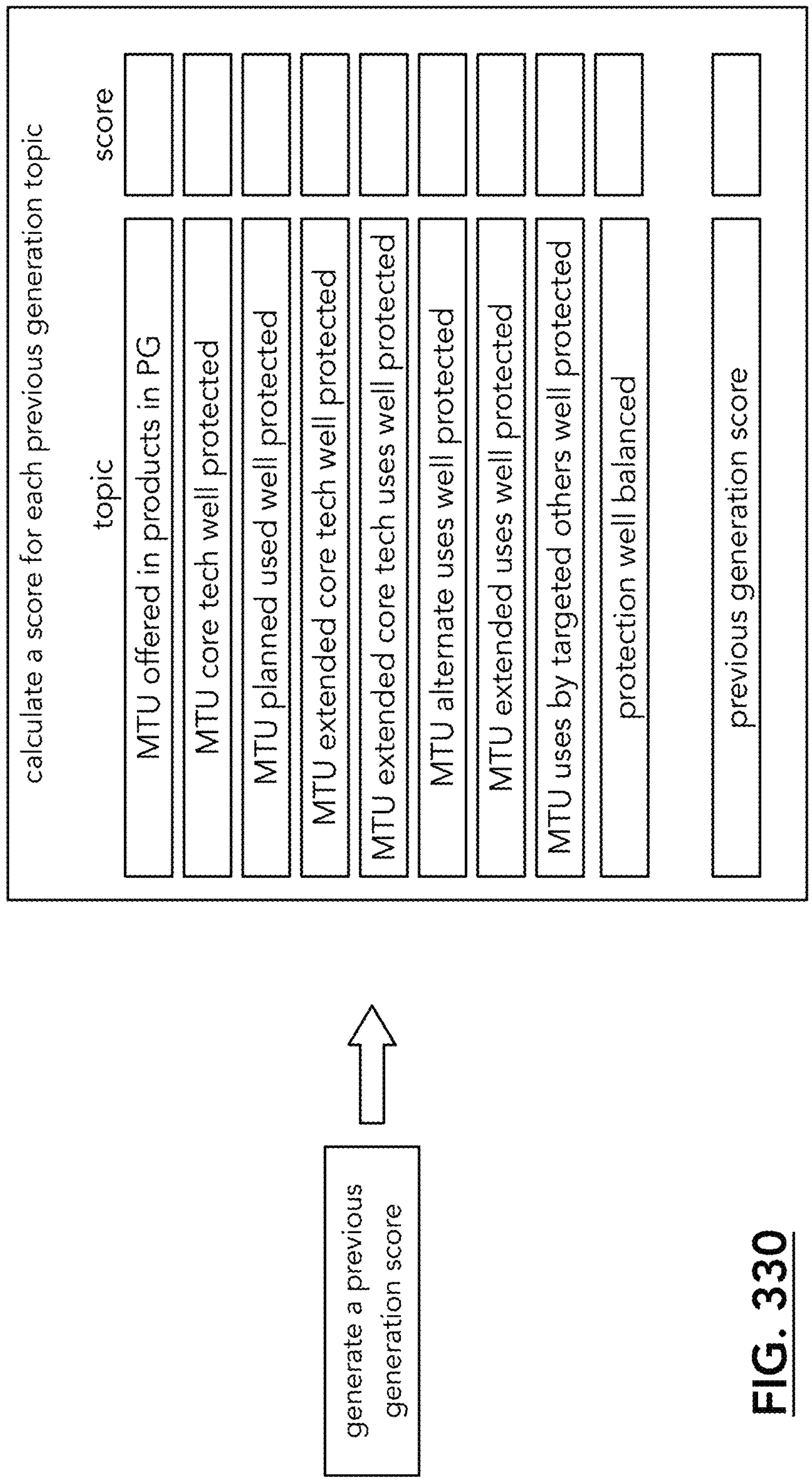
FIG. 330 is a diagram of another example of calculated data for a portfolio factor score for forecasted future patents units of a portfolio valuation tool for valuing an MTU of an improved computer for technology.

Referring next to FIG. 330 another example of calculated data for a portfolio factor score for forecasted future patents units of a portfolio valuation tool for valuing an MTU of an improved computer for technology will be discussed. In particular, data used for generating a previous generation balance score by portfolio factors score for existing patents unit 1702 (FIG. 329) is illustrated. A score for each previous generation balance topic can be determined or obtained by Portfolio Factors Score for existing patents unit 1702.

In at least some embodiments, a score is generated for the following previous generation balance topics: MTU offered in products in PG, MTU core tech well protected, MTU planned uses well protected, MTU extended core tech well protected, MTU extended core tech uses well protected, MTU alternate uses well protected, MTU extended uses well protected, MTU uses by targeted other well protected, and protection well balanced. The previous generation (PG) balance score is generated based on the individual topic scores. The score for each topic represents a degree to which each of the previous generation balance topics has been achieved. A higher overall previous generation score indicates that protection provided by a portfolio of existing patents is balanced across multiple MTU boundaries of a previous generation (PG) MTU. It should be appreciated that the illustrated topics are not an exhaustive list of topics that may be scored by various embodiments.

Scores can be generated automatically, based on one or more of the following: textual analysis of the documents; comparison of documents to samples; comparison of scores assigned to other previous generation MTUs, human analysis/user provided input; automated computer analysis and score generation such as through the use of trained artificial intelligence (AI) bots, or some combination thereof.

In at least one such embodiment, if no MTU is offered in a previous generation product, the total previous generation score will be 0. If an MTU is offered in a previous generation product, the range for each function is 0.0 to 0.1. If the MTU cannot be extended (e.g. the MTU is fully extended already), the maximum score will be assigned for topics related to MTU extension. Similarly, if there are no alternatives or standards related to the MTU, the maximum score will be assigned for topics related to MTU alternatives or standards.

The previous generation balance score can be generated by summing the scores determined for one or more previous generation balance topics by averaging topic scores, by determining a median topic score, or by performing another suitable statistical analysis. In some embodiments, the previous generation balance score itself ranges from 0.0 to 0.1, while in other embodiments, the previous generation balance score can be as large as the sum of all individual topic scores. In some embodiments, any or all of the individual topic scores can be weighted relative to other topic scores so that adding the weighted individual topic scores produces a sum between 0.0 and 0.1. If the protection well balanced score is zero, the total PG balance score will also be 0.

Figure 331:
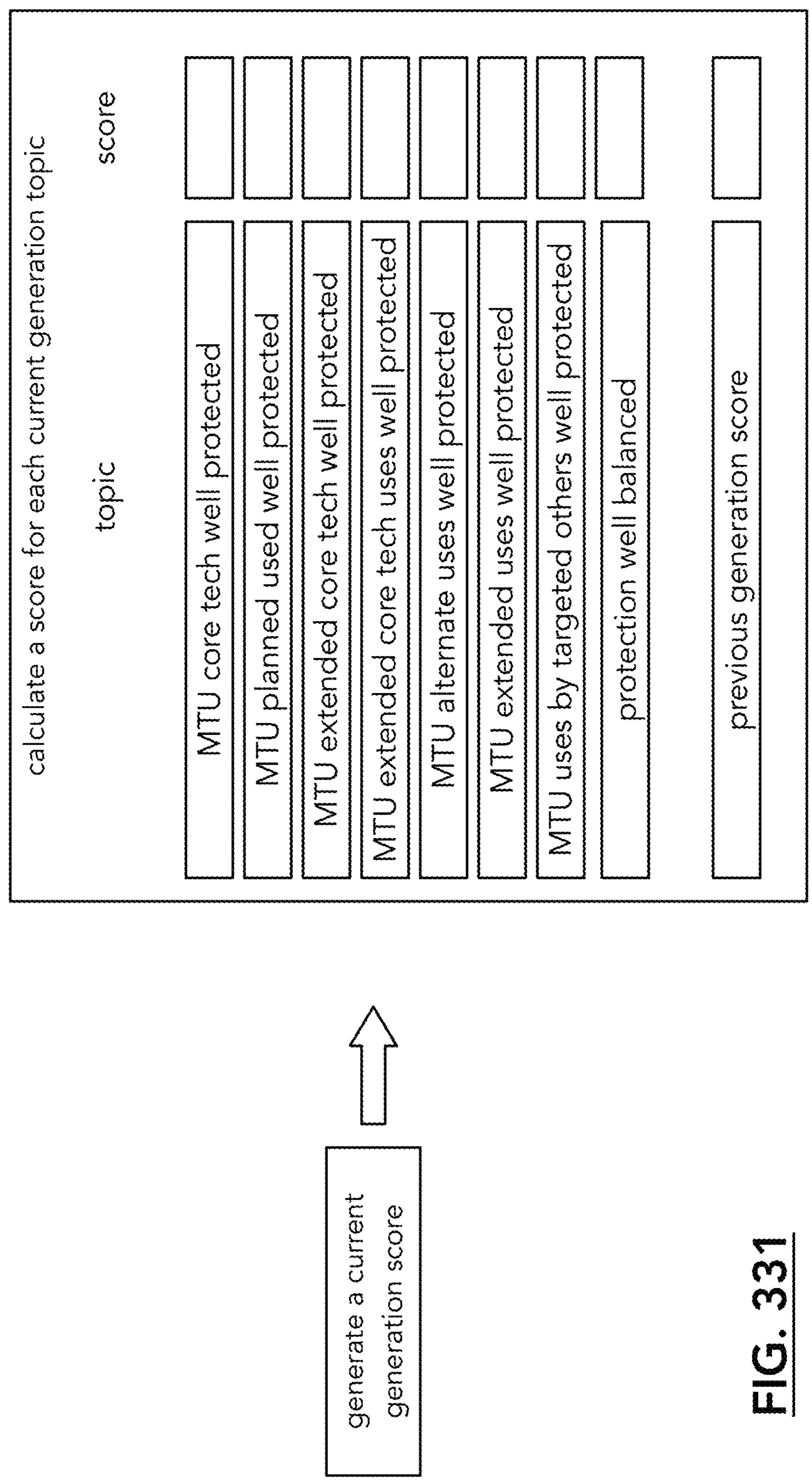
FIG. 331 is a diagram of another example of calculated data for a portfolio factor score for forecasted future patents units of a portfolio valuation tool for valuing an MTU of an improved computer for technology.

Referring next to FIG. 331 another example of calculated data for a portfolio factor score for forecasted future patents units of a portfolio valuation tool for valuing an MTU of an improved computer for technology will be discussed. In particular, data used for generating a current generation balance score by portfolio factors score for existing patents unit 1702 (FIG. 329) or a remaining current generation balance score by portfolio factors score for forecasted future patents unit 1704 (FIG. 329), is illustrated. A score for each CG (or remaining CG) balance topic can be determined or obtained by Portfolio Factors Score for existing patents unit 1702 and/or portfolio factors score for forecasted future patents unit 1704.

In at least some embodiments, a score is generated for the following current generation balance topics: MTU core tech well protected, MTU planned uses well protected, MTU extended core tech well protected, MTU extended core tech uses well protected, MTU alternate uses well protected, MTU extended uses well protected, MTU uses by targeted other well protected, and protection well balanced. The current generation (CG) and remaining CG balance scores are generated based on the individual balance topic scores. Note that in some embodiments, a single CG balance score can be calculated, and split between CG and remaining CG based on a phase of the CG MTU. Thus, if the CG MTU has a life expectancy of 3 years, and this analysis is being performed 1.5 years into the life of the MTU, ½ of the single CG score can be assigned as the CG score, while the remaining ½ of the CG score can be assigned as the remaining CG score. Other suitable divisions are within the spirit and scope of this disclosure.

The score for each CG balance topic represents a degree to which each of the CG balance topics has been achieved. A higher overall CG balance score indicates that protection provided by a portfolio of existing and/or forecasted future patents is balanced across multiple MTU boundaries of a current generation (CG) MTU. It should be appreciated that the illustrated topics are not an exhaustive list of topics that may be scored by various embodiments.

Scores can be generated automatically, based on one or more of the following: textual analysis of the documents; comparison of documents to samples; comparison of scores assigned to other previous generation MTUs, human analysis/user provided input; automated computer analysis and score generation such as through the use of trained artificial intelligence (AI) bots, or some combination thereof.

The range of scores for each balance topic is 0.0 to 0.1. If the MTU cannot be extended (e.g. the MTU is fully extended already), the maximum score will be assigned for topics related to MTU extension. Similarly, if there are no alternatives or standards related to the MTU, the maximum score will be assigned for topics related to MTU alternatives or standards.

The overall CG balance score can be generated by summing the scores determined for one or more current generation (CG) topics, by averaging those scores, by determining a median score, or by performing another statistical analysis. In some embodiments, the overall CG score itself ranges from 0.0 to 0.1, while in other embodiments, the overall CG score is the sum of all individual topic scores. In some embodiments, any or all of the individual topic scores can be weighted relative to other topic scores so that adding the weighted individual topic scores produces a sum between 0.0 and 0.1. If the protection well balanced score is zero, the total CG balance score will also be 0.

Figure 332:
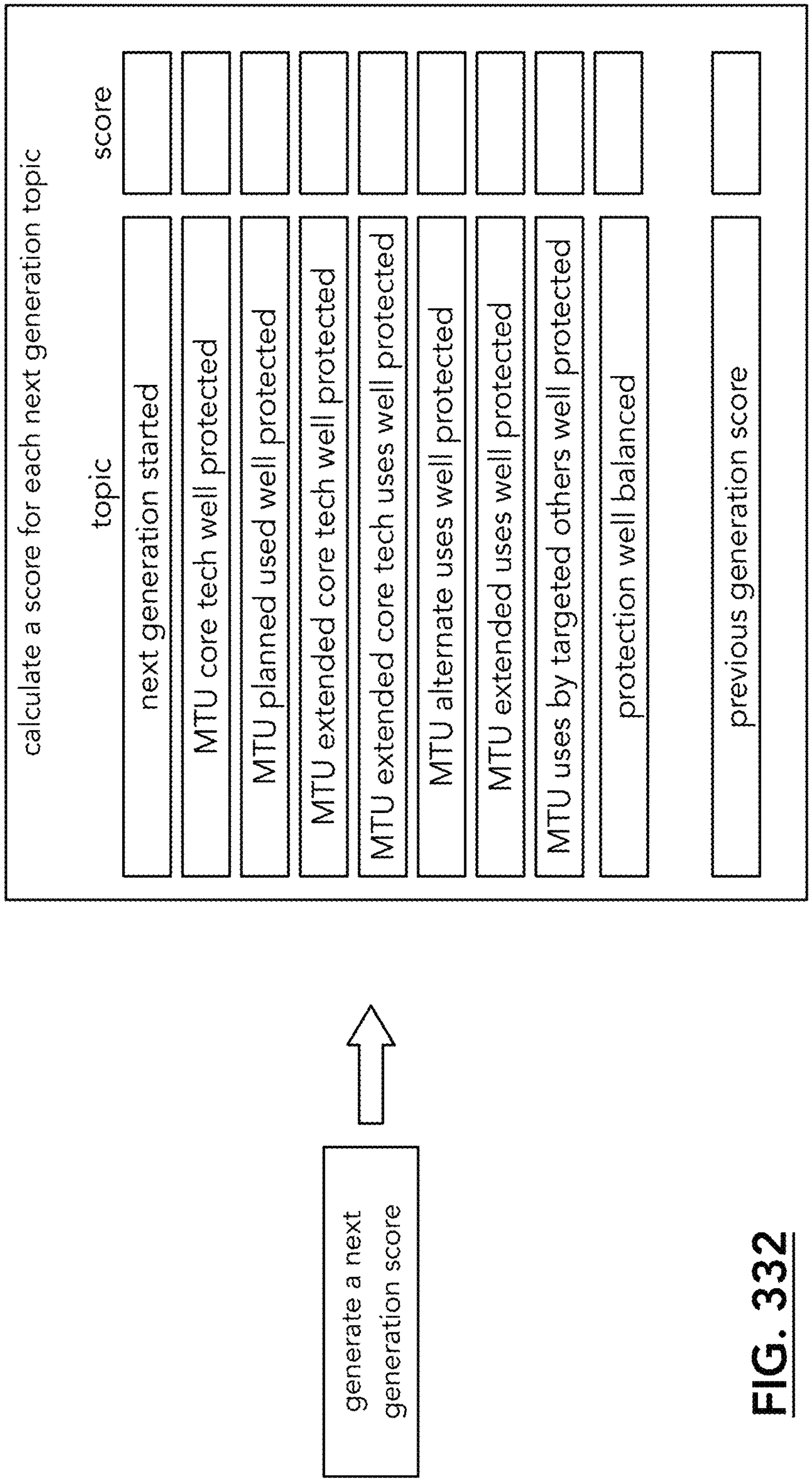
FIG. 332 is a diagram of another example of calculated data for a portfolio factor score for forecasted future patents units of a portfolio valuation tool for valuing an MTU of an improved computer for technology.

Referring next to FIG. 332 another example of calculated data for a portfolio factor score for forecasted future patents units of a portfolio valuation tool for valuing an MTU of an improved computer for technology will be discussed. In particular, data used for generating a next generation (NG) balance score by portfolio factors score for forecasted future patents unit 1704 (FIG. 329), is illustrated. A score for each next generation (NG) balance topic can be determined or obtained by balance score unit 1718 included in portfolio factors score for forecasted future patents unit 1704.

In at least some embodiments, a score is generated for the following NG topics: NG started, MTU core tech well protected, MTU planned uses well protected, MTU extended core tech well protected, MTU extended core tech uses well protected, MTU alternate uses well protected, MTU extended uses well protected, MTU uses by targeted other well protected, and protection well balanced. The total NG balance score is generated based on the individual topic scores.

The score for each NG balance topic represents a degree to which each of the NG topics has been achieved. A higher overall NG score indicates that protection provided by a portfolio of forecasted future patents is balanced across multiple MTU boundaries of a next generation (NG) MTU. It should be appreciated that the illustrated topics are not an exhaustive list of topics that may be scored by various embodiments.

Scores can be generated automatically, based on one or more of the following: textual analysis of the documents; comparison of documents to samples; comparison of scores assigned to other previous generation MTUs, human analysis/user provided input; automated computer analysis and score generation such as through the use of trained artificial intelligence (AI) bots, or some combination thereof.

The range of balance scores for each function is 0.0 to 0.1. If the NG has not yet started, the total NG balance score will be set to 0. If the MTU cannot be extended (e.g. the MTU is fully extended already), the maximum score will be assigned for topics related to MTU extension. Similarly, if there are no alternatives or standards related to the MTU, the maximum score will be assigned for topics related to MTU alternatives or standards.

The total NG balance score can be generated by summing the scores determined for one or more next generation topics, by averaging those scores, by determining a median score, or by performing another statistical analysis. In some embodiments, the total NG balance score itself ranges from 0.0 to 0.1, while in other embodiments, the total NG score is the sum of all individual topic scores. In some embodiments, any or all of the individual balance topic scores can be weighted relative to other balance topic scores so that adding the weighted individual topic scores produces a sum between 0.0 and 0.1. If the protection well balanced score is zero, the total NG balance score will also be 0.

Referring next to FIGS. 333 through 335 another embodiment of a portfolio factor score for existing patents unit and a portfolio factor score for forecasted future patents units of a portfolio valuation tool for valuing an MTU of an improved computer for technology will be discussed. A pending to issued ratio score, sometimes referred to herein as simply a pending to issued score, is one of the inputs used to determine a portfolio factors score (FIG. 312). In various embodiments, the pending to issued ratio score is a function of the ratio of the number of pending applications divided by the sum of the number of pending applications+the number of issued patents.

As illustrated by FIG. 334, portfolio factors score for existing patents unit 1702 includes existing pending to issued score unit 1720, which calculates a pending to issued score for existing patents and applications. Existing pending to issued score unit 1720 obtains data to be used in generating a pending to issued score table or other data structure from one or more data sources. Obtaining the data can include one or more of issuing a query to a commercial, government, or specialty database, performing data scanning and optical character recognition, receiving updated information periodically or in response to a triggering event. For example, one or more co-processors of an improved computer system can be programmed to periodically query a patent-related database. If a query of that database indicates that a patent application in a portfolio has issued, automatic transfer of information indicating the patent issuance can be transmitted to portfolio factors score for existing patents unit 1702. In at least one embodiment, the data obtained for the issued patent score table is grouped into one or more time periods. The time periods can be, for example, a year, a quarter, a month, a number of years, number of quarters, number of months, or the like.

The time period can be determined in advance, and updated data can be obtained automatically one or more times each time period. In some embodiments, the time period can be specified by information included in a user query, or otherwise.

For a particular time period, issued existing patent score unit 1706 sums the number of issued patents present in a portfolio over that time period, sums the number of patents issued during that time period, sums the number of pending applications filed over that time period, calculates a pending to issued ratio, and calculates a pending to issued score. The process repeats until all data, summations, and calculations for all desired time periods have been processed.

As illustrated by FIG. 335, portfolio factors score for forecasted future patents unit 1704 includes future pending to issued score unit 1722, which calculates a pending to issued score for forecasted future patents and applications. Future pending to issued score unit 1722 obtains data to be used in generating a pending to issued score table or other data structure from one or more data sources. Obtaining the data can include one or more of issuing a query to a commercial, government, or specialty database, performing data scanning and optical character recognition, receiving updated information periodically or in response to a triggering event, extrapolating existing patent data values, or the like. In at least one embodiment, the data obtained for the pending to issued patent score table is grouped into one or more time periods. The time periods can be, for example, a year, a quarter, a month, a number of years, number of quarters, number of months, or the like.

The time period can be determined in advance, and updated data can be obtained automatically one or more times each time period. In some embodiments, the time period can be specified by information included in a user query, or otherwise.

For a particular time period, issued future pending to issued score unit 1722 sums the number of patents forecast to be issued over that time period, sums the number of pending applications forecast to be filed over that time period, calculates a forecast pending to issued ratio, and calculates a forecast pending to issued score. The process repeats until all data, summations, and calculations for all desired time periods have been processed.

Referring next to FIG. 336 another example of calculated data for a portfolio factor score for forecasted future patents units of a portfolio valuation tool for valuing an MTU of an improved computer for technology will be discussed. In particular, data used by portfolio factors score for existing patents unit 1702 (FIG. 334) to determine a pending to issued portfolio factor score is discussed.

In various embodiments, the data obtained by portfolio factors score for existing patents unit 1702 (FIG. 334) includes data used to form data records for existing time period(s) that have been completed (e.g. previous year(s)), a current time period (CP) that has not yet been completed (e.g. the current year), and some number of "next periods" (NPs) (e.g. the next 7 years). In some embodiments the existing time period(s), current time period, and next time periods need not be of the same duration. Thus, the existing time period can be the past 10 years, while the current time period can be 1 year, and the next time periods can have varying durations of between about 2-5 years.

The data obtained by portfolio factors score for existing patents unit 1702 includes, but is not limited to, at least one of the following: number of issued patents, number of pending applications, a pending to issued percentage, and a pending to issued score. As illustrated, each row of data in the pending to issued score table includes information linked to a particular period of time (e.g. existing, CP, $1^{st}$-$7^{th}$ NP). The information in the rows can be organized and stored as a record within a database. For example the illustrated table (or some other data structure) can be stored within, or linked to, an MTU record. Similarly, some or all of the information can be individually stored, or stored in other records linked to each other using relational database linking techniques. Note that the data used by portfolio factors score for existing patents unit 1702 can use forecasted data, despite the fact that the data is used by existing patents unit 1702.

Referring next to FIG. 337 another example of calculated data for a portfolio factor score for forecasted future patents units of a portfolio valuation tool for valuing an MTU of an improved computer for technology will be discussed. In particular, data used by portfolio factors score for forecasted future patents unit 1704 (FIG. 335) to determine a forecast pending to forecast issued portfolio factor score is discussed.

In various embodiments, the data obtained by portfolio factors score for forecasted future patents unit 1704 (FIG. 335) includes data used to form data records for existing time period(s), a current time period (CP) that has not yet been completed (e.g. the current year), and some number of "next periods" (NPs) (e.g. the next 7 years). In some embodiments the time periods need not be of the same duration.

The data obtained by portfolio factors score for forecasted future patents unit 1704 includes, but is not limited to, at least one of the following: number of issued patents, number of pending applications, a pending to issued percentage, and a pending to issued score.

As illustrated, each row of data in the pending to issued score table includes information linked to a particular period of time (e.g. forecasted future, CP, $1^{st}$-$7^{th}$ NP). The information in the rows can be organized and stored as a record within a database. For example the illustrated table (or some other data structure) can be stored within, or linked to, an MTU record. Similarly, some or all of the information can be individually stored, or stored in other records linked to each other using relational database linking techniques. By contrast with the data obtained by portfolio factors score for existing patents unit 1702 (FIG. 334), data obtained by portfolio factors score for forecasted future patents unit 1704 (FIG. 335) does not include an existing number of issued patents or an existing number of pending applications, although the issued patent percentage and the issued patent score for an existing portfolio may be included.

Figure 338:
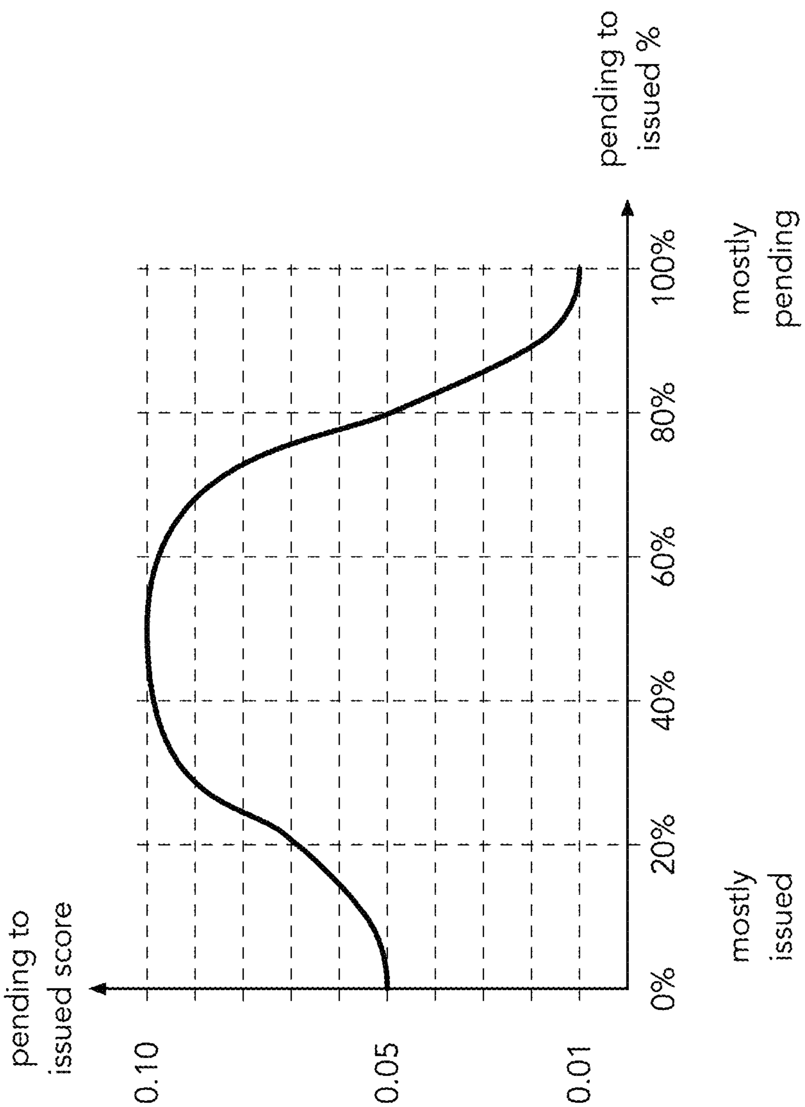
FIG. 338 is a diagram of a graph of pending to issued percentage to pending to issued score for valuing an MTU of an improved computer for technology.

Referring next to FIG. 338 a graph of pending to issued percentage vs. pending to issued score for valuing an MTU of an improved computer for technology will be discussed. The horizontal axis of the graph represents a pending to issued percentage for a portfolio with respect to an MTU. The vertical axis represents pending to issued score for the same portfolio with respect to the same MTU. In at least one embodiment, the pending to issued percentage equals the number of issued patents divided by the number of pending applications.

In various embodiments, two different S-Curve equations are used for different portions of the graph. In at least one such embodiment, when the pending to issued percentage is greater than or equal to 50%, a first S-Curve equation is used to generate values from 1.0 to 0.1 as the pending to issued percentage increases. But when the pending to issued percentage is less than 50%, a second S-Curve equation is used to generate values from 0.5 to 1.0 as the pending to issued percentage increases.

An S-Curve function, sometimes referred to as a sigmoid function, can take many different forms. A basic sigmoid function is represented by the following equation: S(x)=1/

(1+e^((f(x)). S-curves having varying characteristics can be achieved by varying f(x) in the exponent, adding constants, or the like. For any particular S curve function (S(x)) the value of the invention scope score is determined by the actual to ideal percentage.

Figure 339:
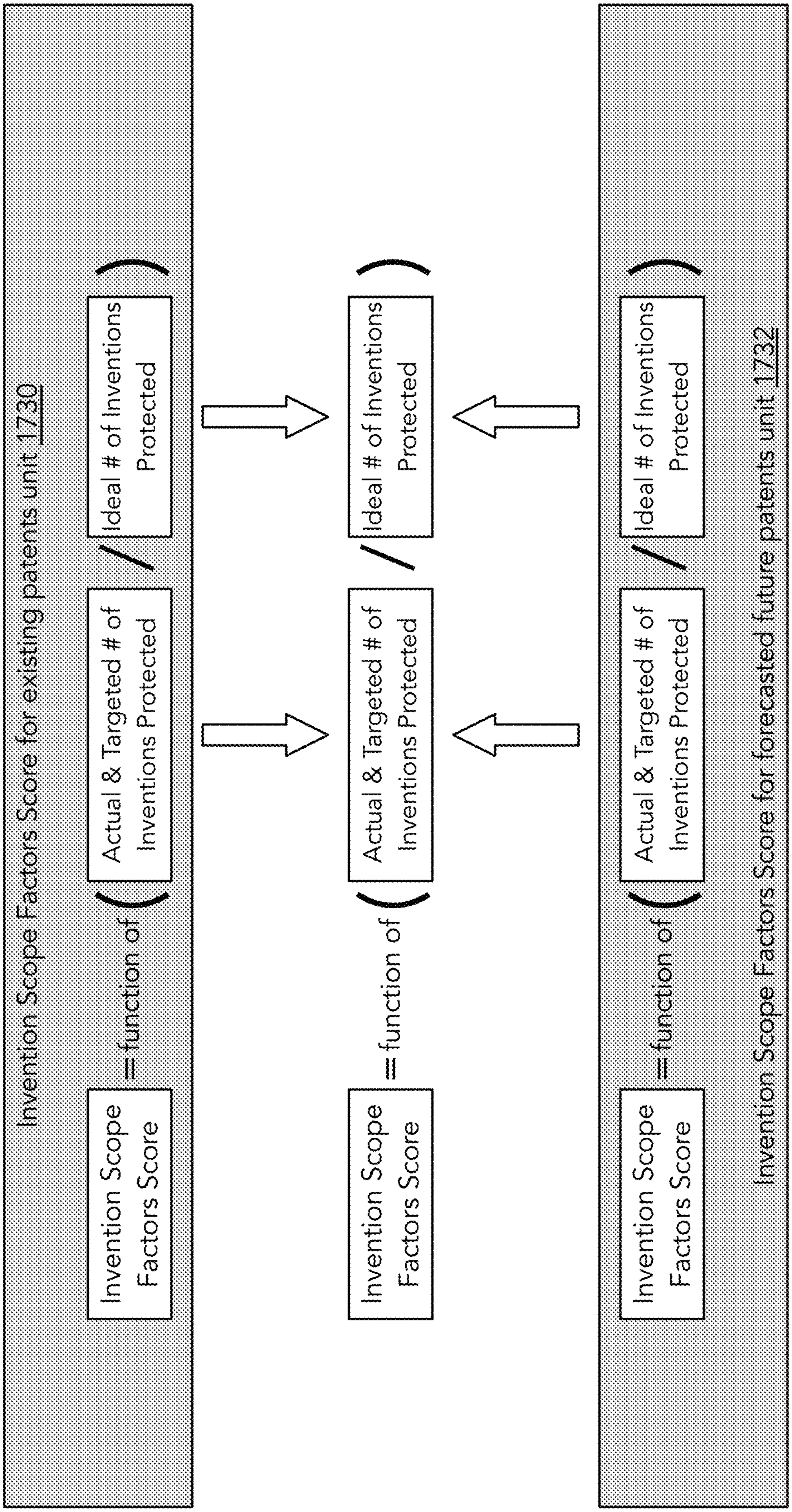
FIG. 339 is a diagram of an embodiment of an invention scope factor score for exiting patents unit and an invention factor score for forecasted future patents units of a portfolio valuation tool for valuing an MTU of an improved computer for technology.

Referring next to FIG. 339 an embodiment of an invention scope factor score for existing patents unit and an invention factor score for forecasted future patents units of a portfolio valuation tool for valuing an MTU of an improved computer for technology will be discussed. Invention scope factor score for existing patents unit 1730 determines an existing invention scope factors score based on the actual and targeted number of inventions (actual number of inventions+targeted number of inventions) protected by existing patents. Similarly, invention scope factor score for forecasted future patents unit 1732 determines a forecasted future invention scope factors score based on the actual and targeted number of inventions (actual number of inventions+targeted number of inventions) forecast to be protected by future patents divided by an ideal number of inventions protected.

Both the existing invention scope factors score and the forecasted future invention scope factors score are determined on a period by period basis. Thus, the scope factor scores can be determined in a quarterly basis, a yearly basis, a technology cycle basis, or the like.

In various embodiments, the portfolio valuation tool combines the actual and targeted number of existing inventions protected with the actual and targeted number of inventions forecast to be protected by future patents protected by existing patents to generate a combined actual and targeted number of inventions protected. The ideal number of inventions used by both Invention scope factor score for existing patents unit 1730 and invention scope factor score for forecasted future patents unit 1732 can, but need not be the same. Furthermore, the ideal number of inventions protected may vary based on the time period being considered. For example, it may be ideal to protect a large number of inventions early on, and add lesser numbers of protected inventions later. Consequently, the ideal number of inventions protected during any particular period may be greater or less than the ideal number protected in a previous or later period. However, in some embodiments the number of protected inventions is cumulative, and will generally increase over time.

The total invention scope factors score is a function of the combined actual and targeted number of inventions protected divided by the combined idea number of inventions protected.

Figure 340:
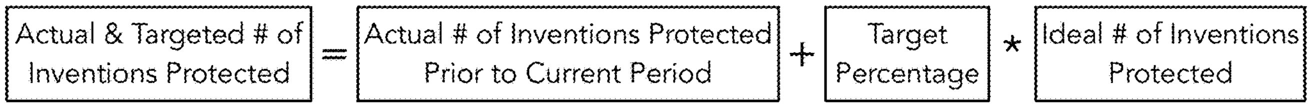
FIGS. 340 through 342 are a diagram of another embodiment of an invention scope factor score for exiting patents unit and an invention factor score for forecasted future patents units of a portfolio valuation tool for valuing an MTU of an improved computer for technology.
Figure 341:
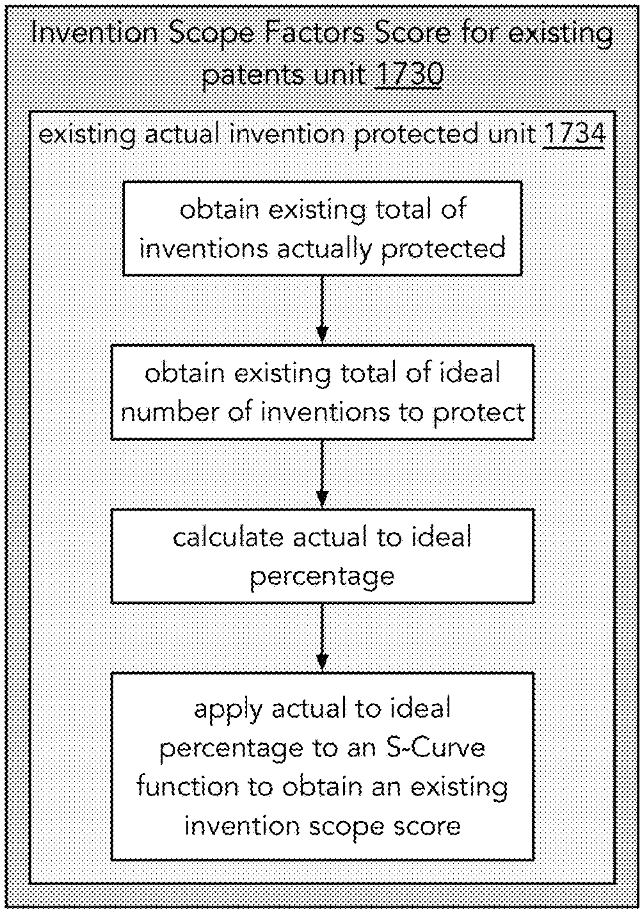
Figure 342:
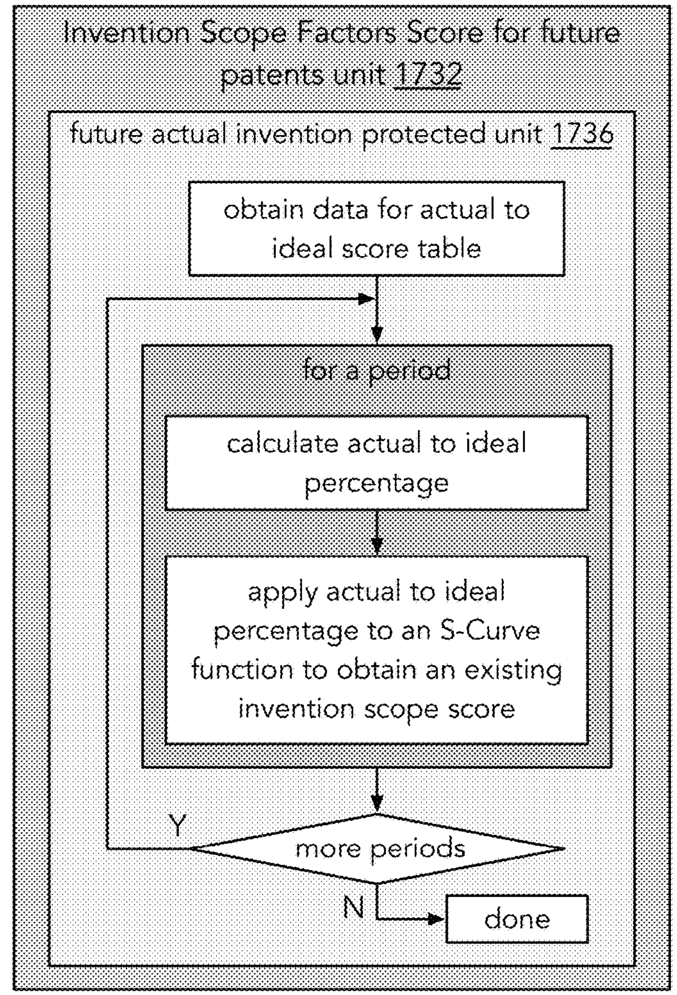

Referring next to FIGS. 340 through 342 another embodiment of an invention scope factors score for existing patents unit and an invention factors score for forecasted future patents units of a portfolio valuation tool for valuing an MTU of an improved computer for technology will be discussed. In at least one embodiment, the actual and targeted number of inventions protected, which is used in determining the invention scope factors score, is equal to the product of a target percentage and the ideal number of inventions added to the actual number of inventions protected prior to the current period.

Invention scope factors score for existing patents unit 1730 (FIG. 341) includes existing actual invention protected unit 1734, which obtains the existing total of inventions actually protected, obtains the existing total of ideal number of inventions to protect, calculates an actual to ideal percentage, and applies the actual to ideal percentage to an S-curve function to obtain an existing invention scope score. Obtaining the existing total of inventions actually protected and the existing total of ideal number of inventions to protect can include retrieving data from a data structure (e.g. one or more databases or tables), receiving user input, scraping data from one or more websites, accessing one or more public information repositories, extracting information from textual documents, or the like. Applying the actual to ideal percentage to an S-curve function to obtain an existing invention scope score is discussed further with reference to FIG. 344.

Invention factors score for forecasted future patents units 1732 (FIG. 342) includes future actual invention protected unit 1736, which obtains data for inclusion in an actual to ideal score table. Obtaining the data can include one or more of issuing a query to a commercial, government, or specialty database, performing data scanning and optical character recognition, and/or receiving updated information periodically or in response to a triggering event, receiving user input, scraping data from one or more websites, or the like.

For a given period of time, future actual invention protected unit 1736 calculates and actual to ideal percentage, and applies the actual to ideal percentage to an S-curve function to obtain an existing invention scope score. The process performed by future actual invention protected unit 1736 continues until existing invention scope scores are determined for each time period of interest. Applying the actual to ideal percentage to an S-curve function to obtain an existing invention scope score is discussed further with reference to FIG. 344.

Referring next to FIG. 343 of an example of calculated data for an invention factor score for forecasted future patents units of a portfolio valuation tool for valuing an MTU of an improved computer for technology will be discussed. In particular, the calculated data is stored in an actual to ideal score table that can be used by Invention Scope Factors Score for existing patents unit 1730 (FIG. 341) and Invention Scope Factors Score for future patents unit 1732 (FIG. 342) to calculate an actual to ideal percentage, or score.

In various embodiments, the data in the actual to ideal score table includes data used to form data records for a current time period (CP) that has not yet been completed (e.g. the current fiscal quarter), and some number of "next periods" (NPs) (e.g. the next 7 fiscal quarters). In some embodiments the time periods need not be of the same duration. The data stored in the actual to ideal score table includes, but is not limited to, at least one of the following: targeted number of inventions per period, running total of targeted inventions per period, ideal number of inventions per period, running total of ideal inventions per period, actual to ideal percentages per period, and invention scope scores per period.

As illustrated, each row of data in the pending to issued score table includes information linked to a particular period of time (e.g. forecasted future, CP, $1^{st}$-$7^{th}$ NP). The information in the rows can be organized and stored as a record within a database. For example the illustrated table (or some other data structure) can be stored within, or linked to, an MTU record. Similarly, some or all of the information can be individually stored, or stored in other records linked using relational database linking techniques.

Referring next to FIG. 344 a graph of a score to actual to ideal invention percentage for valuing an MTU of an improved computer for technology will be discussed. The Y axis of graph represents the inventions scope score, and the X axis represents the actual to ideal percentage. The function represented by the curve is an S-Curve function, sometimes referred to as a sigmoid function with a minimum vertical offset.

Figure 345:
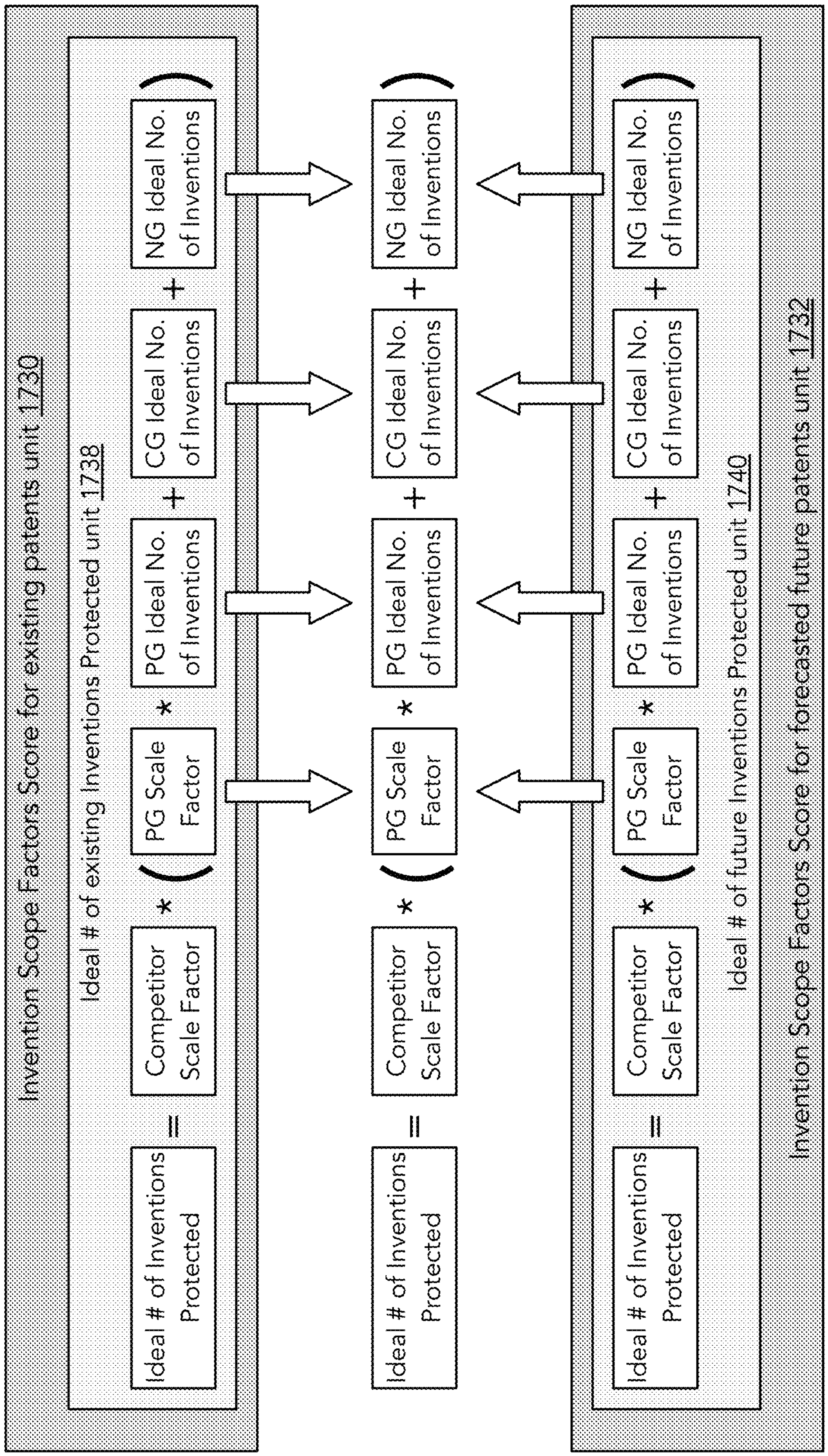
FIG. 345 is a diagram of another embodiment of an invention scope factor score for exiting patents unit and an invention factor score for forecasted future patents units of a portfolio valuation tool for valuing an MTU of an improved computer for technology.

Referring next to FIG. 345 another embodiment of an invention scope factor score for existing patents unit and an invention factor score for forecasted future patents units of a portfolio valuation tool for valuing an MTU of an improved computer for technology will be discussed.

Invention scope factor score for existing patents unit 1730 includes ideal number of existing inventions protected unit 1738, which determines an ideal number of inventions protected by existing patents by multiplying a previous generation (PG) scale factor by a PG ideal number of inventions, and adding that product to a current generation (CG) ideal number of inventions and to a next generation (NG) ideal number of inventions. The result of this calculation is then multiplied by a competitor scale factor to arrive at the ideal number of existing inventions protected.

Similarly, invention scope factor score for forecasted future patents unit 1732 includes ideal number of future inventions protected unit 1740, which determines an ideal number of inventions protected by future patents by multiplying a previous generation (PG) scale factor by a PG ideal number of inventions, and adding that product to a current generation (CG) ideal number of inventions and to a next generation (NG) ideal number of inventions. The result of this calculation is then multiplied by a competitor scale factor to arrive at the ideal number of future inventions protected.

In various embodiments, the portfolio valuation tool combines the existing PG scale factor, the existing PG ideal number of inventions, the existing CG ideal number of inventions, and the existing NG ideal number of inventions to the forecasted future PG ideal number of inventions, the forecasted future CG ideal number of inventions, and the forecasted future NG ideal number of inventions to generate a combined ideal number of inventions protected.

Figure 346:
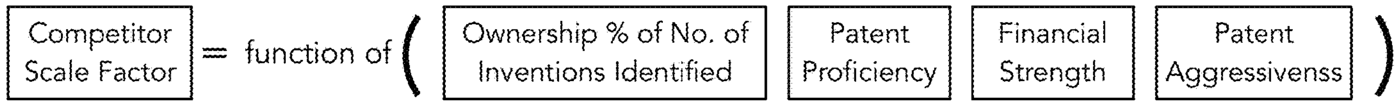
FIGS. 346 and 347 are a diagram of another embodiment of an invention scope factor score for exiting patents unit and an invention factor score for forecasted future patents units of a portfolio valuation tool for valuing an MTU of an improved computer for technology.
Figure 347:
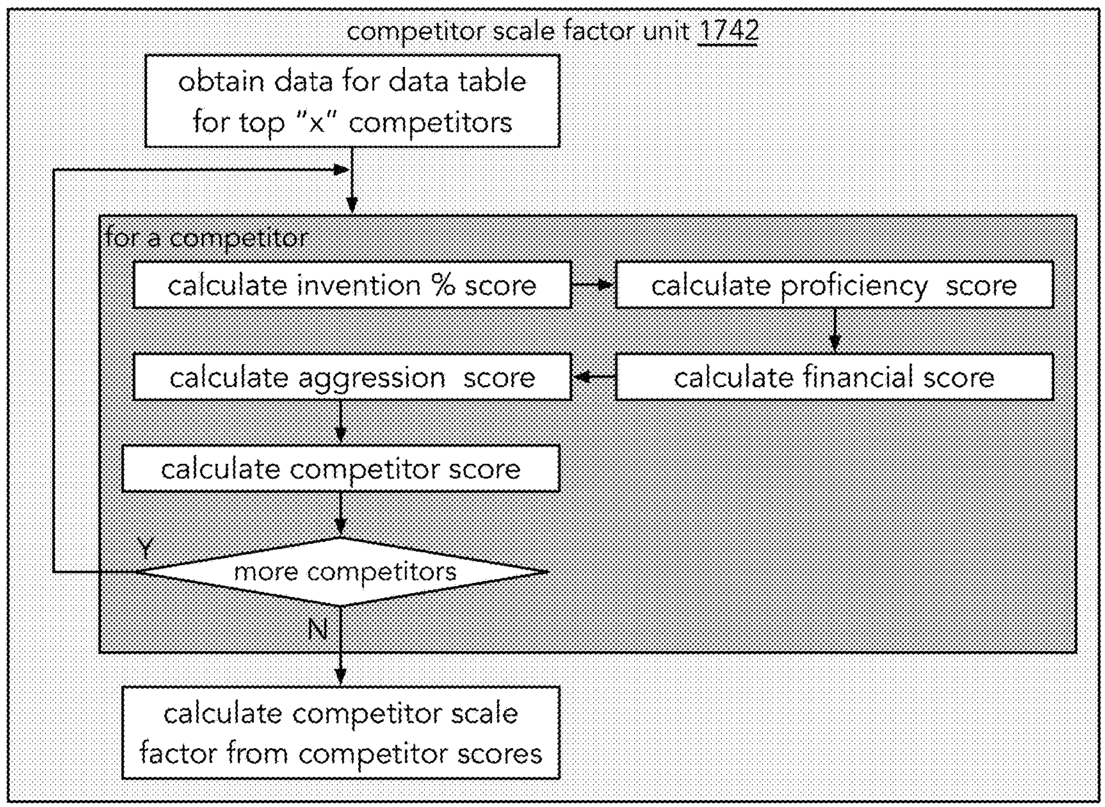

Referring next to FIGS. 346 and 347 another embodiment of an invention scope factor score for existing patents unit and an invention factor score for forecasted future patents units of a portfolio valuation tool for valuing an MTU of an improved computer for technology will be discussed. In at least one embodiment, the competitor scale factor, which is used in determining the ideal number of inventions protected, is equal to a function of ownership percentage of the number of inventions identified, patent proficiency, financial strength, and patent aggressiveness.

Competitor scale factor unit 1742 (FIG. 347) obtains data to be included in a data table for top "x" competitors. For each competitor, competitor scale factor unit 1742 calculates an invention percentage score a proficiency score, a financial score, an aggression score, and competitor score. These computations are repeated until values are calculated for each of the top "x" competitors. After competitor computations have been completed, competitor scale factor unit 1742 calculates a competitor scale factor from the competitor scores. In at least one embodiment, Ideal number of future Inventions Protected unit 1740 and Ideal number of existing Inventions Protected unit 1738 share a single competitor scale factor unit.

In various embodiments, the proficiency score is a function of portfolio size. For example, a competitor with a large portfolio is likely to be more proficient at using the patent process to protect inventions as compared to a competitor with a smaller portfolio. The aggression score is a function of active licensing and litigation activity. For example, a competitor who actively licenses their patent portfolio and is not afraid to initiate patent litigation is considered more aggressive than a competitor who does not license or enforce their portfolio. The financial score is a function of market capitalization and profits.

Referring next to FIG. 348 another example of calculated data for an invention factor score for forecasted future patents units of a portfolio valuation tool for valuing an MTU of an improved computer for technology will be discussed. A competitor data table or other data structure includes records for individual competitors, and can be populated with data by competitor scale factor unit 1742. Each competitor record can include data on the percentage of MTU inventions protected by the competitors portfolio, the size of the competitors portfolio, the competitors market capitalization, financial report information, and a number of patents that have been licensed or litigated.

Although only a single competitor is illustrated in the competitor data table, any number of competitors can be included. Furthermore, various embodiments of the competitor data table can include additional or less information. In some embodiments, the competitor data table can be generated as-needed from information stored in disparate databases.

Referring next to FIG. 349 another example of calculated data for an invention factor score for forecasted future patents units of a portfolio valuation tool for valuing an MTU of an improved computer for technology will be discussed. The competitor scoring table (FIG. 349) is used in conjunction with the competitor data table (FIG. 348) to determine a competitor score for each individual competitor. The data included in the competitor scoring table includes columns for an item score coefficient, a percentage of MTU inventions protected level, a number of patents level, a market capitalization level, a financial score level, and a licensing and litigation level. A weighting value is assigned to each of the columns, except the item score column.

Each row of the competitor scoring table is organized to associate an item score with a level from each of the columns. For example, item score 1 is associated with a 1% of MTU inventions protected level, a 100 number of patents level, a $50 million dollar market capitalization level, a −$50 million dollar financial level, and a 2 licensing and litigation level. The remaining item scores are similarly associated with each of the different levels.

To generate a competitor score, the data for a competitor included in each column of the competitor data table is compared to the values in corresponding columns of the competitor scoring table, and assigned an item score corresponding to the closest value in the competitor scoring table. Taking competitor one as an example, consider the following. The % of MTU inventions protected in competitor data table rounds up to 8% in the competitor scoring table, so competitor one will receive an item score of 3 for % of MTU inventions protected. Similarly, competitor one's portfolio size of 427 rounds up to 500 in the competitor scoring table's "all patents" column, so competitor one receives an item score of 2 for portfolio size. A market capitalization of 2,500 rounds up to 10,000, so competitor one receives an item score of 4 for market capitalization. A financial report indicating +47 rounds up to 50, so competitor one receives an item score of 3 for financials. A licensing and litigation value of 2 matches a licensing and litigation level of 2, so competitor one receives an item score of 2 for licensing and litigation.

In various embodiments, rather than rounding up values in the competitor data table to determine corresponding item scores, values can be rounded to the nearest level. For example, a market capitalization of 2,500 is closer to the 2,000 level of the competitor scoring table, so competitor would be assigned an item score of 3 in such an embodiment. Additionally, different weighting factors can be used. Weighting factors can, but need not be, determined empirically based on historical, using statistical distributions, or some combination thereof.

Referring next to FIG. 350 another example of calculated data for an invention factor score for forecasted future patents units of a portfolio valuation tool for valuing an MTU of an improved computer for technology will be discussed. A competitor score determination table illustrates data sued to determine a competitor score for a particular competitor. The following example continues with the example used in FIGS. 348 and 349.

Competitor 1, which has % of MTU inventions protected value of 6.2% (FIG. 348), receives an item score of 3 for % of MTU inventions protected (FIG. 349). The competitor scoring table indicates that a weighting factor of 2.25 is assigned to assigned to % of MTU inventions protected. Competitor score determination table, therefore, shows that competitor one's % of MTU inventions protected score equals the item score (3) multiplied by the weighting factor (2.25), which yields a result of 6.75. Scores for each of the percentage of MTU inventions protected by the competitors portfolio, the size of the competitors portfolio, the competitors market capitalization, financial report information, and a number of patents that have been licensed or litigated by multiplying the item scores by weighting factors associated with each data type. Thus, competitor one will have a portfolio size score of 3 (2*1.5), a market cap score of 6 (4*1.5), a financial report score of 4.5 (3*1.5), and a licensing and litigation score of 0.75 (1*0.75). These scores are added together to generate the competitor score, which in this example is 21.

Figure 351:
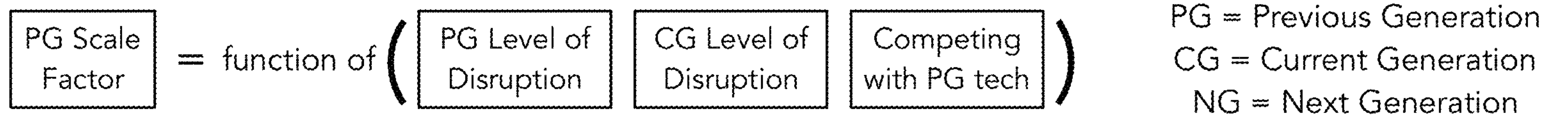
FIGS. 351 and 352 are a diagram of another embodiment of an invention scope factor score for exiting patents unit and an invention factor score for forecasted future patents units of a portfolio valuation tool for valuing an MTU of an improved computer for technology.
Figure 352:
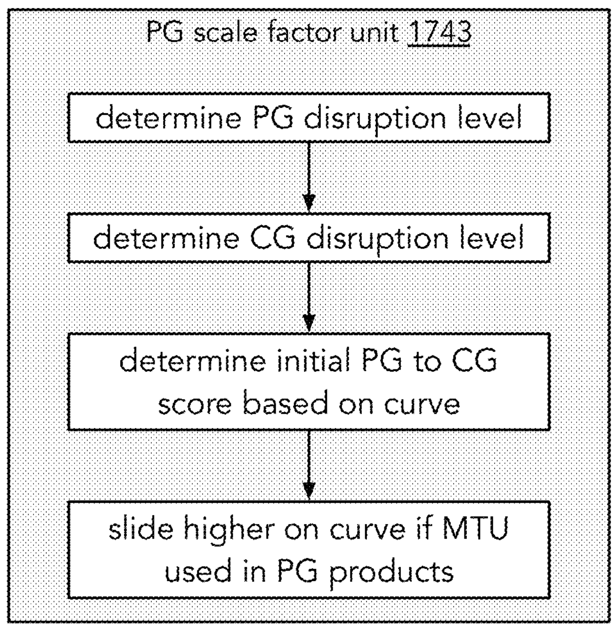

Referring next to FIGS. 351 and 352 another embodiment of an invention scope factor score for existing patents unit and an invention factor score for forecasted future patents units of a portfolio valuation tool for valuing an MTU of an improved computer for technology will be discussed. In various embodiments herein, the degree to which previous generation (PG) technology effect current generation (CG) technology can impact forecasts regarding the number of patents needed to protect an MTU, how quickly the value of the MTU will change, and how quickly the competitive landscape is likely to change, among other things.

A PG scale factor can be used as an indicator of how much PG technology effects CG technology. In various embodiments, the PG scale factor is a function of PG level of disruption, CG level of disruption, and the degree to which CG technology will be in competition with PG technology.

Previous generation (PG) scale factor unit 1743 determines a PG scale factor by determining a PG disruption level, determining a CG disruption level, determining an initial PG to CG score based on disruption curve, and adjusting the initial PG to CG score if an MTU is used in PG products. In various embodiments, a single PG scale factor unit 1743 is for both ideal number of future inventions protected unit 1740 and ideal number of existing inventions protected unit 1738.

The PG disruption level and the CG disruption level can be determined based on analysis of MSBTP (marketing, sales, business, technology, and patent) data (e.g. FIGS. 24-26), and can be automatically adjusted as more data is ingested. Using the disruption curve to determine the PG to CG score will be discussed subsequently with respect to FIG. 353. The amount by which the initial PG to CG score is adjusted is based on level of use of the MTU in the PG technology, and which curve is used. Adjusting the initial PG to CG score if an MTU is used in PG products will be further discussed with reference to FIG. 353.

Figure 353:
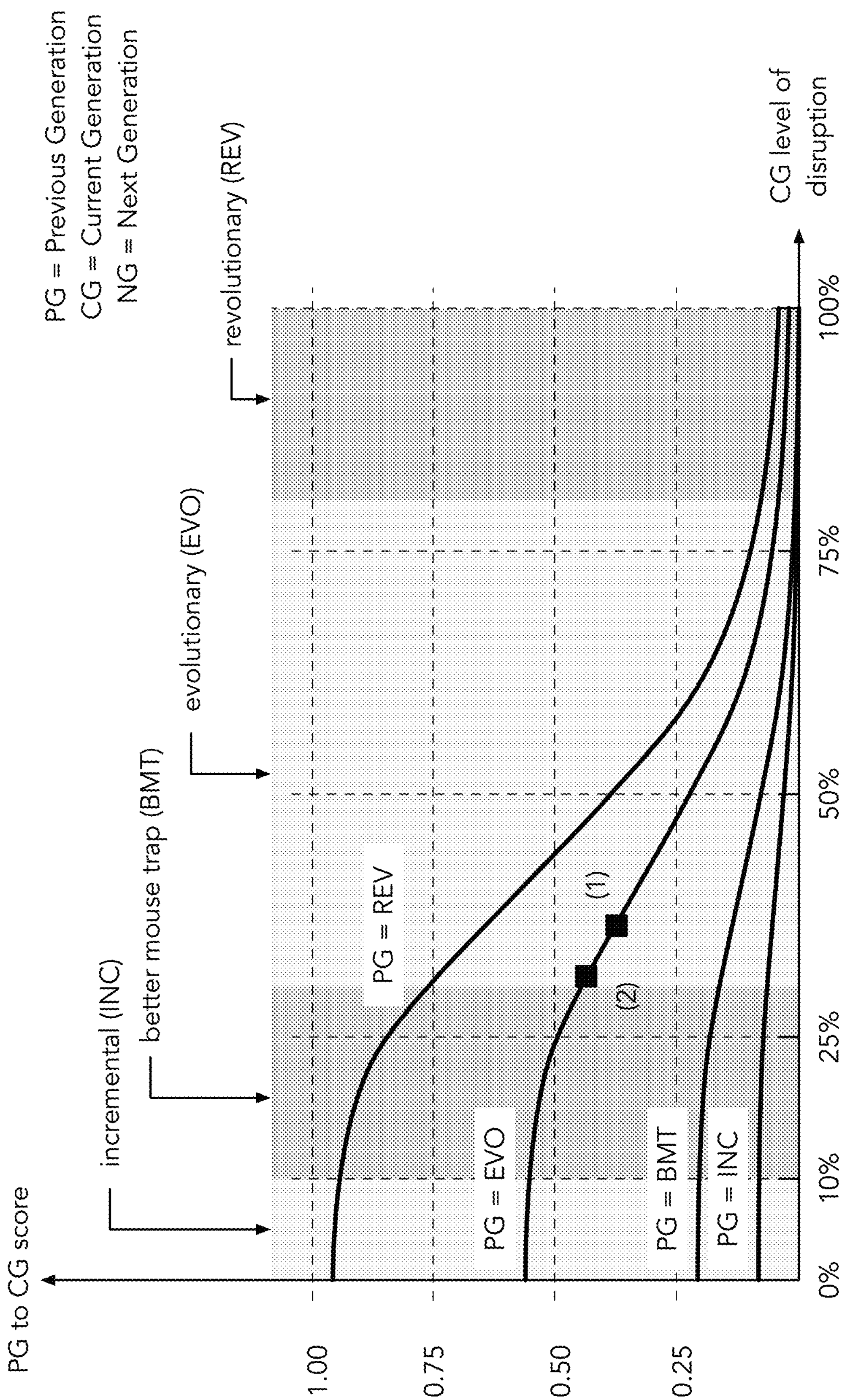
FIG. 353 is a diagram of a graph of PG to CG score to CG level of disruption for valuing an MTU of an improved computer for technology.

Referring next to FIG. 353 a graph of PG to CG score to CG level of disruption for valuing an MTU of an improved computer for technology will be discussed. The illustrated curves are sometimes referred to herein as disruption curves, and the graph will be referred to as a disruption graph. There are 4 disruption curves on the illustrated disruption graph: a PG REV curve, used for previous generation tech assigned a revolutionary status; a PG EVO curve, used for previous generation tech assigned an evolutionary status; a PG BMT curve, used for previous generation tech assigned a "better mousetrap" status; and a PG INC curve, used for previous generation tech assigned an incremental status. Each of the different curves is generated based on data analysis, and continually evolves as new data becomes available.

As used herein, an incremental status is assigned to PG technology that provides a near unperceivably better way of doing things and/or slightly reduces market share of predecessors. A better mousetrap status is assigned to PG technology that provides a more easily perceivably better way of doing things and/or plainly reduces market share of predecessors. An evolutionary status is assigned to PG technology that obsoletes many predecessors and/or expands market opportunities. A revolutionary status is assigned to PG technology that obsoletes predecessors, expands markets, and/or opens new market opportunities.

To determine an initial PG to CG score, the PG disruption level is used to select an appropriate disruption curve. In the illustrated example, the PG EVO curve is selected because the PG disruption level is determined to be evolutionary. The initial position on the selected curve is determined based on the CG level of disruption. In the illustrated example, the CG level of disruption is approximately 25%, so the initial position on the PG EVO curve is shown as a square at location (1), which corresponds to a PG to CG score of about 0.35.

If the MTU being evaluated is used in the PG technology, then the PG to CG score is increased by sliding the initial position on the PG EVO curve left to location (2), which corresponds to a PG to CG score of about 0.42. Sliding the point left on a curve has the same effect as decreasing the CG level of disruption. The amount by which the initial position is adjusted can vary based on a degree to which the MTU is used in the PG technology, with heavy use resulting in moving the point a greater distance along the curve. In some embodiments, amount of movement is a set amount, regardless of how heavily the MTU is incorporated into the PG technology.

Figure 354:
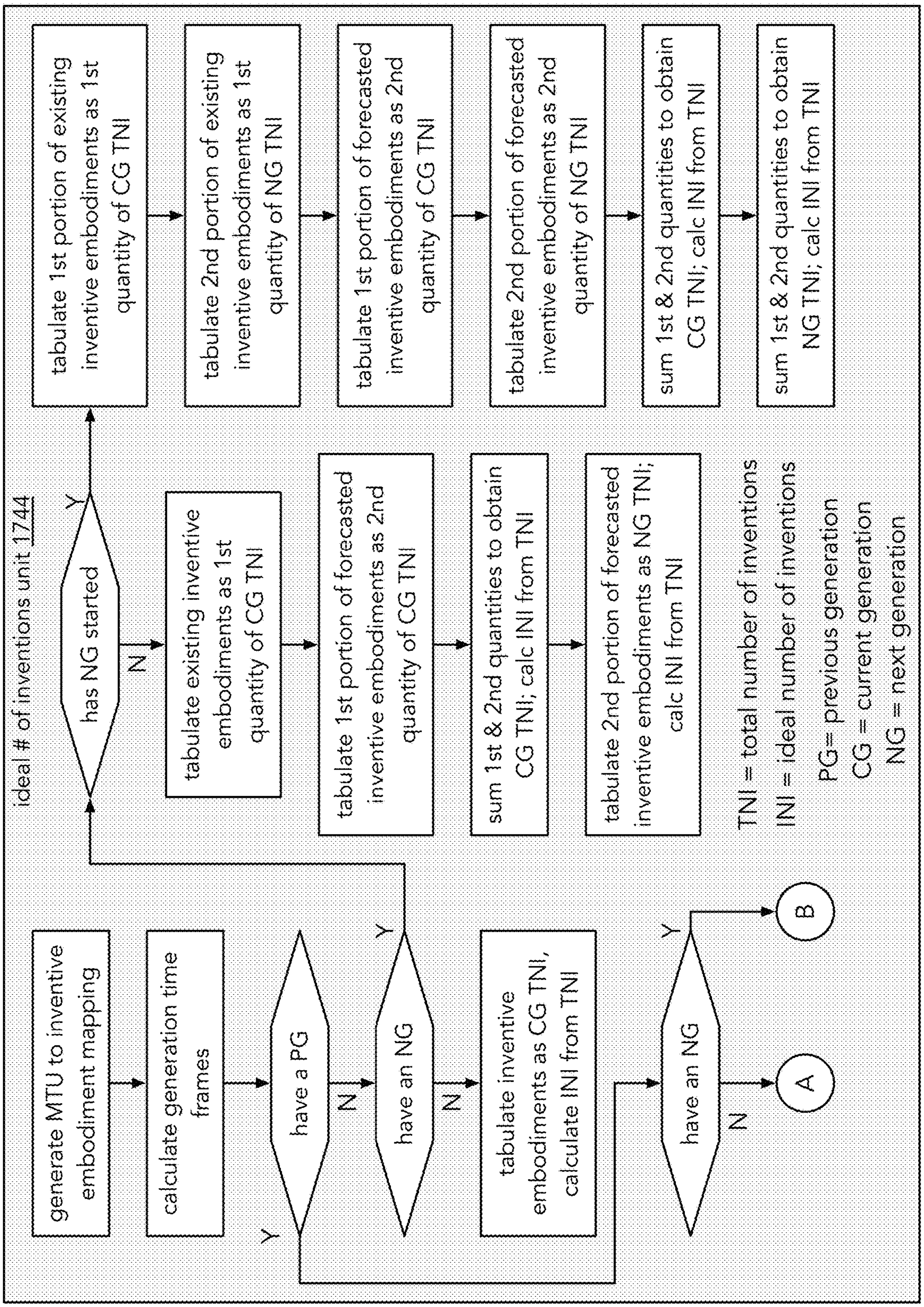
FIG. 354 is a diagram of another embodiment of an ideal number of inventions unit of an invention scope factor score for exiting patents unit and of an invention factor score for forecasted future patents units of a portfolio valuation tool for valuing an MTU of an improved computer for technology.
Figure 355:
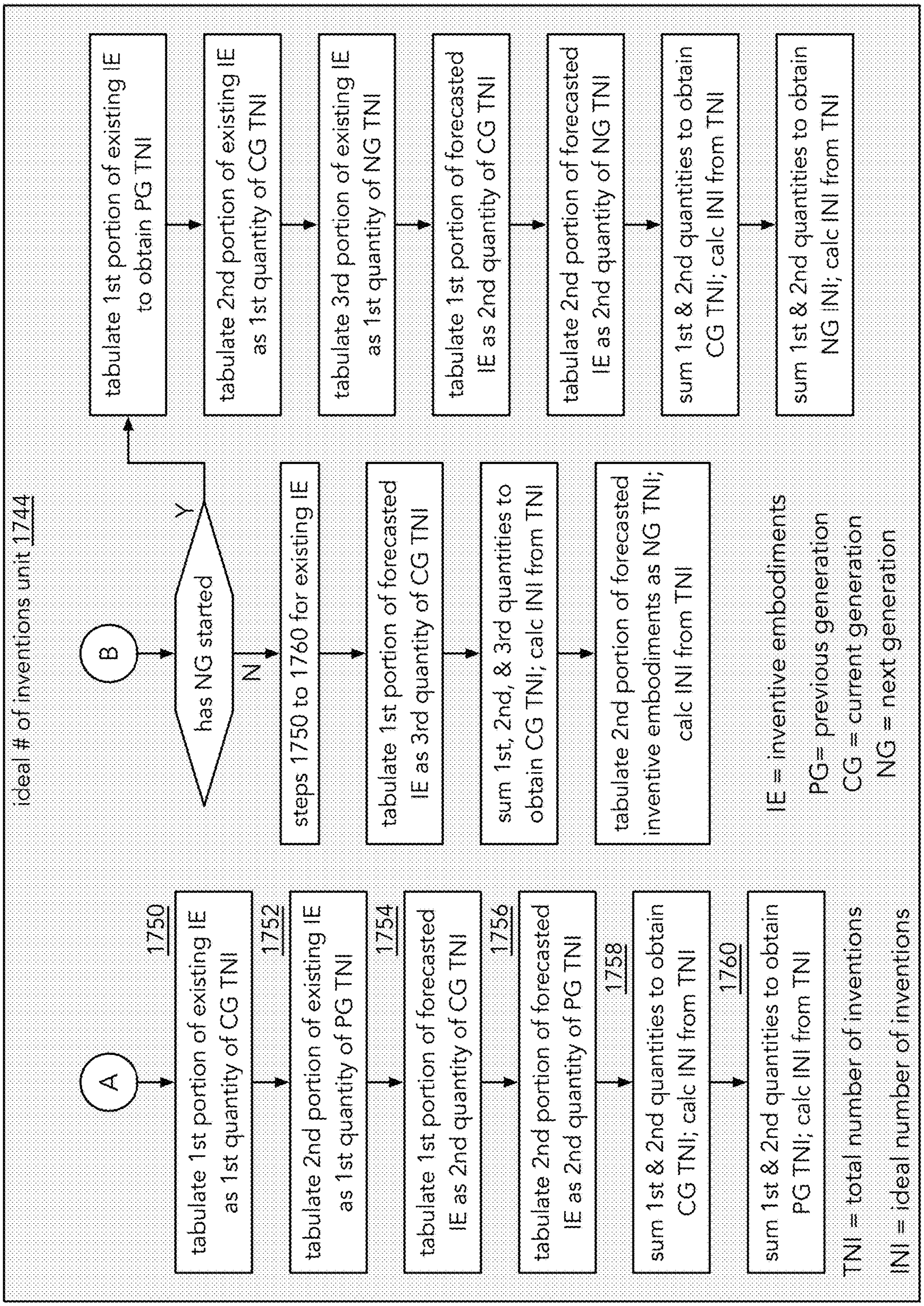
FIG. 355 is a diagram of another embodiment of an ideal number of inventions unit of an invention scope factor score for exiting patents unit and of an invention factor score for forecasted future patents units of a portfolio valuation tool for valuing an MTU of an improved computer for technology.
Figure 356:
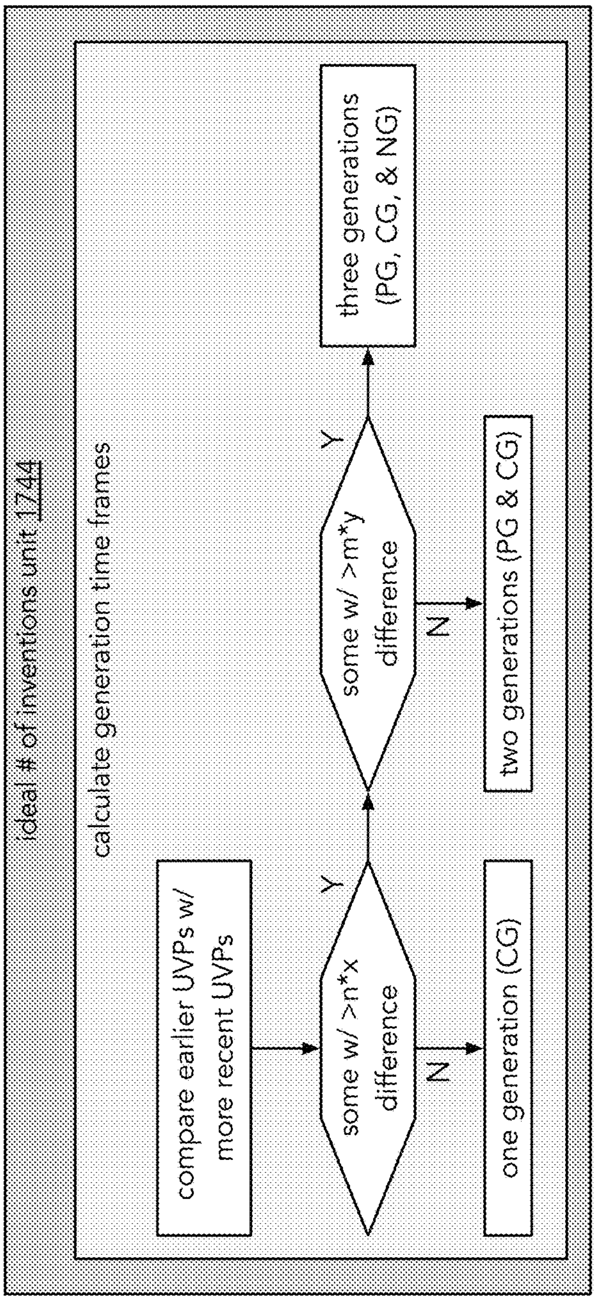
FIG. 356 is a diagram of another embodiment of an ideal number of inventions unit of an invention scope factor score for exiting patents unit and of an invention factor score for forecasted future patents units of a portfolio valuation tool for valuing an MTU of an improved computer for technology.

Referring next to FIGS. 354 and 355 another embodiment of an ideal number of inventions unit of an invention scope factor score for existing patents unit and of an invention factor score for forecasted future patents units of a portfolio valuation tool for valuing an MTU of an improved computer for technology will be discussed. Ideal number of inventions unit 1744 generates MTU to inventive embodiment mapping (FIG. 360) and calculates generation time frames (FIG. 356).

A determination is made whether the current generation MTU has a previous generation (PG), and whether the MTU has a next generation (NG). If it is determined that the MTU has only A PG and CG (i.e. PG yes, NG no) the method proceeds to off-page reference A on FIG. 355, which will be discussed subsequently. If it is determined that the MTU has all three generations, i.e. a PG, CG, and NG (PG yes, NG yes), the method proceeds to off-page reference B on FIG. 355.

If the MTU has only a CG (PG no, NG no), ideal number of inventions unit 1744 tabulates inventive embodiments as CG TNI, meaning that the number of invention in the current generation is the total number of inventions (TNI), can calculates the ideal number of inventions (INI) from the number of current generation inventions, which is also the TNI.

If the MTU has only a CG and an NG (PG no, NG yes), a determination is made whether the next generation (NG) has started. In at least one embodiment, this determination is made based, at least in part on the generation timeframes previously calculated.

If the NG has started, ideal number of inventions unit 1744 tabulates a first portion of existing inventive embodiments as a first quantity of CG TNI, and tabulates a second portion of existing inventive embodiments as a first quantity of NG TNI. Ideal number of inventions unit 1744 also tabulates a first portion of forecasted inventive embodiments as a second quantity of CG TNI and tabulates a second portion of forecasted inventive embodiments as a second quantity of NG TNI.

Ideal number of inventions unit 1744 then sums the first quantity of CG TNI and the second quantity of CG TNI to determine a calculated CG TNI. The ideal number of current generation inventions (CG INI) is then determined from the calculated total number of current generation inventions (CG TNI). Similarly, ideal number of inventions unit 1744 sums the first quantity of NG TNI and the second quantity of NG TNI to determine a calculated NG TNI. The ideal number of next generation inventions (NG INI) is then calculated from the calculated total number of next generation inventions (NG TNI).

If the NG has not started, ideal number of inventions unit 1744 tabulates existing inventive embodiments as a first quantity of CG TNI, and tabulates a first portion of forecasted inventive embodiments as a second quantity of CG TNI. Ideal number of inventions unit 1744 then sums the first quantity of CG TNI and the second quantity of CG TNI to determine a calculated CG TNI. The ideal number of current generation inventions (CG INI) is then determined from the calculated total number of current generation inventions (CG TNI).

Ideal number of inventions unit 1744 also tabulates a second portion of forecasted inventive embodiments as NG TNI, and tabulates a second portion of existing inventive embodiments as a second quantity of CG TNI. The ideal number of next generation inventions (NG INI) is then determined from the calculated total number of next generation inventions (NG TNI).

Referring next to off-page reference A of FIG. 355, the functions performed in response to ideal number of inventions unit 1744 determining that the MTU has only a PG and CG will be discussed. As illustrated by block 1750 ideal number of inventions unit 1744 tabulates a first portion of existing inventive embodiments (IE) as a first quantity of CG TNI. As illustrated by block 1752, ideal number of inventions unit 1744 tabulates a second portion of existing inventive embodiments (IE) as a first quantity of PG TNI.

As illustrated by block 1754 ideal number of inventions unit 1744 tabulates a first portion of forecasted inventive embodiments (IE) as a second quantity of CG TNI. As illustrated by block 1752, ideal number of inventions unit 1744 tabulates a second portion of forecasted inventive embodiments (IE) as a second quantity of PG TNI.

As illustrated by block 1758, ideal number of inventions unit 1744 sums the first quantity of CG TNI and the second quantity of CG TNI to determine a calculated CG TNI. The ideal number of current generation inventions (CG INI) is then determined from the calculated total number of current generation inventions (CG TNI).

As illustrated by block 1760, ideal number of inventions unit 1744 sums the first quantity of PG TNI and the second quantity of PG TNI to determine a calculated PG TNI. The ideal number of previous generation inventions (PG INI) is then determined from the calculated total number of previous generation inventions (PG TNI).

Referring next to off-page reference B of FIG. 355, the functions performed in response to ideal number of inventions unit 1744 determining that the MTU has all three of a PG, a CG, and an NG will be discussed. As illustrated, ideal number of inventions unit 1744 determines whether the NG has started. If the NG has not started, steps 1750-1760 for existing inventive embodiments are performed. Ideal number of inventions unit 1744 tabulates a first portion of forecasted inventive embodiments (IE) as a third quantity of CG TNI, and sums the first, second and third quantities of CG TNI to obtain a calculated CG TNI. Ideal number of inventions unit 1744 then calculates the ideal number of inventions for the current generation (CG INI) from the calculated CG TNI. Ideal number of inventions unit 1744 also tabulates the second portion of forecasted inventive embodiments to arrive at a calculated NG TNI. The ideal number of inventions for the next generation (NG INI) are calculated from the calculated NG TNI.

If the NG has started, ideal number of inventions unit 1744 tabulates a first portion of existing inventive embodiments (IE) to obtain the total number of previous generation inventive embodiments (PG TNI), tabulates a second portion of existing IE as a first quantity of CG TNI, and tabulates a third portion of existing IE as a first quantity of NG TNI. Ideal number of inventions unit 1744 also tabulates a first portion of forecasted IE as a second quantity of CG TNI, and tabulates a second portion of forecasted IE as a second quantity of NG TNI.

Ideal number of inventions unit 1744 sums the first quantity of CG TNI and the second quantity of CG TNI to obtain a calculated CG TNI, which used to further calculate the ideal number of inventions for the current generation (CG INI). Similarly, ideal number of inventions unit 1744 sums the first quantity of NG TNI and the second quantity of NG TNI to obtain a calculated NG TNI, which in turn is used to calculate the ideal number of inventions for the next generation (NG INI).

Referring next to FIG. 356 an ideal number of inventions unit of an invention scope factor score for existing patents unit and of an invention factor score for forecasted future patents units of a portfolio valuation tool for valuing an MTU of an improved computer for technology will be discussed. Ideal number of inventions unit 1744, which can be included in either or both of an invention scope factor score for existing patents unit and an invention factor score for forecasted future patents units of a portfolio valuation tool, includes a calculate generation time frames unit.

Calculate generation time frames unit determines generation time frames by comparing earlier unique value propositions (UVPs) with more recent UVPs. Calculate generation time frames unit determines whether a difference between one or more of the earlier and more recent UVPs is greater than a first threshold value. If not, then the difference between the earlier UVPs and the more recent UVPs indicates that the MTUs are so similar that only one generation, the current generation, exists. If the difference between the earlier UVPs and the more recent UVPs is greater than the first threshold but less than the second threshold, two generations of the MTU (PG and CG) exist. If the difference between the earlier UVPs and the more recent UVPs is greater than the second threshold, three generations of the MTU (PG, CG, and NG) exist. In at least some embodiments, the first threshold can be determined according to the equation y=n*x, where n is a constant, and x represents an original number of traits (or UVPs) associated with an MTU. In some embodiments the value of x can include a quality of the traits can be taken into account in addition to a number of the traits. The second threshold can be determined according to the equation z=m*y, where m is a constant and y is the first threshold.

In various embodiments, the constants n and m are 2 or greater, so that the if the number of MTU traits (UVPs) doubles in comparison to the original number of MTU traits, then the first threshold is satisfied. Similarly, if the number of MTU traits (UVPs) is 4 times the number of original traits, or double the first threshold, the second threshold is satisfied. Either threshold can be adjusted based on data analysis of various factors described herein, and the two constants need not be equal. For example a level of disruption, the rate at which new traits are identified, competitive information, or the like can be used in combination with, or in place of, the UVP comparisons to aid the determination of generational time frames.

Figure 357:
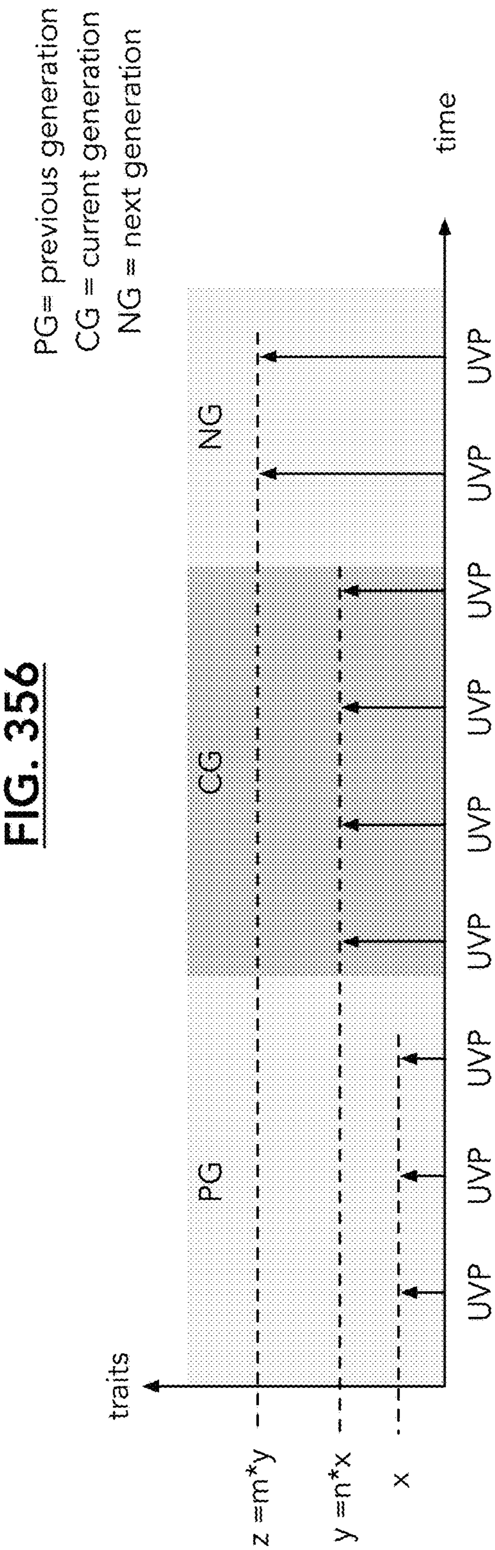
FIG. 357 is a diagram of a graph of UVP traits to time for valuing an MTU of an improved computer for technology.

Referring next to FIG. 357 a graph of UVP traits to time for valuing an MTU of an improved computer for technology will be discussed. UVP traits graph illustrates the number of UVPs over time. During a previous generation, the number and/or quality of UVPs remains essentially constant for a period of time designated as "PG". The number and/or quality of UVPs increases to a point that the first threshold (y=n*x) is satisfied during the current generation (PG), and satisfies the second threshold (z=m*y) during a period of time designated as the next generation (NG). In general, the increase in the number and/or quality of the UVPs/traits can be used to identify generational changes in an MTU.

Figure 358:
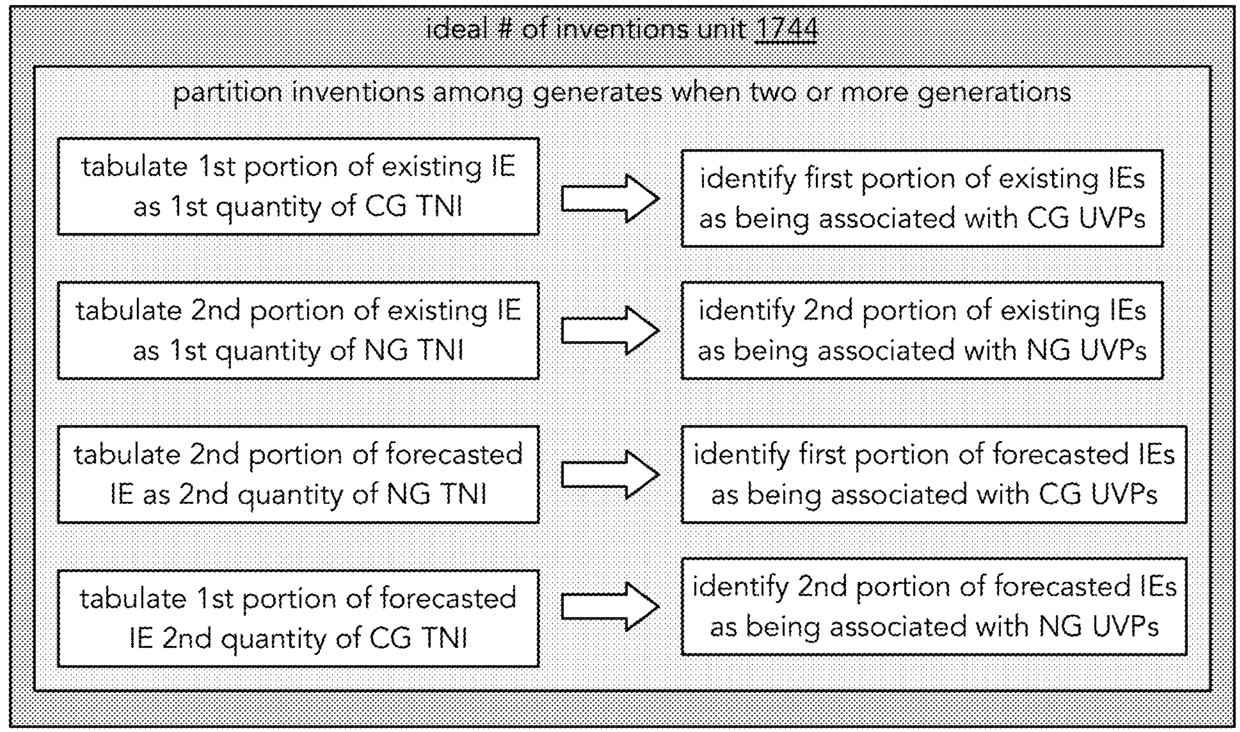
FIG. 358 is a diagram of another embodiment of an ideal number of inventions unit of an invention scope factor score for exiting patents unit and of an invention factor score for forecasted future patents units of a portfolio valuation tool for valuing an MTU of an improved computer for technology.

Referring next to FIG. 358 another embodiment of an ideal number of inventions unit of an invention scope factor score for existing patents unit and of an invention factor score for forecasted future patents units of a portfolio valuation tool for valuing an MTU of an improved computer for technology will be discussed. Ideal number of inventions unit 1744 partitions inventions among generations when two or more generations are determined to exist. As illustrated by FIG. 358, ideal number of inventions unit 1744 tabulates a first portion of existing IEs as a first quantity of CG TNI, and identifies the first portion of existing IEs as being associated with CG UVPs. Ideal number of inventions unit 1744 also tabulates a second portion of existing IEs as a first quantity of NG TNI, and identifies the second portion of existing IEs as being associated with NG UVPs.

Ideal number of inventions unit 1744 tabulates a second portion of forecasted IEs as a second quantity of NG TNI, and identifies the second portion of forecasted IEs as being associated with CG UVPs. Ideal number of inventions unit 1744 tabulates a first portion of forecasted IEs as a second quantity of CG TNI, and identifies the second portion of forecasted IEs as being associated with NG UVPs.

Figure 359:
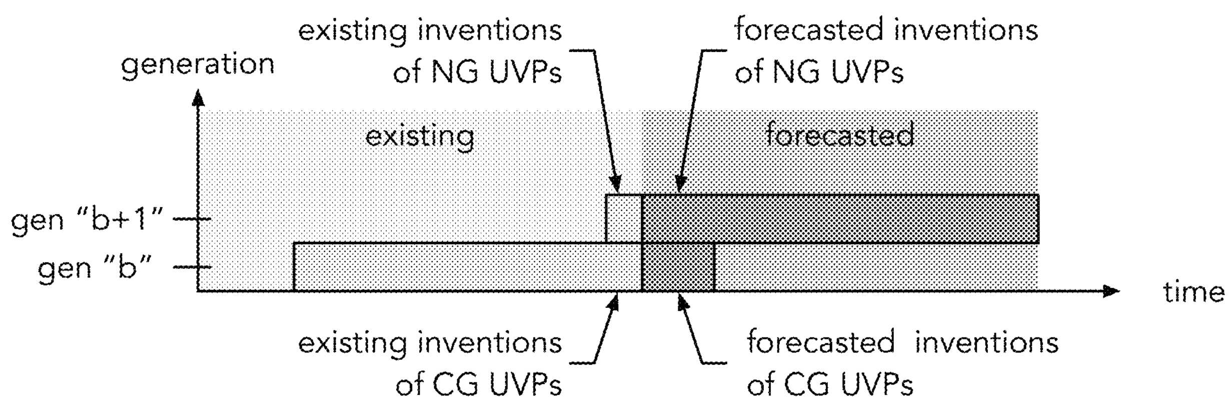
FIG. 359 is a diagram of a graph of generations to time for valuing an MTU of an improved computer for technology.

Referring next to FIG. 359 a graph of generations to time for valuing an MTU of an improved computer for technology will be discussed. The generations graph illustrates how inventions are partitioned. The generation is shown on the vertical axis, and the horizontal axis represents time. Gen "b" inventions, also referred to as current generation (CG)

The "present" is demarcated from the "future" by the change from "existing" to "forecasted." During the present period, there are existing inventions from both the current generation of technology (gen b) and the next generation of technology (gen b+1). During the future period, inventions for both gen b and gen b+1 have been forecast. In various embodiments, determining which existing and forecast inventions belong to which generation of technology is necessary for proper portfolio valuation.

The fact that an invention currently exists does not provide sufficient information to determine the generation to which the invention belongs. Similarly, a forecast invention can belong to gen b or gen b+1. Ideal number of inventions unit 1744 uses the UVPs/traits of each particular invention to determine whether a particular existing or forecasted invention belongs to the current generation (gen b) or the next generation (gen b+1).

Figure 360:
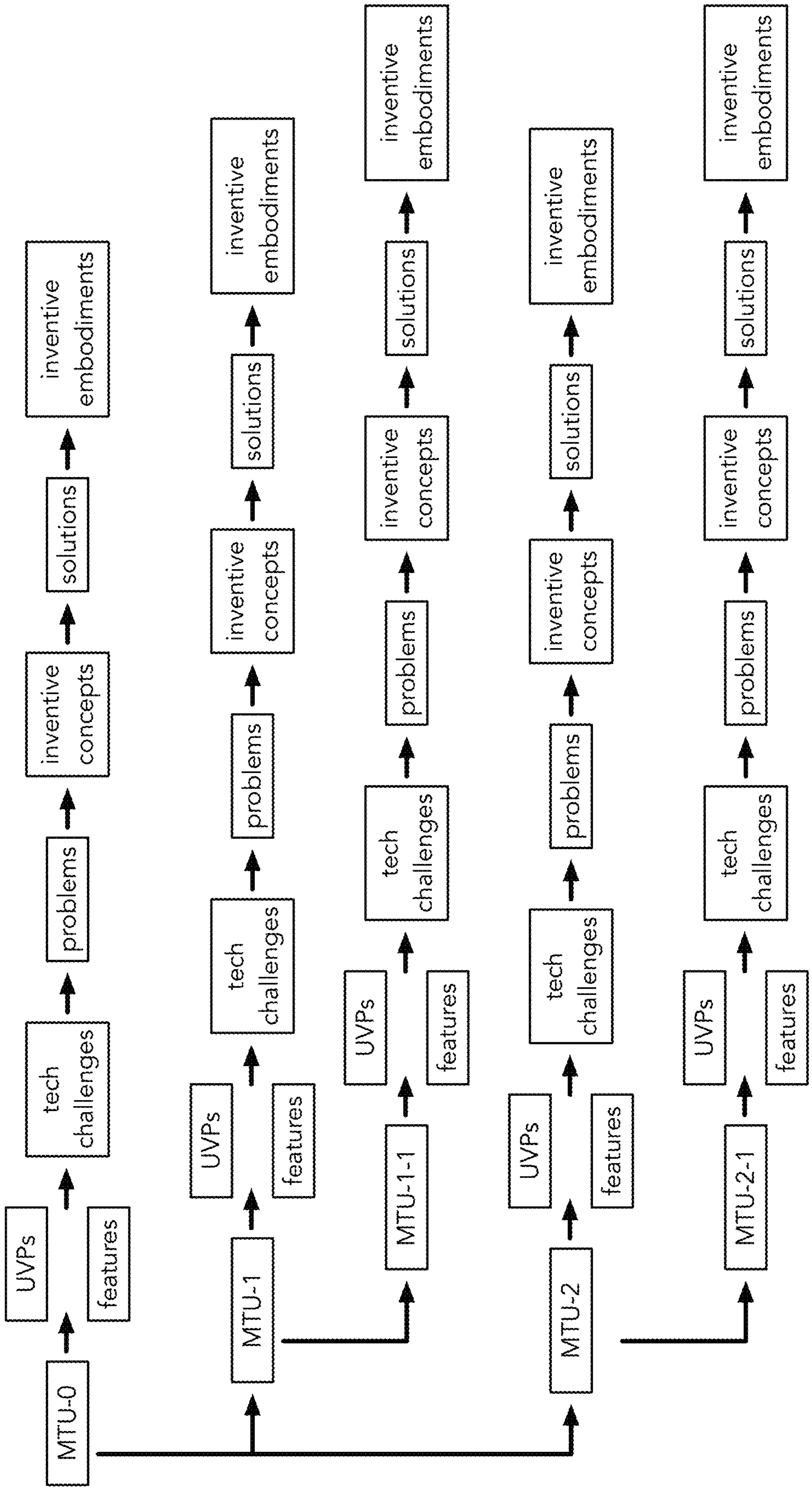
FIG. 360 is a diagram of a an MTU to inventive embodiment mapping for valuing an MTU of an improved computer for technology.

Referring next to FIG. 360 an MTU to inventive embodiment mapping for valuing an MTU of an improved computer for technology will be discussed. As previously discussed with respect to FIG. 354, ideal number of inventions unit 1744 performs MTU to inventive embodiment mapping. The MTU to inventive embodiment mapping shows various factors that can be used to identify which MTU an inventive embodiment belongs to.

MTUs can be identified based on their characteristics. For example, MTU –0 includes particular UVPs and particular features, but not others. In a very basic example, an electric motor does not have the same UVPs or features as mobile phone. But a smart mobile phone will not have the same UVPs or features as a flip phone, and so would not be included in the MTU as the smart phone, even though they are similar in many ways. Each MTU will have its own tech challenges, problems, inventive concepts solutions, and/or inventive embodiments. The greater the number of these MTU factors a product possesses, the greater the likelihood that the product will be included in an MTU. In some embodiments to be assigned to a particular MTU, an inventive embodiment must have substantially all of these characteristics in common.

In at least one embodiment, an inventive embodiment can belong to more than one MTU. For example, inventive embodiments included in MTU1-1 are also included in MTU-1. Likewise, inventive embodiments included in MTU2-1 are also included in MTU-2. In some such embodiments, the characteristics of a sub-MTU are closely related, but not necessarily identical to the characteristics of a parent MTU. Thus, if MTU-2 includes computer display screens, MTU-2-1 might include touch-screen computer displays. In this example, a touch screen would have substantially similar characteristics to other computer display screens, but the touch screen displays would additional UVPs, features, tech challenges, problems, and the like.

Figure 361:
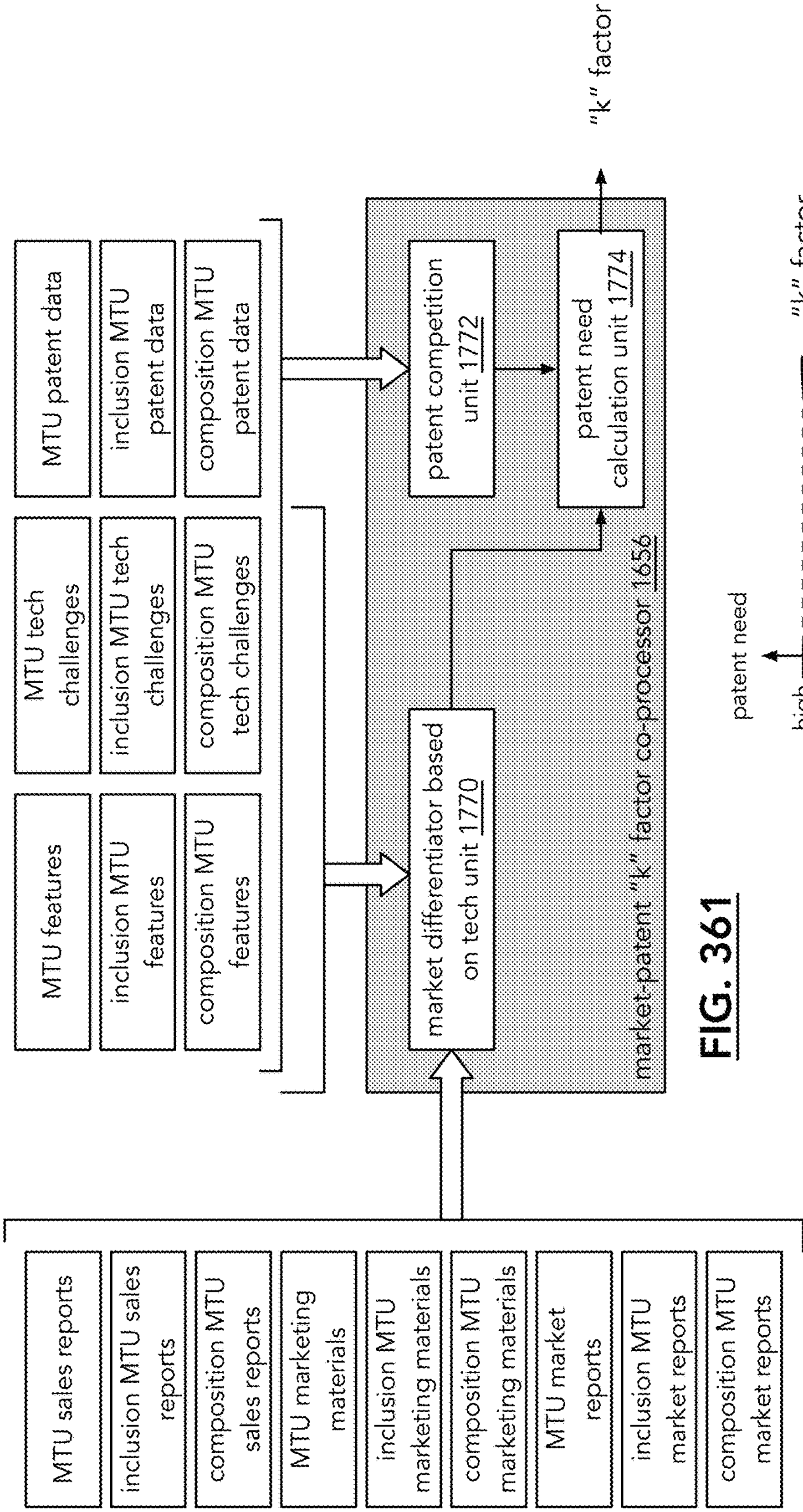
FIGS. 361 and 362 are a diagram of an embodiment of a market-patent "k" factor co-processor of a portfolio valuation tool for valuing an MTU of an improved computer for technology.

Referring next to FIGS. 361 and 362 an embodiment of a market-patent "k" factor co-processor of a portfolio valuation tool for valuing an MTU of an improved computer for technology will be discussed. Market-patent "k" factor co-processor 1656 includes a market differentiator based on tech unit 1770, a patent competition unit 1772, and a patent need calculation unit 1774.

Market differentiator based on tech unit 1770 receives some or all of the following MTU related information: MTU sales reports, inclusion MTU sales reports, composition MTU sales reports, MTU marketing materials, inclusion MTU marketing materials, composition MTU marketing materials, MTU market reports, inclusion MTU market reports, composition MTU market reports, MTU features, inclusion MTU features, composition MTU features, MTU tech challenges, inclusion MTU tech challenges, and composition MTU tech challenges. Market differentiator based on tech unit 1770 processes and distills the MTU information to generate one or more market differentiation results, which provide an indication of how unique the MTU is compared to other products. In some embodiments, the one or more market differentiation results also include results indicating how import technology is as a distinguishing feature in a particular market, a number of competitors, & size of competitors.

Patent competition unit 1772 receives some or all of the following information: MTU features, inclusion MTU features, composition MTU features, MTU tech challenges, inclusion MTU tech challenges and composition MTU tech challenges, MTU patent data, inclusion MTU patent data, and composition MTU patent data. Patent competition unit 1772 processes and distills the MTU information to generate one or more competition results, which provide an indication of how much competition the MTU faces.

The market differentiation result and the competition result are provided to patent need calculation unit 1774, which uses them to generate a "k" factor output. In at least one embodiment, the "k" factor=market leverage factor ((patent need v. level of competition)*market opportunity driven by tech). The "k" factor is a market-wide measure and is not competitor specific. The "k" factor graph illustrated in FIG. 362 shows how the "k" factor relates to patent need and technology competition.

Figures 363, 364:
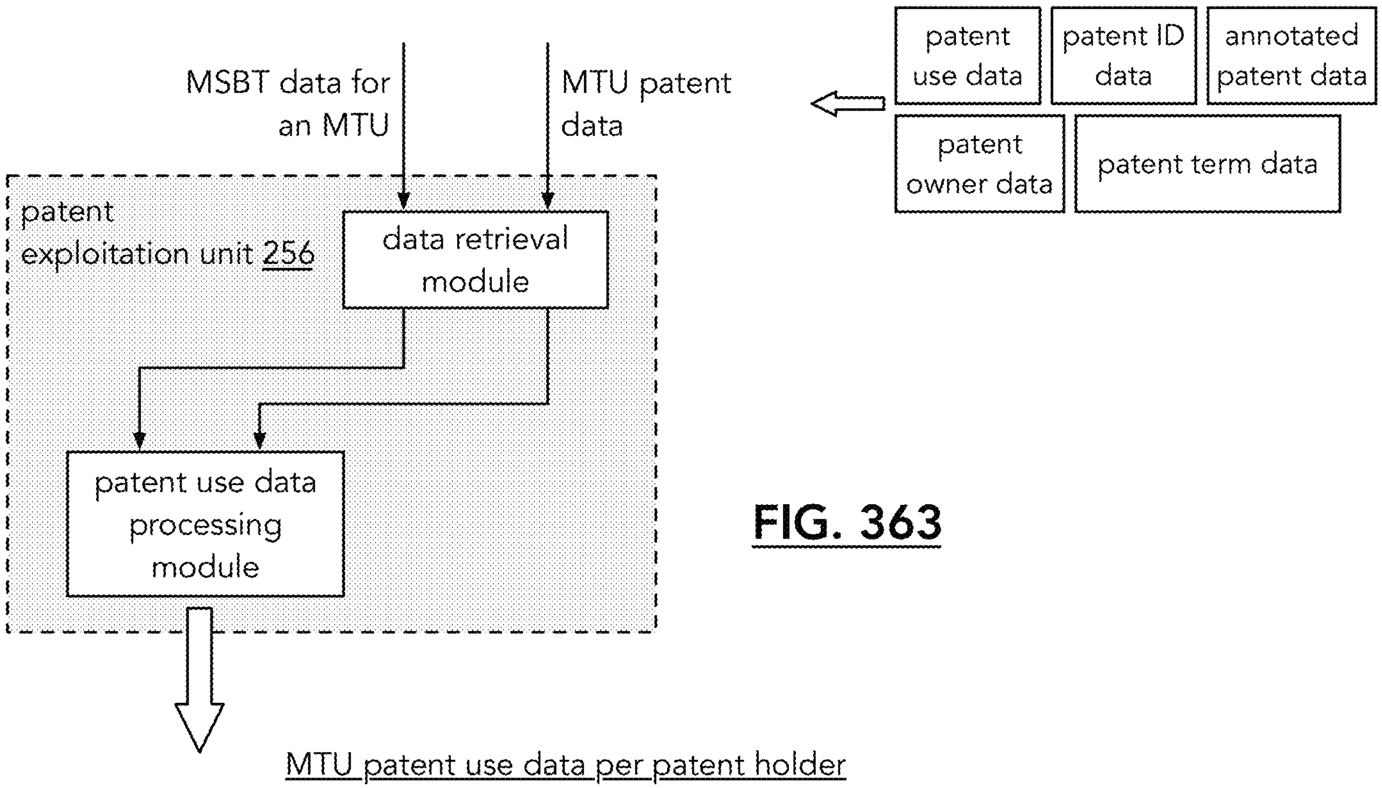
FIGS. 363 and 364 are a diagram of an embodiment of patent use tool executed by co-processor of an improved computer for technology.

FIGS. 363 and 364 are a diagram of an embodiment of patent use tool executed by co-processor of an improved computer for technology. FIG. 363 illustrates the patent exploitation unit 256 of the improved computer generating an MTU patent use data per patent holder report as shown in FIG. 364. The unit 256 retrieves MSBT data and patent data regarding one or more MTUs, which corresponds to an existing item and/or a new item.

From the retrieved data, the improved computer generates the use report as shown in FIG. 364. The report includes rows for each patent holder and columns for use data results. The columns include the field headers of patent holder ID, patent use tendencies, the name of an MTU, the life data of the MTU, patent position, market presence, use likelihood, and use score. The patent holder ID column includes one or more fields per patent holder for information regarding the patent holder (e.g., name, address, market cap, markets of interest, etc.). The patent use tendencies column includes one or more fields per patent holder for the patent holders tendencies with respect to buying patents, selling patents, licensing patents, and/or litigating patents.

The life data for an MTU column includes one or more fields per patent holder for start date, end of life data, time frame of phases, and may further include generational data. The patent position column includes one or more fields per patent holder for the patent position of the patent holder ranging from weak to superior on a sliding scale basis. The market presence column includes one or more fields per patent holder regarding the patent holders sales and/or product/service offerings of existing and/or new products/services that embody this MTU, one or more inclusion MTUs, one or more composition MTUs, and/or one or more related MTUs. The use likelihood column includes one or more fields per patent holder for indicating how the patent holder will likely use the MTU. The use score column includes one or more fields per patent holder includes one or more fields for a use score which is a calculation of the other data elements to provide insight into the most beneficial uses of MTU and/or its patents.

Figure 365:
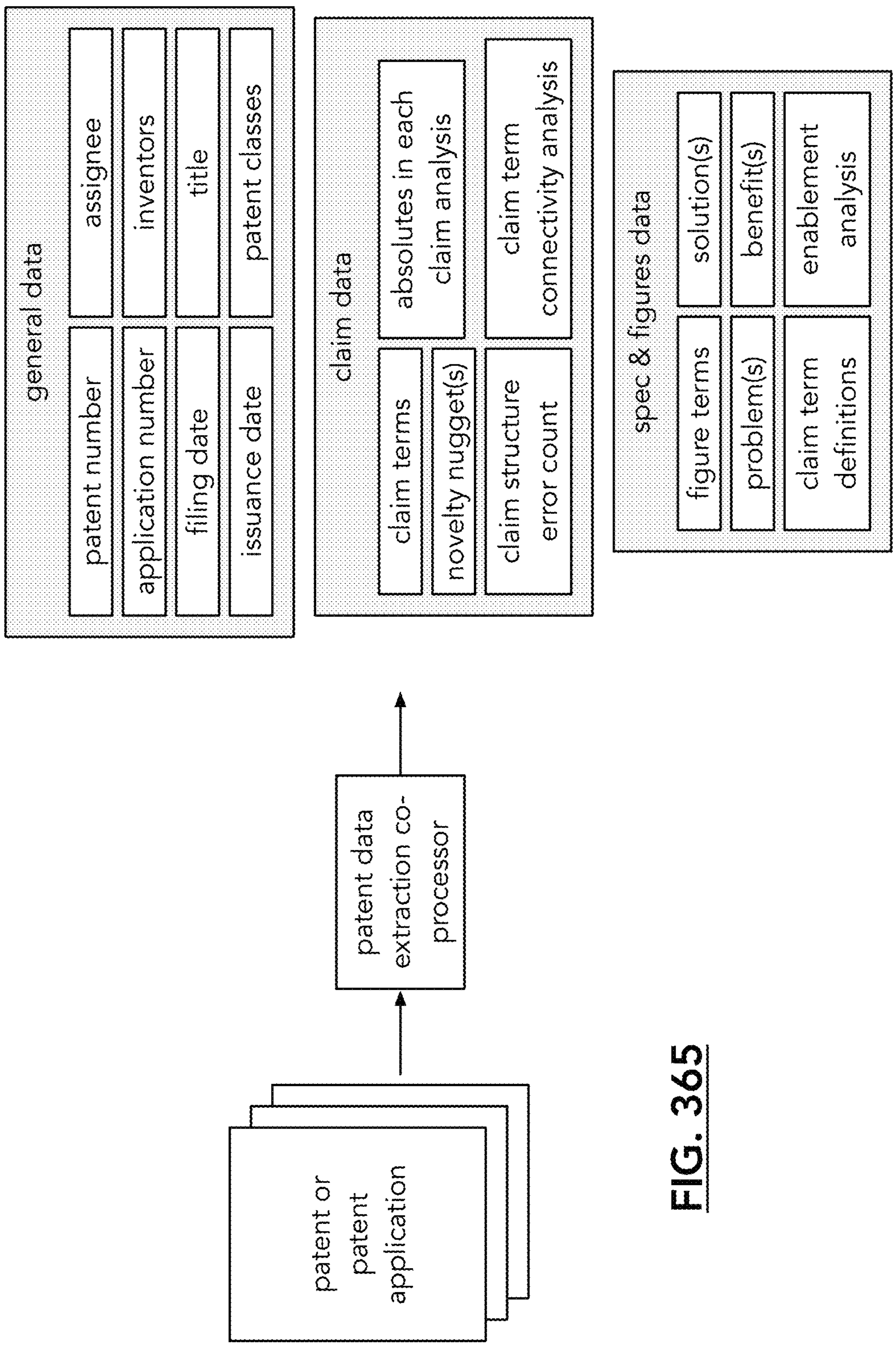
FIG. 365 is a diagram of an embodiment of patent data extraction tool executed by co-processor of an improved computer for technology.

FIG. 365 is a diagram of an embodiment of patent data extraction tool executed by co-processor of an improved computer for technology. The co-processor extracts data from a plurality of patents (e.g., issued, pending, PCT, foreign, provisional, etc.) and categorizes the data of a patent into a general patent data section, a claim data section, and a specification and figure section. As previously discussed, the improved computer uses the patent data of a patent to determine one or more of problem set up, solution & novelty, technical description, benefit of solution, technical environment & use of invention, and patent law interpretation with respect to an MTU.

Figure 366:
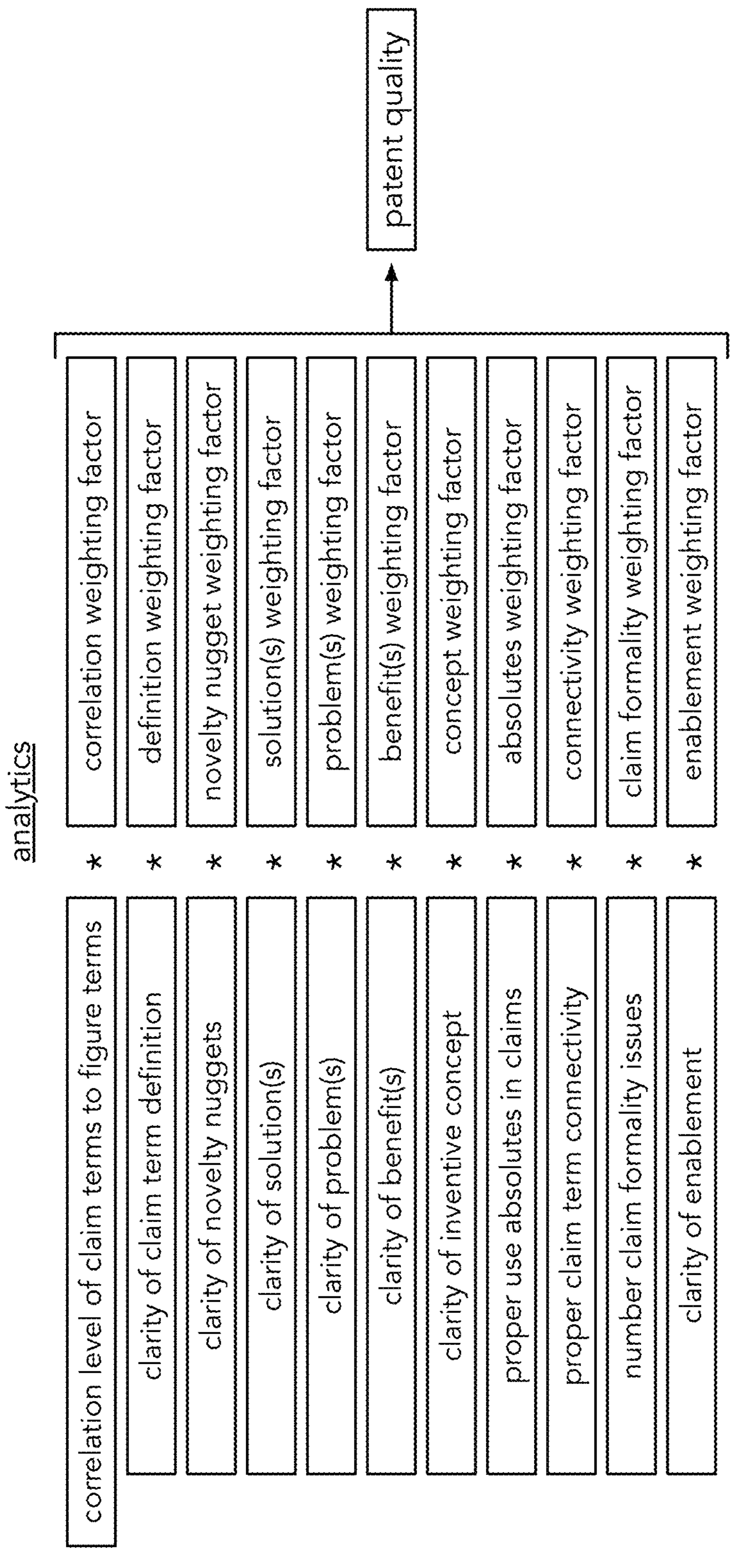
FIG. 366 is a diagram of an example of calculated data for a patent quality analysis tool executed by a co-processor of an improved computer for technology.

FIG. 366 is a diagram of an example of calculated data for a patent quality analysis tool executed by a co-processor of an improved computer for technology. For a patent, the co-processor determines a value of each of the following factors: correlation of claim terms to figure terms; clarity of claim term definition, clarity of novelty nuggets, clarity of solution, clarity of problem, clarity of benefit, clarity of inventive concept, uses of absolutes in claims (no use unless the absolute is a novelty nugget), proper claim term connectivity, number claim formality issues (e.g., claim numbering, antecedent basis), and clarity of enablement.

Each of these factors is multiplied by a corresponding weighting factor to produce a plurality of weighted scores. The weighted scores are combined to produce a patent quality score. For example, issues with the claims typically have a higher weighting factor than clarity of problem and solution, since the claims define the patent protection. Significant issues with the claims creates a very low quality score.

Figure 367:
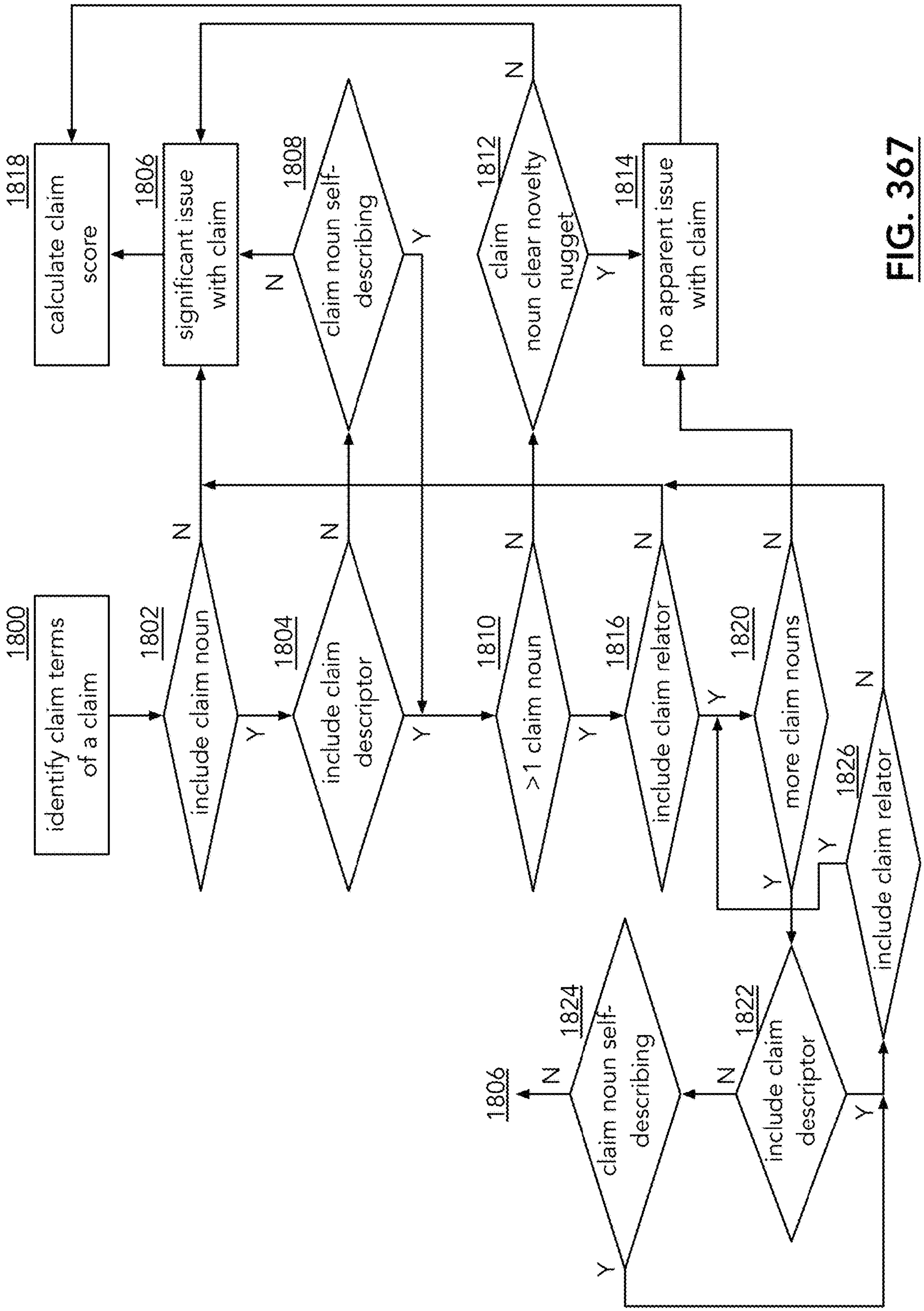
FIG. 367 is a logic diagram of an example of a method for calculating patent quality as performed by executed by a co-processor of an improved computer for technology.

FIG. 367 is a logic diagram of an example of a method for calculating patent quality as performed by executed by a co-processor of an improved computer for technology. The method begins at step 1800 where the improved computer identifies claim terms of a claim. A claim term includes one or more words regarding a claim noun (e.g., an element, a step, an input, output, and/or some quantifiable thing), a claim descriptor (e.g., a feature, a function, a description, an interaction, an operational limitation of a claim noun and/or the like), and/or a claim relator (relationship of two or more claim nouns). A technical term includes one or more words that is regarding a technical aspect of an MTU.

The method continues at step 1802 where the improved computer determines whether the claim includes a claim noun. If not, the method continues at step 1806 where the improved computer determines that this a significant issue with the claim. The method continues at step 1818 where the improved computer calculates a claim score based on the significant issue. For example, a claim score ranges from 1 to 10, where 1 is a low score indicating low quality and 10 is a high score indicating high quality.

If the answer at step 1802 was yes, the method continues at step 1804 where the improved computer determines whether a claim descriptor is associated with the claim noun. If not, the method continues at step 1808 where the improved computer determines whether the claim noun is self-describing (e.g., a resistor is self-describing, a circuit is not). If not, the method continues at step 1806.

If the answer at step 1804 or 1808 was yes, the method continues at step 1810 where the improved computer determines whether the claim includes more than one claim noun. If not, the method continues at step 1812 where the improved computer whether the claim noun is clearly a novelty nugget. If not, the method continues at step 1806. If yes, the method continues at step 1814 where the improved computer concludes that there are no apparent issues with the claim. The method continues at step 1818.

If the answer to step 1810 was yes, the method continues at step 1816 where the improved computer determines whether there is claim relator that connects the claim noun to another claim noun. If not, the method continues at step 1806. If yes, the method continues at step 1820 where the improved computer determines whether there are more claim nouns to process. If not, the method continues at step 1814.

If the answer to step 1820 was yes, the method continues at step 1822 where the improved computer determines whether a claim descriptor is associated with the claim noun. If not, the method continues at step 1824 where the improved computer determines whether the claim noun is self-describing (e.g., a resistor is self-describing, a circuit is not). If not, the method continues at step 1806.

If the answer to step 1822 or 1824 was yes, the method continues at step 1826 where the improved computer determines whether there is a claim relator that connects this claim noun to another claim noun. If not, the method continues at step 1806. If yes, the method continues at step 1820.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provide an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While transistors may be shown in one or more of the above-described figure(s) as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

As applicable, one or more functions associated with the methods and/or processes described herein can be implemented via a processing module that operates via the non-human "artificial" intelligence (AI) of a machine. Examples of such AI include machines that operate via anomaly detection techniques, decision trees, association rules, expert systems and other knowledge-based systems, computer vision models, artificial neural networks, convolutional neural networks, support vector machines (SVMs), Bayesian networks, genetic algorithms, feature learning, sparse dictionary learning, preference learning, deep learning and other machine learning techniques that are trained using training data via unsupervised, semi-supervised, supervised and/or reinforcement learning, and/or other AI. The human mind is not equipped to perform such AI techniques, not only due to the complexity of these techniques, but also due to the fact that artificial intelligence, by its very definition—requires "artificial" intelligence—i.e., machine/non-human intelligence.

As applicable, one or more functions associated with the methods and/or processes described herein can be implemented as a large-scale system that is operable to receive, transmit and/or process data on a large-scale. As used herein, a large-scale refers to a large number of data, such as one or more kilobytes, megabytes, gigabytes, terabytes or more of data that are received, transmitted and/or processed. Such receiving, transmitting and/or processing of data cannot practically be performed by the human mind on a large-scale within a reasonable period of time, such as within a second, a millisecond, microsecond, a real-time basis or other high speed required by the machines that generate the data, receive the data, convey the data, store the data and/or use the data.

As applicable, one or more functions associated with the methods and/or processes described herein can require data to be manipulated in different ways within overlapping time spans. The human mind is not equipped to perform such different data manipulations independently, contemporaneously, in parallel, and/or on a coordinated basis within a reasonable period of time, such as within a second, a millisecond, microsecond, a real-time basis or other high speed required by the machines that generate the data, receive the data, convey the data, store the data and/or use the data.

As applicable, one or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

As applicable, one or more functions associated with the methods and/or processes described herein can be implemented in a system that is operable to electronically store digital data in a memory device. Such storage cannot practically be performed by the human mind because the human mind is not equipped to electronically store digital data.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computer comprises:
- a computing entity (CE) processing core section;
- a technology level (TL) co-processor section;
- a system database section for storing a plurality of TL data operands regarding a plurality of quantified technologies;
- a memory section that stores:
  - a CE operating system;
  - a TL operating system;
  - a plurality of TL system applications, where a TL system application of the plurality of TL system applications includes a machine learning and/or artificial intelligence (ML/AI) system program; and
  - a plurality of TL user applications, where a TL user application of the plurality of TL user applications includes an ML/AI user program, wherein, when enabled:
- the computing entity processing core section executes the TL operating system to:
  - control access between the CE operating system and the TL system applications; and
  - control access between the CE operating system and the TL user applications;
- the computing entity processing core section executes the CE operating system to:
  - control access between the TL operating system and the TL co-processor section, and
  - control access between the TL operating system and the system database section; and
- the technology level co-processor section executes the TL system application, in accordance with control of the TL operating system and the CE operating system, to produce TL data operands regarding a quantified technology of the plurality of TL data operands regarding the plurality of quantified technologies from a plurality of ingested digital documents; and
- the technology level co-processor section executes the TL user application, in accordance with control of the TL operating system and the CE operating system, to:
  - generate a digital representation of a characteristic of the quantified technology for display based on retrieved TL data operands of the data operands for the quantified technology; and
  - store, in the system database section, the digital representation of the characteristic of the quantified technology in a system database record associated with the quantified technology.

2. The computer of claim 1 further comprises:
- the computing entity (CE) processing core section including one or more processing cores;
- the technology level (TL) co-processor section including one or more co-processors; and
- the system database section including one or more databases.

3. The computer of claim 1 further comprises:
- a communication interface unit that provides a digital connection to one or more networks;
- the computing entity processing core section executes the CE operating system to control access between the TL operating system and the communication interface unit, and
- the technology level co-processor section executes a second TL system application of the plurality of TL system applications, in accordance with control of the TL operating system and the CE operating system, to:
  - retrieve documents from the one or more networks via the communication interface unit;
  - identify data in a document of the documents that corresponds to one or more technology quantification categories; and
  - store the document and the data corresponding to one or more technology quantification categories as a database record in the system database, wherein a piece of the data corresponding to one of the technology quantification categories is a TL data operand of the TL data operands regarding the quantified technology.

4. The computer of claim 1 further comprises:
- a user interface unit that provides a digital communication link to a user computing device, wherein the user interface unit receives a request for execution of the TL user application from the user computing device via the digital communication link;
- the computing entity processing core section executes the CE operating system to control access between the TL operating system and the user interface unit; and
- the technology level co-processor section executes the TL user application, in accordance with control of the TL operating system and the CE operating system, to:
  - send, via the user interface unit the digital representation of the characteristic of the quantified technology to the user computing device.

5. The computer of claim 1, wherein the computing entity (CE) processing core section comprises:
- one or more core control modules;
- one or more processing modules;
- one or more main memories, a read only memory (ROM) for a boot up sequence;
- cache memory;
- one or more video graphics processing modules;
- an Input-Output (I/O) peripheral control module;

one or more input interface modules;
one or more output interface modules;
one or more network interface modules; and/or
one or more memory interface modules.

6. The computer of claim 1, wherein the technology level (TL) co-processor section comprises:
one or more tech-maturity co-processors;
one or more existing patent landscape co-processors;
one or more existing competitor patent analysis co-processors;
one or more existing how well patent protected co-processors;
one or more existing market impact co-processors;
one or more existing value analysis co-processors;
one or more forecasted patent landscape co-processors;
one or more forecasted competitor patent analysis co-processors;
one or more forecasted how well patent protected co-processors;
one or more forecasted market impact co-processors;
one or more forecasted value analysis co-processors;
one or more patent planning co-processors;
one or more expense & growth co-processors; and/or
one or more patent plan execution tracking co-processors.

7. The computer of claim 1, wherein the system database section comprises:
one or more quantified technology databases;
one or more MSBT (marketing, sales, business, technical) databases;
one or more annotated patent databases;
one or more patent terms databases; and/or
one or more market impact databases.

8. The computer of claim 1, wherein the computing entity (CE) operating system comprises:
a CE process management operating system function;
a CE command interpret operating system function;
a CE I/O device management operating system function;
a CE main memory management operating system function;
a CE file management operating system function;
a CE secondary storage management operating system function;
a CE security management operating system function; and/or
a CE error detection and management operating system function.

9. The computer of claim 1, wherein the technology level (TL) operating system comprises:
a quantified technology (QT) private database management operating system function;
a QT system database management operating system function;
a QT content management operating system function;
a QT correlation management operating system function;
a QT user interface management operating system function;
a QT security management operating system function;
a QT process management operating system function; and/or
a QT error detection and management operating system function.

10. The computer of claim 1, wherein the plurality of technology level (TL) system applications comprises two or more of:
patent data identify and gather;
patent dissection and QT interpret;
patent data record creation;
MSBT data identify and gather;
MSBT dissection and QT interpret;
MSBT data record creation;
QT tagging of patent data records;
QT tagging of MSBT data records;
QT inclusion map creation;
QT inclusion functional diagram creation;
QT inclusion technical discussion;
QT composition map creation;
QT composition functional diagram creation; and/or
QT composition technical discussion.

11. The computer of claim 1, wherein the plurality of technology level (TL) user applications comprises two or more of:
a quantified technology (QT) generation and phase report,
QT existing patent data report,
QT existing market impact report,
QT existing patent protection report,
QT previous and current value report,
QT future patent data report,
QT future market impact report,
QT future patent protection report,
QT future value report,
QT technology expansion report,
QT market opportunity report,
QT expansion report,
QT patent protection expense & growth report,
QT architectural patent protection plan,
QT invention identification & claim drafting,
QT patent application drafting,
QT patent prosecution drafting,
QT patent quality reports,
QT patent protection plan execution tracking report,
QT constructive notice report,
QT patent sale opportunity report,
QT patent purchase opportunity report,
QT patent licensing opportunity report,
QT patent standards report, and/or
QT patent spin-off or joint venture (JV) opportunity report.

* * * * *